US011979177B2

(12) United States Patent
Banin et al.

(10) Patent No.: US 11,979,177 B2
(45) Date of Patent: May 7, 2024

(54) TIME ENCODED DATA COMMUNICATION PROTOCOL, APPARATUS AND METHOD FOR GENERATING AND RECEIVING A DATA SIGNAL

(71) Applicant: Intel Corporation, Santa Clara, CA (US)

(72) Inventors: Elan Banin, Raanana (IL); Eytan Mann, Modiin (IL); Rotem Banin, Even-Yehuda (IL); Ronen Gernizky, Zichron Yaakov (IL); Ofir Degani, Nes-Ammim (IL); Igal Kushnir, Hod-Hasharon (IL); Shahar Porat, Hof Harcamel (IL); Amir Rubin, Kiryat Ono (IL); Vladimir Volokitin, Nesher (IL); Elinor Kashani, Petach Tikva (IL); Dmitry Felsenstein, Ashkelon (IL); Ayal Eshkoli, Kiryat Tivon (IL); Tal Davidson, Petach Tikva (IL); Eng Hun Ooi, Georgetown (MY); Yossi Tsfati, Rishon le Zion (IL); Ran Shimon, Givatayim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/810,845

(22) Filed: Jul. 6, 2022

(65) Prior Publication Data

US 2023/0090431 A1 Mar. 23, 2023

Related U.S. Application Data

(63) Continuation of application No. 16/639,780, filed as application No. PCT/US2018/051291 on Sep. 17, 2018, now Pat. No. 11,387,852.

(Continued)

(51) Int. Cl.
*H04B 1/04* (2006.01)
*H04L 7/033* (2006.01)

(52) U.S. Cl.
CPC ............ *H04B 1/04* (2013.01); *H04L 7/0331* (2013.01)

(58) Field of Classification Search
CPC .... H04L 5/0055; H04L 1/1812; H04L 1/1816
See application file for complete search history.

(56) References Cited

U.S. PATENT DOCUMENTS

2002/0146068 A1 10/2002 Sumitomo
2005/0078018 A1 4/2005 Cohen et al.
(Continued)

FOREIGN PATENT DOCUMENTS

JP H0472937 A 3/1992
JP H11168513 A 6/1999
(Continued)

*Primary Examiner* — Kevin Kim
(74) *Attorney, Agent, or Firm* — 2SPL Patent Attorneys PartG mbB; Kieran O'Leary

(57) ABSTRACT

An apparatus for generating a data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. An output interface circuit is configured to output the data signal.

21 Claims, 256 Drawing Sheets

Related U.S. Application Data

(60) Provisional application No. 62/559,814, filed on Sep. 18, 2017.

(56) References Cited

U.S. PATENT DOCUMENTS

| | | | | |
|---|---|---|---|---|
| 2014/0044038 | A1* | 2/2014 | Zhang | H04L 1/1854 370/328 |
| 2016/0323070 | A1* | 11/2016 | Chen | H04L 1/1896 |

FOREIGN PATENT DOCUMENTS

| | | | |
|---|---|---|---|
| JP | 2000115421 | A | 4/2000 |
| JP | 2000124966 | A | 4/2000 |

* cited by examiner

| Random Jitter | [fsec] | [%] |
|---|---|---|
| PLL | 100 | 8.00 |
| DTC | 50 | 2.00 |
| TX driver | 200 | 31.99 |
| RX LNA | 250 | 49.99 |
| TDC | 100 | 8.00 |
| | | |
| sigma | 353.6 | 49.99 |

| Random + Deterministic | [fsec_p2p] | [%] |
|---|---|---|
| Random Jitter (+/-7 sigma) | 4950.40 | 58% |
| ISI (BW) | 800 | 9% |
| Reflection | 800 | 9% |
| TDC cal | 250 | 3% |
| TDC supply mod | 1000 | 12% |
| DTC cal | 250 | 3% |
| DTC supply mod | 500 | 6% |
| Worst case assumption | 8550.00 | 100% |

FIG. 6g-1

| Random + Deterministic | [fsec_p2p] | [%] |
|---|---|---|
| Random Jitter (+/-3.7 sigma) | 2758.10 | 49% |
| ISI (BW) | 800 | 14% |
| Reflection | 800 | 14% |
| TDC cal | 250 | 4% |
| TDC supply mod | 500 | 9% |
| DTC cal | 250 | 4% |
| DTC supply mod | 250 | 4% |
| Worst case assumption | 5608.00 | 100% |

| |
|---|
| FIG. 21-1 |
| FIG. 21-2 |

| FIG. 22e-1 | FIG. 22e-2 |
|---|---|

3200

FIG. 35e
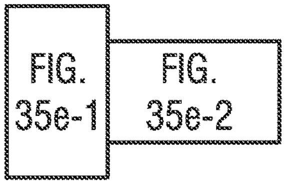
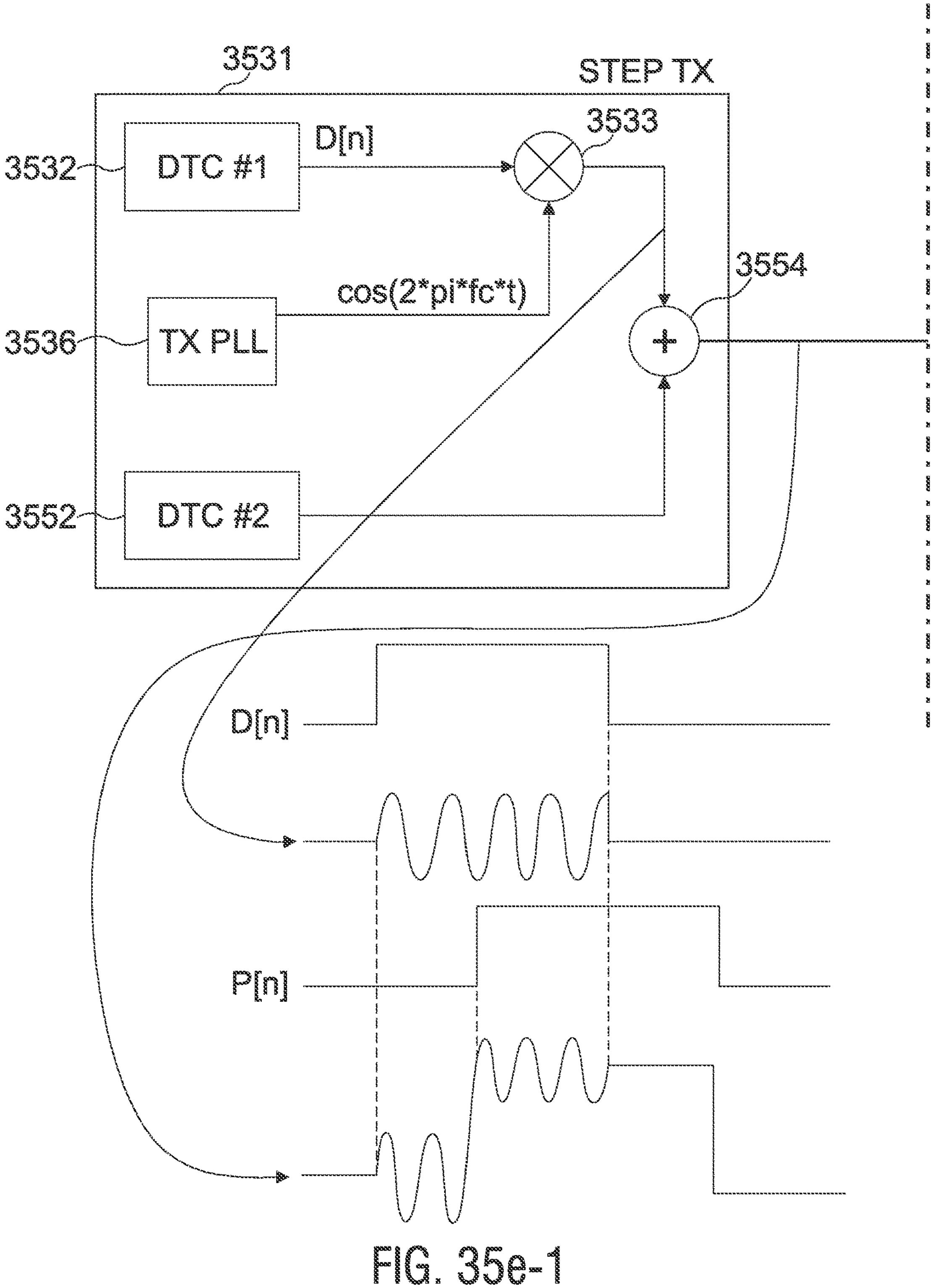
FIG. 35e-1

| stage | PLL | TDC D0 | TDC D1..D7 | DCEI high | DCEI low | pulse high | pulse low | left symbol | right symbol |
|---|---|---|---|---|---|---|---|---|---|
| 1 | T | cal to T | | 0 | 0 | T | T | 0 | 1 |
| 2 | T+d/2 | cal to T+d/2 | | 0 | 0 | T+d/2 | T+d/2 | 0 | 1 |
| 3 | T | T+d/2 | | cal to d/2 | 0 | T+d/2 | T-d/2 | 0 | 1 |
| 4 | T | T+d/2 | | cal to d | d/2 | T+d/2 | T-d/2 | 0 | 1 |
| 5 | T | T | D1 cal to d | d | 0 | T+d | T-d | 1 | 2 |
| 6 | T | T | D1=d | cal to 2d | d | T+d | T-d | 1 | 2 |
| 7 | T | T | D1=d | cal to 3d | 2d | T+d | T-d | 1 | 2 |

FIG. 40c-1

| | | | | | | | | | |
|---|---|---|---|---|---|---|---|---|---|
| 8 | T | T | D1=d | cal to 4d | 3d | T+d | T-d | 1 | 2 |
| 9 | T | T | D2 cal to d | 2d | 0 | T+2d | T-2d | 2 | 3 |
| 10 | T | T | D3 cal to d | 3d | 0 | T+3d | T-3d | 3 | 4 |
| 11 | T | T | D4 cal to d | 4d | 0 | T+4d | T-4d | 4 | 5 |
| 12 | T | T | D5 cal to d | 0,MMD=2 | 0 | T+5d | T-5d | 5 | 6 |
| 13 | T | T | D6 cal to d | d,MMD=2 | 0 | T+6d | T-6d | 6 | 7 |
| 14 | T | T+d/2 | D7 cal to d+d/2 | 3d, MMD=2 | 0 | T+8d | T-8d | 7 | del |

TIME ENCODED DATA COMMUNICATION PROTOCOL, APPARATUS AND METHOD FOR GENERATING AND RECEIVING A DATA SIGNAL

CROSS-REFERENCE TO RELATED APPLICATIONS

This application is a continuation of U.S. patent application Ser. No. 16/639,780, which was filed on Feb. 18, 2020. That application was a 35 U.S.C. § 371 national stage entry of PCT/US2018/051291, filed on Sep. 17, 2018. That application claimed the benefit of priority to U.S. Provisional Application 62/559,814, filed on Sep. 18, 2017, and U.S. Provisional Application 62/649,599, filed on Mar. 29, 2018. The contents of these earlier filed applications are incorporated by reference herein in their entirety.

TECHNICAL FIELD

Examples relate to a time encoded data communication protocol, apparatuses for generating a data signal and apparatuses for receiving a data signal.

BACKGROUND

Interconnects to transfer data may need to fulfill various requirements which depend on the application of the interconnect. For example, it may be desirable to achieve high throughput at moderate energy consumption. Further, it may be desirable to avoid interference of the interconnect with other components present in a system using the interconnect, like e.g. mobile devices/phones, computers, memory/storage systems, sensor systems or the like.

For example, digital interfaces between storage devices like hard disk drives or Solid-State-Drives (SSDs) may be based on Peripheral Component Interconnect Express (PCI-E) or Serial AT Attachment (SATA), which may require too much power per bit of transferred information to be applied within mobile devices. Analog or digital connects, e.g. between a radio frequency frontend and further signal processing circuitry of, for example a mobile telecommunication device, may be expensive and consume a considerable amount of space. There may be a demand for an interconnect with enhanced characteristics.

BRIEF DESCRIPTION OF THE DRAWINGS

FIG. 6*g*, broken into partial views 6*g*-1 and 6*g*-2, illustrates an example of performance gains achievable when using an example as described one of FIGS. 6*b* to 6*f;*

Figure 15A:
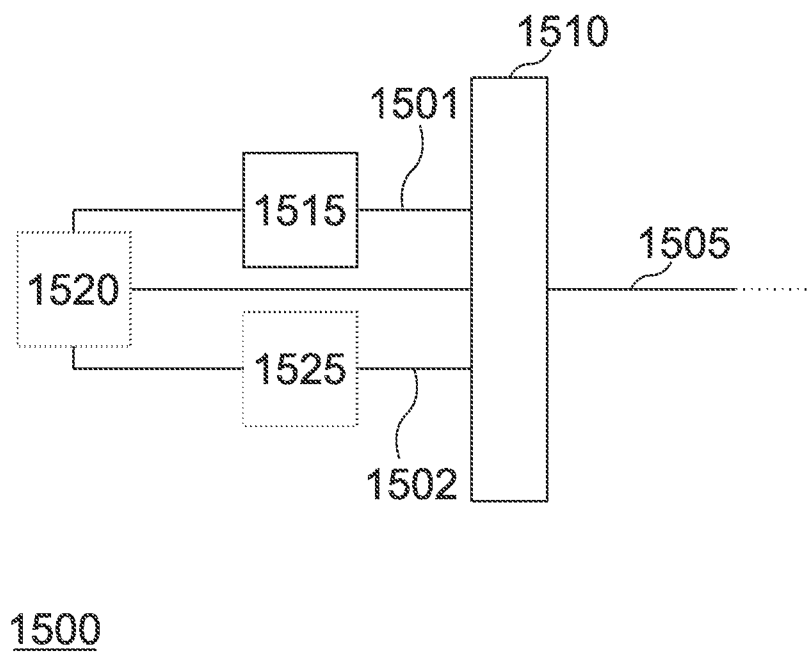
FIG. 15*a* illustrates an example of an apparatus for generating a data signal.
Figures 1, 15B:
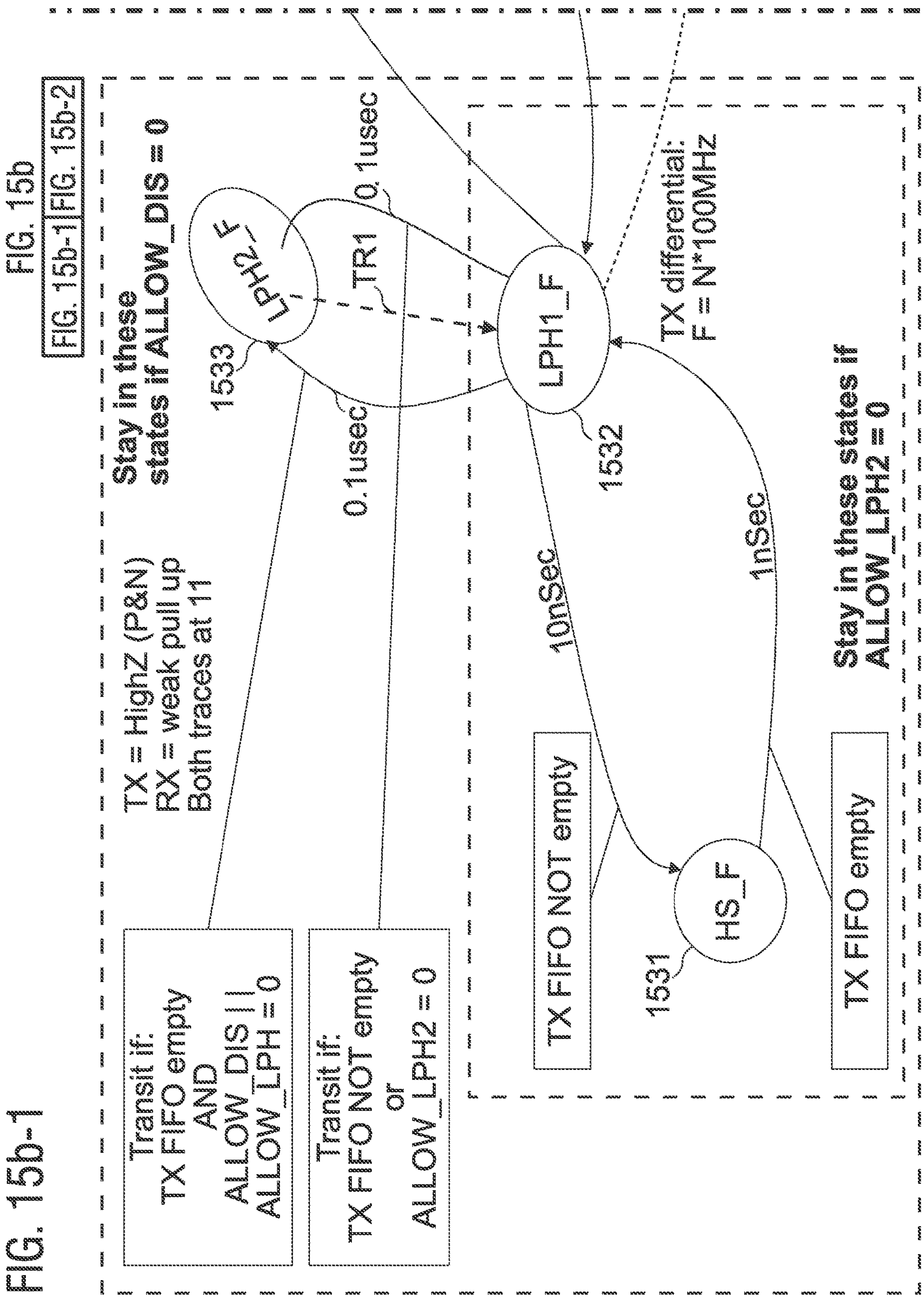
FIG. 15*b*, broken into partial views 15*b*-1 and 15*b*-2, illustrates an example of state diagram for power states.
Figures 2, 15B:
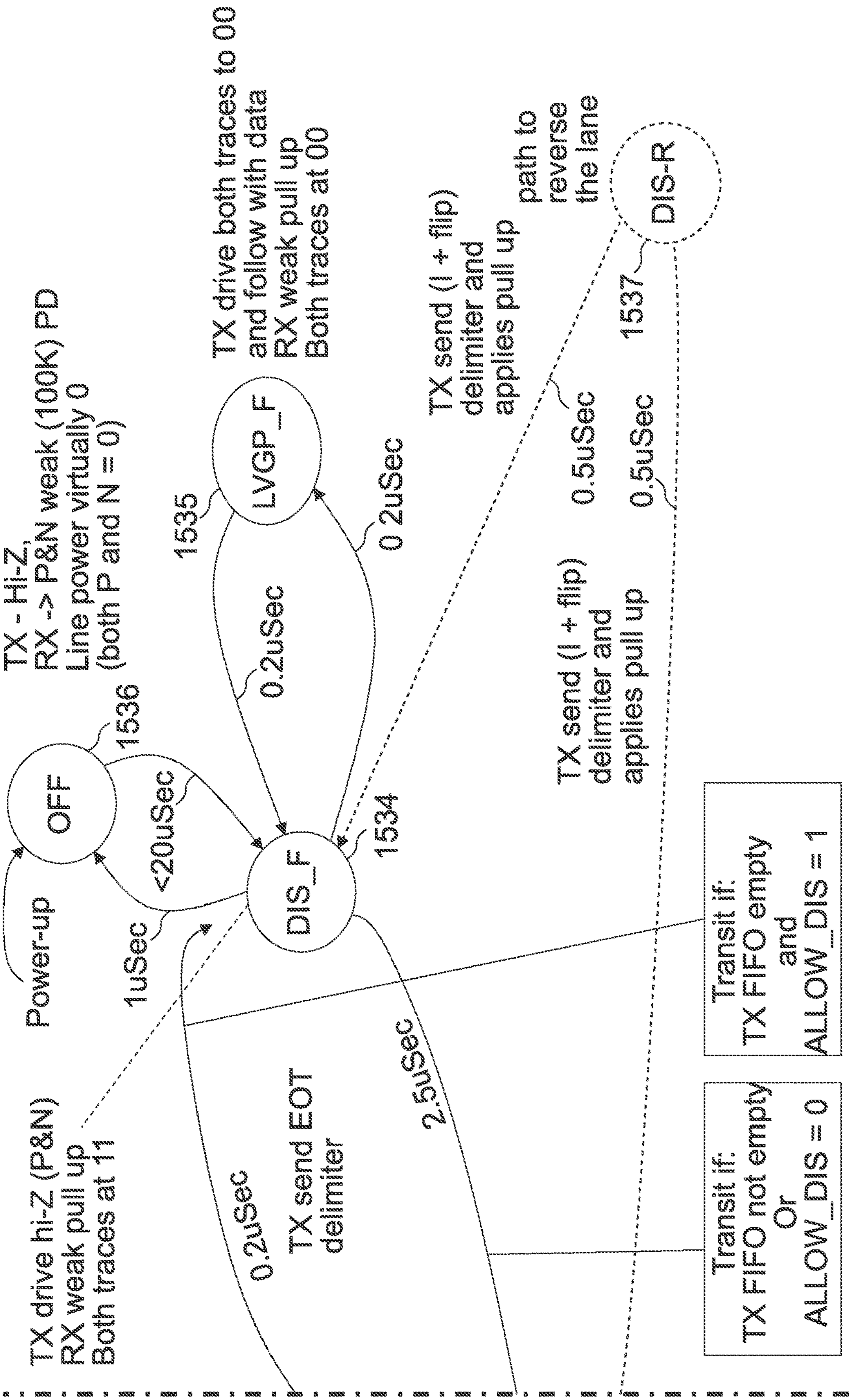
Figure 15C:
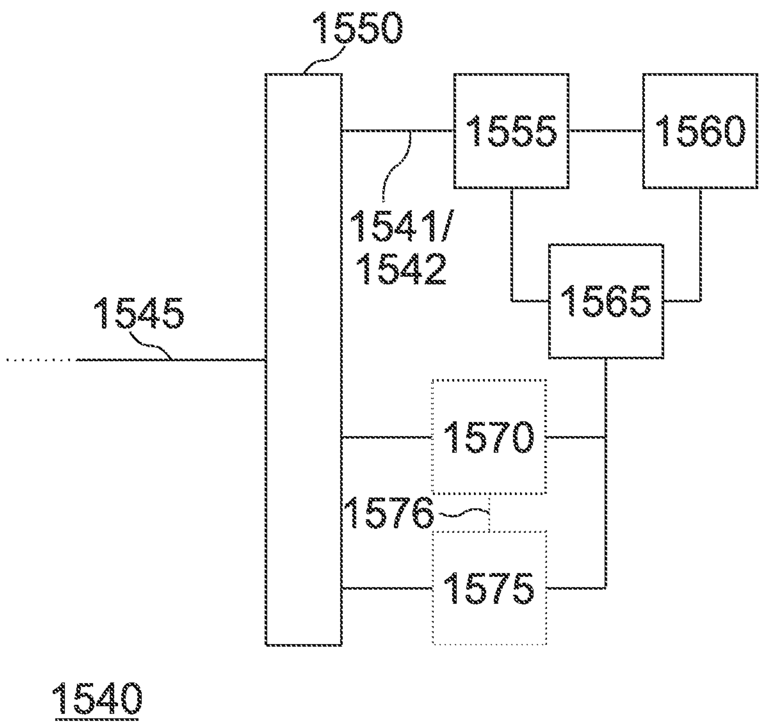
Figure 15D:
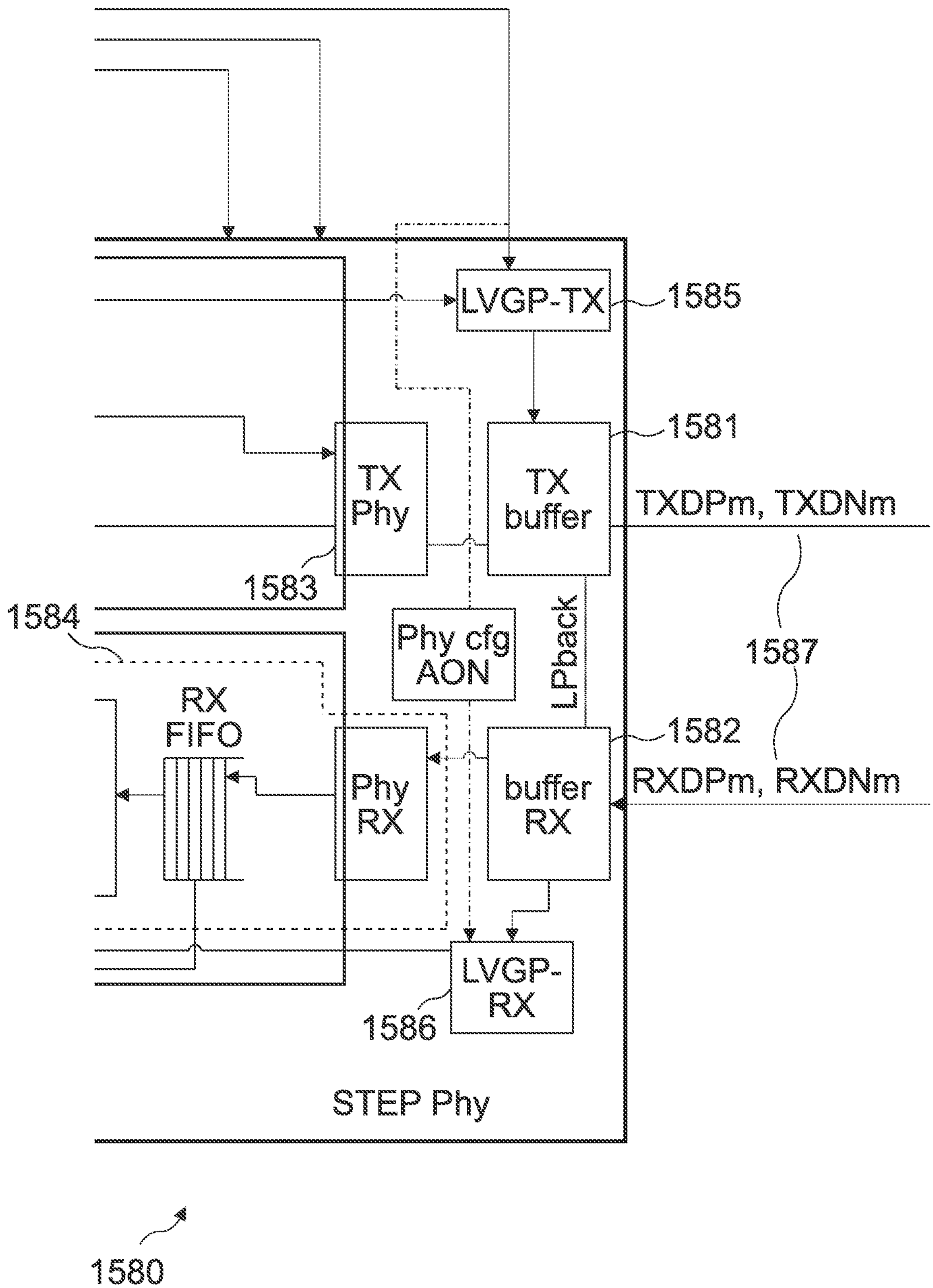
Figure 16A:
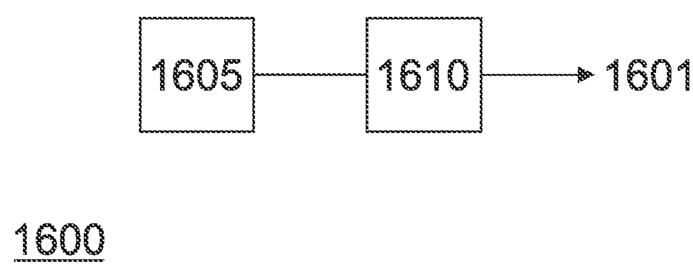
Figure 16B:
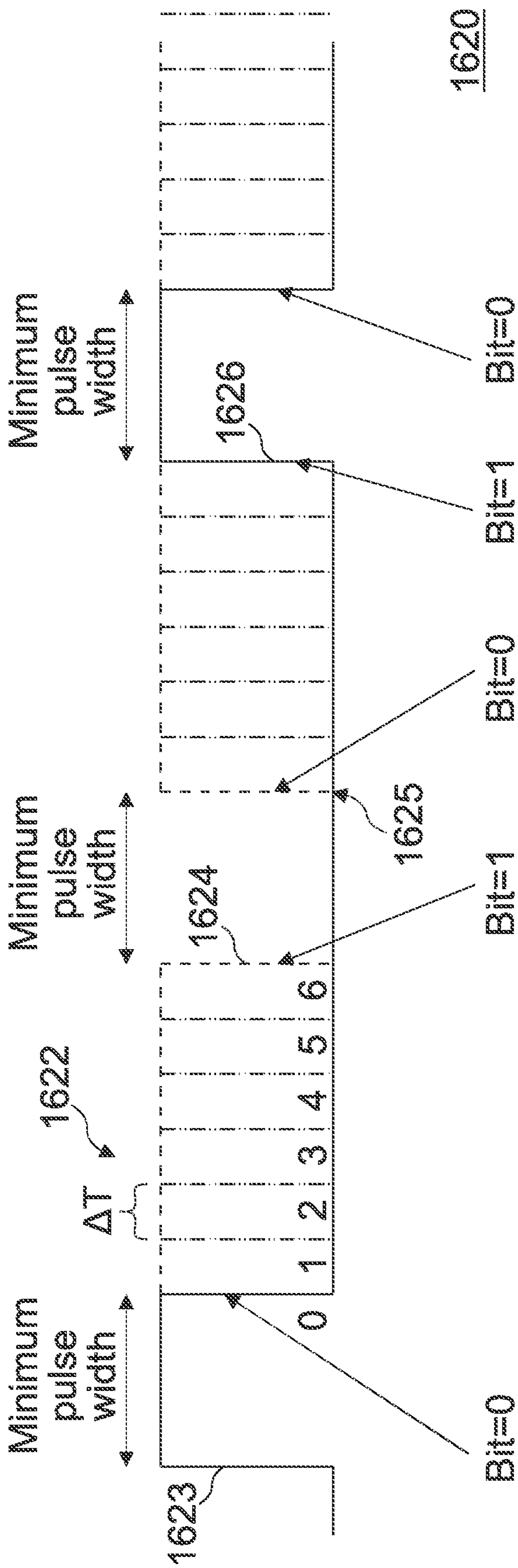
Figure 16C:
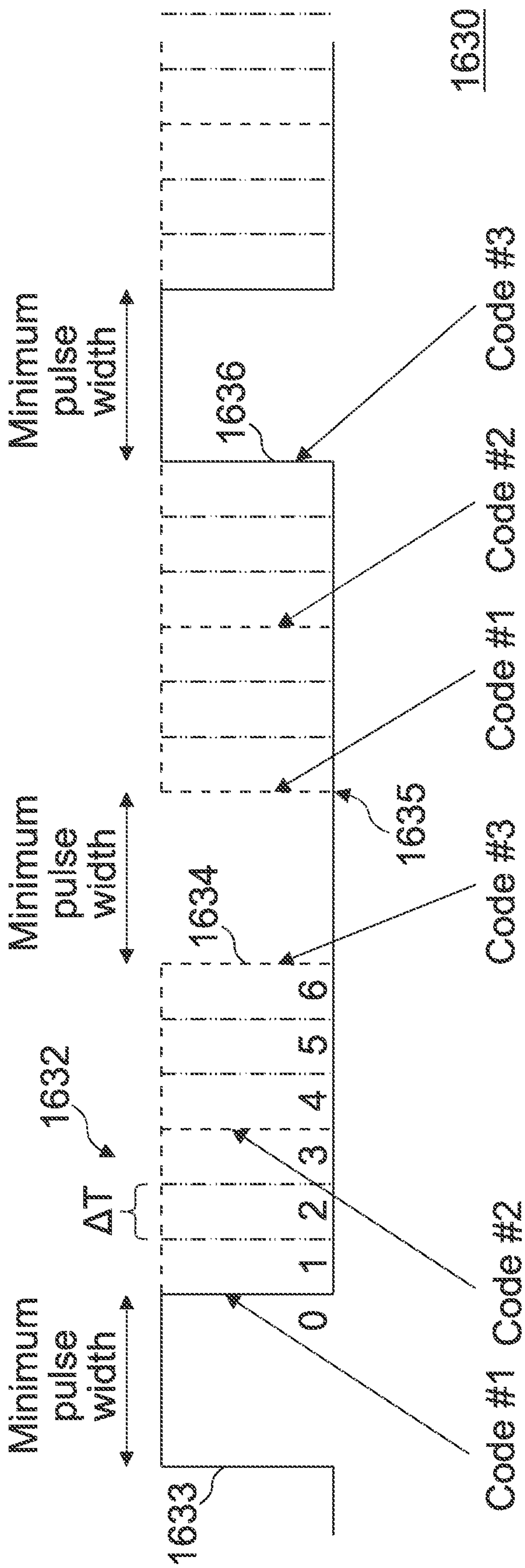
Figure 16D:
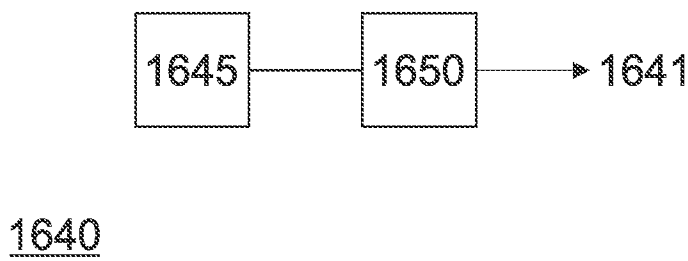
Figure 16E:
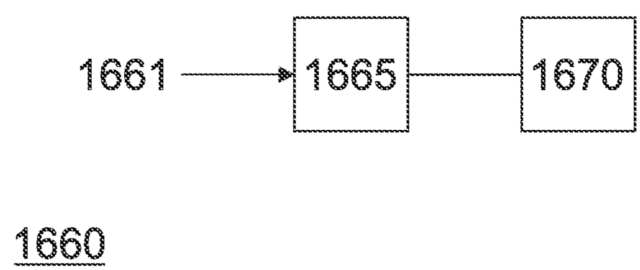
Figure 16F:
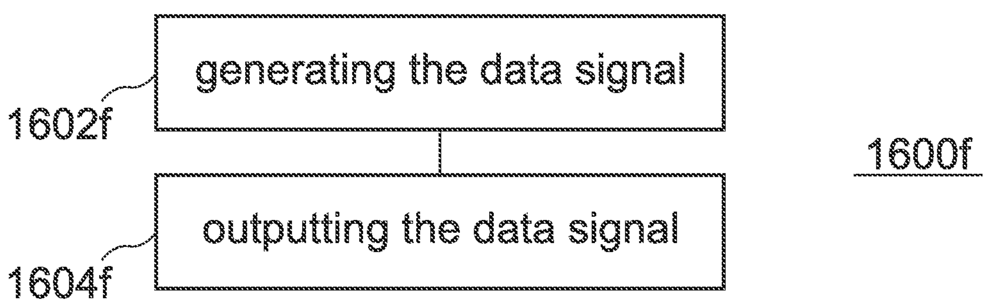
Figure 16G:
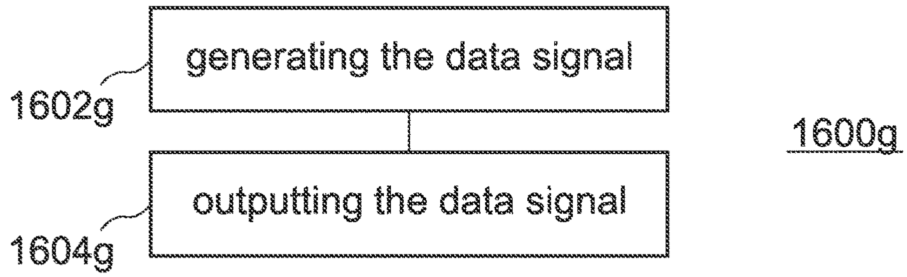
Figure 16H:
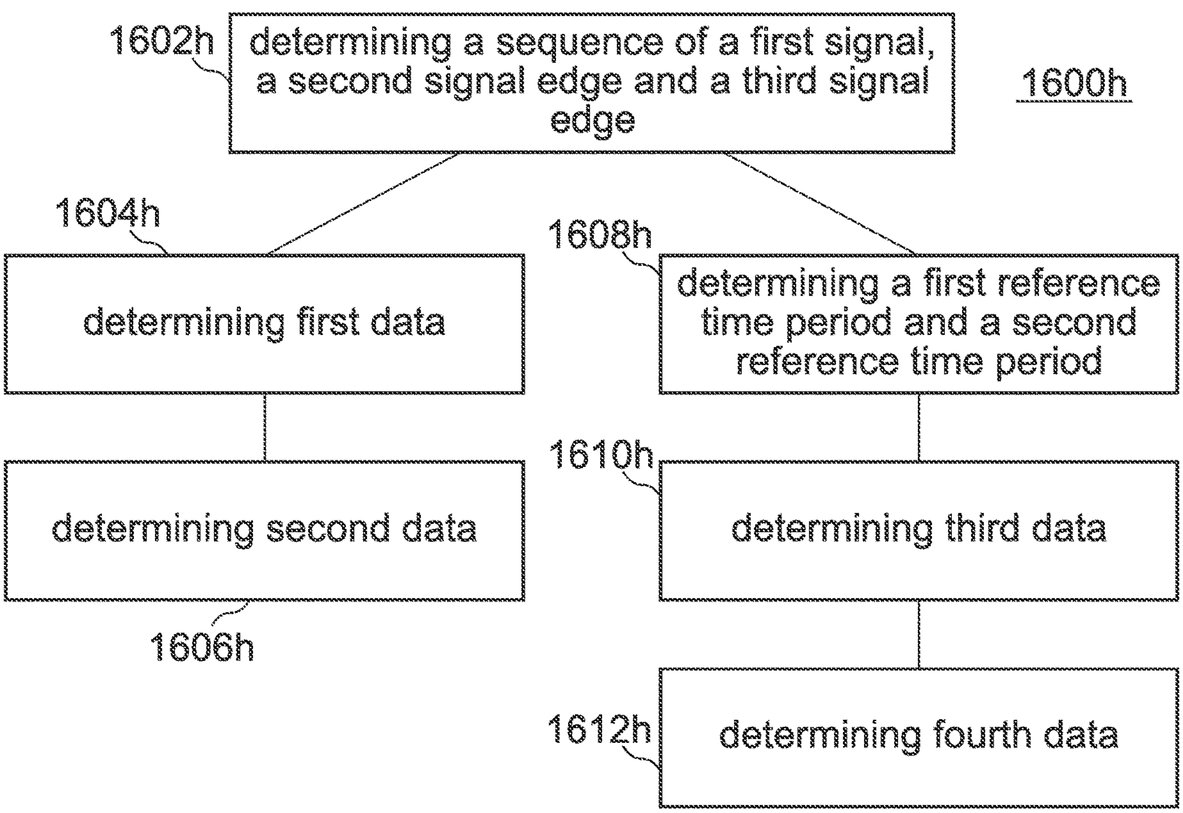
Figure 17A:
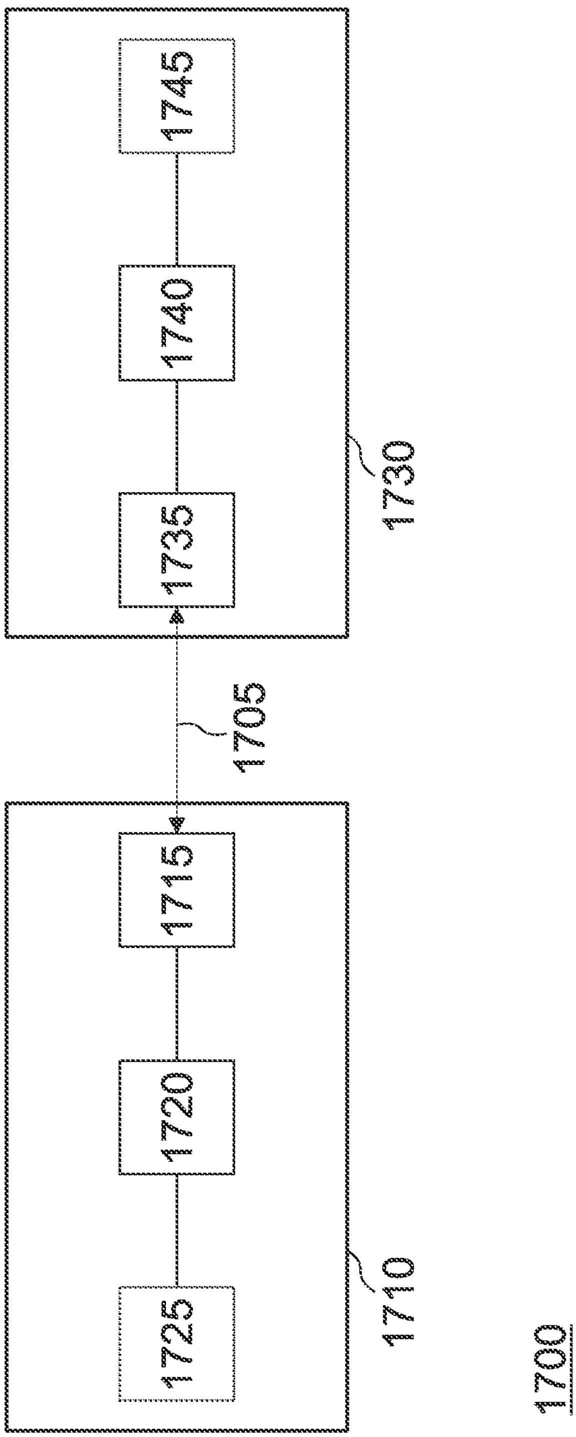
Figure 17B:
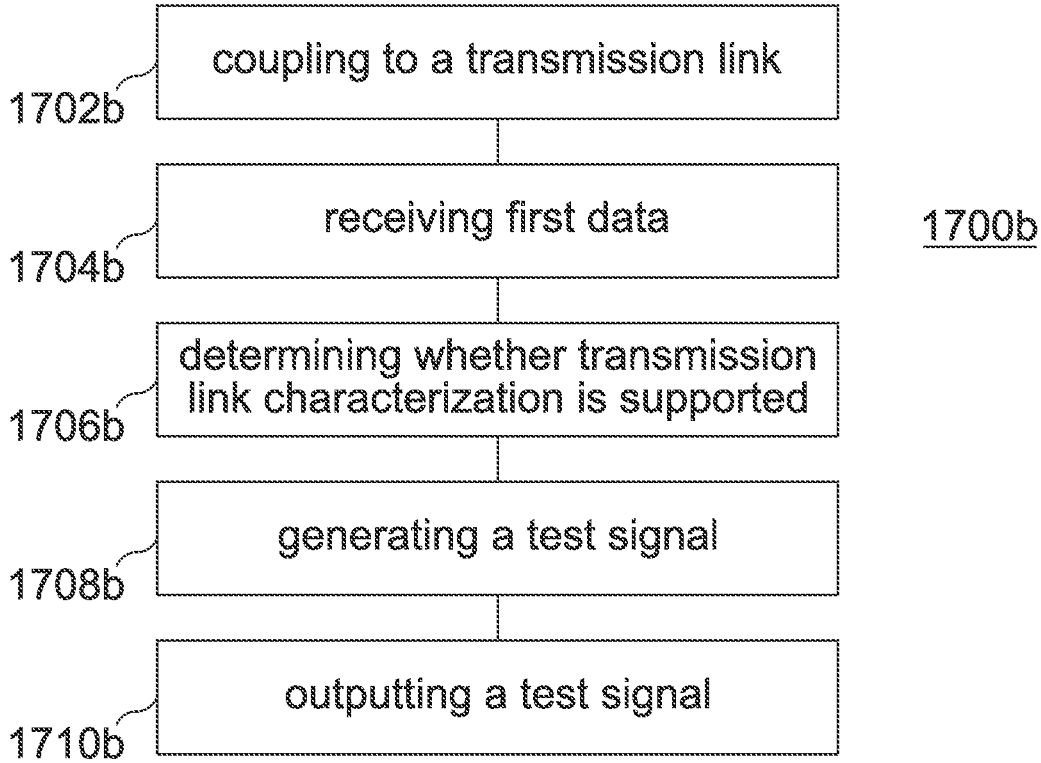
Figure 17C:
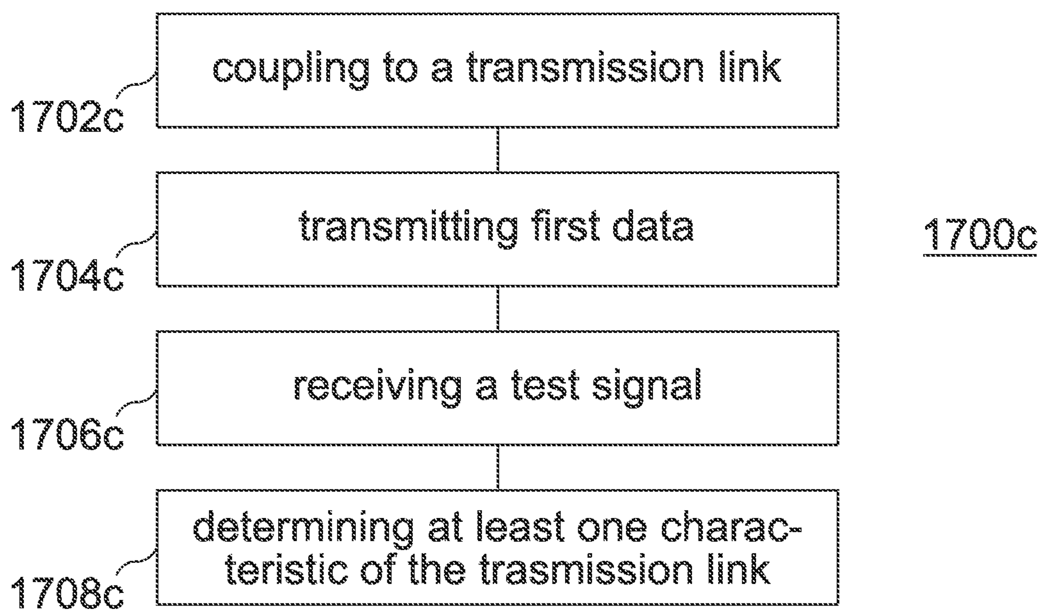
Figure 18A:
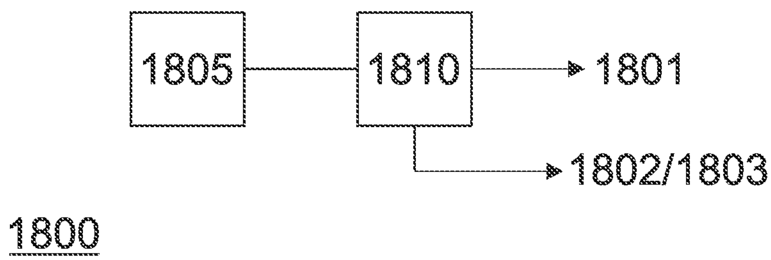
Figure 18B:
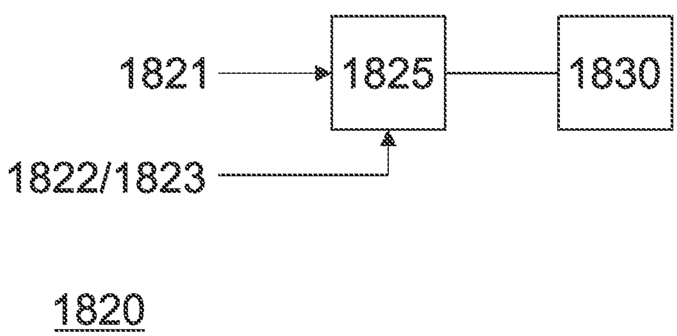
Figure 18C:
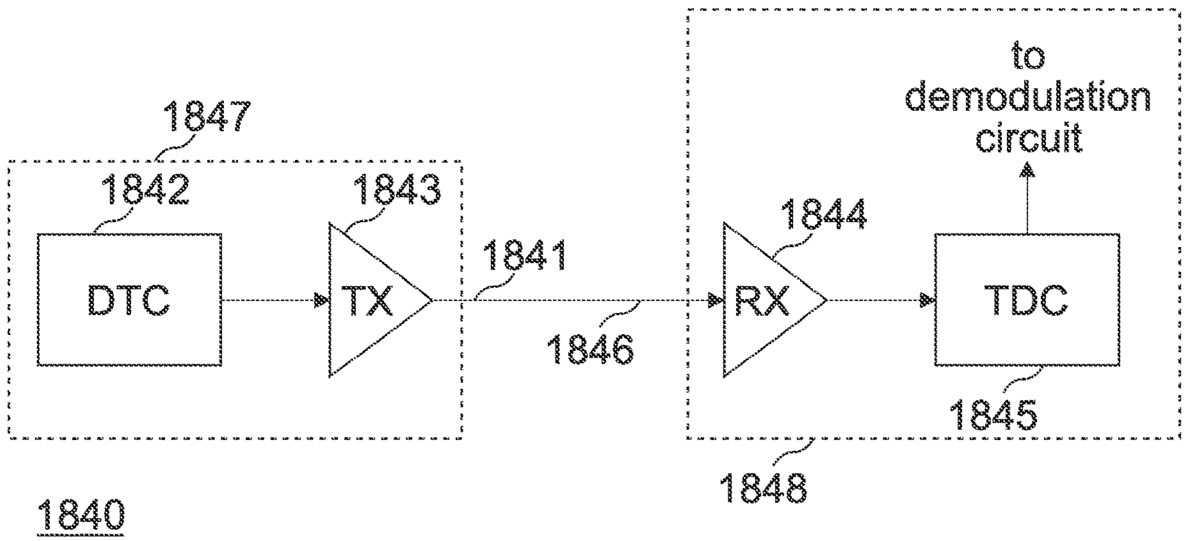
Figure 18D:
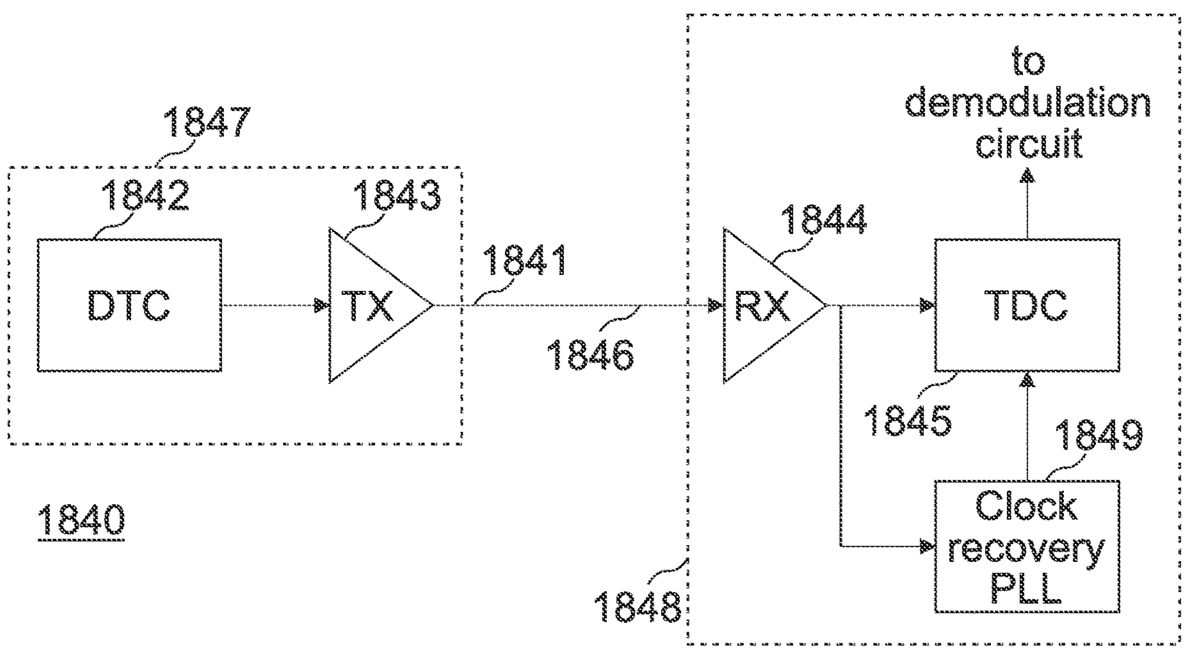
Figure 18E:
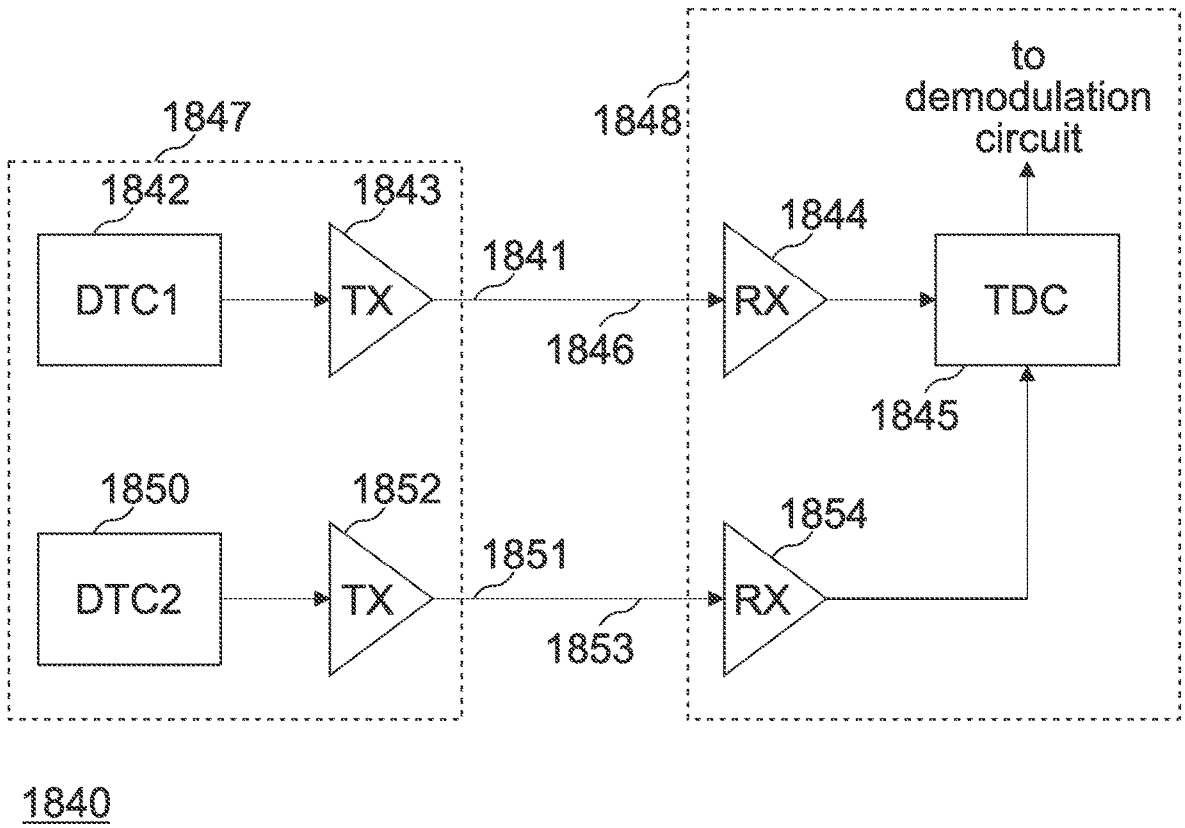
Figure 18F:
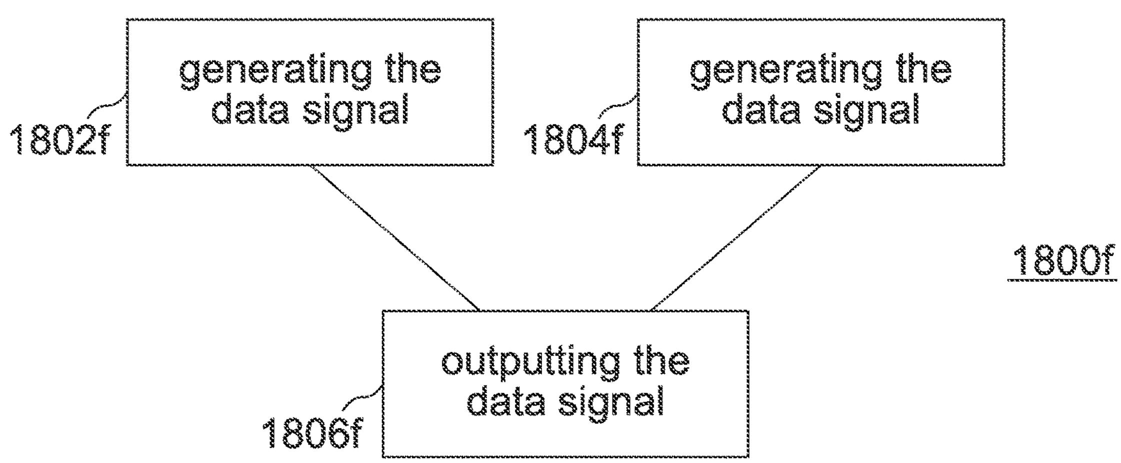
Figure 18G:
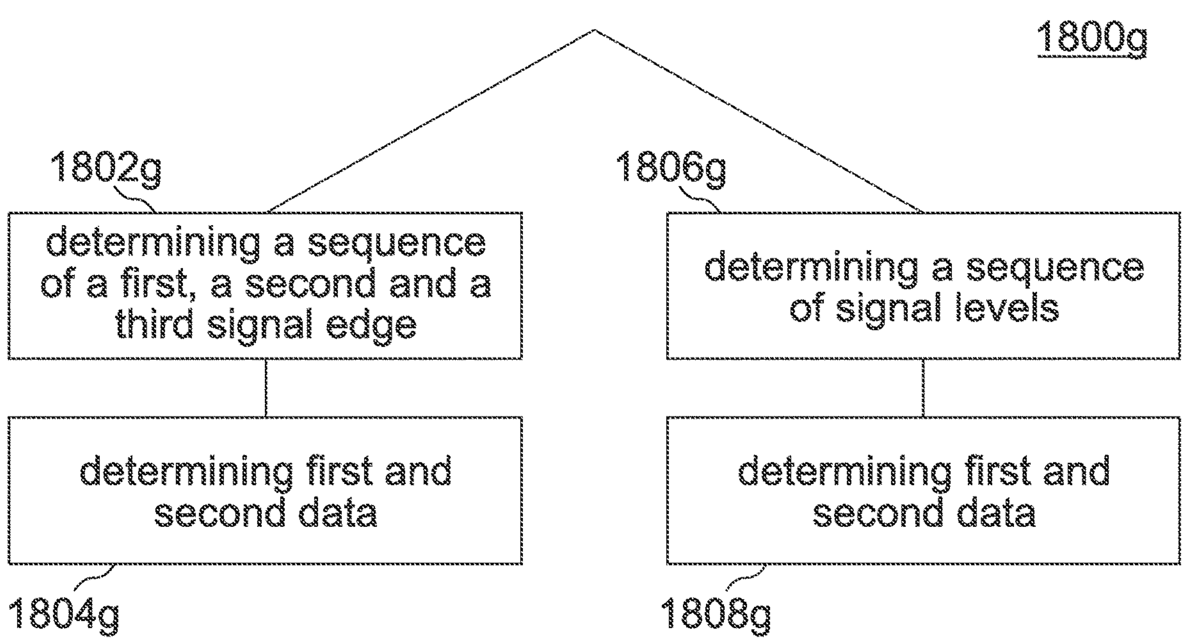
Figure 19:
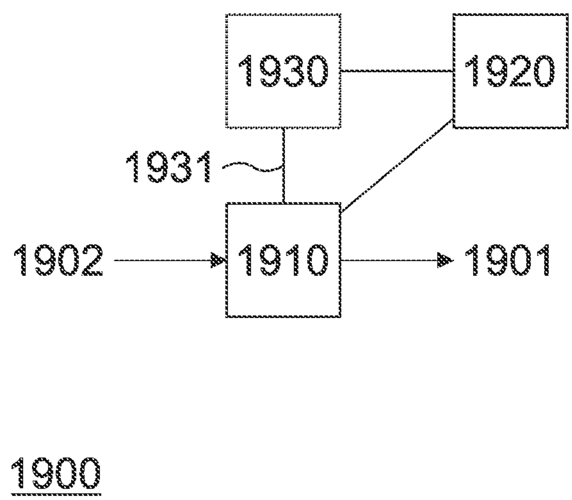
Figure 20A:
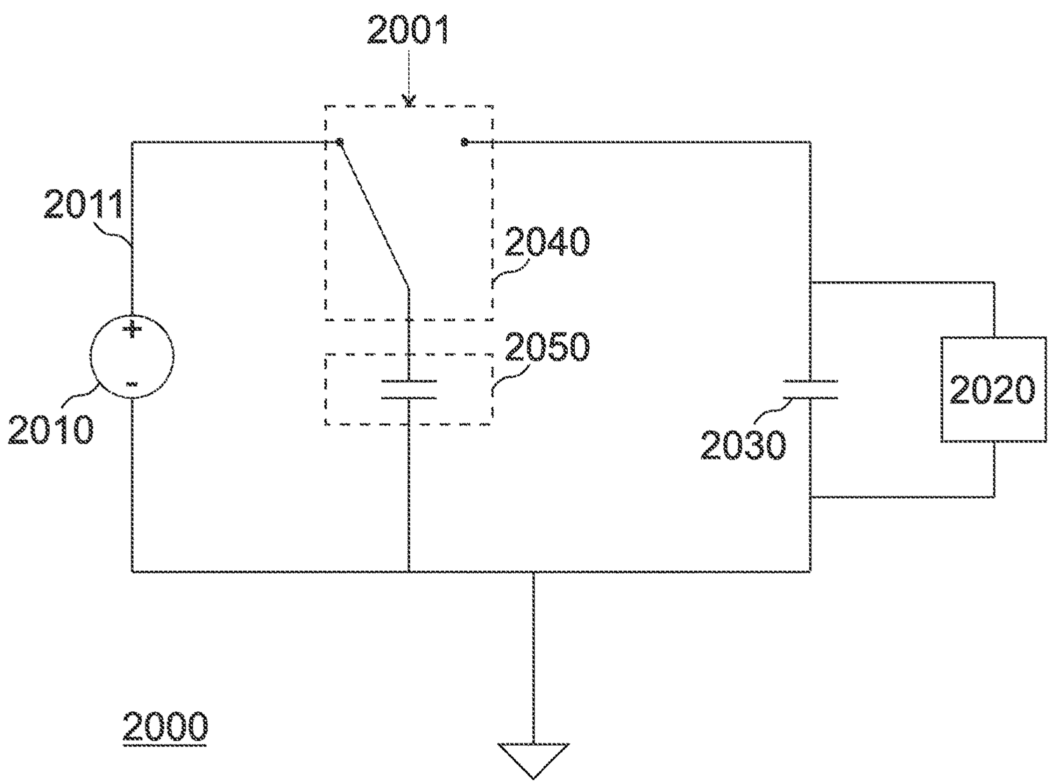
Figure 20B:
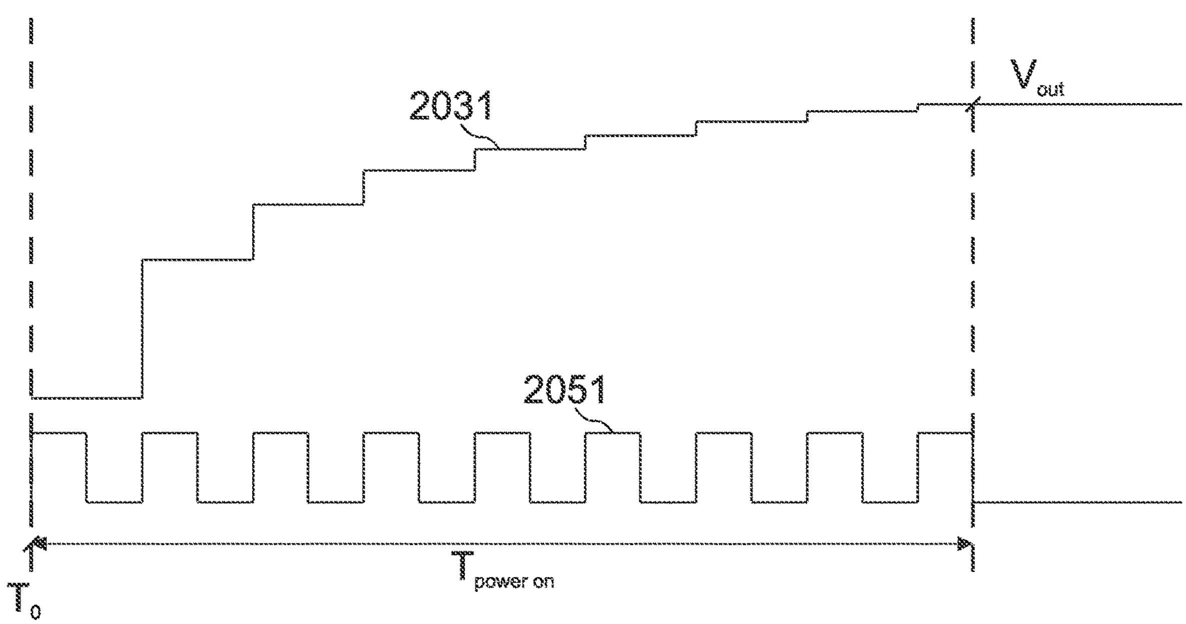
Figure 20C:
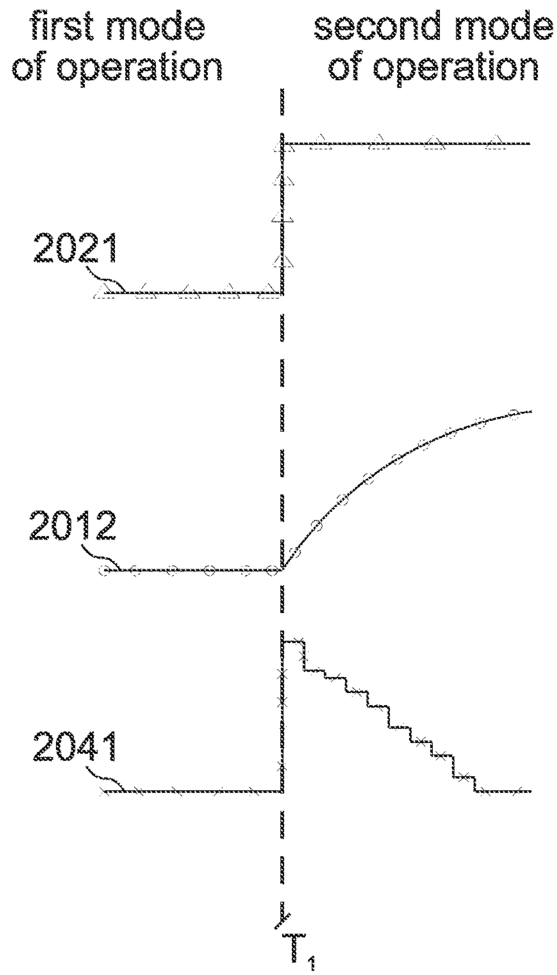
Figure 20D:
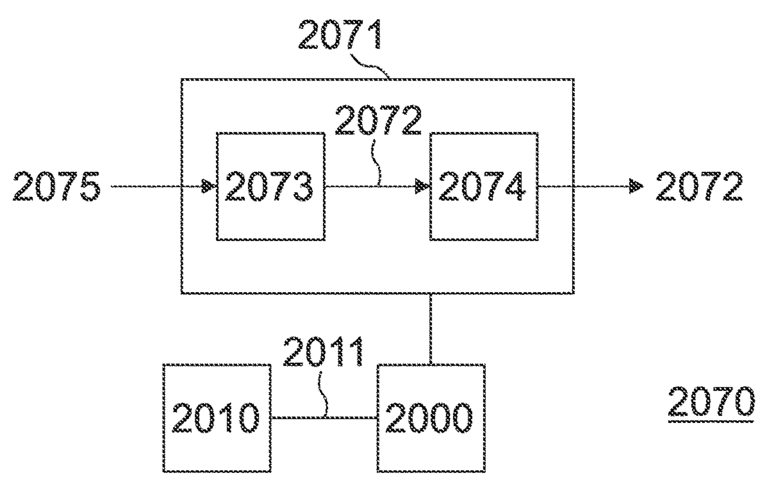
Figure 20E:
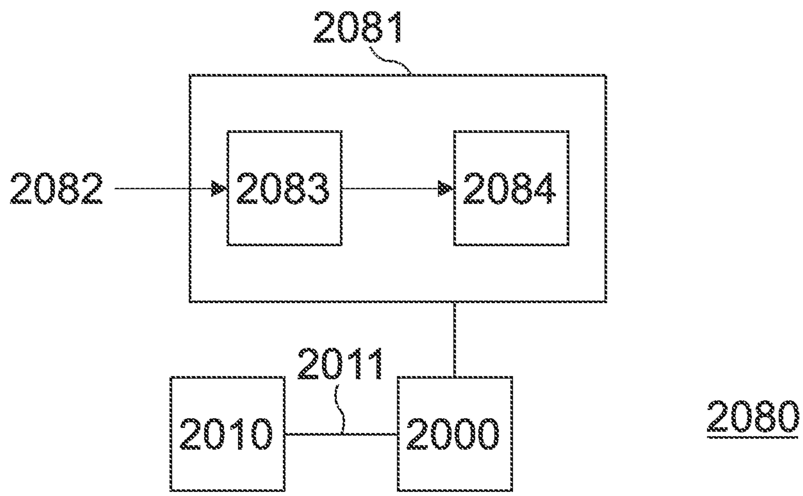
Figure 20F:
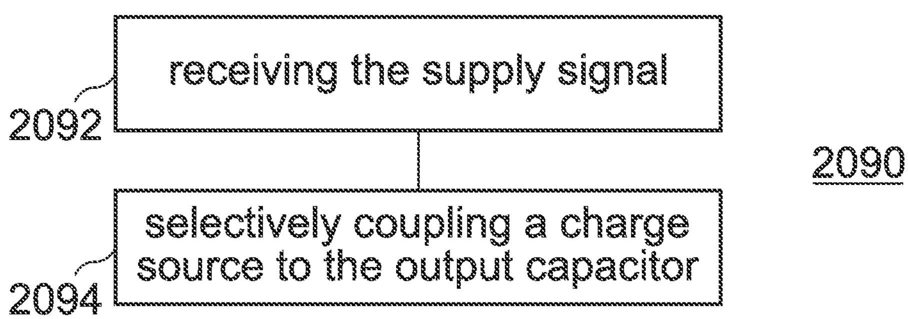
Figures 1, 21:
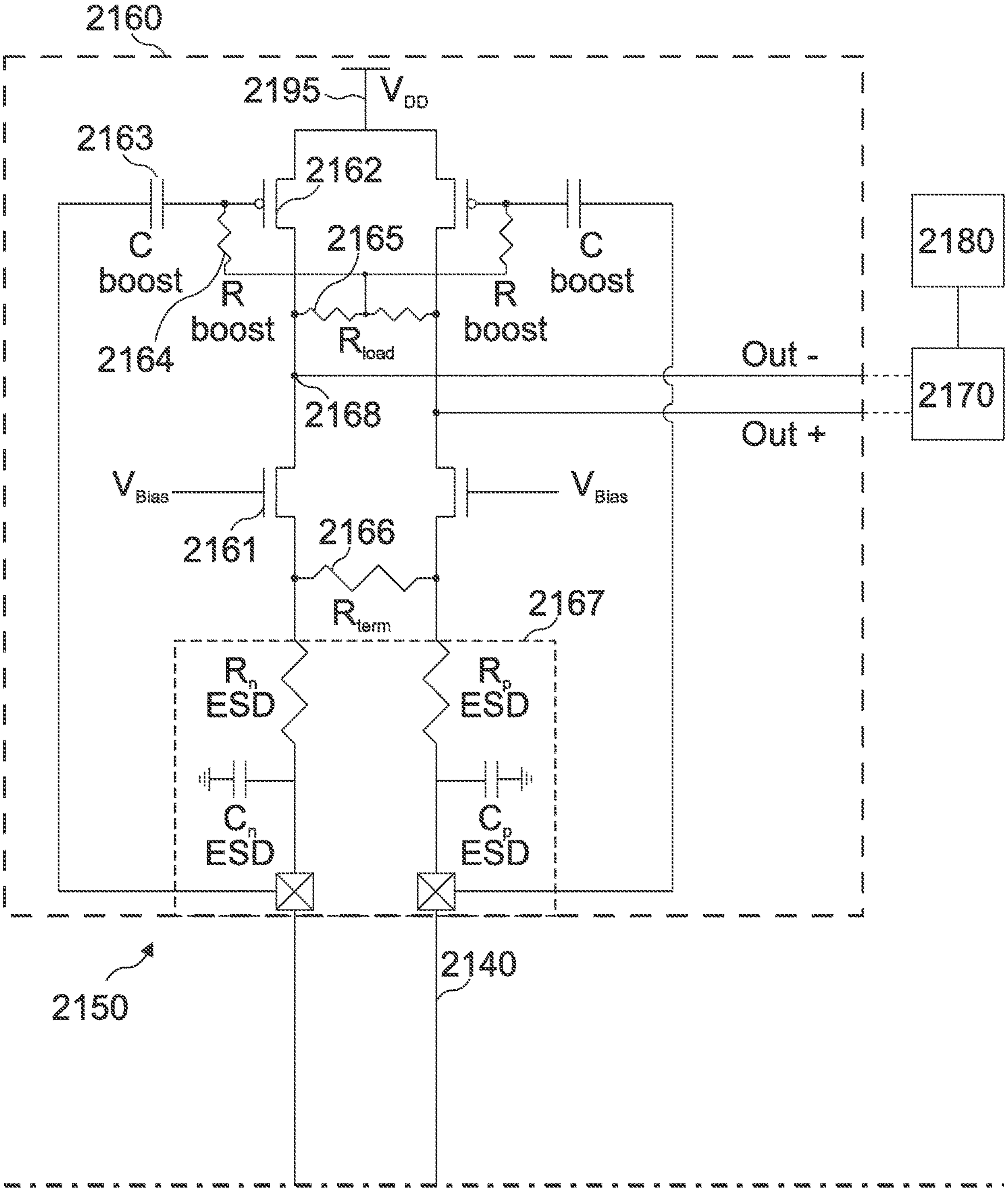
Figures 2, 21:
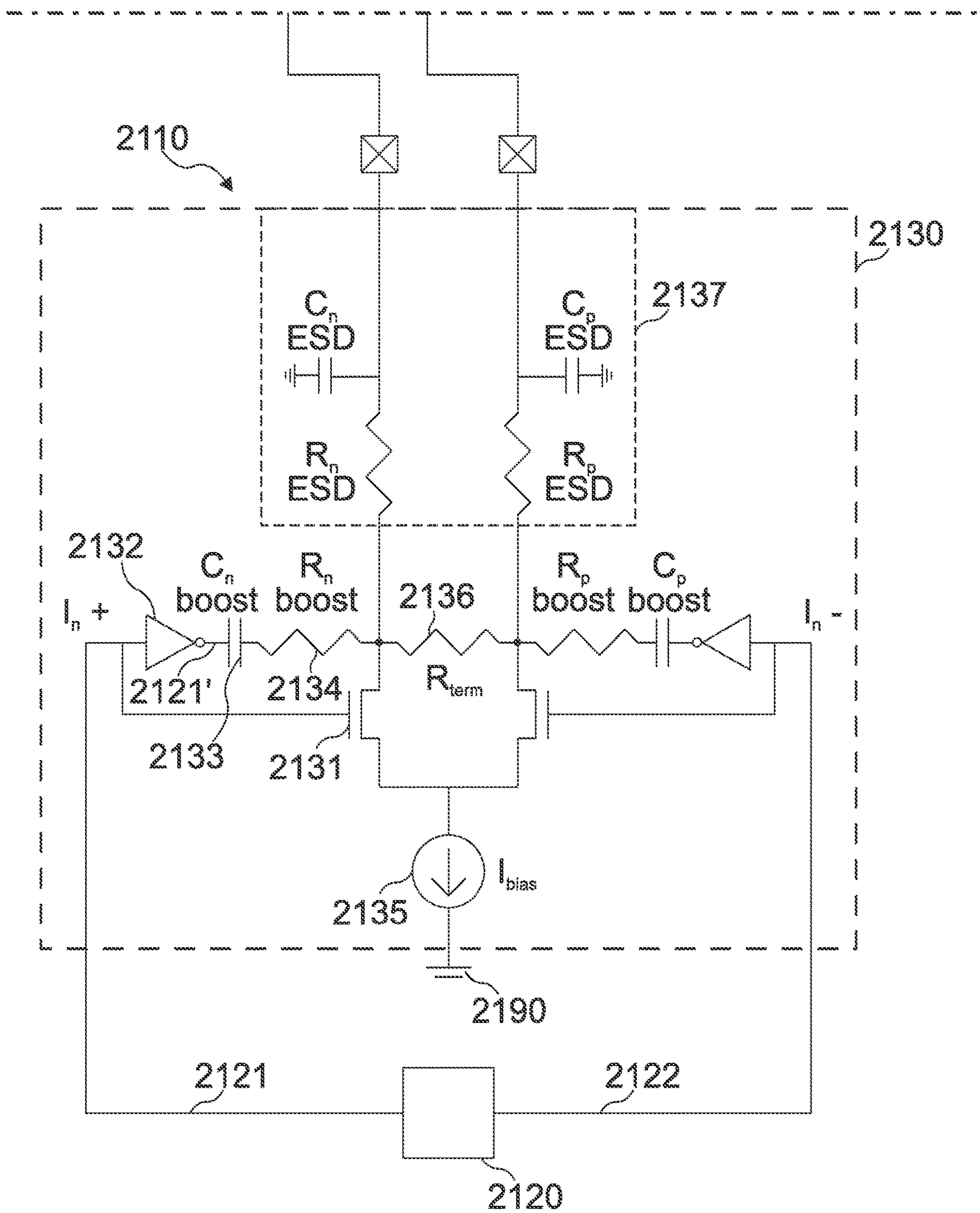
Figure 22A:
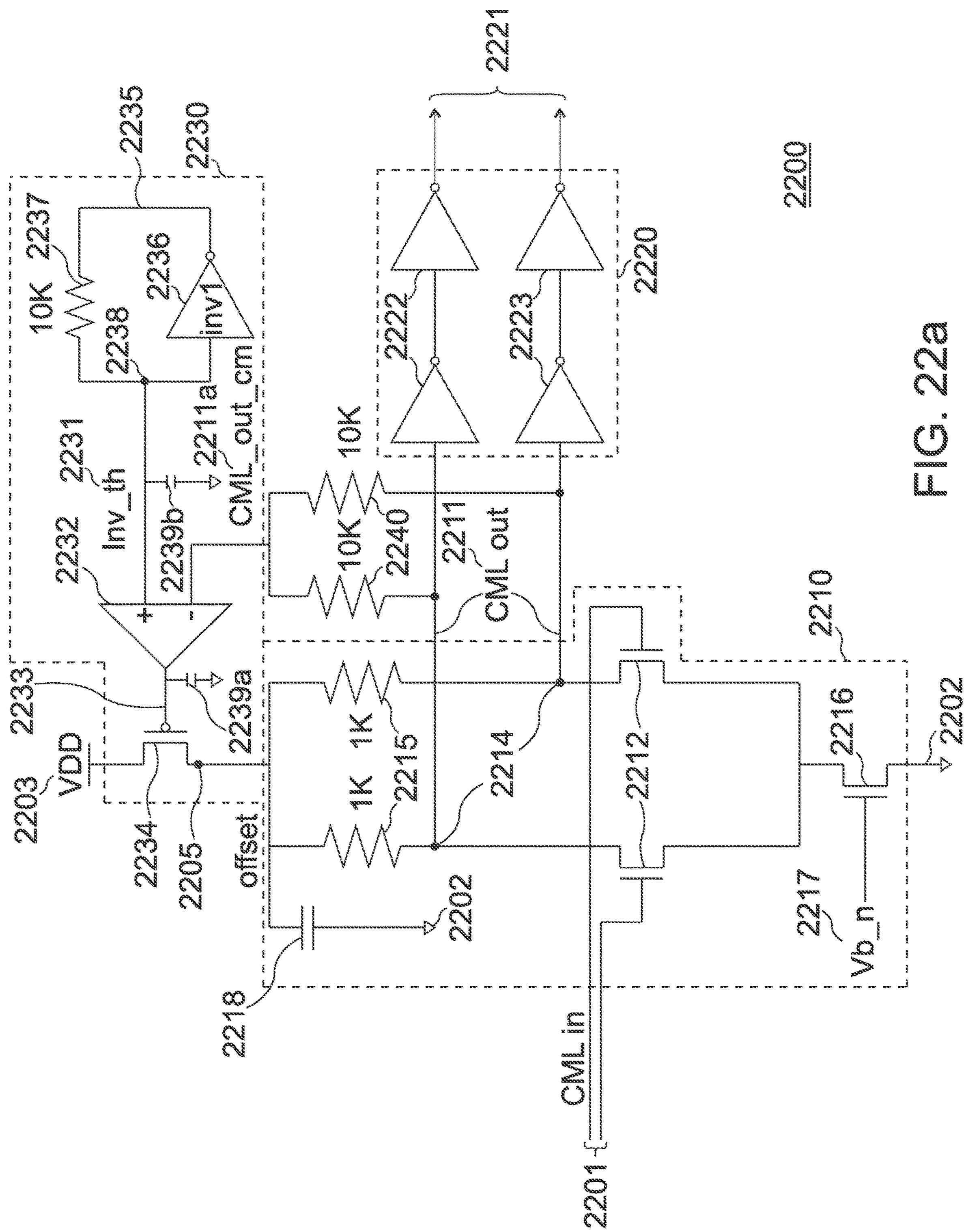
Figure 22B:
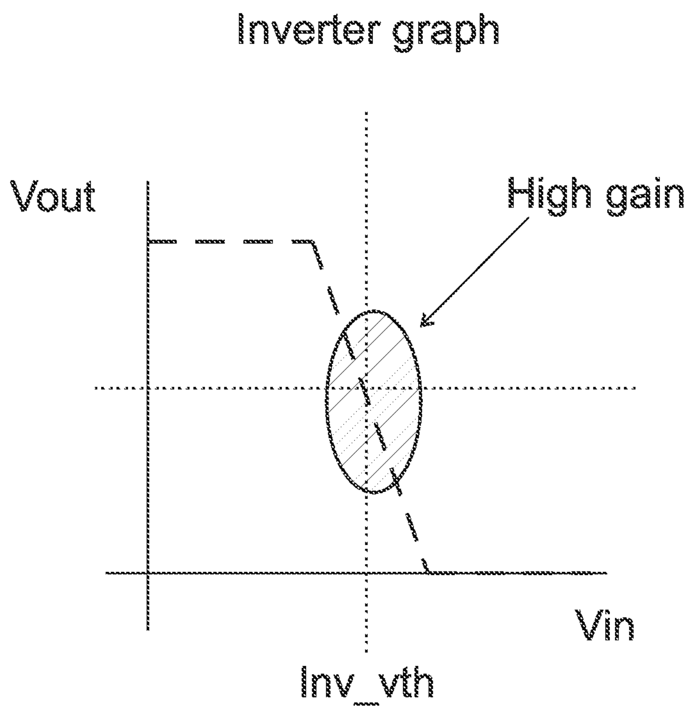
Figure 22C:
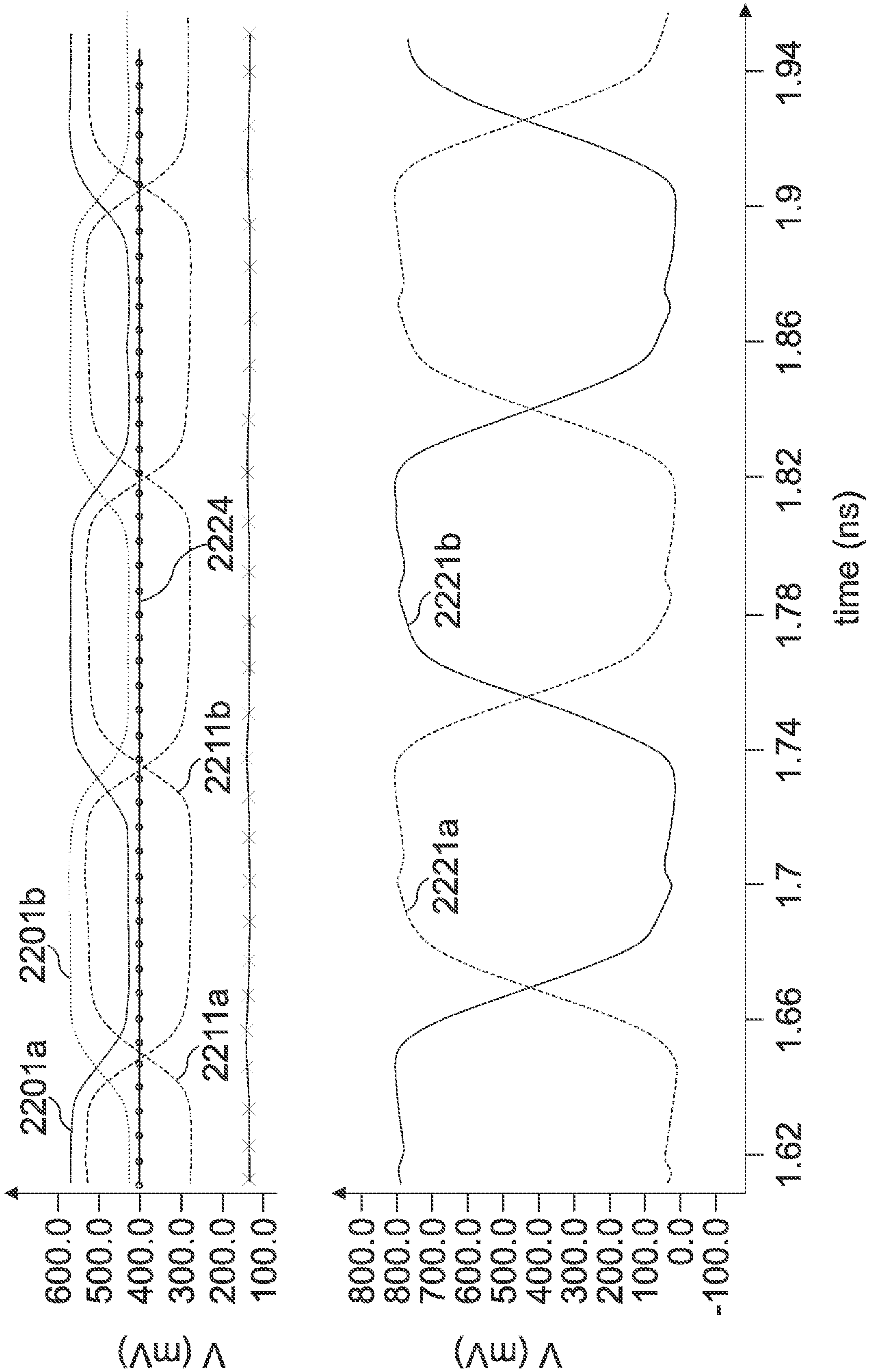

FIG. 15*c* illustrates an example of an apparatus for decoding a data signal;

FIG. 15*d* illustrates an example of a communication apparatus;

FIG. 16*a* illustrates an example of an apparatus for generating a data signal;

FIG. 16*b* illustrates an example of a data signal;

FIG. 16*c* illustrates another example of a data signal;

FIG. 16*d* illustrates another example of an apparatus for generating a data signal;

FIG. 16*e* illustrates an example of an apparatus for decoding a data signal;

FIG. 16*f* illustrates a flowchart of an example of a method for generating a data signal;

FIG. 16*g* illustrates a flowchart of another example of a method for generating a data signal;

FIG. 16*h* illustrates a flowchart of an example of a method for decoding a data signal;

FIG. 17*a* illustrates an example of a communication system;

FIG. 17*b* illustrates a flowchart of an example of a communication method;

FIG. 17*c* illustrates a flowchart of another example of a communication method;

FIG. 18*a* illustrates an example of an apparatus for generating a data signal;

FIG. 18*b* illustrates an example of an apparatus for decoding a data signal;

FIG. 18*c* illustrates an example of a communication system in a first mode of operation;

FIG. 18*d* illustrates an example of the communication system in a second mode of operation;

FIG. 18*e* illustrates another example of the communication system in the second mode of operation;

FIG. 18*f* illustrates a flowchart of an example of a method for generating a data signal;

FIG. 18*g* illustrates a flowchart of an example of a method for decoding a data signal;

FIG. 19 illustrates another example of an apparatus for generating a data signal;

FIG. 20*a* illustrates an example of an apparatus for regulating a supply signal generated by a low-dropout regulator for an electronic device FIG. 20*b* illustrates an exemplary temporal course of a voltage on a capacitor;

FIG. 20*c* illustrates an exemplary comparison of currents;

FIG. 20*d* illustrates an example of a communication apparatus;

FIG. 20*e* illustrates another example of a communication apparatus;

FIG. 20*f* illustrates a flowchart of an example of a method for regulating a supply signal generated by a low-dropout regulator for an electronic device;

FIG. 21, broken into partial views 21-1 and 21-2, illustrates an example of a communication system;

FIG. 22*a* illustrates an example of a current-mode logic to complementary metal-oxide-semiconductor conversion circuit;

FIG. 22*b* illustrates an exemplary relation between an input for an inverter and the output of the inverter;

FIG. 22*c* illustrates exemplary courses of signals within the circuit illustrated in FIG. 22*a;*

Figure 22D:
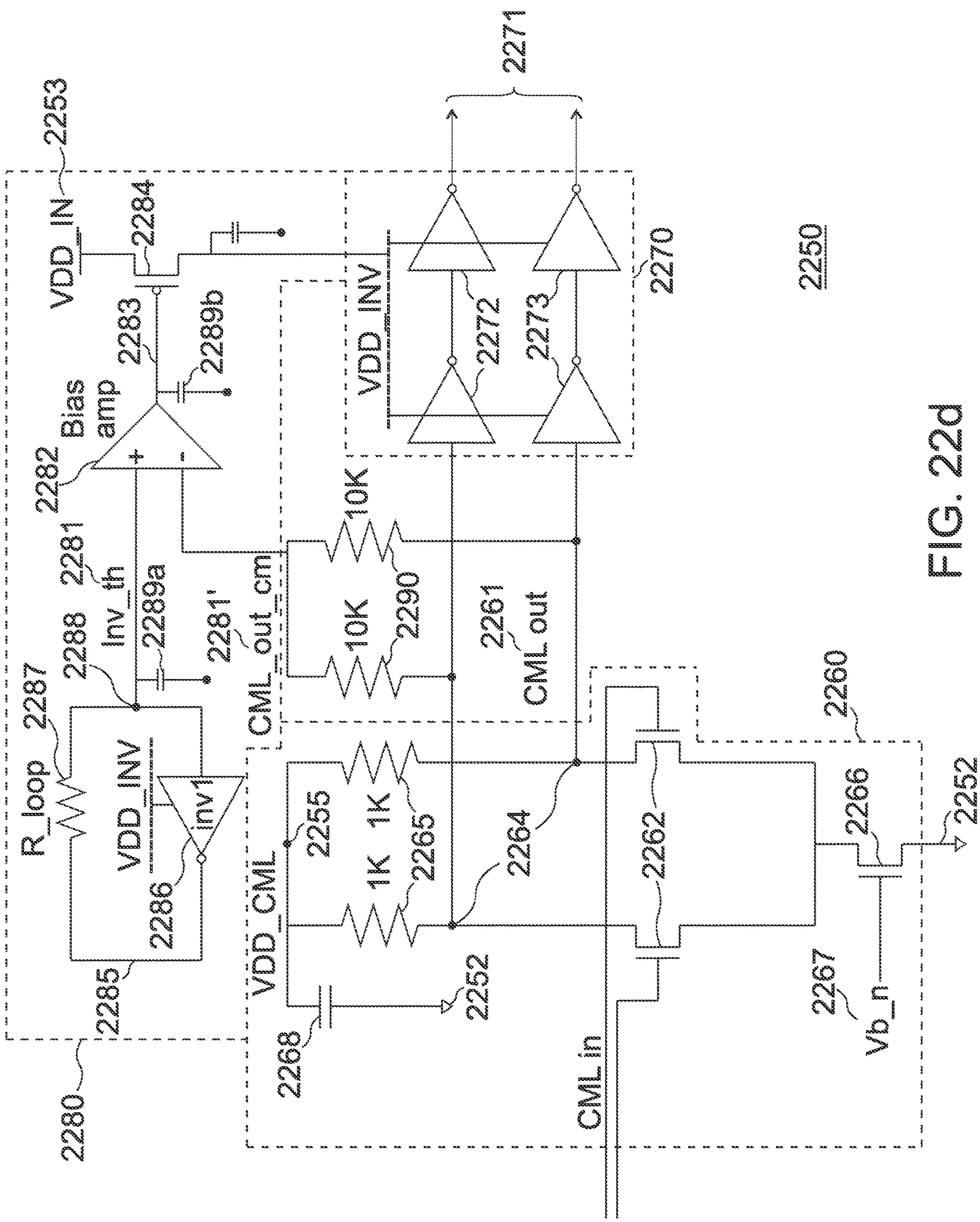
Figures 1, 22E:
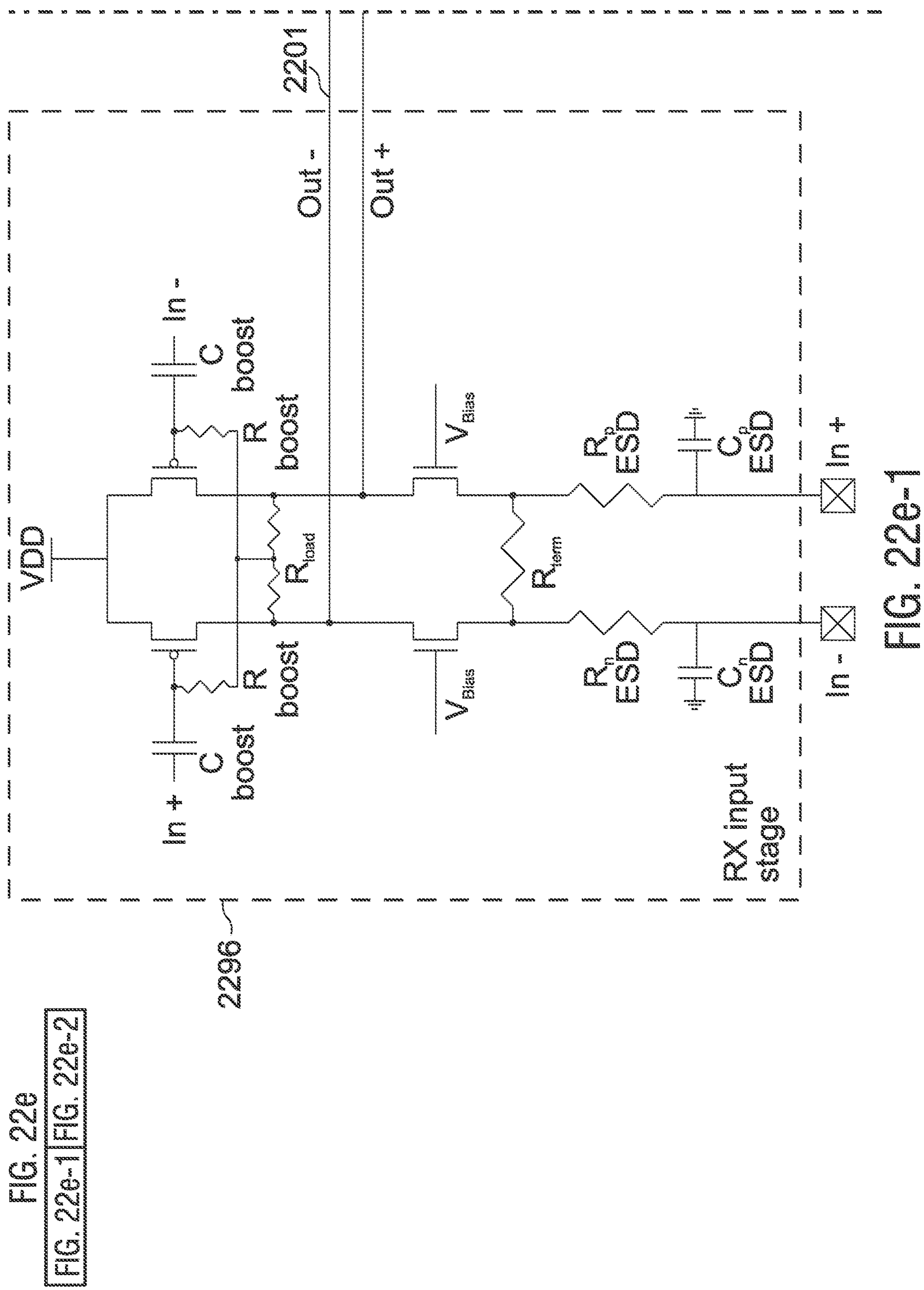
Figures 2, 22E:
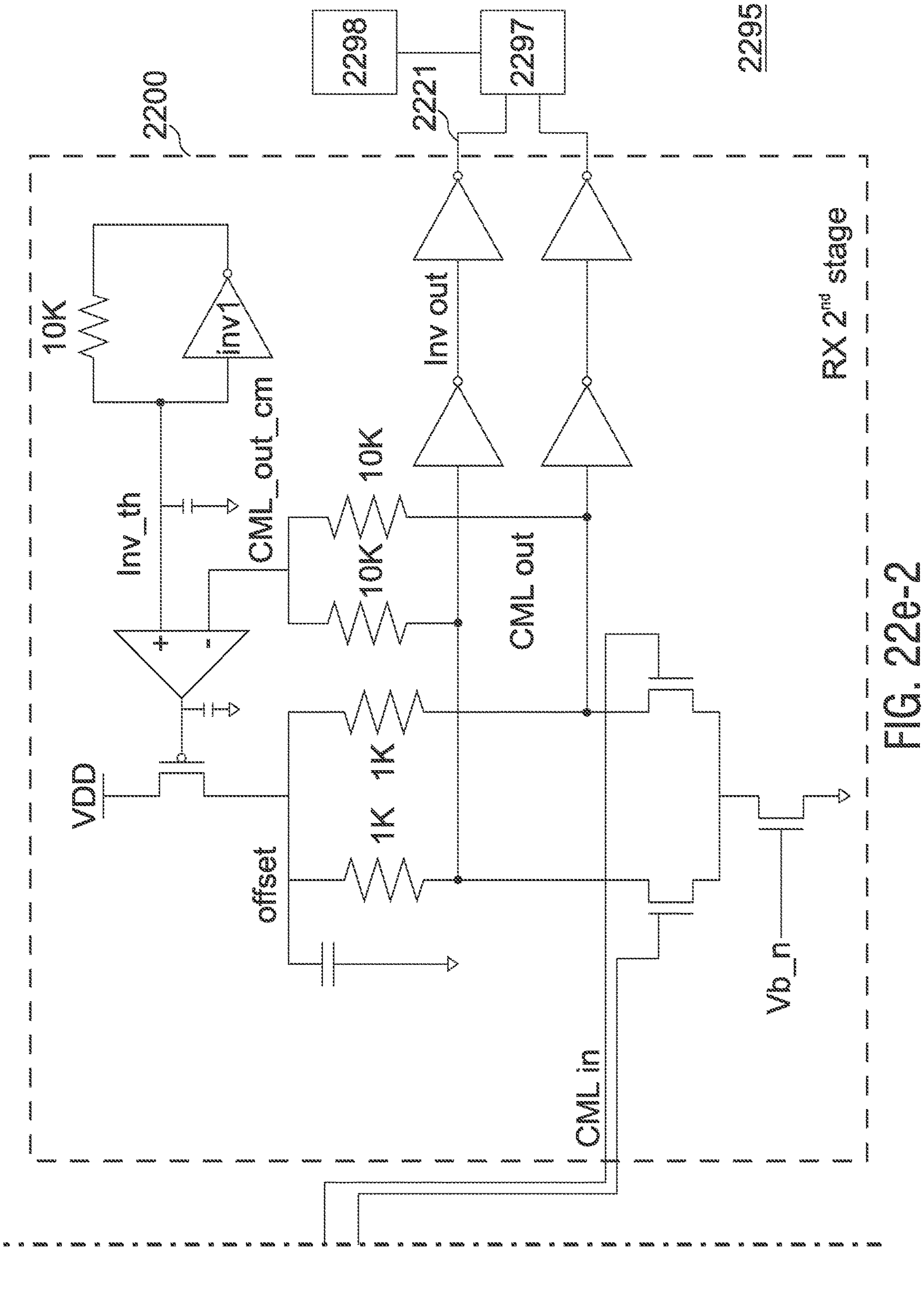
Figure 23A:
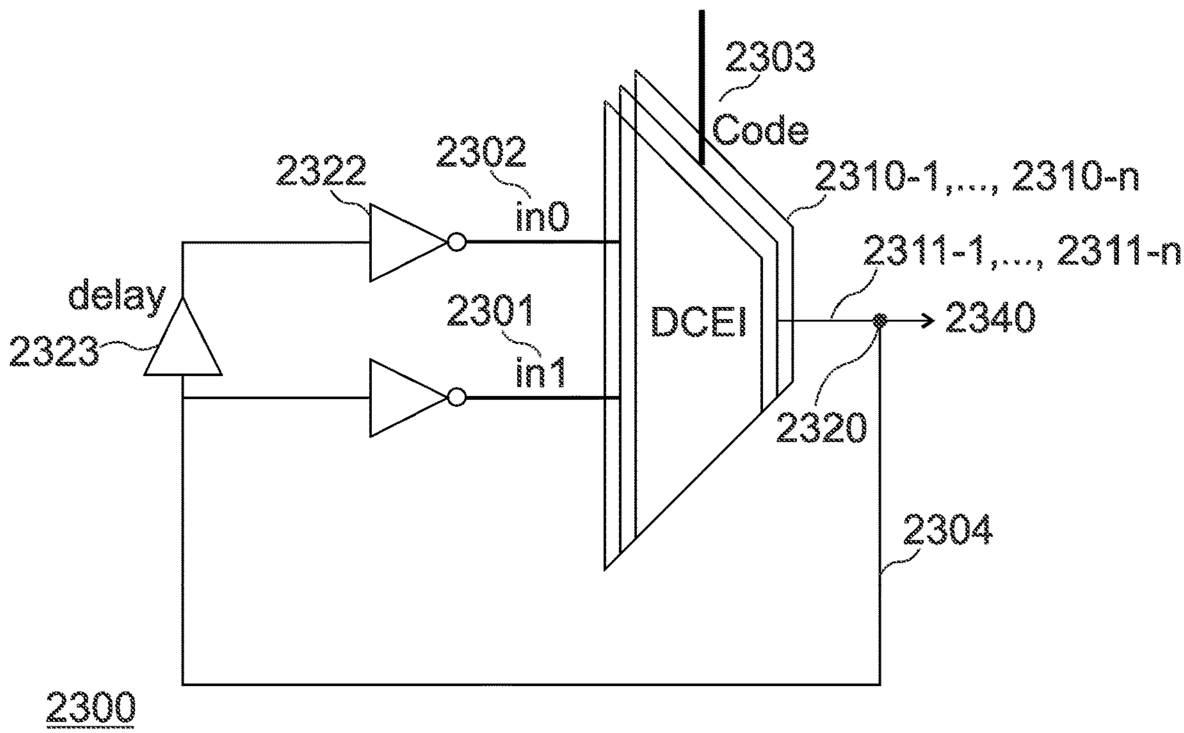
Figure 23B:
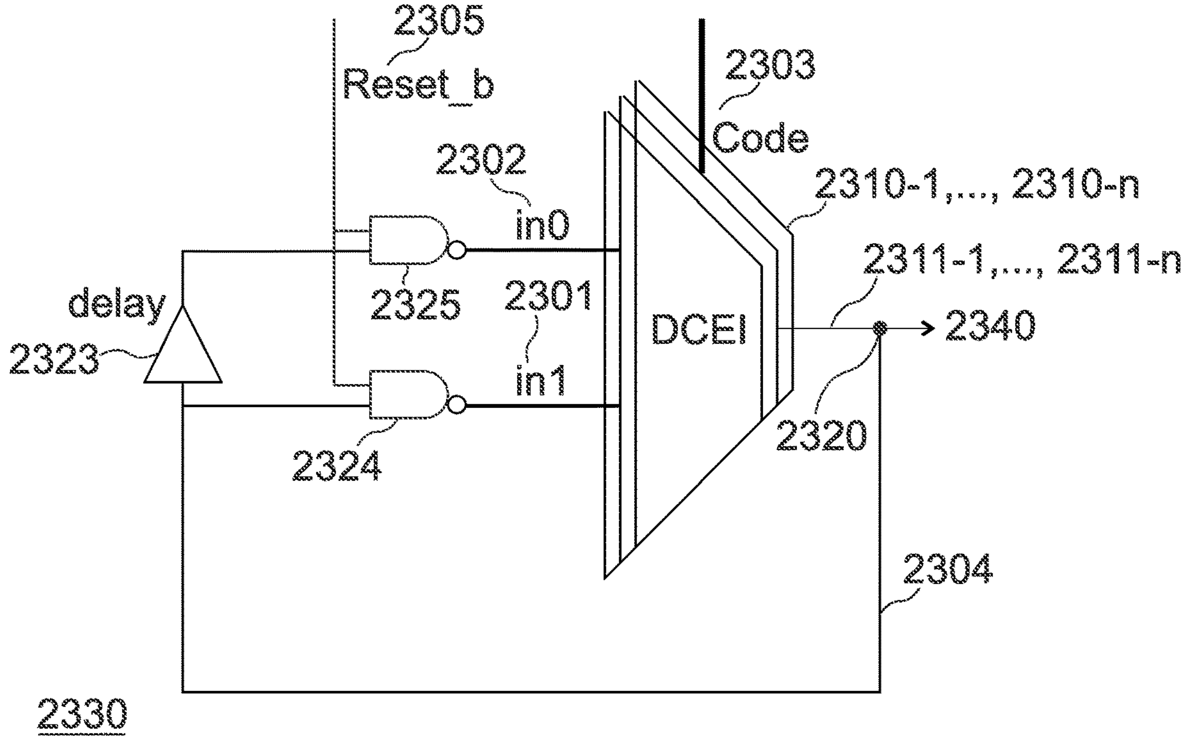
Figure 23C:
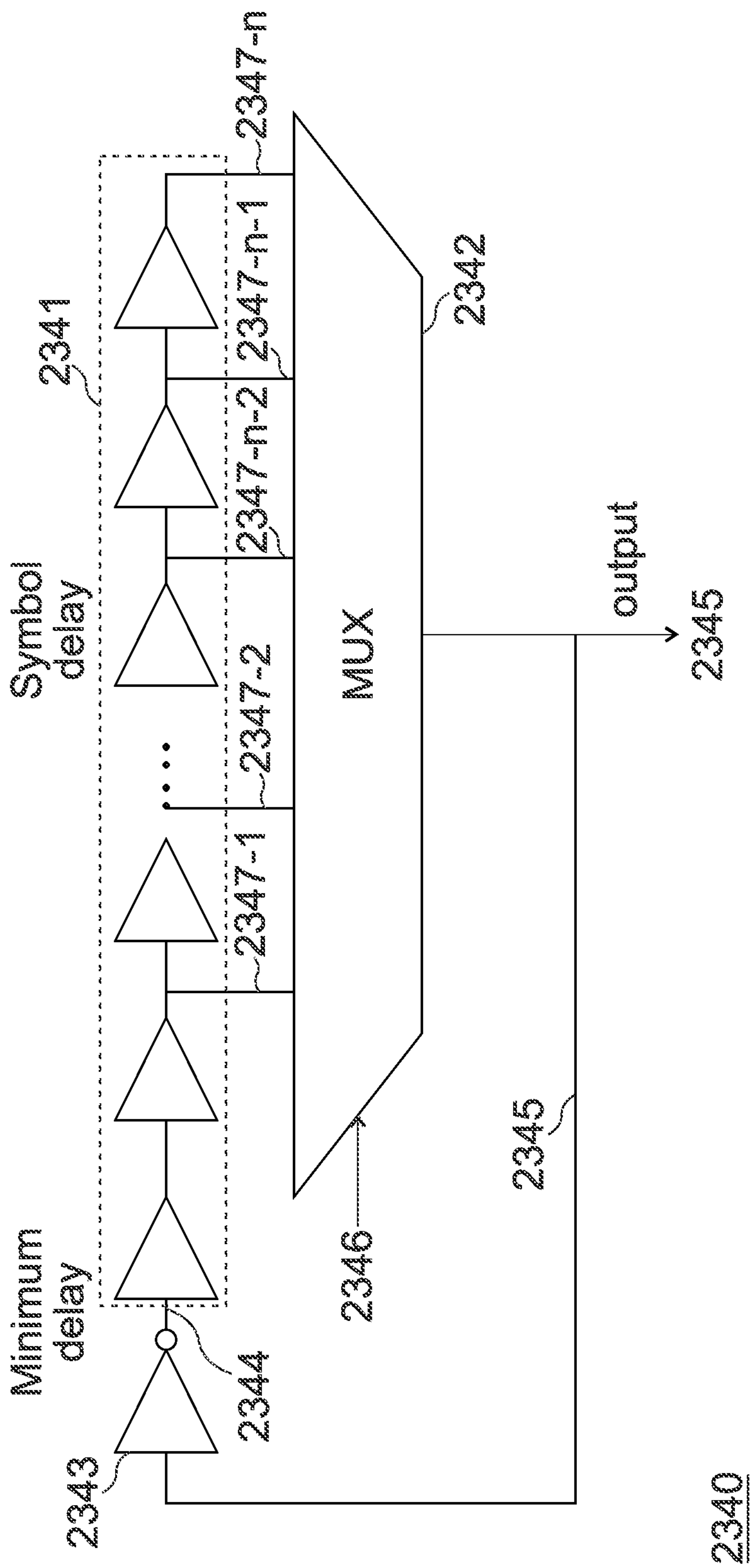
Figure 23D:
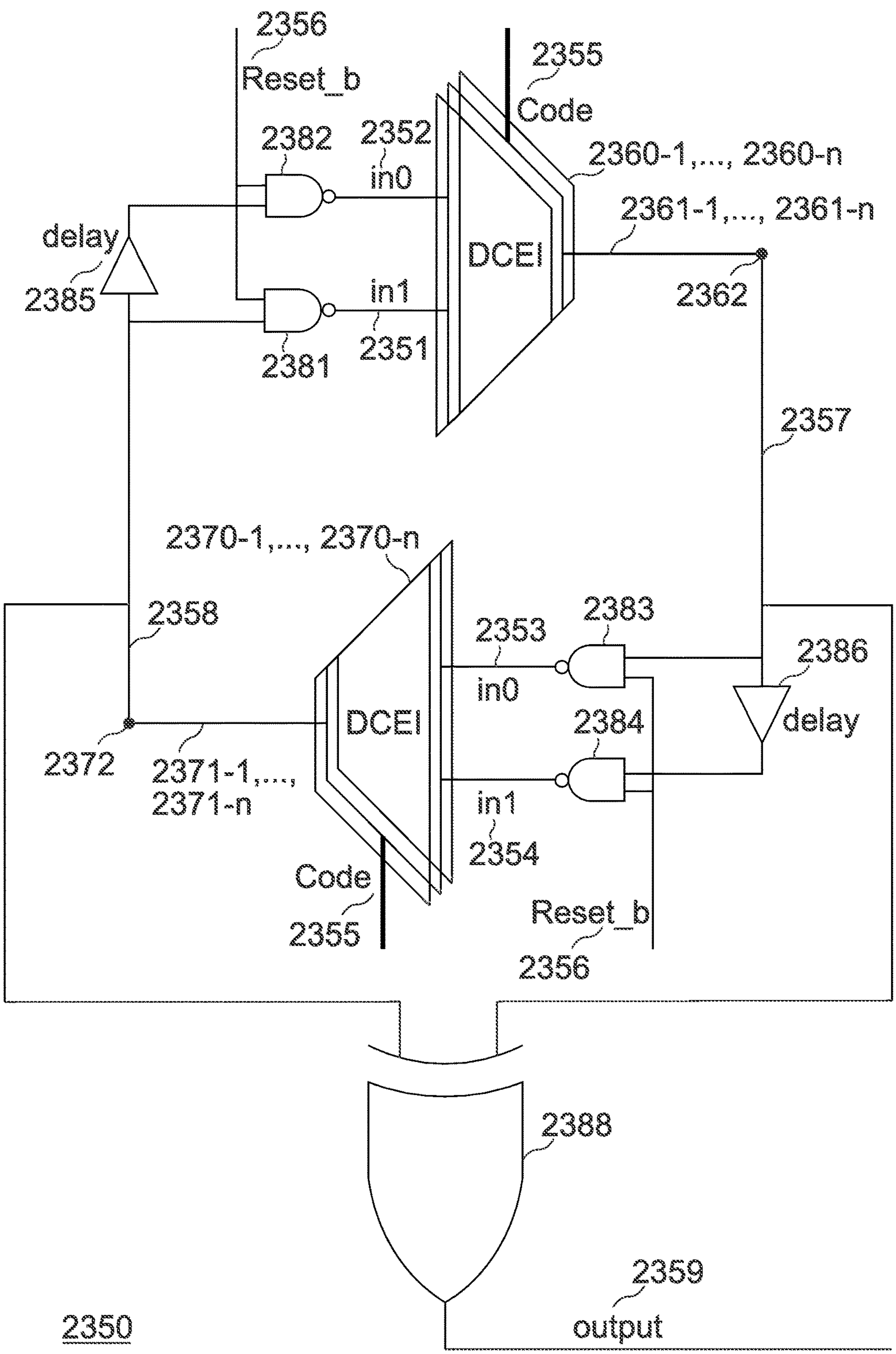
Figure 23E:
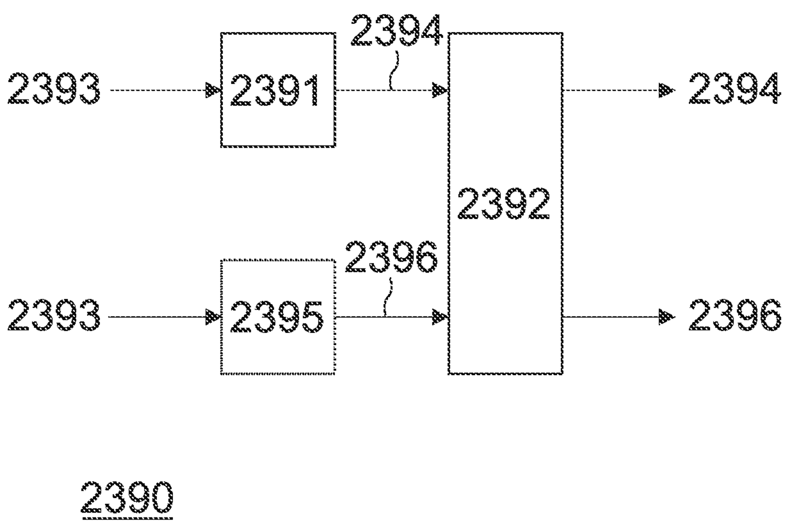
Figure 24A:
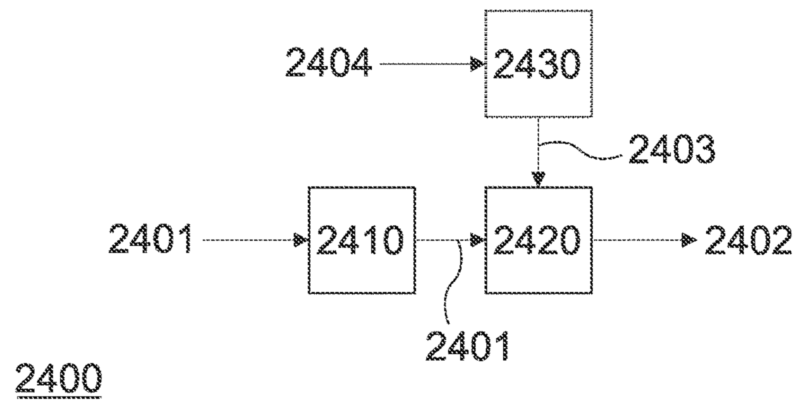
Figure 24B:
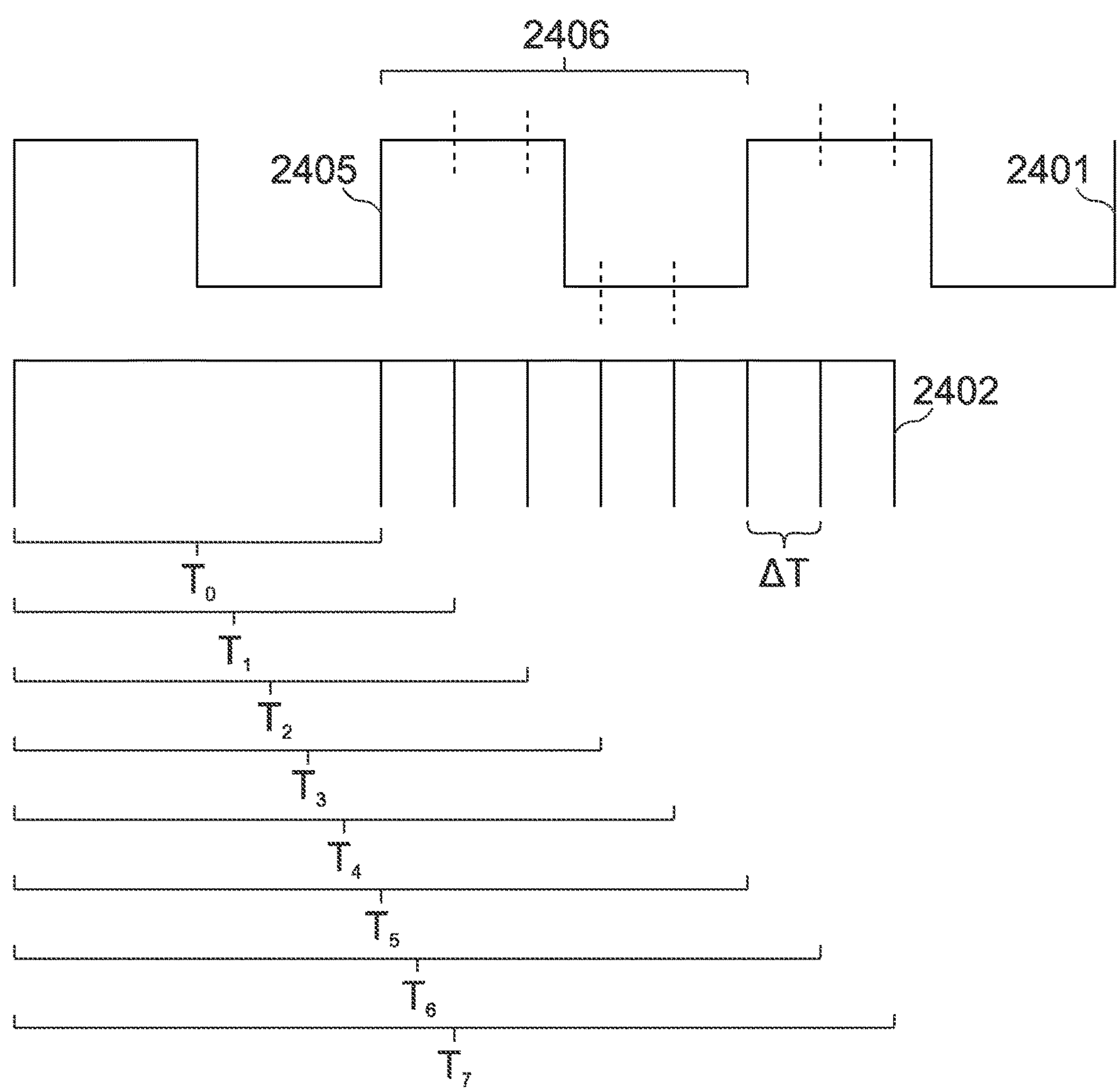
Figure 25A:
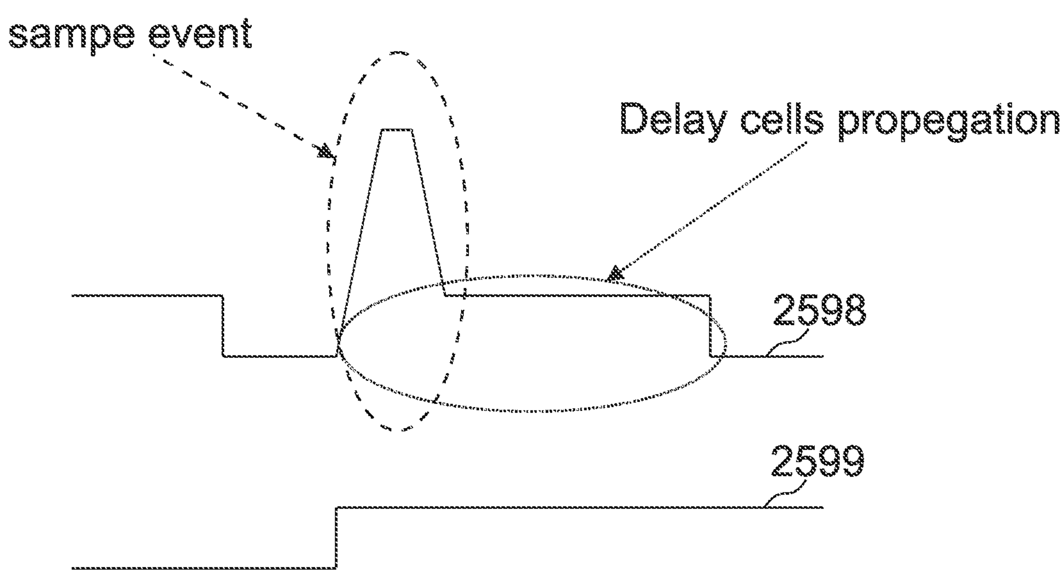
Figure 25B:
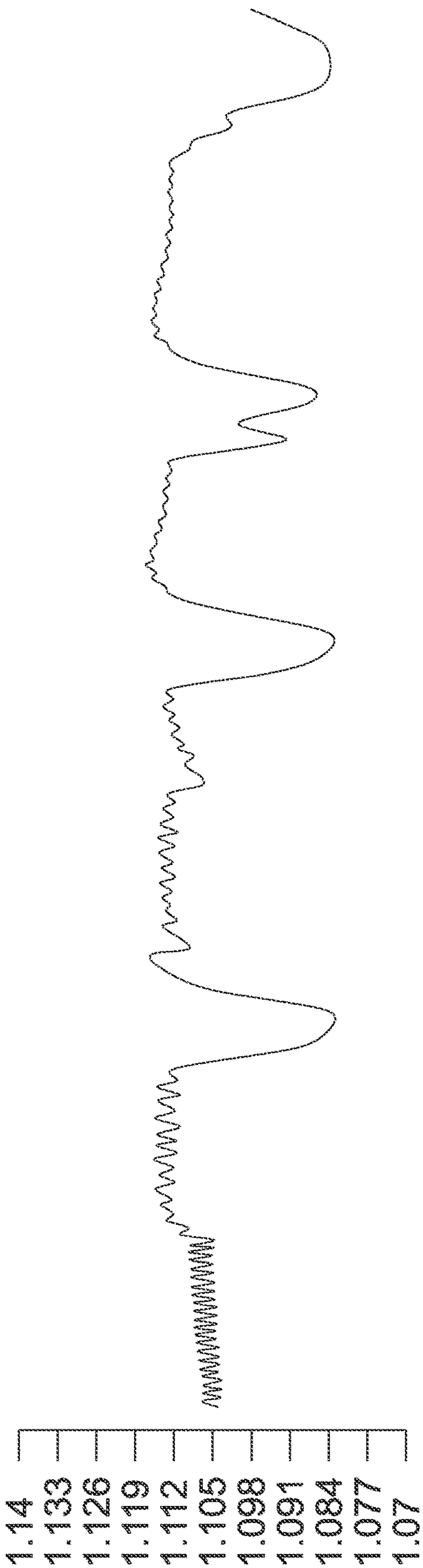
Figure 25C:
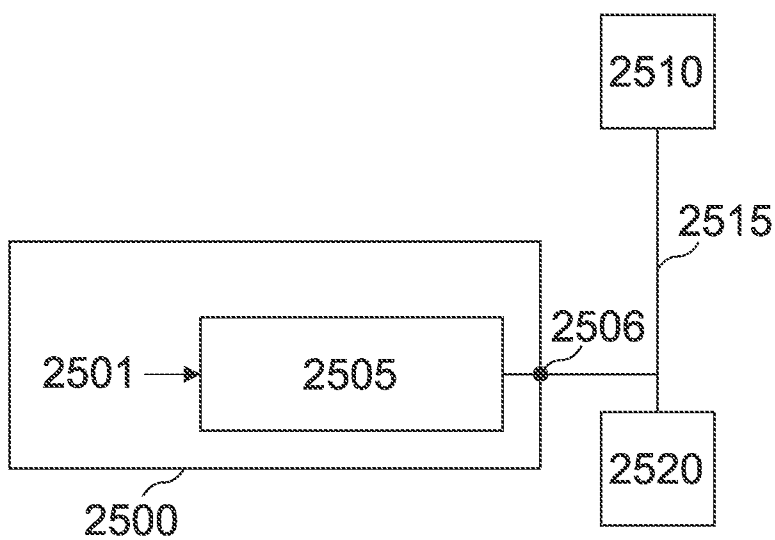
Figure 25D:
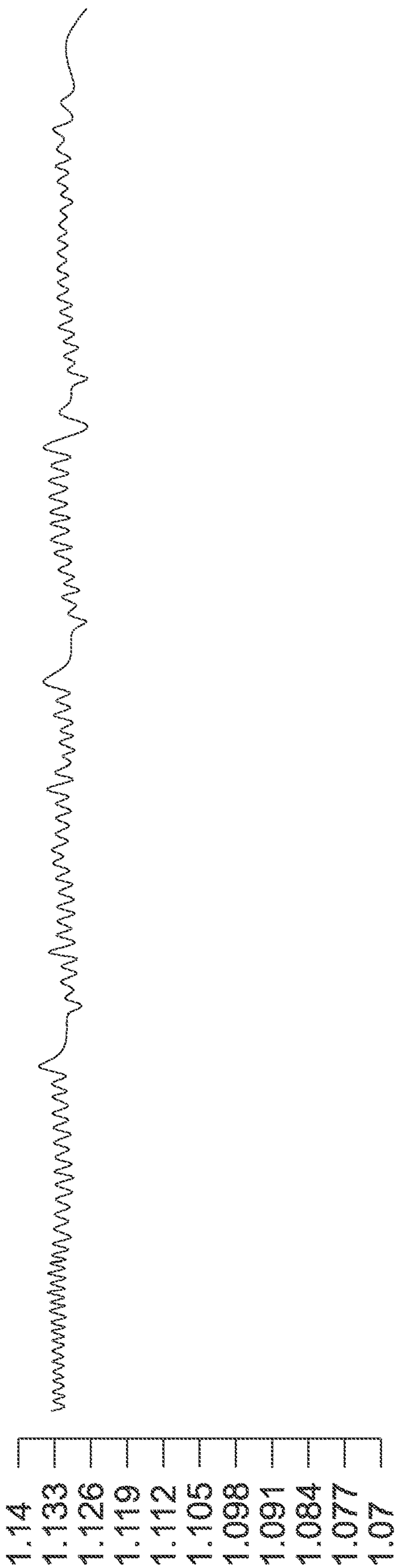
Figure 25E:
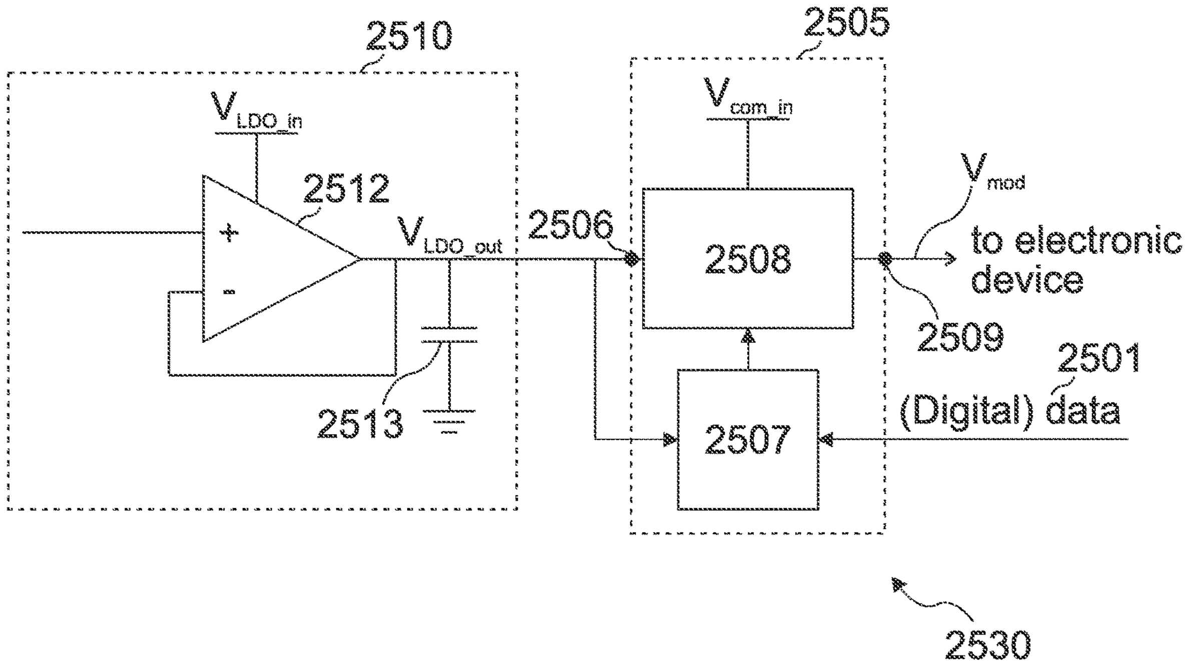
Figure 25F:
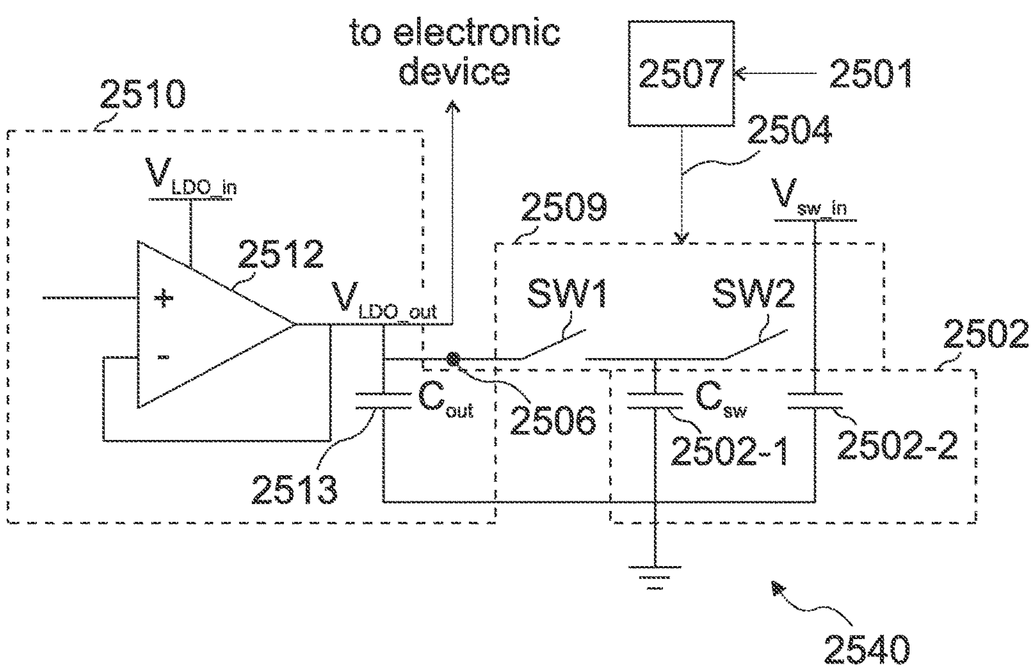
Figure 25G:
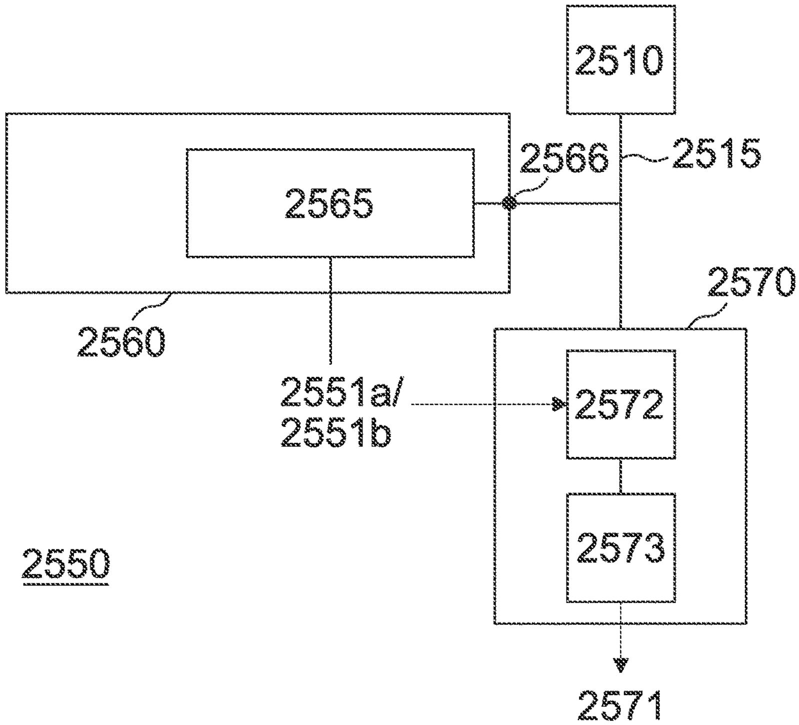
Figure 25H:
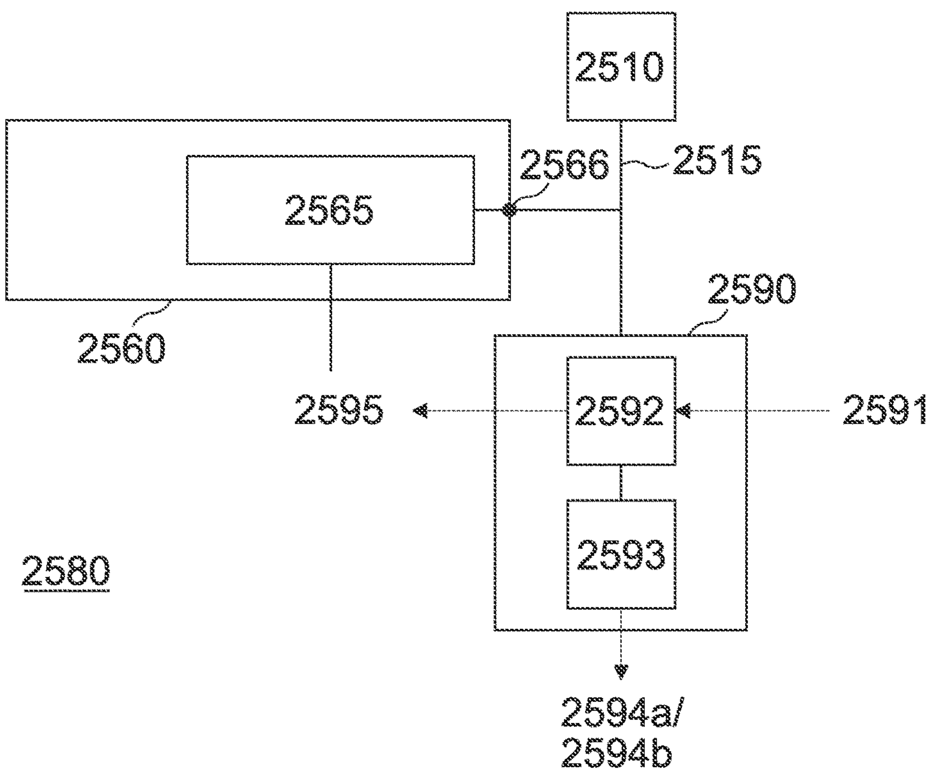
Figure 25I:
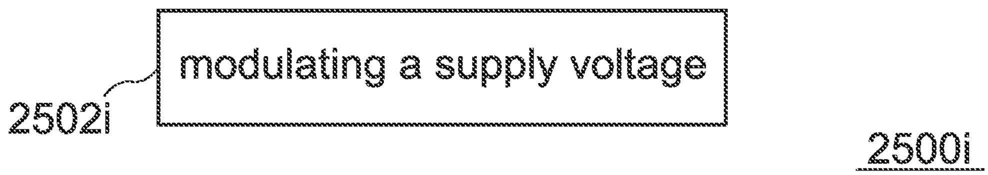
Figure 25J:
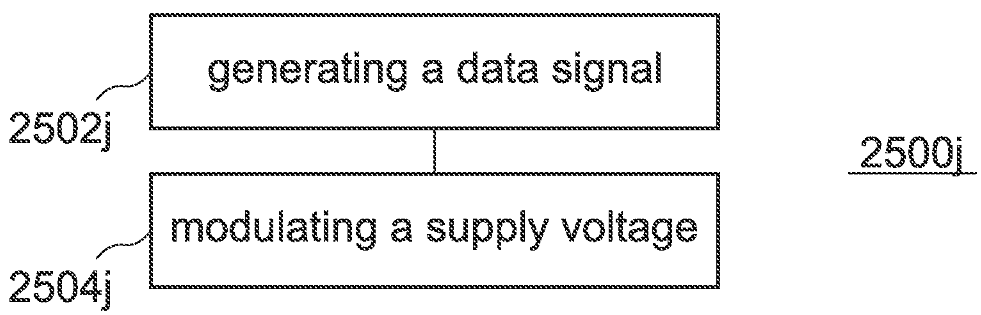
Figure 25K:
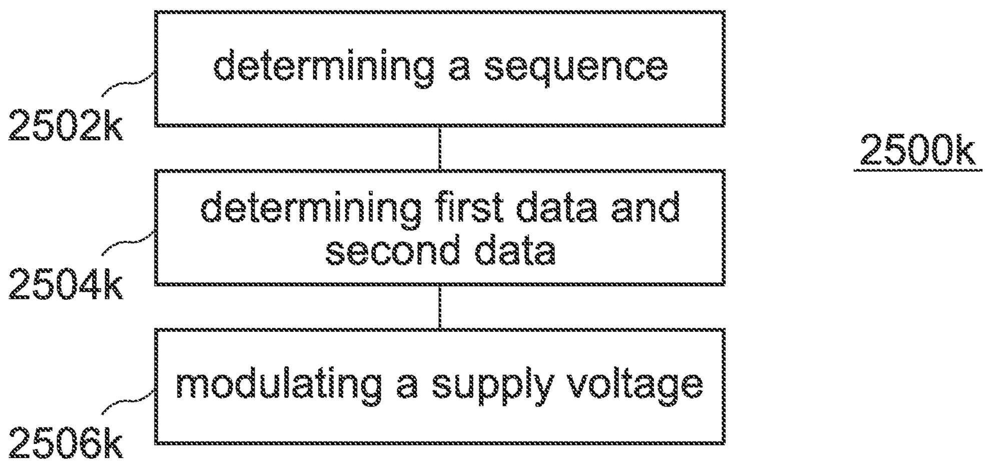
Figure 26A:
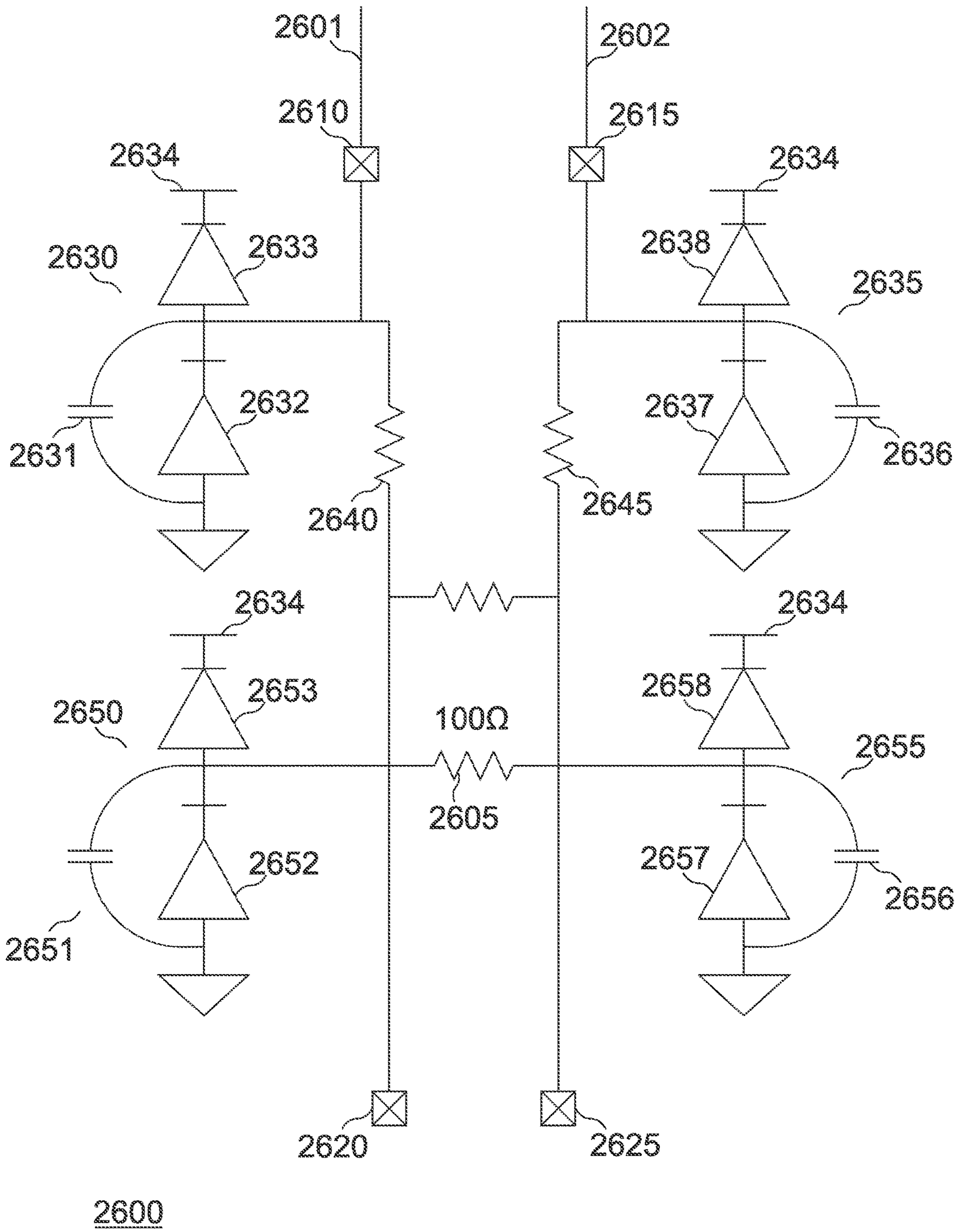
Figure 26B:
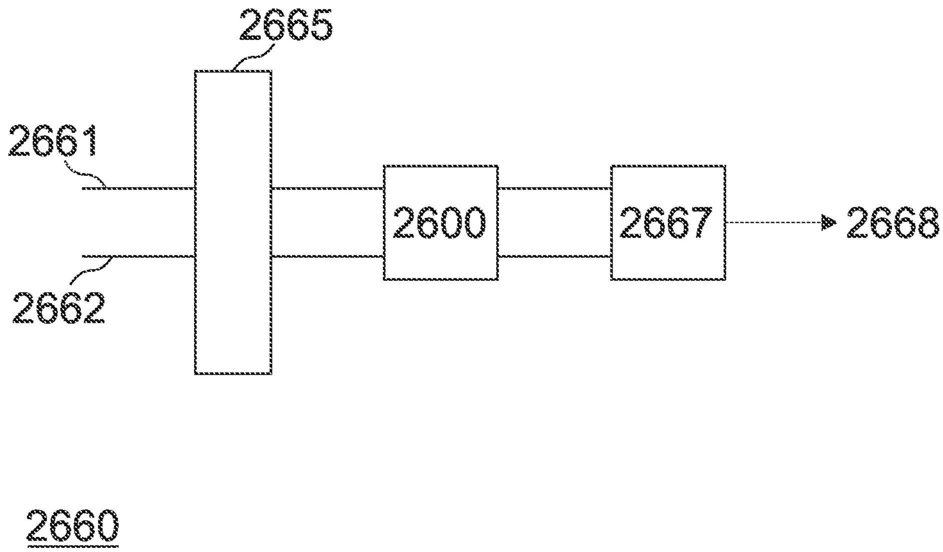
Figure 26C:
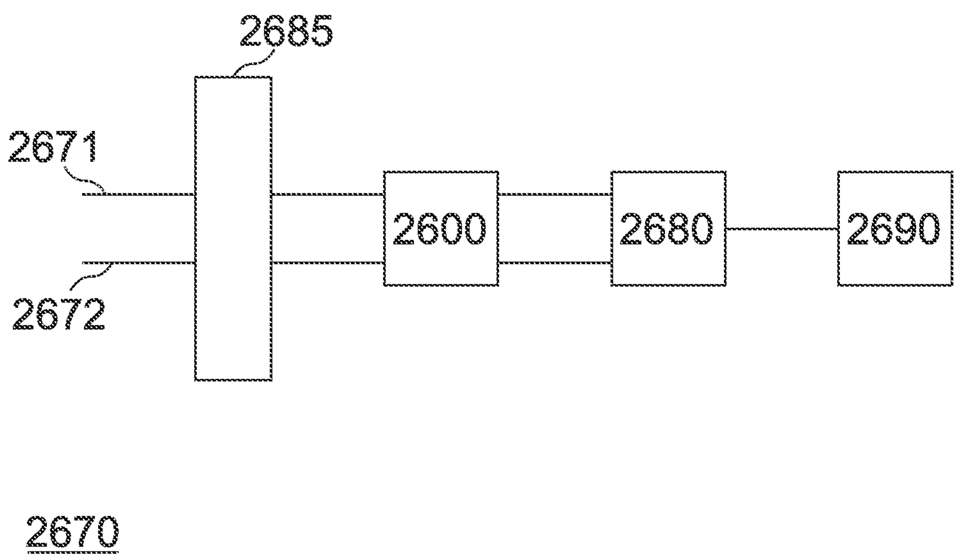
Figure 27A:
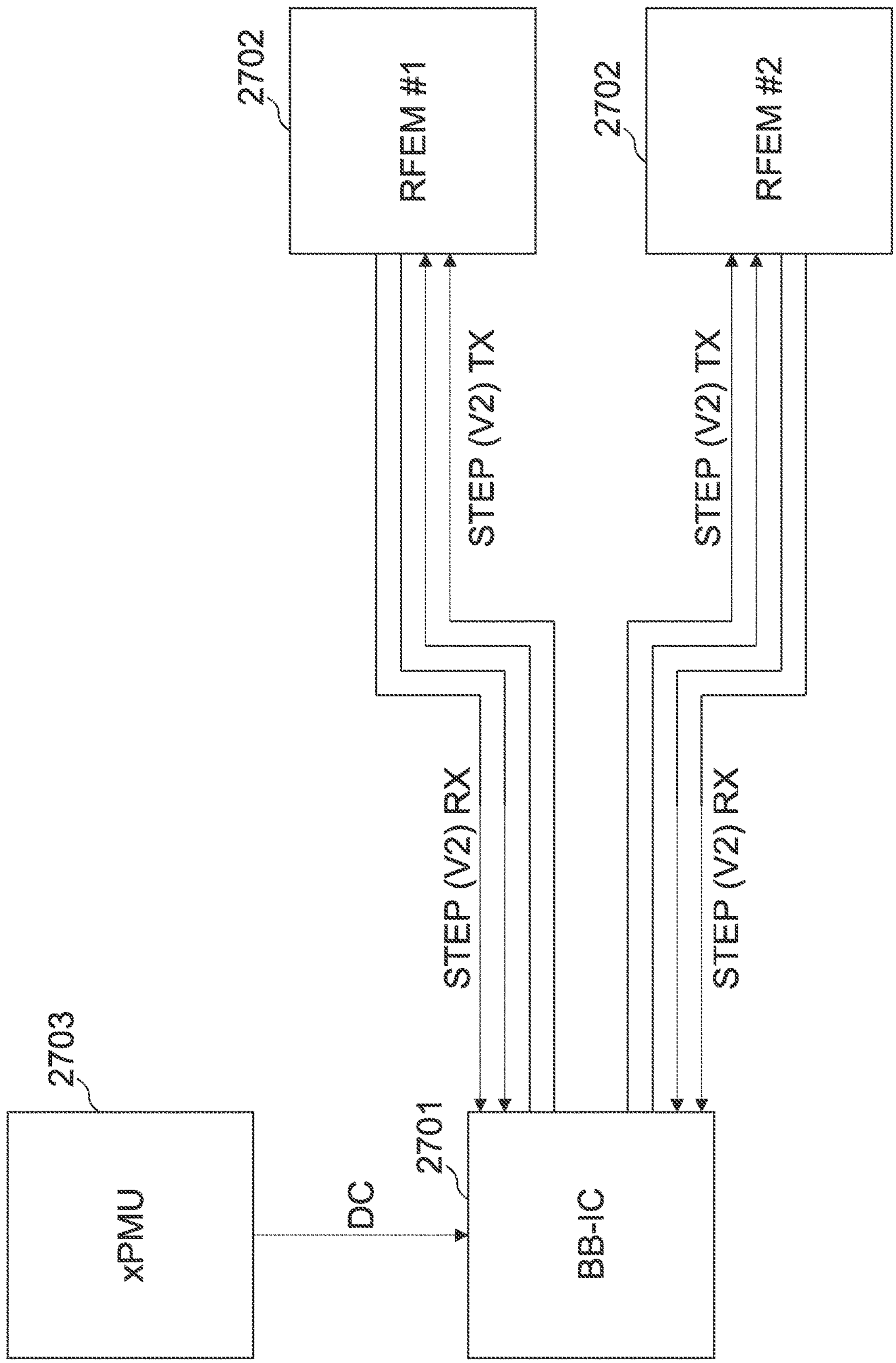
Figure 27B:
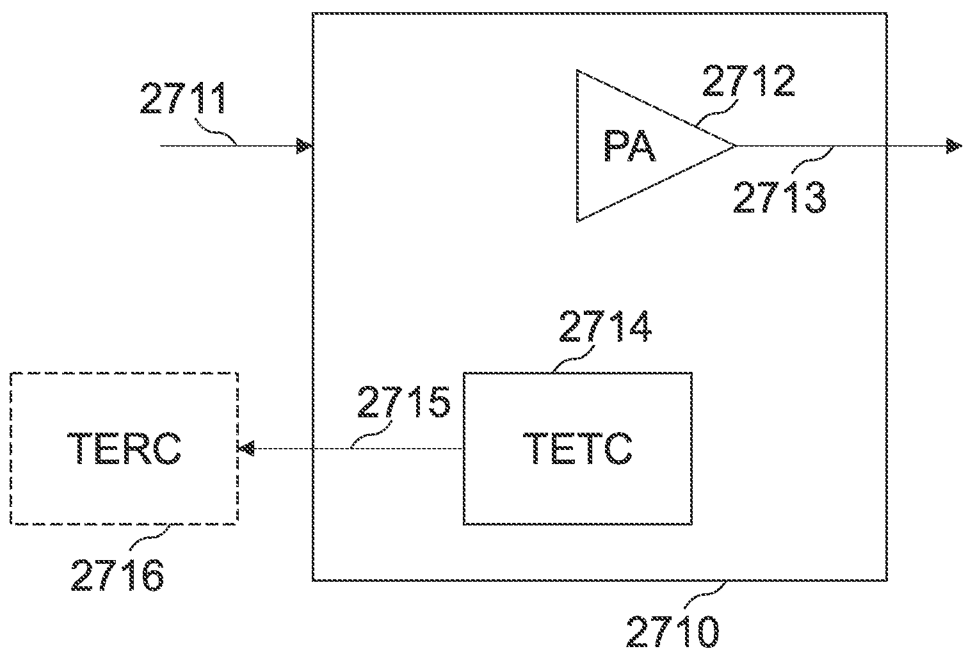
Figure 27C:
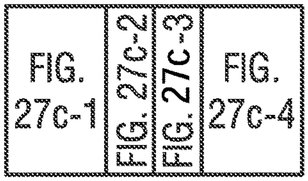
Figure 1:
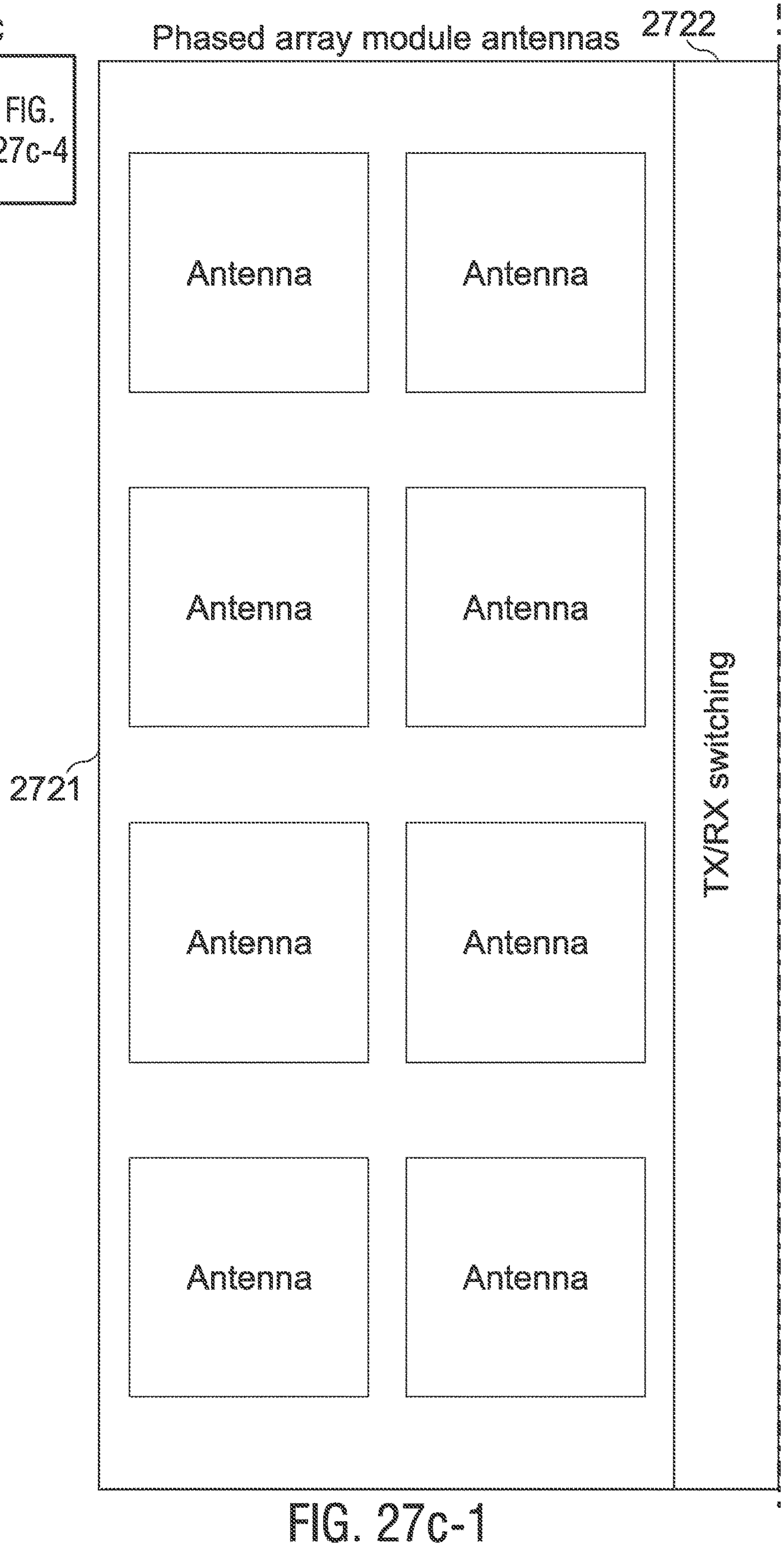
Figures 2, 27C:
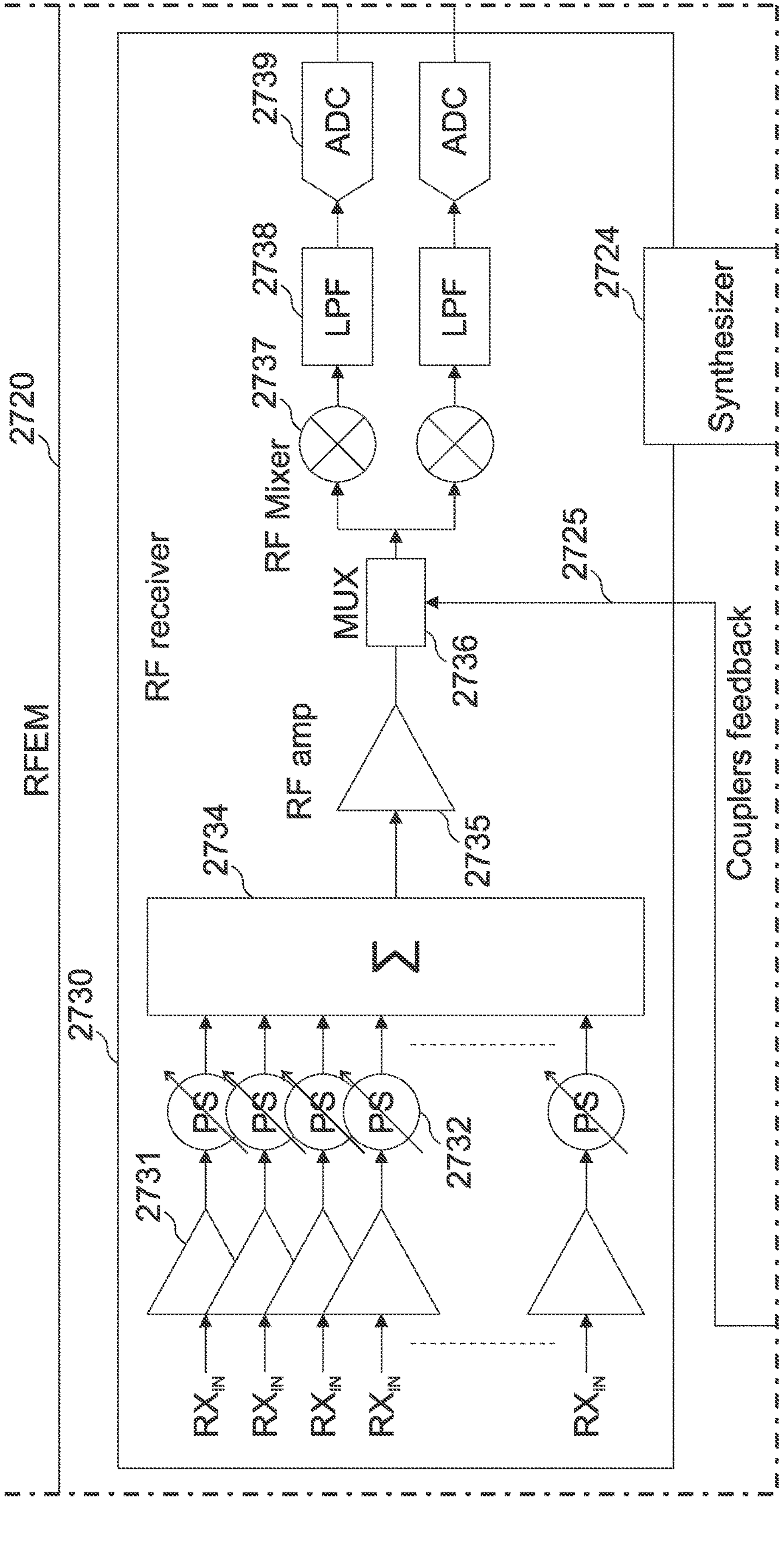
Figures 3, 27C:
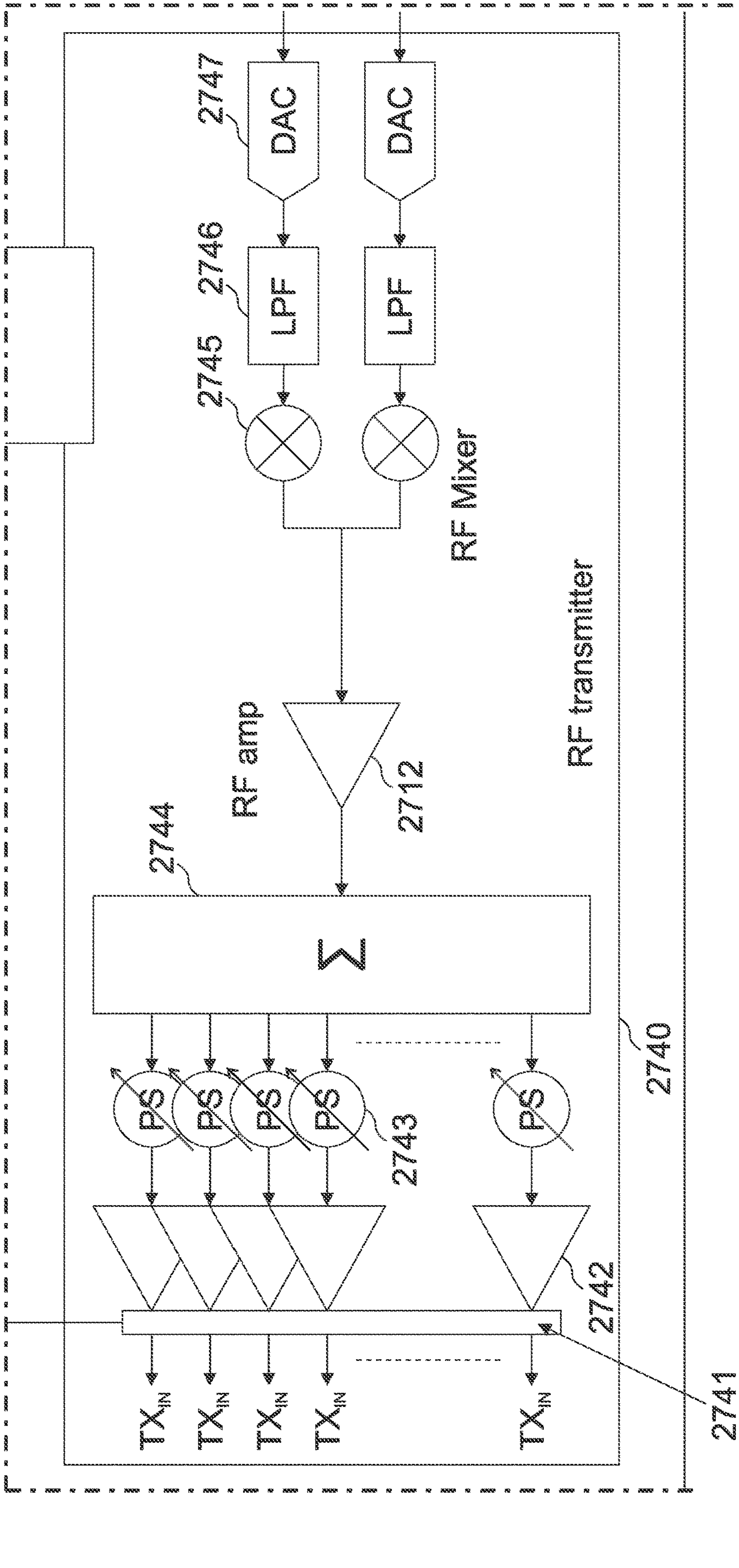
Figures 4, 27C:
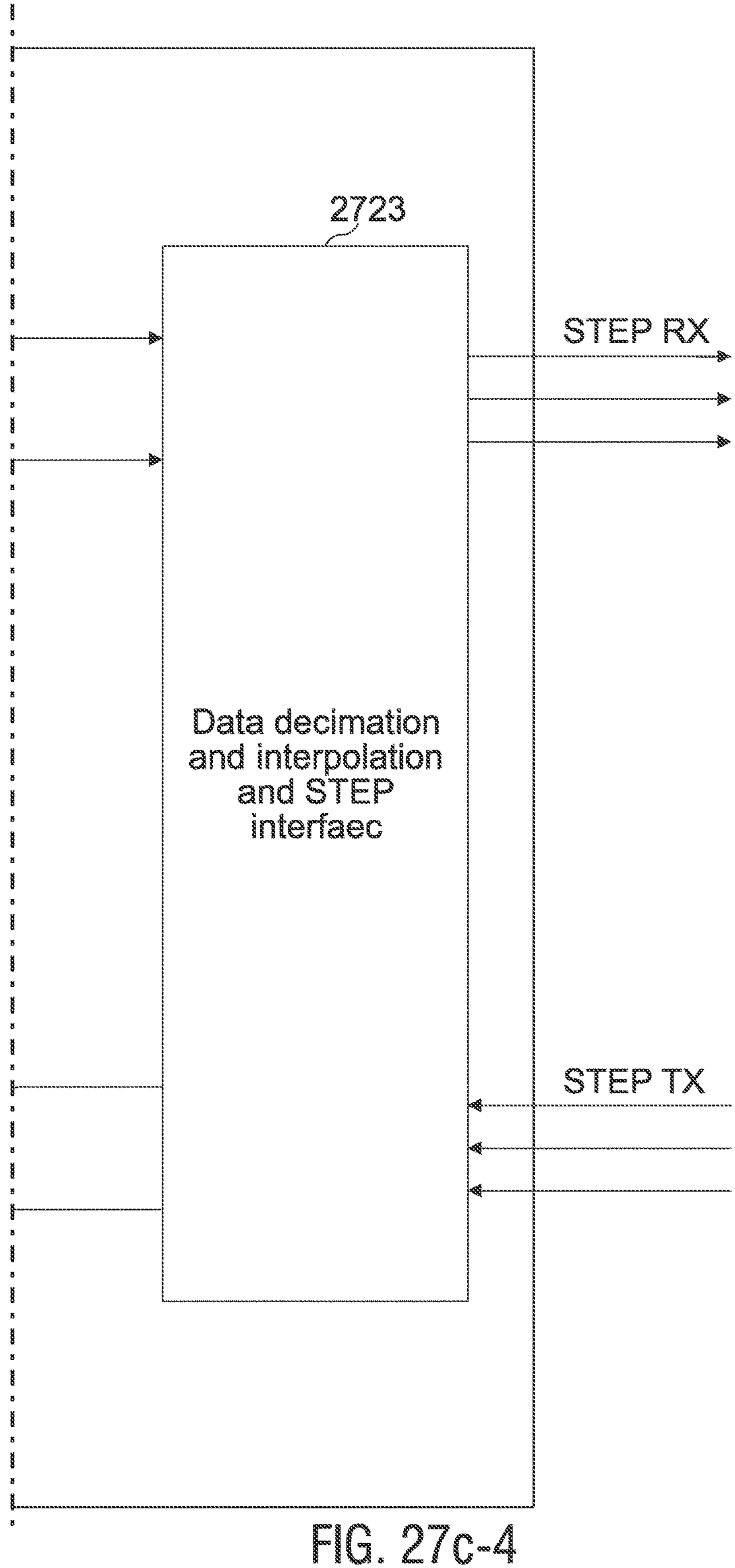
Figure 27D:
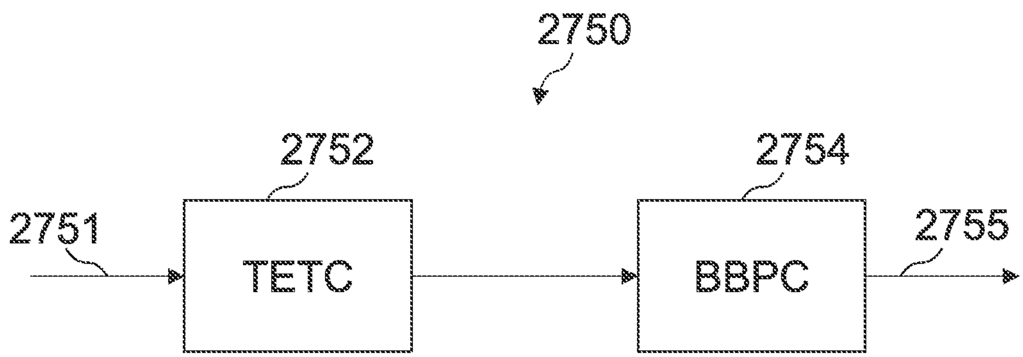
Figure 27E:
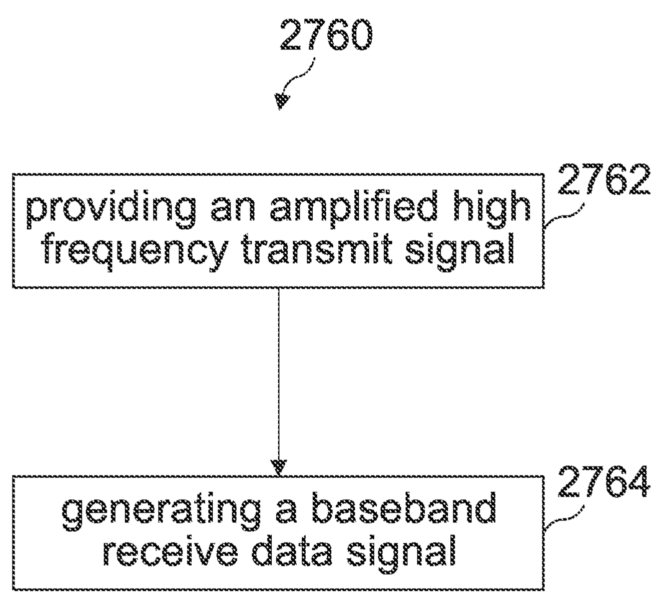
Figure 27F:
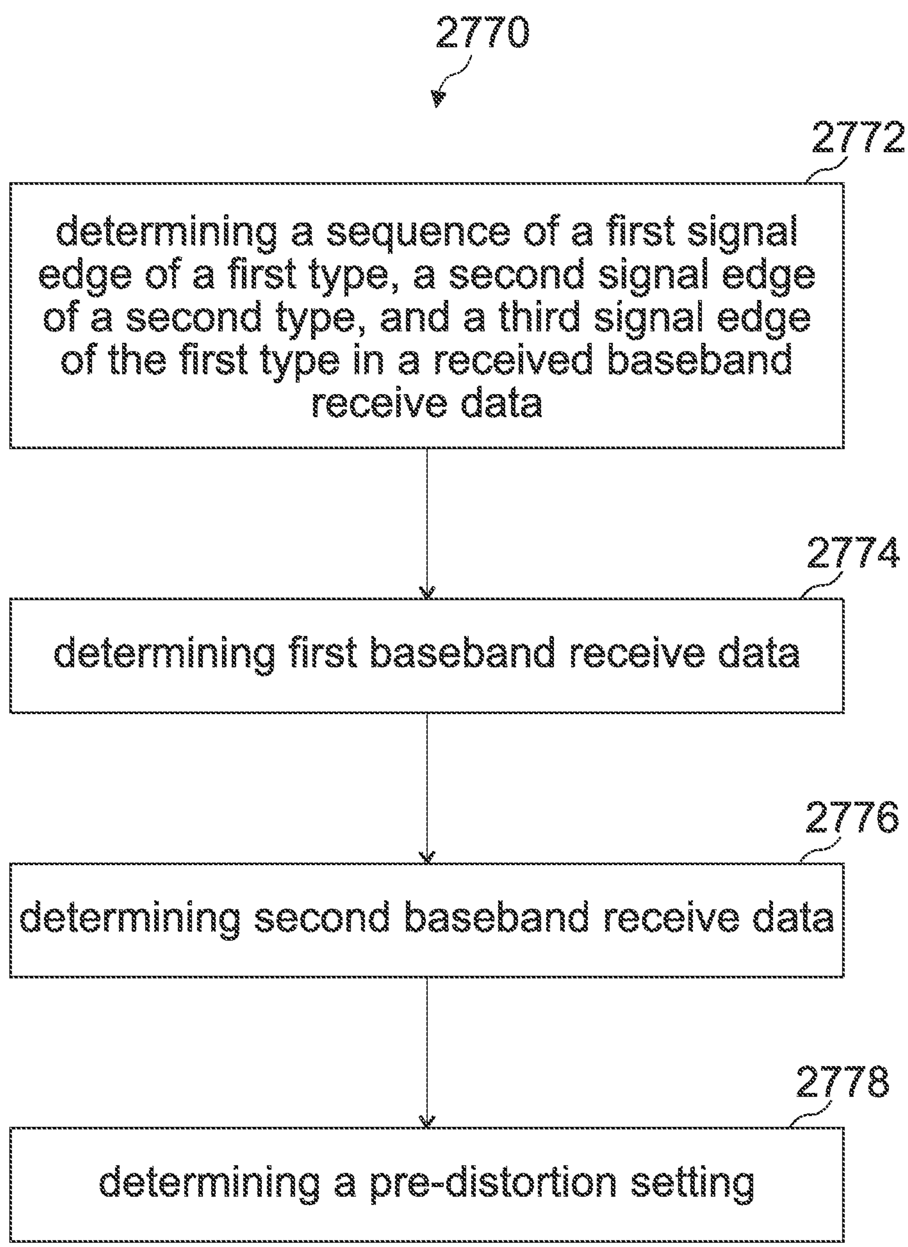
Figure 28A:
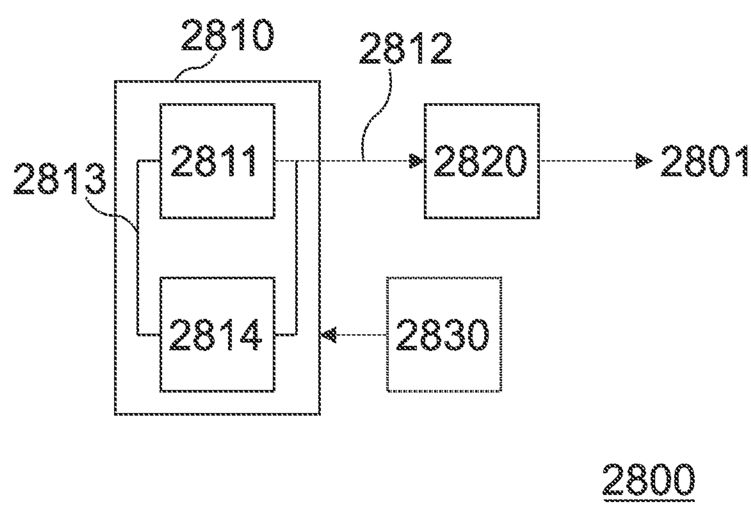
Figure 28B:
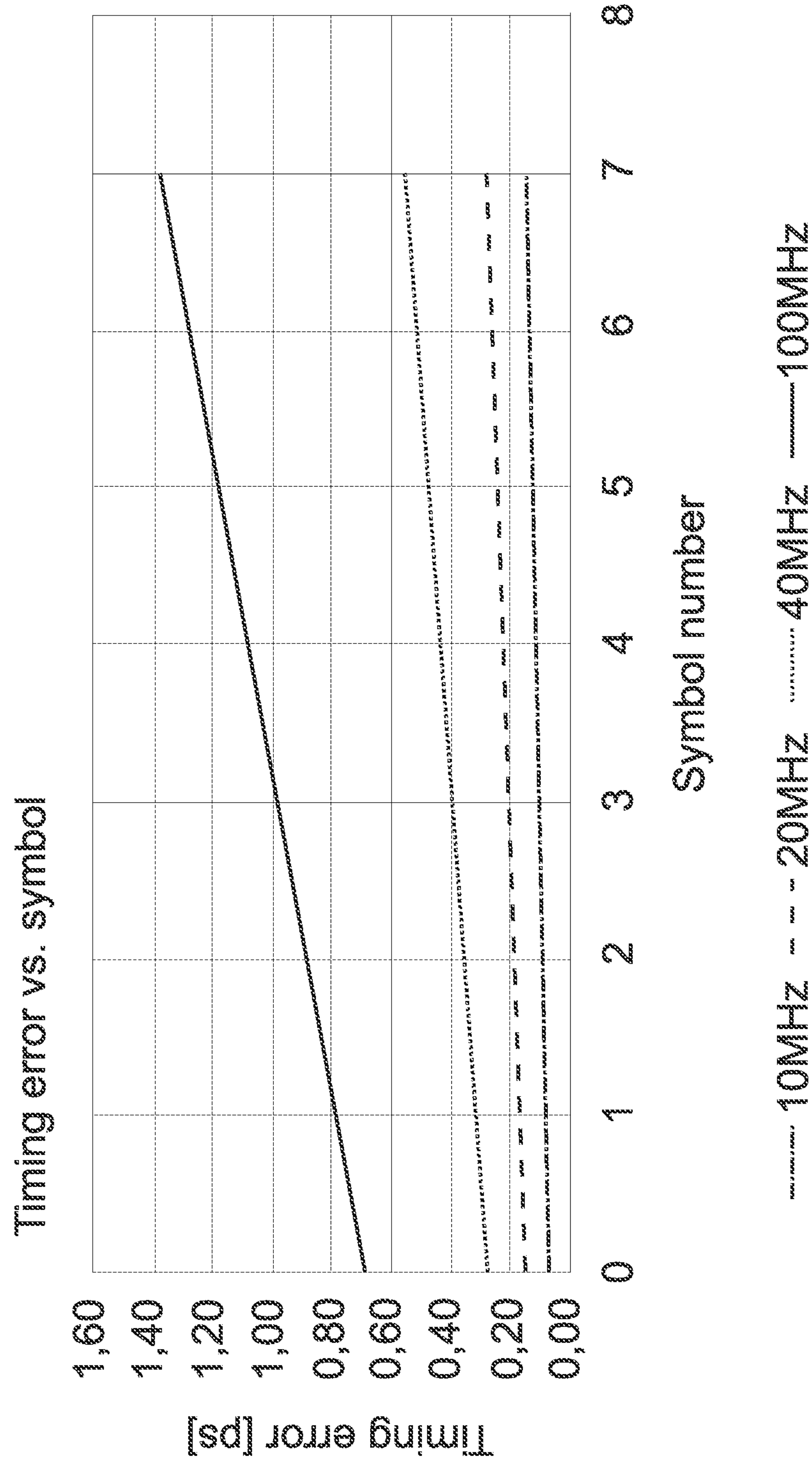
Figure 28C:
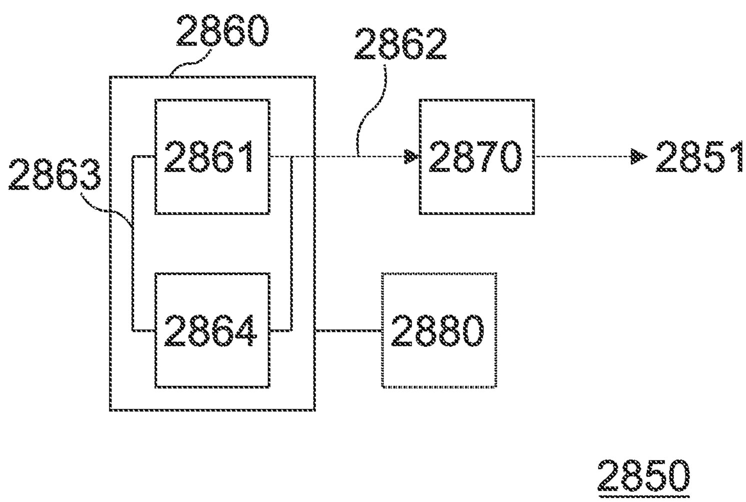
Figure 28D:
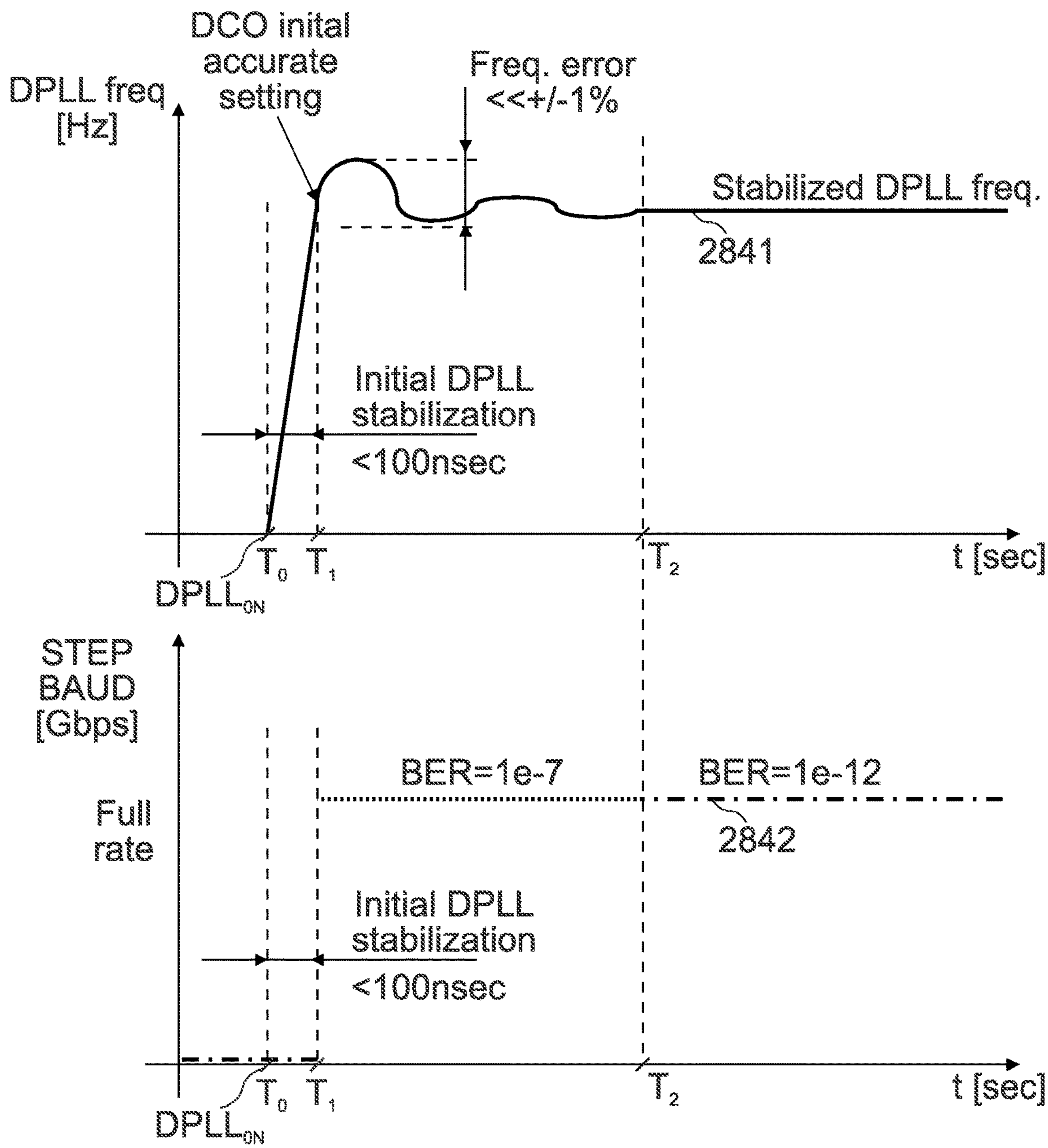
Figure 29A:
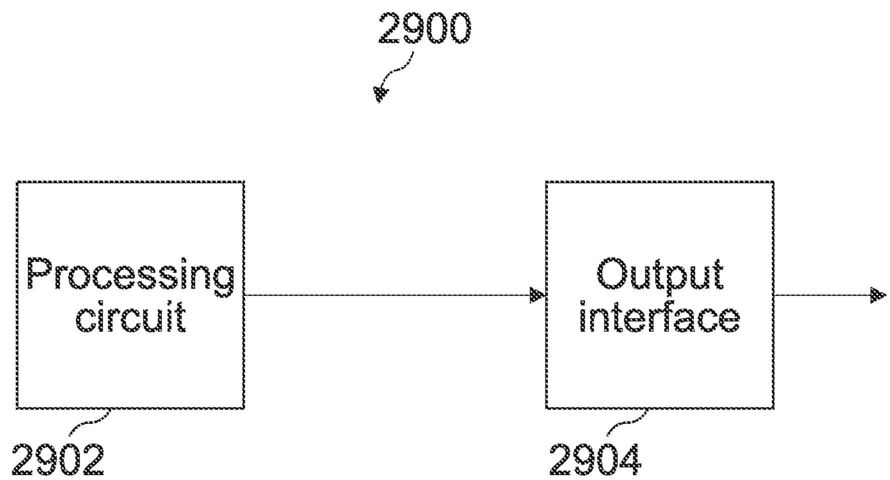
Figure 29B:
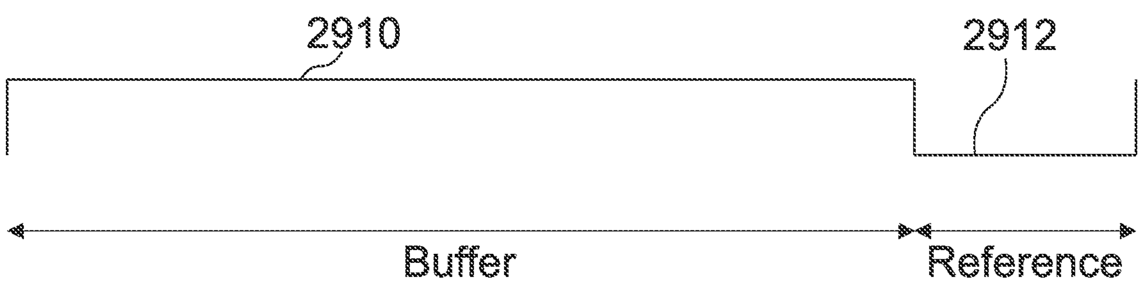
Figure 29C:
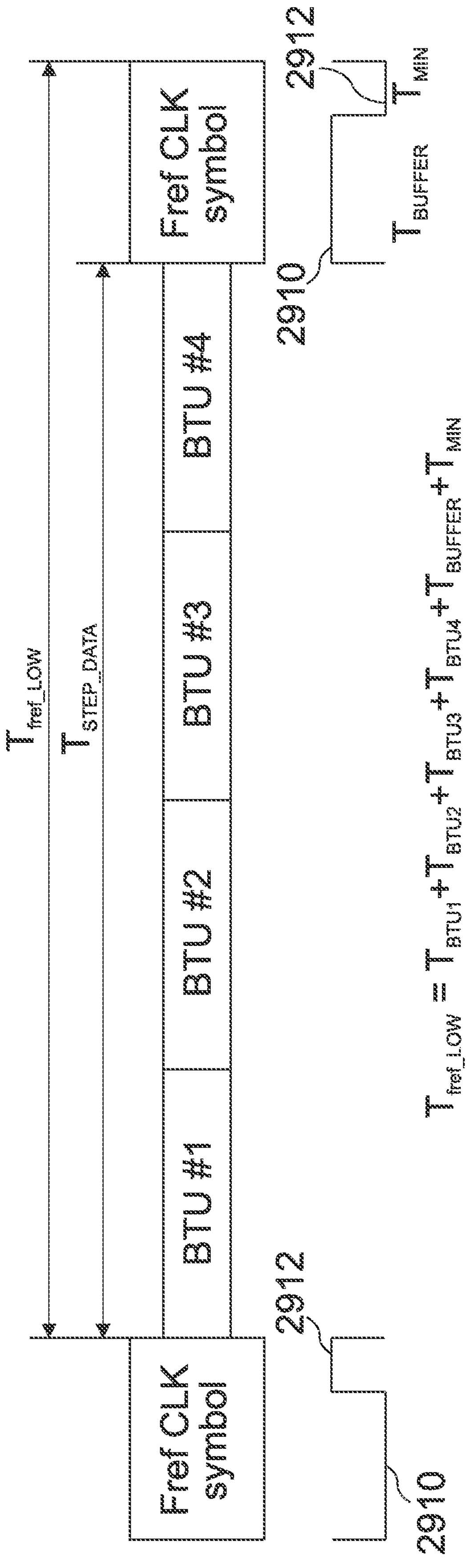
Figure 29D:
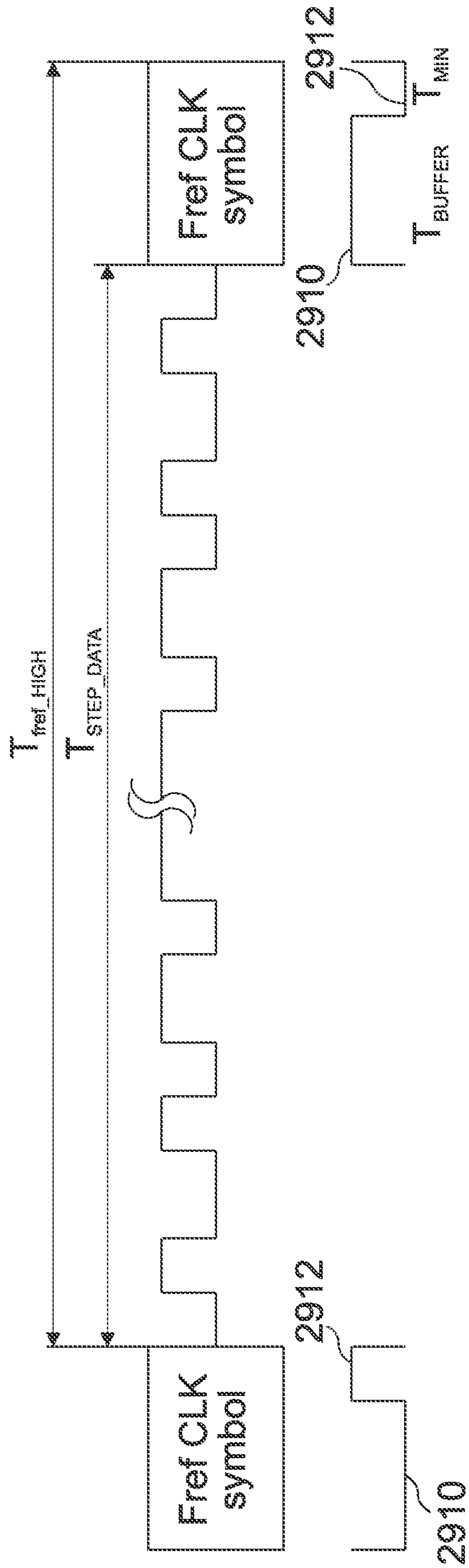
Figure 29E:
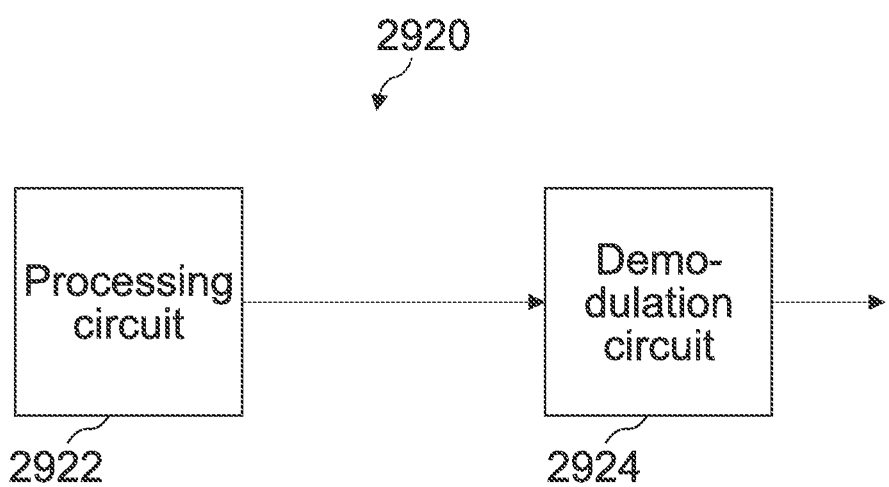
Figure 29F:
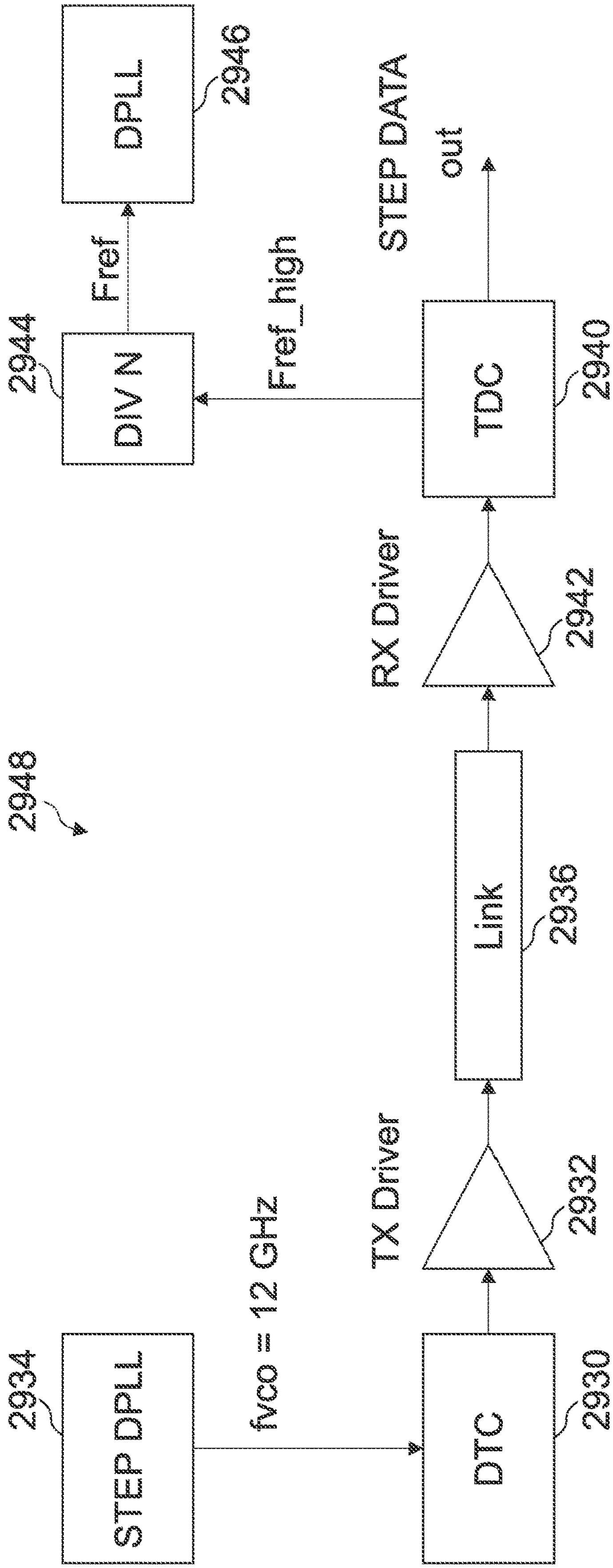
Figure 29G:
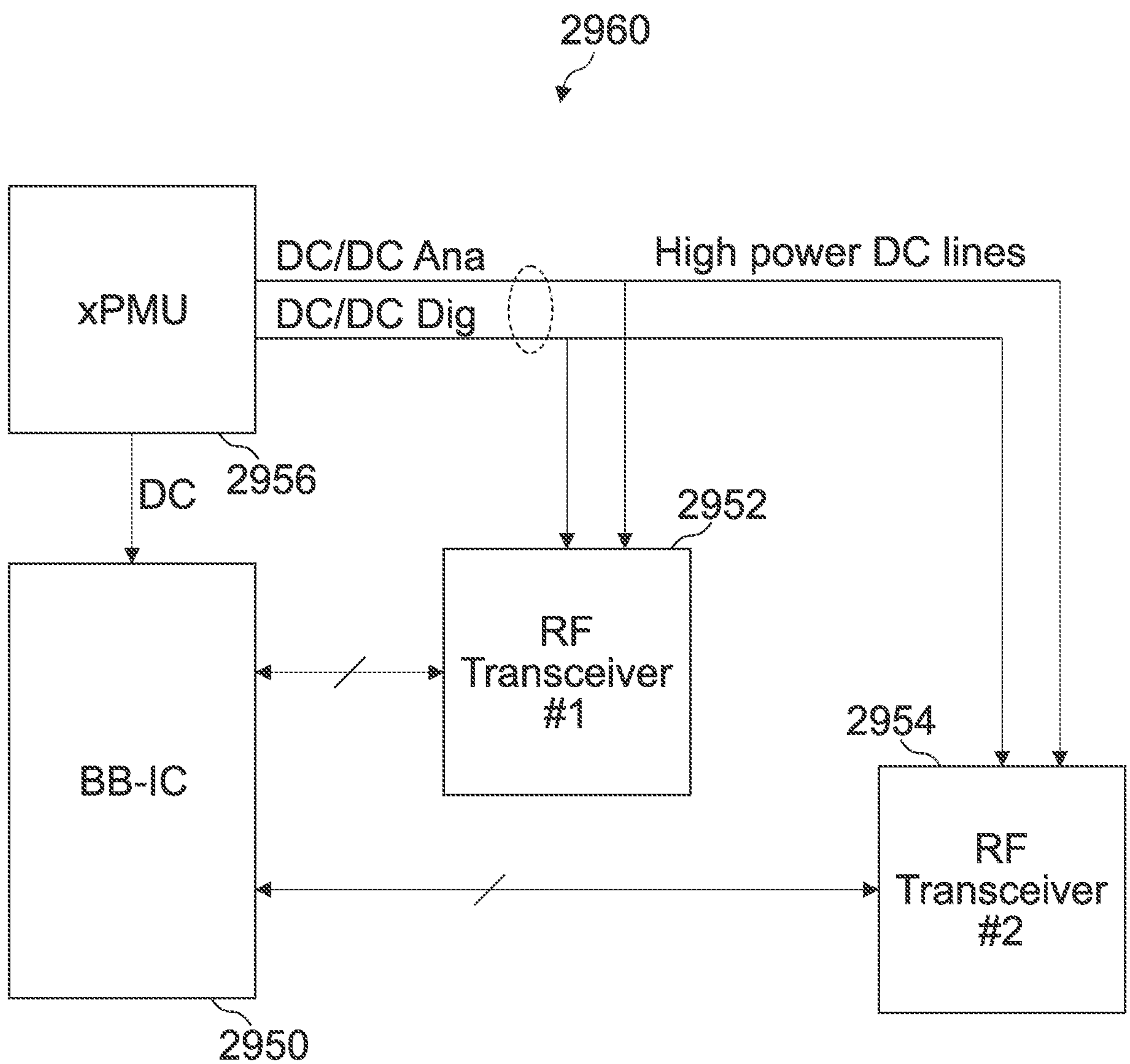
Figure 29H:
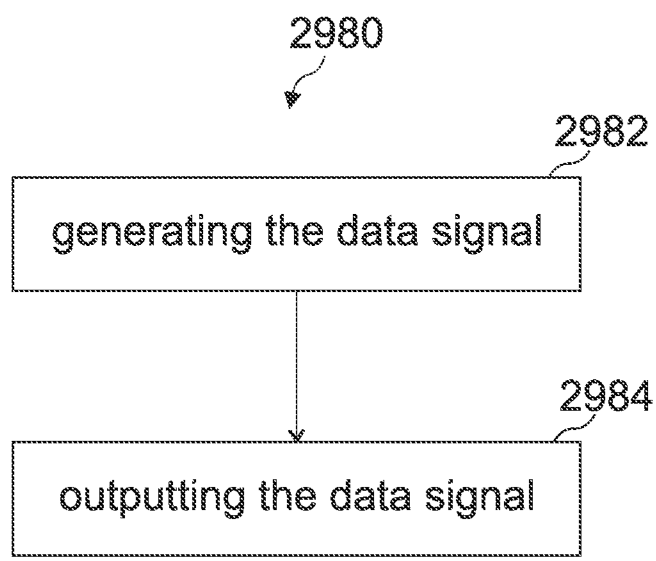
Figure 29I:
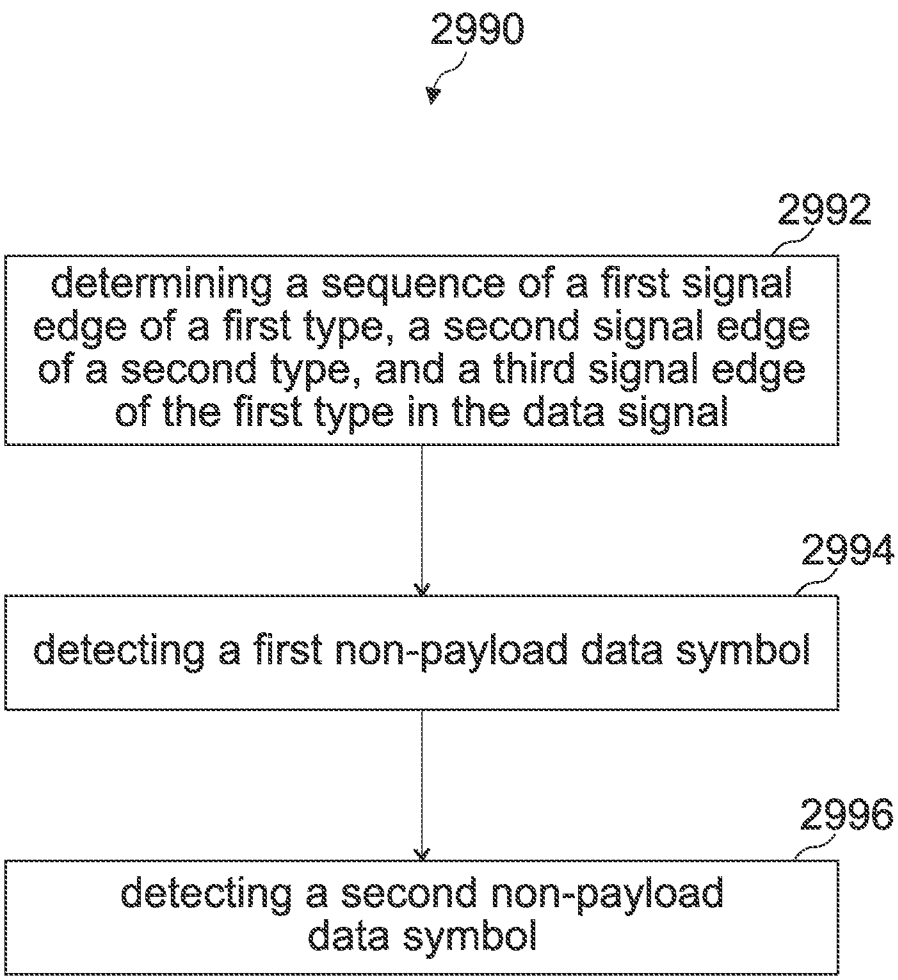
Figure 30A:
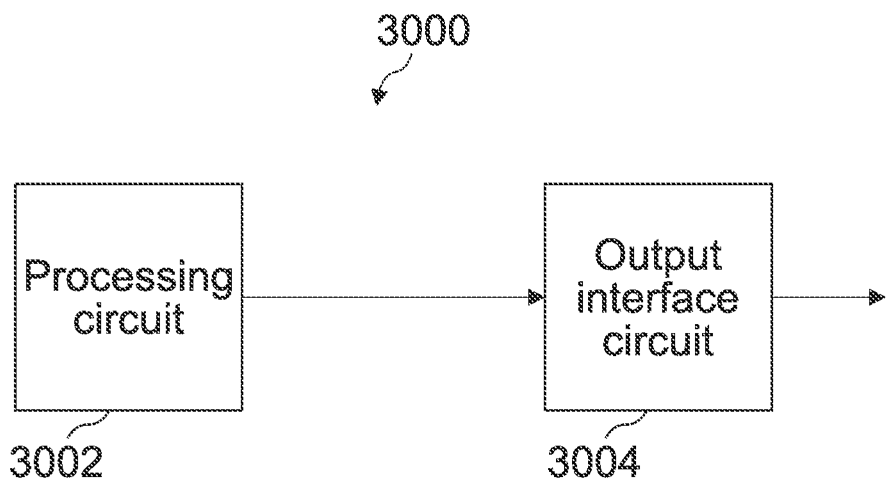
Figure 30B:
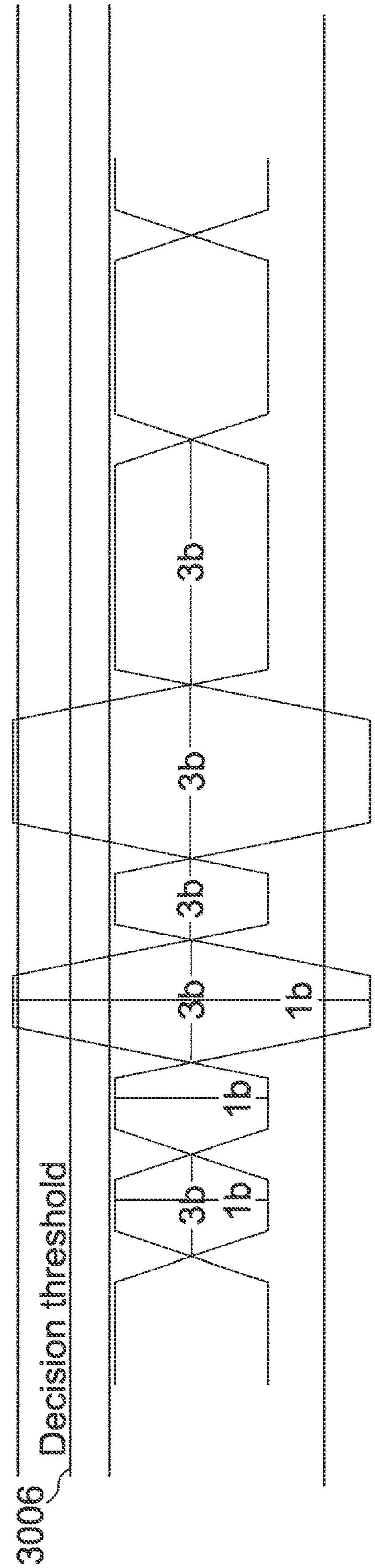
Figure 30C:
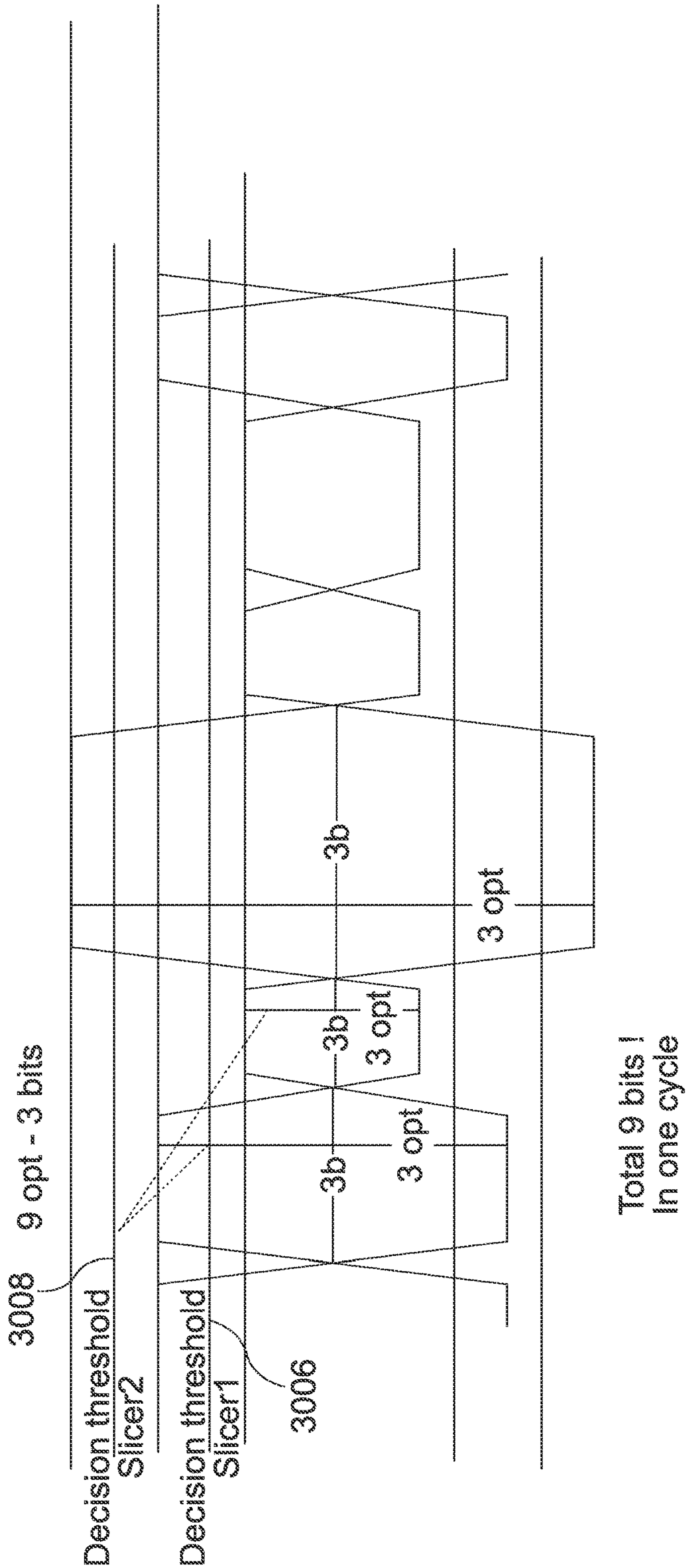
Figure 30D:
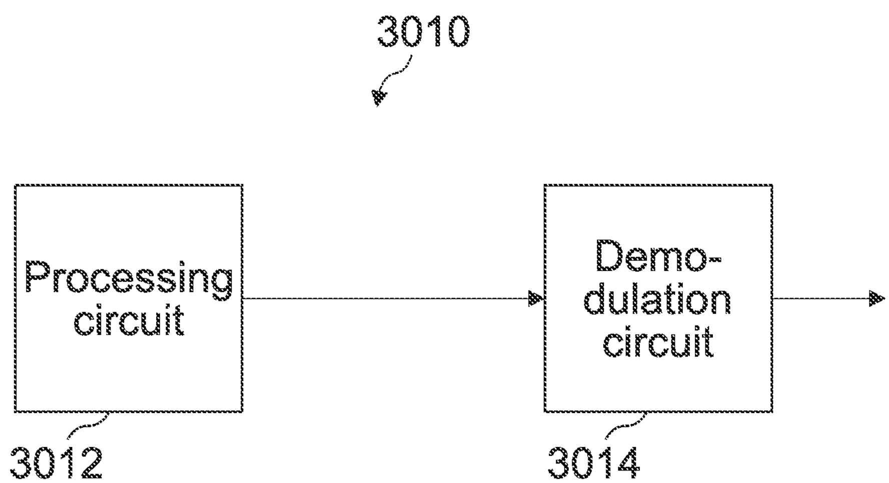
Figure 30E:
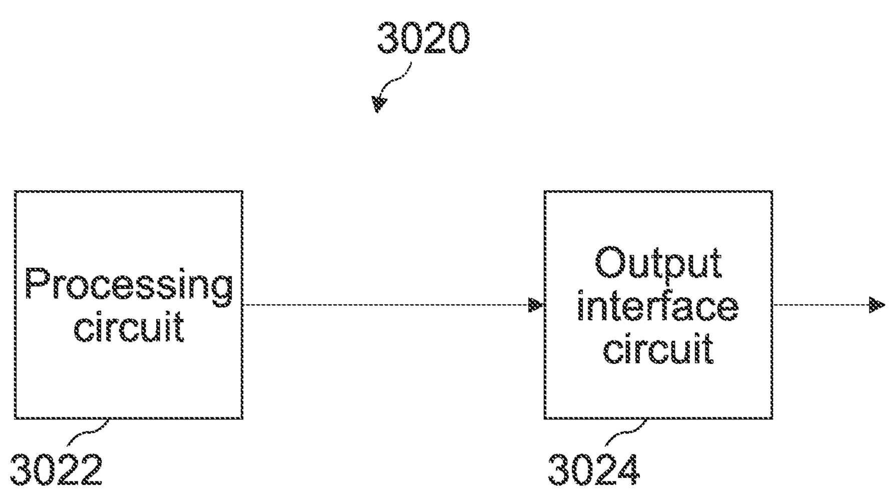
Figure 30F:
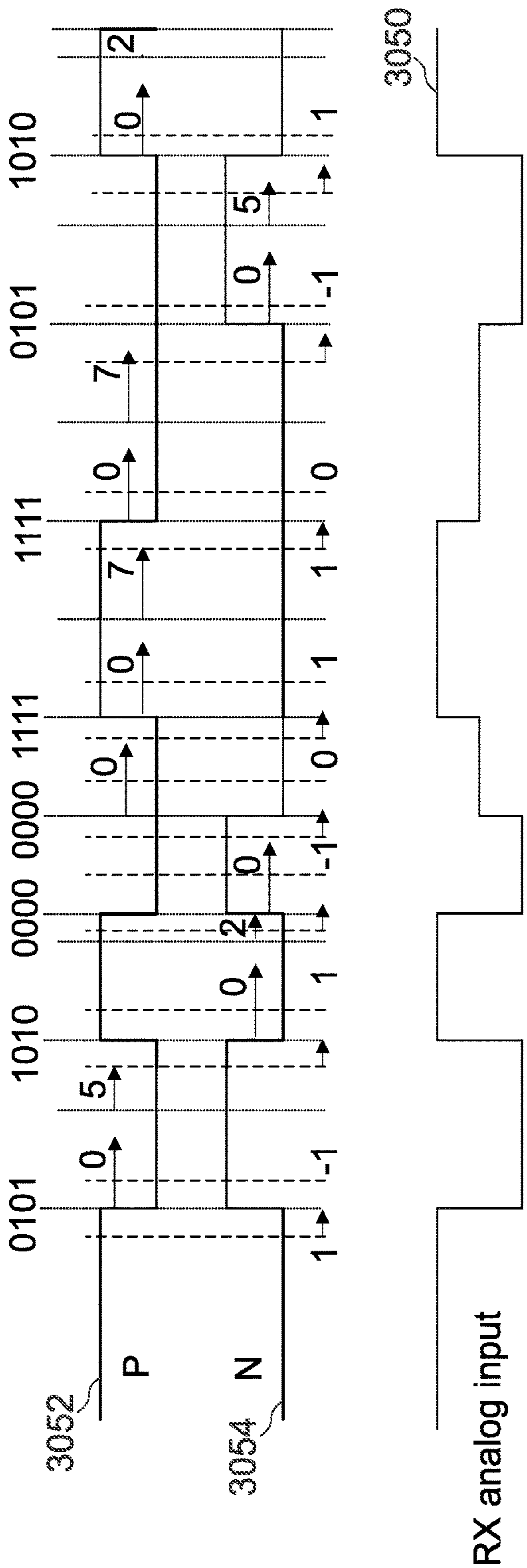
Figure 30G:
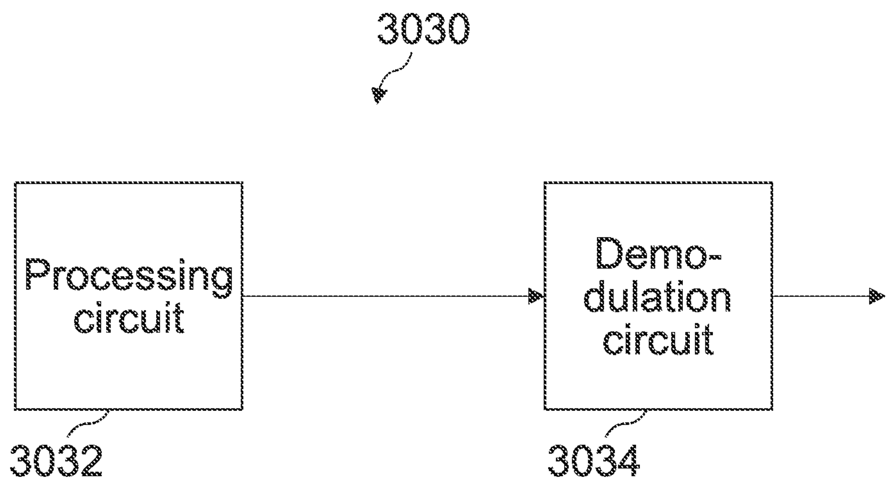
Figure 30H:
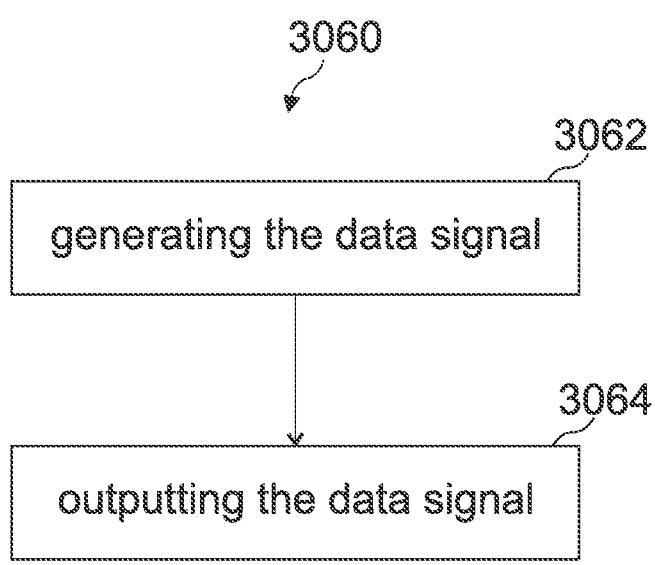
Figure 30I:
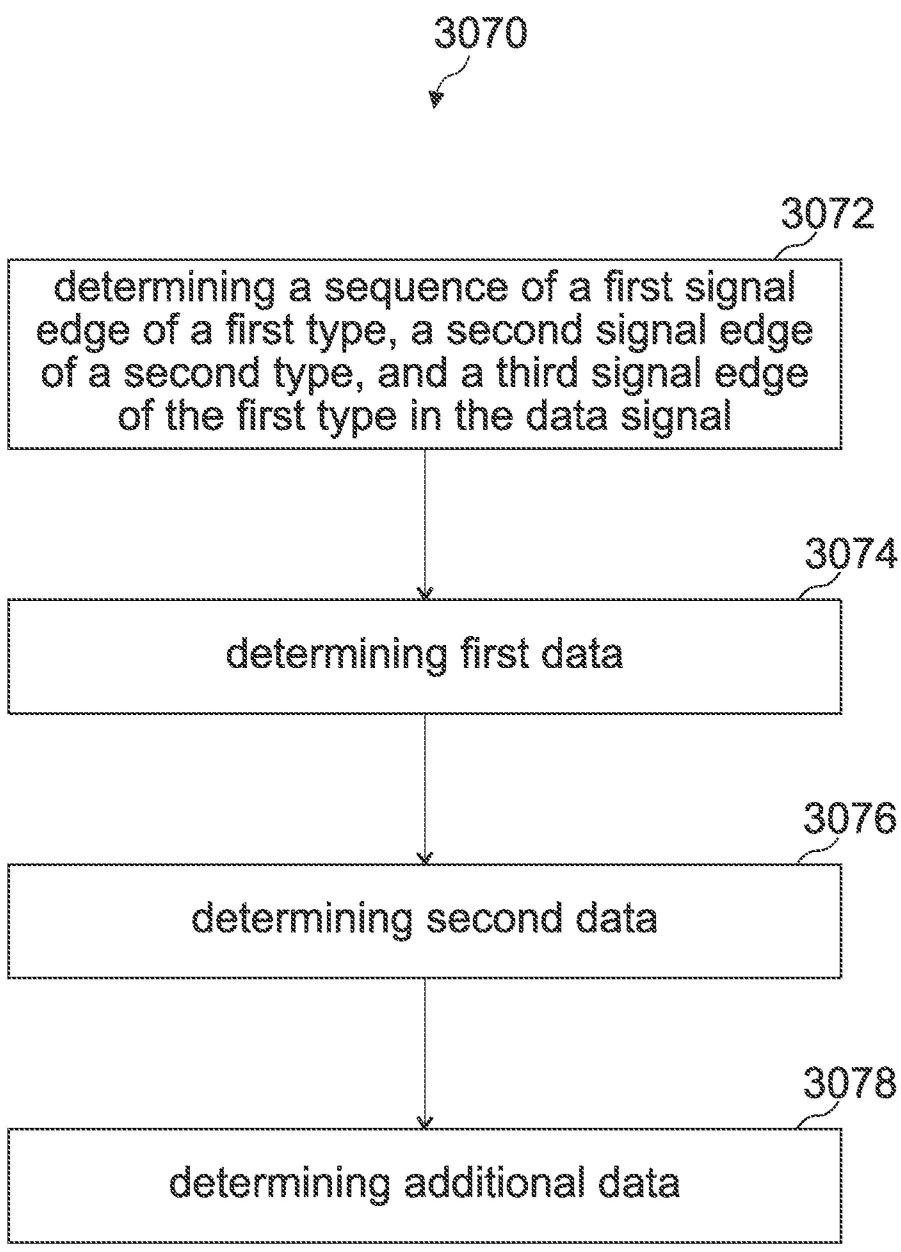
Figure 30J:
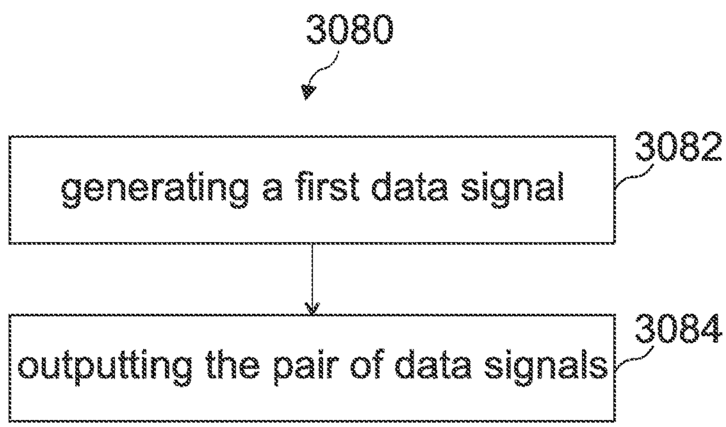
Figure 30K:
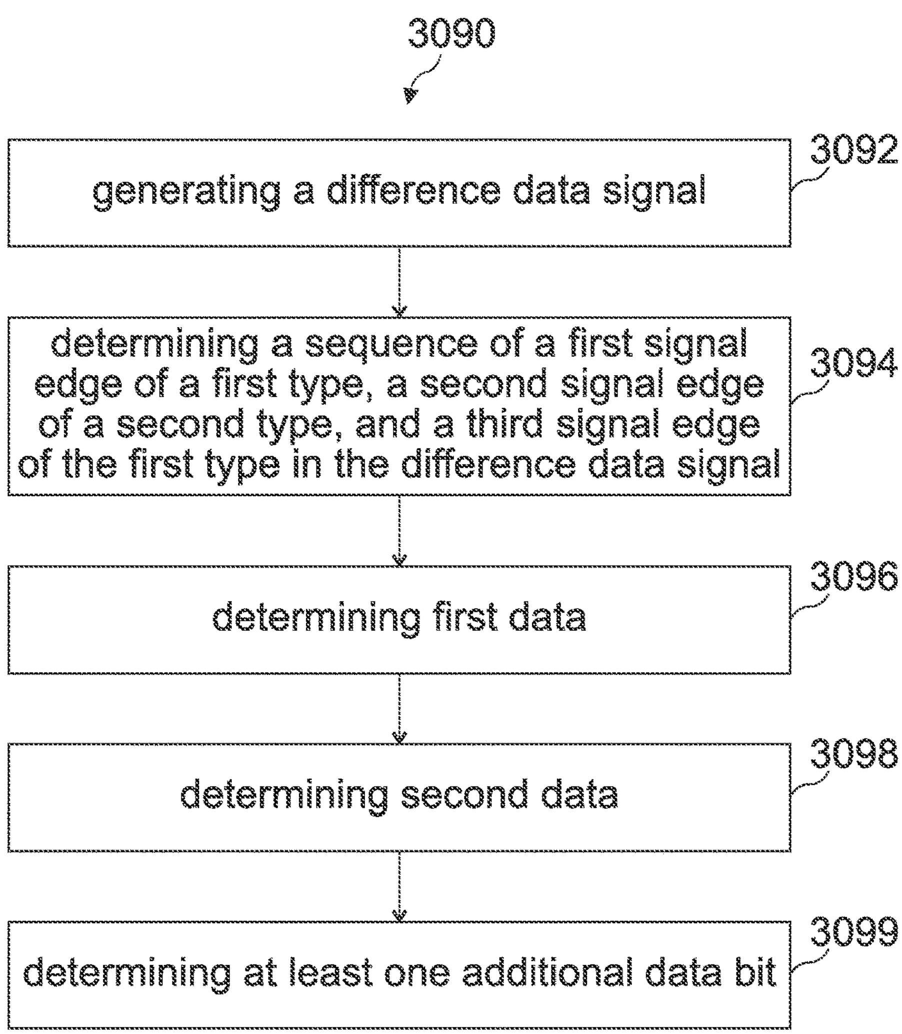
Figure 31A:
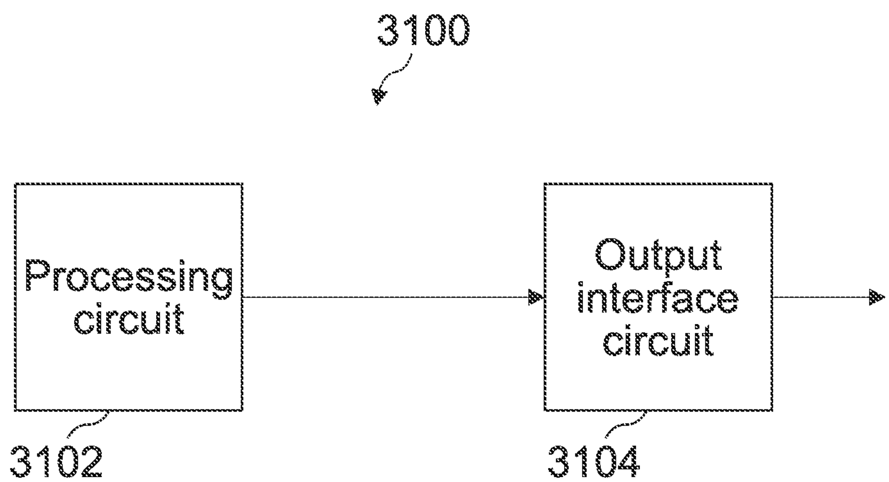
Figure 31B:
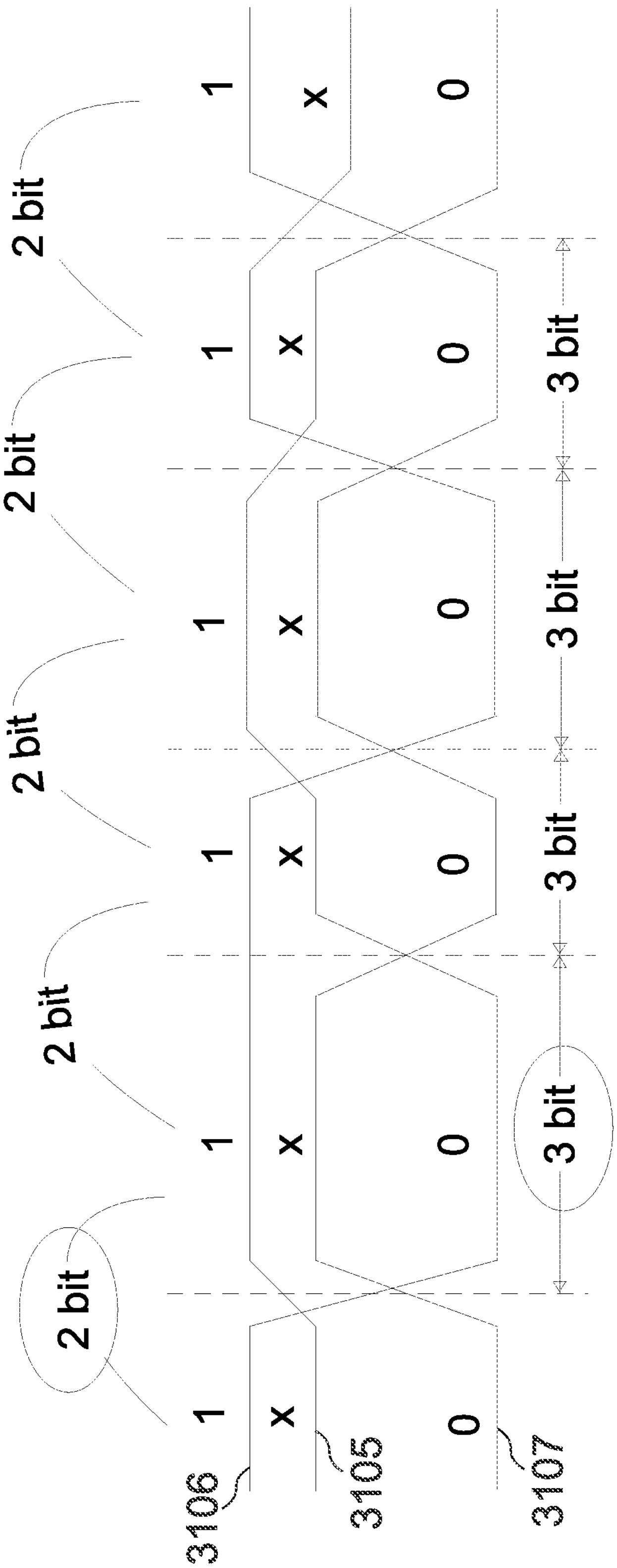
Figures 1, 31C:
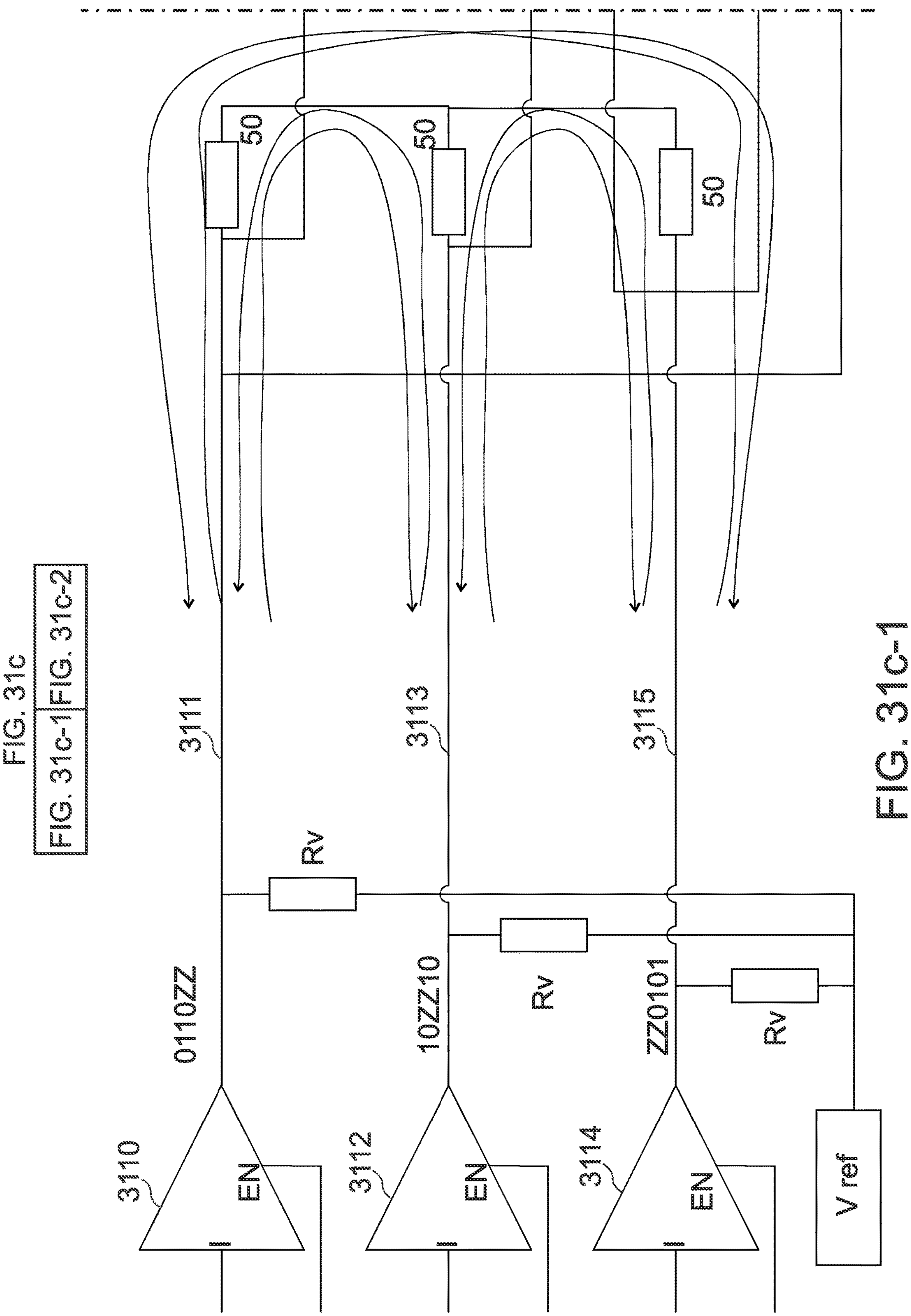
Figures 2, 31C:
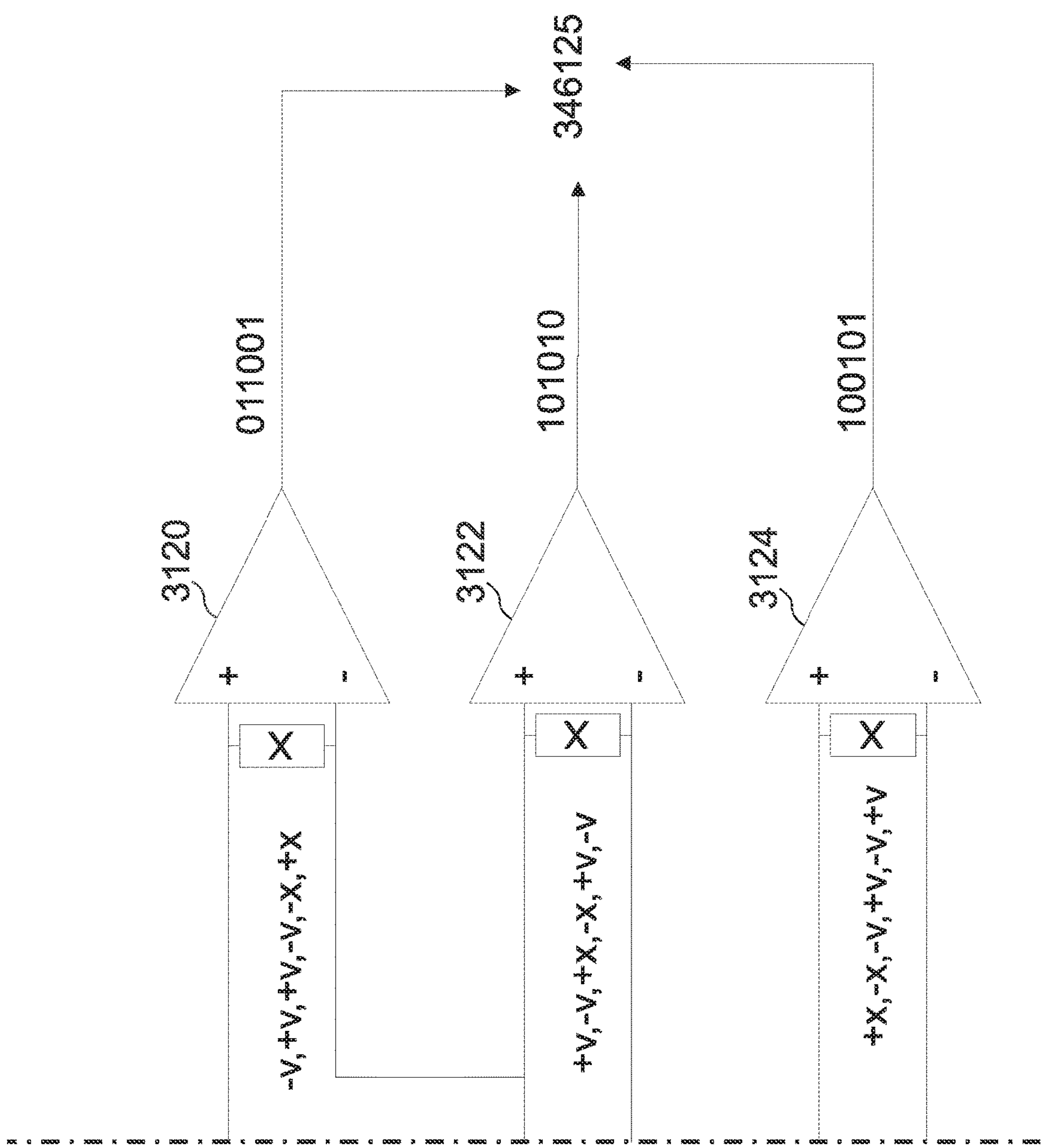
Figure 31D:
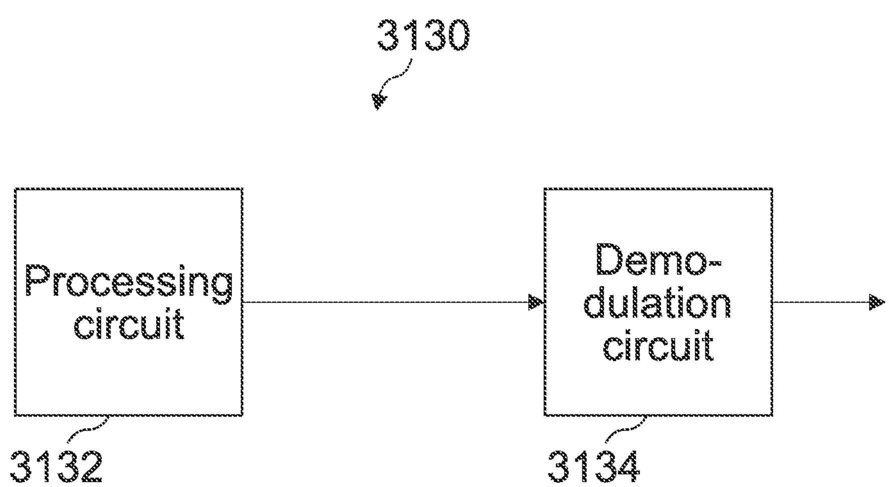
Figure 31E:
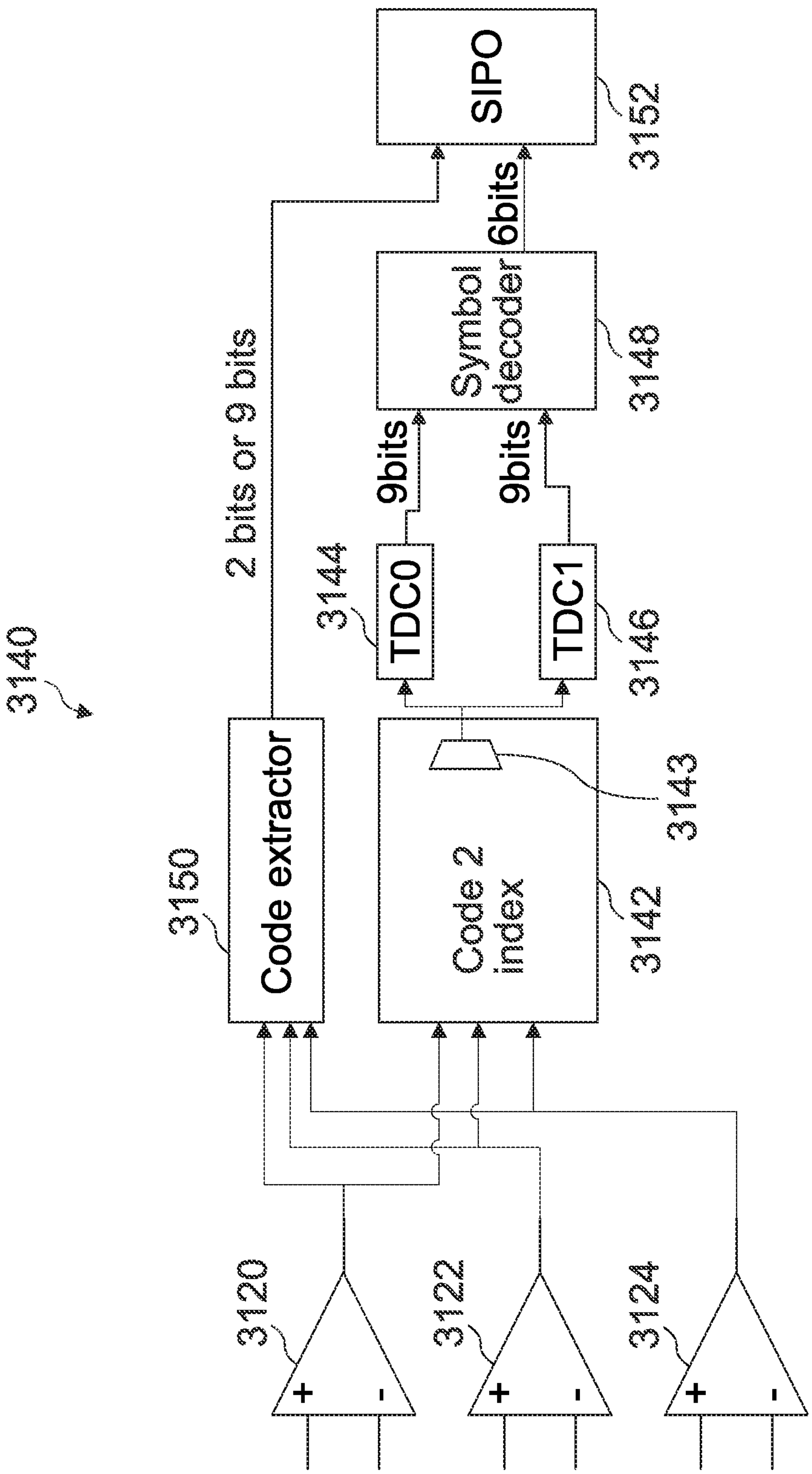
Figure 31F:
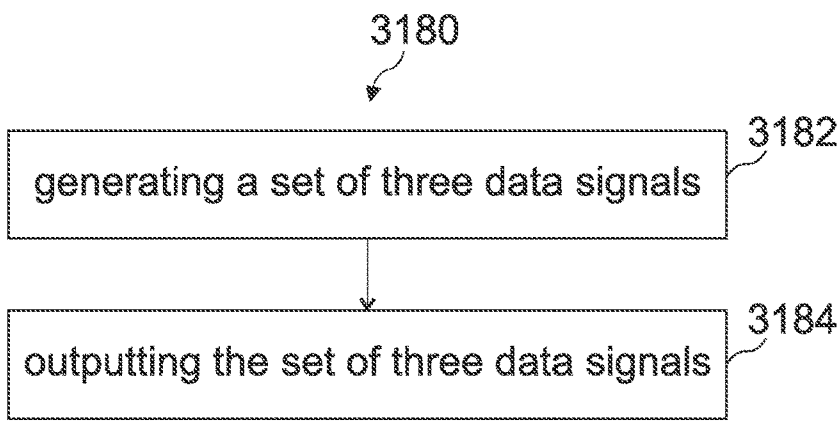
Figure 31G:
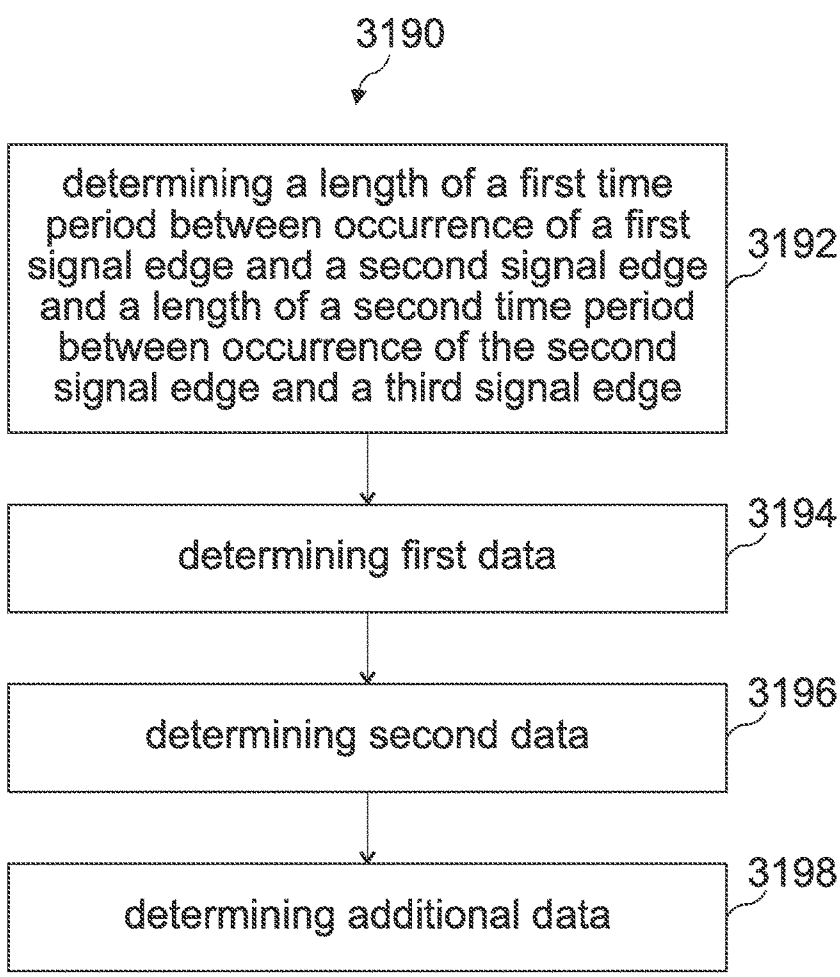
Figure 32A:
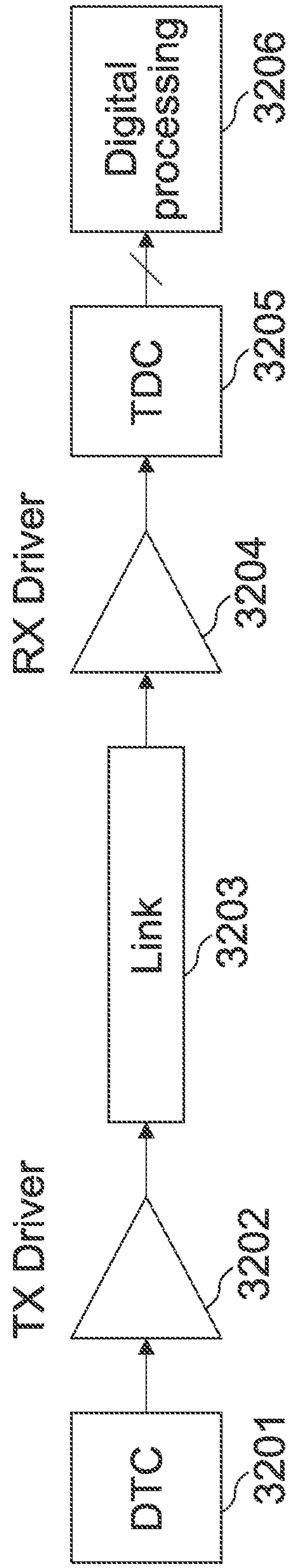
Figure 32B:
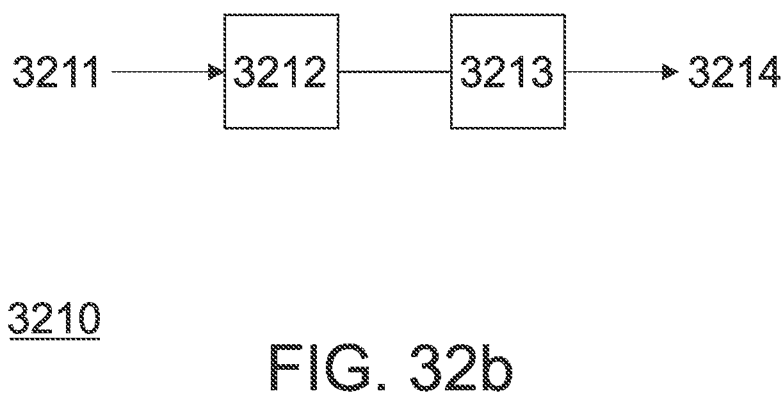
Figure 32C:
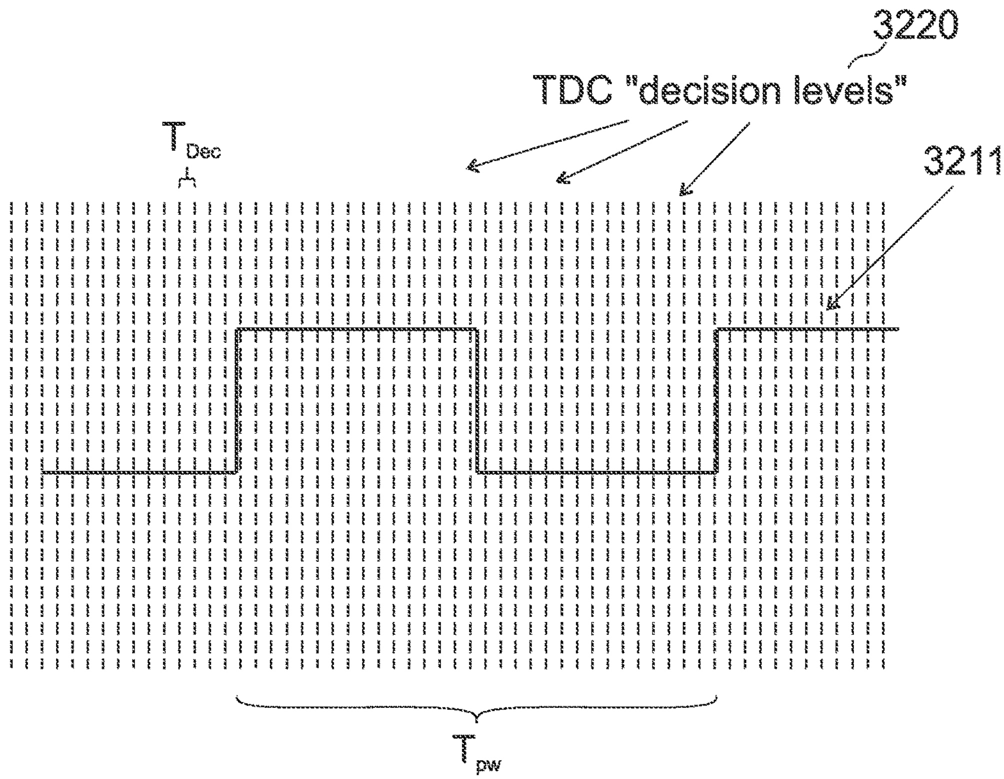
Figure 32D:
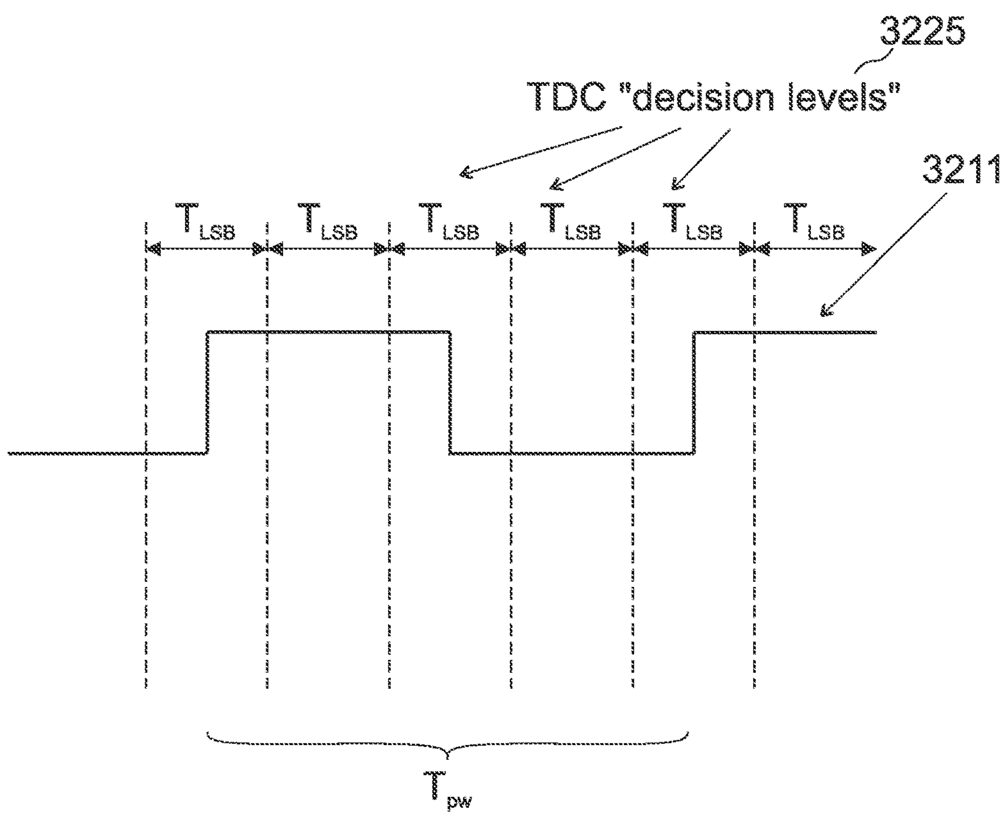
Figure 32E:
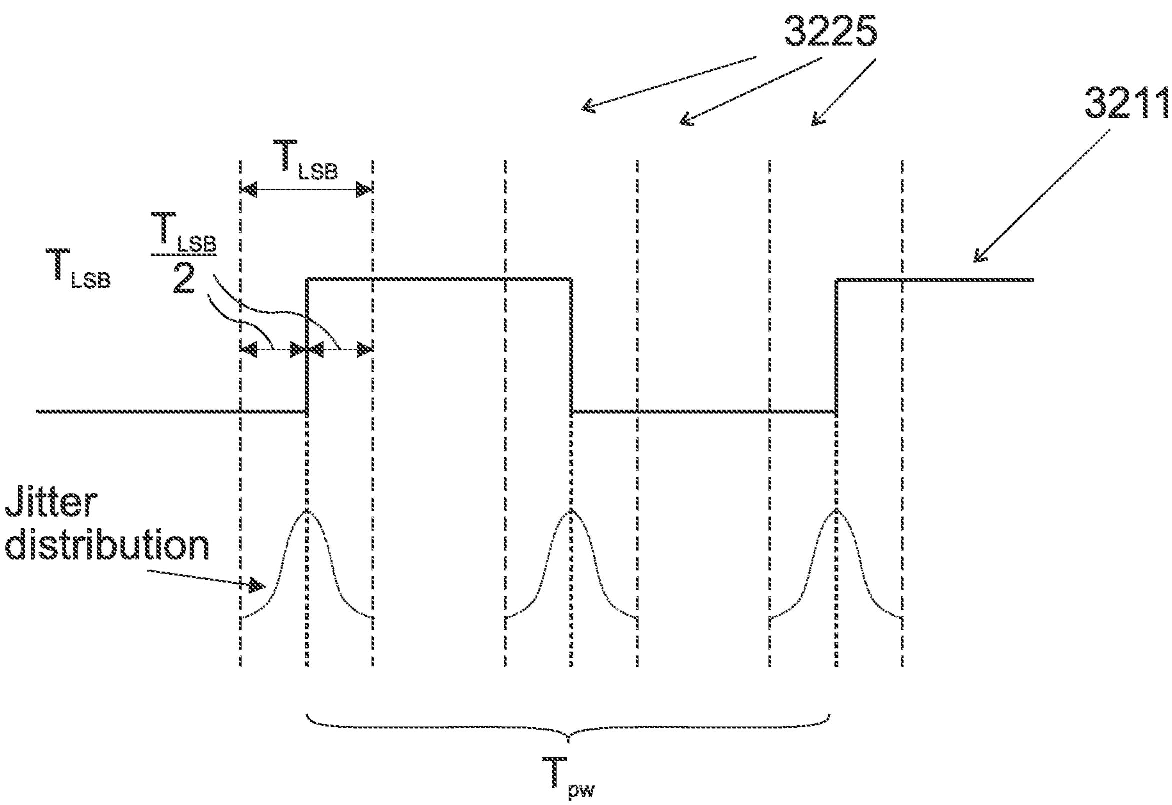
Figure 32F:
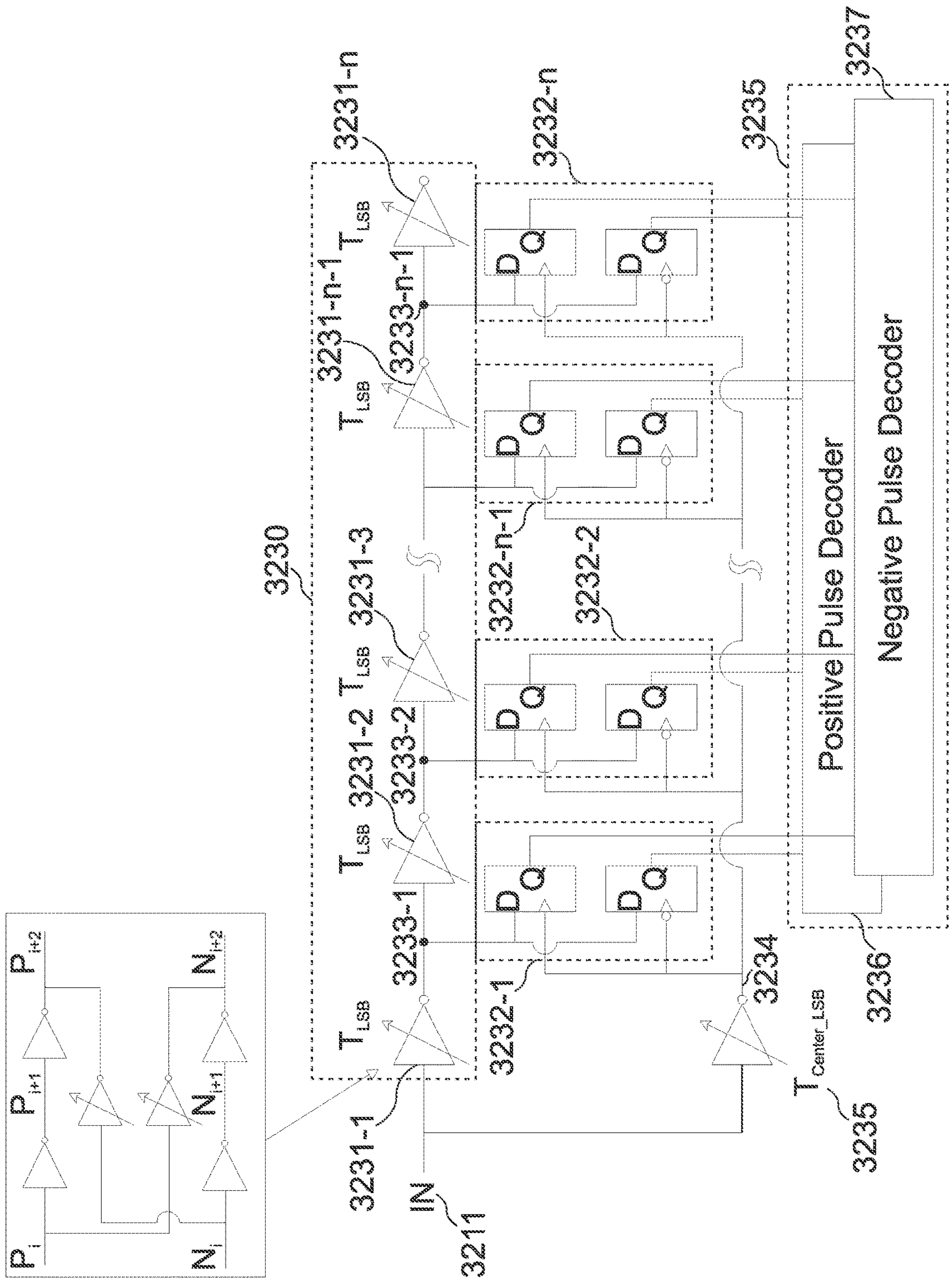
Figure 32G:
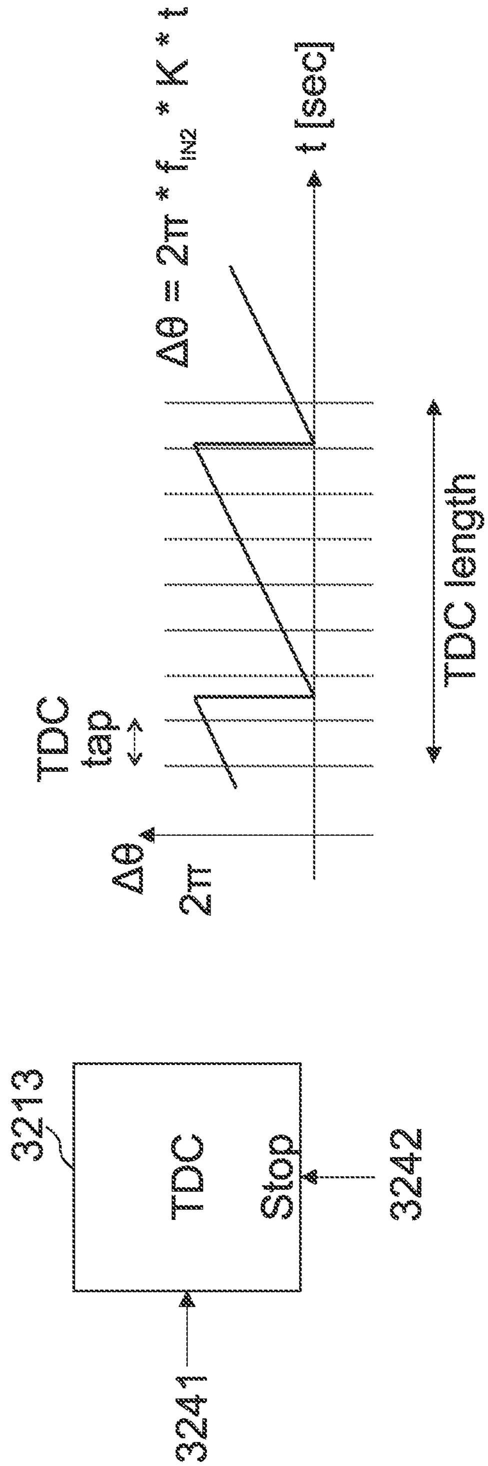
Figure 32H:
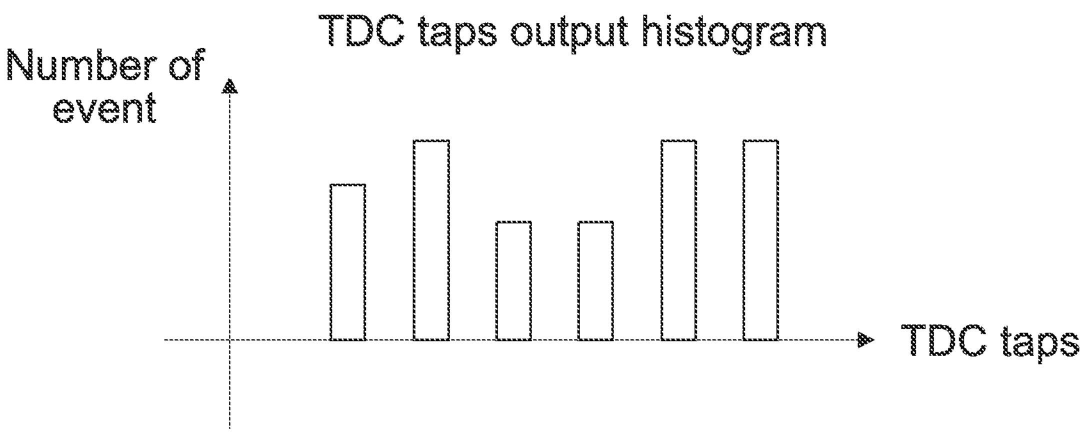
Figure 32I:
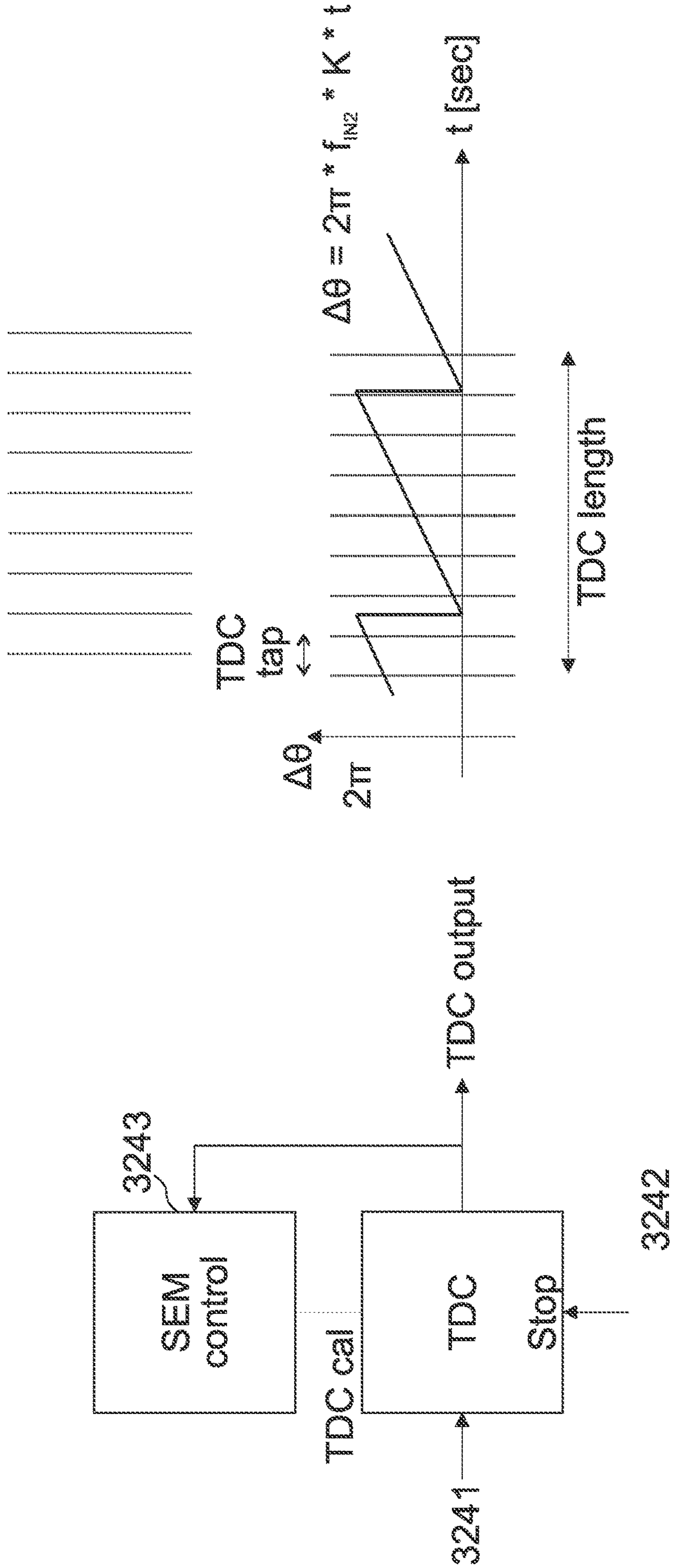
Figure 32J:
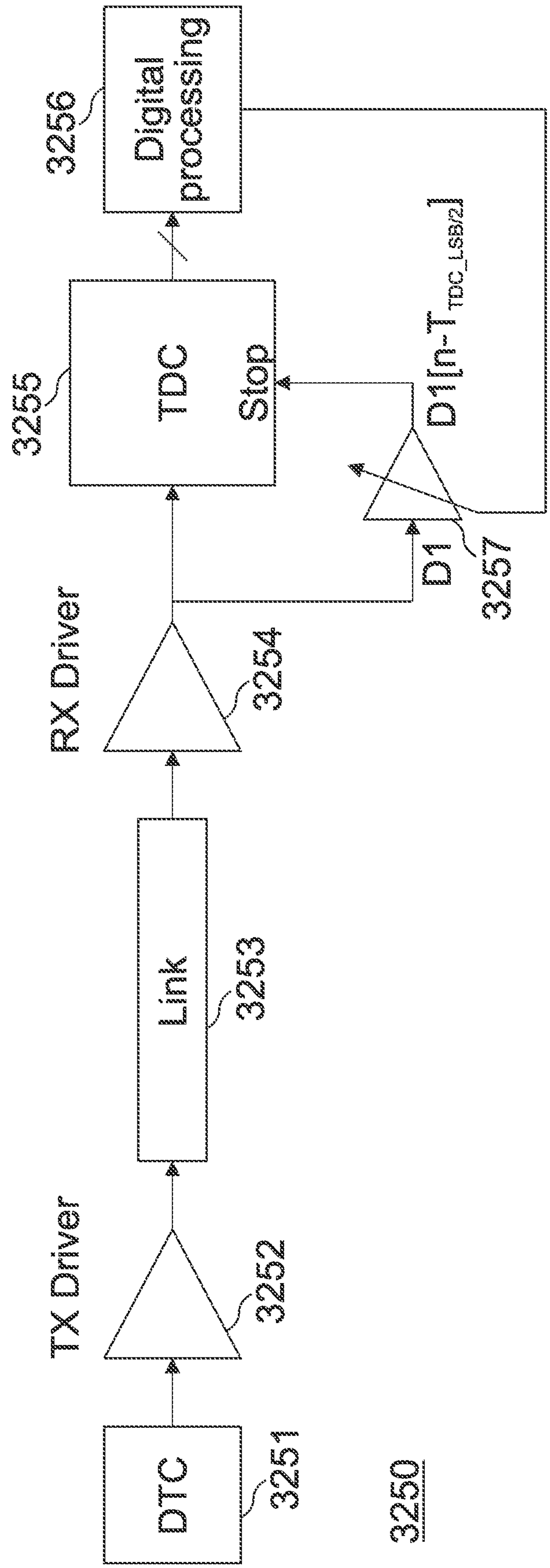
Figure 32K:
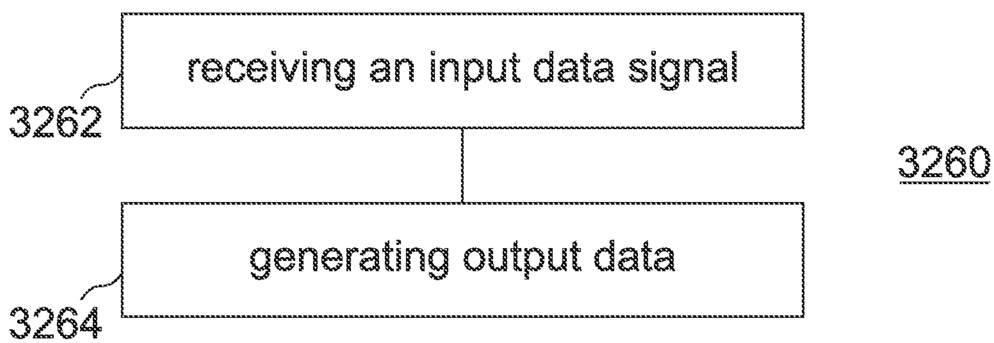
Figure 33A:
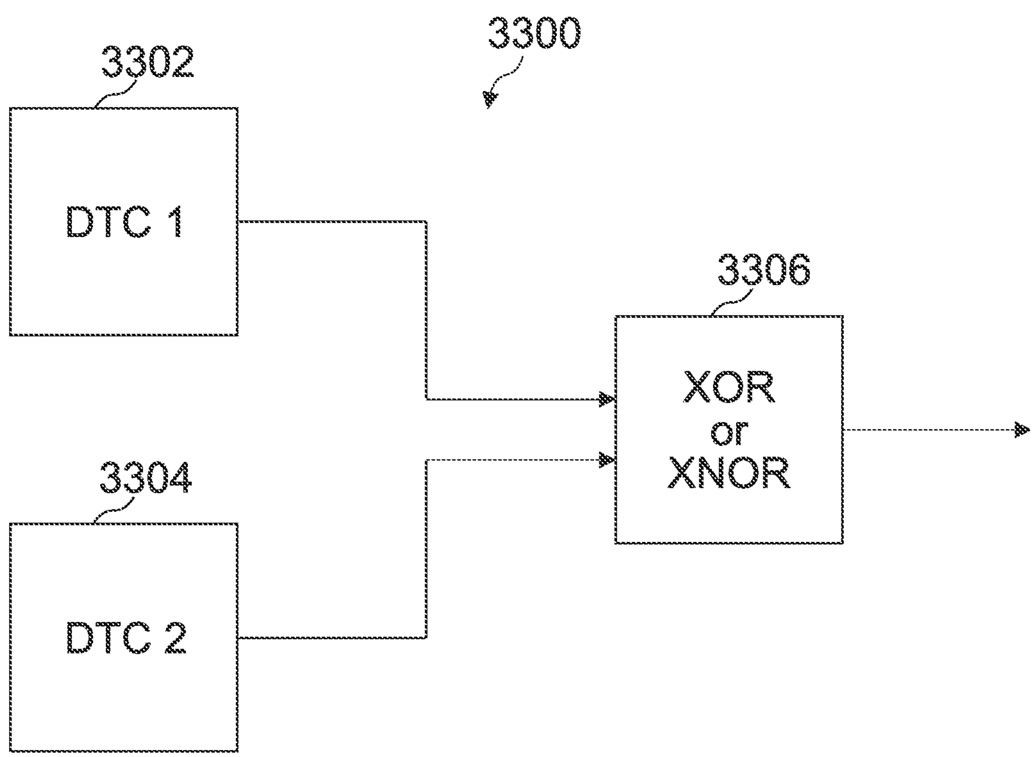
Figure 33B:
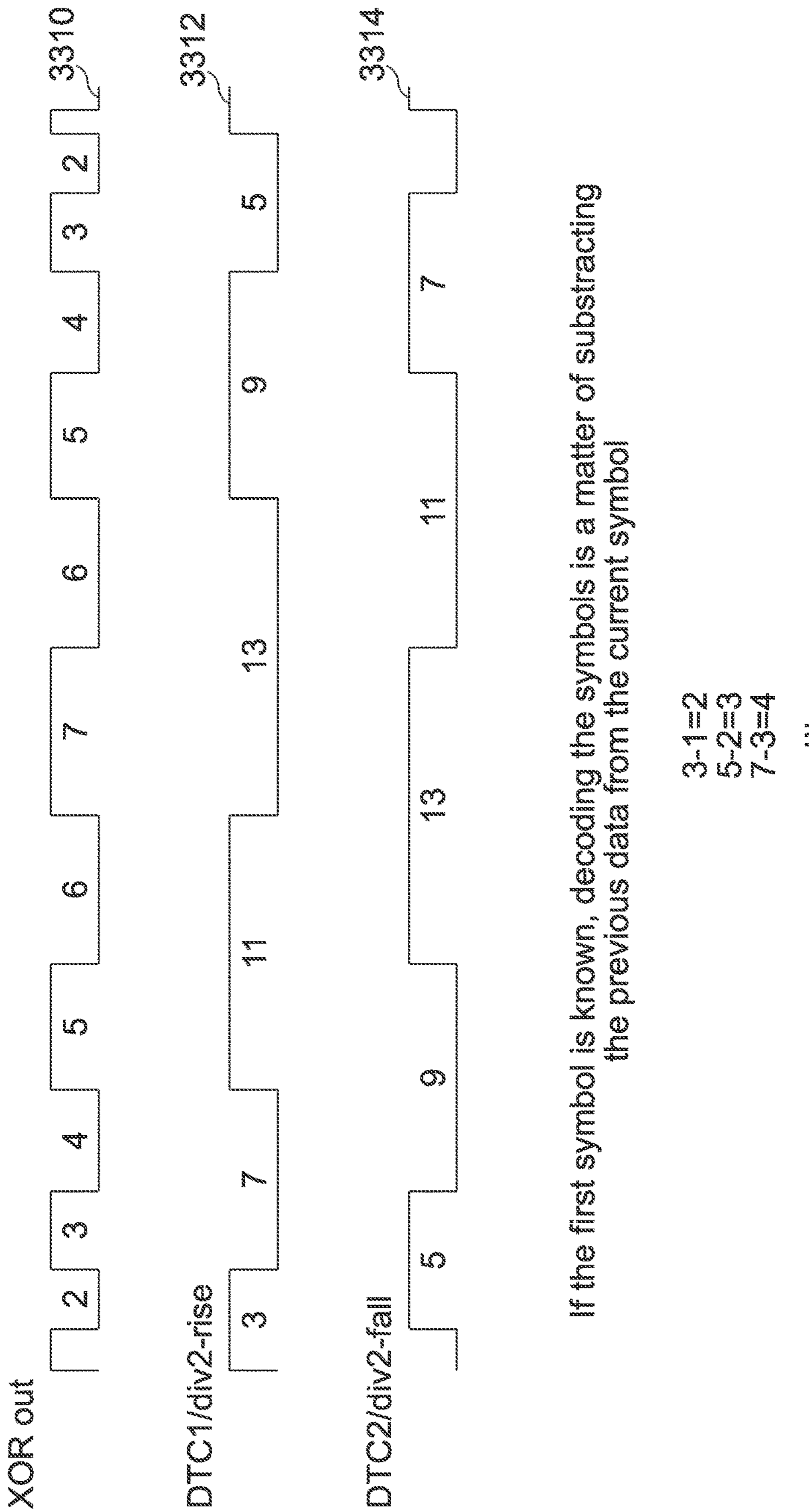
Figure 33C:
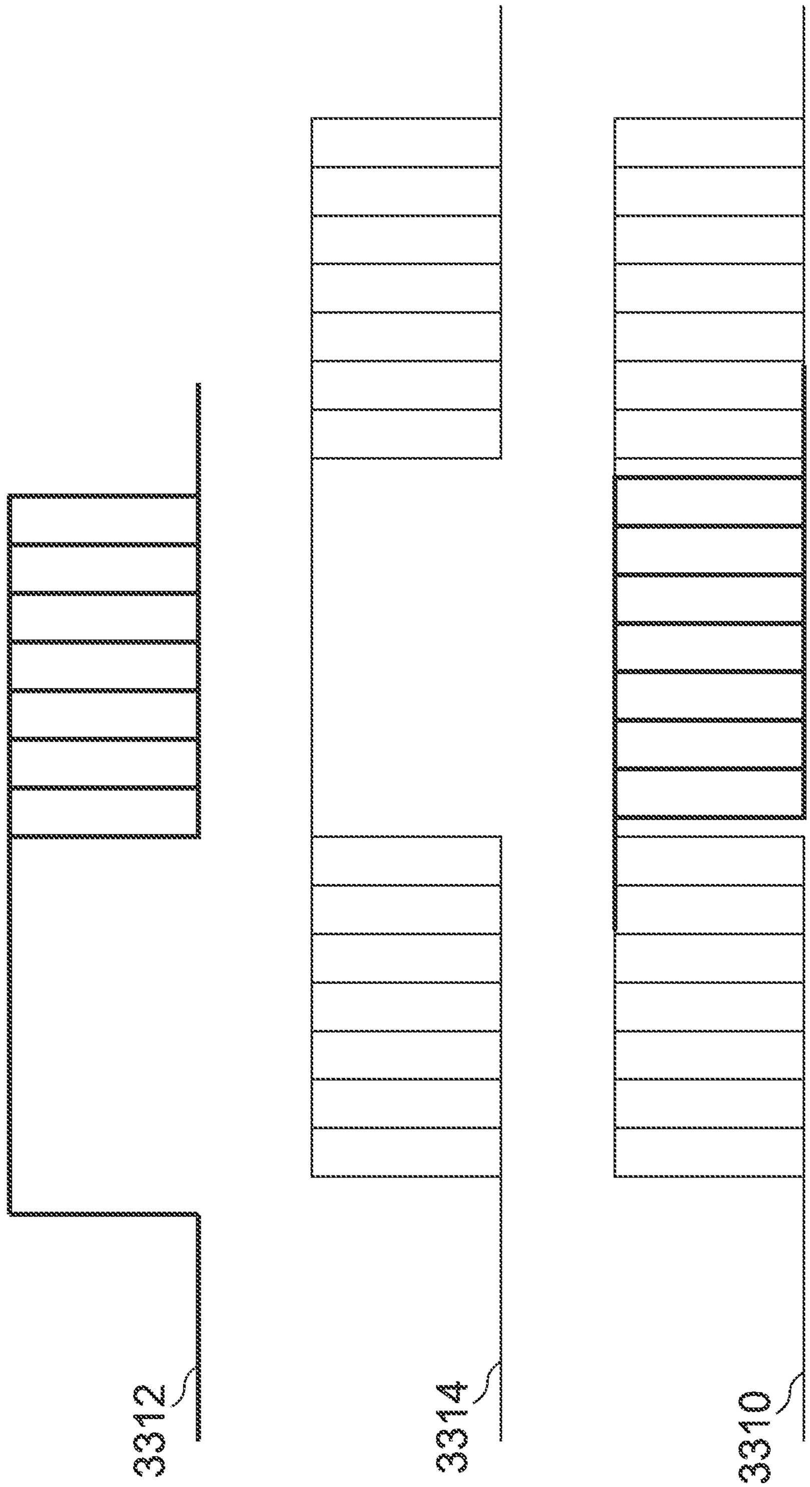
Figure 33D:
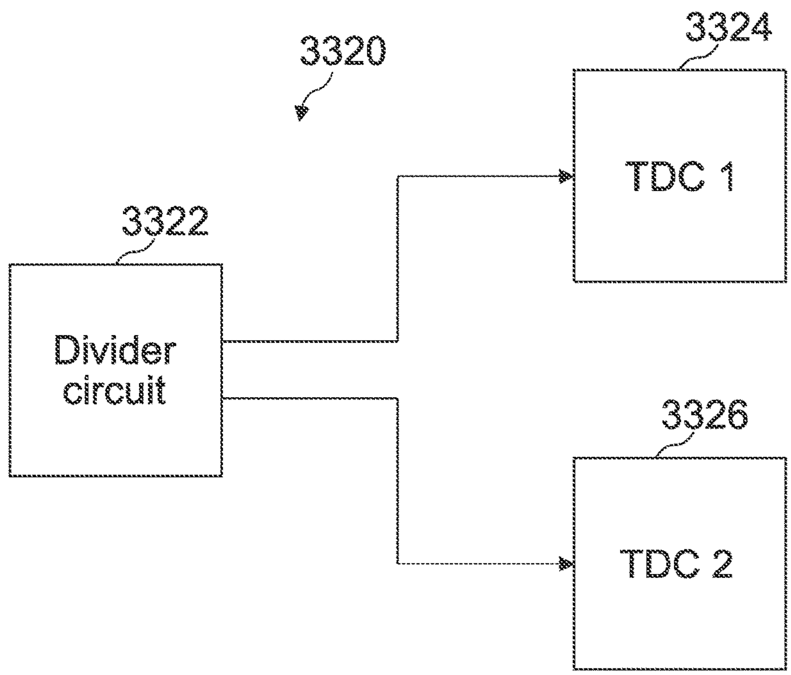
Figure 33E:
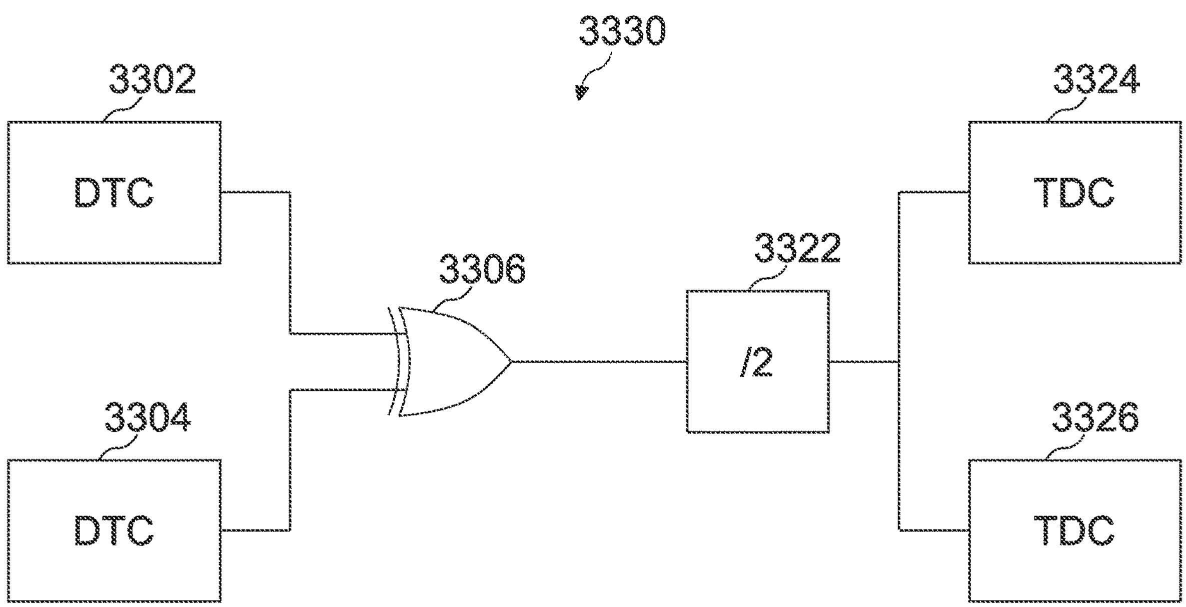
Figure 33F:
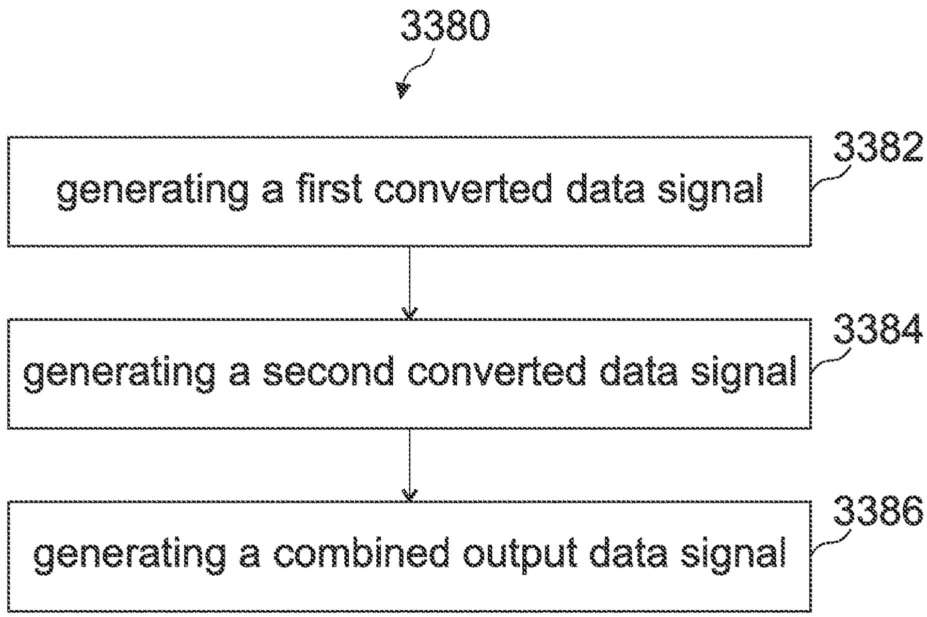
Figure 33G:
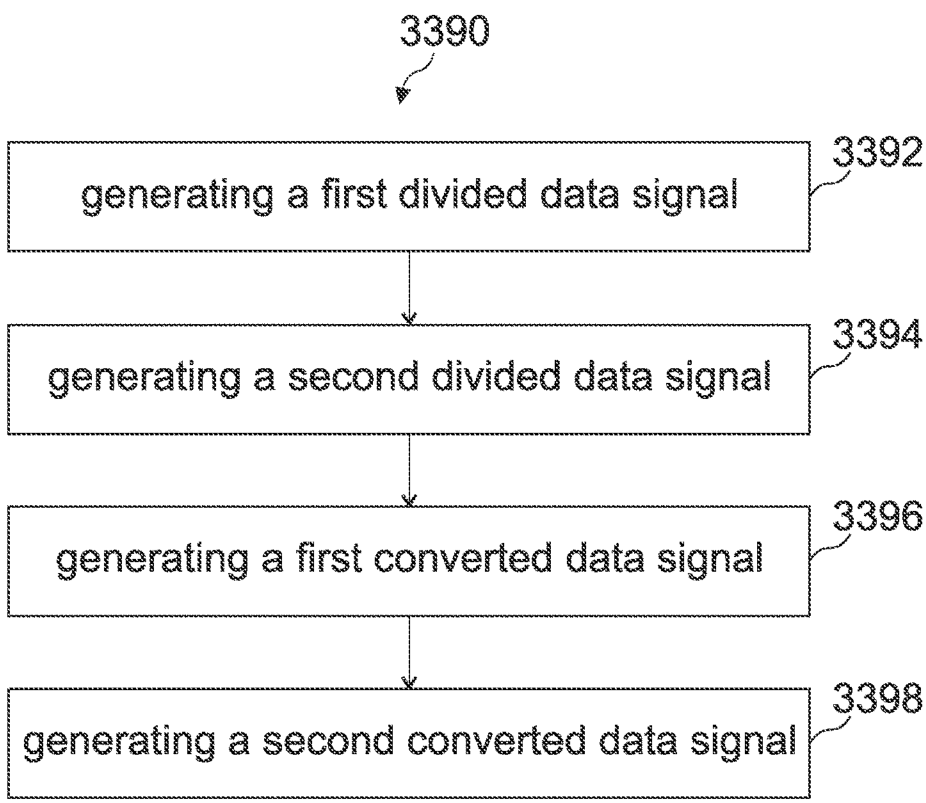
Figure 34A:
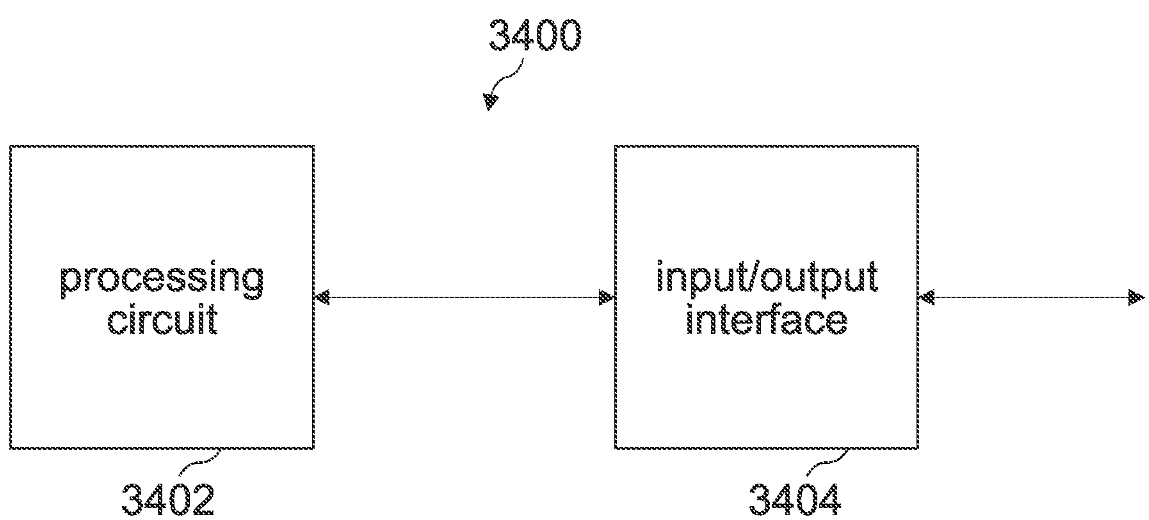
Figure 34B:
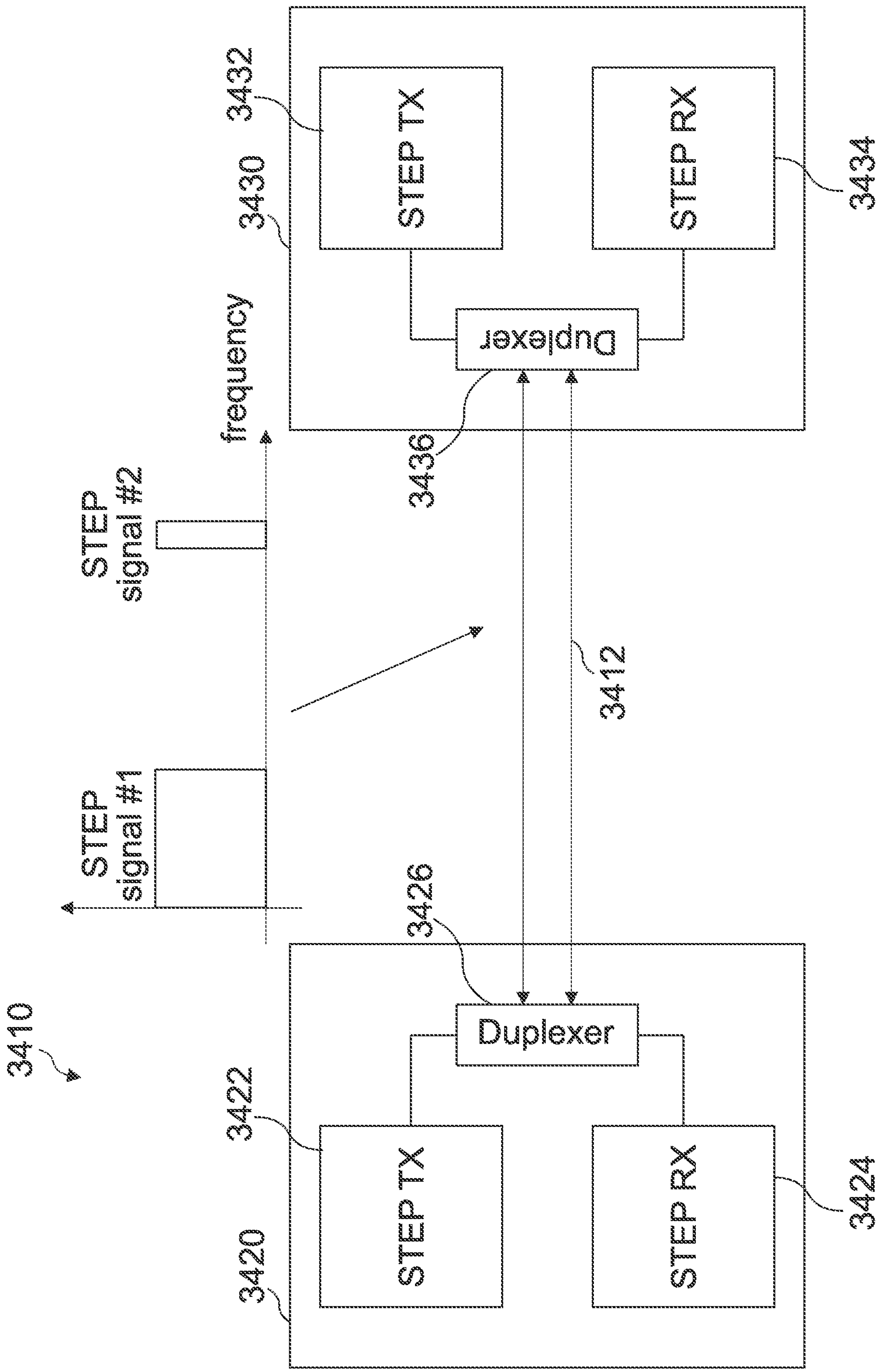
Figure 34C:
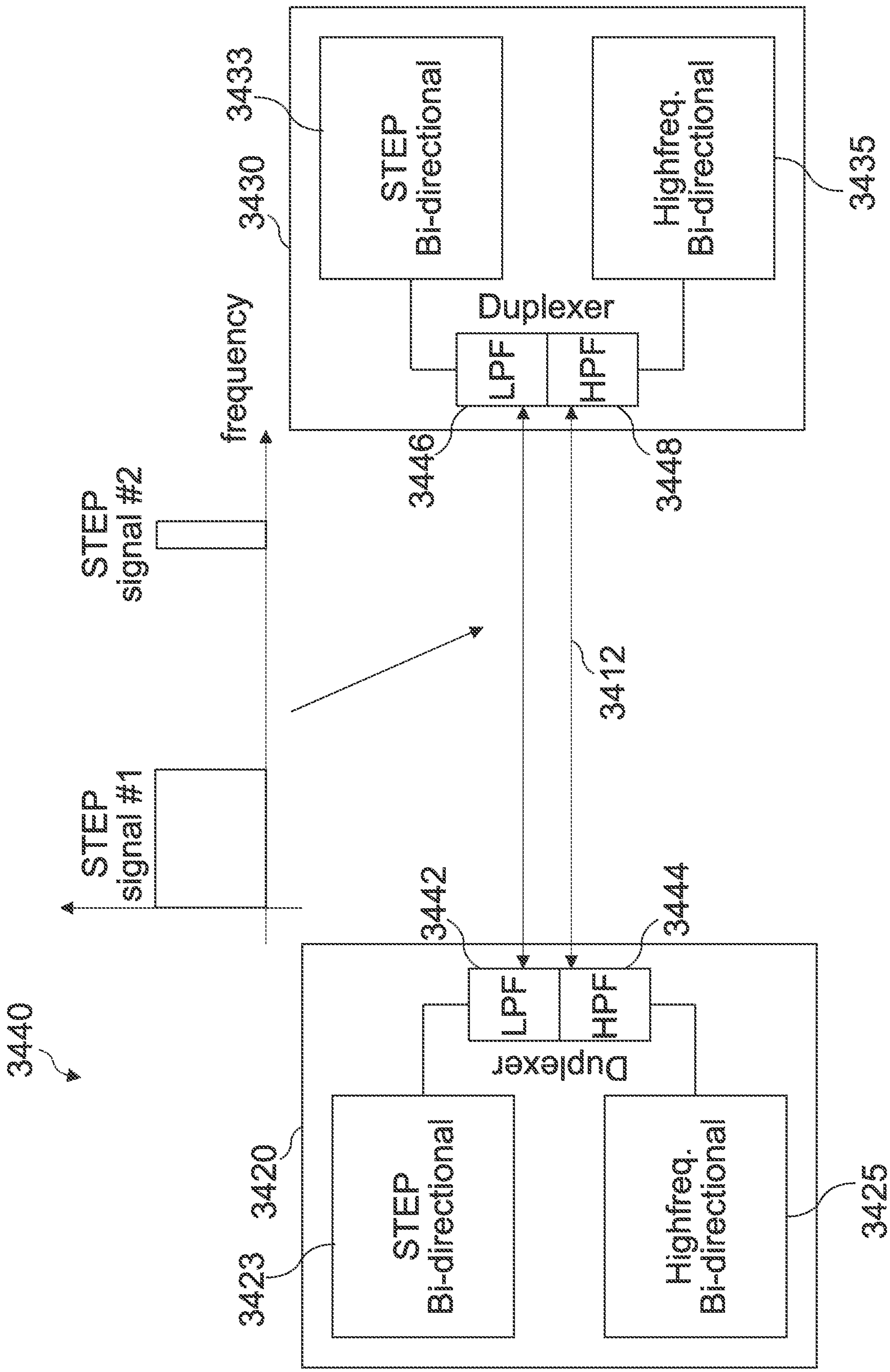
Figure 34D:
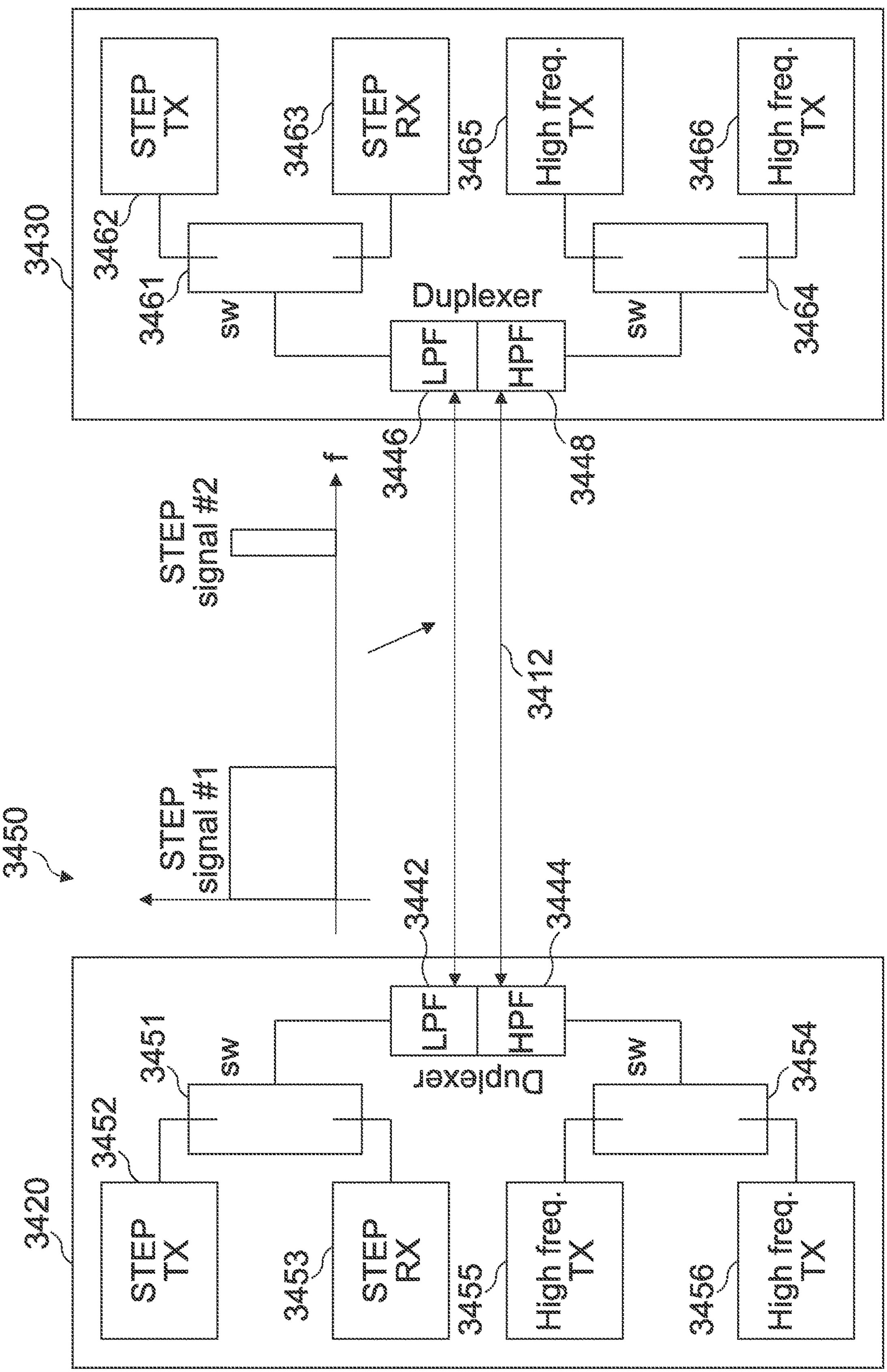
Figure 34E:
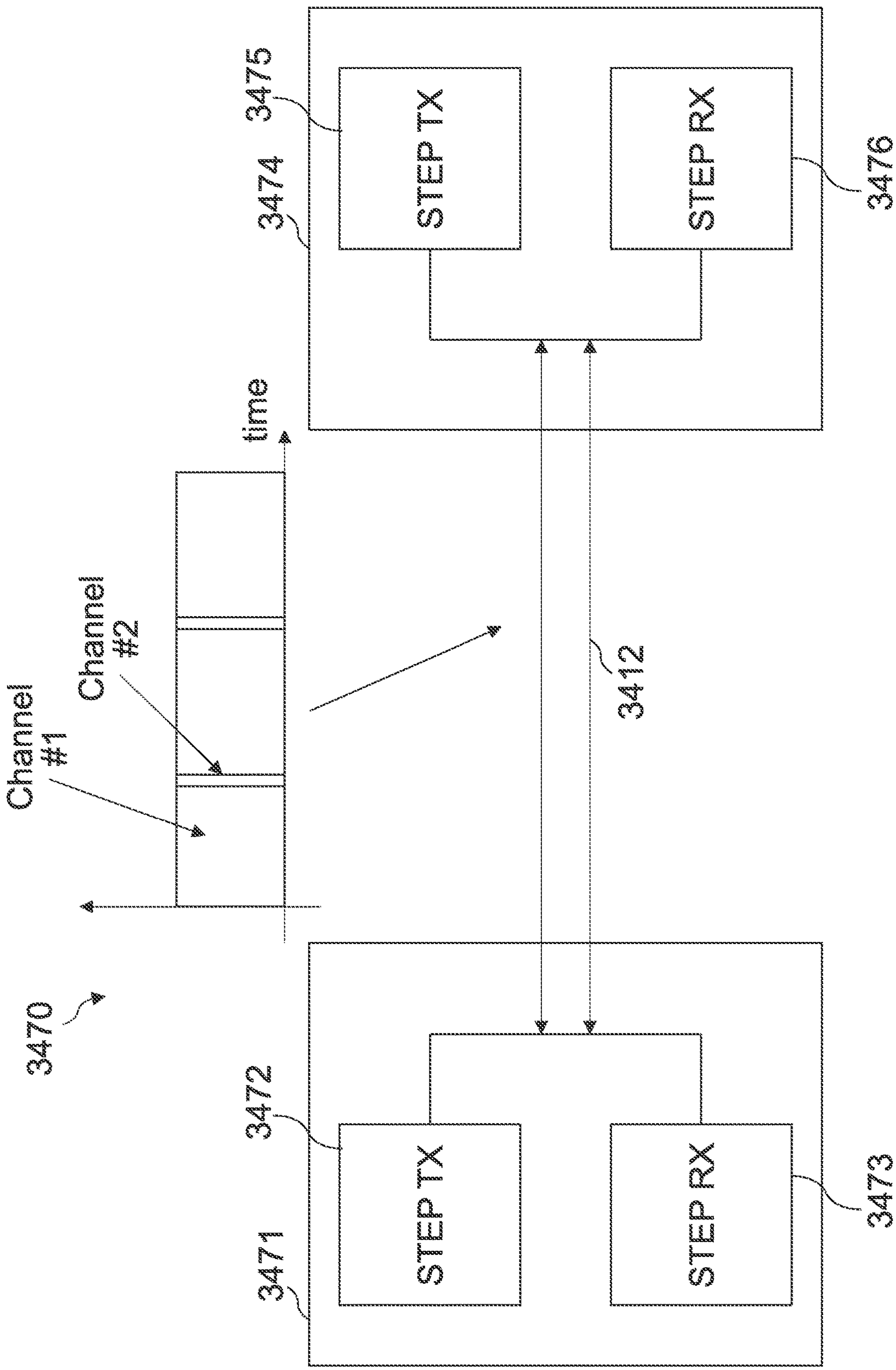
Figure 34F:
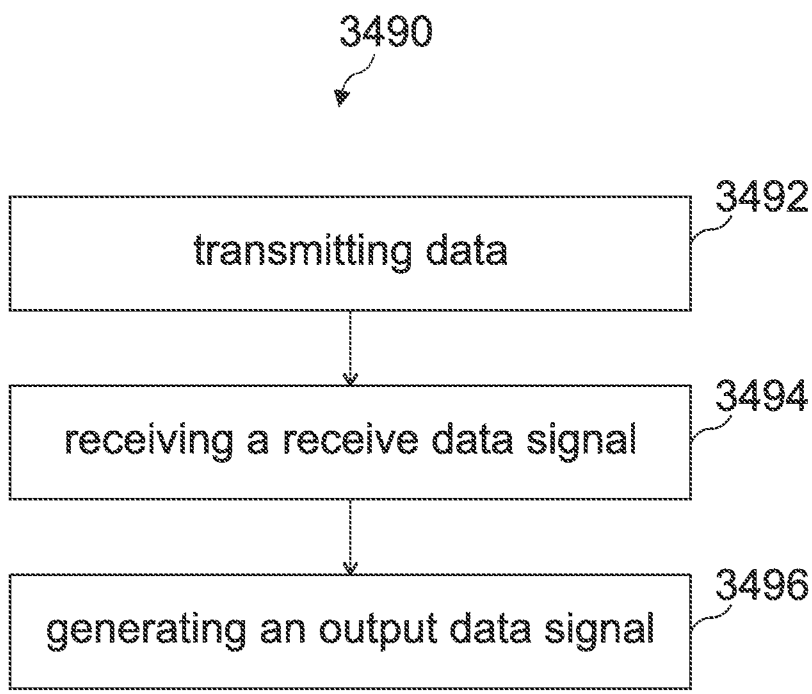
Figure 34G:
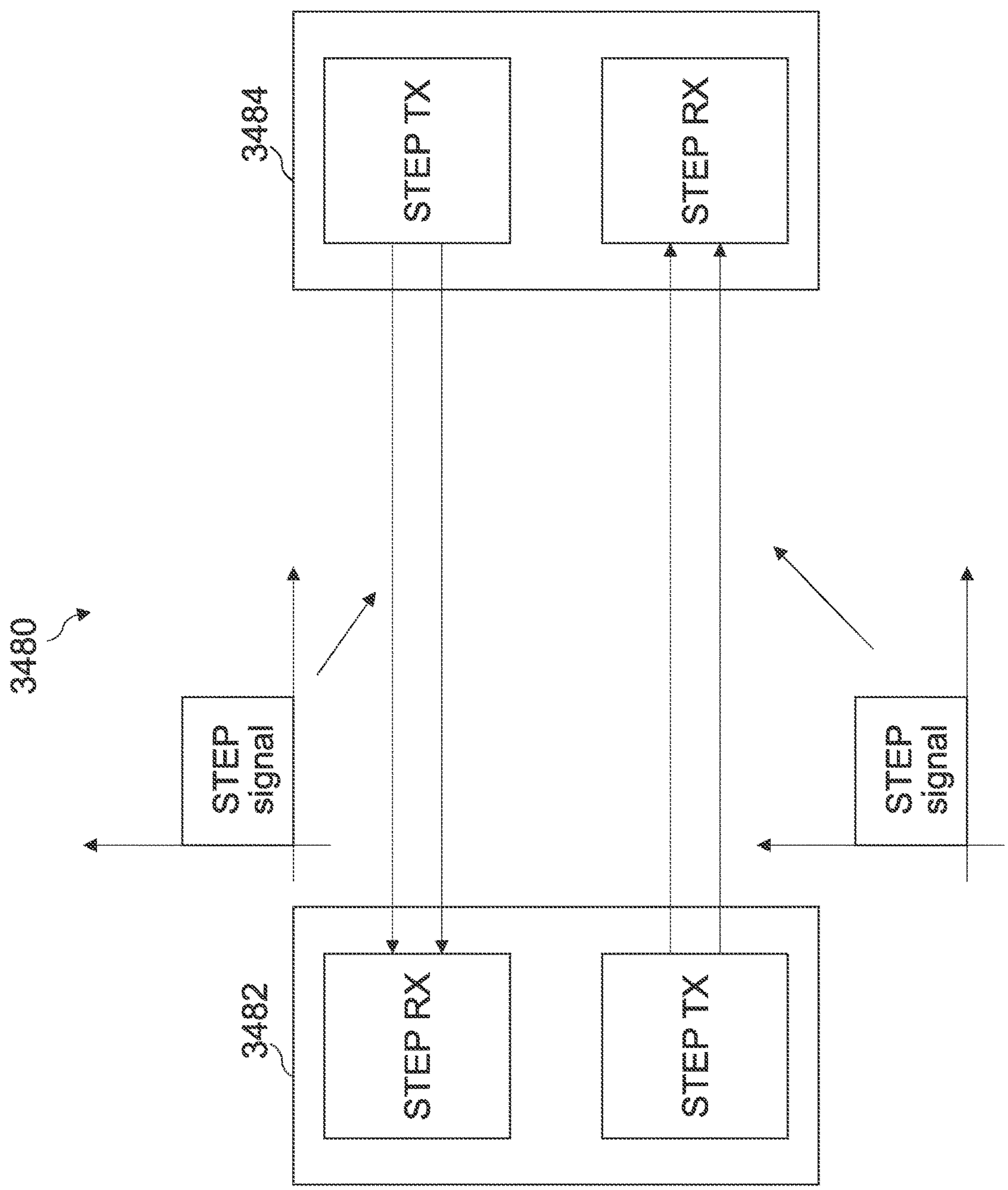
Figure 35A:
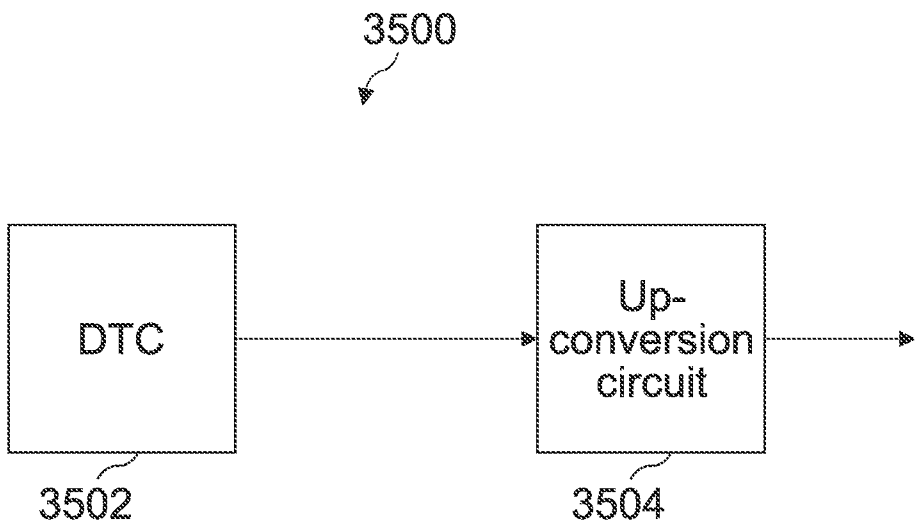
Figure 35B:
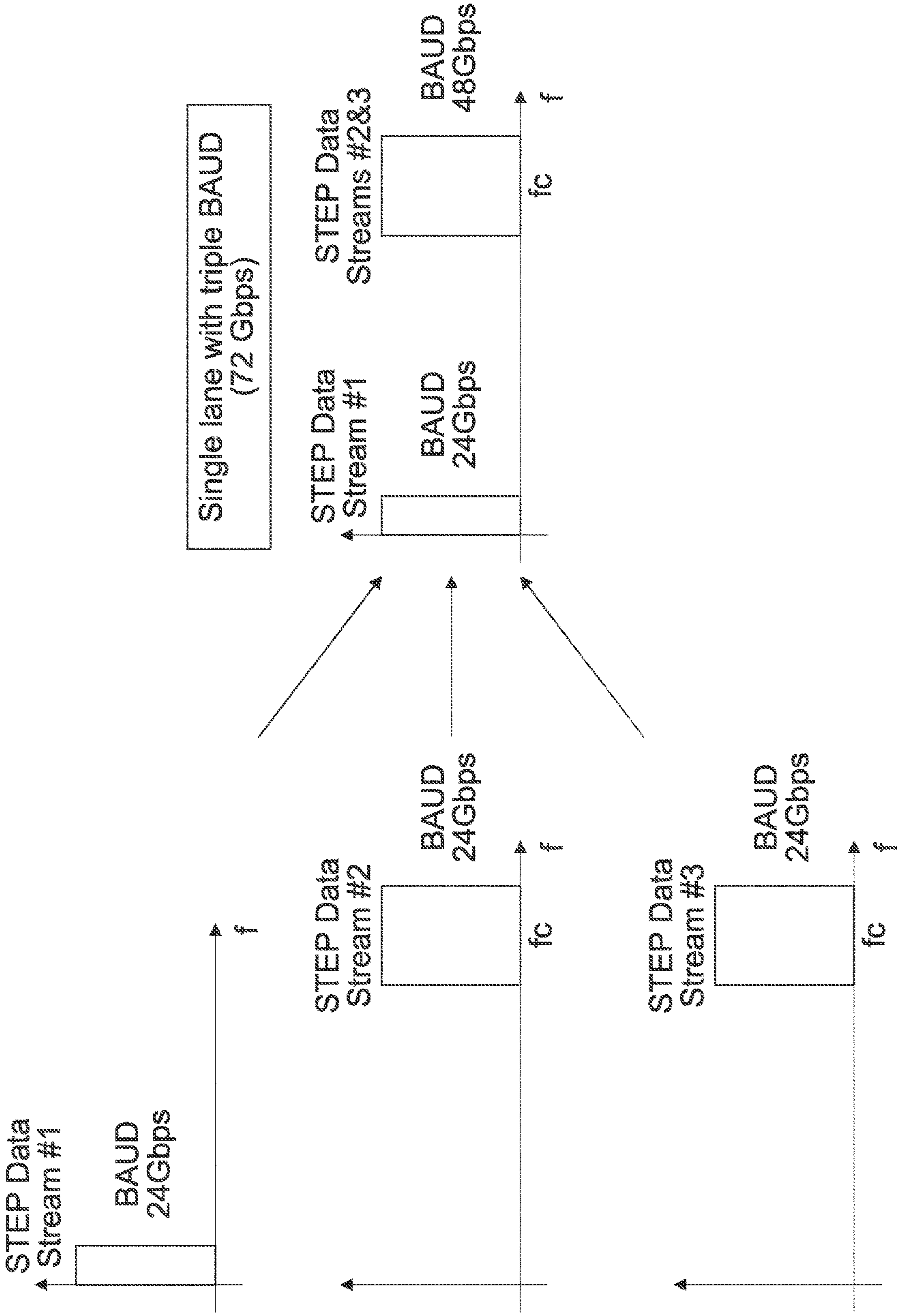
Figure 35C:
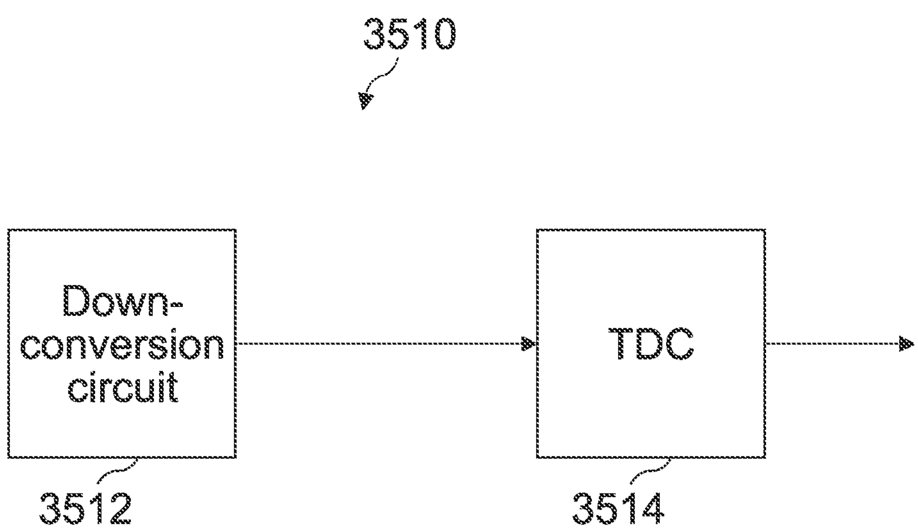
Figures 1, 35D:
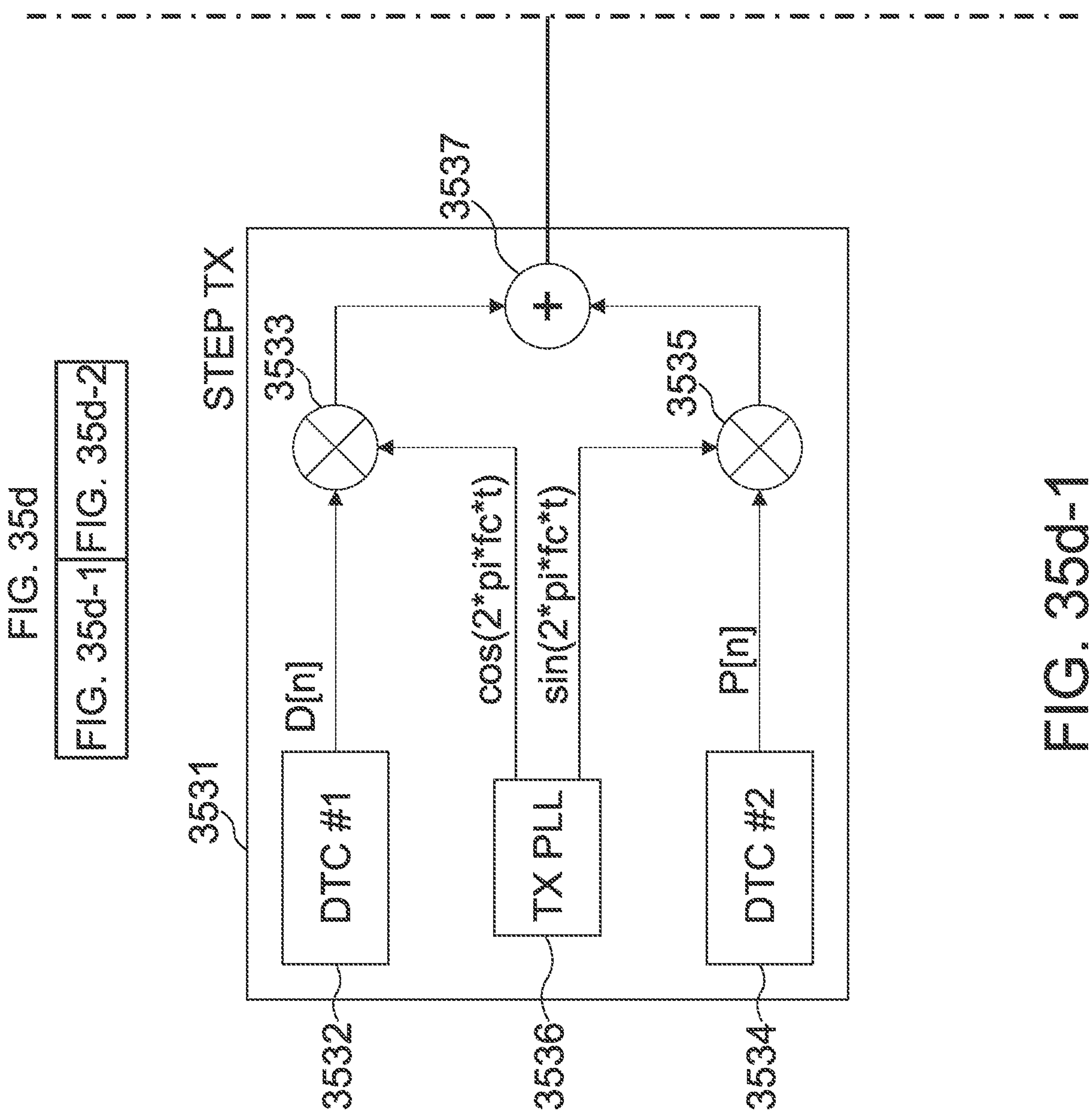
Figures 2, 35D:
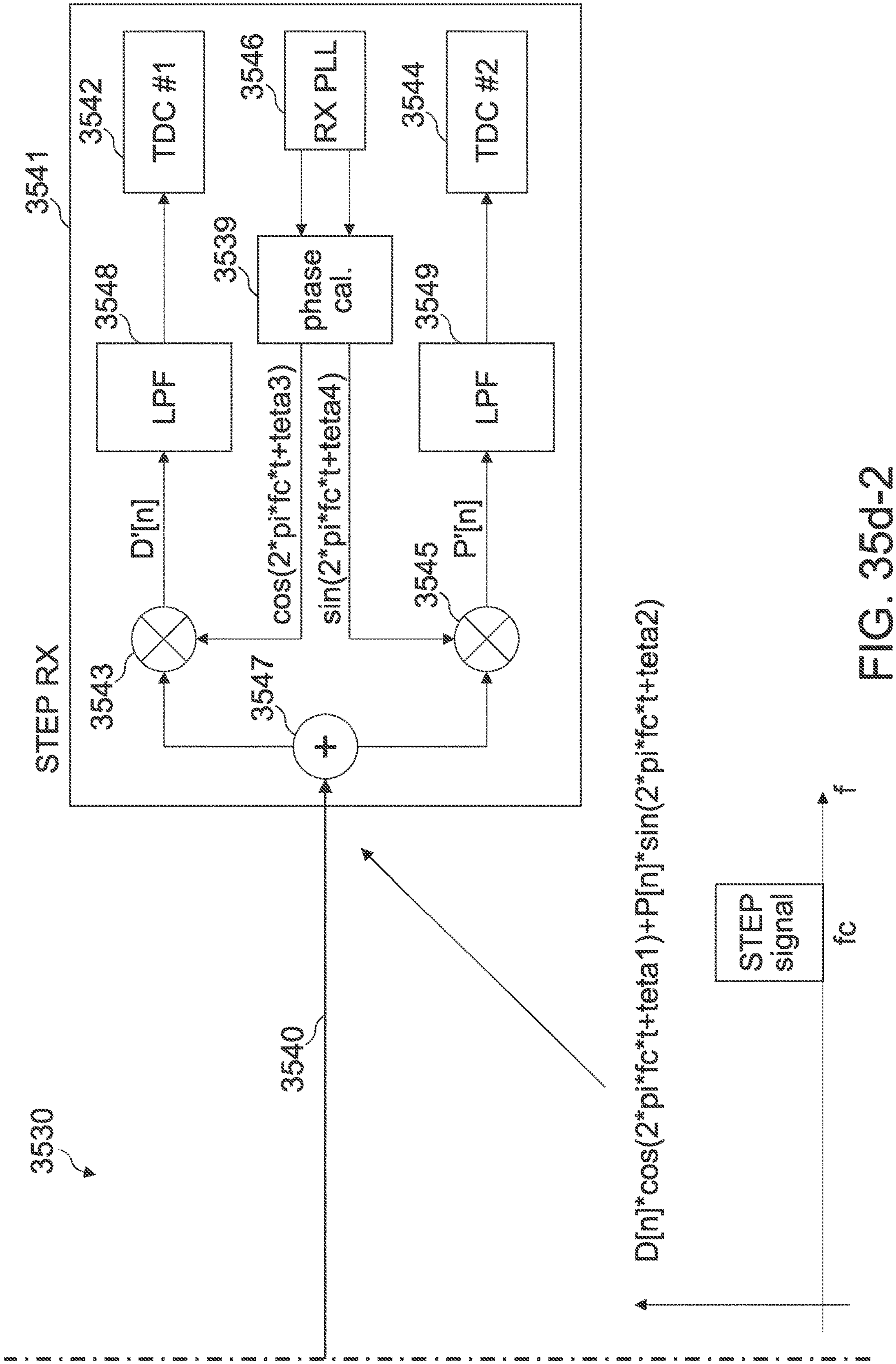
Figures 2, 35E:
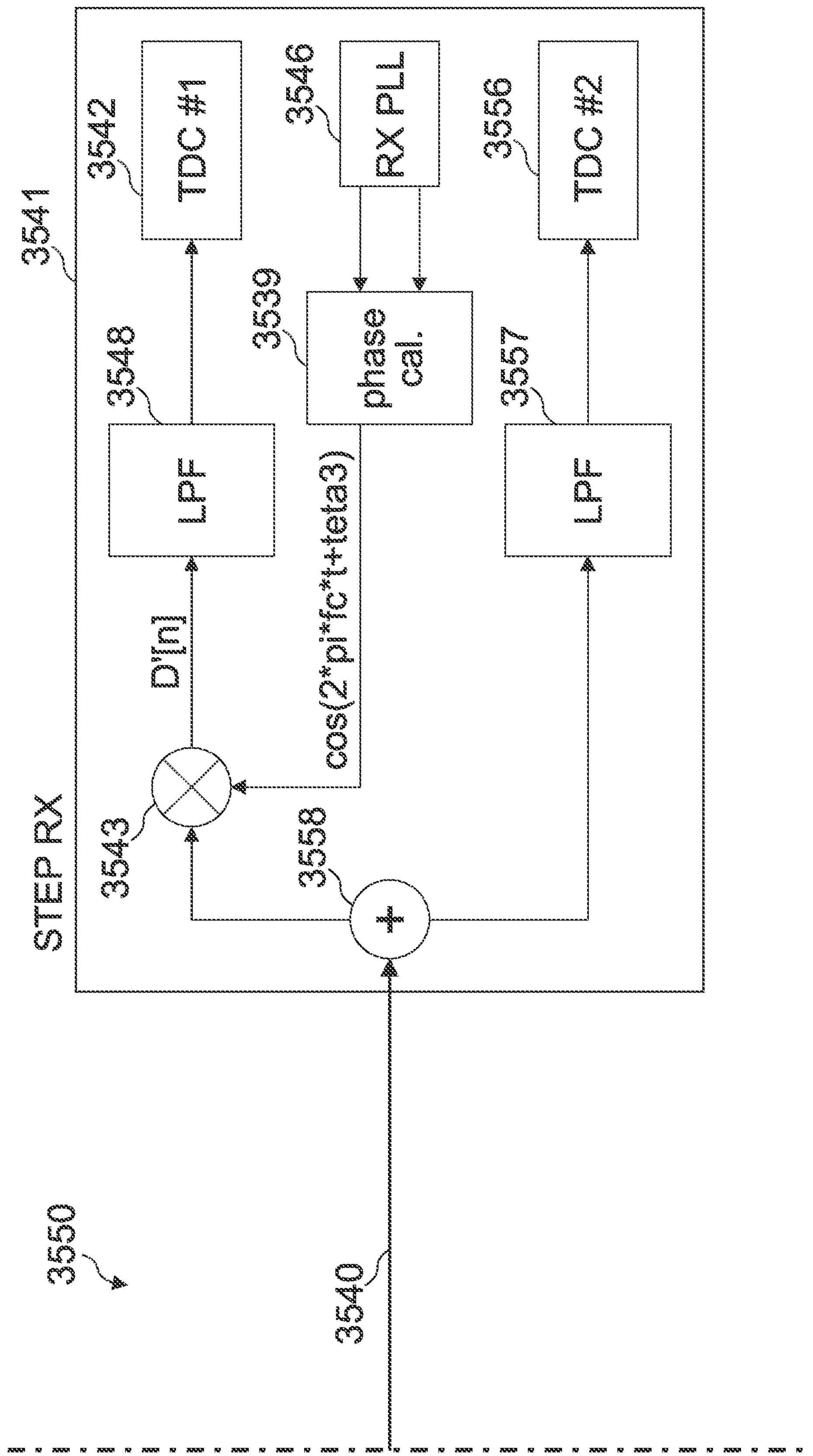
Figures 1, 35F:
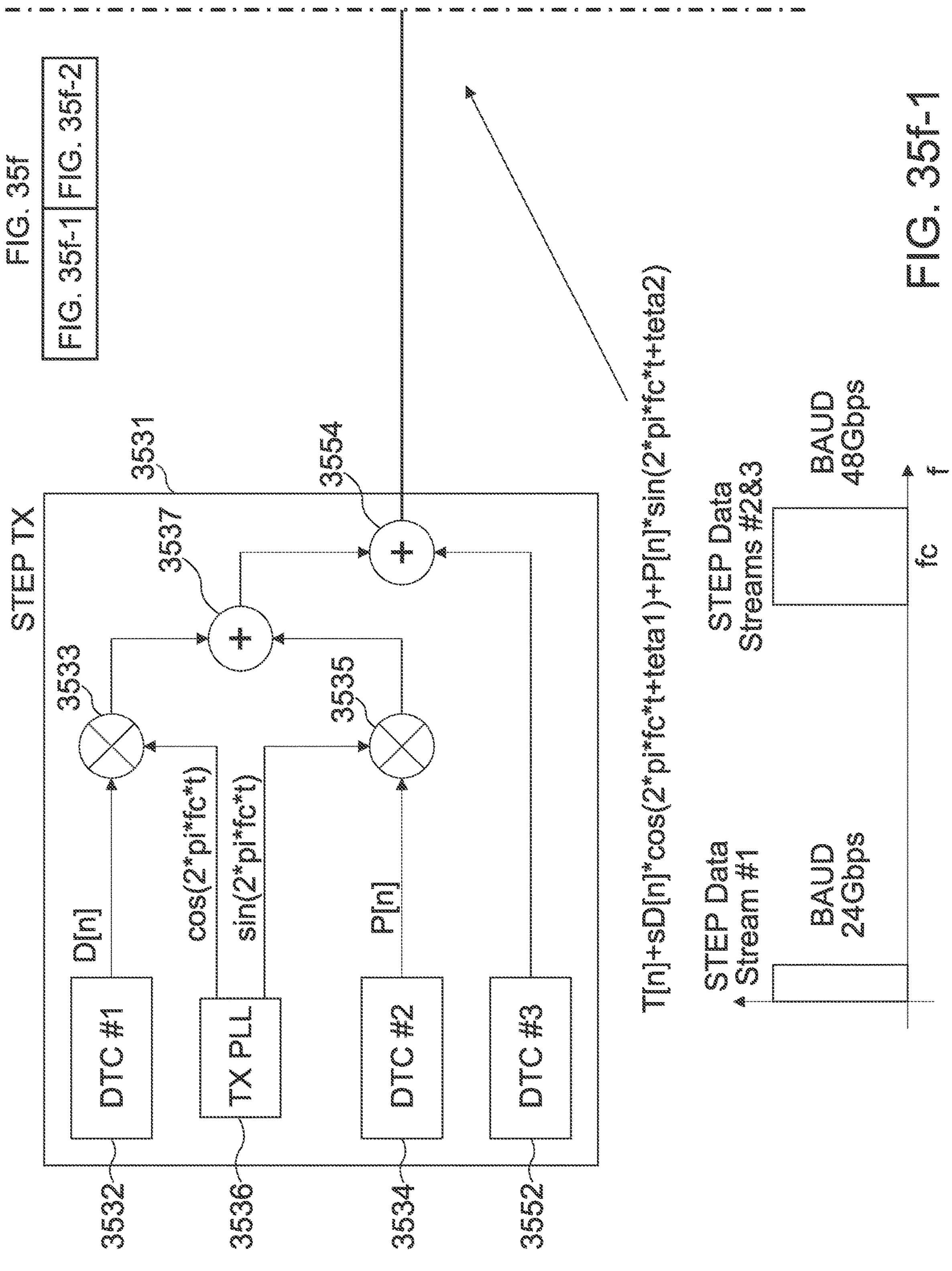
Figures 2, 35F:
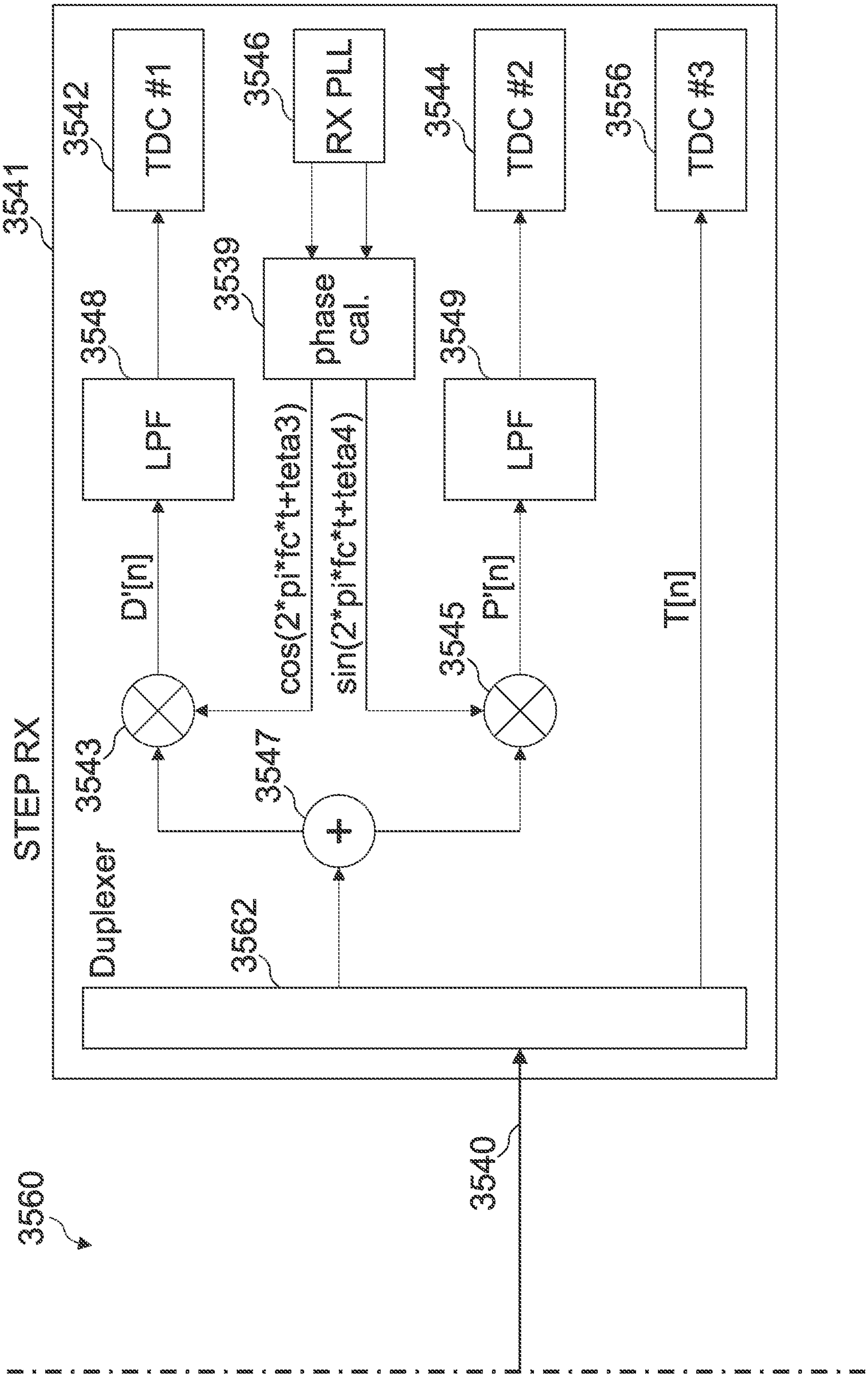
Figure 35G:
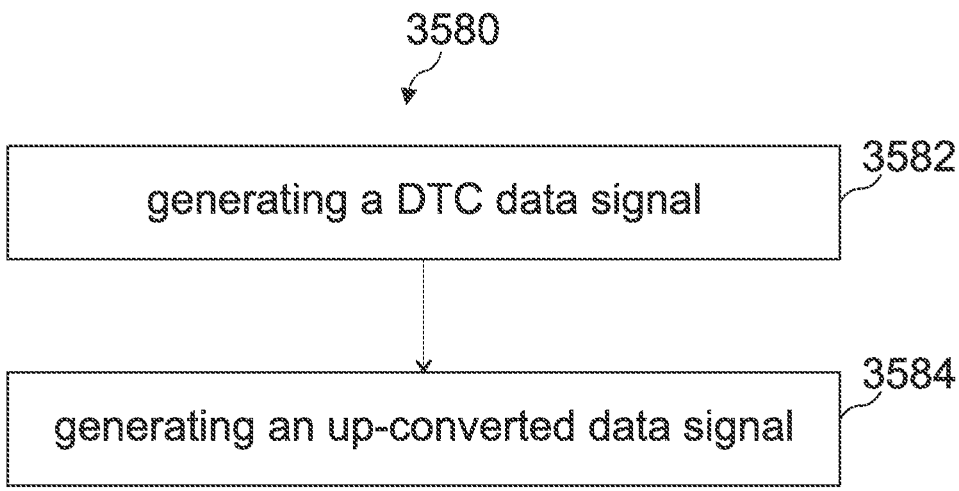
Figure 35H:
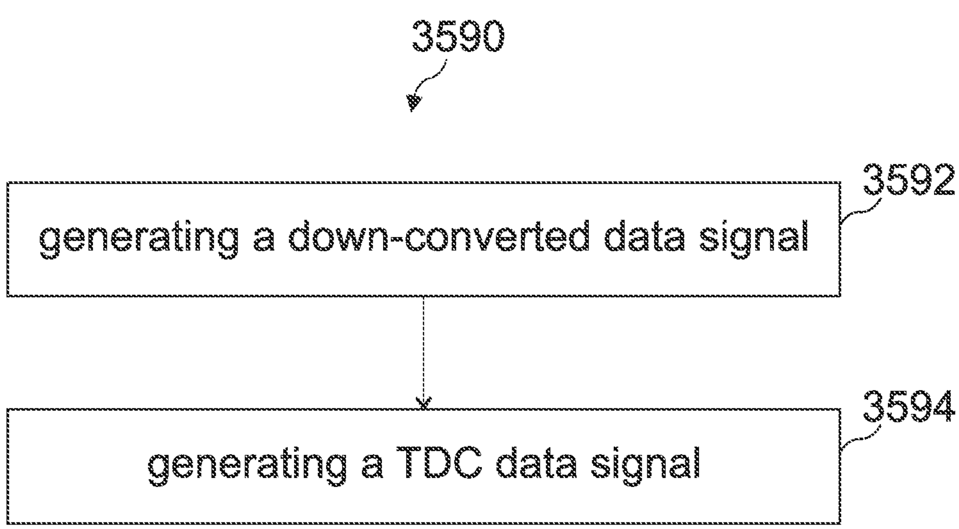
Figure 36A:
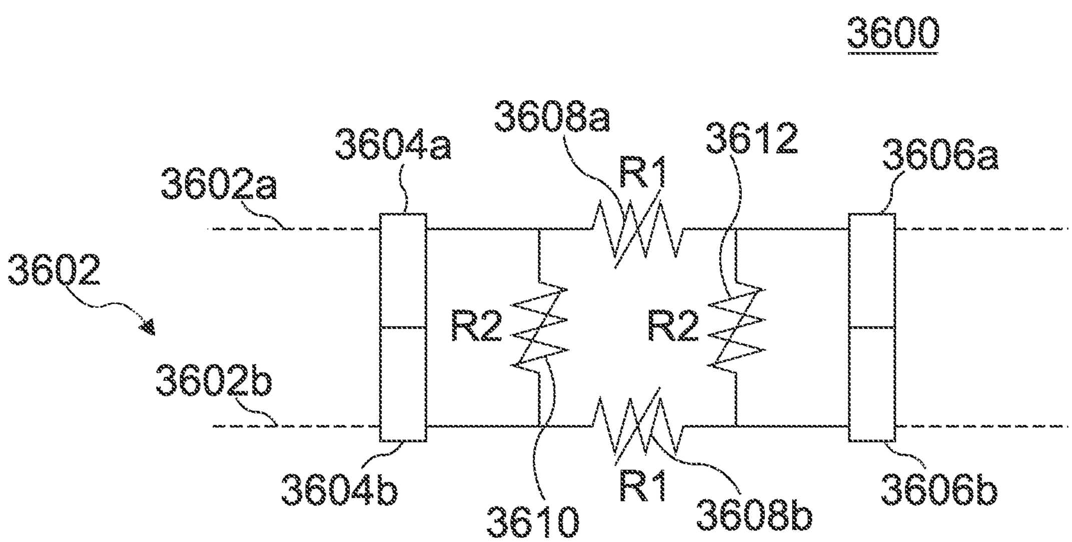
Figure 36B:
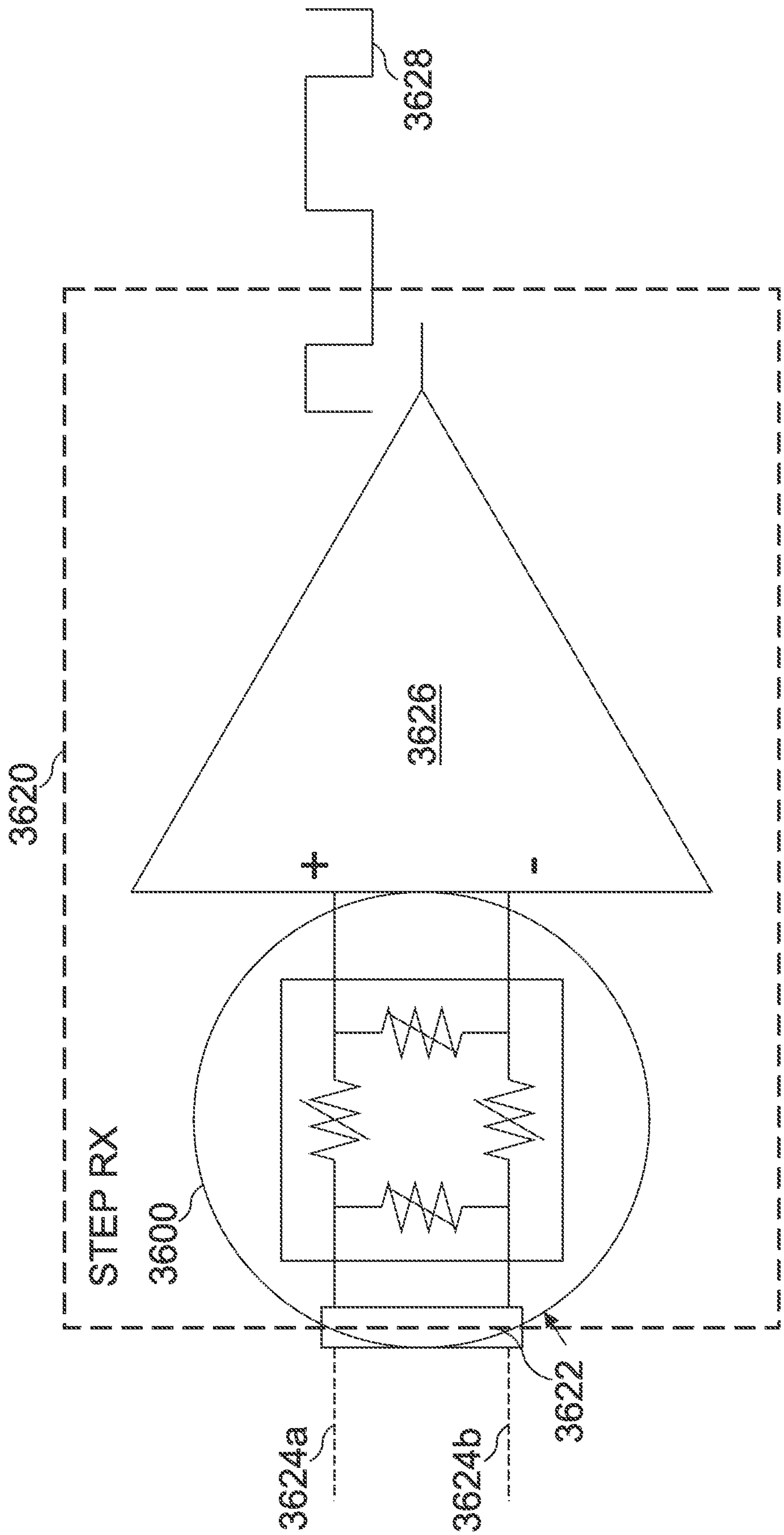
Figure 36C:
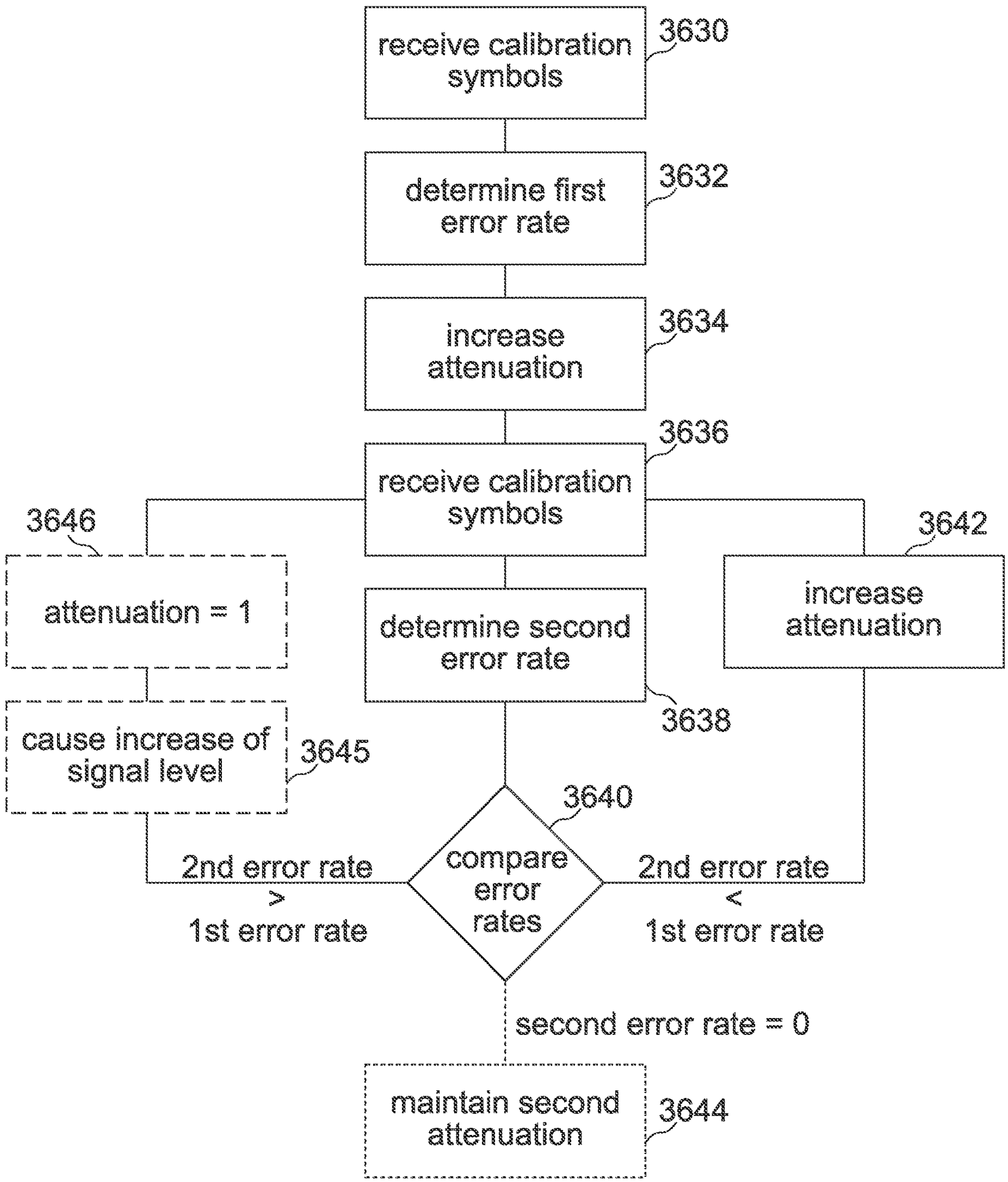
Figure 36D:
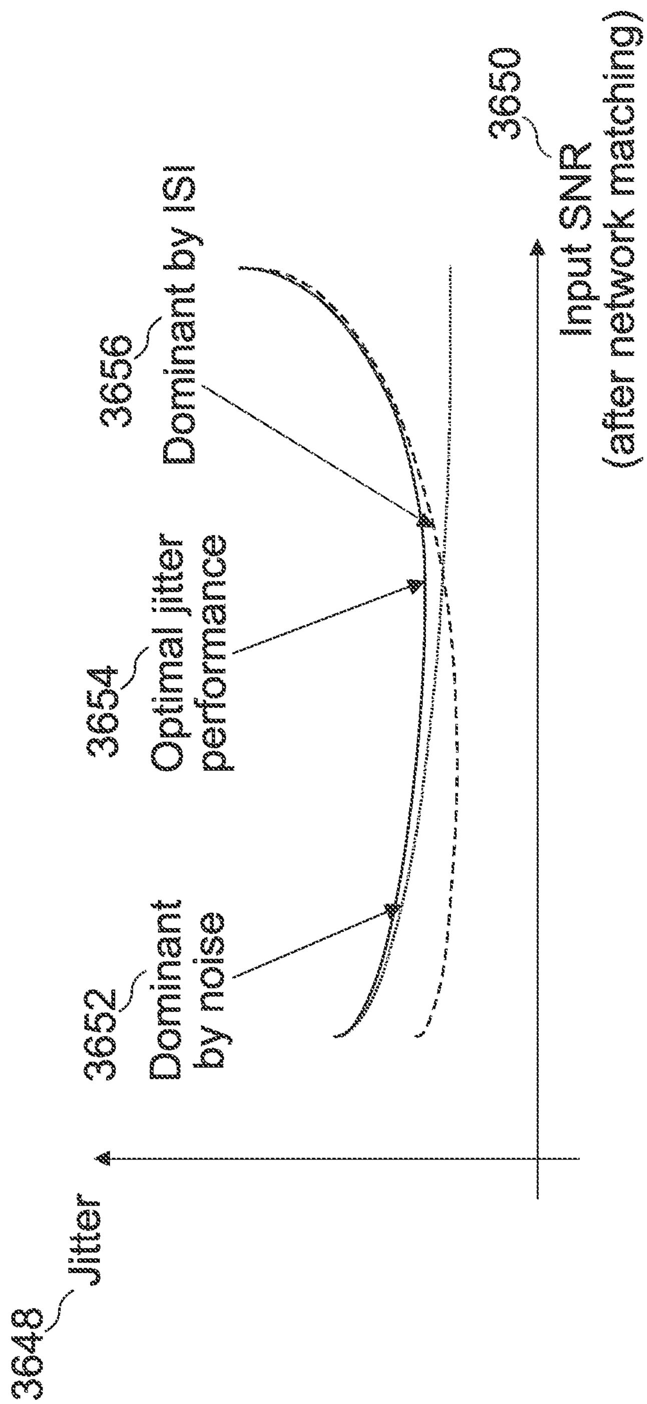

FIG. 22*d* illustrates another example of a current-mode logic to complementary metal-oxide-semiconductor conversion circuit;

FIG. 22*e*, broken into partial views 22*e*-1 and 22*e*-2, illustrates another example of a communication apparatus;

FIG. 23*a* illustrates an example of a digital-to-time converter;

FIG. 23*b* illustrates another example of a digital-to-time converter;

FIG. 23*c* illustrates still another example of a digital-to-time converter;

FIG. 23*d* illustrates a further example of a digital-to-time converter;

FIG. 23*e* illustrates an example of an apparatus for generating a data signal;

FIG. 24*a* illustrates another example of a digital-to-time converter;

FIG. 24*b* illustrates a relation between an oscillation signal and a data signal;

FIG. 25*a* illustrates an example of a current profile of a time-to-digital-converter;

FIG. 25*b* illustrates an exemplary temporal course of a supply voltage;

FIG. 25*c* illustrates an example of an apparatus for regulating a supply voltage;

FIG. 25*d* illustrates another exemplary temporal course of a supply voltage;

FIG. 25*e* illustrates another example of an apparatus for regulating a supply voltage;

FIG. 25*f* illustrates a further example of an apparatus for regulating a supply voltage;

FIG. 25*g* illustrates an example of a communication apparatus;

FIG. 25*h* illustrates another example of a communication apparatus;

FIG. 25*i* illustrates a flowchart of an example of a method for regulating a supply voltage;

FIG. 25*j* illustrates a flowchart of an example of a method for communication;

FIG. 25*k* illustrates a flowchart of another example of a method for communication;

FIG. 26*a* illustrates an example of a protection circuit against electrostatic discharge;

FIG. 26*b* illustrates an example of a receiver for a differential data signal;

FIG. 26*c* illustrates an example of an apparatus for receiving a differential data signal;

FIG. 27*a* shows a block diagram of a radio head RH system;

FIG. 27*b* shows a block diagram of an apparatus for generating an amplified high frequency transmit signal;

FIG. 27*c*, broken into partial views 27*c*-1 to 27*c*-4, shows a block diagram of a radio frequency electromagnetic RFEM module with transmitter TX digital pre-distortion DPD over the STEP interconnect;

FIG. 27*d* shows a block diagram of a baseband processor;

FIG. 27*e* shows a flow chart of a method for generating an amplified high frequency transmit signal;

FIG. 27*f* shows a flow chart of a method for determining a pre-distortion setting;

FIG. 28*a* illustrates an example of a transmitter;

FIG. 28*b* illustrates an exemplary relation between symbol timing errors and frequency errors;

FIG. 28*c* illustrates another example of a transmitter;

FIG. 28*d* illustrates exemplary temporal courses of a frequency and a symbol rate;

FIG. 29*a* shows a block diagram of an apparatus for generating a data signal;

FIG. 29*b* shows an example of an adaptive delimiter for reference timing setting;

FIG. 29*c* shows an example of STEP timing with low reference frequency;

FIG. 29*d* shows an example of STEP timing with high reference frequency;

FIG. 29*e* shows a block diagram of an apparatus for decoding a data signal;

FIG. 29*f* shows a block diagram of a STEP system and high reference extraction;

FIG. 29*g* shows a block diagram of a mobile device;

FIG. 29*h* shows a flow chart of a method for generating a data signal;

FIG. 29*i* shows a flow chart of a method for decoding a data signal;

FIG. 30*a* shows a block diagram of an apparatus for generating a data signal;

FIG. 30*b* shows an example of using 2 output levels;

FIG. 30*c* shows an example of using 3 output levels;

FIG. 30*d* shows a block diagram of an apparatus for decoding a data signal;

FIG. 30*e* shows a block diagram of an apparatus for generating a pair of data signals;

FIG. 30*f* shows an example of data signals;

FIG. 30*g* shows a block diagram of an apparatus for receiving a pair of data signals;

FIG. 30*h* shows a flow chart of a method for generating a data signal;

FIG. 30*i* shows a flow chart of a method for decoding a data signal;

FIG. 30*j* shows a flow chart of a method for generating a pair of data signals;

FIG. 30*k* shows a flow chart of a method for receiving a pair of data signals;

FIG. 31*a* shows a block diagram of an apparatus for generating data signals;

FIG. 31*b* shows an example of a set of three data signals;

FIG. 31*c*, broken into partial views 31*c*-1 and 31*c*-2, shows an example of a set of three transmission lines between a transmitter and a receiver;

FIG. 31*d* shows a block diagram of an apparatus for receiving data signals;

FIG. 31*e* shows a block diagram of a receiver;

FIG. 31*f* shows a flow chart of a method for generating data signals;

FIG. 31*g* shows a flow chart of a method for receiving data signals;

FIG. 32*a* illustrates an example of a communication system;

FIG. 32*b* illustrates an example of an apparatus for generating output data;

FIG. 32*c* illustrates an example of a first resolution of a time-to-digital converter;

FIG. 32*d* illustrates an example of a second resolution of a time-to-digital converter;

FIG. 32*e* illustrates an example of a relation between an input data signal and quantization levels of a time-to-digital converter;

FIG. 32*f* illustrates an example of a time-to-digital converter;

FIG. 32*g* illustrates an example of an un-calibrated time-to-digital converter;

FIG. 32*h* illustrates an example of a histogram;

FIG. 32*i* illustrates an example of a calibrated time-to-digital converter;

FIG. 32*j* illustrates another example of a communication system;

FIG. 32*k* illustrates a flowchart of an example of a method for generating output data;

FIG. 33*a* shows a block diagram of an apparatus for generating an output data signal;

FIG. 33*b* shows an example of DTC output signals and an XOR output signal;

FIG. 33*c* shows another example of DTC output signals and an XOR output signal;

FIG. 33*d* shows a block diagram of an apparatus for generating data signals;

FIG. 33*e* shows a STEP connection using an interleaved data signal;

FIG. 33*f* shows a flow chart of a method for generating an output data signal;

FIG. 33*g* shows a flow chart of a method for generating data signals;

FIG. 34*a* shows a block diagram of an apparatus for generating data signals;

FIG. 34*b* shows a block diagram of a STEP system using FDD;

FIG. 34*c* shows a block diagram of another STEP system using FDD;

FIG. 34*d* shows a block diagram of another STEP system using FDD;

FIG. 34*e* shows a block diagram of a STEP system using TDD;

FIG. 34*f* shows a flow chart of a method for generating output data;

FIG. 34*g* shows a block diagram of a STEP system;

FIG. 35*a* shows a block diagram of an apparatus for generating a data signal;

FIG. 35*b* shows a schematic band diagram of multiple STEP streams over a single lane;

FIG. 35*c* shows a block diagram of an apparatus for generating data signals;

FIG. 35*d*, broken into partial views 35*d*-1 and 35*d*-2, shows a block diagram of a STEP system using orthogonal STEP streams over a single lane and a single carrier;

FIG. 35*e*, broken into partial views 35*e*-1 and 35*e*-2, shows a block diagram of a STEP system using a baseband STEP stream and a high frequency STEP stream for transmission over a single transmission line;

FIG. 35*f*, broken into partial views 35*f*-1 and 35*f*-2, shows a block diagram of a STEP system using a baseband STEP stream and orthogonal high frequency STEP streams for transmission over a single transmission line;

FIG. 35*g* shows a flow chart of a method for generating output data;

FIG. 35*h* shows a flow chart of another method for generating output data;

FIG. 36*a* illustrates an example of adaption circuitry for data signals;

FIG. 36*b* illustrates an example of a receiver for data signals;

FIG. 36*c* illustrates a flowchart of an example of a method for determining an attenuation level;

FIG. 36*d* illustrates an example for degradation of Jitter using an example of adaption circuitry illustrated in FIG. 36*a;*

Figure 36E:
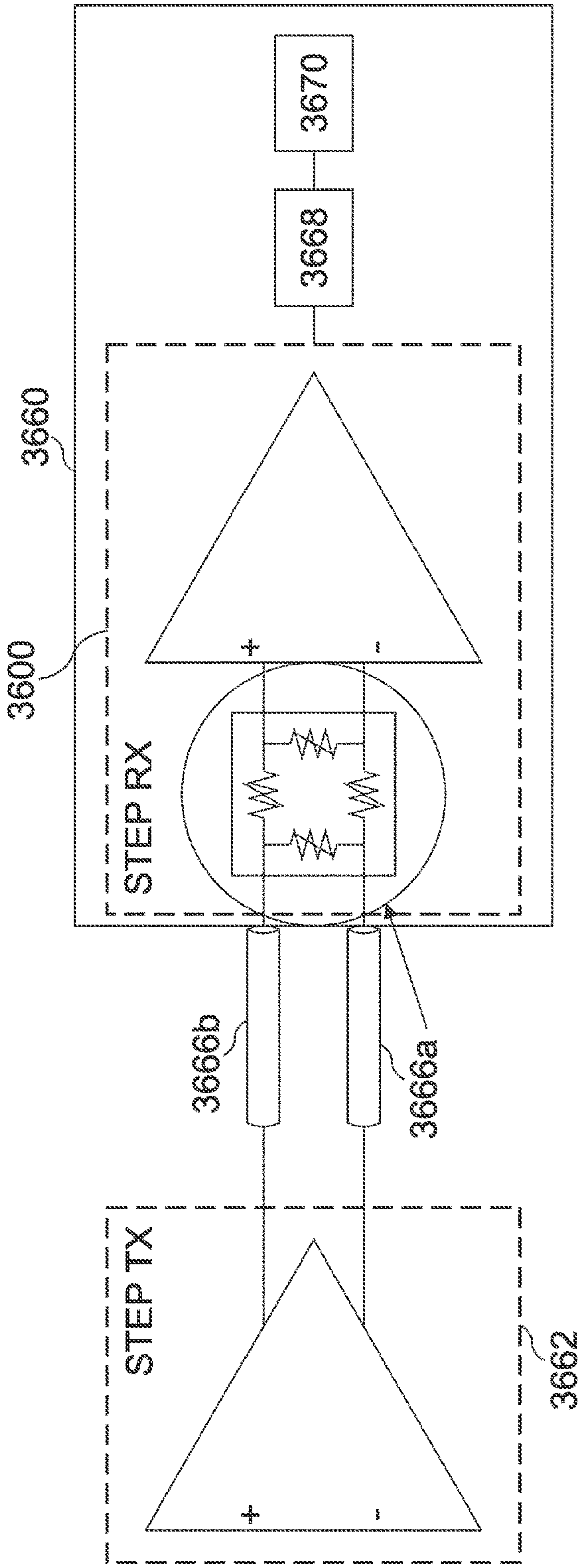
Figure 36F:
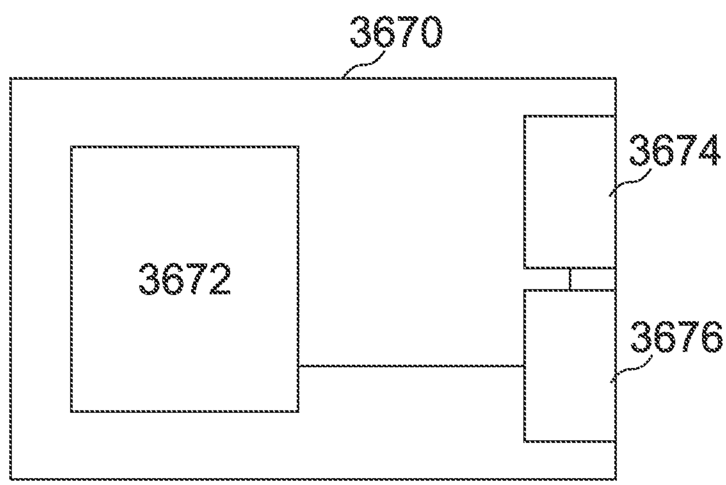
Figure 37A:
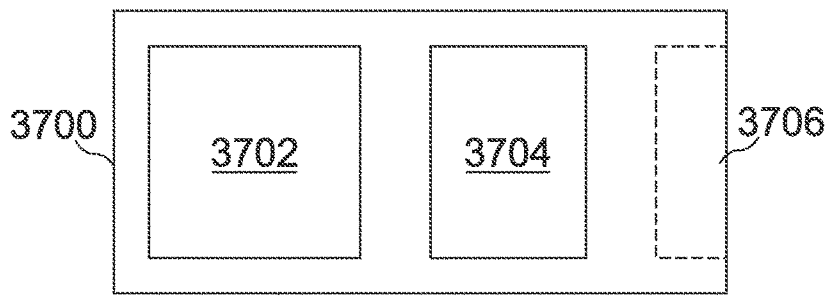
Figure 37B:
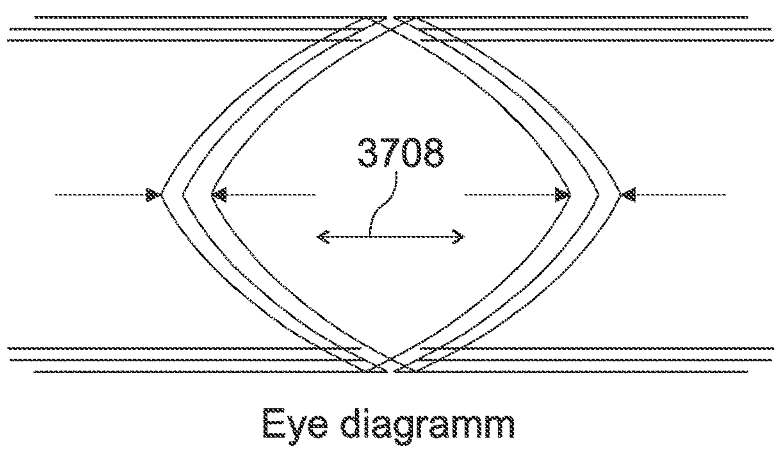
Figure 37C:
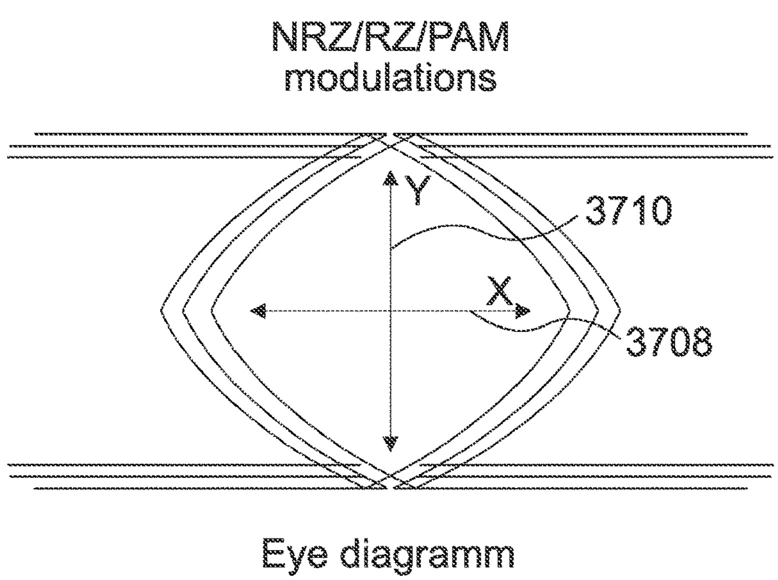
Figure 37D:
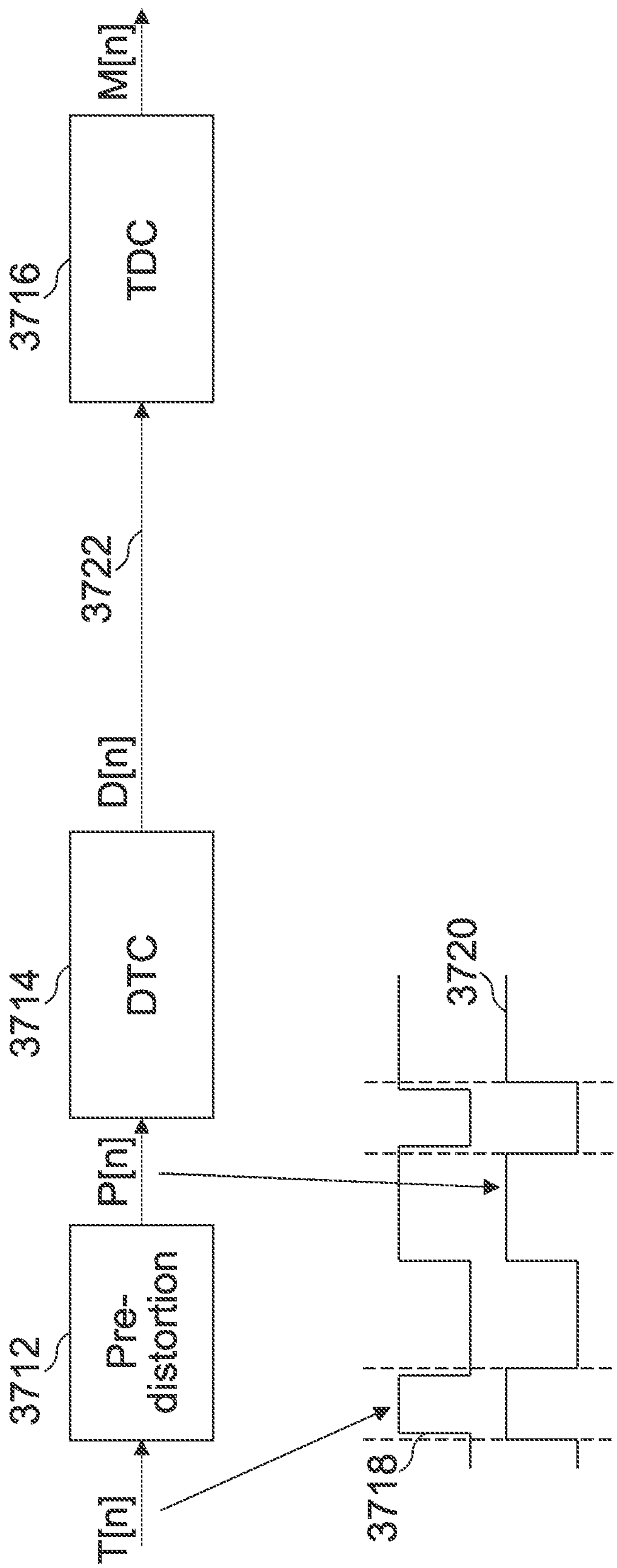
Figure 37E:
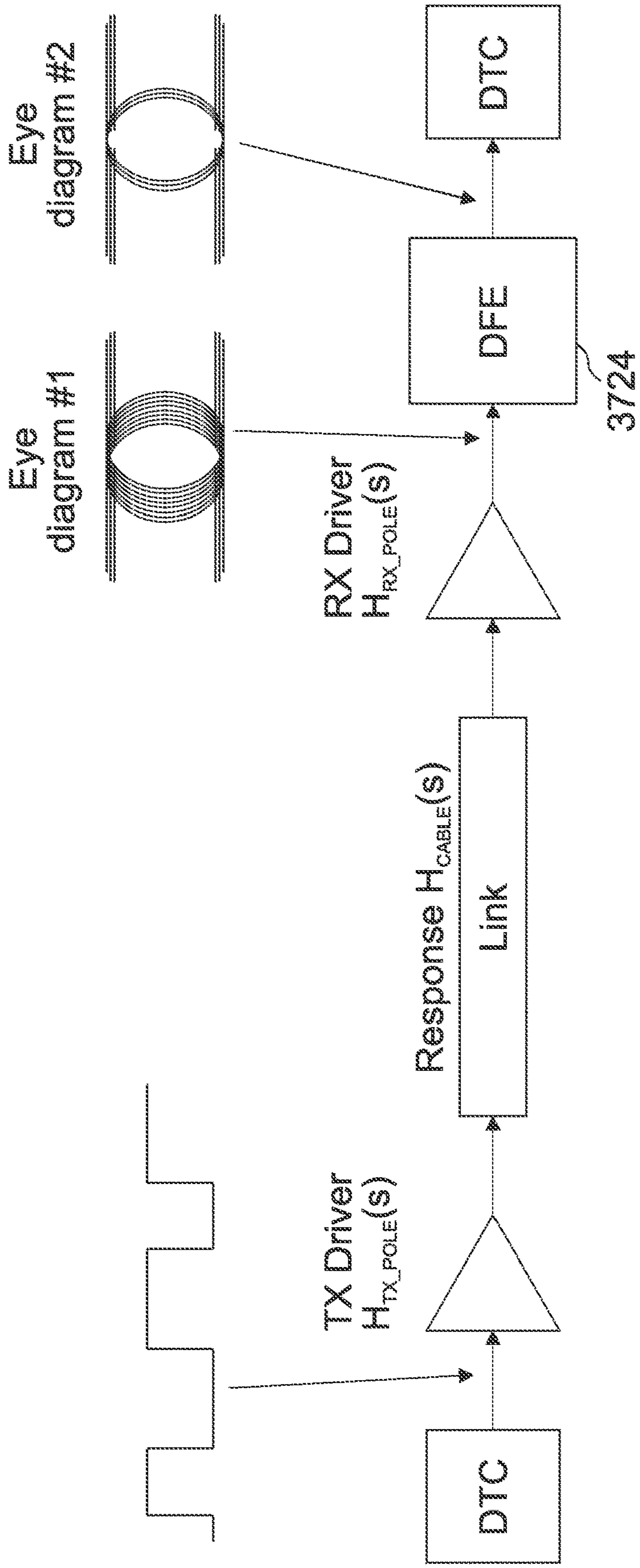
Figure 37F:
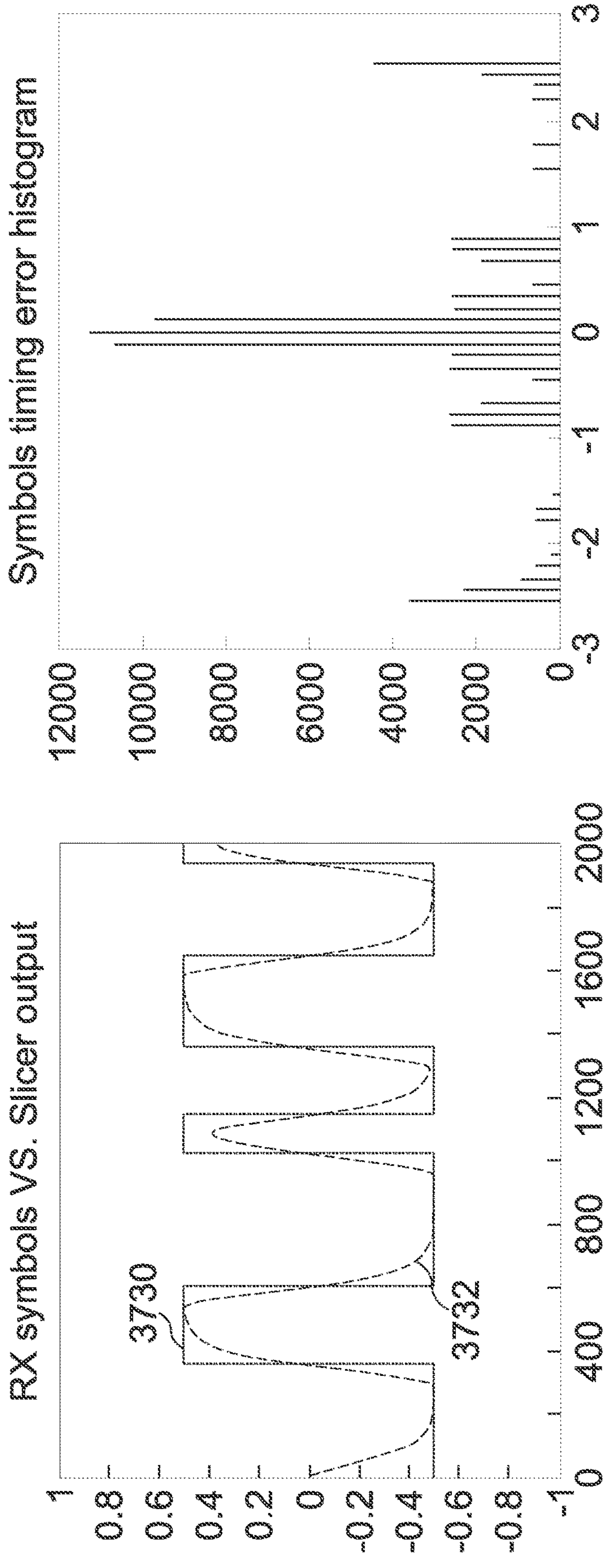
Figure 37G:
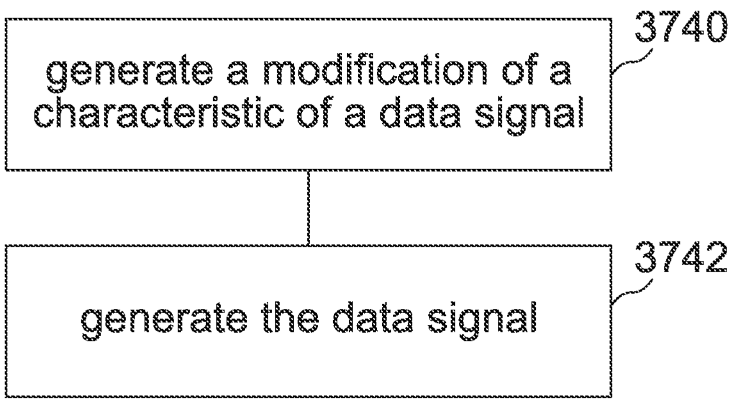
Figure 37H:
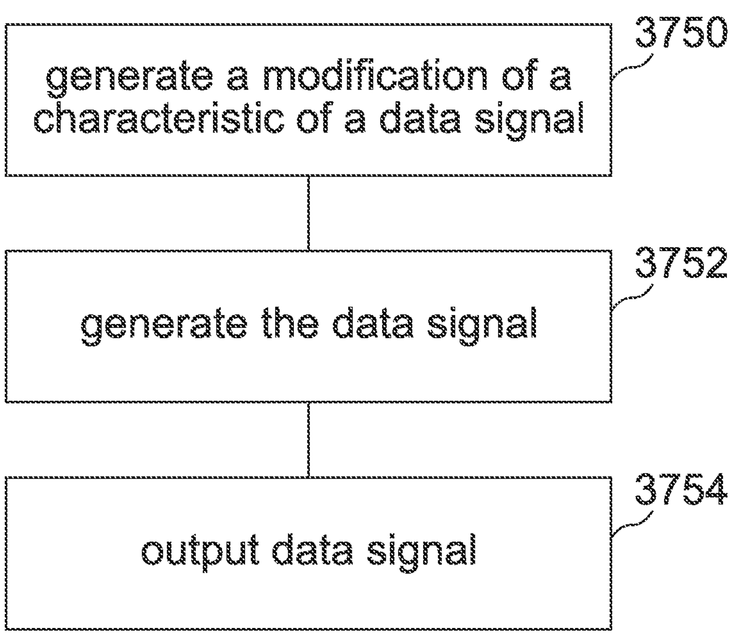
Figure 38A:
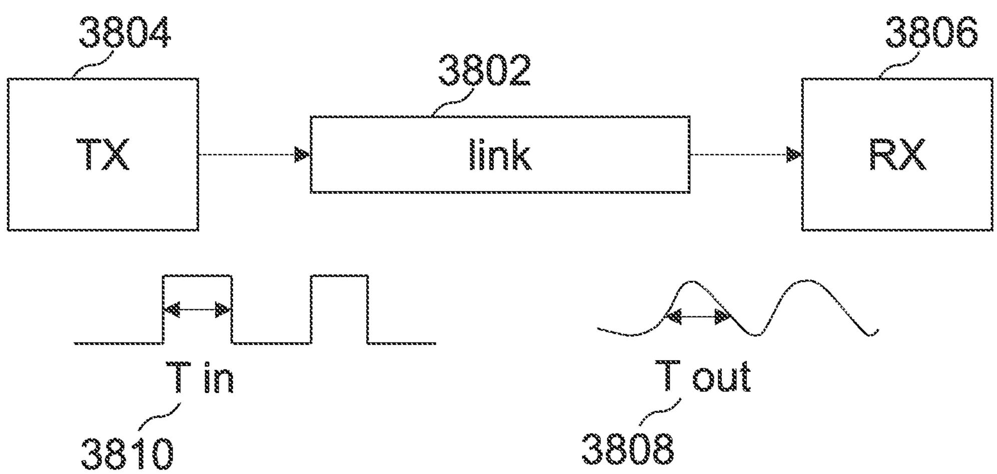
Figure 38B:
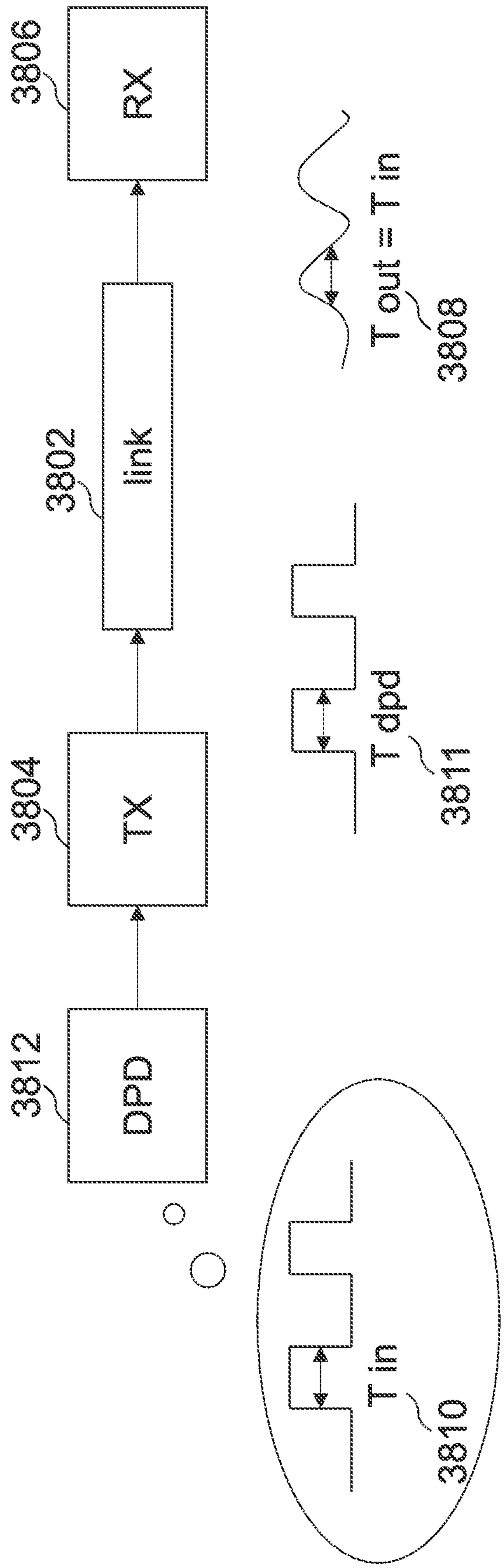
Figure 38C:
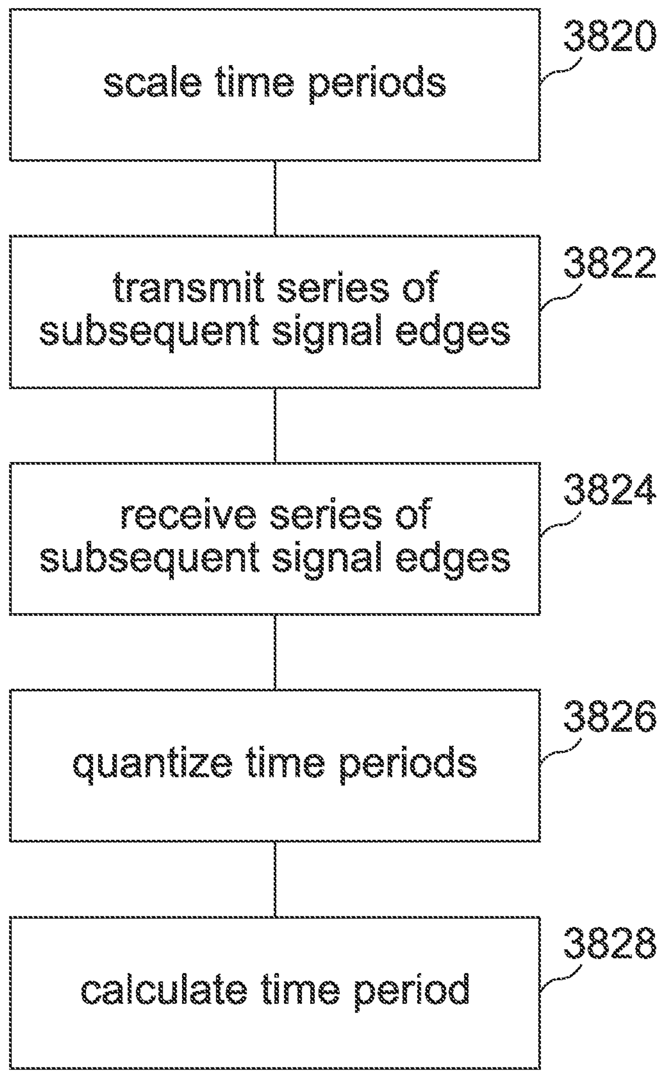
Figure 38D:
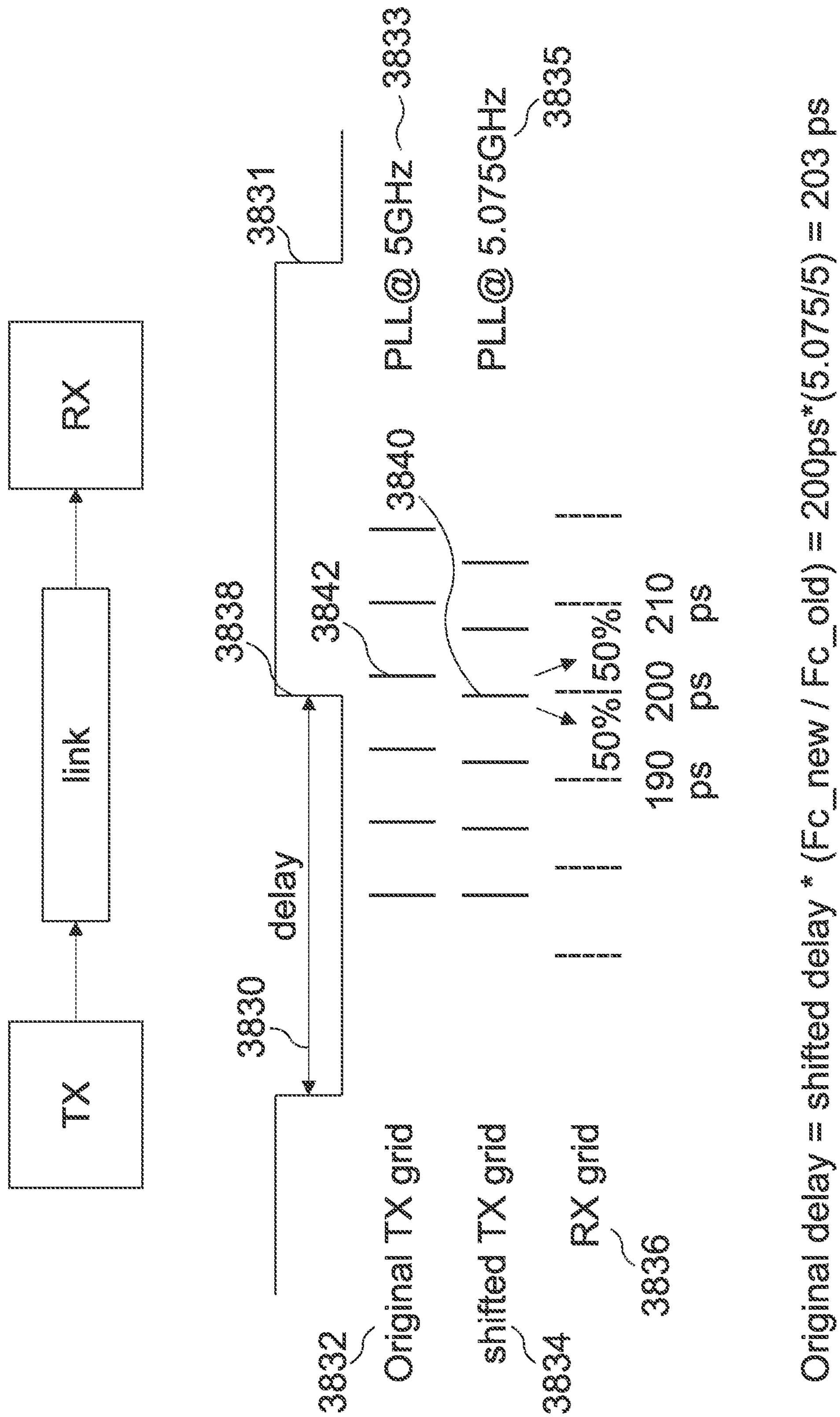
Figure 38E:
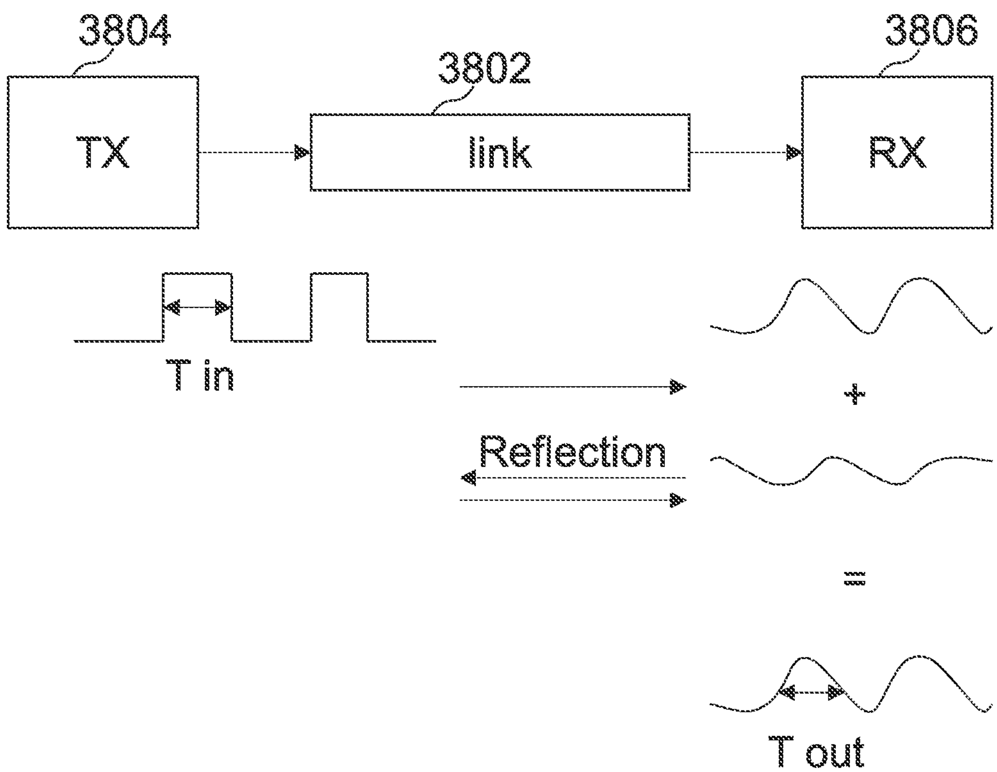
Figure 38F:
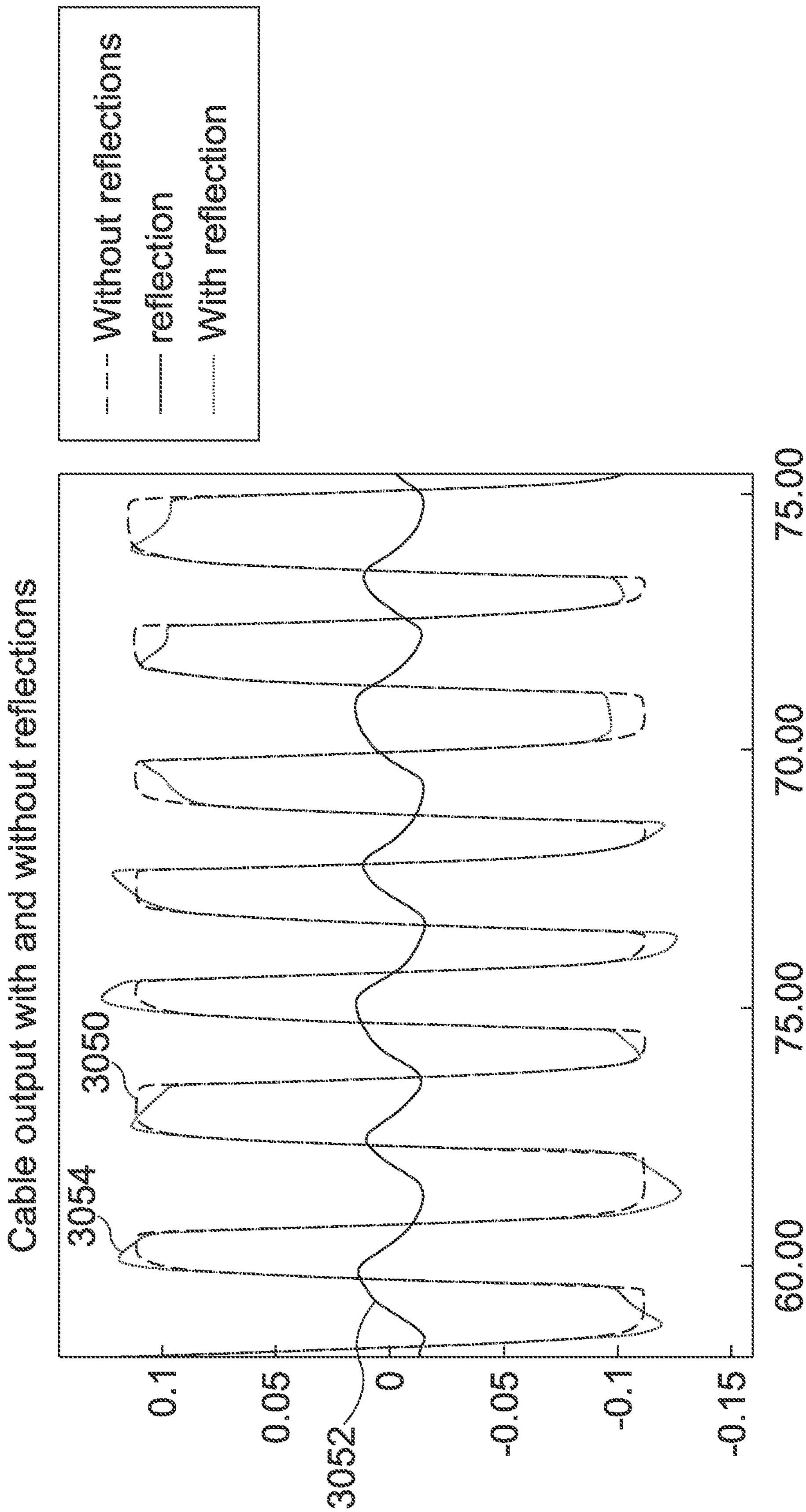
Figure 38G:
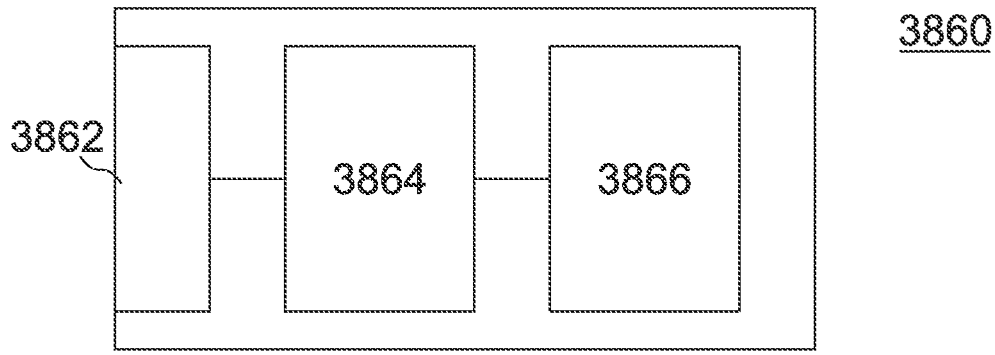
Figure 38H:
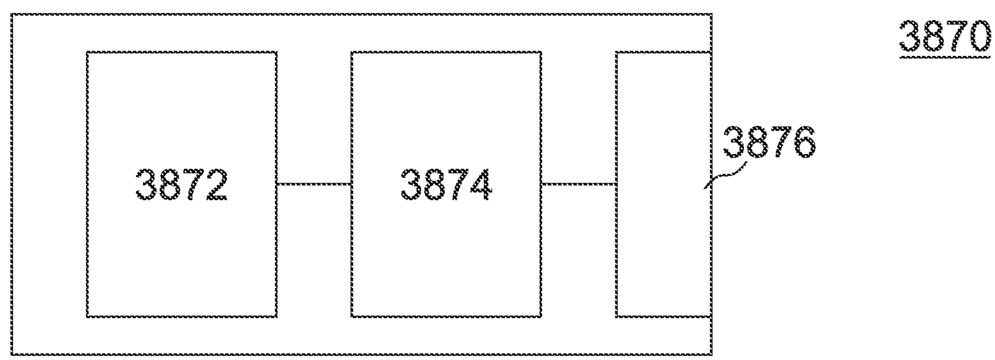
Figure 38I:
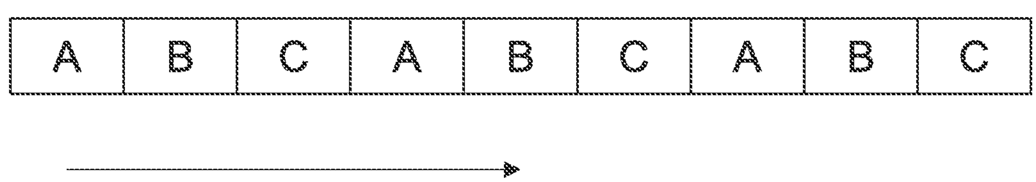
Figure 39A:
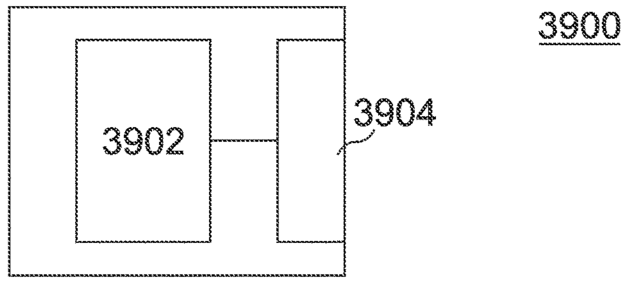
Figure 39B:
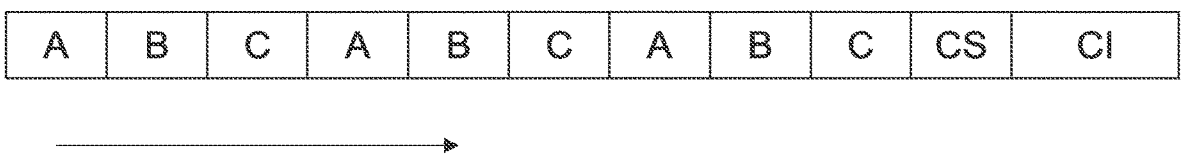
Figure 39C:
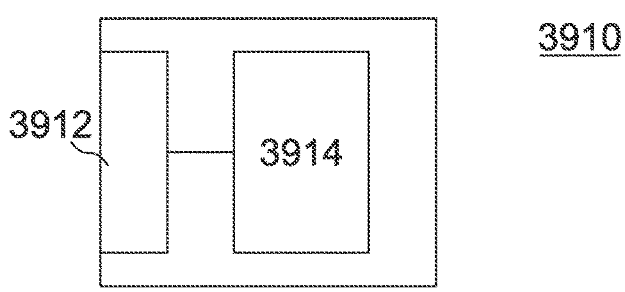
Figure 39D:
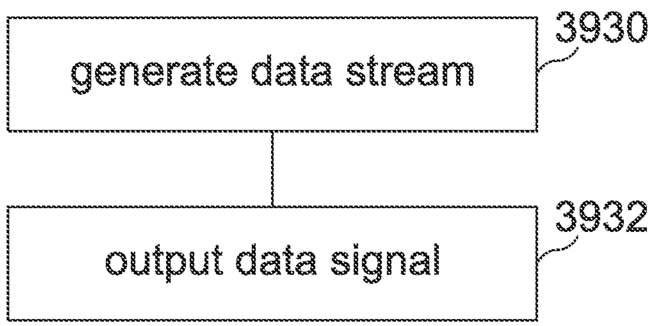
Figure 39E:
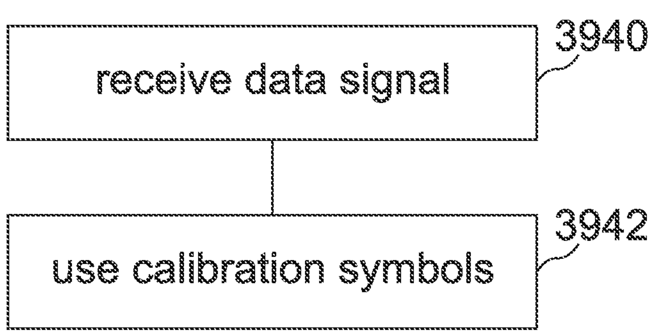
Figure 40A:
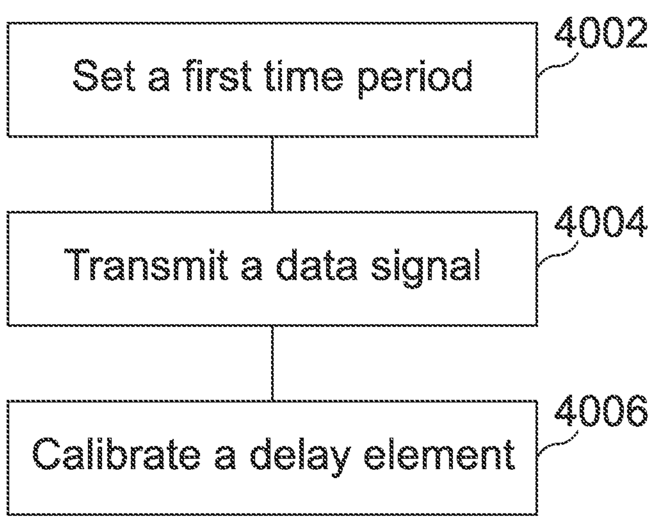
Figures 1, 40B:
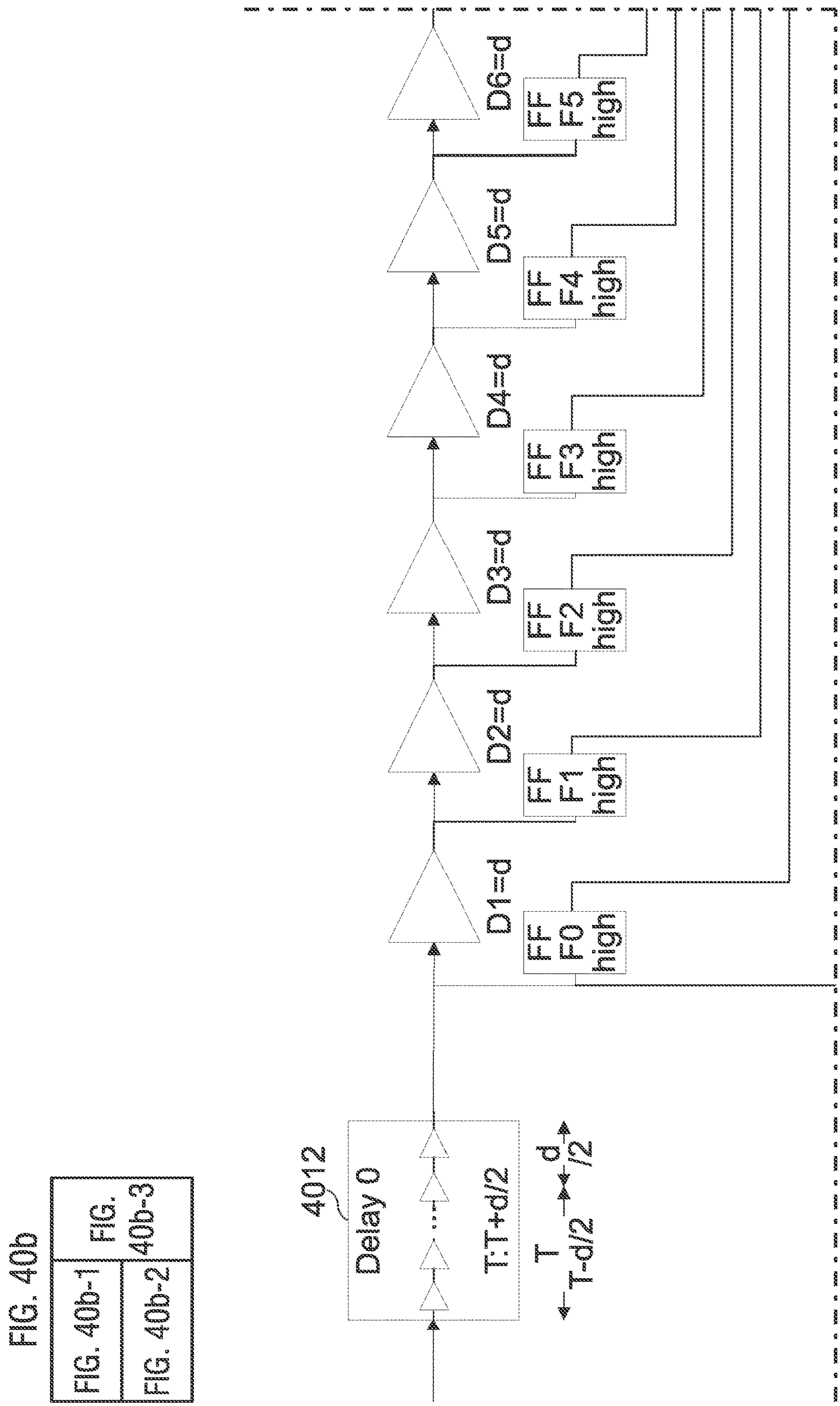
Figures 2, 40B:
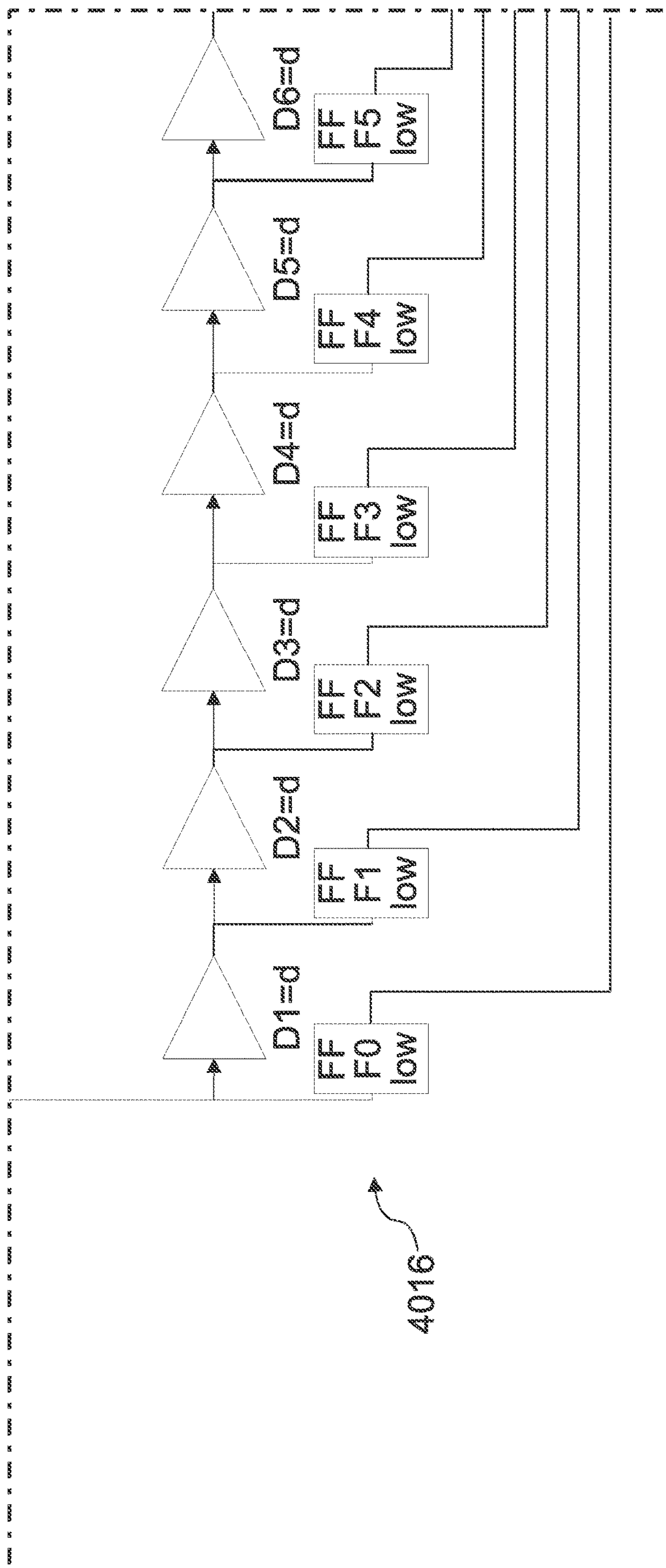
Figures 3, 40B:
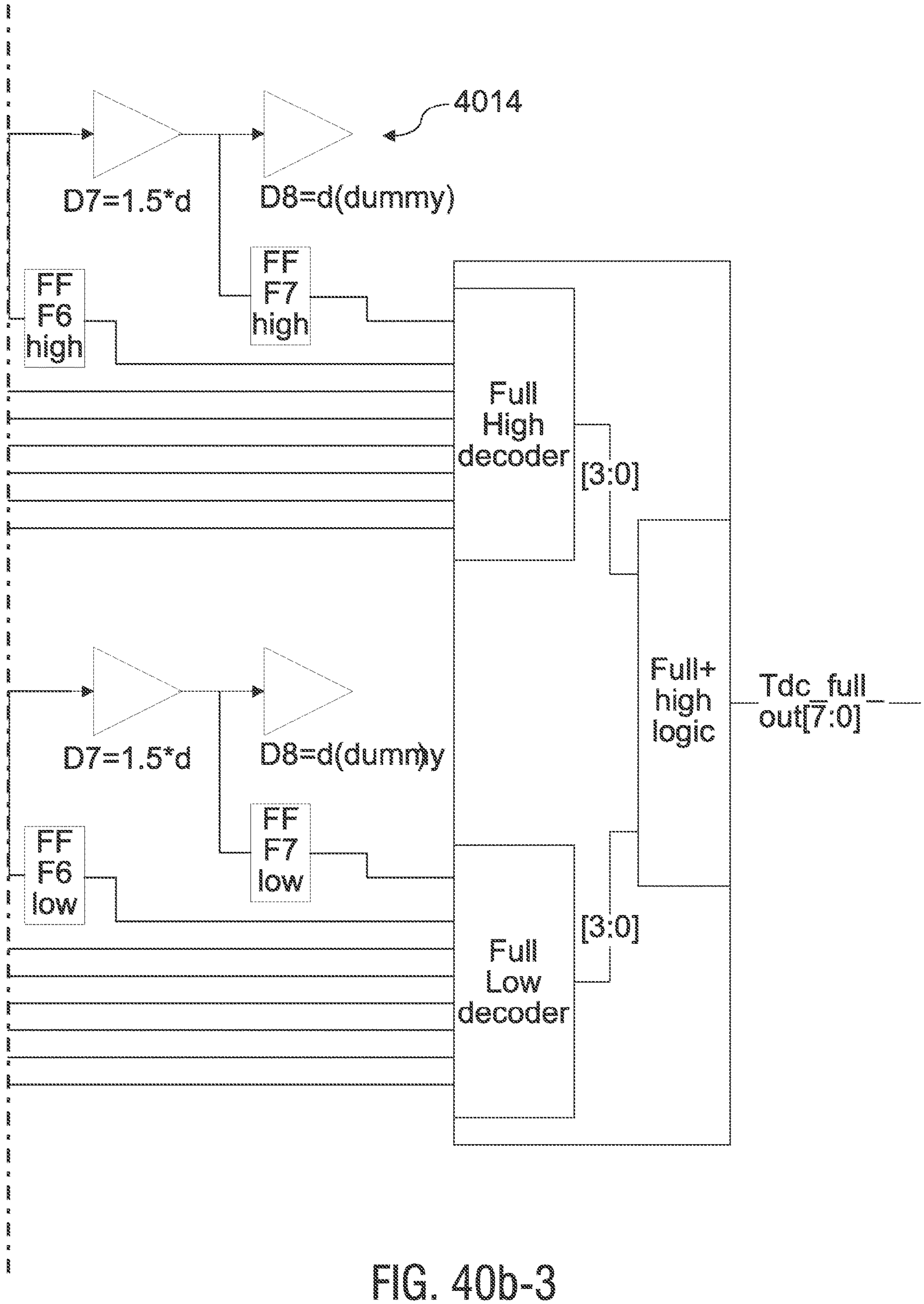
Figures 1, 40D:
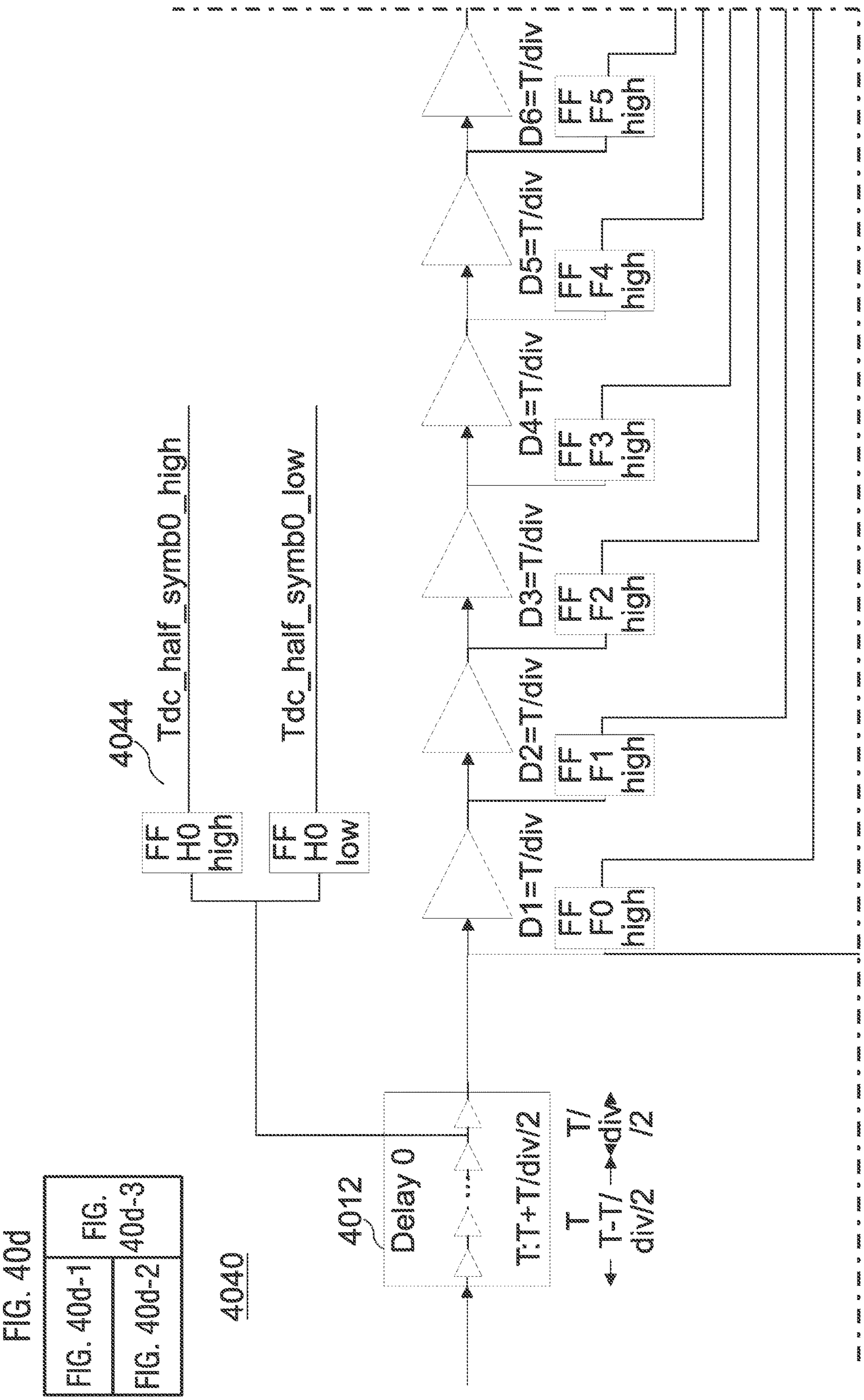
Figures 2, 40D:
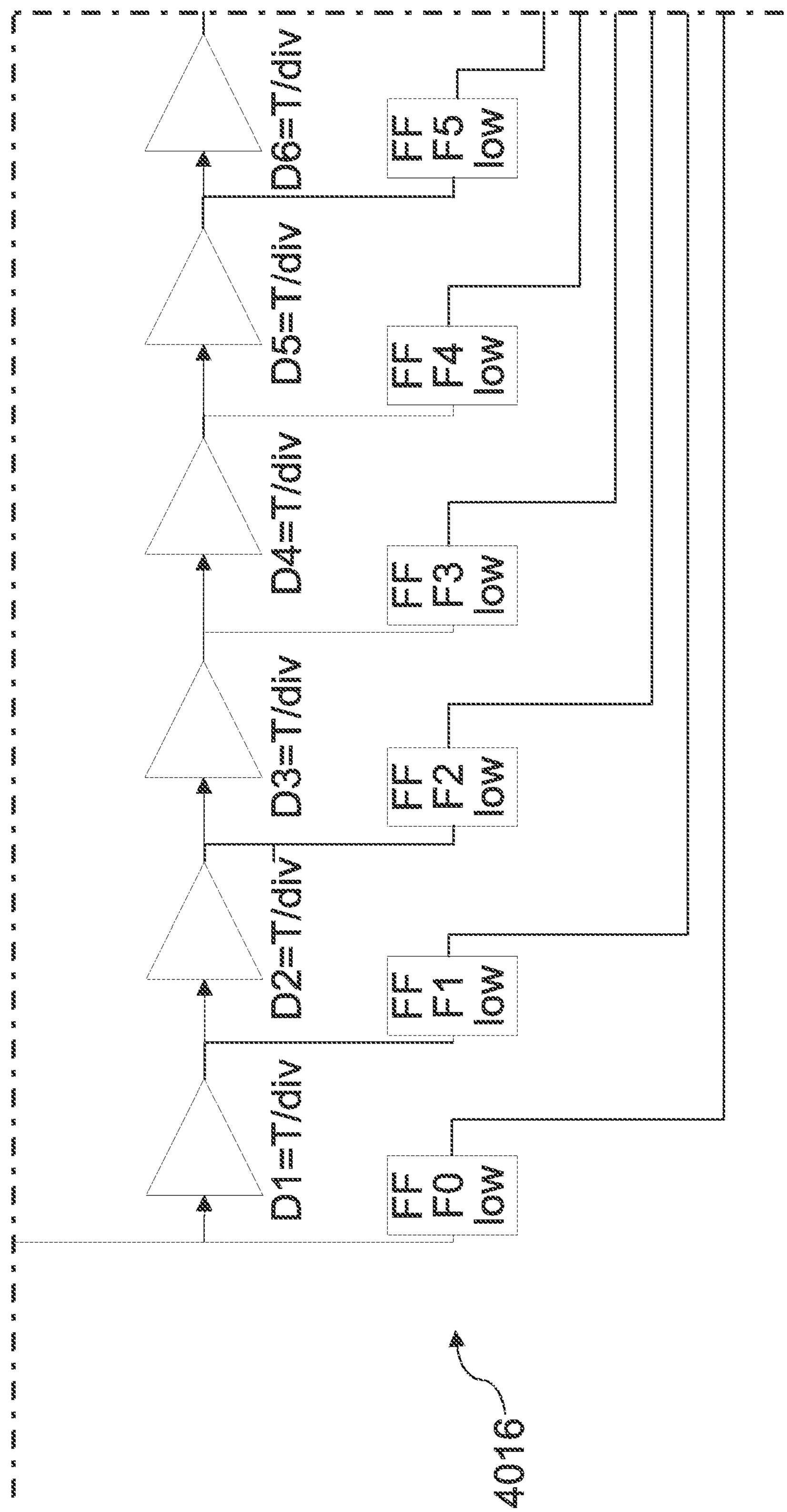
Figures 3, 40D:
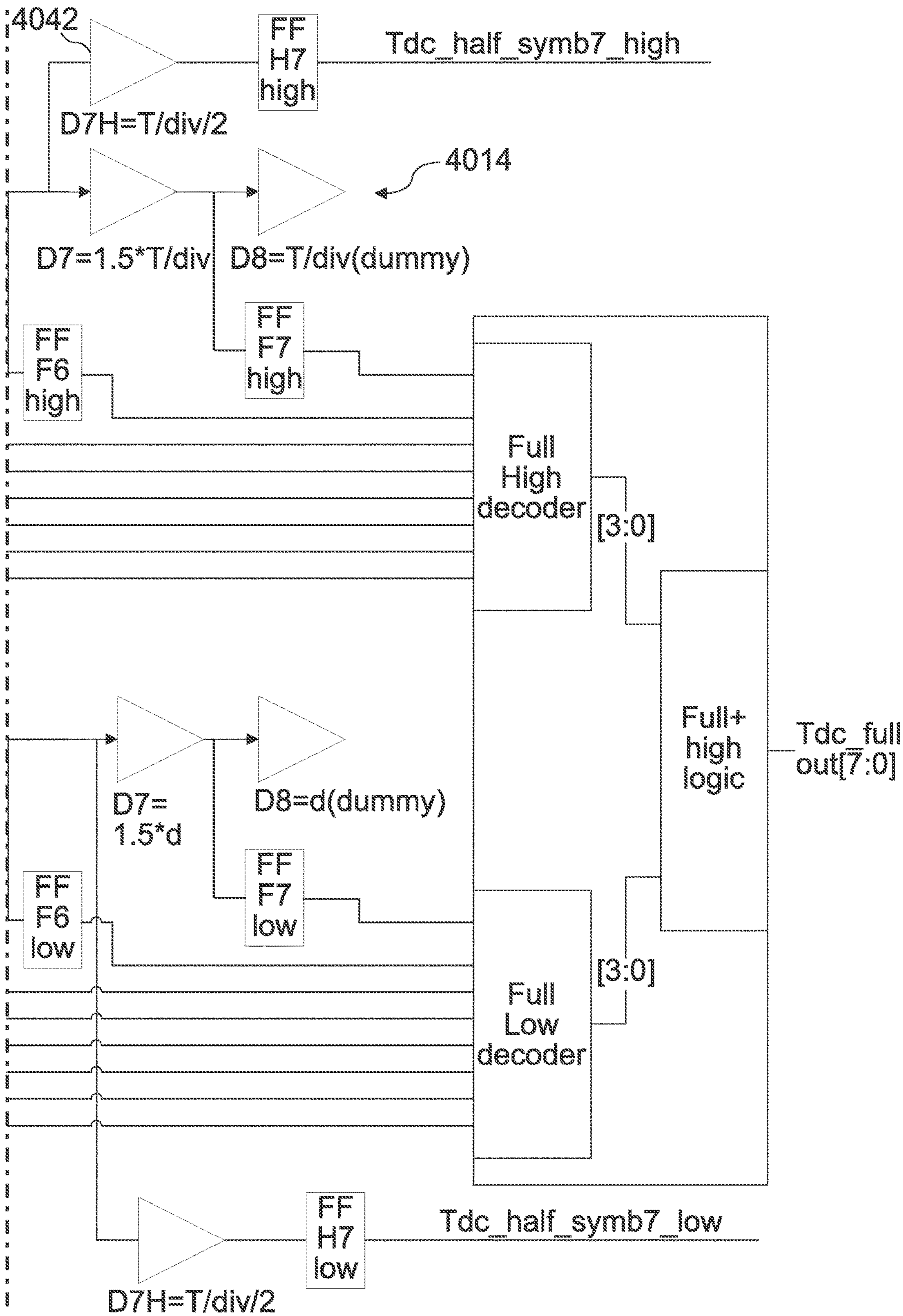
Figure 40E:
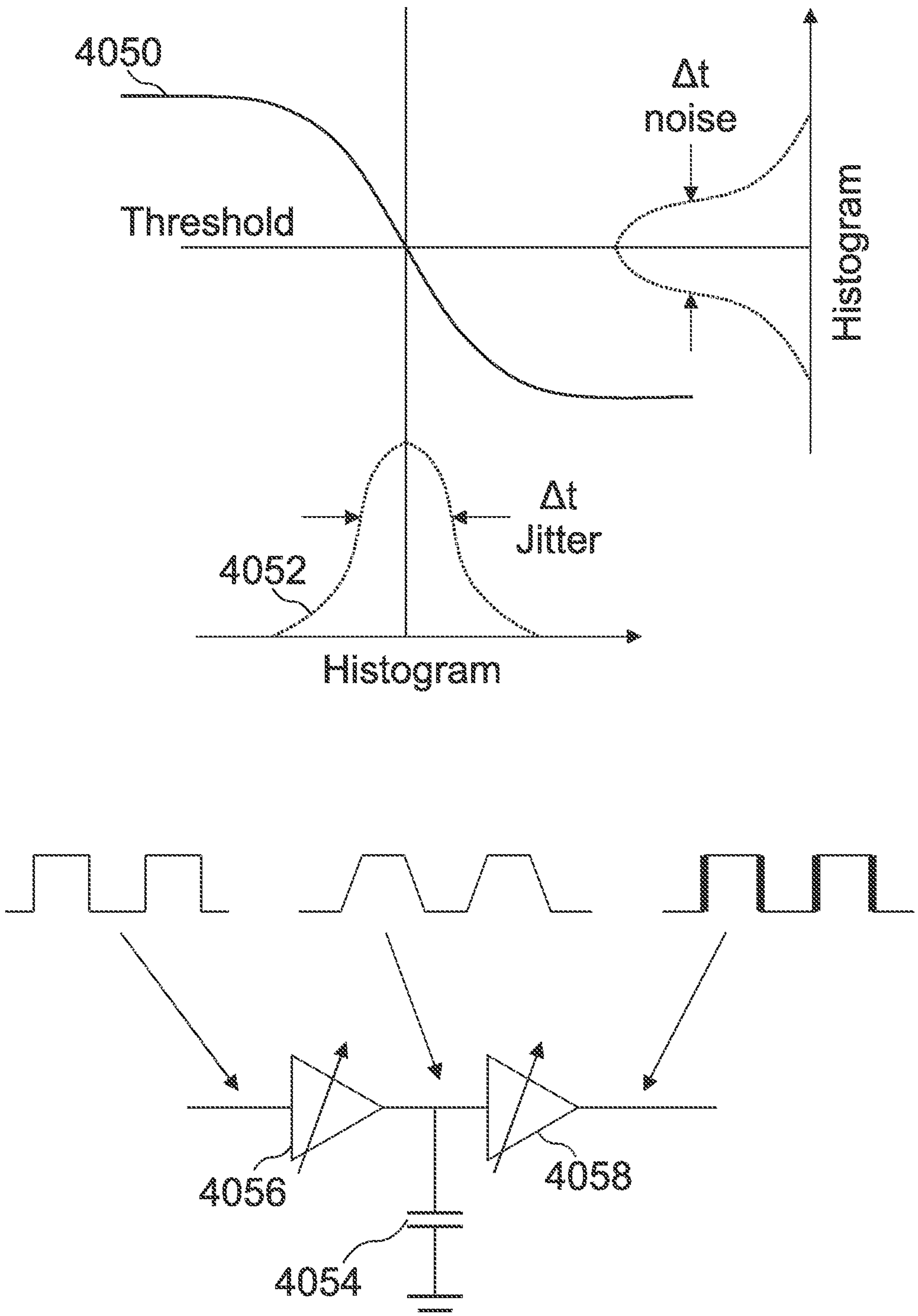
Figure 41A:
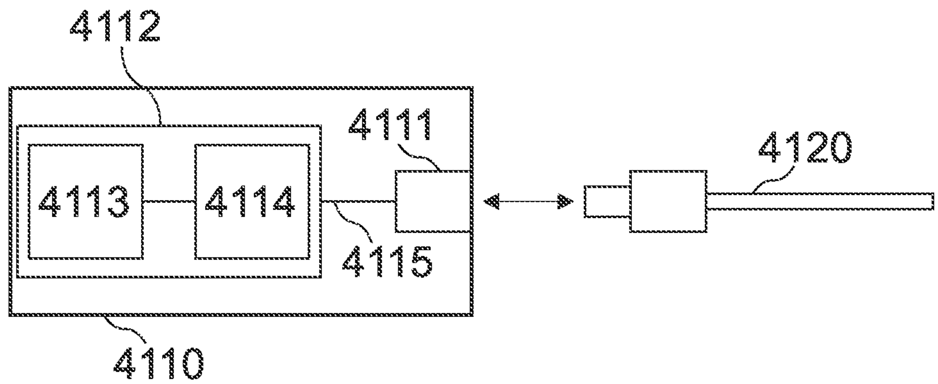
Figure 41B:
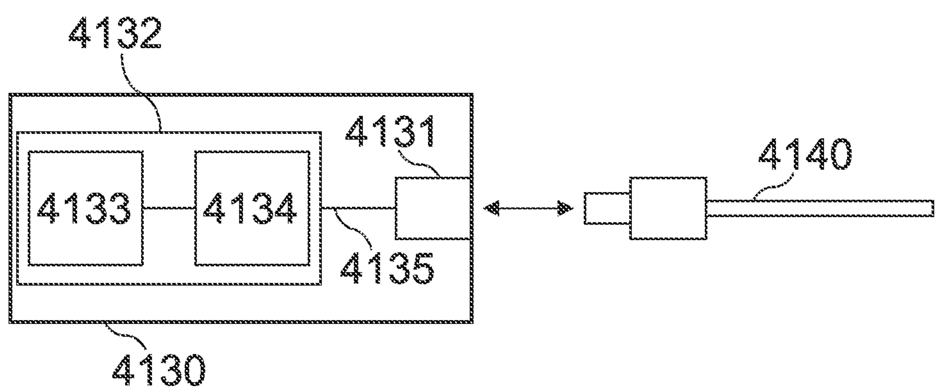
Figure 41C:
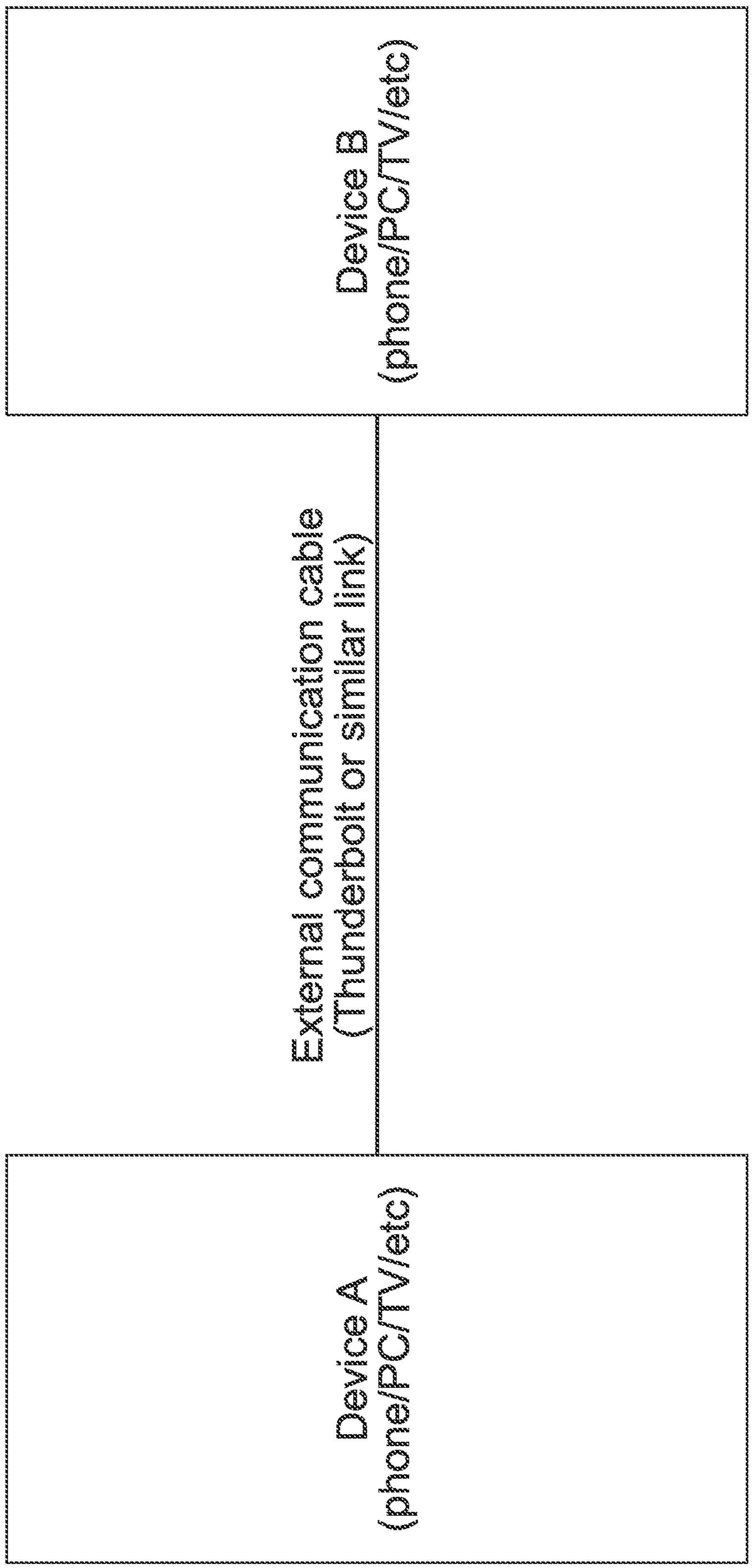
Figure 41D:
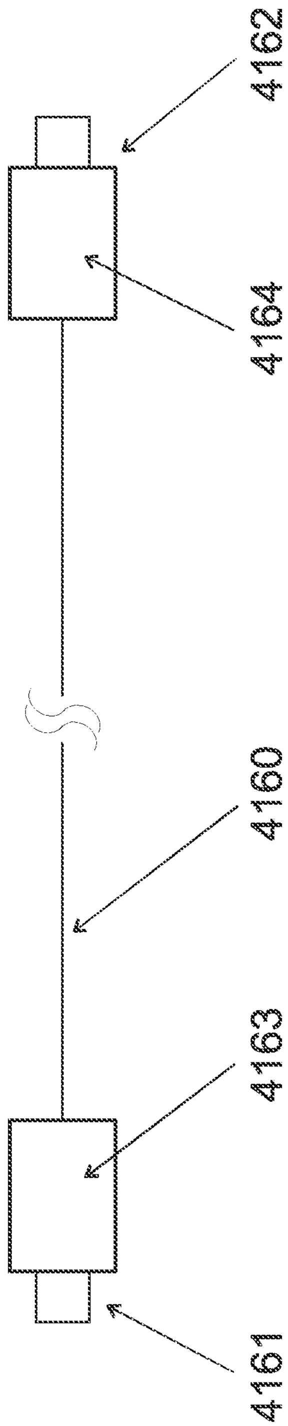
Figure 41E:
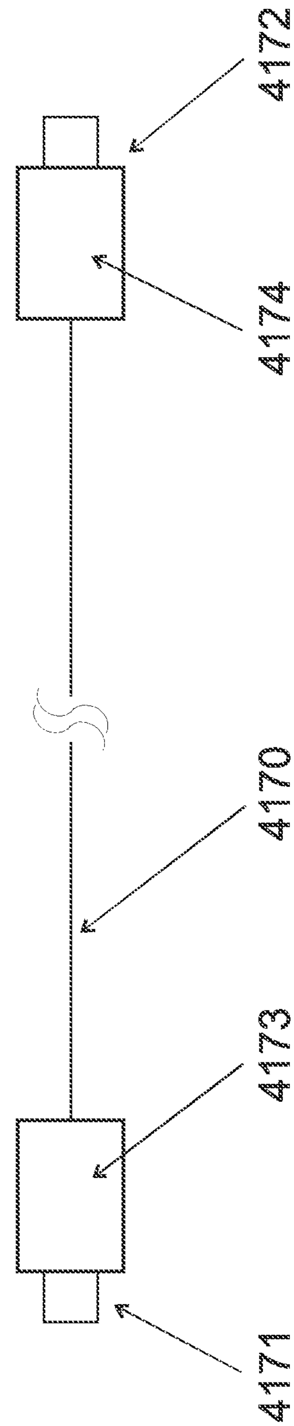
Figure 42A:
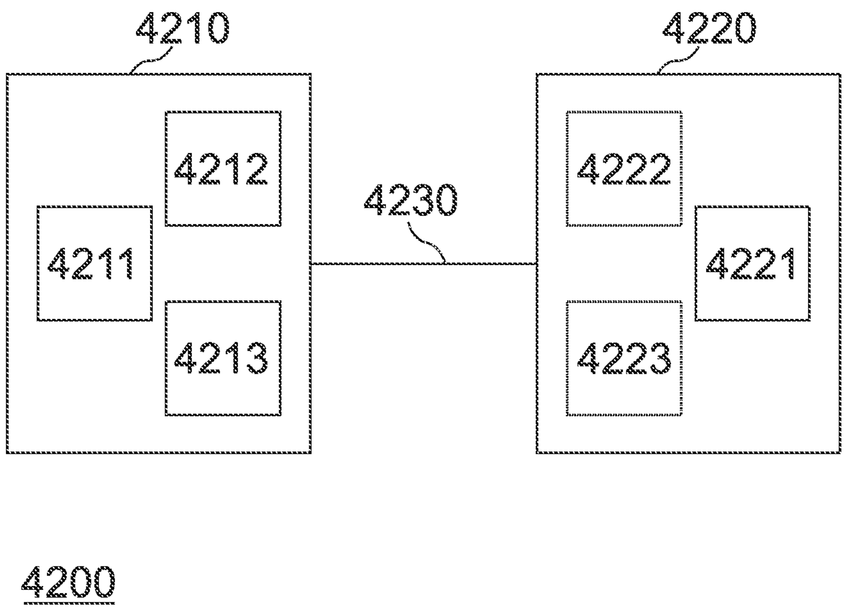
Figure 42B:
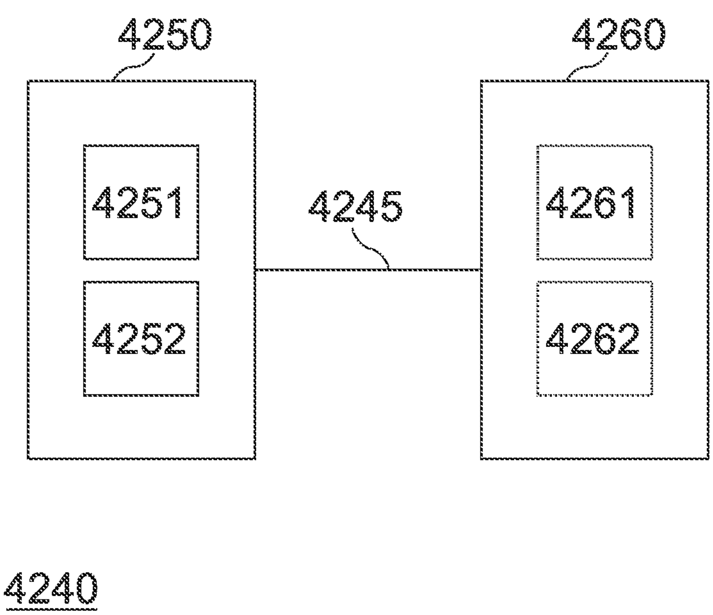
Figure 42C:
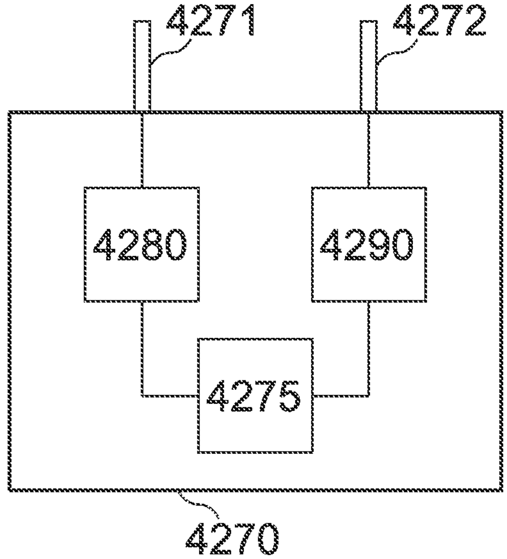
Figure 43A:
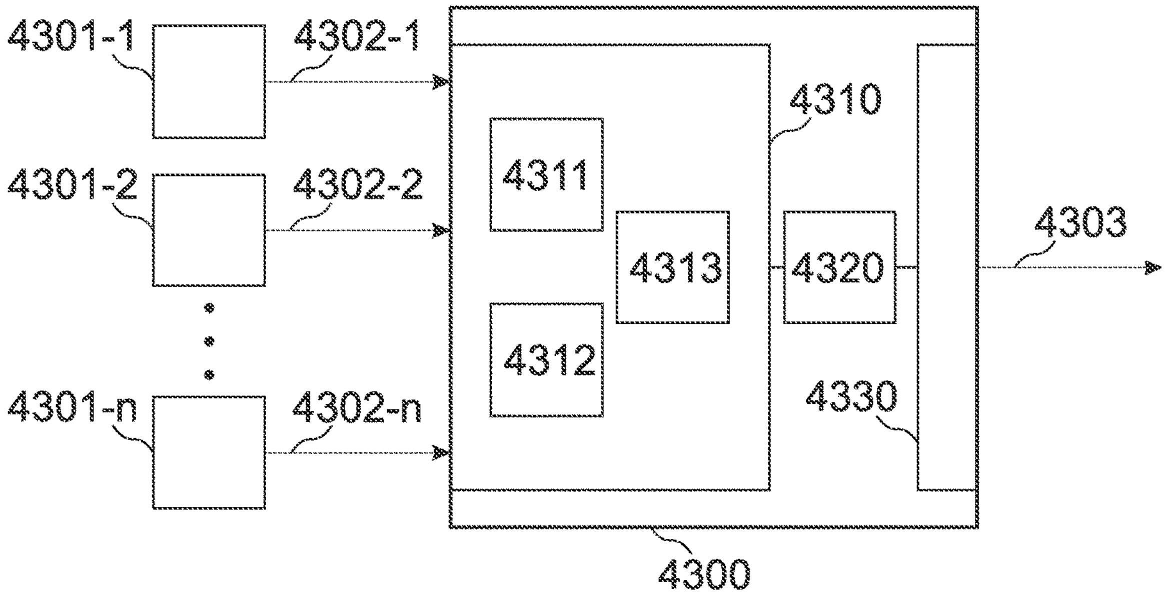
Figure 43B:
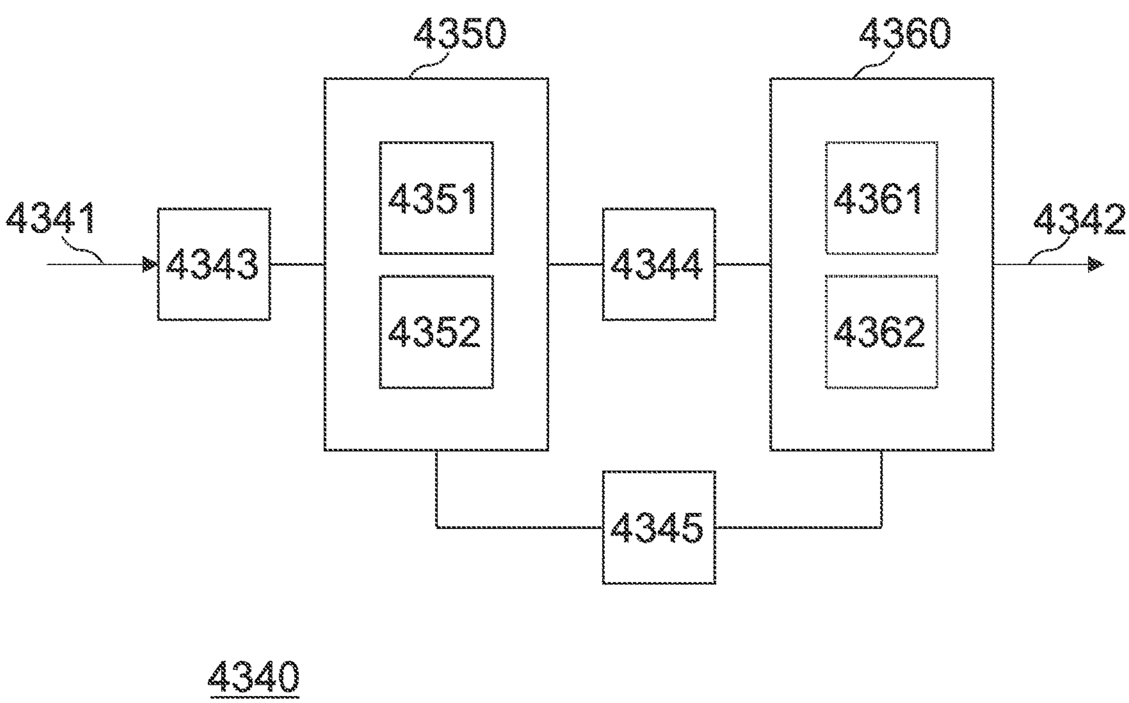
Figures 1, 43C:
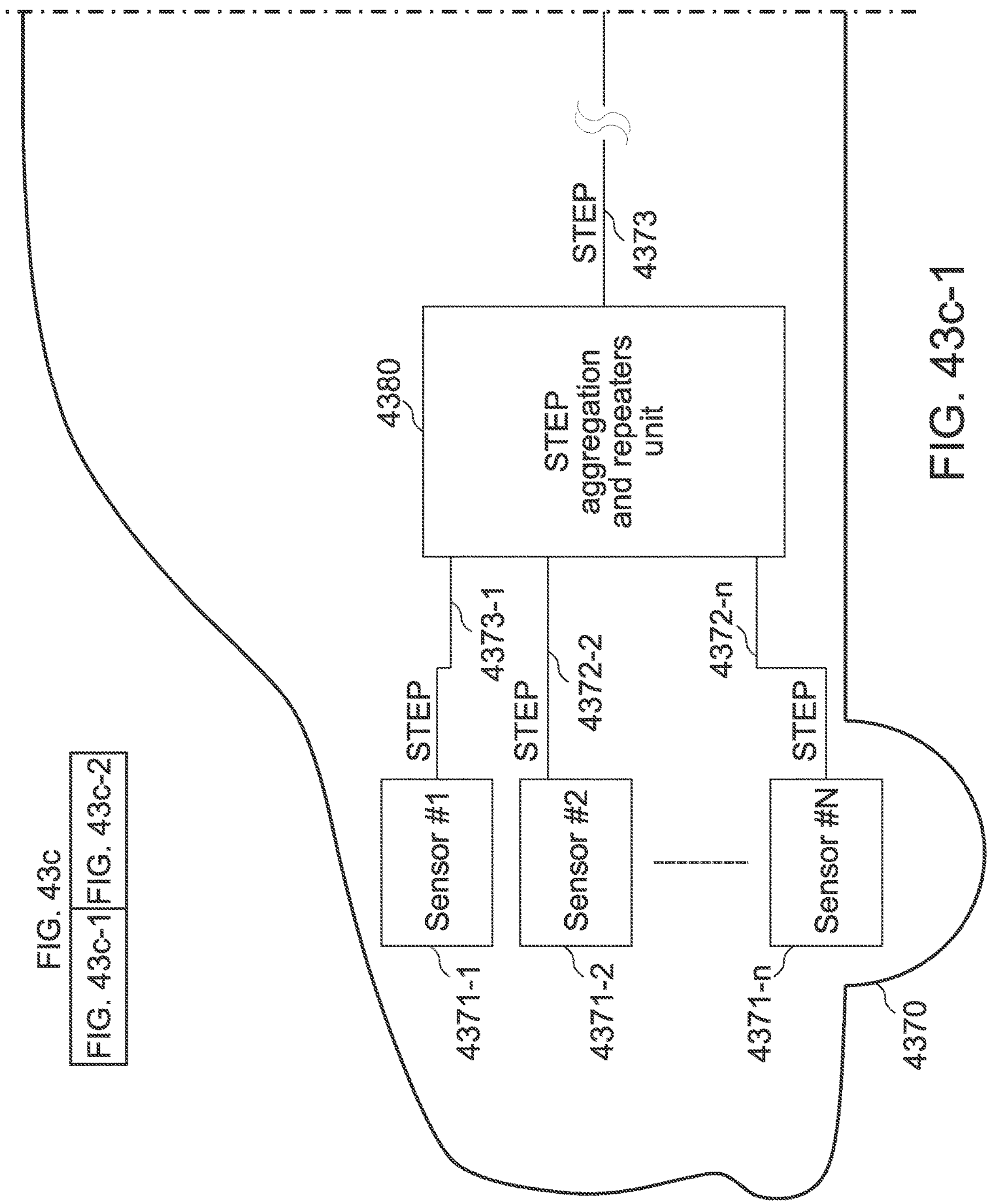
Figures 2, 43C:
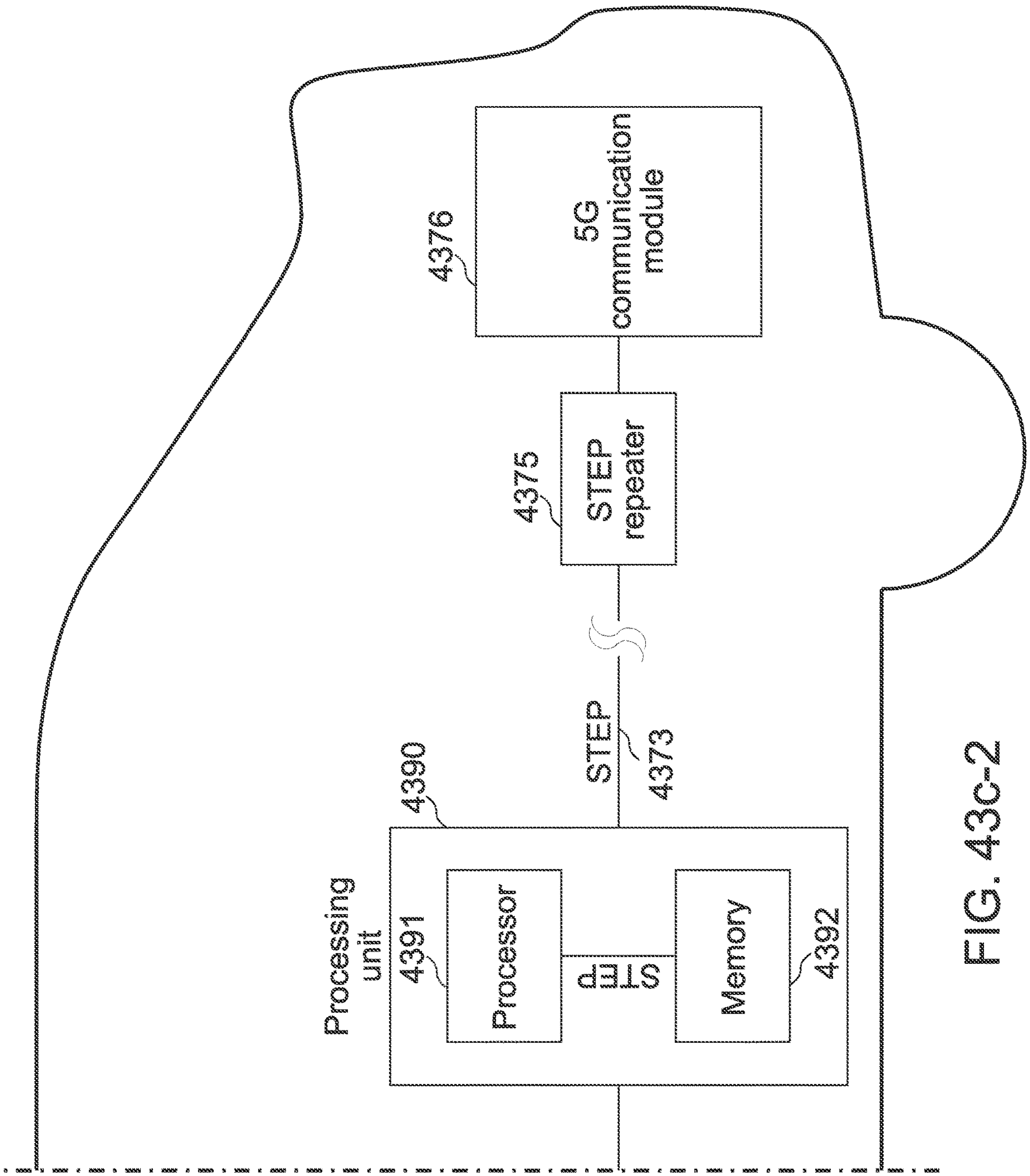
Figure 44A:
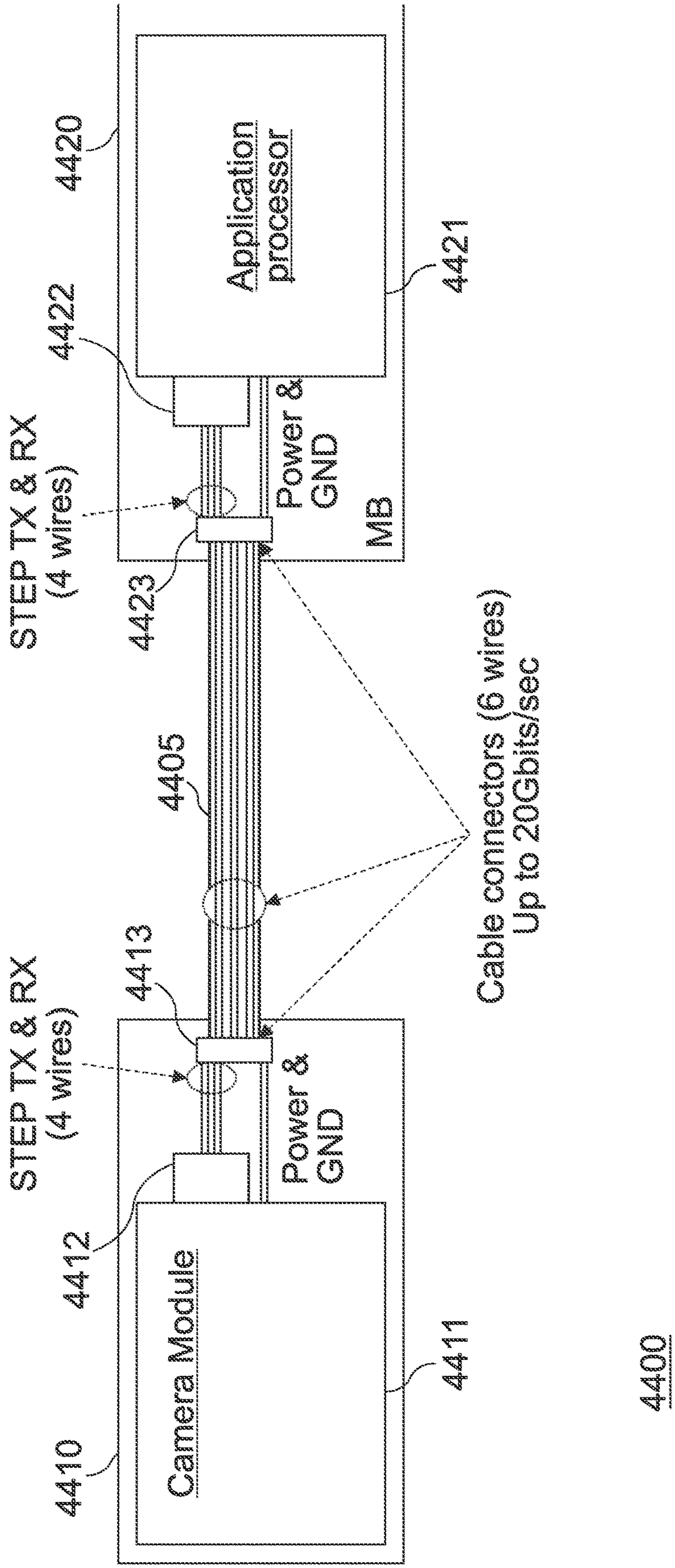
Figure 44B:
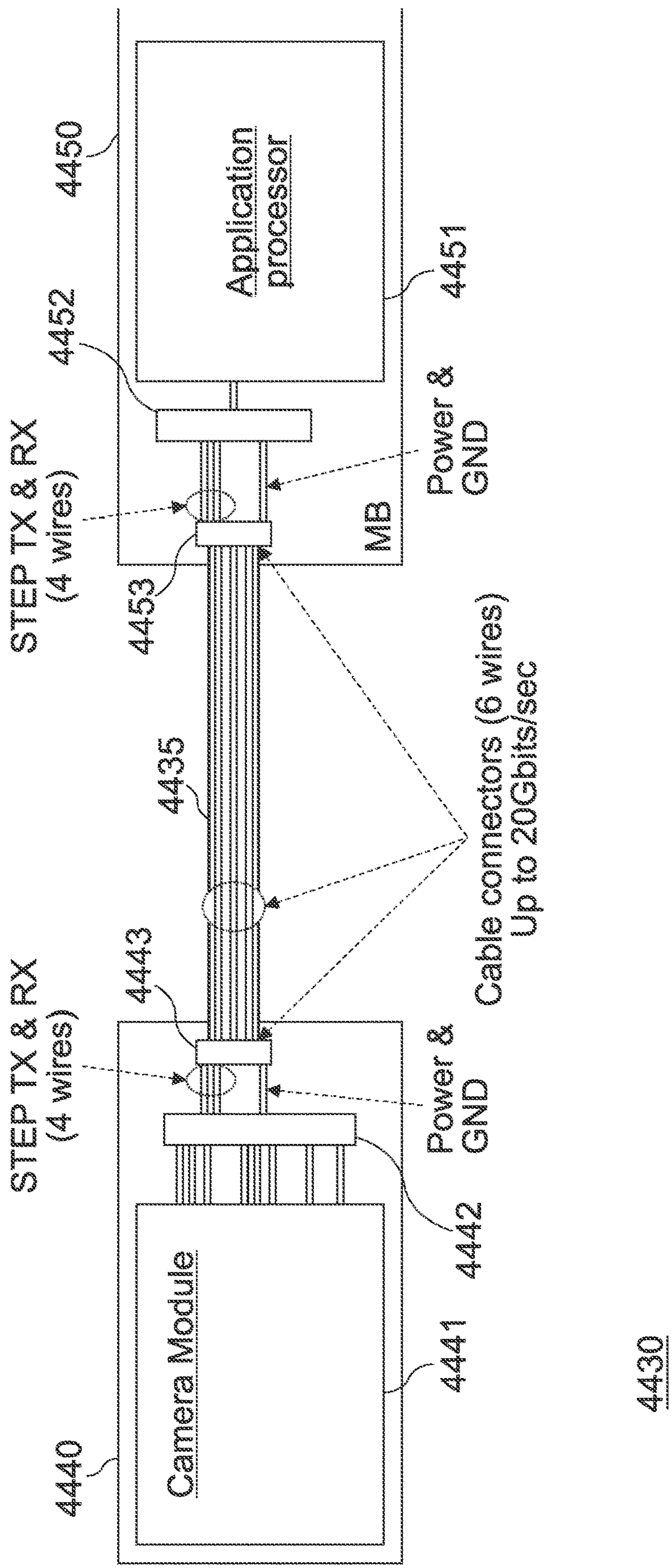
Figure 44C:
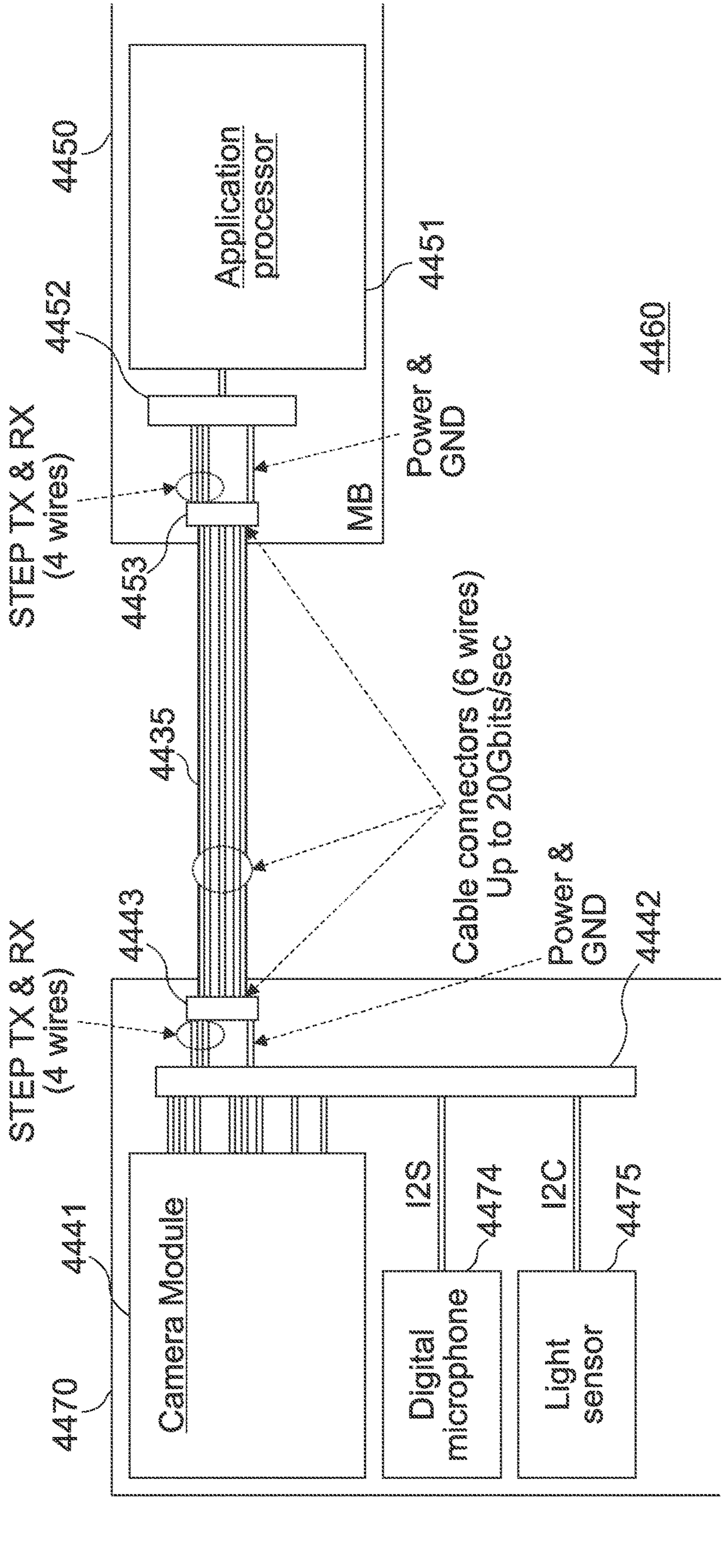
Figure 45A:
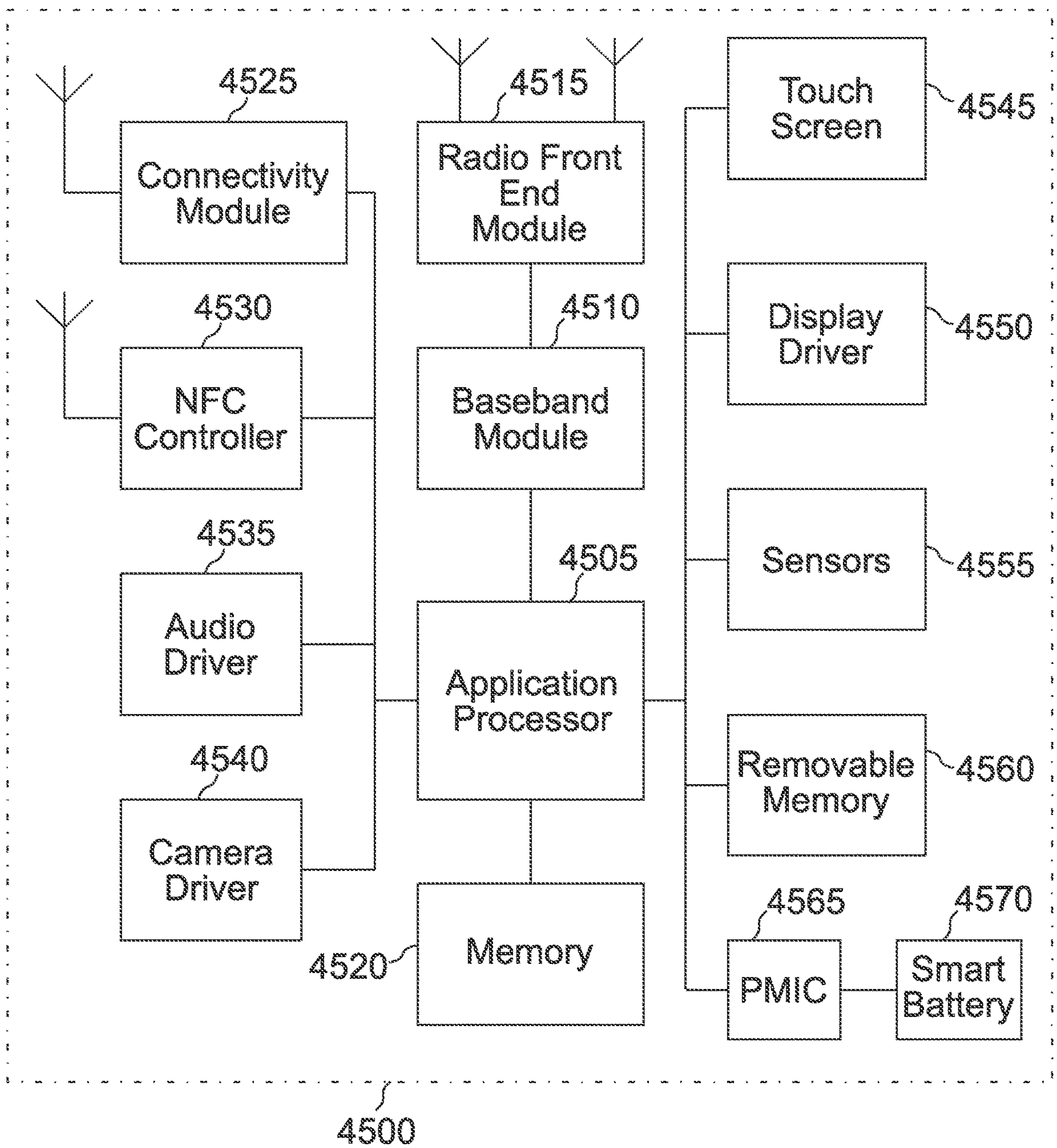
Figure 45B:
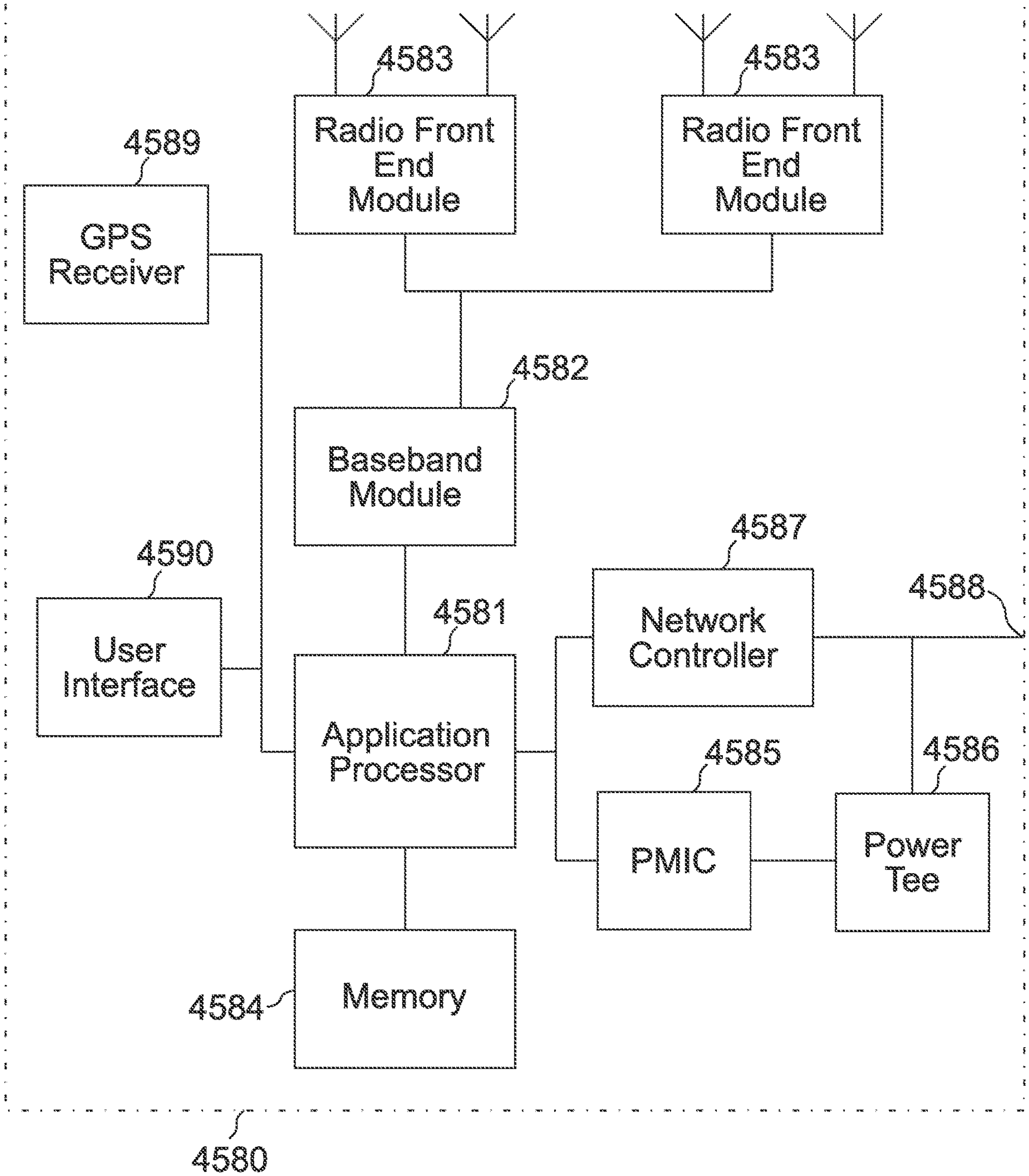
Figure 46A:
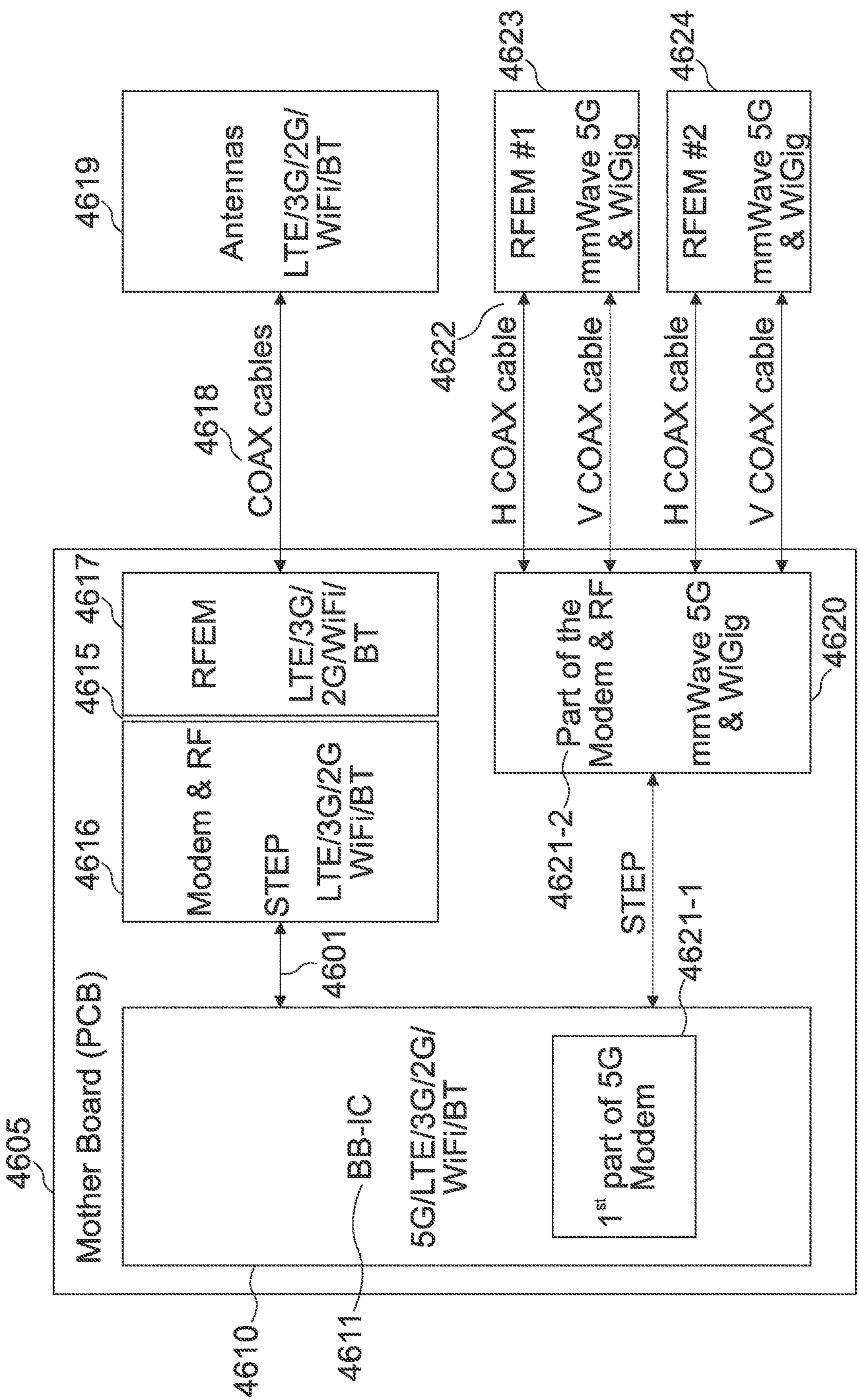
Figure 46B:
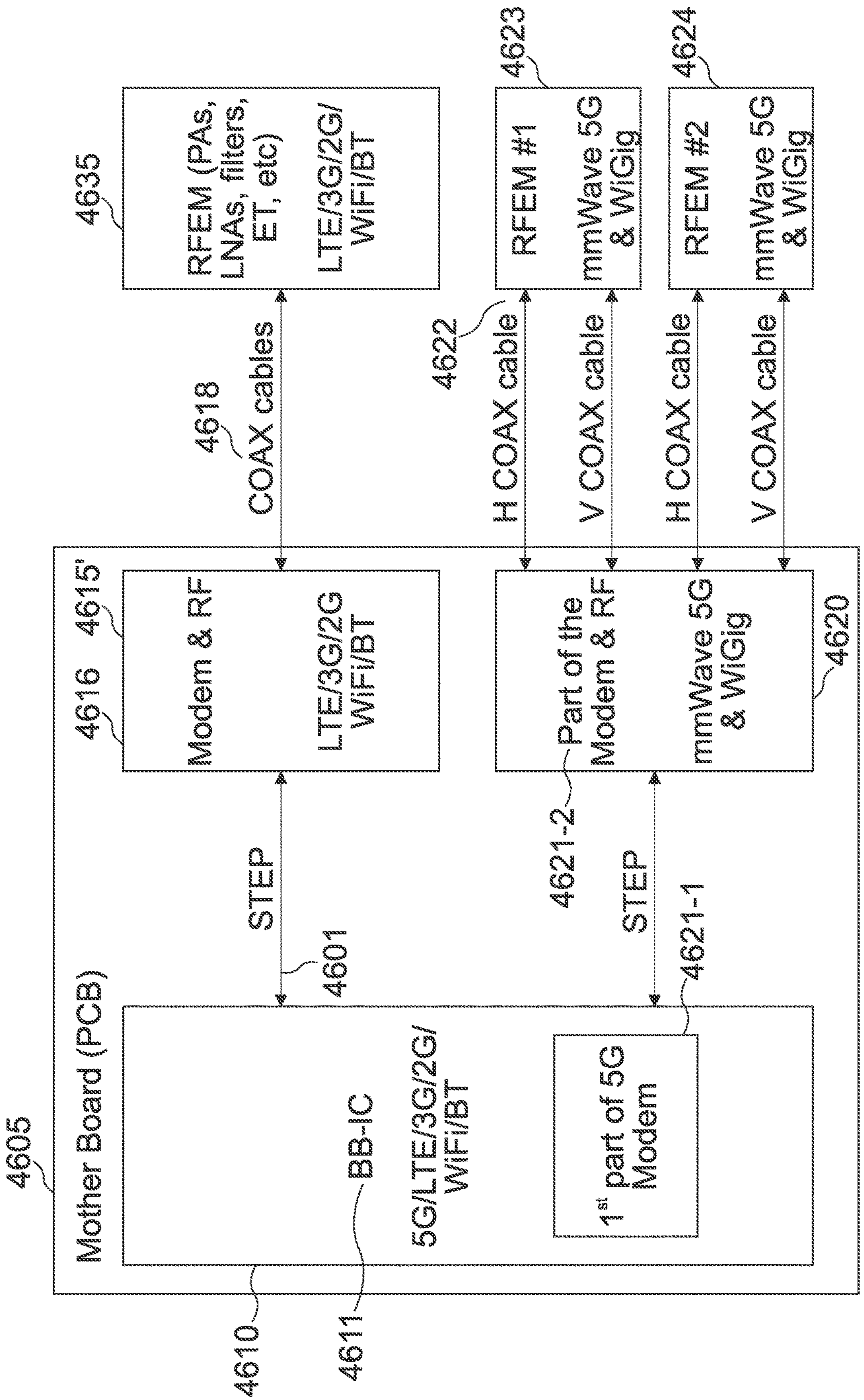
Figure 46C:
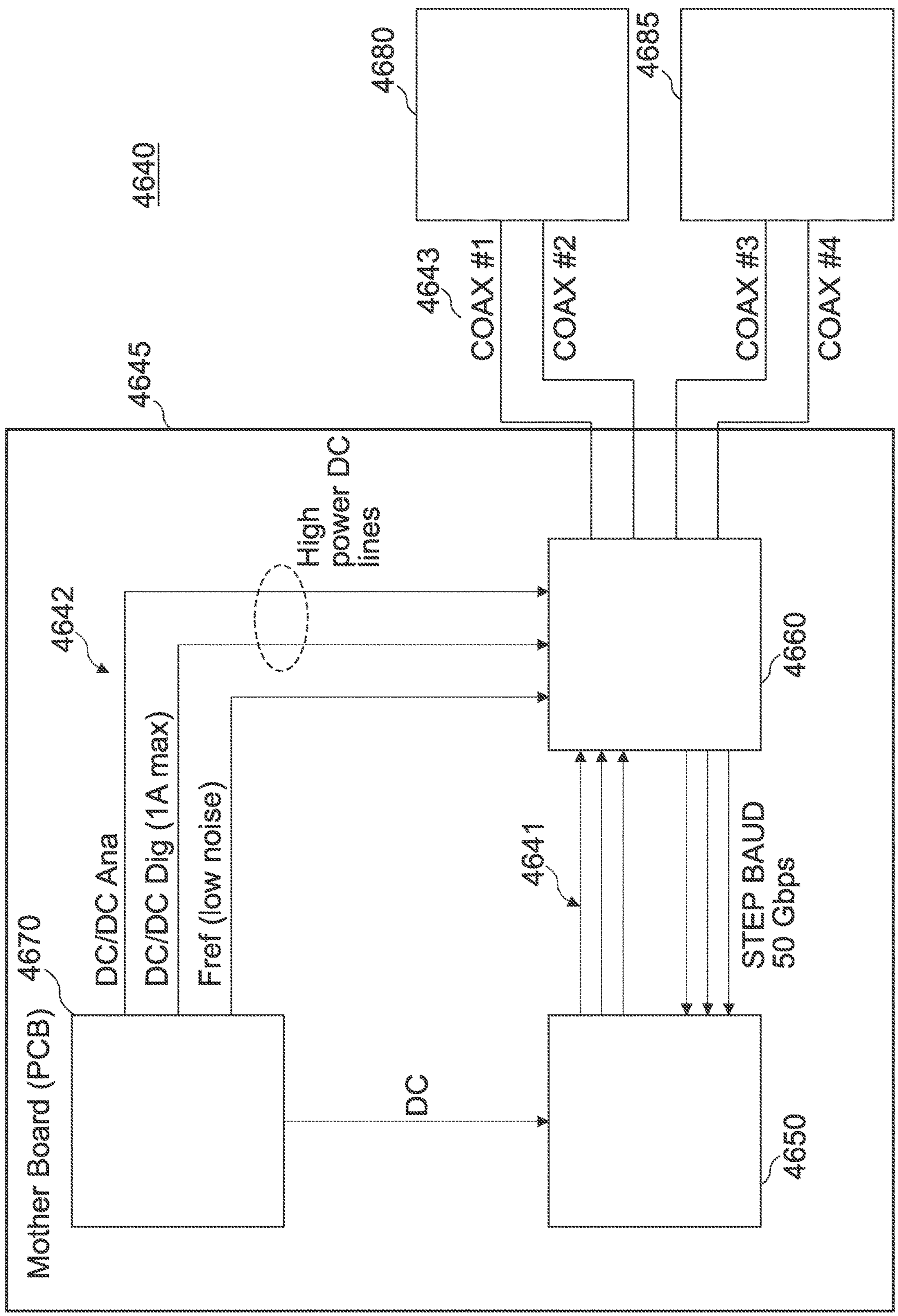
Figure 47A:
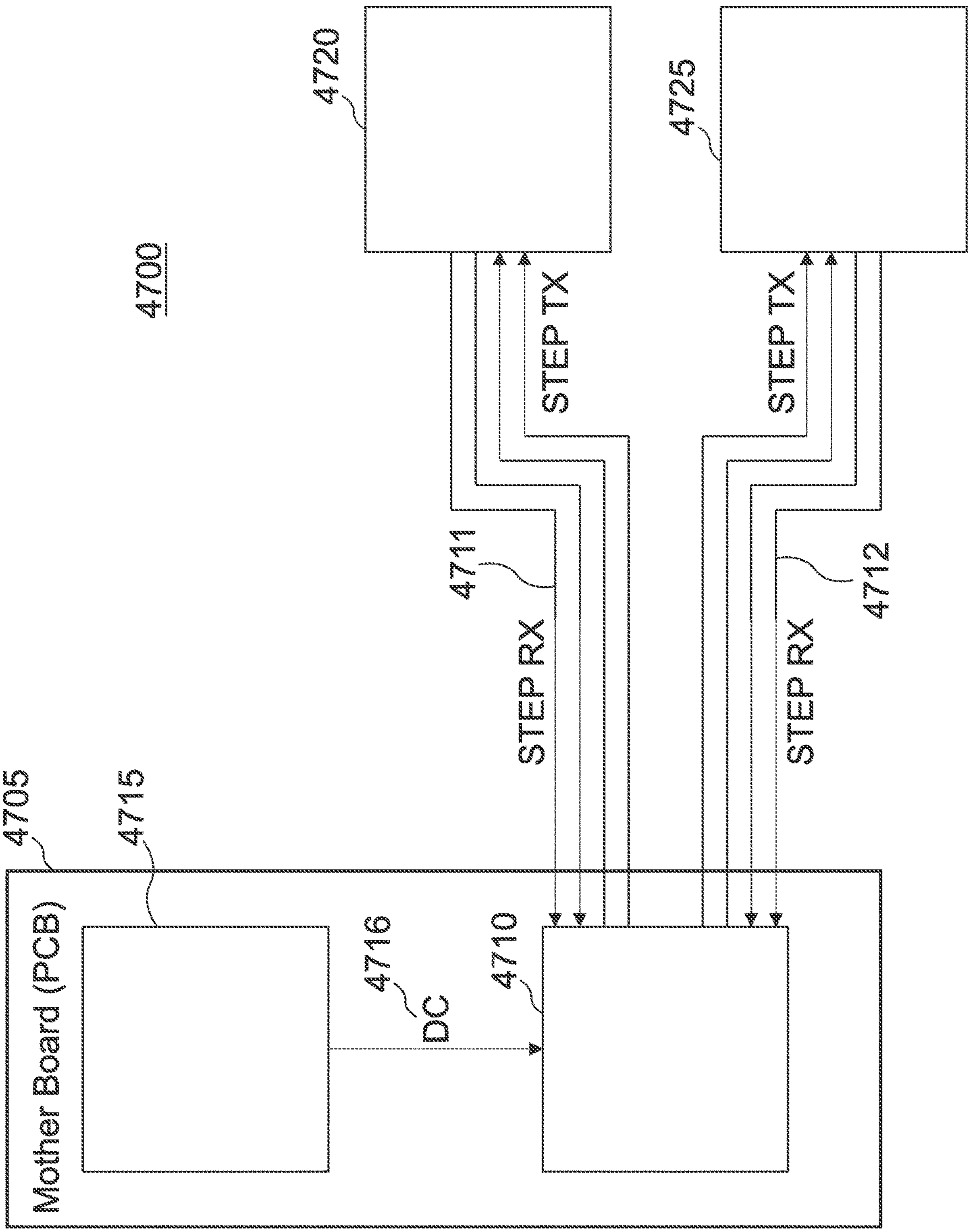
Figure 47B:
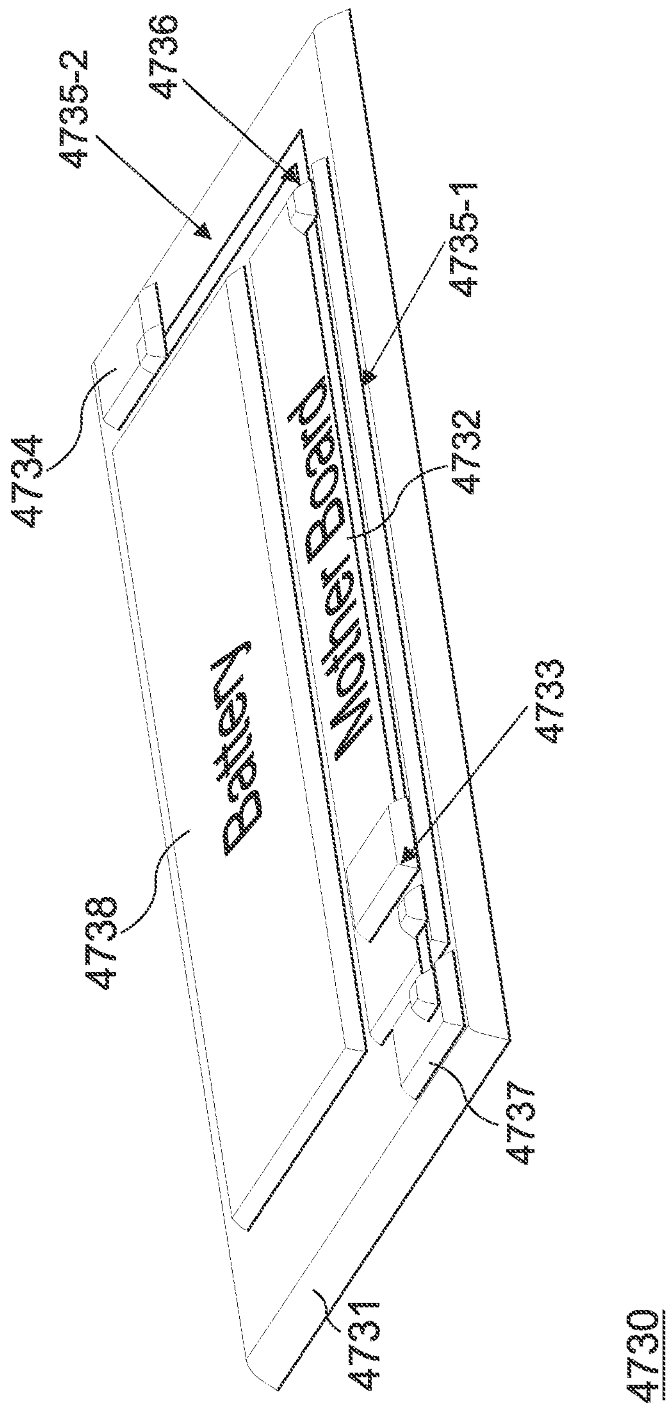
Figure 47C:
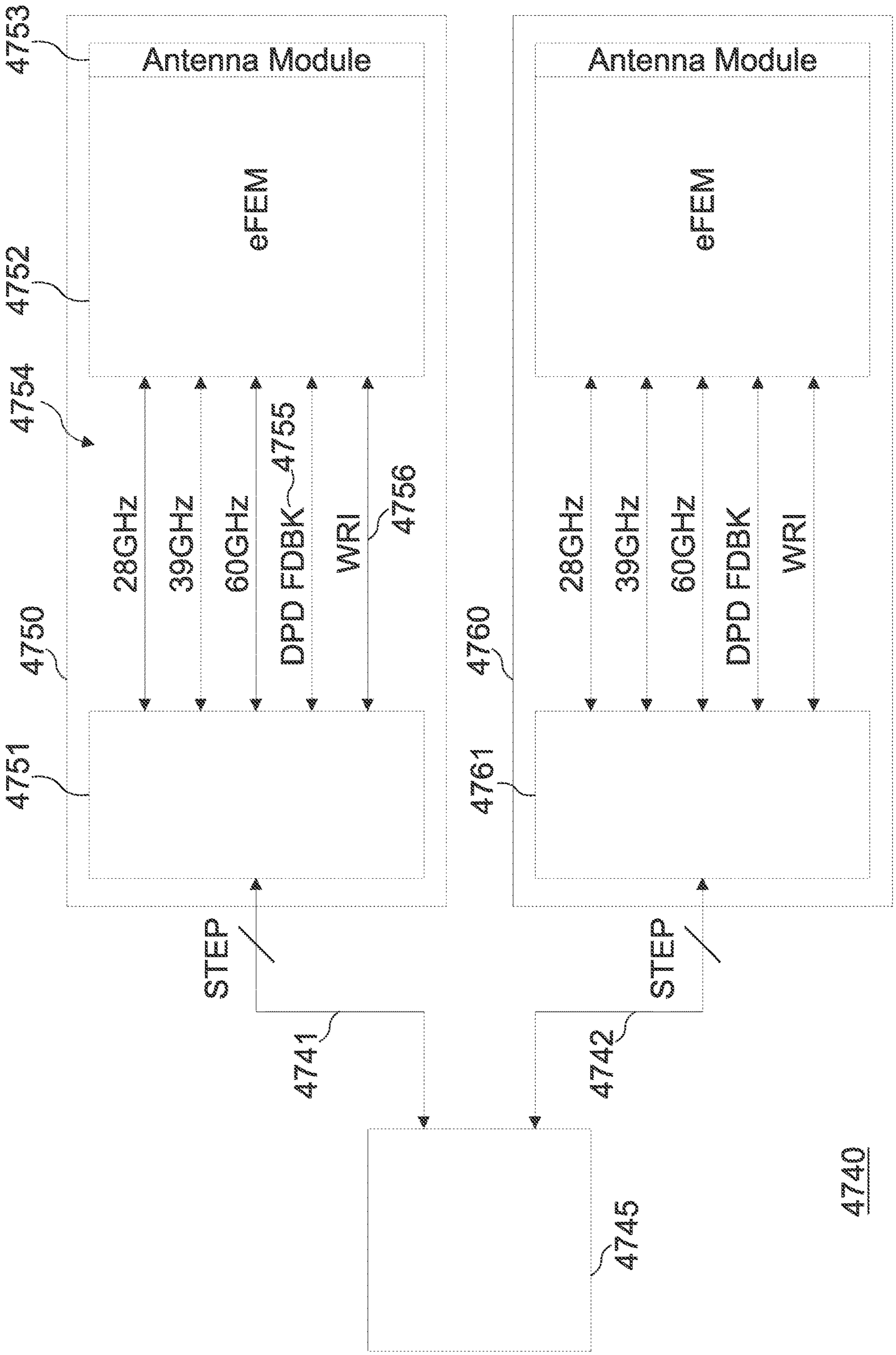
Figure 47D:
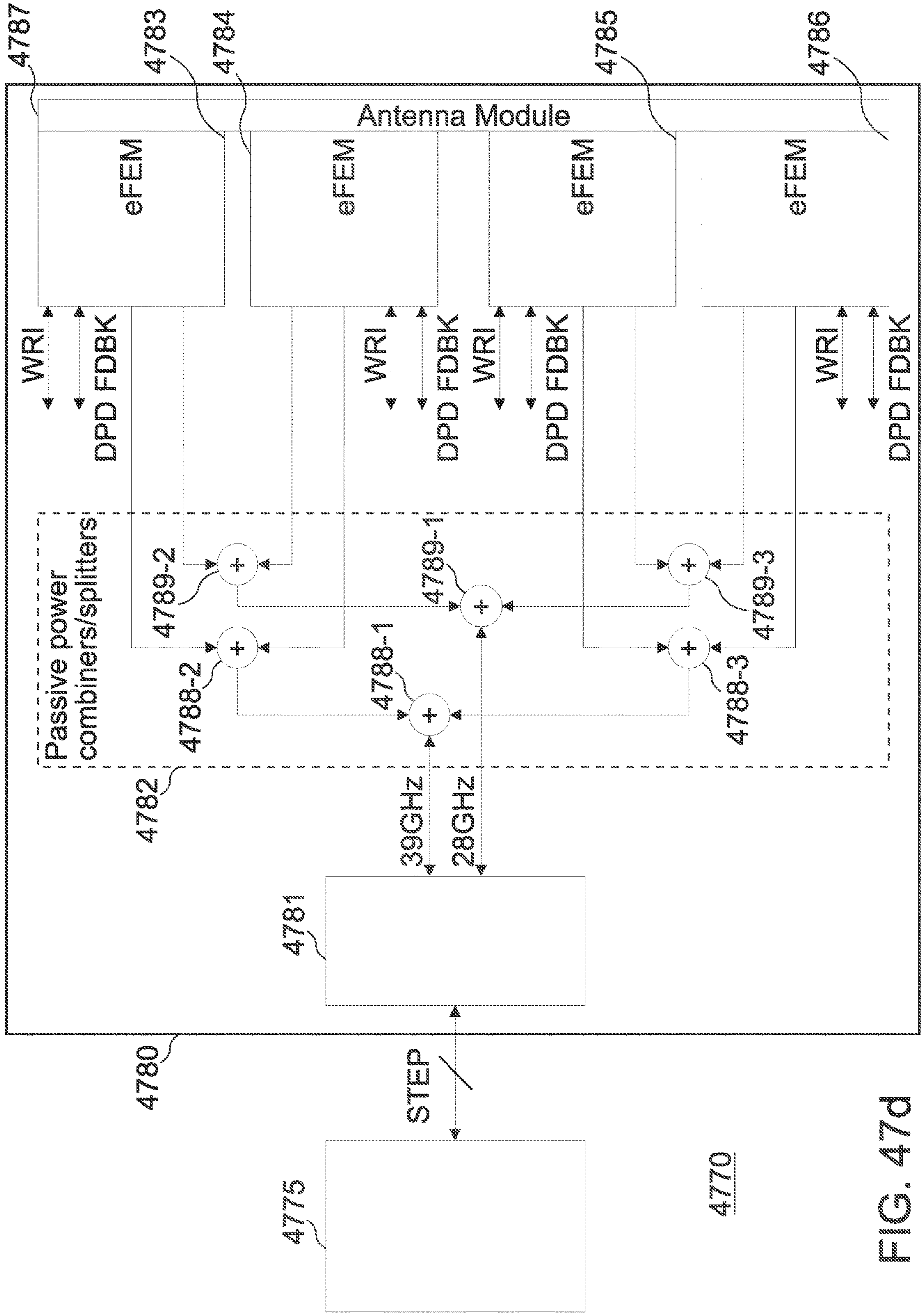
Figure 48A:
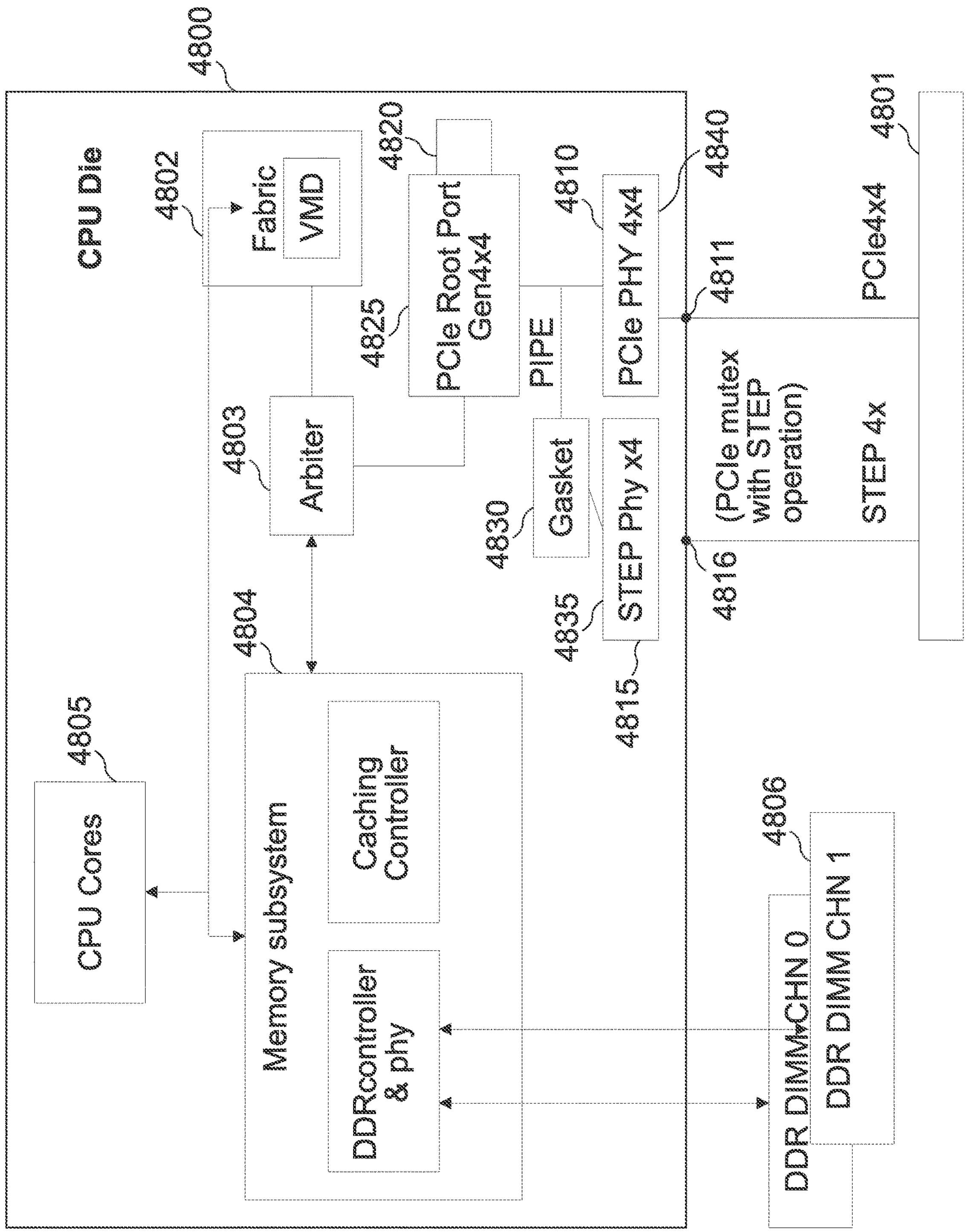
Figure 48B:
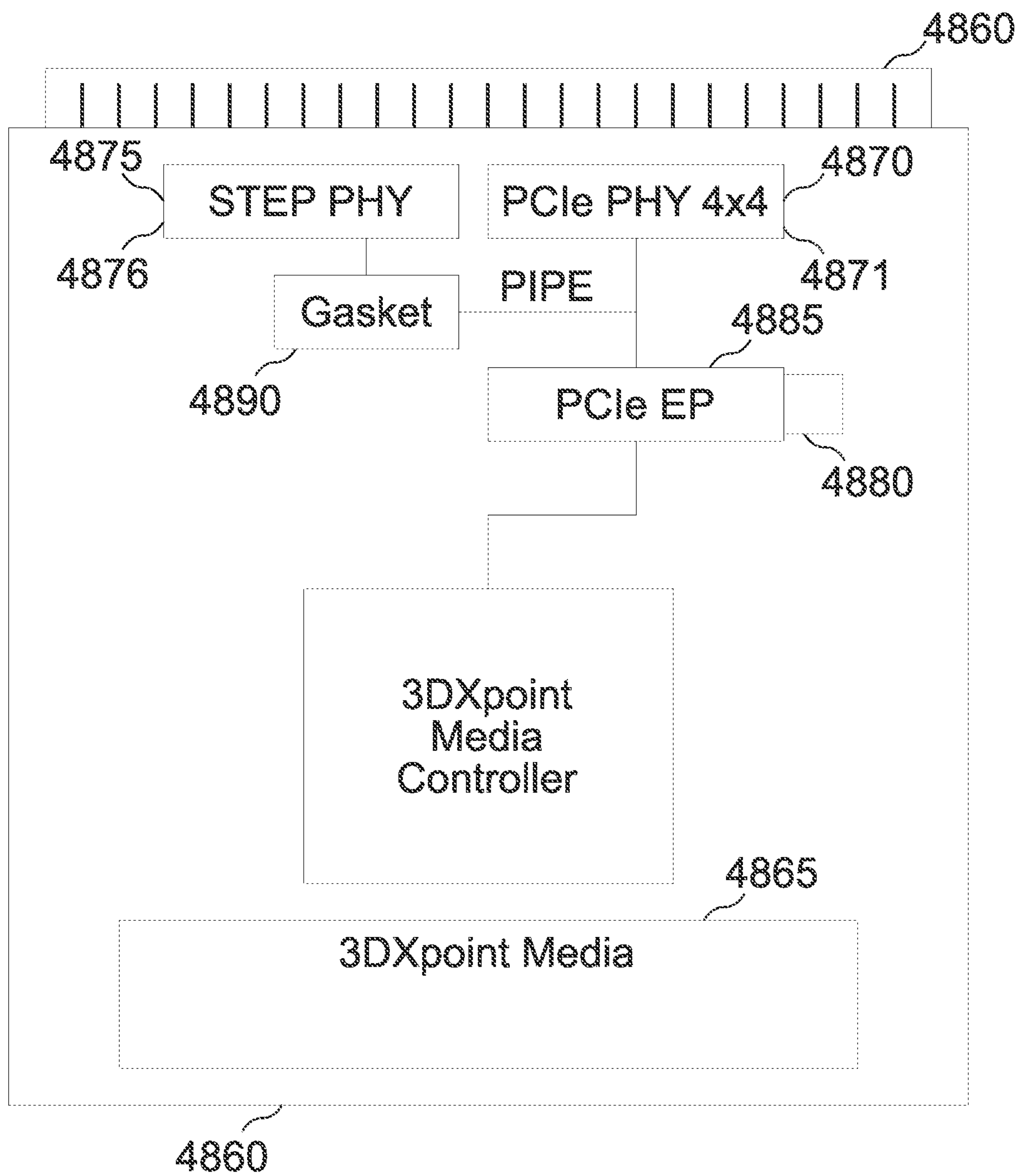
Figure 48C:
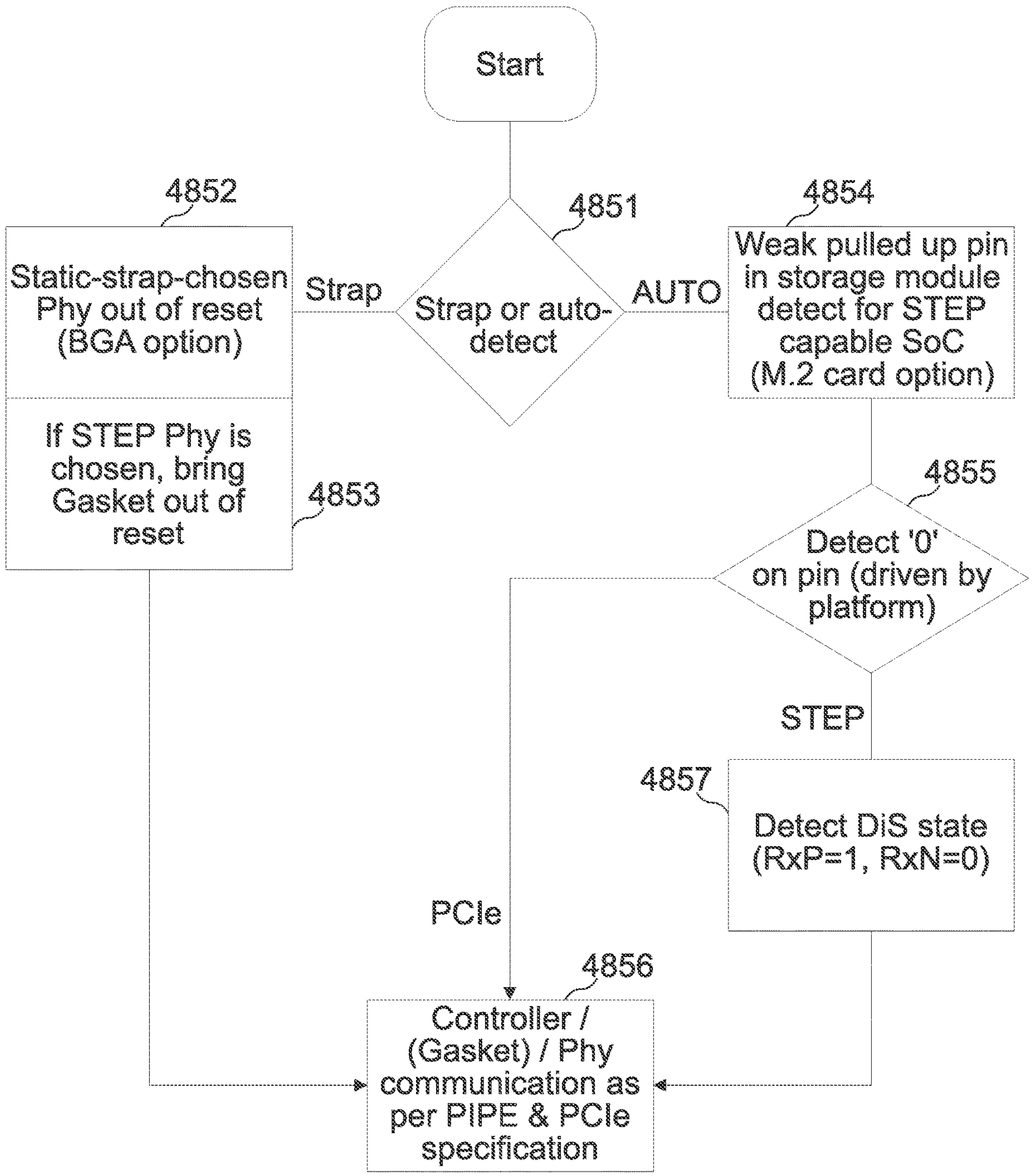
Figure 49:
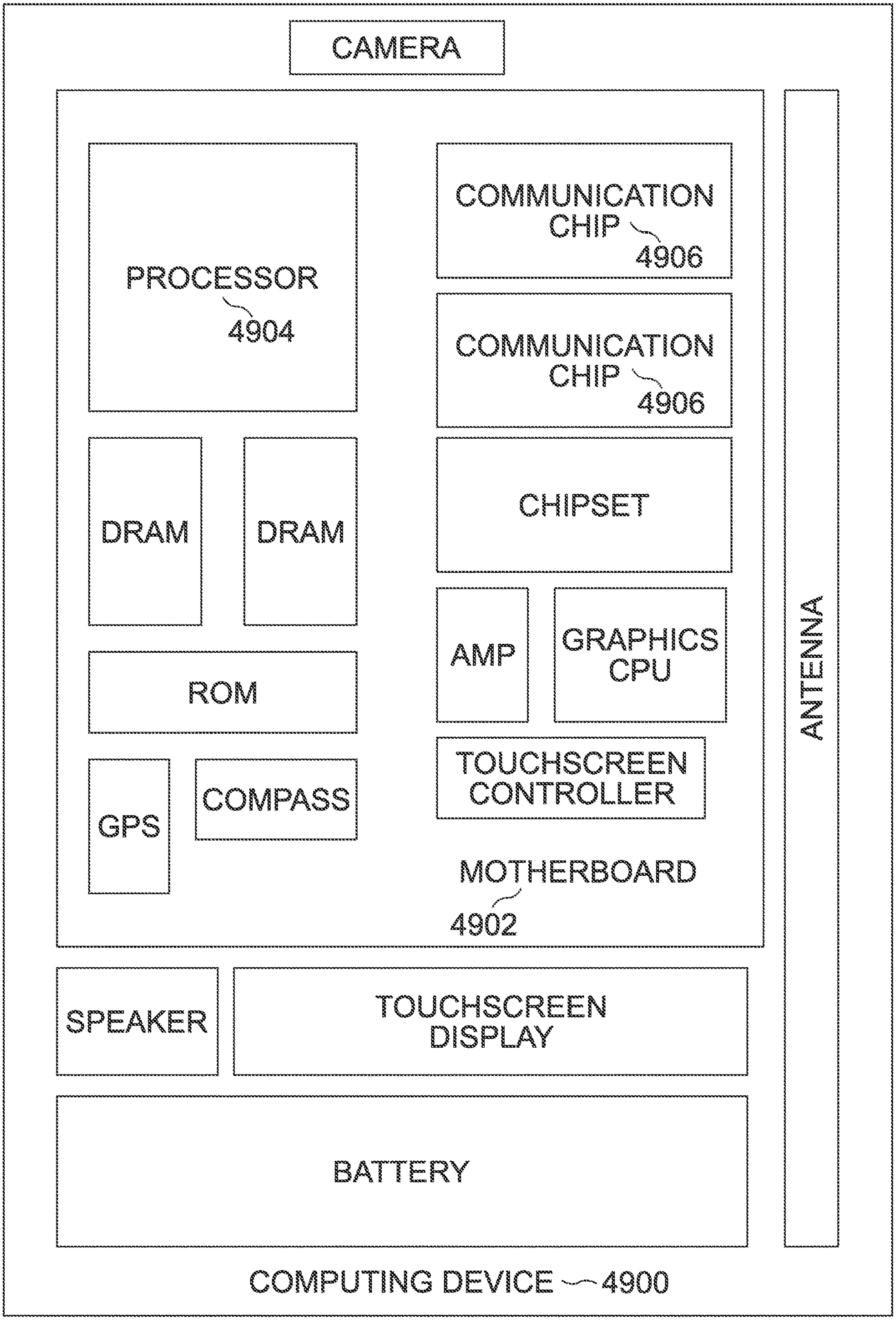

FIG. 36*e* illustrates an example of an interconnect comprising an apparatus for generating a data signal and an apparatus for processing a data signal;

FIG. 36*f* illustrates an example of an apparatus for processing a data signal;

FIG. 37*a* illustrates a first example of an apparatus for generating a data signal;

FIG. 37*b* illustrates a first example of an eye diagram;

FIG. 37*c* illustrates a second example of an eye diagram;

FIG. 37*d* illustrates a second example of an apparatus for generating a data signal;

FIG. 37*e* illustrates a conventional communication link;

FIG. 37*f* illustrates a comparison of a transmitted data signal and a received data signal;

FIG. 37*g* illustrates a flowchart of an example of a method for generating a data signal;

FIG. 37*h* illustrates a flowchart of another example of a method for generating a data signal;

FIG. 38*a* illustrates a model for inter symbol interference;

FIG. 38*b* illustrates a concept of pre-distortion;

FIG. 38*c* illustrates an example of a method to determine a time period between two signal edges using a time to digital converter with a coarse resolution;

FIG. 38*d* illustrates an example for scaling a time period between a series of subsequent signal edges within a data signal by a calibration factor;

FIG. 38*e* illustrates a model for reflection on an interlink;

FIG. 38*f* illustrates an example of an impact of reflection on a data signal;

FIG. 38*g* illustrates an example of an apparatus for processing a data signal;

FIG. 38*h* illustrates an example of an apparatus for generating a data signal;

FIG. 38*i* illustrates an example for three repetitions of a series of payload data symbols used for calibration;

FIG. 39*a* illustrates an example of an apparatus for generating a data signal;

FIG. 39*b* illustrates an example of a data stream comprising a sequence of a control symbol indicator, a control symbol indicating a series of calibration symbols, and a series of calibration symbols;

FIG. 39*c* illustrates an example of an apparatus for processing a data signal;

FIG. 39*d* illustrates an example of a method for generating a data signal;

FIG. 39*e* illustrates an example of a method for processing a data signal;

FIG. 40*a* illustrates an example of a method to calibrate variable delay elements;

FIG. 40*b*, broken into partial views 40*b*-1 to 40*b*-3, illustrates a TDC comprising variable delay elements;

FIG. 40*c*, broken into partial views 40*c*-1 and 40*c*-2, illustrates an example of a method to mutually calibrate time periods within a DTC and a TDC coupled to the DTC;

FIG. 40*d*, broken into partial views 40*d*-1 to 40*d*-3, illustrates an example of a TDC comprising variable delay elements;

FIG. 40*e* illustrates an example of a circuit to degrade jitter of a digital signal;

FIG. 41*a* illustrates an example of an electronic device;

FIG. 41*b* illustrates another example of an electronic device;

FIG. 41*c* illustrates a system comprising two coupled electronic devices;

FIG. 41*d* illustrates an example of a data cable;

FIG. 41*e* illustrates another example of a data cable;

FIG. 42*a* illustrates an example of a semiconductor package;

FIG. 42*b* illustrates an example of a semiconductor die;

FIG. 42*c* illustrates another example of a semiconductor package;

FIG. 43*a* illustrates an example of a data aggregation device for a vehicle;

FIG. 43*b* illustrates an example of a data processing device for a vehicle;

FIG. 43*c*, broken into partial views 43*c*-1 and 43*c*-2, illustrates an example of a vehicle;

FIG. 44*a* illustrates an example of an electronic device;

FIG. 44*b* illustrates another example of an electronic device;

FIG. 44*c* illustrates a further example of an electronic device;

FIG. 45*a* illustrates an example of a user device;

FIG. 45*b* illustrates an example of a base station;

FIG. 46*a* illustrates a first example of a radio system;

FIG. 46*b* illustrates a second example of a radio system;

FIG. 46*c* illustrates a third example of a radio system;

FIG. 47*a* illustrates a fourth example of a radio system;

FIG. 47*b* illustrates a mobile device;

FIG. 47*c* illustrates a fifth example of a radio system;

FIG. 47*d* illustrates a sixth example of a radio system;

FIG. 48*a* illustrates an example of a semiconductor die;

FIG. 48*b* illustrates an example of a storage device;

FIG. 48*c* illustrates a flowchart of an example of a method for selecting between different communication protocols; and FIG. 49 illustrates an example of a computing device.

DESCRIPTION OF EMBODIMENTS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Serial Time Encoded Phy (STEP) may be an interconnect that enables high throughput of 10's of Gb/s with low power requirements, e.g. at a bit efficiency of 1-2 pJ/bit. STEP uses time encoding to modulate digital pulses and transfer multiple bits for each signal edge present in a data signal transmitted via a transmission link of the interconnect. At the same time, the need for a separate clock lane or clock recovery circuit may be eliminated. The transmission link between a transmitter and a receiver of the STEP interconnect may be differential, using two separate transmission lines or it may be single ended using a single transmission line.

Figure 1A:
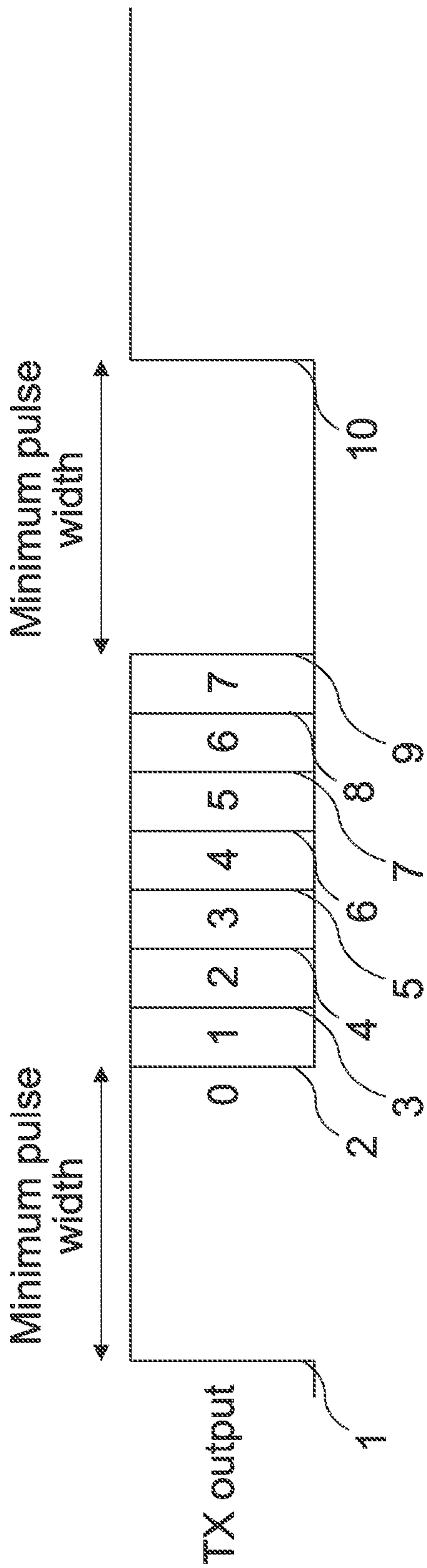
FIG. 1*a* illustrates a data signal interconnect.

For example, data is encoded by the time period between each pair of consecutive complementary signal edges (rising edge to failing edge or falling edge to rising edge) of the data signal in a STEP interconnect, as illustrated in FIG. 1*a*. In the example of FIG. 1*a*, each signal edge represents 3 bits of payload data, as illustrated by means of eight possible pairs of rising and subsequent falling signal edges. A first portion of payload data is encoded by the time period (or time difference) between rising signal edge 1 and one of eight possible subsequent falling signal edges 2, 3, 4, 5, 6, 7, 8, and 9, allowing to encode 3 bits of data in the pair of consecutive complementary signal edges. Data encoded and transmitted by the time period between a pair of consecutive complementary signal edges is also referred to as symbol or data symbol. In the data signal illustrated in FIG. 1*a*, a first symbol is encoded by the time period between rising signal edge 1 and a select signal edge of falling signal edges 2 to 9.

The subsequent symbol is encoded by the time period between the select falling signal edge of the first data symbol and the subsequent rising signal edge 10. Assuming that the first data symbol was "7", encoded by means of rising signal edge 1 and falling signal edge 9, FIG. 1 illustrates the subsequent transmission of data symbol "0", encoded by the falling signal edge 9 and the rising signal edge 10, which are separated by only a minimum pulse width.

While the example of FIG. 1*a* illustrates an example with 3 bits of data per data symbol (time period between a pair of consecutive complementary signal edges), further examples may likewise use an arbitrary different number of bits per symbol, as for example 1, 2, 4, 5, or any other integer number. If each symbol represents an integer number of bits N, there exist $2^N$ possible time periods between subsequent signal edges. Further examples my also use an encoding scheme that does not correspond to an integer number of bits resulting in $2^N$ possible time periods but that uses any arbitrary number of possible time periods between subsequent signal edges, like for example 3, 5, 6, 7, or any other integer number.

For implementational reasons, there may be a minimum pulse width required between any pair of subsequent complementary signal edges, e.g. between rising signal edge 1 and the first possible falling signal edge 2, which is longer than the time difference between any pair of neighboring falling signal edges, such as for example between falling signal edges 2 and 3. The time difference between two possible neighboring signal edges of the same type may also be denoted symbol separation time. Alternative implementations may not require a minimum pulse width so that also symbol "0" would be encoded by a time period equaling the symbol separation time.

As illustrated in FIG. 1*a*, a data signal transmitted in a STEP interconnect can be characterized as comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

Alternatively, the data signal may be characterized to comprise three signal edges immediately succeeding each other, wherein a first time interval between a first signal edge of the three signal edges and a second signal edge of the three signal edges corresponds to a first transmit symbol, wherein a second time interval between the second signal edge of the three signal edges and a third signal edge of the three signal edges corresponds to a second transmit symbol.

Both of the previous characterizations for a data signal of a STEP interconnect may be used alternatively and whenever one of the characterizations is used, the other characterization may also be used instead.

Based on the previous considerations, examples for an apparatus capable to generate (e.g. within a transmitter) a data signal for a STEP interconnect (a STEP signal) may be characterized to comprise a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

Alternatively, an apparatus for generating a data signal may be characterized to comprise a processing circuit configured to generate the data signal, wherein the processing circuit is configured to adjust time periods between directly succeeding signal edges of the data signal based on respective data portions to be transmitted.

Both of the previous characterizations for a data signal of a STEP interconnect may be used alternatively and whenever one of the characterizations is used, the other characterization may also be used instead.

Optionally, an apparatus for generating a data signal may further comprise an output interface circuit configured to output the data signal.

Figure 1B:
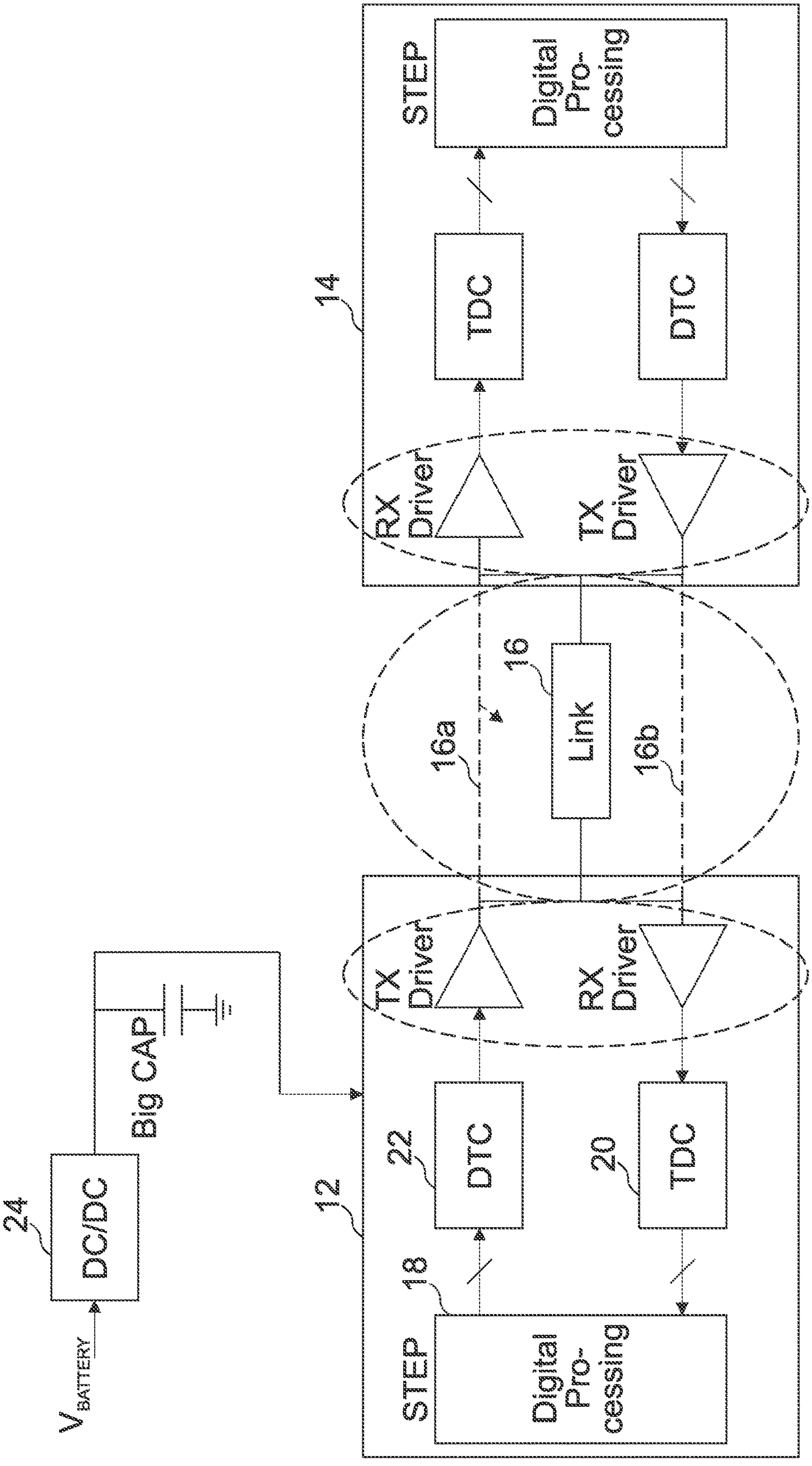
FIG. 1*b* illustrates a STEP interconnect.

FIG. 1*b* schematically illustrates an example of a STEP interconnect for bi-directional communication. In a bi-directional implementation, both STEP interfaces 12 and 14 communicating with each other are capable to transmit and to receive data signals. The STEP interfaces 12 and 14 may be connected by a single transmission link 16. The transmission link 16 may be operated in Time Division Duplex (Half Duplex) to enable bi-directional communication via a single transmission link 16. Alternatively, two transmission links 16*a* and 16*b* may be used for full duplex (dual simplex) communication, each connecting an output driver stage of one STEP interface to an input driver stage of the other STEP interface. A single transmission link may be single ended, using a single transmission line, or it may be differential, using two or more transmission lines. The STEP interfaces 12 and 14 and their associated transmission links constitute a STEP interconnect. In alternative examples, STEP interconnects may also be established for uni-directional communication.

Due to the identical architecture of both STEP interfaces 12 and 14, only STEP interface 12 will be discussed further. The STEP interface 12 comprises digital processing circuitry 18 for digital signal processing. In view of transmitting, digital processing may comprise modulating payload data into payload data symbols according to the STEP protocol. Further, digital processing may comprise to assign a time period to each payload data symbol and to optional further symbols used in a STEP implementation. In order to generate the data signal based on the assigned time periods, a Digital to Time Converter 22 may be used to generate the series of complementary signal edges in the data signal. A power amplifier may be coupled to the DTC 22 drive the transmission link.

For receiving data signals, STEP interface 12 comprises a low noise amplifier coupled to the transmission link 16 and a subsequent Time to Digital Converter 20 (TDC) to determine the time periods between two subsequent signal edges within the data signal. The TDC 20 determines a digital quantity for each time period between signal edges, which can be processed further within the digital processing circuitry 18. In view of receiving, digitally processing may comprise to assign a payload data symbol to each determined time period and to demodulate a payload data symbol to determine payload data.

A battery powered Voltage Converter 24 (DC/DV converter) may be used to provide the supply power for the STEP interface 12, while further examples my likewise be powered by AC power supplies. While FIG. 1*b* focusses on the components used within a physical layer controller of a data interface, further examples may also include processing of higher layers of the protocol stack, e.g. processing circuitry for Medium Access Control (MAC). In the event of a Physical Layer (PHY) Controller using a STEP interface, an input/output interface within the PHY Controller may serve to connect to a dedicated MAC Layer Controller.

Figure 1C:
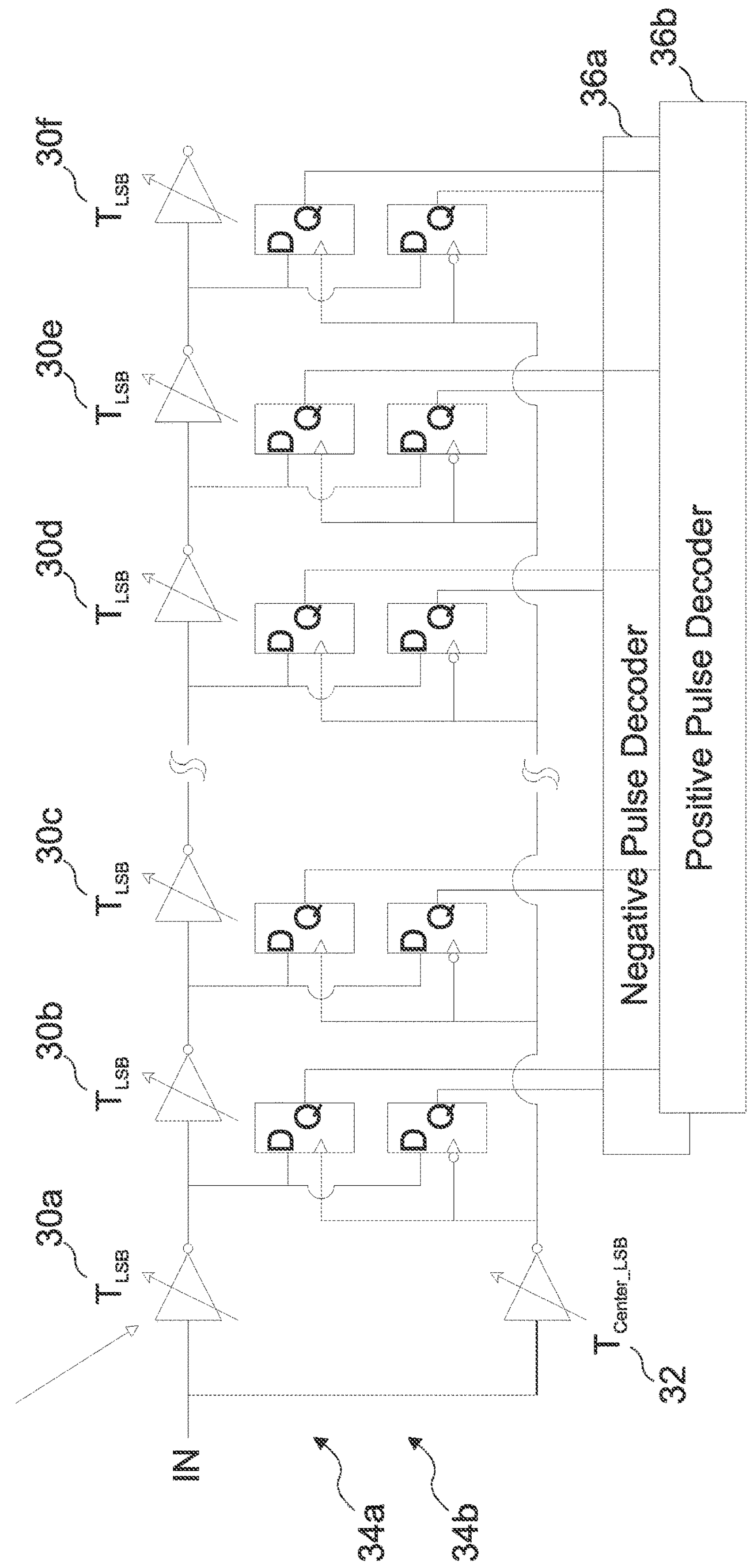
FIG. 1*c* illustrates an architecture of a Time to Digital Converter.

Some examples of TDCs used within a STEP interface may directly determine the time period between two subsequent complementary signal edges within the data signal. FIG. 1*c* illustrates an exemplary implementation of a Time to Digital Converter (TDC) determining the time period between two subsequent complementary signal edges (between rising and subsequent falling signal edges as well as falling and subsequent rising signal edges) within the data signal. The TDC determine the sequence of complementary signal edges comprising a first signal edge of a first type, a second signal edge of a second type, and a third signal edge of the first type within a data signal of FIG. 1*a* and measures the time periods between subsequent complementary signal edges.

The TDC schematically illustrated in FIG. 1*c* is implemented as a sequence of inverters 30*a* to 30*f*, each operating as a delay element. The delay introduced by each inverter may be fixed, while further implementation may also allow to individually tune the delay of the inverters. The data signal is input to first inverter 30*a* of the series and, simultaneously, to a triggering inverter 32. By each inverter, a signal edge present in the data signal is delayed, while the state of the signal changes (from high to low or vice versa). An output of each delay element 30*a* to 30*f* is coupled to an input of a first bank of edge triggered flip flops 34*a* and to an input of a second bank of edge triggered flip flops 34*b*.

All flip flops of both banks 34*a* and 34*b* are jointly reset by means of triggering inverter 32. However, the flip flops of the first bank 34*a* are triggered by positive edges, while the flip flops of the second bank 34*b* are triggered by negative edges. Using the setup, a first bank of flip-flops 34*a* outputs a signal when a negative signal edge is present within the data signal, while a second bank of flip-flops 34*b* outputs a signal when a positive signal edge is present within the data signal. However, the signal pattern at the output of the flip-flops of the first bank allows to conclude, how long ago the preceding positive signal edge was received within the data signal. In particular, the inverter having identical signal states at its output as well as at its input (as readout by means of corresponding flip-flops) may be indicative of the position of the preceding positive signal edge within the delay line and hence for the time period between the triggering negative signal edge and the preceding positive signal edge. Therefore, the readout of the first bank of flip flops 34*a* by a positive pulse decoder 36*a* allows to derive the time period in which the received data signal was in the high state and so provides the time period associated to a received symbol.

Likewise, negative pulse decoder 36*b* allows to derive the time period in which the received data signal was in the low state and so provides the time period associated to a received symbol. If the TDC of FIG. 1*c* receives a data signal as illustrated in FIG. 1*a*, the TDC determines a sequence of a first signal edge of a first type, a second signal edge of a second type, and a third signal edge of the first type. The first signal edge and the second signal edge are separated by a first time period corresponding to first data to be transmitted, and the second signal edge and the third signal edge being separated by a second time period corresponding to second data to be transmitted. The Pulse decoders 36*a* and 36*b* determine the time periods of the high and low pulses with a resolution given by the delays of the inverters 30*a* to 30*f* and allowing for a maximum length of a single time period (dynamic range of the TDC) depending on the overall number of inverters which results in the overall delay of the delay line.

Summarizing the previous considerations, examples for an apparatus capable to generate (e.g. within a transmitter) or to receive (e.g. within a receiver) a STEP signal may be defined as follows.

According to an example, an apparatus for generating a data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted; and an output interface circuit configured to output the data signal.

For example, the first type is a rising edge and the second type is a falling edge or the second type is a rising edge and the first type is a falling edge.

A sum of the first time period and the second time period may be lower than $1*10^{-7}$ s (or lower than $5*10^{-7}$ s, lower than $1*10^{-8}$ s or lower than $5*10^{-8}$ s).

For example, the processing circuit may be further configured to generate a second data signal, the second data signal being inverted with respect to the data signal.

The first data may be represented by a first data symbol and the second data may be represented by a second data symbol to be transmitted according to a data communication protocol.

For example, the apparatus may further comprise at least one Digital to Time converter configured to generate the data signal.

The output interface circuit may be configured to output the data signal to a wired transmission link composed of one or more transmission lines.

According to an example, an apparatus for receiving a data signal comprises a processing circuit configured to determine a sequence of a first signal edge of a first type, a second signal edge of a second type, and a third signal edge of the first type in the data signal. Further, the apparatus comprises a demodulation circuit configured to determine first data based on a first time period between the first signal edge and the second signal edge, and second data based on a second time period between the second signal edge and the third signal edge.

For example, the first type is a rising edge and the second type is a falling edge, or wherein the second type is a rising edge and the first type is a falling edge.

A sum of the first time period and the second time period may be lower than $10^{-7}$ s (or lower than $5*10^{-7}$ s, lower than $1*10^{-8}$ s or lower than $5*10^{-8}$ s).

The processing circuit may be further configured to receive a second data signal, the second data signal being inverted with respect to the data signal. Further, the processing circuit may be further configured to determine the first signal edge, the second signal edge, and the third signal edge further based on the second data signal.

A time period between 2 signal edges may correspond to a data symbol of a communication protocol.

The apparatus may further comprise at least one time to digital converter configured to determine the first time period and the second time period.

According to an example an apparatus for generating a data signal comprises a processing circuit configured to generate the data signal, the data signal comprising alternating signal edges of a first type and of a second type. The time periods between each subsequent pair of signal edges may correspond to data to be transmitted. A number of time periods per second may be higher than $1*10^{7}$ (or higher than $5*10^{-7}$ s, higher than $1*10^{-8}$ s or higher than $5*10^{-8}$ s).

A time period between two signal edges may correspond to a data symbol of a communication protocol.

The data signal may be a digital signal transmitted using a wired transmission link.

According to an example, an apparatus for generating a data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

According to an example, an apparatus for generating a data signal comprises a processing circuit configured to generate the data signal, wherein the processing circuit is configured to adjust time periods between directly succeeding signal edges of the data signal based on respective data portions to be transmitted.

Examples of STEP interconnects may implement multiple features to achieve implementation specific goals and to allow using an example of an interconnect for multiple use cases. Subsequently, some of those features will be described by means of independent examples. The various examples will be described in groups relating to different aspects of the interconnect.

The discussion will start with examples relating to the Physical Interface (Phy) and Algorithms used to run said interface, followed by examples relating to Medium Access Control (MAC) and Algorithms related thereto. Subsequently, examples relating to circuits to implement various functions of the interconnect are described. The subsequent section discusses examples related to calibrations of parts of the interconnect, followed by the discussion of examples related to specific architectural aspects of the interconnect. The discussion concludes with examples of different use-cases enabled by the interconnect.

Any of the subsequently disclosed examples may be combined with arbitrary aspects of the previously described examples of an apparatus for generating a data signal or of an apparatus for receiving a data signal In a STEP system, the Receiver (RX) may be "self-triggered", meaning that the clock needed to operate at least the PHY is derived from the data signal itself. Hence, there may be no need to pass a clock signal between the Transmitter (TX) and RX. The RX clocking is done by the received signal, which minimizes the number of lanes between the TX and the RX. Further, the power consumption is lowered since there is no need for a PLL or a CDR in the RX and the system latency is lowered since there is no need to wait until a PLL/CDR in the RX locks.

Figure 1D:
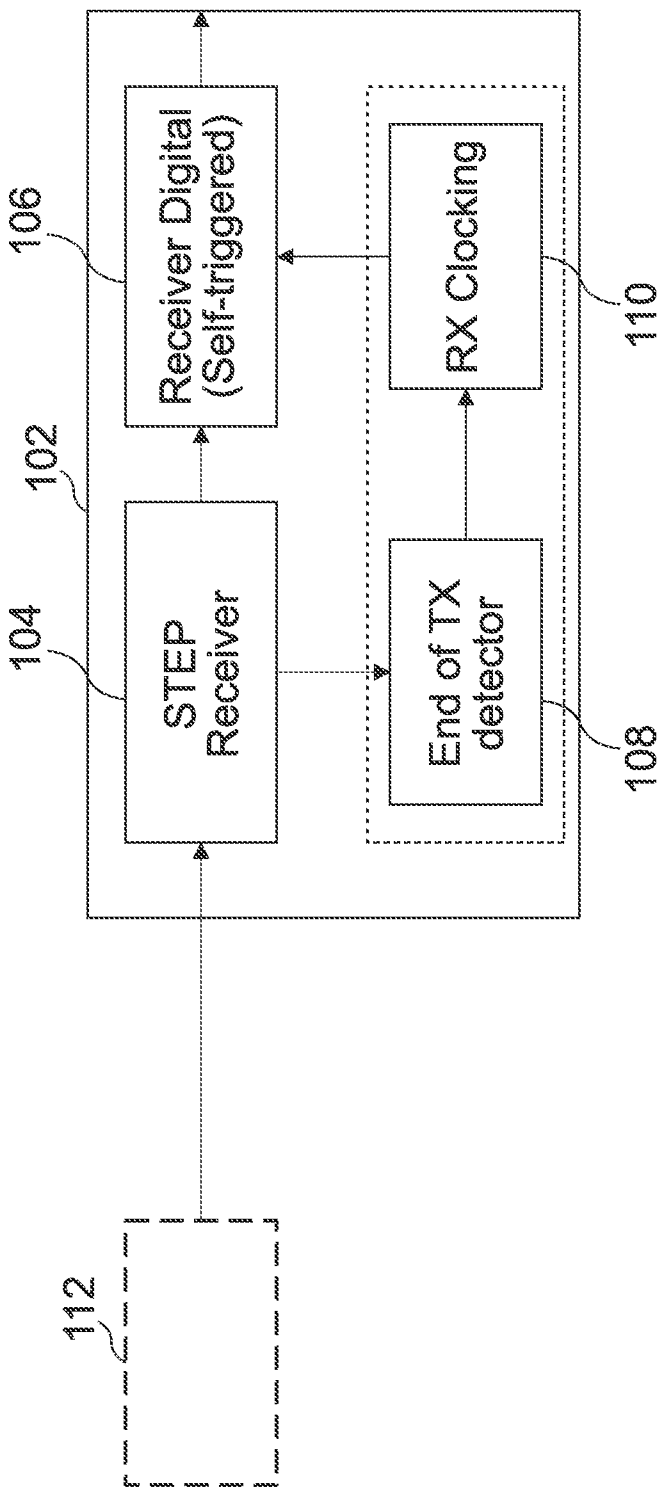
FIG. 1*d* illustrates an example of an apparatus for receiving a data signal.

FIG. 1*d* illustrates an example of an apparatus for receiving a data signal to be operated in a self-triggered receiver, as for example within a STEP-system.

The apparatus 102 comprises a demodulation circuit 106, a processing circuit 104, a detection circuit 108, and an oscillator circuit 110. The apparatus 100 receives a data signal as generated, for example, by a STEP-compliant transmitter 112, which is shown for illustrative purposes only in FIG. 1*a*. The demodulation circuit 106 is configured to demodulate a STEP-compliant data signal. If, for example, two data symbols are received, the demodulation circuit 106 determines first data based on and a first time period between a first signal edge and the second signal edge within the data signal, and second data based on a second time period between the second signal edge and a third signal edge of the data signal. The processing circuit 104 determines the sequence of the first signal edge of a first type, the second signal edge of a second type, and the third signal edge of the first type within the data signal. The processing circuit 104 may, for example, comprise a time-to-digital converter (TDC), which communicates the first and the second determined time periods to the demodulation circuit 106.

The detection circuit 108 is configured generate a trigger signal when no data is identified to be in the first data or the second data. The detection circuit 108 may be coupled to the demodulation circuit 106 or, as illustrated in FIG. 1, to the processing circuit 104. The detection may, for example, be performed by identifying one or several subsequent time periods that do not correspond to data. Alternatively, the detection circuit 108 may conclude that no data is transmitted if the processing circuit 104 does not determine a signal edge within the data signal for a predetermined period of time or if a specific pattern of subsequent complementary signal edges is received by the processing circuit 104.

Upon the trigger signal, the oscillator circuit 110 generates a clock signal. The clock signal may then be used to clock internal components within a receiver which are otherwise operated using a clock derived from the received data signal itself. The oscillator circuit 110 so allows to operate parts of the apparatus 102 even if no data is received by means of the data signal. The so generated clock signal may, for example, serve to further process data within the signal processing chain of a receiver or an apparatus 102 even though no more data is received by means of the processing circuit 104, eventually resulting in a lack of the self-triggered clock. Nonetheless, data already present within the signal processing chain can be processed up to the end of the signal processing chain using the clock signal of the oscillator circuit 110 so as to assure that all data received can be forwarded to higher protocol levels of a receiver, such as for example to the MAC-layer. Using an apparatus 102 with a detection circuit 108 and an oscillator circuit 110 may enable a STEP-receiver to derive the clock from the data signal itself without the risk of losing data at the end of a transmission. According to some examples, the data to be missing in the data signal may be payload data.

In summary, the instantaneous rate of data over the data link is data dependent, since STEP uses a time modulated signal generated by a digital-to-time converter (DTC) and received via a TDC. The TDC data processing circuits are operating using the instantaneous CLK generated by the TDC received data. This is a highly valuable feature, since the STEP RX may be self-triggered and not requiring a CLK/PLL/CDR. Once the TX ends sending payload data symbols or the data signal, payload data that is residing in components of the RX "pipe-line" might not be processed further since the clock signal to operate the components could be missing. This may, for example, result in the data being unable to reach the MAC. As long as the STEP receives data, the demodulation circuit (receiver), using its own generated CLK, may deliver the received symbols to a First-In-First-Out (FIFO) circuit for further processing (which may, e.g., serve as a rate converter to operate at two clocks, being filled with a rate of a TDC within the PHY and being read out with a second rate of a second clock used within the MAC layer). Once the payload data stops (e.g. at the end of a packet), a TDC would stop generating the CLK signal and the data samples between the TDC output and the FIFO input may not be passed or processed further any more, which is avoided using an apparatus 102 as illustrated in FIG. 1*a*. FIG. 1*a* presents a first example in which we propose to detect the end of transmission in the RX PHY layer and generate synthetic CLKs to pass the data from the TDC output to the FIFO input. Performing this operation in the PHY layer (and, for example, not in the MAC) minimizes the latency of the link.

Figure 1E:
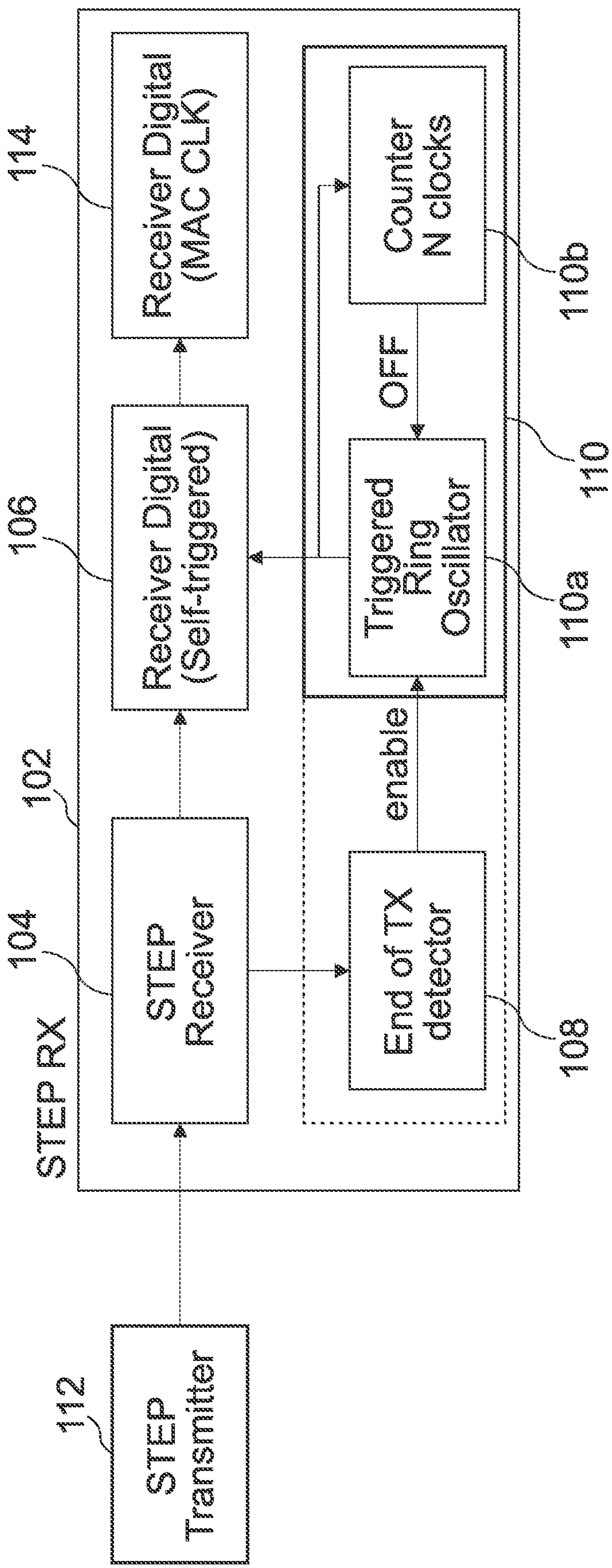
FIG. 1*e* illustrates a further example of an apparatus for receiving a data signal.

FIG. 1*e* illustrates a further example of an apparatus for receiving a data signal sharing multiple components with the apparatus illustrated in FIG. 1*a*. In the particular example of FIG. 1*e*, the oscillator circuit 110 comprises a ring oscillator 110*a* as well as a counter 110*b*. Upon the trigger signal, the ring oscillator starts to oscillate while the counter 110*b* counts every oscillation. After a predetermined number of oscillations, the counter 110*b* stops the ring oscillator 100*a* from oscillating. FIG. 1*e* illustrates a particular example of an oscillator circuit generating a clock signal that comprises a predetermined number of oscillations only. This may be a beneficial implementation if the number of processing operations within the self-triggered processing pipeline of the apparatus 102 is well determined. Only the required number of oscillations for emptying the pipeline are generated by means of the oscillator circuit 110 so that no energy needs to be wasted on oscillations that are known to be unnecessary a priori.

Further to the example of FIG. 1*d*, the apparatus 102 of FIG. 1*e* comprises a MAC-interface 112 configured to transfer payload data from the PHY-Layer to the MAC-layer. According to some examples, the MAC-interface comprises an asynchronous FIFO to interface between different clock domains of the PHY and the MAC. While no more payload data is received at the PHY, the FIFO is filled using the clock signal generated by the oscillator circuit 110.

According to further examples, the apparatus 100 to may comprise at least one data processing circuit other than the FIFO operated using the clock signal of the oscillator circuit 110, which is used as a particular example for clocked processing circuits only.

According to some examples, the detection circuit is configured to identify an End of Packet symbol (EOP) within the data signal and to generate the trigger signal upon identification of the End of Packet symbol. Such a configuration allows to securely empty the signal processing pipeline within a receiver after reception of each data packet (which is indicated by the EOP), further allowing to enter a lower power state of the receiver after each EOP. In other words, the synthetic CLKs are generated after End of Packet (EOP) detection. The detection circuit 108 serves as an EOP detection block enabling a triggered ring oscillator. The CLK generation is limited to N cycles by means of counter 110*b*. The N cycles may be predetermined to the maximum number of required cycles for the worst scenario.

Figure 1F:
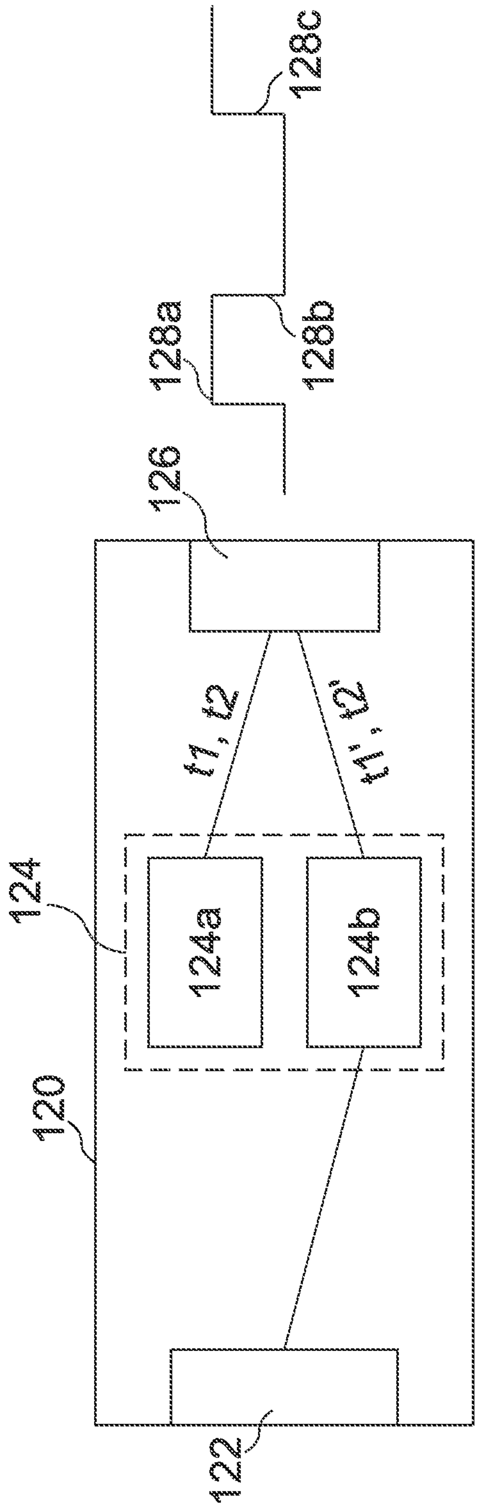
FIG. 1*f* illustrates an example of an apparatus for generating a data signal.

FIG. 1*f* illustrates an example of an apparatus for generating a data signal 120 in which the clock signal required to appropriately enable operation of a self-triggered receiver at the end of a transmission is generated within a transmitter. The apparatus 120 comprises an input interface 122 for payload data and a processing circuit configured to generate the data signal which is output by means of output interface 126. The generated data signal comprises a first signal edge 128*a* of a first type, a second signal edge 128*b* of a second type, and a third signal edge 128*c* of the first type. The first time period separating the first signal edge 128*a* and the second signal edge 128*b* and the second time period set separating the second signal edge 128*b* and the third signal edge 128*c* are generated differently by the processing circuit 124, depending on whether payload data is received at the input interface 122 or not.

If payload data is received at the input interface 122, the first time period is based on a first payload data symbol and the second time period is based on a second payload data symbol depending on the payload received at the input interface 122. However, if no payload data is received at the input interface 122, the first time period is based on a first predetermined clock cycle time and the second time period is based on the second predetermined clock cycle time so as to include a clock signal into the data signal which may be used by the receiver to generate a clock signal for operating its internal components in the absence of payload data.

According to some embodiments, the processing circuit 124 may, therefore, comprise a memory 124*a* having stored therein the first predetermined clock cycle time and the second predetermined clock cycle time to provide an appropriate clock signal in the absence of payload data. To generate an appropriate data signal for payload data, the processing circuit 124 may, for example, comprise a modulator 124*b* which is configured to associate time periods with the received payload data samples according to the STEP communication protocol. The sequence of edges within the data signal may, for example, be generated using a Digital-to-Time converter (DTC).

Depending on the particular implementation, the first and second time periods generated in the absence of payload data may be identical, causing oscillations with a duty cycle of 50%, while alternate implementations may use different time periods. Further, the frequency of the oscillation generated in the absence of payload data does not need to be constant. To the contrary, and arbitrary number of time periods may be read from the memory to generate the data signal and the absence of payload data so that the data signal may comprise subsequent complementary signal edges separated by time periods varying according to the sequence of time periods read from the memory.

Figure 1G:
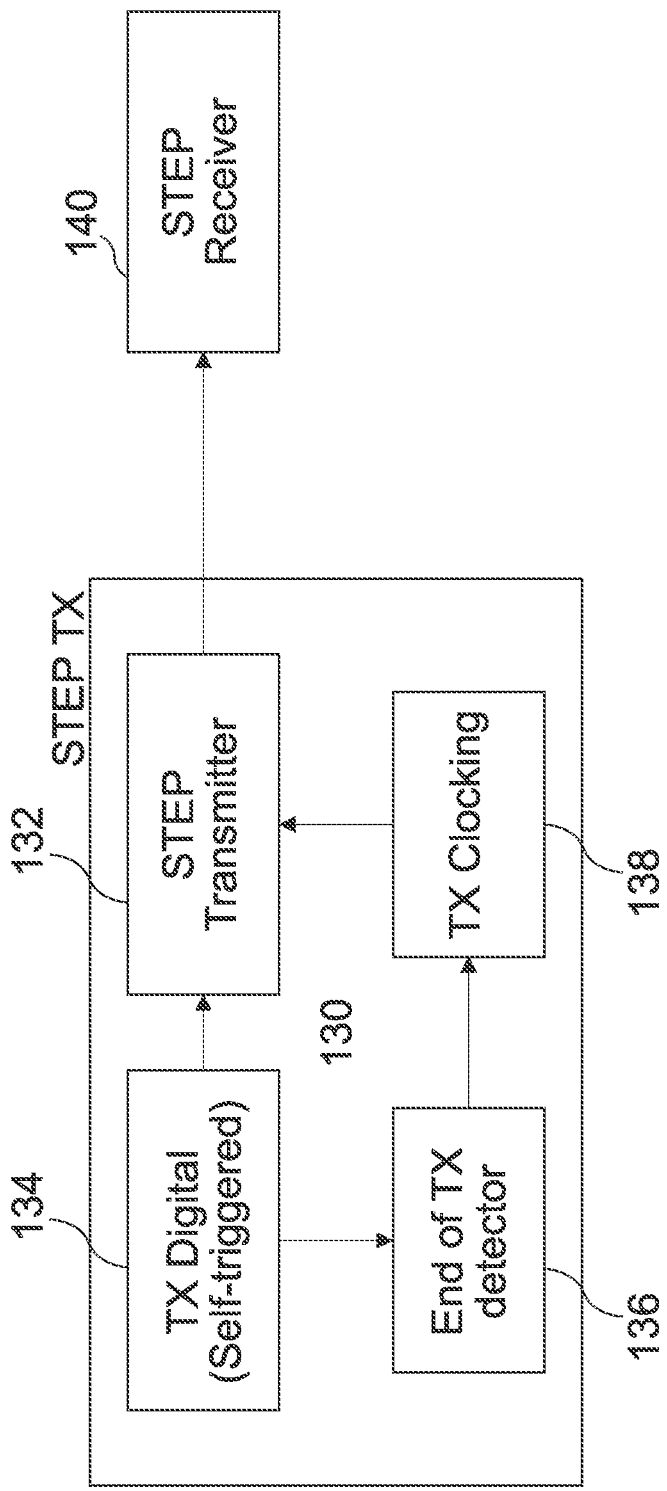
FIG. 1*g* illustrates a further example of an apparatus for generating a data signal.

According to a further example, the apparatus 120 may also comprise an oscillator circuit which is coupled to the output interface 126 in the absence of payload data, as illustrated in FIG. 1*g*. In the example of FIG. 1*g*, the apparatus for generating a data signal 130 comprises an output interface 132, a modulator 134, a detector circuit 136 and an oscillator circuit 138. A STEP-compliant receiver 140 is shown for illustrative purposes only. The modulator 134 generates the time periods between the subsequent signal edges based on the received payload data. The detector circuit 136 determines, when no more payload data is processed by means of modulator 134. If no more payload data is processed, the detector circuit 136 causes oscillator circuit 138 to start oscillating, making the output interface 132 to include the oscillations of oscillator circuit 138 into the data signal.

In other words, FIGS. 1*f* and 1*g* present examples in which the end of transmission is detected in the TX PHY layer which generates synthetic DATA or data symbols to be transmitted so that the RX can pass the data from the TDC output to the FIFO input. Performing this operation in the PHY layer (and not the MAC) minimize the latency of the link. The end of transmission is identified at the TX side (TX PHY) and synthetic data (not sent by the MAC) is generated to push the data in the pipe-line of the RX.

Figure 1H:
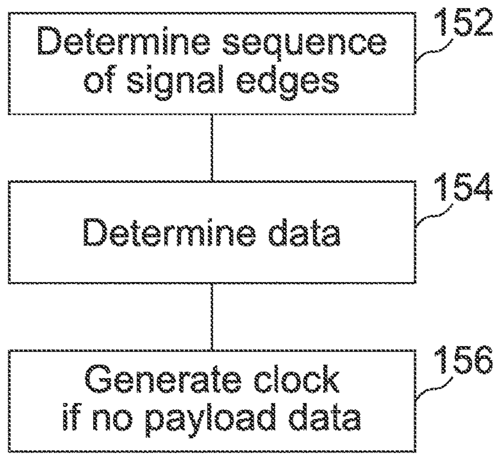
FIG. 1*h* illustrates a flowchart of an example of a method for generating a data signal.

Subsequently, the methods performed by any of the apparatuses discussed before are shortly illustrated by means of flowcharts. FIG. 1*h* illustrates a flowchart of an example of a method for generating a data signal. The method comprises determining 152 a sequence of a first signal edge of a first type, a second signal edge of a second type, and a third signal edge of the first type in the data signal. The method further comprises determining 154 first data based on a first time period between the first signal edge and the second signal edge, and second data based on a second time period between the second signal edge and the third signal edge. Further, the method comprises generating 156 a clock signal when no payload data is identified to be within the first data or the second data.

Figure 1I:
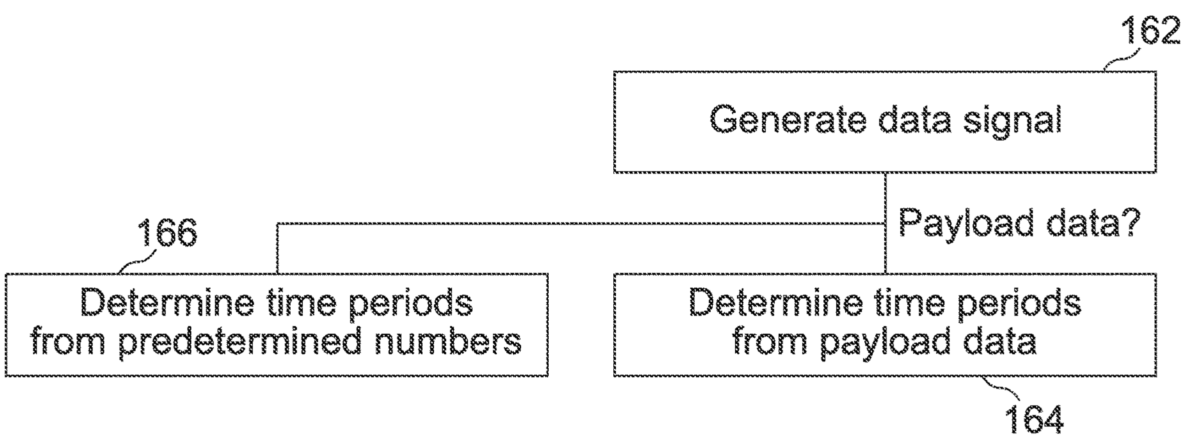
FIG. 1*i* illustrates a flowchart of an example of a method for receiving a data signal.

FIG. 1*i* illustrates a flowchart of an example of a method for receiving a data signal. The method comprises generating 162 the data signal, the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period. The method further comprises determining 164 the first time period based on a first payload data symbol, and the second time period based on a second payload data symbol when payload data is available; or determining 166 the first time period based on a first predetermined clock cycle time and the second time period based on a second predetermined clock cycle time when no payload data is available.

A differential interface may require to be connected with the right polarity at both ends of the transmission link to work right. If the transmission link is established by means of two separate transmission lines (e.g. Coax Wires), this requirement may cause crossing of the transmission lines to connect positive and negative with the right polarity on both sides. Crossing of transmission lines, in turn, may degrade signal quality, e.g. by crosstalk and, furthermore, consume more space which may be limited within an electronic device. Due to electrical properties, not all standard interconnects may allow flipping/crossing of transmission lines and by that limit the platform routing.

Some interconnects, as for example PCI express (PCIe), support polarity check. In PCIe, polarity check is triggered by the MAC which transmits a dedicated symbol called polarity at every recovery flow. Upon start of the so initiated polarity check, the interface performs a check of the polarity of the transmission lines of the differential transmission link using a dedicated message flow and flips its input, if required. Having a dedicated flow may complicate the system and increase the exit latency by transmitting a polarity pattern which doesn't include any data and furthermore requires a special symbol just for signaling the start of the flow. Not supporting a polarity check may further complicate the overall system which then requires good alignment between both sides. Platform routing may cause crossing of the traces causing degrading trace matching. For example, DPHY doesn't allow flipping between the positive and negative contacts of the differential transmission link at all. Implementing a polarity check on the link makes platform routing easier. Further, it may avoid crossing along the transmission lines to get a better line matching. It also does not require pre-adjustment up front to avoid crossing. It may be desirable to provide a polarity check for the transmission lines at a low overhead.

Figure 2A:
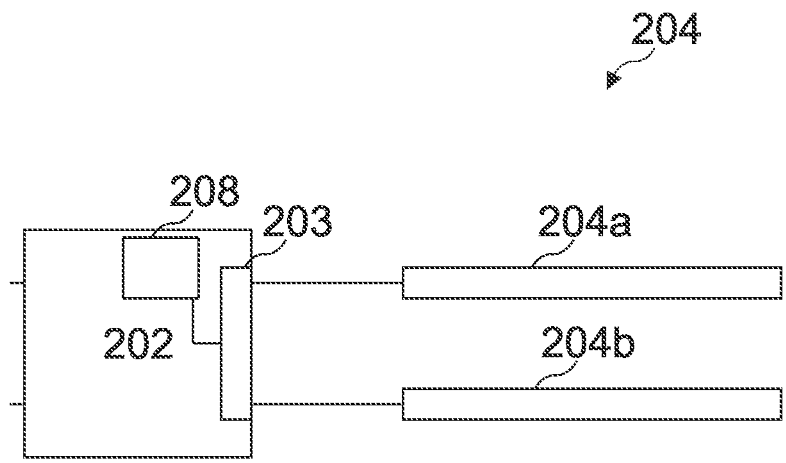
FIG. 2*a* illustrates an example of an apparatus for generating a differential signal pair.
Figure 2B:
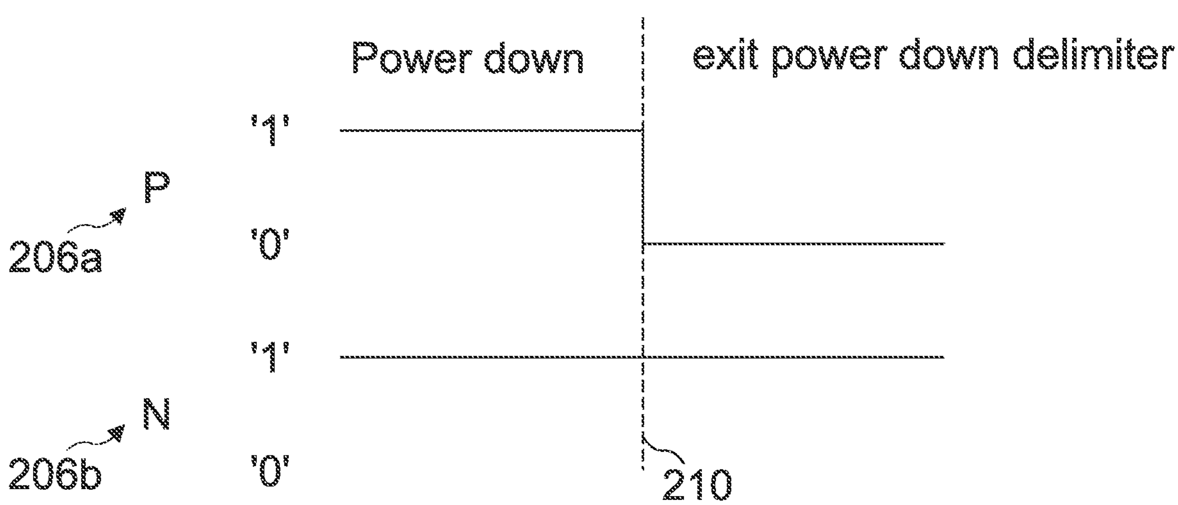
FIG. 2*b* illustrates an example of a differential signal.

FIG. 2*a* illustrates an example of an apparatus for generating a differential signal pair allowing to perform a polarity check at a receiving end of the transmission link. The apparatus 202 generates a differential signal pair for transmission over a transmission link 204 comprising two transmission lines 204*a* and 204*b*. An output interface circuit 203 of the apparatus 202 is configured to simultaneously supply a first signal of the differential signal pair to a first transmission line 204*a* of transmission link 204, and a second signal of the differential signal pair to second transmission line 204*b* of the transmission link 204. During normal operation, both the first signal and the second signal have complementary states, i.e. either the first signal is at a high state while the second signal is at a low state or the first signal is at a low state while the second signal is at a high state. For polarity detection, both signals may initially be at an identical state for some time. Signals being at an identical state for some periods of time may also be used to control power states of a receiver, as for example elaborated in more detail subsequently. FIG. 2*b* illustrates an example for a first signal 206*a* and a second signal 206*b* which may be generated to enable an associated receiver to determine the correct polarity of the transmission lines 204*a* and 204*b*. For the following discussion of the signals of the signal pair, it may be assumed that positive polarity is associated with the first signal 206*a* which is chosen for the first transmission line 204*a*. Of course, in further embodiments, positive polarity may also be chosen for the second transmission line 204*b*.

The first signal 206*a* and the second signal 206*b* are initially both at a first signal level, which is the high level in this particular example. In further examples, both signals may initially be at the low level, likewise. For enabling polarity detection, apparatus 202 further comprises a processing circuit 208 configured to change the signal level of the first signal 206*a* to a second signal level if the first signal 206*a* is of a first polarity. In the example illustrated in FIG. 2*b*, the high-level of signal 206*a* is switched to a low level at a time 210 so that the processing circuit 208 is configured to change the signal level of the first signal 206*a* to the second signal level by generating a falling signal edge in the first signal 206*a*.

Using an apparatus 202 as described above enables a receiver to correctly determine the polarity of both transmission lines 204*a* and 204*b* by determining already within the PHY which of the transmission lines exhibits the change in signal level. As already indicated above, the polarities of both transmission lines can be arbitrarily chosen, so that in an alternative example, the processing circuit 208 may also be configured to change the signal level of the second signal 206*b* to the second signal level, and to maintain the first signal 211*a* at the first signal level.

The polarity information may only be gathered after powering on the STEP interconnect and before the start of transmission of the first payload data. However, some examples may also maintain the STEP interface at a power saving mode when no payload data is to be transmitted after the initial powering on. To this end, the processing circuit 208 may also be configured to maintain (keep) the second signal 206*b* at the first signal level if the first signal 206*a* is of the first polarity until payload data is to be transmitted.

Having the polarity check implemented in the PHY according to one of the examples may reduce the exit latency of the System from a power saving mode dramatically. Polarity check also allows to support symmetric connectors that can be plugged in in both directions, which may be required in some solutions.

After indicating the polarities of the differential signal pair, the processing circuit may be further configured to submit payload data by generating one or both of the first signal 206*a* and the second signal 206*b* to comprise a sequence of a first signal edge of a first type, a second signal edge of a second type, and a third signal edge of the first type. The first signal edge and the second signal edge are separated by a first time period corresponding to first data to be transmitted, and the second signal edge and the third signal edge are separated by a second time period corresponding to second data to be transmitted.

For example, for the first transmission line, the first type of signal edge may be a rising edge and the second type may be a falling edge while the second transmission line receives the complementary signal edges, i.e. the first type is a falling edge and the second type is a rising edge for the second transmission line. Alternatively, the second type for the first transmission line may be a rising edge and the first type may be a falling edge.

In a STEP-system, a sum of the first time period and the second time period may, e.g., be lower than $10^{-7}$ s (e.g. $10^{-8}$, $10^{-9}$, $10^{-10}$, $10^{-11}$, or less second). In other words, in some examples of a STEP-system, a minimum or an average frequency of the data signal may be higher than 10 MHz (e.g. 100 MHz, 1 GHz, 10 GHz, 100 GHz, or more). The first data may, e.g., be a first data symbol and the second data may be a second data symbol to be transmitted according to a data communication protocol.

More details and aspects of apparatus 2100*a* are mentioned in connection with the proposed technique or one or more examples described above or below (e.g. FIGS. 2*a* to 2*i*). Apparatus 202 may comprise one or more additional optional features corresponding to one or more aspects of the proposed technique or one or more examples described above or below.

In summary, since STEP PHY layer may include two unique states (being part of power state flows also elaborated on subsequently): When the TX is powering down the RX, the RX outputs both P and N to high. When the TX exits power off mode it goes to idle or start of package, which forces P to low and N to high. The RX side can so determine the polarity using this information.

Figure 2C:
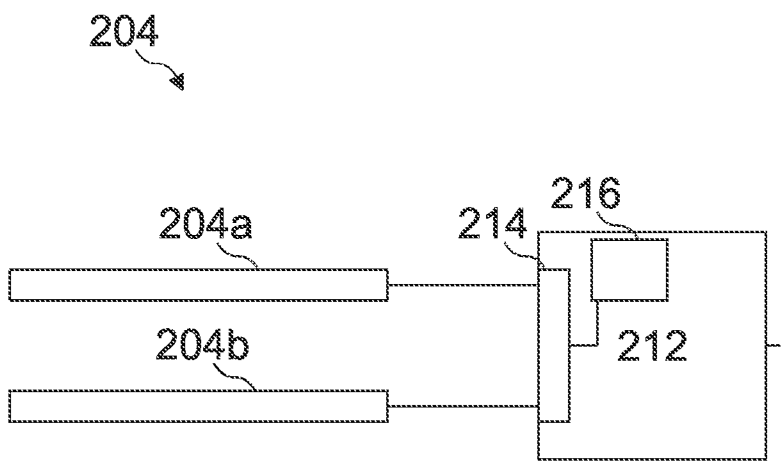
FIG. 2*c* illustrates an example of an apparatus for processing a differential signal pair.

FIG. 2*c* further illustrates an apparatus 212 for processing a differential signal pair which may, for example, be used within a STEP Receiver. Apparatus 212 comprises an input interface circuit 214 configured to simultaneously receive a first signal of the differential signal pair from a first transmission line 204*a* of a transmission link 204, and a second signal of the differential signal pair from a second transmission line 204*b* of the transmission link 204. The first signal and the second signal are initially both at a first (logical) signal level (e.g. high or low). Apparatus 212 further comprises a processing circuit 216 configured to determine that the first signal is of a first polarity if the signal level of the first signal changes (from the first signal level) to a second signal level. Determining that the first signal is of the first polarity may be equivalent to determining that the first transmission line 204*a* is the one which is used for transmitting the signals of the first polarity so that the apparatus 212 or a corresponding receiver can be configured appropriately. Using the example signals illustrated in FIG. 2*b*, the apparatus 212 determines that the first transmission line 204*a* is used for positive polarity if the first signal 206*a* received via first transmission line 204*a* changes its signal level from high to low while the second signal 206*b* maintains the signal level at high. In other words, the processing circuit 216 may be further configured to determine that the first signal is of the first polarity if the second signal maintains (remains at) the first signal level. To this end, the processing circuit 216 may, e.g., be configured to determine that the first signal changes to the second signal level using a falling signal edge in the first signal.

In a further example, processing circuit 212 may be further configured to determine that the first signal is of a second polarity if the signal level of the second signal 212*b* changes to the second signal level, and if the first signal maintains (remains) at the first signal level.

Figure 2D:
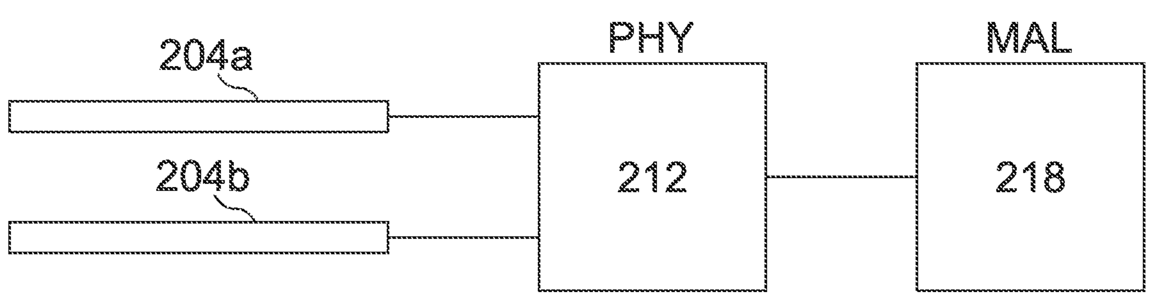
FIG. 2*d* illustrates a further example of an apparatus for processing a differential signal pair.

FIG. 2*d* illustrates a further example for an apparatus for processing a differential signal pair which is based on the example illustrated in FIG. 2*c*. In the example of FIG. 2*d*, the apparatus further comprises a further signal processing circuit 218. The further signal processing circuit 218 is implemented within the MAC layer, while the apparatus 212 is implemented within the PHY layer. FIG. 2*d* so illustrates that polarity detection using an example as described herein may be entirely implemented within the PHY layer, resulting in polarity detection causing very low latency upon start up or wake up of the system, since no MAC layer interaction is required.

Implementing the functionality in the MAC layer would require the PHY layer to fully wake up and the MAC layer to fully wake up before polarity detection can be performed. According to the examples described with respect to FIGS. 2*a* to 2*i*, however, polarity detection is automatically performed upon power up or wake up of the system as part of the wake-up procedure and, hence, with minimum latency and minimum signaling overhead.

In an example supporting the STEP protocol, apparatus 212 may further comprise circuitry two receive and process payload data between subsequent signal edges. In those examples, the processing circuit 212 may be further configured to determine a sequence of a first signal edge of a first type, a second signal edge of a second type, and a third signal edge of the first type based on at least one of the first signal and the second signal. Additionally, apparatus 212 may comprise a demodulation circuit configured to determine first data based on a first time period between the first signal edge and the second signal edge, and second data based on a second time period between the second signal edge and the third signal edge.

Figure 2E:
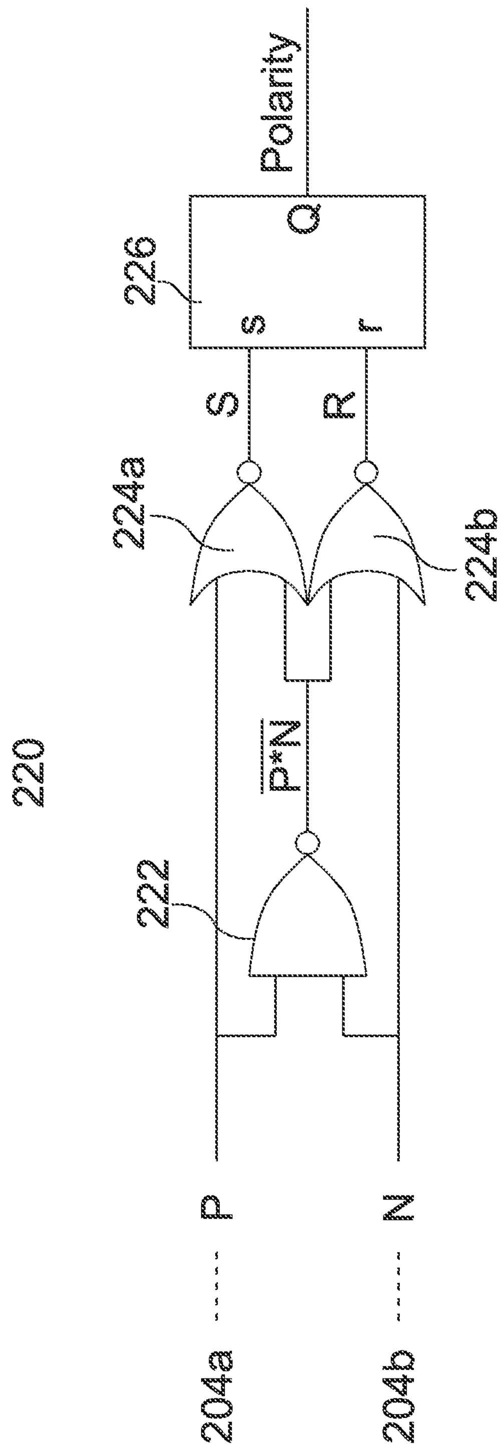
FIG. 2*e* illustrates an example of a processing circuit for determining a property of the differential signal pair.
Figure 2F:
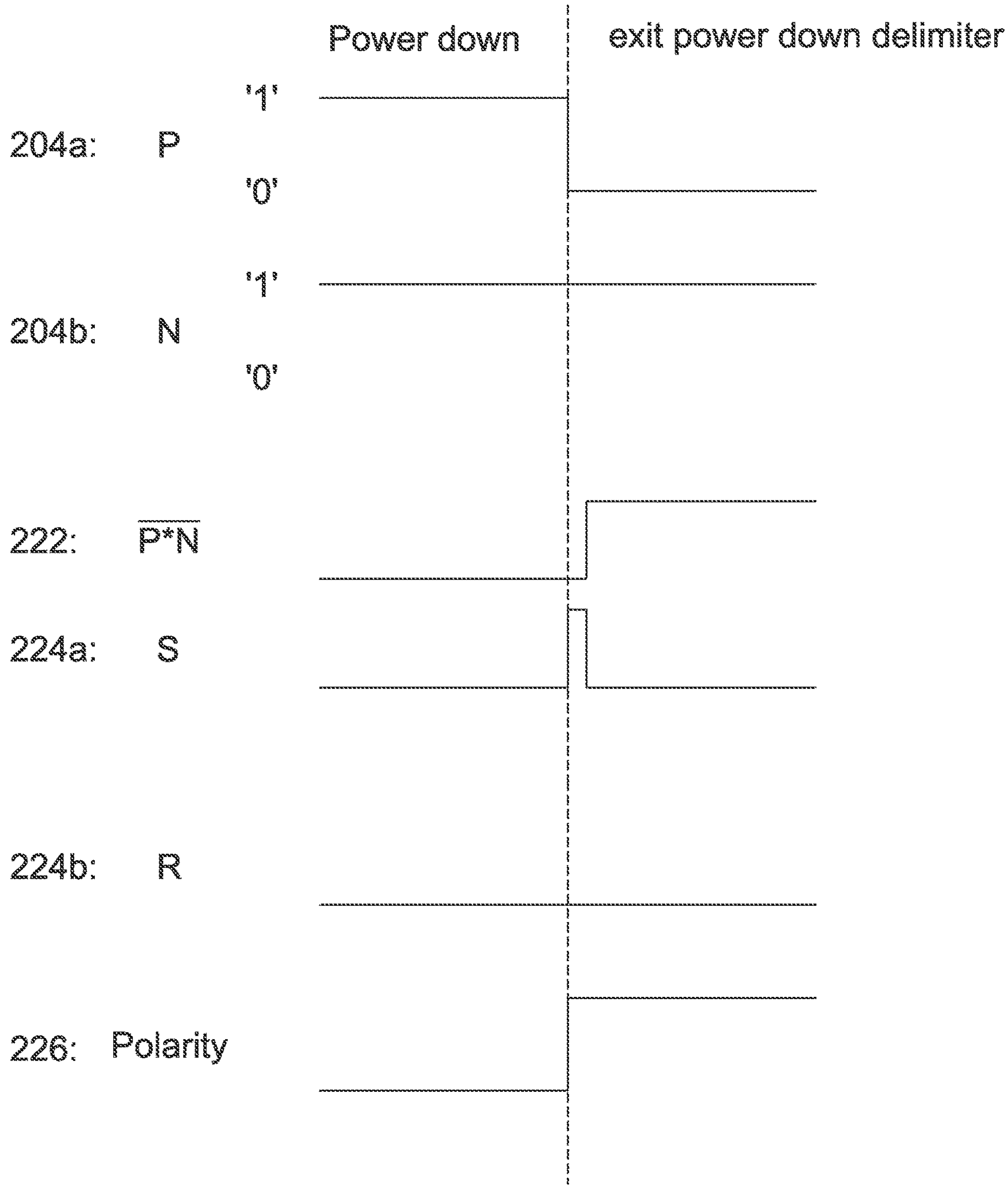
FIG. 2*f* illustrates an example of signals present within the processing circuit of FIG. 2*e;*

FIG. 2*e* illustrates an example for a processing circuit 220 for determining a property of the differential signal pair to enable polarity detection. FIG. 2*f* illustrates an example of signals present within the processing circuit of FIG. 2*e*. The following explanation of the functionality of the example illustrated in FIG. 2*e* relies on the signal flow illustrated in FIG. 2*b*. The processing circuit 220 comprises a NAND-gate 222 having inputs coupled to both transmission lines 204*a*, 204*b*. A first input of a first NOR-gate 224*a* is coupled to first transmission line 204*a*, while a second input is coupled to the output of the NAND-gate 222. A first input of a second NOR-gate 224*b* is coupled to the second transmission line 204*b*, while a second input of the NOR-gate 224*b* is coupled to an output of the NAND-gate 2 22. The output of the first NOR-gate 22 24*a* is coupled to a set-input of a latch 226. The output of the second NOR-gate 224*b* is coupled to a reset-input of latch 226. An output of latch 226 indicates the property of the differential signal pair, comprising the information which of the transmission lines is used for positive polarity.

As illustrated in FIG. 2*f*, once the signal on transmission line 204*a* (P-line) goes low first, the latch output is high which indicates the polarity on transmission line 204*a* is positive. If the transmission line 204*b* (N-line) goes low first, then the latch will output low which indicates that the polarity is negative and that the data needs to be inverted.

In the example of FIG. 2*e*, processing circuit comprises a NAND gate configured to generate a logic signal based on the first signal and the second signal. Further, processing circuit comprises a first NOR gate configured to generate a first decision signal based on the first signal and the logic signal, and a second NOR gate configured to generate a second decision signal based on the second signal and the logic signal. Processing circuit further comprises a flip-flop circuit configured to output, based on the first decision signal and the second decision signal, a polarity signal indicative of the polarity of the first signal.

Figure 2G:
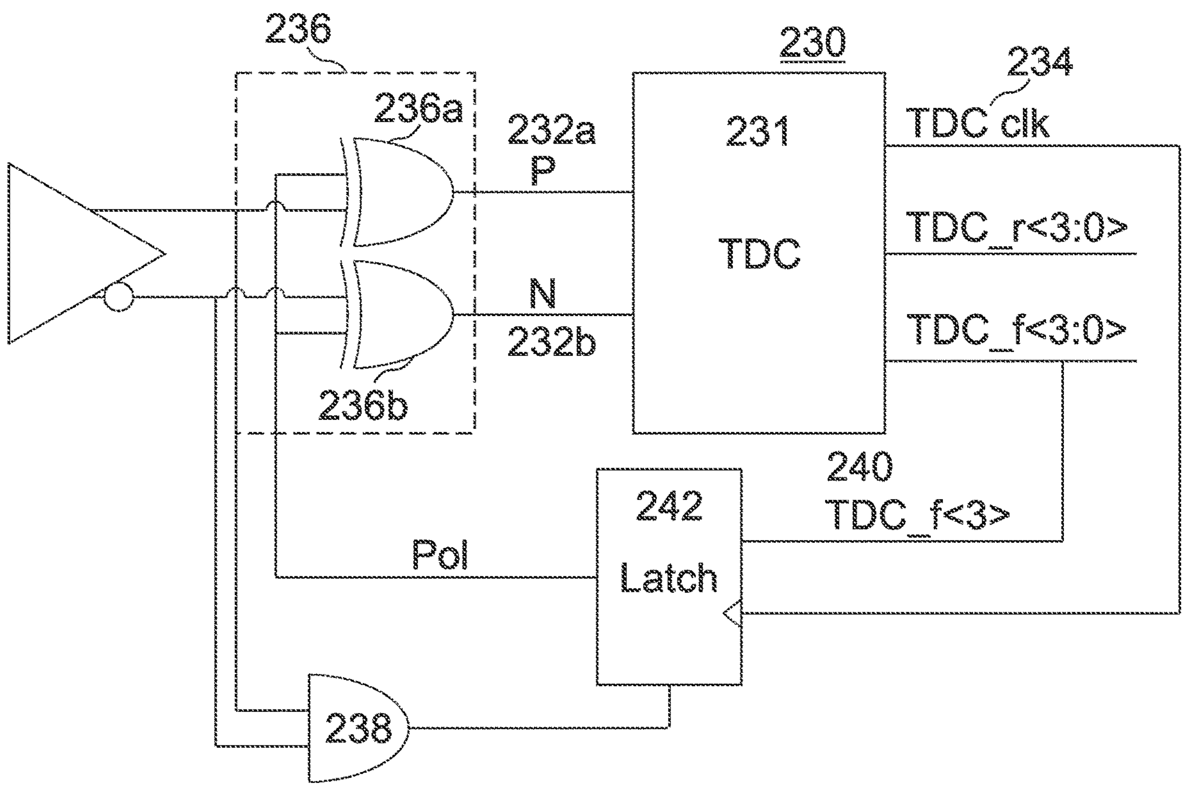
FIG. 2*g* illustrates a further example of a processing circuit for determining a property of the differential signal pair.

FIG. 2*g* illustrates a further processing circuit 230 which comprises a Time-to-Digital Converter (TDC) 231 configured to simultaneously sample the first signal 232*a* and the second signal 232*b* based on a reference clock signal. The TDC 231 is further configured to provide an information signal 240 indicative of the one of the first signal and the second signal that changes from the first signal level to the second signal level to decide if the first signal 232*a* and the second signal 232*b* are to be inverted. XOR Gates 236*a* and 236*b* serve as a signal swapping circuit which inverts both signals 232*a* and 232*b* simultaneously if a logic “1” is supplied to one of their two inputs while the other input is connected to the transmission lines. If a logic “0” is supplied, the signals are not inverted.

The logic “1” or “0” is supplied by a latch 242 which is active once both transmission lines are held at different levels, which is evaluated by means of AND Gate 238 coupled to both transmission lines. The latch 242 is enabled by the reference clock signal 234 and the information signal 240 is input to the data input of latch 242. In generating the information signal 240, the TDC is used as polarity detector. While the PHY is at power down, the TDC is not active and generates no clock. When the TX starts sending payload data (or other signals, such as for example a delimiter), the TDC 231 will get the first edge by the end of the first data (e.g. long pulse and then in its end there will be short pulse). By looking on the first signal edge of received data (e.g. a delimiter indication) and by determining whether a low or a high pules is received at a transmission line, it can be recognized if the corresponding transmission line is positive or negative polarity. Accordingly, it may be determined if the TDC inputs should be diverted and if so, the information signal 240 may be set to logic “1”.

As already indicated, if the polarity is determined to be different as required by a receiver, the processing circuit 230 may flip the first signal received via the first transmission line and the second signal received via the second transmission line to subsequently process the signals with the correct polarity.

To this end, the processing circuit may further comprise a signal swapping circuit 236 configured to receive the first signal and the second signal. The signal swapping circuit 236 is configured to provide one of the first signal and the second signal to a first input of the TDC 231 based on the information signal 240, and to provide the other one of the first signal and the second signal to a second input of the TDC based on the information signal.

In the example illustrated in FIG. 2*g*, flipping is performed logically by inverting both signals using XOR Gates. Further examples may use other signal swapping circuits, such as for example multiplexers to route the transmission lines to different inputs instead of inverting the signals of the transmission lines.

Figure 2H:
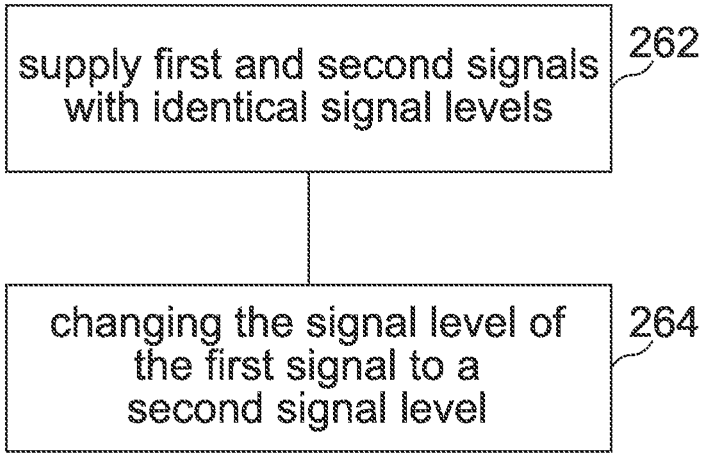
FIG. 2*h* illustrates a flowchart of an example of a method for receiving a data signal.

FIG. 2*h* illustrates a flowchart of an example of a method for generating a differential signal pair, comprising simultaneously supplying 262 a first signal of the differential signal pair to a first transmission line of a transmission link, and a second signal of the differential signal pair to a second transmission line of the transmission link, the first signal and the second signal initially being both at a first signal level. The method further comprises changing the signal level 264 of the first signal to a second signal level if the first signal corresponds to a first polarity.

Figure 2I:
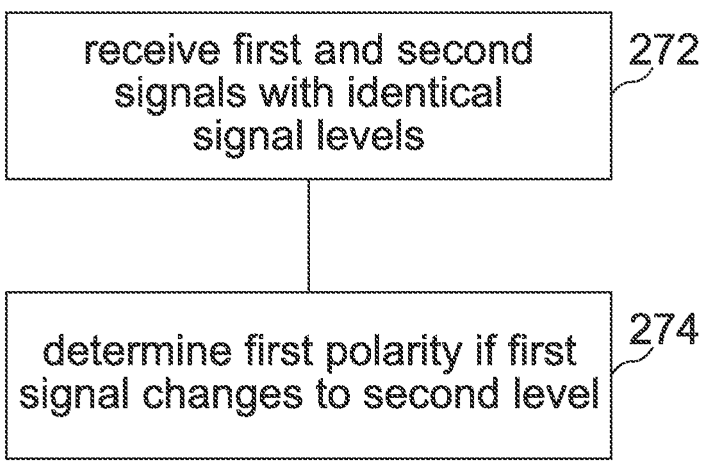
FIG. 2*i* illustrates a flowchart of an example of a method for generating a data signal.

FIG. 2*i* illustrates a flowchart of an example of a method for processing a differential signal pair, comprising simultaneously receiving 272 a first signal of the differential signal pair from a first transmission line of a transmission link, and a second signal of the differential signal pair from a second transmission line of the transmission link, wherein the first signal and the second signal are both at a first signal level. The method further comprises determining 274 that the first signal corresponds to a first polarity if the signal level of the first signal changes to a second signal level.

As indicated above, the present disclosure proposes a solution for interconnect dealing with differential lines polarity to avoid data misunderstanding caused by misconnection between the positive line and the negative line along the system routing. In order to do so, a mechanism in the PHY layer is proposed that can detect the polarity prior to the data so that the MAC layer will get the data correctly without having the need to deal with the polarity. The examples described previously may also be applied to a STEP interconnect.

Some examples of the proposed solution may use power state flows which are supported in STEP and add the polarity check on top of it and do not add an extra flow/symbol. In some STEP interconnects, when the PHY is at power off, the TX is in a high impedance (high-Z) state. The RX recognizes this as a state in which both lines (P and N) are at logic state '1', which is the only case when both transmission lines are maintained at equal signal levels. When the TX exits this state, it transmits a specific delimiter which indicates the RX to power on. This delimiter sets the P-line to high and the N-line to low, so that the RX sees one of the lines goes from logic state '1'→'0'. This line is set to be the positive and from now on the right polarity is known without MAC involvement.

That is, in some examples the polarity check is done in the PHY layer without any need for dedicated message flow from the MAC layer. There may be no need for extra symbol/delimiter in the PHY layer to support polarity check. Moreover, there may be no latency penalty for the polarity check if the TDC capabilities are used for determining the polarity of the link. For example, the procedure may be done once at power up. The determined value may be written to an always-on register. Alternatively, the procedure may be done at each power on of the TX (no need for extra HW support). The proposed technique may further support hot plugging: When no TX device is inserted, the RX is at power down state (both lines at logic state '1'), and when a TX device is plugged in, the TX sends the exit power down state with the right delimiter.

A STEP interface uses time encoding to modulate digital pulses and transfer multiple bits for each signal edge within a data signal (i.e. between a rising edge and a subsequent falling edge as well as between the falling edge and the subsequent rising edge) while eliminating the need for a clock lane or clock recovery circuit. The data is encoded in the time difference between subsequent edges, hence the instantaneous frequency of the data signal transmitted via the transmission link depends on the data itself. This might affect performance or cause buffer overrun/underruns at a receiver, e.g. if the average frequency becomes too high for an extended period of time due to the payload data to be sent.

Figure 3A:
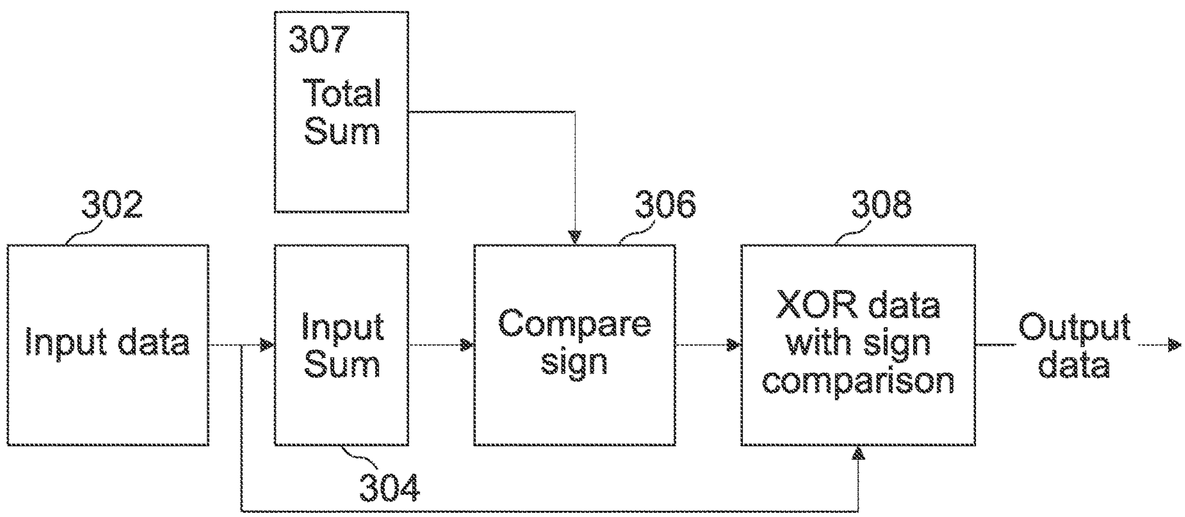
FIG. 3*a* illustrates an example of a method to generate a data signal that is based on a series of data symbols.

FIG. 3*a* illustrates an example of a method to generate a data signal that is based on a series of data symbols. FIG. 3*a* illustrates, by means of a block diagram, how a data signal which is based on a series of data symbols can be generated, maintaining desired signal properties or characteristics, irrespective of the data to be transmitted. Examples for desired signal properties will be given in one of the subsequent paragraphs. For illustrative purposes only, the method of FIG. 3*a* also shows receiving the series of data symbols 302, which is optional. Depending on the implementation, the method may also be performed based on the payload data before it is modulated into data symbols for transmission via a PHY interface. During signal evaluation 304, a deviation from the desired signal property is determined for a group of data symbols as a present deviation. The method may use the data symbols directly to calculate the deviation from the desired signal property for the group of data symbols or the calculation may be performed based on payload data on which the data symbols depend. For example, if data symbols are generated based on a series of data bits generated within the MAC layer, the calculation of the deviation may be performed based on the data bits before the data bits are modulated into the data symbols for transmission by the PHY layer. Modulation assigns a number of bits to a single symbol, the symbol being transmitted over the PHY interface. Some example of STEP interfaces, for example, modulate 3 bits of data into a data symbol.

The method further comprises comparing 306 the present deviation with an accumulated deviation 307, the accumulated deviation being based on preceding data symbols of the series of data symbols. The accumulated deviation 307 may, for example, be stored in a memory or the like. A group of transmit symbols are generated during a transformation 308. The group of transmit symbols is generated such that it comprises an inverted data symbol for every data symbol of the group of symbols if both the present deviation and the accumulated deviation have an identical property (e.g. an identical sign). If the present deviation and the accumulated deviation have a different property, the group of transmit symbols is generated incorporating the data symbols themselves. In determining, for individual groups of data symbols, as to whether a deviation from the desired signal property has an identical property (is similar to) than an accumulated deviation determined for preceding data symbols allows to change the data symbols within the individual groups such that, on average, the desired signal property is maintained within the generated data signal. Depending on how the deviation from the desired signal property is determined, different average characteristics or properties of the data signal can be maintained or controlled. Subsequently, it will be detailed, as to how an average frequency and/or an average common mode of a data signal on a transmission link of a STEP-interface can be maintained according to an example of a method.

Figure 3B:
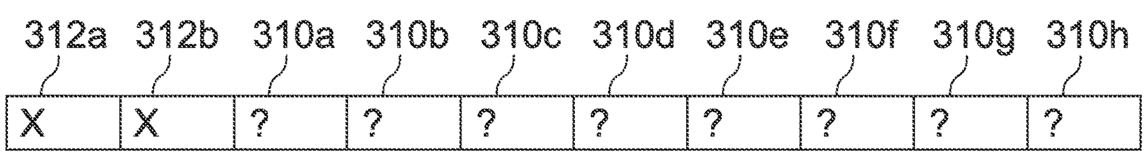
FIG. 3*b* illustrates an example of a series of transmit data generated by the method of FIG. 3*a;*

FIG. 3*b* illustrates an example of a group of transmit symbols which may be generated by a method as described herein. FIG. 3*b* illustrates a series of eight payload data symbols 310*a* to 310*h*. The group of transmit signals further comprises two status symbols 312*a* and 312*b*. At least one of the status symbols indicates, as to whether the group of transmit symbols comprises inverted symbols are not, allowing a receiver to correctly determine the payload data transmitted within the data signal. The status symbols may also carry payload data. For example, if one bit modulated into a status symbol is used to signal whether the group of transmit symbols comprises inverted symbols, the remaining bits modulated into the status symbol can be used to transmit payload data.

According to some examples, the method also comprises updating the accumulated deviation based on the group of transmit symbols. To this end, the present deviation as determined previously 304 may be used to update the accumulated deviation 307, additionally considering, as to whether the data symbols within the group of data symbols are to be converted or not. Updating the accumulated deviation 307 for each processed group of data symbols may allow to maintain the desired signal property for an extended period of time.

In the event of a STEP-interconnect, maintaining an average frequency of the data signal is equivalent to assuring that an average length of time associated to each data symbol within the group of transmit symbols is constant. As already illustrated in FIG. 1, the payload data is encoded by one of multiple possible time periods in which the data signal on a transmission line is maintained at a constant level. While FIG. 1 illustrates two possible levels, further examples may also use multiple different levels to additionally implement amplitude modulation. Assuming multiple subsequent short symbols within the payload data would, therefore, result in a data data signal having a higher frequency than the data signal generated by a series of multiple subsequent long symbols.

In a STEP system, the desired average frequency may be defined by arbitrary means, e.g. by demanding, that the average length of the time period is 50% of the maximum length associated to a transmit symbol used for payload data. In the example of FIG. 1, illustrating eight possible transmit symbols, the average length of the time period would then correspond to 50% of the time period associated to symbol 7, transmitted by means of falling signal edge 9. According to a further possible implementation, the average length of the time period may be defined to hit the middle between of the lengths of the shortest symbol 0 and the longest symbol 7. Demanding the latter, may, for example, be achieved by demanding, that the average value of transmitted symbol amounts to 3.5.

Whenever required to maintain the desired average signal property, the symbols of the group of symbols are inverted. A symbol can be inverted by inverting each bit in the binary representation of the symbol and to modulate the inverted binary representation to a symbol according to the standard modulation scheme of FIG. 1. Another way to invert a symbol is to use the relation that, for symbols X with 2^N states, the sum of the symbol X and its inverted symbol Y is (2^N−1): X+Y=(2^N)−1.

Therefore, Y=(2^N)−1−X. For example, if the symbol X to be inverted was 7, the inverted symbol Y would be 0, resulting in the desired change of frequency of the data signal, as it becomes apparent from FIG. 1.

Based on the above considerations, a particular solution as to how an average frequency for a STEP interconnect can be maintained, is described subsequently.

For each STEP data symbol within a group of data symbols (as well as for control symbols or control symbol indicators), a STEP encoder can calculate the sum of the symbols delta from the desired average for each new symbol, subsequently called sum[n], with n being the index identifying the n-th symbol of a sequence. $2^N$ data symbols (which is, e.g., 8 for N=3) result with each symbol being one of [0, . . . , $2^N-1$]. The average of the Symbols is $(2^N-1)/2$ (being 3.5 for N=3). Therefore, for the n-th symbol, the deviation of all symbols from the desired average computes to the following:

$$sum[n]=sum[n-1]+symbol-(2^N-1)/2.$$

In one particular example, the encoder samples a group or series of m input symbols ($n=n_0, \ldots, n_0+m-1$), calculates the average sign of these m symbols and compares it to the sign of the sum so far (total sign).

If the two signs are the same, one can conclude that maintaining the m symbols unamended would increase the deviation from the desired signal property and, hence, the m symbols are inverted. The inverted data symbols are transmitted to bring the new deviation from the desired average (sum $[n_0+m-1]$) closer to zero.

Some receivers might also be sensitive to the common mode of the signal. Therefore, even if the transmitted data is composed of high and low pulses with a fixed average frequency, it may further be required to balance the common mode to make sure that the receiver performance is not degraded. The common mode is the difference between the accumulated time the data signal is in the high state and the accumulated time the data signal is in the low state (sum of the high pulses and the sum of the low pulses). For example, the series of symbols 0, 7, 0, 7, . . . would create a data signal with constant average frequency, however causing maximum common mode.

Maintaining an average common mode of the signal of a STEP-interconnect as illustrated in FIG. 1 is equivalent to assure, as a signal property, that that the difference between the average duration of the two possible signal states (high and low) illustrated in FIG. 1 is zero.

According to some examples, an average common mode of the signal is maintained, if the previously presented method to maintain an average time period for the transmit symbols is performed in parallel and independently for both the signal pulses transmitted in the high state and the signal pulses transmitted in the low state. If both, the low state and the high state are controlled to exhibit an average time period for its associated pulses, the common mode is, on average, in the middle between the high state and low state, which may be desirable. Controlling the high states and the low states separately translates into considering every second symbol of the series of symbols by the previously presented method, as illustrated by means of the flow chart of FIG. 3*c*.

An example of a method to generate a data signal, therefore, comprises: determining 320 a deviation from the desired signal property for every second data symbol of a group of data symbols as a first present deviation and determining 322 a deviation from the desired signal property for the remaining data symbols of the group of data symbols as a second present deviation. The first present deviation is compared 324 with a first accumulated deviation, the first accumulated deviation being based on every second data symbol of preceding groups of data symbols. Likewise, the second present deviation is compared 326 with a second accumulated deviation, the second accumulated deviation being based on the remaining data symbols of the preceding groups of data symbols. In a composition process 328, the group of transmit symbols is generated. Based on the result of the comparisons 324 and 326, the group of transmit symbols is generated such that it comprises an inverted data symbol for every second data symbol of the group of data symbols if both the first present deviation and the first accumulated deviation have an identical property; or every second data symbol of the group of data symbols if both the first present deviation and the first accumulated deviation have a different property. Further, the group of transmit symbols comprises an inverted data symbol for every remaining data symbol of the group of data symbols if both the second present deviation and the second accumulated deviation have an identical property; or every remaining data symbol of the group of data symbols if both the second present deviation and the second accumulated deviation have a different property.

Figure 3C:
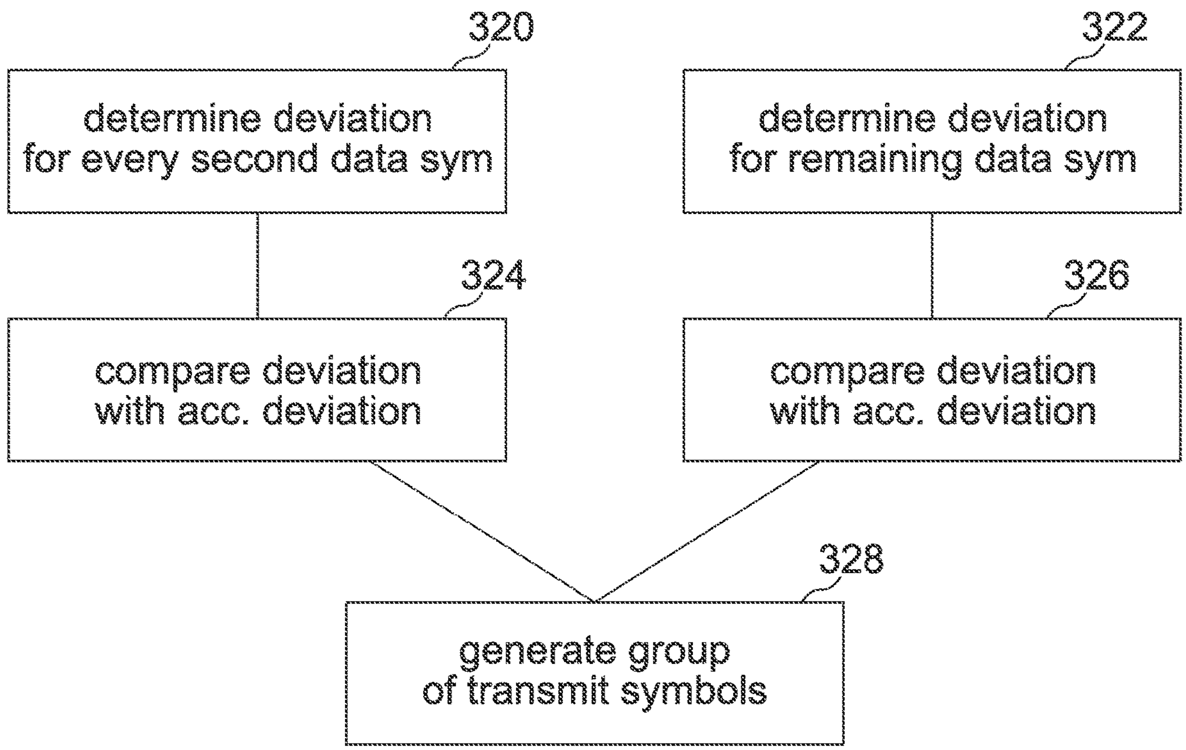
FIG. 3*c* illustrates a further example of a method to generate a data signal that is based on a series of data symbols.

Summarizing the method of FIG. 3*c* in other words, the common mode is the difference between the sum of the high pulses and the sum of the low pulses. To maintain an average common mode, one or two further bits may be added and the encoder tracks and corrects two sums, one for high pulses and one for the low pulses (or falling and rising edges). That is, if the sum[n] is computed and adjusted individually to meet a target of 0 for the low pulses and for the high pulses, one achieves both, a desired average frequency and average common node suppression. In doing so, each sum ($sum_{high}$ and $sum_{low}$) converges to an average of 0. Therefore, each sum maintains the average frequency and the combination also maintains the average DC value (or common mode) of the signal.

Depending on the implementation, the number m of symbols to be jointly inverted according to one of the previous criteria may be chosen arbitraryly. However, depending on the chosen modulation to simultaneously transmit a predetermined number of bits within a single payload data symbol, particular numbers of m may be beneficial. For example, if three bits of data can be submitted by means of a single payload data symbol, jointly processing 22 symbols of data by means of the above may be a beneficial choice. 22 symbols correspond to 66 bit of data, which allows to insert two additional status bits to signal if the positive cycles and/or the negative cycles of the transmit signal carry inverted payload data symbols without causing signal overhead for a Mac-layer operating on bytes. For example, transmitting 8 bytes (64 bits) coming from the MAC-layer of a STEP system requires 22 symbols. The 22 symbols, however, are capable to transport 66 bits, providing for the possibility to include the 2 status bits without causing additional overhead. A similar choice is to jointly process 44 data symbols. In the event of 44 symbols, 4 bits of data can be used as status bits. An encoder may also add 2 identical bits within an (additional) status symbol to signal the polarity of one of the signal states. If, for example 2 bits represent the status information for one signal state (high or low) the data bits may be padded by 2 identical bits for the subgroups of symbols processed independently to avoid errors. The first subgroup comprises every second data symbol of a group of data symbols and the second subgroup contains the remaining data symbols of the group of data symbols. The status bits for the different subgroups may also be submitted using two separate transmit symbols.

An alternative approach to increase reliability for transmission of the status bits is to transmit the status information with a highly reliable modulation scheme for the respective symbol to avoid errors. For example, every possible data symbol above a threshold may be interpreted as one state (e.g. possible data symbols 6 and 7), while every possible data symbols below a further threshold may be interpreted as the other state (e.g. possible data symbols 0 and 1).

Further examples one additionally orders the codes using grey code, padding the status bits into the MSB would likewise allow to protect it from errors since a grey code is a mirror code.

Summarizing the previous considerations in other words, instead of transmitting the pure payload data only, some redundancy can be added to form a coding scheme that allows the transmitter (TX) to manipulate the transmitted data to maintain an average frequency and common mode. By means of the redundancy, it is proposed to signal the receiver (RX) as to the changes to enable it to decode the information correctly. The TX can track the presently transmitted data and calculate the average frequency (or phase drift) and the accumulated common mode. For each data symbol or for a series of data symbols being input, a calculation is performed to determine the impact on the frequency and/or on common node. In order to meet the frequency and/or common mode conditions, single data symbols or a whole series of data symbols may be inverted. The coding scheme adds a few bits at a predetermined position to signal to the RX if the data (pulses) or symbols that are transmitted are in their original form or in an inverted form. Thus, the TX can control the average data and may ensure an average frequency and common mode. This approach allows to maintain an average frequency and common mode and reduce design effort and circuit constrains from the system.

For example, the proposed scheme may allow to limit the buffer size of a receiver and to rely on an average data rate.

Apart from average frequency and common mode, the generation of spurious, which is the presence of one or more peaks within the power spectral density, may be an issue. The generation of spurious should be avoided in some implementations.

While the previously described methods can serve to assure a maintain a desired average frequency, the mechanism may also be used to avoid the generation of spurious. According to some examples, the average target frequency used in a method to generate the data signal as described previously is changed to a further average target frequency. The deviation from the further average target frequency is determined for a further group of data symbols, which is subsequent to a preceding group of data symbols which had been compared to the average target frequency. In other words, the average target frequency may be varied during the ongoing method. Varying the target frequency results in a broadening of the power spectral density which serves to avoid spurious in the spectrum of the generated data signal.

Changing or varying the average target frequency may be performance by different means. For example, a sequence of average target frequencies may be used so that the further target frequency is chosen from a predetermined sequence of average target frequencies. In a further example, the average target frequency is determined using a random number generation method.

In other words, one may further modulate the average frequency by altering the desired average $AV_{des}$ according to the following formula, which may be desirable to spread the spectrum of the created data signal: $sum[n]=sum[n-1]+symbol-AV_{des}$. The effective frequency in which the average target frequency is changed maybe arbitrary. For example, the average target frequency may be changed for every group of data symbols jointly processed. According to further examples, the average target frequency may be changed for every second, third or N'th group of data symbols jointly processed.

One particular implementation as to how the average target frequency may be modulated is discussed in the following paragraph.

In some examples, the average period of the PHY is controlled for groups of data symbols (e.g. for 44 data symbols, the latter corresponding to 22 DTC cycles), by checking the symbols' sum and comparing it to the average symbol $s_{avg}$ multiplied by number of symbols N in PHY unit. (e.g. 44).

The summation offset $O_k$ for a group of data symbols with value $S_i$ (the deviation from the signal property "average frequency") is defined as:

$$O_k=\Sigma S_i-Ns_{avg}$$

And the total weight is integrating all offsets, after deciding whether to flip the bits or not, changing the addition/subtraction:

$$W_k=O_{k-1}\pm O_k$$

(Where 'k' is the unit index, i.e. the number of the group of symbols presently considered, 'i' is a running index on the symbols inside a specific unit, and 'N'=number of symbols in a unit)

This is a closed loop with a constant reference, which may generate spurious. In order to overcome this, we present a new addition to $O_k$, to create a new shifting reference using a spreading factor R:

$$O_k=\Sigma S_i-Ns_{avg}+R_k.$$

In other words, the accumulated value $O_k$ of the signal property for the data symbols within the group of data symbols is modified by adding the spreading factor to the accumulated value to determine a present estimate of the signal property.

$R_k$ is a sequence of spreading factors having two basic parameters. Minimum and maximum values set the spreading factor, resulting in the spreading width in the spectrum. Further, the sequence is periodical and this period is the time it takes to complete the spreading The sequence may be generated according to some options. A first option is pseudo random generation, e.g using a LFSR implementation. Here the number of bits set the spreading period ($T=2^N T_{cycle}$), and the spreading factor is set by dividing the LFSR by a certain value. Both number of bits and division factor are configurable in order to have control on both spreading parameters.

A second option is to use a deterministic sequence—e.g. to implement a triangular sequence, running from negative to the positive 'x' value set by the spreading factor, and a step window 'y' is configured to finally set the spreading period to T=2xyT_cycle.

Varying stepping windows can also be configured if a certain modulation is required.

In other words, some examples consider a spreading factor for the group of data symbols. Some examples comprise determining an accumulated value of the signal property for the data symbols within the group of data symbols, adding the spreading factor to the accumulated value to determine a present estimate of the signal property; and comparing the present estimate with the desired signal property to determine the present deviation.

The series for the spreading factor can be arbitrarily generated. Some examples choose the spreading factor from a predetermined sequence of spreading factors. Further examples may determine the spreading factor using a random number generation method.

A group of data symbols jointly processed by means of one of the described methods may also be characterized as a Basic Transmission Unit (BTU). A BTU may be the amount of data jointly processed by means of a data processing method within a PHY interface. For example, also encoding/decoding or interleaving/de-interleaving (scrambling/de-scrambling) may be performed on the data in block sizes of a BTU. The data of a BTU is passed from the MAC Layer to the STEP Layer. The interface from the MAC Layer to the PHY layer may be a parallel link, but it can also be a serial interface between the MAC. The data constituting a BTU may be characterized by means of data structures used within the MAC Layer (like e.g. bits and bytes) or by data structures used within the PHY Layer. The amount of data within a BTU may be arbitrary. For example, a BTU may be given by 44 data symbols or by 88 data symbols, corresponding to 264 data bits (33 Bytes) of the MAC Layer or to 528 data bits (66 Bytes) of the MAC Layer, respectively.

FIG. **3*d* illustrates an example of an apparatus for generating a data signal 330 which may perform one of the previously discussed methods. The apparatus 330 comprises a monitoring circuit 332 configured to determine a deviation from a desired signal property for a group of data symbols as a present deviation. The apparatus further comprises decision circuitry 334 configured to compare the present deviation with an accumulated deviation 338, the accumulated deviation 338 being based on preceding data symbols of the series of data symbols. Further, the apparatus comprises circuitry 336** configured to generate a group of transmit symbols, the group of transmit symbols comprising an inverted data symbol for every data symbol of the group of data symbols if both the present deviation and the accumulated deviation have an identical sign; or the data symbols of the group of data symbols if both the present deviation and the accumulated deviation have a different sign.

Figure 3D:
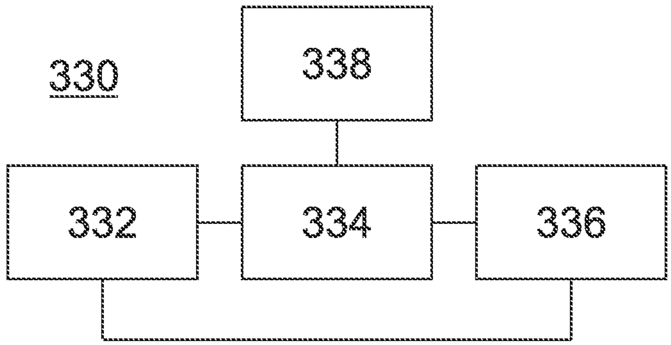
FIG. 3*d* illustrates an example of an apparatus for generating a data signal.
Figure 3E:
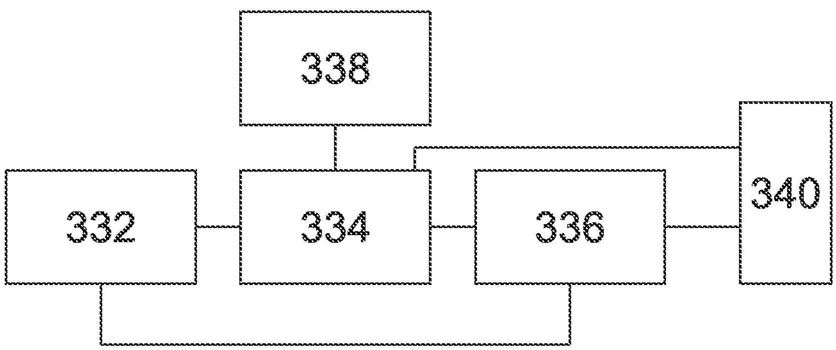
FIG. 3*e* illustrates a further example of an apparatus for generating a data signal.
Figure 3F:
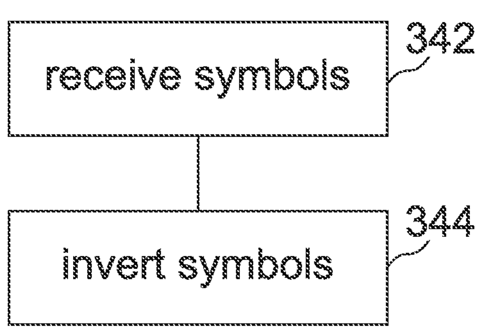
FIG. 3*f* illustrates an example of a method for receiving a data signal.
Figure 3G:
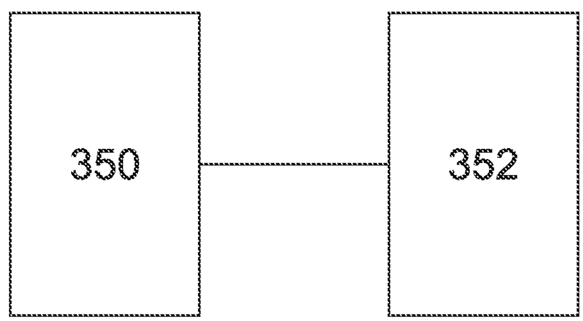
FIG. 3*g* illustrates an example of an apparatus for receiving a data signal.

FIG. **3*e* illustrates a further example of an apparatus for generating a data signal which is based on the apparatus of FIG. 3*d*. Further to the apparatus of FIG. 3*d*, the apparatus of FIG. 3 comprises a multiplexer circuit 340** configured to include the group of transmit data symbols and at least one status data symbol into the data signal, the at least one status data symbol indicating if the group of transmit data symbols comprises inverted data symbols.

Previously, many the signal generation was discussed. FIGS. **3*f* and 3*g*** shortly summarize examples for a method in an apparatus capable to receive a data signal as generated by one of the previously discussed examples.

FIG. **3*f* illustrates an example of a method for receiving a data signal. The method comprises receiving 342 a group of transmit symbols comprising at least one status data symbol and a group of data symbols. Further, the method comprises inverting data symbols 344** of the group of transmit symbols if the status data symbol indicates that the group of transmit symbols comprises inverted data symbols.

FIG. **3*g* illustrates an example of an apparatus for receiving a data signal. The apparatus comprises input circuitry 350 configured to receive a group of transmit symbols comprising at least one status data symbol and a group of data symbols. Further, the apparatus comprises inversion circuitry 352** configured to invert the data symbols of the group transmit symbols if the status data symbol indicates that the group of transmit symbols comprises inverted data symbols.

Figure 3H:
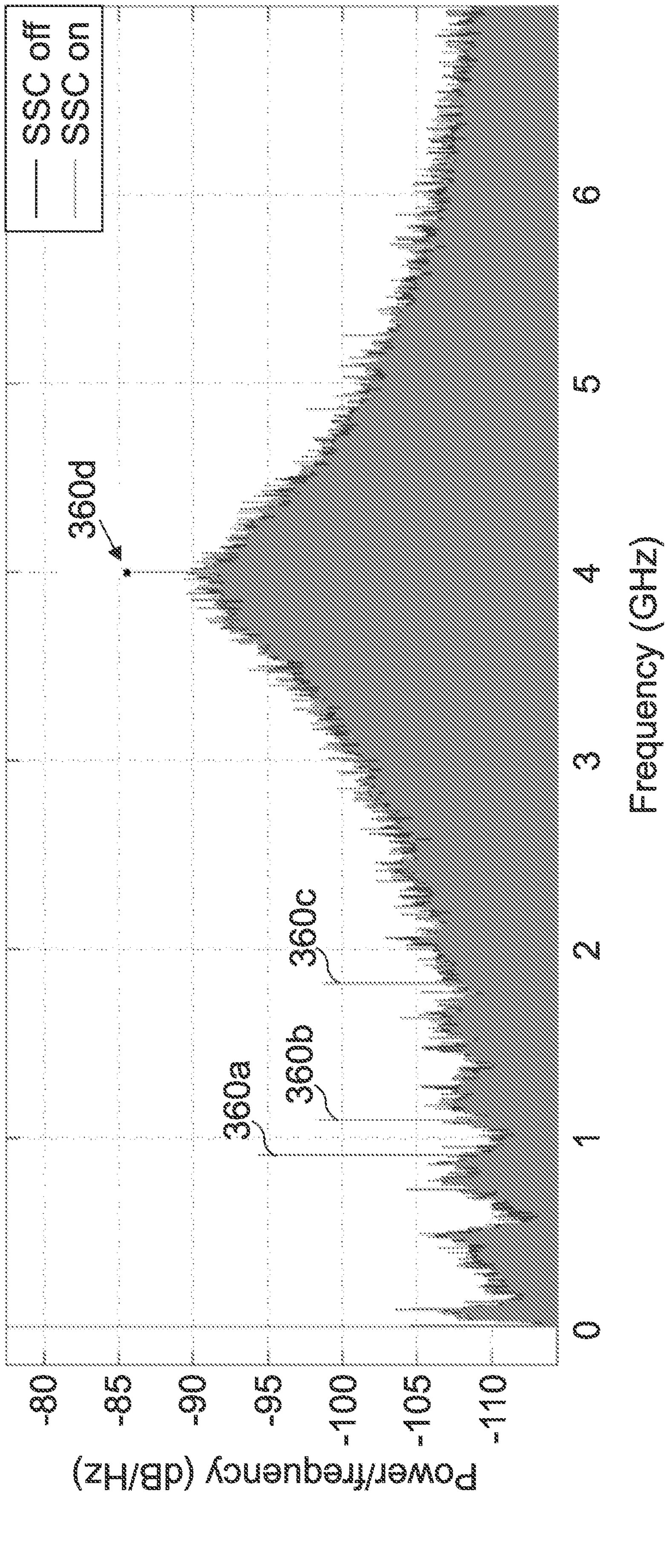
FIG. 3*h* illustrates an improvement of the spectrum of a data signal generated using an example illustrated in one of FIGS. 3*a* to 3*g;*

FIG. **3*h* illustrates an example for improvement of the spectrum of a data signal generated using an example of the method according to 3*c*. FIG. 3*h* illustrates the power spectral density of a data signal generated according to the method of FIG. 3*c* as compared to a power spectral density without the variation of the target frequency. The data signal is based on a random sequence of payload data. As apparent from FIG. 3*h*, spurious peaks 360*a*, 360*b*, 360*c*, and 360*d*** are eliminated when using the example of a method. When using a (high-speed) communication interface as interconnect between electronic devices or components, there may be a need to define a set of controls between transmit and receive circuitry on both sides of the interconnect. For example, controls may be used for synchronization, power management, flow control etc. The controls should not to be confused with any other payload data transmission to minimize the penalty to the overall data throughput. Obscuring controls may pose greater obstacles than missing payload data.

In standard protocols like PCIe Gen 1 & 2 and M-Phy, the transmitter uses an overhead on the data bits (e.g. 8 bits to 10 bits mapping, PCIe Gen 3 and 4 use 128-130 mapping) in order to enlarge the number of transitions within the data signal so that the clock can be recovered from the data signal by the receiver. The so created additional codes or symbols can be used for submission of control words from a transmitter to a receiver to control operation of the interconnect. Control words or control symbols are also called markers in other interface technologies. To further enable to balance the dynamic parameters of the data signal, such as frequency and common mode voltage, several codes or symbols may be mapped to a single marker.

Conventional mechanisms may experience a large overhead on the data which may harm throughput. The Control words/symbols may also not be protected so that a bit error within a control word may be confused and translated as a data word.

In the STEP interface, messages or message flows for control (control codes) are referred to as "delimiters". A delimiter is represented by at least 2 subsequent pulses or symbols, a control symbol indicator and a subsequent or preceding control symbol. The subsequent discussion referring to delimiters may also be applied to other communication interfaces than STEP.

The STEP protocol is based on pulse-width-modulation of the data to be transmitted and each symbol is associated with a time period between two subsequent complementary signal edges. Time periods used for data are subsequently also referred to as payload data symbols. In order to not waste a payload data symbol on a delimiter, the protocol allocates out-of-band/unique symbols for the delimiters, allowing the receiver to easily detect them without any overhead penalty. In some examples, a time period associated to a delimiter is longer than the longest time period associated to payload data. Furthermore, in order to balance the line's dynamic parameters, the delimiters may be mapped to special clock periods which balance themselves out, without a need for any dedicated treatment from the MAC/Phy. The delimiters may further be protected by mapping in such a way that an error would not make a false-detection. In summary, STEP allocates out-of-band symbols as delimiters and delimiters may be self-balanced from frequency and DC level. Delimiters may be unique and cannot be mistaken as data. Further, delimiters may be highly reliable and cannot be confused with any other delimiter.

For easy and protected/reliable reception of the delimiters, out-of-band high/low pulses are used. Each delimiter is represented by at least 2 subsequent symbols within the data signal (also referred to as 2 subsequent pulses), a control symbol indicator and a subsequent control symbol. The control symbol indicator has an associated time period that is longer than the time period of any payload data symbol. In other words, the control symbol indicator is out of band with this respect.

While the out of band control symbol indicator indicates the presence of a delimiter, the control symbol—which may be in band (have a length of a payload data symbol) or also out of band gives the type of delimiter and so the content. Further examples may also use more than one control symbol together with a control symbol indicator to increase the number of available delimiters (control statements).

Using the same separation of phases for control symbols than for payload data symbols may create 7 possible delimiters—given that 3 payload data bits are transferred per symbol. Each delimiter has a long high or low pulse as a control symbol indicator, and may have a subsequent or preceding short pulse, indicating the delimiter type.

Typical implementations may define at least 3 delimiters. Start of Packet (SOP) comprises a control symbol that indicates a start of a packet. End of Packet (EOP) comprises a control symbol that indicates an end of a packet. Idle (I-Delimiter) comprises a control symbol that indicates an idle mode, e.g. when MAC has no payload data to send. For example, before transitioning to lower power modes comprising a control symbol that indicates an idle mode may be sent.

Other examples of delimiters may be Start of Calibration cycle (SOC) with different types of calibration such as short/long/margin, Start of ultra-reliable packet format (SOR) etc.

Figure 4A:
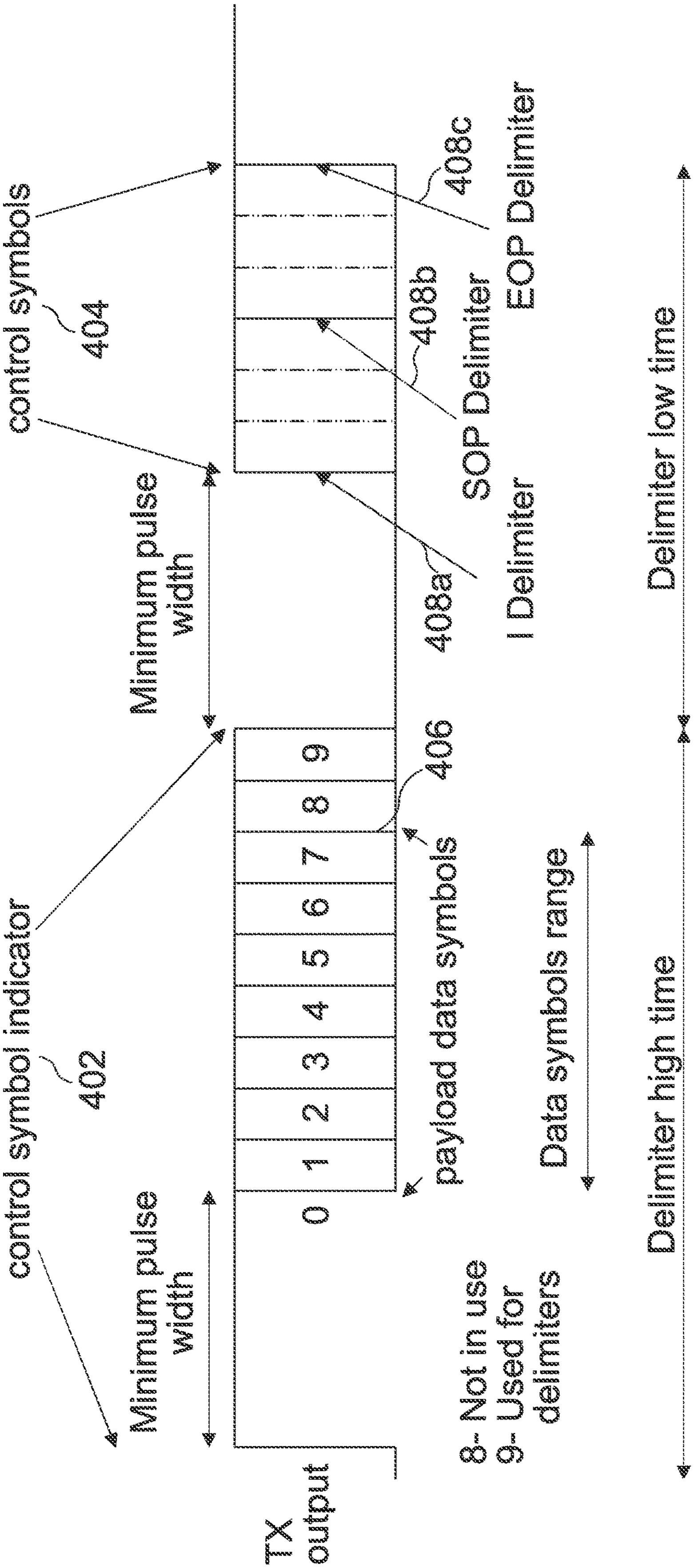
FIG. 4*a* illustrates examples of an I-delimiter, an SOP, and an EOP delimiter.

FIG. 4*a* illustrates examples of an I-delimiter, an SOP delimiter, and an EOP delimiter in comparison to payload data symbols. In the example of FIG. 4*a*, a first alternative to submit a delimiter is illustrated, in which the control symbol indicator 402 is submitted first, followed by the control symbol 404. In the particular example of FIG. 4*a*, the control symbol indicator 402 is submitted by means of a pulse-width of a time period that is longer than the longest time period of a payload data symbol. FIG. 4*a* assumes a modulation scheme according to which three bits are modulated into a payload data symbol at a time resulting in the falling signal edge 406 corresponding to the longest time period for payload data symbol "7". The control symbol indicator is longer than the longest payload data symbol, being above the payload data threshold. The control symbol indicator 402 (initial high time in FIG. 4*a*) does not carry any real data but rather indicates the submission of a delimiter. The control symbol 404 (subsequent low time in FIG. 4*a*) is indicating the type of the delimiter. In the example illustrated in FIG. 4A, three possible delimiters are distinguished by the position of rising signal edges 408*a* 400*b* and 408*c*. The I-delimiter is constituted by the shortest control symbol (signal edge 408*a*), the SOP delimiter by the intermediate length control symbol (signal edge 408*b*) and the EOP delimiter by the longest control symbol (signal edge 408*c*). However, further embodiments may likewise use another control symbol to indicate an I-delimiter. In order to reliably detect the type of delimiter, the different control symbols are separated by longer time periods than the payload data symbols—in the example of FIG. 4*a* there are 3 steps between the different delimiter types, i.e. between the different control symbols, while the payload data symbols are separated by a single step.

Figure 4B:
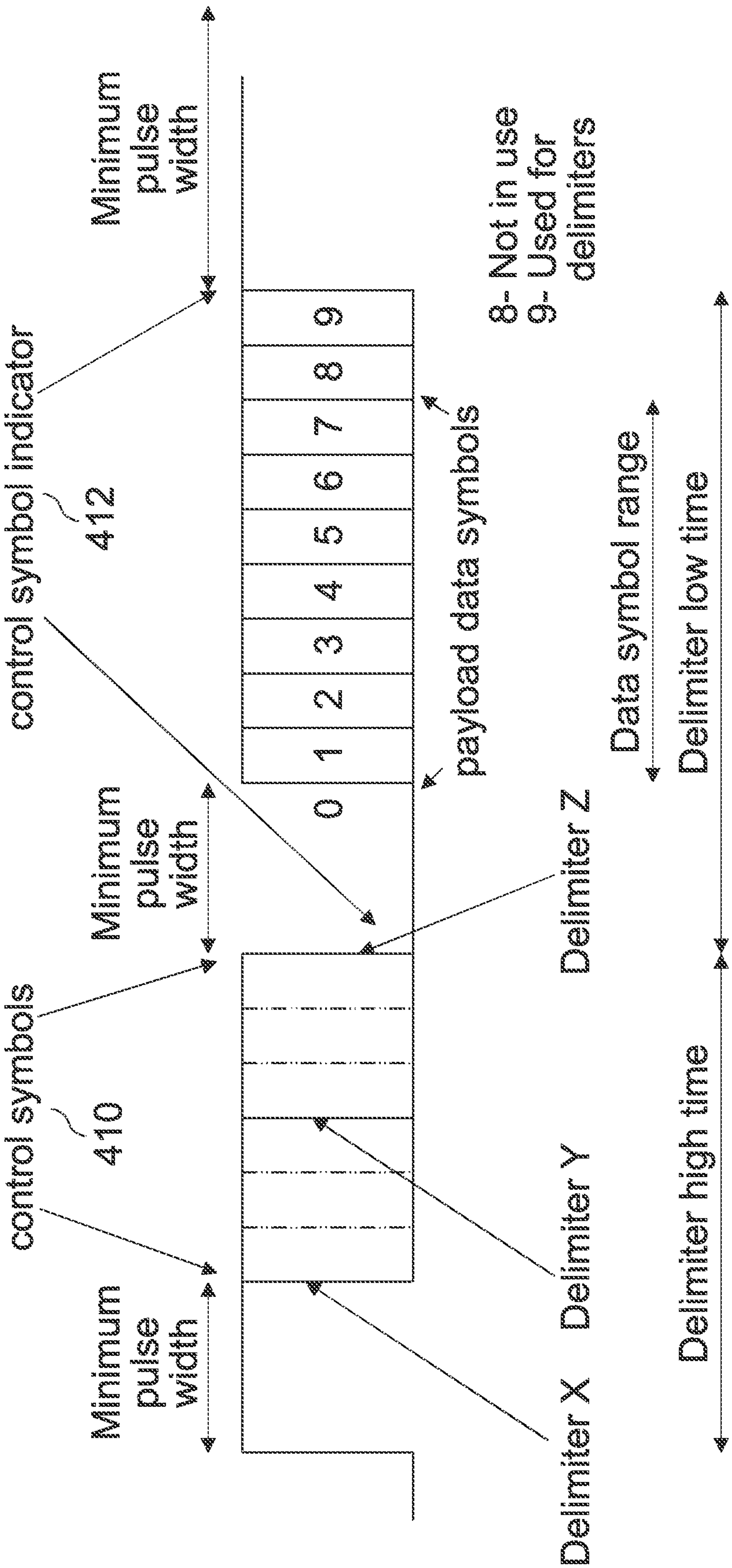
FIG. 4*b* illustrates further examples of an I-delimiter, an SOP, and an EOP delimiter.

FIG. 4*b* illustrates an alternative possibility to submit a delimiter according to which the control symbol 410 precedes the control symbol indicator 412. In the example illustrated in FIG. 4*b*, the delimiter use the LOW time as the long period and the low time does not carry further info while the high time carries the delimiter type and constitutes the control symbol 410.

As illustrated by means of FIGS. 4*a* and 4*b*, the data signal of a delimiter comprises a sequence of a first signal edge of a first type, a second signal edge of a second type, and a third signal edge of the first type, the first signal edge and the second signal edge being separated by a first time period, and the second signal edge and the third signal edge being separated by a second time period, wherein at least one of the first time period and the second time period is longer than the time period of any payload data symbol defined by a communication protocol. The longest time period of any payload data symbol defined by a communication protocol may also be referred to as payload data threshold.

Delimiter types other than I-Delimiters will be described in more detail in the subsequent paragraphs referring to FIGS. 12*a* to 12*x* while the description related to FIGS. 4*c* to 4*g* will focus on an attractive use of idle delimiters.

Idle delimiters can be used for power management. An Idle delimiter may be transmitted when the MAC is not transmitting any payload data, for example until the end of a unit which is jointly processed (e.g. n bits). However, if there's a long time without payload data to be sent, a long sequence of I-delimiters as illustrated in FIG. 4*c* may occur.

Figure 4C:
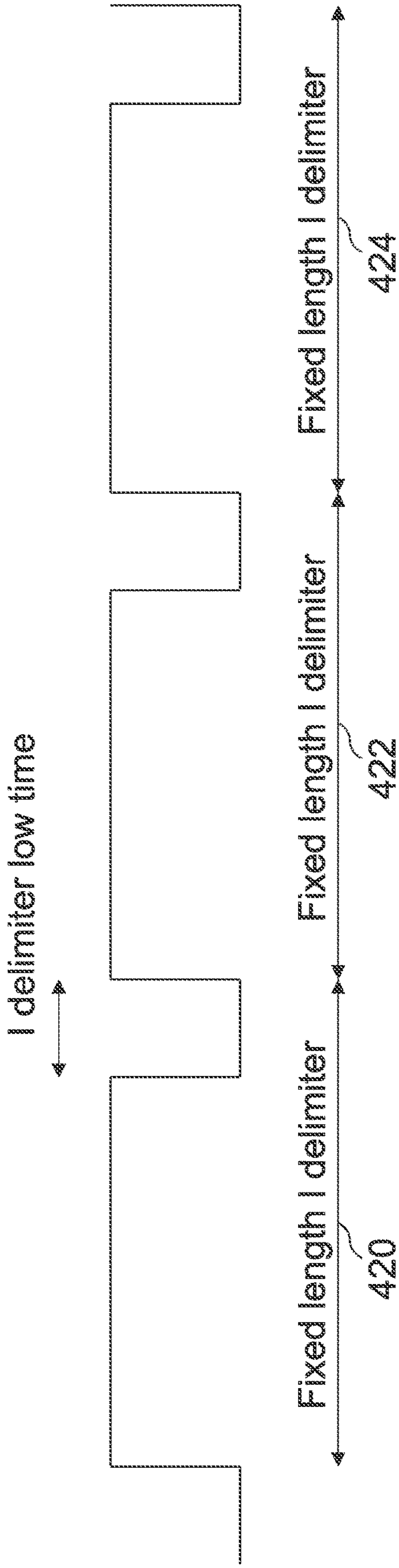
FIG. 4*c* illustrates an example of a data signal containing subsequent delimiters of the same type according to a conventional approach.

FIG. 4*c* illustrates an example of a data signal containing 3 subsequent delimiters 420, 422, and 424 of the same type according to a conventional approach. Since FIG. 4*c* illustrates a repetitive signal, it may create spur or spurious at the frequency of the main harmony—as an example—if the length of the I-delimiter is 0.8 nSec (800 psec), spur is generated at 1.25 GHz, 2.5 GHz, 3.75 GHz and on (n*1.25 GHz).

Figure 4D:
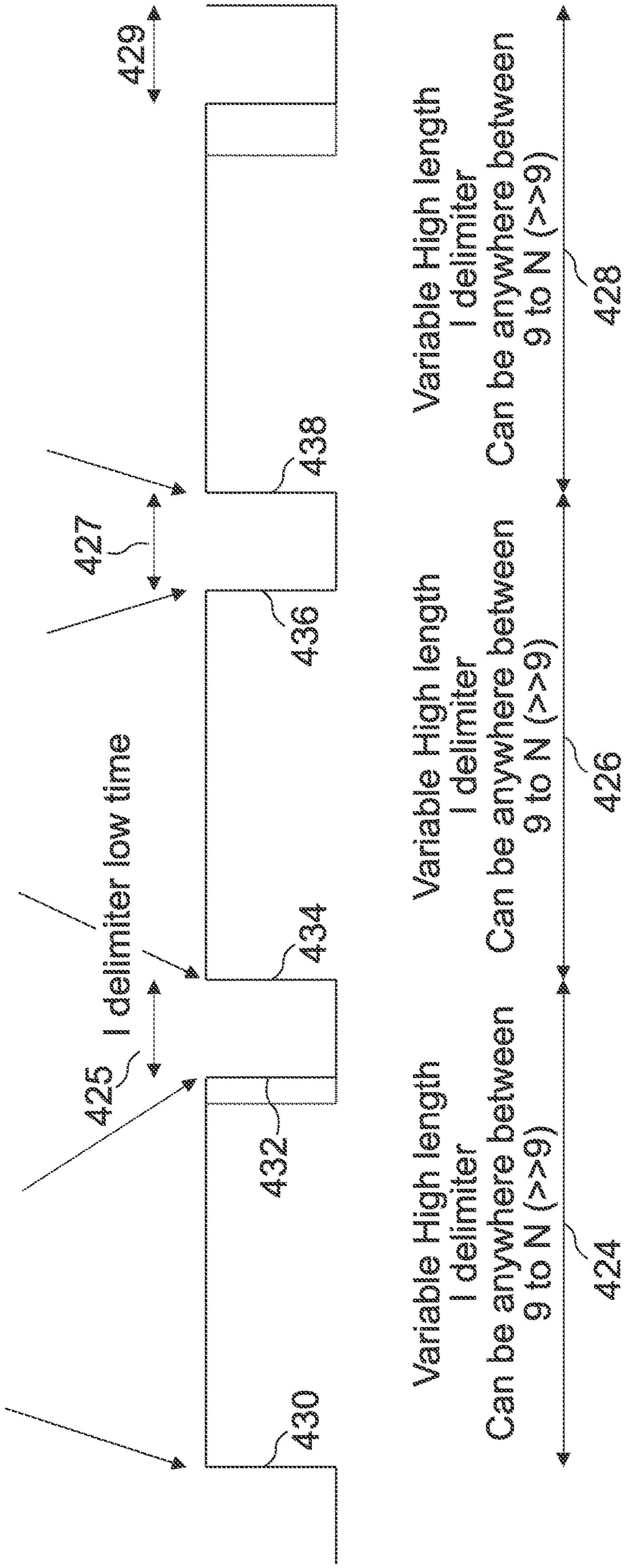
FIG. 4*d* illustrates an example of a data signal as generated by an example of an apparatus for generating a data signal.

FIG. 4*d* illustrates an example of a data signal as generated by an example of an apparatus for generating a data signal. The control symbol indicator (the long part of the delimiter—be it either high or low) may have any length above a payload data threshold (e.g. above 9 for the example illustrated in the Figures). Therefore, the generation of spur may be avoided by modulating the length of the long part of a delimiter, i.e. by modulating the control symbol indicator (high time in FIG. 23*d*) to any number larger than the payload data threshold. As illustrated in FIG. 4*d*, a time period used to transmit the first control symbol indicator 424 differs from the time periods of subsequent control symbol indicators 426 and 428.

However, the time period of the subsequent control symbols 425, 427, and 429 is identical, indicating the same type of delimiter, e.g. the I-delimiter. By modulating the length of the control symbol indicator, the overall length of the I-delimiter changes amongst subsequent I-delimiters and the generation of spurious may be avoided.

A data signal generated according to this principle is characterized in that it comprises a sequence of a first signal edge 420 of a first type, a second signal edge 432 of a second type, a third signal edge 434 of the first type, a fourth signal edge 436 of the second type, and a fifth signal edge 438 of the first type, the first signal edge and the second signal edge being separated by a first time period 424, the second signal edge and the third signal edge being separated by a second time period 425, the third signal edge and the fourth signal edge being separated by a third time period 426, and the fourth signal edge and the fifth signal edge being separated by a fourth time period 427, wherein the first time period 424 is longer than a payload data threshold, the second time period 425 is shorter than a payload data threshold, the third time period 426 is longer than the payload data threshold and different from the first time period 424, and the fourth time period 427 is equal to the second time period 425.

Alternative embodiments may likewise use the alternate mode of submitting delimiters as illustrated by means of FIG. 4*b*, i.e. starting with the control symbol followed by the control symbol indicator to be modulated. A accordingly generated data signal comprises a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period, wherein the first time period is shorter than a payload data threshold, the second time period is longer than the payload data threshold, the third time period is equal to the first time period, and the fourth time period longer than the payload data threshold and different from the second time period.

The scheme of modulation of the time period used for the control symbol indicator can be chosen to the needs. For example, the modulation may be employed as a ramp starting from a minimum of 9 up to 25 and reducing back to 9 before starting over. Alternatively, the length may be selected by a random number generator. Further the length does not necessarily have to be changed for every I-delimiter. Instead, it may remain constant for a finite number of I-delimiters until it is changed again. For example, the time period may stick to a length of 9 for a few delimiters before it increased to 10, and so on, to just name some examples.

Figure 4E:
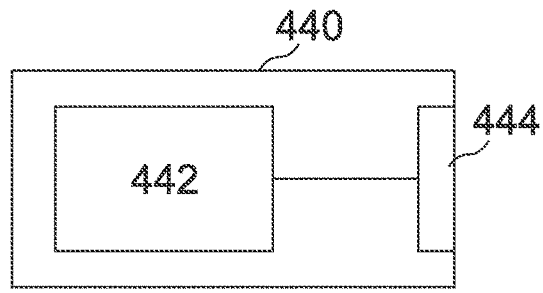
FIG. 4*e* illustrates an example of an apparatus for generating a data signal of FIG. 4*d;*

FIG. 4*e* illustrates an example of an apparatus 440 for generating a data signal. The apparatus 440 comprises a processing circuit 442 configured to generate the data signal, the data signal comprising a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period, wherein the first time period is longer than a payload data threshold, the second time period is shorter than a payload data threshold, the third time period is longer than the payload data threshold and different from the first time period, and the fourth time period is equal to the second time period. Further, the apparatus comprises an output interface 444 circuit configured to output the data signal.

Figure 4F:
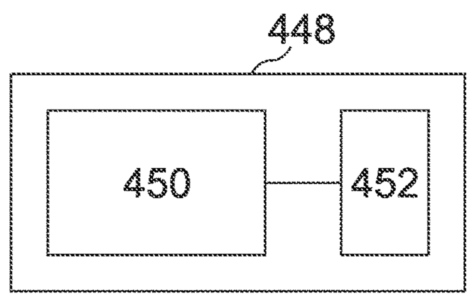
FIG. 4*f* illustrates a flow chart of an example of a method for generating a data signal of FIG. 4*d;*

FIG. 4*f* illustrates a further example of an apparatus 448 for generating a data stream. The apparatus 448 comprises a processing circuit 450 configured to generate a data stream comprising a sequence of a control symbol indicator, a control symbol indicating an idle state, a further control symbol indicator, and a further control symbol indicating the idle state; wherein the control symbol indicator is associated to a first time period, the control symbol is associated to a second time period, the further control symbol indicator is associated to a third time period; and the further control symbol is associated to the second time period. Further, the apparatus 448 comprises a modulator circuit 452 configured determine the first time period and the third time period by varying time periods within a time period interval according to a predetermined modulation scheme.

Figure 4G:
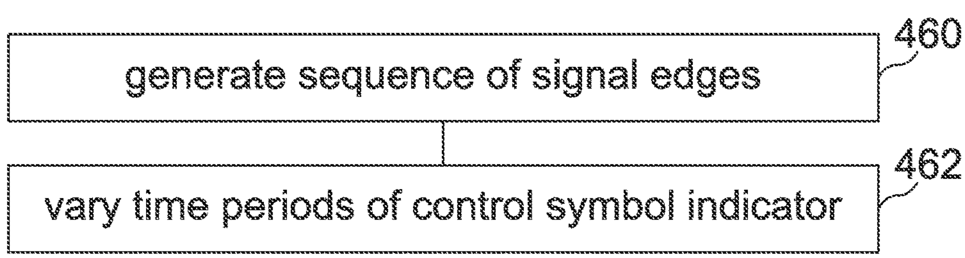
FIG. 4*g* illustrates a further example of an apparatus for generating a data signal of FIG. 4*d;*

FIG. 4*g* illustrates a flow chart of an example of a method for generating a data signal. The method comprises generating 460 a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period wherein the first time period is longer than a payload data threshold, the second time period is shorter than a payload data threshold, the third time period is longer than the payload data threshold, and the fourth time period is equal to the second time period. Further, the method comprises varying 462 the third time period to be different than the first time period.

Figure 4H:
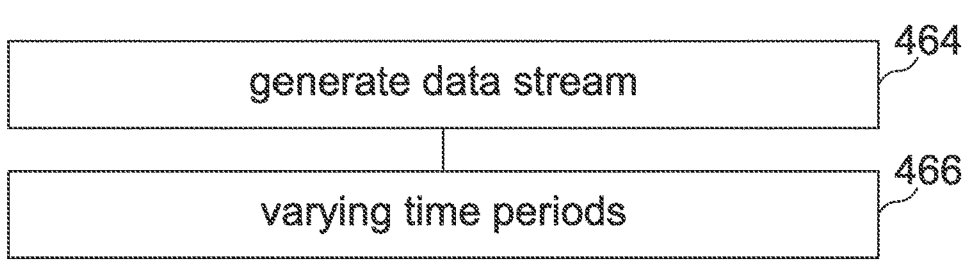
FIG. 4*h* illustrates a flow chart of a further example of a method for generating a data signal of FIG. 4*d;*

FIG. 4*h* illustrates a flow chart of a further example of a method for generating a data signal. The method comprises generating 464 a data stream comprising a sequence of a control symbol indicator, a control symbol indicating an idle state, a further control symbol indicator, and a further control symbol indicating the idle state; wherein the control symbol indicator is associated to a first time period, the control symbol is associated to a second time period, the further control symbol indicator is associated to a third time period; and the further control symbol is associated to the second time period. Further, the method comprises varying 466 a time period within a time period interval to generate the first time period and a different third time period.

Some applications may use multiple channels or interconnects in parallel due to bandwidth demands or for architectural reasons. For example, a CPU may be connected to memories/graphics/etc. using multiple interconnects (STEP lanes) in parallel. In a Mobile device, a single AP may, for example, drive LTE, WiFi, 5G, etc. using a multi-channel STEP interconnection. If multiple interconnects are used in parallel there may occur leakage between adjacent interconnects. For example, in a STEP system, leakage between transmission links might increase jitter and degrade the link quality. Other interconnects may experience other reasons for degrading link quality. The dominant contribution to leakage might emanate from the outputs of the devices (e.g. transmitters and/or receivers) or from crosstalk between the transmission links, which are, for example, implemented as lanes on a PCB. Every implementer of an interconnect such as, for example, of a STEP link, designs its own PCB and routes the transmission lines of the transmission links according to the PCB constraints. One cannot predict in advance what the dominant source of leakage will be since the combination of adjacent channels/transmission links on the PCB can be arbitrary.

While the dominant source of Leakage cannot be predicted reliably in advance, leakage may have at least one of the following characteristics. Leakage may have a high pass frequency response, meaning good isolation at low frequencies which degrades as the frequency goes up. The frequency response may be due to capacitive or electromagnetic coupling. Leakage may have one or more dominant sources, for example two adjacent transmission links cross-talking to one another.

Figure 5A:
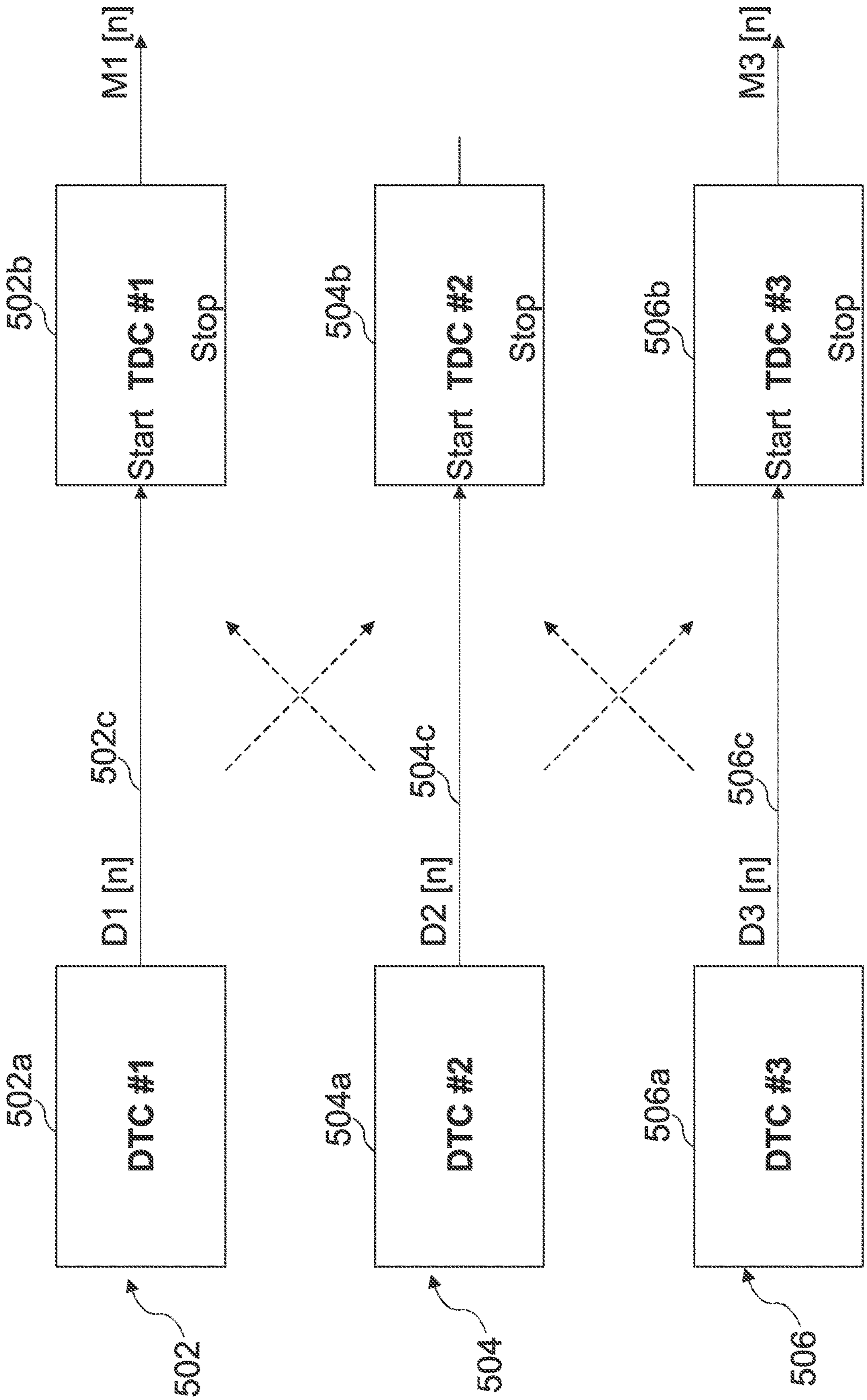
FIG. 5*a* illustrates leakage from one interconnect into another interconnect.
Figure 5B:
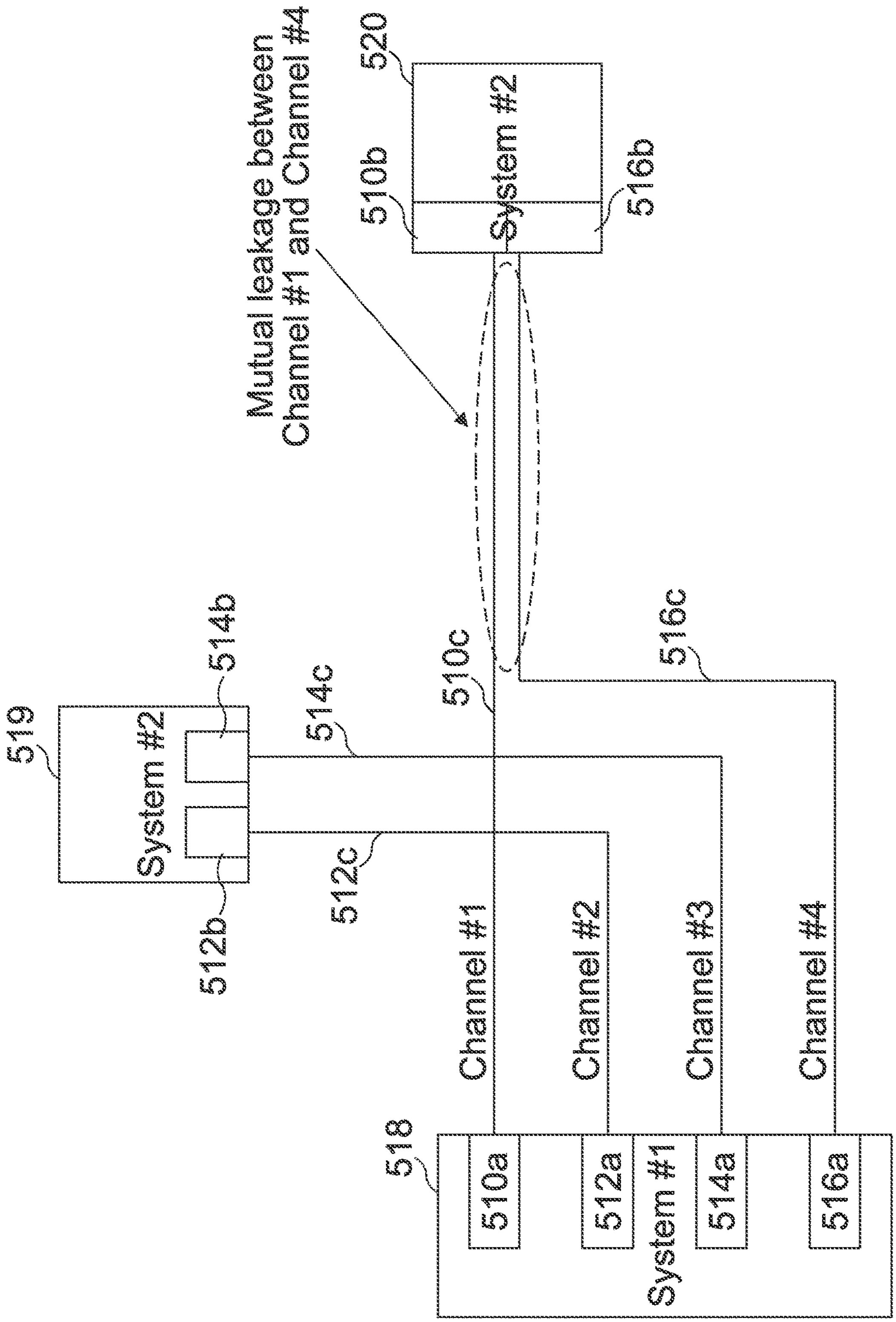
FIG. 5*b* illustrates leakage from one interconnect into another interconnect by means of crosstalk.

Leakage may occur between arbitrary pairs of interconnects, even though the affected transmitters and receivers are spaced apart. FIGS. 5*a* and 5*b* illustrate two setups where leakage between interconnects may occur. FIG. 5*a* illustrates 3 interconnects 502, 504 and 506 constituted by transmitters 502*a*, 504*a*, 506*a* and their associated receivers 502*b*, 504*b*, 504*b*, which are connected by means of transmission links 502*c*, 504*c*, and 506*c*, respectively. In the example of FIG. 5*a*, the layout of the interconnects is fully parallel, i.e. the transmitters and the receivers are neighboring one another and the transmission links are routed such that they are neighboring each other identical to their associated transmitters and receivers. In the setup of FIG. 5*a*, leakage may be dominated by crosstalk between the transmission links 502*c*, 504*c*, and 506*c* or by crosstalk from the output of a transmitter into neighboring transmission links or into an output of the neighboring transmitter.

FIG. 5*b* illustrates a setup having four transmitters 510*a* to 516*a* in a single chip 518 or package and two chips 519 and 520 comprising associated receivers 510*b* to 516*b*. Transmission links 510*c* to 516*c* connect transmitters and receivers. While transmitters 510*a* and 516*a* are spaced apart in chip 518, leakage may nonetheless occur between their interconnects due to the routing of the transmission links 510*c* and 516*c*. Routing on, for example, a PCB, is unpredictable by a manufacturer of the chips 518, 519 and 520.

It may be desirable to have means to compensate or mitigate leakage between transmission links/data links or between interconnects.

Figure 5C:
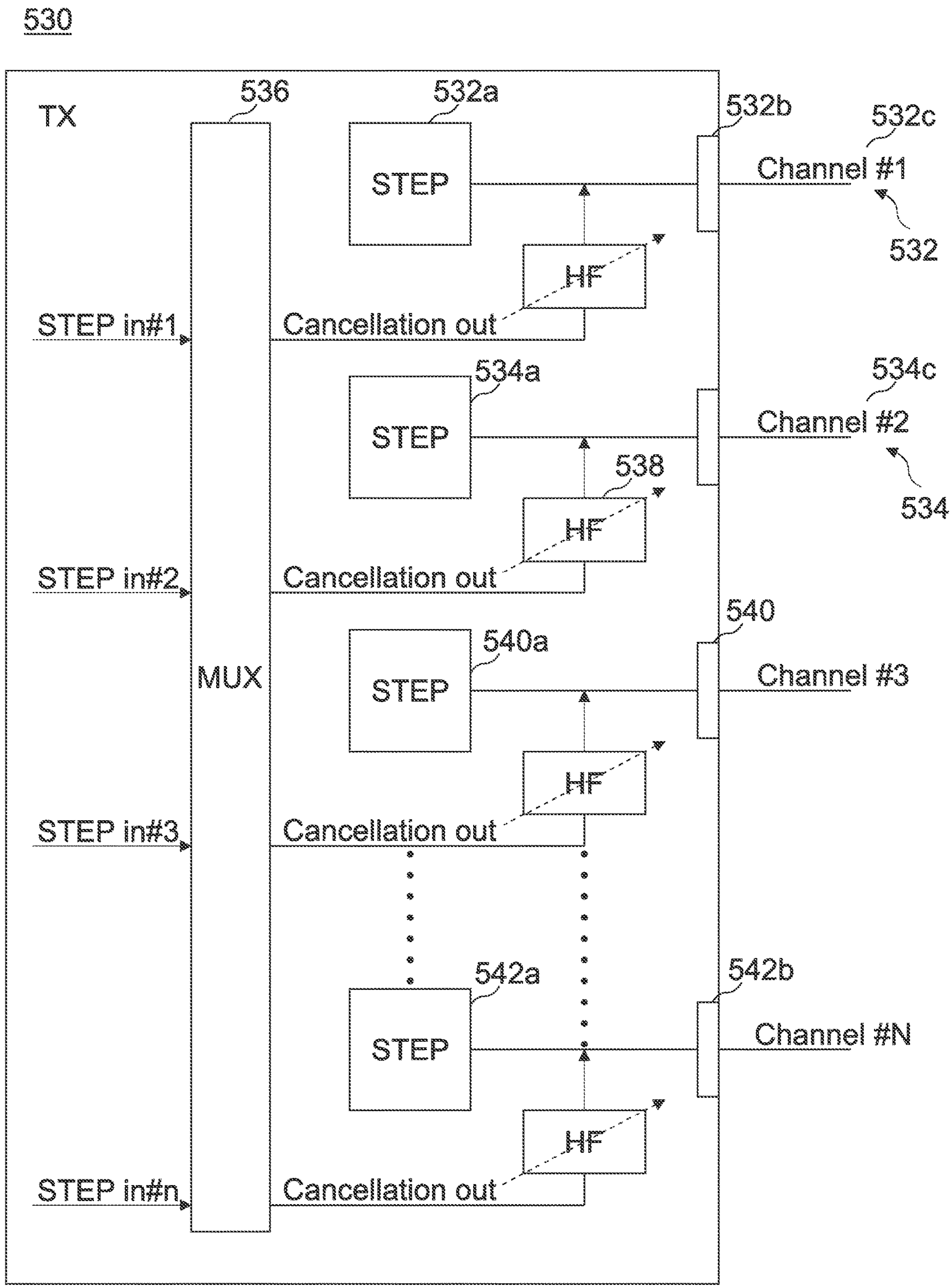
FIG. 5*c* illustrates an example of a transmission system.

FIG. 5*c* illustrates an example of a transmission system 530.

Transmission system 530 comprises a first transmitter 532*a* coupled to a first output interface 532*b* for a first data link 532*c*. A second transmitter 534*a* is coupled to a second output interface 534*b* for a second data link 534*c*. A multiplexer circuit 536 is configured to switch a signal derived from a first data signal generated by the first transmitter 532*a* to a filter circuit 538, the filter circuit 538 being coupled to the second output interface 532*b*. The filter circuit 538 so operates on a data signal that is related to the data signal transmitted via the first transmission link 532*c*. In case of leakage from the first interlink 532 comprising first transmitter 532*a* and first transmission link 532*c* into the second interconnect 534 comprising second transmitter 534*a* and second transmission link 534*c*, the leakage can be canceled or at least decreased by applying the correction signal derived using the filter circuit 538 to the output interface 532*b* used by the second interconnect. Using a transmission system of FIG. 5*c* allows to mitigate negative effects of leakage irrespective of the dominant source of leakage. Using a multiplexer allows also to not apply a correction signal if no leakage from the first interconnect into the second interconnect is determined.

Further examples may also comprise transmitters for more than two interconnects, as illustrated in FIG. 5*c*, further showing a third transmitter 540*a* together with an output interface 540*b* as well as a first transmitter 542*a* together with an associated output interface 542*b*. In order to guarantee maximum flexibility of the system, multiplexer 536 may be configured to switch signals derived from the data signal generated by all transmitters 532*a* to 542*a* to any of the output interfaces via associated filter circuits.

Further examples may also be configured to switch a signal derived from two or more transmitters to a single output interface via two or more filter circuits in order to mitigate signal deteriorations caused by multiple interconnects leaking into a single interconnect at a time.

According to further examples, the filter circuit 538 exhibits a variable filter characteristic allowing to tune the filter circuit 538 to reproduce the characteristic of the leakage between the two interconnects so as to suppress the signal deterioration caused by leakage as good as possible. According to further examples, the filter circuit 538 has a high pass filter characteristic.

In other words, a universal solution for leakage cancellation is shown in FIG. 5*c*. Each data signal of a transmitter (e.g. of a STEP channel) is sampled and multiplexed by the MUX 536 to a channel to which it cross-talks. If the cancellation is performed on the transmit side, as illustrated in FIG. 5*c*, one can alternatively also duplicate a signal directly from the transmitter (e.g. from a DTC within STEP system) without sampling it. Generally speaking, a signal which is derived from the data signal associated to a transmitter is used for the purpose of leakage cancellation. FIG. 5*c* illustrates only single channel leakage cancellation, but the same principle may be used with multiple cancellation signals injected to consider multiple channels cross-talking to a single channel.

Figure 5D:
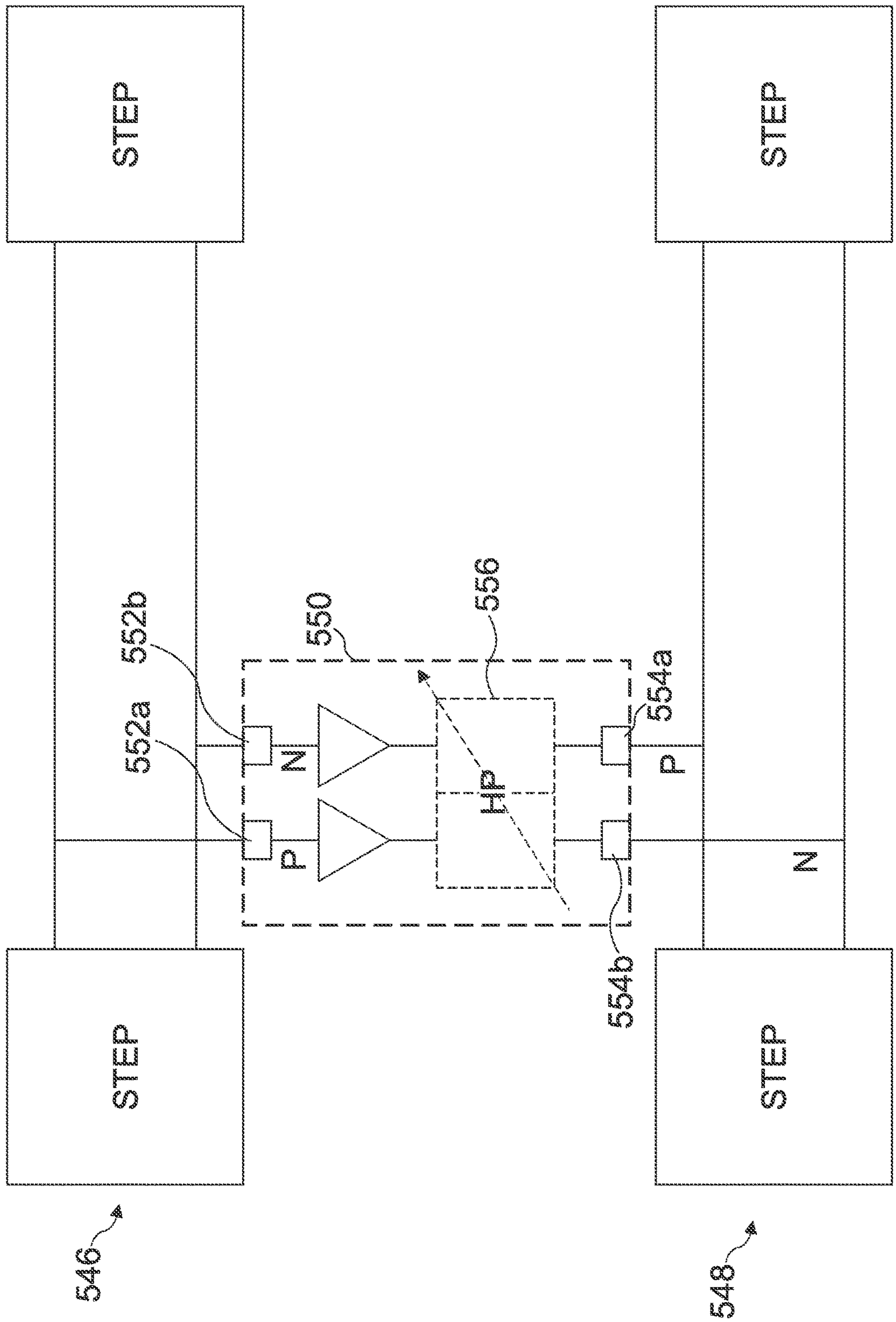
FIG. 5*d* illustrates an example of a filter circuit for leakage mitigation.

FIG. 5*d* schematically illustrates an example of a filter circuit 550 for adaptive leakage cancellation from one channel to another. In particular, FIG. 5*d* illustrates an example where destructive superposition of a correction signal derived from the data signal of a first interlink is achieved by mutually cross coupling positive and negative components of the interlinks. A filter circuit 550 comprises a positive input 552*a* for a positive component of a differential data signal and a negative input 552*b* for a negative component of the differential data signal. The filter circuit 550 further comprises a positive output 554*a* for the positive component of the differential data signal and a negative output 554*b* for the negative component of the differential data signal. Filter circuitry 556 is coupled between the positive input 552*a* and the negative output 552*b* as well as between the negative input 552*b* and the positive output 554*a*. In coupling the input for a positive component of the differential signal to an output for a negative component of a differential signal, the filtered input signal constituting the correction signal is automatically subtracted from the signal connected to the output of the filter circuit 550 to mitigate leakage between the first interconnect 546 and the second interconnect 548. FIG. 5*d* illustrates only single channel leakage cancellation, but the same principle may be used with multiple cancelation signals injected to consider multiple channels cross-talking to a single channel as illustrated by means of FIGS. 5*c* and 5*e*.

Figure 5E:
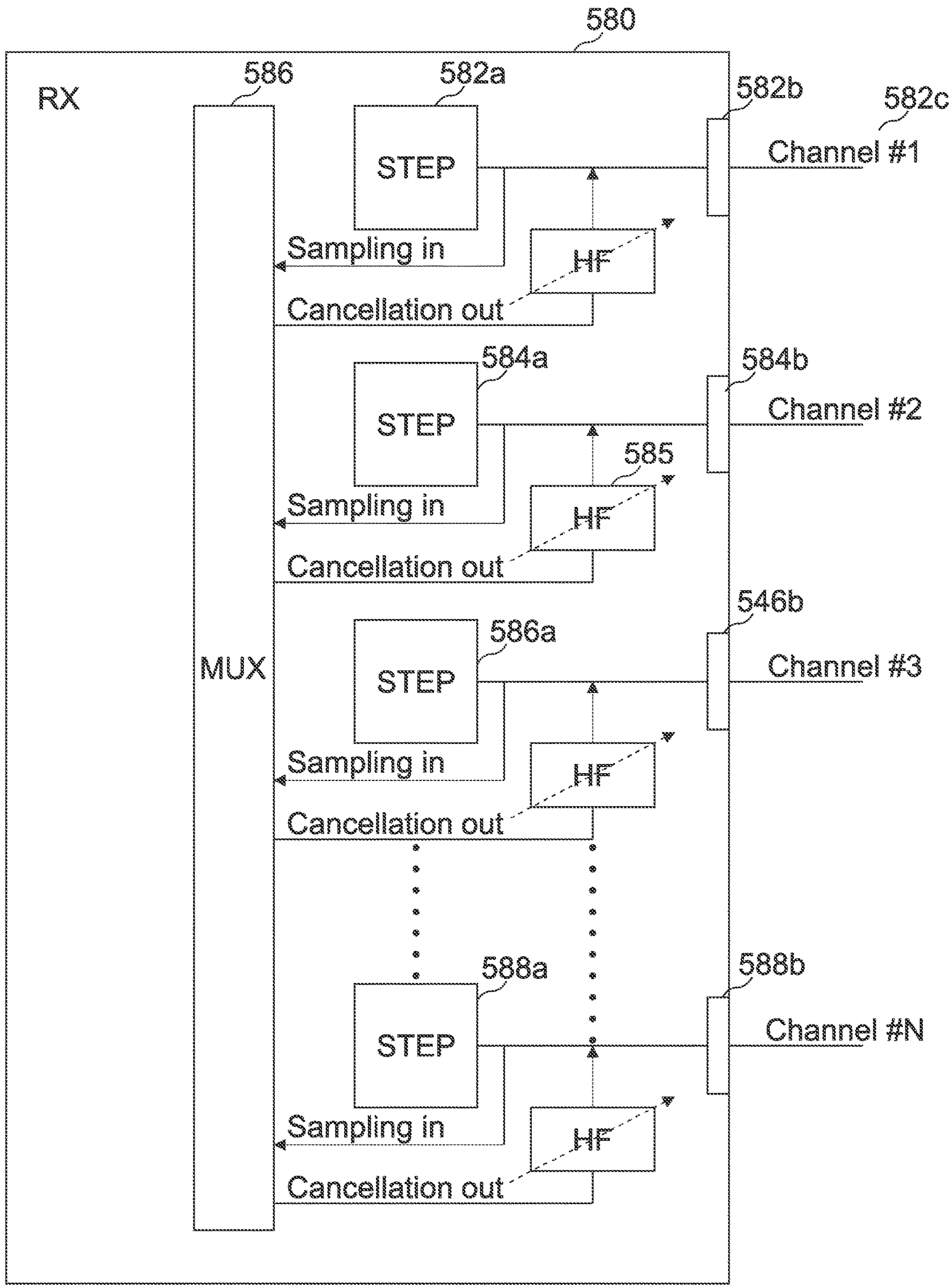
FIG. 5*e* illustrates an example of a data reception system.

As further illustrated by means of FIG. 5*d*, adaptive leakage cancellation may be performed on the RX side or on the TX side. While the example of FIG. 5*c* illustrates a transmission system capable of performing leakage cancellation, FIG. 5*e* illustrates a data reception system capable of performing leakage cancellation on the RX side. In other words, FIG. 5*e* illustrates RX side leakage cancellation using a MUX for appropriate cross-coupling and leakage cancellation.

FIG. 5*e* illustrates a data reception system 580 comprising a first receiver 582*a* coupled to a first input interface 582*b* for a first data link 582*c*. A second receiver 584*a* is coupled to a second input interface 584*b* for a second data link 584*c* and a multiplexer circuit 586 is configured to switch a signal derived from a first data signal received at the first input interface 582*b* to a filter circuit 585, an output of the filter circuit 585 being coupled to the second input interface 584*b*.

The filter circuit 585 and the general principles of leakage cancellation are similar to the ones described with respect to the transmission system of FIG. 5*c* and, therefore, reference is herewith made to the corresponding paragraphs. Since the data reception system 580 of FIG. 5*e* operates on the receive side, the first data signal received at the first input interface 582*b* may need to be sampled before being copied to or directly be copied to the filter circuit 585 in order to be able to generate a correction signal by means of filter circuit 585. Similar to the example illustrated in FIG. 5*c*, multiple further receivers, like for example receiver 586*a* and receiver 588*a*, may be present within further examples of data reception systems together with their input interfaces 586*b* and 588*b* to build a highly flexible system.

Similar to the example of FIG. 5*c*, the example of FIG. 5*e* may comprise a filter circuit 585 having a high pass characteristic. According to further examples, the filter characteristic may be variable to tune the transfer function of the filter circuit 585 to the transfer function of the leakage between the two interconnects during operation, since said transfer function is not known a priori.

Using one of the examples of FIGS. 5*c* to 5*e* may avoid to demand high mutual isolation between the data lanes as a required spec for the PCB and for RFIC outputs of an interconnect, which may impose large separation between the lanes and would yield an inefficient PCB and RFIC.

Figure 5F:
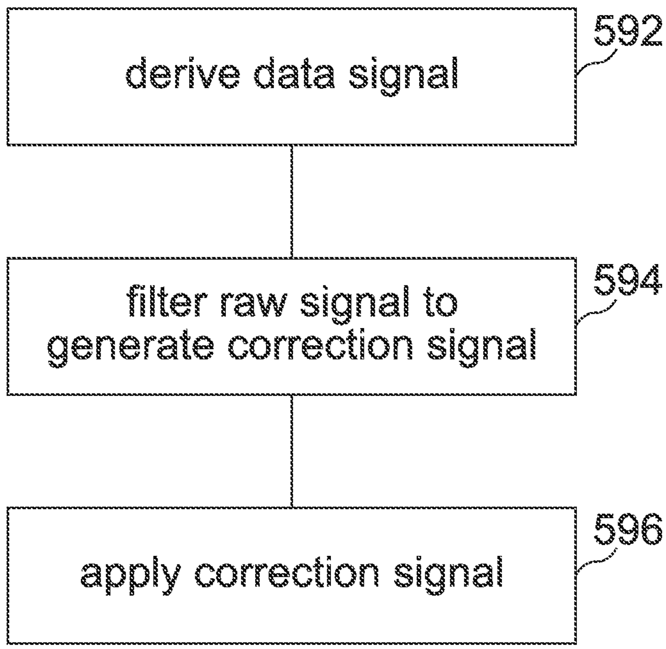
FIG. 5*f* illustrates a flowchart of an example of a method to mitigate leakage of a first interconnect into a second interconnect.

While FIGS. 5*c* to 5*e* illustrate examples of data transmission systems and data reception systems enabling leakage cancellation, FIG. 5*f* illustrates a flowchart of a method to mitigate leakage of a first interconnect into a second interconnect by means of one or both of the previously described systems.

A method to mitigate leakage of a first interconnect into a second interconnect comprises deriving a data signal 592 from a first data signal generated by a first transmitter of the first interconnect to generate a raw signal. The method further comprises filtering the raw signal 594 to generate a correction signal and applying the correction signal 596 to a second data link used by the second interconnect.

According to some examples, deriving the data signal from the first data signal may comprise sampling the first data signal, for example, if the method is implemented on the receiver side. According to further examples, deriving the data signal from the first data signal may comprise copying the first data signal, for example if the method is implemented on a transmitter side.

According to some examples, filtering uses a high pass characteristic for reasons elaborated on before.

Some examples further comprise adjusting at least one of an amplitude, phase and delay of the correction signal. Adjusting one of those parameters may serve to tune the correction signal such that it corresponds as close as possible to the signal leaking from the first interconnect into the second interconnect and to so cancel the leaking signal as good as possible.

In order to be able to judge as to how good the leakage is cancelled and/or how well the filtering of the raw signal mimics the leaking signal, further examples comprise determining a signal characteristic of a second data signal on the second data link.

According to some examples, the characteristic is at least one of a Bit Error Rate (BER) or Jitter. The Bit error rate or jitter of the second data signal which is impaired by the leakage may allow to judge how badly the leakage impairs the signal. For example, if the bit error rate is high, one may conclude, that the present leakage does still result in a high degradation of signal quality. Likewise, high jitter rate may allow for the same conclusion. On the other hand, if both of the signal characteristics are low, one may conclude, that the leakage cancellation is working well.

Further examples comprise varying a filter characteristic to filter the raw signal until the signal characteristic fulfills a predetermined criterion. Evaluating the signal characteristic repeatedly while varying the filter characteristics until a predetermined criterion is fulfilled may serve to adjust the filter characteristics to match the properties of the leakage as good as possible during operation. For example, the predetermined criterion may be fulfilled if the signal characteristic exhibits a minimum or if the signal characteristic is below a predetermined threshold. It may be concluded that the signal characteristic exhibits a minimum if, within a given search space of filter characteristics, the minimum of a particular signal characteristic is experienced at given filter characteristics. The so determined given filter characteristics may then be used during operation to mitigate the signal impairments caused by leakage from the first interconnect into the second interconnect.

Filter characteristics to be varied may, for example, be the attenuation of the signal at a certain frequency, a phase shift applied to the signal within the filter, a lower and/or an upper frequency in which the filter is effective or any arbitrary other characteristic of a filter. According to some examples, the transfer function of the filter may be varied.

Figure 6A:
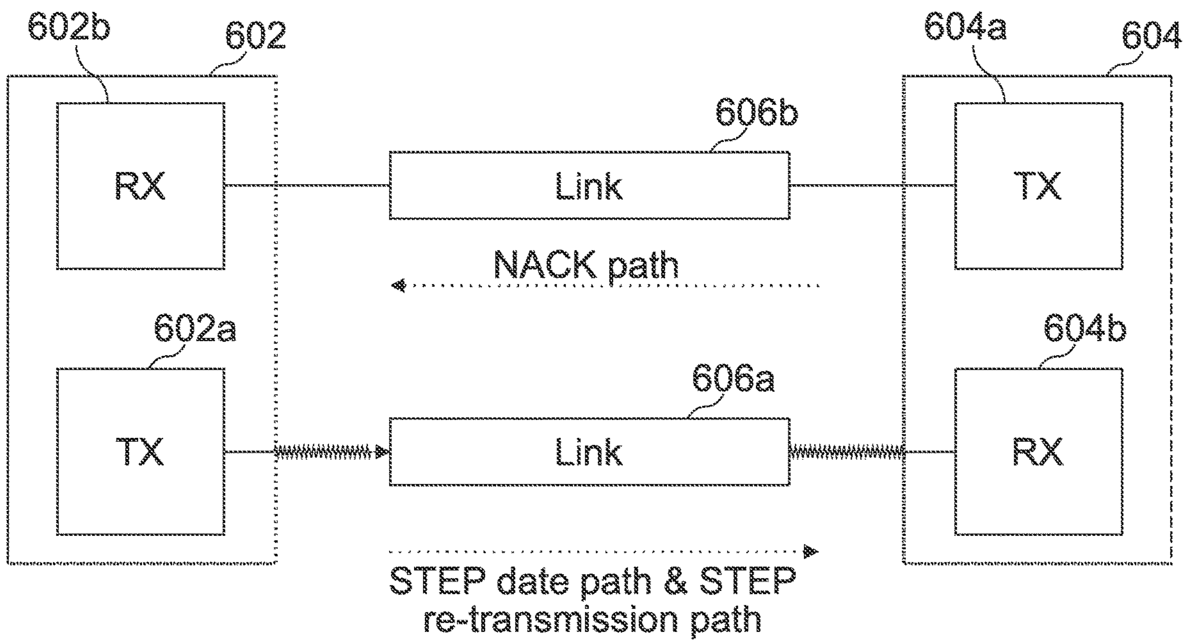
FIG. 6*a* illustrates a STEP interlink.

Interconnects, such as for example a STEP interface illustrated in FIG. 6*a*, are often required to work at very low bit error rates (in the event of a STEP interconnect, a bit error rate may be required to be as low as BER=1e-12). In a STEP interconnect, a STEP transceiver 602 comprises a transmitter 602*a* coupled to a first transmission link 606*a* and a STEP receiver 602*b* be coupled to a second transmission link 606*b*. Likewise, STEP transceiver 604 comprises a transmitter 604*a* coupled to the second transmission link 606*b* and a STEP receiver 604*b* be coupled to the first transmission link 606*a* to establish a STEP interconnect comprising two unidirectional transmission links.

STEP generations may support BAUD=20 Gbps as well even higher Baud rates, such as for example 40 Gbps. Increasing the BAUD rate of a STEP interconnect means that the time difference between the symbols (the symbol separation time) needs to become shorter, while the noise and jitter are not going to be lower. For example, in the event of STEP, low BERs require jitter of the data signal to be very low to avoid errors in determining the symbols. For other interconnects than STEP, requirements for other parameters as jitter may be equally demanding to achieve low BERs.

Nonetheless, increasing the bandwidth (BAUD) of an interconnect without increasing a bit error rate may be desirable.

Figure 6B:
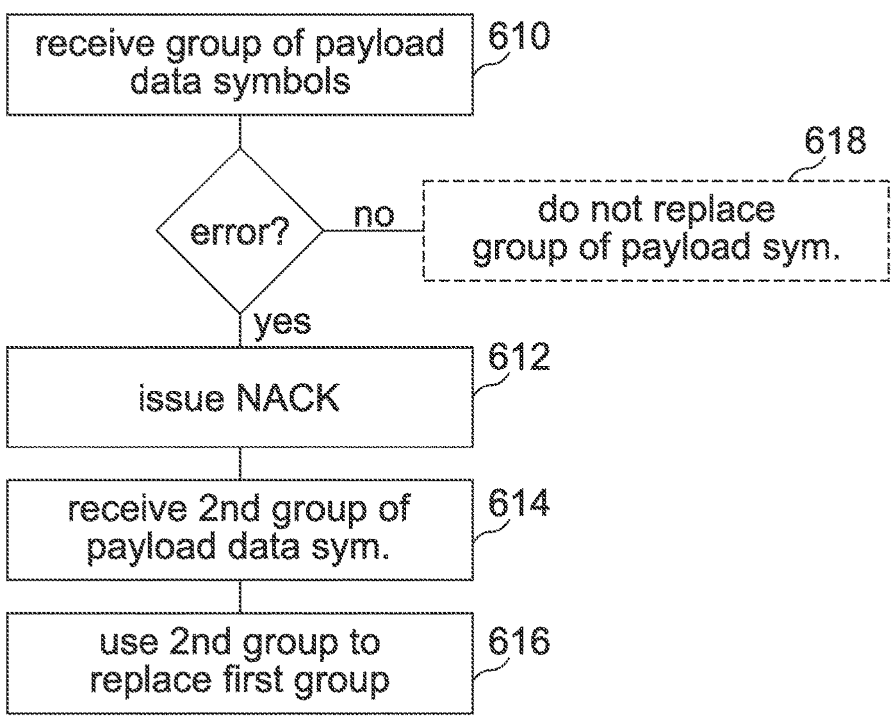
FIG. 6*b* illustrates a flowchart of an example of a method for processing a data signal.

FIG. 6*b* illustrates a flowchart of an example of a method for processing a data signal.

According to the example illustrated in FIG. 6*b*, a group of payload data symbols is received 610. If the data symbols of the group contain an error, a negative acknowledge signal 612 is issued. Further, if an error is detected, a second group of payload data symbols is received 614 either a predetermined number of groups of payload data symbols after issuing the negative acknowledge signal or a predetermined number of groups of payload data symbols after receiving the group of payload data symbols. The method further comprises using 616 the payload data symbols of the second group instead of the payload data symbols of the group.

Issuing a negative acknowledge signal (NACK) at the presence of an error may, for example, allow to make a transmitter retransmit the information contained in the group of payload data symbols using a second group of payload data symbols. A receiver or an apparatus for processing the received data signal may then use the retransmission by means of the second group of data symbols to determine the correct payload data. Since the round-trip times of the interconnect using the method illustrated in FIG. 6*b* may be known, the time that lapses or the number of groups of payload data symbols that are received until the retransmission by means of the second group of payload data symbols is received is predictable. Therefore, a receiver implementing the method may a priori know what subsequent group of payload data symbols comprises the retransmission. Hence, any further overhead required to signal that a presently received group of payload data symbols comprises a retransmission, can be avoided. In a first alternative, the groups of symbols to wait until the retransmission by means of the second group of payload data symbols is received is counted starting from the group of payload data symbols containing the error. In a second alternative, counting may be started at the time of issue of the negative acknowledgment signal.

If no error is determined for payload data symbols of a group, an embodiment of a method may proceed to skip replacing the group of payload data symbols as illustrated by means of optional STEP 618 in FIG. 6*b*.

According to some examples, the group of payload data symbols and the second group of payload data symbols used for the retransmission may be demodulated using different demodulation schemes. For example, a more robust modulation scheme may be chosen for the retransmission within the second group of payload data symbols. A more robust modulation scheme is a modulation scheme that is more error tolerant for errors affecting signal parameters of a data signal during transmission. For example, in the event of a STEP-interconnect, a more robust modulation scheme may use longer symbol separation times to distinguish neighboring symbols. Longer symbol separation times may allow for higher jitter to be present without resulting with demodulation errors. Using a more robust modulation scheme may, hence, avoid to repeatedly receive corrupted payload data.

According to some examples, the groups of payload data symbols are received via a first transmission link, while the negative acknowledgment signal is transmitted via second transmission link. Using another transmission link may avoid to switch the first transmission link from receiving mode to transmitting mode and so may save latency until the negative acknowledge signal is issued and, therefore, also avoid additional latency until the retransmitted data symbols of the second group are received.

An error within the group of payload data symbols may, for example, be determined using a cyclic redundancy check (CRC) or any other error detection method. Cyclic redundancy checks may be advantageous in that they can be continuously computed as the data is received serially via the interconnect.

According to the examples, only negative acknowledgment messages are transmitted, saving an overhead for transmitting positive acknowledgment messages while still being able to retransmit the data contained in corrupted payload data symbols.

Figure 6C:
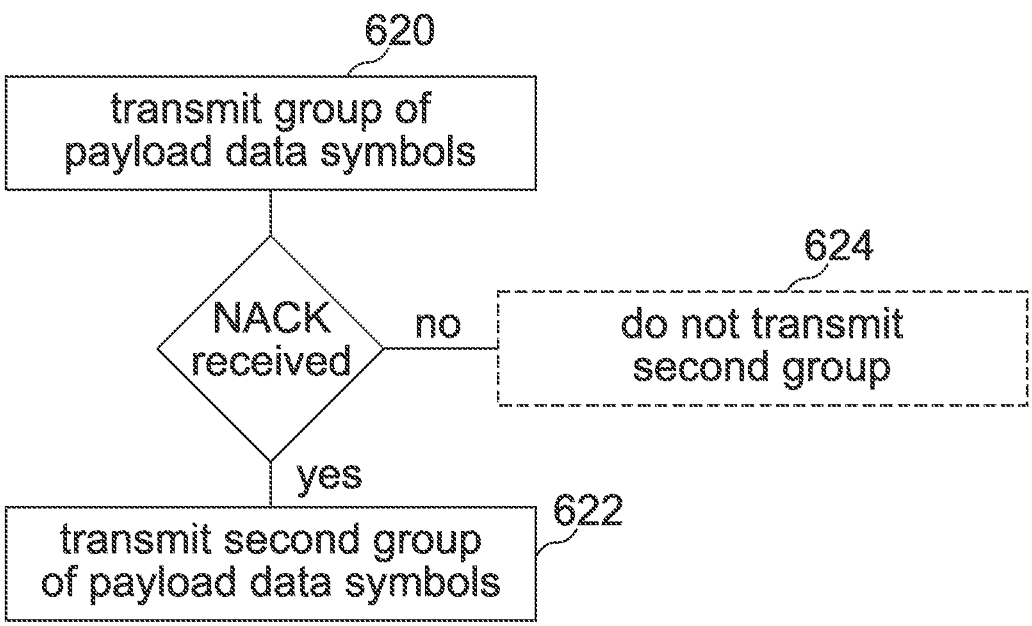
FIG. 6*c* illustrates a flowchart of an example of a method for generating a data signal.

FIG. 6*c* illustrates a flowchart of an example of a method for generating a data signal, which may, for example, be implemented within a transmitter.

The method comprises transmitting a group of payload data symbols 620. If a negative acknowledge signal is received, the method further comprises transmitting 622 a second group of payload data symbols related to the group of payload data symbols. As elaborated on already previously with respect to FIG. 6*b*, the second group of payload data symbols may be transmitted either a predetermined number of groups of payload data symbols after transmitting the group of payload data symbols or a predetermined number of groups of payload data symbols after receiving the negative acknowledge signal. Once the round-trip time or the propagation delay of a data signal on an interconnect is known, the receipt of the negative acknowledge signal may be sufficient to identify the group of payload data symbols containing the error and sent previously. For example, the second group of payload data symbols may be transmitted immediately upon receipt of the negative acknowledgment signal. Upon receipt of the negative acknowledgment signal, payload data contained in a group of payload data symbols already sent a predetermined number of groups before is then resent. As illustrated in FIG. 6*c*, if no negative acknowledge message is received, the method may optionally skip transmit the second group of data symbols in STEP 624.

Various further examples may implement aspects already elaborated on with respect to FIG. 6*b* also within the method for processing a data signal, as for example modulating using different modulation schemes. For a discussion of those optional implementations, reference is herewith made to the description of FIG. 6*b* to avoid redundancy.

Subsequently, FIGS. 6*d* and 6*e* shortly and schematically illustrate apparatuses for processing a data signal and for generating a data signal, which may implement the methods of FIGS. 6*b* and 6*c*.

An apparatus for processing a data signal 630 comprises a receiver circuit 632 configured to receive groups of payload data symbols. The apparatus 630 further comprises an error detection circuit 634 configured to generate a negative acknowledge signal if the data symbols of a group of payload data symbols contain an error. Error correction circuitry 636 is configured to use a second group of payload data symbols to replace the group of payload data symbols, the second group of payload data symbols being received a predetermined number of groups of payload data symbols after issuing the negative acknowledge signal or the group of payload data symbols being received a predetermined number of groups of payload data symbols after receiving the group of payload data symbols.

An apparatus for generating a data signal 640 comprises a transmitter circuit 642 configured to transmit a group of payload data symbols. The apparatus 640 further comprises an input interface 644 configured to receive a negative acknowledge signal. The transmitter circuit 642 is further configured to transmit a second group of payload data symbols related to the group of payload data symbols either a predetermined number of groups of payload data symbols after transmitting the group of payload data symbols or a predetermined number of groups of payload data symbols after receiving the negative acknowledge signal.

Figure 6D:
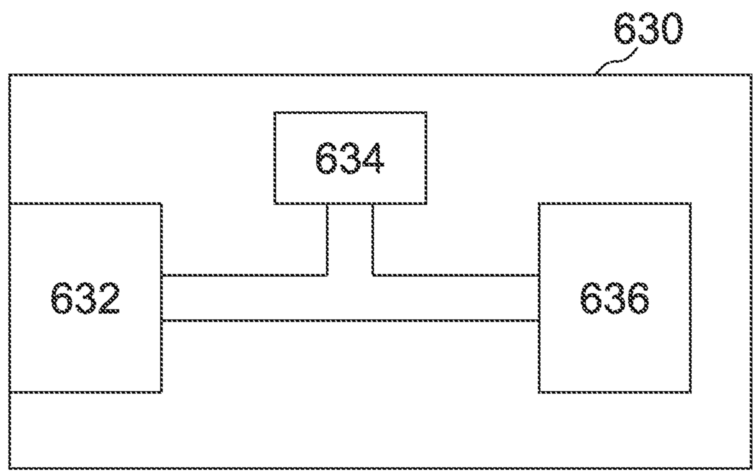
FIG. 6*d* illustrates an example of an apparatus for processing a data signal.
Figure 6E:
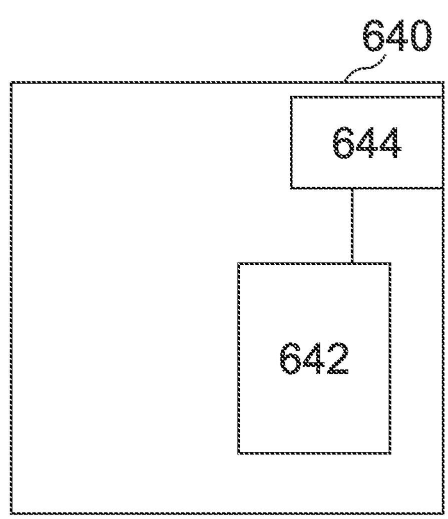
FIG. 6*e* illustrates an example of an apparatus for generating a data signal.
Figure 6F:
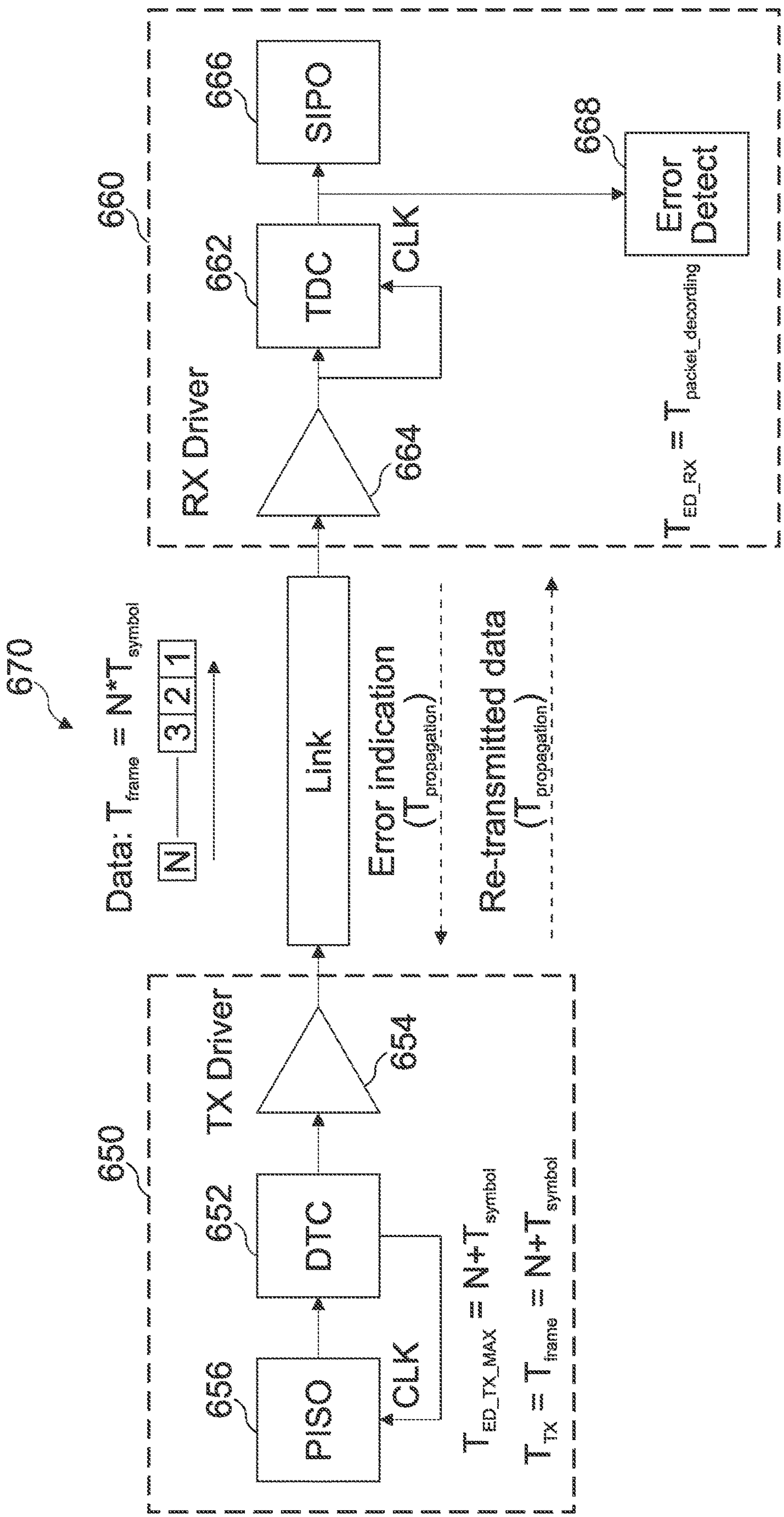
FIG. 6*f* illustrates an example of an interconnect for data transmission.

FIG. 6*f* illustrates an example of an interconnect for data transmission, in particular for a STEP interconnect. The interconnect comprises a first physical layer controller 650 within a transmitter, a second physical layer controller 660 within a receiver and a transmission link 670 connecting the first physical layer controller 650 and the second physical layer controller 660.

The second physical layer controller 660 may, for example, comprise an apparatus for processing a data signal 630 as illustrated in FIG. 6*d*. Likewise, the first physical layer controller 650 may, for example, comprise an apparatus for generating a data signal 640 as illustrated in FIG. 6*e*. Since FIG. 6*e* illustrates a STEP-interlink, the transmitter comprises a digital to time converter 652 to generate the data signal based on the series of data symbols, while the receiver comprises a Time to Digital converter 662 to generate the data symbols based on the received data signal. Amplifiers 654 and 664 serve to amplify the data signal and the received data signal, respectively. Since the STEP interface is a serial interface, parallel to serial converter 656 (PISO) and serial to parallel converter 666 (SIPO) serve to serialize and deserialize the data before transmission to and after reception from higher order protocol layers, such as for example from a MAC layer. The error detection circuit 668 of the example of physical layer controller 660 illustrated in FIG. 6*f* is connected to the output of the time to digital converter 662 to operate on the series of received data symbols directly. Further examples may, likewise, have the error detection circuit also connected to the data stream after the serial to parallel converter 666, depending, for example, on the error detection method used. FIG. 6*f* illustrates one transmission link 670 connecting the transmitting physical layer controller 650 to the receiving physical layer controller 660. For the transmission of NACK messages from the receiving physical layer controller 660 to the transmitting physical layer controller 650, a further transmission link may be used. Alternatively, also an interconnect working according to a different communication protocol than STEP may be used to transport NACKs.

Using an example of a method or of an apparatus as described previously may allow to accept lower bit error rates over a transmission link while maintaining a desired overall bit error rate since errors within individual groups of data symbols are recovered by means of a retransmission of the erroneous payload data using a second group of data symbols. The combination of accepting more groups containing erroneous in data symbols due to the higher net bandwidth of the interlink with the mechanism of controlled retransmission with low overhead within the physical layer controller may result in a higher bandwidth at a high bit error rate. In other words, the additionally errors caused by the higher net data rate (lower symbol separation times for a STEP interface) are compensated by a highly efficient mechanism of retransmission. As compared to a re-transmission initiated by the MAC-layer, the latency cost by the retransmission mechanism is maintained very low.

In other words, the examples described before can be summarized to be based on the following principles. The BER over the STEP link is deliberately lowered (for example from BER=1e-12 to 1e-4) in order to allow working with short symbol separation times to increase the net bandwidth. Error detection is performed at the PHY layer and only NACKs are transmitted (negative acknowledgment) over a link (e.g. another transmission line than the one used for receiving) link, which may be a STEP transmission link or another transmission link. Re-transmission is done once due to low latency requirement. The transmitted packet may be transmitted with better net BER (lower number of active symbols), e.g. with a more robust modulation scheme. Since the link delay is known a priori, the NACK toggles the TX side at a known time causing it to automatically resubmit the correct group of data symbols (package), resulting in low NACK detection and data preparation times.

One particular example for evaluating the performance of a STEP interface is illustrated in FIG. 6*g*. The performance is compared with a standard STEP implementation having a BAUD rate of approx. 20 Gbps at symbol separation times of approx. 24 ps and 12 ps (picoseconds). Doubling the BAUD rate to 48 Gbps may decrease the symbol separation time to approx. 9 or 6 ps. Since noise would be constant and the Inter-Symbol Interference would increase due to the higher spectral content, the BER over the transmission link (net BER) will increase. However, using an example as described with respect to FIGS. 6*b* to 6*f* (fast re-transmission) may allow to work with such short pulses. For example, one can accept a low BER over the STEP and correct the errors using a fast re-transmission (FRT) mechanism.

As illustrated in FIG. 6*g*, one may even accept a BER=1e-4 for the transmission link. Without FRT one arrives at a noise budget of 8.55 ps_p2p (for BER=1e-12) and with FRT one arrives at a noise budget of 5.6 ps_p2p (BER=1e-4 and after FRT BER=1e-12).

In order to speed-up the retransmission mechanism, only NACKs are transmitted. The NACK may be transmitted over the other trace/transmission link (not transmission link that is in TX mode). If the other transmission link is inactive (it can be in a low power GPIO mode), it may nonetheless be used for transmission of NACKs. If the other transmission link is active in STEP mode, a special delimiter may be used to submit NACK, speeding up the NACK detection.

The re-transmission link propagation is known (can be measured) therefore, although the STEP rate is none constant, the position of the retransmitted packet can be fixed (e.g. the re-transmitted packet would be sent to the RX after a fixed number of packets from the moment that the NACK was generated by the RX). Due to the fact that the actual BER over the link is low, much lower than 1e-12, the number of bad packets might be high and the number of consecutive packets might be also higher (compared to BER=1e-12), therefore the re-transmitted packet may be transmitted in a secured manner (as for example by going from normal 8 symbols and BER=1e-12 to 4 symbols and BER<<1e-12).

Within a STEP interconnect, evenly distributed symbols may be generated, which is, every symbol is transmitted with equal probability. However, due to implementation limitations and impairments, the symbols that are transmitted over the STEP transmission link and subsequently recovered by a STEP receiver might have none-equal distributed probability for errors. Different symbols might experience different probabilities to be impaired and received incorrectly. Since the overall Bit Error Rate (BER) is sensitive to the distribution of the probability of errors of the individual symbols, a sub-optimal performance of the interconnect might result. There may be a desire to increase a BER of a highspeed interconnect, such as for example, a STEP interconnect.

Figure 7A:
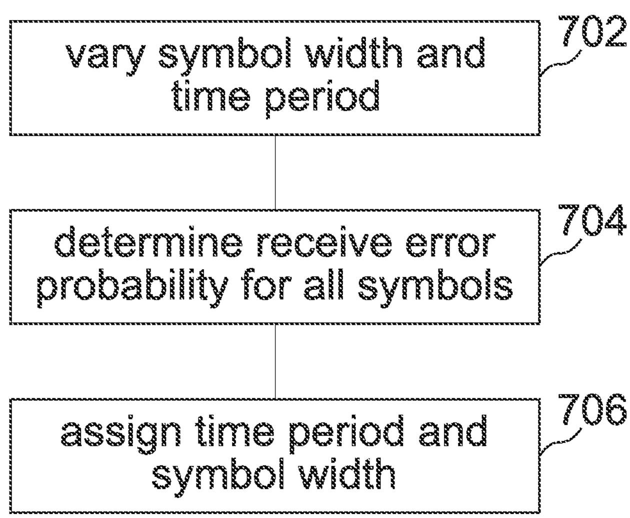
FIG. 7*a* illustrates a flowchart of an example of a method for determining an assignment of a time period and a symbol width to each payload data symbol of a communication protocol.

An example of a method for determining an assignment of a time period and a symbol width to each payload data symbol of a communication protocol is illustrated FIG. 7*a*.

The method comprises a variation process 702 varying the symbol width and the time period assigned to at least one payload data symbol. Varying the symbol width and the time period results in varying the probability to determine the associated symbol at the presence of deteriorations of the data signal, which may, for example, increase jitter. Increasing the symbol width results in greater acceptable jitter to still determine the symbol correctly. Increasing the symbol width of one symbol may result in a decrease of the available symbol widths for the remaining symbols. The method further comprises determining a receive error probability 704 for all payload data symbols which may allow to consider the impact of the variation of the symbol width and the time period of one symbol on the remaining symbols. Further, the method comprises assigning the present time period and the symbol width to the payload data symbol 706 if the receive error probability of all payload data symbols is equal within a predetermined tolerance range. Applying the criterion that the receive error probability of all payload data symbols is to be as equal as possible, may result in the best achievable overall BER of the interlink, as the following considerations will show.

Figure 7B:
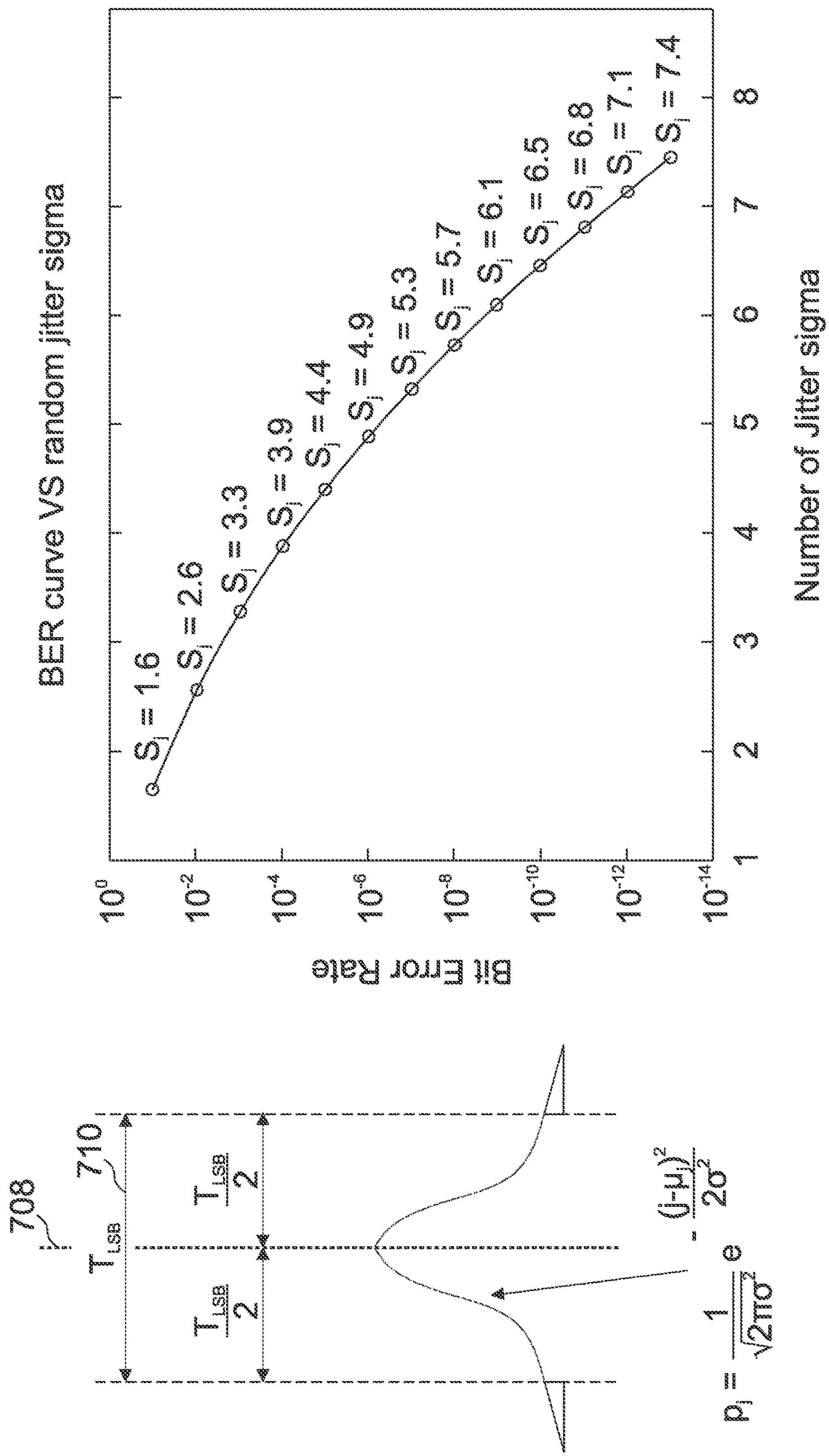
FIG. 7*b* illustrates a probability distribution of edge positions of a payload data symbol.
Figures 1, 7C:
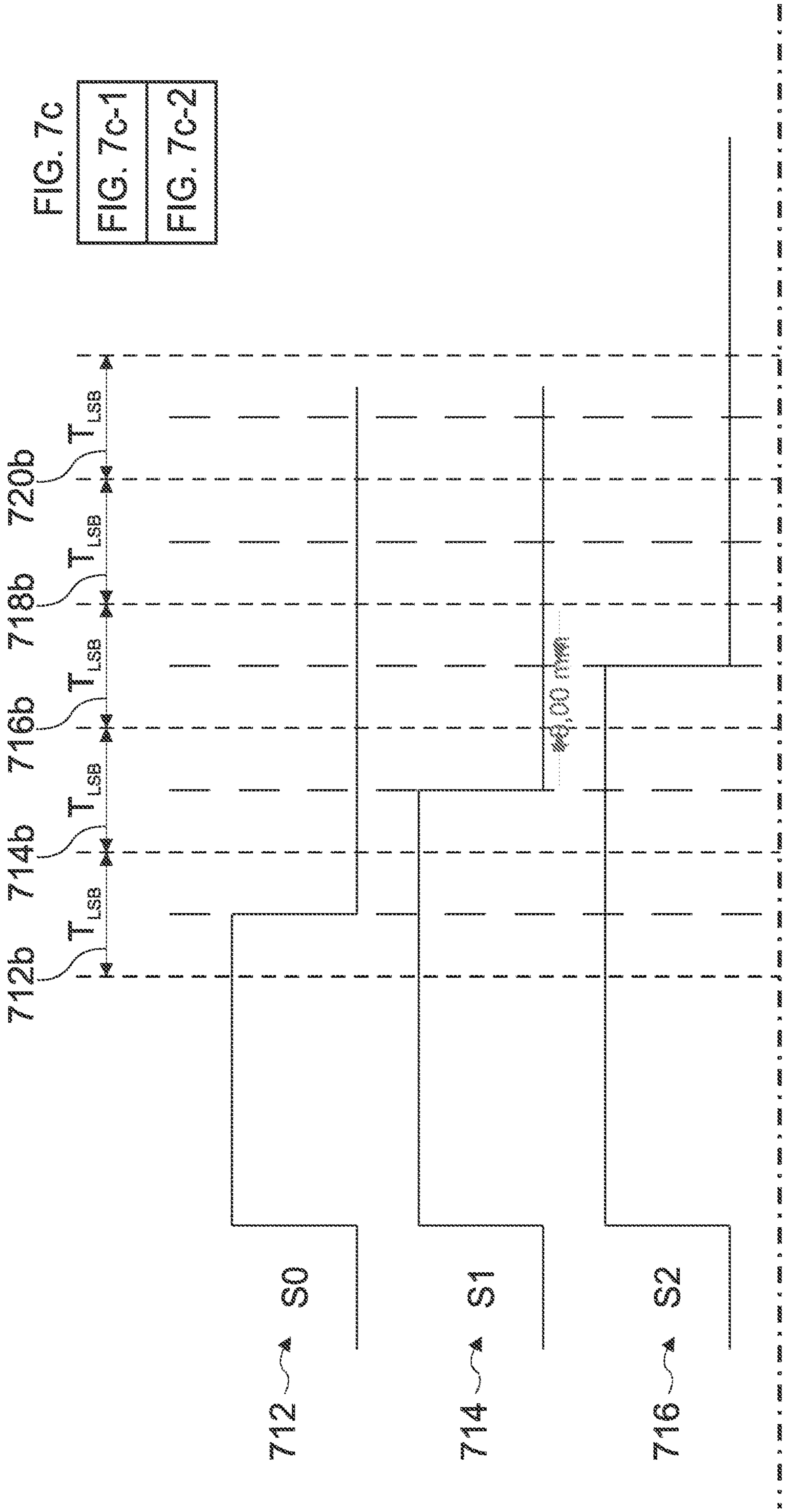
FIG. 7*c*, broken into partial views 7*c*-1 and 7*c*-2, illustrates a STEP interlink with equal probability distributions of all payload data symbols.
Figures 2, 7C:
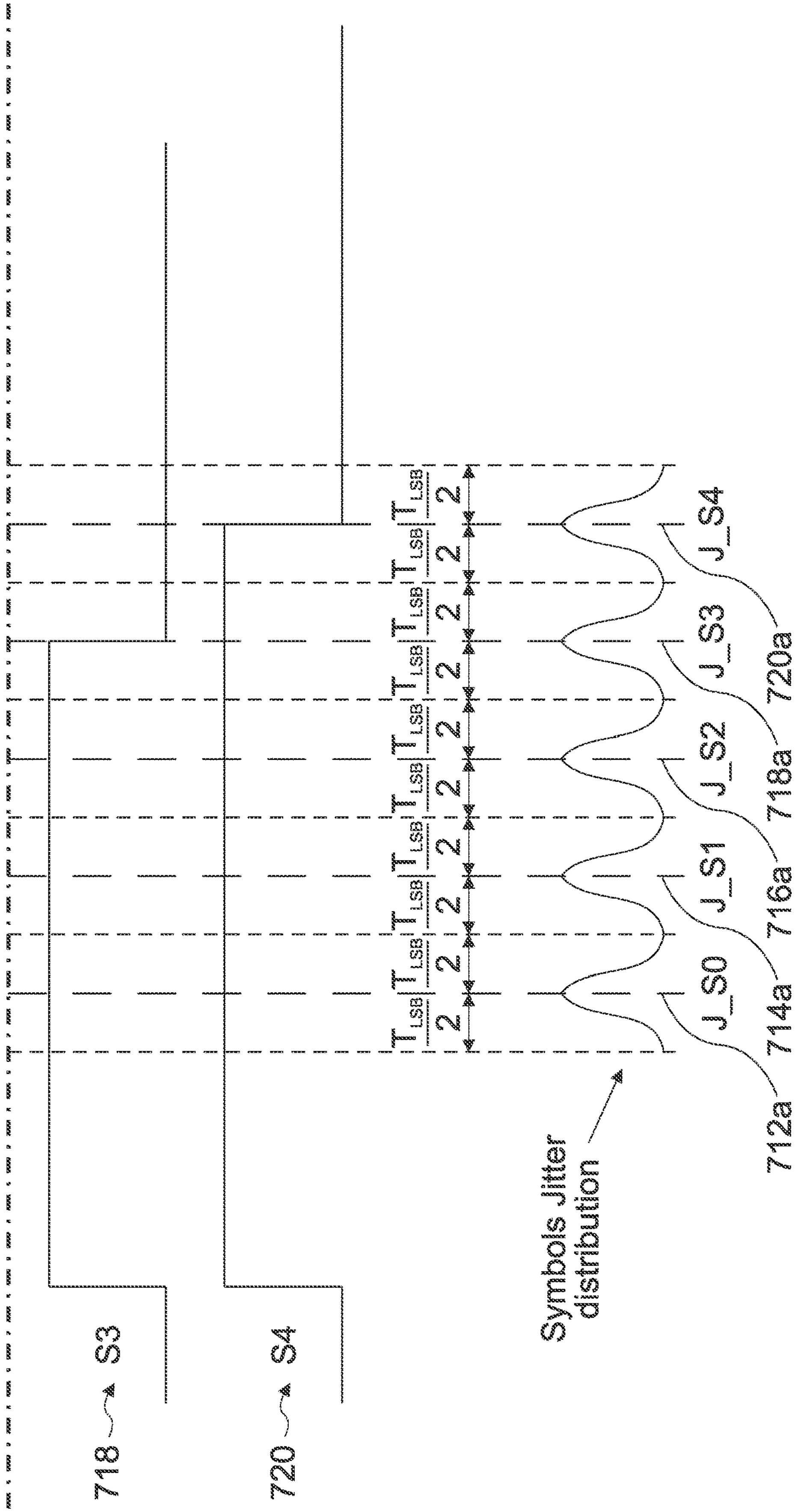

FIG. 7*b* illustrates an example of a probability distribution of the arrival time of a signal edges of a payload data symbol in a STEP interlink. In the particular example of FIG. 7*b*, the probability distribution $P_j$ is assumed to be gaussian, hence symmetric about the time period 708 ($\mu_j$) associated to payload data symbol j, having a standard deviation $\sigma_j$:

$$P_j = \frac{1}{\sqrt{2\pi\sigma_j^2}} e^{-\frac{(t-\mu_j)^2}{2\sigma_j^2}}$$

The symbol width 710 is the time interval around the payload data symbol's time period 708 in which an edge received by a receiver is interpreted to be payload data symbol j. Receiving an edge outside the time interval given by the time period 708 and the symbol width 710 results in a misdetection of payload data symbol j and so increases the receive error probability $P_{ej}$ of payload data symbol j. The standard deviation $\sigma_j$ of the distribution may, for example, be dominated by random jitter.

Given the standard deviation $\sigma_j$ of the distribution, a symbol width 710 required to achieve a specific BER for a particular payload data symbol can be expressed in terms of the standard deviation $\sigma_j$ as illustrated in the right graph of FIG. 7*b*.

However, the BER of the complete interlink also has contributions from the other possible payload data symbols, as illustrated by means of FIG. 7*c* for an exemplary system having N=5 symbols 712, 714, 716, 718, and 720 with associated nominal time periods 712*a*, 714*a*, 716*a*, 718*a*, and 720*a*. FIG. 7*c* illustrates a configuration where all payload data symbols have the same $P_{ej}$, which is $\sigma_j$ (and so the symbol widths 712*b*, 714*b*, 716*b*, 718*b*, and 720*b*) are identical for all payload data symbols. Further, it is assumed, that the probability for transmitting a specific symbol is $P_S$ and it is the same for all payload data symbols to compute the overall BER.

$$BER = \sum_{n=1}^{N} P_s \cdot P_{ej} = P_j$$

In STEP, there may be both deterministic jitter (calibration or signal dependent jitter) and Gaussian random jitter (from random noise sources). Assuming that $P_j$ is dominated by Gaussian random jitter, the assumption that all symbols experience an identical $P_{ej}$ may be reasonable. In order to obtain BER=1e-12 (corresponding to 7.1σ), one needs to assure that each symbol complies with:

$$\frac{T_{LSB}}{2} > 7.1\sigma,$$

meaning that the symbol widths 712*b* to 720*b* need to be greater than 14.2σ.

However, due to implementational details, different symbols may also experience different probability distributions $P_j$, in particular having different standard deviations $\sigma_j$.

Figures 1, 7D:
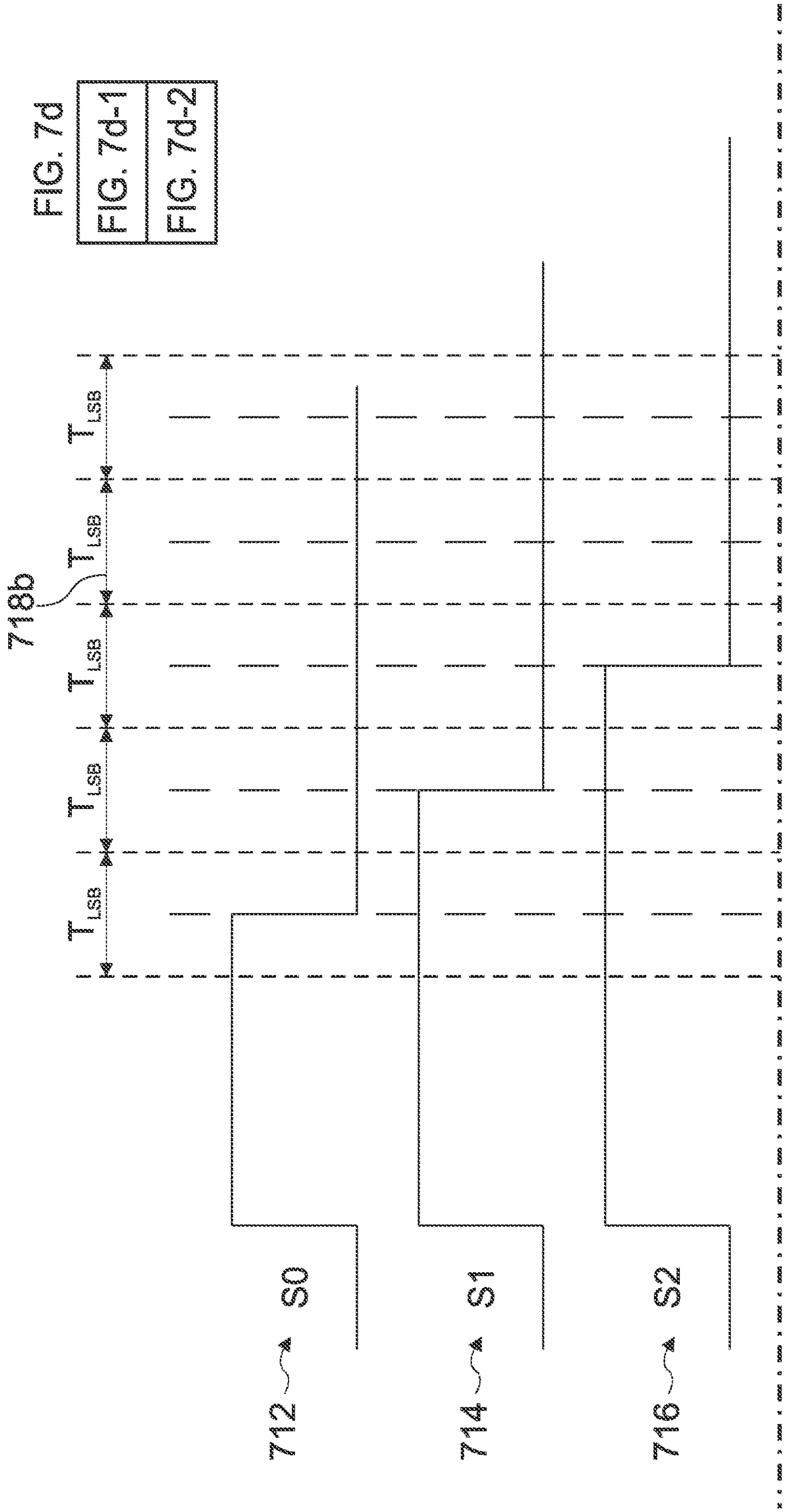
FIG. 7*d*, broken into partial views 7*d*-1 and 7*d*-2, illustrates a STEP interlink with non-equal probability distributions of payload data symbols.
Figures 2, 7D:
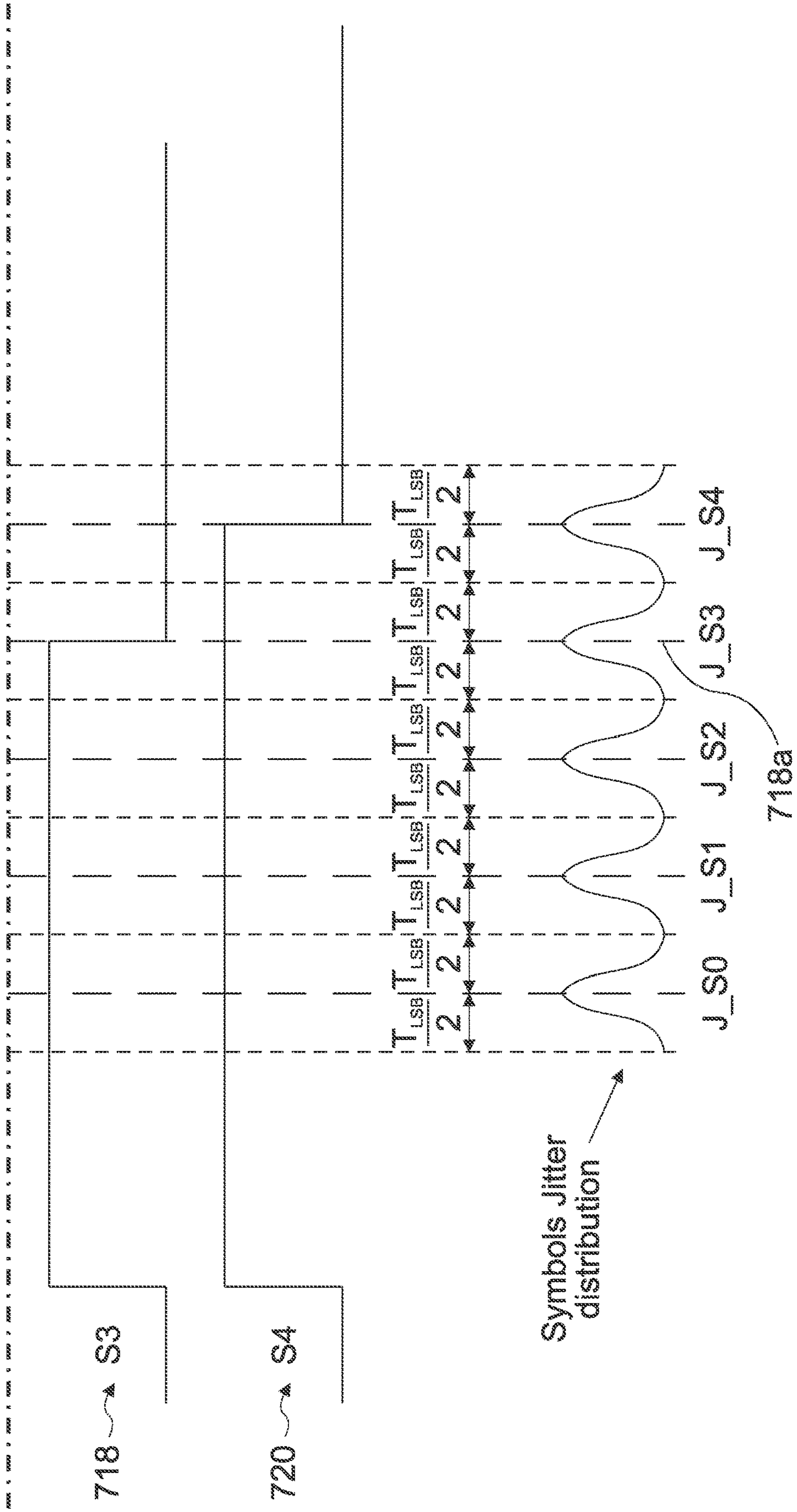

FIG. 7*d* illustrates the same system as in FIG. 7*c*, with the difference that payload data symbol 3 (718) experiences more jitter and consequently a lower Pe (e.g. Pe3>>Pe), resulting in the overall BER to be:

$$BER = \sum_{j=1}^{N} P_s \cdot P_e[j] = \frac{N-1}{N} P_e + \frac{1}{N} Pe_3 \approx \frac{1}{N} Pe_3$$

Under those circumstances, the overall BER may be dominated by payload data symbol 3. Assuming that payload data symbol 3 of FIG. 7*d* has higher random jitter resulting in the symbol width 718*b* ($T_{LSB}$)=$J_{S3}$=±5.7σ, the above considerations result with Pe3=1e-8, leading to an overall BER of approx. 1e-9, which is not optimal.

According to the method illustrated in FIG. 7*a*, however, the symbol width and the time period of symbol 3 may be varied until the receive error probability for all payload data symbols becomes as equal as possible, which may, for example, be achieved by demanding that all error probabilities are within a predetermined tolerance range. The receive error probability indicates the probability that a payload data symbol generated using the assigned time period is received within a time interval given by the assigned symbol width centered around the assigned time period. For the given time budget, varying the symbol width of one payload data symbol results will also adjusting the time periods and symbol widths of the other payload data symbols, or, of at least one further payload data symbol. According to some examples, it may be required to redetermine the receive error probabilities for all payload data symbols after variation. This may, for example, be achieved by transmitting a predetermined sequence of payload data symbols and determining the received sequence of payload data symbols. Comparing the predetermined sequence of payload data symbols with the received sequence of payload data symbols may then allow to conclude on the receive error probability of all symbols. Determining a receive error probability generally comprises transmitting a data signal comprising a data pulse with a width of the time period assigned to a payload data symbol and receiving the data signal. The payload data symbol is considered received if a data pulse having a width within a time interval given by the symbol width centered around the time period is received within the data signal.

If the symbols are determined using a time to digital converter, the symbol width may be changed in finite steps of a resolution of a time to digital converter. Likewise, varying the time period may comprise changing the time period in finite steps of a resolution of the digital to time converter.

If the receive error probabilities of the payload data symbols fulfill the requirement, the present time period and the present symbol width is assigned to the symbol having experienced the variation. According to the method, it may be achieved, that all payload data symbols experience nearly identical or identical receive error probabilities, resulting in the best achievable overall BER according to the previous considerations. Using the method for the example illustrated in FIG. 7*d*, one would lower the symbol widths of symbols #0, #1, #2, #4 (712, 714, 716, and 720) and increase the width of symbol #3 (718), to arrive at an even Pe for all the symbols. In the particular example, one would increase the symbol widths of payload data symbol 3 by ~20% and decrease the symbol widths of the other four symbols by ~5%. Doing this, one results with time periods and symbol widths for all payload data symbols which are equally separated by approx. ±6.8σ, resulting in an overall BER of approx. 1e-11, which is way better than 1e-9 dominated by payload data symbol 3 without using an example of a method to assign individual symbol periods and symbol widths.

Examples of the method may be characterized as a water pouring method allowing optimization of the BER over a communication interlink, such as for example a STEP interlink.

The method of FIG. 7*a* may, for example, be performed as an online calibration, for example, when the interlink is powered up or within a special calibration cycle. The method may also be performed once during a factory calibration of an interlink.

Parts of the method illustrated by means of FIG. 7*a* may be performed on a receiving side, while other parts may be performed on a transmitting side of an interlink. While the variation of the symbol width may only be performed on the receiving side by a method for processing a data signal, the variation of the time period associated to the payload data symbols may be performed on both the receiving side by a method for processing a data signal and the transmitting side by a method for generating a data signal.

Figure 7E:
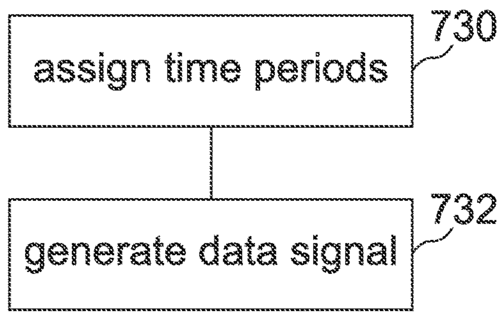
FIG. 7*e* illustrates a flowchart of an example of a method for generating a data signal.

FIG. 7*e* illustrates a flowchart of an example of a method for generating a data signal, which may be performed on the transmit side of an interlink.

The method comprises assigning a time period 730 within a data signal to each payload data symbol, the time periods of neighboring pairs of payload data symbols being separated by an associated symbol separation time. The time periods are assigned such that at least a first symbol separation time is different from at least a second symbol separation time. The method further comprises generating 732 the data signal. By assigning time periods to the individual payload data symbols such that the symbol separation times between neighboring payload data symbols may differ, the method allows to generate a data signal having equal receive error probabilities for all payload data symbols on the receiver side. Hence, an overall BER of communication interlink may be optimized.

Figure 7F:
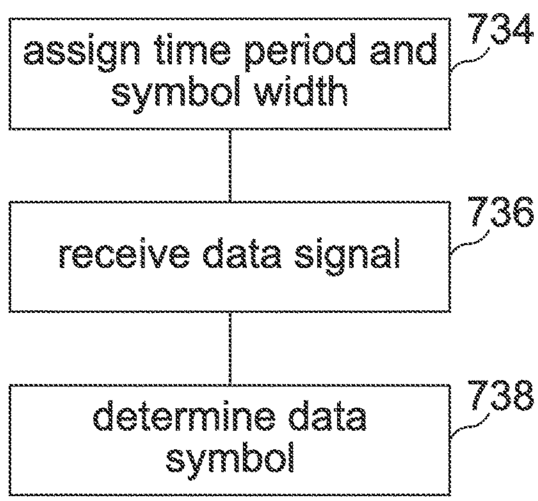
FIG. 7*f* illustrates a flowchart of an example of a method for processing a data signal.

FIG. 7*f* illustrates a flowchart of an example of a method for processing a data signal as it may be performed on a receive side. The method comprises assigning 734 a time period and a symbol width to each payload data symbol of a communication protocol, wherein at least a first symbol width is different from at least a second symbol width. The method further comprises receiving 736 a data signal comprising a series of data pulses. Further, the method comprises determining 738 that a payload data symbol is received if a data pulse having a width within a time interval given by the assigned symbol width centered around the assigned time period is received within the data signal. Allowing for different symbol width and time periods for individual payload data symbols, and overall BER of an interlink may be decreased.

For example, as compared to STEP implementations where all payload data symbols have uniform conditions in the TX and RX, channel and STEP impairments may now be considered by none-evenly distributed probability of errors which lowers the overall BER.

While some examples of the method may be performed as an online or factory calibration, further examples may use a predetermined set of individual time periods and symbol widths, based on a priori knowledge on the communication interlink.

Figure 7G:
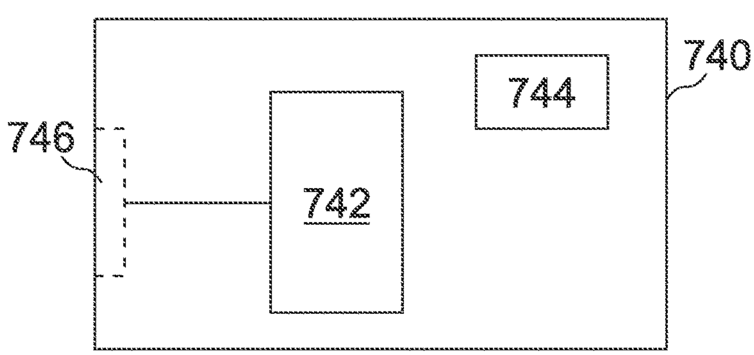
FIG. 7*g* illustrates an example of an apparatus for generating a data signal.
Figure 7H:
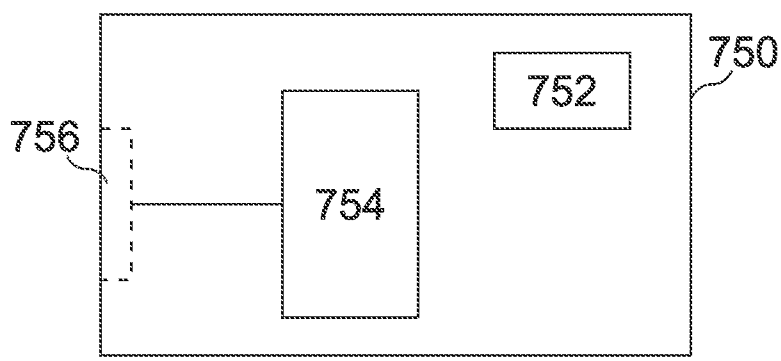
FIG. 7*h* illustrates an example of an apparatus for processing a data signal.
Figure 7I:
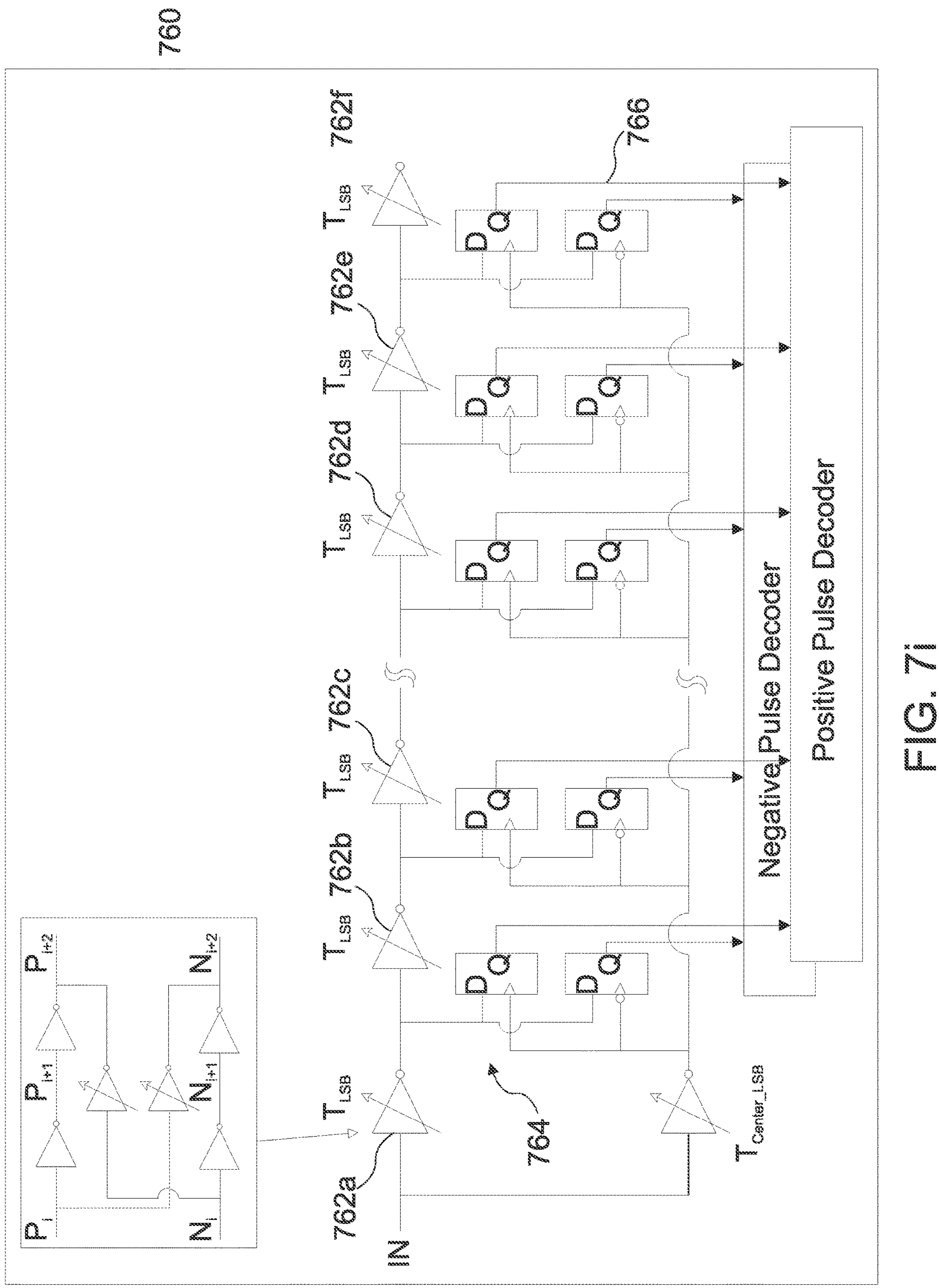
FIG. 7*i* illustrates a time-to-digital converter.

For example, in a STEP interlink, systematic impairments of the data signal may be present, causing a non-uniform receive error probabilities. For example, if the dominant impairment comes from the supplier modulation of the time to digital converter (TDC) used to receive the data signal, as for example illustrated in FIG. 7*i*, the higher the number of the symbol, the higher the error in the determination of the associated signal edge may be. As illustrated in FIG. 7*i*, a TDC may be implemented as a sequence of inverters 762*a* to 762*f*, operating as delay elements, which may, according to the implementation, also allow to tune the individual delay elements constituted by the inverters. An output of each delay element 762*a* to 762*f* is coupled to two flip-flops, which are reset upon occurrence of a signal edge within the data signal. Using the setup, a first bank of flip-flops 764 outputs a signal when a positive signal edge is present within the data signal, while a second bank of flip-flops 766 outputs a signal when a negative signal edge is present within the data signal. Due to the implementation, the power consumption of the TDC depends on the payload data symbol received, since longer payload data symbols result with more digital components within TDC 760 to be operated. More components consume more power and result in a higher variation of the power supply, translating into greater errors within the system. Due to the variation of the power supply, the payload data symbols having longer time periods experience higher errors (jitter). Further, for higher order (longer) symbols, the individual errors of a higher number of delay elements sum up to a higher error than for shorter symbols.

Some examples account for the systematics in that time periods are assigned to the payload data symbols such that the symbol separation times increases with increasing time periods, i.e. for higher order symbols.

Other interconnects may be dominated by signal deterioration caused by inter-symbol interference (ISI), for example, if a long and lossy cable is used for the transmission link between transmitter and receiver. Symbols with shorter time periods are more sensitive to ISI due to their higher spectral content. Further examples may account for said property in that time periods are assigned to the payload data symbols such that the symbol separation times decrease with increasing time periods. In other words, one would design a system with a decreasing symbol separation (S0 to S1 with the highest separation).

By some of the examples described previously may be implemented in software, further examples may be implemented in hardware. FIGS. 7*g* and 7*h* schematically illustrate apparatuses capable to perform one of the previously described methods.

FIG. 7*g* illustrates an example of an apparatus for generating a data signal 740. The apparatus comprises a mapping circuit 742 configured to assign a time period within the data signal to each payload data symbol, the time periods of neighboring pairs of payload data symbols being separated by an associated symbol separation time, wherein at least a first symbol separation time is different from at least a second symbol separation time. The apparatus further comprises a memory 744 configured to store the time periods.

Some examples may optionally further comprise an output interface 746 configured to output the data signal, the data signal comprising a sequence of a first signal edge of a first type, a second signal edge of a second type, and a third signal edge of the first type, the first signal edge and the second signal edge being separated by a first time period assigned to a first payload data symbol and the second signal edge and the third signal edge being separated by a second time period assigned to a second payload data symbol.

FIG. 7*h* illustrates an example of an apparatus for processing a data signal 750. The apparatus comprises a memory 752 for assigning a time period and a symbol width to each payload data symbol of a communication protocol, wherein at least a first symbol width is different from at least a second symbol width. Further, the apparatus comprises a de-mapping circuit 754 configured to determine that a payload data symbol is received if a data pulse having a width within a time interval given by the respectively assigned symbol width centered around the respectively assigned time period is received within the data signal.

Some examples may optionally further comprise an input interface 756 configured to receive the data signal comprising a sequence of a first signal edge of a first type, a second signal edge of a second type, and a third signal edge of the first type, the first signal edge and the second signal edge constituting a first data pulse, the second signal edge and the third signal edge constituting a second data pulse.

Figure 8A:
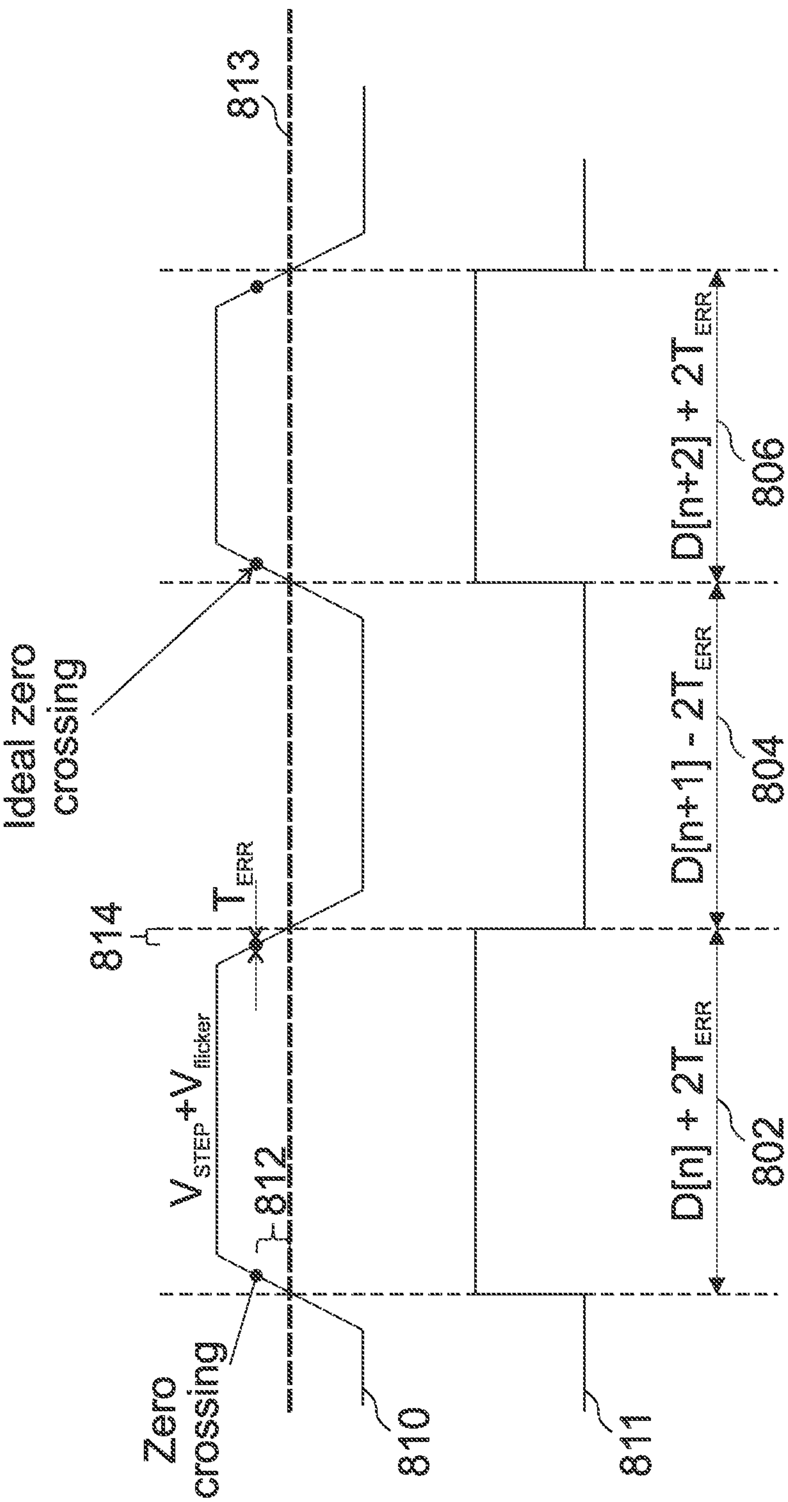
FIG. 8*a* illustrates a data signal according to the STEP protocol.

STEP interconnects measure time periods assigned to payload data symbols and to other symbols, such as for example to control symbols. As illustrated in FIG. 8*a*, symbols 802, 804, and 806 are transmitted by a time period between falling to rising edge or by a time period between rising to falling edge of a data signal.

Timing errors and resulting wrong symbol measurements may occur due to jitter. However, not only time domain errors may affect the measured time period. Along the line-up of a STEP interconnect, some sources of additive noise may be present, causing noise to add up to the STEP data signal 810. As illustrated in FIG. 8*a*, additive noise 812 changing an amplitude of the data signal 810 also translates into jitter 814 once the data signal 810 passes a slicer to generate a digital signal 811 since the edges of the data signal 8*a* are not infinitely steep. An inverter is one particular example of a slicer. For example, within a TDC as illustrated in FIG. 7*i*, the symbols are determined based on the zero crossings of the data signal, which is a form of slicing. STEP data before and after the Time to Digital converter (TDC) (having, for example, an input inverter stage acting as a slicer). With no additive noise, the zero crossing 813 of the data signal 810 would be exactly in the middle of the rising and falling edges of the data.

However, as illustrated in FIG. 8*a*, additive noise adds up to the STEP data signal 810. Once the altered data signal 810 passes a slicer to determine, for example, a zero crossing, the additive amplitude noise 812 alternates the zero crossing of the data signal 810 as jitter 814 leading to wrong time periods used for identifying the symbols in the digital signal 811 output by the slicer, e.g. by a TDC. In a STEP system, where the symbols are represented between two adjacent complementary signal edges, additive noise affects two subsequent edges (positive and negative or vice versa) in opposite directions, thereby doubling the timing error for the determination of a symbol. For example, the falling edge of symbol 804 is shifted to longer times while the subsequent rising edge is shifted to shorter times, effectively decreasing the time period between the edges by twice the error of a single edge. Additive amplitude noise may so cause significant timing errors and lead to potential misinterpretations of received payload data symbols.

There may be a desire to mitigate negative impacts of additive noise in a communication interlink.

Figure 8B:
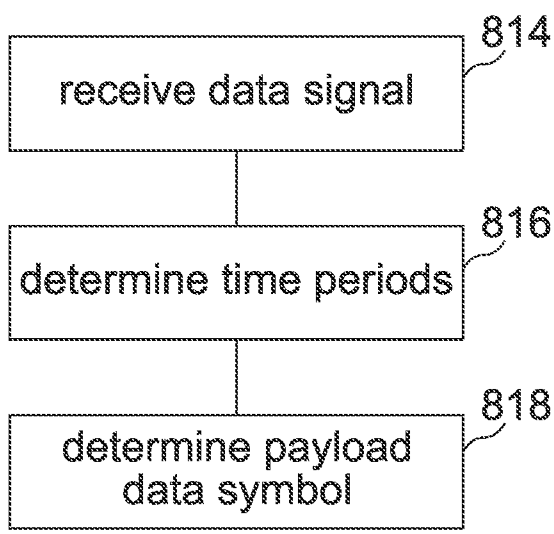
FIG. 8*b* illustrates a flowchart of an example of a method to determine payload data symbols within a data signal.

FIG. 8*b* illustrates a flowchart of an example of a method to determine payload data symbols within a data signal 830. The method will be described also referring to the data signal of FIG. 8*c*. The method comprises receiving 814 a sequence of a first signal edge 832 of a first type, a second signal edge 834 of a second type, a third signal edge 836 of the first type, and a fourth signal edge 838 of the second type in the data signal. The method further comprises determining 816 a first time period 840 between the first signal edge 832 and the third signal edge 836 a well as determining a second time period 842 between the second signal 834 edge and the fourth signal edge 838. Further, the method comprises determining a payload data symbol 818 corresponding to a time period 846 between the third signal edge 836 and the fourth signal edge 838 based on the first time period 840 and on the second time period 842. The time period corresponding to a payload data symbol is not determined by directly measuring the time between subsequent complementary signal edges 836 and 838 but by measuring two time periods between subsequent edges of the same type. Since signal edges of the same type receive an identical timing error at the presence of additive noise, the time difference between both signal edges remains unaffected by constant additive noise. Determining the received payload data symbols using two time periods not affected by additive noise results with the determination of the payload data symbol being hardly affected by additive noise. A TDC usable to determine the time periods between two subsequent signal edges of an identical type may be based on the TDC of FIG. 7*i*.

Figure 8C:
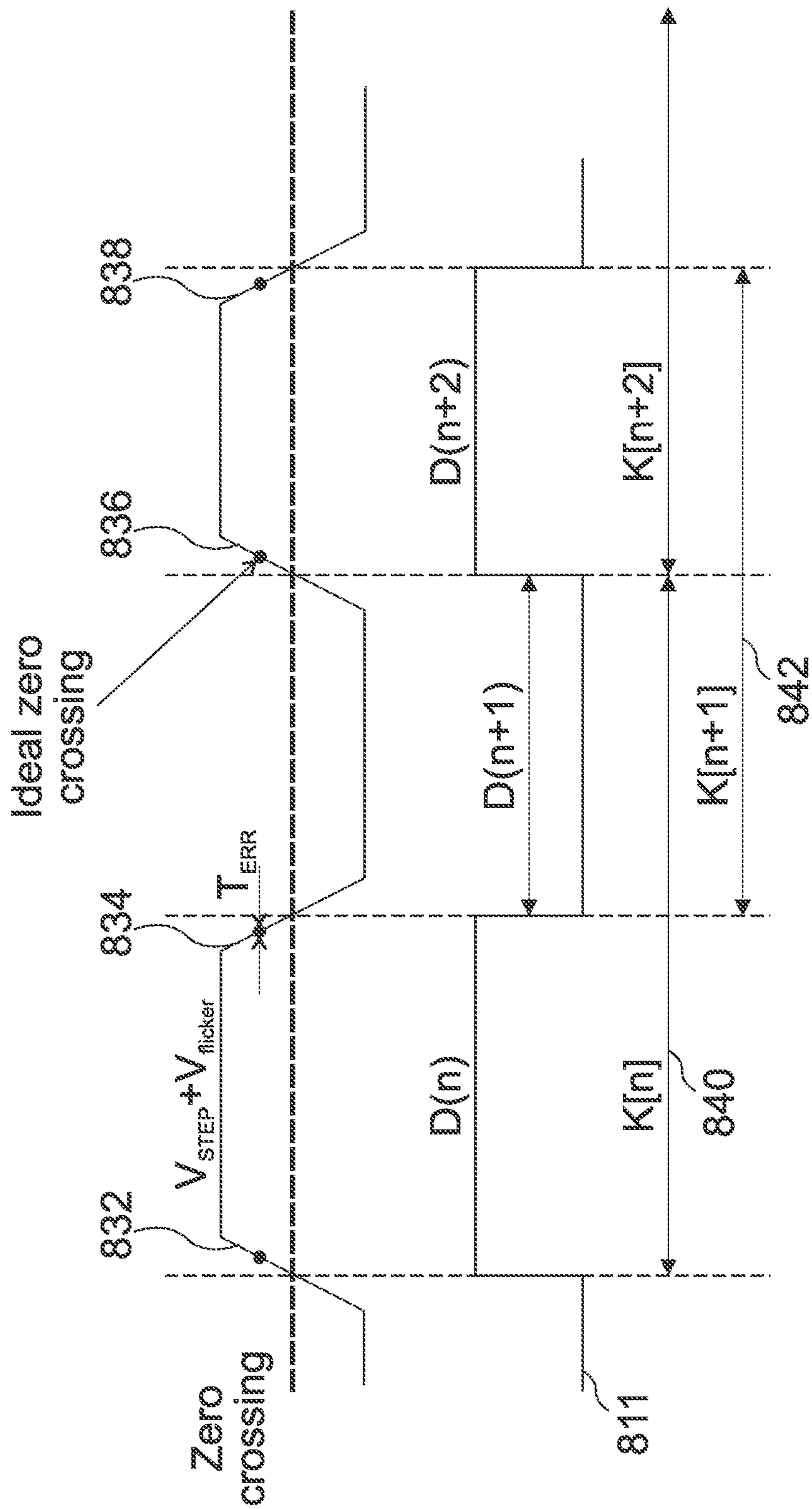
FIG. 8*c* illustrates an example of a data signal processed using the method of FIG. 8*b;*

In other words, to avoid the above source of misinterpretation, it is proposed to change the symbols so that each symbol would be represented or demodulated using the time between rise to rise and fall to fall, as illustrated in FIG. 8*c*. When doing this, possible zero crossing errors on the symbols edges cancel each-other since identical edges (positive or negative) receive identical errors, as illustrated in FIG. 8*c*.

A particular example as to how the symbols may be determined may assume added flicker noise is the source of error shown in FIG. 8*c* The STEP symbols are very short (80-160 psec) while flicker noise and additive DC spurs are slow as compared to the STEP symbols (they have very long time periods). Adding slow noise signals to the STEP signal adds nearly the same voltage error on both the rising and falling edges of each symbol, as illustrated in FIG. 8*c*.

It is further assumed that the unwanted noise signal added to the STEP signal introduce an error of TERR to each signal edge of a symbol. As already indicated above, these errors would add up and result with a timing error of 2*TERR for each symbol when determining the time period between subsequent complementary signal edges directly.

However, according to the method of FIG. 8*b*, symbols are determined (optionally also generated) between rise-to-rise and fall-to-fall. This results in the additive and slow noise being cancelled.

Each time period between two subsequent signal edges of the same type K[n] is a sum of the time period of two subsequent symbols and their timing error (D[n]; TERR):

$$K[n]=D[n]+2^{*}\mathrm{TERR}+D[n+1]-2^{*}\mathrm{TERR}=D[n]+D[n+1].$$

By the method, the timing error cancels.

During reconstruction, the first time period K[n] is subtracted from the second time period K[n+1], resulting with D[n+2]+D[n+1]−D[n+1]−D[n]=D[n+2]−D[n], that is, Symbol D[n+2] can be determined without knowledge on the preceding symbol independent from the preceding symbol D[n+1]. In other words, one can construct and decode the symbols such that we optionally sum in the TX every two consecutive original data symbols and regenerate them in the RX by subtracting. Alternative examples generate the payload data symbols in a transmitter conventionally by using a DTC to directly generate two subsequent complementary signal edges spaced apart by a time period assigned to a payload data symbol.

As illustrated above, determining the payload data symbol may comprise subtracting the first time period K[n] from the second time period K[n+1] to determine a time period D[n+2] of a symbol. In some examples, the method may optionally comprise to store the latest two time periods or symbols to optionally also use them for determining the payload data symbol. The determined time period may then be assigned to a payload data symbol according to a communication protocol.

According to some embodiments, the time period between the first signal edge and the second signal edge may correspond to a control symbol indicating a start of a packet which has a predetermined duration, which may enable to further decrease the probability of a misdetection since the method starts with time periods known a prior.

Figure 8D:
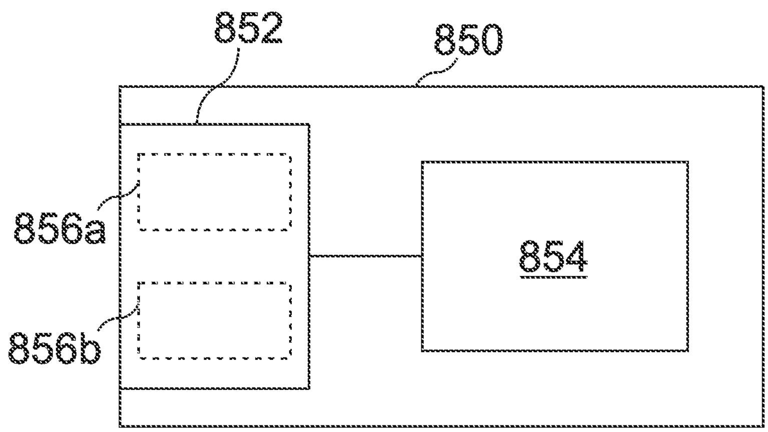
FIG. 8*d* illustrates an example of an apparatus for processing a data signal.
Figure 8E:
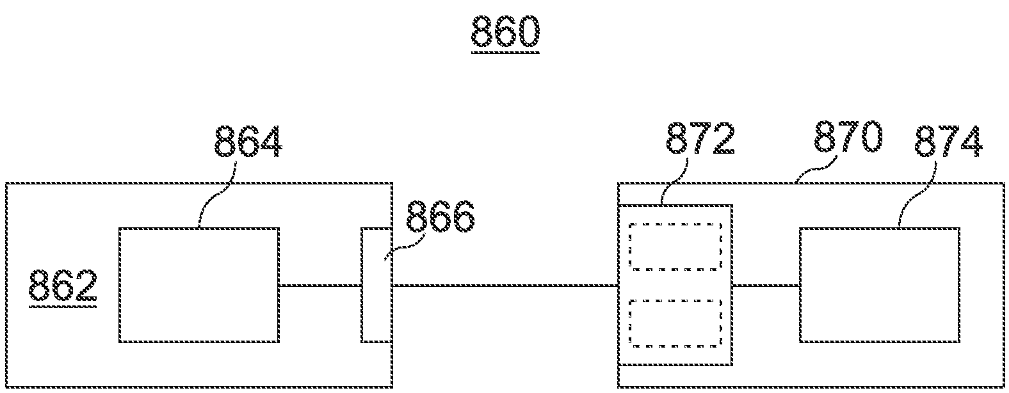
FIG. 8*e* illustrates an example of a communication system.

While FIG. 8*b* illustrates an example of a method to determine payload data symbols within a data signal by means of a flow chart, FIGS. 8*d* and 8*e* will schematically illustrate examples of apparatuses configured to perform the method.

FIG. 8*d* illustrates an example of an apparatus for processing a data signal 850. The apparatus 850 comprises a processing circuit 852 configured to determine a sequence of a first signal edge of a first type, a second signal edge of a second type, a third signal edge of the first type, and a fourth signal edge of the second type in the data signal. A demodulation circuit 854 is configured to determine a payload data symbol corresponding to a time period between the third signal edge and the fourth signal edge based on a first time period between the first signal edge and the third signal edge, and a second time period between the second signal edge and the fourth signal edge.

In some examples, the processing circuit 852 may optionally comprise a first edge detector 856*a* configured to determine signal edges of the first type in the data signal and a second edge detector 856*b* configured to determine signal edges of the second type in the data signal. FIG. 8*e* illustrates an example of a communication system 860. The communication system comprises an apparatus for generating a data signal 862, comprising a processing circuit 864 configured to generate the data signal, the data signal comprising a sequence of a first signal edge of a first type, a second signal edge of a second type, a third signal edge of the first type, and a fourth signal edge of the second type, the first signal edge and the second signal edge being separated by a first time period corresponding to a first payload data symbol, the second signal edge and the third signal edge being separated by a second time period corresponding to a second payload data symbol; and the third signal edge and the fourth signal edge being separated by a third time period corresponding to a third payload data symbol. The apparatus 862 further comprises an output interface circuit 866 configured to output the data signal. Further, the communication system 860 comprises an apparatus for receiving the data signal 870, comprising a processing circuit 872 configured to determine the sequence of the first signal edge, the second signal edge, the third signal edge, and the fourth signal edge in the data signal; and a demodulation circuit 874 configured to determine the third payload data symbol using a first receive time period between the first signal edge and the third signal edge, and a second receive time period between the second signal edge and the fourth signal edge.

According to the examples of methods and apparatuses described referring to FIGS. 8*a* to 8*e*, the effect of correlative additive noise may be lowered. Possible sources of such noise are flicker noise, supply spurs (from a DC/DC converter and other blocks connected on the same DC/DC), and other external aggressors (which may be slow as compared to the time periods assigned to symbols in STEP, like e.g. CLKs, Fref, controls, etc). One may alternatively also try to lower the impact of additive correlative noise by trying to lower the levels of the noise. However, this may come at the disadvantage of higher power consumption and a more complex DC scheme (DC/DC+LDO) with large filtering components (mainly capacitors).

Using an example of a method to determine payload data symbols within a data signal, a STEP interlink or any other communication interlink may increase immunity to flicker noise, supply spurs and other additive correlative noises. Results may be a better link noise budget (less errors) and the possibility to use simpler and lower cost DC supplies. Since flicker noise is inverse proportional to a (CMOS) device area (length and width), lowering the level of flicker noise would require an increase in the size of the (CMOS) devices. However, increasing the size of the (CMOS) device increases the capacitance of the device, which would in turn increase power consumption. Using an example of a method may allow to use smaller size devices, resulting in a power efficient implementation.

Figures 1, 8F:
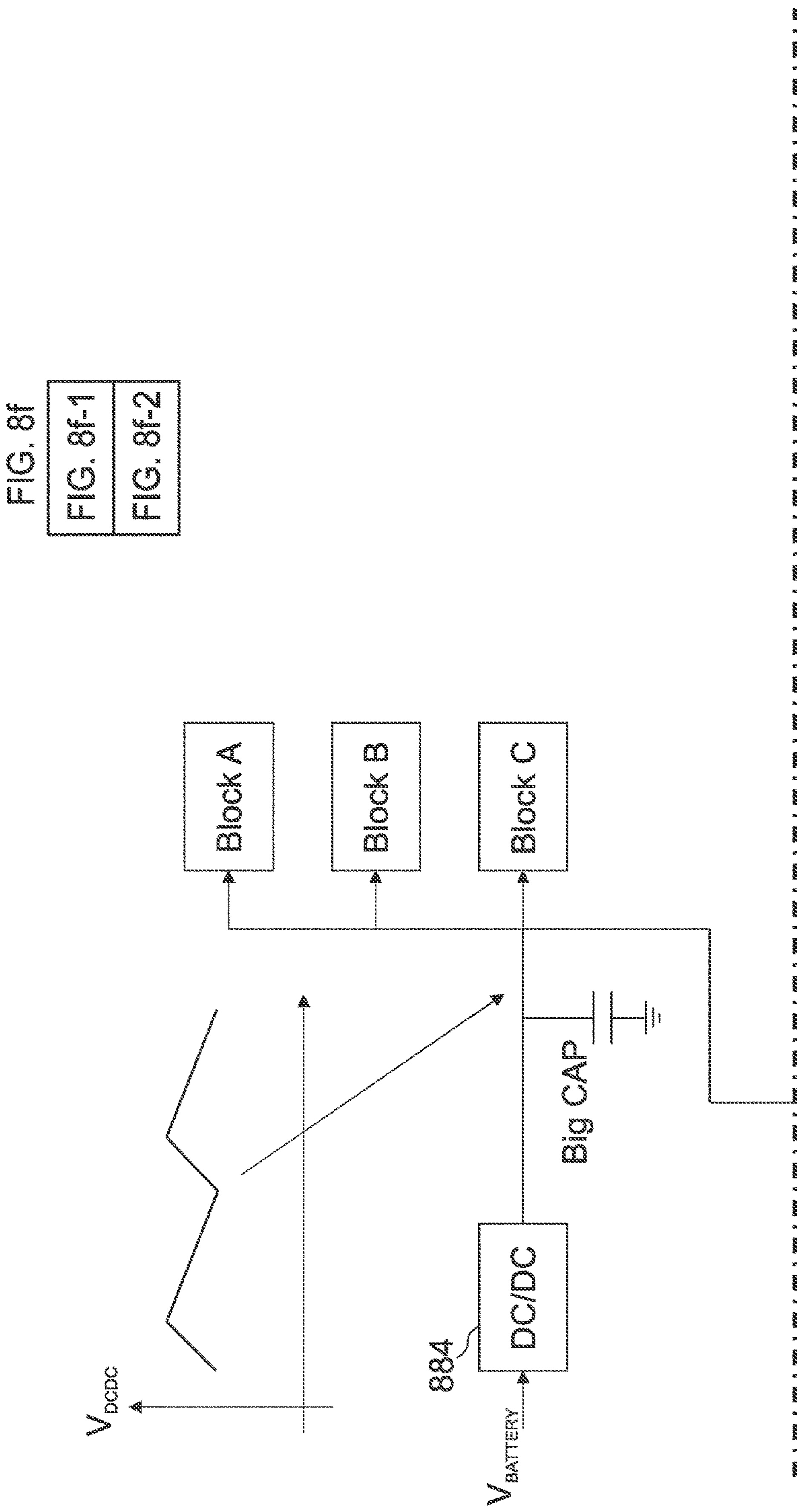
FIG. 8*f*, broken into partial views 8*f*-1 and 8*f*-2, illustrates an example of a STEP interconnect.
Figures 2, 8F:
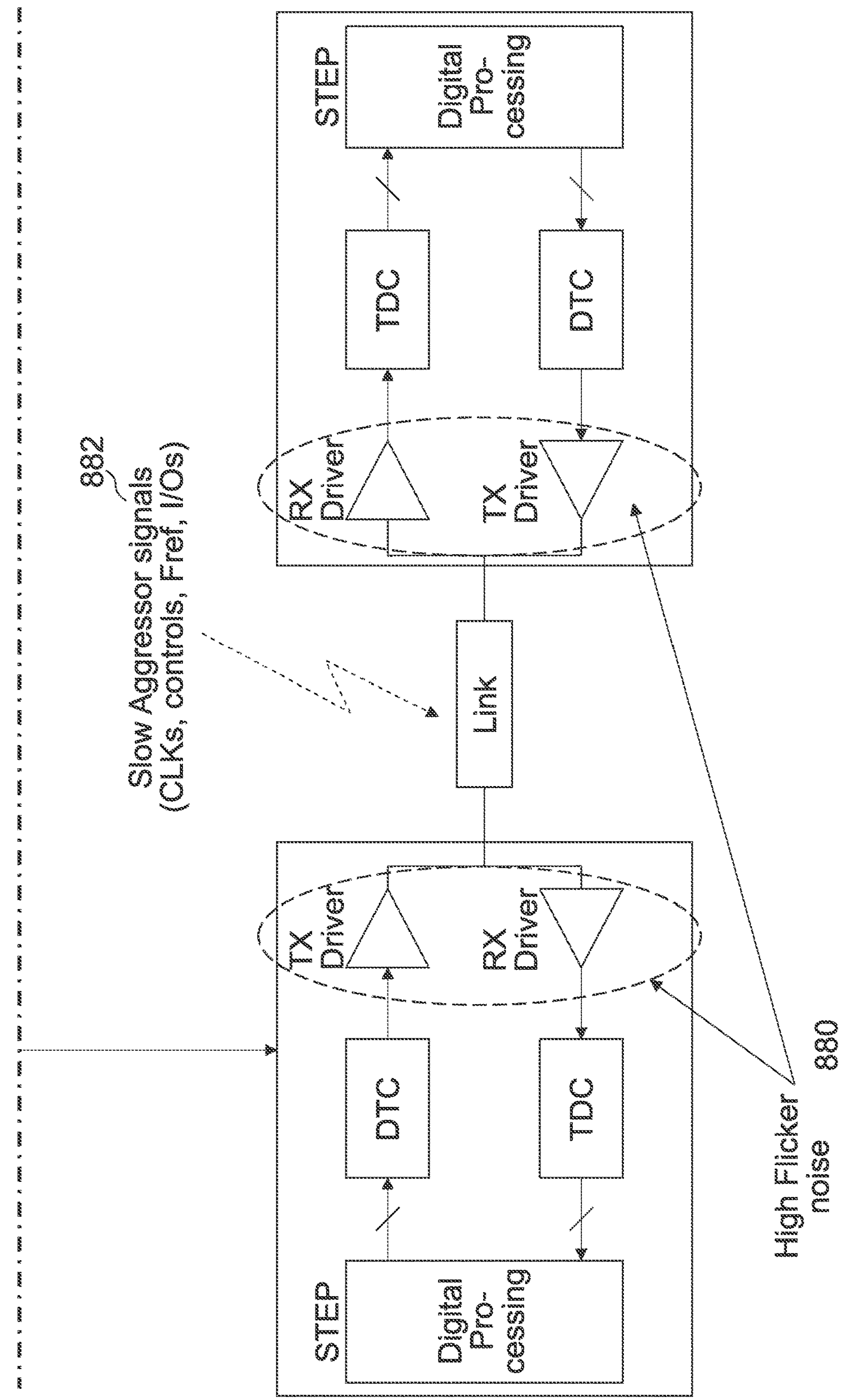

FIG. 8*f* illustrates an example of a STEP interconnect as already illustrated before, further illustrating different possible source of additive noise like flicker noise from the power and low noise amplifiers 880, additive noise from external aggressors 882 cross talking to the transmission link and noise caused by load modulation of the power supply 884.

FIGS. 9*a* to 9*e* relate to examples as to how errors caused by impairments of a data signal transmitted via a transmission link of an interconnect may be mitigated.

Some applications require that payload data is exchanged with high robustness and immunity to errors. This is may be achieved by adding error correction codes (ECC). The overhead of an ECC depends on the amount of data that needs to be protected and the number of potential errors to correct. It may be advantageous to provide means to mitigate errors caused by impairments of a data signal transmitted via a transmission link of an interconnect without adding overhead.

Figure 9A:
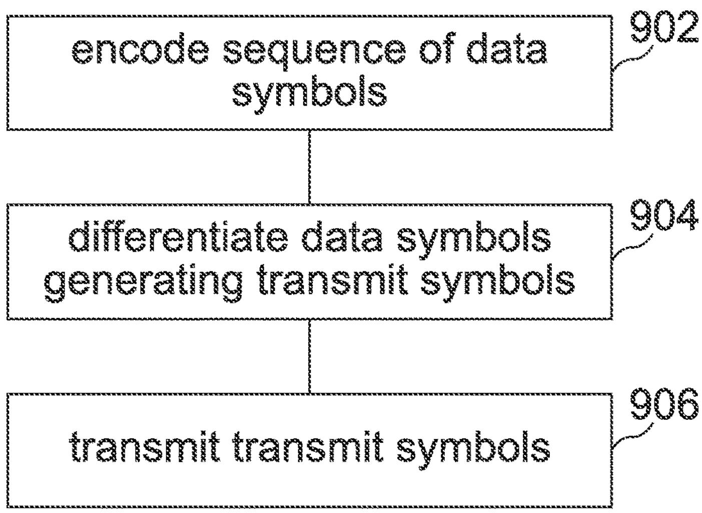
FIG. 9*a* illustrates a flowchart of an example of method to transmit a sequence of data symbols.
Figure 9B:
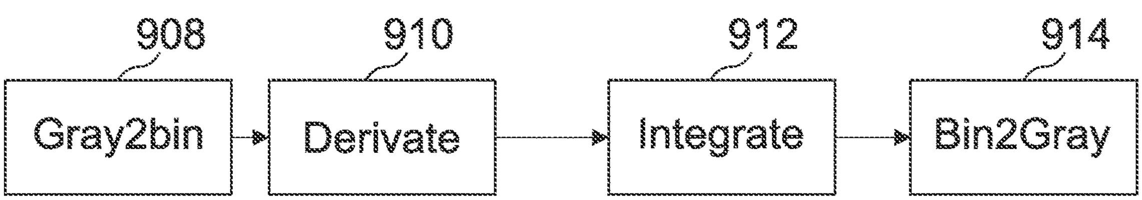
FIG. 9*b* illustrates an example of data processing within an example of an interlink.

FIG. 9*a* illustrates a flowchart of an example of a method to transmit a sequence of data symbols. The method comprises encoding 902 the sequence of data symbols using a gray code to generate a sequence of encoded data symbols. Gray codes are an ordering of the binary numeral system such that two successive values differ in only one bit (binary digit). In other words, in a Gray coded representation of a series of data bits representing an integer number, only one bit changes if the number increases or decreases by 1. The number of possible gray codes depends on the number of bits to be encoded. For a sequence of n bits, n! (faculty of n) gray codes may exist with the previously described property. For example, in the event of a STEP interconnect transmitting 3 bits per symbol, 6 Gray codes may exist and each of the them may be used by the method. Encoding a data symbol may therefore be performed by encoding the sequence of bits assigned to the data symbol and by subsequently modulating the encoded sequence of bits into an encoded data symbol or by directly transforming a data symbol into an encoded data symbol based on the knowledge of the modulation scheme. The first option may be described as encoding a bit sequence associated to a single data symbol using the gray code to generate an encoded bit sequence and modulating the encoded bit sequence to an encoded data symbol using a modulation scheme of a communication protocol.

The method further comprises differentiating 904 the sequence of the encoded data symbols to generate a sequence of transmit data symbols and transmitting 906 the sequence of transmit data symbols. In other words, and as again illustrated in FIG. 9*b*, before submission, the data symbols are encoded 908 using a grey code and the encoded data symbols are subsequently differentiated 910 (derivated) before being transmitted.

At a receiver, both actions are reversed, starting with integrating 912 the series of received data symbols to generate a series of integrated data symbols and subsequent decoding 914 the sequence of integrated data symbols using a gray decoder to generate information on a sequence of data symbols. Differentiating the symbols may be performed by subtracting the value of the preceding symbol from the value of the symbol to be transmitted to generate the transmit symbol. The subtraction is performed modulo the number of data symbols. Differentiating the sequence of encoded data symbols may also comprise transmitting the first data symbol of the sequence without altering it. Likewise, integration may be performed by adding the received symbols up to the data symbol to be determined within the sequence. Adding may be performed modulo the number of data symbols of the modulation scheme.

According to some implementations, the start of a sequence of data symbols may be given by the start of a data frame. Therefore, the sequence of data symbols may start with a predetermined data symbol, for example with a data symbol being a control symbol of a communication protocol to indicate the start of a data frame.

In the coding scheme of, e.g. the STEP interface, a receiver measures each edge twice once at the start time of a symbol/pulse and a second time at the end time of the symbol/pulse. A single signal edge so affects two neighboring data symbols. If a single signal edge would be determined at a wrong position, both neighboring data symbols may be received in error. Differentiating the data symbols before transmission ensures that only a single data symbol may be corrupted by erroneously detecting a signal edge at the receiver side, once the receiver reverses differentiating by integrating the series of received data symbols. Applying a Gray code to the data symbols of a sequence assures that only a single bit error occurs if a data symbol is determined wrong, assuming that the data symbol determined erroneously is neighboring the correct data symbol.

The combination of gray coding and differentiating the symbols according to the method illustrated in FIG. 9*a*, therefore, provides that a misdetection of a single signal edge within the data signal illustrated in FIG. 1 results only with a single bit error within the bit sequence modulated into a data symbol.

If, for some reason (e.g. due to noise, distortion, or an external event) the receiver misinterprets an incoming payload data symbol, the resulting bit sequence corresponding to the misinterpreted payload data symbol differs by only one single bit from the bit sequence sent. A disturbance of one signal edge results in an error of one bit. In other words, according to the coding scheme of the method illustrated in FIG. 9*a*, a single edge error causes a single symbol error, which also results in a single bit error.

Figure 9C:
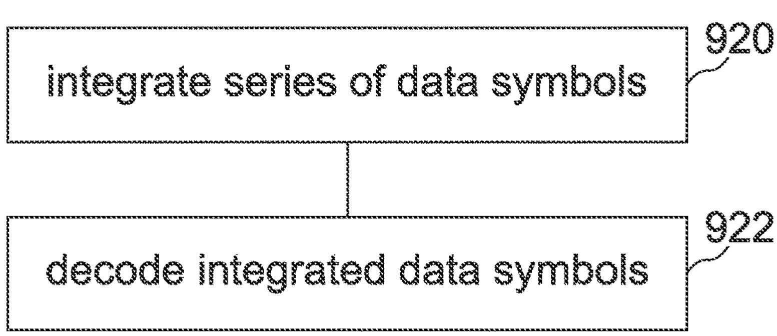
FIG. 9*c* illustrates a flowchart of an example of a method to process a series of received data symbols.

FIG. 9*c* illustrates a flowchart of an example of a method to process a series of received data symbols. The received data symbols may be sent using the method of FIG. 9*a*. The method comprises integrating 920 the series of received data symbols to generate a series of integrated data symbols, and decoding 922 the sequence of integrated data symbols using a gray decoder to generate information on a sequence of data symbols. Similar to encoding, the decoded sequence of data symbols may be given as data symbols according to communication protocol or already as a sequence of data bits for each data symbol. In the latter case, decoding may comprise demodulating an integrated data symbol using a modulation scheme of a communication protocol to generate an encoded bit sequence; and decoding the encoded bit sequence using the gray code to generate a decoded bit sequence.

In the following, a particular example is given for an assumed error during submission of a sequence of data symbols by means of a STEP interconnect using three bits per data symbol, resulting in data symbols from the group [0, . . . , 7].

Assuming a transmitter sent the sequence of the data symbols 012321 and there is jitter on one edge, a receiver may receive the series of received data symbols 012411. A single edge error is correlative to 2 subsequent symbols because the edge is used for 2 symbols and, therefore, a single corrupted signal edge would result in two data symbols being received erroneously.

Using an example of a method as described previously, however, results in only a single bit error upon occurrence of an error in a received signal edge.

According to the method, instead of sending the sequence of data symbols 012321, the data symbols are passed through a gray to bin code, resulting, for example with the sequence of encoded data symbols 013231 (one of the possible six gray codes is arbitrarily chosen for this particular example). Differentiating the sequence results with the sequence of transmit data symbols 012716.

Assuming the error at the fifth signal edge, a receiver might receive the series of received data symbols 013616 with two neighboring symbols being different from the sequence of transmit data symbols.

Implementing an example of a method, the received sequence of data symbols is integrated, which results with the series of integrated data symbols 014231 (integrating is performed modulo 8 for this example having 8 payload data symbols). Finally, the sequence of integrated data symbols 014231 is decoded using a bin2gray code matching the gray2bin code, resulting with the sequence of data symbols 016321.

In summary, the transmitter sent 012321 and the receiver decoded 016321 in response to an error of a symbol edge. That means, data symbol 2 became data symbol 6, which is a single bit error (010 versus 110). Without the grey code, received symbol 4 would translate into the bit sequence 100, which was a two-bit error.

While the previous Figures illustrated examples of methods for transmitting and receiving sequences of data symbols, FIGS. 9*d* and 9*e* will subsequently schematically illustrate apparatuses configured to perform one of the methods.

Figure 9D:
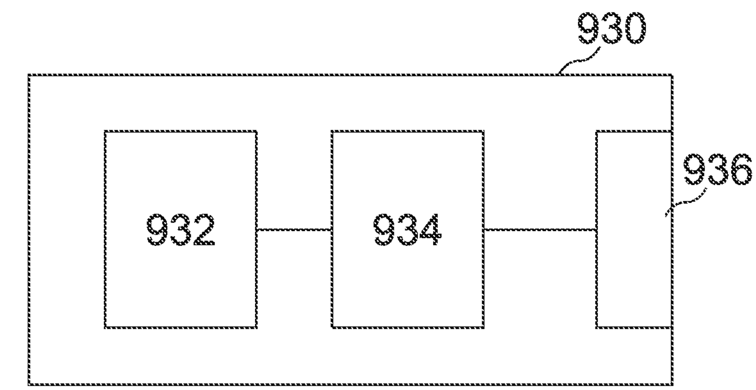
FIG. 9*d* illustrates an example of an apparatus for transmitting a sequence of data symbols.

FIG. 9*d* illustrates an example of an apparatus 930 for transmitting a sequence of data symbols. The apparatus 930 comprises an encoder circuit 932 configured to encode the sequence of data symbols using a gray encoder to generate a sequence of encoded data symbols and a circuit 934 configured to differentiate the sequence of the encoded data symbols to generate a sequence of transmit data symbols. An output interface 936 is configured to output the sequence of transmit data symbols.

Figure 9E:
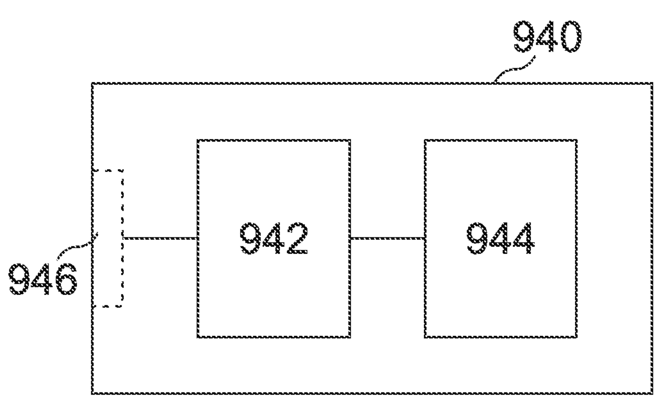
FIG. 9*e* illustrates an example of an apparatus for processing a series of received data symbols.

FIG. 9*e* illustrates an example of an apparatus 940 for processing a series of received data symbols.

The apparatus comprises an integrator circuit 942 configured to integrate the series of received data symbols to generate a series of integrated data symbols. A decoder circuit 944 is configured to decode the sequence of the integrated data symbols using a gray code to generate a sequence of data symbols. Optionally, the apparatus may further comprise an input interface 946 for receiving the series of received data symbols.

Particular for implementations of the method within a Step interconnect and in the event that a TDC in a receiver offers higher resolution than the symbol thresholds separating neighboring payload data symbols, it may be possible to optionally add a soft decision method substitution the differentiating of the symbols at least partly. If the TDC provides a data symbol which is close to the symbol decision threshold and also the next data symbol is close the symbol decision threshold, the shift of the first symbol is subtracted from the next symbol. If one symbol is longer, the other will be shorter. This intensifies the error but ensures that there is more correlation between the errors and thus the Gray Coding ensures that there is only a single bit error. (If both symbols are at the decision threshold, it may otherwise be that due to quantization and noise, one of them is decided in error and the other is decided to be the correct value, which may finally produce 2 errors). A respective apparatus may be characterized by comprising an encoder circuit configured to encode the sequence of data symbols using a gray encoder to generate a sequence of transmit data symbols. A processing circuit of the apparatus generates a data signal, the data signal comprising a sequence of a first signal edge of a first type, a second signal edge of a second type, and a third signal edge of the first type, the first signal edge and the second signal edge being separated by a first time period corresponding to a first data symbol of the sequence of transmit data symbols, and the second signal edge and the third signal edge being separated by a second time period corresponding to a second data symbol of the sequence of transmit data symbols.

A respective apparatus at a receive side of the STEP interlink for processing a series of received data symbols may be characterized to comprise a processing circuit configured to determine a sequence of a first signal edge of a first type, a second signal edge of a second type, and a third signal edge of the first type in a received data signal comprising the series of received data symbols. A demodulation circuit is configured to determine a first received data symbol of the series based on a first time period between the first signal edge and the second signal edge; and a second received data symbol of the series based on a second time period between the second signal edge and the third signal edge. A decoder circuit within the apparatus is configured to decode the sequence of received data symbols using a gray code to generate a sequence of data symbols.

The subsequent paragraphs illustrate a possibility to correct for errors caused by corruption of the data signal during transmission. The subsequently described methods and apparatuses comprise processing data on the transmit side as well as on the receive side.

Figure 10A:
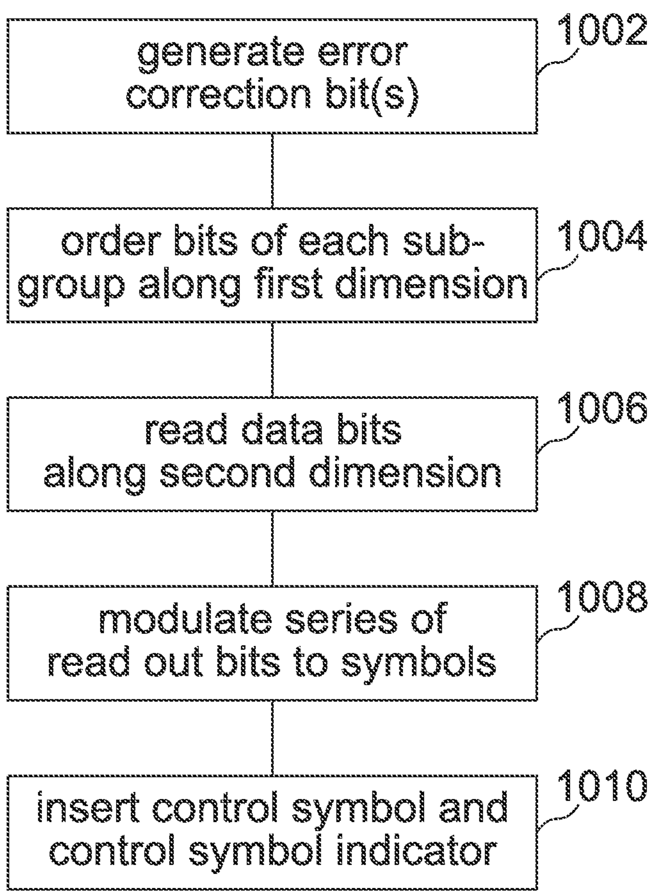
FIG. 10*a* illustrates a flowchart of an example of a method to generate a data signal for transmitting a serially ordered predetermined number of bits.

For a transmit side, an example of a method to transmit a serially ordered predetermined number of bits is schematically illustrated in FIG. 10*a*. The method comprises generating at least one error correction bit for the data bits within each subgroup of multiple subgroups of bits. Generating error correction bits 1002 may allow to determine or correct errors within the subgroup of bits. The amount of errors detectable or correctable depends on the strength of the error correction code (ECC) used.

The method further comprises ordering 1004 the bits of each subgroup and their associated error correction bits along a first dimension of a multidimensional representation of data.

Further, the method comprises reading 1006 the data bits from the multidimensional representation along a second dimension to determine a series of transmit bits; and modulating 1008 the series of transmit bits into a series of transmit symbols. Reading the transmit bits in another dimension before sending the transmit bits by means of the transmit symbols, which is also referred to as interleaving, reduces the probability that multiple bits of the same subgroup are affected by a transmission error since the bits of a subgroup may be transmitted by means of different transmit symbols. Weaker ECC's causing less overhead may be used as a consequence. Further examples may also use different interleaving schemes that result in neighboring bits to be physically transmitted by different payload data symbols.

Further, the method comprises inserting 1010 a control symbol indicator and a control symbol into the series of transmit symbols at a position depending on the position of the group of bits indicative of the control command within the series of bits. Within a STEP implementation, the control symbol indicator and the associated control symbol may also be jointly characterized as a delimiter. Inserting the control symbol indicator and its associated control symbol into the transmit symbols at a predetermined position may allow to use special control symbols within the data signal that exhibit properties other than the payload data symbols used to transmit payload data while maintaining the benefits of interleaving.

According to some examples, the control symbol indicator and the control symbol are inserted within the transmit symbols generated from bits identified by an index for the second dimension within the multidimensional representation that corresponds to the number of the byte indicative of the control command within the group of bits. Inserting the transmit symbols at a predetermined position may allow to rearrange the group of bits indicative of a control command (which may be modulated into a data signal by means of a control symbol indicator and its associated control symbol) into their appropriate position within the multidimensional representation at a receiver without additional signaling overhead.

Figures 1, 2, 10B:
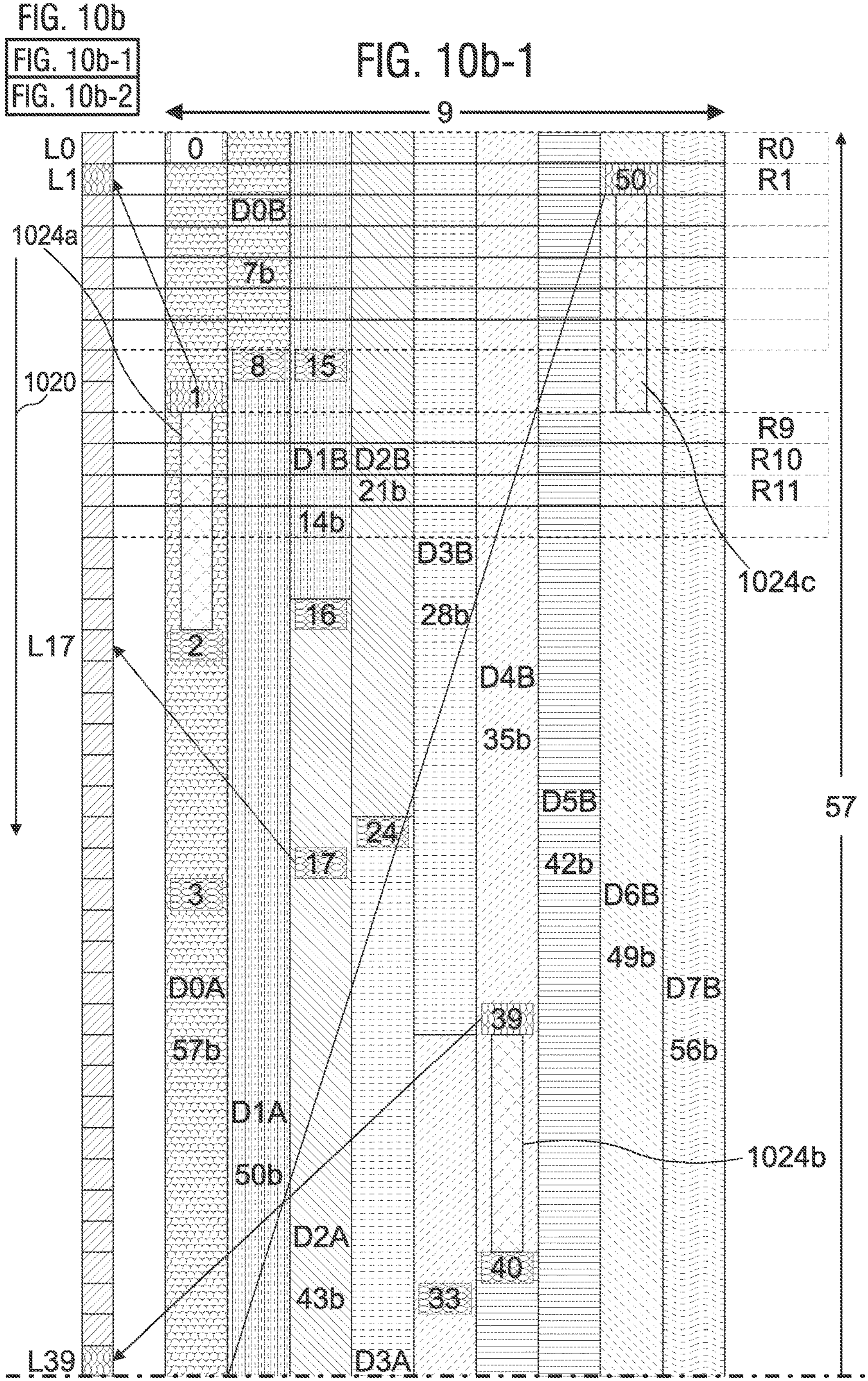
FIG. 10*b*, broken into partial views 10*b*-1 and 10*b*-2, illustrates an example of a two-dimensional representation of data.
Figures 2, 10B:
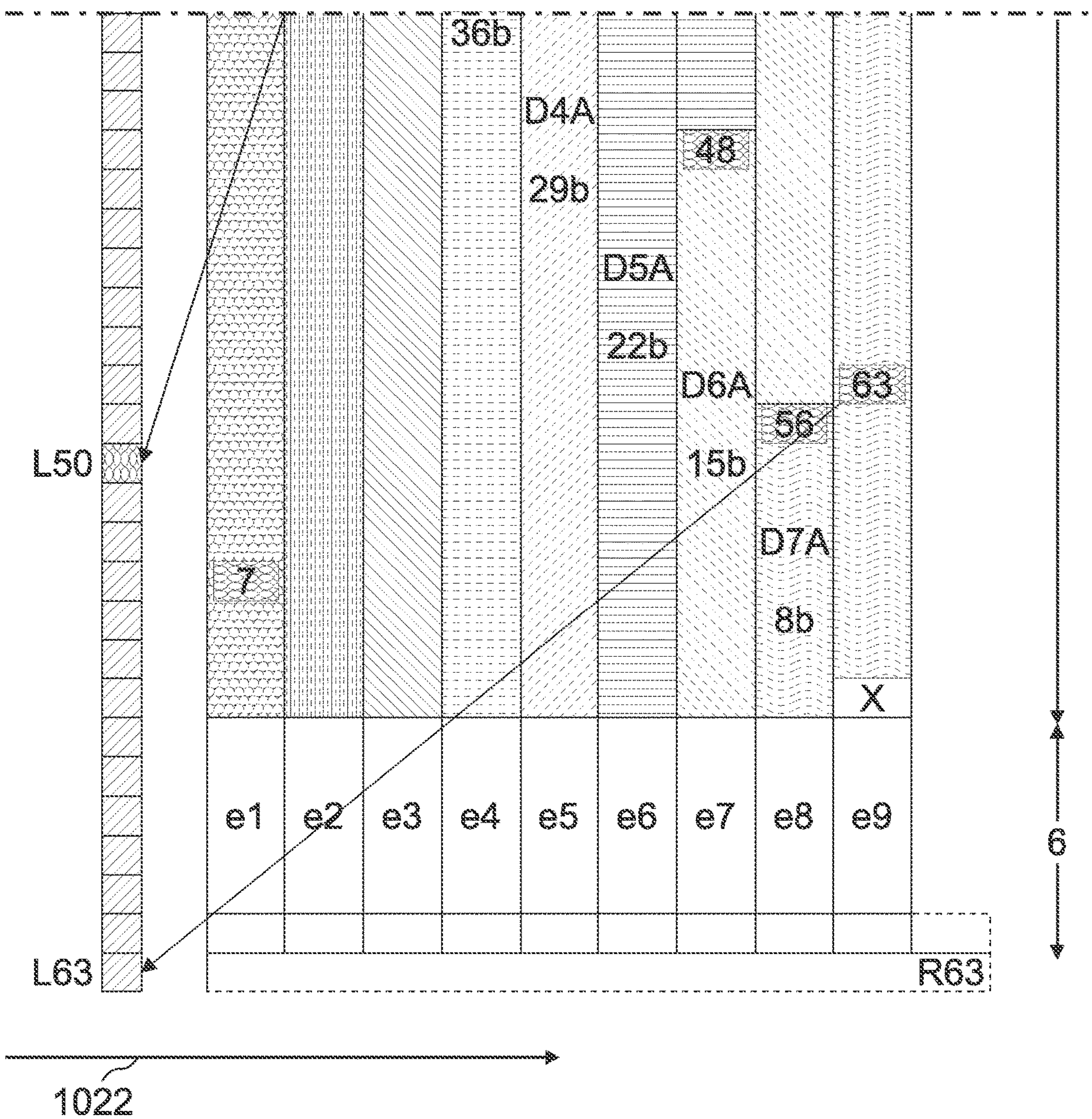

FIG. 10*b* illustrates a particular example for generating a data signal for a STEP interconnect. In the example of FIG. 10*b*, the multidimensional representation has 2 dimensions, the bits are ordered or filled in columns of the 2-dimensional matrix, while they are read out in lines to determine the series of transmit bits illustrated in FIG. 10*c*. In other words, the first dimension 1020 is given by the columns, and the second dimension 1022 is given by the lines. Further examples may also make use of more than 2 dimensions. Likewise, ordering the bits may also be performed along the dimension of the lines, while readout may be performed along the dimension of the columns, so that the first and second dimensions are swapped as compared to the example of FIG. 10*b*.

In the example of FIG. 10*b*, data bits are provided by subsequent bytes, which may, for example, be generated within a MAC Layer of a Protocol Stack. Three bytes 1024*a*, 1024*b*, and 1024*c* are indicating a control command, like e.g. an indication for a start of a data packet consisting of multiple bytes.

For each subgroup of 57 bits, 6 error correction bits are generated and the bits of each subgroup and their associated error correction bits are ordered along the first dimension 1020, resulting in a single column of the 2-dimensional representation. In the example of FIG. 10*b*, the series of data bits to be processed comprises 512 data bits, resulting in a matrix having 9 columns. As a result, the first dimension of the multidimensional representation comprises 63 entries and the second dimension comprises 9 entries.

Further examples may jointly process a different number of bits, e.g. integer multiples of 512 data bits. Likewise, the number of bits within a subgroup may be different than the 57 bits illustrated in the example. Similarly, the number of correction bits may be chosen to be different to use stronger or weaker ECC's.

Figure 10C:
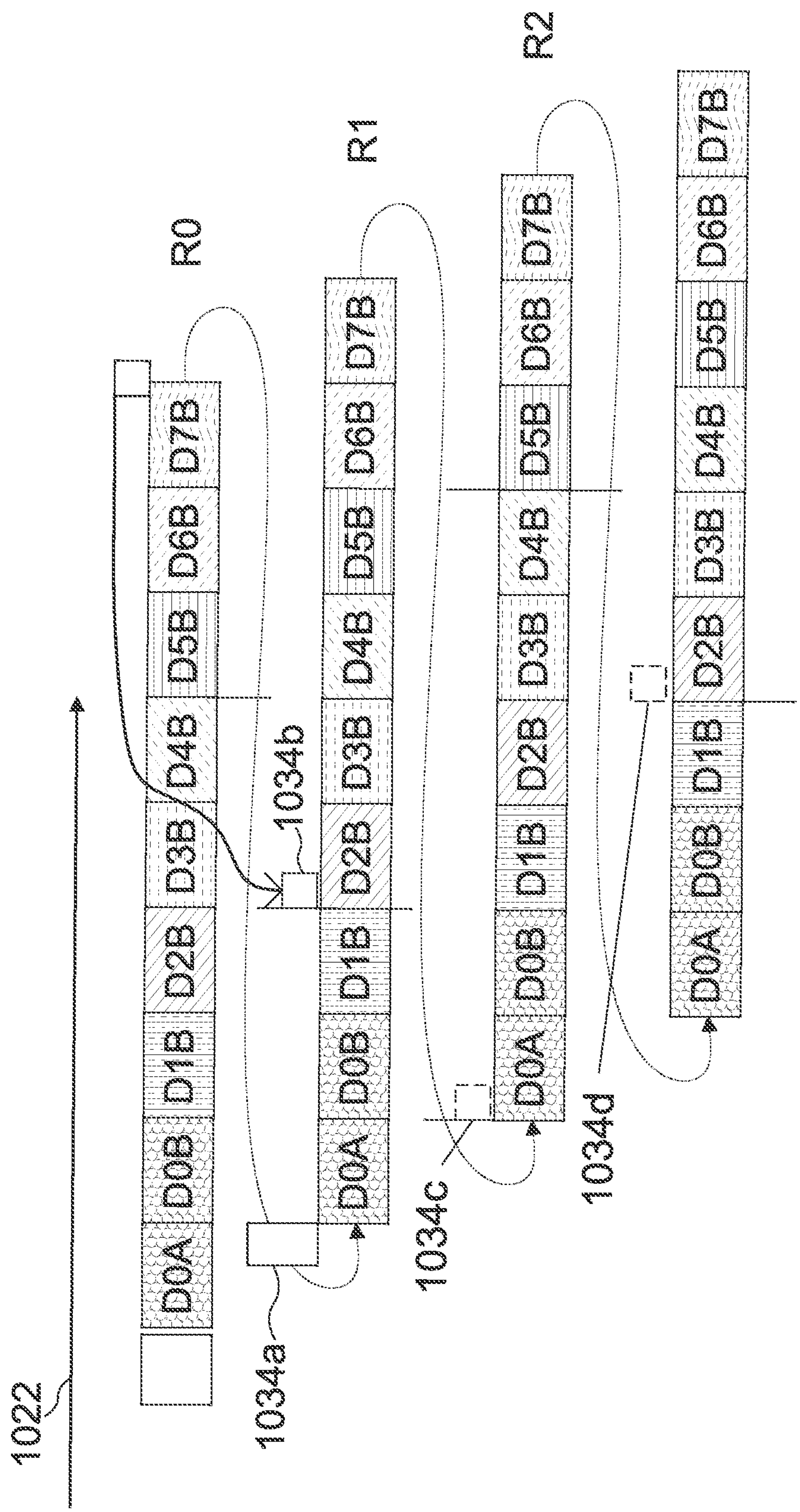
FIG. 10*c* illustrates example of positions to insert a control symbol indicator and a control symbol into a series of transmit symbols.

The series of transmit bits readout along the second dimension 1022 are illustrated in FIG. 10*c*. The series of transmit bits are modulated into a series of transmit symbols. In a STEP implementation, 3 subsequent bits may be assigned to a single symbol. For every control command 1024*a*, 1024*b*, and 1024*c*, a control symbol indicator and a control symbol (a delimiter) is inserted into the series of transmit symbols before transmission, at a position depending on the position of the group of bits indicative of the control command within the series of bits. In the example of FIG. 10*c*, the number of the byte within the serially ordered number of bits that contains the bits indicative of a control command defines the number of the line in which the associated delimiter is inserted before transmission. For example, control command 1024*a* is contained in the byte number 1 within the serially ordered predetermined number of bits to be processed within the matrix. The corresponding control symbol indicator and a control symbol 1034*a* are inserted at the beginning of line #1. The elements of the matrix of FIG. 10*b* can be identified by a first index giving the number of the entry with respect to the first dimension (the number of the column the entry is in) and by a second index giving the number of the entry with respect to the second dimension (the number of the line the entry is in). In other words, the control symbol indicator and the control symbol 1034*a* are inserted within the transmit symbols generated from bits identified by an index for the second dimension within the multidimensional representation that corresponds to the number of the byte indicative of a control command within the group of bits. Further examples may use other predetermined positions within the series of transmit symbols to insert the delimiters, considering that 3 bits are jointly transmitted by a single payload data symbol in the example of a STEP interconnect illustrated in FIGS. 10*b* and 10*c*. Using any predetermined position that depends on the position of the group of bits indicative of the control command within the series of bits may avoid to additionally submit data indicating the position of the inserted delimiters to a receiver. However, further examples may be implemented to additionally or alternatively also insert data indicating the position of the inserted delimiters to a receiver.

Further examples may alternatively insert the control symbol indicator and the control symbol for the control command 1024*a* at another position within line #1 than at the very beginning. For example, the control symbol indicator and the control symbol 1034*b* may be inserted after the first three bits of the bits of the second line (R1), i.e. after the first payload data symbol to be transmitted over a transmission link. Using the alternative position, which is one payload data symbol (equaling 3 bits) apart, may allow to assure that the control symbol indicator is always transmitted with a predetermined polarity (positive or negative) within the data signal of a STEP interconnect, considering that every subsequent pairs of 3 payload data bits are transmitted by a payload data symbol having a different polarity within the data signal.

In summary, control commands 1024*a*, 1024*b*, and 1024*b* of any communication protocol (which are, for example, transmitted by means of delimiters in a STEP interconnect) may be transmitted using a different modulation scheme than the one used for payload data. Therefore, only modulating the series of interleaved bits illustrated in FIG. 10*c* might corrupt the information of the control commands 1024*a*, 1024*b*, and 1024*b*, which may be avoided using the method illustrated by means of FIGS. 10*a* to 10*c*.

In other words, FIGS. 10*b* and 10*c* describe an example using a single matrix. However, multiple matrix dimensions can be implemented considering that different matrix sizes will have impact on the delay and the efficiency. The matrix is 63×9 of size containing 9 code words, each with 57 information bits and 6 redundancy bits (except 1 code word in column 9 which carries 56 information bits). It can fit in total original data of 64*8=512 application data bits, while the total data transported is 63*9=567, which is >90% efficiency. The data is filled in columns. Delimiters may be replacing any data byte and the minimal packet size is assumed to be no less 3 bytes. Some STEP interconnects send data in 3 bits units as such a "reserved room" at the beginning of each line is for a delimiter, and the line that the delimiter is send represents the byte that the delimiter was originally placed at.

In the below example—512 bits represents total of 64 bytes (0 to 63) and there are total of 63 lines and room for 64 delimiters. The original data (64 bit) are placed into the matrix column 0 as 57 bits and the rest of the bits (7) are placed on the next column, followed by the next 64 bits that—from this unit 50 bits are placed into col 1 and the 14 remaining bits are into col 2 and so on. For each 57-bit column a 6 bit ECC code is added at the column (marked e1 to e9). A delimiter that is assumed to be on the 2nd byte of the first 64 bit data units, is "located" at the "second place" (marked L1). Transmission starts when the matrix is full. If the first byte was a delimiter—that delimiter is sent upfront and followed by the 9 bits of data located in the first line of the matrix. If the second byte is a delimiter, it is sent directly after the first line was send, i.e. at the beginning of the second line, followed by the second line's bits and so on. If there is no delimiter than no delimiter is sent.

Delimiters may have either long '1' time (high pulses) and modulated '0' time (low pulses) or long '0' time and modulated '1' time. The order of polarities may be required to be fixed—for that there may be a need to change the delimiter location—pending the delimiter type and the exact state of the line when the delimiter is to be send. For example, assuming that the second byte of the first data unit is a delimiter that needs to be LONG '0' with modulated '1'. The first 3 bits are sent as a rise edge, followed by the second set of 3 bits that modulates the falling edge followed by a modulated rise edge for bits 6-8. Now one should have placed the delimiter, but the delimiter requires long '0' but the signal just rose. As such the NEXT 3 bits (9 to 11) are modulating the falling edge and the delimiter is send after as the signal is down to 0 and a long '0' can be applied followed by a modulated '1'. Delimiters that are sent should have a specific pattern, as else it might not be possible to detect if the delimiter is 'modulated' followed by long level or long followed by modulated level. Delimiters that can be send shall have of a constant scheme of a long level followed by modulated level (or the other way around). Alternatively, a cascaded delimiter may be used where the first delimiter is of the constant format, and the second is as needed.

The increase of the BER by the example illustrated in FIG. 10*b* may be estimated under the assumption that the modulation additionally uses gray coding as previously described, so that the probability of 3 bits that are modulating a single edge to have an error is low. However, 2 errors of 2 triplexes may be possible. Using the example of FIG. 10*b*, burst errors that are at least 9 bits apart will result in that the error is distributed over more than a single data unit (57 bit of data within a column) protected by the ECC which, therefore, shall be able to correct the errored bits.

The updated probability is estimated assuming 2 errors distributed such that the error correction using the matrix (the concept of interleaving) is able to handle them and a single bit probability to be given by P. An interleaver as previously described uses a matrix of dimension A columns x B lines. The source of the data fills the matrix as line by line (or column by column) and to each data unit adds a single bit or multiple bits of an error correction code. Once the matrix is full sending starts but the data over the medium taken column by column (or Lines if the matrix was filled in columns) to mitigate the impact of burst errors as burst error will be distributed over multiple data units protected by an ECC.

Using the previously described modulation scheme (including gray coding), 2 errors are expected to be distant 1 to 5 bits from each other. That means that the error code should be able to correct them, depending on how the errors are distributed. In total, up to 9 errors can be corrected using that scheme.

The bit error will be converted to a matrix error rate (MER), which is given by:

MER=1−P[no errors]−P[single error]−P[2 errors];

P[no errors]={1−P}^[number of bits send];

P[single error]=[number of bits!]/[1!*(bits in matri−1)!]*P*(1−P)^[bits in matrix−1];

P[2 errors]=[number of bits!]/[2!*(bits in matrix−2)!]*P^2*(1−P)^[bits in matrix−2];

If we apply the above and assume that P=1e-10, matrix bits are 567 (=63*9), one arrives at a MER to be 3.022e-20, which is a very low error rate.

Figure 10D:
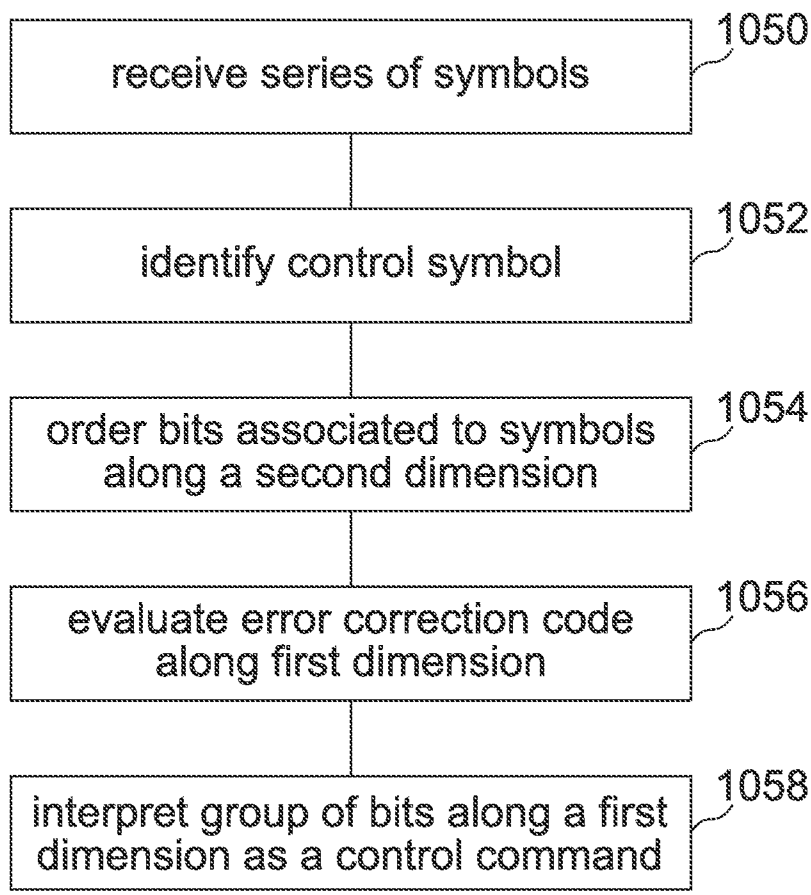
FIG. 10*d* illustrates a illustrates a flowchart of an example of a method to process a data signal.

FIG. 10*d* illustrates a flowchart of a method to process a data signal that can be used to process a data signal generated by the method of FIG. 10*a*. The method comprises receiving a series of symbols 1050 and identifying 1052 a control symbol indicator and a control symbol within the series of symbols. The method further comprises ordering bits 1054 associated to each symbol of the series along a second dimension within a multidimensional representation of data and evaluating an error correction code 1056 along the first dimension of the multidimensional representation. Further, the method comprises interpreting a group of bits along a first dimension as a control command at a position within the multidimensional representation that depends on the positions of the control symbol indicator and the control symbol within the series of symbols.

Using an example of a method allows to correct for errors within a received data signal while allowing to use special and robust modulation schemes for the transmission of control commands.

Figure 10E:
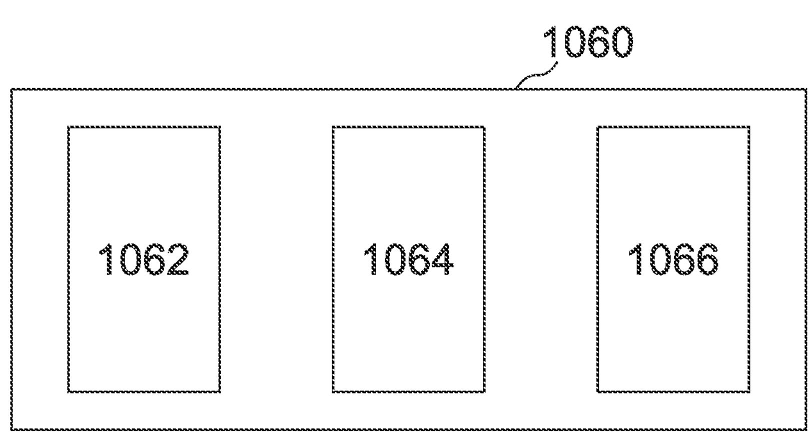
FIG. 10*e* illustrates an example of an apparatus for generating a data signal to transmit a serially ordered predetermined number of bits.
Figure 11A:
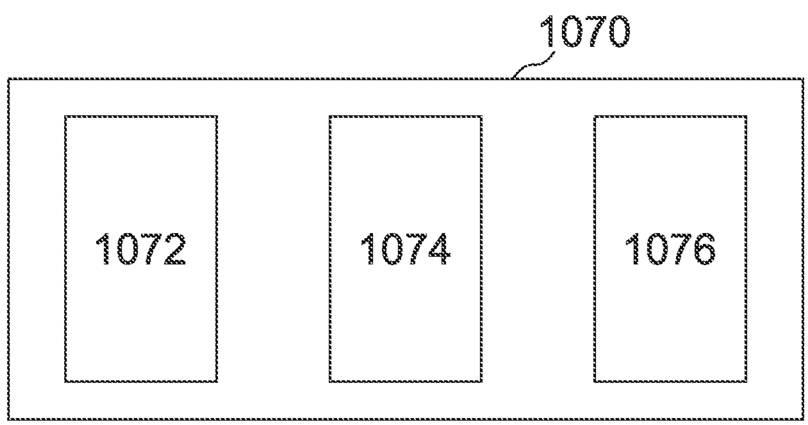
FIG. 11*a* illustrates an example of an apparatus for processing a data signal.

FIGS. 10*e* and 11*a* schematically illustrate apparatuses capable to implement methods according to FIGS. 10*a* and 10*d* on either the transmit side or on the receive side of a data communication link or interconnect. FIG. 10*e* illustrates an apparatus for generating a data signal to transmit a serially ordered predetermined number of bits, the bits comprising a group of bits indicative of a control command. The apparatus 1060 comprises a code generation circuit 1062 configured to generate at least one error correction bit for the data bits within each subgroup of multiple subgroups of bits.

An interleaving circuit 1064 is configured to order the bits of each subgroup and their associated error correction bits along a first dimension of a multidimensional representation of data; and to read the data bits from the multidimensional representation along a second dimension to determine a series of transmit bits.

A modulator circuit 1066 is configured to modulate the series of transmit bits into a series of transmit symbols; and to insert a control symbol indicator and a control symbol into the series of transmit symbols at a position depending on the position of the group of bits indicative of the control command within the series of bits.

According to some examples, the modulator circuit of the apparatus of FIG. 10*e* is configured to insert the control symbol indicator and the control symbol within the transmit symbols generated from bits identified by an index for the second dimension within the multidimensional representation that corresponds to the number of the byte indicative of a control command within the group of bits.

According to some examples, the apparatus optionally further comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to a first transmit symbol, and the second signal edge and the third signal edge being separated by a second time period corresponding to a second transmit symbol; and an output interface circuit configured to output the data signal.

FIG. 11*a* illustrates an apparatus for processing a data signal 1070. The apparatus 1070 comprises a demodulator circuit 1072 configured to receive a series of symbols, to identify a control symbol indicator and a control symbol within the series of symbols; and to demodulate each symbol into associated bits.

Further, the apparatus 1070 comprises a de-interleaving circuit 1074 configured to order the bits associated to each symbol of the series along a second dimension within a multidimensional representation of data; and to read out the bits of the multidimensional representation along a first dimension.

The apparatus 1070 further comprises a code evaluation circuit 1076 configured to evaluate an error correction code for the bits read out along the first dimension to determine corrected bits; and to interpret a group of bits along a first dimension as a control command at a position within the multidimensional representation that depends on the positions of the control symbol indicator and the control symbol within the series of symbols.

According to further examples, the apparatus 1070 optionally further comprises an input interface configured to receive a sequence of a first signal edge of a first type, a second signal edge of a second type, and a third signal edge of the first type in the data signal; wherein the demodulation circuit is configured to determine first associated bits based on a first time period between the first signal edge and the second signal edge, and second associated bits based on a second time period between the second signal edge and the third signal edge.

In the previous sections, basic aspects of the STEP interconnect are described, e.g., in relation to the STEP protocol and the STEP protocol's physical layer. The following description section focuses on the Medium Access Control (MAC) layer of the STEP protocol. It is to be noted that the circuitry and techniques described in the following may be used in transmitters, receivers, or transceivers for enabling communication according to the STEP protocol. However, the circuitry and techniques described in the following may also be used for communication protocols different from the STEP protocol.

When using a (high-speed) communication interface between electronic devices, there may be a need to define a set of controls between transmit, receive or transceiver circuitry on both interconnect sides. For example, controls may be used for synchronization, power management, flow control, signaling etc. The controls should not to be confused with any other data transmission and have minimal effect on the overall data throughput.

A technique that may enable (highly) reliable transmission of controls is described in the following with respect to FIGS. 12*a* to 12*q*. FIG. 12*a* illustrates an example of an apparatus 1200 for generating a data signal 1201. The apparatus 1200 comprises a processing circuit 1205 (e.g. a DTC) configured to generate the data signal 1201. The processing circuit 1205 generates the data signal 1201 to comprise a sequence of a first signal edge of a first type, a second signal edge of a second type, and a third signal edge of the first type. For example, the first type may be a rising edge and the second type be a falling edge, or the second type may be a rising edge and the first type be a falling edge.

Further, the apparatus 1200 comprises an output interface circuit 1210 configured to output the data signal 1201 to a transmission link (not illustrated).

The processing circuit 1205 generates the data signal 1201 such that the first signal edge and the second signal edge are separated by a first time period corresponding to a payload data symbol to be transmitted according to a communication protocol (e.g. the STEP protocol).

Figure 12A:
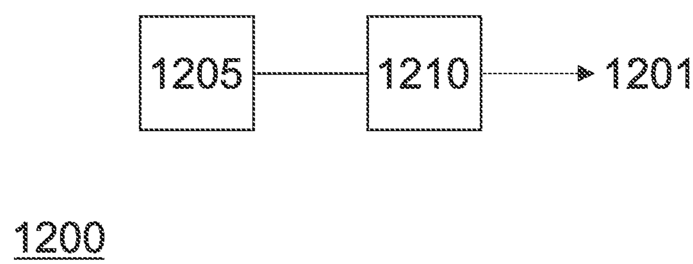
FIG. 12*a* illustrates another example of an apparatus for generating a data signal.
Figure 12B:
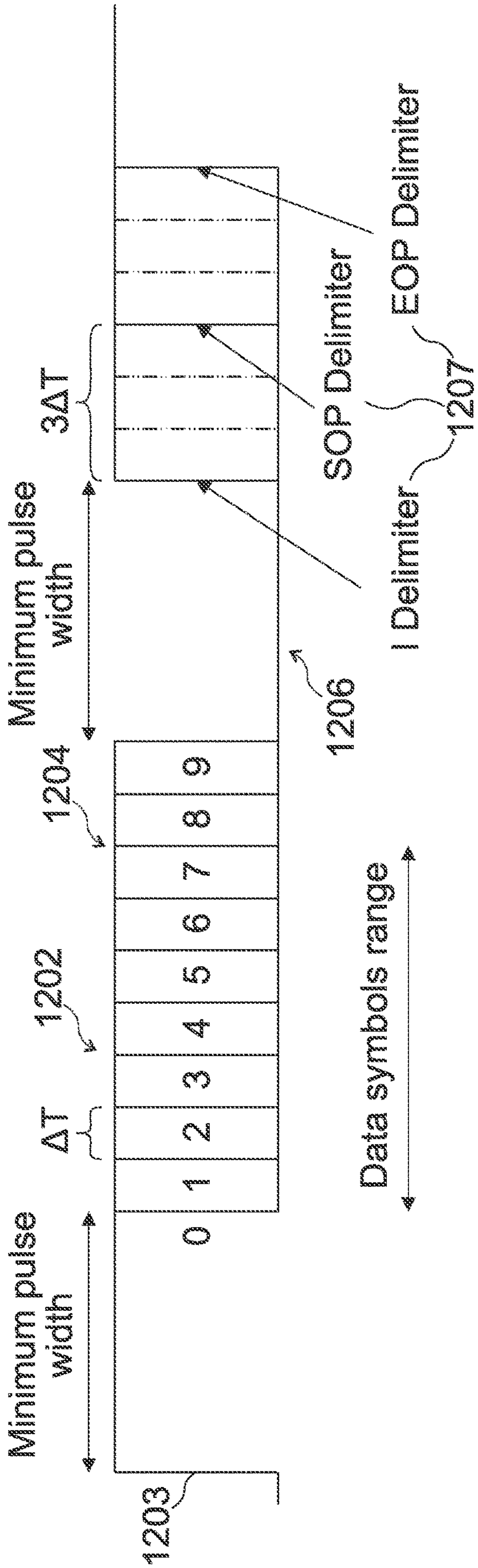
FIG. 12*b* illustrates an example of a data signal.

An overview on exemplary possible time periods for encoding payload data symbols to a data signal is illustrated in FIG. 12*b*. In the left part of FIG. 12*b*, a first pulse 1202 is illustrated. The pulse 1202 starts at rising signal edge 1203 and ends at falling signal edge 1204. As indicated, a position of the falling signal edge 1204 is adjustable by the processing circuit 1205 based on the payload data symbol that is to be encoded to the data signal 1201. In the example of FIG. 12*b*, ten different possible positions for falling signal edge 1204 are illustrated (labelled 0 to 9). Position 0 defines a minimum pulse length for pulse 1202. Accordingly, ten different time periods between the rising signal edge 1203 and the falling signal edge 1204 may be adjusted. In other words, ten different pulse lengths may be adjusted.

In the example of FIG. 12*b*, it is assumed that positions 0 to 7 are used for encoding payload data symbols to the pulse 1202 (e.g. according to the STEP protocol). That is, eight different payload data symbols or 3 bits may be encoded to pulse 1202 by adjusting the position of falling signal edge 1204. In other words, different time periods between the rising signal edge 1203 and the falling signal edge 1204 indicate different payload data symbols of the communication protocol. The different time periods between the rising signal edge 1203 and the falling signal edge 1204 may be understood as the symbol widths of the different payload data symbols. As can be seen in FIG. 12*b*, the time periods corresponding to the different payload data symbols of the communication protocol differ by (at least) a constant symbol separation time $\Delta T$. For example, the processing circuit 1205 of apparatus 1200 may adjust the first time period between the first signal edge and the second signal edge in the data signal 1201 to one of the eight possible options as indicated by pulse 1202 in FIG. 12*b* in order to encode a specific payload data symbol to the data signal 1201.

The processing circuit 1205 further generates the data signal 1201 such that the second signal edge and the third signal edge are separated by a second time period being longer than a time period of any payload data symbol of the communication protocol. Additionally, the processing circuit 1205 is configured to generate the data signal 1201 to comprise a fourth signal edge of the second type that directly succeeds the third signal edge. The third signal edge and the fourth signal edge are separated by a third time period corresponding to a control symbol of the communication protocol. In other words, the processing circuit 1205 generates an out-of-band pulse in the data signal 1201 in order to encode a control symbol indicator (e.g. an out-of-band symbol) to the data signal 1201. The control symbol indicator separates a control symbol (control word) from the payload data symbol(s).

Referring to the example of FIG. 12*b*, the pulse 1202 ends at maximum at position 7 for a payload data symbol. Accordingly, positions 8 and 9 may be used for transmitting the control symbol indicator.

In order to increase a reliability of the control symbol indicator, only position 9 may be used for encoding the control symbol indicator to the data signal 1201. In other words, the time period corresponding to (indicating) the control symbol indicator may differ by more than one symbol separation time ΔT from the longest possible time period corresponding to (indicating) a payload data symbol of the communication protocol. For example, the processing circuit 1205 of apparatus 1200 may adjust the second time period between the second signal edge and the third signal edge in the data signal 1201 to the time period indicated by position 9 in FIG. 12*b* in order to encode the control symbol indicator to the data signal 1201.

In order to encode a specific control symbol of the communication protocol to the data signal 1201, the processing circuit 1205 adjusts the third time period between the third signal edge and the fourth signal edge in the data signal 1201. Referring to the example of FIG. 12*b*, pulse 1202 ends at position 9 in order to indicate the control symbol indicator. Pulse 1202 is directly followed by a second pulse 1206. Pulse 1206 starts with the falling signal edge 1204 at position 9. The pulse 1206 ends with rising signal edge 1207. Three options are possible for the position of rising signal edge 1207. Accordingly, pulse 1206 may indicate three different control symbols of the communication protocol.

In the example of FIG. 12*b*, the time periods corresponding to different control symbols of the communication protocol differ by three symbol separation times ΔT. However, the time periods corresponding to different control symbols of the communication protocol may alternatively differ by any other integer multiple of the symbol separation time ΔT (e.g. by two or four symbol separation times ΔT). In other words, the time periods corresponding to different control symbols of the communication protocol may differ by more than one symbol separation time ΔT. Separating the time periods corresponding to different control symbols of the communication protocol by more than one symbol separation time ΔT may allow to make the control symbol encoding more robust due to greater time differences between the different control symbols. In some examples, however, the time periods corresponding to different control symbols of the communication protocol may alternatively differ by one symbol separation time ΔT.

For example, the processing circuit 1205 of apparatus 1200 may adjust the third time period between the third signal edge and the fourth signal edge in the data signal 1201 to one of the three possible options as indicated by pulse 1206 in FIG. 12*b* in order to encode a specific control symbol to the data signal 1201.

The control symbol indicator together with the control symbol may be understood as a unique delimiter for a certain control. Due to the out-of-band control symbol indicator it cannot be mistaken as payload data symbol.

The control symbol may indicate a variety of different commands, states, etc. for controlling the data transmission and/or operation of the communication interface. For example, the control symbol may indicate one of a start of a data packet (SOP Delimiter), an end of a data packet (EOP Delimiter), an idle mode (I Delimiter), a subsequent transmission of calibration (training) data, a subsequent transmission with a more robust data packet format, and an inversion of the direction of data flow on the transmission link carrying the data signal 1201.

The control symbol indicating the idle mode may, e.g., be encoded to the data signal when there is no data to transmit (by the MAC layer) or before going to a low power mode (for details about possible power modes see below description of FIGS. 15*a* to 15*d*).

Delimiters may further be used for power management. For example, when there is no data to transmit by the MAC layer until at least the end of a transmission data unit (of n bits), the control symbol indicator together with the control symbol indicating the idle mode may be encoded one, two, three or more times to the data signal 1201. The (repeated) transmission of the delimiter indicating the idle mode may be understood as a kind of low power mode in which the activity of the apparatus 1200 (acting as a transmitter) is low. However, at the same time the transmission link (the line) is kept "hot" by the apparatus 1200 due to the continuous transmission of the delimiter indicating the idle mode. Accordingly, waking-up/powering-up the apparatus 1200 (and/or a receiver of the data signal 1201) from the idle mode to the full throughput mode may be very fast. In other words, the delimiters may increase a system efficiency by allowing to enter and to exit the fully operational (full throughput) mode with very low latency.

Furthermore, the long pulse for the delimiter indicating the idle mode may be stretched. For example, the processing circuit 1205 of apparatus 1200 may adjust the second time period between the second signal edge and the third signal edge in the data signal 1201 to a time period that is longer than the one indicated by position 9 in FIG. 12*b*. For example, the processing circuit 1205 may adjust the second time period in the data signal 1201 to a time period that is the sum of a minimum time period (as indicated by position 0 in FIG. 12*b*) plus 20 times, 50 times, 100 times, or more the symbol separation time ΔT. That is, the processing circuit 1205 may adjust the second time period in the data signal 1201 such that it is a multiple of the longest possible time period corresponding to (indicating) a payload data symbol of the communication protocol. Accordingly, the data signal 1201 may be generated by processing circuit 1205 at a low rate. A burst mode using the long idle delimiter may keep the line hot (substantially) without toggling and, hence, keep the amount of energy per transmitted bit low (e.g. around 1 pico-Joule per bit).

As an alternative, two consecutive long pulses (out-of-band pulses) may be used to encode a control symbol to the data signal 1201. That is, the processing circuit 1205 may be configured to generate the data signal 1201 such that the second time period between the second signal edge and the third signal edge as well as the third time period between the third signal edge and the fourth signal edge are longer than a time period of any payload data symbol of the communication protocol. In other words, the processing circuit 1205 may encode two consecutive control symbol indicators (delimiters) to the data signal 1201 for effectively encoding a specific control symbol to the data signal 1201. The processing circuit 1205 of apparatus 1200 may, e.g., adjust the second time period as well the third time period in data signal 1201 to the time period indicated by position 9 in FIG. 12*b*.

For example, for a power management delimiter both the high and the low pulse may be out-of-band in order to create a balanced duty-cycle for the data signal. Two consecutive out-of-band pulses in the data signal 1201 may, e.g., be used to indicate a different power mode (power state, mode of operation).

Payload data is encoded to the data signal 1201 by adjusting the time periods between consecutive signal edges in the data signal 1201. Accordingly, the processing circuit 1205 may be configured to generate the data signal 1201 to further comprise at least a fifth signal edge of the second type that (directly) precedes the first signal edge. The fifth signal edge and the first signal edge are separated by a fourth time period corresponding to another payload data symbol. As mentioned above, apart from other time encoded communication protocols, apparatus 1200 may be used for communication according to the STEP protocol. A sum of the first time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

Although it is described above that the sequence of signal edges representing the payload data symbols in the data signal 1201 precedes the signal edges representing the control symbol indicator and the control symbol, it is to be noted that the above example for encoding the payload data symbols to the data signal 1201 is merely for pedagogical purposes. A delimiter encoded to the data signal may be preceded or succeeded by any kind of data (e.g. another delimiter, training data symbols etc.). Accordingly, it is to be noted that a payload data symbol is not necessarily directly preceding or succeeding a sequence of signal edges in the data signal 1201 that represents a control symbol indicator together with a control symbol. In other words, a sequence of signal edges representing one, two or more payload data symbols may be encoded to any position in the data signal 1201 that precedes or succeeds a sequence of signal edges in the data signal 1201 that represents a control symbol indicator together with a control symbol.

Processing circuit 1205 of apparatus 1200 may further enable to generate delimiters self-balanced in terms of frequency and DC level (common mode voltage). Therefore, the processing circuit 1205 may be configured to generate one or more pulse that precede or succeed the long pulse of the delimiter to be short (e.g. being shorter than an average time period between consecutive signal edges in the data signal 1201). For example, the processing circuit 1205 may be configured to generate to generate the data signal 1201 such that the sum of the first time period and the fourth time period is lower than an average time period between consecutive signal edges of the same type in the data signal 1201. Accordingly, the long pulse of the delimiter may be compensated by the shorter preceding pulse(s) in order to balance the data signal 1201 in terms of frequency and DC level.

Signal balancing for delimiters may, e.g., be done via a data rearrangement when going from the MAC layer to the physical layer. Some exemplary data rearrangements will be described in the following with reference to FIGS. 12*c* to 12*i*. For example, for delimiters indicating a start of a data packet or an end of a data packet, some bits of the delimiter data given by the MAC layer may be redundant in the physical layer. These bits may be used for balancing the line frequency and the duty cycle.

Assuming that the MAC layer operates at a resolution of eight bit and the physical layer operates at a resolution of six bit (e.g. two 3-bit symbols), a delimiter may be sent on a byte in which only six bits are required to represent the delimiter. Accordingly, two out of the eight bits representing the delimiter are redundant. This is exemplarily illustrated in FIG. 12*c*.

Figure 12C:
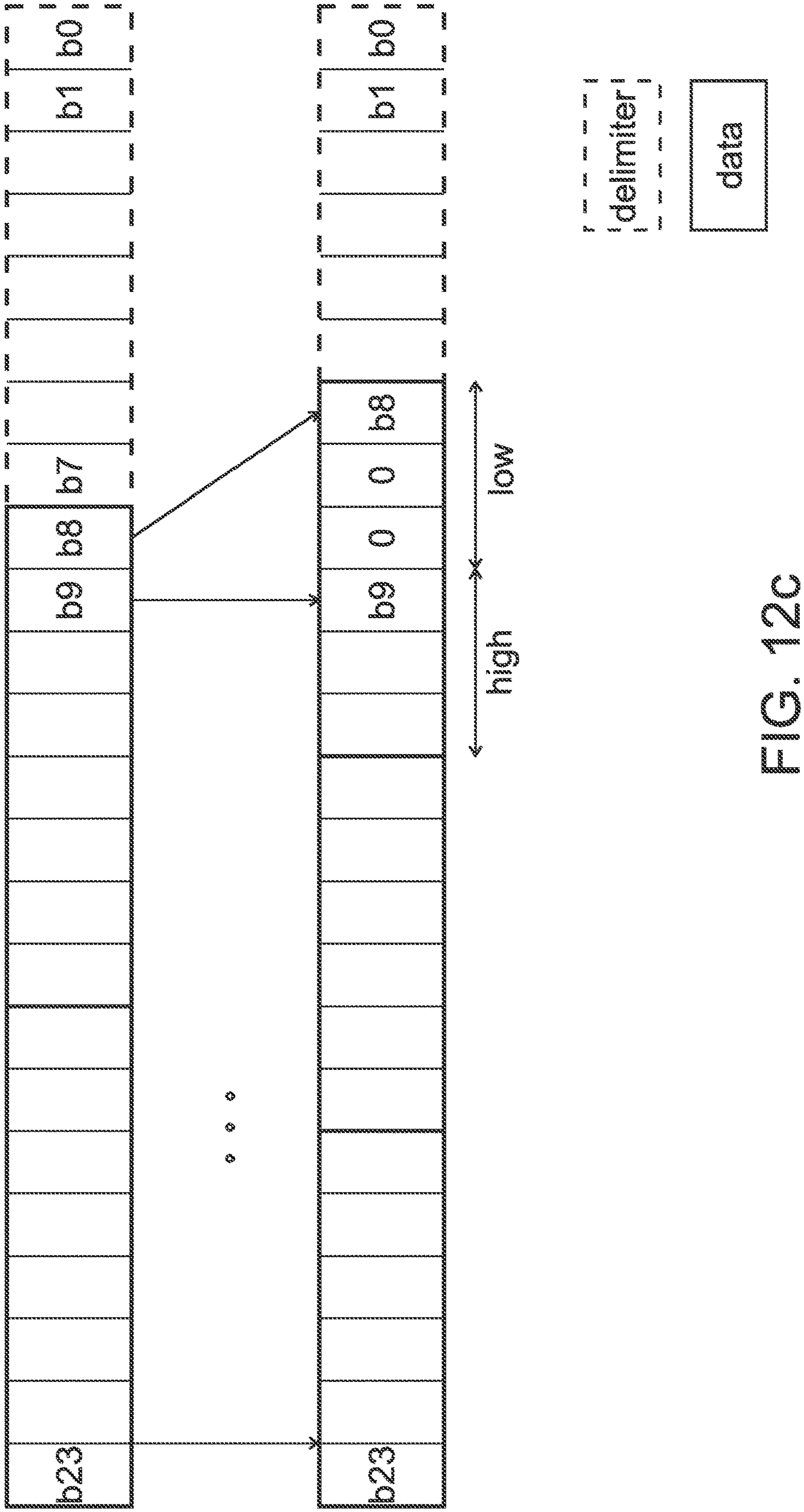
FIG. 12*c* illustrates a first example of a bit rearrangement between a physical layer representation and a medium access control layer representation.

In the upper part of FIG. 12*c*, the arrangement of a sequence of bits b0 to b23 in the MAC layer is illustrated. Bits b0 to b7 represent a delimiter, whereas bits b8 to b15 and bits b16 to b23 represent payload data. That is, the delimiter is located at the end of the 3 bytes set. Only the bits b0 to b5 are required to represent the delimiter. Accordingly, bits b6 and b7 are zero.

As illustrated in the lower part of FIG. 12*c*, the bits are rearranged to four clock periods in the physical layer. The redundant bits b6 and b7 are placed as Most Significant Bits (MSBs) of the next low pulse symbol (zero bits b6 and b7 are placed between bits b8 and b9). Accordingly, the payload data symbol defined by the three bits b6, b7 and b8 has a short duration. For example, referring to the pulse lengths illustrated in FIG. 12*b*, the pulse representing the symbol payload data symbol defined by the three bits b6, b7 and b8 may end either at position 0 or at position 1 depending on the value of bit b8. Assuming that the data signal is balanced, the average pulse length (the time period between consecutive signal edges) would be between position 3 and position 4. Since the low pulse preceding the pulses of the delimiter (as defined by bits b0 to b5) is shorter than the average pulse length, the long high pulse of the delimiter is compensated so that the data signal remains balanced. In other words, the average symbol is balanced out by the data rearrangement between the MAC layer and the physical layer.

Figure 12D:
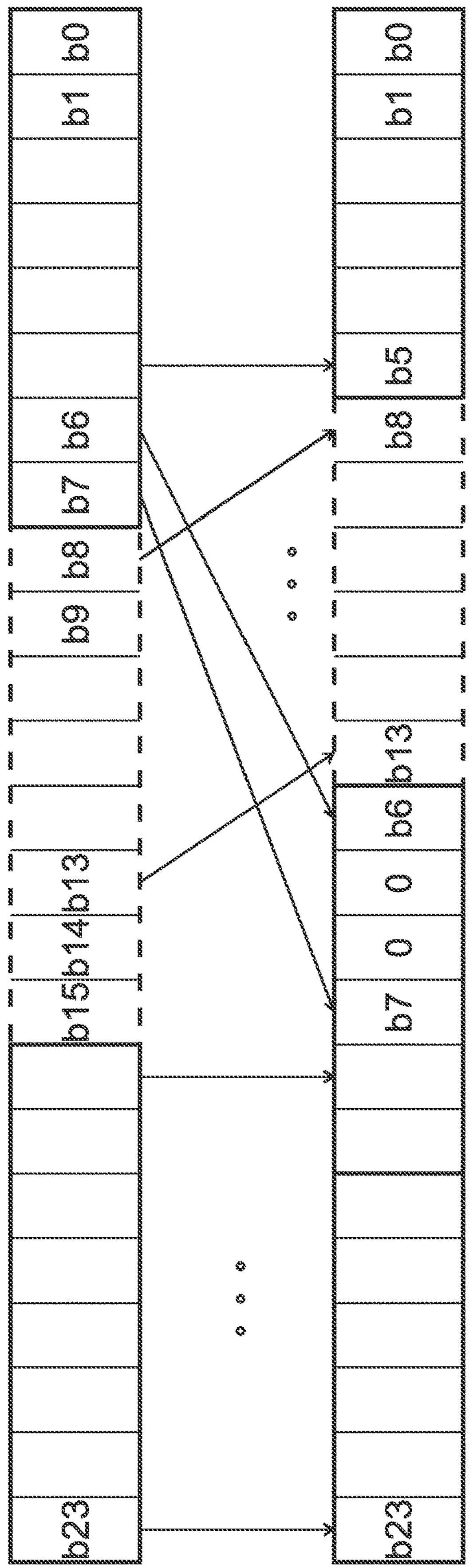
FIG. 12*d* illustrates a second example of a bit rearrangement between a physical layer representation and a medium access control layer representation.

FIG. 12*d* illustrates a similar situation in which the bits representing the delimiter are arranged between bits representing payload data. Bits b8 to b15 represent a delimiter, whereas bits b0 to b7 and bits b16 to b23 represent payload data. Only the bits b8 to b13 are required to represent the delimiter. Accordingly, bits b14 and b15 are zero.

The bits are again rearranged to four clock periods in the physical layer. Bits b6 and b7 are moved to the next high pulse symbol and the next low pulse symbol, respectively. The redundant bits b14 and b15 are again placed as MSBs of the next low pulse symbol. Again, the low pulse preceding the pulses of the delimiter (as defined by bits b8 to b13) is shorter than the average pulse length so that the long pulse of the delimiter is compensated and the data signal remains balanced.

Figure 12E:
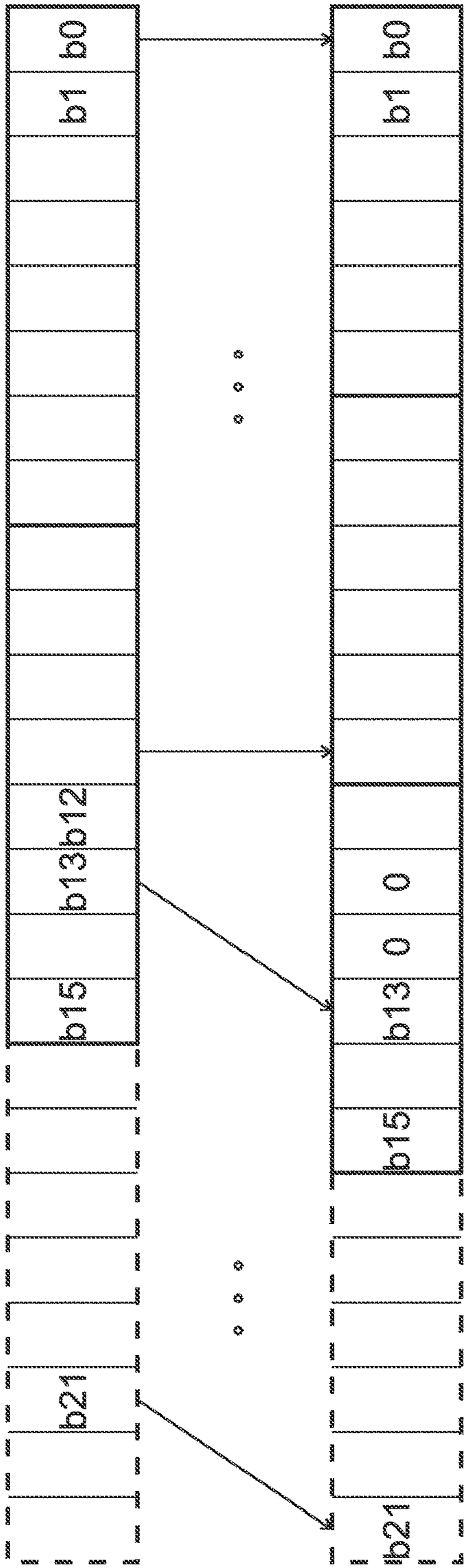
FIG. 12*e* illustrates a third example of a bit rearrangement between a physical layer representation and a medium access control layer representation.

FIG. 12*e* illustrates a similar situation in which the bits representing the delimiter are arranged before the bits representing payload data. Bits b16 to b23 represent a delimiter, whereas bits b8 to b15 and bits b0 to b7 represent payload data. Only the bits b16 to b21 are required to represent the delimiter. Accordingly, bits b22 and b23 are zero.

The bits are again rearranged to four clock periods in the physical layer. Redundant bits b22 and b23 are placed as MSBs of the next low pulse symbol. The low pulse succeeding the pulses of the delimiter (as defined by bits b16 to b21) is shorter than the average pulse length so that the long pulse of the delimiter is compensated and the data signal remains balanced.

Figure 12F:
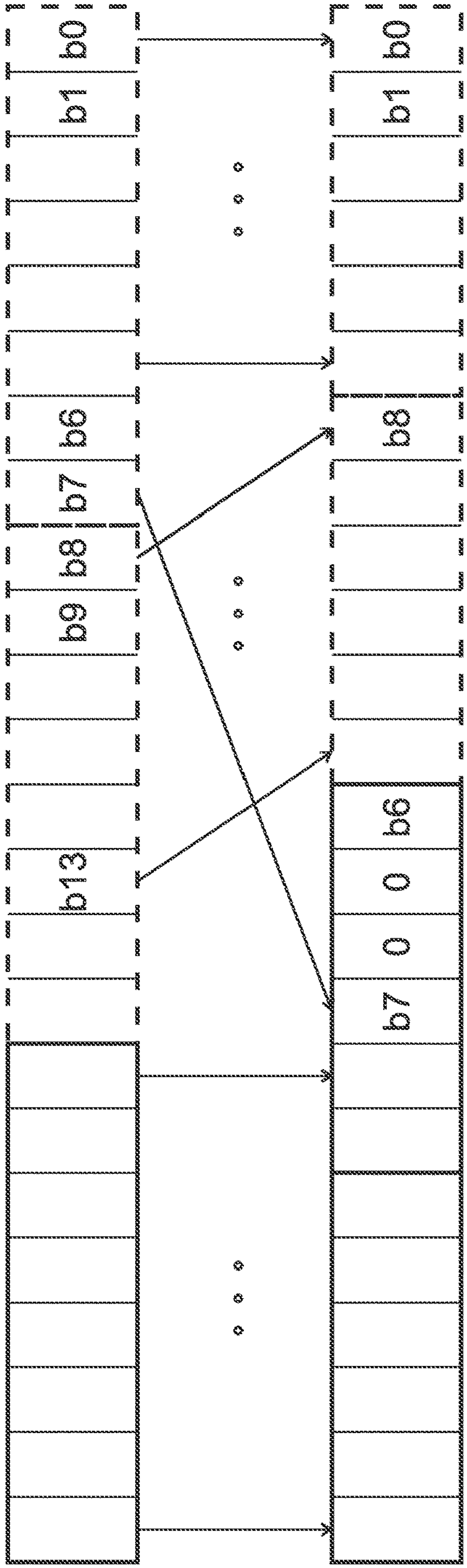
FIG. 12*f* illustrates a fourth example of a bit rearrangement between a physical layer representation and a medium access control layer representation.

FIG. 12*f* illustrates a situation in which bits representing two consecutive idle delimiters are located at the end of the 3 bytes set. Bits b0 to b7 represent a first idle delimiter and bits b8 to b15 represent a second idle delimiter, whereas bits b16 to b23 represent payload data. Only the bits b8 to b13 are required to represent the second idle delimiter. Accordingly, bits b14 and b15 are zero.

The bits are again rearranged to four clock periods in the physical layer. Bits b6 and b7 of the first idle delimiter are moved to the next high pulse symbol and the next low pulse symbol representing payload data, respectively. The redundant bits b14 and b15 are again placed as MSBs of the next low pulse symbol representing payload data. Again, the low pulse preceding the pulses of the second idle delimiter (as defined by bits b8 to b13) is shorter than the average pulse length so that the long pulse of the delimiter is compensated and the data signal remains balanced.

Figure 12G:
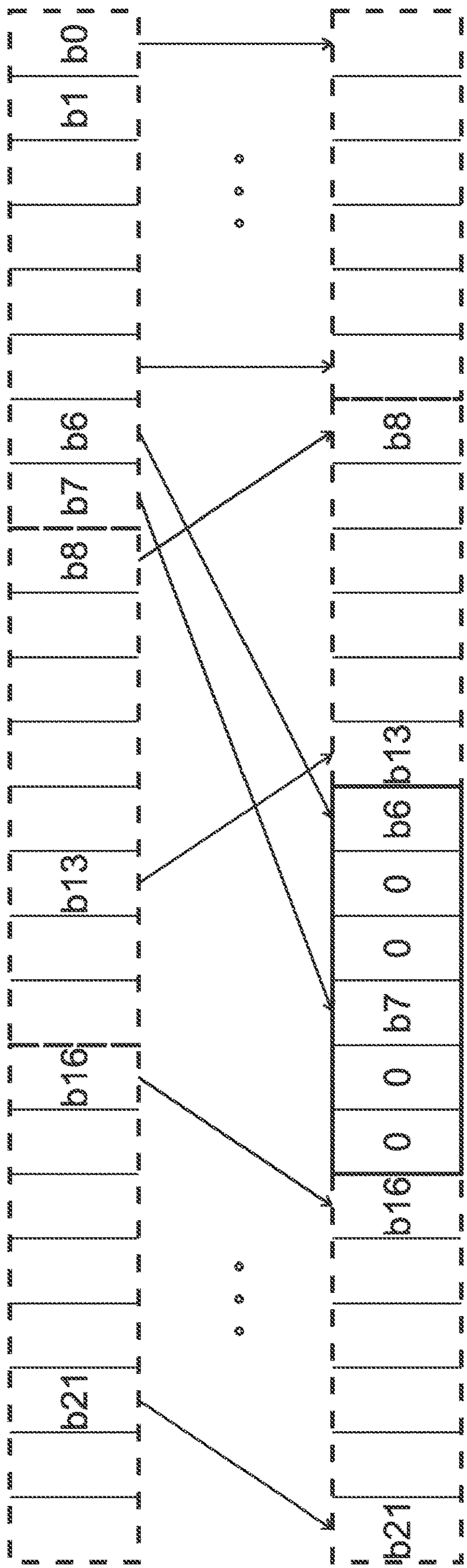
FIG. 12*g* illustrates a fifth example of a bit rearrangement between a physical layer representation and a medium access control layer representation.

FIG. 12*g* illustrates a situation in which the three byte set represents three consecutive idle delimiters. Bits b0 to b7 represent a first idle delimiter, bits b8 to 15 represent a second idle delimiter and bits b16 to b23 represent a third idle delimiter. Only the bits b8 to b13 are required to represent the second idle delimiter and only the bits b16 to b21 are required to represent the third idle delimiter. Accordingly, bits b14 and b15 as well as bits b22 and b23 are zero.

The bits are again rearranged to four clock periods in the physical layer. Bits b1 to b5, bits b8 to b13 and bits b16 to b21 are used to represent the first, the second idle and the third idle delimiter in the physical layer. Bits b6 and b7 of the first idle delimiter are moved to the next high pulse symbol and the next low pulse symbol to represent payload data, respectively. The redundant bits b14 and b15 as well as the redundant bits b22 and b23 are placed as MSBs of the next low pulse symbol and the next high pulse symbol representing payload data, respectively. Both the low pulse and the high pulse representing the payload data are shorter than the average pulse length so that the long pulses of the delimiters are compensated and the data signal remains balanced.

Figure 12H:
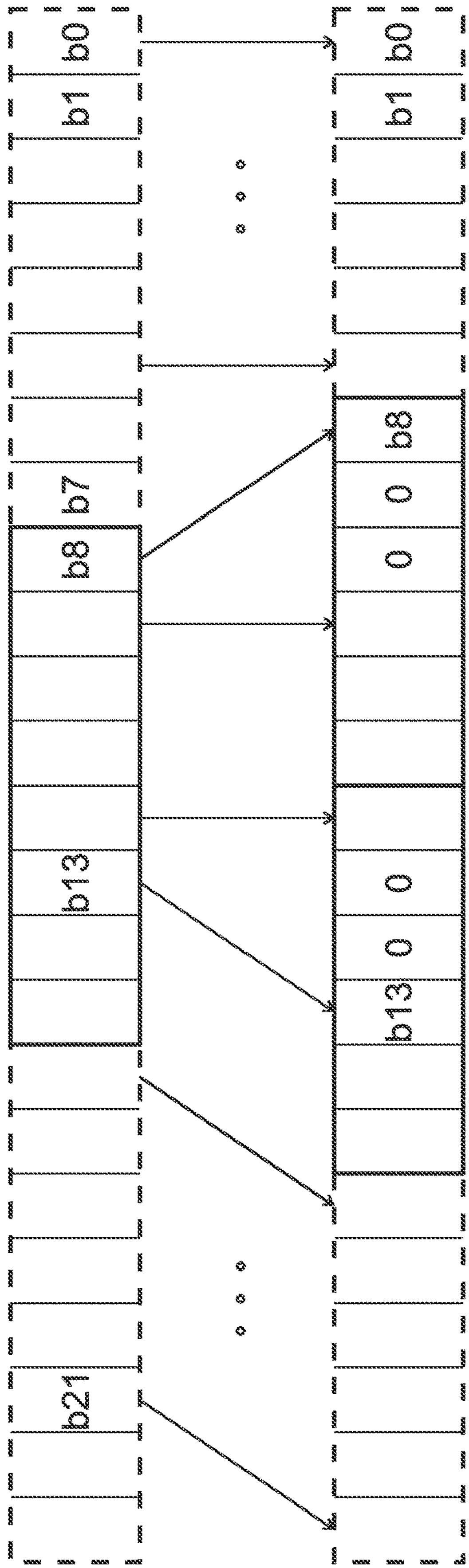
FIG. 12*h* illustrates a sixth example of a bit rearrangement between a physical layer representation and a medium access control layer representation.

FIG. 12*h* illustrates another situation in which a byte set representing payload data is arranged between two byte sets representing delimiters. Bits b0 to b7 represent a first delimiter and bits b16 to b23 represent a second delimiter, whereas bits b8 to b15 represent payload data. Only the bits b1 to b5 and bits b16 to b21 are required to represent the first and the second delimiter. Accordingly, bits b6 and b7 as well as bits b22 and b23 are zero.

The bits are again rearranged to four clock periods in the physical layer. Bits b1 to b5 and bits b16 to b21 are used to represent the first and the second delimiter. Redundant bits b6 and b7 of the first delimiter are placed as MSBs of the next low pulse symbol representing payload data. Further, redundant bits b22 and b23 of the second delimiter are placed as MSBs of the preceding low pulse symbol representing payload data. Both low pulses representing the payload data are shorter than the average pulse length so that the long pulses of the delimiters are compensated and the data signal remains balanced.

The apparatus 1200 may allow to generate a single-ended data signal as described above or a differential signal pair. That is, in some examples, the processing circuit 1205 may be further configured to generate a second data signal, wherein the second data signal is inverted with respect to the data signal 1201. Accordingly, the output interface circuit 1210 may be configured to further output the second data signal to the transmission link.

Figure 12I:
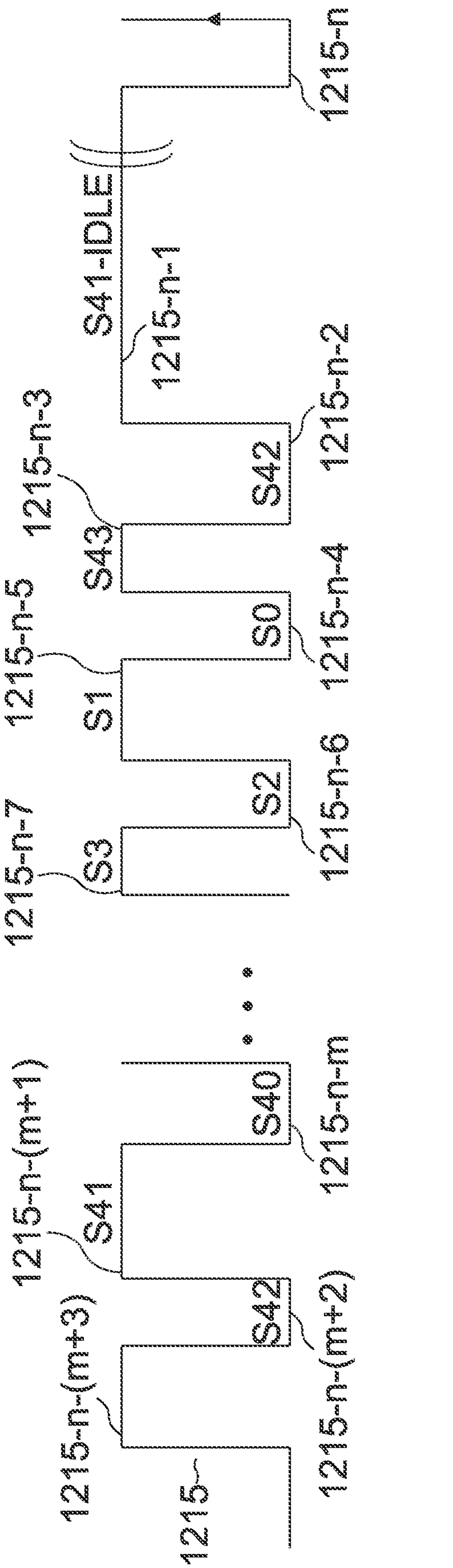
FIG. 12*i* illustrates another example of a data signal.

Another exemplary data signal 1215 in accordance with the above described aspects is illustrated in FIG. 12*i*. The data signal 1215 comprises a plurality of pulses 1215-*n*-(m+3), . . . , 1215-*n*-2 exhibiting different pulse lengths in order to encode different payload data symbols to data signal 1215. Further, pulses 1215-*n*-1 and 1215-*n* encode an idle delimiter to the data signal 1215. The pulse 1215-*n*-1 representing the control symbol indicator is extended as described above. For example, apparatus 1200 may generate the data signal 1215.

Figure 12J:
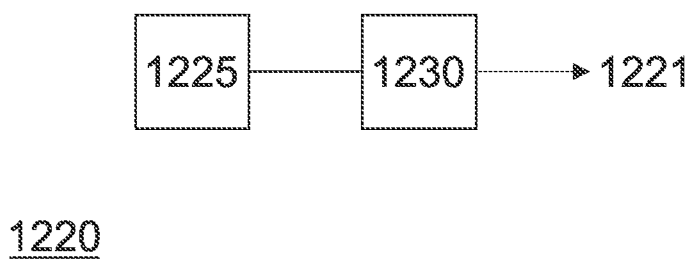
FIG. 12*j* illustrates another example of an apparatus for generating a data signal.

In the examples described above, the control symbol indicator timely precedes the control symbol. However, in some examples the control symbol may alternatively precede the control symbol indicator. An apparatus 1220 for generating an according data signal 1221 is illustrated in FIG. 12*j*.

The apparatus 1200 comprises a processing circuit 1225 (e.g. a DTC) configured to generate the data signal 1221. The processing circuit 1225 is configured to generate the data signal 1221 to comprise a sequence of a first signal edge of a first type, a second signal edge of a second type, and a third signal edge of the first type. The first signal edge and the second signal edge are separated by a first time period corresponding to a control symbol of a communication protocol (e.g. the STEP protocol). The second signal edge and the third signal edge are separated by a second time period being longer than a time period of any payload data symbol of the communication protocol for encoding the control symbol indicator to the data signal 1221. Again, the first type may be a rising edge and the second type be a falling edge, or the second type may be a rising edge and the first type be a falling edge.

The apparatus 1200 comprises an output interface circuit 1230 configured to output the data signal 1221 to a transmission link (not illustrated).

Similar to what is described above in connection with FIGS. 12*a* and 12*b*, the time periods in the data signal 1221 corresponding to different payload data symbols of the communication protocol may differ by at least a symbol separation time ΔT, and the time periods corresponding to different control symbols of the communication protocol may differ by more than the symbol separation time ΔT. For example, the time periods corresponding to different control symbols may differ by an integer multiple of the symbol separation time ΔT. Further, the time period corresponding to (indicating) the control symbol indicator may differ by more than one symbol separation time ΔT from the longest possible time period corresponding to (indicating) a payload data symbol of the communication protocol.

The control symbol may again indicate a variety of different commands, states, etc. for controlling the data transmission and/or operation of the communication interface. For example, the control symbol may indicate one of a start of a data packet, an end of a data packet, an idle mode, subsequent transmission of calibration data, subsequent transmission with a more robust data packet format, and an inversion of the direction of data flow on a transmission link carrying the data signal.

Further, payload data may be encoded to the data signal 1221 by adjusting the time periods between consecutive signal edges in the data signal 1221. Accordingly, the processing circuit 1225 may be configured to generate the data signal 1221 to further comprise a fourth signal edge of the second type, wherein the third signal edge and the fourth signal edge are separated by a third time period corresponding to a payload data symbol of the communication protocol. Additionally, the processing circuit 1225 may be configured to generate the data signal 1221 to further comprise a fifth signal edge of the first type, wherein the fourth signal edge and the fifth signal edge are separated by a fourth time period corresponding to another payload data symbol of the communication protocol. As mentioned above, apart from other time encoded communication protocols, apparatus 1200 may be used for communication according to the STEP protocol. A sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

Although it is described above that the sequence of signal edges representing the payload data symbols in the data signal 1211 succeeds the signal edges representing the control symbol and the control symbol indicator, it is again to be noted that the above example for encoding the payload data symbols to the data signal 1221 is merely for pedagogical purposes. A delimiter encoded to the data signal may be preceded or succeeded by any kind of data (e.g. another delimiter, training data symbols etc.). Accordingly, it is to be noted that a payload data symbol is not necessarily directly preceding or succeeding a sequence of signal edges in the data signal 1221 that represents a control symbol together with a control symbol indicator. In other words, a sequence of signal edges representing one, two or more payload data symbols may be encoded to any position in the data signal 1221 that precedes or succeeds a sequence of signal edges in the data signal 1221 that represents a control symbol together with a control symbol indicator.

Processing circuit 1225 of apparatus 1220 may further enable to generate delimiters self-balanced in terms of frequency and DC level (common mode voltage). Therefore, the processing circuit 1225 may be configured to generate one or more pulses that precede or succeed the long pulse of the delimiter to be short (e.g. being shorter than an average time period between consecutive signal edges in the data signal 1221). For example, the processing circuit 1205 may be configured to generate to generate the data signal 1201 such that the sum of the third time period and the fourth time period is lower than an average time period between consecutive signal edges of the same type in the data signal 1221.

Like the apparatus 1200, the apparatus 1220 may allow to generate a single-ended data signal as described above or a differential signal pair. That is, in some examples, the processing circuit 1225 may be further configured to generate a second data signal, wherein the second data signal is inverted with respect to the data signal 1221. Accordingly, the output interface circuit 1230 may be configured to further output the second data signal to the transmission link.

The apparatus 1220 or at least circuitry parts of the apparatus 1220 may, in some examples, be configured to execute further accordingly adapted features that are described above in connection with apparatus 1200 (e.g. adapted to the interchange of the control symbol indicator position and the control symbol position in the data signal).

As described above, the STEP protocol is based on pulse-width modulation based on the transmitted data. In order to not waste one or more payload data symbols for delimiters, the proposed technique uses out-of-band, unique control symbols for the delimiters that may allow a receiver to (easily) detect them without any overhead penalty.

Moreover, the delimiters may be mapped to special clock periods of the physical layer that balance themselves out in order to balance the line's dynamic parameters. No dedicated treatment from the MAC layer or the physical layer may be required. Also, the delimiters may be protected by the mapping such that an error would not cause false-detection.

For example, as described above in connection with FIG. 12*b*, the STEP protocol modulates each pulse of the data signal as one of several options (e.g. creating a symbol of n bits). Referring to the example of FIG. 12*b*, three bits may be used per symbol so that eight different phases for the pulse are used. In other words, the eight different possible phases of the pulse may be used for encoding the data.

In order to enable easy and protected/reliable reception of the delimiters, out-of-band high and low pulses may be used. Each delimiter is represented by two pulse. For example, seven delimiters may be used—each having a long high pulse together with a short low pulse, a long low pulse together with a short high pulse or the high pulse and the low pulse are both long. If only one of the two pulses is long, the next pulse holds the delimiter type (the control symbol). As described above, the mapping of the delimiter type to the short pulse may be separated by, e.g., three or more phases in order to avoid reception errors.

The foregoing description of FIGS. 12*a* to 12*j* focused on the generation of data (transmit) signals comprising delimiters. In the following corresponding aspects on the detection of delimiters in data (receive) signals are described in connection with FIGS. 12*k* and 12*l*.

Figure 12K:
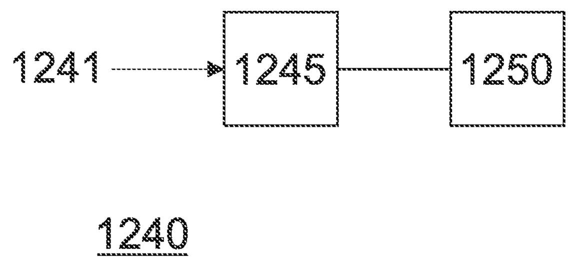
FIG. 12*k* illustrates an example of an apparatus for decoding a data signal.

FIG. 12*k* illustrates an example of an apparatus 1240 for decoding a data signal 1241. The apparatus 1240 comprises a processing circuit 1245 (e.g. a TDC) configured to determine a sequence of a first signal edge of a first type, a second signal edge of a second type, and a third signal edge of the first type in the data signal. Again, the first type may be a rising edge and the second type be a falling edge, or the second type may be a rising edge and the first type be a falling edge. For example, the data signal 1241 may be received from a transmission link by an interface circuit (not illustrated) of the apparatus 1240.

Further, the apparatus 1240 for decoding the data signal 1241 comprises a demodulation circuit 1250 configured to determine a payload data symbol based on a first time period between the first signal edge and the second signal edge if the first time period is shorter than a payload data threshold. The demodulation circuit 1250 is configured to determine a control symbol indicator if a second time period between the second signal edge and the third signal edge is longer than the payload data threshold.

As described above, there is a longest possible time period between directly succeeding signal edges in the data signal that corresponds to a payload data symbol of the communication protocol (e.g. the STEP protocol). Accordingly, the payload data threshold is a reference time period that is used as a decision criterion for deciding whether the data encoded to a pulse is payload data or a control symbol indicator of a delimiter. Referring to the example of FIG. 12*b*, the payload data threshold may, e.g., be any pulse width between the positions 7 and 9 for the falling signal edge 1204. In other words, the payload data threshold is longer than the longest possible time period between directly succeeding signal edges in the data signal that corresponds to a payload data symbol of the communication protocol, and the payload data threshold is shorter than the time period defined in the communication protocol for the control symbol indicator. For example, the payload data threshold may be the pulse width indicated by position 8 for the falling signal edge 1204 in the example of FIG. 12*b*.

By comparing the time periods between consecutive signal edges in the data signal 1241 to the payload data threshold, the beginning of a delimiter may be detected relatively effortless.

Accordingly, the processing circuit 1245 may be further configured to determine a fourth signal edge of the second type in the data signal 1241 that directly succeeds the third signal edge, and the demodulation circuit 1250 may be configured to determine the respective control symbol of the communication protocol based on a third time period between the third signal edge and the fourth signal edge.

As described above, the control symbol may again indicate a variety of different commands, states, etc. for controlling the data transmission and/or operation of the communication interface. For example, the control symbol may indicate one of a start of a data packet, an end of a data packet, an idle mode, subsequent transmission of calibration data, subsequent transmission with a more robust data packet format, and an inversion of the direction of data flow on the transmission link carrying the data signal.

As described above in connection with FIGS. 12*a* and 12*b* for the signal generation, the time periods corresponding to different payload data symbols of the communication protocol may differ by at least a symbol separation time ΔT, and the time periods corresponding to different control symbols of the communication protocol may differ by more than the symbol separation time ΔT. For example, the time periods corresponding to different control symbols may differ by an integer multiple of the symbol separation time ΔT. Accordingly, the demodulation circuit 1250 may be configured to determine the payload data symbol and the control symbol based on information about the time periods corresponding to different payload data symbols of the communication protocol and information about the time periods corresponding to different control symbols of the communication protocol.

Payload data is encoded to the data signal 1241 via the time periods between consecutive signal edges. Accordingly, the processing circuit 1245 may be further configured to determine a fifth signal edge of the second type in the data signal 1241 that directly precedes the first signal edge in time. Accordingly, the demodulation circuit 1250 may be configured to determine another payload data symbol based on a fourth time period between the fifth signal edge and the first signal edge if the fourth time period is shorter than the payload data threshold. As described above, a sum of the first time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

The above example for decoding the payload data symbols in the data signal 1241 is merely for pedagogical purposes. A delimiter encoded to the data signal may be preceded or succeeded by any kind of data (e.g. another delimiter, training data symbols etc.). Accordingly, it is to be noted that a payload data symbol is not necessarily directly preceding or succeeding a sequence of signal edges in the data signal 1241 that represents a control symbol indicator together with a control symbol. In other words, a sequence of signal edges representing one, two or more payload data symbols may be encoded to any position in the data signal 1241 that precedes or succeeds a sequence of signal edges in the data signal 1241 that represents a control symbol indicator together with a control symbol.

In some examples, a differential signal pair may be received by the apparatus 1240. That is, the processing circuit 1245 may be further configured to receive a second data signal that is inverted with respect to the data signal 1241. Accordingly, the processing circuit 1245 may be configured to determine the first signal edge, the second signal edge, and the third signal edge further based on the second data signal. In other words, the processing circuit 1245 may determine the signal edges based on a differential pair of data signals.

Figure 12L:
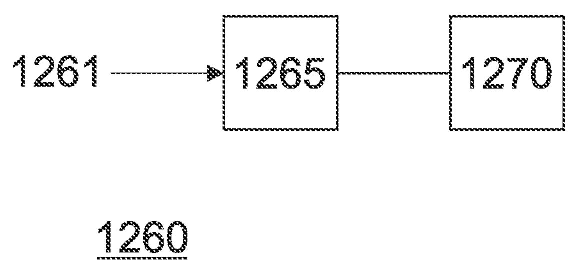
FIG. 12*l* illustrates another example of an apparatus for decoding a data signal.

As described above for the signal generation, the control symbol may alternatively precede the control symbol indicator in the data signal. An apparatus 1260 for decoding an according data signal 1261 is illustrated in FIG. 12*l*.

The apparatus 1260 comprises a processing circuit 1265 (e.g. a TDC) configured to determine a sequence of a first signal edge of a first type, a second signal edge of a second type, and a third signal edge of the first type in the data signal. Again, the first type may be a rising edge and the second type be a falling edge, or the second type may be a rising edge and the first type be a falling edge. For example, the data signal 1261 may be received from a transmission link by an interface circuit (not illustrated) of the apparatus 1260.

Further, the apparatus 1260 for decoding the data signal 1261 comprises a demodulation circuit 1270 configured to determine a control symbol of the communication protocol (e.g. the STEP protocol) based on a first time period between the first signal edge and the second signal edge. Further, the demodulation circuit 1270 is configured to determine a control symbol indicator of the communication protocol if a second time period between the second signal edge and the third signal edge is longer than the payload data threshold.

In contrast to the apparatus 1240, the apparatus 1260 compares the time periods of consecutive signal edges in the data signal 1261 to the payload data threshold in order to detect the end of a delimiter. However, the delimiter may again be detected relatively effortless.

Also in data signal 1261, payload data is encoded to the signal via the time periods between consecutive signal edges. Therefore, the processing circuit 1265 may be further configured to determine a fourth signal edge of the second type in the data signal that directly succeeds the third signal edge, and to determine a fifth signal edge of the first type in the data signal that directly succeeds the fourth signal edge. Accordingly, the demodulation circuit 1270 may be configured to determine a payload data symbol of the communication protocol (e.g. the STEP protocol) based on a third time period between the third signal edge and the fourth signal edge if the third time period is shorter than the payload data threshold. Similarly, the demodulation circuit 1270 may be configured to determine another payload data symbol of the communication protocol based on a fourth time period between the fourth signal edge and the fifth signal edge if the third time period is shorter than the payload data threshold. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol.

Again, the above example for decoding the payload data symbols in the data signal 1261 is merely for pedagogical purposes. A delimiter encoded to the data signal may be preceded or succeeded by any kind of data (e.g. another delimiter, training data symbols etc.). Accordingly, it is to be noted that a payload data symbol is not necessarily directly preceding or succeeding a sequence of signal edges in the data signal 1261 that represents a control symbol together with a control symbol indicator. In other words, a sequence of signal edges representing one, two or more payload data symbols may be encoded to any position in the data signal 1241 that precedes or succeeds a sequence of signal edges in the data signal 1241 that represents a control symbol together with a control symbol indicator.

Also the demodulation circuit 1270 may be configured to determine the payload data symbol and the control symbol based on information about the time periods corresponding to different payload data symbols of the communication protocol and information about the time periods corresponding to different control symbols of the communication protocol. The information about the different time periods may be as described above for apparatus 1240.

In some examples, the processing circuit 1265 may be further configured to receive a second data signal that is inverted with respect to the data signal 1261. Accordingly, the processing circuit 1265 may be configured to determine the first signal edge, the second signal edge, and the third signal edge further based on the second data signal. That is, the processing circuit 1265 may determine the signal edges based on a differential pair of data signals.

The apparatus 1260 or at least circuitry parts of the apparatus 1260 may be configured to execute further accordingly adapted features that are described above in connection with apparatus 1240 (e.g. adapted to the interchange of the control symbol indicator position and the control symbol position in the data signal).

Figure 12M:
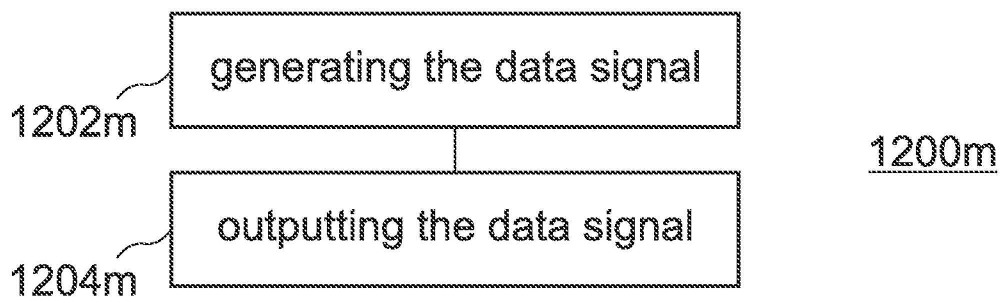
FIG. 12*m* illustrates a flowchart of an example of a method for generating a data signal.

To summarize some of the above aspects on delimiters, an example of a method 1200*m* for generating a data signal is illustrated by means of a flowchart in FIG. 12*m*. Method 1200*m* comprises generating 1202*m* the data signal. The data signal comprises a sequence of a first signal edge of a first type, a second signal edge of a second type, and a third signal edge of the first type. The first signal edge and the second signal edge are separated by a first time period corresponding to a payload data symbol to be transmitted according to a communication protocol, and the second signal edge and the third signal edge are separated by a second time period being longer than a time period of any payload data symbol of the communication protocol. Further, method 1200*m* comprises outputting 1204*m* the data signal.

Optionally, the data signal may further comprise a fourth signal edge of the second type, wherein the third signal edge and the fourth signal edge are separated by a third time period corresponding to a control symbol of the communication protocol.

More details and aspects of method 1200*m* are mentioned in connection with the proposed technique or one or more examples described above (e.g. FIGS. 12*a* to 12*i*). The method may comprise one or more additional optional features corresponding to one or more aspects of the proposed technique or one or more examples described above.

Figure 12N:
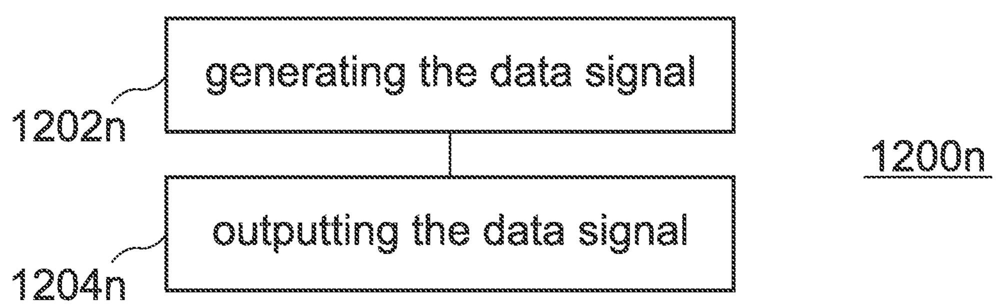
FIG. 12*n* illustrates a flowchart of another example of a method for generating a data signal.

Another example of a method 1200*n* for generating a data signal is illustrated by means of a flowchart in FIG. 12*n*. Method 1200*n* comprises generating 1202*n* the data signal. The data signal comprises a sequence of a first signal edge of a first type, a second signal edge of a second type, and a third signal edge of the first type. The first signal edge and the second signal edge are separated by a first time period corresponding to a control symbol of a communication protocol, and the second signal edge and the third signal edge are separated by a second time period being longer than a time period of any payload data symbol of the communication protocol. Further, method 1200*n* comprises outputting 1204*n* the data signal.

Optionally, the data signal may further comprise a fourth signal edge of the second type, wherein the third signal edge and the fourth signal edge are separated by a third time period corresponding to a payload data symbol of the communication protocol.

More details and aspects of method 1200*n* are mentioned in connection with the proposed technique or one or more examples described above (e.g. FIG. 12*j*). The method may comprise one or more additional optional features corresponding to one or more aspects of the proposed technique or one or more examples described above.

Figure 12O:
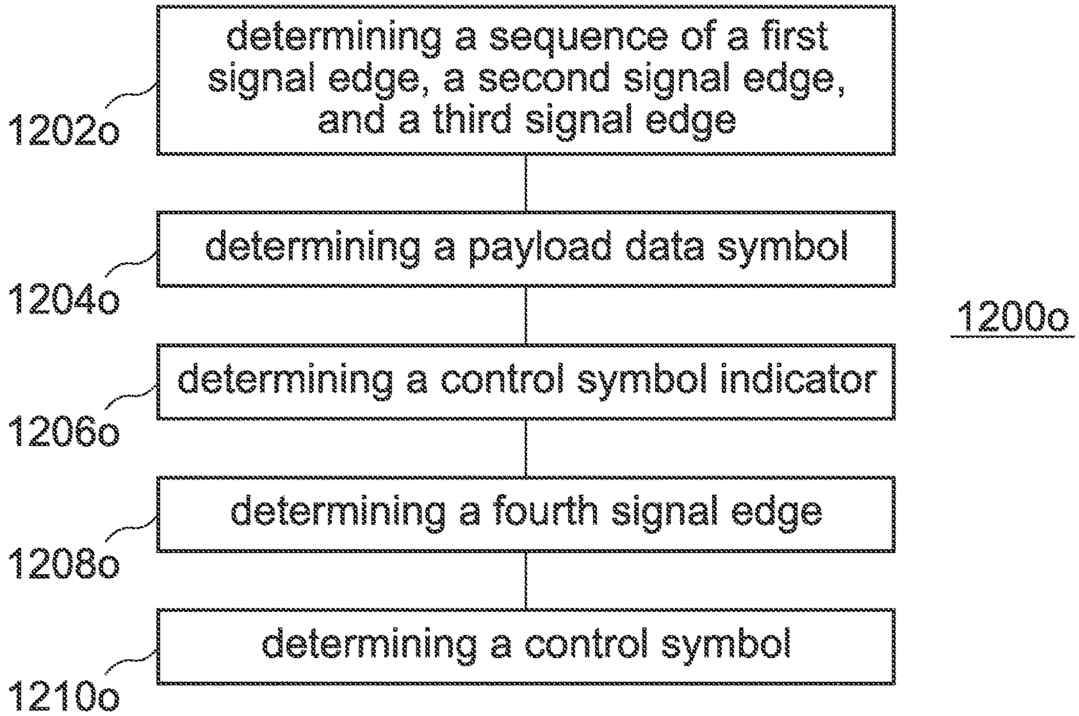
FIG. 12*o* illustrates a flowchart of an example of a method for decoding a data signal.

An example of a method 1200*o* for decoding a data signal is illustrated by means of a flowchart in FIG. 12*o*. Method 1200*o* comprises determining 1202*o* a sequence of a first signal edge of a first type, a second signal edge of a second type, and a third signal edge of the first type in the data signal. Further, method 1200*o* comprises determining 1204*o* a payload data symbol of a communication protocol based on a first time period between the first signal edge and the second signal edge if the first time period is shorter than a payload data threshold. Method 1200*o* additionally comprises determining 1206*o* a control symbol indicator of the communication protocol if a second time period between the second signal edge and the third signal edge is longer than the payload data threshold.

Optionally, method 1200*o* may further comprise determining 1208*o* a fourth signal edge of the second type in the data signal, and determining 1210*o* a control symbol of the communication protocol based on a third time period between the third signal edge and the fourth signal edge.

More details and aspects of method 1200*o* are mentioned in connection with the proposed technique or one or more examples described above (e.g. FIG. 12*k*). The method may comprise one or more additional optional features corresponding to one or more aspects of the proposed technique or one or more examples described above.

Figure 12P:
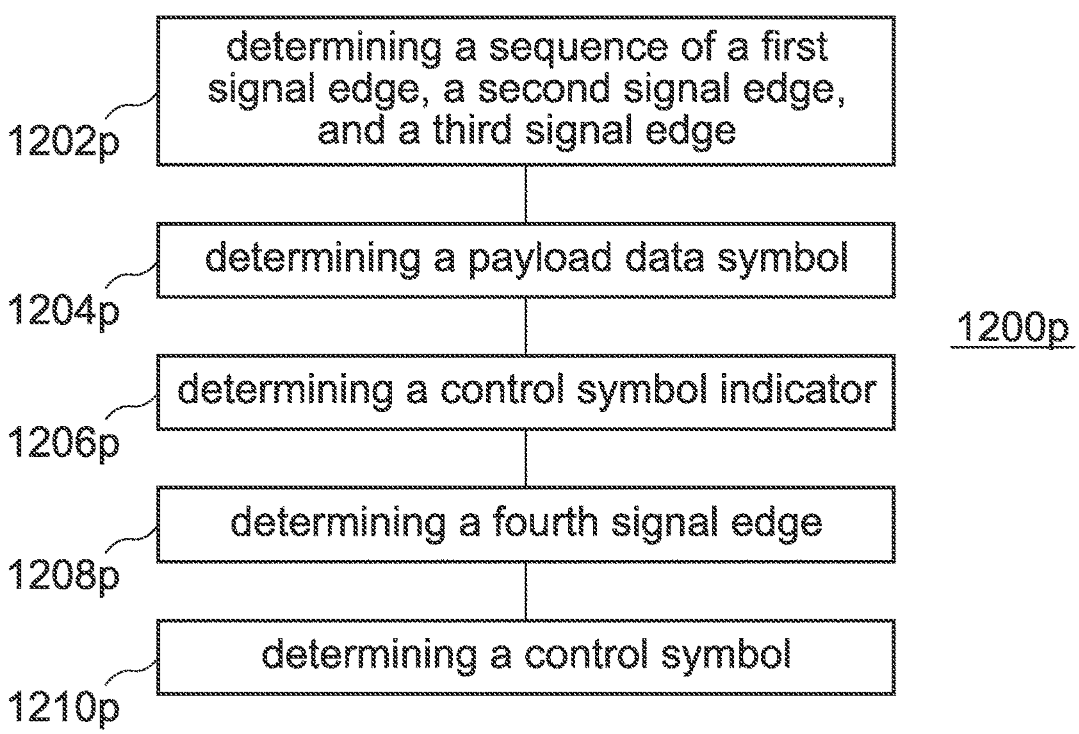
FIG. 12*p* illustrates a flowchart of another example of a method for decoding a data signal.

Another example of a method 1200*p* for decoding a data signal is illustrated by means of a flowchart in FIG. 12*p*. Method 1200*p* comprises determining 1202*p* a sequence of a first signal edge of a first type, a second signal edge of a second type, and a third signal edge of the first type in the data signal. Further, method 1200*p* comprises determining 1204*p* a control symbol of a communication protocol based on a first time period between the first signal edge and the second signal edge. Method 1200*p* additionally comprises determining 1206*p* a control symbol indicator of the communication protocol if a second time period between the second signal edge and the third signal edge is longer than a payload data threshold.

Optionally, method 1200*p* may further comprise determining 1208*p* a fourth signal edge of the second type in the data signal, and determining 1210*p* a payload data symbol of the communication protocol based on a third time period between the third signal edge and the fourth signal edge if the third time period is shorter than the payload data threshold.

More details and aspects of method 1200*p* are mentioned in connection with the proposed technique or one or more examples described above (e.g. FIG. 12*l*). The method may comprise one or more additional optional features corresponding to one or more aspects of the proposed technique or one or more examples described above.

The above examples for delimiters used a combination of one control symbol indicator and one control symbol of the communication protocol. In order to increase the number of delimiters, more than one control symbol may follow the control symbol indicator. In other words, the delimiters may be cascaded. Some exemplary circuits for generating or decoding according data signals are described in the following with respect to FIGS. 12*q* to 12*s*.

Figure 12Q:
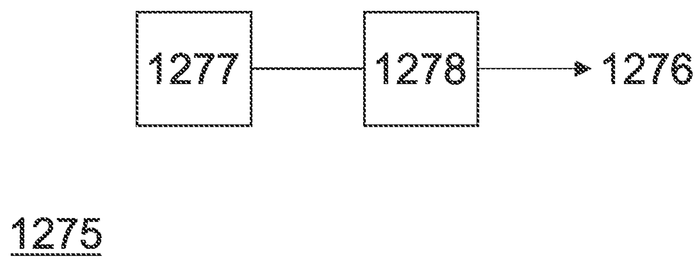
FIG. 12*q* illustrates an example of an apparatus for generating a data signal.

FIG. 12*q* illustrates another example of an apparatus 1275 for generating a data signal 1276. The apparatus 1275 comprises a processing circuit 1277 (e.g. a DTC) configured to generate the data signal 1276. The processing circuit 1277 is configured to generate the data signal 1276 to comprise at least a sequence of a first signal edge of a first type, a second signal edge of a second type, a third signal edge of the first type, and fourth signal edge of the second type.

The processing circuit 1277 generates the data signal 1276 such that the first signal edge and the second signal edge are separated by a first time period being longer than a time period of any payload data symbol of a communication protocol (e.g. the STEP protocol). Further, the second signal edge and the third signal edge are separated by a second time period corresponding to a first control symbol of the communication protocol that indicates succession of at least one further control symbol of the communication protocol. The third signal edge and the fourth signal edge are separated by a third time period corresponding to a second control symbol of the communication protocol. Again, the first type may be a rising edge and the second type be a falling edge, or the second type may be a rising edge and the first type be a falling edge.

Further, the data signal 1276 may comprise a fifth signal edge of the first type that directly succeeds the fourth signal edge. The fourth signal edge and the fifth signal edge are separated by a fourth time period corresponding to a third control symbol of the communication protocol.

The apparatus 1275 further comprises an output interface circuit 1278 configured to output the data signal 1276 to a transmission link (not illustrated).

By using a plurality of consecutive control symbols, the number of possible controls may be extended. Each control symbol may control or indicate a specific property/feature if it is encoded alone with a control symbol indicator to the data signal. Further, the combination of consecutive control symbols following a control symbol indicator in the data signal may allow to encode additional controls or indication of a specific property/feature to the data signal. For example, a certain sequence of control symbols may be assigned to a specific command.

In other words, an escape (ESC) delimiter (may be an arbitrary selected delimiter) may be follow by one or more semi legacy delimiters. The semi legacy delimiter may still be very compact and very reliable. For example, as described above, the ESC delimiter may be followed by two control symbols. Similar to what is described above in connection with FIG. 12*b*, the time periods for the different control symbols may be separated by more than one symbol separation time ΔT. For example, if both control symbols can exhibit three different time periods (e.g. arbitrary lengths 0, 3 and 6), combining the two control symbols may enable $3^2=9$ additional controls.

In some examples, the first control symbol may indicate the exact number of the succeeding control symbols. In other examples, the number of succeeding control symbols may be defined by the communication protocol (e.g. the communication protocol may define that the first control symbol is always followed by two, three, four or more further control symbols).

Alternatively, the first control symbol may be omitted if the number of succeeding control symbols is defined by the communication protocol. For example, the communication protocol may define that a control symbol indicator is always followed (succeeded) by two, three, four or more control symbols. Accordingly, the second signal edge and the third signal edge in the data signal 1276 may be separated by a second time period corresponding to the second control symbol of the communication protocol, and the third signal edge and the fourth signal edge in the data signal 1276 may be separated by a third time period corresponding to the third control symbol of the communication protocol.

Further, payload data may be encoded to the data signal 1276 by adjusting the time periods between consecutive signal edges in the data signal 1276. Accordingly, the processing circuit 1277 may be configured to generate the data signal 1276 to further comprise a sequence of a sixth signal edge of the first type, a seventh signal edge of the second type, and an eighth signal edge of the first type. The processing circuit 1277 generates the data signal 1276 such that the sixth signal edge and the seventh signal edge are separated by a fifth time period corresponding to a first payload data symbol of the communication protocol, and that the seventh signal edge and the eighth signal edge are separated by a sixth time period corresponding to a second payload data symbol of the communication protocol. As mentioned above, apart from other time encoded communication protocols, apparatus 1275 may be used for communication according to the STEP protocol. A sum of the fifth time period and the sixth time period may be lower than $10^{-7}$ s, $10^{-8}$ s, $10^{-9}$ s, $10^{-10}$ s, $10^{-11}$ s, or $10^{-12}$ s according to the STEP protocol.

Like the apparatus 1200, the apparatus 1275 may allow to generate a single-ended data signal as described above or a differential signal pair. That is, in some examples, the processing circuit 1277 may be further configured to generate a second data signal, wherein the second data signal is inverted with respect to the data signal 1276. Accordingly, the output interface circuit 1278 may be configured to further output the second data signal to the transmission link.

The apparatus 1275 or at least circuitry parts of the apparatus 1275 may additionally be configured to execute other accordingly adapted features that are described above in connection with apparatus 1200.

Figure 12R:
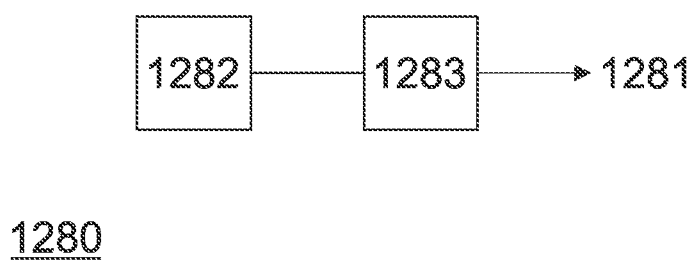
FIG. 12*r* illustrates an example of an apparatus for generating a data signal.

In some examples, the control symbols may alternatively precede the control symbol indicator. An apparatus 1280 for generating an according data signal 1281 is illustrated in FIG. 12*r*. The apparatus 1280 comprises a processing circuit 1282 (e.g. a DTC) configured to generate the data signal 1281. The processing circuit 1282 is configured to generate the data signal 1281 to comprise at least a sequence of a first signal edge of a first type, a second signal edge of a second type, a third signal edge of the first type, and a fourth signal edge of the second type. The first signal edge and the second signal edge are separated by a first time period corresponding to a first control symbol of the communication protocol (e.g. the STEP protocol). The second signal edge and the third signal edge are separated by a second time period corresponding to a second control symbol of the communication protocol that indicates at least one preceding control symbol of the communication protocol. Further, the third signal edge and the fourth signal edge are separated by a third time period being longer than a time period of any payload data symbol of a communication protocol. Again, the first type may be a rising edge and the second type be a falling edge, or the second type may be a rising edge and the first type be a falling edge.

Further, the data signal 1281 may comprise a fifth signal edge of the second type that directly precedes the first signal edge. The first signal edge and the fifth signal edge are separated by a fourth time period corresponding to a third control symbol of the communication protocol.

The apparatus 1280 further comprises an output interface circuit 1283 configured to output the data signal 1281 to a transmission link (not illustrated).

By using a plurality of consecutive control symbols, the number of possible controls may again be extended as described above for the apparatus 1275. In contrast to the apparatus 1275, the apparatus 1280 uses the control symbol indicator for indicating the end of the cascaded delimiter.

In some examples, the second control symbol may indicate the exact number of the preceding control symbols. In other examples, the number of preceding control symbols may be defined by the communication protocol (e.g. the communication protocol may define that the second control symbol is always preceded by two, three, four or more further control symbols).

Alternatively, the second control symbol may again be omitted if the number of preceding control symbols is defined by the communication protocol. For example, the communication protocol may define that a control symbol indicator is always preceded by two, three, four or more control symbols. Accordingly, the first signal edge and the second signal edge in the data signal 1281 may be separated by a first time period corresponding to the third control symbol of the communication protocol, and the second signal edge and the third signal edge in the data signal 1281 may be separated by a second time period corresponding to the first control symbol of the communication protocol.

Further, payload data may be encoded to the data signal 1281 by adjusting the time periods between consecutive signal edges in the data signal 1281. Accordingly, the processing circuit 1282 may be configured to generate the data signal 1281 to further comprise a sequence of a sixth signal edge of the first type, a seventh signal edge of the second type, and an eighth signal edge of the first type. The sixth signal edge and the seventh signal edge are separated by a fifth time period corresponding to a first payload data symbol, and the seventh signal edge and the eighth signal edge are separated by a sixth time period corresponding to a second payload data symbol. As mentioned above, apart from other time encoded communication protocols, apparatus 1280 may be used for communication according to the STEP protocol. A sum of the fifth time period and the sixth time period may be lower than $10^{-7}$ s, $10^{-8}$ s, $10^{-9}$ s, $10^{-10}$ s, $10^{-11}$ s, or $10^{-12}$ s according to the STEP protocol.

Like the apparatus 1275, the apparatus 1280 may allow to generate a single-ended data signal as described above or a differential signal pair. That is, in some examples, the processing circuit 1282 may be further configured to generate a second data signal, wherein the second data signal is inverted with respect to the data signal 1281. Accordingly, the output interface circuit 1283 may be configured to further output the second data signal to the transmission link.

The apparatus 1280 or at least circuitry parts of the apparatus 1280 may additionally be configured to execute other accordingly adapted features that are described above in connection with apparatuses 1200, 1220 and 1275.

The foregoing description of FIGS. 12*q* to 12*r* focused on the generation of data (transmit) signals comprising cascaded delimiters. In the following, corresponding aspects of the detection of the cascaded delimiters in data (receive) signals are described in connection with FIGS. 12*s* and 12*t*.

Figure 12S:
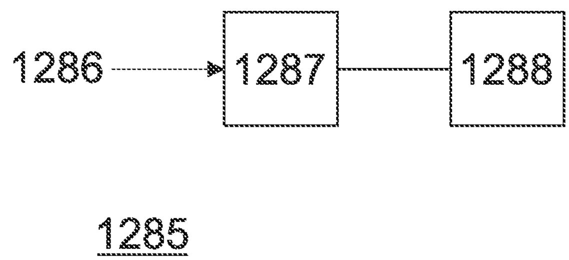
FIG. 12*s* illustrates an example of an apparatus for decoding a data signal.

FIG. 12*s* illustrates an example of an apparatus 1285 for decoding a data signal 1286. The apparatus 1285 comprises a processing circuit 1286 (e.g. a TDC) configured to determine a sequence of a first signal edge of a first type, a second signal edge of a second type, a third signal edge of the first type, and a fourth signal edge of the second type in the data signal 1286. Again, the first type may be a rising edge and the second type be a falling edge, or the second type may be a rising edge and the first type be a falling edge. For example, the data signal 1286 may be received from a transmission link by an interface circuit (not illustrated) of the apparatus 1285.

Further, the apparatus 1285 for decoding the data signal 1286 comprises a demodulation circuit 1287 configured to determine a control symbol indicator if a first time period between the first signal edge and the second signal edge is longer than the payload data threshold defined in the communication protocol. Further, the demodulation circuit 1287 is configured to determine a first control symbol of the communication protocol that indicates succession of at least one further control symbol of the communication protocol if a second time period between the second signal edge and the third signal edge corresponds to a predetermined time period defined in the communication protocol. The demodulation circuit 1287 is further configured to determine a second control symbol of the communication protocol based on a third time period between the third signal edge and the fourth signal edge.

The processing circuit 1287 may be further configured to determine a fifth signal edge of the first type that directly succeeds the fourth signal edge in the data signal 1286. Accordingly, the demodulation circuit 1288 may be further configured to determine a third control symbol of the communication protocol based on a fourth time period between the fourth signal edge and the fifth signal edge.

By comparing the time periods between consecutive signal edges in the data signal 1286 to the payload data threshold, the beginning of a cascaded delimiter may be detected relatively effortless. For example, the demodulation circuit 1288 or further circuitry of the apparatus 1285 for decoding the data signal 1286 may analyze the sequence/combination of the second control symbol and the third control symbol in the data signal 1286 for determining the type of (control) command encoded to the data signal 1286.

In some examples, the first control symbol may indicate the exact number of the succeeding control symbols. In other examples, the number of succeeding control symbols may be defined by the communication protocol (e.g. the communication protocol may define that the first control symbol is always succeeded by two, three, four or more further control symbols).

Alternatively, the first control symbol may be omitted if the number of succeeding control symbols is defined by the communication protocol. For example, the communication protocol may define that a control symbol indicator is always followed (succeeded) by two, three, four or more control symbols. Accordingly, the demodulation circuit 1288 may be configured to determine the second control symbol of the communication protocol based on a second time period between the second signal edge and the third signal edge in the data signal 1286, and to determine the third control symbol of the communication protocol based on a third time period between the third signal edge and the fourth signal edge in the data signal 1286.

Payload data is encoded to the data signal 1286 via the time periods between consecutive signal edges. Accordingly, the processing circuit 1287 may be further configured to determine a sequence of a sixth signal edge of the first type, a seventh signal edge of the second type, and an eighth signal edge of the first type in the data signal 1286. Further, the demodulation circuit 1288 may be configured to determine a first payload data symbol of the communication protocol based on a fifth time period between the sixth signal edge and the seventh signal edge if the fifth time period is shorter than the payload data threshold. Accordingly, the demodulation circuit 1288 may be configured to determine a second payload data symbol of the communication protocol based on a sixth time period between the seventh signal edge and the eighth signal edge if the sixth time period is shorter than the payload data threshold. As described above, a sum of the fifth time period and the sixth time period may be lower than $10^{-7}$ s, $10^{-8}$ s, $10^{-9}$ s, $10^{-10}$ s, $10^{-11}$ s, or $10^{-12}$ s according to the STEP protocol.

Also, the demodulation circuit 1288 may be configured to determine the payload data symbols and the control symbols based on information about the time periods corresponding to different payload data symbols of the communication protocol and information about the time periods corresponding to different control symbols of the communication protocol. The information about the different time periods may be as described above for apparatus 1240.

In some examples, the processing circuit 1287 may be further configured to receive a second data signal that is inverted with respect to the data signal 1286. Accordingly, the processing circuit 1287 may be configured to determine at least the first signal edge, the second signal edge, the third signal edge, and the fourth signal further based on the second data signal. That is, the processing circuit 1287 may determine the signal edges based on a differential pair of data signals.

The apparatus 1285 or at least circuitry parts of the apparatus 1285 may additionally be configured to execute other accordingly adapted features that are described above in connection with apparatuses 1240 and 1260.

Figure 12T:
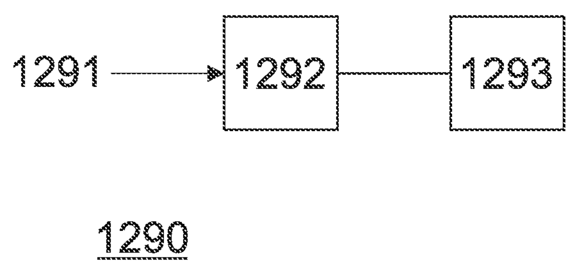
FIG. 12*t* illustrates another example of an apparatus for decoding a data signal.

As described above for the signal generation, the control symbols may alternatively precede the control symbol indicator in the data signal. An apparatus 1290 for decoding an according data signal 1291 is illustrated in FIG. 12*t*.

The apparatus 1290 comprises a processing circuit 1292 (e.g. a TDC) configured to determine a sequence of a first signal edge of a first type, a second signal edge of a second type, a third signal edge of the first type, and a fourth signal edge of the second type in the data signal 1291. Again, the first type may be a rising edge and the second type be a falling edge, or the second type may be a rising edge and the first type be a falling edge. For example, the data signal 1291 may be received from a transmission link by an interface circuit (not illustrated) of the apparatus 1290.

Further, the apparatus 1290 for decoding the data signal 1291 comprises a demodulation circuit 1293 configured to determine a first control symbol of the communication protocol (e.g. the STEP protocol) based on a first time period between the first signal edge and the second signal edge. Further, the demodulation circuit 1293 is configured to determine a second control symbol of the communication protocol that indicates at least one preceding control symbol of the communication protocol if a second time period between the second signal edge and the third signal edge corresponds to a predetermined time period defined in the communication protocol. The demodulation circuit 1293 is configured to determine a control symbol indicator if a third time period between the third signal edge and the fourth signal edge is longer than the payload data threshold defined in the communication protocol.

Further, the processing circuit 1292 may be configured to determine a fifth signal edge of the second type that directly precedes the first signal edge in the data signal 1291. Accordingly, the demodulation circuit 1293 may be further configured to determine a third control symbol of the communication protocol based on a fourth time period between the fifth signal edge and the first signal edge.

In contrast to the apparatus 1285, the apparatus 1290 compares the time periods of consecutive signal edges in the data signal 1291 to the payload data threshold in order to detect the end of a cascaded delimiter. However, the cascaded delimiter may again be detected relatively effortless. For example, the demodulation circuit 1293 or further circuitry of the apparatus 1290 for decoding the data signal 1291 may analyze the sequence/combination of the first control symbol and the third control symbol in the data signal 1291 for determining the type of (control) command encoded to the data signal 1291.

In some examples, the second control symbol may indicate the exact number of the preceding control symbols. In other examples, the number of preceding control symbols may be defined by the communication protocol (e.g. the communication protocol may define that the first control symbol is always preceded by two, three, four or more further control symbols).

Similar to what is described above for the apparatus 1285, the second control symbol may be omitted if the number of succeeding control symbols is defined by the communication protocol. For example, the communication protocol may define that a control symbol indicator is always preceded by two, three, four or more control symbols. Accordingly, the demodulation circuit 1293 may configured to determine the third control symbol of the communication protocol based on a first time period between the first signal edge and the second signal edge in the data signal 1291, and to determine the first control symbol of the communication protocol based on a second time period between the second signal edge and the third signal edge in the data signal 1291.

Also, in the data signal 1291, payload data is encoded to the signal via the time periods between consecutive signal edges. Therefore, the processing circuit 1292 may be further configured to determine a sequence of a sixth signal edge of the first type, a seventh signal edge of the second type, and an eighth signal edge of the first type in the data signal 1291. Accordingly, the demodulation circuit 1293 may be configured to determine a first payload data symbol of the communication protocol (e.g. the STEP protocol) based on fifth time period between the sixth signal edge and the seventh signal edge if the fifth time period is shorter than the payload data threshold, and to determine a second payload data symbol based on sixth time period between the seventh signal edge and the eighth signal edge if the sixth time period is shorter than the payload data threshold. As described above, a sum of the fifth time period and the sixth time period may be lower than $10^{-7}$ s, $10^{-8}$ s, $10^{-9}$ s, $10^{-10}$ s, $10^{-11}$ s, or $10^{-12}$ s according to the STEP protocol.

Also the demodulation circuit 1293 may be configured to determine the payload data symbols and the control symbols based on information about the time periods corresponding to different payload data symbols of the communication protocol and information about the time periods corresponding to different control symbols of the communication protocol. The information about the different time periods may be as described above for apparatus 1240.

In some examples, the processing circuit 1292 may be further configured to receive a second data signal that is inverted with respect to the data signal 1291. Accordingly, the processing circuit 1292 may be configured to determine at least the first signal edge, the second signal edge, the third signal edge and the fourth signal further based on the second data signal. That is, the processing circuit 1292 may determine the signal edges based on a differential pair of data signals.

The apparatus 1290 or at least circuitry parts of the apparatus 1290 may be configured to execute further accordingly adapted features that are described above in connection with apparatus 1285 (e.g. adapted to the interchange of the control symbol indicator position and the control symbol position in the data signal).

Figure 12U:
FIG. 12*u* illustrates a flowchart of an example of a method for generating a data signal.

To summarize some of the above aspects on cascaded delimiters, an example of a method 1200*u* for generating a data signal is illustrated by means of a flowchart in FIG. 12*u*. Method 1200*u* comprises generating 1202*u* the data signal. The data signal comprises a sequence of a first signal edge of a first type, a second signal edge of a second type, a third signal edge of the first type, and fourth signal edge of the second type. The first signal edge and the second signal edge are separated by a first time period being longer than a time period of any payload data symbol of a communication protocol. The second signal edge and the third signal edge are separated by a second time period corresponding to a first control symbol of the communication protocol that indicates succession of at least one further control symbol of the communication protocol. The third signal edge and the fourth signal edge are separated by a third time period corresponding to a second control symbol of the communication protocol. Further, the method 1200*u* comprises outputting 1204*u* the data signal.

Optionally, the data signal may further comprise a fifth signal edge of the second type that directly precedes the first signal edge. The first signal edge and the fifth signal edge are separated by a fourth time period corresponding to a third control symbol of the communication protocol.

More details and aspects of method 1200*u* are mentioned in connection with the proposed technique or one or more examples described above (e.g. FIG. 12*q*). The method may comprise one or more additional optional features corresponding to one or more aspects of the proposed technique or one or more examples described above.

Figure 12V:
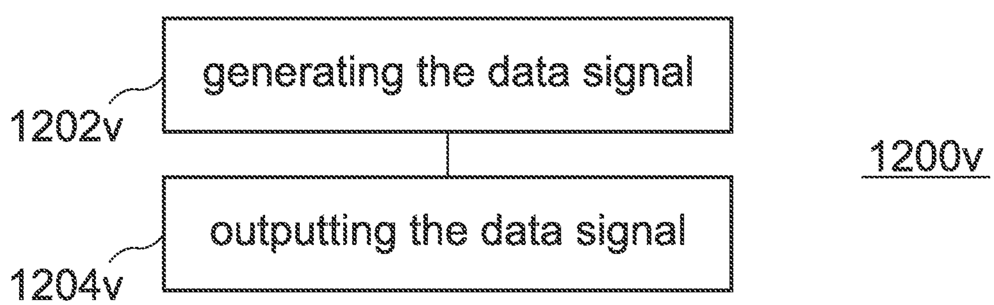
FIG. 12*v* illustrates a flowchart of another example of a method for generating a data signal.

Another example of a method 1200*v* for generating a data signal is illustrated by means of a flowchart in FIG. 12*v*. Method 1200*v* comprises generating 1202*v* the data signal. The data signal comprises a sequence of a first signal edge of a first type, a second signal edge of a second type, a third signal edge of the first type, and a fourth signal edge of the second type. The first signal edge and the second signal edge are separated by a first time period corresponding to a first control symbol of the communication protocol. The second signal edge and the third signal edge are separated by a second time period corresponding to a second control symbol of the communication protocol that indicates at least one preceding control symbol of the communication protocol. The third signal edge and the fourth signal edge are separated by a third time period being longer than a time period of any payload data symbol of a communication protocol. Further, the method 1200*v* comprises outputting 1204*v* the data signal.

Optionally, the data signal may further comprise a fifth signal edge of the second type that directly succeeds the fourth signal edge. The first signal edge and the fifth signal edge are separated by a fourth time period corresponding to a third control symbol of the communication protocol.

More details and aspects of method 1200*v* are mentioned in connection with the proposed technique or one or more examples described above (e.g. FIG. 12*r*). The method may comprise one or more additional optional features corresponding to one or more aspects of the proposed technique or one or more examples described above.

Figure 12W:
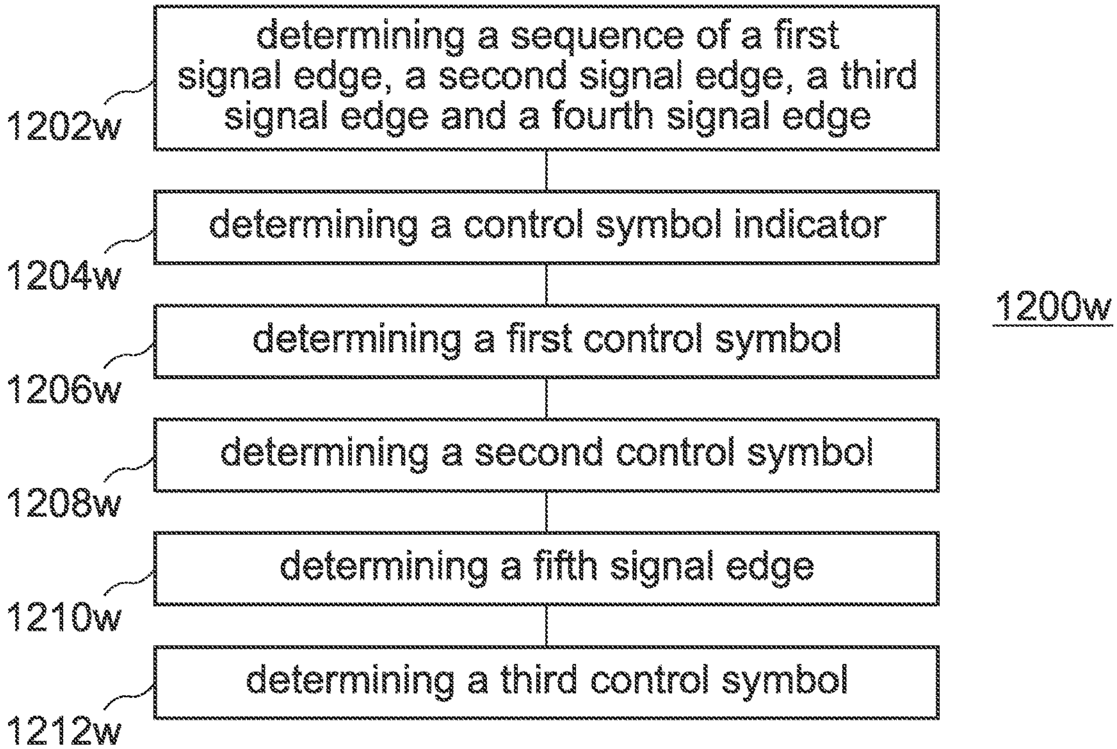
FIG. 12*w* illustrates a flowchart of an example of a method for decoding a data signal.

An example of a method 1200*w* for decoding a data signal is illustrated by means of a flowchart in FIG. 12*w*. Method 1200*w* comprises determining 1202*w* a sequence of a first signal edge of a first type, a second signal edge of a second type, a third signal edge of the first type, and a fourth signal edge of the second type in the data signal. Further, method 1200*w* comprises determining 1204*w* a control symbol indicator if a first time period between the first signal edge and the second signal edge is longer than a payload data threshold defined in a communication protocol. Method

1200*w* additionally comprises determining 1206*w* a first control symbol of the communication protocol that indicates succession of at least one further control symbol of the communication protocol if a second time period between the second signal edge and the third signal edge corresponds to a predetermined time period defined in the communication protocol. Further, method 1200*w* comprises determining 1208*w* a second control symbol of the communication protocol based on a third time period between the third signal edge and the fourth signal edge.

Optionally, method 1200*w* may further comprise determining 1210*w* a fifth signal edge of the first type that directly succeeds the fourth signal edge in the data signal, and determining 1212*w* a third control symbol of the communication protocol based on a fourth time period between the fourth signal edge and the fifth signal edge.

More details and aspects of method 1200*w* are mentioned in connection with the proposed technique or one or more examples described above (e.g. FIG. 12*s*). The method may comprise one or more additional optional features corresponding to one or more aspects of the proposed technique or one or more examples described above.

Figure 12X:
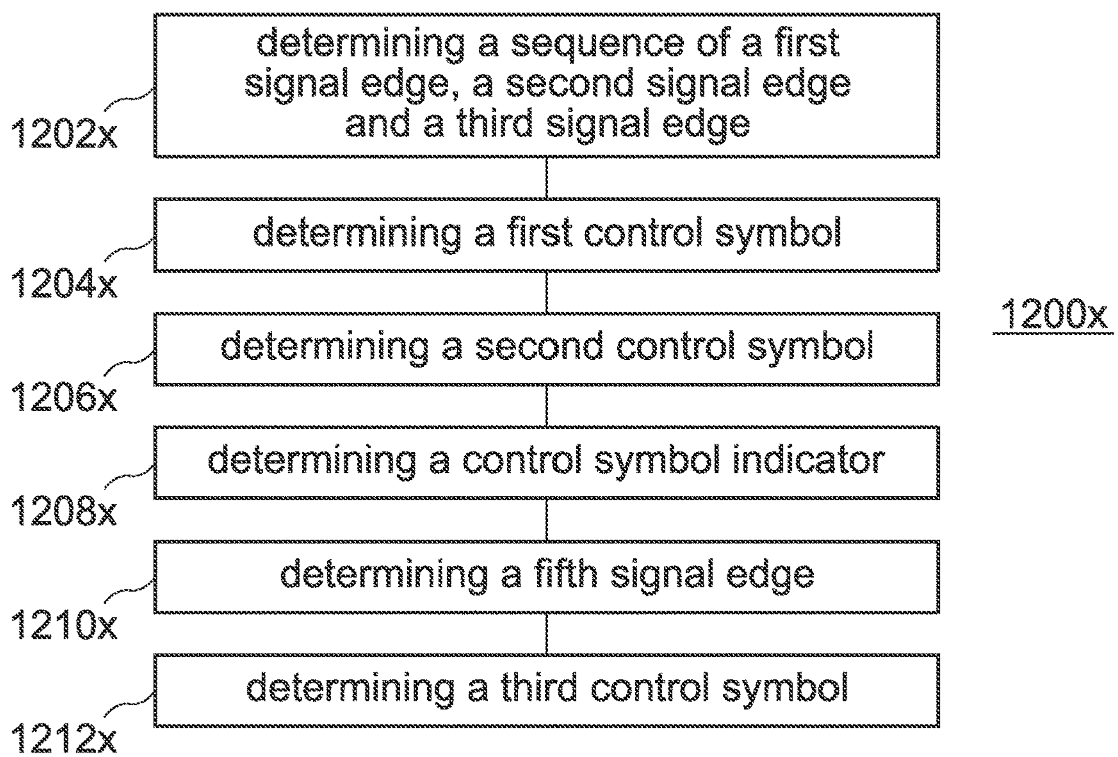
FIG. 12*x* illustrates a flowchart of another example of a method for decoding a data signal.

Another example of a method 1200*x* for decoding a data signal is illustrated by means of a flowchart in FIG. 12*x*. Method 1200*x* comprises determining 1202*x* a sequence of a first signal edge of a first type, a second signal edge of a second type, a third signal edge of the first type, and a fourth signal edge of the second type in the data signal. Further, method 1200*x* comprises determining 1204*x* a first control symbol of a communication protocol based on a first time period between the first signal edge and the second signal edge. Method 1200*x* additionally comprises determining 1206*x* a second control symbol of the communication protocol that indicates at least one preceding control symbol of the communication protocol if a second time period between the second signal edge and the third signal edge corresponds to a predetermined time period defined in the communication protocol. Further, method 1200*x* comprises determining 1208*x* a control symbol indicator if a third time period between the third signal edge and the fourth signal edge is longer than a payload data threshold defined in the communication protocol.

Optionally, method 1200*w* may further comprise determining 1210*x* a fifth signal edge of the second type that directly precedes the first signal edge in the data signal, and determining 1212*x* a third control symbol of the communication protocol based on a fourth time period between the fifth signal edge and the first signal edge.

More details and aspects of method 1200*x* are mentioned in connection with the proposed technique or one or more examples described above (e.g. FIG. 12*t*). The method may comprise one or more additional optional features corresponding to one or more aspects of the proposed technique or one or more examples described above.

Communication interfaces (e.g. according to the STEP protocol) may transport data of different types of services over the medium. For example, some services may be sensitive to latency, whereas other services may require a very low BER. The STEP protocol may, e.g., support multi gigabit per second bitrates at a default BER of $1 \cdot 10^{-12}$. While this default BER may be sufficient for some services, other services may demand an even better BER.

Further, in some cases the service may be of a rather deterministic behavior (e.g. the data is generated at a rather deterministic timing and the data size may be of known length). In other cases, it may be the other way around so that the data generation may be rather of random instantaneous bandwidth. Also, the bits to be transported may in some cases be control or status bits and, hence, be sensitive to latency and/or error rate (e.g. a low BER may be required).

In the following, an apparatus 1300 for generating a data signal 1301 is described in connection with FIG. 13*a* that may enable to carry data for different types of services efficiently.

The apparatus 1300 comprises a processing circuit 1302 (e.g. a DTC) configured to generate the data signal 1301. The processing circuit 1302 generates the data signal 1301 to comprise a sequence of a first signal edge of a first type, a second signal edge of a second type, and a third signal edge of the first type. For example, the first type may be a rising edge and the second type be a falling edge, or the second type may be a rising edge and the first type be a falling edge.

Further, the apparatus 1300 comprises an output interface circuit 1303 configured to output the data signal 1301 to a transmission link (not illustrated).

The processing circuit 1302 generates the data signal 1301 such that the first signal edge and the second signal edge are separated by a first time period being longer than a time period of any payload data symbol of the communication protocol (e.g. the STEP protocol) in order to encode a control symbol indicator to the data signal 1301. Further, the second signal edge and the third signal edge are separated by a second time period corresponding to a control symbol of the communication protocol that indicates a start of a data packet and a service type of the data packet.

The apparatus 1300 uses a unique (and highly reliable) delimiter to indicate/signal to the receiver of the data signal 1301 the type of the upcoming data packet (e.g. data packet is of type A, B or C). The receiver may, hence, be able to process the upcoming data packet accordingly. For example, information about the service type of the data packet may hint the receiver that the data packet needs to be translated to a certain format, or may hint the receiver how to parse and where to send the data packet.

The delimiter itself may be configured as described above in connection with FIGS. 12*a* and 12*b*.

The data of the data packet is encoded to the data signal 1301 via the time periods between consecutive signal edges. Accordingly, the processing circuit 1302 may be configured to generate the data signal 1301 to further comprise a sequence of a fourth signal edge of the first type, a fifth signal edge of the second type, and a sixth signal edge of the first type. The fourth signal edge and the fifth signal edge are separated by a third time period corresponding to a first payload data symbol in the data packet, and the fifth signal edge and the sixth signal edge are separated by a fourth time period corresponding to a second payload data symbol in the data packet. As mentioned above, apart from other time encoded communication protocols, apparatus 1300 may be used for communication according to the STEP protocol. A sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

The apparatus 1300 may allow to generate a single-ended data signal as described above or a differential signal pair. That is, in some examples, the processing circuit 1302 may be further configured to generate a second data signal, wherein the second data signal is inverted with respect to the data signal 1301. Accordingly, the output interface circuit 1303 may be configured to further output the second data signal to the transmission link.

In some examples more than one control symbol (e.g. a cascaded delimiter) may be used to signal the start of the data packet and the service type of the data packet. For example, the processing circuit 1302 may generate the data signal 1301 to comprise a sequence of a first signal edge of a first type, a second signal edge of a second type, a third signal edge of the first type, a seventh signal edge of the second type and an eighth signal edge of the first type. The first signal edge and the second signal edge are again separated by a first time period being longer than a time period of any payload data symbol of the communication protocol in order to encode a control symbol indicator to the data signal 1301. Further, the second signal edge and the third signal edge are separated by a second time period corresponding to a first control symbol of the communication protocol that indicates succession of a number of control symbol of the communication protocol. The third signal edge and the seventh signal edge are separated by a fifth time period corresponding to a second control symbol of the communication protocol, and the seventh signal edge and the eighth signal edge are separated by a sixth time period corresponding to a third control symbol of the communication protocol. The sequence/combination of the second control symbol and the third control symbol in the data signal 1301 indicates the start of the data packet and the service type of the data packet. As described above, the first control symbol may be omitted in some examples.

It is to be noted that also more than two consecutive control symbols may be used to indicate the start of the data packet and the service type of the data packet.

The apparatus 1300 or at least circuitry parts of the apparatus 1300 may additionally be configured to execute other features related to delimiter generation described above (see e.g. FIGS. 12*a* and 12*b*).

In some examples the control symbol(s) may alternatively precede the control symbol indicator. An apparatus 1310 for generating an according data signal 1311 is illustrated in FIG. 13*b*.

The apparatus 1310 comprises a processing circuit 1312 (e.g. a DTC) configured to generate the data signal 1311. The processing circuit 1312 generates the data signal 1311 to comprise a sequence of a first signal edge of a first type, a second signal edge of a second type, and a third signal edge of the first type. Again, the first type may be a rising edge and the second type be a falling edge, or the second type may be a rising edge and the first type be a falling edge.

Further, the apparatus 1310 comprises an output interface circuit 1313 configured to output the data signal 1311 to a transmission link (not illustrated).

The processing circuit 1312 generates the data signal 1311 such that the first signal edge and the second signal edge are separated by a first time period corresponding to a control symbol of a communication protocol (e.g. the STEP protocol). The control symbol indicates a start of a data packet and a service type of the data packet. The second signal edge and the third signal edge are separated by a second time period being longer than a time period of any payload data symbol of the communication protocol.

Again, the delimiter may allow to indicate/signal to the receiver of the data signal 1311 the type of the upcoming data packet so that the receiver is enabled to process the upcoming data packet accordingly. In contrast to the apparatus 1300, the apparatus 1310 uses the control symbol indicator for indicating the end of the cascaded delimiter.

The data of the data packet is encoded to the data signal 1311 via the time periods between consecutive signal edges. Accordingly, the processing circuit 1312 may be configured to generate the data signal 1311 to further comprise a sequence of a fourth signal edge of the first type, a fifth signal edge of the second type, and a sixth signal edge of the first type. The fourth signal edge and the fifth signal edge are separated by a third time period corresponding to a first payload data symbol in the data packet, and the fifth signal edge and the sixth signal edge being separated by a fourth time period corresponding to a second payload data symbol in the data packet. Again, apart from other time encoded communication protocols, apparatus 1310 may be used for communication according to the STEP protocol. A sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

Also the apparatus 1310 may allow to generate a single-ended data signal as described above or a differential signal pair. That is, in some examples, the processing circuit 1312 may be further configured to generate a second data signal, wherein the second data signal is inverted with respect to the data signal 1311. Accordingly, the output interface circuit 1313 may be configured to further output the second data signal to the transmission link.

In some examples more than one control symbol (e.g. a cascaded delimiter) may be used to signal the start of the data packet and the service type of the data packet. For example, the processing circuit 1312 may generate the data signal 1311 to comprise a sequence of a first signal edge of a first type, a second signal edge of a second type, a third signal edge of the first type, a seventh signal edge of the second type and an eighth signal edge of the first type. The first signal edge and the second signal edge are separated by a first time period corresponding to a first control symbol of the communication protocol. Further, the second signal edge and the third signal edge are separated by a second time period corresponding to a second control symbol of the communication protocol. The third signal edge and the seventh signal edge are separated by a fifth time period corresponding to a third control symbol of the communication protocol that indicates a number of preceding control symbol of the communication protocol. The seventh signal edge and the eighth signal edge are separated by a sixth time period that is longer than a time period of any payload data symbol of a communication protocol in order to encode a control symbol indicator to the data signal 1311. The sequence/combination of the first control symbol and the second control symbol in the data signal 1311 indicates the start of the data packet and the service type of the data packet. As described above, the third control symbol may be omitted in some examples.

It is to be noted that again more than two consecutive control symbols may be used to indicate the start of the data packet and the service type of the data packet.

The apparatus 1310 or at least circuitry parts of the apparatus 1310 may additionally be configured to execute other features related to delimiter generation described above (see e.g. FIGS. 12*a* and 12*b*).

Figure 13A:
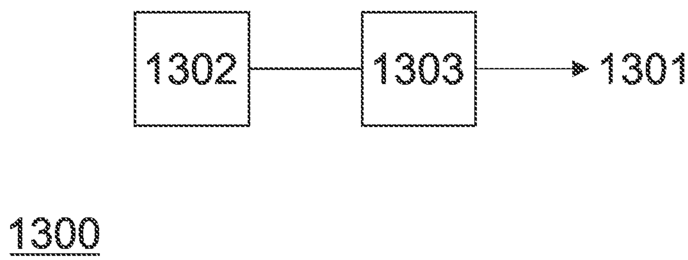
FIG. 13*a* illustrates an example of an apparatus for generating a data signal.
Figure 13B:
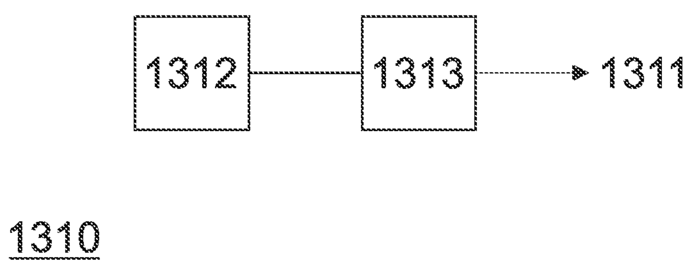
FIG. 13*b* illustrates an example of an apparatus for generating a data signal.

The foregoing description of FIGS. 13*a* to 13*b* focused on the generation of data (transmit) signals comprising delimiters that indicate the type of service. In the following, complementary aspects on the detection of these delimiters in data (receive) signals are described in connection with FIGS. 13*c* and 13*d*.

Figure 13C:
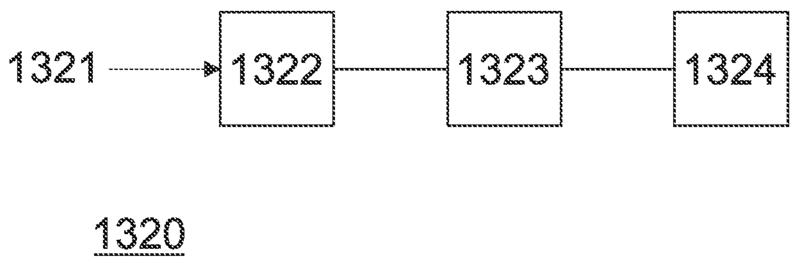
FIG. 13*c* illustrates an example of an apparatus for decoding a data signal.

FIG. 13*c* illustrates an example of an apparatus 1320 for decoding a data signal 1321. The apparatus 1320 comprises a processing circuit 1322 (e.g. a TDC) configured to determine a sequence of a first signal edge of a first type, a second signal edge of a second type, a third signal edge of the first type, and a fourth signal edge of the second type in the data signal 1321. Again, the first type may be a rising edge and the second type be a falling edge, or the second type may be a rising edge and the first type be a falling edge. For example, the data signal 1321 may be received from a transmission link by an interface circuit (not illustrated) of the apparatus 1320.

Further, the apparatus 1285 for decoding the data signal 1286 comprises a demodulation circuit 1287 configured to determine a control symbol indicator if a first time period between the first signal edge and the second signal edge is longer than a payload data threshold defined in a communication protocol (e.g. the STEP protocol). Further, the demodulation circuit 1287 is configured to determine a first control symbol of the communication protocol that indicates a start of a data packet and a service type of the data packet if a second time period between the second signal edge and the third signal edge corresponds to a predetermined time period defined in the communication protocol.

By comparing the time periods between consecutive signal edges in the data signal 1321 to the payload data threshold, the beginning of the delimiter may be detected relatively effortless. Further, the service type of the data packet indicated by the control symbol may allow the apparatus 1320 or downstream receive circuitry to process the upcoming data packet as required.

The data of the data packet is encoded to the data signal 1321 via the time periods between consecutive signal edges. Accordingly, the processing circuit 1322 may be further configured to determine a sequence of a fourth signal edge of the first type, a fifth signal edge of the second type, and a sixth signal edge of the first type in the data signal 1321. Further, the demodulation circuit 1323 may be configured to determine a first payload data symbol of the data packet based on a third time period between the fourth signal edge and the fifth signal edge if the third time period is shorter than the payload data threshold, and a second payload data symbol of the data packet based on a fourth time period between the fifth signal edge and the sixth signal edge if the fourth time period is shorter than the payload data threshold. As described above, a sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

In some examples, the apparatus 1320 further comprises a data handling circuit 1324 (e.g. circuitry for error correction or signal conditioning, a baseband processor or an application processor). The data handling circuit 1324 is configured to process the first payload data symbol and the second payload data symbol based on the service type of the data packet. Accordingly, appropriate data handling by the apparatus 1320 may be enabled.

In some examples, the processing circuit 1322 may be further configured to receive a second data signal that is inverted with respect to the data signal 1321. Accordingly, the processing circuit 1322 may be configured to determine at least the first signal edge, the second signal edge, the third signal edge and the fourth signal further based on the second data signal. That is, the processing circuit 1322 may determine the signal edges based on a differential pair of data signals.

As described above, more than one control symbol (e.g. a cascaded delimiter) may be used to signal the start of the data packet and the service type of the data packet. Accordingly, the processing circuit 1322 may, e.g., be configured to determine a sequence of a sequence of a first signal edge of a first type, a second signal edge of a second type, a third signal edge of the first type, a seventh signal edge of the second type and an eighth signal edge of the first type in the data signal 1321. Further, the demodulation circuit 1323 may be configured to determine a control symbol indicator if a first time period between the first signal edge and the second signal edge is longer than a payload data threshold defined in the communication protocol. Additionally, the demodulation circuit 1323 may be configured to determine a first control symbol of the communication protocol that indicates succession of a number of control symbol of the communication protocol if a second time period between the second signal edge and the third signal edge corresponds to a predetermined time period defined in the communication protocol. The demodulation circuit 1323 may be configured to determine a second control symbol of the communication protocol based on a fifth time period between the third signal edge and the seventh signal edge, and a third control symbol of the communication protocol based on a sixth time period between the seventh signal edge and the eighth signal edge. The sequence/combination of the second control symbol and the third control symbol in the data signal 1321 indicates the start of the data packet and the service type of the data packet. For example, the demodulation circuit 1323 or further circuitry of the apparatus 1320 for decoding the data signal 1321 may analyze the sequence/combination of the second control symbol and the third control symbol in the data signal 1321 for determining that the start of the data packet and the service type of the data packet. As described above, the first control symbol may be omitted in some examples.

As noted above more than two consecutive control symbols may be used to indicate the start of the data packet and the service type of the data packet.

As described above for other demodulation circuits, also demodulation circuit 1323 may be configured to determine the payload data symbols and the control symbols based on information about the time periods corresponding to different payload data symbols of the communication protocol and information about the time periods corresponding to different control symbols of the communication protocol.

Figure 13D:
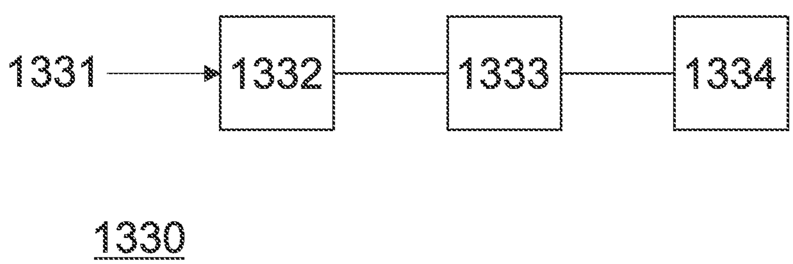
FIG. 13*d* illustrates another example of an apparatus for decoding a data signal.

In some examples the control symbol(s) may alternatively precede the control symbol indicator. An apparatus 1300 for decoding an according data signal 1331 is illustrated in FIG. 13*d*.

The apparatus 1330 comprises a processing circuit 1332 (e.g. a TDC) configured to determine a sequence of a first signal edge of a first type, a second signal edge of a second type, and a third signal edge of the first type in the data signal 1331. Again, the first type may be a rising edge and the second type be a falling edge, or the second type may be a rising edge and the first type be a falling edge. For example, the data signal 1331 may be received from a transmission link by an interface circuit (not illustrated) of the apparatus 1330.

Further, the apparatus 1330 for decoding the data signal 1331 comprises a demodulation circuit 1333 configured to determine a first control symbol of a communication protocol (e.g. the STEP protocol) that indicates a start of a data packet and a service type of the data packet if a first time period between the first signal edge and the second signal edge corresponds to a predetermined time period defined in the communication protocol. The demodulation circuit 1333 is additionally configured to determine a control symbol indicator if a second time period between the second signal edge and the third signal edge is longer than a payload data threshold defined in the communication protocol.

By comparing the time periods between consecutive signal edges in the data signal 1321 to the payload data threshold, the end of the delimiter may be detected relatively effortless. Further, the service type of the data packet indicated by the control symbol may allow the apparatus 1330 or downstream receive circuitry to process the upcoming data packet as required.

The data of the data packet is encoded to the data signal 1331 via the time periods between consecutive signal edges. Accordingly, the processing circuit 1332 may be further configured to determine a sequence of a fourth signal edge of the first type, a fifth signal edge of the second type, and a sixth signal edge of the first type in the data signal 1331. Further, the demodulation circuit 1333 may be configured to determine a first payload data symbol of the data packet based on a third time period between the fourth signal edge and the fifth signal edge if the third time period is shorter than the payload data threshold, and to determine a second payload data symbol of the data packet based on a fourth time period between the fifth signal edge and the sixth signal edge if the fourth time period is shorter than the payload data threshold. As described above, a sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

Also the apparatus 1320 may, in some examples, further comprise a data handling circuit 1334 (e.g. circuitry for error correction or signal conditioning, a baseband processor or an application processor). The data handling circuit 1334 is configured to process the first payload data symbol and the second payload data symbol based on the service type of the data packet. Accordingly, appropriate data handling by the apparatus 1330 may be enabled.

In some examples, the processing circuit 1332 may be further configured to receive a second data signal that is inverted with respect to the data signal 1331. Accordingly, the processing circuit 1332 may be configured to determine at least the first signal edge, the second signal edge, the third signal edge and the fourth signal further based on the second data signal. That is, the processing circuit 1332 may determine the signal edges based on a differential pair of data signals.

As described in connection with FIG. 13*b*, more than one control symbol (e.g. a cascaded delimiter) may be used to signal the start of the data packet and the service type of the data packet. Accordingly, the processing circuit 1332 may, e.g., be configured to determine a sequence of a first signal edge of a first type, a second signal edge of a second type, a third signal edge of the first type, a seventh signal edge of the second type and an eighth signal edge of the first type in the data signal 1331. Further, the demodulation circuit 1323 may be configured to determine a first control symbol of the communication protocol based on a first time period between the first signal edge and the second signal edge. The demodulation circuit 1323 may also be configured to determine a second control symbol of the communication protocol based on a second time period between the second signal edge and the third signal edge. Additionally, the demodulation circuit 1323 may be configured to determine a third control symbol of the communication protocol that indicates a number of preceding control symbol of the communication protocol if a fifth time period between the third signal edge and the seventh signal edge corresponds to a predetermined time period defined in the communication protocol. The demodulation circuit 1323 may be configured to determine a control symbol indicator if a sixth time period between the seventh signal edge and the eighth signal edge is longer than a payload data threshold defined in the communication protocol. The sequence/combination of the first control symbol and the second control symbol in the data signal 1331 indicates the start of the data packet and the service type of the data packet. For example, the demodulation circuit 1333 or further circuitry of the apparatus 1330 for decoding the data signal 1331 may analyze the sequence/combination of the first control symbol and the second control symbol in the data signal 1331 for determining that the start of the data packet and the service type of the data packet. As described above, the third control symbol may be omitted in some examples.

Again, also more than two consecutive control symbols may be used to indicate the start of the data packet and the service type of the data packet.

Similar to what is described above for other demodulation circuits, also demodulation circuit 1333 may be configured to determine the payload data symbols and the control symbols based on information about the time periods corresponding to different payload data symbols of the communication protocol and information about the time periods corresponding to different control symbols of the communication protocol.

In the following some exemplary methods for generating and decoding data signals are described in connection with FIGS. 13*e* to 13*h* for summarizing the above aspects on service type sensitive delimiters.

Figure 13E:
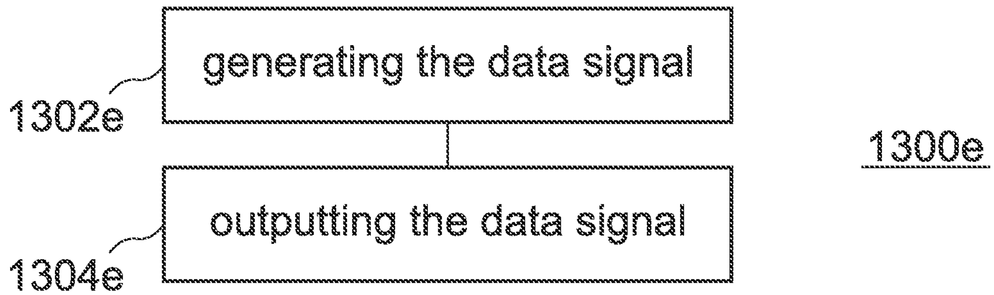
FIG. 13*e* illustrates a flowchart of an example of a method for generating a data signal.

FIG. 13*e* illustrates an example of a method 1300*e* for generating a data signal. Method 1300*e* comprises generating 1302*e* the data signal. The data signal comprises a sequence of a first signal edge of a first type, a second signal edge of a second type, and a third signal edge of the first type. The first signal edge and the second signal edge are separated by a first time period being longer than a time period of any payload data symbol of a communication protocol. The second signal edge and the third signal edge are separated by a second time period corresponding to a control symbol of the communication protocol that indicates a start of a data packet and a service type of the data packet. Further, the method 1300*e* comprises outputting 1304*e* the data signal.

More details and aspects of method 1300*e* are mentioned in connection with the proposed technique or one or more examples described above (e.g. FIG. 13*a*). The method may comprise one or more additional optional features corresponding to one or more aspects of the proposed technique or one or more examples described above.

Figure 13F:
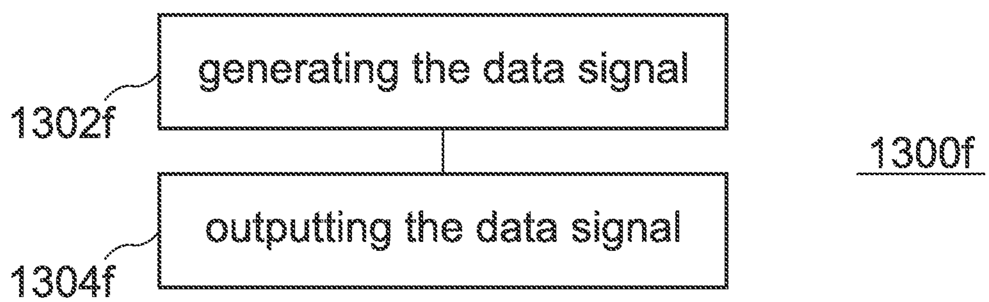
FIG. 13*f* illustrates a flowchart of another example of a method for generating a data signal.

FIG. 13*f* illustrates another example of a method 1300*f* for generating a data signal. Method 1300*f* comprises generating 1302*f* the data signal. The data signal comprises a sequence of a first signal edge of a first type, a second signal edge of a second type, and a third signal edge of the first type. The first signal edge and the second signal edge are separated by a first time period corresponding to a control symbol of a communication protocol that indicates a start of a data packet and a service type of the data packet. The second signal edge and the third signal edge are separated by a second time period being longer than a time period of any payload data symbol of the communication protocol. Further, the method 1300*f* comprises outputting 1304*f* the data signal.

More details and aspects of method 1300*f* are mentioned in connection with the proposed technique or one or more examples described above (e.g. FIG. 13*b*). The method may comprise one or more additional optional features corresponding to one or more aspects of the proposed technique or one or more examples described above.

Figure 13G:
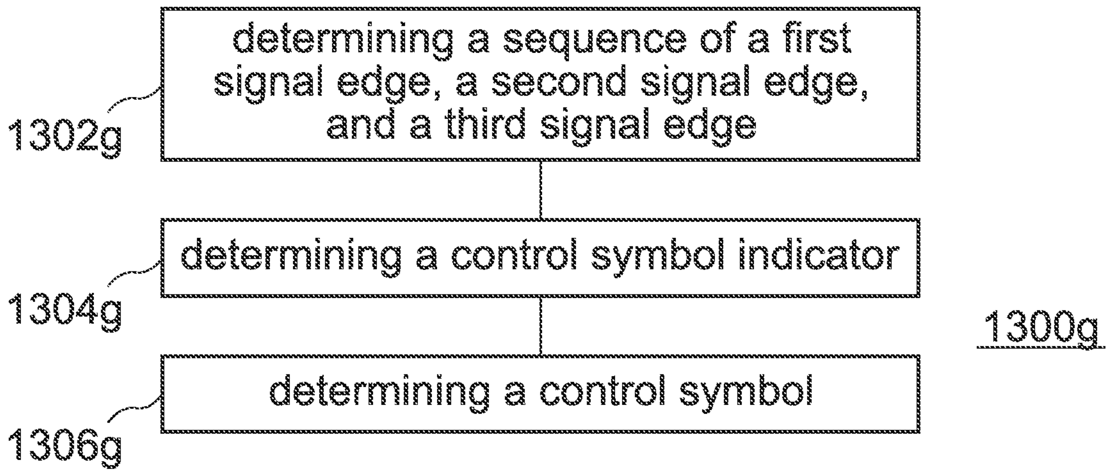
FIG. 13*g* illustrates a flowchart of an example of a method for decoding a data signal.

An example of a method 1300*g* for decoding a data signal is illustrated by means of a flowchart in FIG. 13*g*. Method 1300*g* comprises determining 1302*g* a sequence of a first signal edge of a first type, a second signal edge of a second type, and a third signal edge of the first type in the data signal. Further, method 1300*g* comprises determining 1304*g* a control symbol indicator if a first time period between the first signal edge and the second signal edge is longer than a payload data threshold defined in a communication protocol. Additionally, method 1300*g* comprises determining 1306*g* a first control symbol of the communication protocol that indicates a start of a data packet and a service type of the data packet if a second time period between the second signal edge and the third signal edge corresponds to a predetermined time period defined in the communication protocol.

More details and aspects of method 1300*g* are mentioned in connection with the proposed technique or one or more examples described above (e.g. FIG. 13*c*). The method may comprise one or more additional optional features corresponding to one or more aspects of the proposed technique or one or more examples described above.

Figure 13H:
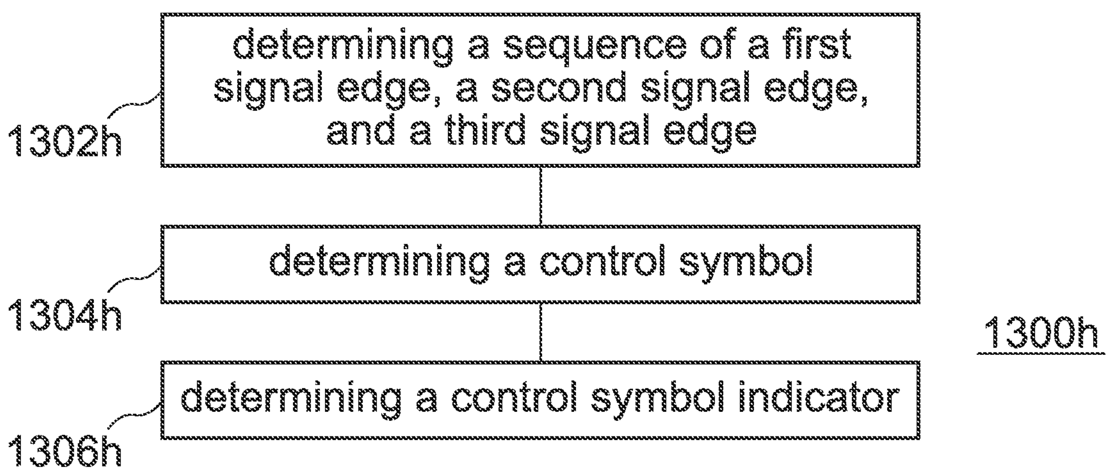
FIG. 13*h* illustrates a flowchart of another example of a method for decoding a data signal.

FIG. 13*h* illustrates another example of a method 1300*h* for decoding a data signal. Method 1300*h* comprises determining 1302*h* a sequence of a first signal edge of a first type, a second signal edge of a second type, and a third signal edge of the first type in the data signal. Further, method 1300*h* comprises determining 1304*h* a control symbol of a communication protocol that indicates a start of a data packet and a service type of the data packet if a first time period between the first signal edge and the second signal edge corresponds to a predetermined time period defined in the communication protocol. Method 1300*h* additionally comprises determining 1306*h* a control symbol indicator if a second time period between the second signal edge and the third signal edge is longer than a payload data threshold defined in the communication protocol.

More details and aspects of method 1300*h* are mentioned in connection with the proposed technique or one or more examples described above (e.g. FIG. 13*d*). The method may comprise one or more additional optional features corresponding to one or more aspects of the proposed technique or one or more examples described above.

Figure 13I:
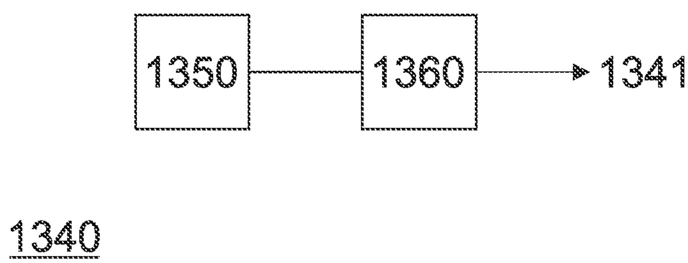
FIG. 13*i* illustrates an example of an apparatus for transmitting a first data packet of a first priority and a second data packet of a higher second priority.

Delimiters may further allow to nest a data packet into another data packet in order to prioritize that transmission of the data packet. An example of an according apparatus 1340 for transmitting a first data packet of a first priority and a second data packet of a higher second priority is illustrated in FIG. 13*i*.

Figure 13J:
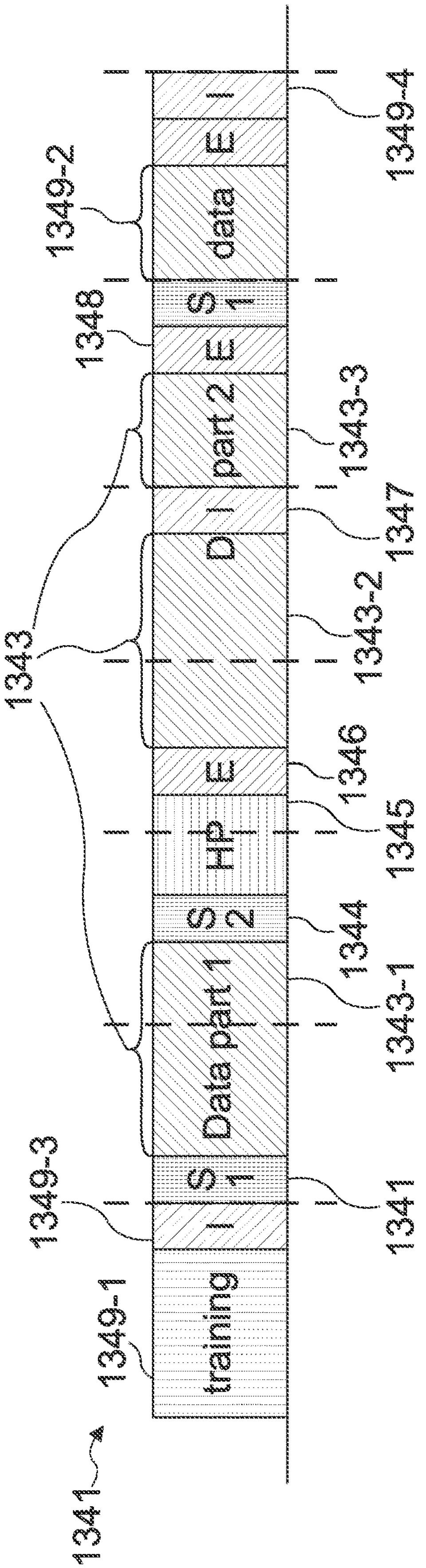
FIG. 13*j* illustrates another example of a data signal.

The apparatus 1340 comprises a processing circuit 1350 (e.g. a DTC) configured to generate a data signal 1341. The data signal 1341 is illustrated in FIG. 13*j*.

The processing circuit 1350 is configured to generate the data signal 1341 to represent a sequence of a first control symbol 1342 (plus a control symbol indicator) of a communication protocol (e.g. the STEP protocol) that indicates a start of a data packet of the first priority, a first portion of the first data packet 1343-1 that comprises at least one payload data symbol, a second control symbol 1344 (plus a control symbol indicator) of the communication protocol that indicates a start of a data packet of the second priority, the second data packet 1345, a third control symbol 1346 (plus a control symbol indicator) of the communication protocol that indicates an end of the data packet of the second priority, and a second portion of the first data packet 1343-2 that comprises at least one payload data symbol.

Further, the apparatus 1340 comprises an output interface circuit 1350 configured to output the data signal 1360 to a transmission link (not illustrated).

For example, the second data packet may be a high priority data packet that needs to be transmitted urgently.

The first data packet—as indicated in FIG. 13*j*—may, e.g., be a lengthy data packet. By nesting the second data packet into the first data packet, the high priority second data packet may be transmitted before the transmission of the first data packet is finished.

Accordingly, data packets of different priority may be multiplexed to the same data signal 1341 in a manner that allows higher prioritized data packets to be transmitted first.

For example, the first data packet may comprise data that can tolerate transmission delay, whereas the second data packet may be control data that is to be transported reliably and with as less transport delay as possible. The apparatus 1340 may enable to multiplex both data packets to the same data signal 1341 since, if the second data packet needs to be transmitted during the transmission of the first data packet, the transmission of the first data packet is paused in the middle of the transport and a sequence of an delimiter indicating the start of the second data packet, the second data packet itself, and another delimiter indicating the end of the second data packet is transmitted before the transmission of the remaining parts of the first data packet resumes.

Referring to the foregoing example, the first and the second data packets may further exhibit a different format and/or a different header. For example, if the second data packet is to be transport reliably, it may be transmitted replicated or carry error correction code. However, high(er) priority data packets may also be sent without any error recovery, error correction code, replication of the data packet or re-transmission of the data packet.

Again, the data may be time encoded to the data signal 1341 by the processing circuit 1350. That is, the data signal 1341 may comprise a sequence of a first signal edge of a first type, a second signal edge of a second type, and a third signal edge of the first type. The first signal edge and the second signal edge are separated by a first time period being longer than a time period of any payload data symbol of the communication protocol in order to encode a control symbol indicator to the data signal 1341. Further, the second signal edge and the third signal edge are separated by a second time period corresponding to the first control symbol 1342. For example, the first type may be a rising edge and the second type be a falling edge, or the second type may be a rising edge and the first type be a falling edge.

The second data packet 1345 may be encoded to the data signal 1341 by at least a sequence of a fourth signal edge of the first type, a fifth signal edge of the second type, and a sixth signal edge of the first type. The fourth signal edge and the fifth signal edge are separated by a third time period corresponding to a first payload data symbol of the second data packet 1345. The fifth signal edge and the sixth signal edge are separated by a fourth time period corresponding to a second payload data symbol of the second data packet 1345. Apart from other time encoded communication protocols, apparatus 1340 may be used for communication according to the STEP protocol. A sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

Similarly, the payload data symbols of the first portion of the first data packet 1343-1, the second portion of the first data packet 1343-2 and optionally further portions of the first data packet may be encoded to the data signal 1341 by adjusting the time period between consecutive signal edges of different types in the data signal 1341.

For representing the second control symbol 1344, the data signal 1341 may further comprise a sequence of a seventh signal edge of the first type, an eighth signal edge of the second type, and a ninth signal edge of the first type. The seventh signal edge and the eighth signal edge are separated by a fifth time period being longer than a time period of any payload data symbol of the communication protocol in order to encode another control symbol indicator to the data signal 1341. The eighth signal edge and the ninth signal edge are separated by a sixth time period corresponding to the second control symbol 1344.

The data signal 1341 may further comprises a sequence of a tenth signal edge of the first type, an eleventh signal edge of the second type, and a twelfth signal edge of the first type for representing the third control symbol 1346. The tenth signal edge and the eleventh signal edge are separated by a seventh time period being longer than a time period of any payload data symbol of the communication protocol for encoding another control symbol indicator to the data signal 1341. The eleventh signal edge and the twelfth signal edge are separated by an eighth time period corresponding to the third control symbol 1346.

As indicated in FIG. 13*j*, for indicating the end of the first data packet, the data signal 1341 may subsequently further represent a fourth control symbol 1348 (plus a control symbol indicator) of the communication protocol that indicates an end of the data packet of the first priority. For example, the data signal 1341 may further comprise a sequence of a thirteenth signal edge of the first type, a fourteenth signal edge of the second type, and a fifteenth signal edge of the first type for representing the fourth control symbol 1348. The thirteenth signal edge and the fourteenth signal edge are separated by a ninth time period being longer than a time period of any payload data symbol of the communication protocol for encoding another control symbol indicator to the data signal 1341. The fourteenth signal edge and the fifteenth signal edge are separated by a tenth time period corresponding to the fourth control symbol 1348.

Furthermore, idle delimiters may be nested in a data packet to pause the transmission of the data packet. For example, idle delimiters may be nested if not all data of the data packet is yet available for transmission (e.g. if a transmit buffer still lacks some data of the data packet). Accordingly, the yet available data of the data packet may be transmitted before the data packet is complete. Hence, the apparatus 1340 does not need to wait until all data of the data packet is available for transmission. This is further shown in FIG. 13*j* illustrating that the data signal 1341 further represents a fifth control symbol 1347 (plus a control symbol indicator) of the communication protocol that indicates an idle mode and a third portion of the first data packet 1343-3 comprising at least one payload data symbol. The fifth control symbol 1347 is arranged between the payload data symbols of the second and the third portions 1343-2 and 1343-3 of the first data packet. It is to be noted that nesting the idle delimiters into the first data packet is independent from nesting the second data packet into the first data packet.

For example, the data signal 1341 may further comprise a sequence of a sixteenth signal edge of the first type, a seventeenth signal edge of the second type, and an eighteenth signal edge of the first type for representing the fifth control symbol 1347. The sixteenth signal edge and the seventeenth signal edge are separated by an eleventh time period being longer than a time period of any payload data symbol of the communication protocol in order to encode another control symbol indicator to the data signal 1341. The seventeenth signal edge and the eighteenth signal edge are separated by a twelfth time period corresponding to the fifth control symbol 1347.

In some examples the control symbols may alternatively precede the control symbol indicator.

That is, the first signal edge and the second signal edge may alternatively be separated by a first time period corresponding to the first control symbol 1342, and the second signal edge and the third signal edge may be separated by a second time period being longer than a time period of any payload data symbol of the communication protocol for encoding the control symbol indicator to the data signal 1341.

Similarly, the seventh signal edge and the eighth signal edge may be separated by a fifth time period corresponding to the second control symbol 1344, and the eighth signal edge and the ninth signal edge may be separated by a sixth time period being longer than a time period of any payload data symbol of the communication protocol in order to encode the control symbol indicator to the data signal 1341.

Further, the tenth signal edge and the eleventh signal edge may alternatively be separated by a seventh time period corresponding to the third control symbol 1346, and the eleventh signal edge and the twelfth signal edge may be separated by an eighth time period being longer than a time period of any payload data symbol of the communication protocol for encoding the control symbol indicator to the data signal 1341.

Also the thirteenth signal edge and the fourteenth signal edge may alternatively be separated by a ninth time period corresponding to the fourth control symbol 1348, and the fourteenth signal edge and the fifteenth signal edge may be separated by a tenth time period being longer than a time period of any payload data symbol of the communication protocol in order to encode the control symbol indicator to the data signal 1341.

The sixteenth signal edge and the seventeenth signal edge may further be separated by an eleventh time period corresponding to the fifth control symbol 1347 in some examples, and the seventeenth signal edge and the eighteenth signal edge may be separated by a twelfth time period being longer than a time period of any payload data symbol of the communication protocol for encoding the control symbol indicator to the data signal 1341.

As described above in connection with FIG. 13*b*, more than one control symbol (e.g. a cascaded delimiter) may be used to signal the start of a data packet, the end of a data packet etc.

As indicated in FIG. 13*j*, the data signal 1341 may optionally represent further data such as training data 1349-1 (e.g. training data symbols), a further data packet 1349-2 (incl. control symbols indicating a start or an end of the data packet) or control symbols 1349-3, 1349-4 representing the idle mode.

The apparatus 1340 may allow to generate a single-ended data signal as described above or a differential signal pair. That is, in some examples, the processing circuit 1350 may be further configured to generate a second data signal, wherein the second data signal is inverted with respect to the data signal 1341. Accordingly, the output interface circuit 1360 may be configured to further output the second data signal to the transmission link.

Figure 13K:
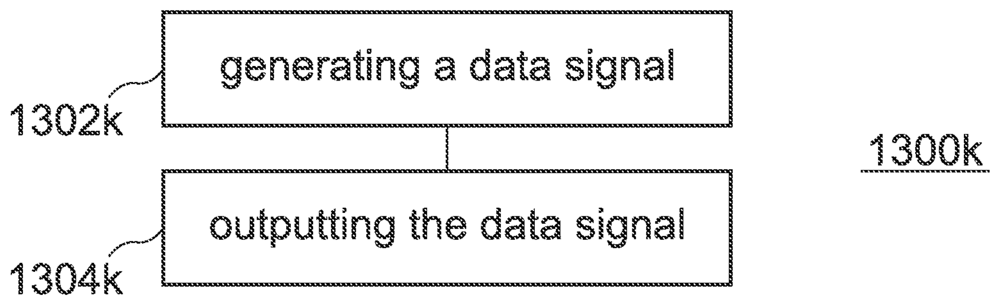
FIG. 13*k* illustrates a flowchart of an example of a method for transmitting a first data packet of a first priority and a second data packet of a higher second priority.

In order to summarize the above aspects on nesting other data into a data packet, FIG. 13*k* illustrates an example of a method 1300*k* for transmitting a first data packet of a first priority and a second data packet of a higher second priority. Method 1300*k* comprises generating 1302*k* a data signal. The data signal represents a sequence of a first control symbol of a communication protocol that indicates a start of a data packet of the first priority, a first portion of the first data packet comprising at least one payload data symbol, a second control symbol of the communication protocol that indicates a start of a data packet of the second priority, the second data packet, a third control symbol of the communication protocol that indicates an end of the data packet of the second priority, and a second portion of the first data packet comprising at least one payload data symbol. Further, method 1300*k* comprises outputting 1304*k* the data signal.

Optionally, the data signal may further represent a fourth control symbol of the communication protocol that indicates an end of the data packet of the first priority.

In some examples, the data signal may further represent a fifth control symbol of the communication protocol that indicates an idle mode and a third portion of the first data packet comprising at least one payload data symbol. The fifth control symbol is arranged between the payload data symbols of the second and the third portions of the first data packet.

More details and aspects of method 1300*k* are mentioned in connection with the proposed technique or one or more examples described above (e.g. FIGS. 13*i* and 13*j*). The method may comprise one or more additional optional features corresponding to one or more aspects of the proposed technique or one or more examples described above.

For transmissions that require a high reliability, an interleaving scheme as described above in connection with FIGS. 10*a* to 10*f* may be used. Using an interleaving scheme conventionally introduces latency since the transmission of the data cannot be started before the matrix is full and the computation is completed. Further, the data for transmission cannot be handed to the application layer unless the full matrix is received and the error correction is applied. However, by allocating one or more (e.g. a few) delimiters for high reliability and/or high priority data packets, the transmission of the matrix may be paused in between and the high reliability and/or high priority data packet may be squeezed in without waiting for whole matrix to complete. For example, a dedicated (high priority) delimiter may be transmitted in the middle of the matrix transport and then the high reliability and/or high priority data packet may be transmitted. Further, a delimiter indicating the end of the data packet may be transmitted and the transmission of the matrix may be resumed.

Figure 14A:
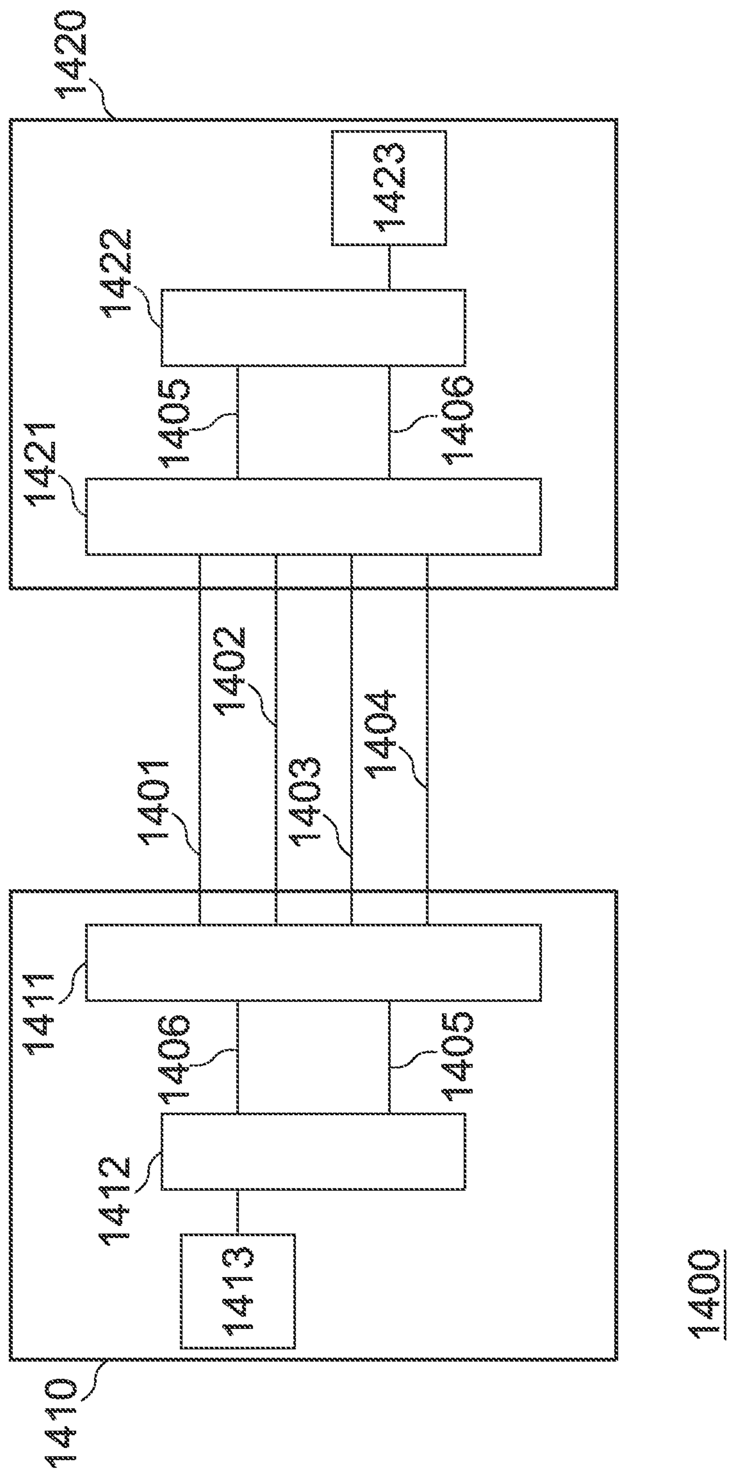
FIG. 14*a* illustrates an example of a communication system.

In some applications, a communication interface doesn't need to be concurrently symmetric. For example, during a first period of time there may be mainly data traffic in a first direction between two communication partners, while during a second period of time there may be mainly data traffic in a second direction that is opposite to the first direction. In order to meet bandwidth (throughput) targets, conventional solutions provide one or more traces for only data traffic in each direction, respectively. FIG. 14*a* illustrates a communication system 1400 that may allow a more efficient data exchange between a first communication apparatus 1410 and a second communication apparatus 1420.

The first communication apparatus 1410 comprises an interface circuit 1411 configured to couple to at least a first transmission link 1401 for communicating with the second communication apparatus 1420. The interface circuit 1411 is configured to output a first transmit data signal 1405 to the second communication apparatus 1420 via the first transmission link 1401.

As indicated in FIG. 14*a*, the first communication apparatus 1410 may optionally communicate with the second communication apparatus 1420 via further transmission links. For example, the interface circuit 1411 may be configured to couple to a second transmission link 1402, a third transmission link 1403 and/or a fourth transmission link 1404 for communicating with the second communication apparatus 1420.

The first communication apparatus 1410 further comprises a processing circuit 1412 configured to generate the first transmit data signal 1405. For example, the processing circuit 1412 may comprises a DTC for generating the first transmit data signal 1405. The first transmit data signal 1405 comprises a sequence of a first signal edge of a first type, a second signal edge of a second type, and a third signal edge of the first type. For example, the first type may be a rising edge and the second type be falling edge, or the first type may be a falling edge and the second type be a rising edge. The first signal edge and the second signal edge are separated by a first time period being longer than a time period of any payload data symbol of a communication protocol in order to encode a control symbol indicator to the first transmit data signal 1405. The second signal edge and the third signal edge are separated by a second time period corresponding to a first control symbol of the communication protocol that indicates an inversion of the direction of data flow on the transmission link.

The second communication apparatus 1420 comprises an interface circuit 1421 configured to couple to at least the first transmission link 1401 for communicating with the first communication apparatus 1410. The interface circuit 1421 is further configured to receive the first transmit data signal 1405 from the first communication apparatus 1410 via the first transmission link 1401. The first transmit data signal 1405 output by the first communication apparatus 1410 may be understood as a first receive data signal for the second communication apparatus 1420.

Further, the second communication apparatus 1420 comprises a processing circuit 1422 configured to determine the sequence of the first signal edge, the second signal edge, and the third signal edge in the first transmit data signal 1405. For example, the processing circuit 1422 may comprise a TDC for determining signal edges in the received first transmit data signal 1405.

The second communication apparatus 1420 additionally comprises a demodulation circuit 1423 configured to determine a control symbol indicator if the first time period between the first signal edge and the second signal edge in the first transmit data signal 1405 is longer than the payload data threshold defined in the communication protocol (e.g. the STEP protocol). The demodulation circuit 1423 is further configured to determine the first control symbol of the communication protocol if the second time period between the second signal edge and the third signal edge in the first transmit data signal 1405 corresponds to a predetermined time period defined in the communication protocol. In other words, the demodulation circuit 1423 translates the time encoded signal edges in the first transmit data signal 1405 back to data.

The first control symbol may allow to exchange data between the first communication apparatus 1410 and the second communication apparatus 1420 in different directions via the first transmission link 1401. For example, the interface circuit 1421 may be further configured to output a first transmit data signal 1406 of the second communication apparatus 1420 to the first communication apparatus 1410 via the first transmission link 1401 in response to receiving the first control symbol. Accordingly, the interface circuit 1411 may be configured to receive the first transmit data signal 1406 from the second communication apparatus 1420 via the first transmission link 1401 after outputting the first control symbol. The first transmit data signal 1406 output by the second communication apparatus 1420 may be understood as a first receive data signal for the first communication apparatus 1410.

The inversion of the direction of data flow on the first transmission link 1401 is signaled by the first communication apparatus 1410 via a unique delimiter to the second communication apparatus 1420. As described above, delimiters are highly reliable symbols of relatively short duration (e.g. much less than five nanoseconds). Accordingly, the direction of data flow on the first transmission link 1401 may be inverted within a relatively short time (e.g. less than one microsecond, μs).

Further, a number of transmission links between the first communication apparatus 1410 and the second communication apparatus 1420 may be reduced compared to conventional approaches. For example, the interface circuit 1411 may be further configured to output a second transmit data signal to the second communication apparatus 1420 via the second transmission link 1402 irrespective of the direction of data flow on the first transmission link 1401. Again, the second transmit data signal of the first communication apparatus 1410 may be understood as a second receive data signal for the second communication apparatus 1420. In other words, the interface circuit 1421 may be further configured to receive a second receive data signal from the first communication apparatus 1410 via the second transmission link 1402 irrespective of the direction of data flow on the first transmission link 1401. Similarly, the interface circuit 1421 may be further configured to output a second transmit data signal to the first communication apparatus 1410 via the third transmission link 1403 irrespective of the direction of data flow on the first transmission link 1401. The second transmit data signal of the second communication apparatus 1420 may be understood as a second receive data signal for the first communication apparatus 1410. In other words, the interface circuit 1411 may be further configured to receive a second receive data signal from the second communication apparatus 1420 via the third transmission link 1403 irrespective of the direction of data flow on the first transmission link 1401.

The three transmission links may be enough to support two different data exchange modes between the first communication apparatus 1410 and the second communication apparatus 1420. For example, in a first mode of operation, data transmission from the first communication apparatus 1410 to the second communication apparatus 1420 at a bandwidth of Gbit/sec may be required and data transmission from the second communication apparatus 1420 to the first communication apparatus 1410 may be required at a bandwidth (far) below 20 Gbit/sec. On the other hand, in a second mode of operation, data transmission from the second communication apparatus 1420 to the first communication apparatus 1410 may be required at a bandwidth at a bandwidth of Gbit/sec is required and data transmission from the first communication apparatus 1410 to the second communication apparatus 1420 may be required at a bandwidth (far) below 20 Gbit/sec.

Assuming that each of the first to third transmission links 1401 to 1403 may carry data at a bandwidth of 20 Gbit/sec, the second transmission link 1402 may be used for carrying data from the first communication apparatus 1410 to the second communication apparatus 1420 in both modes of operation, and the third transmission link 1403 may be used for carrying data from the second communication apparatus 1420 to the first communication apparatus 1410 in both modes of operation. Further, the direction of data flow on the first transmission link 1401 may be selected based on the current mode of operation. For example, the direction of data flow on the first transmission link 1401 may be from the first communication apparatus 1410 to the second communication apparatus 1420 so that the first and the second transmission links 1401 and 1402 provide a sufficient bandwidth for carrying data from the first communication apparatus 1410 to the second communication apparatus 1420 in the first mode of operation. On the contrary, the direction of data flow on the first transmission link 1401 may be flipped so that the first and the third transmission links 1401 and 1403 provide a sufficient bandwidth for carrying data from the second communication apparatus 1420 to the first communication apparatus 1410 during the second mode of operation.

Since a bandwidth of more than 20 Gbit/sec is not required simultaneously for both directions of data flow, the needs of the data exchange between the first communication apparatus 1410 and the second communication apparatus 1420 may be addressed with only three transmission links. Compared to conventional solutions which use two transmission lines (transmission lines) per direction, one line (lane) may be saved. In other words, one transmission link for each direction of data flow and third transmission link that may flip direction may be enough to address the needs.

An application exhibiting the above data exchange schematic may, e.g., be a wireless communication transceiver. When there is transmission of data over the air, most of the data transmitted between a baseband circuit (e.g. on a first semiconductor chip/die) and a radio frequency circuit (e.g. on a second semiconductor chip/die) is output from the baseband circuit to the radio frequency circuit, whereas the required bandwidth from the radio frequency circuit to baseband circuit is much lower. On the other hand, when a signal is received from the air, most of the bandwidth for data exchange between the baseband circuit and the radio frequency circuit is required for the data transport from the radio frequency circuit to baseband circuit, whereas the required bandwidth from the baseband circuit to the radio frequency circuit is much lower. Accordingly, using the communication system 1400 for data exchange between the baseband circuit and the radio frequency circuit may allow to reduce the number of transmission links between the two circuits since at least one of the transmission links can flip its direction of data flow. As described above, communication system 1400 may further allow the other transmission links (here transmission links 1402 and 1403 that are not changed) to maintain its operation without any interruption. Further, the transmission link that flipped may be merged with one or more other lines exhibiting the same direction of data flow (after its direction flip).

For example, the first communication apparatus 1410 may be configured to transmit the first control symbol to the second communication apparatus 1420 based on a received control signal. For example, (circuitry of) a higher layer of the communication interface may generate (provide) the control signal for the first communication apparatus 1410.

The first transmit data signal 1406 of the second communication apparatus 1420 may, e.g., be generated by the processing circuit 1422. For example, the processing circuit 1422 may further comprises a DTC for generating the first transmit data signal 1406 of the second communication apparatus 1420. In order to acknowledge the reception of the first control symbol, the processing circuit 1422 may be further configured to generate the first transmit data signal 1406 to comprise a sequence of a fourth signal edge of the first type, a fifth signal edge of the second type, and a sixth signal edge of the first type. The fourth signal edge and the fifth signal edge are separated by a third time period being longer than a time period of any payload data symbol of the communication protocol for encoding a control symbol indicator to the first transmit data signal 1406. The fifth signal edge and the sixth signal edge are separated by a fourth time period corresponding to a second control symbol of the communication protocol that indicates an acknowledgement of the direction of data flow on the transmission link by the communication apparatus.

For the first communication apparatus 1410, the processing circuit may be further configured to determine the sequence of the fourth signal edge, the fifth signal edge, and the sixth signal edge in the first transmit data signal 1406 (that may be understood as a first data receive signal for the first communication apparatus 1410). The first communication apparatus 1410 may further comprise a demodulation circuit 1413 configured to determine a control symbol indicator if the third time period between the fourth signal edge and the fifth signal edge is longer than the payload data threshold. Further, the demodulation circuit 1413 may be configured to determine the second control symbol of the communication protocol indicating the acknowledgement of the direction of data flow on the transmission link by the second communication apparatus 1420 if the fourth time period between the fifth signal edge and the sixth signal edge corresponds to a predetermined time period defined in the communication protocol.

In some examples, the interface circuit 1411 of the first communication apparatus 1410 as well as the interface circuit 1421 of the second communication apparatus 1420 may comprise a respective transmit circuit (not illustrated) configured to couple to the first transmission link 1401 and output the first transmit data signal 1405/1406 to the other communication apparatus via the first transmission link 1401. Similarly, the interface circuit 1411 of the first communication apparatus 1410 as well as the interface circuit 1421 of the second communication apparatus 1420 may comprise a receive circuit (not illustrated) configured to couple to the first transmission link and receive the first receive data signal 1406/1405 from the other communication apparatus via the first transmission link 1401.

In other words, the first communication apparatus 1410 may first send a flip delimiter and after that change from a transmission to a receive mode, whereas the second communication apparatus 1420 may recognize after accepting the flip delimiter that no more data is coming via the first transmission link 1401 post the delimiter. The second communication apparatus 1420 may subsequently activate its transmit circuitry and send the flip acknowledgement delimiter to the first communication apparatus 1410.

Figure 14B:
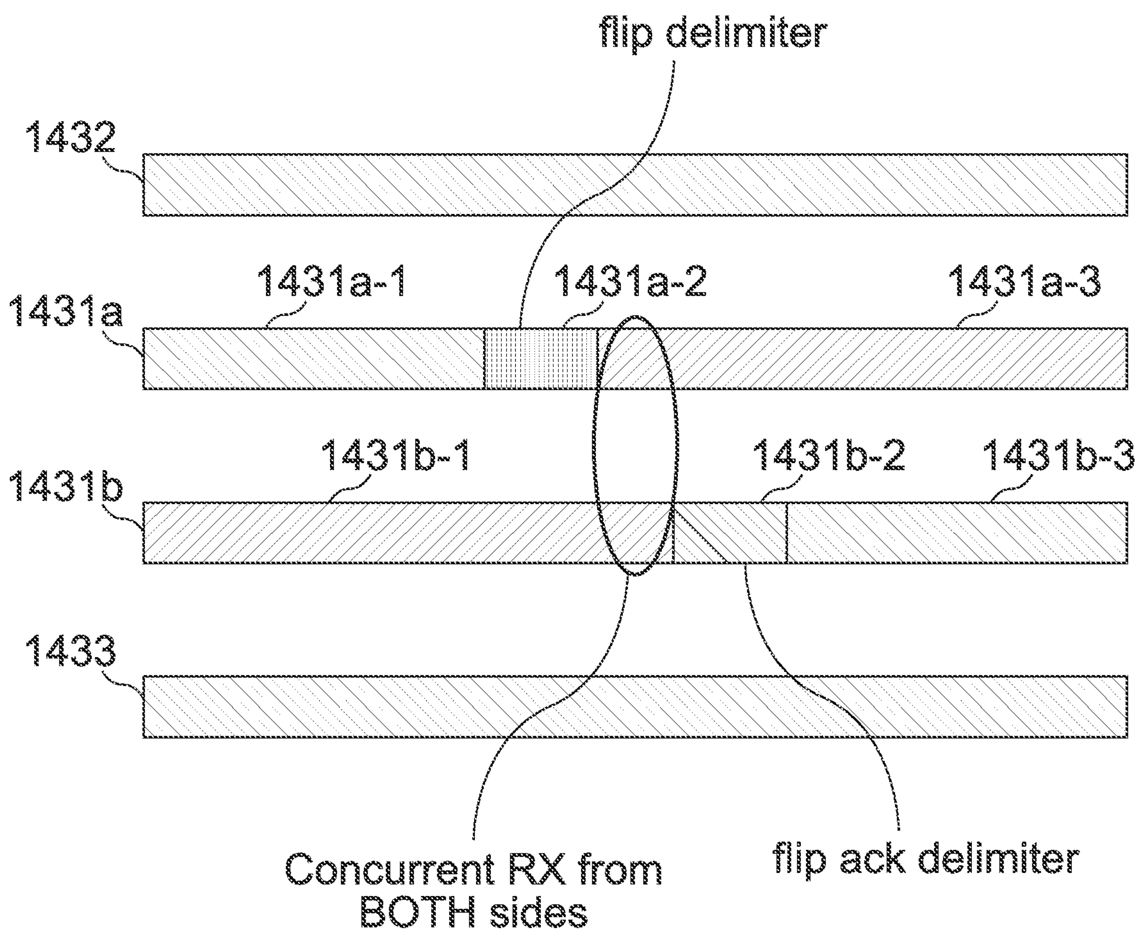
FIG. 14*b* illustrates an example of data flows between two communication apparatuses.

This is exemplarily illustrated in FIG. 14*b*. Line 1431*a* represents the activity of the first communication apparatus 1410 with respect to the first transmission link 1401. During a first time period 1431*a*-1, the first communication apparatus 1410 outputs data to the second communication apparatus 1420 via the first transmission link 1401. Then, the first communication apparatus 1410 outputs the flip delimiter during a second time period 1431*a*-2. After outputting the flip delimiter, the first communication apparatus 1410 is in a receive mode for a time period 1431*a*-3.

Line 1431*b* represents the activity of the second communication apparatus 1420 with respect to the first transmission link 1401. The second communication apparatus 1420 is in a receive mode during an initial time period 1431*b*-1 until it receives the flip delimiter from the first communication apparatus 1410. After receiving the flip delimiter, the second communication apparatus 1420 outputs the flip acknowledgement delimiter during a second time period 1431_b_-2. After outputting the flip acknowledgement delimiter, the second communication apparatus 1420 outputs data to the first communication apparatus 1410 via the first transmission link 1401 during a third time period 1431_b_-3.

Line 1432 represents the activity of the first communication apparatus 1410 with respect to the second transmission link 1402. As can be seen from FIG. 14_b_, the first communication apparatus 1410 transmits data to the second communication apparatus 1420 via the second transmission link 1402 irrespective of the direction of data flow on the first transmission link 1401. Similarly, line 1433 represents the activity of the second communication apparatus 1420 with respect to the third transmission link 1403. The second communication apparatus 1420 transmits data to the first communication apparatus 1410 via the third transmission link 1403 irrespective of the direction of data flow on the first transmission link 1401.

As can be seen from FIG. 14_b_, the first communication apparatus 1410 and the second communication apparatus 1420 are concurrently in a receive mode while the direction of data flow on the first transmission link 1401 is flipped. At least one of the first communication apparatus 1410 and the second communication apparatus 1420 may be configured to avoid a floating state on the first transmission link 1401 during that period time. For example, the interface circuit 1411 may be configured to drive the first transmission link 1401 into a non-floating state after outputting the third signal edge of the transmit data signal 1405 and prior to receiving the first transmit data signal 1406 (which may be understood as a first receive data signal for the first communication apparatus 1410).

Similarly, after generating the sixth signal edge and prior to generating a signal edge indicating a start of payload data, the processing circuit 1422 may be further configured to generate the first transmit data signal 1406 such that the first transmission link 1401 is in a non-floating state.

For example, the processing circuit 1422 may encode one or more delimiters indicating an idle mode to the first transmit data signal 1406 of the second communication apparatus 1420. As described above, the delimiters indicating the idle mode may allow to pull up the first transmission link 1401 (e.g. keep it hot so that there is continuously at least very low rate traffic on the link). Accordingly, the processing circuit 1422 may rapidly change from the idle mode to the fully operational (full throughput) mode. In other words, the processing circuit 1422 may be configured to generate the first transmit data signal 1406 to comprise at least one sequence of a seventh signal edge of the second type and an eighth signal edge of the first type that directly succeeds the sixth signal edge. A fifth time period between the seventh signal edge and its directly preceding signal edge of the first type is longer than the time period of any payload data symbol of the communication protocol in order to encode a control symbol indicator to the first transmit data signal 1406 of the second communication apparatus 1420. A sixth time period between the seventh signal edge and the eighth signal edge corresponds to a third control symbol of the communication protocol that indicates the idle mode.

At the next proper point, the second communication apparatus 1420 may start transmitting data to the first communication apparatus 1410 via the first transmission link. That is, the processing circuit 1422 may be configured to generate the first transmit data signal 1406 to further comprises a sequence of a ninth signal edge of the first type, a tenth signal edge of the second type, and an eleventh signal edge of the first type. The ninth signal edge succeeds the last one of the at least one sequence of the seventh signal edge and the eighth signal edge. The ninth signal edge and the tenth signal edge are separated by a seventh time period corresponding to a first payload data symbol, and the tenth signal edge and the eleventh signal edge are separated by an eighth time period corresponding to a second payload data symbol. A sum of the seventh time period and the eighth time period may be lower than $10^{-7}$ s, $10^{-8}$ s, $10^{-9}$ s, $10^{-10}$ s, $10^{-11}$ s, or $10^{-12}$ s according to the STEP protocol.

Accordingly, the processing circuit may be further configured to determine the sequence of the ninth signal edge, the tenth signal edge, and the eleventh signal edge in the first transmit data signal 1406 of the second communication apparatus 1420 (which may be understood as first receive data signal for the first communication apparatus 1410). Further, the demodulation circuit may be further configured to determine the first and the second payload data symbol based on the respective time periods between the signal edges.

The first communication apparatus 1410 and the second communication apparatus 1420 may further be able to flip the direction of data flow on more than one transmission link coupling both communication apparatuses. As indicated in FIG. 14_a_, the interface circuits 1411 an 1421 of both communication apparatuses 1410 and 1420 may be configured to couple to a fourth transmission link 1404 for communicating with the other communication apparatus, respectively.

That is, the interface circuit 1421 of the second communication apparatus 1420 may be further configured to receive a third receive data signal from the first communication apparatus 1410 via the fourth transmission link 1403. The third receive data signal may be understood as a third transmit data signal of the first communication apparatus 1410. Similarly to what is described above, the processing circuit 1422 may be further configured to determine a sequence of a twelfth signal edge of a first type, a thirteenth signal edge of a second type, and fourteenth signal edge of the first type in the third receive data signal. Further, the demodulation circuit 1423 may be further configured to determine the control symbol indicator if a ninth time period between the twelfth signal edge and the thirteenth signal edge is longer than a payload data threshold, and to determine the first control symbol if a tenth time period between the thirteenth signal edge and the fourteenth signal edge corresponds to the predetermined time period. In response to receiving the first control symbol via the fourth transmission link 1404, the interface circuit 1422 may be configured to output a third transmit data signal to the first communication apparatus 1410 via the fourth transmission link 1410. Hence, the direction of data flow may be additionally flipped on the fourth transmission link 1404.

Accordingly, the interface circuit 1411 of the first communication apparatus 1410 may be further configured to output the third receive data signal for the second communication apparatus 1420 (which may be understood as a third transmit data signal of the first communication apparatus 1410) via the fourth transmission link 1404. The processing circuit 1412 may be further configured to generate the third receive data signal to comprises the sequence of signal edges separated by a time period being longer than the time period of any payload data symbol of the communication protocol, and a time period corresponding to the first control symbol of the communication protocol.

As said above, the second communication apparatus 1420 may receive payload data via the first transmission link 1401 prior to receiving the flip delimiter. For example, the processing circuit 1422 may be configured to determine a sequence of a fifteenth signal edge of the first type, a sixteenth signal edge of the second type, and a seventeenth signal edge of the first type in the first data transmit signal 1405 (which may be understood as first data receive signal for the second communication apparatus 1420). The seventeenth signal edge precedes the first signal edge as the payload data timely precedes the flip delimiter. The demodulation circuit is further configured to determine a third payload data symbol based on an eleventh time period between the fifteenth signal edge and the sixteenth signal edge, and to determine a fourth payload data symbol based on a twelfth time period between the sixteenth signal edge and the seventeenth signal edge.

Accordingly, the processing circuit 1412 of the first communication apparatus 1410 may be further configured to generate the first data transmit signal 1405 to comprises the above signal edges for encoding the third and the fourth payload data symbols to the first data transmit signal 1405. In other words, the processing circuit 1412 of the first communication apparatus 1410 may be configured to adjust the time periods between the above signal edges based on the third and the fourth payload data symbols. A sum of the two time periods representing the third and the fourth payload data symbols may be lower than $10^{-7}$ s, $10^{-8}$ s, $10^{-9}$ s, $10^{-10}$ s, $10^{-11}$ s, or $10^{-12}$ s according to the STEP protocol.

In some examples, one or more of the transmission links between the first communication apparatus 1410 and the second communication apparatus 1420 may be differential transmission links. For example, at least the first transmission link 1401 may be a differential transmission link. Accordingly, the first communication apparatus 1410 as well as the second communication apparatus 1420 may be configured to generate and output differential pairs of data transmit signals in accordance with the above disclosure. Further, the first communication apparatus 1410 as well as the second communication apparatus 1420 may be configured to receive and decode differential pairs of data transmit signals in accordance with the above disclosure.

As described above for other demodulation circuits, also demodulation circuits 1413 and 1423 may be configured to determine the payload data symbols and the control symbols based on information about the time periods corresponding to different payload data symbols of the communication protocol and information about the time periods corresponding to different control symbols of the communication protocol.

It is to be noted that the communication apparatuses 1410 and 1420 may not only initially transmit or receive data via a transmission link that can be flipped as described above. The communication apparatuses 1410 and 1420 may receive data on one transmission link enabling flipping and transmit data on another transmission link enabling flipping concurrently.

In some examples more than one control symbol (e.g. a cascaded delimiter) may be used to indicate an inversion of the direction of data flow on a transmission link to the other communication apparatus in accordance with the above described techniques.

Figure 14C:
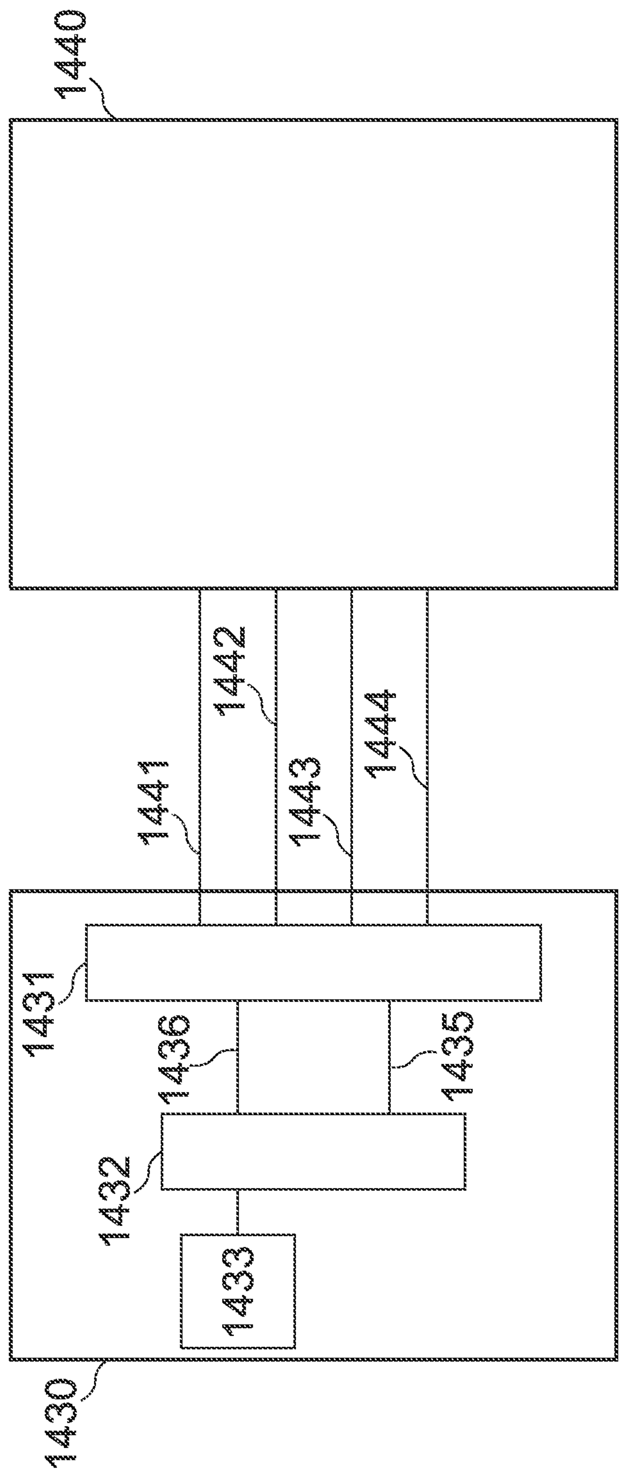
FIG. 14*c* illustrates an example of a communication system.

In some examples the control symbol(s) may alternatively precede the control symbol indicator. An according communication apparatus 1430 that initially transmits data to another communication apparatus 1440 is illustrated in FIG. 14*c*. The communication apparatus 1430 is substantially identical to the communication apparatus 1410 illustrated in FIG. 14*a* except for the swapped positions of the control symbol indicators and the control symbols in the signals exchanged between the communication apparatuses.

The communication apparatus 1430 comprises an interface circuit 1431 configured to couple to at least a first transmission link 1441 for communicating with the other communication apparatus 1440. The interface circuit 1431 is further configured to output a first transmit data signal 1435 to the other communication apparatus 1440 via the first transmission link 1441.

Further, the communication apparatus 1430 comprises a processing circuit 1432 configured to generate the first transmit data signal 1435. The first transmit data signal 1435 comprises a sequence of a first signal edge of a first type, a second signal edge of a second type, and a third signal edge of the first type. The first signal edge and the second signal edge are separated by a first time period corresponding to a first control symbol of the communication protocol (e.g. the STEP protocol) that indicates an inversion of the direction of data flow on the transmission link. The second signal edge and the third signal edge are separated by a second time period being longer than a time period of any payload data symbol of the communication protocol.

In contrast to the apparatus 1410, the apparatus 1430 uses the control symbol indicator for indicating the end of the flip delimiter. Again, the direction of data flow on the first transmission link may be effectively controlled by the communication apparatus 1430.

Similar to the communication apparatus 1410, the interface circuit 1431 may be configured to receive a first receive data signal 1436 from the other communication apparatus 1440 via the first transmission link 1401 after outputting the first control symbol due to the inversion of the direction of data flow on the first transmission link 1441.

Accordingly, the processing circuit 1432 may be further configured to determine a sequence of a fourth signal edge of the first type, a fifth signal edge of the second type, and a sixth signal edge of the first type in the first receive data signal 1436. The communication apparatus 1430 may further comprise a demodulation circuit 1433 configured to determine a second control symbol of the communication protocol that indicates an acknowledgement of the direction of data flow on the transmission link by the other communication apparatus 1440 if a third time period between the fourth signal edge and the fifth signal edge corresponds to a predetermined time period defined in the communication protocol. Further, the demodulation circuit 1433 may be configured to determine a control symbol indicator if a fourth time period between the fifth signal edge and the sixth signal edge is longer than a payload data threshold. That is, again the control symbol indicator is used for determining the end of a delimiter (here the flip acknowledgement delimiter).

After outputting the third signal edge of the transmit data signal 1445 and prior to receiving the first receive data signal 1436, the interface circuit may be configured to drive the first transmission link 1441 into a non-floating state. Similar to what is described above in connection with FIG. 14*b*, a floating state of the first transmission link 1441 during the direction flip may be avoided.

As indicated in FIG. 14*c*, the interface circuit 1431 may be configured to couple to a second transmission link 1442 for communicating with the other communication apparatus 1440. The interface circuit 1431 may be further configured to output a second transmit data signal to the other communication apparatus 1440 via the second transmission link 1442 irrespective of the direction of data flow on the first transmission link 1441.

Similar, the interface circuit 1431 may be configured to couple to a third transmission link 1443 for communicating with the other communication apparatus 1440. The interface circuit 1431 may be further configured to receive a second receive data signal from the other communication apparatus 1440 via the third transmission link 1443 irrespective of the direction of data flow on the first transmission link 1441.

In other words, each transmission link may be virtually independent so that data may be transmitted semi-asynchronously over the interface on each transmission link. With the STEP protocol being natively asynchronous this may allow to use different bit rates on different transmit links unlike conventional communication protocols requiring exactly the same bit rate on each transmission link. The circuitry (logic) of the MAC layer for the STEP protocol simply needs to resolve the different propagation delay on the different transmission links.

Similar to the communication apparatus 1410, also the communication apparatus 1430 may be able to flip the direction of data flow on multiple transmission links. As can be seen from FIG. 14*c*, the interface circuit 1431 is further configured to couple to a fourth transmission link 1444 for communicating with the other communication apparatus 1440. The interface circuit 1431 is configured to output a third transmit data signal to the other communication apparatus 1440 via the fourth transmission link 1444. Accordingly, the processing circuit 1432 is further configured to generate the fourth transmit data signal to comprise a sequence of a seventh signal edge of the first type, an eighth signal edge of the second type, and a ninth signal edge of the first type. The seventh signal edge and the eighth signal edge are separated by a fifth time period corresponding to the first control symbol of the communication protocol, and the eighth signal edge and the ninth signal edge are separated by an sixth time period being longer than the time period of any payload data symbol of the communication protocol.

Like for the first transmission link 1441, the communication apparatus 1430 may effectively control the direction of data flow on the fourth transmission link 1444.

As indicated above, the communication apparatus 1430 may transmit payload data to the other communication apparatus 1440 before the direction of data flow is inverted. That is, the processing circuit 1432 may be configured to generate the first transmit data signal 1435 to further comprise a sequence of a tenth signal edge of the first type, an eleventh signal edge of the second type, and a twelfth signal edge of the first type. The twelfth signal edge timely precedes the first signal edge. The tenth signal edge and the eleventh signal edge are separated by a seventh time period corresponding to a first payload data symbol, and the eleventh signal edge and the twelfth signal edge are separated by an eighth time period corresponding to a second payload data symbol. A sum of the seventh time period and the eighth time period may be lower than $10^{-7}$ s, $10^{-8}$ s, $10^{-9}$ s, $10^{-10}$ s, $10^{-11}$ s, or $10^{-12}$ s according to the STEP protocol.

It is to be noted that the communication apparatus 1440 may not only initially transmit data via a transmission link that can be flipped. The communication apparatus 1440 may receive data on one transmission link enabling flipping and transmit data on another transmission link enabling flipping concurrently.

The communication apparatus 1430 or at least circuitry parts of the communication apparatus 1430 may additionally comprise/implement one or more features described above for the communication apparatus 1410 (accordingly adapted to the interchange of the control symbol indicator position and the control symbol position in the data signal).

Figure 14D:
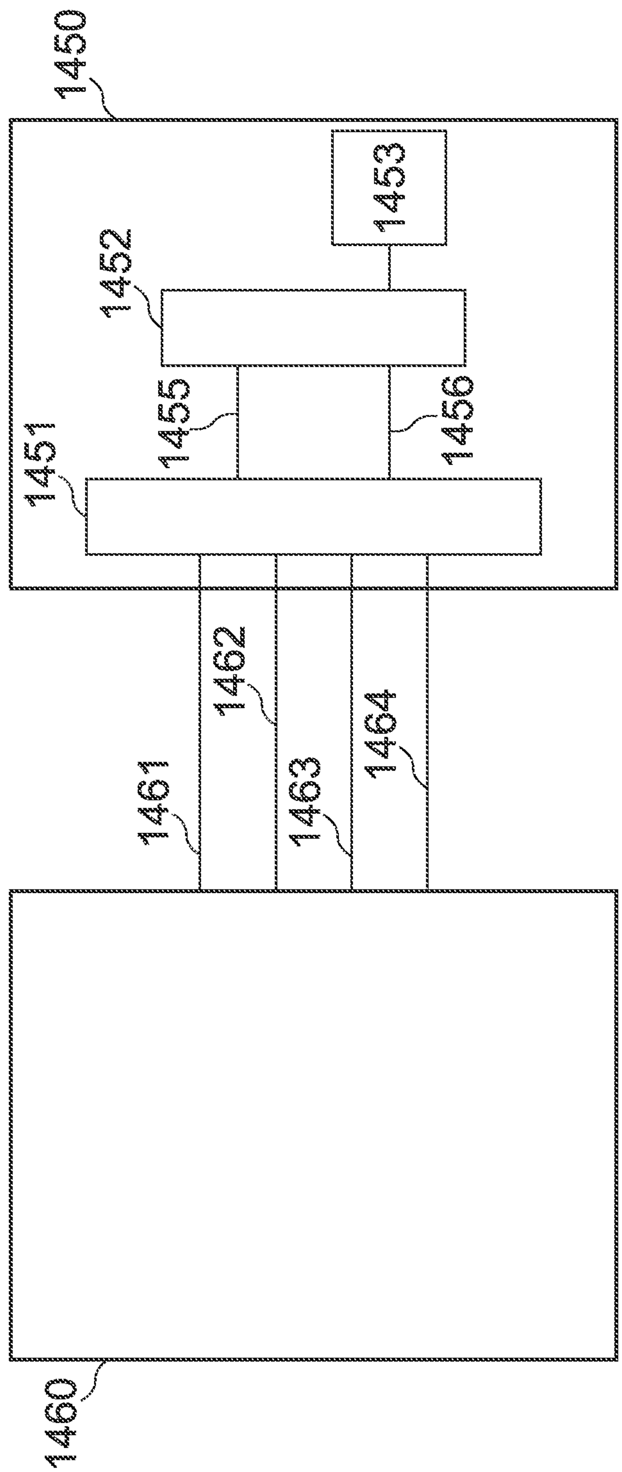
FIG. 14*d* illustrates another example of a communication system.

Another example of a communication apparatus 1450 that initially receives data from another communication apparatus 1460 is illustrated in FIG. 14*d*. The communication apparatus 1450 is substantially identical to the communication apparatus 1420 illustrated in FIG. 14*a* except for the swapped positions of the control symbol indicators and the control symbols in the signals exchanged between the communication apparatuses.

The communication apparatus 1450 comprises an interface circuit 1451 configured to couple to at least a first transmission link 1461 for communicating with the other communication apparatus 1460. The interface circuit 1451 is further configured to receive a first receive data signal 1456 from the other communication apparatus 1460 via the first transmission link 1461.

Further, the communication apparatus 1450 comprises a processing circuit 1452 configured to determine a sequence of a first signal edge of a first type, a second signal edge of a second type, and a third signal edge of the first type in the first receive data signal 1456.

A demodulation circuit 1453 of the communication apparatus 1450 is configured to determine a first control symbol of the communication protocol (e.g. the STEP protocol) that indicates an inversion of the direction of data flow on the transmission link if a first time period between the first signal edge and the second signal edge corresponds to a predetermined time period defined in the communication protocol. The demodulation circuit 1453 is further configured to determine a control symbol indicator if a second time period between the second signal edge and the third signal edge is longer than a payload data threshold defined in a communication protocol.

In contrast to the apparatus 1420, the apparatus 1450 uses the control symbol indicator for indicating the end of the flip delimiter. Again, a change in the direction of data flow on the first transmission link may be effectively communicated to the communication apparatus 1450 by means of the flip delimiter.

Similar to the communication apparatus 1420, the interface circuit 1451 may be configured to output a first transmit data signal 1455 to the other communication apparatus 1460 via the first transmission link 1461 in response to receiving the first control symbol. The direction of data flow on the first transmission link is now inverted.

Before transmitting payload to the other communication apparatus 1460, the communication apparatus 1440 may acknowledge the inversion of the data flow on the first transmission link 1461. Accordingly, the processing circuit 1452 may be further configured to generate the first transmit data signal 1455 to comprise a sequence of a fourth signal edge of the first type, a fifth signal edge of the second type, and a sixth signal edge of the first type. The fourth signal edge and the fifth signal edge are separated by a third time period corresponding to a second control symbol of the communication protocol that indicates an acknowledgement of the direction of data flow on the transmission link by the communication apparatus 1460. The fifth signal edge and the sixth signal edge are separated by a fourth time period being longer than a time period of any payload data symbol of the communication protocol. Again, a control symbol indicator is used for determining the end of a delimiter (here the flip acknowledgement delimiter).

After generating the sixth signal edge and prior to generating to generating a signal edge indicating a start of payload data, the processing circuit 1452 may be further configured to generate the first transmit data signal 1455 such that the first transmission link 1461 is in a non-floating state. Similar to what is described above in connection with FIG. 14_b_, a floating state of the first transmission link 1461 during the direction flip may be avoided.

For example, the processing circuit 1452 may be configured to generate the first transmit data signal 1455 to comprise at least one sequence of a seventh signal edge of the second type and an eighth signal edge of the first type that directly succeeds the sixth signal edge, wherein a fifth time period between the seventh signal edge and its directly preceding signal edge of the first type corresponds to a third control symbol of the communication protocol that indicates an idle mode. A sixth time period between the seventh signal edge and the eighth signal edge is longer than the time period of any payload data symbol of the communication protocol. In other words, the processing circuit 1452 may encode one or more delimiters indicating an idle mode to the first transmit data signal 1455 for pulling up the first transmission link 1461 (e.g. keeping it hot) in order to enable fast transition to the fully operational (full throughput) mode.

After inversion of the direction of data flow on the first transmission link 1461, the communication apparatus 1450 may transmit payload data to the other communication apparatus 1460. For example, the processing circuit 1452 may be configured to generate the first transmit data signal 1455 to comprise a sequence of a ninth signal edge of the first type, a tenth signal edge of the second type, and an eleventh signal edge of the first type. The ninth signal edge succeeds the last one of the at least one sequence of the seventh signal edge and the eighth signal edge. The ninth signal edge and the tenth signal edge are separated by a seventh time period corresponding to a first payload data symbol, and the tenth signal edge and the eleventh signal edge are separated by an eighth time period corresponding to a second payload data symbol. A sum of the seventh time period and the eighth time period may be lower than $10^{-7}$ s, $10^{-8}$ s, $10^{-9}$ s, $10^{-10}$ s, $10^{-11}$ s, or $10^{-12}$ s according to the STEP protocol.

The communication apparatus 1450 may, in some examples, communicate with the other communication apparatus via one or more further transmission links.

For example, the interface circuit 1451 may be configured to couple to a second transmission link 1462 for communicating with the other communication apparatus 1460. The interface circuit 1451 may be further configured to output a second transmit data signal to the other communication apparatus 1460 via the second transmission link 1462 irrespective of the direction of data flow on the first transmission link 1461.

Similar, the interface circuit 1451 may be configured to couple to a third transmission link 1463 for communicating with the other communication apparatus 1460. The interface circuit may be further configured to receive a second receive data signal from the other communication apparatus 1460 via the third transmission link 1463 irrespective of the direction of data flow on the first transmission link 1460.

In other words, each transmission link may be virtually independent so that data may be transmitted semi-asynchronously over the interface on each transmission link.

The communication apparatus 1450 may further be capable of flipping the direction of data flow on multiple transmission links. For example, the interface circuit 1451 may be configured to couple to a fourth transmission link 1464 for communicating with the other communication apparatus 1460. The interface circuit 1451 may be further configured to receive a third receive data signal from the other communication apparatus 1460 via the fourth transmission link 1464. The processing circuit 1452 may be further configured to determine a sequence of a twelfth signal edge of a first type, a thirteenth signal edge of a second type, and a fourteenth signal edge of the first type in the first receive data signal. Accordingly, the demodulation circuit 1453 may be further configured to determine the first control symbol if a ninth time period between the twelfth signal edge and the thirteenth signal edge corresponds to the first predetermined time period, and to determine the control symbol indicator if a tenth time period between the thirteenth signal edge and the fourteenth signal edge is longer than the payload data threshold. Like for the first transmission link 1461, a change in the direction of data flow on the transmission link may be effectively communicated to the communication apparatus 1450 by means of the flip delimiter.

Similar to what is described above for the first transmission link 1461, the interface circuit 1451 may be configured to output a third transmit data signal to the other communication apparatus 1460 via the fourth transmission link 1464 in response to receiving the first control symbol.

It is to be noted that the communication apparatus 1450 may not only initially receive data via a transmission link that can be flipped. The communication apparatus 1450 may receive data on one transmission link enabling flipping and transmit data on another transmission link enabling flipping concurrently.

The communication apparatus 1450 or at least circuitry parts of the communication apparatus 1450 may additionally comprises one or more features described above for the communication apparatus 1420 (accordingly adapted to the interchange of the control symbol indicator position and the control symbol position in the data signal).

Another communication system 1470 comprising a first communication apparatus 1480 and a second communication apparatus 1490 is illustrated in FIG. 14_e_. For example, the first communication apparatus 1480 may be implemented as described above for communication apparatuses 1410 and 1430, and the second communication apparatus 1490 may be implemented as described above for communication apparatuses 1420 and 1450. As can be seen from FIG. 14_e_, the first communication apparatus 1480 may be arranged in a first semiconductor die (chip), and the second communication apparatus 1490 may be arranged in (different) second semiconductor die (chip). Accordingly, the three transmission links 1471, 1472 and 1473 enabling communication between the first communication apparatus 1480 and the second communication apparatus 1490 may, e.g., be arranged on a printed circuit board (PCB) holding the first communication apparatus 1480 and the second communication apparatus 1490 or be arranged inside a semiconductor package comprising the first communication apparatus 1480 and the second communication apparatus 1490. Alternatively, the first communication apparatus 1480 and the second communication apparatus 1490 may be arranged in the same semiconductor die (chip) and the three transmission links 1471, 1472 and 1473 may be arranged inside the semiconductor die (chip). As can be seen, the transmission links 1471, 1472 and 1473 are differential links. For example, they may comprise two transmission lines for transmitting a differential pair of data signals between the communication apparatuses.

Figure 14E:
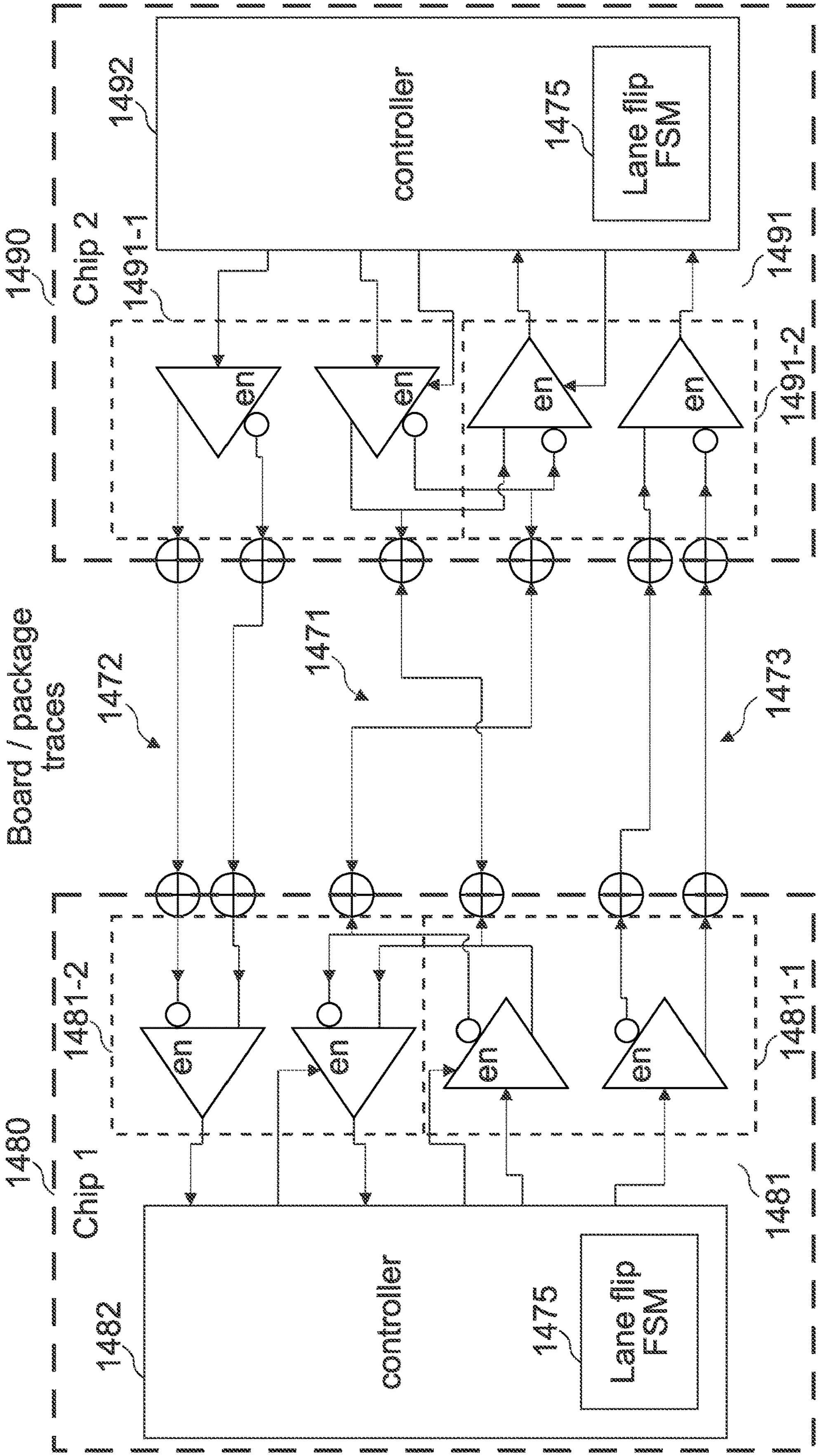
FIG. 14*e* illustrates a further example of a communication system.

The first communication apparatus 1480 comprises an interface circuit 1481 for coupling to the transmission links 1471, 1472 and 1473. Similarly, the second communication apparatus 1490 comprises an interface circuit 1491 for coupling to the transmission links 1471, 1472 and 1473. As indicated in FIG. 14*e*, the second transmission link 1472 is used for (permanently/continuously) transmitting data from the second communication apparatus 1490 to the first communication apparatus 1480. The third transmission link 1473 is used for (permanently/continuously) transmitting data from the first communication apparatus 1480 to the second communication apparatus 1490. The direction of data flow on the first transmission link 1471 may be swapped/flipped.

Accordingly, the interface circuit 1481 comprises a transmit circuit 1481-1 configured to couple to the first transmission link 1471 and the third transmission link 1743. The transmit circuit 1481-1 is configured to output the transmit data signal to the second communication apparatus 1490 via the third transmission link 1473 and optionally the first transmission link 1471. As indicated in FIG. 14*e*, the transmit circuit 1481-1 may, e.g., comprise a (power) amplifier configured to output the transmit data signals to the transmission links (e.g. a differential signal pair as in the example of FIG. 14*e* or a single ended signals in an alternative single ended implementation).

Further, the interface circuit 1481 comprises a receive circuit 1481-2 configured to couple to the first transmission link 1471 and the second transmission link 1472. The receive circuit 1481-2 is configured to receive the receive data signals from the second communication apparatus 1490 via the second transmission link 1472 and optionally the first transmission link 1471. As indicated in FIG. 14*e*, the receive circuit 1481-2 may, e.g., comprise an (operational) amplifier for amplifying the receive data signals from the transmission links (e.g. a differential pair of signals as in the example of FIG. 14*e* or a single ended signals in an alternative single ended implementation).

The interface circuit 1491 of the second communication apparatus 1490 is implemented in a similar manner comprising a transmit circuit 1491-1 and a receive circuit 1491-2.

The above described functionality of the processing circuits and the demodulation circuits is indicated in FIG. 14*e* by means of the control circuits 1482 and 1492 of the communication apparatuses.

As indicated in FIG. 14*e*, the decision about when to flip the direction of data flow on the first transmission link 1471 may be taken by a higher layer. For example, a dedicated finite state machine 1475 may decide on the direction of data flow on the first transmission link 1471 and provide according controls signals to the control circuits 1482 and 1492 of the communication apparatuses.

In other words, FIG. 14*e* illustrates a situation with three transmission links. For example, two of the transmission links initially operate in a direction A (e.g. transmission links 1471 and 1473), while the third transmission link initially operates in the opposite direction B (e.g. transmission link 1472). If there is a need (demand/requirement) that transmission link 1471 changes the direction of data flow to direction B, transmission link 1471 stops the transport of data, flips its direction of data flow and starts transporting the data in direction B.

Figure 14F:
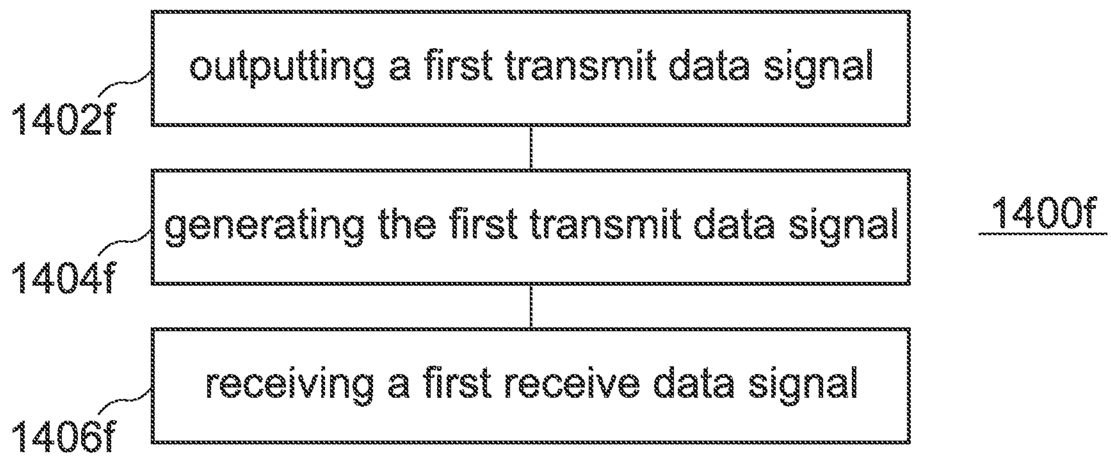
FIG. 14*f* illustrates a flowchart of an example of a communication method for a communication apparatus.

In order to summarize some of the above aspects on inverting the direction of data flow on a transmission link, FIG. 14*f* illustrates an example of a communication method 1400*f* for a communication apparatus. The communication method 1400*f* comprises outputting 1402*f* a first transmit data signal to another communication apparatus via a first transmission link for communicating with the other communication apparatus. Further, the communication method 1400*f* comprises generating 1404*f* the first transmit data signal. The first transmit data signal comprises a sequence of a first signal edge of a first type, a second signal edge of a second type, and a third signal edge of the first type. The first signal edge and the second signal edge are separated by a first time period being longer than a time period of any payload data symbol of a communication protocol, and the second signal edge and the third signal edge are separated by a second time period corresponding to a first control symbol of the communication protocol that indicates an inversion of the direction of data flow on the transmission link.

Optionally, the communication method 1400*f* may further comprise receiving 1406*f* a first receive data signal from the other communication apparatus via the first transmission link after outputting the first control symbol.

More details and aspects of method 1400*f* are mentioned in connection with the proposed technique or one or more examples described above (e.g. FIGS. 14*a* and 14*b*). The method may comprise one or more additional optional features corresponding to one or more aspects of the proposed technique or one or more examples described above.

Figure 14G:
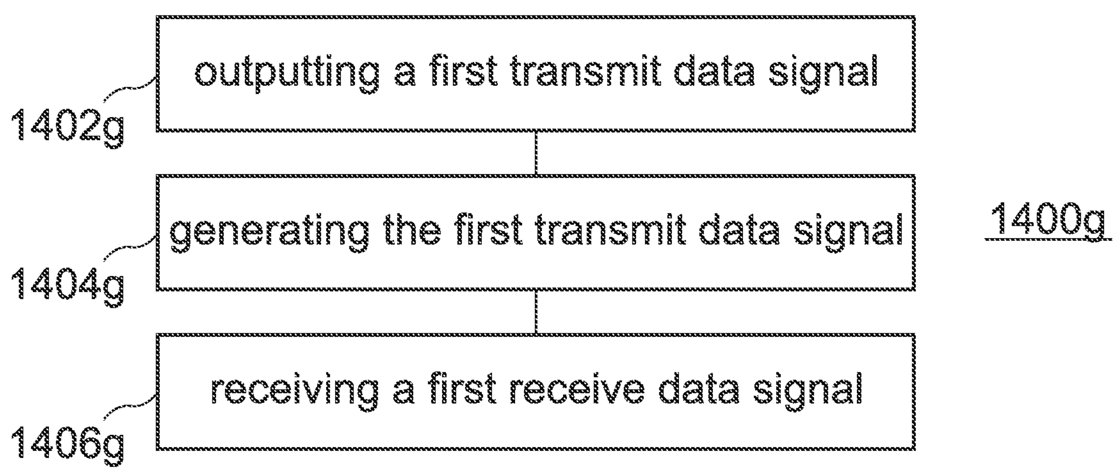
FIG. 14*g* illustrates a flowchart of another example of a communication method for a communication apparatus.

Another example of a communication method 1400*g* for a communication apparatus is illustrated in FIG. 14*g*. The communication method 1400*g* comprises outputting 1402*g* a first transmit data signal to another communication apparatus via a first transmission link for communicating with the other communication apparatus. Further, the communication method 1400*g* comprises generating 1404*g* the first transmit data signal. The first signal edge and the second signal edge are separated by a first time period corresponding to a first control symbol of a communication protocol that indicates an inversion of the direction of data flow on the transmission link, and the second signal edge and the third signal edge are separated by a second time period being longer than a time period of any payload data symbol of the communication protocol.

Optionally, the communication method 1400*g* may further comprise receiving 1406*g* a first receive data signal from the other communication apparatus via the first transmission link after outputting the first control symbol.

More details and aspects of method 1400*g* are mentioned in connection with the proposed technique or one or more examples described above (e.g. FIG. 14*c*). The method may comprise one or more additional optional features corresponding to one or more aspects of the proposed technique or one or more examples described above.

Figure 14H:
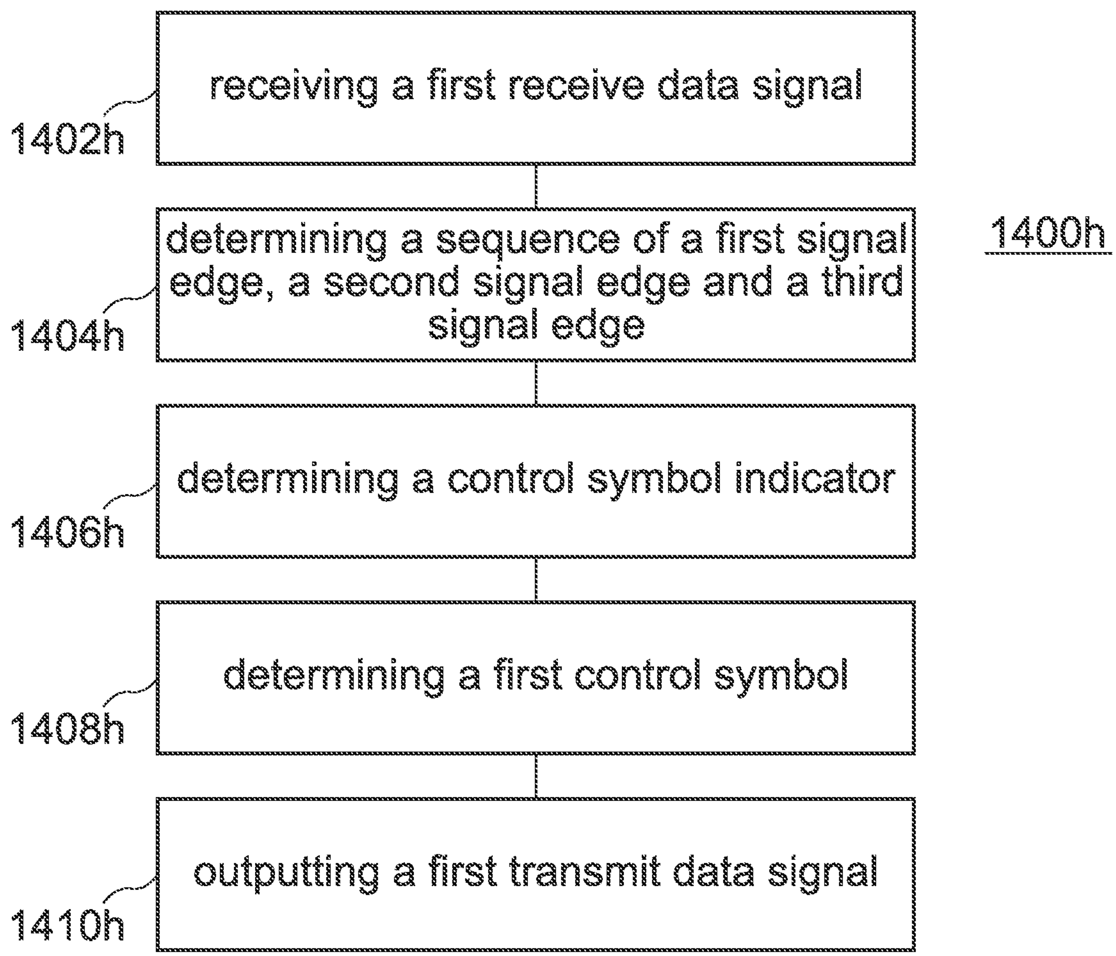
FIG. 14*h* illustrates a flowchart of still another example of a communication method for a communication apparatus.

A still further example of a communication method 1400*h* for a communication apparatus is illustrated in FIG. 14*h*. The communication method 1400*h* comprises receiving 1402*h* a first receive data signal from another communication apparatus via a first transmission link for communicating with the other communication apparatus. Further, the communication method 1400*h* comprises determining 1404*h* a sequence of a first signal edge of a first type, a second signal edge of a second type, and a third signal edge of the first type in the first receive data signal. The communication method 1400*h* additionally comprises determining 1406*h* a control symbol indicator if a first time period between the first signal edge and the second signal edge is longer than a payload data threshold defined in a communication protocol. In addition, the communication method 1400*h* comprises determining 1408*h* a first control symbol of the communication protocol that indicates an inversion of the direction of data flow on the transmission link if a second time period between the second signal edge and the third signal edge corresponds to a predetermined time period defined in the communication protocol.

Optionally, the communication method 1400*h* may further comprise outputting 1410*h* a first transmit data signal to the other communication apparatus via the first transmission link in response to receiving the first control symbol.

More details and aspects of method 1400*h* are mentioned in connection with the proposed technique or one or more examples described above (e.g. FIGS. 14*a* and 14*b*). The method may comprise one or more additional optional features corresponding to one or more aspects of the proposed technique or one or more examples described above.

Figure 14I:
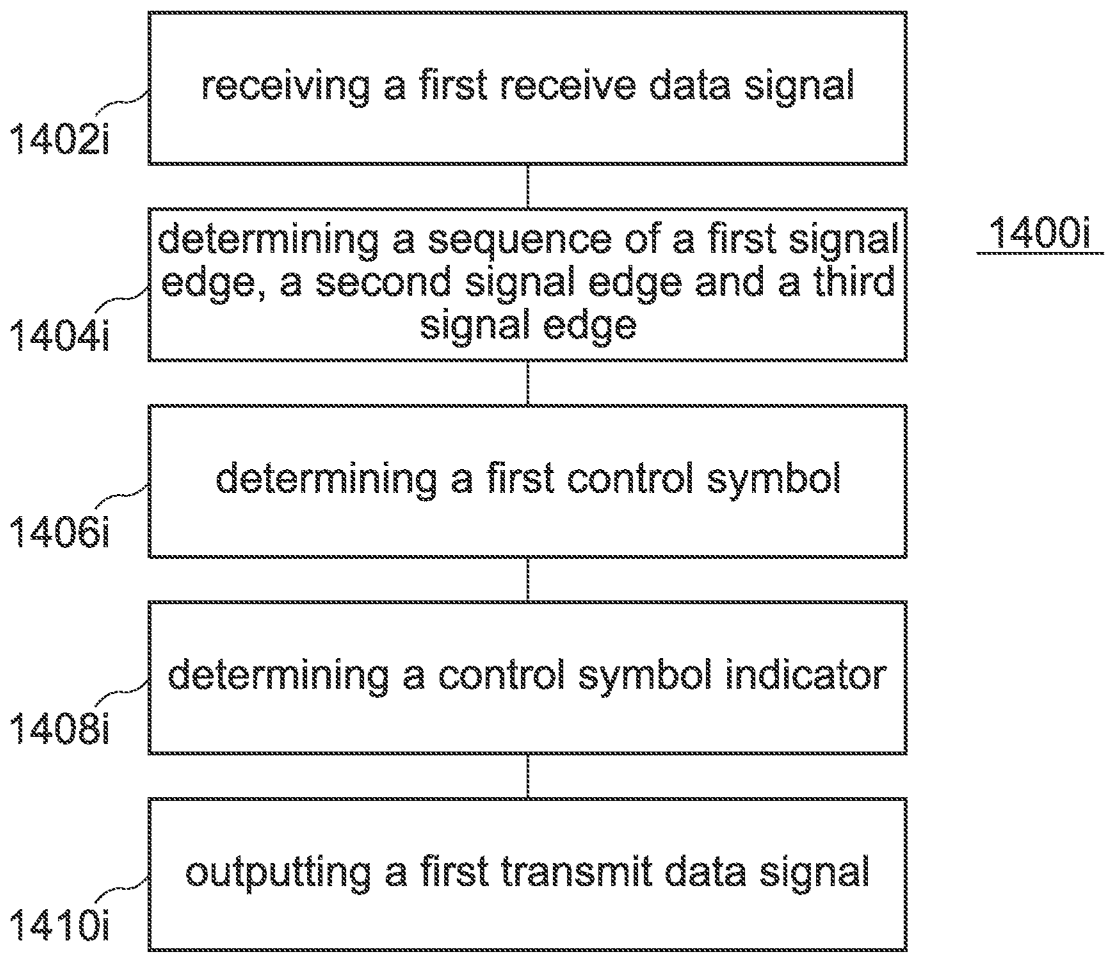
FIG. 14*i* illustrates a flowchart of a further example of a communication method for a communication apparatus.

FIG. 14*i* illustrates another example of a communication method 1400*i* for a communication apparatus. The communication method 1400*i* comprises receiving 1402*i* a first receive data signal from another communication apparatus via a first transmission link for communicating with the other communication apparatus. Further, the communication method 1400*i* comprises determining 1404*i* a sequence of a first signal edge of a first type, a second signal edge of a second type, and a third signal edge of the first type in the first receive data signal. The communication method 1400*i* additionally comprises determining 1406*i* a first control symbol of a communication protocol that indicates an inversion of the direction of data flow on the transmission link if a first time period between the first signal edge and the second signal edge corresponds to a predetermined time period defined in the communication protocol. In addition, the communication method 1400*i* comprises determining 1408*i* a control symbol indicator if a second time period between the second signal edge and the third signal edge is longer than a payload data threshold defined in a communication protocol.

Optionally, the communication method 1400*i* may further comprise outputting 1410*i* a first transmit data signal to the other communication apparatus via the first transmission link in response to receiving the first control symbol.

More details and aspects of method 1400*i* are mentioned in connection with the proposed technique or one or more examples described above (e.g. FIG. 14*d*). The method may comprise one or more additional optional features corresponding to one or more aspects of the proposed technique or one or more examples described above.

As described above in connection with FIGS. 14*a* to 14*i*, the STEP protocol may use two highly reliable and unique delimiters: the flip delimiter and the flip acknowledgement delimiter. For the STEP protocol, some transmission links may implement (use) for the same set of transmission lines transmit and receive circuitry blocks. For example, a higher level entity according to the STEP protocol may decide to flip the direction of data flow on one or more transmission links and trigger a circuit to perform the direction flip. Further, some examples of a receiver according to the STEP protocol do not leave a transmission link in floating state. When the transmit side of a communication system according to the STEP protocol flips the direction of data flow, it may send the flip delimiter, stop sending data and change to a receive mode. Accordingly, the receive side may activate its transmit mode upon detection of the direction flip and send the flip acknowledgement delimiter. In some examples, the direction flip may always be initiated at the transmission link level by the transmit side.

Power consumption is a Key Performance Indicator (KPI) for communication interfaces (e.g. a serial interface). Apart from power efficient circuitry, the power consumption may be optimized by dedicated power states. If circuitry is turned on or off when changing from one power state to the other, fast and efficient turn on/off is desired. In the following, a power state scheme for a communication interface (e.g. according to the STEP protocol) is described in connection with FIGS. 15*a* to 15*d* that may allow energy efficient operation of the communication interface and fast transition between the power states.

FIG. 15*a* illustrates an example of apparatus 1500 for generating a data signal 1501. The apparatus 1500 comprises an output interface circuit 1510 configured to output the data signal 1501 to a transmission link 1505. Further, the apparatus 1500 comprises a processing circuit 1515 (e.g. a DTC) configured to generate the data signal 1501. The data signal 1501 comprises at least a sequence of a first signal edge of a first type, a second signal edge of a second type, and a third signal edge of the first type. For example, the first type may be a rising edge and the second type be a falling edge, or the second type may be a rising edge and the first type be a falling edge.

An exemplary operation of the apparatus 1500 in different power modes (power states) is described in the following in connection with FIG. 15*b*, which illustrates a state diagram illustrating possible power modes as well as possible transitions between the power modes. The power modes may be understood as different modes of operation for the apparatus 1500.

In a first mode of operation 1531, the processing circuit 1515 is configured to adjust a first time period between the first signal edge and the second signal edge to a time period corresponding to a first payload data symbol to be transmitted according to the communication protocol (e.g. the STEP protocol), and to adjust a second time period between the second signal edge and the third signal edge to a time period corresponding to a second payload data symbol to be transmitted according to the communication protocol. That is, the processing circuit 1515 is configured to time encode payload data to the data signal 1501 in the first mode of operation 1531. A sum of the first time period and the second time period may be lower than $10^{-7}$ s, $10^{-8}$ s, $10^{-9}$ s, $10^{-10}$ s, $10^{-11}$ s, or $10^{-12}$ s in the first mode of operation 1531 according to the STEP protocol. Hence, the first mode of operation may be understood as a high speed mode, a full throughput mode or a fully operational mode for transporting data. For example, the apparatus 1500 may generate the data signal 1501 to exhibit a frequency between 2 GHz and 6 GHz in the first mode of operation. However, in some examples, also higher frequencies may be used (e.g. 10 GHz, 12 GHz, 20 GHz or more).

If there is no data or only little data for transmission, the apparatus 1500 may transition to a second mode of operation 1532. In the second mode of operation 1532, the processing circuit 1515 is configured to adjust the first time period to be longer than a time period of any payload data symbol of the communication protocol in order to encode a control symbol indicator to the data signal 1501, and to adjust the second time period to a time period corresponding to a control symbol of the communication protocol that indicates an idle mode. Alternatively, the processing circuit may be configured to adjust the second time period to be longer than a time period of any payload data symbol of the communication protocol, and to adjust the first time period to the time period corresponding to the control symbol of the communication protocol that indicates the idle mode. In other words, the processing circuit 1515 is configured to encode the delimiter indicating the idle mode to the data signal 1501 in the second mode of operation 1532. As described above, encoding the idle delimiter(s) to the data signal 1501 may allow to keep the transmission link 1505 hot and at the same time reduce the activity of the processing circuit 1515 (and hence the apparatus 1500) compared to the first mode of operation 1531. For example, the apparatus 1500 may generate the data signal 1501 to exhibit a frequency of between 100 MHz and 400 MHz (e.g. approx. 200 MHz) in the second mode of operation. Accordingly, the second mode of operation may be understood as a first low power mode (LPH1).

The processing circuit 1515 may encode a plurality of idle delimiters to the data signal 1501 in the second mode of operation to keep the transmission link hot. Accordingly, in the second mode of operation, the processing circuit 1515 may be configured to generate the data signal 1501 to further comprise at least one sequence of a fourth signal edge of the second type and a fifth signal edge of the first type that directly succeeds the third signal edge. A third time period between the fourth signal edge and its directly preceding signal edge of the first type or a fourth time period between the fourth signal edge and the fifth signal edge is longer than a time period of any payload data symbol of the communication protocol in order to encode a control symbol indicator to the data signal 1501. The fourth time period or the third time period corresponds to the control symbol of the communication protocol that indicates the idle mode, respectively.

The transition from one mode of operation to another mode of operation (the transition between different power states) may be controlled by a control circuit 1520 of the apparatus 1500. For example, the control circuit 1520 may be configured to control the circuitry of the apparatus 1500 to change from the first mode of operation to the second mode of operation if an amount of data to be transmitted is below a first threshold, and to change from the second mode of operation to the first mode of operation if the amount of data to be transmitted is above the first threshold. The first threshold may be selected arbitrarily. For example, the control circuit 1520 may control the circuitry of the apparatus 1500 to change to the second mode of operation if there is no data to be transmitted (e.g. a transmit data size is zero). For example, the control circuit 1520 may monitor the fill level of a buffer storing the data to be transmitted. If the buffer is empty or if the fill level is below another threshold value, the control circuit 1520 may control the circuitry of the apparatus 1500 to change to the second mode of operation in order to transmit the idle delimiter(s) over the transmission link 1505. If the buffer is no longer empty or above the other threshold value, the control circuit 1520 may control the circuitry of the apparatus 1500 to change back to the full throughput mode (e.g. the first mode of operation).

In other words, a system may have a high speed mode (state) for transferring high throughput data. However, if there is occasionally no data to transfer, the system may save energy during these (short) idle times by transmitting a unique symbol (e.g. the idle delimiter) at low frequency. The first low power mode may enable to keep the system ready to resume to transmission by keeping the line active at low rate. For example, the transition from the first mode of operation 1531 to the second mode of operation 1532 may take less than 5 nanoseconds (ns; e.g. 1 ns), and the transition from the second mode of operation to the first mode of operation may take less than 20 ns (e.g. 10 ns).

The apparatus 1500 may further be configured to output the data in a differential manner to the transmission link 1505. That is, the processing circuit 1515 may be further configured to generate a second data signal that is inverted with respect to the data signal 1501. Further, the output interface circuit 1510 may be configured to output the second data signal to the transmission link 1505. Accordingly, the transmission link 1505 may be a differential transmission link comprising two transmission lines for the first data signal 1501 and the second data signal.

As described with more details in connection with FIG. 21 below, the output interface circuit 1510 may be configured to couple to ground and to the (differential) transmission link 1505 for DC coupling the apparatus 1500 to a receiver for the data signal 1501. The receiver is coupled to a supply voltage. In other words, the output interface circuit 1510 is coupled between the receiver and ground, whereas the receiver is coupled between the output interface circuit 1510 and the supply voltage. This configuration may enable a second low power mode (LPH2), i.e. a third mode of operation 1533, with reduced power consumption compared to the first low power mode (i.e. the second mode of operation 1532). For example, in the third mode of operation, the output interface circuit 1510 may be configured to power down the receiver by de-coupling the receiver from ground as described in detail below in connection with FIG. 21. Further, the processing circuit 1515 may be deactivated in the third mode of operation so that there is no transmission over the transmission link 1505. In the third mode of operation 1533, the apparatus 1500 (which may be understood as a transmitter) effectively stops sinking current from the receiver. The receiver is put into a kind of standby mode. Accordingly, there is no transmission over the transmission link until the apparatus 1500 resumes transmission (e.g. is sinking current from the receiver). Accordingly, no further actions may be required by the receiver for entering or exiting the third mode of operation 1533.

Since circuitry of the apparatus 1500 is deactivated and since the receiver is deactivated in the third mode of operation, transitioning from the second mode of operation 1532 to the third mode of operation, and vice versa, may take longer than the transitions between the first mode of operation 1531 and the second mode of operation 1532. However, a greater amount of power may be saved in the third mode of operation 1533 compared to the second mode of operation 1532. In other words, more power may be saved in the third mode of operation 1533 for the tradeoff of a longer exit latency (e.g. about 100 ns). Hence, the apparatus 1500 may, e.g., be operated in the third mode of operation 1533 if no data is to be transmitted for a longer (predefined) period of time.

The control circuit 1520 may, e.g., be configured to control the circuitry of the apparatus 1500 to change from the second mode of operation 1532 to the third mode of operation 1533 if an amount of data to be transmitted is below a second threshold (which may be different from the first threshold). As indicated above, the control circuit 1520 may be configured to only control the circuitry of the apparatus 1500 to change from the second mode of operation 1532 to the third mode of operation 1533 if a received control signal (ALLOW_DIS) indicates that the third mode of operation 1533 is enabled. For example, the control signal may indicate that the third mode of operation 1533 is enabled if no data is to be transmitted for a predefined threshold time.

On the contrary, the control circuit 1520 may be configured to control the circuitry of the apparatus 1500 to change from the third mode of operation 1533 back to the second mode of operation 1532 if the amount of data to be transmitted is above the second threshold or if the control signal indicates that the third mode of operation 1533 is disabled. For example, the control circuit 1520 may monitor the fill level of a buffer storing the data to be transmitted. If the buffer is empty or if the fill level is below another threshold value and the control signal indicates that the third mode of operation 1533 is enabled, the control circuit 1520 may control the circuitry of the apparatus 1500 to change to the third mode of operation in order to go to a deeper power saving mode. If the buffer in no longer empty or above the other threshold value and/or if the control signal indicates that the third mode of operation 1533 is disabled, the control circuit 1520 may control the circuitry of the apparatus 1500 to change back to the second mode of operation 1532.

As described with more detail below in connection with FIG. 21, the output interface circuit 1510 may be configured to present high impedance to the (differential) transmission link 1505 in the third mode of operation 1533. Hence, if the transmission link 1505 is a differential transmission link, both transmission lines of the differential transmission link 1505 are on the same signal level (e.g. high) during the third mode of operation 1533—contrary to the first and the second mode of operation 1531, 1532 in which the transmission lines of the differential transmission link 1505 are differentially alternating.

Further, when changing from the third mode of operation 1533 to the second mode of operation 1532, the output interface circuit 1510 may be configured to power up the receiver by re-coupling the receiver to ground (for more details see below description of FIG. 21).

Further, the apparatus 1500 may be turned off completely for going to another deep power saving mode (i.e. a fourth mode of operation 1534). The control circuit 1520 may be configured to deactivate the circuitry of the apparatus 1534 in the fourth mode of operation 1534. The output interface circuit may be configured to present high impedance to the (differential) transmission link 1505 in the fourth mode of operation 1534.

For example, the control circuit 1520 may be configured to control the circuitry of the apparatus 1500 to change from the fourth mode of operation 1534 back to the second mode of operation 1532 if the amount of data to be transmitted (e.g. the transmit data size) is above a third threshold or if the control signal indicates that the fourth mode of operation 1534 is disabled.

On the contrary, the control circuit 1520 may be configured to control the circuitry of the apparatus 1500 to change from the second mode of operation 1532 to the fourth mode of operation 1534 if the amount of data to be transmitted is below the third threshold. Further, the control circuit 1520 may be configured to only control the circuitry of the apparatus 1500 to change from the second mode of operation 1532 to the fourth mode of operation 1534 if the control signal indicates that the fourth mode of operation 1534 is enabled.

For example, the control circuit 1520 may monitor the fill level of a buffer storing the data to be transmitted. If the buffer is empty or if the fill level is below another threshold value and the control signal indicates that the fourth mode of operation 1534 is enabled, the control circuit 1520 may control the circuitry of the apparatus 1500 to change to the fourth mode of operation in order to go to a deeper power saving mode. If the buffer in no longer empty or above the other threshold value and/or if the control signal indicates that the fourth mode of operation 1534 is disabled, the control circuit 1520 may control the circuitry of the apparatus 1500 to change back to the third mode of operation 1533.

In other words, the control circuit 1520 may choose to power down the link (to save power or because no data transfer is done) and it may send the apparatus 1500 to a disabled state. Further, the transition to the fourth mode of operation 1534 may be signaled to the receiver by means of the data signal 1501 using a dedicated delimiter. For example, when changing from the second mode of operation 1532 to the fourth mode of operation 1534, the processing circuit 1515 may be configured to generate the data signal 1501 to comprise a sequence of a sixth signal edge of the first type, a seventh signal edge of the second type, and an eighth signal edge of the second type. The sixth signal edge and the seventh signal edge are separated by a fifth time period, and the seventh signal edge and the eighth signal edge are separated by a sixth time period. The fifth time period or the sixth time period is longer than a time period of any payload data symbol of the communication protocol in order to encode a control symbol indicator to the data signal 1501. The sixth time period or the fifth time period corresponds to a control symbol of the communication protocol that indicates changeover to the fourth mode of operation 1534, respectively. In some examples, more than one control symbol (e.g. a cascaded delimiter) may be used for indicating changeover to the fourth mode of operation 1534.

The above described modes of operation exhibit different power consumption and different exit latencies. However, the lower the power consumption, the longer is the exit latency. The first mode of operation may allow communication according to the STEP protocol at bitrates of multiple gigabits per second. For example, this ultrahigh bandwidth mode may be used for transmitting rather large transport burst units. However, some applications require to transport only small units of data (e.g. one or two bytes). Other applications demand for a mix between these two extremes of data transmission.

Using the legacy mode (i.e. the first mode of operation 1531) of the STEP protocol or any other communication protocol for applications that need only a low bandwidth for relatively small amounts of data (e.g. only a few bytes need to be transported) may be rather inefficient since quite a lot of energy per transported bit is consumed. Further, the transition to the high speed mode of the STEP protocol or any other communication protocol and the transition back to one of the low power modes may take (much) longer than the data transport itself. For example, if 16 bits are to be transported every one microsecond (i.e. a data rate of 16 Mbit/sec is required) and if the exit latency from a low power mode to the high speed mode takes one microsecond, the communication interface needs to stay in the high speed mode all the time and is, hence, relatively inefficient for such an application.

In order to enable increased efficiency for such application, the apparatus 1500 may further support a fifth mode of operation 1535. As said above, the fifth mode of operation 1535 may be used for transmitting small amounts of data. Therefore, the control circuit 1520 may be configured to control the circuitry of the apparatus 1500 to change from the fourth mode of operation 1534 to the fifth mode of operation 1535 if a transmit data size (an amount of data to be transmitted) is below a fourth threshold. The fourth threshold may be selected arbitrarily (e.g. based on the amount of data to be transmitted per unit time for a certain application). In order to save power, the control circuit 1520 may be configured to control the circuitry of the apparatus 1500 to change from the fifth mode of operation 1535 back to the fourth mode of operation after transmitting the data (of smaller amount than the fourth threshold). Accordingly, the apparatus 1500 may only change from the fourth mode of operation 1534 to the first mode of operation 1531 (the high speed mode) if a larger amount of data is to be transmitted.

In the fifth mode of operation, the control circuit 1520 is configured to activate another (a second) processing circuit 1525 that is configured to generate a low bandwidth data signal 1502 exhibiting a lower bandwidth than the data signal 1501 in the first mode of operation 1531. Further, the control circuit 1520 is configured activate the output interface circuit 1510 that was deactivated before during the fourth mode of operation 1534.

For signaling that the apparatus 1500 is operating in the fifth mode of operation 1535 to a receiver, the signal levels on the transmission lines of the differential transmission link 1505 may be used. For example, the output interface circuit 1510 may be configured to output a defined signal level (e.g. ground) to both transmission lines of the differential transmission link 1505 for a predefined period of time (e.g. 100 ns, 200 ns or 300 ns). After outputting the defined signal level to the differential transmission link 1505, the output interface circuit 1510 may be further configured to output the low bandwidth data signal 1502 to the transmission link 1505. In other words, a predefined signal level on the transmission lines of the differential transmission link 1505 may be driven by the output interface circuit 1510 for signaling the start of the fifth mode of operation 1535 to a receiver.

In the fifth mode of operation, the output interface circuit 1510 may be further configured to output ground to the differential transmission link 1505 for a second predefined period of time subsequent to outputting the low bandwidth data signal 1502 in order to signal end of transmission (e.g. return to the fourth mode of operation 1534) to a receiver. Accordingly, the receiver may be enabled to go to a (deep) sleep mode since no further data traffic is to be expected from the apparatus 1500.

A bandwidth of the low bandwidth data signal 1502 in the fifth mode of operation 1535 is (much) lower than a bandwidth of the data signal 1505 in the first mode of operation 1531. The bandwidth of the low bandwidth data signal 1502 in the fifth mode of operation 1535 may, e.g., be at least ten, fifteen or twenty times lower than the bandwidth of the data signal 1501 in the first mode of operation 1531. For example, if a bandwidth of the data signal 1501 in the first mode of operation 1531 is 20 Gbit/sec, the bandwidth of the low bandwidth data signal 1502 in the fifth mode of operation 1535 may be 100 Mbit/sec.

The reduced bandwidth of the low bandwidth data signal 1502 in the fifth mode of operation 1535 may allow to drive rise and fall times for signal edges in the low bandwidth data signal 1502 more relaxed compared to the data signal 1501 (e.g. three to five nanoseconds rise/fall time for a bandwidth of 100 Mbit/sec). Accordingly, a power consumption of the apparatus 1500 in the fifth mode of operation 1535 may be (much) lower than in the first mode of operation 1531.

The transition from the fourth mode of operation 1534 to the fifth mode of operation 1535, and vice versa, may be fast (e.g. 200 ns or less). The transition from the fourth mode of operation 1534 to the fifth mode of operation 1535, and vice versa, may be much faster than changing from the fourth mode of operation 1534 to the first mode of operation 1531 via the second mode of operation 1532. For example, changing from the fourth mode of operation 1534 to the first mode of operation 1531 via the second mode of operation 1532 may take at least five, ten or fifteen times longer than changing from the fourth mode of operation 1534 to the fifth mode of operation 1535.

Assuming that 24 bits of data is to be transmitted, a full cycle of sending the data may take, e.g., 640 ns for a transmission rate (bandwidth of the low bandwidth data signal 1502) of 100 Mbit/sec in the fifth mode of operation 1535 and transition times of 200 ns from the fourth mode of operation 1534 to the fifth mode of operation 1535, and vice versa. That is, an equivalent bandwidth of 37.5 Mbit/sec may transmitted over the transmission link 1505. The time for changing from the fourth mode of operation 1534 to the second mode of operation 1532 may, e.g., be 2.5 microseconds and the time for changing from the second mode of operation 1532 to the first mode of operation 1531 may, e.g., be 10 ns. Accordingly, already the time for changing from the fourth mode of operation 1534 to the first mode of operation 1531 is more than the time for going from the fourth mode of operation 1534 to the fifth mode of operation 1535, transmitting the data in the fifth mode of operation 1535 and going back to the fourth mode of operation 1534. Hence, using the fifth mode of operation 1535 for transmitting small amounts of data may enable to apparatus 1500 to stay in the fourth mode of operation 1534 more often and/or for longer times. Accordingly, a power consumption of the apparatus 1500 may be reduced and a power efficiency of the apparatus 1500 may be increased.

The fifth mode of operation 1535 may, hence, be understood as a Low Voltage General Purpose (LVGP) mode or a semi General Purpose Input Output (GPIO) mode. That is, if occasionally a small amount of data is to be signaled, instead of waking up the system and using the high speed mode (which is inefficient for small data), the LVGP state may be used for transferring the small data payload due to its efficiency and the fast on/off times.

In some examples, the other processing circuit 1525 may be configured to generate the low bandwidth data signal 1502 using a different modulation scheme than the processing circuit 1515 uses for generating the data signal 1501 in the first mode of operation 1531. For example, the processing circuit 1525 may use another modulation scheme than time encoding data to signal edges of the signal. For example, the processing circuit 1525 may use amplitude modulation, another phase modulation scheme or a combination of amplitude modulation and phase modulation.

In the fifth mode of operation 1535, the output interface circuit 1510 may, e.g., be configured to output the low bandwidth data signal 1502 to one transmission line of the differential transmission link 1505 and a clock signal to the other transmission line of the differential transmission link 1505. For example, the clock signal may be a Dual Data Rate (DDR) clock signal or a Single Data Rate (SDR) clock signal. Alternatively, the other processing circuit 1525 may configured to generate a second low bandwidth data signal so that two single ended low bandwidth signals are transmitted over the transmission lines of the differential transmission link 1505. The reduced immunity of single ended signals compared to differential signals may be compensated by the reduced bandwidth of the low bandwidth data signals compared to the data signal 1501 in the first mode of operation 1531.

In some examples, the apparatus 1500 may transmit the data differentially also in the fifth mode of operation 1535. For example, the other processing circuit 1525 may be configured to generate a second low bandwidth data signal that is inverted with respect to the low bandwidth data signal 1502. Accordingly, the output interface circuit 1510 may be configured to output the low bandwidth data signal 1502 and the second low bandwidth data signal to the differential transmission link 1505.

As indicated, the apparatus 1500 may further be driven to an off state, i.e. a sixth mode of operation 1536. For example, when powering up the apparatus 1500, the apparatus 1500 may first go to the off state before going to the low energy fourth mode of operation 1534. In the off state, the apparatus 1500 (or the whole STEP interface) is reset/shut down based on an external command (control signal).

Further, a seventh mode of operation 1537 may be used when flipping (inverting) the direction of data flow on the transmission link 1505 in order to enable the apparatus 1500 to change its receive mode.

In addition to the apparatus 1500 for generating the data signal (the transmit side of the communication interface), also the receive side may operate according to the power scheme. This is described below in connection with FIGS. 15*b* and 15*c*. FIG. 15*c* illustrates an example of apparatus 1540 for decoding a data signal 1541. The apparatus 1540 comprises an interface circuit 1550 configured to receive the data signal 1541 from a transmission link 1545. Further, the apparatus comprises a processing circuit 1555 (e.g. a TDC) configured to determine a sequence of a first signal edge of a first type, a second signal edge of a second type, and a third signal edge of the first type in the data signal 1541. For example, the first type may be a rising edge and the second type be a falling edge, or the second type may be a rising edge and the first type be a falling edge.

The apparatus 1540 additionally comprises a demodulation circuit 1560 configured to determine first data based on a first time period between the first signal edge and the second signal edge, and to determine second data based on a second time period between the second signal edge and the third signal edge. A sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol if the first data and the second data are payload data symbols.

The mode of operation (the power mode) of the apparatus 1540 is controlled by a control circuit 1565. The control circuit 1565 is configured to control the circuitry of the apparatus 1540 to operate in the first mode of operation 1531 if the first data and the second data are payload data symbols according to the communication protocol (e.g. the STEP protocol). Further, the control circuit 1565 is configured to control the circuitry of the apparatus 1540 to operate in the second mode of operation 1532 if the first data and the second data are a control symbol indicator and a control symbol of the communication protocol that indicates an idle mode.

As described above, the demodulation circuit 1560 may determine the delimiter indicating the idle mode based on the time periods between the first to third signal edges of the data signal 1541. For example, the demodulation circuit 1560 may be configured to determine that the first data or the second data is a control symbol indicator if the first time period or the second time period is longer than a payload data threshold defined in the communication protocol. Further, the demodulation circuit 1560 may be configured to determine that the first data or the second data is the control symbol of the communication protocol that indicates the idle mode if the first time period or the second time period corresponds to a predetermined time period defined in the communication protocol.

The data signal 1541 is generated at a lower rate in the second mode of operation 1532 than in the first mode of operation (see above). Accordingly, also the apparatus 1540 may operate at a lower rate in order to save power. Hence, the control circuit 1565 may be configured to control the circuitry of the apparatus 1540 to operate to at a lower rate in the second mode of operation than in the first mode of operation. Like the apparatus 1500, the apparatus 1540 may save power in the second mode of operation but is at the same time kept hot by decoding the idle delimiters at low rate so that the apparatus 1540 may exit to the first mode of operation 1531 with low latency. In other words, the apparatus 1540 is kept active at low rate in order to be able to resume to the high speed mode with low latency.

The apparatus 1540 may (at least in the first and/or the second mode of operation 1531, 1532) further be configured to process differential input signals. That is, the interface circuit 1550 may be further configured to receive a second data signal that is inverted with respect to the data signal 1541. Further, the processing circuit 1555 may be configured to determine the first signal edge, the second signal edge, and the third signal edge further based on the second data signal. Accordingly, the transmission link 1545 may be a differential transmission link comprising two transmission lines for the first data signal 1541 and the second data signal.

As described with more details below in connection with FIG. 21, the interface circuit 1550 may be coupled to a supply voltage and to the (differential) transmission link 1545 for DC coupling the apparatus 1540 to a transmitter generating the data signal 1541 (e.g. the apparatus 1500). The transmitter is coupled to ground. In other words, the interface circuit 1550 is coupled between the transmitter and the supply voltage, whereas the transmitter is coupled between the interface circuit 1550 and ground. As described with more details below in connection with FIG. 21, the transmitter may power down the interface circuit 1550 by decoupling it from ground in order so that the apparatus 1540 is driven to the third mode of operation 1533. That is, the interface circuit 1550 is configured to deactivate in the third mode of operation 1533. When being deactivated during the third mode of operation 1533, the interface circuit 1550 is configured to output a defined signal level to the differential transmission link 1545 (e.g. high signal level/weak pull up) so that the transmission lines of the transmission link 1545 are in a non-floating state.

When the transmitter transitions back to the second mode of operation 1532 and starts sending idle delimiters, the interface circuit is re-coupled to ground. Hence, it is automatically re-activated by the transmitter and driven back to the second mode of operation 1532.

As described above, the transmitter may signal transition to the fourth mode of operation 1534 either via a dedicated delimiter of via the signal level on the transmission lines of the transmission link 1545. For example, the control circuit 1565 may control the circuitry of the apparatus 1540 to operate in the fourth mode of operation 1534 if the data signal 1541 comprises a dedicated sequence of a fourth signal edge of the first type, a fifth signal edge of the second type, and a sixth signal edge of the second type. The processing circuit 1555 may determine the sequence of signal edges in the data signal 1541 and the demodulation circuit 1560 may determine the respective time periods between the signal edges, e.g., a third time period between the fourth signal edge and the fifth signal edge and a fourth time period between the fifth signal edge and the sixth signal edge. The control circuit 1565 may control the circuitry of the apparatus 1540 to operate in the fourth mode of operation 1534 if third time period or the fourth time period is longer than a time period of any payload data symbol of the communication protocol, and the fourth time period or the third time period corresponds to a control symbol of the communication protocol that indicates changeover to the fourth mode of operation 1534. That is, the apparatus 1540 may transit to the fourth mode of operation 1534 if a reserved symbol (delimiter) is broadcasted by the transmitter. In some examples, more than one control symbol (e.g. a cascaded delimiter) may be used for indicating changeover to the fourth mode of operation 1534.

As described above, the common or differential signaling may alternatively be used to allow the apparatus 1540 (which may be understood as a receiver) to detect the state without explicitly transmitting the power state by the transmitter. For example, the control circuit 1565 may control the circuitry of the apparatus 1540 to operate in the fourth mode of operation 1534 if the interface circuit 1550 senses that the transmitter drives both transmission lines of the differential transmission link 1545 to high impedance. The interface circuit 1500 may, e.g., comprise a (small) sensing circuit configured to detect the state (the signal level) of the transmission line(s) of the transmission link 1545 in order to make the apparatus 1540 aware of the power state.

The processing circuit 1555 as well as the demodulation circuit 1560 may be deactivated by the control circuit 1565 in the fourth mode of operation 1534 since no data transmission on the transmission link occurs. Further, the interface circuit 1534 may be deactivated except for the sensing circuit. If the interface circuit 1550 (e.g. the sensing circuit) senses a differential signal pair on the transmission lines of the transmission link 1545, the control circuit 1565 may control to the circuitry of the apparatus 1540 to operate again in the second mode of operation 1532.

Further, if the interface circuit 1550 (e.g. the sensing circuit) senses a defined signal level (e.g. ground) on both transmission lines of the differential transmission link 1545 for a predefined period of time, the control circuit 1565 may be configured to control the circuitry of the apparatus to operate in the fifth mode of operation 1535. In the fifth mode of operation 1535, the interface circuit 1550 may be configured to receive a low bandwidth data signal 1542 from at least one transmission line of the differential transmission link 1545 similar to what is described above.

In the fifth mode of operation 1535, the processing circuit 1555 and the demodulation circuit 1560 may be deactivated due to the lower requirements for decoding the low bandwidth data signal 1542 compared to the data signal 1541. Instead another processing circuit 1570 may be used for determining data based on the low bandwidth data signal 1542. For example, the other processing circuit 1570 may be configured to determine signal edges and/or signal amplitudes of the low bandwidth data signal 1542. Accordingly, the other processing circuit 1570 may be configured to determine data based on the signal edges and/or signal amplitudes of the low bandwidth data signal 1542.

As said above, the same or a different modulation scheme may be used for the low bandwidth data signal 1542 compared to the data signal 1541. Hence, the other processing circuit 1570 may be configured to determine the data based on the low bandwidth data signal 1542 using a different demodulation scheme than the demodulation circuit 1560 for the data signal 1541.

As described above, a bandwidth of the low bandwidth data signal 1542 in the fifth mode of operation 1535 may be (much) lower than a bandwidth of the data signal 1541 in the first mode of operation 1531. For example, the bandwidth of the low bandwidth data signal 1542 may be at least five, ten or fifteen times lower than the bandwidth of the data signal 1541 in the first mode of operation 1531 (e.g. 100 Mbit/sec instead of 20 Gbit/sec).

Due to the lower bandwidth, the apparatus 1540 may operate at a lower rate in the fifth mode of operation 1535 compared to the first mode of operation 1531. In other words, the requirements are more relaxed compared to the first mode of operation 1531. Accordingly, a power consumption of the apparatus in the fifth mode of operation 1535 may be (much) lower than in the first mode of operation 1531.

As described above, the data may be transmitted in a differential manner at least in the first mode of operation. Accordingly, the apparatus 1540 (e.g. the interface circuit 1550) may be configured to terminate the transmission lines of the differential transmission link 1545. Since the low bandwidth data signal 1542 may be single ended data signal, no termination is required. Accordingly, in the fifth mode of operation, the control circuit 1565 may be configured to deactivate the apparatus 1540's termination between the transmission lines of the differential transmission link 1545.

Alternatively, the data may be transmitted over the transmission link 1545 in a differential manner also in the fifth mode of operation 1535. That is, in the fifth mode of operation 1535, the interface circuit 1550 may be configured to receive a second low bandwidth data signal from the other transmission line of the differential transmission link 1545. The second low bandwidth data signal is inverted with respect to the low bandwidth data signal 1542. Accordingly, the other processing circuit 1570 may further configured to determine the data based on the second low bandwidth data signal.

As described above, the low bandwidth data signal 1542 may be transmitted over the transmission link together with a clock signal. Accordingly, in the fifth mode of operation 1535, the interface circuit 1550 may be configured to receive a clock signal from the other transmission line of the differential transmission link 1545. The other processing circuit 1570 may be configured to determine the data in the low bandwidth data signal 1542 using the clock signal (e.g. for determining signal edges or signal amplitudes in the low bandwidth data signal 1542).

Alternatively, the low bandwidth data signal 1542 may be transmitted without a clock signal (e.g. because a second low bandwidth data signal is transmitted over the transmission link 1545). Hence, the receiver side needs to recover the clock (e.g. asynchronously). In other words, the receive side needs to run its own clock. Accordingly, in the fifth mode of operation 1535, the control circuit 1565 may be configured to activate a clock generation circuit 1575 configured to generate a clock signal 1576. For example, the clock generation circuit 1575 may be configured to generate the clock signal 1576 based on the low bandwidth data signal 1542 (e.g. the apparatus 1540 may activate a clock recovery functionality like a clock recovery Phase-Locked Loop, PLL). The other processing circuit 1570 may be configured to determine the data in the low bandwidth data signal 1542 using the clock signal 1576 (e.g. for determining signal edges or signal amplitudes in the low bandwidth data signal 1542).

The transmitter drives the differential transmission link 1545 to ground in order to indicate that the data transmission in the fifth mode of operation 1535 ended. Accordingly, if the interface circuit 1550 senses that the differential transmission link 1545 is at ground for a second predefined period of time (e.g. by means of the sensing circuit) subsequent to receiving the low bandwidth data signal 1542, the control circuit 1565 may control the circuitry of the apparatus 1540 to transition (change) back to the fourth mode of operation 1534.

As described above in connection with FIGS. 15*a* to 15*c*, a transmitter and a receiver of a communication interface according to the STEP protocol may operate in a differential manner in a high speed (full throughput) mode, and operate in a single ended in a LVGP mode. The reduced immunity of the single ended signal compared to differential signals may be compared by the reduced bandwidth.

Like the apparatus 1500, also the apparatus 1540 may go to the sixth mode of operation 1536 (i.e. the off state) in order to enable shut down/reset of the interface.

Further, the apparatus 1540 may go to the sixth mode of operation 1537 when flipping (inverting) the direction of data flow on the transmission link 1545 in order to enable the apparatus 1540 to change to its transmit mode.

The transition time for transitioning (changing) between the different modes of operation may be (substantially) the same for the apparatus 1540 than for the apparatus 1500.

A part of a communication apparatus 1580 in accordance with the above described aspects of the power scheme is illustrated in FIG. 15*d*. The communication apparatus 1580 may be understood as a transceiver since it exhibit transmit and receive functionality.

The communication apparatus 1580 comprises a transmit buffer 1581 and a receive buffer 1582 coupling to a differential transmission link 1587 for outputting and receiving data to the transmission link 1587. Hence, the transmit buffer 1581 and the receive buffer 1582 provide the functionality of the above described interface circuits.

Further, the communication apparatus 1580 comprises a signal generation circuit 1583 for generating a data signal to be output to the transmission link 1587. The signal generation circuit 1583 exhibits the functionality of the above described processing circuits for generating data signals.

Similarly, the communication apparatus 1580 comprises a receive signal processing circuit 1584 for processing a receive signal received from the transmission link 1587, and for determining the data encoded to the receive signal. The receive signal processing circuit 1584 exhibits at least the functionality of the above described processing circuits for determining signal edges and the above described demodulation circuits.

The signal generation circuit 1583 and the receive signal processing circuit 1584 are used for exchanging data in the first to fourth modes of operation 1531 to 1534 illustrated in FIG. 15*b*. For the small amounts of data exchanged in the fifth mode of operation 1535, the communication apparatus 1580 comprises a dedicated LVGP-signal generation circuit 1585 and a dedicated LVGP-receive signal processing circuit 1586. The LVGP-signal generation circuit 1585 exhibits at least the functionality of the other processing circuit 1525 described above in connection with FIG. 15*a*, and the LVGP-receive signal processing circuit 1584 exhibits at least the functionality of the processing circuit 1575 described above in connection with FIG. 15*c*.

In other words, in the fifth mode of operation 1535, the data for the transmit buffer 1581 are generated on a different path, and the data from the receive buffer 1582 are processed on a different path. Accordingly, the blocks left of the transmit buffer 1581 and the receive buffer 1582 may be shut down (power shut) or clock gated in the fifth mode of operation 1535 since they are not required for the LVGP mode.

As described above in connection with FIGS. 15*a* to 15*d*, the STEP protocol may use a few power modes that are unique in terms of exit latency and power (as well as other parameters). According to the STEP protocol, physical layer circuitry may (at least in part) be powered down/clock gated to reduce the power consumption. Transmit and/or receive buffers may be kept active during power down of the other circuitry. Further, the transmit and/or receive buffers may route the data (in or out) to different entities that may parse the data using modulation schemes different from the time encoded scheme of the STEP protocol. During the alternative LVPG mode, an asynchronous protocol or a source synchronous protocol may, e.g., be used according to the STEP protocol. Further, the interface may be configured to operate (for a single transmission link) as two single ended traces or as differential interface. The transition to the LVGP mode and back may be shorter than the transition to the high speed mode by a noticeable factor. The transition to the LVGP mode may be either for a short duration or for a longer duration.

The foregoing description section focused on aspects related optimizing the power consumption of communication interfaces (e.g. according to the STEP protocol). In the following, aspects related to transmitting data demanding high reliability of the transmission are discussed. As indicated above in connection with nesting of data packets into other data packets, some data packets may carry highly reliable data such as control data or status data. In other words, these data packets carry crucial data that requires highly reliable data transmission. For example, a transmission error for these data packets may result in violation of requirements of a communication standard/protocol (e.g. transmission of more energy than allowed), permanent damage to circuitry (e.g. a semiconductor die) or a mismatch between components.

In the following a concept for robust data transmission will be described with respect to FIGS. 16*a* to 16*h*. FIG. 16*a* illustrates an example of an apparatus 1600 for generating a data signal 1601.

The apparatus 1600 comprises a processing circuit 1605 (e.g. a DTC) configured to generate the data signal 1601. The processing circuit 1605 generates the data signal 1601 to comprise a sequence of a first signal edge of a first type, a second signal edge of a second type, and a third signal edge of the first type. The first signal edge and the second signal edge are separated by a first time period, and the second signal edge and the third signal edge are separated by a second time period. For example, the first type may be a rising edge and the second type be a falling edge, or the second type may be a rising edge and the first type be a falling edge.

Further, the apparatus 1600 comprises an output interface circuit 1610 configured to output the data signal 1601 to a transmission link (not illustrated).

In a first mode of operation, the processing circuit 1605 is configured to select the first time period and the second time period from a first plurality of time periods based on data to be transmitted (e.g. payload data or payload data symbols). The time periods of the first plurality of time periods are offset from each other by a first offset time.

In a second mode of operation, the processing circuit 1605 is configured to select the first time period and the second time period from a second plurality of time periods based on the data to be transmitted. The time periods of the second plurality of time periods are offset from each other by at least one second offset time that is greater than the first offset time.

In other words, the delta (the width difference) between possible widths for encoding the data to the data signal 1601 is chosen greater for the second mode of operation. Accordingly, the data signal 1601 is more robust (e.g. less error-prone) in the second mode of operation than in the first mode of operation. For transmitting crucial/highly reliable data, the apparatus 1600 may, hence, use the second mode of operation. The first mode of operation may, e.g., be used for transmitting regular data.

For example, apart from other time encoded communication protocols, apparatus 1600 may be used for communication according to the STEP protocol. A sum of the first time period and the second time period may be lower than $10^{-7}$ s, $10^{-8}$ s, $10^{-9}$ s, $10^{-10}$ s, $10^{-11}$ s, or $10^{-12}$ s in both modes of operation.

An exemplary data signal 1620 is illustrated in FIG. 16*b*. In the left part of FIG. 16*b*, a first pulse 1622 is illustrated. The pulse 1622 starts at rising signal edge 1623 and ends at falling signal edge 1624. As indicated, a position of falling signal edge 1624 is adjustable by the processing circuit 1605 based on the data that is to be encoded to the data signal. In the example of FIG. 16*b*, seven different possible positions for falling signal edge 1624 are illustrated (labelled 0 to 6). Position 0 defines a minimum pulse length for pulse 1622. Accordingly, seven different time periods between the rising signal edge 1623 and the falling signal edge 1624 may be adjusted. In other words, seven different pulse lengths may be adjusted. As for the example illustrated in FIG. 12*b*, the different time periods differ by a (constant) symbol separation time ΔT.

For example, the first plurality of time periods may comprise all seven possible time periods between the rising signal edge 1623 and the falling signal edge 1624, whereas the second plurality of time periods may, e.g., comprise only the shortest possible time period and the longest possible time period of the seven possible time periods between the rising signal edge 1623 and the falling signal edge 1624 (indicated by positions 0 and 6). That is, each pulse can indicate two different states in the second mode of operation. In other words, each pulse can carry a single bit (e.g. 0 or 1). Hence, in the second mode of operation, the possible time periods of the second plurality of time periods are seven symbol separation times ΔT distant from each, whereas the possible time periods of the first plurality of time periods are one symbol separation time ΔT distant from each other in the first mode of operation. In other words, the first offset time between the time periods of the first plurality of time periods is equal to the symbol separation time ΔT, whereas the second offset time between the time periods of the second plurality of time periods is equal to the seven times the symbol separation time ΔT.

Similarly, for the consecutive second pulse 1625 (i.e. the succeeding low pulse) all seven possible time periods between the falling signal edge 1624 and the rising signal edge 1626 may be used in the first mode of operation, whereas only the only the shortest possible time period and the longest possible time period of the seven possible time periods between the falling signal edge 1624 and the rising signal edge 1626 may be used in the second mode of operation. Hence, two bits may be encoded to one oscillation cycle of the data signal.

Due to the great spacing between the signal edges used in the second mode of operation, the robustness of the signal may be very high and the chance for an error (super) small.

It is to be noted that the example of FIG. 16*b* is merely an example. For example, the first plurality of periods may comprise four, five, six, eight, nine, ten, eleven, twelve or more different time periods instead of seven different time periods like in FIG. 16*b*. In some examples, the first plurality of time periods may comprise at least six time periods.

Similarly, the second offset time may be two times, three times, four times, five times, six times, eight times or more the first offset time instead of seven times like in FIG. 16*b*. In order to enable a significantly higher robustness compared to the data signal generated in the first mode of operation, the second offset time may be at least two times the first offset time.

As can be seen from the above examples, the second plurality of time periods may comprise in total less time periods than the first plurality of time periods.

For example, eight possible time periods between the rising signal edge and the falling signal edge of a pulse may be used for the first mode of operation, and the second plurality of time periods may only comprise the shortest possible time period and the longest possible time period of the eight possible time periods between the rising signal edge and the falling signal edge of a pulse. Then, each edge may carry a single bit in the second mode of operation (0 or 1) so that a single oscillation cycle of the data signal carries 2 bits. However, since they are seven symbol separation times ΔT distant from each other, the encoding of the data to the data signal may be very robust. In the first mode of operation, the eight different possible time periods between the rising signal edge and the falling signal edge of a pulse (i.e. the eight different possible pulse widths) may allow to encode $2^3$=8 bits to one pulse (e.g. each low or high time of the data signal).

Assuming that a minimum pulse width corresponding to position 0 is 80 ps (picoseconds), the bit value 0 is encoded as 80 ps long pulse to the data signal in the second mode of operation. Further assuming that the symbol separation time ΔT is 15 ps, the maximum pulse width is 185 ps. That is, the bit value 1 is encoded as 185 ps long pulse to the data signal in the second mode of operation. Accordingly, there is a quite large difference between the encoding of the bit values zero and one to the data signal. This may allow robust and highly reliable decoding of the data signal for a receiver. For example, each pulse having a duration of less 125 ps may be translated to the bit value 0, and any pulse duration greater than 125 ps may be translated to the bit value 1.

Regarding the eight possible pulse widths between the rising signal edge and the falling signal edge of a pulse (e.g. possible pulse widths 0 to 7), the pulse widths 0, 1, 2 and 3 may, e.g., be translated back to the bit value zero at the receive side, and the pulse widths 4, 5, 6 and 7 may be translated back to the bit value one.

In other words, the second plurality of time periods may comprise two time periods, wherein in the second mode of operation the first time period corresponds to a first digit of a base two numeral system representation of the data to be transmitted and the second time period corresponds to a second digit of the base two numeral system representation of the data to be transmitted.

In some examples, the processing circuit 1605 may be further configured to replicate at least one bit of the data to be transmitted a predefined number of times in the second mode of operation. Accordingly, the processing circuit 1605 may be further configured generate the data signal 1601 based on the bit and the predefined number of replicas of the bit. For example, the predefined number for replicating the bit may two, three, four, five or more.

In the apparatus 1600, every bit to be transmitted may, e.g., replicated three times so that a bit 0 is transmitted as 000, and a bit 1 is issued as 111. Replicating the bits to be transmitted may further increase the reliability/robustness of the data transmission.

Another example using three different possible time periods (codes) for the second mode of operation is illustrated in FIG. 16*c*. FIG. 16*c* illustrates another example of a data signal 1630. In the left part of FIG. 16*c*, a first pulse 1632 is illustrated. The pulse 1632 starts at rising signal edge 1633 and ends at falling signal edge 1634. In the example of FIG. 16*c*, seven different possible positions for falling signal edge 1634 are illustrated (labelled 0 to 6). Position 0 defines again a minimum pulse length for pulse 1632, and position 6 defines a maximum pulse length. The different time periods differ again by a (constant) symbol separation time ΔT.

Similarly, the consecutive (low) pulse 1625 between the falling signal edge 1634 and the rising signal edge 1636 may be adjusted to seven different time periods.

Again, all seven possible time periods between the rising signal edge and the falling signal edge of a pulse may be used for the first mode of operation. In contrast to the example of FIG. 16*b*, the second plurality of time periods comprises the shortest possible time period of the seven possible time periods, the longest possible time period of the seven possible time periods and an intermediate possible time period of the seven possible time periods between the rising signal edge and the falling signal edge of a pulse. For example, the time periods indicated by positions 0, 3 and 6 in FIG. 13*b* may be used for the second plurality of time periods.

Accordingly, three different codes may be encoded to one pulse (one signal edge). Compared to the example of FIG. 16*b*, the transport efficiency may be increased for the tradeoff of a slightly lower robustness.

Again, it is to be noted that the example of FIG. 16*c* is merely an example. Other numbers for the possible time periods and time offsets may be used. For example, eight possible time periods between the rising signal edge and the falling signal edge of a pulse may be used for the first mode of operation, and only three out of the eight possible time periods may be used for the second mode of operation. Among the eight possible time periods 0 to 7, the time periods 0, 3 and 7 may, e.g., be used for the second mode of operation.

Accordingly, each pulse (signal edge) may carry three different codes so that four pulses (signal edges) may carry $3^4$=81 different options, i.e. encode 81 different options to the data signal. For encoding 6 bits of data to the data signal $2^6$=64 different options are required. That is, 6 bits may be mapped (encoded) to four consecutive pulses (signal edges) of the data signal in the second mode of operation since each pulse can have three different pulse lengths. In the first mode of operations, the eight possible time periods allow to encode 12 bits to four consecutive pulses (signal edges) of the data signal (three bits per pulse).

Accordingly, an efficiency of the second mode of operation compared to the first mode of operation is 6/12 for the above example. As a comparison, the efficiency of the second mode of operation compared to the first mode of operation is 4/12 if each pulse can only have two different pulse lengths in the second mode of operation. As said above, using more possible pulse lengths for the second mode of operation may allow to increase the transport efficiency for the tradeoff of a slightly lower robustness. Using a distance of three symbol separation times ΔT between the possible time periods of the second mode of operation may allow pulse lengths (time periods) in the data signal that are up to 1.5 bits away from their nominal length (duration) to gravitate back to the original code at the receive side.

Similarly, six pulses (signal edges) providing 729 different options may be used to map nine bits ($2^9$=512) to the data signal in the second mode of operation (efficiency 9/18). Alternatively, twelve bits may be mapped to seven pulse (signal edges). Likewise, 14 pulse (signal edges) providing $3^{14}$=4564269 different options may be used to map 22 bits ($2^{22}$=4194304) to the data signal in the second mode of operation (efficiency 22/42).

By increasing the number of bits in a transport block encoded to the edges, the efficiency of the transport using three possible signal edges may reach up to K=52% ($2^x$=3, K=x/3).

Mapping the data to one of three different possible time periods in the second mode of operation may be understood as a conversion of the data to a base three number (e.g. a conversion from a binary number to a base three number).

Accordingly, in the second mode of operation, the processing circuit 1605 may be further configured to convert the data to be transmitted to a base three numeral system representation. Further, the processing circuit 1605 may be configured to generate the data signal 1601 such that the first time period in the data signal 1601 corresponds to a first digit of the base three numeral system representation of the data to be transmitted, and that the second time period corresponds to a second digit of the base three numeral system representation of the data to be transmitted.

For example, the processing circuit 1605 may convert the basic transfer unit (e.g. 6, 9 or 22 bits as described above) to a base two number. After conversion to the base three numeral system, each digit (e.g. 0, 1, or 2) is coded as pulse exhibiting the time period 0, 3 or 7 out of the eight possible time periods 0 to 7.

On the receive side, this may allow to translate, e.g., the pulse widths 0, 1 back to digit 0, the pulse widths 2, 3 and 4 to digit 1 and the pulse widths 5, 6 and 7 to the digit 2 of the base three numeral system. The data may be recovered by converting the base three digits back to binary code.

As can be seen from the above examples, the time periods of the second plurality of time periods may be offset from each other by a single second offset time or by different second offset times. However, the one or more second offset times are always greater than the first offset time.

The apparatus 1600 may further be configured to output the data in a differential manner to the transmission link. That is, the processing circuit 1605 may be further configured to generate a second data signal that is inverted with respect to the data signal 1601. Further, the output interface circuit 1610 may be configured to output the second data signal to the transmission link.

As described above, the alternative modulation scheme for highly reliable transmission of data may differ from the regular modulation scheme in that less data is encoded into one pulse of the data signal. In order to summarize this aspect, FIG. 16*d* illustrates another apparatus 1640 for generating a data signal 1641. Like the apparatus 1600, the apparatus 1640 comprises a processing circuit 1645 (e.g. a DTC) configured to generate the data signal 1641 such that the data signal 1641 comprises a sequence of a first signal edge of a first type, a second signal edge of a second type, and a third signal edge of the first type. Again, the first type may be a rising edge and the second type be a falling edge, or the second type may be a rising edge and the first type be a falling edge.

Further, the apparatus 1640 comprises an output interface circuit 1650 configured to output the data signal 1641 to a transmission link (not illustrated).

In a first mode of operation, the first signal edge and the second signal edge in the data signal 1641 are separated by a first time period corresponding to first data of a first amount, and the second signal edge and the third signal edge are separated by a second time period corresponding to second data of the first amount.

In a second mode of operation, the first signal edge and the second signal edge in the data signal 1641 are separated by a third time period corresponding to third data of a smaller second amount, and the second signal edge and the third signal edge are separated by a fourth time period corresponding to fourth data of the second amount.

For example, as described above in connection with FIGS. 16*b* and 16*c*, three bits of data may be encoded to the time periods between consecutive signal edges in the first mode of operation, respectively, and one bit of data may be encoded to the time periods between consecutive signal edges in the second mode of operation, respectively.

Accordingly, the data signal 1641 may be more robust (e.g. less error-prone) in the second mode of operation than in the first mode of operation. Therefore, the second of operation may be used for transmitting data that are crucial/highly reliable. The first mode of operation may, e.g., be used for transmitting regular data.

For example, apart from other time encoded communication protocols, apparatus 1640 may be used for communication according to the STEP protocol. A sum of the first time period and the second time period may be lower than $10^{-7}$ s, $10^{-8}$ s, $10^{-9}$ s, $10^{-10}$ s, $10^{-11}$ s, or $10^{-12}$ s in both modes of operation.

Similar to what is described above in connection with FIGS. 16*b* and 16, the processing circuit 1645 may, e.g., be configured to select the first time period and the second time period from a first plurality of time periods, wherein the first plurality of time periods is offset from each other by a first offset time. Further, the processing circuit 1645 may be configured to select the third time period and the fourth time period from a second plurality of time periods, wherein the second plurality of time periods are offset from each other by a at least one second offset time that is greater than the first offset time (e.g. time periods 0, 3 and 7 among the eight time periods 0 to 7 as described above). Again, the second offset time may be at least two times the first offset time. Also, the second plurality of time periods may comprise less time periods than the first plurality of time periods. The first plurality of time periods may, e.g., comprise at least six time periods.

The second plurality of time periods may in some examples, e.g., comprise two time periods as described above in connection with FIG. 16*b*. Accordingly, the third data may be a first digit of a base two numeral system representation of data to be transmitted, and the fourth data may be a second digit of the base two numeral system representation of the data to be transmitted.

In some examples, the second plurality of time periods may, e.g., comprise three time periods. The processing circuit 1645 may then be further configured to convert data to be transmitted to a base three numeral system representation as described above in connection with FIG. 16*c*. Accordingly, the third data may be a first digit of the base three numeral system representation of the data to be transmitted, and the fourth data may be a second digit of the base three numeral system representation of the data to be transmitted.

Also for the apparatus 1640, the processing circuit 1645 may in the second mode of operation be configured to replicate at least one bit of the data to be transmitted a predefined number of times (e.g. three times or more) and to generate the data signal 1641 based on the bit and the predefined number of replicas of the bit. Replicating the data to be transmitted may further increase the reliability/robustness of the data transmission.

Also the apparatus 1640 may in some examples be configured to output the data in a differential manner to the transmission link. That is, the processing circuit 1645 may be further configured to generate a second data signal that is inverted with respect to the data signal 1641. Further, the output interface circuit 1650 may be configured to output the second data signal to the transmission link.

The apparatus 1640 or circuitry of the apparatus 1640 may in some examples further be configured to execute/implement one or more additional optional features described above in connection with FIGS. 16*b* and 16*c*.

While the foregoing description of FIGS. 16*a* to 16*d* focused mainly on the generation of (ultra) reliable data signals, the following paragraphs will focus on decoding an according data signal. FIG. 16*e* illustrates an apparatus 1660 for decoding a data signal 1661.

Similar to the above described apparatuses for decoding a data signal, the apparatus 1660 comprises a processing circuit 1665 (e.g. a TDC) configured to determine a sequence of a first signal edge of a first type, a second signal edge of a second type, and a third signal edge of the first type in the data signal 1661. For example, the first type may be a rising edge and the second type be a falling edge, or the second type may be a rising edge and the first type be a falling edge.

The apparatus 1660 additionally comprises a demodulation circuit 1670 configured to determine, in a first mode of operation, first data based on a first time period between the first signal edge and the second signal edge. In the first mode of operation, the demodulation circuit 1670 is further configured to determine second data based on a second time period between the second signal edge and the third signal edge.

In a second mode of operation, the demodulation circuit 1670 is configured to determine a first reference time period of a plurality of reference time periods that is closest to the first time period between the first signal edge and the second signal edge, and a second reference time period of the plurality of reference time periods that is closest to the second time period between the second signal edge and the third signal edge. Further, the demodulation circuit 1670 is configured to determine third data based on the first reference time period, and fourth data based on the second reference time period.

For example, referring to the example described in connection with FIG. 16*c*, the plurality of reference time periods may comprise the time periods 0, 3 and 7 out of the eight possible time periods 0 to 7 for the length of a pulse in the data signal 1641. Accordingly, the demodulation circuit 1670 may compare an actual length (duration) of a pulse in the data signal 1611 to the time periods 0, 3 and 7 and select the one out of the time periods 0, 3 and 7 that is closest to the actual length (duration) of the pulse in the data signal 1641. For example, if a pulse in the data signal 1661 exhibits the pulse widths 0 or 1, the demodulation circuit 1670 may determine the allowed time period 0 as length of the pulse. If the pulse exhibits the pulse widths 2, 3 or 4, the demodulation circuit 1670 may determine the allowed time period 3 as length of the pulse.

Further, if the pulse exhibits the pulse widths 5, 6 or 7, the demodulation circuit 1670 may determine the allowed time period 7 as length of the pulse. Each of the allowed time periods 0, 3 and 7 is associated with certain data (e.g. a certain bit value or a certain payload data symbol) so that the data encoded to the data signal 1661 is decoded by the demodulation circuit 1670.

In the first mode of operation, the demodulation circuit 1670 may, e.g., compare the actual length (duration) of the pulse to each of the eight possible time periods 0 to 7 and, hence, decode the data encoded to the data signal 1661. In other words, the demodulation circuit 1670 may be configured to determine the predefined possible time periods of the plurality of predefined possible time periods that are closest to the first time period and the second time periods in the first mode of operation, and to determine the first data and the second data based on these predefined possible time periods.

In other words, the demodulation circuit 1670 may be configured to determine the first data and the second data using a plurality of predefined possible time periods (e.g. possible time periods 0 to 7) in the first mode of operation, wherein the plurality of reference time periods used in the second mode of operation is a subset of the plurality of predefined possible time periods.

Due to the greater timely spacing between the allowed pulse lengths in the second mode of operation, the decoding may be more robust than for the second mode of operation. Accordingly, the robustness of data transmission may be increased.

A sum of the first time period and the second time period may, e.g., be lower than $10^{-7}$ s, $10^{-8}$ s, $10^{-9}$ s, $10^{-10}$ s, $10^{-11}$ s, or $10^{-12}$ s according to the STEP protocol.

The data encoded to the data signal 1661 may, e.g., be in a base three numeral system representation as described above. That is, in some examples, the third data determined by the demodulation circuit 1670 may correspond to a first digit of the base three numeral system representation of the data, and the fourth data may correspond to a second digit of the base three numeral system representation of the data. For enabling further data processing in the more conventional binary representation, the demodulation circuit 1670 may be configured to generate a base two numeral system representation (a binary representation) of the data based on the third data and the fourth data.

As described above, the data may be transmitted in a differential manner. Accordingly, the processing circuit 1670 may be configured to receive a second data signal that is inverted with respect to the data signal 1661 in some examples. Accordingly, the processing circuit 1670 may be configured to determine the first signal edge, the second signal edge, and the third signal edge further based on the second data signal.

The mode of operation for the apparatuses described above in connection with FIGS. 16*a* to 16*e* may be selected by different layers of the underlying communication protocol (e.g. the STEP protocol). In other words, different layers of the communication protocol may decide to transmit or mark a data packed as ultra-reliable and accordingly control a transmitter and/or a receiver of the data packet. For example, the physical layer may take the decision. In some examples, the MAC layer may take the decision. Deciding in the MAC layer may be simpler to implement compared to the physical layer and, e.g., be done using RTL (Register Transfer Language) code and synthesized using automated tools as well as be verified with automation. For example, the MAC layer may decide that one or more data packets need to be sent as ultra-reliable, then the MAC layer may control mapping of the data according to the above described ultra-reliable modulation scheme.

The apparatuses described above in connection with FIGS. 16*a* to 16*e* may, e.g., comprises a respective control circuit configured to control the operation of the circuitry of the apparatus based on a received control signal that indicates the mode of operation (e.g. generated by circuitry of the MAC layer or the physical layer).

In order to summarize the above aspects on highly reliable transmission of data, FIG. 16*f* illustrates an example of a method 1600*f* for generating a data signal. The method comprises generating 1602*f* the data signal. The data signal comprises a sequence of a first signal edge of a first type, a second signal edge of a second type, and a third signal edge of the first type. The first signal edge and the second signal edge are separated by a first time period and the second signal edge and the third signal edge are separated by a second time period. In a first mode of operation, generating 1602*f* the data signal comprises selecting the first time period and the second time period from a first plurality of time periods based on data to be transmitted. The first plurality of time periods are offset from each other by a first offset time. In a second mode of operation, generating 1602*f* the data signal comprises selecting the first time period and the second time period from a second plurality of time periods based on the data to be transmitted.

The second plurality of time periods are offset from each other by a second offset time greater than the first offset time. The method 1600*f* further comprises 1604*f* outputting the data signal.

More details and aspects of method 1600*f* are mentioned in connection with the proposed technique or one or more examples described above (e.g. FIGS. 16*a* to 16*c*). The method may comprise one or more additional optional features corresponding to one or more aspects of the proposed technique or one or more examples described above.

Another example of a method 1600*g* for generating a data signal is illustrated in FIG. 16*g*. Method 1600*g* comprises generating 1602*g* the data signal. The data signal comprises a sequence of a first signal edge of a first type, a second signal edge of a second type, and a third signal edge of the first type. In a first mode of operation, the first signal edge and the second signal edge are separated by a first time period corresponding to first data of a first amount, and the second signal edge and the third signal edge are separated by a second time period corresponding to second data of the first amount. In a second mode of operation, the first signal edge and the second signal edge are separated by a third time period corresponding to third data of a smaller second amount, and the second signal edge and the third signal edge are separated by a fourth time period corresponding to fourth data of the second amount. Further, method 1600*g* comprises outputting 1604*g* the data signal.

More details and aspects of method 1600*g* are mentioned in connection with the proposed technique or one or more examples described above (e.g. FIG. 16*d*). The method may comprise one or more additional optional features corresponding to one or more aspects of the proposed technique or one or more examples described above.

An example of a method 1600*h* for decoding a data signal is illustrated in FIG. 16*h*. Method 1600*h* comprises determining 1602*h* a sequence of a first signal edge of a first type, a second signal edge of a second type, and a third signal edge of the first type in the data signal. In a first mode of operation, method 1600*h* further comprises determining 1604*h* first data based on a first time period between the first signal edge and the second signal edge, and determining 1606*h* second data based on a second time period between the second signal edge and the third signal edge. In a second mode of operation, method 1600*h* comprises determining 1608*h* a first reference time period of a plurality of reference time periods that is closest to the first time period and a second reference time period of the plurality of reference time periods that is closest to the second time period. Method 1600*h* further comprises determining 1610*h* third data based on the first reference time period, and 1612*h* determining fourth data based on the second reference time period.

More details and aspects of method 1600*h* are mentioned in connection with the proposed technique or one or more examples described above (e.g. FIG. 16*e*). The method may comprise one or more additional optional features corresponding to one or more aspects of the proposed technique or one or more examples described above.

In accordance with the above disclosure, the STEP protocol may use a reliable code by grouping few phases as a single bit. Further, the STEP protocol may use reliable code by mapping a set of bits to a base 3 representation and transport the data as base three numbers. The STEP protocol may further allow to establish an interface connection before the reliability is established (may e.g. be used for a negotiation phase). Further, the balancing of throughput and reliability may be balanced at a (fully) dynamic scheme.

Another aspect of interest for a communication interface may be the awareness of the communication partners about the capabilities of each other. For example, if devices originating from different generations of a communication standard communicate with each other, the performance and the features of the devices may be different since interface performance and supported interface features may evolve. Over generations of a communication interface, the bit rate may be improved, a power consumption may be reduced or some features may be removed in order to enable a cost reduction or power consumption reduction. However, all these features may affect the performance of the communication between the devices. Further, the communication partners may benefit from knowing the characteristics of the communication channel. In the following, an exemplary link establishment negotiation flow that may allow to optimize the communication between devices is described in connection with FIGS. 17*a* to 17*c*.

FIG. 17*a* illustrates a communication system 1700 comprising a first communication apparatus 1710 and a second communication apparatus 1730 that are coupled via a transmission link 1705. The first communication apparatus 1710 comprises an interface circuit 1715 configured to couple to the transmission link 1705, and the second communication apparatus 1730 comprises an interface circuit 1735 configured to couple to the transmission link 1705.

The interface circuit 1735 of the second communication apparatus 1730 is configured to transmit first data indicative of communication capabilities of the communication apparatus 1730 via the transmission link 1705 to the first communication apparatus 1710. The first data indicates communication related features or specifications supported by the second communication apparatus 1730. For example, the first data may indicate at least one of a maximum data rate supported by the apparatus, power modes supported by the apparatus, a maximum amplitude supported by the apparatus, and a maximum number of transmission links supported by the second communication apparatus 1730 for communicating with the first communication apparatus 1710. Further, the first data indicates that the second communication apparatus 1730 supports transmission link characterization. Transmission link characterization is a procedure/flow for characterizing the transmission link between the second communication apparatus 1730 and the first communication apparatus 1710, i.e. the transmission link 1705.

The interface circuit 1715 of the first communication apparatus 1710 is configured to receive the first data indicative of the communication capabilities of the second communication apparatus 1730 via the transmission link 1705.

The first communication apparatus 1710 further comprises a processing circuit 1720 configured to determine from the first data whether the sender of the first data supports transmission link characterization. If the sender supports transmission link characterization, processing circuit 1720 is further configured to generate a predefined test signal for transmission link characterization. Since the second communication apparatus 1730 indicated in the first data that it supports transmission link characterization, the processing circuit 1720 of the first communication apparatus 1710 generates the predefined test signal. For example, the test signal may represent a predefined data, frequency, amplitude or phase pattern for testing/characterizing the transmission link 1705. In some examples, a frequency sweep may, e.g., be used for characterizing the transmission link 1705. That is, the test signal may exhibit a varying frequency within a pre-determined frequency range.

The interface circuit 1715 of the first communication apparatus 1710 is configured to output the test signal to the transmission link 1705. On the other side, the interface circuit 1735 of the second communication apparatus 1730 receives the test signal from the first communication apparatus 1710 via the transmission link 1705 in response to transmitting the first data.

The processing circuit 1740 of the second communication apparatus 1730 is configured to determine at least one characteristic of the transmission link 1705 based on the received test signal. For example, the processing circuit 1740 may determine a bandwidth of the transmission link 1705, a Bit Error Rate (BER) of the transmission link 1705, an attenuation of the transmission link 1705, or any other characteristic that allows to describe the transmission link 1705's signal transmission behavior.

Accordingly, the second communication apparatus 1730 may allow to determine the quality and/or reliability of the transmission link 1705. These pieces of information about the communication link between the first communication apparatus 1710 and the second communication apparatus 1730 may be used by both communication apparatuses for adapting their communication to the channel conditions.

In order to inform the first communication apparatus 1710 about the channel conditions on the transmission link 1705, the interface circuit 1725 may be configured to transmit second data indicative of the at least one characteristic of the transmission link 1705 (as determined by the processing circuit 1740) to the first communication apparatus 1710. As mentioned above, the second data is based on the test signal previously transmitted by the first communication apparatus 1710.

Accordingly, the interface circuit 1715 of the first communication apparatus 1710 may be further configured to receive the second data indicative of at least one characteristic of the transmission link 1705 from the second communication apparatus 1730.

The first communication apparatus 1710 may act as a master device and determine the parameters for exchanging data between both communication apparatuses. For example, the processing circuit 1720 of the first communication apparatus 1710 may be further configured to determine at least one communication parameter for exchanging data with the second communication apparatus 1730 via the transmission link 1705 based on the first data and the second data.

In some examples, the processing circuit 1720 may additionally use further data about quantities that may influence the communication between both communication apparatuses via the transmission link 1705. For example, the processing circuit 1740 may be further configured to determine the at least one communication parameter based on third data indicative of communication capabilities of the first communication apparatus 1710 itself.

The processing circuit 1740 may, e.g., determine a data rate or a signal amplitude for exchanging data between both communication apparatuses via the transmission link 1705. Accordingly, the data exchange between both communication apparatuses may be optimized. Similarly, the processing circuit 1740 may, e.g., determine power modes (states) that may be used during idle times of the data exchange between both communication apparatuses in order to improve an energy efficiency of the communication system 1700.

In order to inform the second communication apparatus 1730 about the optimized parameters for communication via the transmission link 1705, the interface circuit 1715 of the first communication apparatus 1710 may be configured to output an information signal indicative of the at least one communication parameter to the transmission link 1705. The input interface circuit 1735 of the second communication apparatus 1730 may be configured to receive the information signal. The processing circuit 1740 or any other control circuitry of the second communication apparatus 1730 may use the information about the at least one communication parameter for adapting/tuning/controlling the communication circuitry of the second communication apparatus 1730 based on this information.

Similarly, the processing circuit 1720 or any other control circuitry of the first communication apparatus 1710 may use the information about the at least one communication parameter for adapting/tuning/controlling the communication circuitry of the first communication apparatus 1710 based on this information.

For example, after determining the at least one communication parameter, the processing circuit 1720 may be further configured to generate a data signal taking into account the at least one communication parameter. For example, depending on the determined bandwidth for data exchange over the transmission link 1705 (the communication channel), the processing circuit 1720 may, e.g., use a lower amplitude that may allow to save power for a low bandwidth and drive extra voltage for a higher bandwidth.

The processing circuit 1720 may generate the data signal to comprise a sequence of a first signal edge of a first type, a second signal edge of a second type, and a third signal edge of the first type. The first type may be a rising edge and the second type be a falling edge, or the second type may be a rising edge and the first type be a falling edge. The processing circuit 1720 generates the data signal such that the first signal edge and the second signal edge are separated by a first time period corresponding to fourth data to be transmitted, the second signal edge and the third signal edge being separated by a second time period corresponding to fifth data to be transmitted. For example, the fourth data may be a first payload data symbol and the fifth data be a second payload data symbol to be transmitted according to a communication protocol (e.g. the STEP protocol). Apart from other time encoded communication protocols, communication system 1700 may be used for communication according to the STEP protocol. A sum of the first time period and the second time period may be lower than $10^{-7}$ s, $10^{-8}$ s, $10^{-9}$ s, $10^{-10}$ s, $10^{-11}$ s, or $10^{-12}$ s.

The interface circuit 1715 of the first communication apparatus 1710 may be configured to output the data signal to the transmission link 1705 for transmission to the second communication apparatus 1730.

On the other side, the processing circuit 1740 of the second communication apparatus 1730 may be configured to determine the sequence of the first signal edge, the second signal edge, and the third signal edge in the data signal. For demodulation, the second communication apparatus 1730 may further comprise a demodulation circuit 1745 configured to determine the fourth data based on the first time period between the first signal edge and the second signal edge, and to determine fifth data based on a second time period between the second signal edge and the third signal edge.

Also the first and second communication apparatuses 1710 and 1730 may in some examples be configured to exchange data in a differential manner over the transmission link 1705. For example, the processing circuit 1720 of the first communication apparatus 1710 may be further configured to generate a second data signal that is inverted with respect to the data signal. The interface circuit 1715 may be configured to output the second data signal to the transmission link 1705. Similarly, the interface circuit 1735 of the second communication apparatus 1730 may be further configured to receive the second data signal, and the processing circuit 1740 may be further configured to determine the first signal edge, the second signal edge, and the third signal edge further based on the second data signal.

Although a data transmission from the first communication apparatus 1710 to the second communication apparatus 1730 is described above, it is to be noted that data may be transmitted from the second communication apparatus 1730 to the first communication apparatus 1710 in an equivalent manner.

Also the above described first data indicative of the communication capabilities of the second communication apparatus 1730 may be transmitted to the first communication apparatus in a time encoded manner. For example, the processing circuit 1740 of the communication apparatus 1730 may be configured to generate a capability information signal comprising the first data. The processing circuit 1740 may generate the capability information signal to comprise a sequence of a fourth signal edge of the first type, a fifth signal edge of the second type, and a sixth signal edge of the first type. The fourth signal edge and the fifth signal edge are separated by a third time period corresponding to a first portion of the first data, and the fifth signal edge and the sixth signal edge are separated by a fourth time period corresponding to a second portion of the first data.

In order to increase a reliability of the transmission of the first data, the ultra-reliable modulation scheme described above in connection with FIGS. 16*a* to 16*h* may be used. For example, if the first time period and the second time period for encoding the regular transmit data are offset from each other by a first offset time, the processing circuit 1740 may be configured to select the third time period and the fourth time period for encoding the first data to the capability information signal from a plurality of time periods that are offset from each other by at least one second offset time being greater than the first offset time.

That is, the processing circuit 1740 may be configured to generate the capability information signal to exhibit a lower data rate than the data signal. In other words, the processing circuit 1720 of the first communication apparatus 1710 may be configured to generate the data signal to exhibit a higher data rate than the received capability information signal.

On the side of the communication apparatus 1710, the processing circuit 1720 configured to determine the sequence of the fourth signal edge, the fifth signal edge, and the sixth signal edge in the capability information signal received from the second communication apparatus 1730. For demodulation, the first communication apparatus 1710 may further comprise a demodulation circuit 1725 configured to determine a first reference time period of a plurality of reference time periods that is closest to the first time period between the first signal edge and the second signal edge. Similarly, the demodulation circuit 1725 may be configured to determine a second reference time period of the plurality of reference time periods that is closest to the second time period between the second signal edge and the third signal edge. Based on the first reference time period, the demodulation circuit 1725 may be further configured to determine a first portion of the first data. Likewise, the demodulation circuit 1725 may be configured to determine a second portion of the first data based on the second reference time period.

The first data may be an example for crucial or highly reliable data as described above in connection with FIGS. 16*a* to 16*h*.

The exchange of the first data as well as the transmission link characterization may be done in response to predefined events, on a regular basis or on request. For example, if the first communication apparatus 1710 is plugged into a socket of the transmission link 1705, the interface circuit 1715 may be configured to output a polling signal to the transmission link 1705 that comprises a request to the second communication apparatus 1730 to transmit information about its communication capabilities to the first communication apparatus 1710. Similarly, if dedicated circuitry of the first communication apparatus 1710 detects that the second communication apparatus 1730 is plugged into a socket of the transmission link 1705, the interface circuit 1715 may be configured to output the polling signal. Alternatively, the interface circuit 1715 may be configured to output the polling signal regularly (e.g. after a predetermined period of time lapsed). Further alternatively, the interface circuit 1715 may be configured to output the polling signal upon occurrence of one or more predetermined events. For example, if dedicated circuitry of the first communication apparatus 1710 detects that a communication parameter deviates from a nominal value (set point), the interface circuit 1715 may be configured to output the polling signal On the other hand, the interface circuit 1735 of the second communication apparatus 1730 may be configured to receive a polling signal via the transmission link 1705, and output the first data in response to receiving the polling signal.

In order to summarize the above aspects on link establishment negotiation, FIG. 17*b* illustrates an example of a communication method 1700*b* for a communication apparatus. The communication method 1700*b* comprises coupling 1702*b* the communication apparatus to a transmission link. The communication method 1700*b* further comprises receiving 1704*b*, from another communication apparatus via the transmission link, first data indicative of communication capabilities of the other communication apparatus. Additionally, the communication method 1700*b* comprises determining 1706*b* from the first data whether the other communication apparatus supports transmission link characterization. If the other communication apparatus supports transmission link characterization, the communication method 1700*b* further comprises generating 1708*b* a predefined test signal and outputting 1710*b* the test signal to the transmission link.

More details and aspects of method 1700*b* are mentioned in connection with the proposed technique or one or more examples described above (e.g. FIG. 17*a*). The method may comprise one or more additional optional features corresponding to one or more aspects of the proposed technique or one or more examples described above.

A complementary further example of a communication method 1700*c* for a communication apparatus is illustrated in FIG. 17*c*. The communication method 1700*c* comprises coupling 1702*c* the communication apparatus to a transmission link. The communication method 1700*c* further comprises transmitting 1704*c* first data indicative of communication capabilities of the communication apparatus via the transmission link to another communication apparatus. The first data further indicates that transmission link characterization is supported. Additionally, the communication method 1700*c* comprises receiving 1706*c* a predefined test signal from the other communication apparatus via the transmission link, and determining 1708*c* at least one characteristic of the transmission link based on the test signal.

More details and aspects of method 1700*c* are mentioned in connection with the proposed technique or one or more examples described above (e.g. FIG. 17*a*). The method may comprise one or more additional optional features corresponding to one or more aspects of the proposed technique or one or more examples described above.

For the STEP protocol, the above link establishment negotiation flow may allow to tune, e.g., the bit rate, redundancy or power as a function of the channel performance. The flow may also be used for applications in which the channel is not expected to change often. As described above, the transmitter may be the master of the channel and the receiver may be the slave. In a first part of the two way communication, each side may "collect" information from the other about its respective capabilities such as maximum bit rate, maximum swing, power modes, number of lines (lanes) etc. This collection may use the ultra-reliable modulation scheme described above. Further, the slave will signal to the master if it further supports the second part of the flow. If the second part is supported, the master may run a set of agreed on patterns that will allow the receiver to determine if the channel is reliable (may include multiple patterns). After the master sent the patterns, it will collect the results from the receiver that may allow to decide if, e.g., an expected behavior, bandwidth etc. is achieved. Power or bandwidth of the interface may be adapted accordingly. The STEP protocol may facilitate a silicon solution that is either integrated in the regular circuits or a very small external circuit for facilitating the negotiation phase. Further, the STEP protocol may enable to apply a data pattern that allows to take the channel characteristics into account as part of the total considerations.

Another interesting aspect for communication interfaces using time encoded modulation schemes such as the STEP protocol may be backwards compatibility to circuitry using communication protocols based on Pulse Amplitude Modulation (PAM). In the following, circuits and methods are described in connection with FIGS. 18*a* to 18*g* that may allow to communicate with circuitry using time encoded modulation schemes as well as circuitry using PAM schemes.

FIG. 18*a* illustrates an example of an apparatus 1800 for generating a data signal 1801. The apparatus 1800 comprises a processing circuit 1805 configured to generate the data signal 1801, and an output interface circuit 1810 configured to output the data signal 1801 to a transmission link (not illustrated). For example, the processing circuit 1805 comprises a DTC for generating the data signal 1801.

In a first mode of operation, the processing circuit 1805 is configured to generate the data signal 1801 to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted, and the second signal edge and the third signal edge are separated by a second time period corresponding to second data to be transmitted. For example, apart from other time encoded communication protocols, apparatus 1800 may be used for communication according to the STEP protocol. That is, a sum of the first time period and the second time period may be lower than $10^{-7}$ s, $10^{-8}$ s, $10^{-9}$ s, $10^{-10}$ s, $10^{-11}$ s, or $10^{-12}$ s. In other words, the processing circuit 1805 uses a modulation scheme for passing information in the first mode of operation that encodes information to the time difference between consecutive signal edges in the data signal 1801.

In a second mode of operation, the processing circuit 1805 is configured to generate the data signal 1801 based on the first data and the second data using PAM. In other words, the processing circuit 1805 encodes information by the voltage level of the data signal 1801 at defined time intervals. The processing circuit may use different numbers of signal levels for encoding the data to the data signal 1801. For example, the processing circuit 1805 may be configured to generate the data signal 1801 using PAM with two, three, four or more possible signal levels (e.g. use PAM2, PAM3, PAM4, etc. modulation). In some examples, the processing circuit 1805 may further be configured to generate the data signal 1801 using Non-Return-to-Zero (NRZ) PAM. For example, the processing circuit 1805 may generate the data signal 1801 using NRZ PAM2 in the second mode of operation.

By supporting the first mode of operation and the second mode of operation, the apparatus 1800 may be used for communication according to time encoded communication protocols such as the STEP protocol as well as for protocols using PAM. Accordingly, the apparatus 1800 may allow communication with a variety of different communication partners. Apart from communication partners supporting the STEP protocol, the apparatus 1800 may further communicate with communication partners using PAM in the physical layer (e.g. NRZ PAM2).

For example, if the apparatus 1800 is used for implementing the physical layer of the STEP protocol, the processing circuit 1805 may generate in the second mode of operation pulses in the data signal 1801 that match the number of consecutive sample amplitude bits multiplied by the bit length for mimicking the behavior of a NRZ PAM2 physical layer. Assuming that at 10 Gbit/s NRZ PAM2 modulation scheme is mimicked, the processing circuit 1805 may generate pulse at multiples of 100 ps.

As said above, a DTC may be used for generating the data signal. While frequency division circuitry of the DTC together with interpolation circuitry of the DTC may be used for generating the data signal 1801 in the first mode of operation, only the frequency division circuitry of the DTC may be used in the second mode for mimicking the NRZ PAM2 modulation. For example, if an input oscillation signal for the DTC exhibits a frequency of 10 GHz, the data signal 1801 exhibiting pulses at multiples of 100 ps as mentioned in the above example may be generated by simply dividing the input oscillation signal using the frequency division circuitry of the DTC without the need for the interpolation circuitry of the DTC (e.g. a Digitally Controlled Edge Interpolator, DCEI). In other words, the DTC may be configured to generate the data signal 1801 by frequency dividing an input oscillation signal in the second mode of operation.

Furthermore, if the mimicked protocol using PAM modulation requires a clock signal, the processing circuit 1805 may be further configured to generate an according clock signal 1802 in the second mode of operation (e.g. comprise a second DTC for generating the clock signal 1802). Further, the output interface circuit 1810 may be configured to simultaneously output the clock signal 1802 and the data signal 1801 in the second mode of operation. For example, the output interface circuit 1810 may be configured to simultaneously output the clock signal 1802 and the data signal 1801 to different transmission lines of a differential transmission link.

The differential transmission link may be used in the first mode of operation for outputting the data to be transmitted in a differential manner. That is, the processing circuit 1805 may in the first mode of operation further be configured to generate a second data signal 1803 that is inverted with respect to the data signal 1801. Further, the output interface circuit 1810 may be configured to output the second data signal 1803 to the transmission link.

When operating in the first mode of operation, the apparatus 1800 or at least circuitry parts of the apparatus 1800 (e.g. the processing circuit 1805) may be configured to execute or implement one or more of the additional features described above or below.

The mode of operation of the apparatus 1800 may be controlled by a higher layer application or circuitry. For example, the apparatus 1800 may comprise a control circuit (not illustrated) configured to control the processing circuit 1805 and/or the output interface to operate in the second mode of operation based on a received control signal (e.g. provided by higher layer circuitry).

Also on the receive side, the decoding of time encoded signals as well as of amplitude encoded signals may enable compatibility with a variety of communication partners. An according apparatus 1820 for decoding a data signal 1821 is illustrated in FIG. **18*b*. The apparatus 1820 comprises a processing circuit 1825 and a demodulation circuit 1830**.

In a first mode of operation, the processing circuit 1825 is configured to determine a sequence of a first signal edge of a first type, a second signal edge of a second type, and a third signal edge of the first type in the data signal 1821. Again, the first type may be a rising edge and the second type be a falling edge, or the second type may be a rising edge and the first type be a falling edge. For example, the processing circuit 1825 may comprises a TDC configured to determine the sequence of the first signal edge, the second signal edge, and the third signal edge in the data signal 1821

The demodulation circuit 1830 is in the first mode of operation configured to determine first data based on a first time period between the first signal edge and the second signal edge. Further the demodulation circuit 1830 is in the first mode of operation configured to determine second data based on a second time period between the second signal edge and the third signal edge. A sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. In other words, the apparatus 1820 uses a demodulation scheme in the first mode of operation that decodes information based on the time difference between consecutive signal edges in the data signal 1821.

In a second mode of operation, the processing circuit 1825 is configured to determine a sequence of signal levels of the data signal 1821 at a plurality of successive time instances. In other words, the processing circuit 1825 determines the amplitude of the data signal 1821 rather than the time between consecutive signal edges in the second mode of operation. The plurality of successive time instances are offset from each other by a constant offset time. That is, the processing circuit 1825 may sample the amplitude of the data signal 1821 with a constant frequency. As said above, a TDC may be used for sampling the data signal 1821. While a plurality of flip-flop circuits of the TDC may be used for determining the signal edges in the data signal 1821, only a single one of the plurality of flip-flop circuits of the TDC may be used to sample the amplitude of the data signal 1821 with constant frequency.

The demodulation circuit 1830 is accordingly configured to determine the first data and the second data based on the sequence of signal levels in the second mode of operation.

By supporting the first mode of operation and the second mode of operation, the apparatus 1820 may be used for communication according to time encoded communication protocols such as the STEP protocol as well as for protocols using PAM. Accordingly, the apparatus 1820 may allow communication with a variety of different communication partners. Apart from communication partners supporting the STEP protocol, the apparatus 1820 may further communicate with communication partners using PAM in the physical layer.

The plurality of successive time instances used for sampling the data signal 1821 in the second mode of operation may be based on a clock signal 1822. In other words, the sampling frequency in the second mode of operation may be determined by the clock signal 1822. For example, the processing circuit 1825 may be configured to receive the clock signal 1822 and the data signal 1821 simultaneously from a transmitter (not illustrated) in the second mode of operation. Alternatively, the apparatus 1820 may additionally comprise a clock recovery circuit (not illustrated) configured to generate the clock signal 1822 based on the data signal 1821. That is, the timing information may be extracted from the serial data stream encoded to the data signal 1821. For example, the clock recovery circuit may be a PLL. The PLL may, e.g., align a reference clock signal to transitions (signal edges) in the data signal 1821 for generating the clock signal 1822.

For example, the STEP protocol may allow the TDC of the apparatus 1820 (which may be understood as a receiver) in the second mode of operation to separate clock and data paths for allowing a clock to be fed from a different path or from an internal source. Accordingly, the input data signal 1821 may be sampled with another signal (e.g. the clock signal 1822 from a dedicated clock line or from an internal source).

In the first mode of operation, the data may be received in a differential manner. That is, the processing circuit 1825 may in the first mode of operation further be configured to receive a second data signal 1823 that is inverted with respect to the data signal 1821. Accordingly, the processing circuit 1825 may in the first mode of operation be configured to determine the first signal edge, the second signal edge, and the third signal edge further based on the second data signal.

In the second mode of operation, the data signal 1821 and the clock signal 1822 may be received via the two different transmission lines of the differential transmission link used for receiving the data signal 1821 and the second data signal 1823 in the first mode of operation. An (input) interface circuit (not illustrated) of the apparatus 1820 may be coupled between the processing circuit 1825 and the (differential) transmission link.

When operating in the first mode of operation, the apparatus 1820 or at least circuitry parts of the apparatus 1820 (e.g. the processing circuit 1825) may be configured to execute or implement one or more of the additional features described above or below.

The mode of operation of the apparatus 1820 may again be controlled by a higher layer application or circuitry. For example, the apparatus 1800 may comprise a control circuit (not illustrated) configured to control the processing circuit and the demodulation circuit to operate in the second mode of operation based on a received control signal (e.g. provided by higher layer circuitry).

An exemplary communication system 1840 in accordance with the above aspects on using an additional amplitude modulation scheme is illustrated in FIGS. 18*c* to 18*e* in various modes of operation.

FIG. 18*c* illustrates the communication system 1840 comprising a transmitter 1847 and a receiver 1848 coupled via a transmission link 1846.

The transmitter 1847 comprises a DTC 1842 for generating a data signal 1841 by encoding data to be transported to the time periods between consecutive signal edges of the data signal 1841 in accordance with the STEP protocol. An output interface circuit 1843 (e.g. comprising an amplifier) outputs the data signal 1841 to the transmission link 1846.

The receiver 1848 comprises an input interface circuit 1844 for receiving the data signal 1841. The data signal 1841 is supplied to a TDC 1845 for determining the signal edges in the data signal 1841. The information about the signal edges is forwarded to a demodulation circuit (not illustrated) that translates the time periods between the consecutive signal edges in the data signal 1841 back into data.

That is, the transmitter 1847 behaves like the above described apparatus 1800 for generating a data signal when operated in the first mode of operation, and the receiver 1848 behaves like the above described apparatus 1820 for decoding a data signal when operated in the first mode of operation.

In other words, FIG. 18*c* illustrates a communication system during regular STEP operation.

FIG. 18*d* illustrates the communication system 1840 in a second mode of operation. In contrast to the above described first mode of operation, the DTC 1842 generates the data signal 1841 using NRZ PAM.

Accordingly, the TDC 1845 samples the amplitude of the data signal 1841 based on a clock signal generated by clock recovery PLL 1849 from the data signal 1841. The information about the signal amplitude is forwarded to the demodulation circuit that translates the signal amplitude of the data signal 1841 back into data.

That is, the transmitter 1847 behaves like the above described apparatus 1800 for generating a data signal when operated in the second mode of operation, and the receiver 1848 behaves like the above described apparatus 1820 for decoding a data signal when operated in the second mode of operation.

In other words, FIG. 18*d* illustrates the communication system during STEP operation with clock recovery for NRZ PAM support.

FIG. 18*e* illustrates again the communication system 1840 in the second mode of operation. In contrast to the example of FIG. 18*d*, the transmitter 1847 comprises a second DTC 1850 for generating the clock signal 1851, and a second output interface circuit 1852 for outputting the clock signal to another transmission link 1853 (or a second transmission line of a differential transmission link).

The TDC 1845 again samples the amplitude of the data signal 1841 based on the clock signal. However, in contrast to the example of FIG. 18*d*, the clock signal is not provided by PLL 1849 based on the data signal 1841 but is received via a second input interface circuit 1854 of the receiver 1848 from the transmitter 1847.

In other words, FIG. 18*e* illustrates the communication system in a situation in which the lines regularly used for STEP transmission are used as clock and transmission lines.

Although the transmitter 1847 and the receiver 1848 illustrated in FIGS. 18*c* to 18*e* are both described to support time encoded and amplitude encoded modulation schemes, it is to be noted that transmitter 1847 as well as the receiver 1848 may be used together with other receivers or transmitters that support only one of time encoded and amplitude encoded modulation schemes. For example, the transmitter 1847 may be used together with a receiver that supports only demodulation of NRZ PAM2 signals since the transmitter 1847 supports the two modes of operation described in detail in connection with FIG. 18*a*. Similarly, the receiver 1848 may be used together with a transmitter that supports only NRZ PAM2 modulation since the receiver 1848 supports the two modes of operation described in detail in connection with FIG. 18*b*.

In order to summarize the above aspects on using an additional amplitude modulation scheme, FIG. 18*f* illustrates an example of a method 1800*f* for generating a data signal. In a first mode of operation, the method 1800*f* comprises generating 1802*f* the data signal to comprise a sequence of a first signal edge of a first type, a second signal edge of a second type, and a third signal edge of the first type. The first signal edge and the second signal edge are separated by a first time period corresponding to first data to be transmitted, and the second signal edge and the third signal edge are separated by a second time period corresponding to second data to be transmitted. In a second mode of operation, the method 1800*f* comprises generating 1804*f* the data signal based on the first data and the second data using PAM. Further, the method 1800*f* comprises outputting 1806*f* the data signal.

More details and aspects of method 1800*f* are mentioned in connection with the proposed technique or one or more examples described above (e.g. FIGS. 18*a*, 18*c*, 18*d* and 18*e*). The method may comprise one or more additional optional features corresponding to one or more aspects of the proposed technique or one or more examples described above.

An example of a complementary method 1800*g* for decoding a data signal is illustrated in FIG. 18*g*. In a first mode of operation, the method 1800*g* comprises determining 1802*g* a sequence of a first signal edge of a first type, a second signal edge of a second type, and a third signal edge of the first type in the data signal. Further, the method 1800*g* comprises in the first mode of operation determining 1804*g* first data based on a first time period between the first signal edge and the second signal edge, and second data based on a second time period between the second signal edge and the third signal edge. In a second mode of operation, the method 1800*g* comprises determining 1806*g* a sequence of signal levels of the data signal at a plurality of successive time instances, and determining 1808*g* the first data and the second data based on the sequence of signal levels.

More details and aspects of method 1800*g* are mentioned in connection with the proposed technique or one or more examples described above (e.g. FIGS. 18*b* to 18*e*). The method may comprise one or more additional optional features corresponding to one or more aspects of the proposed technique or one or more examples described above.

The aspects described in connection with FIGS. 18*a* to 18*g* may allow to reuse circuitry according to the STEP protocol for generation and decoding of, e.g., NRZ PAM2 signals.

In the foregoing, basics of the STEP protocol are described together with aspects of the STEP protocol's physical layer and the STEP protocol's MAC layer. The following description section will focus on circuitry for communication hardware (e.g. a transmitter, a receiver, or a transceiver) capable of communication according to the STEP protocol. It is to be noted that the circuitry described in the following may be used in transmitters, receivers, or transceiver for enabling communication according to the STEP protocol, however it is not required to use this specific circuitry for enabling communication according to the STEP protocol. Communication according to the STEP protocol may as well be executed using circuitry different from what is described in the following. Further, it is to be noted that the circuitry described in the following may be used for applications different from communication according to the STEP protocol. For example, the circuitry described in the following may be used for communication according to communication protocols different from the STEP protocol.

Power saving is an important property for many electronic devices. Most electronic devices support one or more power saving modes associated with reduced availability of features or deactivation (turning-off) of unused features in order to save power. For example, communication interfaces working at high throughput (e.g. according to the STEP protocol) do not constantly (all the time) require full throughput capability. Communication interfaces may, e.g., exhibit time periods in which no data is to be transferred (also known as idle periods). Accordingly, the communication interfaces may go to a power saving mode at time periods in which no data is to be transferred. When going to power saving modes, it is to be considered that powering up/waking up features (e.g. bringing back the interface to a fully operational mode) may take some time during which power is consumed by the communication interface, but no data is transferred. Further, different power saving modes may exhibit different power up/wake up times. For example, deeper power saving modes (in which the communication interface consumes less power than in higher power saving modes) may exhibit a longer power up/wake up time than higher power saving modes (in which the communication interface consumes more power than in the lower power saving modes). However, if the power up/wake up time for going from a (deep) power saving mode to the full throughput mode is longer than the available time period until data needs to be transferred, communication interfaces cannot go to this (deep) power saving mode in order to save power during the idle time.

FIG. 19 illustrates an example of an apparatus 1900 for generating a data signal 1901 that may allow improved power up/wake up times and, hence, better utilization of (deep) power saving modes.

The apparatus 1900 comprises a processing circuit 1910 configured to generate the data signal 1901 based on data 1902 to be transmitted in at least a first mode of operation. For example, the processing circuit 1910 may comprise a DTC for generating the data signal. Apart from the first mode of operation, apparatus 1900 supports at least a second mode of operation in which at least part of the circuitry of the apparatus 1900 is deactivated. For example, the second mode of operation may be a (deep) power saving mode. The apparatus 1900 may, e.g., be operated in the second mode of operation if no data is to be transferred (e.g. a transmit buffer of apparatus 1900 may be empty or no data is scheduled for transmission by a higher layer control application or hardware). For example, the second mode of operation may be one of the power save modes described above in connection with FIG. 15*b*.

Further, the apparatus 1900 comprises a monitoring circuit 1920 configured to monitor a stability of the circuitry of the apparatus 1900. The circuitry of the apparatus 1900 may in addition to the processing circuit 1910, e.g., comprise a PLL, one or more filters, one or more buffers, one or more delay elements, one or more control circuits, one or more voltage regulators etc. The stability of a circuit describes the tendency of the circuit's response to return to zero after being disturbed. While a stable circuit's response returns to zero immediately after being disturbed, it may take more time until an unstable circuit's response returns to zero. In some examples, the unstable circuit's response does not return to zero at all after being disturbed. For example, during powering up/waking up circuitry of the apparatus 1900, it may take some time until the circuitry is stable. In other words, when changing to the first mode of operation from the second mode of operation, the circuitry of the apparatus 1900 may at least in part be initially unstable and only be stable after some time.

When changing to the first mode of operation from the second mode of operation, the processing circuit 1910 is configured to initially adjust time periods between directly succeeding signal edges of the data signal 1901 based on respective data portions of a first amount until the monitoring circuit 1920 determines that the circuitry of the apparatus 1900 operates stable. Further, the processing circuit 1910 is configured to adjust the time periods between directly succeeding signal edges of the data signal 1901 based on respective data portions of a greater second amount after the monitoring circuit 1920 determines that the circuitry of the apparatus 1900 operates stable. For example, the monitoring circuit 1920 (or any other control circuit of the apparatus 1900) may supply a corresponding control or information signal to the processing circuit 1910 that indicates whether the circuitry of the apparatus 1900 is stable or not.

That is, the processing circuit 1900 starts generating the data signal 1901 at reduced parameters (e.g. with a lower order modulation scheme) until the apparatus 1900 has fully stabilized. For example, the processing circuit 1910 may be configured to initially adjust time periods between directly succeeding signal edges of the data signal 1901 based on respective 1 bit portions of the data to be transmitted as long as the circuitry of the apparatus 1900 does not yet operate stable, and to adjust the time periods between directly succeeding signal edges of the data signal 1901 based on respective 3 bit portions of the data to be transmitted after the circuitry of the apparatus 1900 operates stable. Using the circuitry of the apparatus 1900 before it is stable for generating the data signal 1901 may increase the error rate in the data signal 1901 (e.g. time periods between directly succeeding signal edges of the data signal 1901 may adjusted too short or too long). However, the increased error rate in the data signal 1901 may (at least in part) be compensated by initially modulating the time periods between directly succeeding signal edges of the data signal 1901 based on smaller data portions until the circuitry of the apparatus 1900 stabilized.

For example, the processing circuit 1910 may be configured to adjust the time periods between directly succeeding signal edges of the data signal 1901 to time periods of a first plurality of time periods until the monitoring circuit 1920 determines that the circuitry of the apparatus 1900 operates stable. The first plurality of time periods are offset from each other by a first offset time. Further, the processing circuit 1910 may be configured to adjust the time periods between directly succeeding signal edges of the data signal 1901 to time periods of a second plurality of time periods after the monitoring circuit 1920 determines that the circuitry of the apparatus 1900 operates stable. The second plurality of time periods are offset from each other by at least a second offset time being smaller than the first offset time. In other words, the processing circuit 1910 may initially use a modulation scheme that is similar to the ultra-reliable modulation scheme described above in connection with FIGS. 16*a* to 16*d* until the circuitry of the apparatus 1900 operates stable.

That is, a greater offset between possible time periods between directly succeeding signal edges of the data signal 1901 is used as long the circuitry of the apparatus 1900 in not yet operating stable. Accordingly, even if time periods between directly succeeding signal edges of the data signal 1901 may be adjusted too short or too long due to the yet unstable circuitry of the apparatus 1900, the increased offset may provide an increased immunity to these signal errors. Accordingly, a potentially increased signal error due to the circuitry's instability may be compensated (mitigated).

For example, the first offset time may be at least two, three, four or more times the second offset time in order to ensure high (sufficient) immunity of the signal edges to the potentially increased signal errors due to the yet unstable circuitry of the apparatus 1900. Accordingly, the first plurality of time periods may comprise less time periods than the second plurality of time periods. For example, the second plurality of time periods may comprise at least two, three, or four times more time periods than the first plurality of time periods. The second plurality of time periods may, e.g., comprises at least six, eight, ten, twelve, fourteen, sixteen or more time periods. The more time periods one of the first plurality of time periods and the second plurality of time periods comprises, the more bits may be encoded to a pulse of the data signal 1901 so that the throughput of the apparatus 1900 increases.

In summary, when changing to the first mode of operation from the second mode of operation, the processing circuit 1910 may be configured to initially adjust, based on data to be transmitted, the time periods between directly succeeding signal edges of the data signal 1901 to time periods of the first plurality of time periods until the monitoring circuit 1920 determines that the circuitry of the apparatus 1900 operates stable, and to adjust, based on the data to be transmitted, the time periods between directly succeeding signal edges of the data signal 1901 to time periods of the second plurality of time periods after the monitoring circuit 1920 determines that the circuitry of the apparatus 1900 operates stable.

Among other circuitry, the apparatus 1900 may, e.g., comprise a PLL 1930 configured to generate an oscillation signal 1931. The processing circuit 1910 may be configured to generate the data signal 1901 using the oscillation signal 1931 (e.g. the processing circuit 1910 may shift signal edges of the oscillation signal 1931 according to the data to be transmitted). In the second mode of operation, the PLL 1930 is deactivated in order to save power. Accordingly, when changing from the second mode of operation to the first mode of operation, the PLL 1930 is activated. The PLL 1930 takes some time until it is locked, i.e. until the PLL 1930 operates stable. However, apparatus 1900 allows to generate the data signal 1901 already before the PLL 1930 is locked. For example, signal transmission may be started with reduced parameters before the PLL 1930 is locked.

After the PLL 1930 is locked, the error rate in the data signal 1901 may be significantly reduced compared to the unlocked operation of the PLL 1930. Therefore, the monitoring circuit 1920 may be configured to only determine that the circuitry of the apparatus 1900 operates stable if the PLL 1930 is locked.

Further, the operation mode of a receiver (not illustrated) of the data signal 1901 may be taken into account when deciding to change over to adjusting the time periods based on the data portions of the greater second amount (adjusting the time periods to the time periods of the second plurality of time periods). For example, the monitoring circuit 1920 (or any other control circuit of the apparatus 1900) may receive an indicator signal indicative of an operation mode of the receiver of the data signal 1901. Accordingly, the processing circuit 1910 may be configured to only change from adjusting the time periods of the data signal 1901 based on the respective data portions of the first amount to adjusting the time periods of the data signal 1901 based on the respective data portions of the greater second amount if the indicator signal indicates that the receiver of the data signal 1901 is in a fully operational mode. In other words, the processing circuit 1910 may be configured to only change from adjusting the time periods of the data signal 1901 to the time periods of the first plurality of time periods to adjusting the time periods of the data signal 1901 to the time periods of the second plurality of time periods if the indicator signal indicates that the receiver of the data signal 1901 is in a fully operational mode.

Apparatus 1900 is woken up before it is stable. Accordingly, a wake up time of apparatus 1900 may be many times (e.g. five, ten, fifteen or more times) faster/smaller than for conventional systems. For example, assuming a wake up time of 1-2 μs for a conventional system, apparatus 1900 may be woken up (be operational) within, e.g., 0.1-0.2 μs. The reduced wake up time may allow to go to deep power saving modes (e.g. a deep sleep mode) more often and for longer times. Accordingly, apparatus 1900 may allow signal generation and signal transmission with reduced energy and in a more power-efficient manner.

The apparatus 1900 may allow to generate a single-ended data signal as described above or a differential signal pair. That is, in some examples, the processing circuit 1910 may be further configured to generate a second data signal that is inverted with respect to the data signal 1901.

As mentioned above, apart from other time encoded communication protocols, apparatus 1900 may be used for communication according to the STEP protocol. That is, after the monitoring circuit 1920 determines that the circuitry of the apparatus 1900 is stable, the processing circuit 1910 may be configured to generate the data signal 1901 to comprise a sequence of a first signal edge of a first type, a second signal edge of a second type, and a third signal edge of the first type. A first time period between the first signal edge and the second signal edge corresponds to a first data portion of the second amount, and wherein a second time period between the second signal edge and the third signal edge corresponds to a second data portion of the second amount. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge.

As described herein, communication interfaces according to the STEP protocol may enable a fast transition from a disable mode of operation or a power saving mode to a fully operational mode (full throughput mode) compared to conventional interfaces. The transition time to the fully operational mode may be dominated by the PLL wake up/power up time, but be accelerated according to aspects described above and below.

Another circuitry that may dominate the transition to the fully operational mode (full throughput mode) is power supply circuitry. For example, Low-DropOut (LDO) regulators may be used as power supply for communication circuits. As described above for other circuitry, also waking up/powering up an LDO regulator may take some time and, hence, increase to the transition time to the fully operational mode. Commonly, LDO regulators are kept on most of the time in order to allow for fast transition times. However, keeping the LDO regulator on for large times may cause increased power consumption, which may conflict with power consumption targets for an electronic device (e.g. low power consumption is a KPI for mobile devices using a battery).

FIG. 20*a* illustrates an apparatus 2000 for regulating a supply signal 2011 generated by a LDO regulator 2010 for an electronic device 2020 that may allow improved effective power up/wake up times for LDO regulator 2010 and, hence, for electronic device 2020.

The LDO regulator 2010 provides the supply signal 2011 at an input voltage $V_{in}$. Conventional LDO regulators (with or without external capacitor) exhibit a power up which is limited by its bandwidth. Typically the power up time is more than 1 μs for regulated LDO regulators and open loop LDO regulators (the input voltage $V_{in}$ is not regulated by an open loop LDO regulator, which might cause high values of input voltage $V_{in}$ that reach the source voltage of the LDO regulator).

Apparatus 2000 comprises an output capacitor 2030 configured to couple between the LDO regulator 2010 and the electronic device 2020. The output capacitor 2030 is coupled to the LDO regulator 2010 and configured to receive the supply signal 2011.

Apparatus 2000 further comprises a switch circuit 2040 configured to selectively couple a charge source 2050 (in parallel) to the output capacitor 2030 if a control signal 2001 indicates that the electronic device 2020 transitions (changes) from a first mode of operation to a second mode of operation (or if the control signal 2001 indicates that the electronic device 2020 is to transition from the first mode of operation to the second mode of operation). For example, the control signal 2001 may be provided from a higher layer control application or hardware (not illustrated). As indicated in FIG. 20*a*, the charge source 2050 may, e.g., be a charged capacitor. That is, a pre-charged switched capacitor may be used.

For example, the first mode of operation is a disable mode (non-operational mode) or a power saving mode of the electronic device 2020 in which the electronic device 2020 is not consuming power. The second mode of operation may, accordingly, be a fully operational mode of the electronic device 2020. Since the electronic device 2020 is not consuming power in the first mode of operation, the LDO regulator 2010 may be initially deactivated (turned off).

After activation, it may take some time until the LDO regulator 2010 is able to provide the supply signal at a voltage level required by the electronic device 2020. That is, it may take some time until the LDO regulator 2010 may generate a required (desired) output voltage $V_{out}$ at the output capacitor 2030 alone.

In order to reduce the time until the required (desired) output voltage $V_{out}$ is reached at the output capacitor 2030, switch circuit 2040 is configured to couple the (pre-charged) charge source 2050 to the output capacitor 2030. Accordingly, additional charge is transferred to the output capacitor 2030 so that the output capacitor 2030 is charged faster to the required output voltage $V_{out}$. As a consequence, the effective wake up/power up time of the LDO regulator 2010 as seen by the electronic device 2020 is reduced. Hence, waking up the LDO regulator 2010 is effectively accelerated. Since the required output voltage $V_{out}$ is provided at the output capacitor 2030 within a reduced period of time, also powering up/waking up the electronic device 2020 may be accelerated. For example, if the electronic device 2020 is a PLL, the PLL wake up may be accelerated. Accordingly, the PLL may be sent to a power saving mode or disable mode more often or for longer periods of time due to the effectively accelerated wake up/power up times for the PLL.

That is, apparatus 2000 may allow to effectively wake up/power up the LDO regulator 2010 in a fast transition (e.g. 100 n or less) while using a standard LDO regulator. The LDO output voltage (supply signal 2011) is regulated and controlled, so that neither the performance nor the reliability of the LDO regulator 2010 is affected.

For example, assuming that during power up/wake up the electronic device 2020 powered by the LDO regulator 2010 is not active, no current consumption (except for leakage) occurs. Taking into account the known capacitance $C_{out}$ of the output capacitor 2030 and the desired transition time, the required charge Q for reaching the required (desired) output voltage $V_{out}$ may be calculated as follows:

$$Q=\int C_{out}\cdot V(t)dt \qquad (1),$$

with V(t) denoting the present value of the voltage across the electrodes of the output capacitor 2030.

In order to supply the required charge to the output capacitor 2030, the charge source 2050 is used to inject the charge to the output capacitor 2030 in a period of time until the required output voltage $V_{out}$ is reached and then stop the charge injection. The change of the output capacitor 2030's voltage may be described as follows:

$$dV_{out}=\frac{c_{inj(V_{in}-V_{out})}}{c_{inj}+c_{out}}, \qquad (2)$$

with $C_{inj}$ denoting the capacitance of the charge source 2050 (e.g. a charged capacitor as illustrated in FIG. 20*a*).

For example, toggling may be used to supply the required charge to the output capacitor 2030. That is, the switch circuit 2040 may be configured to toggle an electrode of the charged capacitor 2050 between the LDO regulator 2010 and the output capacitor 2040.

Knowing $C_{inj}$, $C_{out}$, $V_{in}$, and $V_{out}$, the right amount of toggling may be set in order to reach the target voltage $V_{out}$ in a predefined power-up time. For example, the switch circuit 2040 may be configured to toggle the electrode of the charged capacitor 2050 between the LDO regulator 2010 and the output capacitor 2030 at a predetermined toggle frequency. The toggle frequency is selected such that a predetermined amount of charge is transferred to the output capacitor 2030 within a predetermined time interval.

FIG. 20*b* illustrates an exemplary temporal course of the voltage 2031 across the electrodes of the output capacitor 2030. At a time $T_0$, the toggling starts and charge is continuously transferred to output capacitor 2030 by means of charged capacitor 2050 (indicated by line 2051 representing the voltage presented by charged capacitor 2050 to output capacitor 2030). The output capacitor 2030 is continuously charged and the voltage 2031 across the electrodes of the output capacitor 2030 increases. After the predetermined time interval $T_{power\ on}$ lapsed, the required (desired) output voltage $V_{out}$ is reached and toggling is stopped by the switching circuit 2040.

Alternatively, the switch circuit 2040 may be configured to selectively and continuously couple the charge source 2050 (e.g. a charged capacitor) to the output capacitor 2030 until the voltage across electrodes of the output capacitor 2030 is at the predetermined value $V_{out}$. In some examples, the apparatus 2000 may further comprise a comparator circuit 2060 configured to generate a comparison signal 2061 based on a comparison of a present value of the voltage 2031 across the electrodes of the output capacitor 2030 to the predetermined value $V_{out}$. Accordingly, the switch circuit 2040 may be configured to selectively couple the charge source 2040 to the output capacitor based on the comparison signal 2061.

Further alternatively, the switch circuit 2040 may be configured to selectively and continuously couple the charge source 2050 (e.g. a charged capacitor) to the output capacitor 2030 for a predetermined time interval, wherein time interval is selected such that a predetermined amount of charge is transferred to the output capacitor 2030 (e.g. based on mathematical expression (1)).

In other words, another way to reach the required power up voltage $V_{out}$ may be turning on the switch 2040 for a certain period of time and to turn it off again once the voltage $V_{out}$ is reached. As described above, this approach may be implemented using a (high speed) comparator 2060 or by opening the switch 2040 for a predefined time window.

Apparatus 2000 may further enable fast transition of the electronic device 2020 from a mode of operation requiring low current to a mode of operation requiring high current. For example, the first mode of operation may be an idle mode or a low rate data transmission mode (low throughput mode) and the second mode of operation is a high rate data transmission mode (high throughput mode). The transition from the first mode of operation to the second mode of operation may be quick so that the LDO 2010 itself cannot follow the current change due to its limited bandwidth. This is exemplarily illustrated in FIG. 20*c*.

FIG. 20*c* illustrates the temporal course 2021 of the required current for the electronic device 2020 (the current drawn by the electronic device 2020) when changing from the first mode of operation to the second mode of operation at a time $T_1$. As a reference, the temporal course 2012 of the current provided by the LDO regulator 2010 is illustrated. It is evident from FIG. 20*c* that the LDO regulator 2010 itself cannot follow the current change of the electronic device 2020 due to its limited bandwidth. As a consequence, the voltage supplied to electronic device 2020 might drop.

However, since switch circuit 2040 is configured to selectively couple the charge source 2050 to the output capacitor 2030 if the control signal 2001 indicates that the electronic device 2020 transitions from the first mode of operation (consuming little current) to the second mode of operation (consuming high current). The selective coupling of the charge source 2050 to the output capacitor 2030 may enable the injection of additional charges to the output capacitor 2030 until the LDO regulator 2010 is able to provide the required current. The current injected by the charge source 2050 to the output capacitor 2030 is illustrated in FIG. 20*c* by line 2041 for an exemplary toggling implementation.

Apparatus 2000 may enable ultrafast capacitor charging and LDO regulator wake up.

Apart from other electronic devices, apparatus 2000 may be used for communication according to the STEP protocol. FIG. 20*d* illustrates a first example of a communication apparatus 2070. The communication apparatus 2070 comprises an apparatus 2071 for generating a data signal 2072. The apparatus 2071 for generating the data signal 2072 comprises a processing circuit 2073 (e.g. a DTC) configured to generate the data signal 2072 based on data 2075 to be transmitted. The data signal 2072 comprises a sequence of a first signal edge of a first type, a second signal edge of a second type, and a third signal edge of the first type. The first signal edge and the second signal edge are separated by a first time period corresponding to first data to be transmitted, and the second signal edge and the third signal edge are separated by a second time period corresponding to second data to be transmitted. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge.

Further, the apparatus 2071 for generating the data signal 2072 comprises an output interface circuit 2074 configured to output the data signal 2072 to a transmission link (not illustrated).

The communication apparatus 2070 comprises a LDO regulator 2010 configured to generate a supply signal 2011 for the apparatus 2071 for generating the data signal 2072 as well as an apparatus 2000 for regulating the supply signal 2011 as described above.

Apparatus 2000 may allow to reduce an effective wake up/power up time of the LDO regulator 2010 as seen by the apparatus 2071 for generating the data signal 2072. Accordingly, also a wake up/power up time of the apparatus 2071 for generating the data signal 2072 may be improved.

For example, if the processing circuit 2073 is configured to generate the data signal 2072 at a first data rate in the first mode of operation and to generate the data signal 2072 at a higher second data rate in the second mode of operation, the quickly increasing current demand of the processing circuit 2073 may be compensated by the apparatus 2000 as described above.

Similarly, if the first mode of operation is an idle mode of the apparatus 2071 for generating the data signal 2072 and the second mode of operation is a fully operational mode (high throughput mode) of the apparatus 2071 for generating the data signal 2072, the quickly increasing current demand of the processing circuit 2073 may be compensated by the apparatus 2000 as described above.

If the first mode of operation is one of a power-off mode and a low-power mode (e.g. a power saving mode) of the apparatus 2071 for generating the data signal 2072 and the second mode of operation is one of an idle mode and a fully operational mode of the apparatus 2071 for generating the data signal 2072, the wake up/power up of the apparatus 2071 for generating the data signal 2072 may be accelerated by the apparatus 2000 as described above.

A second example of a communication apparatus 2080 is illustrated in FIG. 20*e*. The communication apparatus 2080 comprises an apparatus 2081 for decoding a data signal 2082 received from a transmission link (not illustrated). The apparatus 2081 for decoding the data signal 2082 comprises a processing circuit 2083 (e.g. a TDC) configured to determine a sequence of a first signal edge of a first type, a second signal edge of a second type, and a third signal edge of the first type in the data signal 2082. Again, the first type may be a rising edge and the second type be a falling edge, or the second type may be a rising edge and the first type be a falling edge. Further, the apparatus 2081 for decoding the data signal 2082 comprises a demodulation circuit 2084 configured to determine first data based on a first time period between the first signal edge and the second signal edge, and to determine second data based on a second time period between the second signal edge and the third signal edge. A sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol.

The communication apparatus 2080 further comprises a LDO regulator 2010 configured to generate a supply signal 2011 for the apparatus 2081 for decoding the data signal 2082 as well as an apparatus 2000 for regulating the supply signal 2011 as described above.

Apparatus 2000 may allow to reduce an effective wake up/power up time of the LDO regulator 2010 as seen by the apparatus 2081 for decoding the data signal 2082. Accordingly, also a wake up/power up time of the apparatus 2081 for decoding the data signal 2082 may be improved.

For example, if the first mode of operation is an idle mode of the apparatus 2081 for decoding the data signal 2082 and the second mode of operation is a fully operational mode (high throughput mode) of the apparatus 2081 for decoding the data signal 2082, the quickly increasing current demand of the apparatus 2081 for decoding the data signal 2082 may be compensated by the apparatus 2000 as described above.

If the first mode of operation is one of a power-off mode and a low-power mode (e.g. a power saving mode) of the apparatus 2081 for decoding the data signal 2082 and the second mode of operation is one of an idle mode and a fully operational mode (high throughput mode) of the apparatus 2081 for decoding the data signal 2082, the wake up/power up of the apparatus 2081 for decoding the data signal 2082 may be accelerated by the apparatus 2000 as described above.

To summarize the above aspects on regulating a supply signal generated by a LDO regulator, an example of a method 2090 for regulating a supply signal generated by a LDO regulator for an electronic device is illustrated by means of a flowchart in FIG. 20*f*. Method 2090 comprises receiving 2092 the supply signal by an output capacitor coupled between the LDO regulator and the electronic device. Further, method 2090 comprises selectively coupling 2094 a charge source to the output capacitor if a control signal indicates that the electronic device transitions from a first mode of operation to a second mode of operation.

More details and aspects of method 2090 are mentioned in connection with the proposed technique or one or more examples described above (e.g. FIGS. 20*a*, 20*b* and 20*c*). The method may comprise one or more additional optional features corresponding to one or more aspects of the proposed technique or one or more examples described above.

It is to be noted that instead of an LDO regulator, any other power supply circuit (e.g. a DC-to-DC converter) may be used in the examples described above in connection with FIGS. 20*a* to 20*f*.

As mentioned above, power may be an important KPI for (serial) communication interfaces. Power efficient circuits as well as circuits supporting different power states (different modes of operation) may allow to meet power targets. Further, circuits should be able to change between different modes of operation in a fast and efficient way. FIG. 21 illustrates a communication system 2100 comprising a transmitter 2110 and a receiver 2150 that may allow power efficient operation and support for multiple modes of operation. The transmitter 2110 and the receiver 2150 are DC coupled via a (differential) transmission link 2140. The transmitter 2110 and the receiver 2150 are illustrated in a differential implementation in FIG. 21. However, it is to be noted that the technical concept for the transmitter 2110 and the receiver 2150 may further be used in a single ended implementation. In order to avoid lengthy repetitions, the following description of the communication system 2100 merely focuses on the circuitry for signals exhibiting positive polarity. It is evident for the skilled reader that the circuitry for the signals exhibiting negative polarity functions in an equivalent manner.

The transmitter 2110 comprises a processing circuit (e.g. a DTC) 2120 configured to generate a data signal 2121 to be transmitted. The processing circuit 2120 is configured to generate the data signal 2121 based on data to be transmitted.

Apart from other time encoded communication protocols, the processing circuit 2120 may be used for communication according to the STEP protocol. That is, the processing circuit 2120 may be configured to generate the data signal 2121 to comprise a sequence of a first signal edge of a first type, a second signal edge of a second type, and a third signal edge of the first type. A first time period between the first signal edge and the second signal edge corresponds to first data to be transmitted, and a second time period between the second signal edge and the third signal edge corresponds to second data to be transmitted. For example, the first data may be a first data symbol and the second data be a second data symbol to be transmitted according to a data communication protocol like the STEP protocol. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge.

Further, the transmitter 2110 comprises an output interface circuit 2130 configured to couple to ground (node) 2190 and to the transmission link 2140 for DC coupling the transmitter 2110 to a receiver 2150 that is coupled to a supply voltage ($V_{DD}$) 2195. Accordingly, a DC current is flowing from the receiver 2150 to the transmitter 2110 via the transmission link 2140. The output interface circuit 2130 is configured to output the data signal 2121 to the receiver by modulating, based on the data signal 2121, the DC current flowing from the receiver 2150 to the transmitter 2110 via the transmission link 2140. That is, the output interface circuit 2130 (the output driver of the transmitter 2110) toggles the current coming from the receiver 2150 to transmit the data over the transmission lines (lanes) of the transmission link 2140. Since the output interface circuit 2130 is effectively reusing the current of the receiver 2150, the transmitter 2110 may operate (highly) energy efficient.

For toggling the current coming from the receiver 2150, the output interface circuit 2130 comprises a first transistor 2131 configured to receive the data signal 2121 at a control terminal (e.g. its gate terminal). A first terminal of the first transistor 2131 is configured to couple to the transmission link 2140, and a second terminal of the first transistor 2131 is coupled to ground 2190.

Further, the output interface circuit 2130 comprises circuitry for boosting high frequency components (energy) of the data signal 2121 in order to equalize line effects of the transmission link 2140 (e.g. trace losses). In particular, the output interface circuit 2130 is further configured to capacitively couple a signal 2121' related to the data signal 2121 to the transmission link 2140. Therefore, the output interface circuit 2130 comprises an inverter circuit 2132 configured to invert the data signal 2121 and to output the inverted data signal as the signal 2121' related to the data signal 2121. Further, the output interface circuit comprises a (boost) capacitor 2133 configured to capacitively couple the inverted data signal 2121' to the transmission link 2140. A (boost) resistor 2134 is coupled between the capacitor 2133 and the transmission link 2140.

The circuitry for boosting high frequency components (energy) of the data signal 2121 may enable to increase a bandwidth of the transmitter 2110 by adding a zero and a pole to the transmit transfer function of the transmitter. Further, a zero crossing at the receiver 2150's input interface circuit 2160 may be recovered. For example, the transfer function A of the transmitter may be:

$$A = \frac{R_0 \cdot g_m\left(1 + S \cdot \frac{c_b}{g_m}\right)}{1 + S \cdot (C_b + C_0) \cdot R_0} \tag{3}$$

with $R_0$ denoting the receiver load (output resistance of the receiver), $g_m$ denoting the gain of the transmitter's output transistor, S denoting the Laplace domain ($S=j \cdot 2 \cdot \pi \cdot f$), $C_b$ denoting the capacity of the (boost) capacitor 2133, and $C_0$ denoting the output capacity that the transmitter pushes (e.g. including package, ball, board and receiver input capacitance).

The output interface circuit 2130 further comprises a bias current source 2135 coupled between the first transistor 2131 and ground 2190.

Additionally, the output interface circuit 2130 comprises a protection circuit 2137 against ElectroStatic Discharge (ESD). The protection circuit 2137 illustrated in FIG. 21 is exemplary and may in some examples be replaced with different protection circuitry (e.g. see FIG. 26*a*).

In a differential implementation as illustrated in FIG. 21, the processing circuit 2120 is further configured to generate a second data signal 2122, wherein the second data signal 2122 is inverted with respect to the data signal 2121. Accordingly, the output interface circuit 2130 is further configured to output the second data signal 2122 to the receiver 2150 by modulating, based on the second data signal 2122, a second DC current flowing from the receiver 2150 to the transmitter 2110 via the transmission link 2140. The modulation is done as described above for the data signal 2121. Accordingly, the output interface circuit 2130 comprises additional circuitry for processing the signals of negative polarity that is equivalent to the above described circuitry for processing the signals of positive polarity.

Further, the output interface circuit 2130 comprises a termination resistor 2136 configured to terminate the transmission lines of the differentially implemented transmission link 2140.

The output interface circuit 2130 is further able to control the power state and, hence, the mode of operation of the receiver 2150's input interface circuit 2160. As illustrated in FIG. 21, the transmitter 2110 is coupled between the receiver 2150 and ground 2190. The output interface circuit 2130 is configured to power down the receiver 2150 by de-coupling the receiver 2150 from ground (node) 2190. The output interface circuit 2130 is configured to power down the receiver 2150 (at least in part, e.g. at least the input interface circuit 2160) by driving the first transistor 2131 to a non-conductive state so that the output interface circuit 2130 presents high impedance to the receiver 2150. Since there is no toggling on the transmitter 2110's driver (e.g. the first transistor 2131 and the equivalent transistor for the negative polarity), the current from the receiver 2150 goes to zero and the receiver 2150's input interface circuit 2160 is powered down together with the output interface circuit 2130. Similarly, the output interface circuit 2130 is configured to power up the receiver 2150 (at least in part, e.g. at least the input interface circuit 2160) by (re-)coupling the receiver 2150 to ground (node) 2190.

The transmitter 2110 may, hence, be understood as master of the communication channel between the transmitter 2110 and the receiver 2150 since it may effectively control the power states of both entities as line master. Further, the transmitter 2110 may resume transmission at any time without the need to notify the receiver 2150 by simply starting to draw current from the receiver side. That is, the transmitter 2110 may put the receiver 2150 into a standby mode so that there is no transmission on the transmission link 2140 until the transmitter 2110 resumes transmission. No further action of the receiver 2150 is required for putting the input interface circuit 2160 into the standby mode. Further, the receiver 2150 does not require any circuitry like a wake-up receiver for detecting that the transmitter 2110 resumes transmission. Accordingly, power and a required semiconductor die area may be saved.

When the first transistor is driven to the non-conductive state, the output interface 2130 may be further configured to deactivate the bias current source 2135. Additionally, further circuitry of the transmitter 2110 (e.g. a PLL) may be deactivated or driven to a power saving mode.

The power states (modes of operation) may, e.g., by controlled by a higher layer control application or hardware (e.g. MAC layer). For example, turning off both the transmitter 2110 and the receiver 2160 may be controlled by the MAC layer. Further, the MAC layer may control the kind of data for the data signal 2121 generated by the processing circuit 2120. For example, the transmitter 2110 may generate the data signal 2121 to comprise specific idle symbols if the communication system 2100 is in an idle mode. Accordingly, the communication system 2100 may be kept operational at, e.g., a lower data processing rate in order to enable fast transition back to the fully operational (high throughput) mode. A detailed exemplary power scheme is described above in connection with FIG. 15*b*.

While the above description mainly focused on the transmitter 2110, the receiver 2150 is described in the following. Again, the description merely focuses on the receiver 2150's circuitry for signals exhibiting positive polarity.

The receiver 2150's input interface circuit 2160 comprises a common gate amplifier 2161 coupled between the transmission link 2140 and the supply voltage (node) 2195. The common gate amplifier 2161 receives a constant bias voltage $V_{bias}$.

Further, also the input interface circuit 2160 comprises circuitry for boosting high frequency components (energy) of the current signal received from the transmitter 2110. Therefore, the input interface circuit 2160 further comprises a second transistor 2162. A first terminal of the second transistor 2162 is coupled to the supply voltage (node) 2195, and a second terminal of the second transistor 2162 is coupled to the common gate amplifier 2161. A control terminal of the second transistor 2162 (e.g. its gate terminal) is capacitively coupled to the transmission link 2140 by means of (boost) capacitor 2163. A (boost) resistor 2164 is coupled between the control terminal and the second terminal of the second transistor 2162. The first transistor 2131 of the transmitter 2110 and the second transistor 2162 exhibit different conductivity. A (adjustable) load resistor 2165 is coupled between the common gate amplifier 2161 and the second terminal of the second transistor 2162. The load resistor 2165 may enable load control to change the gain and the operating point of the input interface circuit 2160. The boost circuitry may enable a high frequency boost of the load to enhance the gain at high frequencies for line equalization.

Like the output interface circuit 2130, the input interface circuit 2160 comprises a termination resistor 2166 configured to terminate the transmission lines of the differentially implemented transmission link 2140.

Additionally, the input interface circuit 2160 comprises a protection circuit 2167 against ESD. The protection circuit 2167 illustrated in FIG. 21 is exemplary and may in some examples be replaced with different protection circuitry (e.g. see FIG. 26*a*).

The input interface circuit 2160 comprises a node 2168 coupled between the common gate amplifier 2161 and the second transistor 2162. The node 2168 provides the resulting receive signal of the input interface circuit 2160. The receive signal is supplied to further circuitry of the receiver 2150 for signal decoding. The circuitry for signal decoding may be directly coupled to the input interface circuit 2160 or via one or more interconnected circuits.

For decoding the receive signal, the receiver 2150 further comprises a processing circuit (e.g. a TDC) 2170 configured to determine at least a sequence of a fourth signal edge of a first type, a fifth signal edge of a second type, and a sixth signal edge of the first type in the receive signal. Again, the first type may be a rising edge and the second type be a falling edge, or the second type may be a rising edge and the first type be a falling edge.

In a differential implementation as illustrated in FIG. 21, the processing circuit 2170 may be configured to determine the fourth signal, the fifth signal and the sixth signal edge further based on a second receive signal of opposite polarity provided by the input interface circuit 2160 (the second receive signal is inverted with respect to the receive signal of positive polarity).

Further, the receiver 2150 comprises a demodulation circuit 2180 configured to determine third data based on a third time period between the fourth signal edge and the fifth signal edge, and to determine fourth data based on a fourth time period between the fifth signal edge and the sixth signal edge. That is, the processing circuit 2170 and the demodulation circuit 2180 recover the data time encoded into the receive signal by the transmitter 2110. As described above, a sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

The transmitter 2110 and the receiver 2150 may be implemented on a same semiconductor die or on different semiconductor dies. For example, the receiver 2150 may be implemented on a first semiconductor die, whereas the transmitter 2110 may be implemented on a (different) second semiconductor die. The design of the transmitter 2110 and the receiver 2150 allows to use a same or different supply voltage levels for both dies. That is, a first supply voltage domain of the first semiconductor die may be different from a second supply voltage domain of the second semiconductor die. For example, a first supply voltage used in the first voltage supply domain may be higher than a second supply voltage used in the second voltage supply domain.

As described above in connection with FIG. 21, duty cycle Current-Mode Logic, CML, signals may be used for transferring data between a transmitter and a receiver. CML signals may allow high frequency signaling (e.g. 20 Gbit/s or more on a single transmission line) using low amplitudes (e.g. ±40 mV) so that a low power design may be provided. At least part of a receiver may be implemented in Complementary Metal-Oxide-Semiconductor, CMOS, technology. CMOS based circuitry is configured to processes signals exhibiting a predefined voltage amplitude (voltage swing) that may be different from the low amplitude of the CML signals. Hence, a conversion from CML to CMOS logic may be desired.

An example of a CML to CMOS logic conversion circuit 2200 is illustrated in FIG. 22*a*. The CML to CMOS logic conversion circuit 2200 comprises a CML circuit 2210 configured to receive a differential pair of CML input signals 2201. The CML circuit 2210 is configured to generate a differential pair of CML output signals 2211 based on the differential pair of CML input signals 2201. For generating the differential pair of CML output signals 2211, the CML circuit 2201 comprises a pair of transistors 2212 coupled in parallel between a ground node 2202 and a node 2205 providing a supply voltage for the CML circuit 2210. Each of the pair of transistors 2212 is configured to receive one of the differential pair of CML input signals 2201 at its respective control terminal (e.g. its gate terminal). A pair of output nodes 2214 is coupled between the pair of transistors 2212 and the node 2205 providing the supply voltage. The pair of output nodes 2214 provides the differential pair of CML output signals 2211.

Further, the CML to CMOS logic conversion circuit 2200 comprises an inverter circuit 2220 configured to receive the differential pair of CML output signals 2211, and to generate a differential pair of CMOS signals 2221 based on the differential pair of CML output signals 2211. The pair of CMOS signals 2221 exhibits a voltage amplitude according to the CMOS logic used in downstream CMOS based circuitry. As indicated in FIG. 22*a*, the inverter circuit 2220 may, e.g., comprise a first pair of inverters 2222 coupled in series and configured to generate one of the differential pair of CMOS signals 2221 based on one of the differential pair of CML output signals 2211, and a second pair of inverters 2223 coupled in series and configured to generate the other one of the differential pair of CMOS signals 2221 based on the other one of the differential pair of CML output signals 2211.

The CML to CMOS logic conversion circuit 2200 additionally comprises a bias circuit 2230 configured to adjust the supply voltage for the CML circuit 2210 based on a comparison of a common mode signal component 2211' of the differential pair of CML output signals 2211 to a signal 2231 indicative of a threshold voltage of the inverter circuit 2220. The threshold voltage of the inverter circuit 2220 is the voltage level defining the threshold between a first input voltage range for which the inverter circuit 2220 outputs a first logic (CMOS) state and a second input voltage range for which the inverter circuit 2220 outputs a second logic (CMOS) state. In other words, the threshold voltage of the inverter circuit 2220 may be understood as a switching point of the inverter circuit 2220.

By adjusting the supply voltage for the CML circuit 2210 based on the comparison of the common mode signal component 2211' of the differential pair of CML output signals 2211 to the signal 2231 indicative of the threshold voltage of the inverter circuit 2220, the CML circuit 2210 may be controlled to adjust the common mode signal component 2211' of the differential pair of CML output signals 2211 substantially exactly to the threshold voltage of the inverter circuit 2220 (the inverter threshold point). Hence, the CML to CMOS logic conversion circuit 2200 may be substantially insensitive to the common mode of the differential pair of CML input signals 2201. Accordingly, the CML to CMOS logic conversion circuit 2250 may be insensitive to variations of the ground noise as well as Process, Voltage and Temperature (PVT) variation effects in upstream circuitry providing the differential pair of CML input signals 2201.

The CML circuit 2210 further comprises a pair of resistors 2215 coupled between the pair of transistors 2212 and the node 2205 providing the supply voltage. The pair of resistors 2215 together with the inverter circuit 2220 may allow to adjust the high frequency bandwidth of the CML to CMOS logic conversion circuit 2200. The differential pair of CML input signals 2201 are at high frequency. The inverter circuit 2220 presents a load to the CML circuit 2210. Selecting a low input capacitance of the inverter circuit 2220 together with a suitably selected resistance for the pair of resistors 2215 may enable to tune the high frequency bandwidth of the CML to CMOS logic conversion circuit 2200. For example, a 30 fF input capacitance for the inverter circuit 2220 and a resistance of 1 kΩ for each of the pair of resistors 2215 yields a pole at a frequency of about 5 GHz and, hence, high bandwidth. By reducing the resistor size, the bandwidth may be further increased.

The CML circuit 2210 additionally comprises a bias current source 2216 coupled between the pair of transistors 2212 and the ground node 2202. As indicated in FIG. 22*a*, the bias current source 2216 may, e.g., be a transistor configured to control its conductivity based on a bias signal 2217. By varying the bias signal 2217, the current through the current source 2216 may be varied. Accordingly, the current through the current source 2216 may be increased using the bias signal 2217 in order to further increase the high frequency bandwidth of the CML to CMOS logic conversion circuit 2200.

In parallel to the pair of resistors 2215, a capacitor 2218 is further coupled between the node 2205 providing the supply voltage for the CML circuit 2210 and the ground node 2202.

For controlling the supply voltage for the CML circuit 2210, the bias circuit 2230 comprises an operational amplifier 2232 configured to generate a control signal 2233 based on the common mode signal component 2211' and the signal 2231 indicative of the threshold voltage of the inverter circuit 2220. Further, the bias circuit 2230 comprises a transistor 2234 coupled between a supply voltage source 2203 (providing a supply voltage $V_{DD}$) and the node 2205 providing the supply voltage for the CML circuit 2210. The transistor 2234 is configured to adjust its conductivity based on the control signal 2233 in order to adjust/control the voltage and/or the current flowing from the supply voltage source 2203 to the CML circuit 2210. As said above, by controlling the supply voltage for the CML circuit 2210, the common mode of the differential pair of CML output signals 2211 may be adjusted to substantially the threshold voltage of the inverter circuit 2220 (the inverter threshold point).

For providing the signal 2231 indicative of the threshold voltage of the inverter circuit 2220, the bias circuit 2220 comprises a loop circuit 2235. The loop circuit 2235 comprises an inverter 2236 and a resistor 2237 coupled in series and forming a closed loop. A node 2238 of the loop circuit 2235 is coupled to a first input of the operational amplifier 2232 for providing the signal 2231 indicative of the threshold voltage of the inverter circuit 2220. The resistor feedback keeps the inverter 2236 substantially at its threshold voltage (threshold point). The threshold voltage of the inverter 2236 is substantially identical to the threshold voltage of the inverter circuit 2220. By means of the signal 2231, the voltage threshold point is transferred to the operational amplifier 2232. The operational amplifier 2232 compares the voltage threshold indicated by signal 2231 to the common mode signal component 2211' of the differential pair of CML output signals 2211 supplied to the second input of the operational amplifier 2232 by a pair of resistors 2240.

Each of the pair of resistors 2240 is configured to receive one of the differential pair of CML output signals 2211. Both resistors of the pair of resistors 2240 are coupled to the second input of the operational amplifier 2232 for providing the common mode signal component 2211' of the differential pair of CML output signals 2211 to the operational amplifier 2232. As indicated in FIG. 22*a*, the resistors of the pair of resistors 2240 may exhibit the same resistance as the resistor 2237 in the loop circuit 2235 (e.g. 10 kΩ). In some examples, the resistors of the pair of resistors 2240 may alternatively exhibit a different resistance than the resistor 2237 in the loop circuit 2235.

For example, if the common mode signal component 2211' (the common mode voltage of the differential pair of CML output signals 2211) is smaller than the voltage threshold indicated by signal 2231, the operational amplifier 2232 will control the transistor 2234 to increase its conductivity in order to shift/offset the common mode of the differential pair of CML output signals 2211 up to the voltage threshold of the inverter circuit 2220. On the other hand, if the common mode signal component 2211' is larger than the voltage threshold indicated by signal 2231, the operational amplifier 2232 will control the transistor 2234 to decrease its conductivity in order to shift/offset the common mode of the differential pair of CML output signals 2211 down to the voltage threshold of the inverter circuit 2220.

The analog loop circuit 2235 may, in some examples, be turned on and off in pre-defined duty cycles in order to reduce the overall current consumption of the CML to CMOS logic conversion circuit 2200. In order to preserve the correct voltages during off periods (to maintain the optimal operation point of the CML to CMOS logic conversion circuit 2200) the bias circuit 2230 may optionally comprise two additional capacitors. A first capacitor 2239*a* may be coupled between ground and the signal line coupling the operational amplifier 2232 to the transistor 2234 in order to preserve the control signal 2233. Further, a second capacitor 2239*b* may be coupled between ground and the signal line coupling the node 2238 of the loop circuit 2235 to the input of the operational amplifier 2232 in order to preserve the signal 2231.

FIG. 22*b* illustrates a relation between an inverter input and an inverter output. The abscissa denotes the input voltage for the inverter, and the ordinate denotes the output voltage of the inverter. It can be seen from FIG. 22*b* that the highest gain is at the threshold voltage (threshold point) of the inverter, which is denoted as Inv_th. The closed loop bias circuit 2230 of CML to CMOS logic conversion circuit 2200 may allow to keep the differential pair of CML output signals 2211 substantially exactly at the inverter threshold point.

Exemplary courses of signals described above in connection with CML to CMOS logic conversion circuit 2200 are illustrated in FIG. 22*c*. Line 2224 represents the threshold voltage of the inverter circuit 2220. In the example of FIG. 22*c*, the threshold voltage of the inverter circuit 2220 is assumed to be 400 mV (which corresponds to half of the difference between two logic voltage levels in the used CMOS logic). However, it is to be noted that also any other voltage level may be used for the threshold voltage.

Lines 2201*a* and 2201*b* represent the two CML signals of the differential pair of CML input signals 2201. It is evident from FIG. 22*c* that the two CML signals of the differential pair of CML input signals 2201 have a common mode of approx. 500 mV and an amplitude of approx. ±50 mV.

Further, lines 2211*a* and 2211*b* represent the two CML signals of the differential pair of CML output signals 2211. As can be seen from FIG. 22*c*, the common mode of the two CML signals of the differential pair of CML output signals 2211 is adjusted to approx. 400 mV (the threshold voltage of the inverter circuit 2220) by the bias circuit 2230 and the CML circuit 2210. That is, the high frequency CML output signals 2211 are sitting pretty much exactly on the inverter threshold point. This may allow accurate and high gain of the inverter circuit 2220 when transferring the signals from the CML level to the full rail to rail CMOS level as represented by lines 2221*a* and 2221*b* in the lower part of FIG. 22*c*. Lines 2221*a* and 2221*b* represent the two CMOS signals of the differential pair of CMOS signals 2221. It can be seen from FIG. 22*c* that the two CMOS signals of the differential pair of CMOS signals 2221 vary between the two logic voltage levels of the used CMOS logic (0 mV and 800 mV). Again, it is to be noted that the illustrated voltage levels of the CMOS logic are merely examples and that any other voltage levels may be used.

Another CML to CMOS logic conversion circuit 2250 using an alternative approach is illustrated in FIG. 22*d*.

The CML to CMOS logic conversion circuit 2250 comprises a CML circuit 2260 configured to generate a differential pair of CML output signals 2261 based on a differential pair of CML input signals 2251. Similar to CML circuit 2210, the CML circuit 2220 comprises a pair of transistors 2262 coupled in parallel between a ground node 2252 and a node 2255 providing a supply voltage for the CML circuit 2260. In contrast to CML to CMOS logic conversion circuit 2200, node 2255 provides a constant supply voltage for the CML circuit 2260. Again, each of the pair of transistors 2262 is configured to receive one of the differential pair of CML input signals 2251 at its respective control terminal (e.g. its gate terminal). Further, the CML circuit 2260 again comprises a pair of output nodes 2264 coupled between the pair of transistors 2262 and the node 2255 providing the constant supply voltage for the CML circuit 2260 The pair of output nodes 2264 provides the differential pair of CML output signals 2261. Additionally, also the CML circuit 2260 comprises a pair of resistors 2265 coupled between the pair of transistors 2262 and the node 2255 providing the constant supply voltage for the CML circuit 2260. Also, the CML circuit 2260 further comprises a bias current source 2266 coupled between the pair of transistors 2262 and the ground node 2252. The bias current source 2266 may again be a transistor configured to control its conductivity based on a bias signal 2267. In parallel to the pair of resistors 2265, a capacitor 2268 is further coupled between the node 2255 providing the constant supply voltage for the CML circuit 2260 and the ground node 2252.

Further, the CML to CMOS logic conversion circuit 2250 comprises an inverter circuit 2270 configured to generate a differential pair of CMOS signals 2271 based on the differential pair of CML output signals 2261. Similar to inverter circuit 2220, the inverter circuit 2270 may comprise a first pair of inverters 2272 coupled in series and configured to generate one of the differential pair of CMOS signals 2271 based on one of the differential pair of CML output signals 2261, and a second pair of inverters 2273 coupled in series and configured to generate the other one of the differential pair of CMOS signals 2271 based on the other one of the differential pair of CML output signals 2261.

The CML to CMOS logic conversion circuit 2250 additionally comprises a bias circuit 2280 configured to adjust a supply voltage ($V_{DD\_INV}$) for the inverter circuit 2270 based on a comparison of a common mode signal component 2261' of the differential pair of CML output signals 2261 to a signal 2281 indicative of a threshold voltage of the inverter circuit 2270.

By adjusting the supply voltage for the inverter circuit 2270 based on the comparison of the common mode signal component 2261' of the differential pair of CML output signals 2261 to the signal 2281 indicative of the threshold voltage of the inverter circuit 2270, the threshold voltage of the inverter circuit 2270 may be adjusted to common mode signal component 2211' (the common mode) of the differential pair of CML output signals 2211. Hence, also the CML to CMOS logic conversion circuit 2250 may be substantially insensitive to the common mode of the differential pair of CML input signals 2251. Accordingly, the CML to CMOS logic conversion circuit 2250 may be insensitive to variations of the ground noise as well as PVT variation effects in upstream circuitry providing the differential pair of CML input signals 2201.

For controlling the supply voltage for the inverter circuit 2270, the bias circuit 2280 comprises an operational amplifier 2282 configured to generate a control signal 2283 based on the common mode signal component 2261' and the signal 2281 indicative of the threshold voltage of the inverter circuit 2270. Further, the bias circuit 2280 comprises a transistor 2284 coupled between a supply voltage source 2253 (providing a supply voltage $V_{DD\_IN}$) and the inverter circuit 2270. The transistor 2284 is configured to adjust its conductivity based on the control signal 2283 in order to adjust/control the voltage and/or the current flowing from the supply voltage source 2253 to the inverter circuit 2270. As said above, by controlling the supply voltage for the inverter circuit 2270, the threshold voltage of the inverter circuit 2270 (the inverter threshold point) may be adjusted to the common mode of the differential pair of CML output signals 2261.

For providing the signal 2281 indicative of the threshold voltage of the inverter circuit 2270, the bias circuit 2270 comprises a loop circuit 2285. The loop circuit 2285 comprises an inverter 2286 and a resistor 2287 coupled in series and forming a closed loop. A node 2288 of the loop circuit 2285 is coupled to a first input of the operational amplifier 2282 for providing the signal 2281 indicative of the threshold voltage of the inverter circuit 2270. The resistor feedback keeps the inverter 2286 substantially at its threshold voltage (threshold point). Further, the inverter 2286 comprises a power supply input terminal configured to receive the supply voltage $V_{DD\_IN}$ for the inverter circuit 2270 in order to adjust the threshold voltage of the inverter 2286 to substantially the present threshold voltage of the inverter circuit 2270. Accordingly, the threshold voltage of the inverter 2286 is substantially identical to the threshold voltage of the inverter circuit 2270. By means of the signal 2281, the voltage threshold point is transferred to the operational amplifier 2282. The operational amplifier 2282 compares the voltage threshold indicated by signal 2281 to the common mode signal component 2261' of the differential pair of CML output signals 2261 supplied to the second input of the operational amplifier 2282 by a pair of resistors 2290.

Each of the pair of resistors 2290 is configured to receive one of the differential pair of CML output signals 2261. Both resistors of the pair of resistors 2290 are coupled to the second input of the operational amplifier 2282 for providing the common mode signal component 2261' of the differential pair of CML output signals 2261 to the operational amplifier 2282.

For example, if the common mode signal component 2261' (the common mode voltage of the differential pair of CML output signals 2261) is smaller than the voltage threshold indicated by signal 2281, the operational amplifier 2282 will control the transistor 2284 to increase its conductivity in order to increase the supply voltage $V_{DD\_IN}$ for the inverter circuit 2270 so that the voltage threshold of the inverter circuit 2270 is shifted up to the common mode of the differential pair of CML output signals 2261. On the other hand, if the common mode signal component 2261' is larger than the voltage threshold indicated by signal 2281, the operational amplifier 2282 will control the transistor 2284 to decrease its conductivity in order to decrease the supply voltage $V_{DD\_IN}$ for the inverter circuit 2270 so that the voltage threshold of the inverter circuit 2270 is shifted down to the common mode of the differential pair of CML output signals 2261.

Each of the first pair of inverters 2272 and the second pair of inverters 2272 comprises a respective power supply input terminal configured to receive the supply voltage $V_{DD\_IN}$ for the inverter circuit 2270.

Similarly to analog loop circuit 2235 also the analog loop circuit 2285 may be turned on and off in pre-defined duty cycles in order to reduce the overall current consumption of the CML to CMOS logic conversion circuit 2250. In order to preserve the correct voltages during off periods (e.g. to maintain the optimal operation point of the CML to CMOS logic conversion circuit 2250) also the bias circuit 2285 may optionally comprise two additional capacitors. A first capacitor **2289*a* may be coupled between ground and the signal line coupling the operational amplifier 2282 to the transistor 2284 in order to preserve the control signal 2283. Further, a second capacitor 2289*b* may be coupled between ground and the signal line coupling the node 2288 of the loop circuit 2285 to the input of the operational amplifier 2282 in order to preserve the signal 2281**.

The above described CML to CMOS logic conversion circuits may be used for any electronic device or application that requires CML to CMOS logic conversion. The above described CML to CMOS logic conversion circuits may, e.g., be used for transmitting a high frequency clock between different in-die domains of a semiconductor die. Further, the above described CML to CMOS logic conversion circuits may, e.g., be used for communication interfaces such as Peripheral Component Interconnect express (PCIe), Universal Serial Bus (USB), SERializer/DESerializer (SERDES) or any other CML based interface.

An example of a communication apparatus 2295 according to the STEP protocol that uses the CML to CMOS logic conversion circuit 2200 of FIG. 22*a* is illustrated in FIG. 22*e*.

The communication apparatus 2295 comprises a receiver circuit 2296 configured to generate (provide) the differential pair of CML input signals 2201 based on a differential pair of data signals In+ and In− received from a transmission link (not illustrated). As an example for the receiver circuit 2296, the receiver 2150 of FIG. 21 is illustrated. However, it is to be noted that also any other kind of receiver circuit may be used.

Additionally, the communication apparatus 2295 comprises a processing circuit 2297 and a demodulation circuit 2298 for decoding the differential pair of CMOS signals 2221 as provided by the CML to CMOS logic conversion circuit 2200. Both of the processing circuit 2297 and the demodulation circuit 2298 are implemented in CMOS technology. The processing circuit 2297 (e.g. a TDC) is configured to determine a sequence of a first signal edge of a first type, a second signal edge of a second type, and a third signal edge of the first type in the differential pair of CMOS signals. Again, the first type may be a rising edge and the second type be a falling edge, or the second type may be a rising edge and the first type be a falling edge.

The demodulation circuit 2298 is configured to determine first data based on a first time period between the first signal edge and the second signal edge, and to determine second data based on a second time period between the second signal edge and the third signal edge. That is, the processing circuit 2297 and the demodulation circuit 2298 recover the data time encoded into the data signals received from the transmission link. As described above, a sum of the third time period and the fourth time period may be lower than $10^{-7}$ s, $10^{-8}$ s, $10^{-9}$ s, $10^{-10}$ s, $10^{-11}$ s, or $10^{-12}$ s according to the STEP protocol.

The CML to CMOS logic conversion circuit may support the high frequency signaling according to the STEP protocol while being insensitive to PVT effects and varying common mode of the input signals. Further, the CML to CMOS logic conversion circuit exhibits a low power design so that it draws only little current. Further, the CML to CMOS logic conversion circuit may avoid introducing memory effects into the data stream. Additionally, the CML to CMOS logic conversion circuit may allow to maintain a duty cycle of the processed signals (e.g. maintain the modulation scheme). Further, the CML to CMOS logic conversion circuit may allow to quickly transition between different modes of operation (e.g. from an idle mode to a high throughput mode in less than 1 ns).

Though the CML to CMOS logic conversion circuit 2200 is illustrated in FIG. 22*e*, it is to be noted that alternatively also the CML to CMOS logic conversion circuit 2250 may be used.

As described above, DTCs may be used for generating time-encoded data signals. A DTC is controlled via a control word provided by control circuitry based on the data to be encoded. The DTC itself as well as the control circuitry consume power. In the following, a few DTC architectures are described in connection with FIGS. 23*a* to 23*d* that may enable reduced power consumption.

FIG. 23*a* illustrates a DTC 2300 comprising plurality of interpolation cells 2310-1, . . . , 2310-*n* configured to receive a first signal 2301 and a second signal 2302 as input. At least one of the plurality of interpolation cells 2310-1, . . . , 2310-*n* is configured to provide, based on a control word 2303, at least one of the first signal 2301 and the second signal 2302 as respective cell output signal 2311-1, . . . , 2311-*n*. That is, based on the control word 2303, at least one of the plurality of interpolation cells 2310-1, . . . , 2310-*n* provides the first signal 2301, the second signal 2302, or a combination of the first signal 2301 and the second signal 2302 as cell output signal 2311-, . . . , 2311-*n*. In some examples, each of the plurality of interpolation cells 2310-1, . . . , 2310-*n* provides, based on a control word 2303, at least one of the first signal 2301 and the second signal 2302 as respective cell output signal 2311-1, . . . , 2311-*n*.

Further, the DTC 2300 comprises an output node 2320 coupled to the plurality of interpolation cells 2310-1, . . . , 2310-*n*. The output node 2320 is configured to combine cell output signals 2311-1, . . . , 2311-*n* of the plurality of interpolation cells 2310-1, . . . , 2310-*n* to an output signal 2304. Output signal 2304 represents an interpolation between the first signal 2301 and the second signal 2302 that is controlled via the control word 2303.

As indicated in FIG. 23*a*, the output signal 2304 is feed back to the plurality of interpolation cells 2310-1, . . . , 2310-*n*. In other words, the first signal 2301 and the second signal 2302 are based on the output signal 2304. As a consequence, the first signal 2301 and the second signal 2302 exhibit the same time grid as the output signal 2304. This is contrary to conventional DTC architectures in which the DTC input signals exhibit a different time grid than the DTC output signal. For example, the time grid of the DTC input signals is conventionally determined by the oscillator providing the input signals or a reference signal the DTC input signals are based on, whereas the time grid of the DTC output signal is determined by the DTC control word. Hence, there is a continuously changing phase shift between the DTC input signals and the DTC output signal for a conventional DTC. As a consequence, the DTC control word needs to be updated for each cycle for a conventional DTC. Even if the DTC output signal remains constant (the time period between directly succeeding signal edges in the DTC output signal remains constant), the code word for the DTC needs to be updated for each cycle in a conventional DTC due to the continuously changing phase shift between the DTC input signals and the DTC output signal. Accordingly, control circuitry (e.g. a decoder) for the conventional DTC needs to constantly update the control word for the DTC.

However, since for DTC 2300 the DTC inputs and the DTC output exhibit the same time grid due to the feedback of the output signal 2304, it may be sufficient to update the control word 2303 only if the output signal is to change. For example, if the time period between multiple directly succeeding signal edges in the output signal 2304 is to remains constant, the same control word 2303 may be used. Only if the time period is to change, the control word 2303 needs to be updated. Accordingly, control of the DTC 2300 may be (significantly) facilitated. The reduced update rate for the control word 2303 may allow power saving in a control circuit (e.g. a decoder; not illustrated) for the DTC 2300.

For generating the first signal 2301 and the second signal 2302 based on the output signal 2304, the DTC 2300 comprises two inverter circuits 2321, 2322 and a delay circuit 2323. The first inverter circuit 2321 is configured to receive the output signal 2304 and to supply the inverted output signal as first signal 2301 to the plurality of interpolation cells 2310-1, . . . , 2310-*n*. Further, the delay circuit 2323 is coupled in parallel to the first inverter circuit 2321 and configured to delay the output signal 2304. The second inverter circuit 2322 is coupled in series to the delay circuit 2323 and configured to receive the delayed output signal. Further, second inverter circuit 2322 is configured to supply the inverted delayed output signal as second signal 2302 to the plurality of interpolation cells 2310-1, . . . , 2310-*n*.

Another DTC 2330 is illustrated in FIG. 23*b*. DTC 2330 is substantially equal to DTC 2300. However, the DTC 2330 additionally allows to reset the output signal 2304. In order to avoid lengthy repetitions, merely the differences between DTC 2330 and DTC 2300 are described in the following. In DTC 2330 the inverter circuits 2321, 2322 of DTC 2300 are replaced with NAND gates 2324, 2325 for generating the first signal 2301 and the second signal 2302 based on the output signal 2304.

The first NAND gate 2324 is configured to receive the output signal 2304 and a reset signal 2305. Based on the comparison of the respective logic levels of the output signal 2304 and the reset signal 2305, the first NAND gate 2324 generates the first signal 2301 and supplies it to the plurality of interpolation cells 2310-1, . . . , 2310-*n*. Further, the delay circuit 2323 is coupled in parallel to the first NAND gate 2324 and configured to delay the output signal 2304. The second NAND gate 2325 is coupled in series to the delay circuit 2323 and configured to receive the delayed output signal and the reset signal 2305. Further, second NAND gate 2325 is configured to generate the second signal 2302 based on the comparison of the respective logic levels of the delayed output signal and the reset signal 2305. The second NAND gate 2325 supplies the second signal 2302 to the plurality of interpolation cells 2310-1, . . . , 2310-*n*.

A DTC 2340 using a delay line instead of interpolation circuits is illustrated in FIG. 23*c*. The DTC 2340 comprises a delay circuit 2341 configured to iteratively delay an input signal 2344 for generating a plurality of delayed input signals 2347-1, . . . , 2347-*n*. As indicated in FIG. 23*c*, the delay circuit 2341 may, e.g., be comprise a plurality of delay elements each configured to delay the input signal 2344 by a predefined delay time. Further, DTC 2340 comprises multiplexer 2342 coupled to the delay circuit 2341 and configured to output, based on a control word 2346, one of the plurality of delayed input signals 2347-1, . . . , 2347-*n* as output signal 2345.

As indicated in FIG. 23*c*, the output signal 2345 is fed back to the delay circuit 2341. In other words, the input signal 2344 is based on the output signal 2345. For example, an inverter circuit 2343 may be configured to receive the output signal 2345 and to supply the inverted output signal as input signal 2344 to the delay circuit 2341.

Similar to DTCs 2300 and 2330, the DTC input and the DTC output exhibit the same time grid due to the feedback of the output signal 2345. Accordingly, it may be sufficient to update the control word 2346 only if the output signal 2345 is to change. Again, if the time period between multiple directly succeeding signal edges in the output signal 2345 is to remain constant, the same control word 2346 may be used. Only if the time period is to change, the control word 2346 needs to be updated. Accordingly, control of the DTC 2340 may be (significantly) facilitated. The reduced update rate for the control word 2346 may allow power saving in a control circuit (e.g. a decoder; not illustrated) for the DTC 2340 that generates the control word 2346.

A further DTC 2350 that may allow to double the rate compared to DTCs 2300 and 2330 described above is illustrated in FIG. 23*d*.

The DTC 2350 comprises a first plurality of interpolation cells 2360-1, . . . , 2360-*n* (e.g. Digitally Controlled Edge Interpolators, DCEI) configured to receive a first signal 2351 and a second signal 2352 as input. At least one (e.g. all) of the first plurality of interpolation cells 2360-1, . . . , 2360-*n* is configured to provide, based on a control word 2355, at least one of the first signal 2351 and the second signal 2352 as respective cell output signal 2361-1, . . . , 2361-*n*. That is, based on the control word 2355, at least one of the first plurality of interpolation cells 2310-1, . . . , 2310-*n* provides the first signal 2351, the second signal 2352, or a combination of the first signal 2351 and the second signal 2352 as respective cell output signal 2361-, . . . , 2361-*n*. In some examples, each of the first plurality of interpolation cells 2360-1, . . . , 2360-*n* provides, based on the control word 2355, at least one of the first signal 2351 and the second signal 2352 as respective cell output signal 2361-1, . . . , 2361-*n*.

Further, the DTC 2350 comprises a first node 2362 coupled to the first plurality of interpolation cells 2360-1, . . . , 2360-*n* and configured to combine cell output signals 2361-1, . . . , 2361-*n* of the first plurality of interpolation cells 2360-1, . . . , 2360-*n* to a first interpolation signal 2357.

A second plurality of interpolation cells 2370-1, . . . , 2370-*n* is configured to receive a third signal 2353 and a fourth signal 2354 as input. Similar to the first plurality of interpolation cells 2360-1, . . . , 2360-*n*, at least one of the second plurality of interpolation cells 2370-1, . . . , 2370-*n* is configured to provide, based on the control word 2355, at least one of the third signal 2353 and the fourth signal 2354 as respective cell output signal 2371-1, . . . , 2371-*n*. In some examples, each of the second plurality of interpolation cells 2370-1, . . . , 2370-*n* provides, based on the control word 2355, at least one of the third signal 2353 and the fourth signal 2354 as respective cell output signal 2371-1, . . . , 2371-*n*.

A second node 2372 is coupled to the second plurality of interpolation cells 2370-1, . . . , 2370-*n* and configured to combine cell output signals 2371-1, . . . , 2371-*n* of the second plurality of interpolation cells 2370-1, . . . , 2370-*n* to a second interpolation signal 2358.

As indicated in FIG. 23*d*, the first signal 2351 and the second signal 2352 are based on the second interpolation signal 2358, whereas the third signal 2353 and the fourth signal 2354 are based on the first interpolation signal 2357.

The DTC 2350 further comprises a logic circuit 2388 (e.g. an XOR gate as illustrated in FIG. 23*d*) configured to combine the first interpolation signal 2357 and the second interpolation signal 2358 to an output signal 2358.

Similar to DTCs 2300, 2330 and 2340, the inputs for the two pluralities of interpolation cells exhibit the same time grid due to coupling of the respective interpolation signal to the other plurality of interpolation cells. Accordingly, it may be sufficient to update the control word 2355 only if the output signal 2359 is to change. Compared to DTCs 2300 and 2330, the rate of output signal 2359 may be doubled due to the loop coupling of the two pluralities of interpolation cells.

For generating the first signal 2351, the second signal 2352, the third signal 2353 and the fourth signal 2354 based on the respective interpolation signals 2357 and 2358, the DTC 2350 comprises NAND gates 2381, 2382, 2383 and 2384 similar to DTC 2330 described above. The NAND gates 2381, 2382, 2383 and 2384 may further allow to reset the output signal 2359 based on a reset signal 2356.

The first NAND gate 2381 is configured to receive the second interpolation signal 2358 and the reset signal 2356. Based on the comparison of the respective logic levels of the second interpolation signal 2358 and the reset signal 2356, the first NAND gate 2381 generates the first signal 2351 and supplies it to the first plurality of interpolation cells 2360-1, . . . , 2360-*n*. Further, a first delay circuit 2385 is coupled in parallel to the first NAND gate 2381 and configured to delay the second interpolation signal 2358. The second NAND gate 2382 is coupled in series to the first delay circuit 2385 and configured to receive the delayed second interpolation signal and the reset signal 2305. Further, second NAND gate 2382 is configured to generate the second signal 2352 based on the comparison of the respective logic levels of the delayed second interpolation signal and the reset signal 2305. The second NAND gate 2382 supplies the second signal 2352 to the first plurality of interpolation cells 2360-1, . . . , **2360-*n***.

Similarly, the third NAND gate 2383 is configured to receive the first interpolation signal 2357 and the reset signal 2356. Based on the comparison of the respective logic levels of the first interpolation signal 2357 and the reset signal 2356, the third NAND gate 2383 generates the third signal 2353 and supplies it to the second plurality of interpolation cells 2370-1, . . . , **2370-*n*. Further, a second delay circuit 2386 is coupled in parallel to the third NAND gate 2383 and configured to delay the first interpolation signal 2357. The fourth NAND gate 2384 is coupled in series to the second delay circuit 2385 and configured to receive the delayed first interpolation signal and the reset signal 2305. Further, the fourth NAND gate 2384 is configured to generate the fourth signal 2354 based on the comparison of the respective logic levels of the delayed first interpolation signal and the reset signal 2305. The fourth NAND gate 2384 supplies the fourth signal 2354 to the second plurality of interpolation cells 2370-1, . . . , 2370-*n***.

In some examples, the NAND gates may be replaced by inverter circuits similar to DTC 2300 described above. That is, DTC 2350 may alternatively comprise a first inverter circuit configured to receive the second interpolation signal 2358 and to supply the inverted second interpolation signal as the first signal 2352 to the first plurality of interpolation cells 2360-1, . . . , **2360-*n*. Further, the DTC 2350 may comprise a second inverter circuit configured to receive the delayed second interpolation signal and to supply the inverted delayed second interpolation signal as second signal 2352 to the first plurality of interpolation cells 2360-1, . . . , 2360-*n*. Similarly, the DTC 2350 may comprise a third inverter circuit configured to receive the first interpolation signal 2357 and to supply the inverted first interpolation signal as third signal 2353 to the second plurality of interpolation cells 2370-1, . . . , 2370-*n*. A fourth inverter circuit of the DTC 2350 may be configured to receive the delayed first interpolation signal and to supply the inverted delayed first interpolation signal as fourth signal 2354 to the second plurality of interpolation cells 2370-1, . . . , 2370-*n***.

The DTCs described above in connection with FIGS. **23*a* to 23*d* may be used within a variety of electronic devices and applications. For example, the DTCs may be used for communication interfaces. FIG. 23*e* illustrates a corresponding example of an apparatus 2390 for generating a data signal 2394**.

The apparatus 2390 comprises a DTC 2391 as described above in connection with FIGS. **23*a* to 23*d*. The DTC 2391 is configured to generate the data signal 2394 as its output signal based on data 2393 to be transmitted. The data signal 2394** comprises a sequence of a first signal edge of a first type, a second signal edge of a second type, and a third signal edge of the first type. The first signal edge and the second signal edge are separated by a first time period corresponding to first data to be transmitted, and the second signal edge and the third signal edge being separated by a second time period corresponding to second data to be transmitted. Accordingly, the control word for the DTC is generated based on the first data to be transmitted and the second data to be transmitted. For example, the first data may be a first data symbol and the second data be a second data symbol to be transmitted according to a data communication protocol like the STEP protocol. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge.

Further, the apparatus 2390 comprises an output interface circuit 2392 configured to output the data signal 2394 to a transmission link (not illustrated).

The apparatus 2390 may allow to generate the data signal 2394 with reduced power and high precision.

For enabling differential signal transmission via the transmission link, the apparatus 2390 may additionally comprise a second DTC 2395 as described above in connection with FIGS. **23*a* to 23*d*. The second DTC 2395 is configured to generate a second data signal 2396 based on the data 2393 to be transmitted, wherein the second data signal 2396 is inverted with respect to the data signal 2394. Alternatively, the DTC 2394 may be configured to further generate the second data signal 2396 so that the second DTC 2395** may be omitted.

A further feature of DTCs that may allow to save power is the DTC resolution. For example, in signal generation applications like a communication interface according to the STEP protocol only a set of predefined modulation steps is used (only predefined time periods between directly succeeding signal edges in the data signal are used). However, conventional DTCs are uniform and cover the full range with the maximum resolution needed for the link budget. A conventional DTC typically has a uniform resolution with a binary number ($2^N$) of bits. However, as described above, a communication protocol such as the STEP protocol may only require the generation of a few discrete modulation steps. Accordingly, only a few code settings would actually be used.

FIG. **24*a* illustrates an improved DTC 2400** exhibiting a simple circuit design that allows to generate required modulation steps accurately and with reduced (minimum) decoding.

DTC 2400 is a DTC for generating a data signal 2402 according to a communication protocol that defines a plurality of possible time periods between directly succeeding signal edges of the data signal 2402 for encoding data to be transmitted. The plurality of possible time periods are offset from each other by an offset time. For example, the communication protocol may be the STEP protocol.

The DTC 2400 comprises an input circuit 2410 configured to receive an oscillation signal 2401. For example, the input circuit 2410 may be coupled to a PLL or another frequency synthesizer (not illustrated) that generates the oscillation signal 2401. In some example, the oscillation signal 2401 may be based on the data signal 2402 as described above.

Further, the DTC 2400 comprises a signal generation circuit 2420 configured to generate the data signal 2402 based on the oscillation signal 2401. The signal generation circuit 2420 is only capable of generating a signal edge in the data signal 2402 at a position that is timely offset by an integer multiple of the offset time (as defined in the communication protocol) from a signal edge of an oscillation cycle in the oscillation signal 2401.

This is illustrated in FIG. 24*b* for an exemplary data signal 2402 according to the STEP protocol. In the example of FIG. 24*b*, it is assumed that the STEP protocol uses eight different possible time periods (symbol widths) $T_0$ to $T_7$ for encoding the data between subsequent signal edges. As can be seen from FIG. 24*b*, the eight possible time periods are offset from each other by an offset time ΔT (symbol separation time ΔT). Further, FIG. 24*b* illustrates an exemplary oscillation signal 2401. It can be seen from FIG. 24*b* that there are only five possible time periods (pulse widths) in an oscillation cycle in the oscillation signal 2401. The offset time ΔT is an integer fraction of the oscillation period 2406 of the oscillation signal 2401. That is, the modulation according to the STEP protocol may be understood as an integer division of the oscillation signal 2401's oscillation cycle (in the example of FIG. 24*b* as division by five).

Accordingly, the signal generation circuit 2420 that is only capable of generating a signal edge in the data signal 2402 at a position that is timely offset by an integer multiple (0, 1, 2, 3, 4, 5, 6, 7) of the offset time ΔT from signal edge 2405 of oscillation cycle 2406 in the oscillation signal 2401 is sufficient for generating all possible time periods between directly succeeding signal edges according to the STEP protocol.

Since the signal generation circuit 2420 that is only capable of generating selected pulse widths (since the signal generation circuit 2420 does not exhibit the maximum resolution needed for the link budget) the signal generation circuit 2420 may exhibit a simpler design compared to conventional DTCs. Accordingly, a power consumption of the DTC 2400 as well as a required semiconductor die area for the DTC 2400 a may be reduced compared to conventional DTCs.

The signal generation circuit 2420 is configured to generate the signal edge in the data signal 2402 based on a control word 2403. The digital-to-time converter 2400 may further comprise a control circuit 2430 (e.g. digital processing circuitry like a decoder) configured to generate the control word 2403 based on data 2404 to be transmitted according to the communication protocol (e.g. the STEP protocol). Since the signal generation circuit 2420 is only capable of generating a reduced number of pulse widths, the control of the signal generation circuit 2420 may be reduced accordingly. Therefore, the control circuit 2430 is only capable of generating control words causing the signal generation circuit 2420 to generate signal edges in the data signal 2402 at positions that are timely offset by integer multiples of the offset time from a signal edge of the oscillation cycle in the oscillation signal 2402. In other words, reducing the number of possible DTC states may allow to reduce number of control words. By reducing the number of possible control words, power as well as required semiconductor die area for the control circuit 2430 may be saved.

In other words, DTC 2400 is tailored to the modulation requirements of the communication protocol. By reducing the elements in the DTC and the controls, power may be saved in analog and digital parts of the DTC.

While conventional DTCs exhibit a binary resolution (e.g. employ a number of possible control words that is a multiple of two) the number of possible control words the control circuit 2430 is capable to generate may be a number that is not a multiple of two. As indicated in FIG. 24*b*, five code words may be enough to generate the eight possible time periods (pulse widths) defined in the communication protocol. That is, the number of possible control words the control circuit 2430 is capable to generate may be smaller than the number of the plurality of possible time periods defined in the communication protocol. In other words, the number of the plurality of possible time periods defined in the communication protocol may be larger than the ratio of the oscillation period 2406 of the oscillation signal 2401 to the offset time ΔT. Accordingly, a maximum value of the integer multiple (defining the time offset of the signal edge in the data signal 2402 from the signal edge 2405 in the oscillation signal) may be equal to the ratio of the oscillation period 2406 of the oscillation signal 2401 to the offset time ΔT.

Apart from other time encoded communication protocols, the DTC 2400 may be used for communication according to the STEP protocol. The DTC 2400 may be configured to generate the data signal 2402 to comprise a sequence of a first signal edge of a first type, a second signal edge of a second type, and a third signal edge of the first type. A first time period between the first signal edge and the second signal edge corresponds to first data to be transmitted according to the communication protocol, and a second time period between the second signal edge and the third signal edge corresponds to second data to be transmitted according to the communication protocol. For example, the first data may be a first data symbol and the second data be a second data symbol to be transmitted according to the data communication protocol (for example the STEP protocol). As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge.

Therefore, DTC 2400 may be understood as a low power analog and digital DTC for communication according to the STEP protocol that utilizes only a predefined number of pulse widths.

For enabling differential signal transmission the DTC 2400 may, in some examples, further be configured to generate a second data signal that is inverted with respect to the data signal 2402.

While the above description focused on DTCs, the following description will focus on some aspects related to the power supply of electronic circuits. Current profiles of circuits may be affected by the processed data. For example, the current consumption of a circuit may depend on the data it currently processes. Accordingly, a variance of the current consumption may be high for circuitry operating at high (data) rates. FIG. 25*a* illustrates an example of a current profile of a TDC. Line 2598 denotes the temporal course of the TDC's current consumption. As a reference, line 2599 denotes the temporal course of a data signal input to the TDC. As can be seen from FIG. 25*a*, the current consumption of the TDC shows a spike at the occurrence of a signal edge in the data signal. This is due to the sampling of the data signal in the sampling sub-circuitry of the TDC (e.g. a plurality of flip-flop circuits). Subsequently, the current consumption remains at an increased level due to the propagation of the signal edge through the delay sub-circuitry of the TDC (e.g. a delay line comprising a plurality of delay cells). It was discovered that short signal pulses may cause higher current spikes (e.g. higher current consumption peaks/amplitudes) than long signal pulses. Further, high rate (high frequency) signals input to the TDC may cause current changes at high rate.

An effect of the data dependent variation of the TDC's current consumption is illustrated in FIG. 25*b*. Line 2597 in FIG. 25*b* denotes the supply voltage of conventional power supply (e.g. a LDO regulator) that supplies the TDC with electric energy. As can be seen from FIG. 25*b*, the supply voltage varies due to the data dependent variation of the TDCs current consumption. This is due to the limited bandwidth of the conventional power supply which is lower than the bandwidth of the variation of the TDC's current consumption. The variation of the supply voltage may change the delay of the delay sub-circuitry of the TDC (e.g. the delay of the delay cell in a delay line) so that the integrated delay of the TDC input signal is calculated wrong. Accordingly, the output (readout) of the TDC may be wrong.

According negative effects due to a varying supply voltage caused by variations of its current consumption may occur for many other electronic circuits. For example, when generating pulses with a DTC by dividing and/or interpolating a clock frequency, the current profile of the DTC is influenced by the pulse generation rate/the pulse width of the generated pulses (e.g. different profiles for 3 GHz and 6 GHz generation rate). The variation of the supply voltage may, e.g., move the interpolation point of the DTC and, hence, change the width of the generated pulse.

Further, circuitry like TDCs or DTCs that is sensitive to supply variations may exhibit performance degradation due to self-generated supply noise (e.g. noise caused by modulation of the power supply with circuit activity). Therefore, a stable supply for electronic circuitry is desired.

FIG. 25*c* illustrates an example of an apparatus 2500 for regulating a supply voltage that may enable stable power supply for an electronic device 2510 processing data. A voltage source (e.g. a LDO regulator or a DC-to-DC converter) supplies the supply voltage to the electronic device 2520 via a supply line 2515.

The apparatus 2500 comprises at least one node 2506 configured to couple to the supply line 2515, and further comprises a modulation circuit 2505 coupled to the node 2506. The modulation circuit 2505 is configured to modulate the supply voltage based on information 2501 about the data processed by the electronic device 2520.

By modulating the supply voltage based on the information 2501 about the data processed by the electronic device 2520, the supply voltage for the electronic device 2520 may be stabilized. For example, the modulation circuit 2505 may allow to supply additional charge to the supply line 2515 based on the information 2501 about the data processed by the electronic device 2520. The stabilizing effect of the apparatus 2500 on the supply voltage is illustrated in FIG. 25*d*. Line 2511 denotes the temporal course of the supply voltage for the electronic device 2520. As can be seen from FIG. 25*d* in comparison to FIG. 25*b* (not using the apparatus 2500), the supply voltage is substantially constant over time. In other words, variations of the supply voltage may be avoided unlike in FIG. 25*b*. Since the apparatus 2500 may enable a stable power supply of the electronic device 2510, a performance degradation of the electronic device 2510's operation due to supply variations may be at least mitigated or even avoided.

FIG. 25*e* illustrates a more detailed example of an apparatus 2530 for regulating a supply voltage for an electronic device. The voltage source 2510 providing the supply voltage is exemplarily implemented as LDO regulator in FIG. 25*e*. As indicated in FIG. 25*e*, the LDO regulator may comprise an operational amplifier 2512. The output voltage $V_{LDO\_out}$ of the operational amplifier 2512 is feedback to one of the inputs of the operational amplifier 2512 for the voltage regulation. The operational amplifier 2512 is supplied with an input voltage $V_{LDO\_in}$. Further, the LDO regulator comprises an output capacitor 2513. However, in some examples, the output capacitor 2513 may be omitted. As such, the LDO regulator provides the voltage $V_{LDO\_out}$ as supply voltage for the electronic device.

The apparatus 2530 is coupled to the supply line connecting the voltage source 2510 and the electronic device via the nodes 2506 and 2509. The modulation circuit 2505 of the apparatus 2530 comprises a control circuit 2507 configured to generate a control signal based on the information 2501 about the (digital or analog) data processed by the electronic device. As indicated in FIG. 25*e*, the control circuit 2507 may generate the control signal further based information about the current value of supply voltage $V_{LDO\_out}$ provided by the voltage source 2510. For example, the control circuit 2507 (or an optional additional circuit) may sample the supply voltage $V_{LDO\_out}$ provided by the voltage source 2510.

Further, the control circuit 2507 may use information about a charge/voltage/current required by the electronic device for processing a specific piece of data (e.g. a data symbol or a pulse of certain length). In other words, the control circuit 2507 may be further configured to generate the control signal based on information about a dependency between the data processed by the electronic device and one of an expected variation of the supply voltage and an expected variation of the current consumption of the electronic device. For example, the data processed by the electronic device may comprise at least one data symbol according to a communication protocol (e.g. the STEP protocol). Accordingly, the information about the dependency between the data processed by the electronic device and one of the expected variation of the supply voltage and the variation of the expected current consumption of the electronic device may comprise information about the expected current consumption of the electronic device while processing the data symbol, or information about the expected variation of the supply voltage while the electronic device processes the data symbol.

Further, the modulation circuit 2505 comprises a modulator 2508 to modulate the voltage $V_{LDO\_out}$ based on the control signal in order to generate the modulated supply voltage for the electronic device.

The modulation circuit 2505 may, hence, modulate the supply voltage $V_{LDO\_out}$ provided by the voltage source 2510 such that the modulated supply voltage for the electronic device carries the charge/voltage/current required by the electronic device for processing a specific piece of data. Accordingly, a stable power supply for the electronic device may be enabled (e.g. a stable DC voltage) so that supply related distortions of the electronic device's operation may be avoided.

FIG. 25*f* illustrates another apparatus 2540 for regulating a supply voltage for an electronic device showing a more detailed (exemplary) modulation circuit. Like in FIG. 25*e*, the voltage source 2510 is implemented as LDO regulator providing a supply voltage $V_{LDO\_out}$ for an electronic device. The apparatus 2540 is coupled to the supply line between the voltage source 2510 and the electronic device by means of node 2506.

The modulation circuit for modulating the supply voltage $V_{LDO\_out}$ based on the information 2501 about the data processed by the electronic device comprises a control circuit 2507 configured to generate a control signal 2504 based on the information 2501 about the data processed by the electronic device. Further, the modulation circuit comprises a switch circuit 2509 configured to selectively couple, based on the control signal 2504, a charged capacitive element 2502 to the supply line.

As described above, the control circuit 2507 may be configured to generate the control signal 2504 based on information about the dependency between the data processed by the electronic device and one of an expected variation of the supply voltage and an expected variation of the current consumption of the electronic device. For example, if the data processed by the electronic device comprises at least one data symbol, the information about the dependency between the data processed by the electronic device and one of the expected variation of the supply voltage and the variation of the expected current consumption of the electronic device may comprise information about the expected current consumption of the electronic device while processing the data symbol, or information about the expected variation of the supply voltage while the electronic device processes the data symbol.

The apparatus 2540 may, hence, allow to overcome performance degradation of the electronic device (e.g. a DTC or a TDC) by a data dependent supply voltage modulation. The apparatus 2540 addresses the supply modulation with a charge and discharge concept taking into account the knowledge about the relation between power supply and the processed data. Referring back to the above data symbol example, each symbol processed by the electronic device may be understood as a specific amount of charge required by the electronic device for operation. The apparatus 2540 uses this information to minimize the distortion of the supply voltage by the apparatus 2540's current consumption variance. Hence, the apparatus 2540 may enable a stable DC voltage for the electronic device.

As indicated in FIG. 25*f*, the capacitive element 2502 may comprise a plurality of capacitors 2502-1, 2502-2, . . . . Although only two capacitors are illustrated in FIG. 25*f*, it is to be noted that any number of capacitors may be used (e.g. 1, 2, 3, 4, or more). The capacitors of the capacitive element 2502 may exhibit the same or different capacitance. For example, a first one of the plurality of capacitors may comprise a first capacitance, and a second one of the plurality of capacitors may comprise a (different) second capacitance.

Accordingly, the switch circuit 2509 may be configured to selectively couple a number of the plurality of capacitors to the supply line based on the control signal 2504 (as indicated by the switches SW1 and SW2 in FIG. 25*f*). The switch circuit 2509 may be configured to couple, based on the control signal 2504, all or only part of the plurality of capacitors to the supply line. Further, the switch circuit 2509 may be configured to selectively couple, based on the control signal, the number of the plurality of capacitors either in parallel (as illustrated in FIG. 25*f*) or in series to the supply line.

The charged capacitive element 2502 (as well as its capacitors) may be charged to a voltage different than a nominal value of the supply voltage. For example, the capacitive element 2502 may be coupled to a modulation supply voltage $V_{sw\_in}$ (being different from the nominal value of the supply voltage) by means of the switch circuit 2509.

The switch circuit 2509 and the capacitive element 2502 may, e.g., be part of a Digital-to-Analog Converter (DAC). The DAC may receive the control signal 2504 from the control circuit 2507 and accordingly couple a number of its plurality of (pre-charged) capacitors to the supply line. In this manner, the DAC may track the required supply voltage of the electronic device and supply the additionally required charge to the electronic device.

In other words, the above described supply modulation may allow to use a conventional follower LDO regulator (as an example for a low bandwidth and simple power supply regulator) that keeps the DC voltage and add switching capacitors for providing the required charge for each event/data.

The above described supply modulation may allow to reduce the power supply variation without using a large output capacitor for the voltage source (e.g. a large capacitor of an LDO regulator) and may, hence, allow to save a significant amount of semiconductor die area. Further, a decrease of the bandwidth of the voltage source (e.g. a LDO regulator or a DC-to-DC converter) due to the large capacitor may be avoided.

While the basic principles of the supply modulation were described above, two exemplary use cases for the above described supply modulation for communication apparatus will be described in the following in connection with FIGS. 25*g* and 25*h*.

FIG. 25*g* illustrates a communication apparatus 2550. The communication apparatus 2550 comprises an apparatus 2570 for generating a data signal 2571. The apparatus 2570 for generating the data signal 2571 comprises a processing circuit 2572 (e.g. a DTC) configured to generate the data signal 2571. The processing circuit 2572 is configured to generate the data signal 2571 to comprise a sequence of a first signal edge of a first type, a second signal edge of a second type, and a third signal edge of the first type. A first time period between the first signal edge and the second signal edge corresponds to first data 2551*a* to be transmitted according to a communication protocol, and a second time period between the second signal edge and the third signal edge corresponds to second data 2551*b* to be transmitted according to the communication protocol. For example, the first data 2551*a* may be a first data symbol and the second data 2551*b* be a second data symbol to be transmitted according to the data communication protocol (for example the STEP protocol). As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol. Again, the first type may be a rising edge and the second type be a falling edge, or the second type may be a rising edge and the first type be a falling edge. Further, the apparatus 2570 for generating the data signal 2571 comprises an interface circuit 2573 configured to output the data signal 2571 to a transmission link (not illustrated).

A voltage source 2510 (e.g. a LDO regulator or a DC-to-DC converter) is coupled to the processing circuit 2572 via a supply line 2515 and supplies a supply voltage to the processing circuit 2572.

Further, the communication apparatus 2550 comprises an apparatus 2560 for regulating the supply voltage supplied from the voltage source 2510 to the processing circuit 2572. The apparatus 2560 for regulating the supply voltage comprises a node 2566 configured to couple to the supply line 2515. Further, the apparatus 2560 for regulating the supply voltage comprises a modulation circuit 2565 coupled to the node 2566. The modulation circuit 2565 is configured to modulate the supply voltage based on information about the first data 2551*a* and the second data 2551*b*.

Similar to what is described above in more general terms for electronic devices, the current consumption of the processing circuit 2572 may vary based on the processed data. For example, the processing circuit 2572 may require a different amount of current for encoding the first data 2551*a* to the data signal 2571 than for encoding the second data 2551*b* to the data signal 2571. By modulating the supply voltage, the apparatus 2560 for regulating the supply voltage may allow to compensate (mitigate/reduce) variations of the supply voltage provided by the voltage source 2510. Accordingly, a conventional LDO regulator or a conventional DC-to-DC converter with low bandwidth may be used as voltage source 2510. Moreover, impairment of the processing circuit 2572's operation due to power supply variance may be avoided. For example, if a DTC is used for the processing circuit 2572, interpolation point movement and pulse width deviations (e.g. too long or too short first and/or second time periods) may be avoided. In other words, the apparatus 2560 for regulating the supply voltage may allow to ensure high accuracy of the data signal 2571.

In some examples, the processing circuit 2572 may further be configured to generate a second data signal that is inverted with respect to the data signal 2571. That is, the processing circuit 2572 may generate a differential pair of data signals. Accordingly, the interface circuit 2573 may be configured to output the second data signal to the transmission link.

Similar to what is described above in connection with FIGS. 25*c* to 25*f*, the modulation circuit 2565 may, e.g., comprise a control circuit configured to generate a control signal based on the information about the first data 2251*a* and the second data 2251*b*. Further, the modulation circuit 2565 may comprise a switch circuit configured to selectively couple a charged capacitive element to the supply line 2515 based on the control signal.

Again, information about a dependency between the processed data and the power consumption of the processing circuit 2572 may be used for the modulation of the supply voltage. That is, the control circuit may be configured to generate the control signal based on information about a dependency between the first data 2551*a* (and/or the second data 2551*b*) and one of an expected variation of the supply voltage and an expected variation of the current consumption of the processing circuit 2572. For example, if the first data 2551*a* is a first data symbol and the second data 2551*b* is a second data symbol to be transmitted according to the communication protocol (e.g. the STEP protocol), the information about the dependency between the first data 2551*a* and one of the expected variation of the supply voltage and the expected variation of the current consumption of the processing circuit 2572 may comprise information about the expected variation of the current consumption of the processing circuit 2572 while the processing circuit 2572 processes the first data symbol, or information about the expected variation of the supply voltage while the processing circuit 2572 processes the first data symbol.

The information about the dependency between the first data 2551*a* (and/or the second data 2551*b*) and one of the expected variation of the supply voltage and the expected variation of the current consumption of the processing circuit 2572 may, e.g., be based on a factory calibration. In other words, the information about the dependency between the processed data and the power consumption of the processing circuit 2572 may be based on factory/lab measurements and be initially stored in the modulation circuit 2565 (e.g. in a dedicated memory or in the control circuit).

In some examples, the modulation circuit 2565 (e.g. the control circuit) may further be configured to update the information about the dependency between the first data 2551*a* (and/or the second data 2551*b*) and one of the expected variation of the supply voltage and the expected variation of the current consumption of the processing circuit based on calibration information received by the interface circuit 2573 from a recipient of the data signal 2571. For example, the calibration information may be based on a measured jitter in the data signal 2571. The calibration information may, e.g., be a Bit-Error-Rate (BER) of the data signal 2571.

In other words, a calibration flow may be run in order to reach a minimum pulse distortion. The calibration flow may allow to create the relation between the apparatus 2560 for regulating the supply voltage (e.g. implemented as digital compensation block) and the transmitted data that achieves a minimum BER. Alternatively, the supply behavior may be read out (e.g. using a fast ADC) for random data and the corresponding BER of the data signal may be measured.

As described above in connection with FIGS. 25*c* to 25*f*, also in modulation circuit 2565 the charged capacitive element may be charged to a voltage different than a nominal value of the supply voltage. Further, the capacitive element may comprises a plurality of capacitors exhibiting the same or different capacitance. For example, a first one of the plurality of capacitors may comprise a first capacitance, and a second one of the plurality of capacitors comprises a (different) second capacitance. In order to adjust the charge additionally supplied to processing circuit 2572 by the apparatus 2560 for regulating the supply voltage, the switch circuit may be configured to selectively couple a number of the plurality of capacitors to the supply line 2515 based on the control signal. Again, the switch circuit may be configured to selectively couple the number of the plurality of capacitors either in parallel or in series based on the control signal. The switch circuit and the capacitive element may, e.g., be part of a DAC.

In some examples, the modulation circuit may further take the processing of preceding data into account for the supply modulation. For example, the modulation circuit 2565 may be configured to modulate the supply voltage based on information about third data to be transmitted. The third data precede the first data 2551*a*. By taking into account also preceding data that is process by the processing circuit 2572, the accuracy of the adaption of the supply voltage to the requirements of the processing circuit 2572 may be further increased.

While communication apparatus 2550 illustrated in FIG. 25*g* focused on the generation of transmit signals, FIG. 25*h* illustrates a communication apparatus 2580 that focuses on signal reception.

The communication apparatus 2580 comprises an apparatus 2590 for decoding a data signal 2591. The apparatus 2590 for decoding the data signal 2591 comprises a processing circuit 2592 (e.g. a TDC) configured to determine a sequence of a first signal edge of a first type, a second signal edge of a second type, and a third signal edge of the first type in the data signal 2591. Again, the first type may be a rising edge and the second type be a falling edge, or the second type may be a rising edge and the first type be a falling edge. For example, the data signal 2591 may be received from a transmission link by an interface circuit (not illustrated) of the communication apparatus 2580.

Further, the apparatus 2590 for decoding the data signal 2591 comprises a demodulation circuit 2593 configured to determine first data 2594*a* based on a first time period between the first signal edge and the second signal edge, and to determine second data 2594*b* based on a second time period between the second signal edge and the third signal edge. That is, the processing circuit 2297 and the demodulation circuit 2298 recover the data that is time encoded into the data signal 2591. For example, the first data 2594*a* may be a first data symbol and the second data 2594*b* may be a second data symbol transmitted according to a communication protocol (e.g. the STEP protocol). As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol.

A voltage source 2510 (e.g. a LDO regulator or a DC-to-DC converter) is coupled to the processing circuit 2592 via a supply line 2515 and supplies a supply voltage to the processing circuit 2592.

Further, the communication apparatus 2580 comprises an apparatus 2560 for regulating the supply voltage supplied from the voltage source 2510 to the processing circuit 2592. The apparatus 2560 for regulating the supply voltage comprises a node 2566 configured to couple to the supply line 2515. Further, the apparatus 2560 for regulating the supply voltage comprises a modulation circuit 2565 coupled to the node 2566. The modulation circuit 2565 is configured to modulate the supply voltage in response to the determination of the second signal edge 2595 by the processing circuit 2592. For example, the modulation circuit 2565 may be configured to modulate the supply voltage based on the information about the first data 2594*a*. Alternatively, the modulation circuit 2565 may be configured to modulate the supply voltage independent of the information about the first data 2954*a* (e.g. the extent of modulation is independent of the first, second or further data).

Similar to what is described above in more general terms for electronic devices, the current consumption of the processing circuit 2572 may vary based on the width of the pulses in the data signal 2591. For example, the processing circuit 2572 may require a different amount of current for determining the second signal edge in the data signal 2591 than for determining the third signal edge in the data signal 2591. By modulating the supply voltage, the apparatus 2560 for regulating the supply voltage may allow to compensate (mitigate/reduce) variations of the supply voltage provided by the voltage source 2510. Accordingly, a conventional LDO regulator or a conventional DC-to-DC converter with low bandwidth may be used as voltage source 2510. Moreover, impairment of the processing circuit 2592's operation due to power supply variance may be avoided. For example, if a TDC is used for the processing circuit 2592, changes in the delay of its delay cells and, hence, wrong calculation of the integrated delay and wrong readout may be avoided.

As described above, the supply modulation may be closed loop (taking into account the information about the first data 2954*a* for modulating the supply voltage in response to the determination of the second signal edge 2595 by the processing circuit 2592) or open loop (modulating the supply voltage in response to the determination of the second signal edge 2595 by the processing circuit 2592 independent of the information about the first data 2954*a*). For example, an amount of charge supplied by the apparatus 2560 for regulating the supply voltage to the processing circuit 2592 in response to the determination of the second signal edge 2595 may be selected based on the first data 2954*a* (e.g. the type of symbol it represents) in the closed loop implementation. Alternatively, the amount of charge supplied by the apparatus 2560 for regulating the supply voltage to the processing circuit 2592 in response to the determination of the second signal edge 2595 may be a constant (predefined) amount in the open loop implementation.

In some examples, the processing circuit 2592 may be further configured to receive a second data signal that is inverted with respect to the data signal. Accordingly, the processing circuit 2592 may be configured to determine the first signal edge, the second signal edge, and the third signal edge further based on the second data signal. That is, the processing circuit may determine the signal edges based on a differential pair of data signals.

Similar to what is described above in connection with FIGS. 25*c* to 25*f*, the modulation circuit 2565 may, e.g., comprise a control circuit configured to generate a control signal in response to the determination of the second signal edge 2595 by the processing circuit 2592. The control circuit may be configured to generate the control signal based on the information about the first data 2594*a* (closed loop) or independent of the information about the first data 2594*a* (open loop). Further, the modulation circuit 2565 may comprise a switch circuit configured to selectively couple a charged capacitive element to the supply line 2515 based on the control signal.

In the closed loop implementation, information about a dependency between the data encoded to the data signal 2591 (e.g. the pulse widths in the data signal 2591) and the power consumption of the processing circuit 2592 may be used for the modulation of the supply voltage. That is, the control circuit may be configured to generate the control signal based on information about a dependency between the first data 2594*a* (the time period between the first and second signal edges in the data signal 2951) and one of an expected variation of the supply voltage and an expected variation of the current consumption of the processing circuit 2572. For example, if the first data 2551*a* is a first data symbol and the second data 2551*b* is a second data symbol transmitted according to the communication protocol (e.g. the STEP protocol), the information about the dependency between the first data 2551*a* and one of the expected variation of the supply voltage and the expected variation of the current consumption of the processing circuit 2592 may comprise information about the expected variation of the current consumption of the processing circuit 2592 while the processing circuit 2592 processes the first data symbol (e.g. determines the first and/or second signal edges in the data signal 2951), or information about the expected variation of the supply voltage while the processing circuit 2572 processes the first data symbol (e.g. determines the first and/or second signal edges in the data signal 2951).

Again, the information about the dependency between the first data 2594*a* and one of the expected variation of the supply voltage and the expected variation of the current consumption of the processing circuit 2592 may be based on a factory calibration. In other words, the information about the dependency between the data encoded to the data signal 2591 and the power consumption of the processing circuit 2592 may be based on factory/lab measurements and be initially stored in the modulation circuit 2565 (e.g. in a dedicated memory or in the control circuit).

In some examples, the modulation circuit 2565 (e.g. the control circuit) may further be configured to update the information about the dependency between the first data 2594*a* and one of the expected variation of the supply voltage and the expected variation of the current consumption of the processing circuit 2592 based on calibration information derived from the data signal 2591 by the apparatus 2590 for decoding the data signal 2591. For example, the calibration information may be based on a measured jitter in the data signal 2591. The calibration information may, e.g., be a BER of the data signal 2591.

As described above in connection with FIGS. 25*c* to 25*f*, also in modulation circuit 2565 the charged capacitive element may be charged to a voltage different than a nominal value of the supply voltage. Further, the capacitive element may comprises a plurality of capacitors exhibiting the same or different capacitance. For example, a first one of the plurality of capacitors may comprise a first capacitance, and a second one of the plurality of capacitors comprises a (different) second capacitance. In order to adjust the charge additionally supplied to processing circuit 2592 by the apparatus 2560 for regulating the supply voltage, the switch circuit may be configured to selectively couple a number of the plurality of capacitors to the supply line 2515 based on the control signal. Again, the switch circuit may be configured to selectively couple the number of the plurality of capacitors either in parallel or in series based on the control signal. The switch circuit and the capacitive element may, e.g., be part of a DAC.

In some examples, the modulation circuit 2565 may further take preceding data into account for the supply modulation. For example, the modulation circuit 2565 may be configured to modulate the supply voltage based on information about third data in the data signal 2591 that precede the first data 2594*a*. By taking into account also preceding data encoded to the data signal 2591, the accuracy of the adaption of the supply voltage to the requirements of the processing circuit 2592 may be further increased.

To summarize the above aspects on supply voltage modulation, an example of a method 2500*i* for regulating a supply voltage supplied from a voltage source to an electronic device via a supply line is illustrated by means of a flowchart in FIG. 25*i*. The method 2500*i* comprises modulating 2502*i* the supply voltage based on information about data processed by the electronic device More details and aspects of method 2500*i* are mentioned in connection with the proposed technique or one or more examples described above (e.g. FIGS. 25*c*-25*f*). The method may comprise one or more additional optional features corresponding to one or more aspects of the proposed technique or one or more examples described above.

An example of a method 2500*j* for communication is illustrated by means of a flowchart in FIG. 25*j*. The method 2500*j* comprises generating 2502*j*, using a processing circuit, a data signal. The data signal comprises a sequence of a first signal edge of a first type, a second signal edge of a second type, and a third signal edge of the first type. The first signal edge and the second signal edge are separated by a first time period corresponding to first data to be transmitted, and the second signal edge and the third signal edge are separated by a second time period corresponding to second data to be transmitted. The method 2500*j* further comprises modulating 2504*j* a supply voltage supplied from a voltage source to the processing circuit via a supply line based on information about the first data and the second data.

More details and aspects of method 2500*j* are mentioned in connection with the proposed technique or one or more examples described above (e.g. FIG. 25*g*). The method may comprise one or more additional optional features corresponding to one or more aspects of the proposed technique or one or more examples described above.

Another example of a method 2500*k* for communication is illustrated by means of a flowchart in FIG. 25*k*. The method 2500*k* comprises determining 2502*k*, using a processing circuit, a sequence of a first signal edge of a first type, a second signal edge of a second type, and a third signal edge of the first type in a data signal. Further, method 2500*k* comprises determining 2504*k* first data based on a first time period between the first signal edge and the second signal edge, and second data based on a second time period between the second signal edge and the third signal edge. The method 2500*k* additionally comprises modulating 2506*k* a supply voltage in response to the determination of the second signal edge by the processing circuit, wherein the supply voltage is supplied from a voltage source to the processing circuit via a supply line. More details and aspects of method 2500*k* are mentioned in connection with the proposed technique or one or more examples described above (e.g. FIG. 25*h*). The method may comprise one or more additional optional features corresponding to one or more aspects of the proposed technique or one or more examples described above.

The supply modulation described in connection with FIGS. 25*c* to 25*k* may be understood as system approach for avoiding performance degradation of a DTC and/or a TDC used for communication according to the STEP protocol based on a closed loop or an open loop supply voltage modulation correction. A high bandwidth data based charge compensation may be enabled. In other words, a distortion reduction mechanism over some main blocks for communication according to the STEP protocol is proposed. For example, a hybrid of a slow LDO regulator with an fast digital switched capacitor may be used for less power consumption and better performance. However, it is to be noted that the proposed supply modulation may also be used for other applications than communication according to the STEP protocol.

For communication interfaces (e.g. according to the STEP protocol), high bandwidth of the data transmission is desired. For example, for a time encoded data signal, immunity to InterSymbol Interference (ISI) as well as to reflections may improve for higher bandwidths. Further, input/output interfaces require protection from ElectroStatic Discharge (ESD) events. Conventional ESD protection structures use diodes that can stand the ESD events and, hence, present a quite high parasitic capacitance to a transmission link. Accordingly, conventional ESD protection structures exhibit only poor line matching and enable only low slew rates on the receive side, which increase ISI and makes the receive side more sensitive to reflections.

In the following, a protection circuit 2600 against ESD is described in connection with FIG. 26*a* that may allow to reduce the parasitic capacitance. The protection circuit 2600 comprises a first input 2610 for a first transmission line 2601 of a differential transmission link and a second input 2615 for a second transmission line 2602 of the differential transmission link. Further, the protection circuit 2600 comprises a first output 2620 for the first transmission line 2601 and a second output 2625 for the second transmission line 2602.

A first pair of diodes 2630 is coupled between the first input 2610 and the first output 2620. Similarly, a second pair of diodes 2635 coupled between the second input 2615 and the second output 2625. The first pair of diodes 2630 comprises a first diode 2632 coupled between the first input 2610 and ground as well as a second diode 2633 coupled between the first input 2610 and a supply voltage 2634. Similarly, the second pair of diodes 2635 comprises a third diode 2637 coupled between the second input 2615 and ground as well as a fourth diode 2638 coupled between the second input 2615 and the supply voltage 2634.

A first resistive element 2640 is coupled between the first pair of diodes 2630 and the first output 2620. A second resistive element 2645 is coupled between the second pair of diodes 2635 and the second output 2625. The first resistive element 2640 and the second resistive element 2645 add attenuation to the first transmission line 2601 and the second transmission line 2602.

The first resistive element 2640 and the second resistive element 2645 may allow to avoid high current on the first and second transmission lines 2601, 2602. A diode size for the first pair of diodes 2630 and the second pair of diodes 2635 may be reduced compared to conventional structures. Accordingly, a parasitic capacitance of each of the first pair of diodes 2630 and the second pair of diodes 2635 may be reduced compared to conventional structures. Hence, the overall capacitance presented to the transmission lines 2601, 2602 by the protection circuit 2600 may be reduced. For example, each diode of the first pair of diodes 2630 and the second pair of diodes 2635 may exhibit a capacitance of less than 250 fF (femtofarad), 200 fF, 150 fF, 100 fF, 90 fF, 80 fF, or 70 fF. In FIG. 26*a*, the capacitances of the first pair of diodes 2630 and the second pair of diodes 2635 are illustrated by means of the capacitors 2631 and 2636.

For circuity/applications that are substantially insensitive to the amplitudes of the signals carried on the transmission lines 2601, 2602, the attenuation added to the first transmission line 2601 and the second transmission line 2602 by the first resistive element 2640 and the second resistive element 2645 is substantially not affecting its performance. For example, communication interfaces according to the STEP protocol (or other time encoded communication protocols) are sensitive to the pulse width rather than the signal's amplitude so that some signal power loss due to the attenuation introduced by the first resistive element 2640 and the second resistive element 2645 does not affect the performance. For example, the first resistive element 2640 and the second resistive element 2645 may each add attenuation of at least 2 dB, 3 dB, 4 dB, or more to the first transmission line 2601 and the second transmission line 2602. A resistivity of each of the first resistive element 2640 and the second resistive element 2645 may, e.g., be higher than 5Ω, 10Ω, 15Ω, or 20Ω. Further, the resistivity of each of the first resistive element 2640 and the second resistive element 2645 may be lower than 50Ω, 45Ω, 40Ω, 35Ω, or 30Ω.

In some examples, the first resistive element 2640 and the second resistive element 2645 may be implemented as inductors (which also present a resistance to the transmission lines 2601 2602). Accordingly, the first resistive element 2640 may exhibit a first inductance and the second resistive element 2645 may exhibit a second inductance (different from or equal to the first inductance). For example, each of the first inductance and the second inductance may be less than 0.25 nH (nano-Henry), 0.20 nH, or 0.15 nH. Using inductors for the first resistive element 2640 and the second resistive element 2645 may further allow to substantially cancel the parasitic capacitance of the pairs of diodes at high frequencies so that real impedance may be presented to the transmission lines 2601, 2602 at the first input 2610 and the second input 2615, whereas the imaginary impedance may be reduced.

The reduced capacitance presented to the transmission lines 2601, 2602 by the first pair of diodes 2630 and the second pair of diodes 2635 may allow to increase the bandwidth of the protection circuit 2600 compared to conventional structures. For example, assuming that each of the first resistive element 2640 and the second resistive element 2645 exhibits a resistivity of 10Ω and that the termination resistor 2605 between the transmission lines 2601, 2602 exhibit a resistivity $R_{term}$ of 100Ω, the 3 dB bandwidth of the protection circuit 2600 for a parasitic capacitance $C_{par}$ of 100 fF for each of the first pair of diodes 2630 and the second pair of diodes 2635 is:

$$BW(3\text{ dB}) = \frac{1}{2\cdot\pi\cdot R_{term}\cdot(C_{par}/2)} = \frac{1}{2\cdot\pi\cdot 100\Omega\cdot(100fF/2)} = 31\text{ GHz} \quad (4)$$

Accordingly, rise and fall times of signal edges in the signals carried on the transmission lines 2601, 2602 may be improved (dramatically) compared to conventional structures, which exhibit a (significantly) reduced bandwidth (e.g. 11.3 GHz assuming a parasitic capacitance of 280 fF).

Accordingly, for ω=6 GHz signals carried on the transmission lines 2601, 2602, the input impedance $Z_{in}$ presented to the transmission lines 2601, 2602 may be:

$$|Z_{in}| = 1 \| \frac{2}{i\cdot\omega\cdot C_{par}} = 80\Omega \quad (5)$$

Compared to conventional structures, the protection circuit 2600 may in addition to the improved slew rate exhibit an increased input impedance and, hence, a reduced sensitivity to signal reflections (e.g. $S_{11}$=−19.08 dB for the above example instead of $S_{11}$=−13.5 dB for a conventional structure.).

Further, the protection circuit 2600 comprises a third pair of diodes 2650 coupled between the first resistive element 2640 and the first output 2620 as well as a fourth pair of diodes 2655 coupled between the second resistive element 2645 and the second output 2625. The third pair of diodes 2650 comprises a fifth diode 2652 coupled between the first output 2620 and ground as well as a sixth diode 2653 coupled between the first output 2620 and the supply voltage 2634. Similarly, the fourth pair of diodes 2655 comprises a seventh diode 2657 coupled between the second output 2625 and ground as well as an eighth diode 2658 coupled between the second output 2625 and the supply voltage 2634. The capacitances of the third pair of diodes 2650 and the fourth pair of diodes 2655 are illustrated by means of the capacitors 2641 and 2646 in FIG. 26*a*. Also the capacitances of the third pair of diodes 2650 and the fourth pair of diodes 2655 may be low, e.g., lower than the capacitances of the first pair of diodes 2630 and the second pair of diodes 2635. For example, each diode of the third pair of diodes 2650 and the fourth pair of diodes 2655 may exhibit a capacitance of less than 100 fF, 90 fF, 80 fF, 70 fF, 60 fF, 50 fF, or 40 fF.

Compared to conventional structures, the protection circuit 2600 uses two sets of small ESD diodes and resistors in between. The use of redundant ESD diodes may be due to the insensitivity of downstream circuitry to signal power losses. The reduced ESD parasitic capacitance in comparison to conventional structures may further allow improved matching.

Accordingly, a better and optimized ESD structure that fits the requirements of time encoded I/Os (e.g. according to the STEP protocol) may be provided.

A receiver 2660 for a differential data signal that uses the proposed protection circuit 2600 is illustrated in FIG. 26*b*. The receiver 2660 comprises an interface circuit 2665 configured to couple to a first transmission line 2661 and a second transmission line 2661 of a differential transmission link. The first transmission line 2661 and a second transmission line 2661 carry the differential data signal Further, the receiver 2660 comprises an amplifier circuit 2667 configured to generate an output signal 2668 based on a difference between signal components of the differential data signal on the first transmission line 2661 and the second transmission line 2662.

The protection circuit 2600 is coupled between the interface circuit 2665 and the amplifier circuit 2667. The details of the protection circuit 2600 are described in connection with FIG. 26*a*.

The receiver 2660 may exhibit a high bandwidth and, hence, be more immune to ISI and signal reflections compared to receive circuits using conventional ESD protection structures.

FIG. 26*c* further illustrates an example of an apparatus 2670 for receiving a differential data signal that is time encoded according to a communication protocol (e.g. the STEP protocol). The apparatus 2670 uses the proposed protection circuit 2600 for ESD protection.

The apparatus 2670 comprises an interface circuit 2685 configured to couple to a first transmission line 2671 and a second transmission line 2671 of a differential transmission link carrying the differential data signal.

Further, the apparatus 2670 comprises a processing circuit 2680 (e.g. a TDC) configured to determine a sequence of a first signal edge of a first type, a second signal edge of a second type, and a third signal edge of the first type in the differential data signal. Again, the first type may be a rising edge and the second type be a falling edge, or the second type may be a rising edge and the first type be a falling edge.

The apparatus 2670 additionally comprises a demodulation circuit 2690 configured to determine first data based on a first time period between the first signal edge and the second signal edge, and to determine second data based on a second time period between the second signal edge and the third signal edge. For example, the first data may be a first data symbol and the second data may be a second data symbol transmitted according to the communication protocol. As described above, a sum of the first time period and the second time period may be lower than $10^{-7}$ s, $10^{-8}$ s, $10^{-9}$ s, $10^{-10}$ s, $10^{-11}$ s, or $10^{-12}$ s according to the STEP protocol.

Due to the insensitivity of time encoded communication protocols like the STEP protocol to amplitude attenuation, protection circuit 2600 using the redundant ESD diodes may allow for reduced parasitic capacitance and, hence, for high slew rates, improved matching, and low sensitivity to ISI and signal reflections as desired for time encoded communication protocols like the STEP protocol. Accordingly, an improved and optimized ESD protection may be provided for receive structures for time encoded communication protocols like the STEP protocol.

Some examples relate to the implementation of a STEP interconnect for data transmission between a base band processor circuit and a radio frequency transceiver module. For example, baseband transmit signals may be transmitted from the base band processor circuit to a radio frequency transceiver module and baseband receive signals may be transmitted from the radio frequency transceiver module to a base band processor circuit over STEP interfaces.

FIG. 27*a* shows an example of a transceiver circuit, e.g. implementing a radio head system. In this example, a base band integrated circuit 2701 (e.g. base band processor) is connected to two radio frequency electromagnetic RFEM modules 2702. The base band integrated circuit 2701 may be configured to transmit baseband transmit signals to each RFEM module 2702 over a STEP interconnect (e.g. two differential STEP transmit signal lines STEP (V2) TX) and may be configured to receive baseband receive signals from the RFEM module 2702 over respective STEP interconnects (e.g. two differential STEP receive signal lines STEP (V2) RX). A power management circuit xPMU 2703 may provide a supply voltage (e.g. DC voltage) to the base band processor 2701 and/or the RFEM modules 2702.

FIG. 27*a* may show an example of a RH system with a single BB/MAC device connected to two RFEMs using STEP interface. The RFEMs are connected with STEP TX lanes and STEP RX lanes.

Additionally or alternatively to the transmission of baseband receive signals from a radio frequency transceiver module 2703 to the base band processor circuit 2701, feedback information may be sent from the radio frequency transceiver module 2703 to the base band processor circuit 2701 over the STEP interconnect. For example, feedback information may be used for controlling a digital predistortion of the transmit signals. When the system is in TX mode only the STEP TX lanes may be used, but the RX receiver and the STEP RX lanes could be used for the DPD feedback.

For example, transmitters (TX) can use DPD (digital pre-distortion) and/or ET (envelop tracking) in order to increase the transmitted signal quality and lower the TX power consumption. At the same time, systems which are built of base band BB and/or MAC module and a remote RF model (RFEM), like WiGig and mmW 5G, may have difficulties to preform real time TX DPD, since the DPD mechanism may be part of the BB/MAC model while the TX PA (power amplifier) may be on the RFEM. In an example, the radio head system may be implemented so that the BB/MAC module and the RFEM may be connected only via a STEP interface (e.g. STEP interconnect). For example, data signal may be exchanged between the radio frequency transceiver module 2703 and the base band processor circuit 2701 over one or more STEP interconnects only.

The DPD may be implemented by a closed loop via a real time loopback from the PA output to the MAC/BB input. The loopback may be implemented over the STEP interconnect.

A real time DPD loopback may enable better correction of the PA none linearity. Implementing the loopback over the STEP lanes, which may be already implemented, may save the need for additional cables.

FIG. 27*b* shows a block diagram of an apparatus for generating an amplified high frequency transmit signal. The apparatus 2710 for generating an amplified high frequency transmit signal 2713 may comprise a power amplifier circuit 2712 configured to generate an amplified high frequency transmit signal 2713 based on a baseband transmit signal 2711. Further, the apparatus 2710 may comprise a time encoded transmitter circuit 2714 configured to generate a baseband receive data signal 2715. The baseband receive data signal 2715 may comprise a sequence of a first signal edge (n-th signal edge) of a first type, a second signal edge (n-th+1 signal edge) of a second type, and a third signal edge (n-th+2 signal edge) of the first type. The first signal edge and the second signal edge may be separated by a first time period corresponding to first baseband receive data to be transmitted to a time encoded receiver circuit 2716, and the second signal edge and the third signal edge may be separated by a second time period corresponding to second baseband receive data to be transmitted to the time encoded receiver circuit 2716. The first baseband receive data and the second baseband receive data may contain feedback information.

Due to the transmission of feedback information to a time encoded receiver circuit, for example, the digital pre-distortion of the baseband transmit signal and/or the transmit signal to be amplified by the power amplifier circuit to generate the amplified high frequency transmit signal may be improved based on the feedback information.

The baseband transmit signal 2711 may be generated and/or provided to the apparatus 2710 by a baseband processor. The apparatus 2710 may be a radio frequency transceiver module or may be implemented as part of a radio frequency transceiver module.

The time encoded transmitter circuit 2714 may be a transmitter of a STEP interconnect between a radio frequency transceiver module and a baseband processor circuit. For example, the time encoded transmitter circuit 2714 may be connected through one or more transmission lines to a time encoded receiver circuit 2716, which may be part of the baseband processor circuit. The time encoded receiver circuit 2716 may be a receiver of the STEP interconnect between a radio frequency transceiver module and a baseband processor circuit.

The time encoded transmitter circuit 2714 may be configured to transmit data by generating a data signal as described with respect to one of the examples of STEP interconnects and the time encoded receiver circuit 2716 may be configured to determine received data as described with respect to one of the examples of STEP interconnects.

The power amplifier circuit 2712 may provide the amplified high frequency transmit signal 2713 for transmission through one or more antennas coupled to the power amplifier circuit 2712. The amplified high frequency transmit signal may have a carrier frequency corresponding to a transmit band of the wireless communication protocol used for transmission of the amplified high frequency transmit signal.

The baseband receive data signal 2715 may be a digital signal. The baseband receive data signal 2715 may be a serial time encoded signal generated according to one or more of the examples of the STEP protocol described above or below.

The feedback information may be information on a feedback receive signal caused by the amplified high frequency transmit signal, a content of a register of the apparatus 2710 or a device comprising the apparatus 2710, an output of a power detector of the apparatus 2710 or a device comprising the apparatus 2710, and/or an output of a temperature sensor of the apparatus 2710 or a device comprising the apparatus 2710.

A feedback receive signal may be obtained from the amplified high frequency transmit signal 2713 or one or more antenna signals generated for one or more antennas based on the amplified high frequency transmit signal 2713. For example, the apparatus 2710 may comprise a coupler module (e.g. directional coupler) coupled to an output of the power amplifier circuit 2712 and configured to provide the feedback receive signal caused by the amplified high frequency transmit signal or caused by an antenna transmit signal provided based on the amplified high frequency transmit signal. The feedback receive signal may be an analog signal (e.g. an analog high frequency signal). For example, the apparatus 2710 may comprise a down-conversion circuit configured to generate a baseband feedback receive signal or an intermediate frequency IF feedback receive signal based on the feedback receive signal. The time encoded transmitter circuit 2714 may be configured to generate the baseband receive data signal based on the baseband feedback receive signal or the intermediate frequency IF feedback receive signal.

For example, the time encoded transmitter circuit 2714 may generate the baseband receive data signal 2715 containing parameters determined based on the feedback receive signal or being a time encoded version of the baseband feedback receive signal or the intermediate frequency IF feedback receive signal. The baseband processor circuit may determine digital pre-distortion parameters based on the information on the feedback receive signal. The baseband processor circuit may pre-distort the baseband transmit signal 2711 or may provide pre-distortion parameters to the apparatus 2710 or a radio frequency transceiver module comprising the apparatus 2710.

The time encoded transmitter circuit 2714 may be configured to transmit the baseband receive data signal containing feedback information during a first time interval and/or in a first operation mode (e.g. feedback mode) and may be configured to transmit the baseband receive data signal based on a payload receive signal during a second, different time interval and/or in a second operation mode (e.g. receive mode). The payload receive signal may be generated based on a high frequency receive signal received from an external transmitter (e.g. from a base station or from a mobile device). The payload receive signal may contain payload data to be transmitted to the baseband processor. The baseband receive data signal 2715 may be a time encoded version of the payload receive signal during the second time interval. The time encoded version of the payload receive signal may be generated according to one or more of the examples of the STEP protocol described above or below.

For example, the time encoded transmitter circuit 2714 of the apparatus 2710 may be used for the transmission of the baseband receive data signal 2715 containing feedback information while the radio frequency transceiver module transmits the amplified high frequency transmit signal 2713 and/or may be used for the transmission of the baseband receive data signal based on a payload receive signal when a high frequency receive signal is received by the radio frequency transceiver module. For example, the apparatus 2710 may comprise a multiplexer configured to provide a payload receive signal or a signal based on the feedback receive signal as multiplexer output signal. The time encoded transmitter circuit 2714 may be configured to generate the baseband receive data signal 2715 based on the multiplexer output signal. For example, the amplified high frequency transmit signal 2713 contains payload data to be transmitted to an external receiver (e.g. to a base station or to a mobile device). The time encoded transmitter circuit 2714 may be configured to send the baseband receive data signal 2715 to the time encoded receiver circuit 2716 while the amplified high frequency transmit signal 2713 with the payload data is wirelessly transmitted to the external receiver. For example, the apparatus 2710 may be configured to provide real time feedback information on the amplified high frequency transmit signal 2713 while payload data is transmitted.

The apparatus 2710 may receive the baseband transmit signal 2711 or an intermediate frequency IF transmit signal based on the baseband transmit signal over a STEP interconnect.

For example, the apparatus 2710 may comprise a time encoded receiver circuit configured to determine a sequence of a first signal edge of a first type, a second signal edge of a second type, and a third signal edge of the first type in a received baseband transmit data signal (or an intermediate frequency IF transmit data signal). The time encoded receiver circuit may be configured to determine first baseband transmit data based on a first time period between the first signal edge and the second signal edge and to determine second baseband transmit data based on a second time period between the second signal edge and the third signal edge. The time encoded receiver circuit 2714 may be configured to provide the baseband transmit signal 2711 (or the intermediate frequency IF transmit signal) based on the first baseband transmit data and the second baseband transmit data. The baseband transmit data signal (or the intermediate frequency IF transmit data signal) may be a time encoded version of the baseband transmit signal generated according to one or more of the examples of the STEP protocol described above or below.

The amplified high frequency transmit signal 2713 may be used to transmit data through a single antenna or through an antenna array. The apparatus 2710 may comprise a feeding network configured to provide a plurality of antenna transmit signals for a plurality of antennas based on the amplified high frequency transmit signal 2713. A wireless transceiver comprising the apparatus 2710 may comprise an antenna array configured to transmit antenna transmit signals, the antenna transmit signals being based on the amplified high frequency transmit signal.

Further, the apparatus 2710 may comprise an up-conversion circuit configured to generate a high frequency transmit signal based on the baseband transmit signal 2711 (or the intermediate frequency IF transmit signal). The power amplifier circuit 2712 may be configured to amplify the high frequency transmit signal to generate the amplified high frequency transmit signal 2713.

The apparatus 2710 may be connected to the baseband processor through a STEP interface. The baseband processor may comprise a time encoded receiver circuit configured to receive the baseband receive data signal and determine a sequence of a first signal edge of a first type, a second signal edge of a second type, and a third signal edge of the first type in the baseband receive data signal. The time encoded receiver circuit may be configured to determine first baseband receive data based on a first time period between the first signal edge and the second signal edge and to determine second baseband receive data based on a second time period between the second signal edge and the third signal edge. The time encoded receiver circuit may be configured to provide a baseband receive data signal containing the feedback information based on the first baseband receive data and the second baseband receive data.

Further, the apparatus 2710 or the baseband processor may comprise a pre-distortion control module configured to control a pre-distortion of the baseband transmit signal based on the information on the at least one feedback receive signal caused by the amplified high frequency transmit signal. The pre-distortion of the baseband transmit signal may be controlled in a closed loop and/or in real time. For example, the pre-distortion control module may be configured to control the pre-distortion in a closed loop via a real time loopback form the power amplifier circuit 2712 and over the time encoded transmitter circuit 2714. The pre-distortion control module may be configured to determine pre-distortion parameters and/or a pre-distortion setting and/or may pre-distort the baseband transmit signal based on determined pre-distortion parameters and/or a determined pre-distortion setting.

More details and aspects of the apparatus 2710 are mentioned in connection with one or more examples described above. The apparatus 2710 may comprise one or more additional optional features corresponding to one or more examples described above or below.

FIG. 27*c* shows a block diagram of a radio frequency electromagnetic RFEM module with transmitter TX digital pre-distortion DPD over the STEP interconnect according to an example. The RFEM module may be implemented similar to the radio frequency transceiver module mentioned in connection with FIG. 27*b* and may comprise an apparatus for generating an amplified high frequency transmit signal as described in connection with FIG. 27*b*.

The RFEM module 2720 is coupled to an antenna array 2721 (e.g. phased array module antennas) through an antenna switching module 2722 (e.g. TX/RX switching). The RFEM module 2720 comprises an RF transmitter module 2740 coupled to the antenna switching module 2722 and configured to provide antenna transmit signals TXin to the antenna switching module 2722. Further, the RFEM module 2720 comprises an RF receiver module 2730 coupled to the antenna switching module 2722 and configured to receive antenna receive signals RXin from the antenna switching module 2722.

The RF transmitter module 2740 and the RF receiver module 2730 are coupled to circuitry 2723 configured for data decimation, interpolation and for providing a STEP interface to a baseband processor. The circuitry 2723 provides I/Q baseband transmit signals received over the STEP interface to the RF transmitter module 2740 and transmits baseband receive data signals containing feedback information and/or information on payload receive signals over the STEP interface to the baseband processor.

The RF transmitter module 2740 comprises digital-to-analog converters 2747 for converting the I/Q baseband transmit signals to analog I/Q baseband transmit signals and low pass filters 2746 for low pass filtering the analog I/Q baseband transmit signals. Further, the RF transmitter module 2740 comprises mixers 2745 for mixing the filtered analog I/Q baseband transmit signals with a local oscillator signal provided by a synthesizer 2724 of the RFEM module 2720 to generate a high frequency transmit signal. The high frequency transmit signal is amplified by an RF amplifier 2712 of the RF transmitter module 2740 to generate an amplified high frequency transmit signal. The amplified high frequency transmit signal is provided to a plurality of antenna signal transmit paths, each antenna signal transmit path comprising an adjustable phase shifter 2743, a power amplifier 2742 and a power amplifier output power coupler 2741 (e.g. for beam forming).

The RF receiver module 2730 comprises a power amplifier 2731 and adjustable phase shifter 2730 for each antenna signal receive path of a plurality of antenna signal receive paths. Further, the RF receiver module 2730 comprises a combiner 2734 configured to combine the plurality of antenna receive signal after passing the power amplifiers 2731 and adjustable phase shifters 2730 to provide a high frequency receive signal to an RF amplifier 2735 of the RF receiver module 2730 (e.g. low noise amplifier LNA). The RF amplifier 2735 provides an amplified high frequency receive signal to a first input of a multiplexer 2736 of the RF receiver module 2730. Further, the power amplifier output power couplers 2741 may provide one or more high frequency feedback signals 2725 to one or more further inputs of the multiplexer 2736. The multiplexer 2736 provides either the amplified high frequency receive signal or a high frequency feedback signal 2725 to I/Q mixers 2737 of the RF receiver module 2730. The I/Q mixers 2737 are configured to mix the output signal of the multiplexer with a local oscillator signal provided by the synthesizer 2724 to generate I/Q baseband signals. The I/Q baseband signals are filtered by low pass filters 2738 of the RF receiver module 2730 and converted to digital I/Q baseband signals by analog-to-digital converters 2739 of the RF receiver module 2730. The circuitry 2723 generates the baseband receive data signals based on the digital I/Q baseband signals.

FIG. 27*c* may be an example of real time TX DPD over the STEP using the RX STEP lanes. For example, a Radio Head (RH) with real time loopback over a STEP interconnect is implemented. A phased array system may be implemented and (e.g. 5G or WiGig) the output of the PAs may be sampled using power couplers. The sampled data may be passed to the RX section over a special connection (e.g. couplers feedback). This may be a single line passing the combined power from the couplers or multiple lines that are passed to a MUX. The MUX on the RX path may select the RX signal (in RX mode) or the couplers feedback (in DPD loopback mode). The DPD feedback signal may be passed to the MAC/BB module in real time over the STEP.

The up-conversion and the down-conversion may be done in one step (from RF to BB or BB to RF). Alternatively, an IF (intermediate frequency) may be used, meaning RF to IF to BB and BB to IF to RF.

For example, the loopback over the STEP may be used only for calculation of the needed data for the DPD in the MAC (e.g. the data can be coefficients for polynomials correction and/or look up table (LUT) data) and the DPD mechanism may be on the RFEM itself.

More details and aspects of the RFEM module 2720 are mentioned in connection with one or more examples described above. The RFEM module 2720 may comprise one or more additional optional features corresponding to one or more examples described above or below.

FIG. 27*d* shows a block diagram of a baseband processor according to an example. The baseband processor 2750 comprising a time encoded receiver circuit 2752 configured to determine a sequence of a first signal edge (n-th signal edge) of a first type, a second signal edge (n-th+1 signal edge) of a second type, and a third signal edge (n-th+2 signal edge) of the first type in a received baseband receive data signal 2751. The time encoded receiver circuit 2752 is configured to determine first baseband receive data based on a first time period between the first signal edge and the second signal edge and to determine second baseband receive data based on a second time period between the second signal edge and the third signal edge. Further, the baseband processor 2750 comprises a baseband processing circuit 2754 configured to determine a pre-distortion setting 2755 for a baseband transmit signal based on the first baseband receive data and the second baseband receive data.

The baseband processor may receive feedback information over a fast interconnection with a radio frequency transceiver module so that the baseband processor may be able to adjust the pre-distortion setting in real time.

The received baseband receive data signal 2751 may be based on a feedback receive signal caused by an amplified high frequency transmit signal generated by a power amplifier for transmission to an external receiver (e.g. of a base station or of another mobile device). The received baseband receive data signal 2751 may be the baseband receive data signal described in connection with FIG. 27*b*. The first baseband receive data and the second baseband receive data may contain information on the feedback receive signal.

The baseband processor 2750 may further comprise a time encoded transmitter circuit configured to generate a baseband transmit data signal. The baseband transmit data signal may comprise a sequence of a first signal edge of a first type, a second signal edge of a second type, and a third signal edge of the first type, the first signal edge and the second signal edge being separated by a first time period corresponding to first baseband transmit data, and the second signal edge and the third signal edge being separated by a second time period corresponding to second baseband transmit data. The baseband transmit data signal may be a time encoded version of a baseband transmit signal. The baseband transmit signal may be pre-distorted by the baseband processor 2750 based on the determined pre-distortion setting or the determined pre-distortion setting or pre-distortion parameters of the determined pre-distortion setting may be contained by the baseband transmit data signal to be used by the radio frequency transceiver module for pre-distortion of the baseband transmit signal.

The determined pre-distortion setting and/or pre-distortion parameters of the determined pre-distortion setting may be stored in a lookup table LUT for later and/or continuous and/or repeated pre-distortion of the baseband transmit signal.

More details and aspects of the baseband processor 2750 are mentioned in connection with one or more examples described above. The baseband processor 2750 may comprise one or more additional optional features corresponding to one or more examples described above or below.

Some examples relate to a wireless transceiver device comprising an apparatus for generating an amplified high frequency transmit signal as described in connection with FIG. 27*b* and/or a baseband processor as described in connection with FIG. 27*d*. The wireless transceiver device may be part of a mobile device (e.g. a mobile phone or a laptop).

FIG. 27*e* shows a flow chart of a method for generating an amplified high frequency transmit signal. The method 2760 comprises providing 2762 an amplified high frequency transmit signal based on a baseband transmit signal and generating 2764 a baseband receive data signal by a time encoded transmitter circuit. The baseband receive data signal comprises a sequence of a first signal edge of a first type, a second signal edge of a second type, and a third signal edge of the first type, the first signal edge and the second signal edge being separated by a first time period corresponding to first baseband receive data to be transmitted to a time encoded receiver circuit, and the second signal edge and the third signal edge being separated by a second time period corresponding to second baseband receive data to be transmitted to the time encoded receiver circuit. The first baseband receive data and the second baseband receive data contain feedback information.

More details and aspects of the method 2760 are mentioned in connection with one or more examples described above. The method 2760 may comprise one or more additional optional features corresponding to one or more examples described above or below.

FIG. 27*f* shows a flow chart of a method for determining a pre-distortion setting. The method 2770 comprises determining 2772 a sequence of a first signal edge of a first type, a second signal edge of a second type, and a third signal edge of the first type in a received baseband receive data signal by a time encoded receiver circuit. Further, the method 2770 comprises determining 2774 first baseband receive data based on a first time period between the first signal edge and the second signal edge and determining 2776 second baseband receive data based on a second time period between the second signal edge and the third signal edge. Additionally, the method 2770 comprises determining 2778 a pre-distortion setting for a baseband transmit signal based on the first baseband receive data and the second baseband receive data.

More details and aspects of the method 2770 are mentioned in connection with one or more examples described above. The method 2770 may comprise one or more additional optional features corresponding to one or examples described above or below.

As previously described, the STEP protocol may enable best in class power consumption at high operation (data, symbol) rates. When lowering the data rate over the transmission link, the low power consumption per bit (e.g. 1 or 2 pJ/bit) should be maintained. At low data rates, the digital circuitry (e.g. implemented in CMOS technology) of a transmitter consumes (almost) no power, but the analog circuitry of the transmitter conventionally consumes almost the same power as for high data rates.

In order to lower the power consumption in, e.g., a standby mode or between transmission bursts, turning off the analog circuitry may be one option. However, turning off the analog circuitry conventionally leads to long wake-up times and, hence, to increased system latency. In particular, the transmitter's frequency synthesizer providing the oscillation signal for generating the data signal combines high power consumption and slow wake-up time when operated conventionally.

In the following, circuits are described in connection with FIGS. 28*a* to 28*d* that may enable synthesizer operation at low power and synthesizer power down without (significantly) increasing the system latency.

FIG. 28*a* illustrates an example of a transmitter 2800. The transmitter 2800 comprises a synthesizer circuit 2810 for generating a clock (oscillation) signal 2812 (e.g. a frequency of the clock signal 2812 may be higher than 8 GHz). Further, the transmitter 2800 comprises an apparatus 2820 for generating a data signal 2801 using the clock signal 2812.

The synthesizer circuit 2810 comprises a controlled oscillator 2811 (e.g. a Digitally Controlled Oscillator, DCO, or a Voltage Controlled Oscillator, VCO) configured to generate the clock signal 2812 in response to a steering signal 2813. The synthesizer circuit 2810 further comprises a closed loop control circuitry 2814 configured to control (generate) the steering signal 2813 based on the clock signal 2812. The closed loop control circuitry 2814 may, e.g., comprise a phase detector (e.g. a TDC) for comparing the phase of the clock signal 2812 or (of a signal derived from the clock signal 2812) with a reference signal for controlling (generating) the steering signal 2813. Further, the closed loop control circuitry 2814 may comprise a loop filter and/or a frequency divider for frequency dividing the clock signal 2812 and providing the frequency-divided clock signal to the phase detector. For example, the synthesizer circuit 2810 may be a PLL (e.g. an Analog PLL, APLL, or a Digital PLL, DPLL).

The synthesizer circuit 2810 is configured to operate (is operable) in a first mode in which the closed loop control circuitry 2814 is inactive, or in a second mode in which the closed loop control circuitry 2814 is active. The first mode may be understood as a free-running mode of the controlled oscillator 2811. The synthesizer circuit 2810 operates in the first mode during a first time period and in the second mode during a second time period.

A power consumption of the synthesizer circuit 2810 is reduced in the first mode compared to the second mode since the closed loop control circuitry 2814 is inactive. Accordingly, operating the synthesizer circuit 2810 in the first mode may allow to save energy for the tradeoff of an increased frequency error (e.g. much more than 100 ppm).

The frequency error may be compensated switching the synthesizer circuit 2810 from the first mode back to the second mode. For example, the transmitter 2800 may further comprise a control circuit 2830 configured to switch the synthesizer circuit from the first mode to the second mode if a predetermined condition is fulfilled. The predetermined condition may, e.g., be at least one of a temperature change (e.g. measured by a temperature detector or sensor) and a lapse of a predetermined time period (e.g. determined by a timer). In other words, the synthesizer circuit 2810 may operate in "open loop" (i.e. only the controlled oscillator 2811 is active), and once in a while (e.g. triggered by a temperature change or a timer) the synthesizer circuit 2810 may relock and correct the frequency drift resulting from the open loop operation.

For example, this mode of operation may be used for a transmitter according to the STEP protocol while operating at full data rate (i.e. at full throughput).

Assuming that eight symbols (i.e. three bit per signal edge) are used for transmitting data according to the STEP protocol, FIG. 28*b* illustrates the timing error for each of the symbols 0 to 7. The timing error for each symbol is illustrated for different frequency errors of the controlled oscillator 2811. In the example of FIG. 28*b*, it is assumed that the clock signal has a nominal frequency of 12 GHz. As can be seen from FIG. 28*b*, the timing error for each symbol increases with the frequency error of the controlled oscillator 2811. For example, for a frequency error of 40 MHz (i.e. ±3300 ppm), the maximum timing error is 0.55 ps. The small timing errors for each symbol illustrate that the system exhibits a high immunity to frequency errors (assuming that the time periods associated to the symbols 0 to 7 each differ by 15 ps).

By relocking the synthesizer circuit 2810 depending on predetermined trigger events, the frequency drift may be compensated. The high immunity of the system towards frequency errors may allow to run the synthesizer circuit 2810 in the first mode most of the time. In other words, the first time period may be longer than the second time period. For example, the first time period may be at least twice or thrice as long as the second time period.

For generating the data signal 2801, the apparatus 2820 for generating the data signal 2801 may comprise a processing circuit (e.g. a DTC; not illustrated) configured to generate the data signal 2801 to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted, and the second signal edge and the third signal edge are separated by a second time period corresponding to second data to be transmitted. As described above, apart from other time encoded communication protocols, transmitter 2800 may be used for communication according to the STEP protocol. That is, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 2820 for generating the data signal 2801 may comprise an output interface circuit (not illustrated) configured to output the data signal 2801 to a transmission link (not illustrated).

Also the transmitter 2800 may in some examples be configured to output the data in a differential manner to the transmission link. That is, the processing circuit may be further configured to generate a second data signal that is inverted with respect to the data signal 2801. Further, the output interface circuit may be configured to output the second data signal to the transmission link.

Another transmitter 2850 is illustrated in FIG. 28*c*. The transmitter 2850 comprises a synthesizer circuit 2860 for generating a clock signal 2862 (e.g. a frequency of the clock signal may be higher than 8 GHz) and an apparatus 2870 for generating a data signal 2851.

The synthesizer circuit 2860 comprises a controlled oscillator 2861 (e.g. a DCO or a VCO) configured to generate the clock signal 2862 in response to a steering signal 2863. Further, the synthesizer circuit 2860 comprises a closed loop control circuitry 2864 configured to control (generate) the steering signal 2863 based on the clock signal 2861. The closed loop control circuitry 2864 may be implemented like the closed loop control circuitry 2814 described above in connection with FIG. 28*a*.

During a first time period after the synthesizer circuit 2860 is activated, the synthesizer circuit 2860 operates in a first mode in which the closed loop control circuitry 2864 is not locked. After the first time period, the synthesizer circuit 2860 operates in a second mode in which the closed loop control circuitry 2864 is locked. In other words, after powering up the synthesizer circuit 2860, the closed loop control circuitry 2864 needs some time to stabilize. The stability of a circuit describes the tendency of the circuit's response to return to zero after being disturbed. While a stable circuit's response returns to zero immediately after being disturbed, it may take more time until an unstable circuit's response returns to zero.

The stabilization of the synthesizer circuit 2860 is schematically illustrated in the upper part of FIG. 28*d*. In the example of FIG. 28*d*, a DPLL is used for the synthesizer circuit 2860. The upper part of FIG. 28*d* illustrates the temporal course 2841 of the clock signal 2862's frequency. The synthesizer circuit 2860 is initially deactivated and is activated at a time $T_0$. After an initial stabilization phase (e.g. of a duration less than 100 ns), the synthesizer circuit 2860 has an initial accurate setting for the controlled oscillator 2861 at a time $T_1$. For example, the transmitter 2850 may comprise a memory 2880 for storing the steering signal, and the synthesizer circuit 2860 may be configured to use the stored steering signal upon activation. Accordingly, the initial frequency error of the clock signal 2861 may be rather small. As can be seen from the upper part of FIG. 2*d*, the synthesizer circuit 2860 takes some more time until the closed loop control circuitry 2864 is locked at time $T_2$, i.e. until the frequency of the clock signal 2861 is stable.

The apparatus 2870 for generating a data signal 2851 uses the clock signal 2862 of the synthesizer circuit 2860 during the second time period (in which the frequency of the clock signal 2861 is stable) and during the first time period (in which the frequency of the clock signal 2861 is not yet stable).

Powering down the synthesizer circuit 2860 in, e.g., a standby mode or between transmission bursts may allow to (significantly) reduce the power consumption of the transmitter 2850. Using not only the stable clock signal but also the initially unstable clock signal for generating the data signal 2851 may allow to (significantly) reduce the effective wake-up time of the synthesizer circuit 2860 and, hence, the transmitter 2850.

In order to compensate for the initially unstable clock signal 2861, the apparatus 2870 for generating the data signal 2851 may be configured to use a first modulation scheme during the first time period, and a second modulation scheme during the second time period. The first modulation scheme is more robust than the second modulation scheme. For example, a reduced number of bits may be encoded to a signal edge during the first time period compared to the second time period.

The temporal course 2842 of the data signal 2851's data rate is illustrated in the lower part of FIG. 28*d*. While the synthesizer circuit 2860 is deactivated and during the initial stabilization phase, no data signal 2851 is generated, i.e. the data rate of the data signal 2851 is effectively zero during these time periods. While the closed loop control circuitry 2864 is locking in the time period from time $T_1$ to time $T_2$, the apparatus 2870 already uses the unstable clock signal 2861 for generating the data signal 2851. As indicated, the apparatus 2870 may already generate the data signal 2851 at the full (maximum) data rate during this time. Due to the frequency errors of the unstable clock signal 2861 the data signal 2851 comprises more errors (indicated by the lower BER of the signal) compared to the normal operation from time $T_2$ onwards (using the stable clock signal 2861). As said above, the additional errors in the data signal 2851 due to the unstable clock signal 2861 may at least partly be compensated by using a different modulation scheme during the first time period.

The apparatus 2870 for generating the data signal 2851 may be implemented as described above for the apparatus 2820. In other words, the apparatus 2870 for generating the data signal 2851 may comprise a processing circuit (e.g. a DTC; not illustrated) configured to generate the data signal 2851 to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted, and the second signal edge and the third signal edge are separated by a second time period corresponding to second data to be transmitted. As described above, apart from other time encoded communication protocols, transmitter 2850 may be used for communication according to the STEP protocol. That is, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 2870 for generating the data signal 2851 may comprise an output interface circuit (not illustrated) configured to output the data signal 2851 to a transmission link (not illustrated).

Also the transmitter 2850 may in some examples be configured to output the data in a differential manner to the transmission link. That is, the processing circuit may be further configured to generate a second data signal that is inverted with respect to the data signal 2851. Further, the output interface circuit may be configured to output the second data signal to the transmission link.

The operation of the transmitter 2850 in accordance with the STEP protocol may be summarized as follows. In normal operation mode (i.e. at high data rate) the STEP synthesizer 2860 may be locked so that the frequency error of the clock signal 2862 is minimal. When switching to a standby mode (e.g. the system is not transmitting or receiving, but it is in standby for fast activation), the synthesizer 2860 is powered down (while its power supply, as for example a LDO regulator, remains active). This may lower the power consumption in the standby mode significantly. When the system moves from standby mode to active mode, the STEP interface/transmitter (at full data rate) and also the synthesizer is activated. Once the controlled oscillator 2861 within the synthesizer 2860 (e.g. a DCO or a VCO) starts oscillating, the STEP interface starts transmitting and receiving after a very short time (e.g. less than 100 ns), although the synthesizer 2860 may not be stabilized yet (as illustrated in FIG. 28*d*). In order to limit the frequency error, the controlled oscillator 2861 may be designed such that the oscillator sub-bands are small (e.g. ~80 MHz). Before turning off the controlled oscillator 2861, the sub-band and frequency control word (i.e. the steering signal 2863) may be kept (e.g. stored in memory 2880) and used once the controlled oscillator 2861 is activated, which may result in a small initial frequency error (e.g. ~10-20 MHz).

In a nutshell, some of the above examples relate to a STEP interconnect system capable to work with a closed loop and an open loop synthesizer. Some examples relate to a STEP interconnect system capable to go from standby to full rate in short time (e.g. less than 100 ns) while the synthesizer converges. Further examples relate to a STEP system with DCO calibration and activation for achieving minimal initial frequency errors. Other examples relate to a STEP system using an "open loop" synthesizer (while working at full/high data rate) and capable to correct the drift errors by "closing the loop". The trigger for closing the loop may, e.g., be generated by a temperature detector or a timer.

A clock generation at different components or a clock synchronization between different components of a device may be desired or necessary.

For example, accurate frequency generation which is based on systems like phase locked loops PLL, synthesizer, digital PLL, delay line locked loop DLL or similar, use a reference frequency (e.g. generated by a crystal oscillator).

For example, the above frequency generation systems may be integrated in communication transceivers (e.g. WiFi, 5G, LTE, etc.) generating the local oscillator LO signal or in computing systems, like servers, generating the clock CLK of the digital devices.

It may be desired to feed the reference signal fref to multiple points of the system. This reference signal fref distribution may be implanted by using a STEP interface. Any device that is connected via the STEP may extract the fref from the STEP interconnection. Only a single crystal oscillator XTAL (or only few XTALs) may be necessary in the system, which may lower the size and cost. The synchronization between all module connected to the STEP (e.g. for MIMO and BF) may be enabled. Further, a high noise immunity of the reference signal fref from the platform noise sources may be achievable.

There may be two other methods, which are routing the fref over the printed circuit board PCB or placing multiple XTAL (crystal oscillators) near the frequency generation system. However, routing the fref over the PCB might lead to degradation of the fref quality. In a transceiver it might increase the TX & RX phase noise (PN), thus degrading the TX & RX error vector magnitude EVM. Using multiple XTALs in a single system may increase the cost and size. Moreover in MIMO and beamforming (BF) systems there may be a need for synchronization between the different transceivers, which might not be able when each one has its own XTAL.

Some examples relate to a clock synchronization between different modules connected through a STEP interface. For example, the STEP is based on pulse width modulation (PWM) so that the rate is data dependent. Thus, it might not be possible to extract the reference signal fref directly from the STEP data (e.g. from edges of payload data symbols). In order to pass the reference signal over the STEP, the reference signal may be modulated as part of the data transmitted over the STEP (e.g. by using the clock distribution symbols and variable buffer symbols). In order to overcome the PWM nature of the STEP and ensure that the reference signal indication appears at constant times, an additional delimiter that has two symbols (e.g. the clock distribution symbol and variable buffer symbol) may be used. The first symbol may be an adaptive buffer, by increasing or decreasing the length of the buffer, the needed time may be compensated, so that the second symbol (e.g. reference symbol or clock distribution symbol), would appear at the wanted timing. For example, a clock CLK synchronization over STEP protocol for radio head RH or other external modules may be implemented.

FIG. 29*a* shows a block diagram of an apparatus for generating a data signal according to an example. The apparatus 2900 comprises a processing circuit 2902 configured to generate a data signal. The data signal comprises a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to a first non-payload data symbol to be transmitted according to a communication protocol. Further, the second signal edge and the third signal edge are separated by a second time period corresponding to a second non-payload data symbol to be transmitted according to the communication protocol. The first time period and/or the second time period is longer than the time period of any payload data symbol of the communication protocol. Further, one of the first non-payload data symbol and the second non-payload data symbol is a (first) variable buffer symbol and the other one of the first non-payload data symbol and the second non-payload data symbol is a (first) clock distribution symbol. Additionally, the apparatus 2900 comprises an output interface 2902 configured to output the data signal.

Due to the generation of edges within the data signal corresponding to a variable buffer symbol and a clock distribution symbol, an edge within the data signal can be synchronized with an edge of a reference signal or clock signal of the apparatus and may enable a clock recovery at a receiver. In this way, the implementation of a reference signal generator (e.g. a crystal oscillator) at the receiver may be unnecessary.

The processing circuit 2902 may be configured to select a length of the time period of the variable buffer symbol so that an edge of the time period of the variable buffer symbol and/or an edge of the time period of the clock distribution symbol corresponds to an edge of a reference signal (e.g. reference oscillator signal or reference clock signal) of the apparatus 2900.

The variable buffer symbol may be used to enable the processing circuit 2902 to generate a signal edge at a time corresponding to an edge of the reference signal. The length of the variable buffer symbols may vary for different transmission of clock distribution symbols in order to synchronize edges of the time periods of the variable buffer symbols and/or an edge of the time periods of the clock distribution symbols to edges of the reference signal. The clock distribution symbol may be of unique length (e.g. unique delimiter length) for a symbol of the used communication protocol. In this way, the receiver may be able to detect the clock distribution symbol and may synchronize a clock or oscillator signal with the timing of the clock distribution symbols.

A non-payload data symbol may be a symbol having a time length different to every data symbol of the communication protocol used for transmitting payload data. A non-payload data symbol may be used to transmit control information, status information or clock information, for example. For example, the first and second non-payload data symbol may be delimiter symbols. For example, the variable buffer symbol and the clock distribution symbol are non-payload data symbols (e.g. delimiter symbols). For example, the time period of the variable buffer symbol and/or the time period of the clock distribution symbol is longer than the time period of any payload data symbol of the communication protocol.

The first non-payload data symbol may be the variable buffer symbol and the second non-payload data symbol may be the clock distribution symbol or vice versa. For example, the variable buffer symbol has a start edge and an end edge and the clock distribution symbol has a start edge and an end edge. If the variable buffer symbol is transmitted before the clock distribution symbol, the end edge of the variable buffer symbol is equal to the start edge of the clock distribution symbol as shown in FIG. 29*b*. FIG. 29*b* shows a variable buffer symbol 2910 (labeled buffer) and a clock distribution symbol 2904 (labeled reference). In this example, the start edge or the end edge of the clock distribution symbol may be synchronized with an edge of the reference signal of the apparatus 2900. Alternatively, if the variable buffer symbol is transmitted after the clock distribution symbol, the start edge of the variable buffer symbol is equal to the end edge of the clock distribution symbol. In this case, the end edge of the variable buffer symbol may be synchronized with an edge of the reference signal of the apparatus 2900.

The processing circuit 2902 may be configured to transmit repeatedly (e.g. at periodic, non-periodic, predefined or random times) a variable buffer symbol and the clock distribution symbol. For example, the clock signal can be generated at a constant rate/frequency or as a spread signal such that the TX and RX know the spreading sequence allowing the RX to extract the clock signal. For example, a basic operation may work without spreading and all the clock distribution symbols appear at a known and constant rate (this might lead to spectral emissions). Alternatively, during "spreading" operation, only part of the clock distribution symbols from the basic operation may be used. The rate and place (e.g. when a clocking symbol is used) may be "random" (e.g. according to a predefined pseudorandom binary sequence PRBS sequence). So, if a clocking symbols appears it may be at the right timing, but there might be no constant rate of clocking symbols appearance. At the RX side the clock may be extracted by a clock recovery mechanism.

A receiver may be able to generate or synchronize a clock signal or local oscillator signal of the receiver based on the repeatedly transmitted variable buffer symbols and clock distribution symbols. Depending on the frequency of the reference signal of the apparatus 2900 and/or the frequency of the reference signal to be synchronized at the receiver, the clock distribution symbols may be sent more or less often. For example, the clock distribution symbols may occur at a frequency of at least 1 GHz within the data signal, if high frequency reference signals (e.g. frequency of more than 10 GHz) may be used.

For example, the processing circuit 2902 may be configured to generate the data signal comprising repeatedly pairs of variable buffer symbols and clock distribution symbols. Further, the processing circuit 2902 may be configured to generate the data signal comprising data symbols (e.g. payload data symbols) in between the pairs of variable buffer symbols and clock distribution symbols. The processing circuit 2902 may be configured to generate the clock distribution symbols within the data signal based on a reference clock signal or reference oscillator signal. The processing circuit 2902 may be configured to generate the time periods of the variable buffer symbols so that the rising edges or the falling edges of the clock distribution symbols and/or the variable buffer symbols correspond to edges of the reference clock signal or the reference oscillator signal.

For example, the processing circuit 2902 may be configured to generate the data signal comprising a sequence of a fourth signal edge (m-th signal edge), a fifth signal edge (m-th+1 signal edge) and a sixth signal edge (m-th+2 signal edge). The fourth signal edge and the fifth signal edge may be separated by a third time period corresponding to a third non-payload data symbol to be transmitted according to the communication protocol. Further, the fifth signal edge and the sixth signal edge may be separated by a fourth time period corresponding to a fourth non-payload data symbol to be transmitted according to the communication protocol. For example, the third time period and/or the fourth time period are longer than the time period of any payload data symbol of the communication protocol. One of the third non-payload data symbol and the fourth non-payload data symbol may be a second variable buffer symbol and the other one of the third non-payload data symbol and the fourth non-payload data symbol may be a second clock distribution symbol.

For example, payload data may be transmitted between the first clock distribution symbol and the second clock distribution symbol so that the signal edges within the data signal are not synchronized with the reference signal during the transmission of the payload data. The payload data may be transmitted as time encoded data symbols as described in connection with on or more examples of a STEP connection above or below. One of the edges of the second variable buffer symbol and/or the second clock distribution symbol may be synchronized with an edge of the reference signal by selecting the length of the second variable buffer symbol correspondingly. Therefore, in most cases, the length of two succeeding variable buffer symbols may differ from each other. For example, the time period of the (first) variable buffer symbol may differ from the time period of the second variable buffer symbol.

In contrast to the time length of the variable buffer symbol, the time length of the clock distribution symbols may stay constant so that the receiver can detect the clock distribution symbols. For example, the time period of the (first) clock distribution symbol is equal to the time period of the second clock distribution symbol.

The processing circuit 2902 may be configured to generate the data signal so that payload data is transmitted between clock distribution symbols according to the STEP protocol described above or below. The proposed clock distribution symbols and variable buffer symbols may be an optional feature of the one or more examples of a STEP connection or STEP interface described above or below.

It may be distinguished between low frequency (e.g. 1 MHz-100 MHz) and high frequency reference (e.g. larger than 1 GHz). Often, the frequency generation modules (e.g. digital phase locked loop DPLL) use a low frequency reference. The reason for using a high frequency reference over the STEP interface (or any other kind of reference connection) may be that any noise that couples the reference may be attenuated at the other end of the link (e.g. after dividing the high reference to the wanted frequency).

For example, for passing low frequency reference over the STEP interface, the fref CLK symbol (e.g. variable buffer symbol and clock distribution symbol) compensates the time difference between a basic transmission units BTU rate and the intended average rate of the BTUs. For example, in STEP, a "rate control" mechanism may be used that may flip the polarity of each BTUs in order to maintain constant average rate over the STEP as described in connection with one or more of the examples above or below. Therefore, over an even number of BTUs, a limited timing error between the intended BTU rate and the actual BTU rate may occur. This difference may be compensated by the buffer symbol.

FIG. 29*c* shows an example of a STEP timing with low reference frequency of the reference signal. For example, the reference signal may be generated by a crystal oscillator with a frequency of more than 1 MHz and/or less than 100 MHz. Each Fref CLK symbol (reference signal clock symbol) comprises a variable buffer symbol 2910 and a clock distribution symbol 2912. For example, the reference signal has a period length $T_{fref\_LOW}$ and the length $T_{buffer}$ of the variable buffer symbol 2910 is selected so that the end edge of a first clock distribution symbol is separated from an end edge of a following, second clock distribution symbol by the period length $T_{fref\_LOW}$ of the reference signal. For example, the time period of the variable buffer symbol is at most equal to the delimiter time period plus a maximal time length of a basic transmission unit of the communication protocol. The sum of the time period of the variable buffer symbol and the time period of the clock distribution symbol may be lower than the maximal time length of a basic transmission unit.

In the example of FIG. 29*c*, the time between two Fref CLK symbol is sufficient to transmit four BTUs in between, but any other number (e.g. even number) of BTUs may also be possible.

For example, for passing high frequency reference over the STEP, the reference indication may be inserted at shorter times and the operation may be done over STEP symbols and not BTUs. The fref CLK symbol may compensate the time difference between the symbols rate and the intended average rate of the symbols.

FIG. 29*d* shows an example of STEP timing with high reference frequency of the reference signal. For example, the reference signal may have a frequency of more than 100 MHz and/or less than 20 GHz. Each fref CLK symbol (reference signal clock symbol) comprises a variable buffer symbol 2910 and a clock distribution symbol 2912. For example, the reference signal has a period length $T_{fref\_HIGH}$ and the length $T_{buffer}$ of the variable buffer symbol 2910 is selected so that the end edge of a first clock distribution symbol is separated from an end edge of a following, second clock distribution symbol by the period length $T_{fref\_HIGH}$ of the reference signal. For example, the time period of the variable buffer symbol is at most equal to the delimiter time period plus a difference between a maximal time length and a minimal time length of data symbols to be transmitted between two succeeding clock distribution symbols.

Some examples may ensure reference synchronization between all modules that are connected by the STEP.

More details and aspects of the apparatus 2900 are mentioned in connection with one or more examples described above. The apparatus 2900 may comprise one or more additional optional features corresponding to one or more aspects of one or more examples described above or below.

FIG. 29*e* shows a block diagram of an apparatus for decoding a data signal according to an example. The apparatus 2920 comprises a processing circuit 2922 configured to determine a sequence of a first signal edge (n-th signal edge) of a first type, a second signal edge (n-th+1 signal edge) of a second type, and a third signal edge (n-th+2 signal edge) of the first type. Further, the apparatus 2920 comprises a demodulation circuit 2924 configured to detect a first non-payload data symbol based on a first time period between the first signal edge and the second signal edge. Additionally, the demodulation circuit 2924 is configured to detect a second non-payload data symbol based on a second time period between the second signal edge and the third signal edge. The first time period and/or the second time period is longer than the time period of any payload data symbol of the communication protocol. Further, one of the first non-payload data symbol and the second non-payload data symbol is a variable buffer symbol and the other one of the first non-payload data symbol and the second non-payload data symbol is a clock distribution symbol.

Due to the reception of the variable buffer symbol and the clock distribution symbol, a device with the apparatus 2920 may be able to generate a reference clock signal or reference oscillator signal based on the variable buffer symbol and the clock distribution symbol. In this way, the implementation of a reference signal generator (e.g. crystal oscillator) at the receiver device may be avoidable.

The processing circuit 2922 may comprise a time-to-digital converter configured to output a first digital value corresponding to the first time period between the first signal edge and the second signal edge and a second digital value corresponding to the second time period between the second signal edge and the third signal edge. The demodulation circuit 2924 may determine the first non-payload data symbol and/or the second non-payload data symbol within the data signal based on the digital values outputted by the time-to-digital converter. Further details and/or optional features of the processing circuit 2922 and/or the demodulation circuit 2924 are described with respect to one or more examples of a STEP receiver above or below.

The processing circuit 2922 may be further configured to determine a sequence of a fourth signal edge (m-th signal edge), a fifth signal edge (m-th+1 signal edge) and a sixth signal edge (m-th+2 signal edge) in the data signal. The demodulation circuit 2924 may be configured to detect a third non-payload data symbol based on a third time period between the fourth signal edge and the fifth signal edge, and configured to detect a fourth non-payload data symbol based on a fourth time period between the fifth signal edge and the sixth signal edge. For example, the third time period or the fourth time period is longer than the time period of any payload data symbol of the communication protocol. One of the third non-payload data symbol and the fourth non-payload data symbol may be a second variable buffer symbol and the other one of the third non-payload data symbol and the fourth non-payload data symbol may be a second clock distribution symbol.

The data signal may comprise repeatedly pairs of variable buffer symbols and clock distribution symbols as well as data symbols in between the pairs of variable buffer symbols and clock distribution symbols.

For example, the demodulation circuit 2924 may be configured to generate a reference clock signal based on the clock distribution symbols within the data signal. For example, every falling or rising edge or a predefined sequence of edges (e.g. every second, every third or every fourth rising or falling edge) of the reference clock signal to be generated or to be synchronized may be synchronized to a start edge or an end edge of the variable buffer symbols and/or the clock distribution symbols. For example, the rising edges or the falling edges of the clock distribution symbols or the variable buffer symbols correspond to edges of the reference clock signal.

The apparatus 2920 may further comprise a clock generation circuit and/or an oscillator circuit configured to generate a local clock signal and/or a local oscillator signal based on the reference clock signal. For example, a frequency of the reference clock signal may be lower than a frequency of the local clock signal and/or the local oscillator signal.

The apparatus 2920 may further comprise a frequency divider and the demodulation circuit 2924 may be configured to generate an intermediate clock signal based on the clock distribution symbols within the data signal. The frequency divider may be configured to provide a reference clock signal based on the intermediate clock signal. For example, the intermediate clock signal may comprise a frequency of more than 100 MHz (e.g. as described in connection with FIG. 29D).

More details and aspects of the apparatus 2920 are mentioned in connection one or more examples described above. The apparatus 2920 may comprise one or more additional optional features corresponding to one or more aspects of one or more examples described above or below.

FIG. 29*f* shows a block diagram of a STEP system 2948 and high reference extraction (e.g. as described in connection with FIG. 29D) according to an example. In this example, an apparatus for generating a data signal comprises a digital-to-time converter DTC 2930 (e.g. processing circuit of apparatus for generating a data signal) coupled to a transmit TX driver 2932 (e.g. output interface of apparatus for generating a data signal) and coupled to a digital phase locked loop 2934 (e.g. STEP DPLL). The digital phase locked loop 2934 generates a reference oscillator signal fvco (e.g. with a frequency of 12 GHz).

The transmit TX driver 2932 is connected through a transmission line 2936 (link) to a receive RX driver 2942 of an apparatus for decoding a data signal. The apparatus for decoding a data signal further comprises a time-to-digital converter TDC 2940 (e.g. processing circuit of apparatus for decoding a data signal), a divider 2944 (DIV N) and a digital phase locked loop 2946 (DPLL).

The transmit TX driver 2932 may transmit the data signal with variable buffer symbols and clock distribution symbols to the receive RX driver 2942. The time-to-digital converter TDC 2940 and/or the processing circuit comprising the time-to-digital converter TDC 2940 may provide an intermediate clock signal or intermediate oscillator signal fref_high to the divider 2944. The intermediate clock signal or intermediate oscillator signal fref_high comprises signal edges based on the variable buffer symbols and clock distribution symbols. The divider 2944 divides the frequency of the intermediate clock signal or intermediate oscillator signal fref_high by a factor N (e.g. integer number) and outputs a reference clock signal or reference oscillator signal fref to the digital phase locked loop 2946. The digital phase locked loop 2946 of the apparatus for decoding a data signal may generate a local clock signal or local oscillator signal based on the reference clock signal or reference oscillator signal fref.

For example, on the TX side:

STEP DPLL fvco=12 GHz, noise @ 100 KHz=−110 dBc/Hz $f_{REF\_HIGH}$=600 MHz→noise @ 100 KHz=−110−20 log (20)=−136 dBc/Hz For example, on the RX side:

The TDC detects the CLK symbols and generates a recovered $f_{REF\_HIGH}$ $f_{REF\_HIGH}$ is divided by N=10→fref=60 MHz, noise @ 100 KHz=−156 dBc/Hz All system noises and link noises may also be attenuated by the divider by 20 dB More details and aspects of the STEP system 2948 are mentioned in connection with the one or more examples described above. The STEP system 2948 may comprise one or more additional optional features corresponding to one or more examples described above or below.

Some examples relate to a wireless transceiver comprises an apparatus for decoding a data signal and an up-conversion circuit configured to generate a high frequency transmit signal based on a baseband transmit signal and a local oscillator signal generated based on the variable buffer symbol and the clock distribution symbol. The apparatus for decoding a data signal may be implemented according to one or more of the examples described above (e.g. in connection with FIGS. 29*a*-29*f*).

Some examples relate to a baseband processor comprising an apparatus for generating a data signal. The apparatus for generating a data signal may be implemented according to one or more of the examples described above (e.g. in connection with FIGS. 29*a*-29*f*).

FIG. 29*g* shows a block diagram of a mobile device according to an example. The mobile device 2960 comprises an apparatus for generating a data signal (e.g. described in connection with FIG. 29*a*) and an apparatus for decoding a data signal (e.g. described in connection with FIG. 29*e*).

For example, the mobile device comprises a baseband processor 2950 (baseband integrated circuit BB-IC) comprising the apparatus for generating a data signal. Further, the mobile device comprises one, two or more radio frequency RF transceivers 2952, each comprising an apparatus for decoding a data signal. The radio frequency RF transceivers 2952 may be connected to the baseband processor 2950 through STEP connections.

Further, the mobile device 2960 may comprise a power management unit 2956 (e.g. xPMU) configured to provide a supply voltage (DC voltage) to the baseband processor 2950 as well as a supply voltage for analog parts (DC/DC Ana) and a supply voltage for digital parts (DC/DC Dig) to the radio frequency RF transceivers 2952 over high power direct current DC lines.

More details and aspects of the mobile device 2960 are mentioned in connection with one or more examples described above. The mobile device 2960 may comprise one or more additional optional features corresponding to one or more examples described above or below.

FIG. 29*h* shows a flow chart of a method for generating a data signal according to an example. The method 2980 comprises generating 2982 the data signal, the data signal comprising a sequence of a first signal edge of a first type, a second signal edge of a second type, and a third signal edge of the first type. The first signal edge and the second signal edge are separated by a first time period corresponding to a first non-payload data symbol to be transmitted according to a communication protocol, and the second signal edge and the third signal edge are separated by a second time period corresponding to a second non-payload data symbol to be transmitted according to the communication protocol. Further, the first time period and/or the second time period is longer than the time period of any payload data symbol of the communication protocol. One of the first non-payload data symbol and the second non-payload data symbol is a variable buffer symbol and the other one of the first non-payload data symbol and the second non-payload data symbol is a clock distribution symbol. Further, the method 2980 comprises outputting 2984 the data signal.

More details and aspects of the method 2980 are mentioned in connection with one or more examples described above. The method 2980 may comprise one or more additional optional features corresponding to one or more aspects of one or more examples described above or below.

FIG. 29*i* shows a flow chart of a method for decoding a data signal according to an example. The method 2990 comprises determining 2992 a sequence of a first signal edge of a first type, a second signal edge of a second type, and a third signal edge of the first type in the data signal. Further, the method 2990 comprises detecting 2994 a first non-payload data symbol based on a first time period between the first signal edge and the second signal edge and detecting 2996 a second non-payload data symbol based on a second time period between the second signal edge and the third signal edge. Further, the first time period or the second time period is longer than the time period of any payload data symbol of the communication protocol. One of the first non-payload data symbol and the second non-payload data symbol is a variable buffer symbol and the other one of the first non-payload data symbol and the second non-payload data symbol is a clock distribution symbol.

More details and aspects of the method 2990 are mentioned in connection with one or more examples described above. The method 2990 may comprise one or more additional optional features corresponding to one or more examples described above or below.

Some examples relate to the implementation of an amplitude modulation in addition to the pulse width modulation of a STEP connection. A STEP interface may have already a multi-Gbits/sec capacity, but it may be desired to further increase the bit rates. A STEP connection may use pulse amplitude modulation PAMx to increase bit rates.

For example, more bits may be coded on the amplitude (e.g. 2 or more bits by using PAM3 or higher). Increasing the number of amplitudes may result in higher exposure to channel reflection and/or ISI (inter symbol interferences—e.g. one of the previous transmitted symbols may effect the next transmitted symbol), but the bit rate may be increased.

For example, each phase may generate 4 bits and not 3 bits as an example for data symbols with 3 time encoded bits). Alternatively, it may be proposed to allow for 2 symbols to generate 8 or 9 bits (e.g. one symbol does not generate 4 bits), or an option for one symbol to generate even 5 or more bits.

For example, STEP may apply phase modulations to code bits (e.g. 3 bits on the rise/fall of the signal) by using differential signaling (e.g. shown in FIG. 30*f*). Phase fall or rise may be a symbol. Alternatively or additionally, STEP may use the same scheme, but instead of differential signals, 3 codes may be used on the amplitude of each P and N signal separately and add extra "amplitude" options (e.g. shown in FIG. 30*f*). This amplitude option may allow to add single bit/symbol (e.g. increase the number of bits transported from 3 bits (typical) to 4 bits).

For example, STEP may use 2 levels modulation and in this way add a single bit extra for each symbol (e.g. 3 to 4 bits) as shown in FIG. 30*b*. Alternatively, STEP may use PAM3 (e.g. by combining of 2 symbols codes can add extra 3 bits to 2 symbols or get to 9 bits on 2 symbols) as shown in FIG. 30*c*. Alternatively, STEP may use PAM4 (e.g. adding 2 bits/symbol). Higher PAM levels may possibly add 2 symbols or single symbol to increase the bitrates.

FIG. 30*a* shows a block diagram of an apparatus for generating a data signal according to an example. The apparatus 3000 comprises a processing circuit 3002 configured to generate the data signal. The data signal comprises a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to first data to be transmitted. The second signal edge and the third signal edge are separated by a second time period corresponding to second data to be transmitted. The processing circuit 3002 is configured to modulate a first signal amplitude of the data signal during the first time period and a second signal amplitude of the data signal during the second time period corresponding to additional data to be transmitted. Further, the apparatus 3000 comprises an output interface circuit 3004 configured to output the data signal.

By modulating the signal amplitude of a pulse width modulated data signal, the bit rate of the data transmission may be increased.

The processing circuit 3002 may be configured to generate the data signal based on a data communication protocol. For example, a first data symbol to be transmitted according to the data communication protocol comprises the first data and at least one bit of the additional data and a second data symbol to be transmitted according to the data communication protocol comprises the second data and at least another bit of the additional data.

The data signal may have a constant amplitude level during the time period of a data symbol, but the amplitude level may vary for time periods of different data symbols. The additional data to be transmitted may be one or more additional data bits modulated onto one or more time encoded symbols. In other words, the amplitude of the data signal during transmission of a data symbol may be selected based on the additional data to be transmitted. The one or more additional data bits may be treated as part of one or more time encoded symbols or may be added at the end or the beginning of the bits of one or more time encoded symbols.

The signal amplitude of the data signal may be pulse amplitude modulated. For example, the data signal may be pulse width modulated and amplitude modulated. For example, information on at least one bit of the additional data may be modulated on the amplitude of a single data symbol within the data signal (e.g. shown in FIG. 30*b*). Alternatively, information on at least one bit of the additional data may be distributed over the first signal amplitude and the second signal amplitude (e.g. shown in FIG. 30*c*). In this example, the information on one or more bits of the additional data may be modulated on two or more data symbols within the data signal to obtain an improved bit rate (see table below).

For example, bits of the additional data may be transmitted solely by amplitude modulation of the data signal (e.g. FIGS. 30*b* and *c*). Alternatively, information on at least one bit of the additional data may be pulse amplitude modulated and time encoded. In other words, the information on the at least one bit of the additional data may be encoded in time and amplitude of one or more data symbols to be transmitted. For example, bits may be combined in time and amplitude domain to obtain an improved utilization of the different time and amplitude states. For example, three amplitude levels and three lengths of time periods may be available resulting in 9 combined states, which may be able to code 3 bits or the three amplitude levels may be combined with 6 or 12 time states for 4 or 5 bits.

The amplitude modulation may be done with two different possible amplitude levels (e.g. FIG. 30*b*), three different possible amplitude levels (e.g. FIG. 30*c*), four different possible amplitude levels or another number of predefined possible amplitude levels.

For example, the processing circuit 3002 may be configured to generate the data signal so that the first signal amplitude of the data signal is larger than a first amplitude threshold, so that the second signal amplitude of the data signal is lower than the first amplitude threshold and larger than a second amplitude threshold, and so that the data signal comprises a third signal amplitude during a third time period. The third signal amplitude of the data signal may be lower than the second amplitude threshold.

FIG. 30*b* shows an example of using 2 output levels (e.g. gain 33% of bit rate if code phase is 3 bits/edge). A single (first) amplitude threshold 3006 is shown for differentiating the two different output states. In this example, 3 bits are transmitted by pulse width modulation and 1 bit is transmitted by amplitude modulation. For example, this code may be balanced for P&N, but may require a single bit comparator to detect if the input voltage is above the decision threshold 3006 or below. If it is above, it may translate to 1, else it may translate to 0 (or vice versa). In this way, an extra bit may be added to each code. The noise immunity of this concept may be better than for the examples described in connection with FIGS. 30*e*-*g* as well as the radiated noise, for example. Additionally, pre-distortion may be implemented at the transmitter.

FIG. 30*c* shows an example of using 3 output levels (e.g. gain 50% of bit rate if code phase is 3 bits/edge). A first amplitude threshold 3006 and a second amplitude threshold 3008 is used to differentiate between the three different output states of the amplitude of each time encoded symbol. For example, three additional data bits may be distributed over two time encoded symbols. In this example, each time encoded symbol may provide three amplitude options so that two symbols provide 9 options resulting in the possibility of 3 additional bits per 2 symbols.

For example, this code may be balanced for P&N lines, but may require 2 slicers (decision threshold slicers) and may generate 3 bits. For 3 bits (e.g. equivalent to PAM3) over 2 symbol times, a total of up to 9 codes may be generated that may translate to extra 3 bits.

Using these slices, and grouping of 2 symbols, the following can be mapped as an example:

| BIT code | Symbol 0 slicers (1 & 2) output | Symbol 1 slicers output |
|---|---|---|
| 0 | 0 & 0 (lowest level) | 0 & 0 |
| 1 | 1 & 0 (medium level) | 0 & 0 |
| 2 | 1 & 0 | 1 & 0 |
| 3 | 1 & 1 (highest level) | 1 & 0 |
| 4 | 1 & 1 | 1 & 1 |
| 5 | 1 & 0 | 1 & 1 |
| 6 | 0 & 0 | 1 & 1 |
| 7 | 0 & 0 | 1 & 0 |
| Unused | 0 & 0 | 1 & 0 |

Similar, it may be possible to set 4 levels (e.g. add 2 bits/symbol), which may increase the bit rate by about 67% and 8 levels may double the bit rate, for example.

More details and aspects of the apparatus 3000 are mentioned in connection with one or more examples described above. The apparatus 3000 may comprise one or more additional optional features corresponding to one or examples described above or below.

FIG. 30*d* shows a block diagram of an apparatus for decoding a data signal according to an example. The apparatus 3010 comprises a processing circuit 3012 configured to determine a sequence of a first signal edge (n-th signal edge) of a first type, a second signal edge (n-th+1 signal edge) of a second type, and a third signal edge (n-th+2 signal edge) of the first type. Further, the apparatus 3010 comprises a demodulation circuit 3014 configured to determine first data based on a first time period between the first signal edge and the second signal edge, and second data based on a second time period between the second signal edge and the third signal edge. Further, the demodulation circuit 3014 is configured to determine additional data based on a first signal amplitude of the data signal during the first time period and a second signal amplitude of the data signal during the second time period.

The data signal may be based on a data communication protocol. For example, a first data symbol received according to the data communication protocol comprises the first data and at least one bit of the additional data, and a second data symbol received according to the data communication protocol comprises the second data and at least another bit of the additional data.

The information on a bit of additional data may be modulated together with a single data symbol (e.g. FIG. 30*b*) or may be distributed over two or more data symbols (e.g. FIG. 30*c*). For example, the demodulation circuit 3014 may be configured to determine a bit of the additional data based on the first signal amplitude and the second signal amplitude.

For example, the demodulation circuit 3014 may comprise one or more comparators configured to compare a signal amplitude of the data signal with one or more amplitude thresholds.

For example, the first signal amplitude of the data signal may be larger than a first amplitude threshold and the second signal amplitude of the data signal may be lower than the first amplitude threshold and larger than a second amplitude threshold. Further, the data signal may comprise a third signal amplitude during a third time period. For example, the third signal amplitude of the data signal may be lower than the second amplitude threshold. Further, the demodulation circuit 3014 may be configured to determine the additional data based on a comparison of the signal amplitude of the data signal with at least one of the first amplitude threshold, the second amplitude threshold and the third amplitude threshold.

For example, bits of the additional data may be transmitted solely by amplitude modulation of the data signal (e.g. FIGS. 30*b* and *c*). Alternatively, information on at least one bit of the additional data may be pulse amplitude modulated and pulse width modulated. The demodulation circuit 3014 may be configured to determine at least one bit of the additional data based on a length of the first time period and based on the first signal amplitude of the data signal during the first time period.

More details and aspects of the apparatus 3010 are mentioned in connection with one or more examples described above. The apparatus 3010 may comprise one or more additional optional features corresponding to one or more examples described above or below.

Some examples relate to a transmission over differential lines. In a differential operation mode, a pair of differential data signals may be transmitted over a pair of transmission lines. The differential nature of the line may be used to gain bit rate (e.g. 33% of bit rate if code phase is 3 bits/edge).

It may be suggested to use the differential nature of the signal (e.g. for simplification the phase modulation is removed and only the "amplitude" is addressed in some of the following explanations). Later the phase modulation may be described in addition, although it may be assumed that it is there all the time (e.g. each symbol may allow 3 bits or another number of bits to be transmitted by phase modulation). The transmitter may be able to generate actually 3 [vertical] symbols out as follows:

| Symbol out | P line level | N line level |
|---|---|---|
| −1 | 0 | 1 |
| 0 | 0 | 0 |
| 1 | 1 | 0 |

Alternative to generating the symbol out 0 at P line level 0 and N line level 0, symbol out 0 may be generated at P line level 1 and N line level 1, which may improve a DC compensation.

Using different output symbols for P line level 0 and N line level 0 and P line level 1 and N line level 1 might not be possible, since the difference of both may be 0 so that the receiver might not be able to differentiate between these two states.

For example, the clock may be carried from the transmitter to the receiver so that the line shall never stay at the same vertical symbol. In other words, at every given next symbol the P and N line may change state. Below is an example of how the extra bit may be coded:

| Extra bit to be send | TX Current "state" P | TX Current "state" N | RX current state Receiver input | TX Next state P | TX Next state N | RX translated state Expected receiver next state |
|---|---|---|---|---|---|---|
| 0 | 1 | 0 | 1 | 0 | 1 | −1 |
| 1 | 1 | 0 | 1 | 0 | 0 | 0 |
| 0 | 0 | 1 | −1 | 0 | 0 | 0 |
| 1 | 0 | 1 | −1 | 1 | 0 | 1 |
| 0 | 0 | 0 | 0 | 0 | 1 | −1 |
| 1 | 0 | 0 | 0 | 1 | 0 | 1 |

For example, the P and N line never stay at the same setting between adjacent symbols. In this way, the receiver may always be able to detect edges and as such may also measure the pulse (negative or positive duration). Further aspects may be addressed with this coding scheme as, for example, the DC balance that may shift the level under some bit conditions, and an amplifier may be required to be able to detect 3 levels (−1,1,0).

For example, the P and the N lines may be allowed to change more independent and this degree of freedom may be used to code additional bits. In this approach, both N and P may only change at the determined times (e.g. given by the signal edges of the time encoded symbols), but not necessarily both lines may change, but only a single one of the pair of data signals. The DC level may shift due to the coding. In extreme case there may be a case in which one signal stay constantly at 0 (for some time) and only the other one toggles.

Alternatively, the two data signals may change the amplitude at different times, but the faster one may wait for synchronization. For example, where 0, the static part may be 2 (not 7 as in the example of FIG. 30*f*). w may mean that the line is waiting for the other line to follow so that it may be avoided that one line overtakes the other. In the example below, in the first half cycle, P is high for 2+3 and N is low for 2+2 time units. Then N waits for one time unit to start the next half cycle aligned with P. In the second half cycle, P is low for 2+2 and N is high for 2+1 time units. Then N waits for one time unit to start the next half cycle aligned with P.

```
Bits:          0+3      0+2
            /^^^^^^\      /
P:    _____/        \____/

N:       ^^\     /^^^^^\
            \___/       \____
Bits:       0+2   w  0+1  w
```

In this way, nearly twice as many bits may be transmitted, but due to the insertion of wait times, the effective data-rate may be a little lower than twice the rate.

FIG. 30*e* shows a block diagram of an apparatus for generating a pair of data signals according to an example. The apparatus 3020 comprises a processing circuit 3022 configured to generate a first data signal of the pair of data signals. The first data signal comprising a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to first data to be transmitted, and the second signal edge and the third signal edge are separated by a second time period corresponding to second data to be transmitted. The first data signal comprises a first signal amplitude during the first time period and a second data signal of the pair of data signals comprises a second signal amplitude during the first time period. Further, the processing circuit 3022 is configured to select the first signal amplitude and the second signal amplitude based on at least one additional data bit to be transmitted. Further, the apparatus 3020 comprises an output interface circuit 3024 configured to output the pair of data signals.

By modulating the signal amplitude of a pair of pulse width modulated data signal, the bit rate of the data transmission may be increased.

For example, every end of time periods associated with data symbols to be transmitted may correspond to a respective edge within at least one of the two data signals of the pair of data signals. In other words, a signal edge associated with a data symbol may occur within either the first data signal of the pair of data signals or the second data signal or may occur within the first data signal and the second data signal of the pair of data signals. For example, a start edge of a time period of a data symbol may be represented solely by an edge within the first data signal, but not by an edge within the second data signal, while the end edge of the time period of the data symbol may be represented solely by an edge within the second data signal, but not by an edge within the first data signal, or vice versa.

For example, the processing circuit 3022 may be configured to generate the pair of data signals based on a data communication protocol. Each beginning and each end of time periods associated with data symbols of the data communication protocol to be transmitted may correspond to a respective signal edge in at least one of the data signals of the pair of data signals. For example, signal edges of the first data signal and signal edges of the second data signal may correspond to beginnings and ends of time periods associated with data symbols to be transmitted. For example, a first data symbol to be transmitted according to the data communication protocol may comprise the first data and the at least one additional data bit.

For example, the processing circuit 3022 may be configured to generate the pair of data signals so that a sum (or a difference) of the first data signal and the second data signal comprises signal edges for each data symbol of the data communication protocol to be transmitted.

For example, the output interface 3024 may be configured to provide the first data signal of the pair of data signals to a first signal line of a pair of signal lines and the second data signal of the pair of data signals to a second signal line of the pair of signal lines.

For example, the apparatus 3020 may be configured to switch between a non-differential operating mode and a differential operating mode. For example, the processing circuit 3020 may be configured to generate the pair of data signals as differential signal in a differential operating mode of the apparatus. The apparatus 3020 may use a pair of transmission lines, which can be used for the transmission of differential signals in a differential operating mode of the apparatus 3020, but may transmit non-differential signals in a non-differential operating mode of the apparatus 3020. For example, the processing circuit 3022 may be configured to generate the pair of data signals as described above in the non-differential operating mode of the apparatus 3020 so that the bit rate may be higher in the non-differential operating mode than in the differential operating mode.

FIG. 30*f* shows an example of a pair of data signals 3052, 3054 for sending the following 4 bytes (e.g. the first bit of every group of four bits is coded in the "amplitude" scheme, while the other three bits are coded in the phase): 01011010 & 00000000 & 11111111 & 01011010

As shown in this example, every symbol may code 4 bits, 3 bits in the time axis and 1 bit by the change of the P&N line output. In the shown example, the time periods of the data symbols have a minimal time length of 7 time units labeled with 0 followed by a data depending time length between 0 and 7 time units labeled with 0 to 7 (e.g. in FIG. 30*f*: 5 followed by 2 followed by a not indicated 0 followed by a not indicated 0 followed by 7 followed by 5 and followed by 2).

Further, an example of a receiver RX analog input signal 3050 is shown in FIG. 30*f* below the pair of data signals, which may be generated by determining a difference between the data signals of the pair of data signals.

More details and aspects of the apparatus 3020 are mentioned in connection with one or more examples described above. The apparatus 3020 may comprise one or more additional optional features corresponding to one or more examples described above or below.

FIG. 30*g* shows a block diagram of an apparatus for receiving a pair of data signals according to an example. The apparatus 3030 comprises a processing circuit 3032 configured to generate a difference data signal based on the pair of data signals. Further, the processing circuit 3032 is configured to determine a sequence of a first signal edge (n-th signal edge) of a first type, a second signal edge (n-th+1 signal edge) of a second type, and a third signal edge (n-th+2 signal edge) of the first type in the difference data signal. Additionally, the apparatus 3030 comprises a demodulation circuit 3034 configured to determine first data based on a first time period between the first signal edge and the second signal edge, and second data based on a second time period between the second signal edge and the third signal edge. Further, the demodulation circuit 3034 is configured to determine at least one additional data bit based on a first signal amplitude of the difference data signal during the first time period and a second signal amplitude of the difference data signal during the second time period.

By encoding additional data through an amplitude change between succeeding data symbols, the bit rate may be increased.

For example, the demodulation circuit 3034 may be configured to determine at least one additional data bit based on a difference between the first signal amplitude and the second signal amplitude.

An example, of a difference data signal may be shown in FIG. 30*f* below the pair of data signals. In this example, a demodulation circuit may be configured to determine the additional data bit based on the table provided above.

For example, the difference data signal may be based on a data communication protocol. A first data symbol received according to the data communication protocol may comprise the first data and the at least one additional bit. In other words, a data symbol determined by the demodulation circuit 3034 may comprise a number of time encoded data bits and at least one amplitude encoded, additional bit.

Signal edges of a first data signal of the pair of data signals and signal edges of a second data signal of the pair of data signals may correspond to beginnings and ends of time periods corresponding to received data symbols.

For example, the processing circuit 3032 may be configured to generate the difference data signal so that the difference data signal comprises signal edges for each received data symbol of the data communication protocol. The difference data signal may be obtained by adding the pair of data signals or by subtracting a first data signal of the pair of data signals from a second data signal of the pair of data signals. For example, the processing circuit 3032 may be configured to generate the difference data signal by summing the data signals of the pair of data signals or subtracting the data signals of the pair of data signals from each other.

For example, the demodulation circuit 3034 may be configured to determine one additional data bit for each received data symbol in a non-differential operating mode of the apparatus based on a respective change of the signal amplitude of the difference data signal. The apparatus 3030 may be configured to switch between a non-differential operating mode and a differential operating mode. For example, the data signals of the pair of data signals may be differential signals in a differential operating mode of the apparatus.

More details and aspects of the apparatus 3030 are mentioned in connection with one or more examples described above. The apparatus 3030 may comprise one or more additional optional features corresponding to one or more examples described above or below.

FIG. 30*h* shows a flow chart of a method for generating a data signal according to an example. The method 3060 comprises generating 3062 the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. Further, the method 3060 comprises modulating a first signal amplitude of the data signal during the first time period and a second signal amplitude of the data signal during the second time period corresponding to additional data to be transmitted. Additionally, the method 3060 comprises outputting 3064 the data signal.

More details and aspects of the method 3060 are mentioned in connection with one or more examples described above. The method 3060 may comprise one or more additional optional features corresponding to one or more examples described above or below.

FIG. 30*i* shows a flow chart of a method for receiving a data signal according to an example. The method 3070 comprises determining 3072 a sequence of a first signal edge of a first type, a second signal edge of a second type, and a third signal edge of the first type in the data signal. Further, the method 3070 comprises determining 3074 first data based on a first time period between the first signal edge and the second signal edge and determining 3076 second data based on a second time period between the second signal edge and the third signal edge. Additionally, the method 3070 comprises determining 3078 additional data based on a first signal amplitude of the data signal during the first time period and a second signal amplitude of the data signal during the second time period.

More details and aspects of the method 3070 are mentioned in connection with one or more examples described above. The method 3070 may comprise one or more additional optional features corresponding to one or more examples described above or below.

FIG. 30*j* shows a flow chart of a method for generating a pair of data signals according to an example. The method 3080 comprises generating 3082 a first data signal of the pair of data signals, the first data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The first data signal comprises a first signal amplitude during the first time period and a second data signal of the pair of data signals comprises a second signal amplitude during the first time period, wherein the first signal amplitude and the second signal amplitude is selected based on at least one additional data bit to be transmitted. Further, the method 3080 comprises outputting 3084 the pair of data signals.

More details and aspects of the method 3080 are mentioned in connection with one or more examples described above. The method 3080 may comprise one or more additional optional features corresponding to one or more examples described above or below.

FIG. 30*k* shows a flow chart of a method for receiving a pair of data signals according to an example. The method 3090 comprises generating 3092 a difference data signal based on the pair of data signals. Further, the method 3090 comprises determining 3094 a sequence of a first signal edge of a first type, a second signal edge of a second type, and a third signal edge of the first type in the difference data signal, and determining 3096 first data based on a first time period between the first signal edge and the second signal edge. Additionally, the method 3090 comprises determining 3098 second data based on a second time period between the second signal edge and the third signal edge. Further, the method 3090 comprises determining 3099 at least one additional data bit based on a first signal amplitude of the difference data signal during the first time period and a second signal amplitude of the difference data signal during the second time period.

More details and aspects of the method 3090 are mentioned in connection with one or more examples described above. The method 3090 may comprise one or more additional optional features corresponding to one or more examples described above or below.

Some examples relate to the use of three traces for a modulation for a STEP connection to increase the bit rates. A STEP interface may have already a multi-Gbits/sec capacity, but it may be always desired to further increase the bit rates.

For example, the number of traces may be increased from 2 (differential) to 3. Some proposals of STEP may address only "semi NRZ" code. That may mean that increasing the bandwidth BW may require to further shrink the gap between phases as well as reduce the minimal symbol time. Additionally or alternatively, the STEP concept of phase modulation may be merged with a 3 traces concept and the BW may be increased by extra 75%, for example. Additionally, a pulse amplitude PAM modulation may be implemented that can further increase the BW as explained in connection with FIGS. 30*a*-30*k*, for example.

For example, STEP may apply phase modulation to code bits (e.g. 3 bits on the rise/fall of the signal) by using differential signaling. The phase fall or rise may be a symbol. According to an aspect, STEP may use the same scheme, but instead of differential lines, 3 traces may be used and in this way 2 extra bits or 5 states may be coded. Such a scheme may still allow PAM modulation and the phase modulation of STEP, but may provide more BW. For example, the TX side may support a code of 2 bits with the phase modulation of 3 bits (one symbol) or alternatively modulating 9 bits on 4 symbols time.

FIG. 31*a* shows a block diagram of an apparatus for generating data signals according to an example. The apparatus 3100 comprises a processing circuit 3102 connected to an output interface circuit 3104. The processing circuit 3102 is configured to generate a set of three data signals for three transmission lines. At least two data signals of the set of three data signals have a first signal edge at a first time and at least two data signals of the set of three data signals have a second signal edge directly succeeding the first signal edge at a second time. Further, at least two data signals of the set of three data signals have a third signal edge directly succeeding the second signal edge at a third time. The first time and the second time are separated by a first time period corresponding to first data to be transmitted, and the second time and the third time are separated by a second time period corresponding to second data to be transmitted. A first combination of two data signals of the set of three data signals have differential signal levels during the first time period and a second, different combination of two data signals of the set of three data signals have differential signal levels during the second time period. Further, the transition from the first combination to the second combination corresponds to at least a part of additional data to be transmitted. The output interface circuit 3104 is configured to output the data signals.

By using three data signals, additional data may be transmitted by a varying selection of a permutation of two data signals of the three data signals having differential signal levels. In this way, the bit rate may be increased.

For example, the three data signal have signal edges corresponding to time encoded data symbols, but not every data signal of the three data signals has every signal edge. However, each signal edge of a pulse width modulated data symbol occurs in at least two of the three data signals, but the permutation of two of the three data signals may vary for different signal edges. For example, all three data signals may comprise a signal edge of a data symbol or two data signals may comprise the signal edge of the data symbol, but the third signal has no corresponding signal edge. For example, none of the three data signals has a signal edge between the first signal edge and the second signal edge and between the second signal edge and the third signal edge so that the second signal edge directly follows the first signal edge and the third signal edge directly follows the second signal edge.

Two of the three data signals may comprise differential signal levels, if one of the two data signals is at a logical low level and the other one of the two data signals is at a logical high level. There might be more than one logical high level, if amplitude modulation is used in addition. A third data signal of the set of three data signals may be in a high impedance state or at a signal level different from the differential signal levels of the other two signals of the set of three data signals during the first time period and the second time period. The third signal of the three data signals may be in a high impedance state, if the two other data signals have differential signal levels. For example, the logical low level is indicated as 0, the logical high level is indicated as 1 and the high impedance state is indicated as X (e.g. FIGS. 31*b* and *c*).

For example, not only which combination of two data signals having differential signal levels may be relevant, but also which of the two data signals is at the logical low level and which one is at the logical high level may be relevant. For example, there are three different combinations of two signals selected from a set of three signals, but there are six different permutations of two signals selected from a set of three signals. In other words, a first permutation of two data signals of the set of three data signals may have differential signal levels during the first time period and a second, different permutation of two data signals of the set of three data signals may have differential signal levels during the second time period. Further, the transition from the first permutation to the second permutation may correspond to at least a part of additional data to be transmitted.

For example, a data signal having a logical low level during a time period of a data symbol may always change during the transition to the time period of the next data symbol (e.g. to a logical high level or a high impedance state). In this way, the transition may be easier detectable within the three data signals.

Some examples may use 3 traces, 2 of them may have differential signaling and the last may have no signal (e.g. high impedance state). For example, the receiver may need to see a change on the input to allow proper direction of the signal and measure the length of the signal pulses (e.g. positive or negative). The setting of the 3 signals may change for every symbol.

For example, the below table shows an example of possible states of the traces (e.g. signal levels of the data signals):

| State | Trace 0 | Trace 1 | Trace 2 |
|---|---|---|---|
| S0 | 0 | 1 | X |
| S1 | 1 | 0 | X |
| S2 | 0 | X | 1 |
| S3 | 1 | X | 0 |
| S4 | X | 1 | 0 |
| S5 | X | 0 | 1 |

Six states may be possible, but the trace states should change from one symbol to the next, actually only 5 options may be used to move from each state to another state. For example, starting at S4, it may be shifted to any state except for S4 so that the RX side may still be able to detect a change.

For example, a single symbol may increase from 3 bits (without the proposed use of three data signals) to 5 bits, which may be a gain of 66.7%.

If 4 symbols are clustered, 5*5*5*5=625 options may be obtained, which may allow 512 combinations representing 9 bits. In such a case, the increase may be from 3*4=12 bits to 12+9=21 bits or a 75% gain in band width BW. Alternatively, also a higher number of symbols may be combined, but the next cases may be less attractive from BW gain and the complexity to design may be higher. More general, information on a bit of the additional data may be distributed over two transitions (e.g. at least the transition from the first combination to the second combination and a transition from the second combination to a third combination of two data signals of the set of three data signals having differential signal levels during a following, third time period).

For example, the extra bits (bits of additional data) may be coded as follows:

| Current state | Bit to code | Next state | T0-T1-T2 before | T0-T1-T2 After |
|---|---|---|---|---|
| S0 | 00 | S1 | 01X | 10X |
| S0 | 01 | S2 | 01X | 0X1 |
| S0 | 10 | S3 | 01X | 1X0 |
| S0 | 11 | S4 | 01X | X10 |
| S0 | Not used | S5 | 01X | X01 |
| S0 | Not allowed | S0 | 01X | 01X |
| S1 | 00 | S0 | 10X | 01X |
| . . . | | | | |

FIG. 31*b* shows a schematic illustration of an example of a set of three data signals for the transmission of some data symbols. At any given time, there may be a unique setting of 1,X,0 of the lines. The first data signal 3105 has the signal levels X, 1, 1, 0, 1, X, the second data signal 3106 has the signal levels 1, 0, X, 1, X, 0 and the third data signal 3107 has the signal levels 0, X, 0, X, 0, 1. In this example, the duration of a time period between directly succeeding edges is selected according to a STEP modulation of 3 bit symbols, while at the code transition (transition between succeeding symbols) extra 2 bits are modulated. In total 6 states and 5 possible transition options may be available from any state to any of the other states, but only 4 may be used to modulate 2 bits. The 2 bits coded by the transitions and the 3 time encoded bits may be combined to get 5 bit symbols.

More general, one data signal of the set of three data signals may be in a high impedance state or at a signal level different from the differential signal levels at any time during transmission of a data symbol in a three-line transmission mode. Different data signals of the set of three data signals may be in the high impedance state or at the signal level different from the differential signal levels at different time periods during transmission of different data symbols in the three-line transmission mode. For example, a data signal of the three data signal has a differential signal level during the first time period and has a high impedance state or a signal level different from the differential signal levels during the second time period.

For example, the processing circuit 3102 may be configured to generate the data signals so that 2 bits of the additional data are transmitted by every transition between two succeeding time periods separated by a signal edge within at least two data signals of the set of three data signals during transmission in the three-line transmission mode. Alternatively, the processing circuit 3102 may be configured to generate the data signals so that 9 bits of the additional data are transmitted by four transitions between respective two succeeding time periods separated by a signal edge within at least two data signals of the set of three data signals during transmission in the three-line transmission mode.

For example, the apparatus 3100 may be configured to switch form a three-line transmission mode to a differential operating mode. For example, the processing circuit 3102 may be configured to generate a pair of data signals as differential signals in the differential operating mode of the apparatus 3100 and may transmit the pair of differential data signals through two of the three transmission lines.

For example, the processing circuit 3102 may be configured to generate the data signals based on a data communication protocol. A first data symbol to be transmitted according to the data communication protocol may comprise the first data and at least one bit of the additional data.

Further, a second data symbol to be transmitted according to the data communication protocol may comprise the second data and at least another bit of the additional data.

The output interface circuit 3104 may comprise a line driver for each of the three transmission lines. The line drivers may be configured to set each of the three transmission lines individually to a high impedance state at different times. The line driver of a transmission line of the three transmission lines may be configured to set the transmission line to a high impedance state, if the two other transmission lines of the three transmission lines are used for transmission of differential signal levels.

FIG. 39*c* shows a schematic illustration of three line drivers of an output interface circuit transmitting a set of three data signals over three transmission lines to a receiver comprising three differential amplifiers. A first line driver 3110 is connected to a non-inverting input of a first differential amplifier 3120 of the receiver and to an inverting input of a third differential amplifier 3124 of the receiver over a first transmission line 3111. A second line driver 3112 is connected to a non-inverting input of a second differential amplifier 3120 of the receiver and to an inverting input of the first differential amplifier 3120 of the receiver over a second transmission line 3113. A third line driver 3114 is connected to a non-inverting input of the third differential amplifier 3124 of the receiver and to an inverting input of the second differential amplifier 3122 of the receiver over a third transmission line 3115.

The output of each line driver is connected to a reference potential terminal Vref over respective resistors Rv. The ends of the transmission lines are connected to each other through respective resistors (e.g. 50Ω).

In the shown example, the high impedance state is labelled Z and the first line driver 3110 drives a sequence of signal levels of 0110ZZ. Further, the second line driver 3112 drives a sequence of signal levels of 10ZZ10 and the third line driver 3114 drives a sequence of signal levels of ZZ0101. These signals may cause a sequence of voltage differences at the first differential amplifier 3120 of −V,+V,+V,−V,−X,+X, a sequence of voltage differences at the second differential amplifier 3122 of +V,−V,+X,−X,+V,−V and a sequence of voltage differences at the third differential amplifier 3124 of +X,−X,−V,+V,−V,+V. Consequently, the amplifier output signal of the first differential amplifier 3120 may show a sequence of signal levels of 011001, the amplifier output signal of the second differential amplifier 3122 may show a sequence of signal levels of 101010 and the amplifier output signal of the third differential amplifier 3124 may show a sequence of signal levels of 100101. Based on these amplifier output signals, additional data may be determined, which may be in this example equal to the sequence 346125.

On the transmit side, a driver buffer and a mapper of bits may be added in comparison to an implementation for differential signaling as mentioned in connection with one or more of the examples of STEP connections described above or below so that the 3 buffers may be set to drive the signals. No additional DTC may be required.

On the RX side, 2 additional differential amplifiers may be added (e.g. 3 instead of 1 used for other STEP implementations with differential signaling) and a decoder of symbols to bits. An additional TDC might not be necessary. The existing TDC (s) (e.g. one for the positive and one for the negative edges) may be sufficient.

For example, the proposed added coding scheme might not require adding a PLL on the RX side and may be combinable with a PAM modulation scheme. The 3 differential receivers may be able to detect whether the line is differential or if one of the signals is at X state (e.g. floating) and not driven and might not participate in the signaling.

More details and aspects of the apparatus 3100 are mentioned in connection with one or more examples described above. The apparatus 3100 may comprise one or more additional optional features corresponding to one or more examples described above or below.

FIG. 31*d* shows a block diagram of an apparatus for receiving data signals according to an example. The apparatus 3130 comprises a processing circuit 3132 connected to a demodulation circuit 3134. The processing circuit 3132 is configured to determine a length of a first time period between occurrence of a first signal edge and a second signal edge and a length of a second time period between occurrence of the second signal edge and a third signal edge. The first signal edge occurs within at least two data signals of a set of three data signals at a first time, the second signal edge occurs within at least two data signals of the set of three data signals at a second time temporally directly succeeding the first signal edge, and the third signal edge occurs within at least two data signals of the set of three data signals at a third time temporally directly succeeding the second signal edge. The first time and the second time are separated by the first time period and the second time and the third time are separated by the second time period. The demodulation circuit 3134 is configured to determine first data based on the length of the first time period and second data based on the length of the second time period. Further, the demodulation circuit 3134 is configured to determine additional data based on a first combination of two data signals of the set of three data signals having differential signal levels during the first time period and a second, different combination of two data signals of the set of three data signals having differential signal levels during the second time period. The transition from the first combination to the second combination corresponds to at least a part of the additional data.

A third data signal of the set of three data signals may be in a high impedance state or at a signal level different from the differential signal levels of the other two signals of the set of three data signals during the first time period and the second time period.

For example, the data signals may be based on a data communication protocol. A first data symbol received according to the data communication protocol may comprise the first data and at least one bit of the additional data. Further, a second data symbol received according to the data communication protocol may comprise the second data and at least another bit of the additional data.

Information on a bit of the additional data may be obtainable from a single transition (e.g. 2 bits per data symbol) or may be distributed over at least the transition from the first combination to the second combination and a transition from the second combination to a third combination of two data signals of the set of three data signals having differential signal levels during a following, third time period (e.g. 9 bits for 4 data symbols).

The demodulation circuit 3130 may be configured to determine 2 bits of the additional data respectively based on a transition between two succeeding time periods separated by a signal edge within at least two data signals of the set of three data signals during reception in a three-line transmission mode. Alternatively, the demodulation circuit 3130 may be configured to determine 9 bits of the additional data based on four transitions between respective two succeeding time periods separated by a signal edge within at least two data signals of the set of three data signals during reception in a three-line transmission mode.

The apparatus 3130 may further comprise three differential amplifiers (e.g. as shown in FIG. 31*c*). Each differential amplifier of the three differential amplifiers may receive a different combination of two data signals of the three data signals as input signals. Further, each differential amplifier may be configured to output an amplifier output signal based on the respective two data signals. The respective amplifier output signal may be proportional to a difference between the two respective input signals. The demodulation circuit 3130 may be configured to determine the additional data based on the amplifier output signals of the three differential amplifiers.

More details and aspects of the apparatus 3130 are mentioned in connection with one or more examples described above. The apparatus 3130 may comprise one or more additional optional features corresponding to one or more examples described above or below.

FIG. 31*e* shows a block diagram of a receiver according to an example. The receiver 3140 comprises an apparatus for receiving data signals as described in connection with FIG. 31*d*. The receiver 3140 may comprise an input interface circuit comprising three differential amplifiers 3120, 3122, 3124 connectable to three transmission lines, for example, as described in connection with FIG. 31*c*.

Further, the receiver 3140 comprises a code to index module 3142 and a code extractor 3150. The amplifier output signals of the three differential amplifiers 3120, 3122, 3124 are provided to the code to index module 3142 and the code extractor 3150.

The code to index module 3142 may translate the change of the traces to a pulse that starts with the change and ends with the next change and may select where the pulse will be routed to TDC wise. The code to index module 3142 may comprise a multiplexer providing an output signal of the code to index module 3142 to a first TDC 3144 (TDC0) and a second TDC 3146 (TDC1). For example, the first TDC 3144 may detect falling edges within the output signal of the code to index module 3142 and may output a 9 bit digital value corresponding to a time of occurrence of a falling edge. The second TDC 3146 may detect rising edges within the output signal of the code to index module 3142 and may output a 9 bit digital value corresponding to a time of occurrence of a rising edge. The output of the two TDCs is provided to a symbol decoder 3148, which may be configured to output a 6 bit digital value representing a data symbol value and/or status information or other information transmitted over the three transmission lines. The symbol decoder 3148 may convert the TDC output into, for example, a 3 bit field that may represent the length of the pulse. On top of the 3 bits, the symbol decoder 3148 may generate status information as overflow, margin low, underflow flags and/or margin high flags (e.g. overflow may be used to signal delimiter, underflow may be used to signal an error and the margin may be detected to trigger calibration), for example.

Further, the receiver 3140 comprises a code extractor 3150 configured to determine additional data based on the three amplifier output signals according to the concept described in connection with FIG. 31*a*-31*d*. For example, the code extractor 3150 may output 2 bits for every received time encoded data symbol or may output 9 bits for every 4 received time encoded data symbols. The code extractor 3150 may convert the state change to a 2 bit code for a single symbol (e.g. 67% gain) or 9 bits in the 4 symbol case (e.g. gain 75%).

The output of the symbol decoder 3148 and the output of the code extractor 3150 may be provided to a serial-input-parallel-output SIPO module 3152 for a serial to parallel conversion for further processing.

The code to index module 3142 and the two TDCs may be part of the processing circuit of the apparatus for receiving data signals and the symbol decoder 3148 and the code extractor 3150 may be part of the demodulation circuit of the apparatus for receiving data signals.

More details and aspects of the receiver 3140 are mentioned in connection with one or more examples described above. The receiver 3140 may comprise one or more additional optional features corresponding to one or more examples described above or below.

FIG. 31*f* shows a flow chart of a method for generating data signals according to an example. The method 3180 comprises generating 3182 a set of three data signals for three transmission lines. At least two data signals of the set of three data signals have a first signal edge at a first time. At least two data signals of the set of three data signals have a second signal edge directly succeeding the first signal edge at a second time. Further, at least two data signals of the set of three data signals have a third signal edge directly succeeding the second signal edge at a third time. The first time and the second time are separated by a first time period corresponding to first data to be transmitted. Further, the second time and the third time are separated by a second time period corresponding to second data to be transmitted. A first combination of two data signals of the set of three data signals have differential signal levels during the first time period and a second, different combination of two data signals of the set of three data signals have differential signal levels during the second time period. Further, the transition from the first combination to the second combination corresponds to at least a part of additional data to be transmitted. Additionally, the method 3180 comprises outputting 3184 the set of three data signals.

More details and aspects of the method 3180 are mentioned in connection with one or more examples described above. The method 3180 may comprise one or more additional optional features corresponding to one or more examples described above or below.

FIG. 31*g* shows a flow chart of a method for receiving data signals according to an example. The method 3190 comprises determining 3192 a length of a first time period between occurrence of a first signal edge and a second signal edge and a length of a second time period between occurrence of the second signal edge and a third signal edge. The first signal edge occurs within at least two data signals of a set of three data signals at a first time, the second signal edge occurs within at least two data signals of the set of three data signals at a second time temporally directly succeeding the first signal edge, and the third signal edge occurs within at least two data signals of the set of three data signals at a third time temporally directly succeeding the second signal edge. Further, the first time and the second time are separated by the first time period and the second time and the third time are separated by the second time period. Additionally, the method 3190 comprises determining 3194 first data based on the length of the first time period and determining 3196 second data based on the length of the second time period. Further, the method 3190 comprises determining 3198 additional data based on a first combination of two data signals of the set of three data signals having differential signal levels during the first time period and a second, different combination of two data signals of the set of three data signals having differential signal levels during the second time period. The transition from the first combination to the second combination corresponds to at least a part of the additional data.

More details and aspects of the method 3190 are mentioned in connection with one or more examples described above. The method 3190 may comprise one or more additional optional features corresponding to one or more examples described above or below.

As described above, the STEP interface is an ultrafast low power digital interface capable of transmitting 10's of Gb/s over a single lane with low power consumption (e.g. 1-2 pJ/bit). The transmitted symbols may be generated by a DTC and received (demodulated) by a TDC. An example of a communication system 3200 using a STEP interface is illustrated in FIG. 32*a*.

The DTC 3201 generates symbols that are passed through a matched transmit driver 3202 (which may be understood as an output interface) before being sent through a transmission link 3203. The symbols are received by a matched receive driver 3204 (which may be understood as an input interface) and a TDC 3205. The TDC 3205 converts the length (time duration) of each symbol into digital data. The digital data from the TDC 3205 is processed by a digital section 3206 (for data decision, coding, calibrations, etc.) to generate appropriate bits.

Some examples of STEP interfaces (using DTC and TDC) may be based on a "soft decision" with a high-resolution TDC (e.g. low quantization noise). A high resolution TDC (for example a stochastic TDC) produces a high number of quantization levels at high rate. This may lead to high power consumption of both the TDC and the processing digital circuits handling this high rate high volume data. In order to optimize the power consumption and the throughput of the STEP interface, a system level optimization and a calibration of the DTC and TDC symbols length (size) as well as a timing calibration in accordance with the aspects described in the following may be used.

In doing so, the power consumption of the STEP interface may be lowered without degrading the error rate of the interface (e.g. the BER). For example, the power consumption of the TDC and further digital processing circuitry may be lowered by using a "hard decision" instead of a "soft decision".

For example, instead of using a very fine resolution TDC with very low quantization noise allowing fine measurement of each symbol length (e.g. a "soft decision"), a system with coarse (but precise) symbols in the DTC and coarse (but precise) timing levels in the TDC may be used. This may allow lowering the power consumption of the system without degrading the BER.

An example of an apparatus 3210 for generating output data using a "hard decision" is illustrated in FIG. 32*b*. The apparatus 3210 comprises an input interface 3212 configured to receive an input data signal 3211 (e.g. a digital signal) generated according to a communication protocol such as the STEP protocol. The input data signal 3211 comprises a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to a first data symbol, and the second signal edge and the third signal edge are separated by a second time period corresponding to a second data symbol. Apart from other time encoded communication protocols, the apparatus 3210 may be used for communication according to the STEP protocol. That is, a sum of the first time period and the second time period may be lower than $10^{-7}$ s, $10^{-8}$ s, $10^{-9}$ s, $10^{-10}$ s, $10^{-11}$ s, or $10^{-12}$ s.

The apparatus 3210 further comprises a TDC 3213 configured to generate, based on the input data signal 3211, output data 3214 indicating the first data symbol and the second symbol. A resolution of the TDC 3213 is larger than 30%, 40%, 50%, 60% or 70% of a minimal symbol separation time of all data symbols of the communication protocol (e.g. the STEP protocol).

Compared to examples using high resolution TDCs (e.g. a stochastic flash TDC with a resolution of less than 1 ps, but high power consumption), the TDC 3213 in the apparatus 3210 uses a smaller number of quantization levels due to the reduced resolution. For example, the resolution of the TDC 3213 may be less than two times the minimal symbol separation time of the communication protocol (e.g. the STEP protocol). The resolution of the TDC 3213 may, e.g., be larger than 5 ps or 10 ps and be less than 30 ps, 25 ps or 20 ps. For example, the resolution of a TDC according to the proposed technique may be about 10 ps with a precision of about 1 ps.

Further, the TDC 3213 outputs data of a smaller volume due to the lower resolution. Accordingly, a power consumption of the TDC 3213 (and digital processing circuitry coupled to the output of the TDC 3213) may be reduced.

A comparison between the resolutions of a conventional TDC and the TDC 3213 is illustrated in FIG. 32*c* and FIG. 32*d*. FIG. 32*c* illustrates the input data signal 3211. Further, FIG. 32*c* illustrates the quantization levels 3220 of a high-resolution TDC as dashed lines. The different quantization levels of the TDC are separated from each other by a short time interval $T_{Dec}$ compared to the pulse width $T_{pw}$ of the input data signal 3211. In other words, the quantization level of the high-resolution TDC is very low compared to the input data signal 3211. As a comparison, the FIG. 32*d* illustrates the input data signal 3211 with the quantization levels 3225 of the TDC 3213 as an example for a low resolution TDC. The different quantization levels of the TDC 3213 are separated from each other by a time interval $T_{LSB}$ which is much longer than the short time interval $T_{Dec}$ of the high resolution TDC. In the example of FIG. 32*d*, the quantization levels of the TDC 3213 are calibrated to equal the (precise) length $T_{LSB}$ of the Least Significant Bit (LSB) of the TDC (the duration corresponding to the LSB of the TDC and, hence, the minimal symbol separation time of the communication protocol).

The symbol duration of a symbol represented by the input data signal 3211 may, e.g., be measured by counting the number of whole $T_{LSB}$ (TDC quantization levels). Using a low resolution TDC may, hence, result in (very) limited data coming out of the TDC.

In order to minimize false detection (e.g. due to Gaussian distributed jitter) falling and rising signal edges of the symbols (and hence the input data signal 3211) should fall exactly in between the TDC quantization levels. FIG. 32*e* illustrates an example of a system with a calibrated delay for an optimal BER. In the example of FIG. 32*e*, the falling and rising signal edges of the input data signal 3211 are located exactly in the middle between consecutive TDC quantization levels 3225 of the low resolution TDC 3213.

Examples of calibrating the TDC 3213 are described below with respect to FIGS. 32*f* to 32*j*. As illustrated in FIG. 32*f*, the TDC 3213 may, e.g., comprises a delay line 3230 with a plurality of delay circuits 3231-1, 3231-2, . . . , 3231-*n* connected in series. A number of delay circuits within the delay line 3230 may, e.g., be less than 3 times a number of different payload data symbols of the communication protocol. As indicated in FIG. 32*f* for the delay circuit 3231-1, at least one delay circuit of the plurality of delay circuits 3231-1, 3231-2, . . . , 3231-*n* may be a variable delay circuit with an adjustable signal delay. In some examples, all delay circuits of the plurality of delay circuits 3231-1, 3231-2, . . . , 3231-*n* may be variable delay circuits. A signal edge present in the input data signal 3211 is delayed by each of the plurality of delay circuits 3231-1, 3231-2, . . . , 3231-*n*, while the state of the signal changes (from high to low or vice versa).

A respective signal capture circuit of a plurality of signal capture circuits 3232-1, 3232-2, . . . , 3232-*n* is connected to a respective tap node 3233-1, 3233-3, . . . , 3233-*n*-1 between every two successive delay circuits of the plurality of delay circuits 3231-1, 3231-2, . . . , 3231-*n*. For example, a number of tap nodes within the delay line 3230 may be less than 3 times a number of different payload data symbols of the communication protocol (e.g. the STEP protocol). In some examples, the number of tap nodes within the delay line 3230 may, e.g., be equal to one time or two times a number of different payload data symbols of the communication protocol.

Circuitry of the TDC is configured to provide the input data signal 3211 to the delay line 3230 and the plurality of signal capture circuits 3232-1, 3232-2, . . . , 3232-*n* are configured to capture signal values of the input data signal 3211 occurring at the tap nodes 3233-1, 3233-3, . . . , 3233-*n*-1 between the delay circuits of the plurality of delay circuits 3231-1, 3231-2, . . . , 3231-*n* when triggered by a trigger signal 3234. The trigger signal 3234 is generated by a triggering inverter 3235 based on the input data signal 3211. In the example of FIG. 32*f*, the trigger signal 3234 is a delayed version of the input data signal 3211. In other example, the trigger signal may alternatively be the input data signal 3211 itself.

Each signal capture circuit of the plurality of signal capture circuits 3232-1, 3232-2, . . . , 3232-*n* comprises at least one D-flip-flop-circuit configured to capture the signal value of the input data signal 3211 occurring at the respective tap node. In the example of FIG. 32*f*, each signal capture circuit of the plurality of signal capture 3232-1, 3232-2, . . . , 3232-*n* circuits comprises a first flip-flop-circuit triggered by the trigger signal and a second flip-flop-circuit triggered by an inverse version of the trigger signal.

In other words, an output of each delay circuit of the plurality of delay circuits 3231-1, 3231-2, . . . , 3231-*n* is input to a first bank of edge triggered flip-flop-circuits (triggered by the trigger signal 3234) and input to a second bank of edge triggered flip-flop-circuits (triggered by the inverse version of the trigger signal 3234).

The TDC further comprises a decoding circuit 3235 configured to output data indicating the first data symbol based on signal values of the input data signal 3211 captured by the first flip-flop-circuits of the plurality of signal capture circuits 3232-1, 3232-2, . . . , 3232-*n* and to output data indicating the second data symbol based on signal values of the input data signal 3211 captured by the second flip-flop-circuits of the plurality of signal capture circuits 3232-1, 3232-2, . . . , 3232-*n*.

The first flip-flop-circuits of the plurality of signal capture circuits 3232-1, 3232-2, . . . , 3232-*n* are triggered by positive signal edges, while the second flip-flop-circuits of the plurality of signal capture circuits 3232-1, 3232-2, . . . , 3232-*n* are triggered by negative signal edges. Hence, the first flip-flop-circuits output a signal when a negative signal edge is present within the input data signal 3211, while the second flip-flop-circuits output a signal when a positive signal edge is present within the data signal. However, the signal pattern output by the first flip-flop-circuits allows to conclude, how long ago the preceding positive signal edge was received within the input data signal 3211. In particular, the delay circuit having identical signal states at its output as well as at its input (as readout by means of corresponding flip-flops) may be indicative of the position of the preceding positive signal edge within the delay line 3230 and hence for the time period between the triggering negative signal edge and the preceding positive signal edge. Therefore, the readout of the first flip-flop-circuits by a positive pulse decoder 3236 of the decoding circuit 3235 allows to derive the time period in which the input data signal 3211 was in the high state and so provides the time period associated to a received symbol. Likewise, a negative pulse decoder 3237 of the decoding circuit 3235 allows to derive the time period in which the received data signal was in the low state and so provides the time period associated to a received symbol.

For calibrating the TDC 3213, the apparatus 3210 may further comprise a calibration module (not illustrated) configured to adjust a variable delay of at least one of the delay circuits 3231-1, 3231-2, . . . , 3231-*n* of the delay line 3230 in a calibration mode. For example, the input interface 3212 may be configured to receive in a c calibration mode a calibration data signal from an external transmitter comprising a known sequence of different data symbols. For example, the known sequence of different data symbols may comprise an equal number of each possible payload data symbol of the communication protocol. The TDC 3213 is configured to generate output data indicating a sequence of calibration output data symbols based on the calibration data signal. The calibration module then adjusts the variable delay of at least one of the delay circuits 3231-1, 3231-2, . . . , 3231-*n* based on a comparison of the data symbols of the known sequence and the calibration output data symbols.

In other examples, the tunable delay line 320 may be calibrated using SEM (Statistical Extraction Machine). The SEM mechanism measures the TDC tap node widths and the so determined data is used to calibrate the tunable delay line 3230. An exemplary calibration set-up for the TDC 3213 is illustrated in FIG. 32*g*. FIG. 32*g* schematically illustrates the TDC 3213 as described above in connection with FIG. 32*f* The apparatus 3210 is in the calibration mode configured to provide a first clock signal 3241 having a first frequency (as input data signal) to the delay line of the TDC 3213. The trigger signal for the signal capture circuits of the TDC 3213 is a second clock signal 3242 having a second frequency in the calibration mode. The first frequency is a non-integer multiple of the second frequency or the second frequency is a non-integer multiple of the first frequency. For example, if $f_{in1}$ denotes the first clock signal 3241 and $f_{in2}$ denotes the second clock signal 3242, the relation $f_{in2}=(N+K)\cdot f_{in1}$ may be used (with N being an integer number and K being a fraction). The calibration module is accordingly configured to count a number of output events for each possible payload data symbol of the communication protocol to obtain a statistical distribution of data symbols outputted by the TDC 3213. For example, the calibration module is configured to count in the calibration mode until TDC 3213 has output at least five times a number of different payload data symbols of the communication protocol to obtain the statistical distribution of data symbols outputted by the TDC 3213.

In other words, two frequencies ($f_{in1}$ and $f_{in2}$) with fractional values are fed to the TDC 3213. If 1/K was larger than the number of tap nodes in the TDC 3213, the phase difference would be evenly distributed between [0, 2π] covering all of the TDC tap nodes (there is a phase wrapping of 2π). The right part of FIG. 32*g* illustrates the TDC tap nodes delay distribution vs. time for an uncalibrated delay line of the TDC. As can be seen, the tap nodes delay as indicated by the vertical lines is not even.

Looking on the histogram of the TDC output, an evenly distributed histogram is expected after calibration, meaning that all the TDC tap nodes are evenly distributed (have the same delay). FIG. 32*h* illustrates an example for a SEM output histogram for an un-calibrated TDC, which consequently has unevenly distributed TDC tap nodes. Collecting this data may allow to trim the tunable interpolating delay line (changing the delay of the feedback paths of delay circuit 3231-1 illustrated in the upper part of FIG. 32*f*).

FIG. 32*i* illustrates in the left part the TDC 3213 together with the calibration module 3243 for adjusting the variable delay of at least one of the delay circuits of the delay line of the TDC 3213. In other words, the calibration module 3243 is configured to adjust the variable delay of at least one of the delay circuits 3231-1, 3231-2, . . . , 3231-*n* of the delay line 3230 of the TDC 3213 based on the statistical distribution of data symbols outputted by the TDC 3213. For example, the calibration module may be configured to adjust a variable delay of at least one of the delay circuits 3231-1, 3231-2, . . . , 3231-*n* of the delay line 3230 of the TDC 3213 so that, at the time of capturing the signal values of the input data signal 3211 by the signal capture circuits 3232-1, 3232-2, . . . , 3232-*n*, an edge of the input data signal 3211 has propagated half of the minimal symbol separation time after passing a latest tap node.

In other words, FIG. 32*i* illustrates an example for the feedback between the SEM calibration module 3243 and the TDC 3213. The SEM calibration module 3243 measures the output data of the TDC 3213 and calculates the distribution of the events of the TDC 3213. The SEM calibration module 3243 controls the delay line tap nodes until all tap nodes have the same delay, making the TDC 3213 producing an evenly distributed histogram. The accuracy of the SEM approach is very high and is theoretically only limited by the measuring time.

The right part of FIG. 32*i* illustrates the TDC tap nodes delay distribution vs. time for a calibrated delay line of the TDC. As can be seen, the tap nodes delay as indicated by the vertical lines is even.

For providing the clock signals used for calibration, the apparatus 3210 may optionally further comprise a clock signal generator circuit (not illustrated) configured to generate at least one of the first clock signal and the second clock signal.

In summarizing at least some of the above aspects, FIG. 32*j* illustrates an example of a STEP system 3250 with a calibrated TDC delay for an optimal BER. The DTC 3251 generates symbols that are passed through a matched transmit driver 3252 (which may be understood as an output interface) before being sent through a transmission link 3253. The symbols are received by a matched receive driver 3254 (which may be understood as an input interface) and a low resolution TDC 3255. The TDC 3255 converts the length (time duration) of each symbol into digital data. The digital data from the TDC 3255 is processed by a digital section 3206 (for data decision, coding, calibrations, etc.) to generate appropriate bits. The variable delays of the delay circuits 3257 in the delay line of the DTC 3255 are calibrated such that an edge of the input data signal from the transmission link 3253 has propagated half of the minimal symbol separation time $T_{TDC\_LSB/2}$ after passing a latest tap node.

The TDC 3255 works as a "hard decision slicer" for directly producing the final value of the detected symbol. As illustrated in FIG. 32*e*, data symbols may be affected by random jitter in the system. In order to minimize the BER, a maximal distance between the fall & rising edges and the TDC quantization levels is adjusted in the TDC 3255 by a calibration between the data and the sampling signal according to the above aspects.

The above calibrations may allow to ensure that rising and fall edges of all symbols are falling (e.g. exactly) in between of the TDC quantization levels. The calibration may, hence, enable to use a hard decision instead of a soft decision. As described above, the calibration may comprise one or more of:

1) setting a specific size (time duration) relationship between the DTC symbols and the TDC quantization levels (e.g. DTC symbols size=$\cdot T_{TDC\_LSB}$ with K being an integer);
2) calibrating the TDC resolution to the resolution of $T_{TDC\_LSB}$ (this may save a lot of power compared to e.g. a stochastic TDC); and
3) calibrating the TDC sampling for an optimal BER.

To summarize some of the above aspects on using low resolution DTCs, an example of a method 3260 for generating output data is illustrated by means of a flowchart in FIG. 32*k*. The method 3260 comprises receiving 3262 an input data signal generated according to a communication protocol. The input data signal comprises a sequence of a first signal edge of a first type, a second signal edge of a second type, and a third signal edge of the first type. The first signal edge and the second signal edge being separated by a first time period corresponding to a first data symbol, and the second signal edge and the third signal edge being separated by a second time period corresponding to a second data symbol. Further, the method 3260 comprises generating 3264 output data indicating the first data symbol and the second symbol based on the input data signal by a TDC. A resolution of the TDC is larger than 30% of a minimal symbol separation time of all data symbols of the communication protocol.

More details and aspects of method 3260 are mentioned in connection with the proposed technique or one or more examples described above (e.g. FIGS. 32*b* to 32*j*). The method may comprise one or more additional optional features corresponding to one or more aspects of the proposed technique or one or more examples described above.

Examples further relate to a machine-readable storage medium comprising code, when executed, to cause a machine to perform the method 3260 for generating output data.

Some examples relate to a time interleaved STEP connection for high throughput. For example, it may be proposed to interleave 2 DTC's and 2 TDC's to double the maximum frequency of operation (e.g. shown in FIG. 33*e*). To interleave the data signal created by 2 DTC's, one may additionally introduce some constraints to the modulation and a method to maintain the frequency in both DTCs identical, for example, to avoid potential problems due to drift in rate.

For example, data modulated by each DTC may consider the data of the other DTC. By defining the modulation range of each DTC to be lower than the minimum pulse width of each DTC, for example, a unified signal may be generated, where one DTC creates rising edges and the other falling edges (e.g. regardless of the data of each individual DTC). The generated combined signal (the doubled signal) may be divided by 2 to regenerate the 2 separate data streams, one of the doubled rising edges and one of the falling edges. The data may be transmitted in pairs x0+x1, x1+x2, x2+x3, x3+x4. Therefore, a subtraction of the data of the previous edge may be used to decode the data of each DTC, for example.

For example, an interleave concept with two DTC circuits connected to an XOR/XNOR gate may be proposed. The sum of two symbols may be modulated on each stream. Further, an interleave concept with two TDC circuits driven by a divided by two circuit may be proposed. The data may be decoded by subtracting the two streams.

FIG. 33*a* shows a block diagram of an apparatus for generating an output data signal according to an example. The apparatus 3300 comprises a first digital-to-time converter circuit 3302 and a second digital-to-time converter circuit 3304 connected to an XOR or XNOR circuit 3306. The first digital-to-time converter circuit 3302 is configured to generate a first converted data signal based on a first DTC input data signal and the second digital-to-time converter circuit 3304 is configured to generate a second converted data signal based on a second DTC input data signal. Further, the XOR or XNOR circuit 3306 is configured to generate a combined output data signal based on the first converted data signal and the second converted data signal.

By using an XOR or XNOR circuit to combine two data signals, the data rate may be doubled. In this way, the data throughput over one single ended connection or one differential connection may be significantly increased, while the DTCs can still work at half the frequency. In this way, the complexity and/or the current consumption of the DTCs may be kept low.

For example, the first DTC input data signal, the second DTC input data signal, the first converted data signal, the second converted data signal and the combined output data signal are digital signals.

The first digital-to-time converter circuit 3302 and the second digital-to-time converter circuit 3304 may be part of a processing circuit of a STEP transmitter as mentioned in connection with one or more examples described above or below.

The first converted data signal and the second converted data signal may be pulse width modulated signals comprising signal edges at times corresponding to data contained by the first DTC input data signal and the second DTC input data signal. For example, the first converted data signal may comprise a sequence of a first signal edge (n-th signal edge) of a first type, a second signal edge (n-th+1 signal edge) of a second type, and a third signal edge (n-th+2 signal edge) of the first type. The first signal edge and the second signal edge of the first DTC input data signal may be separated by a first time period corresponding to a first combined data symbol contained by the first DTC input data signal. Further, the second signal edge and the third signal edge of the first DTC input data signal may be separated by a second time period corresponding to a second combined data symbol contained by the first DTC input data signal. Additionally, the second converted data signal may comprise a sequence of a first signal edge (m-th signal edge) of a first type, a second signal edge (m-th+1 signal edge) of a second type, and a third signal edge (m-th+2 signal edge) of the first type. The first signal edge and the second signal edge of the second DTC input data signal may be separated by a first time period corresponding to a first combined data symbol contained by the second DTC input data signal. Further, the second signal edge and the third signal edge of the second DTC input data signal may be separated by a second time period corresponding to a second combined data symbol contained by the second DTC input data signal.

The first converted data signal and the second converted data signal may contain edges and may be temporally aligned to each other so that, when passing the XOR or XNOR circuit 3306, the edges of the first converted data signal cause the rising edges of the combined output data signal and the edges of the second converted data signal cause the falling edges of the combined output data signal or vice versa. The XOR or XNOR circuit 3306 may comprise an XOR gate configured to combine the first converted data signal and the second converted data signal based on a logical XOR function or an XNOR gate configured to combine the first converted data signal and the second converted data signal based on a logical XNOR function.

Further, the first converted data signal and the second converted data signal may contain edges and may be temporally aligned to each other so that the combined output data signal may comprise a minimal pulse width lower than a minimal pulse width of the first converted data signal and/or the second converted data signal. For example, the minimal pulse width (2m) of the first converted data signal may be equal to two times the minimal pulse width (m) of the combined output data signal. Additionally, the minimal pulse width (2m) of the second converted data signal may be equal to two times the minimal pulse width (m) of the combined output data signal.

The first DTC input data signal and the second DTC input data signal may be generated by a processing circuit based on data to be transmitted. In order to keep the first converted data signal and the second converted data signal aligned independent on the data to be transmitted, the data contained by the first DTC input data signal may be correlated with the data contained by the second DTC input data signal. For example, the first DTC input data signal and the second DTC input data signal may be generated based on two input data streams, each containing data to be transmitted. The first DTC input data signal may contain data symbols being based on data symbols of both input data streams and the second DTC input data signal may contain data symbols being based on data symbols of both input data streams as well.

For example, the data symbols of the first DTC input data signal and the second DTC input data signal may be based on a sum of a data symbol of a first input data stream and a data symbol of a second input data stream respectively. For example, the first combined data symbol of the first DTC input data signal may be based on a first data symbol of a first input data stream to be transmitted and a first data symbol of a second input data stream to be transmitted. Further, the first combined data symbol of the second DTC input data signal may be based on a second data symbol of the first input data stream to be transmitted and the first data symbol of the second input data stream to be transmitted.

Further, a second combined data symbol of the first DTC input data signal may be based on the second data symbol of the first input data stream to be transmitted and a second symbol of the second input data stream to be transmitted. Additionally, a second combined data symbol of the second DTC input data signal may be based on a third data symbol of the first input data stream to be transmitted and the second symbol of the second input data stream to be transmitted.

The apparatus 3300 may comprise a combiner configured to generate the first DTC input data signal based on the first input data stream and the second input data stream. Further, the combiner may be configured to generate the second DTC input data signal based on the first input data stream and the second input data stream.

FIG. 33*b* shows an example of DTC output signals 3312, 3314 (e.g. first converted data signal and second converted data signal) and an XOR output signal 3310 (e.g. combined output data signal). For example, a first data symbol of a first input data stream to be transmitted may be 3 and a first data symbol of a second input data stream to be transmitted may be 4. Further, a second data symbol of the first input data stream to be transmitted may be 5 and a second data symbol of the second input data stream to be transmitted may be 6.

The first combined data symbol of the first DTC input data signal may be the sum of the first data symbol of the first input data stream and the first data symbol of the second input data stream being equal to 7. The first combined data symbol of the second DTC input data signal may be the sum of the second data symbol of the first input data stream and the first data symbol of the second input data stream being equal to 9.

Further, the second combined data symbol of the first DTC input data signal may be the sum of the second data symbol of the first input data stream and the second symbol of the second input data stream being equal to 11.

In the example of FIG. 33*b*, the pulse widths (e.g. including a minimum duration m) of the first converted data signal 3312 and the second converted data signal 3314 are:

DTC1 pulses: 2m+3, 2m+7, 2m+11, 2m+13, 2m+9, 2m+5

DTC2 pulses: 2m+1, 2m+5, 2m+9, 2m+13, 2m+11, 2m+7, 2m+2

XOR pulses: m+1, m+2, m+3, m+4, m+5, m+6, m+7, m+6, m+5, m+4, m+3, m+2, m+1

At the receiver side, the XOR signal may be divided to provide a signal with the falling edges and another signal with the rising edges to two TDCs. If the TDCs are reading the DTC streams than they may calculate: 5−3+1=3, 7−5+3−1=4, 9−7+5−3+1=5, 11−9+7−5+3−1=6, . . . .

The first symbol may be known so that the symbols may be decoded by subtracting the previous data from the current symbol, for example: 3−1=2, 5−2=3, 7−3=4, . . . .

FIG. 33*c* shows an example of DTC output signals 3312, 3314 and an XOR output signal 3310. The modulation of each DTC may be based on the sum of two data symbols, which may ensure that there is no drift between the 2 DTCs. Further, it may ensure that the DTCs have the same frequency and that each DTC's output is offset to modulate the time interval during the minimum pulse width of the other DTC, as illustrated in FIG. 33*c*. Further, the modulation range may be smaller than the minimum pulse width of each DTC.

More details and aspects of the apparatus 3300 are mentioned in connection with one or more examples described above. The apparatus 3300 may comprise one or more additional optional features corresponding to one or more examples described above or below.

Some examples relate to a transmitter or a transceiver comprising an apparatus for generating an output data signal as described in connection with FIG. 33*a*.

FIG. 33*d* shows a block diagram of an apparatus for generating data signals according to an example. The apparatus 3320 comprises a divider circuit 3322 connected to a first time-to-digital converter circuit 3324 and a second time-to-digital converter circuit 3326. The divider circuit 3322 is configured to generate a first divided data signal based on an input data signal. Further, the divider circuit 3322 is configured to generate a second divided data signal based on the input data signal. The first time-to-digital converter circuit 3324 is configured to generate a first converted data signal based on the first divided data signal. Additionally, the second time-to-digital converter circuit 3326 is configured to generate a second converted data signal based on a second divided data signal.

The divider circuit 3322 may be a divider by two. The divider circuit 3322 may be configured to generate the first divided data signal and the second divided data signal so that an average frequency of the first divided data signal is half of an average frequency of the input data signal and an average frequency of the second divided data signal is half of the average frequency of the input data signal. For example, a minimal pulse width (2m) of the first divided data signal may be equal to two times a minimal pulse width (m) of the input data signal. Further, a minimal pulse width (2m) of the second divided data signal may be equal to two times the minimal pulse width (m) of the input data signal.

The divider circuit 3322 may be configured to generate the first divided data signal and the second divided data signal so that the first divided data signal comprises signal edges for every signal edge of a first type (e.g. falling or rising edge) of the input data signal and the second divided data signal comprises signal edges for every signal edge of a second type of the input data signal. For example, the first divided data signal may comprise edges corresponding to falling edges of the input data signal and the second divided data signal comprises edges corresponding to rising edges of the input data signal or vice versa.

The input data signal, the first divided data signal, the second divided data signal, the first converted data signal and the second converted data signal may be digital signals.

The first divided data signal and the second divided data signal may be pulse width modulated signals. For example, the first divided data signal may comprise a sequence of a first signal edge of a first type, a second signal edge of a second type, and a third signal edge of the first type. The first signal edge and the second signal edge may be separated by a first time period corresponding to a first combined data symbol contained by the first divided data signal, and the second signal edge and the third signal edge may be separated by a second time period corresponding to a second combined data symbol contained by the first divided data signal. Further, the second divided data signal may comprise a sequence of a first signal edge of a first type, a second signal edge of a second type, and a third signal edge of the first type. The first signal edge and the second signal edge may be separated by a first time period corresponding to a first combined data symbol contained by the second divided data signal, and the second signal edge and the third signal edge may be separated by a second time period corresponding to a second combined data symbol contained by the second divided data signal.

The first converted data signal and the second converted data signal may comprise output values corresponding to time lengths between edges of data symbols within the first divided data signal and the second divided data signal.

The apparatus 3320 may comprise a processing circuit configured to determine data of a first output data stream based on the first converted data signal and the second converted data signal. Further, the processing circuit may be configured to determine data of a second output data stream based on the first converted data signal and the second converted data signal.

For example, a first data symbol of the first output data stream may be based on the first combined data symbol of the first divided data signal and the first combined data symbol of the second divided data signal. Further, a first data symbol of the second output data stream may be based on the second combined data symbol of the first divided data signal and the first combined data symbol of the second divided data signal. Additionally, a second data symbol of the first output data stream may be based on the second combined data symbol of the first divided data signal and the second combined data symbol of the second divided data signal. Further, a second data symbol of the second output data stream may be based on a third combined data symbol of the first divided data signal and the second combined symbol of the second divided data signal.

For example, the processing circuit may be configured to determine data of a first output data stream at least by subtracting a previous output value of the first time-to-digital converter circuit 3324 from a current output value of the second time-to-digital converter circuit 3326. Alternatively or additionally, the processing circuit may be configured to determine data of the first output data stream by subtracting a previously determined value of the second output data stream from an output value of the first time-to-digital converter circuit 3324.

For example, the processing circuit may be configured to determine data of a second output data stream at least by subtracting a previous output value of the second time-to-digital converter circuit 3326 from a current output value of the first time-to-digital converter circuit 3324. Alternatively or additionally, the processing circuit may be configured to determine data of the second output data stream by subtracting a previously determined value of the first output data stream from an output value of the second time-to-digital converter circuit 3326.

For the example shown in FIG. 33*b*, the first divided data signal may be equal to the first converted data signal 3312 and the second divided data signal may be equal to the second converted data signal 3314. The first time-to-digital converter circuit 3324 may output values representing a sequence equal to 3, 7, 11, 13, 9, 5 and the second time-to-digital converter circuit 3326 may output values representing a sequence equal to 5, 9, 13, 11, 7.

For example, a value of a first output data stream may be calculated by subtracting a previously determined value of the second output data stream from an output value of the first time-to-digital converter circuit 3324. For example, 3 is an output value of the first time-to-digital converter circuit 3324 and the directly preceding, determined value of the second data stream is 1 so that the value of the first data stream is 3−1=2. The next value of the second data stream may be determined by subtracting the previously determined value of the first data stream from the next output value of the second time-to-digital converter circuit 3324. For example, 5 is the next output value of the second time-to-digital converter circuit 3324 and the directly preceding, determined value of the first data stream was 2 so that the next value of the second data stream is 5−2=3.

More details and aspects of the apparatus 3320 are mentioned in connection with one or more examples described above. The apparatus 3320 may comprise one or more additional optional features corresponding to one or examples described above or below.

Some examples relate to a receiver directly sampling a combined output data signal as provided by an apparatus described in connection with FIG. 33*a*. For example, a receiver may comprise a time-to-digital converter circuit configured to generate a converted data signal based on an input data signal. The input data signal may be transmitted over a transmission line from a transmitter generating the input data signal as described in connection with FIG. 33*a*. The input data signal may comprise edges corresponding to data provided by the two mentioned input data streams used to determine the two DTC input data signals of the two DTCs of the transmitter. The time-to-digital converter circuit of the receiver may output values corresponding to the length of time intervals between edges of the input data signal. For example, the input data signal may comprise a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. The receiver may comprise a demodulation circuit configured to provide output data based on the output values of the time-to-digital converter circuit.

In the example of FIG. 33B, the XOR signal 3310 would be fed to the time-to-digital converter circuit of the receiver and the time-to-digital converter circuit may output a sequence of values corresponding to m+1, m+2, m+3, m+4, m+5, m+6, m+7, m+6, m+5, m+4, m+3, m+2, m+1. Further, the demodulation circuit of the receiver may output the data sequence 1234567654321.

More details and aspects of the receiver are mentioned in connection with one or more examples described above. The receiver may comprise one or more additional optional features corresponding to one or more examples described above or below.

Some examples relate to a receiver or a transceiver comprising an apparatus for generating data signals as described in connection with FIG. 33*d*.

Some examples relate to a device comprising a STEP connection. The STEP connection may comprise an apparatus for generating an output data signal as described in connection with FIG. 33*a* and an apparatus for generating data signals as described in connection with FIG. 33*d*. The apparatus for generating an output data signal may provide the combined output data signal as input data signal to the divider circuit of the apparatus for generating data signals.

FIG. 33*e* shows a STEP connection 3330 using an interleaved data signal according to an example. The output of two DTCs 3302, 3304 are fed to an XOR gate 3306 to create a combined signal so that one DTC 3302 effectively generates the rising edges of the XOR output and the other DTC 3304 effectively generates the XOR falling edges. At the RX side, the signal may be passed through a divide by 2 circuit 3322, which outputs 2 streams of the divided signal, one effectively generated by the rising edges and one by the falling edges. This may restore the original 2 signals generated by means of the separate DTCs on a transmitter side. The two output signals of the divide by 2 circuit 3322 are provided to two TDCs 3324, 3326.

The receiver may implement a divide by 2 circuit 3322 to restore the original two signals. Further, the data streams that are restored (received) may be subtracted to calculate the data that each DTC has originally modulated onto a data signal (e.g. the sum of 2 input data streams to ensure average frequency). The method may allow to maintain the correlation in impairments on each stream by measuring rise2fall and fall2rise of each DTC separately.

Alternatively, a receiver may sample directly rise2fall and fall2rise, which may allow to remove the requirement for subtracting the data streams, while eventually resulting with a slightly lower noise immunity, since each edge originates from a different DTC.

More details and aspects of the STEP connection 3330 are mentioned in connection with one or more examples described above. The STEP connection 3330 may comprise one or more additional optional features corresponding to one or more examples described above or below.

FIG. 33*f* shows a flow chart of a method for generating an output data signal according t an example. The method 3380 comprises generating 3382 a first converted data signal based on a first DTC input data signal by a first digital-to-time converter circuit and generating 3384 a second converted data signal based on a second DTC input data signal by a second digital-to-time converter circuit. Further, the method 3380 comprises generating 3386 a combined output data signal based on the first converted data signal and the second converted data signal by an XOR or XNOR circuit.

More details and aspects of the method 3380 are mentioned in connection with one or more examples described above. The method 3380 may comprise one or more additional optional features corresponding to one or more examples described above or below.

FIG. 33*g* shows a flow chart of a method for generating data signals according to an example. The method 3390 comprises generating 3392 a first divided data signal based on an input data signal and generating 3394 a second divided data signal based on the input data signal. Further, the method 3390 comprises generating 3396 a first converted data signal based on the first divided data signal by a first time-to-digital converter circuit and generating 3398 a second converted data signal based on a second divided data signal by a second time-to-digital converter circuit.

More details and aspects of the method 3390 are mentioned in connection with one or more examples described above. The method 3390 may comprise one or more additional optional features corresponding to one or examples described above or below.

In some STEP systems, there are dedicated lanes for TX and dedicated lanes for RX, for example, as shown for a STEP system 3480 in FIG. 34*g*. A STEP transmitter of a first unit 3482 is connected to a STEP receiver of a second unit 3484 through a first pair of differential transmission lines. Further, a STEP transmitter of the second unit 3484 is connected to a STEP receiver of the first unit 3482 through a second pair of differential transmission lines.

For example, in a high density mobile device, there may be many STEP interfaces connecting the AP (application processor) and the RFEMs (RF front-ends). Similar scenarios may occur when a CPU is connected to memories via multiple STEP interfaces.

However, the number of STEP lanes/data traces (which may be differential) might be limited by, for example, printed circuit board PCB constrains.

Some examples relate to frequency division multiplexing FDD and/or time division multiplexing TDD STEP operation over a single lane. For example, an I/O (input/output) interconnection with bi-directional lanes may be implemented. For example, an I/O interconnection may use FDD, where the main channel is implemented by a STEP system, and/or the I/O interconnection may use TDD. For example, dynamically and very fast TX and RX swopping may allow maximal high speed HS STEP operation in both directions of the lane (e.g. each channel over the lanes can be either RX or TX).

According to an example, the number of lanes may be reduced by half, thus reducing the footprint of the interconnection on the PCB and the number of I/Os per device.

A link of an I/O interconnection might not be symmetrical. For example, fast RX and slow TX may be required or vice versa, but not fast RX and fast TX simultaneously. For example, in a mobile device, when the device is transmitting, the AP may use the STEP TX lanes at HS (high speed) and the STEP RX lanes at very low speed (e.g. mostly for acknowledge ACKs and register settings). In the same mobile device, when the device is in RX mode, the STEP lanes activity may be switched. Even though there are STEP lanes for RX and TX that can operate at HS, there may be no case where this is (simultaneously) required.

According to some examples, the STEP lanes may be changed to bi-directional lanes. Each lane may have the option of supporting HS and low rate data streams. According to some examples, the allocation may be done dynamically according to the system requirements (e.g. in TX or in RX mode).

For example, the following two options for implementing bi-directional STEP lanes may lower the footprint on the PCB by half. FDD (frequency division multiplexing) may be implemented (e.g. as illustrated in FIG. 34*b*) and/or TDD (time division multiplexing) may be implemented (e.g. as shown in FIG. 34*e*).

FIG. 34*a* shows a block diagram of an apparatus for generating data signals according to an example. The apparatus 3400 may comprise a processing circuit 3402 configured to generate a transmit data signal, the transmit data signal comprising a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to a first data symbol contained by the transmit data signal. Further, the second signal edge and the third signal edge are separated by a second time period corresponding to a second data symbol contained by the transmit data signal. Further, the apparatus 3400 comprises an input/output interface 3404 configured to transmit data based on the transmit data signal through a bi-directional lane. Further, the input/output interface 3404 is configured to receive a receive data signal through the bi-directional lane. Additionally, the processing circuit 3402 is configured to generate an output data signal based on the receive data signal.

By implementing a bi-directional communication over a transmission line, the number of necessary transmission lines can be reduced in comparison to the usage of several uni-directional connections.

The processing circuit 3402 may comprise a digital-to-time converter circuit configured to generate the transmit data signal based on an input data signal.

The input/output interface 3404 may comprise a contact interface (e.g. connector or solder pad) for connecting a single ended transmission line or a pair of differential transmission lines to the input/output interface 3404. The input/output interface 3404 may be configured to transmit and receive data signals over the same single ended transmission line or the same pair of differential transmission lines.

The apparatus 3400 may be configured to operate in a transmit mode or in a receive mode. The transmit mode may allow data transmission with high data rates and the receive mode may allow reception of data with high data rates. For example, the processing circuit 3402 may be configured to generate the transmit data signal with a first data rate and receive the receive data signal with a second data rate in the transmit mode of the apparatus 3400. The first data rate may be higher than the second data rate in the transmit mode of the apparatus 3400. For example, the first data rate may be higher than 5 times (or higher than 10 times or higher than 50 times) the second data rate in the transmit mode of the apparatus 3400.

Further, the processing circuit 3402 may be configured to generate the transmit data signal with a third data rate and receive the receive data signal with a fourth data rate in the receive mode of the apparatus 3400. The first data rate may be lower than the second data rate in the receive mode of the apparatus 3400. For example, the first data rate may be lower than 10% (or lower than 5% or lower than 1%) of the second data rate in the receive mode of the apparatus 3400.

The processing circuit 3402 may comprise a time-to-digital converter circuit configured to generate the output data signal based on the receive data signal. For example, a TDC input data signal based on the receive data signal may be provided to the time-to-digital converter circuit for generating the output data signal. The TDC input data signal may comprise a sequence of a first signal edge (n-th signal edge) of a first type, a second signal edge (n-th+1 signal edge) of a second type, and a third signal edge (n-th+2 signal edge) of the first type. The first signal edge and the second signal edge may be separated by a first time period corresponding to a first data symbol contained by the TDC input data signal. Further, the second signal edge and the third signal edge may be separated by a second time period corresponding to a second data symbol contained by the TDC input data signal.

For example, the receive data signal may already be a pulse width modulated baseband signal and may be provided to the time-to-digital converter circuit as TDC input data signal. Alternatively, the receive data signal may be a high frequency signal, which may be down-converted to obtain the TDC input data signal.

For example, the apparatus 3400 may be configured to operate in a time division mode and/or a frequency division mode. Either time division multiplexing or frequency division multiplexing or simultaneously time division multiplexing and frequency division multiplexing may be used for bi-directional communication.

For example, the apparatus 3400 may be configured to transmit data during a transmit time interval and receive the receive data signal during a receive time interval over the bi-directional lane. The transmit time interval and the receive time interval may be non-overlapping so that a time division multiplexing communication may be implemented (e.g. as shown in FIG. 34*e*).

The transmit time interval may be longer than the receive time interval in the transmit mode of the apparatus 3400. Further, the transmit time interval may be shorter than the receive time interval in the receive mode of the apparatus 3400. A difference between a length of the transmit time interval and a length of the receive time interval may be larger than 90% (or more than 95% or more than 99%) of the longer time interval of the transmit time interval and the receive time interval.

For example, the apparatus 3400 may be configured to transmit and receive data simultaneously at different frequencies over the bi-directional line. The apparatus 3400 may transmit the data at the baseband frequency band and may receive the receive data signal at a high frequency band or vice versa. The baseband frequency band and the high frequency band may be non-overlapping frequency bands.

For example, the processing circuit 3402 may comprise an up-conversion circuit configured to generate an up-converted transmit data signal based on a modulation of a carrier signal based on the transmit data signal. Further, the input/output interface 3404 may be configured to transmit the up-converted transmit data signal through the bi-directional lane.

For example, the baseband frequency band may be used for the high speed link (e.g. for transmission in the transmit mode) and the high frequency band may be used for the low speed link (e.g. for reception in the transmit mode). The processing circuit 3402 may be configured to provide the transmit data signal to the input/output interface 3404 for transmission in the transmit mode of the apparatus 3400. The input/output interface 3404 may transmit the transmit data signal over the bi-directional lane in the transmit mode of the apparatus 3400. Further, the processing circuit 3402 may be configured to generate the up-converted transmit data signal and provide the up-converted transmit data signal to the input/output interface 3404 for transmission in the receive mode of the apparatus 3400.

Additionally or alternatively, the processing circuit 3402 may comprise a down-conversion circuit configured to generate a down-converted receive data signal based on the receive data signal and an oscillator signal (e.g. by mixing the signals). The down-converted receive data signal may be provided to a time-to-digital converter circuit of the processing circuit 3402 to generate the output data signal based on the down-converted receive data signal. For example, the processing circuit 3402 may be configured to provide the receive data signal or a filtered version of the receive data signal to the time-to-digital converter circuit as the TDC input data signal in the receive mode of the apparatus 3400. Further, the processing circuit 3402 may be configured to provide the down-converted receive data signal to the time-to-digital converter circuit as the TDC input data signal in the transmit mode of the apparatus 3400.

For example, the input/output interface 3404 may comprise a low-pass filter unit configured to low-pass filter the receive data signal to obtain a low-pass filtered receive data signal in the receive mode of the apparatus. Additionally, or alternatively, the input/output interface 3404 may comprise a high-pass or band-pass filter unit configured to high pass filter the receive data signal to obtain a high-pass or band-pass filtered receive data signal in the transmit mode of the apparatus.

More details and aspects of the apparatus 3400 are mentioned in connection with one or more examples described above. The apparatus 3400 may comprise one or more additional optional features corresponding to one or more examples described above or below.

Some examples relate to a transceiver comprising an apparatus as mentioned in connection with FIG. 34*a*. The transceiver may be a STEP transceiver for bi-directional communication with another STEP transceiver.

FIG. 34*b* shows a block diagram of a STEP system using FDD according to an example. The STEP system 3410 comprises a first STEP transceiver 3420 connected to a second STEP transceiver 3430 through a pair of differential transmission lines 3412. The pair of differential transmission lines 3412 connect a duplexer 3426 of the first STEP transceiver 3420 to a duplexer 3436 of the second STEP transceiver 3430. The first STEP transceiver 3420 comprises a STEP transmitter 3422 and a STEP receiver 3424 connected to the duplexer 3426 of the first STEP transceiver 3420. The second STEP transceiver 3430 comprises a STEP transmitter 3432 and a STEP receiver 3434 connected to the duplexer 3436 of the second STEP transceiver 3430. The STEP transmitter and the STEP receiver may be part of a processing circuit and the duplexer may be part of an input/output interface of an apparatus for generating data signals as described in connection with FIG. 34*a*.

FIG. 34*b* may be an example for a FDD bi-directional I/O interconnection. The majority of the data may be passed as a BB signal using a STEP system. This BB signal can be TX or RX according to the MAC requirements. A relatively small portion of the data may be passed over the second channel which is at a different frequency. This second channel may be designed to be simple and low power (very low rate). The data modulation of this channel may be generated by a STEP system or, alternatively, by other kinds of modulation (e.g. quadrature amplitude modulation QAM or quadrature phase shift keying QPSK).

More details and aspects of the STEP system 3410 are mentioned in connection with one or more examples described above. The STEP system 3410 may comprise one or more additional optional features corresponding to one or more examples described above or below.

FIG. 34*c* shows a block diagram of a STEP system using FDD according to an example. The STEP system 3440 is implemented similar to the STEP system shown in FIG. 34*b*. However, the first STEP transceiver 3420 comprises a STEP bi-directional circuit 3423 configured to transmit and receive baseband frequency pulse width modulated signals. Further, the first STEP transceiver 3420 comprises a high frequency bi-directional circuit 3425 configured to transmit and receive high frequency signals. The duplexer of the first STEP transceiver 3420 comprises a low pass filter 3442 to provide baseband signals received over the pair of differential transmission lines 3412 to the STEP bi-directional circuit 3423. Further, the duplexer of the first STEP transceiver 3420 comprises a high pass filter 3444 to provide high frequency signals received over the pair of differential transmission lines 3412 to the high frequency bi-directional circuit 3425.

Similar, the second STEP transceiver 3430 comprises a STEP bi-directional circuit 3433 configured to transmit and receive baseband frequency pulse width modulated signals. Further, the second STEP transceiver 3430 comprises a high frequency bi-directional circuit 3435 configured to transmit and receive high frequency signals. The duplexer of the second STEP transceiver 3430 comprises a low pass filter 3446 to provide baseband signals received over the pair of differential transmission lines 3412 to the STEP bi-directional circuit 3433. Further, the duplexer of the second STEP transceiver 3430 comprises a high pass filter 3448 to provide high frequency signals received over the pair of differential transmission lines 3412 to the high frequency bi-directional circuit 3435.

The STEP transceivers 3420, 3430 of the STEP system 3440 may be able to send and receive data at the baseband frequency band and at a high frequency band respectively. Depending on the desired highspeed direction, the baseband may be used for a transmission from the first STEP transceiver 3420 to the second STEP transceiver 3430 or vice versa.

More details and aspects of the STEP system 3440 are mentioned in connection with one or more examples described above. The STEP system 3440 may comprise one or more additional optional features corresponding to one or more examples described above or below.

FIG. 34*d* shows a block diagram of a STEP system using FDD according to an example. The STEP system 3450 may be implemented similar to the STEP system shown in FIG. 34*c*.

The STEP bi-directional circuit of the first STEP transceiver 3420 comprises a STEP transmitter 3452 and a STEP receiver 3453 connected to the duplexer through a first switch 3451. The first switch 3451 may connect the STEP transmitter 3452 to the duplexer in a transmit mode of the first STEP transceiver 3420 and may connect the STEP receiver 3453 to the duplexer in a receive mode of the first STEP transceiver 3420. Further, the high frequency bi-directional circuit of the first STEP transceiver 3420 comprises a high frequency transmitter 3455 and a high frequency receiver 3456 connected to the duplexer through a second switch 3454. The second switch 3454 may connect the high frequency transmitter 3455 to the duplexer in the receive mode of the first STEP transceiver 3420 and may connect the high frequency receiver 3456 to the duplexer in the transmit mode of the first STEP transceiver 3420.

The STEP bi-directional circuit of the second STEP transceiver 3430 comprises a STEP transmitter 3462 and a STEP receiver 3463 connected to the duplexer through a first switch 3461. The first switch 3461 may connect the STEP transmitter 3462 to the duplexer in a transmit mode of the second STEP transceiver 3430 and may connect the STEP receiver 3463 to the duplexer in a receive mode of the second STEP transceiver 3430. Further, the high frequency bi-directional circuit of the second STEP transceiver 3430 comprises a high frequency transmitter 3465 and a high frequency receiver 3466 connected to the duplexer through a second switch 3464. The second switch 3464 may connect the high frequency transmitter 3465 to the duplexer in the receive mode of the second STEP transceiver 3430 and may connect the high frequency receiver 3466 to the duplexer in the transmit mode of the second STEP transceiver 3430.

More details and aspects of the STEP system 3450 are mentioned in connection with one or more examples described above. The STEP system 3450 may comprise one or more additional optional features corresponding to one or more examples described above or below.

FIG. 34*e* shows a block diagram of a STEP system using TDD according to an example. The STEP system 3470 comprises a first STEP transceiver 3471 connected to a second STEP transceiver 3474 through a pair of differential transmission lines 3412. The first STEP transceiver 3471 comprises a STEP transmitter 3472 and a STEP receiver 3473 connected to the pair of differential transmission lines 3412. The second STEP transceiver 3474 comprises a STEP transmitter 3475 and a STEP receiver 3476 connected to the pair of differential transmission lines 3412. The STEP transmitter and the STEP receiver may be part of a processing circuit and the connection to the pair of differential transmission lines 3412 may be implemented through an input/output interface of an apparatus for generating data signals as described in connection with FIG. 34*a*.

For example, a long time slot representing a first channel may be used for a transmission of data from the first STEP transceiver 3471 to the second STEP transceiver 3474 and a short time slot representing a second channel may be used for a transmission of data from the second STEP transceiver 3474 to the first STEP transceiver 3471 or vice versa.

FIG. 34*e* may be an example for a TDD implementation of a bi-directional I/O interconnection. In this case, two channels may be generated which are active at different time slots. The majority of the data may be passed over channel #1 (can be RX or TX as set by the MAC) and a small portion of the data can be passed over channel #2. Since the rate of channel #2 is reduced, the BAUD of channel #1 can be kept very high.

More details and aspects of the STEP system 3470 are mentioned in connection with one or more examples described above. The STEP system 3470 may comprise one or more additional optional features corresponding to one or more examples described above or below.

FIG. 34*f* shows a flow chart of a method for generating output data according to an example. The method 3490 comprises generating a transmit data signal, the transmit data signal comprising a sequence of a first signal edge of a first type, a second signal edge of a second type, and a third signal edge of the first type, the first signal edge and the second signal edge being separated by a first time period corresponding to a first data symbol contained by the transmit data signal, and the second signal edge and the third signal edge being separated by a second time period corresponding to a second data symbol contained by the transmit data signal. Further, the method 3490 comprises transmitting 3492 data based on the transmit data signal through a bi-directional lane and receiving 3494 a receive data signal through the bi-directional lane. Additionally, the method comprises generating 3496 an output data signal based on the receive data signal.

More details and aspects of the method 3490 are mentioned in connection with one or more examples described above. The method 3490 may comprise one or more additional optional features corresponding to one or more examples described above or below.

Some examples relate to an orthogonal STEP modulation with spectral reuse. For example, the I/O interconnect BAUD may be increased without increasing the number of lanes between the devices communicating via a STEP interface. For example, it may be used by the I/O connections between a CPU and peripheral devices, like memories, where the BAUD may be in the order of Terabits per second. In this kind of systems, the I/O interconnection may be limited by the number and power of the I/O lanes. Examples described below may double the rate (or even more than double) without increasing the number of lanes.

According to some examples, passing multiple data streams over a single lane using STEP systems as a data generation (DTC) and data reception (TDC) becomes feasible. The independent data streams may be transmitted and received simultaneously as a baseband BB signal (around DC) and one or more orthogonal carrier frequencies utilizing the same frequency bands.

The examples differ from other I/Q transmitter and receiver systems, which handle a bandpass signal. In those systems, the I and Q data streams may be generated from a complex baseband signal. Also, the I/Q signal may be generated using a DAC and received using an ADC.

Band pass signals S(t) may be characterized by:

$$S(t)=A(t)\cdot\cos(\omega_c\cdot t+\theta(t))=I(t)\cdot\cos(\omega_c\cdot t)-Q(t)\cdot\sin(\omega_c\cdot t)$$

envelope:

$$A(t)=\sqrt{I(t)^2+Q(t)^2}$$

phase:

$$\theta(t)=\tan^{-1}\left(\frac{Q(t)}{I(t)}\right)$$

I(t) may be the in-phase amplitude, Q(t) may be the quadrature-amplitude, t may be the time and $\omega_c$ may be equal to $2\pi f_c$ with $f_c$ being the frequency of the carrier signal.

For example, in high quality lanes, like a short interconnection between CPU and memory/graphics, a single lane may carry multiple STEP data streams utilizing the same frequency bands.

FIG. 35*a* shows a block diagram of an apparatus for generating a data signal according to an example. The apparatus 3500 comprises a digital-to-time converter circuit 3502 configured to generate a (first) DTC data signal based on an (first) input data signal. The DTC data signal comprises a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to a first data symbol contained by the input data signal. Further, the second signal edge and the third signal edge are separated by a second time period corresponding to a second data symbol contained by the input data signal. Additionally, the apparatus 3500 comprises an up-conversion circuit 3504 configured to generate an (first) up-converted data signal by an up-conversion of the DTC data signal using a carrier signal.

By up-converting the pulse width modulated data signal, a frequency band different to the baseband can be used for the transmission of data. In this way, the data rate may be significantly increased, if the baseband and one or more other frequency bands are used for data transmission.

The DTC data signal and the input data signal may be digital signals. The up-converted data signal may be an analog signal.

The input data signal may contain a sequence of digital values (e.g. data symbols) and the digital-to-time converter circuit 3502 may generate the DTC data signal with signal edges at times corresponding to the digital values of the input data signal.

The apparatus 3500 may comprise a carrier signal generator configured to generate the carrier signal. The carrier signal generator may comprise a phase locked loop PLL, a digital phase locked loop DPLL and/or a crystal oscillator for generating the carrier signal. The carrier signal may have a frequency larger than 10 GHz (or larger than 15 GHz or larger than 20 GHz). Consequently, the up-converted data signal may be a high frequency signal using a high frequency band determined by the frequency of the carrier signal. The carrier signal may be a periodical signal (e.g. sine or cosine signal).

The up-conversion circuit 3504 may comprise a mixer configured to generate the up-converted data signal by mixing the DTC data signal with the carrier signal. Alternatively, the up-conversion circuit 3504 may comprise a radio frequency digital to analog converter configured to generate the up-converted data signal based on the DTC data signal and the carrier signal.

The apparatus 3500 may comprise an output interface configured to be connected to at least one transmission line. The transmission line may be a single ended transmission line or may be a transmission line of a pair of differential transmission lines.

The apparatus 3500 may comprise a second digital-to-time converter circuit configured to generate a second DTC data signal based on a second input data signal. The second DTC data signal may comprise a sequence of a first signal edge (m-th signal edge) of a first type, a second signal edge (m-th+1 signal edge) of a second type, and a third signal edge (m-th+2 signal edge) of the first type. The first signal edge and the second signal edge may be separated by a first time period corresponding to a first data symbol contained by the second input data signal. Further, the second signal edge and the third signal edge may be separated by a second time period corresponding to a second data symbol contained by the second input data signal.

The apparatus 3500 and/or the output interface of the apparatus 3500 may be configured to generate an output data signal based on a combination of the up-converted data signal and the second DTC data signal. The output data signal may comprise signal components in the baseband and in a high frequency band. The output data signal may be provided to the transmission line for transmission to a receiver. Consequently, the apparatus 3500 may be configured to transmit data contained by the input data signal and data contained by the second input data signal over the same lane (e.g. single ended line or line of a pair of differential lines).

The second DTC data signal may use the baseband frequency range, which may extend from 0 Hz up to 30 GHz (or up to 20 GHz or up to 10 GHz). A maximal frequency of the second DTC data signal may be lower than 30 GHz (or lower than 20 GHz or lower than 10 GHz). A frequency range used by the up-converted data signal may be located at higher frequencies than a frequency range used by the second DTC data signal.

Additionally, the apparatus 3500 may use the frequency range of the (first) up-converted data signal twice by generating another high frequency data signal with an orthogonal carrier. For example, the apparatus 3500 may further comprise a further (e.g. third) digital-to-time converter circuit configured to generate a further (e.g. third) DTC data signal based on a further (e.g. third) input data signal. The further DTC data signal may comprise a sequence of a first signal edge of a first type, a second signal edge of a second type, and a third signal edge of the first type. The first signal edge and the second signal edge may be separated by a first time period corresponding to a first data symbol contained by the further input data signal. Further, the second signal edge and the third signal edge may be separated by a second time period corresponding to a second data symbol contained by the further input data signal. Additionally, the apparatus may contain a further (e.g. second) up-conversion circuit configured to generate a further (e.g. second) up-converted data signal based on a modulation of a further (e.g. second) carrier signal based on the further DTC data signal. The (first) carrier signal and the further (second) carrier signal may be orthogonal carrier signals.

For example, the first carrier signal and the second carrier signal may comprise the same frequency, but a phase shift of 180° (e.g. sin signal and cos signal). Consequently, at least a part of a frequency range used by the (first) up-converted data signal may be located at same frequencies as at least a part of a frequency range used by the further (second) up-converted data signal.

The apparatus 3500 and/or the output interface of the apparatus 3500 may be configured to generate an output data signal based on a combination of the (first) up-converted data signal and the further (second) up-converted data signal. The output data signal may be provided to the transmission line for transmission to a receiver. In other words, the apparatus 3500 may be configured to transmit data contained by the input data signal and data contained by the further (e.g. third) input data signal over the same lane (e.g. single ended line or line of a pair of differential lines).

FIG. 35*b* shows an example of a schematic band diagram of three STEP streams over a single lane, at baseband BB and around carrier frequency $f_C$ (e.g. more streams may be passed over additional carrier frequencies).

More details and aspects of the apparatus 3500 are mentioned in connection with one or more examples described above. The apparatus 3500 may comprise one or more additional optional features corresponding to one or examples described above or below.

Some examples relate to a transmitter or a transceiver comprising an apparatus as mentioned in connection with FIG. 35*a*. The transmitter or transceiver may be a STEP transmitter or STEP transceiver for transmitting data to a STEP receiver.

FIG. 35*c* shows a block diagram of an apparatus for generating data signals according to an example. The apparatus 3510 comprises a down-conversion circuit 3512 configured to generate a (first) down-converted data signal based on an input data signal and an (first) oscillator signal. Further, the apparatus 3510 comprises a time-to-digital converter circuit 3514 configured to generate a TDC data signal based on the down-converted data signal. The down-converted data signal comprises a sequence of a first signal edge (n-th signal edge) of a first type, a second signal edge (n-th+1 signal edge) of a second type, and a third signal edge (n-th+2 signal edge) of the first type. The first signal edge and the second signal edge are separated by a first time period corresponding to a first data symbol contained by the down-converted data signal. Further, the second signal edge and the third signal edge are separated by a second time period corresponding to a second data symbol contained by the down-converted data signal.

The apparatus 3500 may comprise an input interface connected to or configured to be connected to at least one transmission line. The transmission line may be a single ended transmission line or may be a transmission line of a pair of differential transmission lines. The input data signal may be received through the transmission line.

The input data signal may comprise signal portions (data signals) in one or more frequency bands. The apparatus 3500 and/or the input interface may comprise one or more filter to separate one or more data signals from noise or other data signals.

For example, the apparatus 3500 and/or the input interface may comprise a high-pass or band-pass filter configured to filter the input data signal to obtain a (high-pass or band-pass) filtered input data signal. The down-conversion circuit 3512 may be configured to generate the down-converted data signal based on the filtered input data signal and the oscillator signal. A lower cut-off frequency of the high-pass or band-pass filter may be higher than 10 GHz (or higher than 20 GHz or higher than 30 GHz).

For example, the down-conversion circuit 3512 may comprise a mixer circuit configured to mix the oscillator signal and the input data signal or the filtered input data signal to obtain the down-converted data signal.

The apparatus 3500 may comprise an oscillator signal generator configured to generate the oscillator signal (e.g. local oscillator signal). The oscillator signal generator may comprise a clock recovery circuit, a phase locked loop PLL, a digital phase locked loop DPLL and/or a crystal oscillator for generating the carrier signal. The oscillator signal may have a frequency larger than 10 GHz (or larger than 15 GHz or larger than 20 GHz). Consequently, the input data signal may comprise at least a high frequency signal portion in a high frequency band corresponding to the frequency of the oscillator signal.

In addition to the high frequency portion, the input data signal may comprise another data signal portion in the baseband frequency band. For example, the apparatus 3510 may comprise a second time-to-digital converter circuit configured to generate a second TDC data signal based on the input data signal. Further, the apparatus 3500 and/or the input interface may comprise a low-pass filter configured to filter the input data signal to obtain a low-pass filtered input data signal. The second time-to-digital converter circuit may be configured to generate the second TDC data signal based on a time-to-digital conversion of the low-pass filtered input data signal. The low-pass filtered input data signal may comprise a sequence of a first signal edge (m-th signal edge) of a first type, a second signal edge (m-th+1 signal edge) of a second type, and a third signal edge (m-th+2 signal edge) of the first type. The first signal edge and the second signal edge may be separated by a first time period corresponding to a first data symbol contained by the low-pass filtered input data signal. Further, the second signal edge and the third signal edge may be separated by a second time period corresponding to a second data symbol contained by the low-pass filtered input data signal.

The low-pass filtered input data signal may comprise signal portions in the baseband frequency range, which may extend from 0 Hz up to 30 GHz (or up to 20 GHz or up to 10 GHz). A maximal frequency of the low-pass filtered input data signal may be lower than 30 GHz (or lower than 20 GHz or lower than 10 GHz). A frequency range used by the high-pass or band-pass filtered input data signal may be located at higher frequencies than a frequency range used by the low-pass filtered input data signal. For example, an upper cut-off frequency of the low-pass filter may be lower than 30 GHz (or lower than 20 GHz or lower than 10 GHz).

Additionally, the apparatus 3510 may use the frequency range of the high-pass or band-pass filtered input data signal twice by generating another down-converted data signal with an orthogonal oscillator signal. For example, the apparatus 3510 may further comprise a further (second) down-conversion circuit configured to generate a further (second) down-converted data signal based on the input data signal and a further (second) oscillator signal. For example, the high-pass or band-pass filtered input data signal may be mixed with the further oscillator signal to obtain the further (second) down-converted data signal. Additionally, the apparatus 3510 may comprise a further (e.g. third) time-to-digital converter circuit configured to generate a further (e.g. third) TDC data signal based on the further down-converted data signal. The further down-converted data signal may comprise a sequence of a first signal edge of a first type, a second signal edge of a second type, and a third signal edge of the first type. The first signal edge and the second signal edge may be separated by a first time period corresponding to a first data symbol contained by the further down-converted data signal. Further, the second signal edge and the third signal edge may be separated by a second time period corresponding to a second data symbol contained by the further down-converted data signal. Additionally, the (first) oscillator signal and the further (second) oscillator signal may be orthogonal oscillator signals.

For example, the first oscillator signal and the second oscillator signal may comprise the same frequency, but a phase shift of 180° (e.g. sin signal and cos signal). Consequently, at least a part of a frequency range used for the transmission of data contained by the (first) TDC data signal may be located at same frequencies as at least a part of a frequency range used for the transmission of data contained by the further (e.g. third) TDC data signal.

More details and aspects of the apparatus 3510 are mentioned in connection with one or more examples described above. The apparatus 3510 may comprise one or more additional optional features corresponding to one or examples described above or below.

Some examples relate to a receiver or a transceiver comprising an apparatus as mentioned in connection with FIG. 35*c*. The receiver or transceiver may be a STEP receiver or STEP transceiver for receiving data from a STEP transmitter.

FIG. 35*d* shows a block diagram of a STEP system using orthogonal STEP streams over a single lane and a single carrier according to an example. The STEP system 3530 comprises a STEP transmitter 3531 connected to a STEP receiver 3541 over a transmission line 3540 (e.g. single ended transmission line or transmission line of a pair of differential transmission lines). The STEP transmitter 3531 comprises a first DTC 3532 configured to provide a first DTC data signal D[n] to a first mixer 3533. Further, the STEP transmitter 3531 comprises a second DTC 3534 configured to provide a second DTC data signal P[n] to a second mixer 3535. Additionally, the STEP transmitter 3531 comprises a transmitter oscillator 3536 (e.g. PLL) configured to provide a first oscillator signal (e.g. cos(2*pi*fc*t)) to the first mixer 3533 and a second oscillator signal (e.g. sin(2*pi*fc*t)) to the second mixer 3535. The first mixer 3533 may be configured to mix the first DTC data signal with the first oscillator signal to obtain a first up-converted data signal. The second mixer 3535 may be configured to mix the second DTC data signal with the second oscillator signal to obtain a second up-converted data signal. Further, the STEP transmitter 3531 comprises a combiner 3537 configured to combine (e.g. add or sum) the first up-converted data signal and the second up-converted data signal to obtain an output data signal. The output data signal is provided to the transmission line 3540 for transmission to the STEP receiver 3541.

The STEP receiver 3541 comprises a signal provider 3547 (e.g. node with simple line splitting or more complex circuitry) configured to provide a first input data signal to a first mixer 3543 of the STEP receiver 3541 and a second input data signal to a second mixer 3545 of the STEP receiver 3541. Further, the STEP receiver 3541 comprises a receiver oscillator 3546 (e.g. PLL) configured to provide a first oscillator signal (e.g. cos(2*pi*fc*t+teta3)) to the first mixer 3543 and a second, orthogonal oscillator signal (e.g. sin(2*pi*fc*t+teta4)) to the second mixer 3545 through a phase calibration unit 3539 of the STEP receiver 3541. The phase calibration unit 3539 may be configured to adjust a phase of the first oscillator signal and the second oscillator signal. The first mixer 3543 is configured to mix the first input data signal and the first oscillator signal to obtain a first down-converted data signal D'[n]. The second mixer 3545 is configured to mix the second input data signal and the second oscillator signal to obtain a second down-converted data signal P'[n].

The first mixer 3543 provides the first down-converted data signal D'[n] to a first low pass filter 3548. The first low pass filter 3548 filters the first down-converted data signal D'[n] and provides a first low-pass filtered down-converted data signal to a first TDC 3542 of the STEP receiver 3541. The first TDC 3542 generates a first TDC data signal based on the first low-pass filtered down-converted data signal. The second mixer 3545 provides the second down-converted data signal P'[n] to a second low pass filter 3549. The second low pass filter 3549 filters the second down-converted data signal P'[n] and provides a second low-pass filtered down-converted data signal to a second TDC 3544 of the STEP receiver 3541. The second TDC 3544 generates a second TDC data signal based on the second low-pass filtered down-converted data signal.

The example shown in FIG. 35*d* uses orthogonal signals to pass multi-streams over the same frequency and separate them in the receiver. The proposed orthogonal functions are, for example, sine and cosine functions. For example, in order to keep these functions orthogonal, an analog correction may be done ensuring phase matching between the TX up-conversion and the RX down-conversion.

The phase calibration in the RX may be done in the analog domain, since the STEP RX is performing decision on each data stream using a TDC. This may be different from other I/Q modulations, where the I/Q data is sampled by two ADCs and the decision is done on the complex I/Q data in the digital domain (e.g. allowing I/Q mismatch error correction).

FIG. 35*d* may show two orthogonal STEP streams over a single lane and a single carrier as follows:

$$S_{TX}=D[n]\cdot\cos(2\cdot\pi\cdot f_C\cdot t+\varphi_1)+P[n]\cdot\sin(2\cdot\pi f_C\cdot t+\varphi_2)$$

$$S_{RX\_D}=(D[n]\cdot\cos(2\cdot\pi\cdot f_C\cdot t+\varphi_1)+P[n]\cdot\sin(2\cdot\pi\cdot f_C\cdot t+\varphi_2))\cdot\cos(2\cdot\pi\cdot f_C\cdot t+\varphi_3)$$

After calibration and filtering the high frequencies (e.g. the doubled frequencies are at very high values):

$$\varphi_1=\varphi_3$$

$$S_{RX\_D}=D[n]+P[n]\cdot 0=D[n]$$

Same may be done on the second branch:

$$\varphi_2=\varphi_4$$

$$S_{RX\_P}=P[n]+D[n]\cdot 0=P[n]$$

$S_{TX}$ may be the output data signal of the STEP transmitter 3531, $S_{RX\_D}$ may be the first down-converted data signal, $S_{RX\_P}$ may be the second down-converted data signal, D[n] may be the first DTC data signal, P[n] may be the second DTC data signal, t may be the time, $f_c$ may be the frequency of the first oscillator signal and the second oscillator signal of the STEP transmitter 3531 and the STEP receiver 3541, $\varphi_1$ may be the phase of the first oscillator signal, $\varphi_2$ may be the phase of the second oscillator signal and $\varphi_3$ may be the phase of the first oscillator signal of the STEP receiver 3541.

Unlike in other I/Q transceivers, which may require low I/Q mismatch between the received I and Q branches, some examples may require matching between the transmitted and received frequencies and phases (e.g. a coherent STEP system).

More details and aspects of the STEP system 3530 are mentioned in connection with one or more examples described above. The STEP system 3530 may comprise one or more additional optional features corresponding to one or more examples described above or below.

FIG. 35*e* shows a block diagram of a STEP system using a baseband STEP stream and a high frequency STEP stream for transmission over a single transmission line according to an example. The STEP system 3550 may be implemented similar to the STEP system described in connection with FIG. 35*d*. However, the STEP system 3550 may provide a baseband data signal instead of the second, orthogonal high frequency data signal.

The STEP transmitter 3531 comprises a second DTC 3552 configured to generate a baseband DTC data signal based on a second input data signal. Further, the STEP transmitter 3531 comprises a combiner 3554 configured to combine (e.g. add or sum) the first up-converted data signal and the baseband DTC data signal to obtain an output data signal. The output data signal is provided to the transmission line 3540 for transmission to the STEP receiver 3541.

Further, the STEP receiver 3541 comprises an input interface 3558 configured to provide the first input data signal to the first mixer 3543 of the STEP receiver 3541 and a second input data signal to a second low-pass filter 3557 of the STEP receiver 3541. The second low-pass filter may filter the second input data signal to obtain a baseband input data signal. Further, the STEP receiver 3541 comprises a second TDC 3556 configured to generate a second TDC data signal based on the baseband input data signal.

More details and aspects of the STEP system 3550 are mentioned in connection with one or more examples described above. The STEP system 3550 may comprise one or more additional optional features corresponding to one or more examples described above or below.

FIG. 35*f* shows a block diagram of a STEP system using a baseband STEP stream and orthogonal high frequency STEP streams for transmission over a single transmission line according to an example. The STEP system 3560 may be implemented based on a combination of the STEP system described in connection with FIG. 35*d* and the STEP system described in connection with FIG. 35*e*.

The STEP transmitter 3531 comprises a first signal path with a first DTC 3532 and a second signal path with a second DTC 3534 as described in connection with FIG. 35*d*. Further, the STEP transmitter 3531 comprises a third signal path with a third DTC 3552 as described in connection with FIG. 35*e* for the second DTC. Further, the STEP transmitter 3531 comprises a first combiner 3537 as described in connection with FIG. 35*d* for the combiner of the STEP transmitter 3531. Additionally, the STEP transmitter 3531 comprises a second combiner 3554 configured to combine (e.g. add or sum) the output signal of the first combiner 3537 and the baseband DTC data signal provided by the third DTC 3552 to obtain an output data signal. The output data signal is provided to the transmission line 3540 for transmission to the STEP receiver 3541.

The STEP receiver 3541 comprises a first signal path with a first TDC 3542 and a second signal path with a second TDC 3544 as described in connection with FIG. 35*d*. Further, the STEP receiver 3541 comprises a third signal path with a third TDC 3556 as described in connection with FIG. 35*e* for the second TDC. Further, the STEP receiver 3541 comprises a duplexer 3562 configured to provide a high frequency input data signal to the signal provider 3547 and to provide a baseband input data signal to the third TDC 3556.

The three signal paths of the STEP transmitter 3531 and the STEP receiver 3541 may be able to handle three STEP data streams (e.g. each with BAUD of 24 Gbps).

More details and aspects of the STEP system 3560 are mentioned in connection with one or more examples described above. The STEP system 3560 may comprise one or more additional optional features corresponding to one or more examples described above or below.

Some examples may relate to a multi-lane interconnection system using multiple steams on each lane. An orthogonal up-conversion and down-conversion using a DTC for TX data generation and a TDC for RX data reception may be implemented. TX and RX frequency and phase matching for orthogonal data stream separation may be implemented using a STEP system. TX and RX frequency and phase matching for orthogonal data stream separation may be implemented using a bit error rate BER measurement as a cost function. A multi stream STEP system may use a BB signal and orthogonal carriers. Carrier generation on the RX side, passing the carrier from the TX to the RX, or passing a reference signal from the TX to the RX may be implemented. An orthogonal transceiver without ADC or DAC for data generation or reception may be enabled.

FIG. 35*g* shows a flow chart of a method for generating output data according to an example. The method 3580 may comprise generating 3582 a DTC data signal based on an input data signal by a digital-to-time converter circuit. The DTC data signal comprises a sequence of a first signal edge of a first type, a second signal edge of a second type, and a third signal edge of the first type, wherein the first signal edge and the second signal edge are separated by a first time period corresponding to a first data symbol contained by the input data signal. The second signal edge and the third signal edge are separated by a second time period corresponding to a second data symbol contained by the input data signal. Further, the method 3580 comprises generating 3584 an up-converted data signal based on a modulation of a carrier signal based on the DTC data signal.

More details and aspects of the method 3580 are mentioned in connection with one or more examples described above. The method 3580 may comprise one or more additional optional features corresponding to one or more examples described above or below.

FIG. 35*h* shows a flow chart of a method for generating output data according to an example. The method 3590 comprises generating 3892 a down-converted data signal based on an input data signal and an oscillator signal. Further, the method 3590 comprises generating 3594 a TDC data signal based on the down-converted data signal by a time-to-digital converter circuit. The down-converted data signal comprises a sequence of a first signal edge of a first type, a second signal edge of a second type, and a third signal edge of the first type, wherein the first signal edge and the second signal edge are separated by a first time period corresponding to a first data symbol contained by the down-converted data signal. The second signal edge and the third signal edge are separated by a second time period corresponding to a second data symbol contained by the down-converted data signal.

More details and aspects of the method 3590 are mentioned in connection with one or more examples described above. The method 3590 may comprise one or more additional optional features corresponding to one or more examples described above or below.

While the previous paragraphs relate to examples for implementing a high-speed interconnect, FIGS. 36 to 40 will subsequently describe examples allowing to increase the performance of the interconnect by calibrating some of its components or parameters.

A STEP interconnect, for example, is based on transmitting and receiving the accurate length of the time periods associated to data symbols. The previously described examples illustrate how one may accurately measure the length of each received symbol. Jitter, however, corrupts the quality of the measurements of the time periods and so the determination of the symbols and might cause data errors. There may be a desire to decrease the impact of Jitter.

FIG. 36*a* illustrates an example of adaption circuitry for data signals differentially received via two transmission lines of a transmission link 3602. The adaption circuitry 3600 comprises an input 3604*a* for the first transmission line 3602*a* and an input 3604*b* for a second transmission line 3602*b* as well as an output 3606*a* for the first transmission line 3602*a* and an output 3606*b* for the second transmission line 3602*b*. A first resistive element 3608*a* is coupled between the input 3604*a* for the first transmission line 3602*a* and the output 3606*a* for the first transmission line. A second resistive element 3608*b* is coupled between the input 3604*b* for the second transmission line and the output 3606*b* for the second transmission line.

Within the adaption circuitry 3600, the first resistive element 3608*a* and the second resistive element 3608*b* add attenuation to the transmission lines.

The example of FIG. 36*a* further discloses an optional third resistive element 3610 coupled between the first transmission line and the second transmission line between the input and the first and second resistive elements, respectively. An optional fourth resistive element 3612 is coupled between the first transmission line and the second transmission line between the output and the first and second resistive elements, respectively.

Using adaption circuitry 3600 within a transmission link of a STEP interconnect, e.g. in front of an input of a STEP receiver or as a first signal processing stage of o STEP receiver, may allow to select the first resistive element 3608*a* and the second resistive element 3608*b* such that Jitter of the signal edges within the data signal is reduced while introducing additional attenuation of the signal. For example, reflections on an input to a receiver may be one of the major contributors to Jitter, resulting in a reflected signal with reduced amplitude on the transmission lines, which translates into Jitter by adding to the data signal on the transmission lines (also referred to as AM to PM).

The reduction of Jitter may be achieved at low cost without having to guarantee that the amplitude of a data signal on the transmission lines is maintained, which is often required in approaches tailored to conventional high-speed interfaces. By introducing an appropriate amount of attenuation by means of an example of adaption circuitry, one may minimize Jitter using an un-expected tradeoff between line matching and suppression of additive noises. In other words, even if a Signal to Noise ratio of the data signal at an input pf a receiver may be degraded by the introduction of attenuation, reflections may simultaneously be attenuated to an extent that results in an increase of the overall bit error rate of the interlink.

A STEP interlink is sensitive, like other high-speed interconnects, to reflections (even S11=−20 dB might still result in some degradation). FIGS. 36*a* to 36*f* illustrate a method of Jitter minimization using an adaptive and lossy matching network (which introduces attenuation of the data signal). In one example, adaption circuitry may essentially be constituted by an adaptive attenuator that minimizes the reflection levels until other Jitter contributors, like e.g. thermal noise and 1/f noises become dominant, which is illustrated in FIG. 36*d*. Other sources of Jitter to be considered, eventually by other means, may be PLL phase noise within a transmitter and Inter Symbol Interference (ISI).

As compared to conventional approaches trying to minimize reflections by constant, non-adaptive and not lossy matching networks, examples of adaption circuitry may increase the quality of the interlink with low effort and without significant additional circuitry and/or power consumption. For example, in common fast digital amplitude modulation links, reflections are often mitigated by power hungry Decision Feedback Equalizers (DFE) since the spectral content is high so that lossy matching networks would degrade the link quality.

In some examples of adaption circuitry, the resistivity of the first resistive element and the second resistive element is adjustable to allow for a calibration of the quality of the interlink. An example for a method to determine appropriate attenuation levels by calibration is subsequently illustrated in FIG. 36*c*.

In one example, a resistivity (resulting in an attenuation) of the first resistive element and the second resistive element are adjusted to identical values. Further examples may also adjust the resistivities independently to, for example, account for imbalances on the transmission lines.

In further examples, also the resistivity of the third resistive element and the fourth resistive element may be adjustable which may allow to maintain an impedance of the transmission link 3602 while increasing the attenuation. According to some examples, the resistivity of the third resistive element and the fourth resistive element are adjusted to an identical value.

In summary, the adaption circuitry of FIG. 36*a* constitutes a matching network which is based on resistors that are configured as attenuators absorbing energy and reducing the returned energy from the RX to the TX. That is, additional attenuation is deliberately accepted within the signal path, as illustrated in FIG. 36*d*. This may be acceptable since STEP is predominantly sensitive to timing errors.

While FIG. 36*a* illustrates resistors as an example for resistive elements, further examples may use other components within adaption circuitry that cause attenuation of a data signal on the transmission lines 3602*a* and 3602*b*. Further components used within other examples of adaption circuitry may also exhibit varying or constant capacitances or inductances, for example.

FIG. 36*b* illustrates the application of the adaption circuitry 3600 within a receiver 3620 for data signals that are differentially transmitted via two transmission lines. The receiver 3620 comprises a data input 3622 for a first transmission line 3624*a* and for a second transmission line 3624*b*. An amplifier circuit 3626 is configured to generate an output signal 3628 depending on a difference of the signal on the first transmission line 3624*a* and on the second transmission line 3624*b*. Adaption circuitry 3600 of FIG. 36*a* is coupled between the data input 3622 and the amplifier circuit 3626 to allow to reduce the negative impacts of Jitter on the output signal 3628 generated by means of amplifier circuit 3626.

FIG. 36*c* illustrates a flowchart of an example of a method for determining an attenuation level. The determination of the attenuation level is subsequently discussed for adaption circuitry as illustrated in FIG. 36*a*. However, further examples may use the method also together with other matching circuits. For the attenuation circuit of FIG. 36*a*, attenuation maybe varied based on the following equations, considering that Z0 is the desired trace impedance (e.g. 100Ω for differential pairs, i.e. for transmission links comprising two transmission lines). A denotes the attenuation, which is grater that 1. In the following equations, it is assumed that the resistivity of the first resistive element 3608*a* and the second resistive element 3608*b* are jointly adjusted to an identical value R1 while the resistivity of the third resistive element 3608*a* and the fourth resistive element 3608*b* are jointly adjusted to an identical value R2.

For a given attenuation A and given Z, the resistivities R1 and R2 compute to: $R1=Z0*(A^2-1)/(4*A)$ and $R2=Z0*(A+1)/(A-1)$, i.e. the attenuation can be varied by adjusting the resistivities accordingly.

The method comprises receiving 3630 a first predetermined sequence of calibration symbols at a first attenuation level and determining 3632 a first error rate for the received calibration symbols of the first sequence. The error rate may, for example, be determined by comparing the received symbols with the sequence of calibration symbols sent, which may be known by a receiver a priori or which may be transmitted to the receiver using a highly reliable modulation scheme upfront.

Further, the method comprises increasing attenuation 3634 to a second attenuation level and receiving 3636 a second predetermined sequence of calibration symbols at the second attenuation level. The second predetermined sequence may be equal to the first predetermined sequence or it may different. Further, the method comprises determining a second error rate 3638 for the received calibration symbols of the second sequence.

To determine, whether the additional attenuation increases the quality, the method further comprises comparing 3640 the first error rate and the second error rate.

If the second error rate is lower than the first error rate, the method comprises increasing the attenuation 3642 to a third attenuation level since the increase of the attenuation resulted in less distortion of the data signal.

Reiterating the increase of the attenuation until no further decrease of the error rate is experienced may result in a setting with optimal Jitter reduction.

In some examples, the method optionally comprises maintaining the second attenuation level 3644 if the second error rate is zero.

In some examples, the method further comprises sending a feedback signal causing no more calibration symbols to be received. Doing so, a cooperating transmitter may be notified to no longer send calibration symbols since an optimized setting has been found and calibration can be terminated.

In some examples, the method further comprises setting the first attenuation level to zero 3646 and sending a feedback signal 3644 causing an increase of a signal level of the data signal carrying the calibration symbols if the second error rate is higher than the first error rate. If an increase of the attenuation results in a worse error rate, one may so increase the transmit power resulting in more headroom for additional attenuation to be inserted afterwards.

The method to improve the signal quality using an adaptive lossy matching network may serve to fine tune the network so as to arrive at a setting which gives minimal Jitter caused by trace matching and SNR, as illustrated in FIG. 36*d*. FIG. 36*d* illustrates Jitter versus Signal to Noise Ratio (SNR) at a receiver after the data signal passed the adaption circuitry/matching network. A first graph 3652 in FIG. 36*d* illustrates the dependency of Jitter from the SNR in a scenario which is dominated by noise. As expected, the higher the SNR (the power of the data signal generated at a transmitter), the less Jitter. In a scenario dominated by Inter Symbol Interference (ISI), as illustrated by graph 3656, the reflected signal of the preceding symbol may be the dominant source of Jitter. Therefore, high transmit powers, resulting in high SNR and high amplitudes of the reflections, may result with high Jitter. The combination of both Jitter sources is illustrated by means of graph 3654. An example of a method to determine an attenuation may result in a setting resulting with minimal Jitter, considering both sources of Jitter at a time.

If the method of FIG. 36*c* is applied within a receiver of FIG. 36*b*, receiving the first predetermined sequence of calibration symbols at the first attenuation level comprises: receiving a data signal comprising the first predetermined sequence of calibration symbols; and attenuating the data signal with the first attenuation level. Likewise, receiving the second predetermined sequence of calibration symbols at the second attenuation level comprises receiving the data signal comprising the second predetermined sequence of calibration symbols; and attenuating the data signal with the second attenuation level.

An example of a method for determining an attenuation level may, in other words, be characterized by 2 Phases. In phase 1, the TX transmits a calibration pattern (will be defined as known pseudo random data) while the RX attenuator is set to 1 (the attenuator is bypassed) and with Bit ERror Measurement (BERM) counting the errors in a time window. The amount of errors will be kept as a reference for the quality of the link.

In phase 2, the RX changes the attenuation by one step (and adjusts the resistors accordingly) and compares the errors with respect to the first phase. The STEP size in which the attenuation is varied in the examples described herein is arbitrary. The variation may be constant at each step or it may increase or decrease linearly or even non-linearly.

If the new error is lower than in phase 1 then one may proceed gradually till one reaches no errors on the BERM. At that state, the RX may send ack to the TX and one may finish the calibration. If the new error is not lower, the RX returns nack and the TX should increase his amplitude and the RX should start phase 1 again.

After an attenuation value is found, one may proceed to further fine tune the PHY Layer controller by, for example, changing the TDC and look for best margins (time periods) for each symbol. Further calibration concepts will be subscribed subsequently referring to FIGS. 36*e* and 36*f*.

FIG. 36*e* illustrates the use of adaption circuitry for data signals within a STEP interconnect. In a STEP interconnect, a PHY Layer controller for generating a data signal 3660 is connected to a PHY Layer controller for processing a data signal 3662 (which are, for example, within two different chips) via transmission lines 3666*a* and 3666*b* which may affect the quality of the signal due to diffraction, losses, and reflection caused by mismatch along the transmission lines (traces) and in the connections (for example within board package connections). STEP is a phase modulation interface. Therefore, the spectral content is limited to a relatively specific and band pass frequency range (around the center frequency of the link). Matching may, therefore, require mainly in-band adjustments and no adjustments over the whole spectrum and may be performed by adaption circuitry 3600 of FIG. 36*a*. A processing circuit 3668 is coupled to an output of the adaption circuitry 3600 and configured to determine a sequence of a first signal edge of a first type, a second signal edge of a second type, and a third signal edge of the first type in the data signal. In other words, the processing circuit 3668 measures the time periods between subsequent complementary signal edges in the data signal received.

A demodulation circuit 3670 is configured to determine first data based on a first time period between the first signal edge and the second signal edge; and second data based on a second time period between the second signal edge and the third signal edge by assigning the time periods to (payload data) symbols of the STEP protocol.

FIG. 36*f* illustrates an example of an apparatus for generating a data signal 3670 that has the capability to provide one or more series of calibration symbols for calibration. A modulator circuit 3672 is configured to generate the series of calibration symbols. An output interface 3674 is configured to transmit a data signal comprising the series of calibration symbols at a first signal level. The apparatus 3670 further comprises an input interface 3676 configured to receive a feedback signal from an apparatus to process a data signal (e.g. from a STEP receiver) to control the behavior of the apparatus 3670 during calibration. Upon receipt of a corresponding feedback signal, the output interface transmits the data signal comprising the series of calibration symbols at a second signal level, the second signal level being higher than the first signal level.

Further examples may optionally transmit a second series of calibration symbols at the second signal level, which is different than the series of calibration symbols transmitted at the first signal level.

Within a PHY controller for a STEP interconnect, the output interface may further be configured to generate the data signal comprising a sequence of a first signal edge of a first type, a second signal edge of a second type, and a third signal edge of the first type, wherein a first time period between the first signal edge and the second signal edge corresponds to a first calibration symbol and wherein a second time period between the first signal edge and the second signal edge corresponds to a second calibration symbol.

While the previous paragraphs mainly discussed an example of a method for determining an attenuation level for a differential data bus, further examples of a method may likewise be used for a single ended data bus.

While FIGS. 36*a* to 36*f* illustrate examples as to how to avoid the generation of Jitter, FIGS. 37*a* to 37*j* subsequently illustrate examples for compensating some remaining Jitter contributions. I/O links may be based on pulse transmission (at a transmitter side, TX) and pulse width measurement (at receiver side, RX). A corresponding I/O data link, such as or example a STEP interconnect, may be sensitive to jitter (pulse width timing errors). There may be a demand to mitigate the negative impact of Jitter.

FIG. 37*a* illustrates an example of an apparatus for generating a data signal 3700. The apparatus comprises a pre-distortion circuit 3702 configured to generate a modification for at least one characteristic of a data signal to be transmitted via a transmission link based on a pre-distortion model for Jitter introduced to the data signal at the transmission link.

Further, the apparatus comprises a processing circuit 3704 configured to generate the data signal based on the modified characteristic.

For an interconnect transmitting data by symbols physically represented by time periods of pulses, it has been found that a major contributor to the overall Jitter is Inter-Symbol Interference (ISI). Pre-distorting a data signal to be transmitted using a pre-distortion model for Jitter (which is targeting the generation of Jitter by components of the interconnect) allows to efficiently mitigate the negative impacts of Jitter on the performance of the interlink with little additional effort.

According to some examples, the modification is an adjustment of a time period associated to a transmit data symbol, which may allow to directly apply an example of an apparatus for generating a data signal within a STEP transmitter.

According to some examples, the pre-distortion circuit is configured to generate a modification of the characteristic using a look-up-table that assigns the modification to data to be transmitted using the data signal. If ISI is identified to be a major contributor to Jitter, Pre-distortion may be implemented with a look-up-table, since the required modification depends on the data to be transmitted itself and a simple look-up-table may be used to assign modifications to data to be transmitted.

In some examples, the pre-distortion circuit uses a pre-distortion model depending on at least one transmit data symbol of a series of transmit data symbols to be transmitted by means of the data signal. In such an event, a look-up-table may assign a modification to every transmit data symbol to be transmitted.

In further examples, the pre-distortion model may also depend on previously transmitted transmit data symbols. Depending on the implementation, the number of antecedent transmit data symbols to be considered may be different. In some examples, the predistortion model uses at least the present transmit data symbol and a preceding transmit data symbol of the series. If a lookup table is used to implement the predistortion model, the lookup table may, for example, comprise three columns, one for the present transmit data symbol, one for the antecedent transmit data symbol and one for the modification to be applied.

Further examples may use mathematical formulations of predistortion models so that data to be transmitted may be input continuously into the pre-distortion model to generate the modification of the characteristic. Depending on the pre-distortion model, the presently input data may also affect the modification of the data signal used to transmit future data, which is also referred to as the pre-distortion function having memory.

In some examples, the pre-distortion model comprises a finite impulse response model of the transmission link.

Some examples update the pre-distortion model based on calibration information received from a recipient of the data signal, which may, for example, allow to perform a calibration in which the pre-distortion model is generated. According to some examples, the calibration information is based on measured jitter in the data signal.

If the apparatus is 3700 is, for example, used within a STEP transmitter, the processing circuit is 3704 configured to generate the data signal, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. The apparatus may further comprise an optional output interface circuit 3706 configured to output the data signal to the transmission link.

According to some examples, the pre-distortion circuit maybe configured to generate a modification of the first time period and a modification of the second time period. The modification may be implemented by generating a correction to be added to or subtracted from a nominal time period or by generating a time period to replace an existing nominal time period. FIG. 37*b* illustrates an Eye Diagram recorded for multiple signal edges received by a STEP receiver. Along a transmission line, digital data signals are deteriorated, resulting in a variation of their amplitudes as well as of the rise and fall times of the signal edges, so that a superposition of multiple signals received results in an Eye diagram as illustrated in FIG. 37*b*, which deviates significantly from the ideal shape, which is square. Using a pre-distortion model for Jitter maximizes the Eye-opening in the time dimension 3708 only, which is sufficient for some interconnects like STEP. FIG. 37*c* illustrates an approach for conventional high-speed interconnects, which require maximizing the Eye-opening in both the time dimension 3708 and the amplitude dimension 3710 to achieve a reduction of distortions.

Maximizing the Eye-Opening only in the time dimension 3708 may be achieved very efficient by means of a pre-distortion circuit in a transmitter, as illustrated in FIG. 37*d*.

FIG. 37*d* schematically illustrates circuitry of an apparatus for generating a data signal within a STEP transmitter as well as a TDC used within a STEP receiver to process the received data signal. At a transmitter side, a pre-distortion circuit 3712 generates a modification of the time period associated to each transmit data symbol. For example, a nominal time period T(n) for each transmit symbol (as illustrated by means of graph 3718) is modified to become pre-distorted time period P(n) (as illustrated by means of graph 3720). Pre-distorted time period P(n) is subsequently used by DTC 3714 to generate the data signal D(n) to be output to the transmission link 3722. As illustrated in FIG. 37*d*, pre-distortion can be implemented without significant additional effort in the digital domain of a transmitter.

At a receiver side, the data signal is received and the time periods between complementary signal edges are determined by means of TDC 3716.

The pre-distortion circuit 3714 uses a pre-distortion model for jitter. The data symbols/time periods T(n) to be transmitted are known and the link model is, e.g., obtained using a calibration method using a sequence of calibration symbols to determine the link model. The calibration may be a factory/lab calibration, or an online calibration using eventually even payload data symbols during normal operation, which may be referred to as background calibration. According to further examples, calibration may be performed once at start-up of the interconnect. For each symbol to be transmitted, the pre-distortion circuit generates a correction value that is fed to the DTC 3714 and modifies the time period, so that the ISI at the RX side (which is represented by a Time-to-Digital Converter 3716, TDC) is minimized. In other words, TX time domain memory ISI pre-distortion is performed. A TX memory ISI pre-distortion system requiring only DTC pulse width manipulation is achieved, allowing for ISI minimization without power hungry and costly devices.

FIG. 37*e* illustrates a conventional communication link minimizing the performance degradation caused by ISI via a Decision Feedback Equalizer 3724 (DFE) at the RX. Conventional high speed interconnect systems may use voltage level pulse modulation schemes (RZ, NRZ, CMI, PAM etc.). Accordingly, any equalization scheme would need to operate under the criterium of “maximal EYE opening” in both voltage and time dimensions in order to insure minimal BER (minimize the probability for an error caused by jitter and amplitude noise). This requires an analog equalizer or a DFE, which is very power hungry and, hence, undesirable.

In some communication systems like STEP, however, a minimal zero crossing variation may be sufficient (e.g. the optimization criteria for the proposed interconnect system is different). Hence, a pre-distortion model for jitter may be sufficient to achieve an optimal result.

In summary, to minimize the zero crossing variation that is caused by ISI, TX pre-distortion is performed, which may be a low power pure digital mechanism. Since the proposed communication system is only sensitive to jitter that changes its zero crossing, the expected zero crossing at the RX (due to ISI) can be pre-calculated and be pre-compensated at the TX.

FIG. 37*f* illustrates a communication system like a STEP interconnect that is dominated by ISI. FIG. 37*f* illustrates a first graph 3730 of essentially rectangular shapes that illustrates the transmitted data signal and a second graph 3732 that illustrates the received data signal which exhibits a deteriorated waveform. The right graph of FIG. 37*f* illustrates a histogram of a deviation (error) of the zero crossing of the received data signal from the expected values. As illustrated in FIG. 37*f*, the errors have a finite number of possible values only, which means that they are data dependent (the transmission link bandwidth and responses introduce memory effects). Given the observed error distribution one can conclude that Jitter is dominated by ISI so that a pre-distortion model for jitter is sufficient to optimize the performance of the interlink.

FIG. 37*g* illustrates a flowchart of an example of a method for generating a data signal. The method comprises generating a modification 3740 for at least one characteristic of a data signal to be transmitted via a transmission link. The modification is performed using a pre-distortion model for jitter introduced to the data signal along the transmission link. According to some examples, the pre-distortion model may optionally exclusively model the contribution of ISI to Jitter. The method further comprises generating the data signal 3742 based on the modified characteristic.

FIG. 37*h* illustrates a flowchart of another example of a method for generating a data signal for a STEP interconnect. The method comprises generating a modification 3750 for at least one characteristic of a data signal to be transmitted via a transmission link based on a pre-distortion model for jitter introduced to the data signal along the transmission link. The method further comprises generating the data signal 3752, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. Further, the method comprises outputting the data signal 3754 to the transmission link.

While pre-distortion has been discussed referencing FIGS. 37*a* to 37*f*, FIGS. 38*a* to 38*i* will subsequently illustrate examples as to how Jitter can be accurately measured at a receive side with an accuracy exceeding the resolution of a quantizing Time to Digital Converter.

FIG. 38*a* re-illustrates the generation of Jitter by ISI which is caused by frequency dependencies of the link-channel (the transmission link 3802) between a transmitter 3804 and a receiver 3806. The effect of ISI on a particular pulse (the time period between 2 subsequent complementary signal edges as given be the symbol to be transmitted) depends on the present code (symbol) itself and the history (meaning the previous code/s or symbol/s). ISI leads to a change of the received time period 3608 of a symbol at a receiving end of a communication interlink (then being different from the time period 3810 at the transmitting end), which may, in turn, lead to misdetections.

As already discussed referencing FIGS. 37*a* to 37*f*, FIG. 38*b* re-illustrates that the effect of ISI and of other sources of Jitter may be mitigated using a Predistortion Circuit 3812 before the Transmitter to generate modifications of the time periods for each symbol based on a pre-distortion model. A Digital Pre-Distortion (DPD) Model may consider the current and previous codes (symbols) and outputs a shifted signal 3811 with modified time periods in such a way that, after the channel/transmission link 3802, the distance between the subsequent edges 3808 will be as required. DPD may, for example, be implemented with a Look Up Table (LUT) having current and previous codes/symbols as an input and outputting a modified time period to be used for the present symbol.

FIG. 38*c* illustrates an example of a method to determine a time period between two signal edges using a time to digital converter with a coarse resolution.

The method comprises scaling a time period 3820 between a series of subsequent signal edges within a data signal by a calibration factor.

FIG. 38*d* illustrates the effect of scaling the time period 3830 on the quantization of the time period by means of a TDC at a receive side. In the example of FIG. 38*d*, the time period is scaled by changing a frequency of a local oscillator (e.g. a PLL) used to generate the series of subsequent signal edges from an operating frequency 3833 to a calibration frequency 3835. The change results in a change of the grid of positions where signal edges can be generated within the data signal 3831 from the original grid 3832 (used during normal operation) to a new grid 3834. However, the positions at which a TDC at a receive side quantizes the time periods, the TDC grid 3836, remains constant. In the example of FIG. 38*d*, this results in the rising signal edge 3838 being generated at position 3840 of the new grid 3834 other than at position 3842 where it would have been generated according to the original grid defined by the calibration frequency. By scaling a time period 3830 between a series of subsequent signal edges, the position 3840 of rising signal edge is shifted to coincide with the TDC grid 3836, i.e. with a position where the decision between two neighboring time intervals (quantization values) is taken. In the example, the neighboring time intervals are the first time interval [190 ps; 200 ps[ and the second time interval [200 ps; 210 ps[. Due to inherent statistical Jitter in the system, the rising signal edge 3838 may, therefore, be quantized into the first time interval or into the second time interval. Transmitting the signal edge 3838 multiple times within the series of subsequent signal edges, therefore, results with a distribution of the quantization values among those neighboring time intervals. Assuming the probability density of the statistical Jitter to be symmetric and the position 3840 coinciding precisely with the TDC grid 3836, 50% of the samples would be found in the first time interval and another 50% would be found in the second time interval. The previous observation is used for calibration by the example of a method illustrated in FIG. 38*c*.

To this end, the method further comprises transmitting 3822 the series of subsequent signal edges via a transmission link.

Further, the method comprises receiving the series of subsequent signal edges 3824 and quantizing the time periods 3826 between signal edges with the coarse resolution to provide quantization values.

The method further comprises calculating the time period between the signal edges 3828 based on a distribution of the quantization values and the scaling factor. The calculation can be performed along the lines of the considerations set forth in connection of FIG. 38*d*. While FIG. 38*d* illustrates one particular example to scale the time periods, further examples may use other arbitrary ways to achieve the scaling.

The previously described method allows to measure jitter accurately although it is challenging due to the coarse quantization of the TDC (RX).

For example, one may transmit symbols (codes) 5,5,5,5, 5,5 . . . (current code is 5 and the previous code is 5) to evaluate the ISI of the sequence of symbols 5, 5. The nominal (required) time period 3830 (delay) for symbol 5 is assumed to be 205 ps (making the signal edge arrive in the center of the second time interval [200 ps; 210 ps[ to achieve maximum reliability). However, be the real time interval caused by ISI is 203 ps, which is the time period to be determined during calibration to be able to compensate it by pre-distortion in the event the sequence of symbols 5, 5 is to be sent. The TDC quantization levels, however, are [170 180 190 200 210 220 230]ps. Therefore, the TDC sampling using the original grid 3832 will only result in the information that the time period is between 200 ps and 210 ps at a receiver, which does not allow to conclude on the real time interval of 203 ps.

Examples of a method overcome this issue by shifting the DTC (TX) grid and exploiting the presence of statistic jitter in the system (e.g. thermal noise) to generate some distribution of the quantization values. If, for example, there is a 0.5 ps RMS jitter in the system, one would need to shift the DTC ~2-4 ps (scale the time periods accordingly) to cause a distribution of the RX samples/quantization values (some will be 190-200 and some 200-210) amongst neighboring time intervals. Once there's a distribution of the quantization values, it is possible to calculate the exact delay. (Example 1: if 50% of the samples are 190-200 and 50% are 200-210, the exact delay is 200. Example 2: if 30% are 190-200 and 70% are 200-210, one may further consider the sigma of the statistic Jitter to calculate the exact time period (delay) of, e.g. 201 ps.

In order to arrive at a distribution of the quantization values suitable to calculate the time period accurately, one may try different calibration factors (PLL frequencies or local oscillator frequencies) until the quantization values are distributed among neighboring time periods to a sufficient extent. For calibration frequency Fc_new, a calibration factor C on the transmit side amounts to C=Fc_old/Fc_new, with Fc_old being an operating frequency during normal operation of the communication interlink.

To calculate the real time period on the receive side, the impact of the calibration factor is the inverse, so that the Real Time Period equals the Measured Time Period divided by C.

The previously described method may be used to accurately measure time periods impaired by, for example, Jitter, to determine calibration data used within a distortion circuit. While ISI has already been shown to be a source of Jitter, FIGS. 38*e* and 38*f* illustrate another source of Jitter, which is reflection.

Reflection is an additive impairment. Part of the signal is reflected back from the end of the link at a receiver 3806 and then reflected again at the transmitter 3804 (see figure below). This effect causes a "past-version" of the signal to be added to the current signal (however, the reflected version is weakened since it passes through the link 2 more times). The delay of the reflection is a function of the link's length and may, therefore, be constant for a given implementation The effect of the reflection on a current time period (the position of its signal edge) depends on the current symbol and on an antecedent symbol (at $t-T_{reflection}$) Treflection is twice the signal propagation time over the transmission link 3802. In other words, the shape of the present signal depends on the past codes.

FIG. 38*f* illustrates the impairment of the data signal due to reflections. A first graph shows an example of a data signal 3050 without reflections, a second graph 3052 shows reflections generated by means of the data signal at a given transmission link and a third graph 3054 shows the superposition of the reflections on the data signal 3050, illustrating the significant signal impairments that can be caused by reflections.

Reflections can be mitigated similar to ISI, e.g. by means of pre-distortion using a LUT. Instead of depending on the previous code/s (in addition to the current code), however, the modification of the time period to mitigate the effect of reflections depends on the present symbol and on the symbol sent $T_{reflection}$ before (on the closest edge relative to the reflection time). In order to maintain the information on previously sent symbols, a digital FIFO may be used.

While pre-distortions for ISI and reflection may be based on LUTs containing the inverse values of the impairments, the generation of the LUTs requires different series of payload data symbols to measure the deterministic Jitter (edge offset) caused by each effect.

For both effects, generating the payload data symbols transmitted to measure jitter comprises providing multiple repetitions of a series of payload data symbols and assigning a time period to each payload data symbol of the series. The multiple repetitions may be required to gather the necessary statistics at a receiver.

For calibrating ISI, the number of payload data symbols within the series corresponds to the complexity of a predistortion model for Jitter by Inter Symbol interference. In a simple model, one may assume that ISI is dominated by the directly preceding payload data symbols so that the number of payload data symbols within the series is two. Further examples may use more complex models, depending on 3, 4, 5, or more symbols.

Because of the previous considerations regarding reflections, the length of the series of payload data symbols for calibrating a DPD to mitigate impairments caused by reflections corresponds to twice the signal propagation time of the transmission link.

For both ISI and reflections, the calibration data is determined for the last payload data symbol within the series.

In the event of ISI calibration, first calibration data relates the time period determined for the last payload data symbol to the series of payload data symbols.

For reflection calibration, however, second calibration data relates the time period determined for the last payload data symbol of the series to the first payload data symbol of the series.

To allow implementing the previously described method of measuring time periods and calibration, examples of apparatuses for generating and processing data signals may require to communicate with one another to start or terminate calibration, for example.

FIG. 38*g* schematically illustrates an example of an apparatus for processing a data signal 3860. The apparatus comprises an input interface 3862 configured to receive a series of subsequent signal edges within the data signal and a time to digital converter 3864 configured to quantize time periods between signal edges with a coarse resolution to provide quantization values for each time period.

Evaluation circuitry 3866 is configured to calculate the time period between the signal edges based on a distribution of the quantization values and a scaling factor used for generating the data signal according to the method detailed above.

For example, according to some examples, the evaluation circuitry is configured to determine the time period between signal edges corresponding to a select payload data symbol of a series of payload data symbols repeatedly received within the data signal by determining the distribution of quantization values for the select payload data symbol. The time period is calculated using the scaling factor, the time periods corresponding to at least two neighboring quantization values of the distribution and the distribution of the quantization values.

According to some examples, the apparatus 3860 may optionally further comprise an output interface configured to communicate the calculated time period to the apparatus for generating a data signal, which may, for example, use the calculated time period to build a pre-distortion model.

FIG. 38*h* illustrates an example of an apparatus for generating a data signal 3870. The apparatus 3870 comprises a calibration circuit 3872 configured to generate multiple repetitions of a series of payload data symbols, as, for example, illustrated in FIG. 38*i*. A modulation circuit 3874 is configured to assign a time period to each payload data symbol of the series.

A data signal generation circuit 3876 is configured to generate a data signal comprising a sequence of subsequent signal edges separated by calibration time periods, the calibration time periods being the time periods scaled by a calibration factor.

Some examples of an apparatus for generating a data signal 3870 may optionally further comprise an input interface configured to receive a feedback signal wherein the data signal generation circuit 3876 is configured to modify the calibration factor upon receipt of a negative acknowledgement signal within the feedback signal. Doing so may allow a receiver to notify the apparatus for generating a data signal 3870 to further modify the calibration signal if the received signal edges do not coincide with the time grid of the TDC sufficiently.

According to some examples, the apparatus is configured to decrease the calibration factor by a predetermined amount upon receipt of the feedback signal.

As already elaborated on before, some examples may comprise a Phase Locked Loop used to generate the sequence of subsequent signal edges and the frequency of the Phase Locked Loop may be increased upon receipt of the negative acknowledgement signal for decreasing the calibration factor.

FIG. 38*i* illustrates an example of a series of payload data symbols that may be generated on a transmit side for calibration. The series comprises three repetitions of the series C, B, and A of payload data symbols. Consequently, it may be used for ISI calibration of payload data symbol A in a model considering 2 preceding payload data symbols as a cause of ISI. The generated calibration data relates the time period determined for the last payload data symbol A to the series of payload data symbols C, B, and A. The calibration data is then used to modify the time period assigned to payload data symbol A in the event that the series C, B, and A are transmitted during normal operation.

Similarly, the series may be used to calibrate reflection in the event of a short transmission link so that twice the signal propagation time corresponds to the length of the time periods assigned to the series of payload data signals of FIG. 38*i*

FIGS. 37*a* to 37*h* as well as FIGS. 38*a* to 38*i* relate to pre-distortion and to the use of a series of calibration symbols to determine the modifications to be applied to the data signal according to a pre-distortion model. A series of calibration symbols may, for example, be given by a series of payload data symbols in a particular order that allows to measure a certain property of the data signal generated from the series of calibration symbols.

While the TX side may use a crystal oscillator (PLL) as a reference and as such may itself measure the output generated reliably (the accuracy may be at order of 10's of PPM or better), the RX side may not comprise a PLL and all pulse durations may be measured based on a delay line of silicon. Such a delay line may vary due to process variation, Voltage and temperature, which may necessitate calibration of the elements of the delay line after production, requiring to transmit series of calibration symbols from a transmitter to a receiver and causing the receiver to perform the calibration measurements.

FIGS. 39*a* to 39*e* disclose examples as to how the transmission of a series of calibration symbols may be signaled from a transmitter to a receiver to, for example, make the latter perform calibration measurements.

According to some examples, a delimiter as previously described, which comprises a sequence of a control symbol indicator and a control symbol, is used to signal subsequent transmission of a series of calibration symbols. The delimiter used may be particularly created using a dedicated control symbol that indicates a series of calibration symbols.

Consequently, an apparatus for generating a data signal 3900 as indicated in FIG. 39*a* comprises a modulator circuit 3902 configured to generate a data stream comprising a sequence of a control symbol indicator, a control symbol indicating a series of calibration symbols, and a series of calibration symbols comprising at least one calibration symbol. An output interface 3904 is configured to output a data signal comprising the symbols of the data stream. An apparatus 3900 may so be used to generate a series of calibration symbols and to signal the transmission of the series to a receiver by means of the delimiter composed of the control symbol indicator and the control symbol indicating a series of calibration symbols. For example, for an implementation within a STEP interconnect, some examples of an apparatus 3900 may further comprising a processing circuit configured to generate the data signal comprising a sequence of complementary signal edges separated by time periods corresponding to the control symbol indicator, the control symbol, and the calibration symbols of the sequence. FIG. 39*b* illustrates an example of a data stream comprising a sequence of a control symbol indicator CI, a control symbol C indicating a series of calibration symbols, and a series of calibration symbols C, B, and A which is repeated three times for repeated measurements as discussed referencing FIGS. 38*a* to 38*i*. In other words, the series of calibration symbols comprises multiple repetitions of a series C, B, and A of payload data symbols.

FIG. 39*c* illustrates an example of an apparatus 3910 for processing a data signal which is capable to use the series of calibration symbols for calibration. The apparatus 3910 comprises an input interface 3912 configured to receive the data signal comprising a sequence of a control symbol indicator, a control symbol indicating a series of calibration symbols, and a series of calibration symbols (for example the data stream of FIG. 39*b*). An evaluation circuit 3914 is configured to use the series of calibration symbols to determine a property of the data signal once the apparatus 3910 determines from the control symbol indicating a series of calibration symbols that calibration is to be performed.

According to some examples, the apparatus 3910 optionally further comprises an output interface configured to output the property of the data signal to, e.g., a transmitter to update a pre-distortion model.

In other words, after the delimiter, a sequence of modulated signals can be sent. For example, one may send 16 short symbols [000], followed by 16 [001], followed by 16 [010] . . . and alternatively start with long symbols 16 [111] followed by [110] . . . . The receiver when detecting the "calibration" delimiter will use the following symbols for calibration of the internal circuit parts. Since the calibration symbols are triggered by a delimiter—it can actually be stopped at any stage by the transmitter when it is requires to transport application data. In this event, for example, a Start Of Packet (SOP) delimiter may be sent, follow by application data, e.g. by means of payload data symbols. Using a delimiter may save significant bandwidth as compared to conventional implementations. For example, PCIe normally sends the training as part of the data—but the "cost" is 25% extra BW to allow the RX follow the TX frequency and sample the data correctly. DPhy facilitates a de-skew feature and the transmitter should not stop the de-skew in the mid of operation, and must furthermore go through a low power state before going to application data—this is rather "long" procedure of delay—~2 uSec.

FIG. 39*d* illustrates an example of a method for generating a data signal. The method comprises generating a data stream 3930 comprising a sequence of a control symbol indicator, a control symbol indicating a series of calibration symbols, and a series of calibration symbols comprising at least one calibration symbol; and outputting the data signal 3932 comprising the symbols of the data stream.

FIG. 39*e* illustrates an example of a method for processing a data signal. The method comprises receiving 3940 the data signal comprising a sequence of a control symbol indicator, a control symbol indicating a series of calibration symbols, and a series of calibration symbols. Further, the method comprises using the series 3942 of calibration symbols to determine a property of the data signal.

While FIGS. 36*a* to 39*e* disclose calibration methods to mitigate impairments of the data signal that are caused by properties of the transmission link, FIGS. 40*a* to 40*e* relate to a method to calibrate parameters within the TDC and the DTC used to process and generate the data signal. DTCs and TDCs are analog blocks whose performance may vary significantly over process, voltage and temperature. Further, a DTC with fine quantization steps may comprise an interpolation function that interpolates between neighboring pulse widths generated using a reference local oscillator. Interpolation may that generate DNL and INL errors.

For example, in a particular implementation of the STEP interconnect, a DTC for generating a data signal may generate 8 optional payload data symbols 0-7. Some symbols, such as 0 and 5, are merely a division of the DTC reference clock coming (generated, for example, by means of a PLL). In other words, those symbols are directly derivable from the reference clock without interpolation. Other symbols are generated inside the DTC by a sub-block called DCEI, which uses interpolation to create a pulse width between 2 signal edges of the reference clock. The DTC DCEI may provide for a good time resolution given by the PLL cycle divided by 2Ndcei.

Digital circuitry called "DTC encoder" controls the DTC, and generates a code for the DCEI to be used for each transmit symbol. The fine time resolution of the DCEI may, for example, allow to implement pre-distortion using look-up-tables as elaborated on before.

Likewise, a look up table may be used to compensate for nonlinearities and other impairments within the DTC itself.

Examples of a method to calibrate variable delay elements allows to mutually calibrate both, the TDC and the DTC by initially establishing a calibrated time period in one of the TDC or the DTC which is subsequently used to calibrate another timer period in the other device.

An example of a method to calibrate variable delay elements is illustrated in FIG. 40*a*. The method comprises setting a first time period of the DTC 4002 to a first value derivable from a reference clock.

The method further comprises transmitting a data signal 4004 comprising a series of complementary signal edges separated by the first time period to a TDC.

With the first time period within the delay element being accurately set, the method further comprises calibrating a delay element 4006 within the TDC to the first value.

Choosing a reliable base for a time period within the DTC allows to generate the data signal with accurately timed edges, which in turn enables the DTC to internally calibrate a delay element to the first value using said data signal.

The calibration measurements may, for example, be performed using an example of a method disclosed in FIGS. 38*a* to 38*i*.

According to a further example, the method further comprises setting the first time period of the DTC to a second value derivable from the reference clock and transmitting a data signal comprising a series of complementary signal edges separated by the first time period to the TDC. Similar than for the first value, the reliably generated signal edges separated by a time period having the second value can be used to calibrate the delay element within the TDC to the second value.

Having accurately calibrated time periods within the TDC, further examples calibrate a time period within the DTC generating the data signal.

Some examples, therefore, set the first time period of the DTC to the first value and transmit a data signal comprising a series of complementary signal edges separated by a time period depending form the first time period and from a second time period to the TDC. The second time period within the DTC can then be calibrated to a difference between the second value and the first value since both of those values have been calibrated within the TDC before.

Based on the previously described method to iteratively calibrate components of the DTC and of the TDC, an arbitrary further number of time periods may be calibrated.

While examples of the method may be used universally for a setup comprising a DTC and a DTC, some examples may be beneficially implemented within a communication system, like, e.g. in STEP, in that one chooses the difference between the second value and the first value to correspond to one half of a symbol separation time of a communication protocol. Further time periods calibrated may then also relate to fractions or multiples of the symbol separation times. For example, the second time period within the DTC may be set to the symbol separation time to calibrate a second time period within TDC to the symbol separation time.

FIGS. 40*b* and 40*c* illustrate the application of the method to a STEP interconnect as previously described, having 8 payload data symbols.

FIG. 40*b* re-illustrates schematically a TDC at a receiving side of a STEP transmission link, which has already been discussed before, for example with respect to FIG. 1*c*.

Therefore, a repeated detailed appears to be moot and reference is made to FIG. 1*c*.

The TDC comprises an initial common delay element 4012 and a first series of delay elements 4014 and associated readout FIFOs for the high pulses as well as second series of delay elements 4016 and associated readout FIFOs for the high pulses.

For the following consideration, it is important to note that T is the PLL clock period, which is also symbol 0. The symbol separation time d is the delta steps in time between each symbol, meaning e.g. symbol1=T+d. Delay 0 in operational mode as set by means of common delay element 4012 needs to be equal to T+d/2 so that symbol 0 (=T), will result with all zeros at the FF outputs, symbol 1 (=T+d) will sit exactly in D1 output which is T+d+d/2, etc.

According to the method illustrated above, DTC and TDC are operated in a loopback mode, and some jitter is assumed to be present to allow for the measurements of FIGS. 38*a* to 38*i*.

The subsequent calibration to be performed to calibrate all necessary time periods (delay) in both, the DTC and the TDC, are given by the table in FIG. 40*c*, where lines 1, 2, 5, and 9 to 14 relate to calibrations of the TDC, while lines 3, 4, and 6 to 8 relate to calibrations of the DTC.

Column 4020 comprises the values for the first time period used/calibrated within the DTC and column 4026 comprises the values for the second time period used/calibrated within the DTC. Column 4022 comprises the first time period to be calibrated/used within the TDC and Column 4024 comprises a second time period D1 and further time periods D2 to D7 to be calibrated within the TDC.

As illustrated by the table, one can first calibrate TDC D0 (the common delay element 4012) to T and T+d/2 separately. Then, one uses D0=T, which shall not be used in operational mode, for all other calibration. Doing so results in all symbols coming from the DTC to not "fall" not in the middle but on the edge, and including jitter we should sample right and left hand symbols at a ratio of 50%-50%.

Subsequently choosing the further settings of the table of FIG. 40*c* allows to calibrate both, the DTC and the TDC without the necessity to use external equipment or further circuitry. In each calibration stage (given by a single line) the same DTC cycle is repeated several iterations, each time counting how many times we sampled the left/right symbols until sufficient statistics is collected. In each stage the right-left ratio is saved and then used for next stages—in order to not accumulate the error from one stage to the other.

Further examples of mutual calibration may use another series of calibrations. For example, another option for TDC calibration would be transmitting not the operational symbols themselves, but mid-points between symbols, e.g. T+d/2, T+d+d/2, etc. Doing so, all TDC buffers/delays will be calibrated to the correct configurations using the 50%-50% method, but there would be no need to first calibrate D0 to T, which is not the operational buffer width (but T+d/2).

FIG. 40*d* illustrates a further example of a Time to Digital Converter 4040. The Time to Digital Converter 4040 is based on the TDC of FIG. 40*d*. The TDC 4040 likewise comprises a series of serially connected delay elements 4014 configured to implement a delay corresponding to a symbol separation time of a communication protocol. Further, the ADC 4040 comprises at least one further delay element 4042 coupled to the serially connected delay elements, the further delay element 4042 being configured to implement a delay of one half of the symbol separation time.

The output of the further delay element 4042 is so at the edge of the payload data symbols received during normal operation. Therefore, the output of the delay element does permanently measure a distribution of quantization values amongst two neighboring time periods that can be used for calibration. The calibration may so be performed online, e.g. during normal operation without the necessity of a dedicated calibration period.

In FIG. 40*d*, the further delay element 4042 is coupled in parallel to the series of serially connected delay elements. However, depending on the implementation, delay elements configured to implement a delay of one half of the symbol separation time may also be connected in series for the same purpose. For example, one delay element for a symbol separation time may be replaced by two serially connected delay elements of half of the symbol separation time.

In the TDC 4040 of FIG. 40*d*, for example, further readout FlipFlops 4044 are connected to a delay line within common delay element 4012 at a position corresponding to a delay of one half of the symbol separation time. Constantly monitoring the output of FlipFLops 4044 together with the output of further delay element 4042 may allow to permanently update a scaling factor to commonly scale the delays of the series of serially connected delay elements 4014.

In other words, the TDC 404 is built out of a delay-line composed out of buffers. These buffers can be affected by temperature changes, and can lead to mis-detection of symbols in the receiver. In TDC 4040, additional FlipFLops are added at certain points in the delay line, which correspond to "half symbols". These sampling points are on the edge of symbols 0,7 (both high & low—total of 4 bits). When transmitting symbols 0/7, they should yield 50%-50% on sampling right/left hand symbols. These indicators can be sampled and used during regular transmission. If the ratio is not 50%-50%, we can use the ratio to determine how much the delay line extended/shrunk, and even suggest an auto-fix to recalibrate the TDC cell configurations by changing each time and reusing these indicators.

FIG. 40*d* illustrates an example for "jitter amplification" that is based on AM to PM conversion. In order to degrade the system jitter 4052 one needs to degrade the slew rate of the signal. This can be done either by inserting capacitors as loads (as illustrated by capacitor 4054 in between of two inverters 4056 and 4058 of the series) or by changing the bias of the amplifiers (example: RX driver) to lower the BW and degrade the slew rate.

As illustrated in FIG. 40*c*, the slew rate of the first inverter 4056 is degraded and the AM noise of the second inverter 4058 is, therefore, "amplified".

Implementing an example of a method illustrated above allows for self-calibration without the need for external equipment or measurements. An initial calibration can be performed either in production testing or once at power up. Statistics are used to derive optimal configuration and calculating distance from optimal symbol pulse widths. Optionally On-the-fly TDC calibration using half samplers may be implemented without the need for a special training sequence which would otherwise add latency. These are benefits as compared to conventional solutions calibrating DTC symbols levels using an ADC which returns the modulated clock duty cycle, holding the pulse width information. Another conventional approach uses for calibrating TDC levels using by transmitting each time a clock, whose cycle is composed out of 2 equal symbols, and checking correctness of each output. Also periodic calibration using training sequences may be avoided with some examples, which would generate lags in latency when moving to high-speed mode. In summary, using additional blocks such ADC for DTC calibration and its associated cost, area, and power may be saved. Also, using an external tester to inject the clock to the TDC can be avoided.

In the previous sections, various aspects of the STEP protocol are described. The following description section focuses on some exemplary use cases for the STEP protocol. Although specific use cases are presented in the following, communication according to the STEP protocol is not limited to these use cases. The STEP protocol may be used for any communication application.

Device to device communication (e.g. between phones, computers, tablet-computers, set-top boxes, etc.) demands for high data rates. Traditional links according to protocols like Universal Serial Bus (USB) 2.x, 3.x or Thunderbolt may provide quite high data rates. However, higher data rates while keeping the power consumption for the data exchange low may be desired. Using the STEP protocol for device to device communication may allow to achieve higher data rates and at the same time low power consumption.

In connection with FIGS. 41*a* to 41*c*, some electronic devices and systems are described in the following that use the STEP protocol over the external communication link.

FIG. 41*a* illustrates an example of an electronic device 4110. For example, the electronic device 4110 may be one of a mobile phone, a tablet computer, a laptop computer, a computer, a television set, a set-top box, a portable data storage device, a video game console, and a consumer electronics device.

The electronic device 4110 comprises a connector 4111 configured to receive a data cable 4120. For example, the connector 4111 may be a plug or a socket configured to receive a corresponding counterpart of the data cable 4120. The connector 4111 is further configured to output a data signal 4115 to the data cable 4120 for transmitting data to another device (not illustrated).

The electronic device 4110 additionally comprises an apparatus 4112 for generating the data signal 4115. The apparatus 4112 for generating the data signal 4115 comprises a processing circuit 4113 (e.g. a DTC) configured to generate the data signal 4115 to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted, and the second signal edge and the third signal edge are separated by a second time period corresponding to second data to be transmitted. The processing circuit 4113 is configured to generate the data signal 4115 compliant to the STEP protocol (e.g. according to one or more of the aspects described above). That is, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 4112 for generating the data signal 4115 comprises an output interface circuit 4114 configured to output the data signal 4115 to the connector 4111.

The connector 4111 may in some examples be configured to output the data in a differential manner to the data cable 4120. Therefore, the processing circuit 4113 may be further configured to generate a second data signal that is inverted with respect to the data signal 4115. Accordingly, the output interface circuit 4114 may be further configured to output the second data signal to the connector 4111.

By using the STEP protocol, the electronic device 4110 may output data to other devices at a high data rate and with low power consumption.

FIG. 41*b* illustrates another example of an electronic device 4130. Like the above described electronic device 4110, the electronic device 4130 may, e.g., be one of a mobile phone, a tablet computer, a laptop computer, a computer, a television set, a set-top box, a portable data storage device, a video game console, and a consumer electronics device.

The electronic device 4130 comprises a connector 4131 configured to receive a data cable 4140. For example, the connector 4131 may be a plug or a socket configured to receive a corresponding counterpart of the data cable 4140. The connector 4131 is further configured to receive a data signal 4135 from the data cable 4140. For example, another device may apply the data signal 4135 to the data cable 4140 for transmitting data to the electronic device 4130.

The electronic device 4130 additionally comprises an apparatus 4132 for decoding the data signal 4135. The apparatus 4132 for decoding the data signal 4135 comprises a processing circuit 4134 (e.g. a TDC) configured to determine a sequence of a first signal edge of a first type, a second signal edge of a second type, and a third signal edge of the first type in the data signal. Again, the first type may be a rising edge and the second type be a falling edge, or the second type may be a rising edge and the first type be a falling edge.

Further, the apparatus 4132 for decoding the data signal 4135 comprises a demodulation circuit 4133 configured to determine first data based on a first time period between the first signal edge and the second signal edge, and to determine second data based on a second time period between the second signal edge and the third signal edge. The apparatus 4132 for decoding the data signal 4135 is configured to decode the data signal 4135 compliant to the STEP protocol (e.g. according to one or more of the aspects described above). A sum of the first time period and the second time period may, hence, be lower than $10^{-7}$ s, $10^{-8}$ s, $10^{-9}$ s, $10^{-10}$ s, $10^{-11}$ s, or $10^{-12}$ s.

The connector 4131 may in some examples be configured to receive the data in a differential manner from the data cable 4140. Therefore, the connector 4131 may be further configured to receive a second data signal from the data cable 4140 that is inverted with respect to the data signal. Accordingly, the processing circuit 4134 may be configured to determine the first signal edge, the second signal edge, and the third signal edge further based on the second data signal.

By using the STEP protocol, the electronic device 4130 may receive data from other devices at a high data rate and decode the data with low power consumption.

In order to summarize the above aspects, FIG. 41*c* illustrates a system comprising two electronic devices 4151 and 4152 via a data cable 4153. The data exchange between the electronic devices 4151 and 4152 is done using the STEP protocol as communication protocol in order to enable data exchange between the electronic devices 4151 and 4152 at a high data rate and with low power consumption. Each of the electronic devices 4152 and 4153 may support data transmission and data reception according to the STEP protocol (e.g. as described above in connection with FIGS. 41*a* and 41*b*).

Data cables suitable for communication according to the STEP protocol are described in the following in connection with FIGS. 41*d* and 41*e*.

FIG. 41*d* illustrates an example of a data cable 4160. The data cable 4160 comprises a first connector 4161 for coupling to a first electronic device (not illustrated) and a second connector 4162 for coupling to a second electronic device (not illustrated). For example, the first and second connectors 4161 and 4162 may be plugs or sockets configured to receive a corresponding counterpart of an electronic device. The first and the second connector 4161, 4162 form cable ends of the data cable 4160.

The first connector 4161 is configured to receive a data signal from the first electronic device. The data signal comprises a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted, and the second signal edge and the third signal edge are separated by a second time period corresponding to second data to be transmitted. The data signal is compliant to the STEP protocol (e.g. according to one or more of the aspects described above). Therefore, a sum of the first time period and the second time period may be lower than $10^{-7}$ s, $10^{-8}$ s, $10^{-9}$ s, $10^{-10}$ s, $10^{-11}$ s, or $10^{-12}$ s.

The data cable 4160 further comprises at least one repeater circuit 4163 coupled between the first connector 4161 and the second connector 4162. As illustrated in FIG. 41*d*, the repeater circuit 4163 may be arranged in the same housing (casing) like the first connector 4161. In other examples, the repeater circuit 4163 and the first connector 4161 may be arranged in separate housings.

The at least one repeater circuit 4163 is configured to amplify the data signal. In other words, the repeater circuit 4163 increases the power of the data signal so that the amplitude of the amplified data signal is increased by a gain factor (greater than one) compared to the amplitude of the data signal. The second connector 4162 receives the amplified data signal and is configured to output the amplified data signal to the second electronic device.

The data cable 4160 may optionally comprise one or more further repeater circuits. In the example of FIG. 41*d*, the data cable 4160 comprises a second repeater circuit 4164. The (at least) two repeater circuits 4163 and 4163 are coupled in series between the first connector 4161 and the second connector 4162, and are configured to sequentially amplify the data signal. As illustrated in FIG. 41*d*, the second repeater circuit 4164 may be arranged in the same housing like the second connector 4162. In other examples, the second repeater circuit 4164 and the second connector 4162 may be arranged in separate housings.

FIG. 41*d* illustrates an "active" data cable with repeaters at both ends. Using one or more repeaters together with the STEP protocol may allow high data rates for long cables. Further, the low power consumption of the STEP protocol may allow low heat dissipation of the repeaters. This may be advantageous if a repeater circuit and a connector are arranged in the same housing (e.g. made of plastic) since the housing may exhibit only limit heat dissipation capability.

Different types of cables may be used for connecting the first connector 4161 and the second connector 4162. For example, a coaxial cable may be used so that the at least one repeater circuit 4163 is coupled to the second connector 4162 via the coaxial cable. The data signal may be transmitted in a single ended manner via the data cable 4160. In such a configuration, the at least one repeater circuit 4163 may be configured to output the amplified data signal single ended to the second connector 4162 via the coaxial cable.

In some examples, the data may alternatively be transmitted in a differential manner via the data cable 4160. For example, the first connector 4161 may be further configured to receive a second data signal from the first electronic device that is inverted with respect to the data signal. Accordingly, the at least one repeater circuit 4163 (and optionally also the other repeater circuits of the data cable) may be further configured to amplify the second data signal. The second connector 4162 may be further configured to output the amplified second data signal to the second electronic device.

In a coaxial configuration, the at least one repeater circuit 4163 may be coupled to the second connector 4162 via a pair of coaxial cables for transmitting the data in the differential manner. The at least one repeater circuit is then configured to output the amplified data signal and the amplified second data signal to different ones of the pair of coaxial cables.

As an alternative to coaxial cables, a twisted pair cable may be used for differential data transmission. Accordingly, the at least one repeater circuit 4163 may be coupled to the second connector 4162 via the twisted pair cable, wherein the at least one repeater circuit is configured to output the amplified data signal and the amplified second data signal to different lines of the twisted pair cable.

In the foregoing, single direction data handling via the data cable 4160 was described. However, in some examples, dual direction data handling may be supported by the data cable 4160. For example, the second connector 4162 may be configured to receive a third data signal from the second electronic device. The third data signal comprises a sequence of a fourth signal edge of the first type, a fifth signal edge of the second type, and a sixth signal edge of the first type. The fourth signal edge and the fifth signal edge are separated by a third time period corresponding to third data to be transmitted, and the fifth signal edge and the sixth signal edge are separated by a fourth time period corresponding to fourth data to be transmitted. The third data signal is compliant to the STEP protocol (e.g. according to one or more of the aspects described above). Therefore, a sum of the third time period and the fourth time period may be lower than $10^{-7}$ s, $10^{-8}$ s, $10^{-9}$ s, $10^{-10}$ s, $10^{-11}$ s, or $10^{-12}$ s. The at least one repeater circuit 4163 (and optionally also the other repeater circuits of the data cable) is configured to amplify the third data signal, and the first connector 4161 is configured to output the amplified third data signal to the first electronic device.

As described above for the data transmission from the first electronic device to the second electronic device, differential signals may also be used for the data transmission from the second electronic device to the first electronic device.

The data transmission via the data cable 4160 from the first electronic device to the second electronic device and vice versa may be simultaneous (concurrent). Therefore, the at least one repeater circuit 4163 (and optionally also the other repeater circuits of the data cable) may be configured to simultaneously amplify the first data signal and the third data signal. Similarly, the data cable 4160 may comprises additional wires (e.g. additional coaxial cables or additional twisted pair cables) for the simultaneous data transmission from the first electronic device to the second electronic device and vice versa.

In the example of FIG. 41*d*, the data signals provided to the data cable 4160 are compliant to the STEP protocol. However, data cables using the STEP protocol may further be used for transmitting signals compliant to another communication protocol. An according data cable 4170 is illustrated in FIG. 41*e*.

The data cable 4170 comprises a first connector 4171 configured to couple to a first electronic device (not illustrated) and to receive an input signal compliant to a communication protocol (e.g. USB 2.x, 3.x or Thunderbolt) from the first electronic device. Further, the data cable 4170 comprises a second connector 4172 configured to couple to a second electronic device (not illustrated). For example, the first and second connectors 4171 and 4172 may be plugs or sockets configured to receive a corresponding counterpart of an electronic device. The first and the second connector 4171, 4172 form cable ends of the data cable 4170.

The data cable 4170 additionally comprises two conversion circuits 4173 and 4174 coupled between the first connector 4171 and the second connector 4172. As illustrated in FIG. 41*e*, the conversion circuits 4173 and 4174 may be arranged in the same housings (casings) like the connectors 4171 and 4172. In other examples, the conversion circuits 4173 and 4174 and the connectors 4171 and 4172 may be arranged in separate housings.

The first conversion circuit 4173 of the two conversion circuits 4173 and 4174 is configured to receive the input signal from the first connector 4171 and to generate a data signal based on the input signal. The data signal comprises a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data encoded to the input signal, and the second signal edge and the third signal edge are separated by a second time period corresponding to second data encoded to the input signal. The data signal is compliant to the STEP protocol (e.g. according to one or more of the aspects described above). Therefore, a sum of the first time period and the second time period may be lower than $10^{-7}$ s, $10^{-8}$ s, $10^{-9}$ s, $10^{-10}$ s, $10^{-11}$ s, or $10^{-12}$s. In other words, the first conversion circuit 4173 converts the input signal to the STEP protocol.

The second conversion circuit 4174 of the two conversion circuits 4173 and 4174 is configured to receive the data signal from the first conversion circuit 4174 and to generate an output signal compliant to the communication protocol based on the data signal. In other words, the second conversion circuit 4174 converts the STEP protocol compliant data signal back to the communication protocol of the received input signal.

The second connector 4172 is configured output the output signal to the second electronic device.

Also FIG. 41*e* illustrates an active data cable. An input signal according to a communication protocol different from the STEP protocol is converted to the STEP protocol for propagating the data along the data cable 4170 at high rate and with low power. Before outputting the data, the data is converted back to the initial communication protocol.

Like for data cable 4160, different types of cables may be used for connecting the first connector 4171 and the second connector 4172. For example, a coaxial cable may be used so that the first conversion circuit 4173 is coupled to the second conversion circuit 4174 via the coaxial cable. The data transfer via the data cable 4170 may in some examples be single ended. For example, the first conversion circuit 4173 may be configured to output the data signal single ended to the second conversion circuit 4174 via the coaxial cable.

In some examples, the data may alternatively be transmitted in a differential manner via the data cable 4170. For example, the first conversion circuit may be further configured to generate a second data signal based on the input signal (the input signal may be single ended or differential). The second data signal is inverted with respect to the data signal. The second conversion circuit 4174 may accordingly be configured to generate the output signal further based on the second data signal (the output signal may be single ended or differential).

In a coaxial configuration, the first conversion circuit 4173 may be coupled to the second conversion circuit 4174 via a pair of coaxial cables, wherein the first conversion circuit 4173 may be configured to output the data signal and the second data signal to different ones of the pair of coaxial cables.

As an alternative to coaxial cables, a twisted pair cable may be used for differential data transmission. Accordingly, the first conversion circuit 4173 may be coupled to the second conversion circuit 4174 via the twisted pair cable. Further, the first conversion circuit 4173 may be configured to output the data signal and the second data signal to different lines of the twisted pair cable.

In the foregoing, single direction data handling via the data cable 4170 was described. However, in some examples, dual direction data handling may be supported by the data cable 4170. For example, the second connector 4172 may be configured to receive a second input signal compliant to the communication protocol from the second electronic device. The second conversion circuit 4174 is configured to receive the second input signal from the second connector 4172 and to generate a third data signal based on the second input signal. The third data signal comprises a sequence of a fourth signal edge of the first type, a fifth signal edge of the second type, and a sixth signal edge of the first type. The fourth signal edge and the fifth signal edge are separated by a third time period corresponding to third data encoded to the second input signal, and the fifth signal edge and the sixth signal edge are separated by a fourth time period corresponding to fourth data encoded to the second input signal. The third data signal is compliant to the STEP protocol (e.g. according to one or more of the aspects described above). Therefore, a sum of the third time period and the fourth time period may be lower than $10^{-7}$ s, $10^{-8}$ s, $10^{-9}$ s, $10^{-10}$ s, $10^{-11}$ s, or $10^{-12}$ s. The first conversion circuit 4173 is configured to receive the third data signal from the second conversion circuit 4174 and to generate a second output signal compliant to the communication protocol based on the third data signal. The first connector 4171 is configured output the second output signal to the first electronic device.

The data transmission via the data cable 4170 from the first electronic device to the second electronic device and vice versa may be simultaneous (concurrent). For example, the first conversion circuit 4173 may be configured to simultaneously (concurrently) generate the data signal and the second output signal.

Data may, e.g., be transferred via the data cable 4170 using four single ended coaxial cables for one direction (e.g. from the first connector 4171 to the second connector 4172) and four single ended coaxial cables for the opposite direction (e.g. from the second connector 4172 to the first connector 4171). Assuming that 20 Gb/s of data may be transferred via each of the coaxial cables, 80 Gb/s of data may be simultaneously (concurrently) transferred in each direction via the data cable 4170 so that in total 160 Gb/s of data may be transferred via the data cable 4170.

In other examples, a “passive” cable (a cable without any active electronic components) instead of the active cables 4160 and 4170 may be used for exchanging data between two electronic devices. As described above, a passive data cable with a single or multiple coaxial cables in a bundle may be used for data exchange according to the STEP protocol. For example, STEP compliant data transfer may be done for each of the coaxial cables (single ended data transmission). Alternatively, STEP compliant data transfer may be done using differential coaxial cable pairs (e.g. two coaxial cables for one STEP compliant transmission link). Alternatively, a passive data cable with a twisted pair cable may be used.

Using the STEP protocol for data exchange between electronic devices may enable lower power consumption, lower costs, lower size and lower oscillation risk.

Another use case for the STEP protocol may be communication between multiple dies or on-die communication. In connection with FIGS. 42*a* to 42*c*, some semiconductor packages and dies are illustrated that use the STEP protocol for communication.

FIG. 42*a* illustrates a semiconductor package 4200. The semiconductor package 4200 is a metal, plastic, glass or ceramic casing (housing) containing semiconductor electronic components. For reasons of clarity, the casing is not illustrated in FIG. 42*a*. The semiconductor package 4200 may comprise one or more terminals (not illustrated) for externally contacting the semiconductor electronic components. For example, the semiconductor package 4200 may comprises one or more leads, pins and/or contact pads. Further, the semiconductor package 4200 may comprise one or more heat sinks (not illustrated) for dissipating waste heat of the semiconductor electronic components.

As described above, the semiconductor package 4200 comprises semiconductor electronic components. The semiconductor package 4200 comprises at least a first semiconductor die 4210 comprising a first integrated circuit 4211, and a second semiconductor die 4220 comprising a second integrated circuit 4221. The semiconductor dies 4210 and 4220 are (small) blocks of semiconducting material (e.g. silicon) on which given functional circuits (i.e. the integrated circuits 4211 and 4221) are fabricated. For example, the first integrated circuit 4211 and the second integrated circuit 4221 may be one or more of a Central Processing Unit (CPU), a CPU core, a Graphics Processing Unit (GPU), a GPU core, memory, etc. However, the semiconductor package 4200 is not limited to the foregoing examples. The first integrated circuit 4211 and the second integrated circuit 4221 may, in general, be any set of electronic components implemented in the first semiconductor die 4210 and the second semiconductor die 4220, respectively.

Further, the semiconductor package 4200 comprises a transmission link 4230 coupling the first semiconductor die 4210 and the second semiconductor die 4220 for data exchange.

The first semiconductor die 4210 further comprises an apparatus 4212 for generating a data transmit signal. The apparatus 4212 for generating the data transmit signal comprises a processing circuit (e.g. a DTC) configured to generate the data transmit signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted from the first integrated circuit 4211 to the second integrated circuit 4221, and the second signal edge and the third signal edge are separated by a second time period corresponding to second data to be transmitted from the first integrated circuit 4211 to the second integrated circuit 4221. The processing circuit is configured to generate the data signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 4212 for generating the data signal comprises an output interface circuit configured to output the data transmit signal to the transmission link 4230.

The data may in some example be transferred in a differential manner. Therefore, the processing circuit may be further configured to generate a second data transmit signal that is inverted with respect to the data transmit signal. Accordingly, the output interface circuit may be further configured to output the second data transmit signal to the transmission link 4230.

By using the STEP protocol, data may be transmitted from the first integrated circuit 4211 to the second integrated circuit 4221 at a high data rate, with low latency and with low power consumption (e.g. less than 0.5 pJ/bit).

The STEP protocol may optionally further be used for receiving data. For example, the interface circuit may be further configured to receive a data receive signal via the transmission link 4230. Alternatively, the first semiconductor die 4210 may comprises a dedicated (second) interface circuit for receiving the data receive signal. The first semiconductor die 4210 may further comprise an apparatus 4213 for decoding the data receive signal.

The apparatus 4213 for decoding the data receive signal comprises a processing circuit (e.g. a TDC) configured to determine a sequence of a fourth signal edge of the first type, a fifth signal edge of the second type, and a sixth signal edge of the first type in the data receive signal. Further, the apparatus 4213 for decoding the data receive signal comprises a demodulation circuit configured to determine first data for the first integrated circuit 4211 based on a third time period between the fourth signal edge and the fifth signal edge, and to determine second data for the first integrated circuit 4211 based on a fourth time period between the fifth signal edge and the sixth signal edge. The apparatus 4213 for decoding the data receive signal is configured to decode the data receive signal compliant to the STEP protocol (e.g. according to one or more of the aspects described above).

In some examples, the data may be received in a differential manner. Therefore, the interface circuit may be further configured to receive a second data receive signal from the transmission link 4230 that is inverted with respect to the data signal. Accordingly, the processing circuit may be configured to determine the fourth signal edge, the fifth signal edge, and the sixth signal edge further based on the second data receive signal.

Using the STEP protocol may allow the first integrated circuit 4211 to receive data at a high data rate, with low latency and with low power consumption.

For exchanging data with the first integrated circuit 4211, the second integrated circuit 4221 may comprise an according apparatus 4222 for generating the data receive signal and an according apparatus 4223 for decoding the data transmit signal.

In order to fulfill the (strict) requirements for inter-die data exchange within a semiconductor package, the STEP protocol may be adapted. In some examples, a lower modulation scheme may be used for the STEP protocol. For example, only two bits may be encoded to one signal edge rather than three bits as described above for various examples. In other words, the first data to be transmitted from the first integrated circuit 4210 to the second integrated circuit 4220 may be two bits (or even less). In some examples, the time resolution may be scaled. For example, the symbol separation time (i.e. the time difference between different payload data symbols) may be increased compared to other applications. This may allow to improve the BER (e.g. to $10^{-19}$ or better) or to remove regulators from the circuitry for communication according to the STEP protocol so that area on the semiconductor dies 4210 and 4220 as well as power may be saved. In some examples, some of the above described transmit and/or receive features of the STEP protocol may be omitted since channel distortions along the transmission links 4230 are low and since the need for equalization is lower.

The transmission link 4230 may be implemented in many different ways. In the following, some exemplary implementations for the transmission link 4230 are described. The transmission link 4230 may, e.g., be implemented by short routing in the package (e.g. a few millimeters). For example, the transmission link 4230 may be one or more wires, or the transmission link 4230 may be one or more conductive tracks on a Printed Circuit Board (PCB) holding the first semiconductor die 4210 and the second semiconductor die 4220.

In other examples, advanced packaging methods may be used for connecting the semiconductor dies 4210 and 4220. For example, the first semiconductor die 4210 and the second semiconductor die 4220 may be mounted on a third semiconductor die (not illustrated), and the transmission link 4230 may be one or more conductive traces in a wiring layer stack of the third semiconductor die. In other words, a third semiconductor die may be used as a carrier with integrated transmission link 4230 for the semiconductor dies 4210 and 4220.

Another example using the STEP protocol for on-die communication is illustrated in FIG. 42*b*. FIG. 42*b* illustrates a semiconductor die 4240 comprising a first integrated circuit 4250 and a second integrated circuit 4260. The semiconductor die 4240 is a (small) block of semiconducting material (e.g. silicon) on which given functional circuits (i.e. the integrated circuits 4250 and 4260) are fabricated. Like the integrated circuits 4211 and 4221 described above, the first integrated circuit 4250 and the second integrated circuit 4260 may be any set of electronic components (e.g. a CPU or a memory). The semiconductor die 4240 may in some examples be a System on a Chip (SoC).

The semiconductor die 4240 further comprises a transmission link 4245 coupling the first integrated circuit 4250 and the second integrated circuit 4260. For example, the transmission link 4245 may be one or more conductive traces in a wiring layer stack of the semiconductor die 4240.

For communicating with the second integrated circuit 4260, the first integrated circuit 4250 comprises an apparatus 4251 for generating a data transmit signal. The apparatus 4251 for generating the data transmit signal comprises a processing circuit (e.g. a DTC) configured to generate the data transmit signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data to be transmitted from the first integrated circuit 4250 to the second integrated circuit 4260, and the second signal edge and the third signal edge are separated by a second time period corresponding to second data to be transmitted from the first integrated circuit 4250 to the second integrated circuit 4260. The processing circuit is configured to generate the data transmit signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 4251 for generating the data transmit signal comprises an output interface circuit configured to output the data transmit signal to the transmission link 4245.

The data may in some example be transferred in a differential manner. Therefore, the processing circuit may be further configured to generate a second data transmit signal that is inverted with respect to the data transmit signal. Accordingly, the output interface circuit may be further configured to output the second data transmit signal to the transmission link 4245.

By using the STEP protocol, data may be transmitted from the first integrated circuit 4250 to the second integrated circuit 4260 at a high data rate, with low latency and with low power consumption (e.g. less than 0.5 pJ/bit).

The STEP protocol may optionally further be used for receiving data. For example, the interface circuit may be further configured to receive a data receive signal via the transmission link 4245. Alternatively, the first integrated circuit 4250 may comprises a dedicated (second) interface circuit for receiving the data receive signal. The first integrated circuit 4250 may further comprise an apparatus 4252 for decoding the data receive signal.

The apparatus 4252 for decoding the data receive signal comprises a processing circuit (e.g. a TDC) configured to determine a sequence of a fourth signal edge of the first type, a fifth signal edge of the second type, and a sixth signal edge of the first type in the data receive signal. Further, the apparatus 4252 for decoding the data receive signal comprises a demodulation circuit configured to determine first data for the first integrated circuit 4250 based on a third time period between the fourth signal edge and the fifth signal edge, and to determine second data for the first integrated circuit 4250 based on a fourth time period between the fifth signal edge and the sixth signal edge. The apparatus 4252 for decoding the data receive signal is configured to decode the data receive signal compliant to the STEP protocol (e.g. according to one or more of the aspects described above).

In some examples, the data may be received in a differential manner. Therefore, the interface circuit may be further configured to receive a second data receive signal from the transmission link 4245 that is inverted with respect to the data signal. Accordingly, the processing circuit may be configured to determine the fourth signal edge, the fifth signal edge, and the sixth signal edge further based on the second data receive signal.

Using the STEP protocol may allow the first integrated circuit 4250 to receive data at a high data rate, with low latency and with low power consumption. The received and decoded data may be further processed by other circuitry of the first integrated circuit 4250.

For exchanging data with the first integrated circuit 4250, the second integrated circuit 4260 may comprise an according apparatus 4261 for generating the data receive signal and an according apparatus 4262 for decoding the data transmit signal.

As described above for inter-die data exchange, the STEP protocol may be adapted to the requirements for on-die data exchange. For example, a lower modulation scheme may be used. The first data to be transmitted from the first integrated circuit 4250 to the second integrated circuit 4260 may, e.g., be two bits or less. Similarly, some of the above described transmit and receive features of the STEP protocol may be omitted.

Another semiconductor package 4270 is illustrated in FIG. 42*c*. The semiconductor package 4270 comprises a semiconductor die 4275 comprising an integrated circuit (not illustrated). The semiconductor die 4275 is arranged in a casing (housing) of the semiconductor package 4270. For reasons of clarity, the casing is not illustrated in FIG. 42*c*. Like the integrated circuits 4211, 4221, 4250 and 4260 described above, the integrated circuit fabricated on the semiconductor die 4275 may be any set of electronic components (e.g. a CPU or a memory). The semiconductor package 4270 may optionally comprise one or more heat sinks (not illustrated) for dissipating waste heat of the semiconductor die 4275.

The semiconductor package 4270 further comprises an output terminal 4271 configured to output an output signal of the semiconductor package 4270. The output terminal 4271 is at least in part arranged on an outside surface of the semiconductor package 4270's casing so that it can be contacted by external entities for communicating with the semiconductor package 4270 (and in particular with the integrated circuit of the semiconductor die 4275). For example, the output terminal 4271 may be a lead or pin arranged on an outside surface of the semiconductor package 4270's casing as illustrated in FIG. 42*c*, or a contact pad arranged on an outside surface of the semiconductor package 4270's casing.

For providing the output signal, the semiconductor package 4270 comprises an apparatus 4280 for generating the output signal. The apparatus 4280 for generating the output signal may be fabricated on a separate (second) die as illustrated in FIG. 42*c*, or it may be fabricated on the semiconductor die 4275 together with the integrated circuit.

The apparatus 4280 for generating the output signal comprises a processing circuit (e.g. a DTC) configured to generate the output signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first output data of the integrated circuit, and the second signal edge and the third signal edge are separated by a second time period corresponding to second output data of the integrated circuit. The processing circuit is configured to generate the output signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 4280 for generating the output signal comprises an output interface circuit configured to output the output signal to the output terminal 4271.

The data may in some example be transferred in a differential manner. Therefore, the processing circuit may be further configured to generate a second output signal that is inverted with respect to the output signal. Accordingly, the output interface circuit may be further configured to output the second output signal to another output terminal of the semiconductor package 4270.

By using the STEP protocol, output data of the semiconductor package 4270's integrated circuit may be transmitted to external entities (e.g. external integrated circuits) at a high data rate, with low latency and with low power consumption.

The STEP protocol may optionally further be used for receiving data. For example, the semiconductor package 4270 may further comprise an input terminal 4272 configured to receive an input signal for the semiconductor package 4270. As indicated in FIG. 42*c*, the terminals 4271 and 4272 for outputting and receiving signal of/for the semiconductor package 4270 may be two separate physical entities (e.g. two leads, pins or contact pads). However, in some examples, the output terminal 4271 and the input terminal 4272 may be the same physical entity (e.g. a single lead, pin, or contact pad) used in a time division duplex configuration.

The semiconductor package 4270 may further comprise an apparatus 4290 for decoding the input signal. Like the apparatus 4280 for generating the output signal, the apparatus 4290 for decoding the input signal may be fabricated on the semiconductor die 4275 or on a separate die (e.g. together with the apparatus 4280 for generating the output signal).

The apparatus 4290 for decoding the input signal comprises a processing circuit (e.g. a TDC) configured to determine a sequence of a fourth signal edge of the first type, a fifth signal edge of the second type, and a sixth signal edge of the first type in the input signal. Further, the apparatus 4290 for decoding the data receive signal comprises a demodulation circuit configured to determine first input data based on a third time period between the fourth signal edge and the fifth signal edge, and to determine second input data based on a fourth time period between the fifth signal edge and the sixth signal edge. The apparatus 4290 for decoding the data receive signal is configured to decode the input signal compliant to the STEP protocol (e.g. according to one or more of the aspects described above).

The decoded input data may, e.g., be forwarded to the semiconductor die 4275's integrated circuit for further processing.

In some examples, the data may be received in a differential manner. Therefore, another input terminal of the semiconductor package 4270 may be further configured to receive a second input signal that is inverted with respect to the input signal. Accordingly, the processing circuit may be configured to determine the fourth signal edge, the fifth signal edge, and the sixth signal edge further based on the second input signal.

Using the STEP protocol may allow to receive the input data at a high data rate, with low latency and with low power consumption.

Using the STEP protocol for communication between multiple dies or for on-die communication as described above in connection with FIGS. 42*a* to 42*c* may enable a higher throughput, a reduction of required pins/leads/contact pads/etc., improved package routing (shorter routes) and reduced die area consumption.

The STEP protocol may enable to replace conventional serial interfaces in semiconductor packages or semiconductor dies (e.g. SoCs). Since distances in a semiconductor package are short, matching and channel equalization features of the STEP protocol may be reduced compared to other applications. The STEP protocol may allow to simplify routing within semiconductor packages or semiconductor dies and to reach challenging power requirements for data exchange in semiconductor packages or semiconductor dies.

Another use case for the STEP protocol are vehicles. A vehicle is an apparatus that comprises wheels driven by a motor (and optionally a powertrain system). In some examples, the vehicle may be a private vehicle or a commercial vehicle. In particular, the vehicle may be an automobile, a truck, a motorcycle, or a tractor. The number of sensors, processors, actors and communication modules in vehicles is continuously increasing. The amount of data generated and passed by/between these elements is increasing accordingly. The interconnection of these elements is challenging in terms of cable length, weight and cost. Using the STEP protocol in the vehicle may allow to improve the data exchange as will become more evident from the following examples described in connection with FIGS. 43*a* to 43*c*.

FIG. 43*a* illustrates a data aggregation device 4300 for a vehicle. The data aggregation device 4300 comprises an input interface circuit 4310 configured to couple to a plurality of sensors 4301-1, 4301-2, . . . , 4301-*n* installed in the vehicle via a plurality of first transmission links 4302-1, 4302-2, . . . , 4302-*n*. Although three sensors are illustrated in FIG. 43*a*, it is to be noted that any number of sensors may be used. For example, the input interface circuit 4310 may couple to more than three sensors or to less than three sensors. The plurality of sensors 4301-1, 4301-2, . . . , 4301-*n* may sense the same or different physical quantities. For example, one or more of the plurality of sensors 4301-1, 4301-2, . . . , 4301-*n* may sense a pressure (e.g. tire pressure), an acceleration (e.g. for determining an impact or a crash), a magnetic field (e.g. for determining a steering angle or a rotation speed of a tire), or a temperature (e.g. ambience temperature or motor temperature).

The input interface 4310 is configured to receive sensor data from the plurality of sensors 4301-1, 4301-2, . . . , 4301-*n*, and further to aggregate the sensor data from the plurality of sensors 4301-1, 4301-2, . . . , 4301-*n*. The aggregation of the sensor data from the plurality of sensors 4301-1, 4301-2, . . . , 4301-*n* is a process in which the sensor data from the plurality of sensors 4301-1, 4301-2, . . . , 4301-*n* is put together to a combined data set. For example, a plurality of data streams received from the plurality of sensors 4301-1, 4301-2, . . . , 4301-*n* and each describing measurement results of one of the plurality of sensors 4301-1, 4301-2, . . . , 4301-*n* may be combined to a single data stream comprising the measurement results of all sensors of the plurality of sensors 4301-1, 4301-2, . . . , 4301-*n*. For aggregating the sensor data from the plurality of sensors 4301-1, 4301-2, . . . , 4301-*n*, the input interface 4310 may, e.g., comprises an aggregation circuit 4313 like a processor or an Application-Specific Integrated Circuit (ASIC).

The data aggregation device 4300 further comprises processing circuit 4320 configured to generate a data signal. The processing circuit 4320 (e.g. a DTC) is configured to generate the data transmit signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the aggregated sensor data, and the second signal edge and the third signal edge are separated by a second time period corresponding to second data of the aggregated sensor data. The processing circuit is configured to generate the data signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the data aggregation device 4300 comprises an output interface circuit 4330 configured to output the data signal to a second transmission link 4303 for forwarding the aggregated sensor data to processing facilities of the vehicle.

The data may in some example be transferred in a differential manner. Therefore, the processing circuit 4320 may be further configured to generate a second data signal that is inverted with respect to the data signal. Accordingly, the output interface circuit 4330 may be further configured to output the second data signal to the second transmission link 4303.

By aggregating the sensor data of the plurality of sensors 4301-1, 4301-2, . . . , 4301-*n*, the data aggregation device 4300 may allow to combine the plurality of low data rate signals output of the plurality of sensors 4301-1, 4301-2, . . . , 4301-*n* to a single high rate data signal (e.g. single ended or differential). In other words, the processing circuit 4320 is configured to generate the data signal to exhibit a higher data rate than the sensor data received via a single one of the plurality of first transmission links 4302-1, 4302-2, . . . , 4302-*n* by the input interface circuit 4310.

Accordingly, the number of cables and, hence, a cable length required for transporting the sensor data (e.g. measurement results) of the plurality of sensors 4301-1, 4301-2, . . . , 4301-*n* to processing facilities of the vehicle for evaluating the sensor data may be reduced compared to conventional approaches. By reducing the amount of cables, a weight of the vehicle as well as manufacturing costs may be reduced. Further, using the STEP protocol may allow to forward the sensor data of the plurality of sensors 4301-1, 4301-2, . . . , 4301-*n* to the processing facilities of the vehicle at a high data rate, with low latency and with low power consumption.

In general, any communication protocol may be used for the data transfer from the plurality of sensors 4301-1, 4301-2, . . . , 4301-*n* to the data aggregation device 4300. In some examples, the STEP protocol may be used for transferring the sensor data from the plurality of sensors 4301-1, 4301-2, . . . , 4301-*n* to the input interface circuit 4310. In other words, the plurality of sensors 4301-1, 4301-2, . . . , 4301-*n* may be configured to generate sensor signals that are compliant to the STEP protocol (and e.g. comprise an apparatus for generating the sensor signal based on its sensor data according to one or more aspects described above).

In some examples, the data aggregation device 4300 (e.g. the aggregation circuit 4313) may be configured combine the STEP compliant sensor signals to the aggregated sensor data without decoding the individual sensor signals received from the plurality of sensors 4301-1, 4301-2, . . . , 4301-*n*.

In other examples, the data aggregation device 4300 may be configured to decode the sensor signals before aggregating the sensor data. For example, the input interface circuit 4310 may comprise a processing circuit 4311 configured to determine a sequence of a fourth signal edge of the first type, a fifth signal edge of the second type, and a sixth signal edge of the first type in a sensor signal received from one of the plurality sensors 4301-1, 4301-2, . . . , 4301-*n* by the input interface circuit 4310. Further, a demodulation circuit of the input interface circuit 4310 may be configured to determine first sensor data of the one of the plurality sensors 4301-1, 4301-2, . . . , 4301-*n* based on a third time period between the fourth signal edge and the fifth signal edge, and to determine second sensor data of the one of the plurality sensors 4301-1, 4301-2, . . . , 4301-_n_ based on a fourth time period between the fifth signal edge and the sixth signal edge. The demodulation circuit 4312 is configured to decode the input signal compliant to the STEP protocol (e.g. according to one or more of the aspects described above). The aggregation circuit 4313 may combine the decoded pieces of sensor data to the aggregated sensor data.

In some examples, the data may be received in a differential manner from the plurality sensors 4301-1, 4301-2, . . . , 4301-_n_. Therefore, the input interface circuit 4310 may be further configured to receive a second sensor signal from the one of the plurality sensors 4301-1, 4301-2, . . . , 4301-_n_ that is inverted with respect to the sensor signal. Accordingly, the processing circuit 4311 may be configured to determine the fourth signal edge, the fifth signal edge, and the sixth signal edge further based on the second sensor signal.

The sensor signals of the other sensors may be decoded in the same manner.

Using the STEP protocol may allow to receive the input data with low latency and with low power consumption.

As described above, the STEP protocol may be used for implementing an (highly) efficient data aggregation unit in a vehicle. Further, the STEP protocol may be used for processing units of the vehicle that evaluate the sensor data. An exemplary data processing device 4340 for a vehicle is illustrated in FIG. 43_b_.

The data processing device 4340 comprises an input interface circuit 4343 configured to receive a data signal from a (first) transmission link 4341. The data signal carries sensor data from a plurality of sensors. For example, the data signal may be generated by a data aggregation device as described above. The data signal is compliant to the STEP protocol.

The data processing device 4340 comprises an apparatus 4350 for decoding that enables to decode the data signal. The apparatus 4350 for decoding comprises a (first) processing circuit 4351 (e.g. a TDC) configured to determine a sequence of a first signal edge of a first type, a second signal edge of a second type, and a third signal edge of the first type in the data signal. Again, the first type may be a rising edge and the second type be a falling edge, or the second type may be a rising edge and the first type be a falling edge.

Further, the apparatus 4350 for decoding comprises a demodulation circuit 4352 configured to determine first data of the sensor data based on a first time period between the first signal edge and the second signal edge, and to determine second data of the sensor data based on a second time period between the second signal edge and the third signal edge. The apparatus 4350 for decoding is configured to decode the data signal compliant to the STEP protocol (e.g. according to one or more of the aspects described above). A sum of the first time period and the second time period may, hence, be lower than $10^{-7}$ s, $10^{-8}$ s, $10^{-9}$ s, $10^{-10}$ s, $10^{-11}$ s, or $10^{-12}$ s.

The sensor data may in some examples be received in a differential manner from the transmission link 4341. Therefore, the input interface circuit 4343 may be further configured to receive a second data signal from the transmission link 4341 that is inverted with respect to the data signal. Accordingly, the processing circuit 4351 may be configured to determine the first signal edge, the second signal edge, and the third signal edge further based on the second data signal.

The data processing device 4340 further comprises a processor 4244 configured to generate control data for a controllable device of the vehicle based on the first data and the second data of the sensor data. The controllable device may be any unit or appliance installed in the vehicle that is responsive to an external control signal. For example, the controllable device may be a motor, an electric motor, an electronic device, an actuator, a communication device (module), etc.

The data processing device 4340 may optionally further comprise an apparatus 4360 for generating a control signal for the controllable device. The apparatus 4360 for generating the control signal comprises another (second) processing circuit 4361 (e.g. a DTC) configured to generate the control signal to comprise a sequence of a fourth signal edge of the first type, a fifth signal edge of the second type, and a sixth signal edge of the first type. The fourth signal edge and the fifth signal edge are separated by a third time period corresponding to first data of the control data, and the fifth signal edge and the sixth signal edge are separated by a fourth time period corresponding to second data of the control data. The other processing circuit 4361 is configured to generate the control signal compliant to the STEP protocol (e.g. according to one or more of the aspects described above). That is, a sum of the third time period and the fourth time period may be lower than $10^{-7}$ s, $10^{-8}$ s, $10^{-9}$ s, $10^{-10}$ s, $10^{-11}$ s, or $10^{-12}$ s.

Further, the apparatus 4360 for generating the control signal comprises an output interface circuit 4362 configured to output the data signal to another (a second) transmission link 4342 for forwarding the control signal to the controllable device of the vehicle.

The control data may in some examples be output in a differential manner to the other transmission link 4342. Therefore, the other processing circuit 4361 may be further configured to generate a second control signal that is inverted with respect to the control signal. Accordingly, the output interface circuit 4362 may be further configured to output the second control signal to the other transmission link 4342.

By using the STEP protocol, the data processing device 4340 may communicate with other devices of the vehicle at a high data rate, with low latency and with low power consumption.

In some examples, the data processing device 4340 may further comprise a memory device 4345 such as Read-Only Memory (ROM), Random Access Memory (RAM) and/or a non-volatile data storage. The memory device 4345 may be used for storing data output by the processor 4344 (e.g. control data, updated configuration/calibration data, etc.) or for storing data for the processor 4344 (e.g. a software, configuration/calibration data, etc.). The STEP protocol may, in some examples, further be used for the data exchange between the processor 4344 and the memory device 4345.

For example, the other processing circuit 4361 may be further configured to generate a write signal for the memory device 4345 that comprises data of the processor 4344 to be written to the memory device 4345. For example, the other processing circuit 4361 may be configured to generate the write signal to comprise a sequence of a seventh signal edge of the first type, an eighth signal edge of the second type, and a ninth signal edge of the first type. The seventh signal edge and the eighth signal edge are separated by a fifth time period corresponding to first data of the processor 4344 to be written to the memory device 4345, and the eighth signal edge and the ninth signal edge are separated by a sixth time period corresponding to second data of the processor 4344 to be written to the memory device 4345. The other processing circuit 4361 is configured to generate the write signal compliant to the STEP protocol (e.g. according to one or more of the aspects described above). The memory device 4345 may comprise an according apparatus for decoding the write signal and a memory element for storing the decoded data of the write signal.

Similarly, the memory device 4345 may provide a read signal comprising data for the processor 4344 in compliance with the STEP protocol. The apparatus 4350 for decoding may be used for decoding the read signal and providing the decoded data of the read signal to the processor 4344. The processing circuit 4351 may be configured to determine a sequence of a tenth signal edge of the first type, an eleventh signal edge of the second type, and a twelfth signal edge of the first type in the read signal output by the memory device 4345. Further, the demodulation circuit 4352 may be configured to determine first data for the processor based 4344 on a seventh time period between the tenth signal edge and the eleventh signal edge, and to determine second data for the processor 4344 based on an eighth time period between the eleventh signal edge and the twelfth signal edge. The demodulation circuit 4352 is configured to decode the read signal compliant to the STEP protocol (e.g. according to one or more of the aspects described above).

FIG. 43*c* illustrates a vehicle 4370 comprising a plurality of sensors 4371-1, 4371-2, . . . 4371-*n* together with a data aggregation device 4380 and a data processing device 4390 as described above. The elements exchange data compliant to the STEP protocol as indicated in FIG. 43*c*.

Similar to what is described above, the data aggregation device 4380 comprises a first interface circuit configured to couple to the plurality of sensors 4371-1, 4371-2, . . . 4371-*n* via a plurality of first transmission links 4372-1, 4372-2, . . . 4372-*n*. The sensor data is transmitted compliant to the STEP protocol from the plurality of sensors 4371-1, 4371-2, . . . 4371-*n* to the aggregation device 4380. The input interface is further configured to aggregate the sensor data from the plurality of sensors 4371-1, 4371-2, . . . 4371. A processing circuit of the data aggregation device 4380 is configured to generate a data signal that comprises a sequence of a first signal edge of a first type, a second signal edge of a second type, and a third signal edge of the first type. The first signal edge and the second signal edge are separated by a first time period corresponding to first data of the aggregated sensor data, and the second signal edge and the third signal edge are separated by a second time period corresponding to second data of the aggregated sensor data. In other words, the processing circuit generates the data signal compliant to the STEP protocol. Hence, a sum of the third time period and the fourth time period may be lower than $10^{-7}$ s, $10^{-8}$ s, $10^{-9}$ s, $10^{-10}$ s, $10^{-11}$ s, or $10^{-12}$ s. A second interface circuit of the data aggregation device 4380 is configured to output the data signal to a second transmission link 4373.

The data aggregation device 4380 allows to combine the multiple low-rate data streams from the plurality of sensors 4371-1, 4371-2, . . . 4371-*n* to a single high-rate data signal. For example, a data rate of the data signal may be at least three, four, five, ten or twenty times higher than a data rate of each of the sensor data received via a single one of the plurality of first transmission links 4372-1, 4372-2, . . . 4372-*n*.

The data processing device 4390 is coupled to the data aggregation device 4380 via the second transmission link 4373. The data processing device 4390 comprises a third interface circuit configured to receive the data signal from the second transmission link 4373. Further, the data processing device 4390 comprises a processing circuit configured to determine a sequence of a fourth signal edge of the first type, a fifth signal edge of the second type, and a sixth signal edge of the second type in the data signal. The data processing device 4390 additionally comprises a demodulation circuit configured to determine third data of the sensor data based on a third time period between the fourth signal edge and the fifth signal edge, and to determine fourth data of the sensor data based on a fourth time period between the fifth signal edge and the sixth signal edge. In other words, the data processing device 4390 comprises an apparatus for decoding the data signal compliant to the STEP protocol. For example, the demodulation circuit is configured to demodulate the data signal compliant to the STEP protocol.

A processor 4391 of the data processing device 4390 is configured to generate control data for a controllable device 4376 of the vehicle based on the third data and the fourth data of the sensor data. In the example of FIG. 43*c*, the controllable device 4376 is a communication module for wireless communication.

As indicated in FIG. 43*c*, the data processing device 4390 may comprise further elements such as a memory device 4392. Also the data exchange between the processor 4391 and the other elements of the data processing device 4390 may be based on the STEP protocol.

For transmitting the control data to the controllable device 4376, the data processing device further comprises an apparatus for generating a control signal compliant to the STEP protocol. The apparatus for generating the control signal comprises another processing circuit configured to generate the control signal to comprise a sequence of a seventh signal edge of the first type, an eighth signal edge of the second type, and a ninth signal edge of the first type. The seventh signal edge and the eighth signal edge are separated by a fifth time period corresponding to first data of the control data, and the eighth signal edge and the ninth signal edge are separated by a sixth time period corresponding to second data of the control data. The other processing circuit is configured to generate the control signal compliant to the STEP protocol. That is, a sum of the fifth time period and the sixth time period may be lower than $10^{-7}$ s, $10^{-8}$ s, $10^{-9}$ s, $10^{-10}$ s, $10^{-11}$ s, or $10^{-12}$ s.

The apparatus for generating the control signal further comprises a fourth interface circuit configured to output the data signal to a third transmission link 4374 coupled to the controllable device 4376.

Accordingly, the controllable device 4376 may be controlled based on the sensor data of the plurality of sensors 4371-1, 4371-2, . . . 4371-*n* in an efficient manner. In particular, the data transfer between the individual elements of the vehicle 4370 may be at high rate, with low latency and with low power consumption. Further, the amount of cables may be reduced compared to conventional communication approaches.

Referring back to the exemplary implementation of the controllable device 4376 as a communication module for wireless communication, the control signal may, e.g., comprise information about data to be transmitted to a back-end or a network external of the vehicle 4370 so that the communication module is able to modulate a radio frequency carrier signal (a radio frequency oscillation signal) based on these pieces of information.

If the third transmission link 4374 is rather long, signal attenuation may become noticeable. Accordingly, a repeater circuit 4375 may optionally be coupled between the fourth interface circuit of the data processing device 4390 and the controllable device 4376. The repeater circuit 4375 is configured to receive the control signal from the third transmission link and to amplify the control signal. The amplified control signal is then output to the controllable device 4376 by the repeater circuit 4375.

The transmission links described above in connection with FIGS. 43*a* to 43*c* may be implemented in a plurality of different ways. The specific implementation of a transmission link may, e.g., be selected based on the length of the transmission link. For example, a transmission link may be implemented as one or more traces on a PCB, one or more coaxial cables, one or more flat flex cables, one or more Ethernet cables (e.g. CAT5, CAT6, etc.), one or more (shielded) twisted pair cables, one or more fibres, a combination thereof, etc. However, the above examples described in connection with FIGS. 43*a* to 43*c* are not limited to the aforementioned types of transmission links.

Another use case for the STEP protocol may be the data exchange between sensors and application processors in electronic devices like mobile phones, tablet computers, laptop computers or computers. For example, some implementations of cameras may integrate high throughput camera modules generating a single video data stream or multiple video data streams with high resolution.

Assuming a 4K camera module with four cameras each generating 10 bits/pixel at a frame rate of 60 fps, the required throughput is:

$$8\frac{\text{Megapixels}}{\text{camera}}\cdot 4\ \text{cameras}\cdot 10\frac{\text{bits}}{\text{pixel}}\cdot 60fps = 19.2Gbit/s$$

Assuming an 8K camera module with two cameras each generating 10 bits/pixel at a frame rate of 30 fps, the required throughput is:

$$32\frac{\text{Megapixels}}{\text{camera}}\cdot 2\ \text{cameras}\cdot 10\frac{\text{bits}}{\text{pixel}}\cdot 30fps = 19.2Gbit/s$$

For supporting a throughput of about 20 Gbit/s, conventional approaches using protocols like DPHY and/or Inter-Integrated Circuit, I2C, would result in extensive wires (e.g. 16 wires including 12 matched high frequency wires) to be used and a large size (footprint) due to the wires, connectors, etc. Large connectors as required for the extensive wires are expensive. The conventional solution also requires expensive volume space for the cable within a device and results in expensive routing on the board.

Using the STEP protocol may allow to rearrange the data in manner such that the footprint may be reduced significantly. Also, there may be reductions in cost and power consumption. Some examples of electronic devices using the STEP protocol for exchanging data between a camera module and an application processor are described in the following in connection with FIGS. 44*a* to 44*c*.

FIG. 44*a* illustrates an electronic device 4400 (e.g. an imaging system or a communication device such as a mobile phone, a tablet computer, a laptop computer or a computer) comprising at least one sensor device 4410 (e.g. an imaging device) and a processing device 4420 (e.g. an image processing device). The sensor device 4410 and the processing device 4420 are coupled via a transmission link 4405 (e.g. a flat cable).

The sensor device 4410 comprises a camera element (module) 4411 configured to generate image data. For example, the image data may comprise at least one video data stream. The video data stream may, e.g., exhibit a data rate of more than 5.5, 10 or 15 Gbit/s. The camera element 4411 may comprises one or more cameras. For example, the camera element 4411 may comprise a first camera configured to generate a first video data stream, and a second camera configured to generate a second video data stream. The camera element 4411 is configured to generate the image data to comprise the first video data stream and the second video data stream. In other words, the camera element may be configured to combine the video data streams of its plurality of cameras to one image data stream.

For outputting the image data of the camera element 4411, the sensor device 4410 comprises communication circuitry 4412 compliant to the STEP protocol. The communication circuitry 4412 comprises a first processing circuit (e.g. a DTC) configured to generate the data signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the image data, and the second signal edge and the third signal edge are separated by a second time period corresponding to second data of the image data. The first processing circuit is configured to generate the data signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the communication circuitry 4412 comprises a first interface circuit configured to output the data signal to the transmission link 4405 (via a connector 4413). In other words, the first interface circuit acts as an output interface circuit.

The data may in some examples be output in a differential manner to the transmission link 4405. Therefore, the first processing circuit may be further configured to generate a second data signal that is inverted with respect to the data signal. Accordingly, the first interface circuit may be further configured to output the second data signal to the transmission link 4405.

The image data is transferred to the processing device 4420 via the transmission link 4405. For decoding the data signal, the processing device 4420 comprises communication circuitry 4422 compliant to the STEP protocol. The communication circuitry 4422 comprises a second interface circuit configured to receive the data signal from the transmission link 4405 (via a connector 4423). The second interface circuit acts as an input interface circuit.

Further, the communication circuitry 4422 comprises a second processing circuit (e.g. a TDC) configured to determine a sequence of a fourth signal edge of the first type, a fifth signal edge of the second type, and a sixth signal edge of the second type in the data signal.

Further, the communication circuitry 4422 comprises a demodulation circuit configured to determine third data based on a third time period between the fourth signal edge and the fifth signal edge, and to determine fourth data based on a fourth time period between the fifth signal edge and the sixth signal edge. The demodulation circuit is configured to demodulate the data signal compliant to the STEP protocol (e.g. according to one or more of the aspects described above). A sum of the third time period and the fourth time period may, hence, be lower than $10^{-7}$ s, $10^{-8}$ s, $10^{-9}$ s, $10^{-10}$ s, $10^{-11}$ s, or $10^{-12}$ s.

If the data is transmitted in a differential manner, the second interface circuit may be further configured to receive a second data signal (as generated by the first processing circuit of the communication circuitry 4412). Accordingly, the second processing circuit may be configured to determine the fourth signal edge, the fifth signal edge, and the sixth signal edge further based on the second data signal.

The demodulated data is forwarded to the application processor 4421 for further processing. For example, the application processor 4421 may be configured to determine (restore) the image data based on the third data and the fourth data.

Using the STEP protocol for exchanging data between the camera element 4411 and the application processor 4421 may allow to use only a small number of wires and small connectors for the transmission link. For example, for a throughput of about 20 Gbit/s, a flat cable with six wires may be sufficient for transmitting the image from the camera element 4411 to the application processor 4421. A single STEP link using two wires may be sufficient for the data transfer from the camera element 4411 to the application processor 4421 since the STEP protocol may enable a data rate of 20 Gbit/s or more on a single differential link. Similarly, two additional wires may be used for data transfer from the application processor 4421 to the camera element 4411 (e.g. for transmitting control data). Further, two more wires (power & ground) are used for the power supply. Compared to conventional approaches using, e.g., the D-PHY or the M-PHY protocol, a significant amount of wires may be saved. Accordingly, smaller connectors for the cable may be used. A STEP link may occupy approximately the same spectral bandwidth as a D-PHY or a M-PHY link (which are used today according to the Camera Serial Interface, CSI, protocol). Since there is no need to improve the high frequency quality of the flat cable and the connectors (e.g. loss, matching, isolation, etc.,), transmission links of the same quality may be used for the STEP interface. As a result, the required space and costs may be reduced. Further, high rate, low latency and low power data exchange may be enabled.

In some examples, the sensor device 4410 may additionally comprise at least one further sensor element configured to generate sensor data. For example, the further sensor element may be one of a (digital) microphone and a light sensor. Accordingly, the first processing circuit of the communication circuity 4412 may be further configured to include the sensor data into the data signal. In other words, the first processing circuit may aggregate the image data and the sensor data.

As indicated above, data may in some examples be transmitted not only from the camera element 4411 to the application processor 4421, but also vice versa. For example, the processing device 4420 may transmit control data for controlling the camera element 4411 and/or the further sensor elements to the sensor device 4410 compliant to the STEP protocol.

The control data is generated by the application processor 4421. The communication circuity 4422 may comprises a third processing circuit (e.g. a DTC) for outputting a corresponding control signal. The third processing device is configured to generate the control signal to comprise a sequence of a seventh signal edge of the first type, an eighth signal edge of the second type, and a ninth signal edge of the first type. The seventh signal edge and the eighth signal edge are separated by a fifth time period corresponding to first data of the control data, and the eighth signal edge and the ninth signal edge are separated by a sixth time period corresponding to second data of the control data. The third processing circuit is configured to generate the data signal compliant to the STEP protocol (e.g. according to one or more of the aspects described above). Hence, a sum of the fifth time period and the sixth time period may be lower than $10^{-7}$ s, $10^{-8}$ s, $10^{-9}$ s, $10^{-10}$ s, $10^{-11}$ s, or $10^{-12}$ s.

The second interface circuit is configured to output the control signal to the transmission link 4405 (via the connector 4423). In other words, the second interface circuit acts as an output interface circuit.

Again, the control data may in some examples be output in a differential manner to the transmission link 4405. Therefore, the third processing circuit may be further configured to generate a second control signal that is inverted with respect to the control signal. Accordingly, the second interface circuit may be further configured to output the second control signal to the transmission link 4405.

The control data is transferred to the sensor device 4410 via the transmission link 4405. The first interface circuit of the sensor device 4410 is further configured to receive the control signal. In other words, the first interface circuit acts as an input interface circuit.

For decoding the control signal compliant to the STEP protocol, the communication circuitry 4412 of the sensor device 4410 may additionally comprise a fourth processing circuit (e.g. a TDC) configured to determine a sequence of a tenth signal edge of the first type, an eleventh signal edge of the second type, and a twelfth signal edge of the second type in the control signal.

Further, the communication circuitry 4412 may comprise a demodulation circuit configured to determine first control data based on a seventh time period between the tenth signal edge and the eleventh signal edge, and to determine second control data based on an eighth time period between the eleventh signal edge and the twelfth signal edge. The demodulation circuit is configured to demodulate the control signal compliant to the STEP protocol (e.g. according to one or more of the aspects described above). Hence, a sum of the seventh time period and the eighth time period may be lower than $10^{-7}$ s, $10^{-8}$ s, $10^{-9}$ s, $10^{-10}$ s, $10^{-11}$ s, or $10^{-12}$ s.

If the control data is transmitted in a differential manner as illustrated in FIG. 44*a*, the first interface circuit may be further configured to receive a second control signal (as generated by the third processing circuit of the communication circuitry 4422). Accordingly, the fourth processing circuit may be configured to determine the tenth signal edge, the eleventh signal edge, and the eleventh signal edge further based on the second control signal.

The demodulated data is forwarded to the camera element 4411 and/or the further sensor(s) of the sensor device 4410 so that the camera element 4411 and/or the further sensor(s) may adapt their operation according to the control data of the application processor 4421.

Although the camera element 4411 and the communication circuitry 4412 are illustrated as separate elements within the sensor device 4410, it is to be noted that the functionality of the communication circuitry 4412 may, in some examples, be integrated into the camera element 4411. Hence, examples of the present disclosure further relate to a camera element comprising (the functionality of) the communication circuitry 4412. Similarly, examples of the present disclosure further relate to an application processor comprising (the functionality of) the communication circuitry 4422. In other words, the camera element 4411 and the application processor 4421 may be able to natively exchange data compliant to the STEP protocol. It is to be further noted that the camera element 4411 is merely an example for a sensor element. Also other sensor elements (e.g. sensor elements for sensing other physical quantities than the camera element 4411) may be able to natively exchange data compliant to the STEP protocol. Accordingly, examples of the present disclosure generally relate to a sensor element comprising (the functionality of) the communication circuitry 4412.

Another example of an electronic device 4430 (e.g. an imaging system or a communication device such as a mobile phone, a tablet computer, a laptop computer or a computer) using bridge circuitry for converting and exchanging data using the STEP protocol is illustrated in FIG. 44*b*.

The electronic device 4430 comprises at least one sensor device 4440 (e.g. an imaging device) and a processing device 4450 (e.g. an image processing device). The sensor device 4440 and the processing device 4450 are coupled via a transmission link 4435 (e.g. a flat cable).

The sensor device 4440 comprises a sensor element 4441. As indicated in FIG. 44*b*, the sensor element 4441 may be a camera element (e.g. as described above in connection with FIG. 44*a*). However, the sensor element 4441 may, in general, be any kind of sensor element (e.g. microphone, magnetic sensor or light sensor). The sensor element 4441 generates sensor data. The sensor element 4441 may be configured to generate the sensor data compliant to a conventional protocol. For example, if the sensor data comprises image data, the sensor element 4441 may be configured to generate the sensor data compliant to the CSI protocol. Similarly, the sensor element 4441 may, e.g., be configured to generate the sensor data compliant to the I2C protocol, or the Integrated-Interchip-Sound, I2S, protocol if the sensor data comprises sound data. However, the sensor element 4441 is not limited to these specific protocols—any suitable protocol may be used.

For transmitting the sensor data to the processing device 4450, the sensor device 4440 comprises a first bridge circuit 4442. The first bridge circuit 4442 converts the sensor data to the STEP protocol and outputs the converted sensor data to the transmission link 4435.

The first bridge circuit 4442 comprises a first interface circuit configured to receive sensor data from the sensor element 4441. The first interface circuit is configured to receive the sensor data compliant to the respective protocol used by the sensor element 4441. For example, if the sensor data comprises image data, the first interface circuit may be configured to receive the image data compliant with the CSI protocol.

The first bridge circuit 4442 further comprises a first processing circuit (e.g. a DTC) configured to generate a data signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the sensor data, and the second signal edge and the third signal edge are separated by a second time period corresponding to second data of the sensor data. The first processing circuit is configured to generate the data signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the first bridge circuit 4442 comprises a second interface circuit configured to output the data signal to the transmission link 4435 (via a connector 4443).

The sensor data may in some examples be output in a differential manner to the transmission link 4435. Therefore, the first processing circuit may be further configured to generate a second data signal that is inverted with respect to the data signal. Accordingly, the second interface circuit may be further configured to output the second data signal to the transmission link 4435.

The sensor data is transferred to the processing device 4450 via the transmission link 4435. For providing the sensor data in a desired/required scheme (format) to the application processor 4450, the processing device 4450 comprises another bridge circuit 4452.

The second bridge circuit 4452 comprises a third interface circuit configured to receive the data signal from the transmission link 4435 (via a connector 4453). Further, the second bridge circuit 4452 comprises a second processing circuit (e.g. a TDC) configured to determine a sequence of a fourth signal edge of the first type, a fifth signal edge of the second type, and a sixth signal edge of the second type in the data signal.

Further, the second bridge circuit 4452 comprises a demodulation circuit configured to determine third data based on a third time period between the fourth signal edge and the fifth signal edge, and to determine fourth data based on a fourth time period between the fifth signal edge and the sixth signal edge. The demodulation circuit is configured to demodulate the data signal compliant to the STEP protocol (e.g. according to one or more of the aspects described above). A sum of the third time period and the fourth time period may, hence, be lower than $10^{-7}$ s, $10^{-8}$ s, $10^{-9}$ s, $10^{-10}$ s, $10^{-11}$ s, or $10^{-12}$ s.

If the sensor data is transmitted in a differential manner, the third interface circuit may be further configured to receive a second data signal (as generated by the first processing circuit of the first bridge circuit 4442). Accordingly, the second processing circuit may be configured to determine the fourth signal edge, the fifth signal edge, and the sixth signal edge further based on the second data signal.

The second bridge circuit 4452 additionally comprises a modulation circuit configured to generate an output signal compliant to a communication protocol based on the first data and the second data (based on the data demodulated by the demodulation circuit). A fourth interface circuit of the second bridge circuit 4452 is configured to output the output signal to the application processor 4451. The second bridge circuit 4452, hence, performs a data conversion from the STEP protocol to a data protocol supported by the application processor 4451. For example, the communication protocol may be one of Peripheral Component Interconnect express (PCIe), D-PHY, M-PHY or USB.

The data may be output by the second bridge circuit in a single-ended manner (as described above) or in a differential manner. Accordingly, the modulation circuit may, in some examples, further be configured to generate a second output signal that is inverted with respect to the output signal. The fourth interface circuit may be further configured to output the second output signal to the application processor 4451.

The sensor data in the output signal is subsequently evaluated by the application processor 4451. For example, if the sensor data comprises image data, the application processor 4451 may be configured to determine (restore) the image data from the output signal.

The bridge circuits 4442 and 4452 may, in some examples, further be configured to enable data transmission from the application processor 4451 to the sensor element 4441. For example, the application processor 4451 may be configured to generate control data. The fourth interface of the second bridge circuit 4452 may be accordingly configured to receive the control data compliant to the used communication protocol from the application processor 4451. The control data is converted by the second bridge circuit 4452 to the STEP protocol. Therefore, the second bridge circuit 4452 may, e.g., comprise a third processing circuit (e.g. a DTC) configured to generate a control signal to comprise a sequence of a seventh signal edge of the first type, an eighth signal edge of the second type, and a ninth signal edge of the first type. The seventh signal edge and the eighth signal edge are separated by a fifth time period corresponding to first data of the control data, and the eighth signal edge and the ninth signal edge are separated by a sixth time period corresponding to second data of the control data. The third processing circuit is configured to generate the data signal compliant to the STEP protocol (e.g. according to one or more of the aspects described above). Hence, a sum of the fifth time period and the sixth time period may be lower than $10^{-7}$ s, $10^{-8}$ s, $10^{-9}$ s, $10^{-10}$ s, $10^{-11}$ s, or $10^{-12}$ s.

The third interface circuit of the second bridge circuit 4452 may accordingly be configured to output the control signal to the transmission link 4435 (via the connector 4453).

Similar to what is described above for the sensor data, the control data may in some examples be output in a differential manner to the transmission link 4435. Therefore, the third processing circuit may be further configured to generate a second control signal that is inverted with respect to the control signal. Accordingly, the third interface circuit may be further configured to output the second control signal to the transmission link 4435.

The control data is transferred to the sensor device 4440 via the transmission link 4435. The second interface circuit of the sensor device 4430 may further be configured to receive the control signal.

For decoding the control signal compliant to the STEP protocol, the first bridge circuit 4442 may additionally comprise a fourth processing circuit (e.g. a TDC) configured to determine a sequence of a tenth signal edge of the first type, an eleventh signal edge of the second type, and a twelfth signal edge of the second type in the control signal.

Further, the first bridge circuit 4442 may comprise a demodulation circuit configured to determine first control data based on a seventh time period between the tenth signal edge and the eleventh signal edge, and to determine second control data based on an eighth time period between the eleventh signal edge and the twelfth signal edge. The demodulation circuit is configured to demodulate the control signal compliant to the STEP protocol (e.g. according to one or more of the aspects described above). Hence, a sum of the seventh time period and the eighth time period may be lower than $10^{-7}$ s, $10^{-8}$ s, $10^{-9}$ s, $10^{-10}$ s, $10^{-11}$ s, or $10^{-12}$ s.

If the control data is transmitted in a differential manner, the second interface circuit may be further configured to receive a second control signal (as generated by the third processing circuit of the second bridge circuit 4452). Accordingly, the fourth processing circuit may be configured to determine the tenth signal edge, the eleventh signal edge, and the eleventh signal edge further based on the second control signal.

The control data is subsequently forwarded to the sensor element 4441. For example, the first interface of the first bridge circuit 4442 may be configured to output the first control data and the second control data compliant to the communication protocol used for communication between the sensor element 4441 and the first bridge circuit 4442.

Similar to what is described above for the electronic device 4400, using the bridge circuits 4442 and 4452 for enabling data exchange between the sensor element 4441 and the application processor 4451 according to the STEP protocol may allow to use only a small number of wires and small connectors for the transmission link 4435. As a result, the required space and costs may be reduced. Further, high rate, low latency and low power data exchange may be enabled. Using the bridge circuits 4442 and 4452 may allow to exchange data compliant to the STEP protocol even if the sensor element 4441 and the application processor 4451 do not natively support the STEP protocol.

The first bridge circuit 4441 may further be used for exchanging data of/for multiple sensor elements with the application processor 4451 as illustrated in FIG. 44*c*. FIG. 44*c* illustrates an electronic device 4460 comprising a sensor device 4470 with two additional sensor elements 4474 and 4475 compared to the sensor device 4440 illustrated in FIG. 44*b*.

The first interface of the first bridge circuit 4442, hence, receives the sensor data from three sensor elements. However, it is to be noted that three sensor elements are merely illustrated for illustrative purposes. In general, any number of sensor elements may be used. In other words, the first interface of the first bridge circuit 4442 may be configured to receive the sensor data from at least two sensor elements.

As indicated in FIG. 44*c*, the different sensor elements 4441, 4474 and 4475 may use different protocols for transmitting their respective sensor data. Accordingly, the first interface of the first bridge circuit 4442 may be configured to (simultaneously) receive the sensor data from the sensor elements compliant to different protocols (e.g. the CSI protocol, the I2C protocol and the I2S protocol).

The sensor element application processor interconnects described above in connection with FIGS. 44*a* to 44*c* may allow to use only a small number of wires between the sensor element and the application processor. For example, a flat cable used as transmission link as well as the (high frequency) connectors may be chosen small according to the examples illustrated in FIGS. 44*a* to 44*c*. The reduction in size may be enabled by integrating the STEP protocol into the devices on both sides of the transmission link or by using external bridge circuits (e.g. a periphery bridge silicon) that bundle and rearrange the sensor module data from the standard protocol to the STEP protocol/interface. By bundling/rearranging the data and passing it over the transmission link (e.g. a flat cable) using the STEP protocol, a sensor module may be connected to an application processor with a small number of wires in the flat cable and small connectors. As can be seen from the above examples, the proposed architecture may further allow to multiplex several sensor modules (e.g. camera, digital microphone, light sensor, etc.) into one serial high speed bus as provided by the STEP interface. Multiple sensor interfaces may be supported and connected to the application processor via the STEP interface.

The proposed architecture may be used for many electronic devices, such as mobile phones (smartphones), laptop computers, computers or tablet computers. Although a camera element is described in the examples of FIGS. 44*a* to 44*c*, it is to be noted that in general any type of sensor element may be used. The architecture illustrated in FIGS. 44*a* to 44*c* is not limited to camera elements.

As indicated above, another use case for the STEP protocol may be mobile communication devices since the STEP protocol may allow high rate and low latency data exchange at low power consumption.

FIG. 45*a* illustrates a user device 4500 in accordance with an aspect. The user device 4500 may be a mobile device in some aspects and comprises an application processor 4505, baseband processor 4510 (also referred to as a baseband module), Radio Front End Module (RFEM) 4515, memory 4520, connectivity module 4525, Near Field Communication (NFC) controller 4530, audio driver 4535, camera driver 4540, touch screen 4545, display driver 4550, sensors 4555, removable memory 4560, Power Management Integrated Circuit (PMIC) 4565 and smart battery 4570.

In some aspects, application processor 4505 may include, for example, one or more CPU cores and one or more of cache memory, LDO regulators, interrupt controllers, serial interfaces such as Serial Peripheral Interface (SPI), I2C or universal programmable serial interface module, Real Time Clock (RTC), timer-counters including interval and watchdog timers, general purpose Input-Output (IO), memory card controllers such as Secure Digital/Multi-Media Card (SD/MMC) or similar, USB interfaces, Mobile Industry Processor Interface (MIPI) interfaces and Joint Test Access Group (JTAG) test access ports.

In some aspects, baseband module 4510 may be implemented, for example, as a solder-down substrate including one or more integrated circuits, a single packaged integrated circuit soldered to a main circuit board, and/or a multi-chip module containing two or more integrated circuits.

As described above in connection with FIGS. 44*a* to 44*c*, the STEP protocol may be used for coupling the application processor 4505 and the sensors 4555. Similarly, other elements of the user device 4500 that exchange data may be coupled using a STEP interface/the STEP protocol.

FIG. 45*b* illustrates a base station or infrastructure equipment radio head 4580 in accordance with an aspect. The base station radio head 4580 may include one or more of application processor 4581, baseband modules 4582, one or more RFEMs 4583, memory 4584, power management circuitry 4585, power tee circuitry 4586, network controller 4587, network interface connector 4588, satellite navigation receiver module 4589, and user interface 4590.

In some aspects, application processor 4581 may include one or more CPU cores and one or more of cache memory, LDO regulator, interrupt controllers, serial interfaces such as SPI, I2C or universal programmable serial interface module, RTC, timer-counters including interval and watchdog timers, general purpose IO, memory card controllers such as SD/MMC or similar, USB interfaces, MIPI interfaces and JTAG test access ports.

In some aspects, baseband processor 4582 may be implemented, for example, as a solder-down substrate including one or more integrated circuits, a single packaged integrated circuit soldered to a main circuit board or a multi-chip module containing two or more integrated circuits.

In some aspects, memory 4584 may include one or more of volatile memory including Dynamic Random Access Memory (DRAM) and/or Synchronous Dynamic Random Access Memory (SDRAM), and Non-Volatile Memory (NVM) including high-speed electrically erasable memory (commonly referred to as Flash memory), Phase change Random Access Memory (PRAM), Magnetoresistive Random Access Memory (MRAM) and/or a three-dimensional crosspoint (3D XPoint) memory. Memory 4584 may be implemented as one or more of solder down packaged integrated circuits, socketed memory modules and plug-in memory cards.

In some aspects, power management integrated circuitry 4585 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 4586 may provide for electrical power drawn from a network cable to provide both power supply and data connectivity to the base station radio head 4580 using a single cable.

In some aspects, network controller 4587 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 4589 may include circuitry to receive and decode signals transmitted by one or more navigation satellite constellations such as the Global Positioning System (GPS), Globalnaya Navigatsionnaya Sputnikovaya Sistema (GLONASS), Galileo and/or BeiDou. The receiver 4589 may provide data to application processor 4581 which may include one or more of position data or time data. Application processor 4581 may use time data to synchronize operations with other radio base stations.

In some aspects, user interface 4590 may include one or more of physical or virtual buttons, such as a reset button, one or more indicators such as Light Emitting Diodes (LEDs) and a display screen.

Similar to what is described above for the user device 4500, elements of the base station radio head 4580 that exchange data with each other may be coupled using a STEP interface/the STEP protocol for enabling high rate, low latency data exchange with low power consumption.

Wireless communication circuits described in the present disclosure may be configured to operate according to one of the 3$^{rd}$ Generation Partnership Project (3GPP)-standardized mobile communication networks or systems. The mobile or wireless communication system may correspond to, for example, a 5$^{th}$ Generation New Radio (5G NR), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM), an Enhanced Data rates for GSM Evolution (EDGE) network, or a GSM/EDGE Radio Access Network (GERAN). Alternatively, the wireless communication circuits may be configured to operate according to mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wide-band-CDMA (WCDMA) network, a Frequency Division Multiple Access (FDMA) network, a Spatial Division Multiple Access (SDMA) network, etc.

Some examples for partitioning radio head systems in wireless communication devices using the STEP protocol/interface are described in the following in connection with FIGS. 46*a* to 46*c* and 47*a* to 47*d*.

FIG. 46*a* illustrates a first example of a radio system 4600. The radio system 4600 comprises a PCB 4605. At least a first die 4610 and a second die 4615 are arranged on the PCB 4605. The first die 4610 comprises a baseband processor 4611 configured to generate transmit data to be radiated to the environment. The second die 4615 comprises a radio frequency modem 4616. The radio frequency modem 4616 is configured to generate a radio frequency transmit signal based on the transmit data. In the example of FIG. 46*a*, the radio frequency modem 4616 is configured to generate the radio frequency transmit signal compliant to a sub mm-Wave standard (e.g. LTE, UMTS, EDGE, WLAN IEEE 802.11 or Bluetooth). Additionally, the second die 4615 may comprise a RFEM 4617 configured to process the radio frequency transmit signal. For example, the RFEM 4617 may comprise one or more of a Power amplifier (PA), a Low-Noise Amplifier (LNA), analog filters, Envelope Tracking (ET) circuitry etc. The (processed) radio frequency transmit signal is supplied to an antenna module 4619 comprising one or more antennas (e.g. for different frequency bands) via one or more coaxial cables 4618.

For transmitting the transmit data to the radio frequency modem 4616, the first die 4610 further comprises a processing circuit (e.g. a DTC) configured to generate a data transmit signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the transmit data, and the second signal edge and the third signal edge are separated by a second time period corresponding to second data of the transmit data. The processing circuit is configured to generate the data transmit signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the first die 4610 comprises an interface circuit configured to output the data transmit signal to a transmission link 4601 coupling the first die 4610 and the second die 4615.

The data may in some examples be transferred in a differential manner. Therefore, the processing circuit may be further configured to generate a second data transmit signal that is inverted with respect to the data transmit signal. Accordingly, the interface circuit may be further configured to output the second data transmit signal to the transmission link 4601.

The data transmit signal is received by the second die 4615 via the transmission link 4601.

By using the STEP protocol, data may be transmitted from the first die 4610 to the radio frequency modem 4616 at a high data rate, with low latency and with low power consumption.

The STEP protocol may optionally further be used for receiving data. For example, the interface circuit of the first die 4610 may be further configured to receive a data receive signal from the second die 4615 via the transmission link 4601. Alternatively, the first die 4610 may comprises a dedicated (second) interface circuit for receiving the data receive signal.

For decoding the data receive signal compliant to the STEP protocol, the first die 4610 may further comprise another processing circuit (e.g. a TDC) configured to determine a sequence of a fourth signal edge of the first type, a fifth signal edge of the second type, and a sixth signal edge of the first type in the data receive signal. Further, the first die 4610 may comprise a demodulation circuit configured to determine first receive data based on a third time period between the fourth signal edge and the fifth signal edge, and to determine second receive data based on a fourth time period between the fifth signal edge and the sixth signal edge. The demodulation circuit is configured to decode the data receive signal compliant to the STEP protocol (e.g. according to one or more of the aspects described above).

In some examples, the data may be received in a differential manner. Therefore, the interface circuit of the first die 4610 may be further configured to receive a second data receive signal from the transmission link 4601 that is inverted with respect to the data receive signal. Accordingly, the processing circuit may be configured to determine the fourth signal edge, the fifth signal edge, and the sixth signal edge further based on the second data receive signal.

Using the STEP protocol may allow the first die 4610 to receive data from the second die 4615 at a high data rate, with low latency and with low power consumption.

For exchanging data with the first die 4610, the second die 4620 may comprise according circuitry for generating the data receive signal and according circuitry for decoding the data transmit signal (e.g. according to one or more aspects described above).

The radio system 4600 illustrated in FIG. 46*a* may be further capable of communicating using mm-Waves. A third die 4620 comprising a part 4621-2 of another radio frequency modem 4621 for mm-Wave communication may be arranged on the PCB 4605. The first die 4610 comprises another part 4621-1 of the other radio frequency modem 4621. In other words, the other radio frequency modem 4621 is split up into two parts which are implemented in different dies.

The other radio frequency modem 4621 is configured to generate at least one other radio frequency transmit signal based on further transmit data generated by the baseband processor 4611. For example, other radio frequency transmit signals for different transmit polarizations (e.g. horizontal, H, and vertical, V) may be generated by the other radio frequency modem 4621. In the example of FIG. 46*a*, the other radio frequency modem 4621 is configured to generate the other radio frequency transmit signal compliant to a mm-Wave standard (e.g. 5G NR or Wireless Gigabit, WiGig). The one or more other radio frequency transmit signals are supplied to one or more radio heads 4623, 4624 via one or more coaxial cables 4622. The one or more radio heads 4623, 4624 exhibit RFEMs and one or more antennas.

The first die 4610 is configured to exchange data with the third die 4620 compliant to the STEP protocol as described above for the data exchange between the first die 4610 and the second die 4615. For example, data related to the transmit data as generated by the baseband processor is transmitted from the first die 4610 to the second die 4620. In particular, data generated by the first part 4621-1 of the other radio frequency modem 4621 based on the transmit data is transmitted to the second part 4621-1 of the other radio frequency modem 4621, and vice versa. For example, the processing circuit, the other processing circuit and the interface circuit used for the data exchange between the first die 4610 and the second die 4615 may additionally be used for the data exchange between the first die 4610 and the third die 4620. Alternatively, dedicated circuitry exhibiting the same functionality as the processing circuit, the other processing circuit and the interface circuit used for the data exchange between the first die 4610 and the second die 4615 may be used for the data exchange between the first die 4610 and the third die 4620.

In other words, FIG. 46*a* illustrates a radio system in which a first die comprising a baseband processor communicates with a second die comprising at least part of a radio frequency modem via the STEP protocol.

FIG. 46*b* illustrates another radio system 4630, which is a slight variation of the radio system 4600 illustrated in FIG. 46*a*. In the radio system 4630, the functionality of the RFEM 4617 is moved from the second die 4615 to another radio head 4635 which is arranged separate from the PCB 4605. The radio head 4635 is not arranged on the PCB 4605. In other words, the radio head 4635 exhibits the functionality of the RFEM 4617 and the antenna module 4619 described above in connection with FIG. 46*a*. Other than that, the radio system 4630 is identical to the radio system 4600.

FIG. 46*c* illustrates a further radio system 4640. The radio system 4640 is similar to the radio systems 4600 and 4630 described above in connection with FIGS. 46*a* and 46*b*. The radio system 4640 comprises a first die 4650 and a second die 4660, which are arranged on a PCB 4645. The first die 4650 comprises a baseband processor. The second die 4660 comprises at least part of a radio frequency modem. The first die 4650 and the second die 4660 exchange data compliant to the STEP protocol via a transmission link 4641 as described above for the radio systems 4600 and 4630. The one or more radio frequency transmit signals generated by the radio frequency modem are supplied to one or more radio heads 4680, 4685 via one or more coaxial cables 4643 for radiation to the environment. Similarly, a radio frequency receive signal received from the environment is supplied to the radio frequency modem via the one or more coaxial cables 4643.

In comparison to the radio systems illustrated in FIGS. 46*a* and 46*b*, FIG. 46*c* additionally shows supply circuitry 4670 which provides one or more supply signals 4642 for the circuitry of the dies 4650 and 4660. For example, the one or more supply signals 4642 may comprise analog and/or digital supply voltages or reference oscillation signals for the dies 4650 and 4660.

The partitioning illustrated in FIGS. 46*a* to 46*c* may, e.g., be used in a mobile device (e.g. a mobile phone, a laptop-computer or a tablet-computer) or a base station for a mobile communication network. In other words, examples of the present disclosure further relate to mobile devices and base stations comprising radio systems as illustrated in FIGS. 46*a* to 46*c*.

For example, the baseband processors illustrated in FIGS. 46*a* to 46*c* may be coupled to an application processor of a mobile device or a base station. The application processor may, e.g., process the data received via the radio system or provide data to be transmitted via the radio system.

Another partitioning architecture is described in the following with respect to FIGS. 47*a* to 47*d*. FIG. 47*a* illustrates a radio system 4700. The radio system 4700 comprises a PCB 4705. A die 4710 is arranged on the PCB 4705. The die 4710 comprises at least a baseband processor and a first part of a radio frequency modem. Optionally, the radio system 4700 may further comprise supply circuitry 4715 configured to provide one or more supply signals 4716 for the baseband processor and the first part of the radio frequency modem (e.g. a supply voltage or a reference oscillation signal).

The radio system 4700 additionally comprises a radio head 4720 arranged separate from the PCB 4705. In other words, the radio head 4720 is not arranged (mounted) on the PCB 4705. The radio head 4720 comprises a second part of the radio frequency modem and at least one antenna coupled to the second part of the radio frequency modem. Optionally, the radio head 4720 may comprise analog front end circuitry (such as one or more PAs, one or more LNAs, one or more filters, etc.) coupled between the second part of the radio frequency modem and the at least one antenna.

For transmitting data from the first part of the radio frequency modem to the second part of the radio frequency modem, the die 4710 further comprises a processing circuit (e.g. a DTC) configured to generate a data transmit signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data generated by the first part of a radio frequency modem, and the second signal edge and the third signal edge are separated by a second time period corresponding to second data generated by the first part of a radio frequency modem. The processing circuit is configured to generate the data transmit signal compliant to the STEP protocol (e.g. according to one or more of the aspects described above). Hence, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the die 4710 comprises an interface circuit configured to output the data transmit signal to a transmission link 4711 (e.g. a flat cable and/or conductive traces on PCB 4705) coupling the die 4710 and the radio head 4720.

The data may in some examples be transferred in a differential manner. Therefore, the processing circuit may be further configured to generate a second data transmit signal that is inverted with respect to the data transmit signal. Accordingly, the interface circuit may be further configured to output the second data transmit signal to the transmission link 4711. The differential implementation is illustrated in FIG. 47*a*.

By using the STEP protocol, data may be transmitted from the first part of the radio frequency modem to the second part of the radio frequency modem at a high data rate, with low latency and with low power consumption.

The STEP protocol may optionally further be used for receiving data. For example, the interface circuit of the die 4710 may be further configured to receive a data receive signal from the second part of the radio frequency modem via the transmission link 4711. Alternatively, the die 4710 may comprises a dedicated (second) interface circuit for receiving the data receive signal.

For decoding the data receive signal compliant to the STEP protocol, the die 4710 may further comprise another processing circuit (e.g. a TDC) configured to determine a sequence of a fourth signal edge of the first type, a fifth signal edge of the second type, and a sixth signal edge of the first type in the data receive signal. Further, the die 4710 may comprise a demodulation circuit configured to determine first receive data based on a third time period between the fourth signal edge and the fifth signal edge, and to determine second receive data based on a fourth time period between the fifth signal edge and the sixth signal edge. The demodulation circuit is configured to decode the data receive signal compliant to the STEP protocol (e.g. according to one or more of the aspects described above).

In some examples, the data may be received in a differential manner. Therefore, the interface circuit of the die 4710 may be further configured to receive a second data receive signal from the transmission link 4711 that is inverted with respect to the data receive signal. Accordingly, the processing circuit may be configured to determine the fourth signal edge, the fifth signal edge, and the sixth signal edge further based on the second data receive signal.

Using the STEP protocol may allow the die 4710 to receive data from the radio head 4720 at a high data rate, with low latency and with low power consumption.

The received data may be further processed by the first part of the radio frequency modem and the baseband processor.

For exchanging data with the die 4710 (e.g. with the first part of the radio frequency modem), the radio head 4720 may comprise according circuitry for generating the data receive signal and according circuitry for decoding the data transmit signal (e.g. according to one or more aspects described above).

Compared to the partitioning architecture illustrated in FIGS. 46*a* to 46*c*, the partitioning illustrated in FIG. 47*a* may allow to reduce the footprint of the radio system on the platform since the number of devices on the PCB may be reduced and no coaxial cables are required for coupling the elements. Reducing the number of elements together with omitting coaxial cables may further allow to reduce manufacturing costs.

Baseband devices comprising (only) digital circuitry are usually implemented at a more advanced technological node (e.g. using smaller semiconductor structures) than radio frequency modems comprising digital and analog circuitry. The first part of the radio frequency modem, which is implemented in the die 4710 together with the baseband processor, may hence comprise only digital circuitry, wherein the second part of the radio frequency modem may comprise either only analog circuitry, or digital as well as analog circuitry. In other words, large parts of the modem may be implemented into the die 4710 holding the baseband processor. Implementing large parts of the modem may be implemented into the die 4710 holding the baseband processor may allow to save power and die area due to the advanced technological node of the die 4710. On the other hand, the second part of the modem may be implemented in a die of the radio head 4720 and mostly (or exclusively) comprise analog circuitry of the radio frequency modem. The die holding the second part of the radio frequency modem may be implemented in a lower technological node than the die 4710 (e.g. using larger semiconductor structures).

In other words, the partitioning of FIG. 47*a* may allow to replace the coaxial cables of the partitioning according to FIGS. 46 to 46*c* by STEP compliant transmission links (e.g. flexible cables and/or conductive traces on the PCB 4705). Further, the high rate digital STEP interface may allow moving digital functionalities (e.g. the digital front end) of the radio frequency modem to the baseband processor. The proposed architecture may allow minimal radio frequency gain in the radio head 4720 (which may be understood as an RFEM) so that the risk of radio frequency oscillations in the radio head 4720 may be reduced. Accordingly, the proposed partitioning may allow for lower size, lower cost, lower power consumption and low lower oscillation risk.

The high data rate STEP interface may further allow to transmit data for multiple different channels and/or polarizations via a single transmission link from the first part of the radio frequency modem (on the die 4710) to the second part of the radio frequency modem (in the radio head). In other words, the data transmit signal may (concurrently) comprise data for multiple transmit channels and/or data for multiple transmit polarizations.

Optionally, the radio system 4700 may comprise one or more further radio heads 4725. The further radio head 4725 may comprise a part of another radio frequency modem, wherein the other part of the other radio frequency modem is implemented in the die 4710. For example, the radio head 4720 may be used for radiating and/or receiving sub mm-Wave signals (e.g. LTE signals), whereas the other radio head 4725 may be used for radiating and/or receiving mm-Wave signals (e.g. 5G-NR signals). In other examples, the radio head 4720 may be used for radiating and/or receiving mm-Wave signals of a first type (e.g. WiGig signals), whereas the other radio head 4725 may be used for radiating and/or receiving other mm-Wave signals (e.g. 5G-NR signals). The die 4710 is configured to exchange data with the other radio head 4725 using the STEP protocol as described above for the data exchange between the die 4710 and the radio head 4720.

For example, the processing circuit, the other processing circuit and the interface circuit used for the data exchange between the die 4710 and the radio head 4720 may additionally be used for the data exchange between the die 4710 and the other radio head 4725. Alternatively, dedicated circuitry exhibiting the same functionality as the processing circuit, the other processing circuit and the interface circuit used for the data exchange between the die 4710 and the radio head 4720 may be used for the data exchange between the die 4710 and the other radio head 4725.

A 3D schematic view of a mobile device 4730 (e.g. a mobile phone or a tablet-computer) comprising a radio system according to the partitioning scheme described in connection with FIG. 47*a* is illustrated in FIG. 47*b*.

The mobile device comprises a display element 4731 (e.g. a touch display element). A PCB 4732 is arranged on a backside of the display element 4371. A die 4733 comprising a baseband processor and a first part of a radio frequency modem is arranged on the PCB 4732.

A first radio head 4734 comprising the second part of the radio frequency modem and one or more antennas (and optional radio frequency front end components) is arranged on the backside of the display element 4731 separate from the PCB 4732.

The die 4733 and the first radio head 4734 exchange data according to the STEP protocol via a transmission link 4735. The transmission link 4735 comprises a first part 4375-1 running along the PCB 4732 and a second part 4735-2 running outside the PCB 4732. The first part 4735-1 may, e.g., be one or more conductive traces on the PCB 4732 or a flexible cable, and the second part 4735-2 may, e.g., be a flexible cable. The first part 4735-1 and the second part 4735-2 are coupled via a connector 4736 (e.g. a multiline connector).

In the same manner, a second radio head 4737 is coupled to the die 4733. The second radio head 4737 comprises a second part of another radio frequency modem, wherein the first part of the other radio frequency modem is implemented in the die 4733. Also the parts of the other radio frequency modem exchange data according to the STEP protocol.

The radio heads 4374 and 4737 may be used for radiating/receiving radio frequency signals in different frequency bands and/or according to different communication standards and/or Multiple Input Multiple Output (MIMO) communication.

Further, a battery 4738 for powering the circuitry of the mobile device 4730 is illustrated in FIG. 47*b*. Further optional elements of the mobile device 4730 (for details see e.g. FIG. 45*a*) are omitted in FIG. 47*b* for reasons of clarity.

FIG. 47*c* illustrates another radio system 4700 showing more details of the radio heads. A die 4745 comprising a baseband processor and a first part of a radio frequency modem is exchanging data via a first transmission link 4741 with a first radio head 4750 comprising a second part 4751 of the radio frequency modem. The data exchange is compliant to the STEP protocol. The second part 4751 of the radio frequency modem generates one or more radio frequency transmit signals based on the data received from the first part of the radio frequency modem. For example, the second part 4751 of the radio frequency modem may generate transmit signals for different frequency bands (e.g. at carrier frequencies of 28 GHz, 39 GHz and 60 GHz). The one or more transmit signal are supplied to an external front end module 4752 for radio frequency processing (e.g. for filtering and/or amplifying the signals) before radiating them to environment by means of antenna module 4753 (comprising one or more antennas). Similarly, one or more radio frequency receive signals may be received by the antennas of the antenna module 4753 and be supplied to the second part 4751 of the radio frequency modem after radio frequency processing them by means of the external front end module 4752 (e.g. filtering and amplification). Data related to the one or more radio frequency receive signals is generated by the second part 4751 of the radio frequency modem and transmitted to the first part of the radio frequency modem compliant to the STEP protocol via the first transmission link 4741. In summary, the second part 4751 of the radio frequency modem and the external front end module 4752 may exchange radio frequency transmit and/or receive signals 4754.

Further, the external front end module 4752 may provide feedback information or a feedback signal 4755 for (digital) pre-distortion circuitry of the radio frequency modem. If the (digital) pre-distortion circuitry is part of the first part of the radio frequency modem, the feedback information or the feedback signal 4755 may be transmitted to the first part of the radio frequency modem compliant to the STEP protocol via the first transmission link 4741.

The external front end module 4752 and the second part 4751 of the radio frequency modem may optionally further exchange control information 4756. At least part of the control information 4756 may be transmitted to/received from the first part of the radio frequency modem compliant to the STEP protocol via the first transmission link 4741.

The second radio head 4760 comprising a second part 4761 of another radio frequency modem, wherein the first part of the other radio frequency modem is implemented in the die 4745 is implemented accordingly. The second radio head 4760 and the die 4745 exchange data according to the STEP protocol via the second transmission link 4742 in the same manner as described above for the first radio head 4760. A detailed description of the second radio head 4760 is therefore omitted.

FIG. 47*d* illustrates an alternative implementation of the radio head. In particular, the functionalities of a plurality of radio heads as illustrated in FIG. 47*c* are combined to a single radio head. The second part 4781 of the radio frequency modem communicates with the first part of the radio frequency modem implemented in the die 4775 using the STEP protocol. The radio head 4780 of the radio system 4770 comprises a (passive) splitter/combiner circuit 4782 for splitting up a generated radio frequency transmit signal into signals for the individual ones of the plurality of external front end module 4783, . . . , 4786 coupled to the antenna module 4787. Similarly, the splitter/combiner circuit 4782 combines the received signals provided by the individual ones of the plurality of external front end module 4783, . . . , 4786 to a combined radio frequency receive signal. As indicated in FIG. 47*d*, different sets of signal combining/splitting elements 4788-1, . . . , 4788-3 and 4789-1, . . . , 4789-3 may be used for different frequency ranges of the radio frequency transmit signals and the radio frequency receive signals (e.g. different sets for carrier frequencies of 28 GHz and 39 GHz as illustrated in FIG. 47*d*). The implementation illustrated in FIG. 47*d* may allow a point-to-point or a point-to-multi-point connection.

The partitioning illustrated in FIGS. 47*a* to 47*d* may, e.g., be used in a mobile device (e.g. a mobile phone, a laptop-computer or a tablet-computer) or a base station for a mobile communication network. In other words, examples of the present disclosure further relate to mobile devices and base stations comprising radio systems as illustrated in FIGS. 47*a* to 47*d*. For example, examples of the present disclosure may relate to mobile devices or base stations in which the functionality of the radio frequency modem (e.g. digital front end and analog radio frequency circuits) are splitted and shifted to the baseband device and the RFEMs. The baseband processors of the systems illustrated in FIGS. 47*a* to 47*d* may, e.g., be coupled to an application processor of a mobile device or a base station. The application processor may, e.g., process the data received via the radio system or provide data to be transmitted via the radio system.

Another use case for the STEP protocol may be the coupling of data storages to processors. For example, NAND-based storage modules (e.g. Solid-State-Drives, SSDs) typically connect to computing SoCs through a Peripheral Component Interconnect express, PCIe interface, which is power-optimized for legacy bulk storage traffic. Emerging memory/storage technologies such as the three-dimensional crosspoint (3D XPoint) technology employ sporadic random-access traffic models in addition to legacy bulk traffic. PCIe is not power-optimized and not latency-optimized for these new traffic models. When used as an interface, it results in excessive power coupled with low responsiveness.

Interfaces based on the STEP protocol may be suitable physical interfaces for coupling of data storages (e.g. based on the 3D XPoint technology) and processors since it may provide low latency and low power consumption. A STEP interface may enable memory traffic, legacy storage traffic and novel storage traffic models such as Persistent Memory Direct Access (DAX) mode.

In the following, some examples for coupling data storages and processors using the STEP protocol are described in connection with FIGS. 48*a* to 48*c*. FIG. 48*a* illustrates an example of a semiconductor die 4800. The semiconductor die 4800 comprises one or more processor cores 4805 (e.g. CPU cores). The at least one processor core 4805 is configured to generate data to be stored. The semiconductor die 4800 is a (small) block of semiconducting material (e.g. silicon) on which given functional circuits (i.e. the least one processor core 4805) are fabricated.

The semiconductor die 4800 further comprises a first apparatus 4810 capable of generating a first output signal compliant to the PCIe protocol based on the data to be stored. As indicated in FIG. 48*a*, the first apparatus 4810 may, e.g., be part of PCIe physical layer circuitry. The first apparatus 4810 is configured to output the first output signal to a first output terminal 4811 of the semiconductor die 4800.

Additionally, the semiconductor die 4800 comprises a second apparatus 4815 capable of generating a second output signal. The apparatus 4815 comprises a processing circuit (e.g. a DTC) configured to generate the second output signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the data to be stored, and the second signal edge and the third signal edge are separated by a second time period corresponding to second data of the data to be stored. The processing circuit is configured to generate the second output signal compliant to the STEP protocol (e.g. according to one or more of the aspects described above). That is, a sum of the first time period and the second time period may be lower than $10^{-7}$ s, $10^{-8}$ s, $10^{-9}$ s, $10^{-10}$ s, $10^{-11}$ s, or $10^{-12}$ s.

Further, the apparatus 4815 comprises an output interface circuit configured to output the second output signal to a second output terminal 4816 of the semiconductor die 4800.

The data may in some example be transferred in a differential manner. Therefore, the processing circuit may be further configured to generate an inverted second output signal that is inverted with respect to the second output signal. Accordingly, the output interface circuit may be further configured to output the inverted second output signal to another output terminal (not illustrated) of the semiconductor die 4800.

In compliance with the PCIe protocol, also the first apparatus may generate a differential pair of first output signals.

In summarizing the above, the semiconductor die 4800 comprises a PCIe interface and a STEP interface for outputting the data to be stored.

As illustrated in FIG. 48*a*, the first output terminal 4811 and the second output terminal 4816 are configured to couple via different signal lines to a connector 4801 (e.g. a socket) for receiving a data storage device. Both the PCIe lanes and STEP lanes are routed separately towards the connector 4801 (e.g. a storage module socket) since the STEP interface and the PCIe interface cannot share the routing due to inherent differences in the physical layer. For example, each of the first output terminal 4811 and the second output terminal 4816 may be coupled to the connector 4801 via a respective conductive trace on a PCB holding the semiconductor die 4800 and the connector 4801.

The semiconductor die 4800 further comprises a control circuit 4820 configured to enable the first apparatus 4810 in a first operation mode of the semiconductor die 4800, and to enable the second apparatus 4815 in a second operation mode of the semiconductor die 4800. Accordingly, the control circuit 4820 may be configured to disable the first apparatus 4810 in the second operation mode, and to disable the second apparatus 4815 in the first operation mode. In other words, the semiconductor die 4800 may either output the data to the data storage device based on the PCIe protocol or based on the STEP protocol.

The semiconductor die 4800 exhibits a dual physical layer, one for the STEP protocol and the other for legacy PCIe protocol. Accordingly, the at least one processor core 4805 may be coupled to data storage devices (e.g. based on the 3D XPoint technology) through the STEP interface, while maintaining backward compatibility to legacy PCIe-based storage modules in a cost-efficient manner.

As indicated in FIG. 48*a*, the semiconductor die 4800 may further comprise a PCIe controller 4825 configured to control operation of the first apparatus 4810 for generating the PCIe compliant first output signal. The PCIe controller 4825 is further configured to control operation of the second apparatus 4815 for generating the STEP compliant second output signal. For example, the PCIe controller 4825 may comprise a first port for communicating with the first apparatus 4810 and a second port for communicating with the second apparatus 4815. Hence, the semiconductor die 4800 may comprise a PCIe controller with dual physical layer port, one for the STEP protocol and the other for legacy PCIe protocol. In addition to selectively coupling the at least one processor core 4805 to data storage devices via STEP or PCIe, the extended PCIe controller 4825 may allow to keep a consistent software model.

The PCIe controller 4825 and the first apparatus 4810 use the PHY Interface for the PCI Express Architecture (PIPE) protocol for communication, while the second apparatus 4815 uses the proprietary STEP controller interface (e.g. according to one or more aspects described above). Compared to a conventional PCIe controller, the PCIe controller 4825 may exhibit an additional PIPE port towards the STEP physical layer circuitry 4815. In other words, the PCIe controller 4825 is configured to communicate with the first apparatus 4810 and the second apparatus 4815 using a first interface protocol, wherein the second apparatus 4815 is configured to communicate with control circuitry using a (different) second interface protocol.

For converting the standard PIPE interface of the PCIe controller 4825 to the proprietary STEP controller interface, the semiconductor die 4800 comprises a gasket circuit 4830 configured to convert between the PIPE interface and the proprietary STEP controller interface (to convert between first and second interface protocols). The gasket circuit 4830 may, e.g., convert data signals and/or control signals/commands of the PIPE interface to data signals and/or control signals/commands of the STEP controller interface, and vice versa.

The two physical layer interfaces may further be used for receiving data from the data storage device. For example, the semiconductor die 4800 may be configured to receive an input signal at an input terminal (not illustrated) of the semiconductor die 4800. The input signal may, e.g., be a read signal output by the data storage device and comprise information about data stored in the data storage device. The semiconductor die 4800 may further comprise an apparatus 4835 capable of decoding the input signal compliant to the STEP protocol. The apparatus 4835 and the apparatus 4815 may each be part of a common STEP physical layer circuitry.

The apparatus 4835 capable of decoding the input signal comprises a processing circuit (e.g. a TDC) configured to determine a sequence of a fourth signal edge of the first type, a fifth signal edge of the second type, and a sixth signal edge of the first type in the input signal. Further, the apparatus 4835 capable of decoding the input signal comprises a demodulation circuit configured to determine first receive data based on a third time period between the fourth signal edge and the fifth signal edge, and to determine second receive data based on a fourth time period between the fifth signal edge and the sixth signal edge. The apparatus 4835 capable of decoding the input signal is configured to decode the input signal compliant to the STEP protocol (e.g. according to one or more of the aspects described above).

Similarly, the semiconductor die 4800 may comprise circuitry capable of decoding the input signal compliant to the PCIe protocol. For example, the semiconductor die 4800 may comprise an apparatus 4840 capable of decoding the input signal compliant to the PCIe protocol. The apparatus 4840 may be part of PCIe physical layer circuitry like the apparatus 4810.

The control circuit 4820 may be configured to enable the apparatus 4840 in the first operation mode, and to enable the apparatus 4835 in the second operation mode. Accordingly, the control circuit 4820 may be configured to disable the apparatus 4840 in the second operation mode, and to disable the apparatus 4835 in the first operation mode.

The decoded data may be further processed by other circuitry of the semiconductor die 4800. For example, the decoded data may be further processed by the at least one processor core 4805. As indicated in FIG. 48*a*, the semiconductor die 4800 may comprises additional circuitry coupled to the PCIe controller 4825 and/or the at least one processor core 4805. The semiconductor die 4800 may, e.g., additionally comprise a non-coherent fabric agent 4802 configured to route storage traffic. This path may optionally support Volume Management Device (VMD) technology. Further, the semiconductor die 4800 may comprise a Double Data Rate (DDR) memory subsystem 4804 including a memory caching controller 4802-1 and a memory controller 4802-2 for controlling the data exchange between the data storage device, the at least one processor core 4805 and the DDR memory 4806. The semiconductor die 4800 may also comprise an arbiter circuit 4803 configured to arbitrate between storage traffic and memory traffic.

The control circuit 4820 for selecting the operation mode may be individual circuitry, or be part of the PCIe controller 4825 as indicated in FIG. 48*a*. In other words, the PCIe controller 4825 may comprise the control circuit 4820.

The above described STEP and PCIe interfaces are mutually exclusive. For example, when a device is detected through the PCIe physical layer path, all the traffic may be routed through PCIe physical layer circuitry 4810 and 4840. When a device is detected through the STEP physical layer path, all the traffic may be routed through physical layer circuitry 4815 and 4835. When a device is detected through both the STEP and the PCIe path, STEP may have precedence and the PCIe path may be disabled.

For deciding on the operation mode, a static strap option (e.g. always STEP or always PCIe) or a dynamic option may be used. Examples for deciding on the operation mode will be described in the following with reference to FIG. 48*c* which illustrates a flowchart of a method 4850 for deciding on the operation mode.

The method 4850 starts with a decision 4851 whether static strap option or an auto-detect option is used. The static strap option may be suitable for, e.g., data storage devices soldered down as a Ball Grid Array (BGA). The semiconductor die (e.g. a CPU die) as well as the data storage device would be told to use a specific physical layer upon coming out of reset (e.g. information about the selected interface may be stored in an internal memory of the semiconductor die 4800 or the data storage device). The dynamic auto-detect option may be suitable for variable combinations of semiconductor die (e.g. a CPU die) and data storage device. For example, for a data storage device coupled to the processor core via a M.2 connection, the semiconductor die as well as the data storage device need to detect each other's STEP capability. The semiconductor die as well as the data storage device need to be capable of inter-operating with previous generation non-STEP capable data storage devices or semiconductor dies, respectively.

In the case of the static strap option, the respective physical layer is brought out of reset in a process 4852 (e.g. PCIe or STEP physical layer). If the STEP interface is selected, the gasket circuit is further activated in a process 4853.

In the case of the auto-detect option, the semiconductor die 4800 and the data storage device each sense for a signal of the other one that indicates support of the STEP interface. For example, an input terminal of the semiconductor die 4800 may be configured to couple to a predetermined electrical contact of the connector 4801 that receives the data storage device. The control circuit 4825 may be configured to set the second operation mode if a predetermined signal (or signal state) is sensed in a process 4855 at the predetermined electrical contact. On the other hand, the data storage device may be configured to output the predetermined signal (or signal state) to the predetermined electrical contact of the connector 4801 for indicating that the data storage device supports the STEP protocol. For example, one specific pin of the connector 4801 may be driven to ground (logical state "0") by the data storage device. If ground is detected by the semiconductor die 4800, the second apparatus 4815 is enabled. If ground is not detected by the semiconductor die 4800, the first apparatus 4810 is enabled. In other words, the control circuit 4825 may be configured to set the first operation mode if a signal different from the predetermined signal is sensed at the predetermined electrical contact of the connector 4801. For example, the STEP physical layer circuitry of the semiconductor die 4800 may sense if the predetermined signal is present at the predetermined electrical contact of the connector 4801.

Similarly, another output terminal of the semiconductor die 4800 (which may be different from the different from the first output terminal and the second output terminal) may be configured to couple to another predetermined electrical contact of the connector 4801. The semiconductor die 4800 may be configured to output another predefined signal to the other predetermined electrical contact via the other output terminal for indicating that the semiconductor die 4800 supports the STEP protocol. Accordingly, the data storage device may be able to detect the STEP capability of the semiconductor die 4800. For example, the semiconductor die 4800 may apply a weak pull up to a pin of the connector 4801 in a process 4854.

If no STEP compatibility is detected, PCIe is used for the data transfer in process 4856.

If STEP compatibility is detected, the STEP interface is used in process 4856. Before the STEP compliant data transmission starts, it may further be checked if the communication partner is initially in the disabled power state (e.g. indicated by alternating states on a differential transmission link) in a process 4857.

As indicated above, also the data storage device may support PCIe and STEP data exchange. An example of a data storage device 4860 is illustrated in FIG. 48*b*. The data storage device 4860 comprises a data storage element 4865 configured to store data (e.g. a 3D XPoint non-volatile memory as illustrated in FIG. 48*b* or any other type of storage medium).

The data storage device 4860 further comprises a first apparatus 4870 capable of generating a first output signal compliant to the PCIe protocol based on data stored in the data storage element 4865. As indicated in FIG. 48*b*, the first apparatus 4870 may, e.g., be part of PCIe physical layer circuitry. The first apparatus 4810 is configured to output the first output signal to a connector 4861 of the data storage device 4860. The connector 4861 comprises a plurality of terminals for coupling to a counterpart of the connector 4861. For example, the connector 4861 may be a plug or a socket configured to receive a corresponding counterpart.

Additionally, the data storage device 4860 comprises a second apparatus 4875 capable of generating a second output signal. The apparatus 4875 comprises a processing circuit (e.g. a DTC) configured to generate the second output signal to comprise a sequence of a first signal edge of a first type, a second signal edge of a second type, and a third signal edge of the first type. For example, the first type may be a rising edge and the second type be a falling edge, or the second type may be a rising edge and the first type be a falling edge. The first signal edge and the second signal edge are separated by a first time period corresponding to first data of the data stored in the data storage element 4865, and the second signal edge and the third signal edge are separated by a second time period corresponding to second data of the data stored in the data storage element 4865. The processing circuit is configured to generate the second output signal compliant to the STEP protocol (e.g. according to one or more of the aspects described above). That is, a sum of the first time period and the second time period may be lower than $10^{-7}$ s, $10^{-8}$ s, $10^{-9}$ s, $10^{-10}$ s, $10^{-11}$ s, or $10^{-12}$ s. Further, the apparatus 4875 comprises an output interface circuit configured to output the second output signal to the connector 4861.

The data may in some examples be transferred in a differential manner. Therefore, the processing circuit may be further configured to generate an inverted second output signal that is inverted with respect to the second output signal. Accordingly, the output interface circuit may be further configured to output the inverted second output signal to the connector 4861.

In compliance with the PCIe protocol, also the first apparatus 4870 may generate a differential pair of first output signals.

In other words, the data storage device 4860 comprises a PCIe interface and a STEP interface for outputting data stored in the data storage element 4865.

The first apparatus 4870 and the interface circuit of the second apparatus 4875 are coupled to the connector 4861 via different signal lines since the STEP interface and the PCIe interface cannot share the routing due to inherent differences in the physical layer.

The data storage device 4860 further comprises a control circuit 4880 configured to enable the first apparatus 4870 in a first operation mode of the data storage device 4860, and to enable the second apparatus 4875 in a second operation mode of the data storage device 4860. Accordingly, the control circuit 4880 may be configured to disable the first apparatus 4870 in the second operation mode, and to disable the second apparatus 4875 in the first operation mode. In other words, the data storage device 4860 may either output the data based on the PCIe protocol or based on the STEP protocol.

Like the semiconductor die 4800 described above in connection with FIG. 48*a*, the data storage device 4860 comprises a dual physical layer, one for the STEP protocol and the other for legacy PCIe protocol. Accordingly, the data storage device 4860 may be coupled to other circuitry (e.g. the semiconductor die 4800) through the STEP interface, while maintaining backward compatibility to legacy PCIe-based circuitry in a cost-efficient manner.

As indicated in FIG. 48*c*, the data storage device 4860 may further comprise a PCIe controller 4885 configured to control operation of the first apparatus 4870 for generating the PCIe compliant first output signal. The PCIe controller 4885 is further configured to control operation of the second apparatus 4875 for generating the STEP compliant second output signal. For example, the PCIe controller 4885 may comprise a first port for communicating with the first apparatus 4870 and a second port for communicating with the second apparatus 4875. Hence, the data storage device 4860 may comprise a PCIe controller with dual physical layer port, one for the STEP protocol and the other for the legacy PCIe protocol. In addition to selectively outputting data via STEP or PCIe, the extended PCIe controller 4885 may allow to keep a consistent software model.

The PCIe controller 4885 and the first apparatus 4870 use again the PIPE protocol for communication, while the second apparatus 4875 uses the proprietary STEP controller interface (e.g. according to one or more aspects described above). Therefore, the PCIe controller 4885 comprises a first port for communicating with the first apparatus 4870 and a second port for communicating with the second apparatus 4875. In other words, the PCIe controller 4885 is configured to communicate with the first apparatus 4870 and the second apparatus 4875 using a first interface protocol, wherein the second apparatus 4885 is configured to communicate with control circuitry using a (different) second interface protocol.

For converting the standard PIPE interface of the PCIe controller 4885 to the proprietary STEP controller interface, the data storage device 4860 comprises a gasket circuit 4890 configured to convert between the PIPE interface and the proprietary STEP controller interface (to convert between first and second interface protocols). The gasket circuit 4890 may, e.g., convert data signals and/or control signals/commands of the PIPE interface to data signals and/or control signals/commands of the STEP controller interface, and vice versa.

The two physical layer interfaces may further be used for receiving data. For example, the data storage device 4860 may be configured to receive an input signal at the connector 4861. The input signal may, e.g., be received from a CPU and comprise information about data to be stored in the data storage device 4860. The data storage device 4860 may further comprise an apparatus 4876 capable of decoding the input signal compliant to the STEP protocol. The apparatus 4876 and the apparatus 4875 may each be part of STEP physical layer circuitry.

The apparatus 4876 capable of decoding the input signal comprises a processing circuit (e.g. a TDC) configured to determine a sequence of a fourth signal edge of the first type, a fifth signal edge of the second type, and a sixth signal edge of the first type in the input signal. Further, the apparatus 4876 capable of decoding the input signal comprises a demodulation circuit configured to determine first receive data based on a third time period between the fourth signal edge and the fifth signal edge, and to determine second receive data based on a fourth time period between the fifth signal edge and the sixth signal edge. The apparatus 4876 capable of decoding the input signal is configured to decode the input signal compliant to the STEP protocol (e.g. according to one or more of the aspects described above).

Similarly, the data storage device 4860 may comprise circuitry capable of decoding the input signal compliant to the PCIe protocol. For example, the data storage device 4860 may comprise another apparatus 4871 capable of decoding the input signal compliant to the PCIe protocol. The apparatus 4871 may be part of PCIe physical layer circuitry like the apparatus 4870.

The control circuit 4880 may be configured to enable the apparatus 4871 in the first operation mode, and to enable the apparatus 4876 in the second operation mode. Accordingly, the control circuit 4880 may be configured to disable the apparatus 4871 in the second operation mode, and to disable the apparatus 4876 in the first operation mode.

The decoded data may, e.g., be stored in the data storage element 4876 if the decoded data is data to be stored. If the decoded data is control data for the data storage device 4860, the decoded data may, e.g., be further processed by the storage media controller 4895 of the data storage device 4860 for adapting operation of the data storage device 4860.

The control circuit 4880 for selecting the operation mode may be individual circuitry, or be part of the PCIe controller 4885 as indicated in FIG. 48*c*. In other words, the PCIe controller 4885 may comprise the control circuit 4880.

The above described STEP and PCIe interfaces of the data storage device 4860 are mutually exclusive. For example, when a device is detected through the PCIe physical layer path, all the traffic may be routed through PCIe physical layer circuitry 4870 and 4871. When a device is detected through the STEP physical layer path, all the traffic may be routed through physical layer circuitry 4875 and 4876. When a device is detected through both the STEP and the PCIe path, STEP may have precedence and the PCIe path may be disabled.

For deciding on the operation mode, a static strap option (e.g. always STEP or always PCIe) or a dynamic option may be used as described above for the semiconductor die 4800 in connection with FIG. 48*c*. For example, the control circuit 4880 may be configured to set the second operation mode if a predetermined signal is sensed at a predetermined electrical contact of the connector 4881. If a signal different from the predetermined signal is sensed at the predetermined electrical contact 4881, the control circuit 4880 may be configured to set the first operation mode. Further, the data storage device 4860 may be configured to output another predefined signal to another predetermined electrical contact of the connector 4861 for indicating that the data storage device 4860 supports the STEP protocol.

As described above, the PCIe protocol may be retained in the PCIe controllers of the semiconductor die 4800 and the data storage device 4860 even when using the STEP physical layer in order to ease transition and ensure compatibility. This may include power states defined by the PCIe specification, power rails, GPIO's related to reset scheme (PERST), clocking (CLKREQ #, REFCLK_P/N), or wake (WAKE #).

The STEP protocol defines (uses) different power states that the PCIe protocol. In order to enable proper operation of the STEP physical layer, an exemplary mapping between the PCIe power states (link states) and the STEP power states as described in connection with FIG. 15*b* is described in the following. The conversion (translation) between the power states of both protocols may, e.g., be done by the gasket circuits 4830 and 4890 of the semiconductor die 4800 and the data storage device 4860. For example, if a gasket circuit receives a command from the PCIe controller to change to a specific power state according to the PCIe protocol, the gasket circuit may select a power state (power mode, mode of operation) of the STEP protocol according to a predefined mapping scheme and control the STEP physical layer circuitry to change to the selected power state (power mode, mode of operation) of the STEP protocol.

For example, the PCIe power state L0 may be mapped to the high speed (HS) mode of the STEP protocol since both modes are the default active modes of the protocols. In other words, the PCIe power state L0 may be mapped to the full throughput mode or a fully operational mode of the STEP protocol.

The PCIe power states L0s, L1.0 and L1.1 may, e.g., be mapped to the LPH1, LPH2 and DIS modes of the STEP protocol since these modes are low power modes of the protocols.

The PCIe power state L1.2 may be mapped to the disabled (DIS) mode of the STEP protocol. In the disabled mode a negative supply voltage ($V_{nn}$) for the processor core 4805 of the semiconductor die 4800 may, e.g., be turned off for saving energy. Depending on the platform requirements as well as the power & exit latency characteristic of the disabled mode, the disabled mode could also be mapped to each of the PCIe power states L0s, L1.0, L1.1 and L1.2.

Further, the PCIe power state L23 may, e.g., be mapped to the OFF mode of the STEP protocol since both enable a reset of the platform. Depending on the platform requirements as well as the power & exit latency characteristic of the OFF mode, the OFF mode could also be mapped to each of the PCIe power states L1.1 and L1.2.

The above mapping is exemplary. Different mappings of the power states may alternatively be used. Depending on the system requirements, the design of the gasket circuits in both the processor die and the storage element may be configured to a consistent mapping.

Summarizing the aspects described above in connection with FIGS. 48*a* to 48*c*, the STEP interface may serve as an optimized interface between a CPU and 3D XPoint storage device for memory traffic, legacy storage traffic and novel storage traffic models (such as a Persistent Memory DAX mode). A PCIe controller with a dual physical layer port, one for the STEP physical layer and the other for legacy PCIe physical layer, may be used. A detection mechanism may be used for select the physical layer based on the module connected, i.e. either PCIe-based or STEP-based. Further, a mapping between PCIe power states and STEP power states is proposed.

The above described CPU die and/or the above described data storage element may, e.g., be used in a computing device such as a (personal) computer, a laptop computer or a tablet computer. In other words, examples of the present disclosure further relate to a computer comprising a semiconductor die and/or a data storage device as illustrated in FIGS. 48*a* to 48*c*.

FIG. 49 illustrates an example of a computing device 4900. The computing device 4900 houses a motherboard (mainboard) 4902. The motherboard 4902 may include a number of components, including but not limited to a processor 4904 and at least one communication chip 4906. The processor 4904 is physically and electrically coupled to the motherboard 4902. In some examples the at least one communication chip 4906 is also physically and electrically coupled to the motherboard 4902. In further examples, the communication chip 4906 may be part of the processor 4904.

Depending on its applications, computing device 4900 may include other components that may or may not be physically and electrically coupled to the motherboard 4902. These other components may include, but are not limited to, volatile memory (e.g. DRAM), non—volatile memory (e.g. ROM), flash memory, a graphics processor, a digital signal processor, a crypto processor, a chipset, an antenna, a display, a touchscreen display, a touchscreen controller, a connector to an external display, a battery, an audio codec, a video codec, a power amplifier, a GPS device, a compass, an accelerometer, a gyroscope, a speaker, a camera, and a data storage device (such as Hard Disk Drive, HDD; SSD; Compact Disk, CD; Digital Versatile Disk, DVD; and so forth).

The communication chip 4906 enables wireless communications for the transfer of data to and from the computing device 4900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 4906 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 4900 may include a plurality of communication chips 4906. For instance, a first communication chip 4906 may be dedicated to shorter range wireless communications such as Wi-Fi and Bluetooth and a second communication chip 4906 may be dedicated to longer range wireless communications such as GPS, EDGE, GPRS, CDMA, WiMAX, LTE, Ev-DO, and others.

As described above in connection with FIGS. 48*a* to 48*c*, the STEP protocol may be used for coupling the processor 4904 and a data storage device of the computing device 4900. Similarly, other elements of the computing device 4900 that exchange data may be coupled using a STEP interface/the STEP protocol.

In the examples described above, the transmission links for coupling a transmitter or a receiver are described as wired links for transmitting electric signals. In some examples, optical transmission links (e.g. one or more fibers) may be used instead. Accordingly, an (output) interface circuit as described above may, e.g., be an optical driver configured to convert the one or more (STEP compliant) electric signals provided by the processing circuit (e.g. a DTC) to one or more optical signals, and to output the optical signal(s) to the optical transmission link. Accordingly, the optical signal exhibits pulse lengths with time periods corresponding to the symbols to be transmitted. For example, the amplifier coupled to DTC 22 in FIG. 1*b* may be replaced by an optical driver. Similarly, an (input) interface circuit as described above may be an optical receiver configured to convert one or more optical signals received from the optical transmission link to one or more electric signals, and to provide the electric signal(s) to the processing circuit (e.g. a TDC) for determining the signal edges. For example, the amplifier coupled to TDC 20 in FIG. 1*b* may be replaced by an optical receiver. In other words, examples of STEP interconnects may transmit one or more optical signal(s) over the transmission link coupling the transmitter and the receiver.

The examples described previously in connection with FIGS. 1*a* to 1*c* may be summarized as follows:

A first example of an apparatus for generating a data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted; and an output interface circuit configured to output the data signal.

In example 2, in the apparatus of example 1, the first type is a rising edge and the second type is a falling edge, or wherein the second type is a rising edge and the first type is a falling edge.

In example 3, in the apparatus of one of the preceding examples, a sum of the first time period and the second time period is lower than $10^{-7}$ s or $10^{-8}$ s.

In example 4, in the apparatus of one of the preceding examples, the processing circuit is further configured to generate a second data signal, the second data signal being inverted with respect to the data signal.

In example 5, in the apparatus of one of the preceding examples, the first data is represented by a first data symbol and the second data is represented by a second data symbol to be transmitted according to a data communication protocol.

In example 6, the apparatus of one of the preceding examples further comprises at least one Digital to Time converter configured to generate the data signal.

In example 7, output interface circuit is configured to output the data signal to a wired transmission link composed of one or more transmission lines.

Example 8 is an apparatus for receiving a data signal, comprising a processing circuit configured to determine a sequence of a first signal edge of a first type, a second signal edge of a second type, and a third signal edge of the first type in the data signal; and a demodulation circuit configured to determine first data based on a first time period between the first signal edge and the second signal edge; and second data based on a second time period between the second signal edge and the third signal edge.

In example 9, in the apparatus of example 8, the first type is a rising edge and the second type is a falling edge, or wherein the second type is a rising edge and the first type is a falling edge.

In example 10, in the apparatus of one of the examples 8 or 9, a sum of the first time period and the second time period is lower than $10^{-7}$ s or $10^{-8}$ s.

In example 11, in the apparatus of one of examples 8 to 10, the processing circuit is further configured to receive a second data signal, the second data signal being inverted with respect to the data signal; and to determine the first signal edge, the second signal edge, and the third signal edge further based on the second data signal.

In example 12, in the apparatus of one of examples 8 to 11, a time period between a plurality of signal edges corresponds to a data symbol of a communication protocol.

In example 13, the apparatus of one of the examples 8 to 12 further comprises at least one time to digital converter configured to determine the first time period and the second time period.

Example 14 is an apparatus for generating a data signal, comprising a processing circuit configured to generate the data signal, the data signal comprising alternating signal edges of a first type and of a second type, wherein the time periods between each subsequent pair of signal edges correspond to data to be transmitted, wherein a number of time periods per second is higher than $1*10^7$ or $1*10^8$.

In example 15, in the apparatus of example 14, a time period between two signal edges corresponds to a data symbol of a communication protocol.

In example 16, in the apparatus of one of the preceding examples, the data signal is a digital signal transmitted using a wired transmission link.

Example 17 is means for generating a data signal comprising means for generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted; and means for outputting the data signal In example 18, in the means of example 17, the first type is a rising edge and the second type is a falling edge, or the second type is a rising edge and the first type is a falling edge.

Example 19 is means for receiving a data signal, comprising means for determining a sequence of a first signal edge of a first type, a second signal edge of a second type, and a third signal edge of the first type in the data signal; and means for determining first data based on a first time period between the first signal edge and the second signal edge; and second data based on a second time period between the second signal edge and the third signal edge.

In example 20, in the means of example 19, the first type is a rising edge and the second type is a falling edge, or wherein the second type is a rising edge and the first type is a falling edge.

Example 21 is means for generating a data signal, comprising means for generating the data signal, the data signal comprising alternating signal edges of a first type and of a second type, wherein the time periods between each subsequent pair of signal edges correspond to data to be transmitted, wherein a number of time periods per second is higher than $1*10^7$ or $1*10^8$.

Example 22 is an apparatus for generating a data signal, comprising a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

In example 23, the apparatus of example 22 further comprises an output interface for the data signal.

Example 24 is an apparatus for generating a data signal comprising a processing circuit configured to generate the data signal, wherein the processing circuit is configured to adjust time periods between directly succeeding signal edges of the data signal based on respective data portions to be transmitted.

In example 25, the apparatus of example 24 further comprises an output interface for the data signal.

The examples described previously in connection with FIGS. 1*d* to 1*f* may be summarized as follows:

Example 1 is an apparatus for receiving a data signal, comprising:

- a processing circuit configured to determine a sequence of a first signal edge of a first type, a second signal edge of a second type, and a third signal edge of the first type in the data signal; and
- a demodulation circuit configured to determine first data based on a first time period between the first signal edge and the second signal edge, and second data based on a second time period between the second signal edge and the third signal edge, the apparatus further comprising:
- a detection circuit configured to generate a trigger signal when identifying other data than payload data in the first data or the second data; and
- an oscillator circuit configured to generate a clock signal upon generation or the trigger signal.

In some implementations, identifying other data than payload data in the first data or the second data may correspond to identifying no payload data to be in the first data or the second data Example 2 is the apparatus of example 1, wherein the clock signal comprises a predetermined number of oscillations.

Example 3 is the apparatus of example 1 or 2, further comprising at least one data processing circuit operated using to the clock signal.

Example 4 is the apparatus of example 3, wherein the data processing circuit comprises a First In-First Out Buffer.

Example 5 is the apparatus of any of the preceding examples, wherein the detection circuit is configured to identify an End of Packet symbol based on at least one of the first time period and the second time period and to generate the trigger signal upon identification of the End of Packet symbol.

Example 6 is an apparatus for receiving a data signal, comprising:

- an input interface for the data signal; and
- an oscillator circuit configured to generate a clock signal in the absence of a data signal at the input interface.

Example 7 is the apparatus of example 6, further comprising:

- a processing circuit configured to determine a sequence of a first signal edge of a first type, a second signal edge of a second type, and a third signal edge of the first type in the data signal if a data signal is received at the input interface.

Example 8 is an apparatus for generating a data signal, comprising:

- an input interface for payload data;
- a processing circuit configured to generate the data signal, the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period, the first time period being based on a first payload data symbol, and the second time period being based on a second payload data symbol when payload data is received at the input interface; or
- the first time period being based on a first predetermined clock cycle time and the second time period being based on a second predetermined clock cycle time when no payload data is received at the input interface; and
- an output interface configured to output the data signal.

Example 9 is the apparatus of example 8, wherein the processing circuit further comprises: a Digital-to-Time converter configured to generate the sequence of the first signal edge, the second signal, and the third signal edge.

Example 10 is the apparatus of example 9, further comprising an oscillator circuit coupled to the output interface when no payload data is received.

Example 11 is the apparatus of any of examples 8 to 10, further comprising a memory having stored therein the first predetermined clock cycle time and the second predetermined clock cycle time.

Example 12 is an apparatus for generating a data signal, comprising:

- an input interface for payload data;
- a processing circuit configured to generate the data signal, the data signal comprising a clock signal having at least one of a first predetermined clock cycle time and the second predetermined clock cycle time if other data than payload data is received at the input interface; and
- an output interface configured to output the data signal.

Example 13 is the apparatus of example 12, further comprising an oscillator circuit coupled to the output interface when no payload data is received.

Example 14 is a method for receiving a data signal, comprising:

determining a sequence of a first signal edge of a first type, a second signal edge of a second type, and a third signal edge of the first type in the data signal;

determining first data based on a first time period between the first signal edge and the second signal edge, and second data based on a second time period between the second signal edge and the third signal edge; and generating a clock signal when other data than payload data is identified to be within the first data or the second data.

Example 15 is the method of example 14, wherein the clock signal comprises a predetermined number of oscillations.

Example 16 is the method of example 14 or 15, further comprising operating at least one data processing circuit using the clock signal.

Example 17 is the method of any of examples 14 to 16, further comprising:

identifying an End of Packet symbol based on at least one of the first time period and the second time period; and generating the trigger signal upon identification of the End of Packet symbol.

Example 18. A method for generating a data signal, comprising:

generating the data signal, the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period;

determining the first time period based on a first payload data symbol, and the second time period based on a second payload data symbol when payload data is available; or determining the first time period based on a first predetermined clock cycle time and the second time period based on a second predetermined clock cycle time when no payload data is available.

Example 19 is the method of example 18, further comprising using a Digital-to-Time converter to generate the sequence of the first signal edge, the second signal, and the third signal edge.

Example 20 is the method of example 19, further comprising an oscillator circuit coupled to the output interface when other data than payload data is received.

Example 21 is the method of examples 19 or 20, further comprising reading the first predetermined clock cycle time and the second predetermined clock cycle time from a memory.

Example 22 is a physical layer controller for a communication interface, the physical layer controller comprising an apparatus for receiving a data signal according to any of examples 1 to 7.

Example 23 is a physical layer controller of example 22, further comprising a MAC-output interface configured to connect to a Medium Access Controller.

Example 24 is a physical layer controller for a communication interface, the physical layer controller comprising an apparatus for generating a data signal according to any of examples 8 to 13.

Example 25 is the physical layer controller of example 24, further comprising a MAC-input interface configured to connect to a Medium Access Controller.

The examples described previously in connection with FIGS. 2*a* to 2*i* may be summarized as follows:

Example 1 is an apparatus for generating a differential signal pair, comprising:

an output interface circuit configured to simultaneously supply a first signal of the differential signal pair to a first transmission line of a transmission link, and a second signal of the differential signal pair to a second transmission line of the transmission link, wherein the first signal and the second signal are both at a first signal level; and a processing circuit configured to change the signal level of the first signal to a second signal level if the first signal corresponds to a first polarity.

Example 2 is the apparatus of example 1, wherein, if the first signal corresponds to the first polarity, the processing circuit is further configured to maintain the second signal at the first signal level.

Example 3 is the apparatus of example 1 or example 2, wherein, if the first signal corresponds to a second polarity, the processing circuit is further configured to:

change the signal level of the second signal to the second signal level; and maintain the first signal at the first signal level.

Example 4 is the apparatus of any of examples 1 to 3, wherein the processing circuit is configured to change the signal level of the first signal to the second signal level by generating a falling signal edge in the first signal.

Example 5 is the apparatus of any of the preceding examples, wherein the processing circuit is further configured to generate one of the first signal and the second signal to comprise a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

Example 6 is the apparatus of example 5, wherein the first type is a rising edge and the second type is a falling edge, or wherein the second type is a rising edge and the first type is a falling edge.

Example 7 is the apparatus of example 5 or example 6, wherein a sum of the first time period and the second time period is lower than 10-7 s.

Example 8 is the apparatus of any of examples 5 to 7, wherein the first data is a first data symbol and the second data is a second data symbol to be transmitted according to a data communication protocol.

Example 9 is an apparatus for processing a differential signal pair, comprising:

an input interface circuit configured to simultaneously receive a first signal of the differential signal pair from a first transmission line of a transmission link, and a second signal of the differential signal pair from a second transmission line of the transmission link, wherein the first signal and the second signal are initially both at a first signal level; and a processing circuit configured to determine that the first signal corresponds to a first polarity if the signal level of the first signal changes to a second signal level.

Example 10 is the apparatus of example 9, wherein the processing circuit is further configured to determine that the first signal corresponds to the first polarity if the second signal remains at the first signal level.

Example 11 is the apparatus of example 9 or example 10, wherein the processing circuit is further configured to determine that the first signal corresponds to a second polarity if the signal level of the second signal changes to the second signal level, and if the first signal maintains at the first signal level.

Example 12 is the apparatus of any of examples 9 to 11, wherein the processing circuit is configured to determine that the first signal changes to the second signal level by means of a falling signal edge in the first signal.

Example 13 is the apparatus of any of examples 9 to 12, wherein the processing circuit comprises:

a NAND gate configured to generate a logic signal based on the first signal and the second signal;

a first NOR gate configured to generate a first decision signal based on the first signal and the logic signal;

a second NOR gate configured to generate a second decision signal based on the second signal and the logic signal; and a flip-flop circuit configured to output, based on the first decision signal and the second decision signal, a polarity signal indicative of the polarity of the first signal.

Example 14 is the apparatus of any of examples 9 to 12, wherein the processing circuit comprises:

a time-to-digital converter configured to simultaneously sample the first signal and the second signal based on a reference clock signal, wherein the time-to-digital converter is further configured to provide an information signal indicative of the one of the first signal and the second signal that changes from the first signal level to the second signal level.

Example 15 is the apparatus of example 14, wherein the processing circuit further comprises: a signal swapping circuit configured to receive the first signal and the second signal, and to provide one of the first signal and the second signal to a first input of the time-to-digital converter based on the information signal, and to provide the other one of the first signal and the second signal to a second input of the time-to-digital converter based on the information signal.

Example 16 is the apparatus of any of examples 9 to 15, wherein the processing circuit is further configured to determine a sequence of a first signal edge of a first type, a second signal edge of a second type, and a third signal edge of the first type based on at least one of the first signal and the second signal, wherein the apparatus further comprises a demodulation circuit configured to determine first data based on a first time period between the first signal edge and the second signal edge, and second data based on a second time period between the second signal edge and the third signal edge.

Example 17 is the apparatus of example 16, wherein the time-to-digital converter is used for determine the sequence of the first signal edge, the second signal edge of a second type, and the third signal edge.

Example 18 is the apparatus of example 16 or example 17, wherein the first type is a rising edge and the second type is a falling edge, or wherein the second type is a rising edge and the first type is a falling edge.

Example 19 is the apparatus of any of examples 16 to 18, wherein a sum of the first time period and the second time period is lower than 10-7 s.

Example 20 is the apparatus of any of examples 16 to 19, wherein the processing circuit is configured to determine the first signal edge, the second signal edge, and the third signal edge based on both the first signal and the second signal.

Example 21 is a method for generating a differential signal pair, comprising:

simultaneously supplying a first signal of the differential signal pair to a first transmission line of a transmission link, and a second signal of the differential signal pair to a second transmission line of the transmission link, the first signal and the second signal initially being both at a first signal level; and changing the signal level of the first signal to a second signal level if the first signal corresponds to a first polarity.

Example 22 is the method of example 21, further comprising generating a falling signal edge in the first signal to change the signal level of the first signal to the second signal level.

Example 23 is a method for processing a differential signal pair, comprising:

simultaneously receiving a first signal of the differential signal pair from a first transmission line of a transmission link, and a second signal of the differential signal pair from a second transmission line of the transmission link, wherein the first signal and the second signal are both at a first signal level; and determining that the first signal corresponds to a first polarity if the signal level of the first signal changes to a second signal level.

Example 24 is the method of example 23, further comprising swapping the first signal and the second signal at an input of the time-to-digital converter depending on the first polarity.

Example 25 is a physical layer controller for a communication interface, the physical layer controller comprising an apparatus for processing a differential signal pair according to any of examples 9 to 20.

Example 26 is a physical layer controller of example 25, further comprising a MAC-output interface configured to connect to a Medium Access Controller.

Example 27 is a physical layer controller for a communication interface, the physical layer controller comprising an apparatus for generating a differential signal pair according to any of examples 1 to 8.

Example 28 is the physical layer controller of example 27, further comprising a MAC-input interface configured to connect to a Medium Access Controller.

The examples described previously in connection with FIGS. 3*a* to 3*h* may be summarized as follows:

Example 1 is a method to generate a data signal that is based on a series of data symbols, the method comprising:

determining a deviation from a desired signal property for a group of data symbols as a present deviation;

comparing the present deviation with an accumulated deviation, the accumulated deviation being based on preceding data symbols of the series of data symbols; and generating a group of transmit symbols comprising an inverted data symbol for every data symbol of the group of data symbols if both the present deviation and the accumulated deviation have an identical property; or the group of data symbols if both the present deviation and the accumulated deviation have a different property.

Example 2 is the method of example 1, further comprising updating the accumulated deviation based on the group of transmit symbols.

Example 3 is the method of any of the preceding examples, wherein the desired signal property is at least one of an average target frequency or an average common mode of the data signal.

Example 4 is the method of any of the preceding examples, wherein the desired signal property is at least one of an average length of a time period which is associated to a data symbol, or a desired difference between an average duration of two signal states of the data signal.

Example 5 is the method of example 4, wherein the average length of the time period is 50% of a maximum length associated to a data symbol.

Example 6 is the method of example 4, wherein the desired difference is zero.

Example 7 is the method of any of the preceding examples, wherein the group of data symbols comprises at least one payload data symbol.

Example 8 is the method of example 3, further comprising:

changing the average target frequency to a further average target frequency; and determining a deviation from the further average target frequency for a further group of data symbols as the present deviation.

Example 9 is the method of example 8, wherein changing the average target frequency comprises choosing the further average target frequency from a predetermined sequence of average target frequencies.

Example 10 is the method of example 8, wherein changing the average target frequency comprises determining the further average target frequency using a random number generation method.

Example 11 is the method of any of the preceding examples, wherein determining the present deviation further comprises considering a spreading factor for the group of data symbols.

Example 12 is the method of example 11, further comprising:

determining an accumulated value of the signal property for the data symbols within the group of data symbols; and adding the spreading factor to the accumulated value to determine a present estimate of the signal property; and comparing the present estimate with the desired signal property to determine the present deviation.

Example 13 is the method of example 11 or 12, further comprising:

choosing the spreading factor from a predetermined sequence of spreading factors; or determining the spreading factor using a random number generation method.

Example 14 is the method of any of the preceding examples, further comprising including at least one status data symbol into the group of transmit data symbols, the at least one status data symbol indicating if the group of transmit data symbols comprises inverted data symbols.

Example 15 is a method to generate a data signal that is based on a series of data symbols, the method comprising:

determining a deviation from a desired signal property for every second data symbol of a group of data symbols as a first present deviation;

determining a deviation from the desired signal property for the remaining data symbols of the group of data symbols as a second present deviation;

comparing the first present deviation with a first accumulated deviation, the first accumulated deviation being based on every second data symbol of preceding groups of data symbols;

comparing the second present deviation with a second accumulated deviation, the second accumulated deviation being based on the remaining data symbols of the preceding groups of data symbols;

generating a group of transmit symbols comprising:

an inverted data symbol for every second data symbol of the group of data symbols if both the first present deviation and the first accumulated deviation comprise an identical property; or every second data symbol of the group of data symbols if both the first present deviation and the first accumulated deviation comprise a different property; and an inverted data symbol for every remaining data symbol of the group of data symbols if both the second present deviation and the second accumulated deviation comprise an identical property; or every remaining data symbol of the group of data symbols if both the second present deviation and the second accumulated deviation comprise a different property.

Example 16 is the method of example 15, further comprising including at least a first status data symbol and a second status data symbol into the group of transmit symbols, the first status data symbol indicating if every second data symbol of the group of transmit symbols is an inverted data symbol; and the second status data symbol indicating if every remaining data symbol of the group transmit symbols is an inverted data symbol.

Example 17 is the method of example 15 or 15, wherein the desired signal property is an average length of a time period associated with a data symbol.

Example 18 is a method for receiving a data signal, the method comprising:

receiving a group of transmit symbols comprising at least one status data symbol and a group of data symbols; and inverting data symbols of the group of transmit symbols if the status data symbol indicates that the group of transmit symbols comprises inverted data symbols.

Example 19 is the method of example 18, further comprising:

demodulating the status symbol using a first demodulation scheme; and demodulating the data symbols using a second demodulation scheme.

Example 20 is an apparatus for generating a data signal that is based on a series of data symbols, the apparatus comprising:

a monitoring circuit configured to determine a deviation from a desired signal property for a group of data symbols as a present deviation;

decision circuitry configured to compare the present deviation with an accumulated deviation, the accumulated deviation being based on preceding data symbols of the series of data symbols; and circuitry configured to generate a group of transmit symbols, comprising:

an inverted data symbol for every data symbol of the group of data symbols if both the present deviation and the accumulated deviation comprise an identical sign; or the data symbols of the group of data symbols if both the present deviation and the accumulated deviation comprise a different sign.

Example 21 is the apparatus of example 20, further comprising circuitry configured to update the accumulated deviation based on the group of transmit symbols.

Example 22 is the apparatus of example 20 or 21, wherein the desired signal property is at least one of an average target frequency or an average common mode of the data signal.

Example 23 is the apparatus of any of examples 20 to 22, wherein the desired signal property is at least one of an average length of a time period associated to a data symbol within the group of transmit symbols, or an average difference between the duration of two signal states of the data signal.

Example 24 is the apparatus of example 23, wherein the average length of the time period is 50% of a maximum length associated to a transmit symbol.

Example 25 is the apparatus of example 23, wherein the average difference is zero.

Example 26 is the apparatus of example 22, wherein the monitoring circuit is further configured to change the average target frequency.

Example 27 is the apparatus of example 26, wherein changing the average target frequency comprises choosing the average target frequency from a predetermined sequence of average target frequencies.

Example 28 is the apparatus of example 27, wherein changing the average target frequency comprises determining the average target frequency using a random number generation method.

Example 29 is the apparatus of any of the preceding examples, wherein the monitoring circuit is further configured to determine the present deviation considering a spreading factor for the group of data symbols.

Example 30 is the apparatus of example 29, wherein the monitoring circuit is configured to determine an accumulated value of the signal property for the data symbols within the group of data symbols; to add the spreading factor to the accumulated value to determine a present estimate of the signal property; and to compare the present estimate with the desired signal property to determine the present deviation.

Example 31 is the apparatus of example 29 or 30, further comprising choosing the spreading factor from a predetermined sequence of spreading factors; or determining spreading factor using a random number generation method.

Example 32 is the apparatus of any of examples 20 to 31, wherein the group of transmit symbols comprises at least one payload data symbol.

Example 33 is the apparatus of any of examples 20 to 32, further comprising a multiplexer circuit configured to include the group of transmit data symbols and at least one status data symbol into the data signal, the at least one status data symbol indicating if the group of transmit data symbols comprises inverted data symbols.

Example 34 is the apparatus of any of examples 20 to 33, wherein the circuitry configured to generate the group of transmit symbols comprises a XOR gate or a XNOR gate.

Example 35 is the apparatus of any of examples 20 to 34, further comprising an input interface configured to receive the series of data symbols.

Example 36 is the apparatus of any of examples 20 to 35, further comprising:

a processing circuit configured to generate the data signal, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol of; and an output interface circuit configured to output the data signal.

Example 37 is an apparatus for receiving a data signal, comprising:

input circuitry configured to receive a group of transmit symbols comprising at least one status data symbol and a group of data symbols; and inversion circuitry configured to invert the data symbols of the group transmit symbols if the status data symbol indicates that the group of transmit symbols comprises inverted data symbols.

Example 38 is the apparatus of example 37, further comprising:

a demodulation circuit configured to demodulate the status data symbol using a first demodulation scheme; and demodulating the data symbols using a second demodulation scheme.

Example 39 is a physical layer controller for a communication interface, the physical layer controller comprising an apparatus for receiving a data signal according to any of examples 37 or 38.

Example 40 is a physical layer controller of example 39, further comprising a MAC-output interface configured to connect to a Medium Access Controller.

Example 41 is a physical layer controller for a communication interface, the physical layer controller comprising an apparatus for generating a data signal according to any of examples 20 to 36.

Example 42 is the physical layer controller of example 41, further comprising a MAC-input interface configured to connect to a Medium Access Controller.

The examples described previously in connection with FIGS. 4*a* to 4*h* may be summarized as follows:

Example 1 is an apparatus for generating a data signal, comprising:

a processing circuit configured to generate the data signal, the data signal comprising a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period, wherein the first time period is longer than a payload data threshold, the second time period is shorter than a payload data threshold, wherein the third time period is longer than the payload data threshold and different from the first time period, and wherein the fourth time period is substantially equal to the second time period; and an output interface circuit configured to output the data signal.

Example 2 is an apparatus for generating a data signal, comprising:

a processing circuit configured to generate the data signal, the data signal comprising a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period, wherein the first time period is shorter than a payload data threshold, the second time period is longer than the payload data threshold, the third time period is equal to the first time period, and the fourth time period longer than the payload data threshold and different from the second time period; and an output interface circuit configured to output the data signal.

Example 3 is the apparatus of example 1 or 2, wherein the processing circuit is configured to determine a difference between the first time period and the third time period according to a predetermined modulation scheme.

Example 4 is the apparatus of example 1 or 2, wherein the processing circuit is configured to determine a difference between the first time period and the third time period according to a random modulation scheme.

Example 5 is the apparatus of any of examples 1 to 4, wherein the first type is a rising edge and the second type is a falling edge, or wherein the second type is a rising edge and the first type is a falling edge.

Example 6 is an apparatus for generating a data stream, comprising:

a processing circuit configured to generate a data stream comprising a sequence of a control symbol indicator, a control symbol indicating an idle state, a further control symbol indicator, and a further control symbol indicating the idle state; wherein the control symbol indicator is associated to a first time period, the control symbol is associated to a second time period, the further control symbol indicator is associated to a third time period; and the further control symbol is associated to the second time period; and a modulator circuit configured determine the first time period and the third time period by varying time periods within a time period interval according to a predetermined modulation scheme.

Example 7 is an apparatus for generating a data stream, comprising:

a processing circuit configured to generate a data stream comprising a sequence of a control symbol indicating an idle state, a control symbol indicator, a further control symbol indicating the idle state, and a further control symbol indicator; wherein the control symbol is associated to a first time period, the control symbol indicator is associated to a second time period, the further control symbol is associated to a third time period, and the further control symbol indicator is associated to a fourth time period; and a modulator circuit configured determine the second time period and the fourth time period by varying time periods within a time period interval according to a predetermined modulation scheme.

Example 8 is the apparatus of example 6 or 7, wherein the modulator circuit is configured to determine differing associated first and third time periods.

Example 9 is the apparatus of any of examples 6 to 8, further comprising an output interface circuit configured to output the data signal.

Example 10 is a method for generating a data signal, comprising:

generating a sequence of a first signal edge of a first type, a second signal edge of a second type, a third signal edge of the first type, a fourth signal edge of the second type, and a fifth signal edge of the first type, the first signal edge and the second signal edge being separated by a first time period, the second signal edge and the third signal edge being separated by a second time period, the third signal edge and the fourth signal edge being separated by a third time period, and the fourth signal edge and the fifth signal edge being separated by a fourth time period wherein the first time period is longer than a payload data threshold, wherein the second time period is shorter than a payload data threshold, wherein the third time period is longer than the payload data threshold, and wherein the fourth time period is substantially equal to the second time period; and varying the third time period to be different from the first time period.

Example 11 is the method of example 10, further comprising reading the first time period and the second time period from a memory.

Example 12 is a method for generating a data stream, comprising:

generating a data stream comprising a sequence of a control symbol indicator, a control symbol indicating an idle state, a further control symbol indicator, and a further control symbol indicating the idle state; wherein the control symbol indicator is associated to a first time period, the control symbol is associated to a second time period, the further control symbol indicator is associated to a third time period; and the further control symbol is associated to the second time period; and varying a time period within a time period interval to generate the first time period and a third time period different from the first period.

Example 13 is the method of example 12, further comprising using a random number generation method to vary the time period or using a predetermined modulation scheme to vary the time period.

Example 14 is a physical layer controller for a communication interface, the physical layer controller comprising an apparatus for generating a data signal according to any of examples 1 to 5.

Example 15 is a physical layer controller for a communication interface, the physical layer controller comprising an apparatus for generating a data stream according to any of examples 6 to 9.

Example 16 is the physical layer controller of example 14 or 15, further comprising a MAC-output interface configured to connect to a Medium Access Controller.

The examples described previously in connection with FIGS. 5*a* to 5*f* may be summarized as follows:

Example 1 is a transmission system, comprising:

a first transmitter coupled to a first output interface for a first data link;

a second transmitter coupled to a second output interface for a second data link;

a multiplexer circuit configured to switch a signal derived from a first data signal generated by the first transmitter to a filter circuit, the filter circuit being coupled to the second output interface.

Example 2 is the transmission system of example 1, wherein the filter circuit comprises a variable filter characteristic.

Example 3 is the transmission system of example 2, wherein the filter circuit comprises a high pass characteristic.

Example 4 is the transmission system of any of examples 1 to 3, wherein the filter circuit comprises:

a positive input for a positive component of a differential data signal and a negative input for a negative component of the differential data signal;

a positive output for the positive component of the differential data signal and a negative output for the negative component of the differential data signal, wherein filter circuitry is coupled between the positive input and the negative output and between the negative input and the positive output.

Example 5 is the transmission system of any of examples 1 to 4, further comprising:

a first apparatus for generating the first data signal, the first apparatus comprising:

a first processing circuit configured to generate the first data signal, the first data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted; the processing circuit being coupled to the first transmitter; and a second apparatus for generating the second data signal, the second apparatus comprising:

a second processing circuit configured to generate the second data signal, the second data signal comprising a sequence of a fourth signal edge of the first type, a fifth signal edge of the second type, and a sixth signal edge of the first type, the fourth signal edge and the fifth signal edge being separated by a third time period corresponding to third data to be transmitted, and the fifth signal edge and the sixth signal edge being separated by a fourth time period corresponding to fourth data to be transmitted;

the second processing circuit being coupled to the second transmitter.

Example 6 is a data reception system, comprising:

a first receiver coupled to a first input interface for a first data link;

a second receiver coupled to a second input interface for a second data link; and a multiplexer circuit configured to switch a signal derived from a first data signal received at the first input interface to a filter circuit, an output of the filter circuit being coupled to the second input interface.

Example 7 is the data reception system of example 6, wherein the filter circuit has a variable filter characteristic.

Example 8 is the data reception system of example 6 or 7, further comprising:

a first apparatus for receiving a data signal coupled to the first input interface, comprising:

a first processing circuit configured to determine a sequence of a first signal edge of a first type, a second signal edge of a second type, and a third signal edge of the first type in a first data signal; and a first demodulation circuit configured to determine first data based on a first time period between the first signal edge and the second signal edge; and second data based on a second time period between the second signal edge and the third signal edge; and a second apparatus for receiving a data signal coupled to the second input interface, comprising:

a second processing circuit configured to determine a sequence of a fourth signal edge of the first type, a fifth signal edge of the second type, and a sixth signal edge of the first type in the data signal; and a second demodulation circuit configured to determine third data based on a third time period between the fourth signal edge and the fifth signal edge; and fourth data based on a fourth time period between the fifth signal edge and the sixth signal edge.

Example 9 is the transmission system of any of examples 1 to 5 or the data reception system of any of examples 6 to 8, wherein the first type is a rising edge and the second type is a falling edge, or wherein the second type is a rising edge and the first type is a falling edge.

Example 10 is a method to mitigate leakage of a first interconnect into a second interconnect, comprising:

deriving a data signal from a first data signal generated by a first transmitter of the first interconnect to generate a raw signal;

filtering the raw signal to generate a correction signal; and applying the correction signal to a second data link used by the second interconnect.

Example 11 is the method of example 10, wherein filtering uses a high pass characteristic.

Example 12 is the method according to example 10 or 11, further comprising adjusting an amplitude, phase and delay of the correction signal.

Example 13 is the method of any of examples 10 to 12, further comprising determining a signal characteristic of a second data signal on the second data link.

Example 14 is the method of example 13, further comprising varying a filter characteristic to filter the raw signal until the signal characteristic fulfills a predetermined criterion.

Example 15 is the method of example 13 or 14, wherein the characteristic is at least one of a Bit Error Rate or Jitter.

Example 16 is the method of example 14 or 15, wherein the predetermined criterion is fulfilled if the signal characteristic exhibits a minimum or if the signal characteristic is below a predetermined threshold.

Example 17 is the method of examples 10 to 16, wherein deriving the data signal from the first data signal comprises at least one of copying or sampling the first data signal.

Example 18 is a data communication interlink, comprising:

at least one transmission system of one of examples 1 to 5; and at least data reception system of one of examples 6 to 8.

Example 19 is the data communication interlink, further comprising:

a first data link coupled between the first transmitter and the first receiver; and a second data link coupled between the second transmitter and the second receiver.

Example 20 is a physical layer controller for a communication interlink, the physical layer controller comprising a transmission system according to one of examples 1 to 5.

Example 21 is a physical layer controller for a communication interface, the physical layer controller comprising a data reception system according to one of examples 6 to 8.

Example 22 is the physical layer controller of example 20 or 21, further comprising:

a MAC-output interface configured to connect to a Medium Access Controller.

The examples described previously in connection with FIGS. 6*a* to 6*g* may be summarized as follows:

Example 1 is a method for processing a data signal, the method comprising:

receiving a group of payload data symbols;

issuing a negative acknowledge signal if the data symbols of the group contain an error;

receiving a second group of payload data symbols a predetermined number of groups of payload data symbols after issuing the negative acknowledge signal or receiving the second group of payload data symbols a predetermined number of groups of payload data symbols after receiving the group of payload data symbols; and using the payload data symbols of the further group instead of the payload data symbols of the group.

Example 2 is the method of example 1 further comprising:

demodulating the payload data symbols of the group using a first demodulation scheme; and demodulating the payload data symbols of the second group using a second demodulation scheme.

Example 3 is the method of example 2, wherein the second demodulation scheme is more robust than the first demodulation scheme.

Example 4 is the method of example 3, wherein a symbol separation time of the second demodulation scheme is longer than the symbol separation time of the first demodulation scheme.

Example 5 is the method of one of examples 1 to 4, further comprising:

receiving the of payload data symbols and the second group of payload data symbols via a first transmission link; and transmitting the negative acknowledge signal via a second transmission link.

Example 6 is a method for generating a data signal, the method comprising:

transmitting a group of payload data symbols; and upon receiving a negative acknowledge signal, transmitting a second group of payload data symbols related to the group of payload data symbols either a predetermined number of groups of payload data symbols after transmitting the group of payload data symbols or a predetermined number of groups of payload data symbols after receiving the negative acknowledge signal.

Example 7 is the method of example 6, further comprising:

modulating payload data into the group of payload data symbols using a first modulation scheme; and modulating the payload data into the further group of payload data symbols using a second modulation scheme.

Example 8 is the method of example 7, wherein the second modulation scheme is more robust than the first modulation scheme.

Example 9 is the method of example 8, wherein a symbol separation time of the second modulation scheme is longer than the symbol separation time of the first modulation scheme.

Example 10 is the method of one of examples 6 to 9, further comprising:

transmitting the group of payload data symbols and the second group of payload data symbols via a first transmission link; and receiving the negative acknowledge signal via a second transmission link.

Example 11 is an apparatus for processing a data signal, the apparatus comprising:

a receiver circuit configured to receive groups of payload data symbols;

an error detection circuit configured to generate a negative acknowledge signal if the data symbols of a group of payload data symbols contain an error; and error correction circuitry configured to use a second group of payload data symbols to replace the group of payload data symbols, the second group of payload data symbols being received a predetermined number of groups of payload data symbols after issuing the negative acknowledge signal or the group of payload data symbols being received a predetermined number of groups of payload data symbols after receiving the group of payload data symbols.

Example 12 is the apparatus of example 11, further comprising: demodulation circuitry configured to demodulate the payload data symbols of the group using a first demodulation scheme and to demodulate the payload data symbols of the second group using a second demodulation scheme.

Example 13 is the apparatus of example 11 or 12, further comprising an input interface for a first transmission link coupled to the receiver circuit to receive a data signal comprising the groups of payload data symbols.

Example 14 is the apparatus of example 13, wherein the input interface is configured to receive the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period; the first time period being based on a first payload data symbol, and the second time period being based on a second payload data symbol.

Example 15 is the apparatus of example 13 or 14, further comprising an output interface for transmitting the negative acknowledge signal via a second transmission link, the output interface coupled to the error detection circuit.

Example 16 is an apparatus for generating a data signal, the apparatus comprising:

a transmitter circuit configured to transmit a group of payload data symbols; and an input interface configured to receive a negative acknowledge signal, wherein the transmitter circuit is further configured to transmit a second group of payload data symbols related to the group of payload data symbols either a predetermined number of groups of payload data symbols after transmitting the group of payload data symbols or a predetermined number of groups of payload data symbols after receiving the negative acknowledge signal.

Example 17 is the apparatus of example 16, wherein the transmitter circuit further comprises a modulator circuit configured to modulate payload data into the group of payload data symbols using a first modulation scheme; and to modulate the payload data into the further group of payload data symbols using a second modulation scheme.

Example 18 is the apparatus of example 17, wherein a symbol separation time of the second modulation scheme is longer than the symbol separation time of the first modulation scheme.

Example 19 is the apparatus of one of examples 16 to 18, further comprising:

an output interface configured to output a data signal comprising the group of payload data symbols and the second group of payload data symbols via a first transmission link; and an input interface configured to receive the negative acknowledge signal via a second transmission link.

Example 20 is the apparatus of example 19, wherein the output interface is configure to output the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period; the first time period being based on a first payload data symbol, and the second time period being based on a second payload data symbol.

Example 21 is a physical layer controller for a communication interface, the physical layer controller comprising an apparatus for processing a data signal according to one of examples 11 to 15.

Example 22 is a physical layer controller of example 21, further comprising a MAC-output interface configured to connect to a Medium Access Controller.

Example 23 is a physical layer controller for a communication interface, the physical layer controller comprising an apparatus for generating a data signal according to any of examples 16 to 20.

Example 24 is the physical layer controller of example 23, further comprising a MAC-input interface configured to connect to a Medium Access Controller.

Example 25 is an interconnect for data transmission, comprising:

a first physical layer controller according to example 21;

a second physical layer controller according to example 23; and a transmission link connecting the first physical layer controller and the second physical layer controller.

The examples described previously in connection with FIGS. 7*a* to 7*i* may be summarized as follows:

Example 1 is a method for determining an assignment of a time period and a symbol width to each payload data symbol of a communication protocol, comprising:

varying the symbol width and the time period assigned to at least one payload data symbol; determining a receive error probability for all payload data symbols; and assigning the time period and the symbol width to the payload data symbol, if the receive error probability of all payload data symbols is substantially equal within a predetermined tolerance range.

Example 2 is the method of example 1, wherein the receive error probability indicates the probability that a payload data symbol generated using the time period is received within a time interval given by the symbol width centered around the time period.

Example 3 is the method of example 1 or 2, wherein varying the symbol width comprises changing the symbol width in finite steps of a resolution of a time to digital converter.

Example 4 is the method of one of examples 1 to 3, wherein varying the time period comprises changing the time period in finite steps of a resolution of a digital to time converter.

Example 5 is the method of one of examples 1 to 4, wherein determining a receive error probability comprises:

transmitting a data signal comprising a data pulse with a width of the time period assigned to a payload data symbol;

receiving the data signal; and determining that the payload data symbol is received if a data pulse having a width within a time interval given by the symbol width centered around the time period is received within the data signal.

Example 6 is a method for generating a data signal, comprising:

assigning a time period within the data signal to each payload data symbol, the time periods of neighboring pairs of payload data symbols being separated by an associated symbol separation time;

wherein at least a first symbol separation time is different from at least a second symbol separation time; and generating the data signal.

Example 7 is the method of example 6, wherein the data signal is generated to comprise a sequence of a first signal edge of a first type, a second signal edge of a second type, and a third signal edge of the first type, the first signal edge and the second signal edge being separated by a first time period assigned to a first payload data symbol and the second signal edge and the third signal edge being separated by a second time period assigned to a second payload data symbol.

Example 8 is the method of one of examples 6 or 7, wherein the symbol separation times increases with increasing time periods.

Example 9 is the method of one of examples 6, 7 or 8, wherein the symbol separation times decreases with increasing time periods.

Example 10 is a method for processing a data signal, comprising:

assigning a time period and a symbol width to each payload data symbol of a communication protocol, wherein at least a first symbol width is different from at least a second symbol width; receiving a data signal comprising a series of data pulses;

determining that a payload data symbol is received if a data pulse having a width within a time interval given by the assigned symbol width centered around the assigned time period is received within the data signal.

Example 11 is the method of example 12, further comprising:

receiving the data signal comprising a sequence of a first signal edge of a first type, a second signal edge of a second type, and a third signal edge of the first type, the first signal edge and the second signal edge constituting a first data pulse, the second signal edge and the third signal edge constituting a second data pulse.

Example 12 is an apparatus for generating a data signal, comprising:

a mapping circuit configured to assign a time period within the data signal to each payload data symbol, the time periods of neighboring pairs of payload data symbols being separated by an associated symbol separation time, wherein at least a first symbol separation time is different from at least a second symbol separation time; and a memory configured to store the time periods.

Example 13 is the apparatus of example 12, further comprising:

an output interface configured to output the data signal, the data signal comprising a sequence of a first signal edge of a first type, a second signal edge of a second type, and a third signal edge of the first type, the first signal edge and the second signal edge being separated by a first time period assigned to a first payload data symbol and the second signal edge and the third signal edge being separated by a second time period assigned to a second payload data symbol.

Example 14 is an apparatus for processing a data signal, comprising:

a memory for assigning a time period and a symbol width to each payload data symbol of a communication protocol, wherein at least a first symbol width is different from at least a second symbol width; and a de-mapping circuit configured to determine that a payload data symbol is received if a data pulse having a width within a time interval given by the respectively assigned symbol width centered around the respectively assigned time period is received within the data signal.

Example 15 is the apparatus of example 14, further comprising:

an input interface configured to receive the data signal comprising a sequence of a first signal edge of a first type, a second signal edge of a second type, and a third signal edge of the first type, the first signal edge and the second signal edge constituting a first data pulse, the second signal edge and the third signal edge constituting a second data pulse.

Example 16 is a physical layer controller for a communication interface, the physical layer controller comprising an apparatus for processing a data signal according to one of examples 14 or 15.

Example 17 is a physical layer controller of example 16, further comprising a MAC-output interface configured to connect to a Medium Access Controller.

Example 18 is a physical layer controller for a communication interface, the physical layer controller comprising an apparatus for generating a data signal according to one of examples 12 or 13.

Example 19 is the physical layer controller of example 18, further comprising a MAC-input interface configured to connect to a Medium Access Controller.

Example 21 is an interconnect for data transmission, comprising:

a first physical layer controller according to example 16;

a second physical layer controller according to example 18; and a transmission link connecting the first physical layer controller and the second physical layer controller.

The examples described previously in connection with FIGS. 8*a* to 8*f* may be summarized as follows:

Example 1 is a method to determine payload data symbols within a data signal, comprising:

receiving a sequence of a first signal edge of a first type, a second signal edge of a second type, a third signal edge of the first type, and a fourth signal edge of the second type in the data signal;

determining a first time period between the first signal edge and the third signal edge;

determining a second time period between the second signal edge and the fourth signal edge; and determining a payload data symbol corresponding to a time period between the third signal edge and the fourth signal edge based on the first time period and on the second time period.

Example 2 is the method of example 1, wherein determining the payload data symbol comprises subtracting the first time period from the second time period to determine a symbol period.

Example 3 is the method of example 2, further comprising assigning the symbol period to a payload data symbol according to a communication protocol.

Example 4 is the method of any of examples 1 to 3, wherein a time period between the first signal edge and the second signal edge corresponds to a control symbol indicating a start of a packet.

Example 5 is an apparatus for processing a data signal, comprising:

a processing circuit configured to determine a sequence of a first signal edge of a first type, a second signal edge of a second type, a third signal edge of the first type, and a fourth signal edge of the second type in the data signal; and a demodulation circuit configured to determine a payload data symbol corresponding to a time period between the third signal edge and the fourth signal edge based on a first time period between the first signal edge and the third signal edge, and a second time period between the second signal edge and the fourth signal edge.

Example 6 is the apparatus of example 5, wherein the demodulation circuit is configured to subtract the first time period from the second time period.

Example 7 is the apparatus of example 5 or 6, wherein the processing circuit comprises:

a first edge detector configured to determine signal edges of the first type in the data signal; and a second edge detector configured to determine signal edges of the second type in the data signal.

Example 8 is the apparatus of example 7, wherein the first edge detector configured to determine only signal edges of the first type in the data signal, and the second edge detector configured to determine only signal edges of the second type in the data signal.

Example 9 is the apparatus of example 7 or 8, further comprising:

a first Time to Digital Converter triggered by an output of the first edge detector; and a second Time to Digital Converter triggered by an output of the second edge detector.

Example 10 is the apparatus of any of examples 4 to 9, wherein the demodulation circuit is operable in a further mode of operation, in which the demodulation circuit is configured to determine a payload data symbol using only the first time period.

Example 11 is a communication system comprising:

an apparatus for generating a data signal, comprising:

a processing circuit configured to generate the data signal, the data signal comprising a sequence of a first signal edge of a first type, a second signal edge of a second type, a third signal edge of the first type, and a fourth signal edge of the second type, the first signal edge and the second signal edge being separated by a first time period corresponding to a first payload data symbol, the second signal edge and the third signal edge being separated by a second time period corresponding to a second payload data symbol; and the third signal edge and the fourth signal edge being separated by a third time period corresponding to a third payload data symbol; and an output interface circuit configured to output the data signal; and an apparatus for receiving the data signal, comprising:

a processing circuit configured to determine the sequence of the first signal edge, the second signal edge, the third signal edge, and the fourth signal edge in the data signal; and a demodulation circuit configured to determine the third payload data symbol using a first receive time period between the first signal edge and the third signal edge, and a second receive time period between the second signal edge and the fourth signal edge.

Example 12 is the apparatus of any of examples 5 to 10, wherein the first type is a rising edge and the second type is a falling edge, or wherein the second type is a rising edge and the first type is a falling edge.

Example 13 is a physical layer controller for a communication interface, the physical layer controller comprising an apparatus for processing a data signal according to one of examples 5 or 10.

Example 14 is the physical layer controller of example 13, further comprising a MAC-output interface configured to connect to a Medium Access Controller.

Example 15 is an interconnect for data transmission, comprising:

a first physical layer controller according to example 13;

a second physical layer controller; and a transmission link connecting the first physical layer controller and the second physical layer controller.

The examples described previously in connection with FIGS. 9*a* to 9*e* may be summarized as follows:

Example 1 is a method to transmit a sequence of data symbols, comprising:

encoding the sequence of data symbols using a gray code to generate a sequence of encoded data symbols;

differentiating the sequence of the encoded data symbols to generate a sequence of transmit data symbols; and transmitting the sequence of transmit data symbols.

Example 2 is the method of example 1, further comprising generating the sequence of data symbols such that the sequence starts with a predetermined data symbol.

Example 3 is the method of example 2, wherein the predetermined data symbol is a control symbol of a communication protocol.

Example 4 is the method of one of examples 1 and 2, wherein encoding the sequence of data symbols comprises, for each data symbol of the sequence:

encoding a bit sequence associated to a single data symbol using the gray code to generate an encoded bit sequence; and modulating the encoded bit sequence to an encoded data symbol using a modulation scheme of a communication protocol.

Example 5 is a method to process a series of received data symbols, comprising:

integrating the series of received data symbols to generate a series of integrated data symbols; and decoding the sequence of integrated data symbols using a gray decoder to generate information on a sequence of data symbols.

Example 6 is the method of example 5, further comprising starting the integration with a predetermined data symbol.

Example 7 is the method of example 6, wherein the predetermined data symbol is a control symbol of a communication protocol.

Example 8 is the method of one of examples 5 and 6, wherein decoding the sequence of integrated data symbols comprises, for each integrated data symbol of the sequence:

demodulating an integrated data symbol using a modulation scheme of a communication protocol to generate an encoded bit sequence; and decoding the encoded bit sequence using the gray code to generate a decoded bit sequence.

Example 9 is an apparatus for transmitting a sequence of data symbols, the apparatus comprising:

an encoder circuit configured to encode the sequence of data symbols using a gray encoder to generate a sequence of encoded data symbols;

a circuit configured to differentiate the sequence of the encoded data symbols to generate a sequence of transmit data symbols; and an output interface configured to output the sequence of transmit data symbols.

Example 10 is the apparatus of example 9, further comprising:

a processing circuit configured to generate a data signal, the data signal comprising a sequence of a first signal edge of a first type, a second signal edge of a second type, and a third signal edge of the first type, the first signal edge and the second signal edge being separated by a first time period corresponding to a first data symbol of the sequence of transmit data symbols, and the second signal edge and the third signal edge being separated by a second time period corresponding to a second data symbol of the sequence of transmit data symbols.

Example 11 is the apparatus of example 10, further comprising a physical layer output interface circuit configured to output the data signal.

Example 12 is an apparatus for processing a series of received data symbols, comprising:

an integrator circuit configured to integrate the series of received data symbols to generate a series of integrated data symbols; and a decoder circuit configured to decode the sequence of the integrated data symbols using a gray code to generate a sequence of data symbols.

Example 13 is the apparatus of example 12, further comprising:

a processing circuit configured to determine a sequence of a first signal edge of a first type, a second signal edge of a second type, and a third signal edge of the first type in a received data signal comprising the series of received data symbols; and a demodulation circuit configured to determine a first received data symbol of the series based on a first time period between the first signal edge and the second signal edge; and a second received data symbol of the series based on a second time period between the second signal edge and the third signal edge.

Example 14 is the apparatus of example 13, wherein the demodulation circuit is configured to determine the first and second received data symbols based on a modified first time period and based on a modified second time period, if the second signal edge is determined within a predetermined interval around a symbol decision threshold.

Example 15 is the apparatus of example 14, wherein the demodulation circuit is configured to determine the modified first time period by increasing the first time period and determine the modified second time period by decreasing the second time period; or determine the modified first time period by decreasing the first time period and determine the modified second time period by increasing the second time period.

Example 16 is an apparatus for transmitting a sequence of data symbols, the apparatus comprising:

an encoder circuit configured to encode the sequence of data symbols using a gray encoder to generate a sequence of transmit data symbols;

a processing circuit configured to generate a data signal, the data signal comprising a sequence of a first signal edge of a first type, a second signal edge of a second type, and a third signal edge of the first type, the first signal edge and the second signal edge being separated by a first time period corresponding to a first data symbol of the sequence of transmit data symbols, and the second signal edge and the third signal edge being separated by a second time period corresponding to a second data symbol of the sequence of transmit data symbols.

Example 17 is an apparatus for processing a series of received data symbols, comprising:

a processing circuit configured to determine a sequence of a first signal edge of a first type, a second signal edge of a second type, and a third signal edge of the first type in a received data signal comprising the series of received data symbols;

a demodulation circuit configured to determine a first received data symbol of the series based on a first time period between the first signal edge and the second signal edge; and a second received data symbol of the series based on a second time period between the second signal edge and the third signal edge; and a decoder circuit configured to decode the sequence of received data symbols using a gray code to generate a sequence of data symbols.

Example 18 is a physical layer controller for a communication interface, the physical layer controller comprising an apparatus for processing a series of received data symbols according to one of examples 12 to 15.

Example 19 is the physical layer controller of example 18, further comprising a MAC-output interface configured to connect to a Medium Access Controller.

Example 20 is a physical layer controller for a communication interface, the physical layer controller comprising an apparatus for generating a sequence of data symbols according to one of examples 9 to 12.

Example 21 is the physical layer controller of example 20, further comprising a MAC-input interface configured to connect to a Medium Access Controller.

Example 22 is an interconnect for data transmission, comprising:

a first physical layer controller according to example 18;

a second physical layer controller according to example 20; and a transmission link connecting the first physical layer controller and the second physical layer controller.

The examples described previously in connection with FIGS. 10*a* to 11*a* may be summarized as follows:

Example 1 is a method to generate a data signal for transmitting a serially ordered predetermined number of bits, the bits comprising a group of bits indicative of a control command, the method comprising:

generating at least one error correction bit for the data bits within each subgroup of multiple subgroups of bits;

ordering the bits of each subgroup and their associated error correction bits along a first dimension of a multidimensional representation of data;

reading the data bits from the multidimensional representation along a second dimension to determine a series of transmit bits;

modulating the series of transmit bits into a series of transmit symbols; and inserting a control symbol indicator and a control symbol into the series of transmit symbols at a position depending on the position of the group of bits indicative of the control command within the series of bits.

Example 2 is the method of example 1, wherein the control symbol indicator and the control symbol are inserted within the transmit symbols generated from bits identified by an index for the second dimension within the multidimensional representation that corresponds to the number of the byte indicative of a control command within the group of bits.

Example 3 is the method of one of examples 1 or 2, wherein the first dimension comprises 63 entries and wherein the second dimension comprises 9 entries.

Example 4 is the method of one of examples 1 to 3, wherein 6 error correction bits are generated for each subgroup comprising 57 bits.

Example 5 is the method of one of examples 1 to 3, wherein the multidimensional representation of data has 2 dimensions.

Example 6 is a method to process a data signal, comprising:

receiving a series of symbols;

identifying a control symbol indicator and a control symbol within the series of symbols;

ordering bits associated to each symbol of the series along a second dimension within a multidimensional representation of data;

replacing a group of bits along a first dimension with a group of bits indicative of a control command at a position within the multidimensional representation that depends on the positions of the control symbol indicator and the control symbol within the series of symbols; and evaluating an error correction code along the first dimension of the multidimensional representation.

Example 7 is the method of example 3, further comprising reading the data bits of the multidimensional representation along the first dimension.

Example 8 is an apparatus for generating a data signal to transmit a serially ordered predetermined number of bits, the bits comprising a group of bits indicative of a control command, the apparatus comprising:

a code generation circuit configured to generate at least one error correction bit for the data bits within each subgroup of multiple subgroups of bits;

an interleaving circuit configured to order the bits of each subgroup and their associated error correction bits along a first dimension of a multidimensional representation of data; and to read the data bits from the multidimensional representation along a second dimension to determine a series of transmit bits; and a modulator circuit configured to modulate the series of transmit bits into a series of transmit symbols; and to insert a control symbol indicator and a control symbol into the series of transmit symbols at a position depending on the position of the group of bits indicative of the control command within the series of bits.

Example 9 is the apparatus of example 8, wherein the modulator circuit is configured to insert the control symbol indicator and the control symbol within the transmit symbols generated from bits identified by an index for the second dimension within the multidimensional representation that corresponds to the number of the byte indicative of a control command within the group of bits.

Example 10 is the apparatus of example 8 or 9, further comprising:

a processing circuit configured to generate the data signal, the data signal comprising a sequence of a first signal edge of a first type, a second signal edge of a second type, and a third signal edge of the first type, the first signal edge and the second signal edge being separated by a first time period corresponding to a first transmit symbol, and the second signal edge and the third signal edge being separated by a second time period corresponding to a second transmit symbol; and an output interface circuit configured to output the data signal.

Example 11 is an apparatus for processing a data signal, comprising:

a demodulator circuit configured to receive a series of symbols;

identify a control symbol indicator and a control symbol within the series of symbols; and demodulate each symbol into associated bits;

a de-interleaving circuit configured to order the bits associated to each symbol of the series along a second dimension within a multidimensional representation of data;

to replace a group of bits along a first dimension with a group of bits indicative of a control command at a position within the multidimensional representation that depends on the positions of the control symbol indicator and the control symbol within the series of symbols; and to read out the bits of the multidimensional representation along a first dimension; and a code evaluation circuit configured to evaluate an error correction code for the bits read out along the first dimension to determine corrected bits.

Example 12 is the apparatus of example 11, further comprising an input interface configured to receive a sequence of a first signal edge of a first type, a second signal edge of a second type, and a third signal edge of the first type in the data signal, wherein the demodulation circuit is configured to determine first associated bits based on a first time period between the first signal edge and the second signal edge, and second associated bits based on a second time period between the second signal edge and the third signal edge.

Example 13 is a physical layer controller for a communication interface, the physical layer controller comprising an apparatus for generating a data signal according to any of examples 8 or 9.

Example 14 is the physical layer controller of example 13, further comprising a MAC-input interface configured to connect to a Medium Access Controller to receive the serially ordered predetermined number of bits.

Example 15 is a physical layer controller for a communication interface, the physical layer controller comprising an apparatus for processing a data signal according to any of examples 11 or 12.

Example 16 is a physical layer controller of example 15, further comprising a MAC-output interface configured to connect to a Medium Access Controller to output the corrected bits.

Example 17 is an interconnect for data transmission, comprising:

a first physical layer controller according to example 13;

a second physical layer controller according to example 15; and a transmission link connecting the first physical layer controller and the second physical layer controller.

The examples described above in connection with FIGS. 12a to 12p may be summarized as follows:

Example 1 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to a payload data symbol to be transmitted according to a communication protocol, and the second signal edge and the third signal edge being separated by a second time period being longer than a time period of any payload data symbol of the communication protocol. Further, the apparatus for generating the data signal comprises an output interface circuit configured to output the data signal.

Example 2 is the apparatus of example 1, wherein the processing circuit is further configured to generate a fourth signal edge of the second type, and wherein the third signal edge and the fourth signal edge are separated by a third time period corresponding to a control symbol of the communication protocol.

Example 3 is the apparatus of example 2, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 4 is the apparatus of example 2 or 3, wherein the time periods corresponding to different payload data symbols of the communication protocol differ by at least a symbol separation time, and wherein the time periods corresponding to different control symbols of the communication protocol differ by more than the symbol separation time.

Example 5 is the apparatus of example 4, wherein the time periods corresponding to different control symbols differ by an integer multiple of the symbol separation time.

Example 6 is the apparatus of example 1, wherein the processing circuit is further configured to generate a fourth signal edge of the second type, the third signal edge and the fourth signal edge being separated by a third time period being longer than a time period of any payload data symbol of the communication protocol.

Example 7 is the apparatus of any of examples 1 to 6, wherein the first type is a rising edge and the second type is a falling edge, or wherein the second type is a rising edge and the first type is a falling edge.

Example 8 is the apparatus of any of examples 1 to 7, wherein the processing circuit is a digital-to-time converter.

Example 9 is the apparatus of any of examples 1 to 8, wherein the processing circuit is further configured to generate a fifth signal edge of the second type, wherein the fifth signal edge precedes the first signal edge, the fifth signal edge and the first signal edge being separated by a fourth time period corresponding to another payload data symbol.

Example 10 is the apparatus of example 9, wherein a sum of the first time period and the fourth time period is lower than $10^{-7}$ s.

Example 11 is the apparatus of example 9 or example 10, wherein a sum of the first time period and the fourth time period is lower than an average time period between consecutive signal edges of the same type.

Example 12 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to a control symbol of a communication protocol, and the second signal edge and the third signal edge being separated by a second time period being longer than a time period of any payload data symbol of the communication protocol. Further, the apparatus for generating the data signal comprises an output interface circuit configured to output the data signal.

Example 13 is the apparatus of example 12, wherein the processing circuit is further configured to generate a fourth signal edge of the second type, and wherein the third signal edge and the fourth signal are being separated by a third time period corresponding to a payload data symbol of the communication protocol.

Example 14 is the apparatus of example 13, wherein the processing circuit is further configured to generate a fifth signal edge of the first type, the fourth signal edge and the fifth signal edge being separated by a fourth time period corresponding to another payload data symbol of the communication protocol.

Example 15 is the apparatus of example 14, wherein a sum of the third time period and the fourth time period is lower than $10^{-7}$ s.

Example 16 is the apparatus of example 14 or example 15, wherein a sum of the third time period and the fourth time period is lower than an average time period between consecutive signal edges of the same type.

Example 17 is the apparatus of any of examples 12 to 16, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 18 is the apparatus of any of examples 12 to 17, wherein the time periods corresponding to different payload data symbols of the communication protocol differ by at least a symbol separation time, and wherein the time periods corresponding to different control symbols of the communication protocol differ by more than the symbol separation time.

Example 19 is the apparatus of example 18, wherein the time periods corresponding to different control symbols differ by an integer multiple of the symbol separation time.

Example 20 is the apparatus of any of examples 12 to 19, wherein the first type is a rising edge and the second type is a falling edge, or wherein the second type is a rising edge and the first type is a falling edge.

Example 21 is the apparatus of any of examples 12 to 20, wherein the processing circuit is a digital-to-time converter.

Example 22 is an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine a payload data symbol of a communication protocol based on a first time period between the first signal edge and the second signal edge if the first time period is shorter than a payload data threshold, and to determine a control symbol indicator if a second time period between the second signal edge and the third signal edge is longer than the payload data threshold.

Example 23 is the apparatus of example 22, wherein the processing circuit is further configured to determine a fourth signal edge of the second type in the data signal, and wherein the demodulation circuit is configured to determine a control symbol of the communication protocol based on a third time period between the third signal edge and the fourth signal edge.

Example 24 is the apparatus of example 22 or example 23, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 25 is the apparatus of any of examples 22 to 24, wherein the time periods corresponding to different payload data symbols of the communication protocol differ by at least a symbol separation time, and wherein the time periods corresponding to different control symbols of the communication protocol differ by more than the symbol separation time.

Example 26 is the apparatus of example 25, wherein the time periods corresponding to different control symbols differ by an integer multiple of the symbol separation time.

Example 27 is the apparatus of any of examples 22 to 26, wherein the first type is a rising edge and the second type is a falling edge, or wherein the second type is a rising edge and the first type is a falling edge.

Example 28 is the apparatus of any of examples 22 to 27, wherein the processing circuit is a time-to-digital converter.

Example 29 is the apparatus of any of examples 22 to 28, wherein the processing circuit is further configured to determine a fifth signal edge of the second type in the data signal, wherein the fifth signal edge precedes the first signal edge in time, and wherein the demodulation circuit is configured to determine another payload data symbol based on a fourth time period between the fifth signal edge and the first signal edge if the fourth time period is shorter than the payload data threshold.

Example 30 is the apparatus of example 29, wherein a sum of the first time period and the fourth time period is lower than $10^{-7}$ s.

Example 31 is an apparatus for decoding a data signal. The apparatus for decoding the data signal comprises a processing circuit configured to determine a sequence of a first signal edge of a first type, a second signal edge of a second type, and a third signal edge of the first type in the data signal. Additionally, the apparatus for decoding the data signal comprises a demodulation circuit configured to determine a control symbol of a communication protocol based on a first time period between the first signal edge and the second signal edge, and to determine a control symbol indicator if a second time period between the second signal edge and the third signal edge is longer than a payload data threshold.

Example 32 is the apparatus of example 31, wherein the processing circuit is further configured to determine a fourth signal edge of the second type in the data signal, and wherein the demodulation circuit is configured to determine a payload data symbol of the communication protocol based on a third time period between the third signal edge and the fourth signal edge if the third time period is shorter than the payload data threshold.

Example 33 is the apparatus of example 31, wherein the processing circuit is further configured to determine a fifth signal edge of the first type in the data signal, and wherein the demodulation circuit is configured to determine another payload data symbol of the communication protocol based on a fourth time period between the fourth signal edge and the fifth signal edge if the third time period is shorter than the payload data threshold.

Example 34 is the apparatus of example 33, wherein a sum of the third time period and the fourth time period is lower than $10^{-7}$ s.

Example 35 is the apparatus of any of examples 31 to 34, wherein the control symbol indicates one of a start of a data packet, an end of a data packet, an idle mode, a subsequent transmission of calibration data, a subsequent transmission with a more robust data packet format, and an inversion of the direction of data flow on a transmission link carrying the data signal.

Example 36 is the apparatus of any of examples 31 to 35, wherein the time periods corresponding to different payload data symbols of the communication protocol differ by at least a symbol separation time; and wherein the time periods corresponding to different control symbols of the communication protocol differ by more than the symbol separation time.

Example 37 is the apparatus of example 36, wherein the time periods corresponding to different control symbols differ by an integer multiple of the symbol separation time.

Example 38 is the apparatus of any of examples 31 to 37, wherein the first type is a rising edge and the second type is a falling edge, or wherein the second type is a rising edge and the first type is a falling edge.

Example 39 is the apparatus of any of examples 31 to 38, wherein the processing circuit is a time-to-digital converter.

Example 40 is a method for generating a data signal. The method comprises generating the data signal, the data signal comprising a sequence of a first signal edge of a first type, a second signal edge of a second type, and a third signal edge of the first type, the first signal edge and the second signal edge being separated by a first time period corresponding to a payload data symbol to be transmitted according to a communication protocol, and the second signal edge and the third signal edge being separated by a second time period being longer than a time period of any payload data symbol of the communication protocol. Further, the method comprises outputting the data signal.

Example 41 is the method of example 40, wherein the data signal further comprises a fourth signal edge of the second type, and wherein the third signal edge and the fourth signal edge are separated by a third time period corresponding to a control symbol of the communication protocol.

Example 42 is the method of example 0, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 43 is the method of example 40, wherein the data signal further comprises a fourth signal edge of the second type, the third signal edge and the fourth signal edge being separated by a third time period being longer than a time period of any payload data symbol of the communication protocol.

Example 44 is the method of any of examples 40 to 43, wherein the data signal further comprises a fifth signal edge of the second type, wherein the fifth signal edge precedes the first signal edge, the fifth signal edge and the first signal edge being separated by a fourth time period corresponding to another payload data symbol.

Example 45 is the method of example 44, wherein a sum of the first time period and the fourth time period is lower than $10^{-7}$ s.

Example 46 is a method for generating a data signal. The method comprises generating the data signal, the data signal comprising a sequence of a first signal edge of a first type, a second signal edge of a second type, and a third signal edge of the first type, the first signal edge and the second signal edge being separated by a first time period corresponding to a control symbol of a communication protocol, and the second signal edge and the third signal edge being separated by a second time period being longer than a time period of any payload data symbol of the communication protocol. Further, the method comprises outputting the data signal.

Example 47 is the method of example 46, wherein the data signal further comprises a fourth signal edge of the second type, the third signal edge and the fourth signal edge being separated by a third time period corresponding to a payload data symbol of the communication protocol.

Example 48 is the method of example 47, wherein the data signal further comprises a fifth signal edge of the first type, the fourth signal edge and the fifth signal edge being separated by a fourth time period corresponding to another payload data symbol of the communication protocol.

Example 49 is the method of example 48, wherein a sum of the third time period and the fourth time period is lower than $10^{-7}$ s.

Example 50 is the method of any of examples 46 to 49, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 51 is a method for decoding a data signal. The method comprises determining a sequence of a first signal edge of a first type, a second signal edge of a second type, and a third signal edge of the first type in the data signal. Further, the method comprises determining a payload data symbol of a communication protocol based on a first time period between the first signal edge and the second signal edge if the first time period is shorter than a payload data threshold. The method additionally comprises determining a control symbol indicator if a second time period between the second signal edge and the third signal edge is longer than the payload data threshold.

Example 52 is the method of example 51, further comprising determining a fourth signal edge of the second type in the data signal, and determining a control symbol of the communication protocol based on a third time period between the third signal edge and the fourth signal edge.

Example 53 is the method of example 51 or example 52, wherein the control symbol indicates one of a start of a data packet, an end of a data packet, an idle mode, subsequent transmission of calibration data, subsequent transmission with a more robust data packet format, and an inversion of the direction of data flow on a transmission link carrying the data signal.

Example 54 is the method of any of examples 51 to 53, further comprising determining a fifth signal edge of the second type in the data signal, wherein the fifth signal edge precedes the first signal edge in time, and determining another payload data symbol based on a fourth time period between the fifth signal edge and the first signal edge if the fourth time period is shorter than the payload data threshold.

Example 55 is the method of example 54, wherein a sum of the first time period and the fourth time period is lower than $10^{-7}$ s.

Example 56 is a method for decoding a data signal. The method comprises determining a sequence of a first signal edge of a first type, a second signal edge of a second type, and a third signal edge of the first type in the data signal. Further, the method comprises determining a control symbol of a communication protocol based on a first time period between the first signal edge and the second signal edge. The method additionally comprises determining a control symbol indicator if a second time period between the second signal edge and the third signal edge is longer than a payload data threshold.

Example 57 is the method of example 56, further comprising determining a fourth signal edge of the second type in the data signal, and determining a payload data symbol of the communication protocol based on a third time period between the third signal edge and the fourth signal edge if the third time period is shorter than the payload data threshold.

Example 58 is the method of example 57, further comprising determining a fifth signal edge of the first type in the data signal, and determining another payload data symbol of the communication protocol based on a fourth time period between the fourth signal edge and the fifth signal edge if the third time period is shorter than the payload data threshold.

Example 59 is the method of example 58, wherein a sum of the third time period and the fourth time period is lower than $10^{-7}$ s.

Example 60 is the method of any of examples 56 to 59, wherein the control symbol indicates one of a start of a data packet, an end of a data packet, an idle mode, a subsequent transmission of calibration data, a subsequent transmission with a more robust data packet format, and an inversion of the direction of data flow on a transmission link carrying the data signal.

The examples described above in connection with FIGS. 12*q* to 12*x* may be summarized as follows:

Example 1 is an apparatus for generating a data signal. The apparatus for generating the data signal comprises a processing circuit configured to generate the data signal, the data signal comprising a sequence of a first signal edge of a first type, a second signal edge of a second type, a third signal edge of the first type, and a fourth signal edge of the second type, the first signal edge and the second signal edge being separated by a first time period being longer than a time period of any payload data symbol of a communication protocol, the second signal edge and the third signal edge being separated by a second time period corresponding to a first control symbol of the communication protocol that indicates succession of at least one further control symbol of the communication protocol, and the third signal edge and the fourth signal edge being separated by a third time period corresponding to a second control symbol of the communication protocol. Further, the apparatus for generating the data signal comprises an output interface circuit configured to output the data signal.

Example 2 is the apparatus of example 1, wherein the data signal further comprises a fifth signal edge of the first type that directly succeeds the fourth signal edge, the fourth signal edge and the fifth signal edge being separated by a fourth time period corresponding to a third control symbol of the communication protocol.

Example 3 is the apparatus of example 1 or example 2, wherein the first control symbol indicates succession of at least one further control symbol of the communication protocol.

Example 4 is the apparatus of any of examples 1 to 3, wherein the data signal further comprises a sequence of a sixth signal edge of the first type, a seventh signal edge of the second type, and an eighth signal edge of the first type, the sixth signal edge and the seventh signal edge being separated by a fifth time period corresponding to a first payload data symbol, the seventh signal edge and the eighth signal edge being separated by a sixth time period corresponding to a second payload data symbol.

Example 5 is the apparatus of example 4, wherein a sum of the fifth time period and the sixth time period is lower than $10^{-7}$ s.

Example 6 is the apparatus of any of examples 1 to 5, wherein the first type is a rising edge and the second type is a falling edge, or wherein the second type is a rising edge and the first type is a falling edge.

Example 7 is the apparatus of any of examples 1 to 6, wherein the processing circuit is further configured to generate a second data signal, the second data signal being inverted with respect to the data signal.

Example 8 is the apparatus of any of examples 1 to 7, wherein the processing circuit is a digital-to-time converter.

Example 9 is an apparatus for generating a data signal. The apparatus for generating the data signal comprises a processing circuit configured to generate the data signal, the data signal comprising a sequence of a first signal edge of a first type, a second signal edge of a second type, a third signal edge of the first type, and a fourth signal edge of the second type, the first signal edge and the second signal edge being separated by a first time period corresponding to a first control symbol of the communication protocol, the second signal edge and the third signal edge being separated by a second time period corresponding to a second control symbol of the communication protocol, and the third signal edge and the fourth signal edge being separated by a third time period being longer than a time period of any payload data symbol of a communication protocol. Further, the apparatus for generating the data signal comprises an output interface circuit configured to output the data signal.

Example 10 is the apparatus of example 9, wherein the data signal further comprises a fifth signal edge of the second type that directly precedes the first signal edge, the first signal edge and the fifth signal edge being separated by a fourth time period corresponding to a third control symbol of the communication protocol.

Example 11 is the apparatus of example 9 or example 10, wherein the second control symbol of the communication protocol indicates that at least one further control symbol of the communication protocol precedes the second control symbol.

Example 12 is the apparatus of any of examples 9 to 11, wherein the data signal further comprises a sequence of a sixth signal edge of the first type, a seventh signal edge of the second type, and an eighth signal edge of the first type, the sixth signal edge and the seventh signal edge being separated by a fifth time period corresponding to a first payload data symbol, the seventh signal edge and the eighth signal edge being separated by a sixth time period corresponding to a second payload data symbol.

Example 13 is the apparatus of example 12, wherein a sum of the fifth time period and the sixth time period is lower than $10^{-7}$ s.

Example 14 is the apparatus of any of examples 9 to 13, wherein the first type is a rising edge and the second type is a falling edge, or wherein the second type is a rising edge and the first type is a falling edge.

Example 15 is the apparatus of any of examples 9 to 14, wherein the processing circuit is further configured to generate a second data signal, the second data signal being inverted with respect to the data signal.

Example 16 is the apparatus of any of examples 9 to 15, wherein the processing circuit is a digital-to-time converter.

Example 17 is an apparatus for decoding a data signal. The apparatus for decoding the data signal comprises a processing circuit configured to determine a sequence of a first signal edge of a first type, a second signal edge of a second type, a third signal edge of the first type, and a fourth signal edge of the second type in the data signal. Further, the apparatus for decoding the data signal comprises a demodulation circuit configured to determine a control symbol indicator if a first time period between the first signal edge and the second signal edge is longer than a payload data threshold defined in a communication protocol, a first control symbol of the communication protocol based on a second time period between the second signal edge and the third signal edge, and a second control symbol of the communication protocol based on a third time period between the third signal edge and the fourth signal edge.

Example 18 is the apparatus of example 17, wherein the processing circuit is further configured to determine a fifth signal edge of the first type that directly succeeds the fourth signal edge, and wherein the demodulation circuit is further configured to determine a third control symbol of the communication protocol based on a fourth time period between the fourth signal edge and the fifth signal edge.

Example 19 is the apparatus of example 17 or example 18, wherein, if the second time period corresponds to a predetermined time period defined in the communication protocol, the first control symbol indicates succession of at least one further control symbol of the communication protocol.

Example 20 is the apparatus of any of examples 17 to 19, wherein the processing circuit is further configured to determine a sequence of a sixth signal edge of the first type, a seventh signal edge of the second type, and an eighth signal edge of the first type in the data signal. The demodulation circuit is configured to determine a first payload data symbol based on a fifth time period between the sixth signal edge and the seventh signal edge, and to determine a second payload data symbol based on a sixth time period between the seventh signal edge and the eighth signal edge.

Example 21 is the apparatus of example 20, wherein a sum of the fifth time period and the sixth time period is lower than $10^{-7}$ s.

Example 22 is the apparatus of any of examples 17 to 21, wherein the first type is a rising edge and the second type is a falling edge, or wherein the second type is a rising edge and the first type is a falling edge.

Example 23 is the apparatus of any of examples 17 to 22, wherein the processing circuit is further configured to receive a second data signal, the second data signal being inverted with respect to the data signal; and wherein the processing circuit is further configured to determine the first signal edge, the second signal edge, the third signal edge and the fourth signal edge further based on the second data signal.

Example 24 is the apparatus of any of examples 17 to 23, wherein the processing circuit is a time-to-digital converter.

Example 25 is an apparatus for decoding a data signal. The apparatus for decoding the data signal comprises a processing circuit configured to determine a sequence of a first signal edge of a first type, a second signal edge of a second type, a third signal edge of the first type, and a fourth signal edge of the second type in the data signal. Further, the apparatus for decoding the data signal comprises a demodulation circuit configured to determine a first control symbol of a communication protocol based on a first time period between the first signal edge and the second signal edge, a second control symbol of the communication protocol that indicates at least one preceding control symbol of the communication protocol if a second time period between the second signal edge and the third signal edge corresponds to a predetermined time period defined in the communication protocol, and a control symbol indicator if a third time period between the third signal edge and the fourth signal edge is longer than a payload data threshold defined in the communication protocol.

Example 26 is the apparatus of example 25, wherein the processing circuit is further configured to determine a fifth signal edge of the second type that directly precedes the first signal edge, and wherein the demodulation circuit is further configured to determine a third control symbol of the communication protocol based on a fourth time period between the fifth signal edge and the first signal edge.

Example 27 is the apparatus of example 25 or example 26, wherein, if the second time period corresponds to a predetermined time period defined in the communication protocol, the second control symbol indicates that at least one further control symbol of the communication protocol precedes the second control symbol.

Example 28 is the apparatus of any of examples 25 to 27, wherein the processing circuit is further configured to determine a sequence of a sixth signal edge of the first type, a seventh signal edge of the second type, and an eighth signal edge of the first type in the data signal. The demodulation circuit is configured to determine a first payload data symbol based on a fifth time period between the sixth signal edge and the seventh signal edge, and to determine a second payload data symbol based on sixth time period between the seventh signal edge and the eighth signal edge.

Example 29 is the apparatus of example 28, wherein a sum of the fifth time period and the sixth time period is lower than $10^{-7}$ s.

Example 30 is the apparatus of any of examples 25 to 29, wherein the first type is a rising edge and the second type is a falling edge, or wherein the second type is a rising edge and the first type is a falling edge.

Example 31 is the apparatus of any of examples 25 to 30, wherein the processing circuit is further configured to receive a second data signal, the second data signal being inverted with respect to the data signal; and wherein the processing circuit is further configured to determine the first signal edge, the second signal edge, the third signal edge and the fourth signal edge further based on the second data signal.

Example 32 is the apparatus of any of examples 25 to 31, wherein the processing circuit is a time-to-digital converter.

Example 33 is a method for generating a data signal. The method comprises generating the data signal, the data signal comprising a sequence of a first signal edge of a first type, a second signal edge of a second type, a third signal edge of the first type, and a fourth signal edge of the second type, the first signal edge and the second signal edge being separated by a first time period being longer than a time period of any payload data symbol of a communication protocol, the second signal edge and the third signal edge being separated by a second time period corresponding to a first control symbol of the communication protocol, and the third signal edge and the fourth signal edge being separated by a third time period corresponding to a second control symbol of the communication protocol. Further, the method comprises outputting the data signal.

Example 34 is the method of example 33, wherein the data signal further comprises a fifth signal edge of the second type that directly succeeds the fourth signal edge, the first signal edge and the fifth signal edge being separated by a fourth time period corresponding to a third control symbol of the communication protocol.

Example 35 is the method of example 33 or example 34, wherein the first control symbol indicates succession of at least one further control symbol of the communication protocol.

Example 36 is the method of any of examples 33 to 35, wherein the data signal further comprises a sequence of a sixth signal edge of the first type, a seventh signal edge of the second type, and an eighth signal edge of the first type, the sixth signal edge and the seventh signal edge being separated by a fifth time period corresponding to a first payload data symbol, the seventh signal edge and the eighth signal edge being separated by a sixth time period corresponding to a second payload data symbol.

Example 37 is the method of example 36, wherein a sum of the fifth time period and the sixth time period is lower than $10^{-7}$ s.

Example 38 is the method of any of examples 33 to 37, wherein the first type is a rising edge and the second type is a falling edge, or wherein the second type is a rising edge and the first type is a falling edge.

Example 39 is the method of any of examples 33 to 38, wherein the method further comprises generating a second data signal, the second data signal being inverted with respect to the data signal.

Example 40 is a method for generating a data signal. The method comprises generating the data signal, the data signal comprising a sequence of a first signal edge of a first type, a second signal edge of a second type, a third signal edge of the first type, and a fourth signal edge of the second type, the first signal edge and the second signal edge being separated by a first time period corresponding to a first control symbol of the communication protocol, the second signal edge and the third signal edge being separated by a second time period corresponding to a second control symbol of the communication protocol, and the third signal edge and the fourth signal edge being separated by a third time period being longer than a time period of any payload data symbol of a communication protocol. Further, the method comprises outputting the data signal.

Example 41 is the method of example 40, wherein the data signal further comprises a fifth signal edge of the second type that directly precedes the first signal edge, the first signal edge and the fifth signal edge being separated by a fourth time period corresponding to a third control symbol of the communication protocol.

Example 42 is the method of example 40 or example 41, wherein the second control symbol of the communication protocol indicates that at least one further control symbol of the communication protocol precedes the second control symbol.

Example 43 is the method of any of examples 40 to 42, wherein the data signal further comprises a sequence of a sixth signal edge of the first type, a seventh signal edge of the second type, and an eighth signal edge of the first type, the sixth signal edge and the seventh signal edge being separated by a fifth time period corresponding to a first payload data symbol, the seventh signal edge and the eighth signal edge being separated by a sixth time period corresponding to a second payload data symbol.

Example 44 is the method of example 43, wherein a sum of the fifth time period and the sixth time period is lower than $10^{-7}$ s.

Example 45 is the method of any of examples 40 to 44, wherein the first type is a rising edge and the second type is a falling edge, or wherein the second type is a rising edge and the first type is a falling edge.

Example 46 is the method of any of examples 40 to 45, wherein the method further comprises generating a second data signal, the second data signal being inverted with respect to the data signal.

Example 47 is a method for decoding a data signal. The method comprises determining a sequence of a first signal edge of a first type, a second signal edge of a second type, a third signal edge of the first type, and a fourth signal edge of the second type in the data signal. Further, the method determining a control symbol indicator if a first time period between the first signal edge and the second signal edge is longer than a payload data threshold defined in a communication protocol. The method additionally comprises determining a first control symbol of the communication protocol based on a second time period between the second signal edge and the third signal edge. The method further comprises determining a second control symbol of the communication protocol based on a third time period between the third signal edge and the fourth signal edge.

Example 48 is the method of example 47, further comprising determining a fifth signal edge of the first type that directly succeeds the fourth signal edge in the data signal, and determining a third control symbol of the communication protocol based on a fourth time period between the fourth signal edge and the fifth signal edge.

Example 49 is the method of example 47 or example 48, wherein, if the second time period corresponds to a predetermined time period defined in the communication protocol, the first control symbol indicates succession of at least one further control symbol of the communication protocol.

Example 50 is the method of any of examples 47 to 49, further comprising determining a sequence of a sixth signal edge of the first type, a seventh signal edge of the second type, and an eighth signal edge of the first type in the data signal. Additionally, the method comprises determining a first payload data symbol based on a fifth time period between the sixth signal edge and the seventh signal edge. The method further comprises determining a second payload data symbol based on a sixth time period between the seventh signal edge and the eighth signal edge.

Example 51 is the method of example 50, wherein a sum of the fifth time period and the sixth time period is lower than $10^{-7}$ s.

Example 52 is the method of any of examples 47 to 51, wherein the first type is a rising edge and the second type is a falling edge, or wherein the second type is a rising edge and the first type is a falling edge.

Example 53 is the method of any of examples 47 to 52, further comprising receiving a second data signal, wherein the second data signal is inverted with respect to the data signal, and determining the first signal edge, the second signal edge, the third signal edge and the fourth signal edge further based on the second data signal.

Example 54 is a method for decoding a data signal, comprising determining a sequence of a first signal edge of a first type, a second signal edge of a second type, a third signal edge of the first type, and a fourth signal edge of the second type in the data signal. The method further comprises determining a first control symbol of a communication protocol based on a first time period between the first signal edge and the second signal edge. Additionally, the method comprises determining a second control symbol of the communication protocol that indicates at least one preceding control symbol of the communication protocol if a second time period between the second signal edge and the third signal edge corresponds to a predetermined time period defined in the communication protocol. The method further comprises determining a control symbol indicator if a third time period between the third signal edge and the fourth signal edge is longer than a payload data threshold defined in the communication protocol.

Example 55 is the method of example 54, further comprising determining a fifth signal edge of the second type that directly precedes the first signal edge in the data signal, and determining a third control symbol of the communication protocol based on a fourth time period between the fifth signal edge and the first signal edge.

Example 56 is the method of example 54 or example 55, wherein, if the second time period corresponds to a predetermined time period defined in the communication protocol, the second control symbol indicates that at least one further control symbol of the communication protocol precedes the second control symbol.

Example 57 is the method any of examples 54 to 56, further comprising determining a sequence of a sixth signal edge of the first type, a seventh signal edge of the second type, and an eighth signal edge of the first type in the data signal. The method additionally comprises determining a first payload data symbol based on a fifth time period between the sixth signal edge and the seventh signal edge, and determining a second payload data symbol based on a sixth time period between the seventh signal edge and the eighth signal edge.

Example 58 is the method of example 57, wherein a sum of the fifth time period and the sixth time period is lower than $10^{-7}$ s.

Example 59 is the method of any of examples 54 to 58, wherein the first type is a rising edge and the second type is a falling edge, or wherein the second type is a rising edge and the first type is a falling edge.

Example 60 is the method of any of examples 54 to 59, further comprising receiving a second data signal, wherein the second data signal is inverted with respect to the data signal, and determining the first signal edge, the second signal edge, the third signal edge and the fourth signal edge further based on the second data signal.

The examples described above in connection with FIGS. 13*a* to 13*h* may be summarized as follows:

Example 1 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period being longer than a time period of any payload data symbol of a communication protocol, and the second signal edge and the third signal edge being separated by a second time period corresponding to a control symbol of the communication protocol that indicates a start of a data packet and a service type of the data packet. Further, the apparatus for generating the data signal comprises an output interface circuit configured to output the data signal.

Example 2 is the apparatus of example 1, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol in the data packet, the fifth signal edge and the sixth signal edge being separated by a fourth time period corresponding to a second payload data symbol in the data packet.

Example 3 is the apparatus of example 2, wherein a sum of the third time period and the fourth time period is lower than $10^{-7}$ s.

Example 4 is the apparatus of any of examples 1 to 3, wherein the first type is a rising edge and the second type is a falling edge, or wherein the second type is a rising edge and the first type is a falling edge.

Example 5 is the apparatus of any of examples 1 to 4, wherein the processing circuit is further configured to generate a second data signal, the second data signal being inverted with respect to the data signal.

Example 6 is the apparatus of any of examples 1 to 5, wherein the processing circuit is a digital-to-time converter.

Example 7 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to a control symbol of a communication protocol that indicates a start of a data packet and a service type of the data packet, and the second signal edge and the third signal edge being separated by a second time period being longer than the longest time period associated with a payload data symbol of the communication protocol. Further, the apparatus for generating the data signal comprises an output interface circuit configured to output the data signal.

Example 8 is the apparatus of example 7, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol in the data packet, the fifth signal edge and the sixth signal edge being separated by a fourth time period corresponding to a second payload data symbol in the data packet.

Example 9 is the apparatus of example 8, wherein a sum of the third time period and the fourth time period is lower than $10^{-7}$ s.

Example 10 is the apparatus of any of examples 7 to 9, wherein the first type is a rising edge and the second type is a falling edge, or wherein the second type is a rising edge and the first type is a falling edge.

Example 11 is the apparatus of any of examples 7 to 10, wherein the processing circuit is further configured to generate a second data signal, the second data signal being inverted with respect to the data signal.

Example 12 is the apparatus of any of examples 7 to 11, wherein the processing circuit is a digital-to-time converter.

Example 13 is an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine a control symbol indicator if a first time period between the first signal edge and the second signal edge is longer than a payload data threshold defined in a communication protocol, and to determine a first control symbol of the communication protocol that indicates a start of a data packet and a service type of the data packet if a second time period between the second signal edge and the third signal edge corresponds to a predetermined time period defined in the communication protocol.

Example 14 is the apparatus of example 13, wherein the processing circuit is further configured to determine a sequence of a fourth signal edge of the first type, a fifth signal edge of the second type, and a sixth signal edge of the first type in the data signal. The demodulation circuit is configured to determine a first payload data symbol of the data packet based on a third time period between the fourth signal edge and the fifth signal edge if the third time period is shorter than the payload data threshold, and to determine a second payload data symbol of the data packet based on a fourth time period between the fifth signal edge and the sixth signal edge if the fourth time period is shorter than the payload data threshold.

Example 15 is the apparatus of example 14, further comprising a data handling circuit configured to process the first payload data symbol and the second payload data symbol based on the service type of the data packet.

Example 16 is the apparatus of example 14 or example 15, wherein a sum of the third time period and the fourth time period is lower than $10^{-7}$ s.

Example 17 is the apparatus of any of examples 13 to 16, wherein the first type is a rising edge and the second type is a falling edge, or wherein the second type is a rising edge and the first type is a falling edge.

Example 18 is the apparatus of any of examples 13 to 17, wherein the processing circuit is further configured to receive a second data signal, the second data signal being inverted with respect to the data signal; and wherein the processing circuit is further configured to determine the first signal edge, the second signal edge, and the third signal edge further based on the second data signal.

Example 19 is the apparatus of any of examples 13 to 18, wherein the processing circuit is a time-to-digital converter.

Example 20 is an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine a control symbol of a communication protocol that indicates a start of a data packet and a service type of the data packet if a first time period between the first signal edge and the second signal edge corresponds to a predetermined time period defined in the communication protocol, and to determine a control symbol indicator if a second time period between the second signal edge and the third signal edge is longer than a payload data threshold defined in the communication protocol.

Example 21 is the apparatus of example 20, wherein the processing circuit is further configured to determine a sequence of a fourth signal edge of the first type, a fifth signal edge of the second type, and a sixth signal edge of the first type in the data signal. The demodulation circuit is configured to determine a first payload data symbol of the data packet based on a third time period between the fourth signal edge and the fifth signal edge if the third time period is shorter than the payload data threshold, and to determine a second payload data symbol of the data packet based on a fourth time period between the fifth signal edge and the sixth signal edge if the fourth time period is shorter than the payload data threshold.

Example 22 is the apparatus of example 21, further comprising a data handling circuit configured to process the first payload data symbol and the second payload data symbol based on the service type of the data packet.

Example 23 is the apparatus of example 21 or example 22, wherein a sum of the third time period and the fourth time period is lower than $10^{-7}$ s.

Example 24 is the apparatus of any of examples 20 to 3, wherein the first type is a rising edge and the second type is a falling edge, or wherein the second type is a rising edge and the first type is a falling edge.

Example 25 is the apparatus of any of examples 20 to 24, wherein the processing circuit is further configured to receive a second data signal, the second data signal being inverted with respect to the data signal, and wherein the processing circuit is further configured to determine the first signal edge, the second signal edge, and the third signal edge further based on the second data signal.

Example 26 is the apparatus of any of examples 20 to 25, wherein the processing circuit is a time-to-digital converter.

Example 27 is a method for generating a data signal. The method comprises generating the data signal, the data signal comprising a sequence of a first signal edge of a first type, a second signal edge of a second type, and a third signal edge of the first type, the first signal edge and the second signal edge being separated by a first time period being longer than a time period of any payload data symbol of a communication protocol, and the second signal edge and the third signal edge being separated by a second time period corresponding to a control symbol of the communication protocol that indicates a start of a data packet and a service type of the data packet. Further, the method comprises outputting the data signal.

Example 28 is the method of example 27, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol in the data packet, the fifth signal edge and the sixth signal edge being separated by a fourth time period corresponding to a second payload data symbol in the data packet.

Example 29 is the method of example 28, wherein a sum of the third time period and the fourth time period is lower than $10^{-7}$ s.

Example 30 is the method of any of examples 27 to 29, wherein the first type is a rising edge and the second type is a falling edge, or wherein the second type is a rising edge and the first type is a falling edge.

Example 31 is the method of any of examples 27 to 30, wherein the method further comprises generating a second data signal, the second data signal being inverted with respect to the data signal.

Example 32 is a method for generating a data signal. The method comprises generating the data signal, the data signal comprising a sequence of a first signal edge of a first type, a second signal edge of a second type, and a third signal edge of the first type, the first signal edge and the second signal edge being separated by a first time period corresponding to a control symbol of a communication protocol that indicates a start of a data packet and a service type of the data packet, and the second signal edge and the third signal edge being separated by a second time period being longer than a time period of any payload data symbol of the communication protocol. Further, the method comprises outputting the data signal.

Example 33 is the method of example 32, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol in the data packet, the fifth signal edge and the sixth signal edge being separated by a fourth time period corresponding to a second payload data symbol in the data packet.

Example 34 is the method of example 33, wherein a sum of the third time period and the fourth time period is lower than $10^{-7}$ s.

Example 35 is the method of any of examples 32 to 34, wherein the first type is a rising edge and the second type is a falling edge, or wherein the second type is a rising edge and the first type is a falling edge.

Example 36 is the method of any of examples 32 to 35, wherein the method further comprises generating a second data signal, the second data signal being inverted with respect to the data signal.

Example 37 is a method for decoding a data signal. The method comprises determining a sequence of a first signal edge of a first type, a second signal edge of a second type, and a third signal edge of the first type in the data signal. Further, the method comprises determining a control symbol indicator if a first time period between the first signal edge and the second signal edge is longer than a payload data threshold defined in a communication protocol. Additionally, the method comprises determining a first control symbol of the communication protocol that indicates a start of a data packet and a service type of the data packet if a second time period between the second signal edge and the third signal edge corresponds to a predetermined time period defined in the communication protocol.

Example 38 is the method of example 37, further comprising determining a sequence of a fourth signal edge of the first type, a fifth signal edge of the second type, and a sixth signal edge of the first type in the data signal. The method additionally comprises determining a first payload data symbol of the data packet based on a third time period between the fourth signal edge and the fifth signal edge if the third time period is shorter than the payload data threshold, and determining a second payload data symbol of the data packet based on a fourth time period between the fifth signal edge and the sixth signal edge if the fourth time period is shorter than the payload data threshold.

Example 39 is the method of example 38, further comprising processing the first payload data symbol and the second payload data symbol based on the service type of the data packet.

Example 40 is the method of example 38 or example 39, wherein a sum of the third time period and the fourth time period is lower than $10^{-7}$ s.

Example 41 is the method of any of examples 37 to 40, wherein the first type is a rising edge and the second type is a falling edge, or wherein the second type is a rising edge and the first type is a falling edge.

Example 42 is the method of any of examples 37 to 41, further comprising receiving a second data signal, wherein the second data signal is inverted with respect to the data signal. The method additionally comprises determining the first signal edge, the second signal edge, the third signal edge and the fourth signal edge further based on the second data signal.

Example 43 is a method for decoding a data signal. The method comprises determining a sequence of a first signal edge of a first type, a second signal edge of a second type, and a third signal edge of the first type in the data signal. Further, the method comprises determining a control symbol of a communication protocol that indicates a start of a data packet and a service type of the data packet if a first time period between the first signal edge and the second signal edge corresponds to a predetermined time period defined in the communication protocol. The method additionally comprises determining a control symbol indicator if a second time period between the second signal edge and the third signal edge is longer than a payload data threshold defined in the communication protocol.

Example 44 is the method of example 41, further comprising determining a sequence of a fourth signal edge of the first type, a fifth signal edge of the second type, and a sixth signal edge of the first type in the data signal. Additionally, the method comprises determining a first payload data symbol of the data packet based on a third time period between the fourth signal edge and the fifth signal edge if the third time period is shorter than the payload data threshold. The method further comprises determining a second payload data symbol of the data packet based on a fourth time period between the fifth signal edge and the sixth signal edge if the fourth time period is shorter than the payload data threshold.

Example 45 is the method of example 44, further comprising processing the first payload data symbol and the second payload data symbol based on the service type of the data packet.

Example 46 is the method of example 44 or example 45, wherein a sum of the third time period and the fourth time period is lower than $10^{-7}$ s.

Example 47 is the method of any of examples 43 to 46, wherein the first type is a rising edge and the second type is a falling edge, or wherein the second type is a rising edge and the first type is a falling edge.

Example 48 is the method of any of examples 43 to 47, further comprising receiving a second data signal, wherein the second data signal is inverted with respect to the data signal. The method additionally comprises determining the first signal edge, the second signal edge, the third signal edge and the fourth signal edge further based on the second data signal.

The examples described above in connection with FIGS. 13*i* to 13*k* may be summarized as follows:

Example 1 is an apparatus for transmitting a first data packet of a first priority and a second data packet of a higher second priority. The apparatus comprises a processing circuit configured to generate a data signal, the data signal representing a sequence of a first control symbol of a communication protocol that indicates a start of a data packet of the first priority, a first portion of the first data packet comprising at least one payload data symbol, a second control symbol of the communication protocol that indicates a start of a data packet of the second priority, the second data packet, a third control symbol of the communication protocol that indicates an end of the data packet of the second priority, and a second portion of the first data packet comprising at least one payload data symbol. Further, the apparatus comprises an output interface circuit configured to output the data signal.

Example 2 is the apparatus of example 1, wherein the data signal comprises a sequence of a first signal edge of a first type, a second signal edge of a second type, and a third signal edge of the first type, the first signal edge and the second signal edge being separated by a first time period being longer than a time period of any payload data symbol of the communication protocol, and the second signal edge and the third signal edge being separated by a second time period corresponding to the first control symbol.

Example 3 is the apparatus of example 2, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol of the second data packet, and the fifth signal edge and the sixth signal edge being separated by a fourth time period corresponding to a second payload data symbol of the second data packet.

Example 4 is the apparatus of example 3, wherein a sum of the third time period and the fourth time period is lower than $10^{-7}$ s.

Example 5 is the apparatus of example 3 or example 4, wherein the data signal further comprises a sequence of a seventh signal edge of the first type, an eighth signal edge of the second type, and a ninth signal edge of the first type, the seventh signal edge and the eighth signal edge being separated by a fifth time period being longer than a time period of any payload data symbol of the communication protocol, and the eighth signal edge and the ninth signal edge being separated by a sixth time period corresponding to the second control symbol.

Example 6 is the apparatus of example 5, wherein the data signal further comprises a sequence of a tenth signal edge of the first type, an eleventh signal edge of the second type, and a twelfth signal edge of the first type, the tenth signal edge and the eleventh signal edge being separated by a seventh time period being longer than a time period of any payload data symbol of the communication protocol, and the eleventh signal edge and the twelfth signal edge being separated by an eighth time period corresponding to the third control symbol.

Example 7 is the apparatus of any of examples 1 to 6, wherein the data signal further represents a fourth control symbol of the communication protocol that indicates an end of the data packet of the first priority.

Example 8 is the apparatus of example 7, wherein the data signal further comprises a sequence of a thirteenth signal edge of the first type, a fourteenth signal edge of the second type, and a fifteenth signal edge of the first type, the thirteenth signal edge and the fourteenth signal edge being separated by a ninth time period being longer than a time period of any payload data symbol of the communication protocol, and the fourteenth signal edge and the fifteenth signal edge being separated by a tenth time period corresponding to the fourth control symbol.

Example 9 is the apparatus of example 7 or example 8, wherein the data signal further represents a fifth control symbol of the communication protocol that indicates an idle mode and a third portion of the first data packet comprising at least one payload data symbol, and wherein the fifth control symbol is arranged between the payload data symbols of the second and the third portions of the first data packet.

Example 10 is the apparatus of example 9, wherein the data signal further comprises a sequence of a sixteenth signal edge of the first type, a seventeenth signal edge of the second type, and an eighteenth signal edge of the first type, the sixteenth signal edge and the seventeenth signal edge being separated by an eleventh time period being longer than a time period of any payload data symbol of the communication protocol, and the seventeenth signal edge and the eighteenth signal edge being separated by a twelfth time period corresponding to the fifth control symbol.

Example 11 is the apparatus of example 1, wherein the data signal comprises a sequence of a first signal edge of a first type, a second signal edge of a second type, and a third signal edge of the first type, the first signal edge and the second signal edge being separated by a first time period corresponding to the first control symbol, and the second signal edge and the third signal edge being separated by a second time period being longer than a time period of any payload data symbol of the communication protocol.

Example 12 is the apparatus of example 11, wherein the data signal further comprises a sequence of a fourth signal edge of the first type, a fifth signal edge of the second type, and a sixth signal edge of the first type, the fourth signal edge and the fifth signal edge being separated by a third time period corresponding to a first payload data symbol of the second data packet, and the fifth signal edge and the sixth signal edge being separated by a fourth time period corresponding to a second payload data symbol of the second data packet.

Example 13 is the apparatus of example 12, wherein a sum of the third time period and the fourth time period is lower than $10^{-7}$ s.

Example 14 is the apparatus of example 12 or example 13, wherein the data signal further comprises a sequence of a seventh signal edge of the first type, an eighth signal edge of the second type, and a ninth signal edge of the first type, the seventh signal edge and the eighth signal edge being separated by a fifth time period corresponding to the second control symbol, and the eighth signal edge and the ninth signal edge being separated by a sixth time period being longer than a time period of any payload data symbol of the communication protocol.

Example 15 is the apparatus of example 14, wherein the data signal further comprises a sequence of a tenth signal edge of the first type, an eleventh signal edge of the second type, and a twelfth signal edge of the first type, the tenth signal edge and the eleventh signal edge being separated by a seventh time period corresponding to the third control symbol, and the eleventh signal edge and the twelfth signal edge being separated by an eighth time period being longer than a time period of any payload data symbol of the communication protocol.

Example 16 is the apparatus of any of examples 1 or 11 to 15, wherein the data signal further represents a fourth control symbol of the communication protocol that indicates an end of the data packet of the first priority.

Example 17 is the apparatus of example 16, wherein the data signal further comprises a sequence of a thirteenth signal edge of the first type, a fourteenth signal edge of the second type, and a fifteenth signal edge of the first type, the thirteenth signal edge and the fourteenth signal edge being separated by a ninth time period corresponding to the fourth control symbol, and the fourteenth signal edge and the fifteenth signal edge being separated by a tenth time period being longer than a time period of any payload data symbol of the communication protocol.

Example 18 is the apparatus of example 16 or example 17, wherein the data signal further represents a fifth control symbol of the communication protocol that indicates an idle mode and a third portion of the first data packet comprising at least one payload data symbol, and wherein the fifth control symbol is arranged between the payload data symbols corresponding to a second and the third portion of the first data packet.

Example 19 is the apparatus of example 18, wherein the data signal further comprises a sequence of a sixteenth signal edge of the first type, a seventeenth signal edge of the second type, and an eighteenth signal edge of the first type, the sixteenth signal edge and the seventeenth signal edge being separated by an eleventh time period corresponding to the fifth control symbol, and the seventeenth signal edge and the eighteenth signal edge being separated by a twelfth time period being longer than a time period of any payload data symbol of the communication protocol.

Example 20 is the apparatus of any of examples 11 to 19, wherein the first type is a rising edge and the second type is a falling edge, or wherein the second type is a rising edge and the first type is a falling edge.

Example 21 is the apparatus of any of examples 11 to 20, wherein the processing circuit is further configured to generate a second data signal, the second data signal being inverted with respect to the data signal.

Example 22 is the apparatus of any of examples 11 to 21, wherein the processing circuit is a digital-to-time converter.

Example 23 is a method for transmitting a first data packet of a first priority and a second data packet of a higher second priority. The method comprises generating a data signal, wherein the data signal represents a sequence of a first control symbol of a communication protocol that indicates a start of a data packet of the first priority, a first portion of the first data packet comprising at least one payload data symbol, a second control symbol of the communication protocol that indicates a start of a data packet of the second priority, the second data packet, a third control symbol of the communication protocol that indicates an end of the data packet of the second priority, and a second portion of the first data packet comprising at least one payload data symbol. The method further comprises outputting the data signal.

Example 24 is the method of example 23, wherein the data signal further represents a fourth control symbol of the communication protocol that indicates an end of the data packet of the first priority.

Example 25 is the method of example 23 or example 24, wherein the data signal further represents a fifth control symbol of the communication protocol that indicates an idle mode and a third portion of the first data packet comprising at least one payload data symbol, and wherein the fifth control symbol is arranged between the payload data symbols of the second and the third portions of the first data packet.

The examples described above in connection with FIGS. 14*a* to 14*i* may be summarized as follows:

Example 1 is a communication apparatus. The communication apparatus comprises an interface circuit configured to couple to at least a first transmission link for communicating with another communication apparatus, wherein the interface circuit is further configured to output a first transmit data signal to the other communication apparatus via the first transmission link. Further, the communication apparatus comprises a processing circuit configured to generate the first transmit data signal, the first transmit data signal comprising a sequence of a first signal edge of a first type, a second signal edge of a second type, and a third signal edge of the first type, the first signal edge and the second signal edge being separated by a first time period being longer than a time period of any payload data symbol of a communication protocol, and the second signal edge and the third signal edge being separated by a second time period corresponding to a first control symbol of the communication protocol that indicates an inversion of the direction of data flow on the transmission link.

Example 2 is the communication apparatus of example 1, wherein the interface circuit is configured to receive a first receive data signal from the other communication apparatus via the first transmission link after outputting the first control symbol.

Example 3 is the communication apparatus of example 2, wherein the processing circuit is further configured to determine a sequence of a fourth signal edge of the first type, a fifth signal edge of the second type, and a sixth signal edge of the first type in the first receive data signal. The communication apparatus further comprises a demodulation circuit configured to determine a control symbol indicator if a third time period between the fourth signal edge and the fifth signal edge is longer than a payload data threshold, and to determine a second control symbol of the communication protocol that indicates an acknowledgement of the direction of data flow on the transmission link by the other communication apparatus if a fourth time period between the fifth signal edge and the sixth signal edge corresponds to a predetermined time period defined in the communication protocol.

Example 4 is the communication apparatus of example 3, wherein the processing circuit is further configured to determine a sequence of a seventh signal edge of the first type, an eighth signal edge of the second type, and a ninth signal edge of the first type in the first receive data signal, wherein the seventh signal edge succeeds the sixth signal edge. The demodulation circuit is further configured to determine a first payload data symbol based on a fifth time period between the seventh signal edge and the eighth signal edge, and to determine a second payload data symbol based on a sixth time period between the eighth signal edge and the ninth signal edge.

Example 5 is the communication apparatus of any of examples 2 to 4, wherein, after outputting the third signal edge of the transmit data signal and prior to receiving the first receive data signal, the interface circuit is configured to drive the first transmission link into a non-floating state.

Example 6 is the communication apparatus of any of examples 1 to 5, wherein the interface circuit is configured to couple to a second transmission link for communicating with the other communication apparatus, and wherein the interface circuit is further configured to output a second transmit data signal to the other communication apparatus via the second transmission link irrespective of the direction of data flow on the first transmission link.

Example 7 is the communication apparatus of any of examples 1 to 6, wherein the interface circuit is configured to couple to a third transmission link for communicating with the other communication apparatus, and wherein the interface circuit is further configured to receive a second receive data signal from the other communication apparatus via the third transmission link irrespective of the direction of data flow on the first transmission link.

Example 8 is the communication apparatus of any of examples 1 to 7, wherein the interface circuit is configured to couple to a fourth transmission link for communicating with the other communication apparatus, wherein the interface circuit is further configured to output a third transmit data signal to the other communication apparatus via the fourth transmission link. The processing circuit is further configured to generate the third transmit data signal, the fourth transmit data signal comprising a sequence of a tenth signal edge of the first type, an eleventh signal edge of the second type, and a twelfth signal edge of the first type, the tenth signal edge and the eleventh signal edge being separated by a seventh time period being longer than the time period of any payload data symbol of the communication protocol, and the eleventh signal edge and the twelfth signal edge being separated by an eighth time period corresponding to the first control symbol of the communication protocol.

Example 9 is the communication apparatus of any of examples 1 to 8, wherein the interface circuit comprises a transmit circuit configured to couple to the first transmission link and to output the first transmit data signal to the other communication apparatus via the first transmission link, and a receive circuit configured to couple to the first transmission link and to receive the first receive data signal from the other communication apparatus via the first transmission link.

Example 10 is the communication apparatus of any of examples 1 to 9, wherein the communication apparatus is configured to transmit the first control symbol to the other communication apparatus based on a received control signal.

Example 11 is the communication apparatus of any of examples 1 to 10, wherein the first transmit data signal further comprises a sequence of a thirteenth signal edge of the first type, a fourteenth signal edge of the second type, and a fifteenth signal edge of the first type, the thirteenth signal edge and the fourteenth signal edge being separated by a ninth time period corresponding to a third payload data symbol, the fourteenth signal edge and the fifteenth signal edge being separated by a tenth time period corresponding to a fourth payload data symbol, wherein the fifteenth signal edge precedes the first signal edge.

Example 12 is the communication apparatus example 11, wherein a sum of the ninth time period and the tenth time period is lower than $10^{-7}$ s.

Example 13 is the communication apparatus of any of examples 1 to 12, wherein at least the first transmission link is a differential transmission link.

Example 14 is the communication apparatus of any of examples 1 to 13, wherein the first type is a rising edge and the second type is falling edge, or wherein the first type is a falling edge and the second type is a rising edge.

Example 15 is a communication apparatus. The communication apparatus comprises an interface circuit configured to couple to at least a first transmission link for communicating with another communication apparatus, wherein the interface circuit is further configured to output a first transmit data signal to the other communication apparatus via the first transmission link. Further, the communication apparatus comprises a processing circuit configured to generate the first transmit data signal, the first transmit data signal comprising a sequence of a first signal edge of a first type, a second signal edge of a second type, and a third signal edge of the first type, the first signal edge and the second signal edge being separated by a first time period corresponding to a first control symbol of a communication protocol that indicates an inversion of the direction of data flow on the transmission link, and the second signal edge and the third signal edge being separated by a second time period being longer than a time period of any payload data symbol of the communication protocol.

Example 16 is the communication apparatus of example 15, wherein the interface circuit is configured to receive a first receive data signal from the other communication apparatus via the first transmission link after outputting the first control symbol.

Example 17 is the communication apparatus of example 16, wherein the processing circuit is further configured to determine a sequence of a fourth signal edge of the first type, a fifth signal edge of the second type, and a sixth signal edge of the first type in the first receive data signal. The communication apparatus further comprises a demodulation circuit configured to determine a second control symbol of the communication protocol that indicates an acknowledgement of the direction of data flow on the transmission link by the other communication apparatus if a third time period between the fourth signal edge and the fifth signal edge corresponds to a predetermined time period defined in the communication protocol. The demodulation circuit is further configured to determine a control symbol indicator if a fourth time period between the fifth signal edge and the sixth signal edge is longer than a payload data threshold.

Example 18 is the communication apparatus of example 16 or example 17, wherein, after outputting the third signal edge of the transmit data signal and prior to receiving the first receive data signal, the interface circuit is configured to drive the first transmission link into a non-floating state.

Example 19 is the communication apparatus of any of examples 15 to 18, wherein the interface circuit is configured to couple to a second transmission link for communicating with the other communication apparatus, and wherein the interface circuit is further configured to output a second transmit data signal to the other communication apparatus via the second transmission link irrespective of the direction of data flow on the first transmission link.

Example 20 is the communication apparatus of any of examples 15 to 19, wherein the interface circuit is configured to couple to a third transmission link for communicating with the other communication apparatus, and wherein the interface circuit is further configured to receive a second receive data signal from the other communication apparatus via the third transmission link irrespective of the direction of data flow on the first transmission link.

Example 21 is the communication apparatus of any of examples 15 to 20, wherein the interface circuit is configured to couple to a fourth transmission link for communicating with the other communication apparatus, wherein the interface circuit is further configured to output a third transmit data signal to the other communication apparatus via the fourth transmission link. The processing circuit is further configured to generate the fourth transmit data signal, the fourth transmit data signal comprising a sequence of a seventh signal edge of the first type, an eighth signal edge of the second type, and a ninth signal edge of the first type, the seventh signal edge and the eighth signal edge being separated by a fifth time period corresponding to the first control symbol of the communication protocol, and the eighth signal edge and the ninth signal edge being separated by an sixth time period being longer than the time period of any payload data symbol of the communication protocol.

Example 22 is the communication apparatus of any of examples 15 to 21, wherein the first transmit data signal further comprises a sequence of a tenth signal edge of the first type, an eleventh signal edge of the second type, and a twelfth signal edge of the first type, the tenth signal edge and the eleventh signal edge being separated by a seventh time period corresponding to a first payload data symbol, the eleventh signal edge and the twelfth signal edge being separated by an eighth time period corresponding to a second payload data symbol, wherein the twelfth signal edge precedes the first signal edge.

Example 23 is the communication apparatus of any of examples 15 to 22, wherein a sum of the seventh time period and the eighth time period is lower than $10^{-7}$ s.

Example 24 is a communication apparatus. The communication apparatus comprises an interface circuit configured to couple to at least a first transmission link for communicating with another communication apparatus, wherein the interface circuit is further configured to receive a first receive data signal from the other communication apparatus via the first transmission link. Further, the communication apparatus comprises a processing circuit configured to determine a sequence of a first signal edge of a first type, a second signal edge of a second type, and a third signal edge of the first type in the first receive data signal. The communication apparatus additionally comprises a demodulation circuit configured to determine a control symbol indicator if a first time period between the first signal edge and the second signal edge is longer than a payload data threshold defined in a communication protocol, and to determine a first control symbol of the communication protocol that indicates an inversion of the direction of data flow on the transmission link if a second time period between the second signal edge and the third signal edge corresponds to a predetermined time period defined in the communication protocol.

Example 25 is the communication apparatus of example 24, wherein the interface circuit is configured to output a first transmit data signal to the other communication apparatus via the first transmission link in response to receiving the first control symbol.

Example 26 is the communication apparatus of example 25, wherein the processing circuit is further configured to generate the first transmit data signal, the first transmit data signal comprising a sequence of a fourth signal edge of the first type, a fifth signal edge of the second type, and a sixth signal edge of the first type, the fourth signal edge and the fifth signal edge being separated by a third time period being longer than a time period of any payload data symbol of the communication protocol, and the fifth signal edge and the sixth signal edge being separated by a fourth time period corresponding to a second control symbol of the communication protocol that indicates an acknowledgement of the direction of data flow on the transmission link by the communication apparatus.

Example 27 is the communication apparatus of example 26, wherein, after generating the sixth signal edge and prior to generating a signal edge indicating a start of payload data, the processing circuit is configured to generate the first transmit data signal such that the first transmission link is in a non-floating state.

Example 28 is the communication apparatus of example 26 or example 27, wherein the first transmit data signal further comprises at least one sequence of a seventh signal edge of the second type and an eighth signal edge of the first type that directly succeeds the sixth signal edge, wherein a fifth time period between the seventh signal edge and its directly preceding signal edge of the first type is longer than the time period of any payload data symbol of the communication protocol, and wherein a sixth time period between the seventh signal edge and the eighth signal edge corresponds to a third control symbol of the communication protocol that indicates an idle mode.

Example 29 is the communication apparatus of example 28, wherein the first transmit data signal further comprises a sequence of a ninth signal edge of the first type, a tenth signal edge of the second type, and an eleventh signal edge of the first type, wherein the ninth signal edge succeeds the last one of the at least one sequence of the seventh signal edge and the eighth signal edge, the ninth signal edge and the tenth signal edge being separated by a seventh time period corresponding to a first payload data symbol, the tenth signal edge and the eleventh signal edge being separated by an eighth time period corresponding to a second payload data symbol.

Example 30 is the communication apparatus of example 29, wherein a sum of the seventh time period and the eighth time period is lower than $10^{-7}$ s.

Example 31 is the communication apparatus of any of examples 24 to 30, wherein the interface circuit is configured to couple to a second transmission link for communicating with the other communication apparatus, and wherein the interface circuit is further configured to receive a second receive data signal from the other communication apparatus via the second transmission link irrespective of the direction of data flow on the first transmission link.

Example 32 is the communication apparatus of any of examples 24 to 31, wherein the interface circuit is configured to couple to a third transmission link for communicating with the other communication apparatus, and wherein the interface circuit is further configured to output a second transmit data signal to the other communication apparatus via the third transmission link irrespective of the direction of data flow on the first transmission link.

Example 33 is the communication apparatus of any of examples 24 to 32, wherein the interface circuit is configured to couple to a fourth transmission link for communicating with the other communication apparatus, wherein the interface circuit is further configured to receive a third receive data signal from the other communication apparatus via the fourth transmission link. The processing circuit is further configured to determine a sequence of a twelfth signal edge of a first type, a thirteenth signal edge of a second type, and fourteenth signal edge of the first type in the third receive data signal. The demodulation circuit is configured to determine the control symbol indicator if a ninth time period between the twelfth signal edge and the thirteenth signal edge is longer than a payload data threshold, and to determine the first control symbol if a tenth time period between the thirteenth signal edge and the fourteenth signal edge corresponds to the predetermined time period. The interface circuit is configured to output a third transmit data signal to the other communication apparatus via the fourth transmission link in response to receiving the first control symbol.

Example 34 is the communication apparatus of example 25, wherein the interface circuit comprises a transmit circuit configured to couple to the first transmission link and output the first transmit data signal to the other communication apparatus via the first transmission link, and a receive circuit configured to couple to the first transmission link and receive the first receive data signal from the other communication apparatus via the first transmission link.

Example 35 is the communication apparatus of any of examples 24 to 34, wherein the processing circuit configured to determine a sequence of a fifteenth signal edge of the first type, a sixteenth signal edge of the second type, and a seventeenth signal edge of the first type in the first data receive signal, wherein the seventeenth signal edge precedes the first signal edge. The demodulation circuit is further configured to determine a third payload data symbol based on an eleventh time period between the fifteenth signal edge and the sixteenth signal edge, and to determine a fourth payload data symbol based on a twelfth time period between the sixteenth signal edge and the seventeenth signal edge.

Example 36 is the communication apparatus of any of examples 24 to 35, wherein at least the first transmission link is a differential transmission link.

Example 37 is the communication apparatus of any of examples 24 to 36, wherein the first type is a rising edge and the second type is falling edge, or wherein the first type is a falling edge and the second type is a rising edge.

Example 38 is a communication apparatus. The communication apparatus comprises an interface circuit configured to couple to at least a first transmission link for communicating with another communication apparatus, wherein the interface circuit is further configured to receive a first receive data signal from the other communication apparatus via the first transmission link. Further, the communication apparatus comprises a processing circuit configured to determine a sequence of a first signal edge of a first type, a second signal edge of a second type, and a third signal edge of the first type in the first receive data signal. The communication apparatus additionally comprises a demodulation circuit configured to determine a first control symbol of a communication protocol that indicates an inversion of the direction of data flow on the transmission link if a first time period between the first signal edge and the second signal edge corresponds to a predetermined time period defined in the communication protocol, and to determine a control symbol indicator if a second time period between the second signal edge and the third signal edge is longer than a payload data threshold defined in a communication protocol.

Example 39 is the communication apparatus of example 38, wherein the interface circuit is configured to output a first transmit data signal to the other communication apparatus via the first transmission link in response to receiving the first control symbol.

Example 40 is the communication apparatus of example 39, wherein the processing circuit is further configured to generate the first transmit data signal, the first transmit data signal comprising a sequence of a fourth signal edge of the first type, a fifth signal edge of the second type, and a sixth signal edge of the first type, the fourth signal edge and the fifth signal edge being separated by a third time period corresponding to a second control symbol of the communication protocol that indicates an acknowledgement of the direction of data flow on the transmission link by the communication apparatus, and the fifth signal edge and the sixth signal edge being separated by a fourth time period being longer than a time period of any payload data symbol of the communication protocol.

Example 41 is the communication apparatus of example 40, wherein, after generating the sixth signal edge and prior to generating to generating a signal edge indicating a start of payload data, the processing circuit configured to generate the first transmit data signal such that the first transmission link is in a non-floating state.

Example 42 is the communication apparatus of example 40 or example 41, wherein the first transmit data signal further comprises at least one sequence of a seventh signal edge of the second type and an eighth signal edge of the first type that directly succeeds the sixth signal edge, wherein a fifth time period between the seventh signal edge and its directly preceding signal edge of the first type corresponds to a third control symbol of the communication protocol that indicates an idle mode, and wherein a sixth time period between the seventh signal edge and the eighth signal edge is longer than the time period of any payload data symbol of the communication protocol.

Example 43 is the communication apparatus of example 42, wherein the first transmit data signal further comprises a sequence of a ninth signal edge of the first type, a tenth signal edge of the second type, and an eleventh signal edge of the first type, wherein the ninth signal edge succeeds the last one of the at least one sequence of the seventh signal edge and the eighth signal edge, the ninth signal edge and the tenth signal edge being separated by a seventh time period corresponding to a first payload data symbol, the tenth signal edge and the eleventh signal edge being separated by an eighth time period corresponding to a second payload data symbol.

Example 44 is the communication apparatus of example 43, wherein a sum of the seventh time period and the eighth time period is lower than $10^{-7}$ s.

Example 45 is the communication apparatus of any of examples 38 to 44, wherein the interface circuit is configured to couple to a second transmission link for communicating with the other communication apparatus, and wherein the interface circuit is further configured to output a second transmit data signal to the other communication apparatus via the second transmission link irrespective of the direction of data flow on the first transmission link.

Example 46 is the communication apparatus of any of examples 38 to 45, wherein the interface circuit is configured to couple to a third transmission link for communicating with the other communication apparatus, and wherein the interface circuit is further configured to receive a second receive data signal from the other communication apparatus via the third transmission link irrespective of the direction of data flow on the first transmission link.

Example 47 is the communication apparatus of any of examples 38 to 46, wherein the interface circuit is configured to couple to a fourth transmission link for communicating with the other communication apparatus, wherein the interface circuit is further configured to receive a third receive data signal from the other communication apparatus via the fourth transmission link. The processing circuit is further configured to determine a sequence of a twelfth signal edge of a first type, a thirteenth signal edge of a second type, and a fourteenth signal edge of the first type in the first receive data signal. The demodulation circuit is configured to determine the first control symbol if a ninth time period between the twelfth signal edge and the thirteenth signal edge corresponds to the first predetermined time period, and to determine the control symbol indicator if a tenth time period between the thirteenth signal edge and the fourteenth signal edge is longer than a payload data threshold. The interface circuit is configured to output a third transmit data signal to the other communication apparatus via the fourth transmission link in response to receiving the first control symbol.

Example 48 is a communication method for a communication apparatus. The method comprises outputting a first transmit data signal to another communication apparatus via a first transmission link for communicating with the other communication apparatus. Further, the method comprises generating the first transmit data signal, the first transmit data signal comprising a sequence of a first signal edge of a first type, a second signal edge of a second type, and a third signal edge of the first type, the first signal edge and the second signal edge being separated by a first time period being longer than a time period of any payload data symbol of a communication protocol, and the second signal edge and the third signal edge being separated by a second time period corresponding to a first control symbol of the communication protocol that indicates an inversion of the direction of data flow on the transmission link.

Example 49 is the method of example 48, further comprising receiving a first receive data signal from the other communication apparatus via the first transmission link after outputting the first control symbol.

Example 50 is the method of example 49, further comprising determining a sequence of a fourth signal edge of the first type, a fifth signal edge of the second type, and a sixth signal edge of the first type in the first receive data signal. The method additionally comprises determining a control symbol indicator if a third time period between the fourth signal edge and the fifth signal edge is longer than a payload data threshold, and determining a second control symbol of the communication protocol that indicates an acknowledgement of the direction of data flow on the transmission link by the other communication apparatus if a fourth time period between the fifth signal edge and the sixth signal edge corresponds to a predetermined time period defined in the communication protocol.

Example 51 is the method of example 50, further comprising determining a sequence of a seventh signal edge of the first type, an eighth signal edge of the second type, and a ninth signal edge of the first type in the first receive data signal, wherein the seventh signal edge succeeds the sixth signal edge. The method additionally comprises determining a first payload data symbol based on a fifth time period between the seventh signal edge and the eighth signal edge, and determining a second payload data symbol based on a sixth time period between the eighth signal edge and the ninth signal edge.

Example 52 is the method of example 51, wherein a sum of the fifth time period and the sixth time period is lower than $10^{-7}$ s.

Example 53 is the method of any of examples 48 to 52, further comprising at least one of: outputting a second transmit data signal to the other communication apparatus via a second transmission link for communicating with the other communication apparatus irrespective of the direction of data flow on the first transmission link; and receiving a second receive data signal from the other communication apparatus via a third transmission link for communicating with the other communication apparatus irrespective of the direction of data flow on the first transmission link.

Example 54 is a communication method for a communication apparatus. The method comprises outputting a first transmit data signal to another communication apparatus via a first transmission link for communicating with the other communication apparatus. Further, the method comprises generating the first transmit data signal, the first transmit data signal comprising a sequence of a first signal edge of a first type, a second signal edge of a second type, and a third signal edge of the first type, the first signal edge and the second signal edge being separated by a first time period corresponding to a first control symbol of a communication protocol that indicates an inversion of the direction of data flow on the transmission link, and the second signal edge and the third signal edge being separated by a second time period being longer than a time period of any payload data symbol of the communication protocol.

Example 55 is the method of example 54, further comprising receiving a first receive data signal from the other communication apparatus via the first transmission link after outputting the first control symbol.

Example 56 is the method of example 55, further comprising determining a sequence of a fourth signal edge of the first type, a fifth signal edge of the second type, and a sixth signal edge of the first type in the first receive data signal. Additionally, the method comprises determining a second control symbol of the communication protocol that indicates an acknowledgement of the direction of data flow on the transmission link by the other communication apparatus if a third time period between the fourth signal edge and the fifth signal edge corresponds to a predetermined time period defined in the communication protocol, and determining a control symbol indicator if a fourth time period between the fifth signal edge and the sixth signal edge is longer than a payload data threshold.

Example 57 is the method of any of examples 54 to 56, further comprising at least one of: outputting a second transmit data signal to the other communication apparatus via a second transmission link for communicating with the other communication apparatus irrespective of the direction of data flow on the first transmission link; and receiving a second receive data signal from the other communication apparatus via a third transmission link for communicating with the other communication apparatus irrespective of the direction of data flow on the first transmission link.

Example 58 is the communication apparatus of any of examples 54 to 57, wherein the first transmit data signal further comprises a sequence of a seventh signal edge of the first type, an eighth signal edge of the second type, and a ninth signal edge of the first type, the seventh signal edge and the eighth signal edge being separated by a fifth time period corresponding to a first payload data symbol, the eighth signal edge and the ninth signal edge being separated by an sixth time period corresponding to a second payload data symbol, wherein the ninth signal edge precedes the first signal edge.

Example 59 is the method of example 58, wherein a sum of the fifth time period and the sixth time period is lower than $10^{-7}$ s.

Example 60 is a communication method for a communication apparatus. The method comprises receiving a first receive data signal from another communication apparatus via a first transmission link for communicating with the other communication apparatus. Further, the method comprises determining a sequence of a first signal edge of a first type, a second signal edge of a second type, and a third signal edge of the first type in the first receive data signal. The method additionally comprises determining a control symbol indicator if a first time period between the first signal edge and the second signal edge is longer than a payload data threshold defined in a communication protocol, and determining a first control symbol of the communication protocol that indicates an inversion of the direction of data flow on the transmission link if a second time period between the second signal edge and the third signal edge corresponds to a predetermined time period defined in the communication protocol.

Example 61 is the method of example 60, further comprising outputting a first transmit data signal to the other communication apparatus via the first transmission link in response to receiving the first control symbol.

Example 62 is the method of example 61, further comprising generating the first transmit data signal, wherein the first transmit data signal comprises a sequence of a fourth signal edge of the first type, a fifth signal edge of the second type, and a sixth signal edge of the first type, the fourth signal edge and the fifth signal edge being separated by a third time period being longer than a time period of any payload data symbol of the communication protocol, and the fifth signal edge and the sixth signal edge being separated by a fourth time period corresponding to a second control symbol of the communication protocol that indicates an acknowledgement of the direction of data flow on the transmission link by the communication apparatus.

Example 63 is the method of example 62, wherein generating the first transmit data signal comprises generating the first transmit data signal such after generating the sixth signal edge and prior to generating a signal edge indicating a start of payload data that the first transmission link is in a non-floating state.

Example 64 is the method of example 62 or example 63, wherein the first transmit data signal further comprises at least one sequence of a seventh signal edge of the second type and an eighth signal edge of the first type that directly succeeds the sixth signal edge, wherein a fifth time period between the seventh signal edge and its directly preceding signal edge of the first type is longer than the time period of any payload data symbol of the communication protocol, and wherein a sixth time period between the seventh signal edge and the eighth signal edge corresponds to a third control symbol of the communication protocol that indicates an idle mode.

Example 65 is the method of example 64, wherein the first transmit data signal further comprises a sequence of a ninth signal edge of the first type, a tenth signal edge of the second type, and an eleventh signal edge of the first type, wherein the ninth signal edge succeeds the last one of the at least one sequence of the seventh signal edge and the eighth signal edge, the ninth signal edge and the tenth signal edge being separated by a seventh time period corresponding to a first payload data symbol, the tenth signal edge and the eleventh signal edge being separated by an eighth time period corresponding to a second payload data symbol.

Example 66 is the method of example 65, wherein a sum of the seventh time period and the eighth time period is lower than $10^{-7}$ s.

Example 67 is the method of any of examples 60 to 66, further comprising at least one of: outputting a second transmit data signal to the other communication apparatus via a second transmission link for communicating with the other communication apparatus irrespective of the direction of data flow on the first transmission link; and receiving a second receive data signal from the other communication apparatus via a third transmission link for communicating with the other communication apparatus irrespective of the direction of data flow on the first transmission link.

Example 68 is a communication method for a communication apparatus. The method comprises receiving a first receive data signal from another communication apparatus via a first transmission link for communicating with the other communication apparatus. Further, the method comprise determining a sequence of a first signal edge of a first type, a second signal edge of a second type, and a third signal edge of the first type in the first receive data signal. Additionally, the method comprises determining a first control symbol of a communication protocol that indicates an inversion of the direction of data flow on the transmission link if a first time period between the first signal edge and the second signal edge corresponds to a predetermined time period defined in the communication protocol, and determining a control symbol indicator if a second time period between the second signal edge and the third signal edge is longer than a payload data threshold defined in a communication protocol.

Example 69 is the method of example 68, further comprising outputting a first transmit data signal to the other communication apparatus via the first transmission link in response to receiving the first control symbol.

Example 70 is the method of example 69, further comprising generating the first transmit data signal, the first transmit data signal comprising a sequence of a fourth signal edge of the first type, a fifth signal edge of the second type, and a sixth signal edge of the first type, the fourth signal edge and the fifth signal edge being separated by a third time period corresponding to a second control symbol of the communication protocol that indicates an acknowledgement of the direction of data flow on the transmission link by the communication apparatus, and the fifth signal edge and the sixth signal edge being separated by a fourth time period being longer than a time period of any payload data symbol of the communication protocol.

Example 71 is the method of example 69, wherein generating the first transmit data signal comprises generating the first transmit data signal such after generating the sixth signal edge and prior to generating a signal edge indicating a start of payload data that the first transmission link is in a non-floating state.

Example 72 is the method of example 70 or example 71, wherein the first transmit data signal further comprises at least one sequence of a seventh signal edge of the second type and an eighth signal edge of the first type that directly succeeds the sixth signal edge, wherein a fifth time period between the seventh signal edge and its directly preceding signal edge of the first type corresponds to a third control symbol of the communication protocol that indicates an idle mode, and wherein a sixth time period between the seventh signal edge and the eighth signal edge is longer than the time period of any payload data symbol of the communication protocol.

Example 73 is the method of example 72, wherein the first transmit data signal further comprises a sequence of a ninth signal edge of the first type, a tenth signal edge of the second type, and an eleventh signal edge of the first type, wherein the ninth signal edge succeeds the last one of the at least one sequence of the seventh signal edge and the eighth signal edge, the ninth signal edge and the tenth signal edge being separated by a seventh time period corresponding to a first payload data symbol, the tenth signal edge and the eleventh signal edge being separated by an eighth time period corresponding to a second payload data symbol.

Example 74 is the method of example 73, wherein a sum of the seventh time period and the eighth time period is lower than $10^{-7}$ s.

Example 75 is the method of any of examples 68 to 74, further comprising at least one of:

outputting a second transmit data signal to the other communication apparatus via a second transmission link for communicating with the other communication apparatus irrespective of the direction of data flow on the first transmission link; and receiving a second receive data signal from the other communication apparatus via a third transmission link for communicating with the other communication apparatus irrespective of the direction of data flow on the first transmission link.

The examples described above in connection with FIGS. 15*a* to 15*d* may be summarized as follows:

Example 1 is an apparatus for generating a data signal. The apparatus for generating the data signal comprises an output interface circuit configured to output the data signal, and a processing circuit configured to generate the data signal. The data signal comprises a sequence of a first signal edge of a first type, a second signal edge of a second type, and a third signal edge of the first type. In a first mode of operation, the processing circuit is configured to adjust a first time period between the first signal edge and the second signal edge to a time period corresponding to a first payload data symbol to be transmitted according to a communication protocol, and to adjust a second time period between the second signal edge and the third signal edge to a time period corresponding to a second payload data symbol to be transmitted according to the communication protocol. In a second mode of operation, the processing circuit is configured to adjust the first time period to be longer than a time period of any payload data symbol of the communication protocol, and to adjust the second time period to a time period corresponding to a control symbol of the communication protocol that indicates an idle mode. In the second mode of operation, the processing circuit is alternatively configured to adjust the second time period to be longer than a time period of any payload data symbol of the communication protocol, and to adjust the first time period to the time period corresponding to the control symbol of the communication protocol that indicates the idle mode.

Example 2 is the apparatus of example 1, further comprising a control circuit configured to control the circuitry of the apparatus to change from the first mode of operation to the second mode of operation if an amount of data to be transmitted is below a first threshold.

Example 3 is the apparatus of example 2, wherein the control circuit is configured to control the circuitry of the apparatus to change from the second mode of operation to the first mode of operation if the amount of data to be transmitted is above the first threshold.

Example 4 is the apparatus of example 2 or example 3, wherein, in the second mode of operation, the processing circuit is configured to generate the data signal with a lower frequency than in the first mode of operation.

Example 5 is the apparatus of any of examples 1 to 4, wherein, in the second mode of operation, the data signal further comprises at least one sequence of a fourth signal edge of the second type and a fifth signal edge of the first type that directly succeeds the third signal edge, wherein a third time period between the fourth signal edge and its directly preceding signal edge of the first type or a fourth time period between the fourth signal edge and the fifth signal edge is longer than a time period of any payload data symbol of the communication protocol, and wherein the fourth time period or the third time period corresponds to the control symbol of the communication protocol that indicates the idle mode.

Example 6 is the apparatus of any of examples 1 to 5, wherein the output interface circuit is configured to couple to ground and to a transmission link for DC coupling the apparatus to a receiver that is coupled to a supply voltage. Further, in a third mode of operation, the output interface circuit is configured to power down the receiver by decoupling the receiver from ground, and the processing circuit is deactivated.

Example 7 is the apparatus of example 6, wherein the output interface circuit is configured to present high impedance to the transmission link in the third mode of operation.

Example 8 is the apparatus of example 6 or example 7, further comprising a control circuit configured to control the circuitry of the apparatus to change from the second mode of operation to the third mode of operation if an amount of data to be transmitted is below a second threshold.

Example 9 is the apparatus of example 8, wherein the control circuit is configured to only control the circuitry of the apparatus to change from the second mode of operation to the third mode of operation if a received control signal indicates that the third mode of operation is enabled.

Example 10 is the apparatus of example 8 or example 9, wherein the control circuit is configured to control the circuitry of the apparatus to change from the third mode of operation to the second mode of operation if the amount of data to be transmitted is above the second threshold or if the control signal indicates that the third mode of operation is disabled.

Example 11 is the apparatus of example 10, wherein, when changing from the third mode of operation to the second mode of operation, the output interface circuit is configured to power up the receiver by re-coupling the receiver to ground.

Example 12 is the apparatus of any of examples 6 to 11, further comprising a control circuit configured to deactivate the circuitry of the apparatus in a fourth mode of operation, wherein the output interface circuit is configured to present high impedance to the transmission link in the fourth mode of operation.

Example 13 is the apparatus of example 12, wherein the control circuit is configured to control the circuitry of the apparatus to change from the fourth mode of operation to the second mode of operation if an amount of data to be transmitted is above a third threshold or if a received control signal indicates that the fourth mode of operation is disabled.

Example 14 is the apparatus of example 12 or example 13, wherein the control circuit is configured to control the circuitry of the apparatus to change from the second mode of operation to the fourth mode of operation if the amount of data to be transmitted is below the third threshold.

Example 15 is the apparatus of example 14, wherein the control circuit is configured to control the circuitry of the apparatus to change from the second mode of operation to the fourth mode of operation if the control signal indicates that the fourth mode of operation is enabled.

Example 16 is the apparatus of any of examples 12 to 15, wherein, when changing from the second mode of operation to the fourth mode of operation, the processing circuit is configured to generate the data signal to comprise a sequence of a sixth signal edge of the first type, a seventh signal edge of the second type, and an eighth signal edge of the second type. The sixth signal edge and the seventh signal edge are separated by a fifth time period, and the seventh signal edge and the eighth signal edge are separated by a sixth time period. The fifth time period or the sixth time period is longer than a time period of any payload data symbol of the communication protocol, and the sixth time period or the fifth time period corresponds to a control symbol of the communication protocol that indicates changeover to the fourth mode of operation.

Example 17 is the apparatus of any of examples 12 to 16, wherein the transmission link is a differential transmission link. Further, in a fifth mode of operation, the control circuit is configured to activate another processing circuit configured to generate a low bandwidth data signal exhibiting a lower bandwidth than the data signal in the first mode of operation, and to activate the output interface circuit. In the fifth mode of operation, the output interface circuit is configured to output a defined signal level to both transmission lines of the differential transmission link for a predefined period of time, and to output the low bandwidth data signal to the transmission link after outputting the defined signal level to the differential transmission link.

Example 18 is the apparatus of example 17, wherein the other processing circuit is configured to generate the low bandwidth data signal using a different modulation scheme than the processing circuit uses for generating the data signal in the first mode of operation.

Example 19 is the apparatus of example 17 or example 18, wherein a bandwidth of the low bandwidth data signal in the fifth mode of operation is at least ten times lower than a bandwidth of the data signal in the first mode of operation.

Example 20 is the apparatus of any of examples 17 to 19, wherein the control circuit is configured to control the circuitry of the apparatus to change from the fourth mode of operation to the fifth mode of operation if a transmit data size is below a fourth threshold.

Example 21 is the apparatus of any of examples 17 to 20, wherein the control circuit is configured to control the circuitry of the apparatus to change from the fifth mode of operation to the fourth mode of operation after transmitting the data.

Example 22 is the apparatus of any of examples 17 to 21, wherein, in the fifth mode of operation, the output interface circuit is configured to output ground to the differential transmission link for a second predefined period of time subsequent to outputting the low bandwidth data signal.

Example 23 is the apparatus of any of examples 17 to 22, wherein the output interface circuit is configured to output the low bandwidth data signal to one transmission line of the differential transmission link and a clock signal to the other transmission line of the differential transmission link.

Example 24 is the apparatus of any of examples 17 to 22, wherein the other processing circuit is configured to generate a second low bandwidth data signal, the second low bandwidth data signal being inverted with respect to the low bandwidth data signal, and wherein the output interface circuit is configured to output the low bandwidth data signal and the second low bandwidth data signal to the differential transmission link.

Example 25 is the apparatus of any of example 17 to 24, wherein changing from the fourth mode of operation to the first mode of operation via the second mode of operation takes at least five times longer than changing from the fourth mode of operation to the fifth mode of operation.

Example 26 is the apparatus of any of example 17 to 25, wherein a power consumption of the apparatus in the fifth mode of operation is lower than in the first mode of operation.

Example 27 is the apparatus of any of examples 1 to 26, wherein a sum of the first time period and the second time period is lower than $10^{-7}$ s in the first mode of operation.

Example 28 is the apparatus of any of examples 1 to 27, wherein the first type is a rising edge and the second type is a falling edge, or wherein the second type is a rising edge and the first type is a falling edge.

Example 29 is the apparatus of any of examples 1 to 28, wherein, in the first mode of operation, the processing circuit is further configured to generate a second data signal, the second data signal being inverted with respect to the data signal.

Example 30 is an apparatus for decoding a data signal. The apparatus for decoding the data signal comprises an interface circuit configured to receive the data signal. Further, the apparatus for decoding the data signal comprises a processing circuit configured to determine a sequence of a first signal edge of a first type, a second signal edge of a second type, and a third signal edge of the first type in the data signal. The apparatus for decoding the data signal additionally comprises a demodulation circuit configured to determine first data based on a first time period between the first signal edge and the second signal edge, and to determine second data based on a second time period between the second signal edge and the third signal edge. A control circuit is configured to control the circuitry of the apparatus to operate in a first mode of operation if the first data and the second data are payload data symbols according to a communication protocol, and to control the circuitry of the apparatus to operate in a second mode of operation if the first data and the second data are a control symbol indicator and a control symbol of the communication protocol that indicates an idle mode.

Example 31 is the apparatus of example 30, wherein the demodulation circuit is configured to determine that the first data or the second data is a control symbol indicator if the first time period or the second time period is longer than a payload data threshold defined in the communication protocol, and to determine that the first data or the second data is the control symbol of the communication protocol that indicates the idle mode if the first time period or the second time period corresponds to a predetermined time period defined in the communication protocol.

Example 32 is the apparatus of example 30 or example 31, wherein the control circuit is configured to control the circuitry of the apparatus to operate to at a lower rate in the second mode of operation than in the first mode of operation.

Example 33 is the apparatus of any of examples 30 to 32, wherein the interface circuit is coupled to a supply voltage and to a differential transmission link for DC coupling the apparatus to a transmitter that is coupled to ground, wherein, in a third mode of operation, the interface circuit is configured to deactivate and to output a defined signal level to the differential transmission link.

Example 34 is the apparatus of example 33, wherein, in a fourth mode of operation, the interface circuit is configured to output ground to one transmission line of the differential transmission link and to present high impedance to another transmission line of the differential transmission link if the interface circuit senses that the transmitter drives both transmission lines of the differential transmission link to high impedance or if the data signal comprises a sequence of a fourth signal edge of the first type, a fifth signal edge of the second type, and a sixth signal edge of the second type. The fourth signal edge and the fifth signal edge are separated by a third time period, the fifth signal edge and the sixth signal edge are separated by a fourth time period, wherein the third time period or the fourth time period is longer than a time period of any payload data symbol of the communication protocol, and wherein the fourth time period or the third time period corresponds to a control symbol of the communication protocol that indicates changeover to the fourth mode of operation.

Example 35 is the apparatus of example 33 or example 34, wherein, if the interface circuit senses a defined signal level on both transmission lines of the differential transmission link for a predefined period of time, the control circuit is configured to control the circuitry of the apparatus to operate in a fifth mode of operation. In the fifth mode of operation, the interface circuit is configured to receive a low bandwidth data signal from one transmission line of the differential transmission link, and the control circuit is configured to activate another processing circuit configured to determine data based on the low bandwidth data signal.

Example 36 is the apparatus of example 35, wherein the other processing circuit is configured to use a different demodulation scheme for determining the data than the demodulation circuit.

Example 37 is the apparatus of example 35 or example 36, wherein, in the fifth mode of operation, the interface circuit is configured to receive a clock signal from the other transmission line of the differential transmission link, wherein the other processing circuit is further configured to determine the data based on the clock signal.

Example 38 is the apparatus of example 35 or example 36, wherein, in the fifth mode of operation, the control circuit is configured to activate a clock generation circuit configured to generate a clock signal, wherein the other processing circuit is further configured to determine the data based on the clock signal.

Example 39 is the apparatus of example 38, wherein the clock generation circuit is configured to generate the clock signal based on the low bandwidth data signal.

Example 40 is the apparatus of example 35 or example 36, wherein, in the fifth mode of operation, the interface circuit is configured to receive a second low bandwidth data signal from the other transmission line of the differential transmission link, the second low bandwidth data signal being inverted with respect to the low bandwidth data signal, wherein the other processing circuit is further configured to determine the data based on the second low bandwidth data signal.

Example 41 is the apparatus of any of examples 35 to 40, wherein a bandwidth of the low bandwidth data signal in the fifth mode of operation is at least ten times lower than a bandwidth of the data signal in the first mode of operation.

Example 42 is the apparatus of any of examples 35 to 41, wherein a power consumption of the apparatus in the fifth mode of operation is lower than in the first mode of operation.

Example 43 is the apparatus of any of examples 35 to 42, wherein, in the fifth mode of operation, the control circuit is configured to deactivate a termination between the transmission lines of the differential transmission link.

Example 44 is the apparatus of any of examples 30 to 43, wherein, in the first mode of operation, the interface circuit is further configured to receive a second data signal, the second data signal being inverted with respect to the data signal, and wherein the processing circuit is further configured to determine the first signal edge, the second signal edge, and the third signal edge further based on the second data signal.

Example 45 is the apparatus of any of examples 30 to 44, wherein a sum of the first time period and the second time period is lower than $10^{-7}$ s if the first data and the second data are payload data symbols according to the communication protocol.

Example 46 is the apparatus of any of examples 30 to 45, wherein the first type is a rising edge and the second type is a falling edge, or wherein the second type is a rising edge and the first type is a falling edge.

The examples described above in connection with FIGS. 16*a* to 16*h* may be summarized as follows:

Example 1 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, wherein the first signal edge and the second signal edge are separated by a first time period and the second signal edge and the third signal edge are separated by a second time period. In a first mode of operation, the processing circuit is configured to select the first time period and the second time period from a first plurality of time periods based on data to be transmitted, the first plurality of time periods being offset from each other by a first offset time. In a second mode of operation, the processing circuit is configured to select the first time period and the second time period from a second plurality of time periods based on the data to be transmitted, the second plurality of time periods being offset from each other by at least one second offset time that is greater than the first offset time. The apparatus for generating the data signal further comprises an output interface circuit configured to output the data signal.

Example 2 is the apparatus of example 1, wherein the second offset time is at least two times the first offset time.

Example 3 is the apparatus of example 1 or example 2, wherein the second plurality of time periods comprises less time periods than the first plurality of time periods.

Example 4 is the apparatus of any of examples 1 to 3, wherein the second plurality of time periods comprises two time periods, and wherein, in the second mode of operation, the first time period corresponds to a first digit of a base two numeral system representation of the data to be transmitted and the second time period corresponds to a second digit of the base two numeral system representation of the data to be transmitted.

Example 5 is the apparatus of any of examples 1 to 3, wherein the second plurality of time periods comprises three time periods. Further, in the second mode of operation, the processing circuit is further configured to convert the data to be transmitted to a base three numeral system representation, and the first time period corresponds to a first digit of the base three numeral system representation of the data to be transmitted and the second time period corresponds to a second digit of the base three numeral system representation of the data to be transmitted.

Example 6 is the apparatus of any of examples 1 to 5, wherein the first plurality of time periods comprises at least six time periods.

Example 7 is the apparatus of any of examples 1 to 6, wherein, in the second mode of operation, the processing circuit is configured to replicate at least one bit of the data to be transmitted a predefined number of times and to generate the data signal based on the bit and the predefined number of replicas of the bit.

Example 8 is the apparatus of example 7, wherein the predefined number of times is three or more.

Example 9 is the apparatus of any of examples 1 to 8, wherein the first type is a rising edge and the second type is a falling edge, or wherein the second type is a rising edge and the first type is a falling edge.

Example 10 is the apparatus of any of examples 1 to 9, wherein a sum of the first time period and the second time period is lower than $10^{-7}$ s.

Example 11 is the apparatus of any of examples 1 to 10, wherein the processing circuit is further configured to generate a second data signal, the second data signal being inverted with respect to the data signal.

Example 12 is the apparatus of any of examples 1 to 11, wherein the processing circuit comprises a digital-to-time converter configured to generate the data signal.

Example 13 is an apparatus for generating a data signal. The apparatus for generating the data signal comprises a processing circuit configured to generate the data signal, the data signal comprising a sequence of a first signal edge of a first type, a second signal edge of a second type, and a third signal edge of the first type. In a first mode of operation, the first signal edge and the second signal edge are separated by a first time period corresponding to first data of a first amount, and the second signal edge and the third signal edge are separated by a second time period corresponding to second data of the first amount. In a second mode of operation, the first signal edge and the second signal edge are separated by a third time period corresponding to third data of a smaller second amount, and the second signal edge and the third signal edge are separated by a fourth time period corresponding to fourth data of the second amount. The apparatus for generating the data signal further comprises an output interface circuit configured to output the data signal.

Example 14 is the apparatus of example 13, wherein the processing circuit is configured to select the first time period and the second time period from a first plurality of time periods, wherein the first plurality of time periods is offset from each other by a first offset time, and to select the third time period and the fourth time period from a second plurality of time periods. The second plurality of time periods are offset from each other by at least one second offset time that is greater than the first offset time.

Example 15 is the apparatus of example 14, wherein the second offset time is at least two times the first offset time.

Example 16 is the apparatus of example 14 or example 15, wherein the second plurality of time periods comprises less time periods than the first plurality of time periods.

Example 17 is the apparatus of any of examples 14 to 16, wherein the second plurality of time periods comprises two time periods, wherein the third data is a first digit of a base two numeral system representation of data to be transmitted, and wherein the fourth data is a second digit of the base two numeral system representation of the data to be transmitted.

Example 18 is the apparatus of any of examples 14 to 16, wherein the second plurality of time periods comprises three time periods. Further, the processing circuit is configured to convert data to be transmitted to a base three numeral system representation, wherein the third data is a first digit of the base three numeral system representation of the data to be transmitted, and wherein the fourth data is a second digit of the base three numeral system representation of the data to be transmitted.

Example 19 is the apparatus of example 17 or example 18, wherein, in the second mode of operation, the processing circuit is configured to replicate at least one bit of the data to be transmitted a predefined number of times and to generate the data signal based on the bit and the predefined number of replicas of the bit.

Example 20 is the apparatus of example 19, wherein the predefined number of times is three or more.

Example 21 is the apparatus of any of examples 14 to 20, wherein the first plurality of time periods comprises at least six time periods.

Example 22 is the apparatus of any of examples 14 to 21, wherein the first type is a rising edge and the second type is a falling edge, or wherein the second type is a rising edge and the first type is a falling edge.

Example 23 is the apparatus of any of examples 14 to 22, wherein a sum of the first time period and the second time period is lower than $10^{-7}$ s.

Example 24 is the apparatus of any of examples 14 to 23, wherein the processing circuit is further configured to generate a second data signal, the second data signal being inverted with respect to the data signal.

Example 25 is the apparatus of any of examples 14 to 24, wherein the processing circuit comprises a digital-to-time converter configured to generate the data signal.

Example 26 is an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine, in a first mode of operation, first data based on a first time period between the first signal edge and the second signal edge, and to determine second data based on a second time period between the second signal edge and the third signal edge. In a second mode of operation, the demodulation circuit is configured to determine a first reference time period of a plurality of reference time periods that is closest to the first time period, and a second reference time period of the plurality of reference time periods that is closest to the second time period. The demodulation circuit is further configured to determine third data based on the first reference time period, and fourth data based on the second reference time period.

Example 27 is the apparatus of example 26, wherein the third data corresponds to a first digit of a base three numeral system representation of data, wherein the fourth data corresponds to a second digit of the base three numeral system representation of the data, and wherein the demodulation circuit is configured to generate a base two numeral system representation of the data based on the third data and the fourth data.

Example 28 is the apparatus of example 26 or example 27, wherein the first type is a rising edge and the second type is a falling edge, or wherein the second type is a rising edge and the first type is a falling edge.

Example 29 is the apparatus of any of examples 26 to 28, wherein a sum of the first time period and the second time period is lower than $10^{-7}$ s.

Example 30 is the apparatus of any of examples 26 to 29, wherein the processing circuit is a time-to-digital converter.

Example 31 is the apparatus of any of examples 26 to 30, wherein the processing circuit is further configured to receive a second data signal, the second data signal being inverted with respect to the data signal, and to determine the first signal edge, the second signal edge, and the third signal edge further based on the second data signal.

Example 32 is a method for generating a data signal. The method comprises generating the data signal, the data signal comprising a sequence of a first signal edge of a first type, a second signal edge of a second type, and a third signal edge of the first type, wherein the first signal edge and the second signal edge are separated by a first time period and the second signal edge and the third signal edge are separated by a second time period. In a first mode of operation, generating the data signal comprises selecting the first time period and the second time period from a first plurality of time periods based on data to be transmitted, the first plurality of time periods being offset from each other by a first offset time. In a second mode of operation, generating the data signal comprises selecting the first time period and the second time period from a second plurality of time periods based on the data to be transmitted, the second plurality of time periods being offset from each other by a at least one second offset time that is greater than the first offset time. The method further comprises outputting the data signal.

Example 33 is the method of example 32, wherein the second offset time is at least two times the first offset time.

Example 34 is the method of example 32 or example 33, wherein the second plurality of time periods comprises less time periods than the first plurality of time periods.

Example 35 is the method of any of examples 32 to 34, wherein the second plurality of time periods comprises two time periods, and wherein, in the second mode of operation, the first time period corresponds to a first digit of a base two numeral system representation of the data to be transmitted and the second time period corresponds to a second digit of the base two numeral system representation of the data to be transmitted.

Example 36 is the method of any of examples 32 to 35, wherein the second plurality of time periods comprises three time periods. Further, the method comprises converting the data to be transmitted to a base three numeral system representation, wherein the first time period corresponds to a first digit of the base three numeral system representation of the data to be transmitted and the second time period corresponds to a second digit of the base three numeral system representation of the data to be transmitted.

Example 37 is the method of any of examples 32 to 36, wherein, in the second mode of operation, the method further comprises replicating at least one bit of the data to be transmitted a predefined number of times, and wherein generating the data signal is based on the bit and the predefined number of replicas of the bit.

Example 38 is the method of any of examples 32 to 37, wherein a sum of the first time period and the second time period is lower than $10^{-7}$ s.

Example 39 is a method for generating a data signal. The method comprises generating the data signal, the data signal comprising a sequence of a first signal edge of a first type, a second signal edge of a second type, and a third signal edge of the first type. In a first mode of operation, the first signal edge and the second signal edge are separated by a first time period corresponding to first data of a first amount, and the second signal edge and the third signal edge are separated by a second time period corresponding to second data of the first amount. In a second mode of operation, the first signal edge and the second signal edge are separated by a third time period corresponding to third data of a smaller second amount, and the second signal edge and the third signal edge are separated by a fourth time period corresponding to fourth data of the second amount. The method further comprises outputting the data signal.

Example 40 is the method of example 39, wherein generating the data signal comprises selecting the first time period and the second time period from a first plurality of time periods, wherein the first plurality of time periods is offset from each other by a first offset time, and selecting the third time period and the fourth time period from a second plurality of time periods, wherein the second plurality of time periods are offset from each other by a at least one second offset time that is greater than the first offset time.

Example 41 is the method of example 39 or example 40, wherein the second plurality of time periods comprises less time periods than the first plurality of time periods.

Example 42 is the method of any of examples 39 to 41, wherein the second plurality of time periods comprises two time periods, wherein the third data is a first digit of a base two numeral system representation of data to be transmitted, and wherein the fourth data is a second digit of the base two numeral system representation of data to be transmitted.

Example 43 is the method of any of examples 39 to 41, wherein the second plurality of time periods comprises three time periods. Further, the method comprises converting data to be transmitted to a base three numeral system representation, wherein the third data is a first digit of the base three numeral system representation of data to be transmitted, and wherein the fourth data is a second digit of the base three numeral system representation of data to be transmitted.

Example 44 is the method of example 42 or example 43, wherein, in the second mode of operation, the method further comprises replicating at least one bit of the data to be transmitted a predefined number of times, and wherein generating the data signal is based on the bit and the predefined number of replicas of the bit.

Example 45 is the method of any of examples 39 to 44, wherein a sum of the first time period and the second time period is lower than $10^{-7}$ s.

Example 46 is a method for decoding a data signal. The method comprises determining a sequence of a first signal edge of a first type, a second signal edge of a second type, and a third signal edge of the first type in the data signal. Further, the method comprises determining, in a first mode of operation, first data based on a first time period between the first signal edge and the second signal edge. The method additionally comprises determining, in the first mode of operation, second data based on a second time period between the second signal edge and the third signal edge. The method further comprises determining, in a second mode of operation, a first reference time period of a plurality of reference time periods that is closest to the first time period and a second reference time period of the plurality of reference time periods that is closest to the second time period. Additionally, the method comprises determining third data based on the first reference time period, and determining fourth data based on the second reference time period.

Example 47 is the method of example 46, wherein the third data corresponds to a first digit of a base three numeral system representation of data, wherein the fourth data corresponds to a second digit of the base three numeral system representation of the data, and wherein the method further comprises generating a base two numeral system representation of the data based on the third data and the fourth data.

Example 48 is the method of example 46 or example 47, wherein a sum of the first time period and the second time period is lower than $10^{-7}$ s.

The examples described above in connection with FIGS. 17*a* to 17*c* may be summarized as follows:

Example 1 is a communication apparatus. The communication apparatus comprises an interface circuit configured to couple to a transmission link and to receive, from another communication apparatus via the transmission link, first data indicative of communication capabilities of the other communication apparatus. Further, the communication apparatus comprises a processing circuit configured to determine from the first data whether the other communication apparatus supports transmission link characterization, and to generate a predefined test signal if the other communication apparatus supports transmission link characterization. The interface circuit is configured to output the test signal to the transmission link.

Example 2 is the communication apparatus of example 1, wherein the interface circuit is further configured to receive second data indicative of at least one characteristic of the transmission link from the other communication apparatus, wherein the second data is based on the test signal.

Example 3 is the communication apparatus of example 2, wherein the processing circuit is further configured to determine at least one communication parameter for exchanging data with the other communication apparatus via the transmission link based on the first data and the second data.

Example 4 is the communication apparatus of example 3, wherein the processing circuit is further configured to determine the at least one communication parameter based on third data indicative of communication capabilities of the communication apparatus.

Example 5 is the communication apparatus of example 3 or example 4, wherein the interface circuit is configured to output an information signal indicative of the at least one communication parameter to the transmission link.

Example 6 is the communication apparatus of any of examples 3 to 5, wherein, after determining the at least one communication parameter, the processing circuit is further configured to generate a data signal taking into account the at least one communication parameter. The data signal comprises a sequence of a first signal edge of a first type, a second signal edge of a second type, and a third signal edge of the first type, the first signal edge and the second signal edge being separated by a first time period corresponding to fourth data to be transmitted, the second signal edge and the third signal edge being separated by a second time period corresponding to fifth data to be transmitted. Further, the interface circuit is configured to output the data signal to the transmission link.

Example 7 is the communication apparatus of example 6, wherein the first type is a rising edge and the second type is a falling edge, or wherein the second type is a rising edge and the first type is a falling edge.

Example 8 is the communication apparatus of example 6 or example 7, wherein a sum of the first time period and the second time period is lower than $10^{-7}$ s.

Example 9 is the communication apparatus of any of examples 6 to 8, wherein the processing circuit is further configured to generate a second data signal, the second data signal being inverted with respect to the data signal.

Example 10 is the communication apparatus of any of examples 6 to 9, wherein the fourth data is a first payload data symbol and the fifth data is a second payload data symbol to be transmitted according to a communication protocol.

Example 11 is the communication apparatus of any of examples 6 to 10, wherein the processing circuit is further configured to generate the data signal to exhibit a higher data rate than a received capability information signal comprising the first data.

Example 12 is the communication apparatus of any of examples 1 to 11, wherein the processing circuit is further configured to determine a sequence of a fourth signal edge of the first type, a fifth signal edge of the second type, and a sixth signal edge of the first type in a capability information signal received from the other communication apparatus and comprising the first data. Further, the communication apparatus comprises a demodulation circuit configured to determine a first reference time period of a plurality of reference time periods that is closest to a first time period between the first signal edge and the second signal edge, to determine a second reference time period of the plurality of reference time periods that is closest to the second time period between the second signal edge and the third signal edge, and to determine a first portion of the first data based on the first reference time period, and a second portion of the first data based on the second reference time period.

Example 13 is the communication apparatus of any of examples 1 to 12, wherein the first data indicates at least one of a maximum data rate supported by the other communication apparatus, power modes supported by the other communication apparatus, a maximum signal amplitude supported by the other communication apparatus, and a maximum number of transmission links supported by the other communication apparatus for communicating with the communication apparatus.

Example 14 is the communication apparatus of any of examples 1 to 13, wherein the test signal exhibits a varying frequency within a pre-determined frequency range.

Example 15 is the communication apparatus of any of examples 1 to 14, wherein the interface circuit is further configured to output a polling signal to the transmission link that comprises a request to the other communication apparatus to transmit information about its communication capabilities to the apparatus.

Example 16 is a communication apparatus. The communication apparatus comprises an interface circuit configured to couple to a transmission link, and transmit first data indicative of communication capabilities of the communication apparatus via the transmission link to another communication apparatus, wherein the first data further indicates that the communication apparatus supports transmission link characterization. The interface circuit is further configured to receive a predefined test signal from the other communication apparatus via the transmission link in response to transmitting the first data. Further, the communication apparatus comprises a processing circuit configured to determine at least one characteristic of the transmission link based on the test signal.

Example 17 is the communication apparatus of example 16, wherein the interface circuit is further configured to transmit second data indicative of the at least one characteristic of the transmission link to the other communication apparatus.

Example 18 is the communication apparatus of example 17, wherein the input interface circuit is further configured to receive, from the other communication apparatus, an information signal indicative of at least one communication parameter for exchanging data with the other communication apparatus via the transmission link, wherein the at least one communication parameter is based on the first data and the second data.

Example 19 is the communication apparatus of any of examples 16 to 18, wherein the interface circuit is further configured to receive a polling signal via the transmission link that comprises a request to the apparatus to transmit information about its communication capabilities to the other communication apparatus, and wherein the output interface circuit is configured to output the first data in response to receiving the polling signal.

Example 20 is the communication apparatus of any of examples 16 to 19, wherein, after receiving the information signal, the interface circuit is configured to receive a data signal from the other communication apparatus via the transmission link. Further, the processing circuit is configured to determine a sequence of a first signal edge of a first type, a second signal edge of a second type, and a third signal edge of the first type in the data signal. The communication apparatus further comprises a demodulation circuit configured to determine third data based on a first time period between the first signal edge and the second signal edge, and to determine fourth data based on a second time period between the second signal edge and the third signal edge.

Example 21 is the communication apparatus of example 20, wherein the first type is a rising edge and the second type is a falling edge, or wherein the second type is a rising edge and the first type is a falling edge.

Example 22 is the communication apparatus of example 20 or example 21, wherein a sum of the first time period and the second time period is lower than $10^{-7}$ s.

Example 23 is the communication apparatus of any of examples 20 to 22, wherein the interface circuit is further configured to receive a second data signal, the second data signal being inverted with respect to the data signal, and wherein the processing circuit is further configured to determine the first signal edge, the second signal edge, and the third signal edge further based on the second data signal.

Example 24 is the communication apparatus of any of examples 20 to 23, wherein the processing circuit is configured to generate a capability information signal comprising the first data, wherein the capability information signal exhibits a lower data rate than the data signal.

Example 25 is the communication apparatus of example 24, wherein the capability information signal comprises a sequence of a fourth signal edge of the first type, a fifth signal edge of the second type, and a sixth signal edge of the first type, the fourth signal edge and the fifth signal edge being separated by a third time period corresponding to a first portion of the first data, the fifth signal edge and the sixth signal edge being separated by a fourth time period corresponding to a second portion of the first data, wherein the first time period and the second time period are offset from each other by a first offset time. The processing circuit is configured to select the third time period and the fourth time period from a plurality of time periods, the plurality of time periods being offset from each other by at least one second offset time greater than the first offset time.

Example 26 is the communication apparatus of any of examples 16 to 25, wherein the first data indicates at least one of a maximum data rate supported by the communication apparatus, power modes supported by the communication apparatus, a maximum signal amplitude supported by the communication apparatus, and a maximum number of transmission links supported by the communication apparatus for communicating with the other communication apparatus.

Example 27 is a communication method for a communication apparatus. The method comprises coupling to a transmission link, and receiving, from another communication apparatus via the transmission link, first data indicative of communication capabilities of the other communication apparatus. Additionally, the method comprises determining from the first data whether the other communication apparatus supports transmission link characterization, and generating a predefined test signal if the other communication apparatus supports transmission link characterization. The method further comprises outputting the test signal to the transmission link.

Example 28 is the method of example 27, further comprising receiving second data indicative of at least one characteristic of the transmission link from the other communication apparatus, wherein the second data is based on the test signal.

Example 29 is the method of example 28, further comprising determining at least one communication parameter for exchanging data with the other communication apparatus via the transmission link based on the first data and the second data.

Example 30 is the method of example 29, wherein determining the at least one communication parameter is further based on third data indicative of communication capabilities of the communication apparatus.

Example 31 is the method of example 29 or example 30, further comprising outputting an information signal indicative of the at least one communication parameter to the transmission link.

Example 32 is the method of any of examples 29 to 31, wherein, after determining the at least one communication parameter, the method further comprises generating a data signal taking into account the at least one communication parameter, the data signal comprising a sequence of a first signal edge of a first type, a second signal edge of a second type, and a third signal edge of the first type, the first signal edge and the second signal edge being separated by a first time period corresponding to fourth data to be transmitted, and the second signal edge and the third signal edge being separated by a second time period corresponding to fifth data to be transmitted. Additionally, the method comprises outputting the data signal to the transmission link.

Example 33 is the method of example 32, wherein a sum of the first time period and the second time period is lower than $10^{-7}$ s.

Example 34 is the method of examples 32 or example 33, wherein the data signal is generated to exhibit a higher data rate than a received capability information signal comprising the first data.

Example 35 is the method of any of examples 27 to 34, wherein receiving the first data comprises determining a sequence of a fourth signal edge of the first type, a fifth signal edge of the second type, and a sixth signal edge of the first type in a capability information signal comprising the first data. Additionally, receiving the first data comprises determining a first reference time period of a plurality of reference time periods that is closest to a first time period between the first signal edge and the second signal edge, and determining a second reference time period of the plurality of reference time periods that is closest to the second time period between the second signal edge and the third signal edge. Receiving the first data further comprises determining a first portion of the first data based on the first reference time period, and a second portion of the first data based on the second reference time period.

Example 36 is the method of any of examples 27 to 35, wherein the test signal comprises a varying frequency within a pre-determined frequency range.

Example 37 is the method of any of examples 27 to 36, further comprising outputting a polling signal to the transmission link that comprises a request to the other communication apparatus to transmit information about its communication capabilities to the communication apparatus.

Example 38 is a communication method for a communication apparatus. The method comprises coupling to a transmission link, and transmitting first data indicative of communication capabilities of the communication apparatus via the transmission link to another communication apparatus, wherein the first data further indicates that transmission link characterization is supported. Further, the method comprises receiving a predefined test signal from the other communication apparatus via the transmission link, and determining at least one characteristic of the transmission link based on the test signal.

Example 39 is the method of example 38, further comprising transmitting second data indicative of the at least one characteristic of the transmission link to the other communication apparatus.

Example 40 is the method of example 39, further comprising receiving, from the other communication apparatus, an information signal indicative of at least one communication parameter for exchanging data with the other communication apparatus via the transmission link, wherein the at least one communication parameter is based on the first data and the second data.

Example 41 is the method of any of examples 38 to 40, further comprising receiving a polling signal via the transmission link that comprises a request to transmit information about the own communication capabilities to the other communication apparatus, and outputting the first data in response to receiving the polling signal.

Example 42 is the method of any of examples 38 to 41, wherein, after receiving the information signal, the method further comprises receiving a data signal from the other communication apparatus via the transmission link, and determining a sequence of a first signal edge of a first type, a second signal edge of a second type, and a third signal edge of the first type in the data signal. The method additionally comprises determining third data based on a first time period between the first signal edge and the second signal edge, and determining fourth data based on a second time period between the second signal edge and the third signal edge.

Example 43 is the method of example 42, wherein a sum of the first time period and the second time period is lower than $10^{-7}$ s.

Example 44 is the method of example 42 or example 43, further comprising generating a capability information signal comprising the first data, wherein the capability information signal exhibits a lower data rate than the data signal.

Example 45 is the method of example 44, wherein the capability information signal comprises a sequence of a fourth signal edge of the first type, a fifth signal edge of the second type, and a sixth signal edge of the first type, the fourth signal edge and the fifth signal edge being separated by a third time period corresponding to a first portion of the first data, the fifth signal edge and the sixth signal edge being separated by a fourth time period corresponding to a second portion of the first data. The first time period and the second time period are offset from each other by a first offset time. Further, generating the capability information signal comprises selecting the third time period and the fourth time period from a plurality of time periods, the plurality of time periods being offset from each other by at least one second offset time greater than the first offset time.

The examples described above in connection with FIGS. 18*a* to 18*g* may be summarized as follows:

Example 1 is an apparatus for generating a data signal. The apparatus for generating the data signal comprises a processing circuit configured to generate the data signal, and an output interface circuit configured to output the data signal. In a first mode of operation, the processing circuit is configured to generate the data signal to comprise a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. In a second mode of operation, the processing circuit is configured to generate the data signal based on the first data and the second data using pulse amplitude modulation.

Example 2 is the apparatus of example 1, wherein, in the second mode of operation, the processing circuit is configured to generate the data signal using pulse amplitude modulation with two possible signal levels.

Example 3 is the apparatus of example 1 or example 2, wherein, in the second mode of operation, the processing circuit is configured to generate the data signal using non-return-to-zero pulse amplitude modulation.

Example 4 is the apparatus of any of examples 1 to 3, wherein, in the second mode of operation, the processing circuit is further configured to generate a clock signal, and wherein the output interface circuit is configured to simultaneously output the clock signal and the data signal.

Example 5 is the apparatus of any of examples 1 to 4, wherein the first type is a rising edge and the second type is a falling edge, or wherein the second type is a rising edge and the first type is a falling edge.

Example 6 is the apparatus of any of examples 1 to 5, wherein a sum of the first time period and the second time period is lower than $10^{-7}$ s.

Example 7 is the apparatus of any of examples 1 to 6, wherein, in the first mode of operation, the processing circuit is further configured to generate a second data signal, the second data signal being inverted with respect to the data signal.

Example 8 is the apparatus of any of examples 1 to 7, wherein the processing circuit comprises a digital-to-time converter configured to generate the data signal.

Example 9 is the apparatus of any of examples 1 to 8, wherein, in the second mode of operation, the digital-to-time converter is configured to generate the data signal by frequency dividing an input oscillation signal.

Example 10 is the apparatus of any of examples 1 to 9, further comprising a control circuit configured to control the processing circuit to operate in the second mode of operation based on a received control signal.

Example 11 is an apparatus for decoding a data signal. The apparatus for decoding the data signal comprises a processing circuit configured to determine, in a first mode of operation, a sequence of a first signal edge of a first type, a second signal edge of a second type, and a third signal edge of the first type in the data signal. Further, the apparatus for decoding the data signal comprises a demodulation circuit configured to determine, in the first mode of operation, first data based on a first time period between the first signal edge and the second signal edge, and to determine second data based on a second time period between the second signal edge and the third signal edge. In a second mode of operation, the processing circuit is configured to determine a sequence of signal levels of the data signal at a plurality of successive time instances. Further, in the second mode of operation, the demodulation circuit is configured to determine the first data and the second data based on the sequence of signal levels.

Example 12 is the apparatus of example 11, wherein the plurality of successive time instances are offset from each other by a constant offset time.

Example 13 is the apparatus of example 11 or example 12, wherein, the plurality of successive time instances are based on a clock signal.

Example 14 is the apparatus of example 13, wherein, in the second mode of operation, the processing circuit is configured to receive the clock signal and the data signal simultaneously from a transmitter.

Example 15 is the apparatus of example 13, further comprising a clock recovery circuit configured to generate the clock signal based on the data signal.

Example 16 is the apparatus of example 15, wherein the clock recovery circuit is a phase-locked loop.

Example 17 is the apparatus of any of examples 10 to 16, wherein the first type is a rising edge and the second type is a falling edge, or wherein the second type is a rising edge and the first type is a falling edge.

Example 18 is the apparatus of any of examples 11 to 17, wherein a sum of the first time period and the fourth time period is lower than $10^{-7}$ s.

Example 19 is the apparatus of any of examples 11 to 18, wherein the processing circuit comprises a time-to-digital converter configured to determine the sequence of the first signal edge, the second signal edge, and the third signal edge in the data signal.

Example 20 is the apparatus of any of examples 11 to 19, wherein, in the first mode of operation, the processing circuit is further configured to receive a second data signal, the second data signal being inverted with respect to the data signal, and to determine the first signal edge, the second signal edge, and the third signal edge further based on the second data signal.

Example 21 is the apparatus of any of examples 11 to 20, further comprising a control circuit configured to control the processing circuit and the demodulation circuit to operate in the second mode of operation based on a received control signal.

Example 22 is a method for generating a data signal. The method comprises generating, in a first mode of operation, the data signal to comprise a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. Further, the method comprises generating, in a second mode of operation, the data signal based on the first data and the second data using pulse amplitude modulation. The method additionally comprises outputting the data signal.

Example 23 is the method of example 22, wherein, in the second mode of operation, generating the data signal comprises generating the data signal using pulse amplitude modulation with two possible signal levels.

Example 24 is the apparatus of example 22 or example 23, wherein, in the second mode of operation, generating the data signal comprises generating the data signal using non-return-to-zero pulse amplitude modulation.

Example 25 is the method of any of examples 22 to 24, wherein the method further comprises generating, in the second mode of operation, a clock signal, and simultaneously outputting the clock signal and the data signal.

Example 26 is the method of any of examples 22 to 25, wherein the first type is a rising edge and the second type is a falling edge, or wherein the second type is a rising edge and the first type is a falling edge.

Example 27 is the method of any of examples 22 to 26, wherein a sum of the first time period and the second time period is lower than $10^{-7}$ s.

Example 28 is the method of any of examples 22 to 27, wherein, in the first mode of operation, the method further comprises generating a second data signal, the second data signal being inverted with respect to the data signal.

Example 29 is a method for decoding a data signal. The method comprises determining, in a first mode of operation, a sequence of a first signal edge of a first type, a second signal edge of a second type, and a third signal edge of the first type in the data signal. Further, the method comprises determining, in the first mode of operation, first data based on a first time period between the first signal edge and the second signal edge, and second data based on a second time period between the second signal edge and the third signal edge. The method additionally comprises determining, in a second mode of operation, a sequence of signal levels of the data signal at a plurality of successive time instances. Further, the method comprises determining, in the second mode of operation, the first data and the second data based on the sequence of signal levels.

Example 30 is the method of example 29, wherein the plurality of successive time instances are offset from each other by a constant offset time.

Example 31 is the method of example 29 or example 30, wherein, the plurality of successive time instances are based on a clock signal.

Example 32 is the method of example 31, wherein the method further comprises receiving, in the second mode of operation, the clock signal and the data signal simultaneously from a transmitter.

Example 33 is the method of example 31, wherein the method further comprises generating the clock signal based on the data signal.

Example 34 is the method of any of examples 29 to 33, wherein the first type is a rising edge and the second type is a falling edge, or wherein the second type is a rising edge and the first type is a falling edge.

Example 35 is the method of any of examples 29 to 34, wherein a sum of the first time period and the fourth time period is lower than $10^{-7}$ s.

Example 36 is the method of any of examples 29 to 35, wherein the method further comprises receiving, in the first mode of operation, a second data signal, the second data signal being inverted with respect to the data signal, and determining the first signal edge, the second signal edge, and the third signal edge further based on the second data signal.

The examples described above in connection with FIG. 19 may be summarized as follows:

Example 1 is an apparatus for generating a data signal. The apparatus for generating the data signal comprises a processing circuit configured to generate the data signal in at least a first mode of operation, and a monitoring circuit configured to monitor a stability of circuitry of the apparatus. When changing to the first mode of operation from a second mode of operation in which at least part of the circuitry of the apparatus is deactivated, the processing circuit is configured to initially adjust time periods between directly succeeding signal edges of the data signal based on respective data portions of a first amount until the monitoring circuit determines that the circuitry of the apparatus operates stable. Further, the processing circuit is configured to adjust the time periods between directly succeeding signal edges of the data signal based on respective data portions of a greater second amount after the monitoring circuit determines that the circuitry of the apparatus operates stable.

Example 2 is the apparatus of example 1, wherein the processing circuit is configured to adjust the time periods between directly succeeding signal edges of the data signal to time periods of a first plurality of time periods until the monitoring circuit determines that the circuitry of the apparatus operates stable, wherein the first plurality of time periods are offset from each other by a first offset time. Further, the processing circuit is configured to adjust the time periods between directly succeeding signal edges of the data signal to time periods of a second plurality of time periods after the monitoring circuit determines that the circuitry of the apparatus operates stable, wherein the second plurality of time periods are offset from each other by a second offset time being smaller than the first offset time.

Example 3 is the apparatus of example 2, wherein the first offset time is at least three times the second offset time.

Example 4 is the apparatus of example 2 or example 3, wherein the first plurality of time periods comprises less time periods than the second plurality of time periods.

Example 5 is the apparatus of any of examples 2 to 4, wherein the second plurality of time periods comprises at least six time periods.

Example 6 is the apparatus of any of examples 1 to 5, wherein the apparatus further comprises a phase-locked-loop configured to generate an oscillation signal, wherein the processing circuit is configured to generate the data signal using the oscillation signal, wherein the phase-locked-loop is activated when changing from the second mode of operation to the first mode of operation, and wherein the monitoring circuit is configured to only determine that the circuitry of the apparatus operates stable if the phase-locked-loop is locked.

Example 7 is the apparatus of any of examples 1 to 6, wherein the second mode of operation is a power saving mode.

Example 8 is the apparatus of any of examples 1 to 7, wherein, after the monitoring circuit determines that the circuitry of the apparatus is stable, the processing circuit is configured to generate the data signal to comprise a sequence of a first signal edge of a first type, a second signal edge of a second type, and a third signal edge of the first type, wherein a first time period between the first signal edge and the second signal edge corresponds to a first data portion of the second amount, and wherein a second time period between the second signal edge and the third signal edge corresponds to a second data portion of the second amount.

Example 9 is the apparatus of example 8, wherein the first type is a rising edge and the second type is a falling edge, or wherein the second type is a rising edge and the first type is a falling edge.

Example 10 is the apparatus of example 8 or example 9, wherein a sum of the first time period and the second time period is lower than $10^{-7}$ s.

Example 11 is the apparatus of any of examples 1 to 10, wherein the processing circuit is further configured to generate a second data signal, the second data signal being inverted with respect to the data signal.

Example 12 is the apparatus of any of examples 1 to 11, wherein the processing circuit comprises a digital-to-time converter configured to generate the data signal.

Example 13 is an apparatus for generating a data signal. The apparatus for generating the data signal comprises a processing circuit configured to generate the data signal at least in a first mode of operation, and a monitoring circuit configured to monitor a stability of circuitry of the apparatus. When changing to the first mode of operation from a second mode of operation in which at least part of the circuitry of the apparatus is deactivated, the processing circuit is configured to initially adjust, based on data to be transmitted, time periods between directly succeeding signal edges of the data signal to time periods of a first plurality of time periods until the monitoring circuit determines that the circuitry of the apparatus operates stable, wherein the first plurality of time periods are offset from each other by a first offset time. Further, the processing circuit is configured to adjust, based on the data to be transmitted, the time periods between directly succeeding signal edges of the data signal to time periods of a second plurality of time periods after the monitoring circuit determines that the circuitry of the apparatus operates stable, wherein the second plurality of time periods are offset from each other by a second offset time being smaller than the first offset time.

Example 14 is the apparatus of example 13, wherein the first offset time is at least three times the second offset time.

Example 15 is the apparatus of example 13 or example 14, wherein the first plurality of time periods comprises less time periods than the second plurality of time periods.

Example 16 is the apparatus of any of examples 13 to 15, wherein the second plurality of time periods comprises at least six time periods.

Example 17 is the apparatus of any of examples 13 to 16, wherein the apparatus further comprises a phase-locked-loop configured to generate an oscillation signal, wherein the processing circuit is configured to generate the data signal using the oscillation signal, wherein the phase-locked-loop is activated when changing from the second mode of operation to the first mode of operation, and wherein the monitoring circuit is configured to determine that the circuitry of the apparatus operates stable if the phase-locked-loop is locked.

Example 18 is the apparatus of any of examples 13 to 17, wherein the second mode of operation is a power saving mode.

Example 19 is the apparatus of any of examples 13 to 18, wherein, after the monitoring circuit determines that the circuitry of the apparatus is stable, the processing circuit is configured to generate the data signal to comprise a sequence of a first signal edge of a first type, a second signal edge of a second type, and a third signal edge of the first type, wherein a first time period between the first signal edge and the second signal edge corresponds to first data to be transmitted, wherein a second time period between the second signal edge and the third signal edge corresponds to second data to be transmitted.

Example 20 is the apparatus of example 19, wherein the first type is a rising edge and the second type is a falling edge, or wherein the second type is a rising edge and the first type is a falling edge.

Example 21 is the apparatus of example 19 or example 20, wherein a sum of the first time period and the second time period is lower than $10^{-7}$ s.

Example 22 is the apparatus of any of examples 13 to 21, wherein the processing circuit is further configured to generate a second data signal, the second data signal being inverted with respect to the data signal.

Example 23 is the apparatus of any of examples 13 to 22, wherein the processing circuit comprises a digital-to-time converter configured to generate the data signal.

The examples described above in connection with FIGS. 20*a* to 20*f* may be summarized as follows:

Example 1 is an apparatus for regulating a supply signal generated by a low-dropout regulator for an electronic device. The apparatus for regulating the supply signal comprises an output capacitor configured to couple between the low-dropout regulator and the electronic device, wherein the output capacitor is configured to receive the supply signal. Further, the apparatus for regulating the supply signal comprises a switch circuit configured to selectively couple a charge source to the output capacitor if a control signal indicates that the electronic device transitions from a first mode of operation to a second mode of operation.

Example 2 is the apparatus of example 1, wherein the charge source is a charged capacitor, and wherein the switch circuit is configured to toggle an electrode of the charged capacitor between the low-dropout regulator and the output capacitor.

Example 3 is the apparatus of example 2, wherein the switch circuit is configured to toggle the electrode between the low-dropout regulator and the output capacitor at a predetermined toggle frequency, wherein the toggle frequency is selected such that a predetermined amount of charge is transferred to the output capacitor within a predetermined time interval.

Example 4 is the apparatus of example 1, wherein the switch circuit is configured to selectively couple the charge source to the output capacitor until a voltage across electrodes of the output capacitor is at a predetermined value.

Example 5 is the apparatus of example 4, further comprising a comparator circuit configured to generate a comparison signal based on a comparison of a present value of the voltage across the electrodes of the output capacitor to the predetermined value, wherein the switch circuit is configured to selectively couple the charge source to the output capacitor based on the comparison signal.

Example 6 is the apparatus of example 1, wherein the switch circuit is configured to selectively couple the charge source to the output capacitor for a predetermined time interval, wherein time interval is selected such that a predetermined amount of charge is transferred to the output capacitor.

Example 7 is the apparatus of any of examples 4 to 6, wherein the charge source is a charged capacitor.

Example 8 is the apparatus of any of the preceding examples, wherein the switch circuit is configured to couple the charge source in parallel to the output capacitor.

Example 9 is a communication apparatus. The communication apparatus comprises an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. Further, the apparatus for generating the data signal comprises an output interface circuit configured to output the data signal. The communication apparatus additionally comprises a low-dropout regulator configured to generate a supply signal for the apparatus for generating the data signal, and an apparatus for regulating the supply signal according to any of examples 1 to 8.

Example 10 is the communication apparatus of example 9, wherein the processing circuit is configured to generate the data signal at a first data rate in the first mode of operation and to generate the data signal at a higher second data rate in the second mode of operation.

Example 11 is the communication apparatus of example 9, wherein the first mode of operation is an idle mode of the apparatus for generating the data signal, and wherein the second mode of operation is a fully operational mode of the apparatus for generating the data signal.

Example 12 is the communication apparatus of example 9, wherein the first mode of operation is one of a power-off mode and a low-power mode of the apparatus for generating the data signal, and wherein the second mode of operation is one of an idle mode and a fully operational mode of the apparatus for generating the data signal.

Example 13 is the communication apparatus of any of examples 9 to 12, wherein the processing circuit is a digital-to-time converter.

Example 14 is the communication apparatus of any of example 9 to 13, wherein the first type is a rising edge and the second type is a falling edge, or wherein the second type is a rising edge and the first type is a falling edge.

Example 15 is the communication apparatus of any of example 9 to 14, wherein a sum of the first time period and the second time period is lower than $10^{-7}$ s.

Example 16 is a communication apparatus. The communication apparatus comprises an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine first data based on a first time period between the first signal edge and the second signal edge, and to determine second data based on a second time period between the second signal edge and the third signal edge. The communication apparatus additionally comprises a low-dropout regulator configured to generate a supply signal for the apparatus for decoding the data signal, and an apparatus for regulating the supply signal according to any of examples 1 to 8.

Example 17 is the communication apparatus of example 16, wherein the first mode of operation is an idle mode of the apparatus for decoding the data signal, and wherein the second mode of operation is a fully operational mode of the apparatus for decoding the data signal.

Example 18 is the communication apparatus of example 16, wherein the first mode of operation is one of a power-off mode and a low-power mode of the apparatus for decoding the data signal, and wherein the second mode of operation is one of an idle mode and a fully operational mode of the apparatus for decoding the data signal.

Example 19 is the communication apparatus of any of examples 16 to 18, wherein the processing circuit is a time-to-digital-converter.

Example 20 is the communication apparatus of any of example 16 to 19, wherein the first type is a rising edge and the second type is a falling edge, or wherein the second type is a rising edge and the first type is a falling edge.

Example 21 is the communication apparatus of any of example 16 to 20, wherein a sum of the first time period and the second time period is lower than $10^{-7}$ s.

Example 22 is a method for regulating a supply signal generated by a low-dropout regulator for an electronic device. The method comprises receiving the supply signal by an output capacitor coupled between the low-dropout regulator and the electronic device, and selectively coupling a charge source to the output capacitor if a control signal indicates that the electronic device transitions from a first mode of operation to a second mode of operation.

Example 23 is the method of example 22, wherein the charge source is a charged capacitor, and wherein selectively coupling the charge source to the output capacitor comprises toggling an electrode of the charged capacitor between the low-dropout regulator and the output capacitor.

Example 24 is the method of example 23, wherein toggling an electrode of the charged capacitor between the low-dropout regulator and the output capacitor comprises toggling an electrode of the charged capacitor between the low-dropout regulator and the output capacitor at a predetermined toggle frequency, wherein the toggle frequency is selected such that a predetermined amount of charge is transferred to the output capacitor within a predetermined time interval.

Example 25 is the method of example 22, wherein selectively coupling the charge source to the output capacitor comprises selectively coupling the charge source to the output capacitor until a voltage across electrodes of the output capacitor is at a predetermined value.

Example 26 is the method of example 22, further comprising generating a comparison signal based on a comparison of a present value of the voltage across the electrodes of the output capacitor to the predetermined value, wherein selectively coupling the charge source to the output capacitor is based on the comparison signal.

Example 27 is the method of example 22, wherein selectively coupling the charge source to the output capacitor comprises selectively coupling the charge source to the output capacitor for a predetermined time interval, wherein the predetermined time interval is selected such that a predetermined amount of charge is transferred to the output capacitor.

Example 28 is the method of any of examples 25 to 27, wherein the charge source is a charged capacitor.

Example 29 is the method of any of examples 22 to 28, wherein selectively coupling the charge source to the output capacitor comprises coupling the charge source in parallel to the output capacitor.

The examples described above in connection with FIG. 21 may be summarized as follows:

Example 1 is a transmitter. The transmitter comprises a processing circuit configured to generate a data signal to be transmitted. Further, the transmitter comprises an output interface circuit configured to couple to ground and to a transmission link for DC coupling the transmitter to a receiver that is coupled to a supply voltage, wherein the output interface circuit is further configured to output the data signal to the receiver by modulating, based on the data signal, a DC current flowing from the receiver to the transmitter via the transmission link.

Example 2 is the transmitter of example 1, wherein the output interface circuit comprises a first transistor configured to receive the data signal at a control terminal, wherein a first terminal of the first transistor is configured to couple to the transmission link, and wherein a second terminal of the first transistor is coupled to ground.

Example 3 is the transmitter of example 1 or example 2, wherein the output interface circuit is further configured to capacitively couple a signal related to the data signal to the transmission link.

Example 4 is the transmitter of example 3, wherein the output interface circuit comprises an inverter circuit configured to invert the data signal and to output the inverted data signal as the signal related to the data signal, and a capacitor configured to capacitively couple the inverted data signal to the transmission link.

Example 5 is the transmitter of example 4, wherein the output interface circuit comprises a resistor coupled between the capacitor and the transmission link.

Example 6 is the transmitter of any of examples 1 to 5, wherein the output interface circuit is configured to power down the receiver by de-coupling the receiver from ground.

Example 7 is the transmitter of example 6, wherein the output interface circuit is configured to power up the receiver by re-coupling the receiver to ground.

Example 8 is the transmitter of example 6 or example 7, wherein the output interface circuit is configured to power down the receiver by driving the first transistor to a non-conductive state.

Example 9 is the transmitter of 8, wherein the output interface is further configured to deactivate a bias current source coupled between the first transistor and ground.

Example 10 is the transmitter of any of examples 1 to 9, wherein the data signal comprises a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted.

Example 11 is the transmitter of example 10, wherein a sum of the first time period and the second time period is lower than $10^{-7}$ s.

Example 12 is the transmitter of example 10 or example 11, wherein the first type is a rising edge and the second type is a falling edge, or wherein the second type is a rising edge and the first type is a falling edge.

Example 13 is the transmitter of any of examples 10 to 12, wherein the first data is a first data symbol and the second data is a second data symbol to be transmitted according to a data communication protocol.

Example 14 is the transmitter of any of examples 1 to 13, wherein the processing circuit is further configured to generate a second data signal, the second data signal being inverted with respect to the data signal. Further, the output interface circuit is configured to output the second data signal to the receiver by modulating, based on the second data signal, a second DC current flowing from the receiver to the transmitter via the transmission link.

Example 15 is a communication system, comprising a transmitter according to any of examples 1 to 14 and a receiver coupled to a supply voltage, wherein the transmitter and the receiver are DC coupled via a transmission link.

Example 16 is the communication system of example 15, wherein the transmitter is coupled between the receiver and ground.

Example 17 is the communication system of example 15 or example 16, wherein the receiver comprises an input interface circuit, wherein the input interface circuit comprises a common gate amplifier coupled between the transmission link and the supply voltage.

Example 18 is the communication system of example 17, wherein the input interface circuit further comprises a second transistor, wherein a first terminal of the second transistor is coupled to the supply voltage, wherein a second terminal of the second transistor is coupled to the common gate amplifier, and wherein a control terminal of the second transistor is capacitively coupled to the transmission link.

Example 19 is the communication system of example 18, wherein the first transistor and the second transistor exhibit different conductivity.

Example 20 is the communication system of example 18 or example 19, wherein a resistor is coupled between the control terminal and the second terminal of the second transistor.

Example 21 is the communication system of any of examples 18 to 20, wherein the input interface circuit further comprises a node coupled between the common gate amplifier and the second transistor, wherein the node is configured to provide a receive signal.

Example 22 is the communication system of example 21, wherein the receiver further comprises a processing circuit configured to determine a sequence of a fourth signal edge of a first type, a fifth signal edge of a second type, and a sixth signal edge of the first type in the receive signal. The receiver additionally comprises a demodulation circuit configured to determine third data based on a third time period between the fourth signal edge and the fifth signal edge, and to determine fourth data based on a fourth time period between the fifth signal edge and the sixth signal edge.

Example 23 is the communication system of any of examples 15 to 22, wherein the receiver is implemented on a first semiconductor die, and wherein the transmitter is implemented on a second semiconductor die.

Example 24 is the communication system of example 23, wherein a first supply voltage domain of the first semiconductor die is different from a second supply voltage domain of the second semiconductor die.

Example 25 is the communication system of example 24, wherein a first supply voltage used in the first voltage supply domain is higher than a second supply voltage used in the second voltage supply domain.

The examples described above in connection with FIGS. **22*a* to 22*e*** may be summarized as follows:

Example 1 is a current-mode logic, CML, to complementary metal-oxide-semiconductor, CMOS, logic conversion circuit. The CML to CMOS logic conversion circuit comprises a CML circuit configured to generate a differential pair of CML output signals based on a differential pair of CML input signals, wherein the CML circuit comprises a pair of transistors coupled in parallel between a ground node and a node providing a supply voltage, and wherein each of the pair of transistors is configured to receive one of the differential pair of CML input signals at its respective control terminal. Further, the CML to CMOS logic conversion circuit comprises an inverter circuit configured to generate a differential pair of CMOS signals based on the differential pair of CML output signals, and a bias circuit configured to adjust the supply voltage based on a comparison of a common mode signal component of the differential pair of CML output signals to a signal indicative of a threshold voltage of the inverter circuit.

Example 2 is the CML to CMOS logic conversion circuit of example 1, wherein the CML circuit further comprises a pair of output nodes coupled between the pair of transistors and the node providing the supply voltage, wherein the pair of output nodes is configured to provide the differential pair of CML output signals.

Example 3 is the CML to CMOS logic conversion circuit of example 1 or example 2, wherein the CML circuit further comprises a pair of resistors coupled between the pair of transistors and the node providing the supply voltage.

Example 4 is the CML to CMOS logic conversion circuit of any of examples 1 to 4, wherein the CML circuit further comprises a bias current source coupled between the pair of transistors and the ground node.

Example 5 is the CML to CMOS logic conversion circuit of example 4, wherein the bias current source is a transistor configured to control its conductivity based on a bias signal.

Example 6 is the CML to CMOS logic conversion circuit of any of examples 1 to 5, wherein the bias circuit comprises an operational amplifier configured to generate a control signal based on the common mode signal component and the signal indicative of the threshold voltage of the inverter circuit, and a transistor coupled between a supply voltage source and the node providing the supply voltage, wherein the transistor is configured to adjust its conductivity based on the control signal.

Example 7 is the CML to CMOS logic conversion circuit of example 6, wherein the bias circuit further comprises a loop circuit comprising an inverter and a resistor coupled in series, wherein a node of the loop circuit is coupled to an input of the operational amplifier for providing the signal indicative of the threshold voltage of the inverter circuit.

Example 8 is the CML to CMOS logic conversion circuit of example 7, wherein the bias circuit further comprises a capacitor coupled between ground and a signal line coupling the node of the loop circuit to the input of the operational amplifier.

Example 9 is the CML to CMOS logic conversion circuit of any of examples 6 to 8, further comprising a pair of resistors each configured to receive one of the differential pair of CML output signals, wherein the pair of resistors is coupled to an input of the operational amplifier for providing the common mode signal component of the differential pair of CML output signals.

Example 10 is the CML to CMOS logic conversion circuit of any of examples 6 to 9, wherein the bias circuit further comprises a capacitor coupled between ground and a signal line coupling the operational amplifier to the transistor.

Example 11 is the CML to CMOS logic conversion circuit of any of examples 1 to 10, wherein the inverter circuit comprises a first pair of inverters coupled in series and configured to generate one of the differential pair of CMOS signals based on one of the differential pair of CML output signals, and a second pair of inverters coupled in series and configured to generate the other of the differential pair of CMOS signals based on the other one of the differential pair of CML output signals.

Example 12 is a current-mode logic, CML, to complementary metal-oxide-semiconductor, CMOS, logic conversion circuit. The CML to CMOS logic conversion circuit comprises a CML circuit configured to generate a differential pair of CML output signals based on a differential pair of CML input signals, and an inverter circuit configured to generate a differential pair of CMOS signals based on the differential pair of CML output signals. Further, the CML to CMOS logic conversion circuit comprises a bias circuit configured to adjust a supply voltage for the inverter circuit based on a comparison of a common mode signal component of the differential pair of CML output signals to a signal indicative of a threshold voltage of the inverter circuit.

Example 13 is the CML to CMOS logic conversion circuit of claim 12, wherein the CML circuit comprises a pair of transistors coupled in parallel between a ground node and a node providing a constant supply voltage for the CML circuit, and wherein each of the pair of transistors is configured to receive one of the differential pair of CML input signals at its respective control terminal.

Example 14 is the CML to CMOS logic conversion circuit of example 13, wherein the CML circuit further comprises a pair of output nodes coupled between the pair of transistors and the node providing the constant supply voltage for the CML circuit, wherein the pair of output nodes is configured to provide the differential pair of CML output signals.

Example 15 is the CML to CMOS logic conversion circuit of example 13 or example 14, wherein the CML circuit further comprises a pair of resistors coupled between the pair of transistors and the node providing the constant supply voltage for the CML circuit.

Example 16 is the CML to CMOS logic conversion circuit of any of examples 11 to 15, wherein the CML circuit further comprises a bias current source coupled between the pair of transistors and the ground node.

Example 17 is the CML to CMOS logic conversion circuit of example 16, wherein the bias current source is a transistor configured to control its conductivity based on a bias signal.

Example 18 is the CML to CMOS logic conversion circuit of any of examples 12 to 17, wherein the bias circuit comprises an operational amplifier configured to generate a control signal based on the common mode signal component and the signal indicative of the threshold voltage of the inverter circuit, and a transistor coupled between a supply voltage source and the inverter circuit, wherein the transistor is configured to adjust its conductivity based on the control signal.

Example 19 is the CML to CMOS logic conversion circuit of example 18, wherein the bias circuit further comprises a loop circuit comprising an inverter and a resistor coupled in series, wherein a node of the loop circuit is coupled to an input of the operational amplifier for providing the signal indicative of the threshold voltage of the inverter circuit.

Example 20 is the CML to CMOS logic conversion circuit of example 19, wherein the inverter comprises a power supply input terminal configured to receive the supply voltage for the inverter circuit.

Example 21 is the CML to CMOS logic conversion circuit of example 19 or example 20, wherein the bias circuit further comprises a capacitor coupled between ground and a signal line coupling the node of the loop circuit to the input of the operational amplifier.

Example 22 is the CML to CMOS logic conversion circuit of any of examples 18 to 21, further comprising a pair of resistors each configured to receive one of the differential pair of CML output signals, wherein the pair of resistors is coupled to an input of the operational amplifier for providing the common mode signal component of the differential pair of CML output signals.

Example 23 is the CML to CMOS logic conversion circuit of any of examples 18 to 22, wherein the bias circuit further comprises a capacitor coupled between ground and a signal line coupling the operational amplifier to the transistor.

Example 24 is the CML to CMOS logic conversion circuit of any of examples 12 to 23, wherein the inverter circuit comprises a first pair of inverters coupled in series and configured to generate one of the differential pair of CMOS signals based on one of the differential pair of CML output signals, and a second pair of inverters coupled in series and configured to generate the other of the differential pair of CMOS signals based on the other one of the differential pair of CML output signals.

Example 25 is the CML to CMOS logic conversion circuit of example 24, wherein each of the first pair of inverters and the second pair of inverters comprises a respective power supply input terminal configured to receive the supply voltage for the inverter circuit.

Example 26 is a communication apparatus, comprising a current-mode logic, CML, to complementary metal-oxide-semiconductor, CMOS, logic conversion circuit according to any of examples 1 to 25, and a receiver circuit configured to generate the differential pair of CML input signals based on a differential pair of data signals received from a transmission link. The communication apparatus further comprises an apparatus for decoding the differential pair of CMOS signals. The apparatus for decoding the differential pair of CMOS signals comprises a processing circuit configured to determine a sequence of a first signal edge of a first type, a second signal edge of a second type, and a third signal edge of the first type in the differential pair of CMOS signals. Further, the apparatus for decoding the differential pair of CMOS signals comprises a demodulation circuit configured to determine first data based on a first time period between the first signal edge and the second signal edge, and to determine second data based on a second time period between the second signal edge and the third signal edge.

Example 27 is the communication system of example 26, wherein the first type is a rising edge and the second type is a falling edge, or wherein the second type is a rising edge and the first type is a falling edge.

Example 28 is the communication system of example 27 or example 28, wherein a sum of the first time period and the second time period is lower than $10^{-7}$ s.

Example 29 is the communication system of any of examples 27 to 28, wherein the processing circuit is a time-to-digital-converter.

The examples described above in connection with FIGS. 23*a* to 23*e* may be summarized as follows:

Example 1 is a digital-to-time converter. The digital-to-time converter comprises a plurality of interpolation cells configured to receive a first signal and a second signal as input, wherein at least one of the plurality of interpolation cells is configured to provide, based on a control word, at least one of the first signal and the second signal as cell output signal. Further, the digital-to-time converter comprises an output node coupled to the plurality of interpolation cells and configured to combine cell output signals of the plurality of interpolation cells to an output signal. The first signal and the second signal are based on the output signal.

Example 2 is the digital-to-time converter of example 1, further comprising a first inverter circuit configured to receive the output signal and to supply the inverted output signal as first signal to the plurality of interpolation cells, a delay circuit configured to delay the output signal, and a second inverter circuit configured to receive the delayed output signal and to supply the inverted delayed output signal as second signal to the plurality of interpolation cells.

Example 3 is the digital-to-time converter of example 1, further comprising a first NAND gate configured to generate the first signal based on the output signal and a reset signal, a delay circuit configured to delay the output signal, and a second NAND gate configured to generate the second signal based on the delayed output signal and the reset signal.

Example 4 is a digital-to-time converter. The digital-to-time converter comprises a delay circuit configured to iteratively delay an input signal for generating a plurality of delayed input signals, and a multiplexer coupled to the delay circuit and configured to output, based on a control word, one of the plurality of delayed input signals as output signal. The input signal is based on the output signal.

Example 5 is the digital-to-time converter of example 4, further comprising an inverter circuit configured to receive the output signal and to supply the inverted interpolation signal as input signal to the delay circuit.

Example 6 is a digital-to-time converter. The digital-to-time converter comprises a first plurality of interpolation cells configured to receive a first signal and a second signal as input, wherein at least one of the first plurality of interpolation cells is configured to provide, based on a control word, at least one of the first signal and the second signal as cell output signal. Further, the digital-to-time converter comprises a first node coupled to the first plurality of interpolation cells and configured to combine cell output signals of the first plurality of interpolation cells to a first interpolation signal. The digital-to-time converter additionally comprises a second plurality of interpolation cells configured to receive a third signal and a fourth signal as input, wherein at least one of the second plurality of interpolation cells is configured to provide, based on the control word, at least one of the third signal and the fourth signal as cell output signal. The digital-to-time converter comprises a second node coupled to the second plurality of interpolation cells and configured to combine cell output signals of the second plurality of interpolation cells to a second interpolation signal. The first signal and the second signal are based on the second interpolation signal, wherein the third signal and the fourth signal are based on the first interpolation signal.

Example 7 is the digital-to-time converter of example 6, further comprising a logic circuit configured to combine the first interpolation signal and the second interpolation signal to an output signal.

Example 8 is the digital-to-time converter of example 7, wherein the logic circuit is an XOR gate.

Example 9 is the digital-to-time converter of any of examples 6 to 8, further comprising a first inverter circuit configured to receive the second interpolation signal and to supply the inverted second interpolation signal as first signal to the first plurality of interpolation cells. The digital-to-time converter additionally comprises a first delay circuit configured to delay the second interpolation signal, and a second inverter circuit configured to receive the delayed second interpolation signal and to supply the inverted delayed second interpolation signal as second signal to the first plurality of interpolation cells.

Example 10 is the digital-to-time converter of example 9, further comprising a third inverter circuit configured to receive the first interpolation signal and to supply the inverted first interpolation signal as third signal to the second plurality of interpolation cells. The digital-to-time converter additionally comprises a second delay circuit configured to delay the first interpolation signal, and a fourth inverter circuit configured to receive the delayed first interpolation signal and to supply the inverted delayed first interpolation signal as fourth signal to the second plurality of interpolation cells.

Example 11 is the digital-to-time converter of any of examples 6 to 8, further comprising a first NAND gate configured to generate the first signal based on the second interpolation signal and a reset signal, a first delay circuit configured to delay the second interpolation signal, and a second NAND gate configured to generate the second signal based on the delayed second interpolation signal and the reset signal.

Example 12 is the digital-to-time converter of example 11, further comprising a third NAND gate configured to generate the third signal based on the first interpolation signal and the reset signal, a second delay circuit configured to delay the first interpolation signal, and a fourth NAND gate configured to generate the fourth signal based on the delayed first interpolation signal and the reset signal.

Example 13 is an apparatus for generating a data signal comprising a digital-to-time converter according to any of examples 1 to 12. The digital-to-time converter is configured to generate the data signal as the output signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The apparatus for generating the data signal further comprises an output interface circuit configured to output the data signal.

Example 14 is the apparatus of example 13, wherein the control word is based on the first data and the second data.

Example 15 is the apparatus of example 13 or example 14, wherein the first type is a rising edge and the second type is a falling edge, or wherein the second type is a rising edge and the first type is a falling edge.

Example 16 is the apparatus of any of examples 13 to 15, wherein a sum of the first time period and the fourth time period is lower than $10^{-7}$ s.

Example 17 is the apparatus of any of examples 13 to 16, further comprising a second digital-to-time converter configured to generate a second data signal, the second data signal being inverted with respect to the data signal.

Example 18 is the apparatus of any of examples 13 to 16, wherein the digital-to-time converter is further configured to generate a second data signal, the second data signal being inverted with respect to the data signal.

Example 19 is the apparatus of any of examples 13 to 18, wherein the first data is a first data symbol and the second data is a second data symbol to be transmitted according to a data communication protocol.

The examples described above in connection with FIGS. 24*a* and 24*b* may be summarized as follows:

Example 1 is a digital-to-time converter for generating a data signal according to a communication protocol, the communication protocol defining a plurality of possible time periods between directly succeeding signal edges of the data signal for encoding data, wherein the plurality of possible time periods are offset from each other by an offset time. The digital-to-time converter comprises an input circuit configured to receive an oscillation signal, and a signal generation circuit configured to generate the data signal based on the oscillation signal, wherein the signal generation circuit is capable of generating a signal edge in the data signal at a position that is timely offset by an integer multiple of the offset time from a signal edge of an oscillation cycle in the oscillation signal.

Example 2 is the digital-to-time converter of example 1, wherein the signal generation circuit is configured to generate the signal edge in the data signal based on a control word, wherein the digital-to-time converter further comprises a control circuit configured to generate the control word based on data to be transmitted according to the communication protocol, and wherein the control circuit is capable of generating control words causing the signal generation circuit to generate signal edges in the data signal at positions that are timely offset by integer multiples of the offset time from the signal edge of the oscillation cycle in the oscillation signal.

Example 3 is the digital-to-time converter of example 2, wherein the number of possible control words the control circuit is capable to generate is not a multiple of two.

Example 4 is the digital-to-time converter of example 2 or example 3, wherein the number of possible control words the control circuit is capable to generate is smaller than a number of the plurality of possible time periods.

Example 5 is the digital-to-time converter of any of examples 1 to 4, wherein a number of the plurality of possible time periods defined in the communication protocol is larger than a ratio of an oscillation period of the oscillation signal to the offset time.

Example 6 is the digital-to-time converter of any of examples 1 to 5, wherein the offset time is an integer fraction of an oscillation period of the oscillation signal.

Example 7 is the digital-to-timer convert of any of examples 1 to 6, wherein a maximum value of the integer multiple is equal to the ratio of an oscillation period of the oscillation signal to the offset time.

Example 8 is the digital-to-time converter of any of examples 1 to 7, wherein the signal generation circuit is configured to generate the data signal to comprises a sequence of a first signal edge of a first type, a second signal edge of a second type, and a third signal edge of the first type, wherein a first time period between the first signal edge and the second signal edge corresponds to first data to be transmitted according to the communication protocol, and wherein a second time period between the second signal edge and the third signal edge corresponds to second data to be transmitted according to the communication protocol.

Example 9 is the digital-to-time converter of example 8, wherein the first type is a rising edge and the second type is a falling edge, or wherein the second type is a rising edge and the first type is a falling edge.

Example 10 is the digital-to-time converter of example 8 or example 9, wherein a sum of the first time period and the second time period is lower than $10^{-7}$ s.

Example 11 is the digital-to-time converter of any of examples 1 to 10, wherein the digital-to-time converter is further configured to generate a second data signal, the second data signal being inverted with respect to the data signal.

The examples described above in connection with FIGS. 25*a* to 25*k* may be summarized as follows:

Example 1 is an apparatus for regulating a supply voltage supplied from a voltage source to an electronic device via a supply line. The apparatus for regulating the supply voltage comprises a node configured to couple to the supply line, and a modulation circuit coupled to the node, wherein the modulation circuit is configured to modulate the supply voltage based on information about data processed by the electronic device.

Example 2 is the apparatus of example 1, wherein the modulation circuit comprises a control circuit configured to generate a control signal based on the information about the data processed by the electronic device, and a switch circuit configured to selectively couple a charged capacitive element to the supply line based on the control signal.

Example 3 is the apparatus of example 2, wherein the control circuit is further configured to generate the control signal based on information about a dependency between the data processed by the electronic device and one of an expected variation of the supply voltage and an expected variation of the current consumption of the electronic device.

Example 4 is the apparatus of example 3, wherein the data processed by the electronic device comprises at least one data symbol, and wherein the information about the dependency between the data processed by the electronic device and one of the expected variation of the supply voltage and the variation of the expected current consumption of the electronic device comprises information about the expected current consumption of the electronic device while processing the data symbol, or information about the expected variation of the supply voltage while the electronic device processes the data symbol.

Example 5 is the apparatus of any of examples 2 to 4, wherein the charged capacitive element is charged to a voltage different than a nominal value of the supply voltage.

Example 6 is the apparatus of any of examples 2 to 5, wherein the capacitive element comprises a plurality of capacitors.

Example 7 is the apparatus of example 6, wherein a first one of the plurality of capacitors comprises a first capacitance, and wherein a second one of the plurality of capacitors comprises a second capacitance.

Example 8 is the apparatus of example 6 or example 7, wherein the switch circuit is configured to selectively couple a number of the plurality of capacitors to the supply line based on the control signal.

Example 9 is the apparatus of example 8, wherein the switch circuit is configured to selectively couple the number of the plurality of capacitors either in parallel or in series based on the control signal.

Example 10 is the apparatus of any of examples 2 to 9, wherein the switch circuit and the capacitive element are part of a digital-to-analog converter.

Example 11 is the apparatus of any of the preceding examples, wherein the voltage source is a low-dropout regulator or a DC-to-DC converter.

Example 12 is a communication apparatus. The communication apparatus comprises an apparatus for generating a data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. Further, the apparatus for generating the data signal comprises an interface circuit configured to output the data signal. The communication apparatus additionally comprises an apparatus for regulating a supply voltage supplied from a voltage source to the processing circuit via a supply line. The apparatus for regulating the supply voltage comprises a node configured to couple to the supply line, and a modulation circuit coupled to the node, wherein the modulation circuit is configured to modulate the supply voltage based on information about the first data and the second data.

Example 13 is the communication apparatus of example 12, wherein the modulation circuit comprises a control circuit configured to generate a control signal based on the information about the first data and the second data, and a switch circuit configured to selectively couple a charged capacitive element to the supply line based on the control signal.

Example 14 is the communication apparatus of example 13, wherein the control circuit is further configured to generate the control signal based on information about a dependency between the first data and one of an expected variation of the supply voltage and an expected variation of the current consumption of the processing circuit.

Example 15 is the communication apparatus of example 14, wherein the first data is a first data symbol and the second data is a second data symbol to be transmitted according to a communication protocol, and wherein the information about the dependency between the first data and one of the expected variation of the supply voltage and the expected variation of the current consumption of the processing circuit comprises information about the expected variation of the current consumption of the processing circuit while the processing circuit processes the first data symbol, or information about the expected variation of the supply voltage while the processing circuit processes the first data symbol.

Example 16 is the communication apparatus of example 14 or example 15, wherein the information about the dependency between the first data and one of the expected variation of the supply voltage and the expected variation of the current consumption of the processing circuit is based on a factory calibration.

Example 17 is the communication apparatus of any of examples 14 to 16, wherein the control circuit is configured to update the information about the dependency between the first data and one of the expected variation of the supply voltage and the expected variation of the current consumption of the processing circuit based on calibration information received by the interface circuit from a recipient of the data signal.

Example 18 is the communication apparatus of example 17, wherein the calibration information is based on a measured jitter in the data signal.

Example 19 is the communication apparatus of any of examples 13 to 18, wherein the charged capacitive element is charged to a voltage different than a nominal value of the supply voltage.

Example 20 is the communication apparatus of any of examples 13 to 19, wherein the capacitive element comprises a plurality of capacitors.

Example 21 is the communication apparatus of example 20, wherein a first one of the plurality of capacitors comprises a first capacitance, and wherein a second one of the plurality of capacitors comprises a second capacitance.

Example 22. is the communication apparatus of example 20 or example 21, wherein the switch circuit is configured to selectively couple a number of the plurality of capacitors to the supply line based on the control signal.

Example 23 is the communication apparatus of example 22, wherein the switch circuit is configured to selectively couple the number of the plurality of capacitors either in parallel or in series based on the control signal.

Example 24 is the communication apparatus of any of examples 13 to 23, wherein the switch circuit and the capacitive element are part of a digital-to-analog converter.

Example 25 is the communication apparatus of any of examples 12 to 24, wherein the voltage source is a low-dropout regulator or a DC-to-DC converter.

Example 26 is the communication apparatus of any of examples 12 to 25, wherein the processing circuit is a digital-to-time converter.

Example 27 is the communication apparatus of any of example 12 to 26, wherein the modulation circuit is configured to modulate the supply voltage based on information about third data to be transmitted, wherein the third data precede the first data.

Example 28 is the communication apparatus of any of example 12 to 27, wherein the first type is a rising edge and the second type is a falling edge, or wherein the second type is a rising edge and the first type is a falling edge.

Example 29 is the communication apparatus of any of example 12 to 28, wherein a sum of the first time period and the second time period is lower than $10^{-7}$ s.

Example 30 is the communication apparatus of any of example 12 to 29, wherein the processing circuit is further configured to generate a second data signal, the second data signal being inverted with respect to the data signal.

Example 31 is a communication apparatus. The communication apparatus comprises an apparatus for decoding a data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine first data based on a first time period between the first signal edge and the second signal edge; and second data based on a second time period between the second signal edge and the third signal edge. The communication apparatus additionally comprises an apparatus for regulating a supply voltage supplied from a voltage source to the processing circuit via a supply line. The apparatus for regulating the supply voltage comprises a node configured to couple to the supply line, and a modulation circuit coupled to the node, wherein the modulation circuit is configured to modulate the supply voltage in response to the determination of the second signal edge by the processing circuit.

Example 32 is the communication apparatus of example 31, wherein the modulation circuit is further configured to modulate the supply voltage based on the information about the first data.

Example 33 is the communication apparatus of example 31, wherein the modulation circuit is further configured to modulate the supply voltage independent of the information about the first data.

Example 34 is the communication apparatus of any of examples 31 to 33, wherein the modulation circuit comprises a control circuit configured to generate a control signal in response to the determination of the second signal edge by the processing circuit, and a switch circuit configured to selectively couple a charged capacitive element to the supply line based on the control signal.

Example 35 is the communication apparatus of example 34, wherein the control circuit is further configured to generate the control signal independent of the information about the first data.

Example 36 is the communication apparatus of example 34, wherein the control circuit is further configured to generate the control signal based on the information about the first data.

Example 37 is the communication apparatus of example 36, wherein the control circuit is further configured to generate the control signal based on information about a dependency between the first data and one of an expected variation of the supply voltage and an expected variation of the current consumption of the processing circuit.

Example 38 is the communication apparatus of example 37, wherein the first data is a first data symbol and the second data is a second data symbol transmitted according to a communication protocol, and wherein the information about the dependency between the first data and one of the expected variation of the supply voltage and the expected variation of the current consumption of the processing circuit comprises information about the expected current consumption of the processing circuit while the processing circuit processes the first data symbol, or information about the expected variation of the supply voltage while the processing circuit processes the first data symbol.

Example 39 is the communication apparatus of example 37 or example 38, wherein the information about the dependency between the first data and one of the expected variation of the supply voltage and the expected variation of the current consumption of the processing circuit is based on a factory calibration and stored within a memory.

Example 40 is the communication apparatus of any of examples 37 to 39, wherein the control circuit is configured to update the information about the dependency between the first data and one of the expected variation of the supply voltage and the expected variation of the current consumption of the processing circuit based on calibration information derived from the data signal by the apparatus for decoding the data signal.

Example 41 is the communication apparatus of example 40, wherein the calibration information is based on a measured jitter in the data signal.

Example 42 is the communication apparatus of any of examples 34 to 41, wherein the charged capacitive element is charged to a voltage different than a nominal value of the supply voltage.

Example 43 is the communication apparatus of any of examples 34 to 42, wherein the capacitive element comprises a plurality of capacitors.

Example 44 is the communication apparatus of example 43, wherein a first one of the plurality of capacitors comprises a first capacitance, and wherein a second one of the plurality of capacitors comprises a second capacitance.

Example 45 is the communication apparatus of example 43 or example 44, wherein the switch circuit is configured to selectively couple a number of the plurality of capacitors to the supply line based on the control signal.

Example 46 is the communication apparatus of example 45, wherein the switch circuit is configured to selectively couple the number of the plurality of capacitors either in parallel or in series based on the control signal.

Example 47 is the communication apparatus of any of examples 34 to 46, wherein the switch circuit and the capacitive element are part of a digital-to-analog converter.

Example 48 is the communication apparatus of any of examples 31 to 47, wherein the voltage source is a low-dropout regulator or a DC-to-DC converter.

Example 49 is the communication apparatus of any of examples 31 to 48, wherein the processing circuit is a time-to-digital-converter.

Example 50 is the communication apparatus of any of examples 31 to 49, wherein the modulation circuit is further configured to modulate the supply voltage based on information about third data in the data signal, wherein the third data precede the first data.

Example 51 is the communication apparatus of any of examples 31 to 50, wherein the first type is a rising edge and the second type is a falling edge, or wherein the second type is a rising edge and the first type is a falling edge.

Example 52 is the communication apparatus of any of examples 31 to 51, wherein a sum of the first time period and the second time period is lower than $10^{-7}$ s.

Example 53 is the communication apparatus of any of examples 31 to 52, wherein the processing circuit is further configured to receive a second data signal, the second data signal being inverted with respect to the data signal, and determine the first signal edge, the second signal edge, and the third signal edge further based on the second data signal.

Example 54 is a method for regulating a supply voltage supplied from a voltage source to an electronic device via a supply line, the method comprising modulating the supply voltage based on information about data processed by the electronic device.

Example 55 is the method of example 54, wherein modulating the supply voltage comprises generating a control signal based on the information about the data processed by the electronic device, and selectively coupling, using a switch circuit, a charged capacitive element to the supply line based on the control signal.

Example 56 is the method of example 55, wherein generating the control signal is further based on information about a dependency between the data processed by the electronic device and one of an expected variation of the supply voltage and an expected variation of the current consumption of the electronic device.

Example 57 is the method of example 56, wherein the data processed by the electronic device comprises at least one data symbol, and wherein the information about the dependency between the data processed by the electronic device and one of the expected variation of the supply voltage and the variation of the expected current consumption of the electronic device comprises information about the expected current consumption of the electronic device while processing the data symbol, or information about the expected variation of the supply voltage while the electronic device processes the data symbol.

Example 58 is a method for communication. The method comprises generating, using a processing circuit, a data signal. The data signal comprises a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. Further, the method comprises modulating a supply voltage supplied from a voltage source to the processing circuit via a supply line based on information about the first data and the second data.

Example 59 is the method of example 58, wherein modulating the supply voltage comprises generating a control signal based on the information about the first data and the second data, and selectively coupling, using a switch circuit, a charged capacitive element to the supply line based on the control signal.

Example 60 is the method of example 59, wherein generating the control signal is further based on information about a dependency between the first data and one of an expected variation of the supply voltage and an expected variation of the current consumption of the processing circuit.

Example 61 is the method of example 60, wherein the first data is a first data symbol and the second data is a second data symbol to be transmitted according to a data communication protocol, and wherein the information about the dependency between the first data and one of the expected variation of the supply voltage and the expected variation of the current consumption of the processing circuit comprises information about the expected variation of the current consumption of the processing circuit while processing the first data symbol, or information about the expected variation of the supply voltage while the processing circuit processes the first data symbol.

Example 62 is the method of example 60 or example 61, wherein the information about the dependency between the first data and one of the expected variation of the supply voltage and the expected variation of the current consumption of the processing circuit is based on a factory calibration.

Example 63 is the method of any of examples 61 to 62, wherein the method further comprises updating the information about the dependency between the first data and one of the expected variation of the supply voltage and the expected variation of the current consumption of the processing circuit based on calibration information received from a recipient of the data signal.

Example 64 is the method of any of example 58 to 63, wherein the first type is a rising edge and the second type is a falling edge, or wherein the second type is a rising edge and the first type is a falling edge.

Example 65 is the method of any of example 58 to 64 wherein a sum of the first time period and the second time period is lower than $10^{-7}$ s.

Example 66 is the method of any of example 58 to 65, further comprising generating a second data signal, the second data signal being inverted with respect to the data signal.

Example 67 is the method of any of example 58 to 66, wherein modulating the supply voltage is further based on information about third data to be transmitted, wherein the third data precede the first data.

Example 68 is a method for communication. The method comprises determining, using a processing circuit, a sequence of a first signal edge of a first type, a second signal edge of a second type, and a third signal edge of the first type in a data signal. Further, the method comprises determining first data based on a first time period between the first signal edge and the second signal edge, and second data based on a second time period between the second signal edge and the third signal edge. The method additionally comprises modulating a supply voltage in response to the determination of the second signal edge by the processing circuit, wherein the supply voltage is supplied from a voltage source to the processing circuit via a supply line.

Example 69 is the method of example 68, wherein modulating the supply voltage is further based on the information about the first data.

Example 70 is the method of example 68, wherein modulating the supply voltage is independent of the information about the first data.

Example 71 is the method of any of examples 68 to 70, wherein modulating the supply voltage comprises generating a control signal based on the information about the first data and the second data, and selectively coupling, using a switch circuit, a charged capacitive element to the supply line based on the control signal.

Example 72 is the method of example 71, wherein generating the control signal is independent of the information about the first data.

Example 73 is the method of example 71, wherein generating the control signal is further based on the information about the first data.

Example 74 is the method of example 73, wherein generating the control signal is further based on information about a dependency between the first data and one of an expected variation of the supply voltage and an expected variation of the current consumption of the processing circuit.

Example 75 is the method of example 74, wherein the first data is a first data symbol and the second data is a second data symbol transmitted according to a data communication protocol, and wherein the information about the dependency between the first data and one of the expected variation of the supply voltage and the expected variation of the current consumption of the processing circuit comprises information about the expected current consumption of the processing circuit while processing the first data symbol, or information about the expected variation of the supply voltage while the processing circuit processes first data symbol.

Example 76 is the method of example 74 or example 75, wherein the information about the dependency between the first data and one of the expected variation of the supply voltage and the expected variation of the current consumption of the processing circuit is based on a factory calibration.

Example 77 is the method of any of examples 74 to 76, further comprising updating the information about the dependency between the first data and one of the expected variation of the supply voltage and the expected variation of the current consumption of the processing circuit based on calibration information derived from the data signal.

Example 78 is the method of any of examples 68 to 77, further comprising modulating the supply voltage based on information about third data in the data signal, wherein the third data precede the first data.

Example 79 is the method of any of examples 68 to 78, wherein the first type is a rising edge and the second type is a falling edge, or wherein the second type is a rising edge and the first type is a falling edge.

Example 80 is the method of any of examples 68 to 79, wherein a sum of the first time period and the second time period is lower than $10^{-7}$ s.

Example 81 is the method of any of examples 68 to 80, further comprising receiving a second data signal, the second data signal being inverted with respect to the data signal, and determining the first signal edge, the second signal edge, and the third signal edge further based on the second data signal.

The examples described above in connection with FIGS. 26*a* to 26*c* may be summarized as follows:

Example 1 is a protection circuit against electrostatic discharge. The protection circuit comprises a first input for a first transmission line of a differential transmission link and a second input for a second transmission line of the differential transmission link. Further, the protection circuit comprises a first output for the first transmission line and a second output for the second transmission line. The protection circuit additionally comprises a first pair of diodes coupled between the first input and the first output, a second pair of diodes coupled between the second input and the second output. The protection circuit comprises a first resistive element coupled between the first pair of diodes and the first output, and a second resistive element coupled between the second pair of diodes and the second output, wherein the first resistive element and the second resistive element add attenuation to the first transmission line and the second transmission line.

Example 2 is the protection circuit of example 1, wherein the first resistive element and the second resistive element each add attenuation of at least 2 dB to the first transmission line and the second transmission line.

Example 3 is the protection circuit of example 1 or example 2, wherein a resistivity of each of the first resistive element and the second resistive element is higher than 5Ω or higher than 10Ω.

Example 4 is the protection circuit of any of examples 1 to 3, wherein a resistivity of each of the first resistive element and the second resistive element is lower than 50Ω.

Example 5 is the protection circuit of any of examples 1 to 4, wherein each diode of the first pair of diodes and the second pair of diodes exhibits a capacitance of less than 250 fF.

Example 6 is the protection circuit of any of examples 1 to 5, wherein the first pair of diodes comprises a first diode coupled between the first input and ground, and a second diode coupled between the first input and a supply voltage. Further, the second pair of diodes comprises a third diode coupled between the second input and ground, and a fourth diode coupled between the second input and the supply voltage.

Example 7 is the protection circuit of any of examples 1 to 6, further comprising a third pair of diodes coupled between the first resistive element and the first output, and a fourth pair of diodes coupled between the second resistive element and the second output.

Example 8 is the protection circuit of example 7, wherein each diode of the third pair of diodes and the fourth pair of diodes exhibits a capacitance of less than 100 fF.

Example 9 is the protection circuit of example 7 or example 8, wherein the third pair of diodes comprises a fifth diode coupled between the first output and ground, and a sixth diode coupled between the first output and the supply voltage. Further, the fourth pair of diodes comprises a seventh diode coupled between the second output and ground, and an eighth diode coupled between the second output and the supply voltage.

Example 10 is the protection circuit of any of examples 1 to 9, wherein the first resistive element exhibits a first inductance and the second resistive element exhibits a second inductance.

Example 11 is the protection circuit of example 10, wherein each of the first inductance and the second inductance is less than 0.25 nH.

Example 12 is a receiver for a differential data signal. The receiver comprises an interface circuit configured to couple to a first transmission line and a second transmission line of a differential transmission link carrying the differential data signal. Further, the receiver comprises an amplifier circuit configured to generate an output signal based on a difference between signal components of the differential data signal on the first transmission line and the second transmission line. The receiver additionally comprises a protection circuit according to any of examples 1 to 11 coupled between the interface circuit and the amplifier circuit.

Example 12 is an apparatus for receiving a differential data signal. The apparatus comprises an interface circuit configured to couple to a first transmission line and a second transmission line of a differential transmission link carrying the differential data signal. Further, the apparatus comprises a processing circuit configured to determine a sequence of a first signal edge of a first type, a second signal edge of a second type, and a third signal edge of the first type in the differential data signal. The apparatus additionally comprises a demodulation circuit configured to determine first data based on a first time period between the first signal edge and the second signal edge, and to determine second data based on a second time period between the second signal edge and the third signal edge. The apparatus comprises a protection circuit according to any of examples 1 to 11 coupled between the interface circuit and the processing circuit.

Example 13 is the apparatus of example 12, wherein a sum of the first time period and the second time period is lower than $10^{-7}$ s.

Example 14 is the apparatus of example 12 or example 13, wherein the first type is a rising edge and the second type is a falling edge, or wherein the second type is a rising edge and the first type is a falling edge.

Example 15 is the apparatus of any of examples 12 to 14, wherein the processing circuit is a time-to-digital-converter.

The examples described above in connection with FIGS. 27*a* to 27*f* may be summarized as follows:

Example 1 is an apparatus for generating an amplified high frequency transmit signal, wherein the apparatus comprises:

- a power amplifier circuit configured to provide an amplified high frequency transmit signal based on a baseband transmit signal;
- a time encoded transmitter circuit configured to generate a baseband receive data signal, the baseband receive data signal comprising a sequence of a first signal edge of a first type, a second signal edge of a second type, and a third signal edge of the first type, the first signal edge and the second signal edge being separated by a first time period corresponding to first baseband receive data to be transmitted to a time encoded receiver circuit, and the second signal edge and the third signal edge being separated by a second time period corresponding to second baseband receive data to be transmitted to the time encoded receiver circuit,
- wherein the first baseband receive data and the second baseband receive data contain feedback information.

Example 2 is the apparatus according to example 1, wherein the feedback information is information on at least one of a feedback receive signal caused by the amplified high frequency transmit signal, a content of a register of the apparatus, an output of a power detector, and an output of a temperature sensor.

Example 3 is the apparatus according to example 2, further comprising a multiplexer configured to provide a payload receive signal or the feedback receive signal as multiplexer output signal, wherein the time encoded transmitter circuit is configured to generate the baseband receive data signal based on the multiplexer output signal.

Example 4 is the apparatus according to example 2 or 3, wherein the feedback receive signal is an analog signal.

Example 5 is the apparatus according to one of the examples 2-4, further comprising a down-conversion circuit configured to generate a baseband feedback receive signal based on the feedback receive signal, wherein the time encoded transmitter circuit is configured to generate the baseband receive data signal based on the baseband feedback receive signal.

Example 6 is the apparatus according to one of the examples 2-5, further comprising a coupler module coupled to an output of the power amplifier circuit and configured to provide the feedback receive signal caused by the amplified high frequency transmit signal or caused by an antenna transmit signal provided based on the amplified high frequency transmit signal.

Example 7 is the apparatus according to one of the previous examples, wherein the baseband receive data signal is a digital signal.

Example 8 is the apparatus according to one of the previous examples, wherein the amplified high frequency transmit signal contains payload data, wherein the time encoded transmitter circuit is configured to send the baseband receive data signal to the time encoded receiver circuit while the amplified high frequency transmit signal with the payload data is wirelessly transmitted to an external receiver.

Example 9 is the apparatus according to one of the previous examples, further comprising a time encoded receiver circuit configured to determine a sequence of a first signal edge of a first type, a second signal edge of a second type, and a third signal edge of the first type in a received baseband transmit data signal, wherein the time encoded receiver circuit is configured to determine first baseband transmit data based on a first time period between the first signal edge and the second signal edge and to determine second baseband transmit data based on a second time period between the second signal edge and the third signal edge, wherein the time encoded receiver circuit is configured to provide the baseband transmit signal based on the first baseband transmit data and the second baseband transmit data.

Example 10 is the apparatus according to one of the previous examples, further comprising a feeding network configured to provide a plurality of antenna transmit signals for a plurality of antennas based on the amplified high frequency transmit signal.

Example 11 is the apparatus according to one of the previous examples, further comprising an up-conversion circuit configured to generate a high frequency transmit signal based on the baseband transmit signal, wherein the power amplifier circuit is configured to amplify the high frequency transmit signal to generate the amplified high frequency transmit signal.

Example 12 is a wireless transceiver device comprising an apparatus according to one of the previous examples.

Example 13 is the wireless transceiver device according to example 12, further comprising a time encoded receiver circuit configured to receive the baseband receive data signal and determine a sequence of a first signal edge of a first type, a second signal edge of a second type, and a third signal edge of the first type in the baseband receive data signal, wherein the time encoded receiver circuit is configured to determine first baseband receive data based on a first time period between the first signal edge and the second signal edge and to determine second baseband receive data based on a second time period between the second signal edge and the third signal edge.

Example 14 is the wireless transceiver device according to example 12 or 13, further comprising a pre-distortion control module configured to control a pre-distortion of the baseband transmit signal based on the information on the at least one feedback receive signal caused by the amplified high frequency transmit signal.

Example 15 is the wireless transceiver device according to example 14, wherein the pre-distortion control module is configured to control the pre-distortion in a closed loop via a real time loopback form the power amplifier circuit and over the time encoded transmitter circuit.

Example 16 is the wireless transceiver device according to one of the examples 12-15, further comprising an antenna array configured to transmit antenna transmit signals, wherein the antenna transmit signals are based on the amplified high frequency transmit signal.

Example 17 is a mobile device comprising a wireless transceiver device according to one of the examples 12-16.

Example 18 is a baseband processor comprising:

a time encoded receiver circuit configured to determine a sequence of a first signal edge of a first type, a second signal edge of a second type, and a third signal edge of the first type in a received baseband receive data signal, wherein the time encoded receiver circuit is configured to determine first baseband receive data based on a first time period between the first signal edge and the second signal edge and to determine second baseband receive data based on a second time period between the second signal edge and the third signal edge; and a baseband processing circuit configured to determine a pre-distortion setting for a baseband transmit signal based on the first baseband receive data and the second baseband receive data.

Example 19 is the baseband processor according to example 18, wherein the received baseband receive data signal is based on a feedback receive signal caused by an amplified high frequency transmit signal, wherein the first baseband receive data and the second baseband receive data contain information on the feedback receive signal.

Example 20 is the baseband processor according to example 18 or 19, further comprising a time encoded transmitter circuit configured to generate a baseband transmit data signal, the baseband transmit data signal comprising a sequence of a first signal edge of a first type, a second signal edge of a second type, and a third signal edge of the first type, the first signal edge and the second signal edge being separated by a first time period corresponding to first baseband transmit data, and the second signal edge and the third signal edge being separated by a second time period corresponding to second baseband transmit data.

Example 21 is a wireless transceiver device comprising a baseband processor according to one of the examples 18-20.

Example 22 is a mobile device comprising a wireless transceiver device according to example 21.

Example 23 is a method for generating an amplified high frequency transmit signal, wherein the method comprises:

providing an amplified high frequency transmit signal based on a baseband transmit signal; and generating a baseband receive data signal by a time encoded transmitter circuit, the baseband receive data signal comprising a sequence of a first signal edge of a first type, a second signal edge of a second type, and a third signal edge of the first type, the first signal edge and the second signal edge being separated by a first time period corresponding to first baseband receive data to be transmitted to a time encoded receiver circuit, and the second signal edge and the third signal edge being separated by a second time period corresponding to second baseband receive data to be transmitted to the time encoded receiver circuit, wherein the first baseband receive data and the second baseband receive data contain feedback information.

Example 24 is a method for determining a pre-distortion setting, comprising:

determining a sequence of a first signal edge of a first type, a second signal edge of a second type, and a third signal edge of the first type in a received baseband receive data signal by a time encoded receiver circuit;

determining first baseband receive data based on a first time period between the first signal edge and the second signal edge;

determining second baseband receive data based on a second time period between the second signal edge and the third signal edge; and determining a pre-distortion setting for a baseband transmit signal based on the first baseband receive data and the second baseband receive data.

Example 25 is a machine readable storage medium including program code, when executed, to cause a machine to perform the method of example 23 or 24.

Example 26 is a computer program having a program code for performing the method of example 23 or 24, when the computer program is executed on a computer or processor.

The examples described above in connection with FIGS. **28*a* to 28*d*** may be summarized as follows:

Example 1 is a transmitter comprising a synthesizer circuit. The synthesizer circuit comprises a controlled oscillator configured to generate a clock signal in response to a steering signal, and closed loop control circuitry configured to control the steering signal based on the clock signal. The synthesizer circuit is configured to operate in a first mode in which the closed loop control circuitry is inactive, or in a second mode in which the closed loop control circuitry is active. The transmitter further comprises an apparatus for generating a data signal using the clock signal. The synthesizer circuit operates in the first mode during a first time period and in the second mode during a second time period.

Example 2 is the transmitter of example 1, wherein the controlled oscillator is a digitally controlled oscillator or a voltage controlled oscillator.

Example 3 is the transmitter of example 1 or example 2, further comprising a control circuit configured to switch the synthesizer circuit from the first mode to the second mode if a predetermined condition is fulfilled.

Example 4 is the transmitter of example 3, wherein the predetermined condition is at least one of a temperature change and a lapse of a predetermined time period.

Example 5 is the transmitter of any examples 1 to 4, wherein the first time period is longer than the second time period.

Example 6 is the transmitter of any of the preceding examples, wherein the first time period is at least twice as long as the second time period.

Example 7 is the transmitter of any examples 1 to 6, wherein a frequency of the clock signal is higher than 8 GHz.

Example 8 is the transmitter of any examples 1 to 7, wherein the apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The apparatus for generating the data signal further comprises an output interface circuit configured to output the data signal.

Example 9 is the apparatus of example 8, wherein a sum of the first time period and the second time period is lower than $10^{-7}$ s.

Example 10 is the apparatus of example 8 or example 9, wherein the first type is a rising edge and the second type is a falling edge, or wherein the second type is a rising edge and the first type is a falling edge.

Example 11 is the apparatus of any of examples 8 to 10, wherein the processing circuit is further configured to generate a second data signal, the second data signal being inverted with respect to the data signal.

Example 12 is the apparatus of any of examples 8 to 11, wherein the processing circuit is a digital-to-time converter.

Example 13 is a transmitter comprising a synthesizer circuit. The synthesizer circuit comprises a controlled oscillator configured to generate a clock signal in response to a steering signal, and closed loop control circuitry configured to control the steering signal based on the clock signal. During a first time period after the synthesizer circuit is activated, the synthesizer circuit operates in a first mode in which the closed loop control circuitry is not locked. The synthesizer circuit operates after the first time period in a second mode in which the closed loop control circuitry is locked. The transmitter further comprises an apparatus for generating a data signal using the clock signal in the first time period and in the second time period.

Example 14 is the transmitter of example 13, further comprising a memory for storing the steering signal, wherein the synthesizer circuit is configured to use the stored steering signal upon activation.

Example 15 is the transmitter of example 13 or 14, wherein the apparatus for generating the data signal is configured to use a first modulation scheme during the first time period, and a second modulation scheme during the second time period. The first modulation scheme is more robust than the second modulation scheme.

Example 16 is the transmitter of any of examples 13 to 15, wherein a frequency of the clock signal is higher than 8 GHz.

Example 17 is the transmitter of any of examples 13 to 16, wherein the apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The apparatus for generating the data signal further comprises an output interface circuit configured to output the data signal.

Example 18 is the apparatus of example 17, wherein a sum of the first time period and the second time period is lower than $10^{-7}$ s.

Example 19 is the apparatus of example 17 or example 18, wherein the first type is a rising edge and the second type is a falling edge, or wherein the second type is a rising edge and the first type is a falling edge.

Example 20 is the apparatus of any of examples 17 to 19, wherein the processing circuit is further configured to generate a second data signal, the second data signal being inverted with respect to the data signal.

Example 21 is the apparatus of any of examples 17 to 20, wherein the processing circuit is a digital-to-time converter.

The examples described above in connection with FIGS. 29*a* to 29*i* may be summarized as follows:

Example 1 is an apparatus for generating a data signal, the apparatus comprising:

a processing circuit configured to generate the data signal, the data signal comprising a sequence of a first signal edge of a first type, a second signal edge of a second type, and a third signal edge of the first type, the first signal edge and the second signal edge being separated by a first time period corresponding to a first non-payload data symbol to be transmitted according to a communication protocol, and the second signal edge and the third signal edge being separated by a second time period corresponding to a second non-payload data symbol to be transmitted according to the communication protocol, wherein at least one of the first time period and the second time period is longer than the time period of any payload data symbol of the communication protocol, wherein one of the first non-payload data symbol and the second non-payload data symbol is a variable buffer symbol and the other one of the first non-payload data symbol and the second non-payload data symbol is a clock distribution symbol; and an output interface circuit configured to output the data signal.

Example 2 is the apparatus according to example 1, wherein the time period of the variable buffer symbol is longer than the time period of any payload data symbol of the communication protocol.

Example 3 is the apparatus according to example 1 or 2, wherein the time period of the variable buffer symbol is at least equal to a delimiter time period of the communication protocol.

Example 4 is the apparatus according to example 3, wherein the time period of the variable buffer symbol is at most equal to the delimiter time period plus a maximal time length of a basic transmission unit of the communication protocol.

Example 5 is the apparatus according to example 3 or 4, wherein the time period of the variable buffer symbol is at most equal to the delimiter time period plus a difference between a maximal time length and a minimal time length of data symbols to be transmitted between the clock distribution symbol and a next clock distribution symbol.

Example 6 is the apparatus according to one of the previous examples, wherein the processing circuit is configured to generate the data signal comprising a sequence of a fourth signal edge, a fifth signal edge and a sixth signal edge, wherein the fourth signal edge and the fifth signal edge being separated by a third time period corresponding to a third non-payload data symbol to be transmitted according to the communication protocol, and the fifth signal edge and the sixth signal edge being separated by a fourth time period corresponding to a fourth non-payload data symbol to be transmitted according to the communication protocol, wherein the third time period or the fourth time period is longer than the time period of any payload data symbol of the communication protocol, wherein one of the third non-payload data symbol and the fourth non-payload data symbol is a second variable buffer symbol and the other one of the third non-payload data symbol and the fourth non-payload data symbol is a second clock distribution symbol.

Example 7 is the apparatus according to example 6, wherein the time period of the variable buffer symbol differs from the time period of the second variable buffer symbol.

Example 8 is the apparatus according to example 6 or 7, wherein the time period of the clock distribution symbol is equal to the time period of the second clock distribution symbol.

Example 9 is the apparatus according to one of the previous examples, wherein the processing circuit is configured to generate the data signal comprising repeatedly pairs of variable buffer symbols and clock distribution symbols and data symbols in between the pairs of variable buffer symbols and clock distribution symbols.

Example 10 is the apparatus according to example 9, wherein the processing circuit is configured to generate the clock distribution symbols within the data signal based on a reference clock signal or a reference oscillator signal.

Example 11 is the apparatus according to example 9 or 10, wherein the processing circuit is configured to generate the time periods of the variable buffer symbols wherein the rising edges or the falling edges of the clock distribution symbols or the variable buffer symbols correspond to edges of a reference clock signal or a reference oscillator signal.

Example 12 is the apparatus according to example 9, 10 or 11, wherein the clock distribution symbols occur at a frequency of at least 1 GHz within the data signal.

Example 13 is the apparatus according to one of the previous examples, wherein the first non-payload data symbol is the variable buffer symbol and the second non-payload data symbol is the clock distribution symbol.

Example 14 is an apparatus for decoding a data signal, the apparatus comprising:

a processing circuit configured to determine a sequence of a first signal edge of a first type, a second signal edge of a second type, and a third signal edge of the first type in the data signal; and a demodulation circuit configured to detect a first non-payload data symbol based on a first time period between the first signal edge and the second signal edge, and configured to detect a second non-payload data symbol based on a second time period between the second signal edge and the third signal edge, wherein at least one of the first time period and the second time period is longer than the time period of any payload data symbol of the communication protocol, wherein one of the first non-payload data symbol and the second non-payload data symbol is a variable buffer symbol and the other one of the first non-payload data symbol and the second non-payload data symbol is a clock distribution symbol.

Example 15 is the apparatus according to example 14, wherein the time period of the variable buffer symbol is longer than the time period of any payload data symbol of the communication protocol.

Example 16 is the apparatus according to example 14 or 15, wherein the time period of the variable buffer symbol is at least equal to a delimiter time period of the communication protocol.

Example 17 is the apparatus according to example 16, wherein the time period of the variable buffer symbol is at most equal to the delimiter time period plus a time length of a basic transmission unit of the communication protocol.

Example 18 is the apparatus according to example 16 or 17, wherein the time period of the variable buffer symbol is at most equal to the delimiter time period plus a difference between a maximal time length and a minimal time length of data symbols to be transmitted between the clock distribution symbol and a next clock distribution symbol.

Example 19 is the apparatus according to one of the examples 14-18, wherein the processing circuit is configured to determine a sequence of a fourth signal edge, a fifth signal edge and a sixth signal edge in the data signal, wherein the demodulation circuit is configured to detect a third non-payload data symbol based on a third time period between the fourth signal edge and the fifth signal edge, and configured to detect a fourth non-payload data symbol based on a fourth time period between the fifth signal edge and the sixth signal edge, wherein the third time period or the fourth time period is longer than the time period of any payload data symbol of the communication protocol, wherein one of the third non-payload data symbol and the fourth non-payload data symbol is a second variable buffer symbol and the other one of the third non-payload data symbol and the fourth non-payload data symbol is a second clock distribution symbol.

Example 20 is the apparatus according to example 19, wherein the time period of the variable buffer symbol differs from the time period of the second variable buffer symbol.

Example 21 is the apparatus according to example 19 or 20, wherein the time period of the clock distribution symbol is equal to the time period of the second clock distribution symbol.

Example 22 is the apparatus according to one of the examples 14-21, wherein the data signal comprises repeatedly pairs of variable buffer symbols and clock distribution symbols and data symbols in between the pairs of variable buffer symbols and clock distribution symbols.

Example 23 is the apparatus according to example 22, wherein the demodulation circuit is configured to generate a reference clock signal based on the clock distribution symbols within the data signal.

Example 24 is the apparatus according to example 22 or 23, wherein the rising edges or the falling edges of the clock distribution symbols or the variable buffer symbols correspond to edges of a reference clock signal.

Example 25 is the apparatus according to example 23 or 24, further comprising a clock generation circuit configured to generate a local clock signal based on the reference clock signal.

Example 26 is the apparatus according to example 23, 24 or 25, further comprising an oscillator circuit configured to generate a local oscillator signal based on the reference clock signal.

Example 27 is the apparatus according to one of the examples 22-26, wherein the clock distribution symbols occur at a frequency of at least 1 GHz within the data signal.

Example 28 is the apparatus according to example 27, further comprising a frequency divider, wherein the demodulation circuit is configured to generate an intermediate clock signal based on the clock distribution symbols within the data signal, wherein the frequency divider is configured to provide a reference clock signal based on the intermediate clock signal.

Example 29 is the apparatus according one of the examples 24-28, wherein the first non-payload data symbol is the variable buffer symbol and the second non-payload data symbol is the clock distribution symbol.

Example 30 is a wireless transceiver comprising:

An apparatus according to one of the examples 14-29; and

An up-conversion circuit configured to generate a high frequency transmit signal based on a baseband transmit signal and a local oscillator signal generated based on the variable buffer symbol and the clock distribution symbol.

Example 31 is a baseband processor comprising an apparatus according to one of the examples 1-13.

Example 32 is a mobile device comprising an apparatus according to one of the examples 1-13 and an apparatus according to one of the examples 14-29.

Example 33 is a method for generating a data signal, the method comprising:

generating the data signal, the data signal comprising a sequence of a first signal edge of a first type, a second signal edge of a second type, and a third signal edge of the first type, the first signal edge and the second signal edge being separated by a first time period corresponding to a first non-payload data symbol to be transmitted according to a communication protocol, and the second signal edge and the third signal edge being separated by a second time period corresponding to a second non-payload data symbol to be transmitted according to the communication protocol, wherein the first time period or the second time period is longer than the longest time period associated to a payload data symbol of the communication protocol, wherein one of the first non-payload data symbol and the second non-payload data symbol is a variable buffer symbol and the other one of the first non-payload data symbol and the second non-payload data symbol is a clock distribution symbol; and outputting the data signal.

Example 34 is a method for decoding a data signal, the method comprising:

determining a sequence of a first signal edge of a first type, a second signal edge of a second type, and a third signal edge of the first type in the data signal;

detecting a first non-payload data symbol based on a first time period between the first signal edge and the second signal edge; and detecting a second non-payload data symbol based on a second time period between the second signal edge and the third signal edge, wherein the first time period or the second time period is longer than the time period of any payload data symbol of the communication protocol, wherein one of the first non-payload data symbol and the second non-payload data symbol is a variable buffer symbol and the other one of the first non-payload data symbol and the second non-payload data symbol is a clock distribution symbol.

The examples described above in connection with FIGS. 30*a* to 30*k* may be summarized as follows:

Example 1 is an apparatus for generating a data signal, the apparatus comprising:

a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted, wherein the processing circuit is configured to modulate a first signal amplitude of the data signal during the first time period and a second signal amplitude of the data signal during the second time period corresponding to additional data to be transmitted; and an output interface circuit configured to output the data signal.

Example 2 is the apparatus according to example 1, wherein the signal amplitude of the data signal is pulse amplitude modulated.

Example 3 is the apparatus according to one of the previous examples, wherein the processing circuit is configured to generate the data signal based on a data communication protocol, wherein a first data symbol to be transmitted according to the data communication protocol comprises the first data and at least one bit of the additional data, wherein a second data symbol to be transmitted according to the data communication protocol comprises the second data and at least another bit of the additional data.

Example 4 is the apparatus according to one of the previous examples, wherein information on at least one bit of the additional data is distributed over the first signal amplitude and the second signal amplitude.

Example 5 is the apparatus according to one of the previous examples, wherein the processing circuit is configured to generate the data signal so that:

the first signal amplitude of the data signal is larger than a first amplitude threshold;

the second signal amplitude of the data signal is lower than the first amplitude threshold and larger than a second amplitude threshold; and the data signal comprises a third signal amplitude during a third time period, wherein the third signal amplitude of the data signal is lower than the second amplitude threshold.

Example 6 is the apparatus according to one of the previous examples, wherein information on at least one bit of the additional data is pulse amplitude modulated and time encoded.

Example 7 is an apparatus for receiving a data signal, the apparatus comprising:

a processing circuit configured to determine a sequence of a first signal edge of a first type, a second signal edge of a second type, and a third signal edge of the first type in the data signal; and a demodulation circuit configured to determine first data based on a first time period between the first signal edge and the second signal edge, and second data based on a second time period between the second signal edge and the third signal edge, wherein the demodulation circuit is configured to determine additional data based on a first signal amplitude of the data signal during the first time period and a second signal amplitude of the data signal during the second time period.

Example 8 is the apparatus according to example 7, wherein the signal amplitude of the data signal is pulse amplitude modulated.

Example 9 is the apparatus according to one of the examples 7-8, wherein the data signal is based on a data communication protocol, wherein a first data symbol received according to the data communication protocol comprises the first data and at least one bit of the additional data, wherein a second data symbol received according to the data communication protocol comprises the second data and at least another bit of the additional data.

Example 10 is the apparatus according to one of the examples 7-9, wherein the demodulation circuit is configured to determine a bit of the additional data based on the first signal amplitude and the second signal amplitude.

Example 11 is the apparatus according to one of the examples 7-10, wherein the first signal amplitude of the data signal is larger than a first amplitude threshold, wherein the second signal amplitude of the data signal is lower than the first amplitude threshold and larger than a second amplitude threshold, wherein the data signal comprises a third signal amplitude during a third time period, wherein the third signal amplitude of the data signal is lower than the second amplitude threshold, wherein the demodulation circuit is configured to determine the additional data based on a comparison of the signal amplitude of the data signal with at least one of the first amplitude threshold, the second amplitude threshold and the third amplitude threshold.

Example 12 is the apparatus according to one of the previous examples, wherein the demodulation circuit is configured to determine at least one bit of the additional data based on a length of the first time period and based on the first signal amplitude of the data signal during the first time period.

Example 13 is an apparatus for generating a pair of data signals, the apparatus comprising:

a processing circuit configured to generate a first data signal of the pair of data signals, the first data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted, wherein the first data signal comprises a first signal amplitude during the first time period and a second data signal of the pair of data signals comprises a second signal amplitude during the first time period, wherein the processing circuit is configured to select the first signal amplitude and the second signal amplitude based on at least one additional data bit to be transmitted; and an output interface circuit configured to output the pair of data signals.

Example 14 is the apparatus according to example 13, wherein the processing circuit is configured to generate the pair of data signals based on a data communication protocol, wherein each beginning and each end of time periods associated with data symbols of the data communication protocol to be transmitted corresponds to a respective signal edge in at least one of the data signals of the pair of data signals.

Example 15 is the apparatus according to example 13 or 14, wherein a first data symbol to be transmitted according to the data communication protocol comprises the first data and the at least one additional data bit.

Example 16 is the apparatus according to one of the examples 13-15, wherein signal edges of the first data signal and signal edges of the second data signal correspond to beginnings and ends of time periods associated with data symbols to be transmitted.

Example 17 is the apparatus according to one of the examples 13-16, wherein the processing circuit is configured to generate the pair of data signals so that a sum of the first data signal and the second data signal comprises signal edges for each data symbol of the data communication protocol to be transmitted.

Example 18 is the apparatus according to one of the examples 13-17, wherein the output interface is configured to provide the first data signal of the pair of data signals to a first signal line of a pair of signal lines and the second data signal of the pair of data signals to a second signal line of the pair of signal lines.

Example 19 is the apparatus according to example 18, wherein the processing circuit is configured to generate the pair of data signals as differential signal in a differential operating mode of the apparatus.

Example 20 is an apparatus for receiving a pair of data signals, the apparatus comprising:

a processing circuit configured to generate a difference data signal based on the pair of data signals, wherein the processing circuit is configured to determine a sequence of a first signal edge of a first type, a second signal edge of a second type, and a third signal edge of the first type in the difference data signal; and a demodulation circuit configured to determine first data based on a first time period between the first signal edge and the second signal edge, and second data based on a second time period between the second signal edge and the third signal edge, wherein the demodulation circuit is configured to determine at least one additional data bit based on a first signal amplitude of the difference data signal during the first time period and a second signal amplitude of the difference data signal during the second time period.

Example 21 is the apparatus according to example 20, the demodulation circuit is configured to determine at least one additional data bit based on a difference between the first signal amplitude and the second signal amplitude.

Example 22 is the apparatus according to example 20 or 21, wherein the difference data signal is based on a data communication protocol, wherein a first data symbol received according to the data communication protocol comprises the first data and the at least one additional bit.

Example 23 is the apparatus according to one of the examples 20-22, wherein signal edges of a first data signal of the pair of data signals and signal edges of a second data signal of the pair of data signals correspond to beginnings and ends of time periods corresponding to data symbols to be transmitted.

Example 24 is the apparatus according to one of the examples 20-23, wherein the processing circuit is configured to generate the difference data signal wherein the difference data signal comprises signal edges for each received data symbol of the data communication protocol.

Example 25 is the apparatus according to one of the examples 20-24, wherein the demodulation circuit is configured to determine one additional data bit for each received data symbol in a non-differential operating mode of the apparatus based on a respective change of the signal amplitude of the difference data signal.

Example 26 is the apparatus according to one of the examples 20-25, wherein the processing circuit is configured to generate the difference data signal by summing the data signals of the pair of data signals or subtracting the data signals of the pair of data signals from each other.

Example 27 is the apparatus according to one of the examples 20-26, wherein the data signals of the pair of data signals are differential signals in a differential operating mode of the apparatus.

Example 28 is a method for generating a data signal, the method comprising:

generating the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted;

modulating a first signal amplitude of the data signal during the first time period and a second signal amplitude of the data signal during the second time period corresponding to additional data to be transmitted; and outputting the data signal.

Example 29 is a method for receiving a data signal, the method comprising:

determining a sequence of a first signal edge of a first type, a second signal edge of a second type, and a third signal edge of the first type in the data signal;

determining first data based on a first time period between the first signal edge and the second signal edge;

determining second data based on a second time period between the second signal edge and the third signal edge; and determining additional data based on a first signal amplitude of the data signal during the first time period and a second signal amplitude of the data signal during the second time period.

Example 30 is a method for generating a pair of data signals, the method comprising:

generating a first data signal of the pair of data signals, the first data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted, wherein the first data signal comprises a first signal amplitude during the first time period and a second data signal of the pair of data signals comprises a second signal amplitude during the first time period, wherein the first signal amplitude and the second signal amplitude is selected based on at least one additional data bit to be transmitted; and outputting the pair of data signals.

Example 31 is a method for receiving a pair of data signals, the method comprising:

generating a difference data signal based on the pair of data signals;

determining a sequence of a first signal edge of a first type, a second signal edge of a second type, and a third signal edge of the first type in the difference data signal;

determining first data based on a first time period between the first signal edge and the second signal edge;

determining second data based on a second time period between the second signal edge and the third signal edge; and determining at least one additional data bit based on a first signal amplitude of the difference data signal during the first time period and a second signal amplitude of the difference data signal during the second time period.

The examples described above in connection with FIGS. 31*a* to 31*g* may be summarized as follows:

Example 1 is an apparatus for generating data signals, the apparatus comprising:

a processing circuit configured to generate a set of three data signals for three transmission lines, wherein at least two data signals of the set of three data signals have a first signal edge at a first time, wherein at least two data signals of the set of three data signals have a second signal edge directly succeeding the first signal edge at a second time, wherein at least two data signals of the set of three data signals have a third signal edge directly succeeding the second signal edge at a third time, wherein the first time and the second time are separated by a first time period corresponding to first data to be transmitted, and the second time and the third time are separated by a second time period corresponding to second data to be transmitted, wherein a first combination of two data signals of the set of three data signals have differential signal levels during the first time period and a second, different combination of two data signals of the set of three data signals have differential signal levels during the second time period, wherein the transition from the first combination to the second combination corresponds to at least a part of additional data to be transmitted; and an output interface circuit configured to output the set of three data signals.

Example 2 is the apparatus according to example 1, wherein the processing circuit is configured to generate the data signals based on a data communication protocol, wherein a first data symbol to be transmitted according to the data communication protocol comprises the first data and at least one bit of the additional data, wherein a second data symbol to be transmitted according to the data communication protocol comprises the second data and at least another bit of the additional data.

Example 3 is the apparatus according to one of the previous examples, wherein information on a bit of the additional data is distributed over at least the transition from the first combination to the second combination and a transition from the second combination to a third combination of two data signals of the set of three data signals having differential signal levels during a following, third time period.

Example 4 is the apparatus according to one of the previous examples, wherein a third data signal of the set of three data signals is in a high impedance state or at a signal level different from the differential signal levels of the other two signals of the set of three data signals during the first time period and the second time period.

Example 5 is the apparatus according to one of the previous examples, wherein one data signal of the set of three data signals is in a high impedance state or at a signal level different from the differential signal levels at any time during transmission in a three-line transmission mode, wherein different data signals of the set of three data signals are in the high impedance state or at the signal level different from the differential signal levels at different time periods during transmission in the three-line transmission mode.

Example 6 is the apparatus according to one of the previous examples, wherein the output interface circuit comprises a line driver for each of the three transmission lines, wherein the line drivers are configured to set each of the three transmission lines individually to a high impedance state at different times.

Example 7 is the apparatus according to example 6, wherein the line driver of a transmission line of the three transmission lines is configured to set the transmission line to a high impedance state, if the two other transmission lines of the three transmission lines are used for transmission of differential signal levels.

Example 8 is the apparatus according to one of the previous examples, wherein a data signal of the three data signal has a differential signal level during the first time period and has a high impedance state or a signal level different from the differential signal levels during the second time period.

Example 9 is the apparatus according to one of the previous examples, wherein the processing circuit is configured to generate the data signals so that 2 bits of the additional data are transmitted by every transition between two succeeding time periods separated by a signal edge within at least two data signals of the set of three data signals during transmission in the three-line transmission mode.

Example 10 is the apparatus according to one of the examples 1 to 8, wherein the processing circuit is configured to generate the data signals wherein 9 bits of the additional data are transmitted by four transitions between respective two succeeding time periods separated by a signal edge within at least two data signals of the set of three data signals during transmission in the three-line transmission mode.

Example 11 is an apparatus for receiving data signals, comprising:

a processing circuit configured to determine a length of a first time period between occurrence of a first signal edge and a second signal edge and a length of a second time period between occurrence of the second signal edge and a third signal edge, wherein the first signal edge occurs within at least two data signals of a set of three data signals at a first time, the second signal edge occurs within at least two data signals of the set of three data signals at a second time temporally directly succeeding the first signal edge, and the third signal edge occurs within at least two data signals of the set of three data signals at a third time temporally directly succeeding the second signal edge, wherein the first time and the second time are separated by the first time period and the second time and the third time are separated by the second time period; and a demodulation circuit configured to determine first data based on the length of the first time period and second data based on the length of the second time period, wherein the demodulation circuit is configured to determine additional data based on a first combination of two data signals of the set of three data signals having differential signal levels during the first time period and a second, different combination of two data signals of the set of three data signals having differential signal levels during the second time period, wherein the transition from the first combination to the second combination corresponds to at least a part of the additional data.

Example 12 is the apparatus according to example 11, wherein the data signals are based on a data communication protocol, wherein a first data symbol received according to the data communication protocol comprises the first data and at least one bit of the additional data, wherein a second data symbol received according to the data communication protocol comprises the second data and at least another bit of the additional data.

Example 13 is the apparatus according to example 11 or 12, wherein information on a bit of the additional data is distributed over at least the transition from the first combination to the second combination and a transition from the second combination to a third combination of two data signals of the set of three data signals having differential signal levels during a following, third time period.

Example 14 is the apparatus according to one of the examples 11 to 13, further comprising three differential amplifiers, wherein each differential amplifier of the three differential amplifiers receives a different combination of two data signals of the three data signals as input signals and is configured to output an amplifier output signal based on the respective two data signals.

Example 15 is the apparatus according to example 14, wherein the demodulation circuit is configured to determine the additional data based on the amplifier output signals of the three differential amplifiers.

Example 16 is the apparatus according to one of the examples 11 to 15, wherein a third data signal of the set of three data signals is in a high impedance state or at a signal level different from the differential signal levels of the other two signals of the set of three data signals during the first time period and the second time period.

Example 17 is the apparatus according to one of the examples 11 to 16, wherein demodulation circuit is configured to determine 2 bits of the additional data respectively based on a transition between two succeeding time periods separated by a signal edge within at least two data signals of the set of three data signals during reception in a three-line transmission mode.

Example 18 is the apparatus according to one of the examples 11 to 16, wherein demodulation circuit is configured to determine 9 bits of the additional data based on four transitions between respective two succeeding time periods separated by a signal edge within at least two data signals of the set of three data signals during reception in a three-line transmission mode.

Example 19 is a method for generating data signals, the method comprising:

generating a set of three data signals for three transmission lines, wherein at least two data signals of the set of three data signals have a first signal edge at a first time, wherein at least two data signals of the set of three data signals have a second signal edge directly succeeding the first signal edge at a second time, wherein at least two data signals of the set of three data signals have a third signal edge directly succeeding the second signal edge at a third time, wherein the first time and the second time are separated by a first time period corresponding to first data to be transmitted, and the second time and the third time are separated by a second time period corresponding to second data to be transmitted, wherein a first combination of two data signals of the set of three data signals have differential signal levels during the first time period and a second, different combination of two data signals of the set of three data signals have differential signal levels during the second time period, wherein the transition from the first combination to the second combination corresponds to at least a part of additional data to be transmitted; and outputting the set of three data signals.

Example 20 is a method for receiving data signals, the method comprising:

determining a length of a first time period between occurrence of a first signal edge and a second signal edge and a length of a second time period between occurrence of the second signal edge and a third signal edge, wherein the first signal edge occurs within at least two data signals of a set of three data signals at a first time, the second signal edge occurs within at least two data signals of the set of three data signals at a second time temporally directly succeeding the first signal edge, and the third signal edge occurs within at least two data signals of the set of three data signals at a third time temporally directly succeeding the second signal edge, wherein the first time and the second time are separated by the first time period and the second time and the third time are separated by the second time period;

determining first data based on the length of the first time period;

determining second data based on the length of the second time period; and determining additional data based on a first combination of two data signals of the set of three data signals having differential signal levels during the first time period and a second, different combination of two data signals of the set of three data signals having differential signal levels during the second time period, wherein the transition from the first combination to the second combination corresponds to at least a part of the additional data.

The examples described above in connection with FIGS. 32*a* to 32*k* may be summarized as follows:

Example 1 is an apparatus for generating output data. The apparatus comprises an input interface configured to receive an input data signal generated according to a communication protocol, wherein the input data signal comprises a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. The apparatus further comprises a time-to-digital converter configured to generate output data indicating the first data symbol and the second symbol based on the input data signal. A resolution of the time-to-digital converter is larger than 30% of a minimal symbol separation time of all data symbols of the communication protocol.

Example 2 is the apparatus of example 1, wherein the input data signal is a digital signal.

Example 3 is the apparatus of example 1 or example 2, wherein the resolution of the time-to-digital converter is larger than 70% of the minimal symbol separation time.

Example 4 is the apparatus of any of examples 1 to 3, wherein the time-to-digital converter comprises a delay line with a plurality of delay circuits connected in series.

Example 5 is the apparatus of example 4, wherein at least one delay circuit of the plurality of delay circuits is a variable delay circuit with an adjustable signal delay.

Example 6 is the apparatus of example 4 or example 5, wherein a respective signal capture circuit of a plurality of signal capture circuits is connected to a respective tap node between every two successive delay circuits of the plurality of delay circuits. The time-to-digital converter is configured to provide the input data signal to the delay line and the plurality of signal capture circuits are configured to capture signal values of the input data signal occurring at the tap nodes between the delay circuits of the plurality of delay circuits when triggered by a trigger signal.

Example 7 is the apparatus of example 6, wherein the trigger signal is the input data signal or a delayed version of the input data signal.

Example 8 is the apparatus of example 6 or example 7, wherein each signal capture circuit of the plurality of signal capture circuits comprises at least one D-flip-flop-circuit configured to capture the signal value of the input data signal occurring at the respective tap node.

Example 9 is the apparatus of any of examples 6 to 8, wherein each signal capture circuit of the plurality of signal capture circuits comprises a first flip-flop-circuit triggered by the trigger signal and a second flip-flop-circuit triggered by an inverse version of the trigger signal.

Example 10 is the apparatus of example 9, wherein the wherein the time-to-digital converter comprises a decoding circuit configured to output data indicating the first data symbol based on signal values of the input data signal captured by the first flip-flop-circuits of the plurality of signal capture circuits and configured to output data indicating the second data symbol based on signal values of the input data signal captured by the second flip-flop-circuits of the plurality of signal capture circuits.

Example 11 is the apparatus of any of examples 6 to 10, wherein a number of tap nodes within the delay line is less than 3 times a number of different payload data symbols of the communication protocol.

Example 12 is the apparatus of any of examples 6 to 11, wherein a number of tap nodes within the delay line is equal to one time or two times a number of different payload data symbols of the communication protocol.

Example 13 is the apparatus of any of examples 4 to 12, wherein a number of delay circuits within the delay line is less than 3 times a number of different payload data symbols of the communication protocol.

Example 14 is the apparatus of any of examples 1 to 13, further comprising a calibration module configured to adjust a variable delay of at least one delay circuit of a delay line of the time-to-digital converter in a calibration mode.

Example 15 is the apparatus of example 14, wherein the input interface is configured to receive a calibration data signal (from an external transmitter) comprising a known sequence of different data symbols. The time-to-digital converter is configured to generate output data indicating a sequence of calibration output data symbols based on the calibration data signal, wherein the calibration module is configured to adjust the variable delay of at least one delay circuit based on a comparison of the data symbols of the known sequence and the calibration output data symbols.

Example 16 is the apparatus of example 15, wherein the known sequence of different data symbols comprises an equal number of each possible payload data symbol of the communication protocol.

Example 17 is the apparatus of example 14, wherein the time-to-digital converter comprises a delay line with a plurality of delay circuits connected in series. A respective signal capture circuit of a plurality of signal capture circuits is connected to a respective tap node between every two successive delay circuits of the plurality of delay circuits. The time-to-digital converter is configured to provide the input data signal to the delay line and the plurality of signal capture circuits are configured to capture signal values of the input data signal occurring at the tap nodes between the delay circuits of the plurality of delay circuits when triggered by a trigger signal. The apparatus is configured to provide a first clock signal having a first frequency to the delay line in the calibration mode, wherein the trigger signal is a second clock signal having a second frequency in the calibration mode. The first frequency is a non-integer multiple of the second frequency or the second frequency is a non-integer multiple of the first frequency.

Example 18 is the apparatus of example 17, wherein the calibration module is configured to count a number of output events for each possible payload data symbol of the communication protocol to obtain a statistical distribution of data symbols outputted by the time-to-digital converter.

Example 19 is the apparatus of example 18, wherein the calibration module is configured to adjust the variable delay of at least one delay circuit of the delay line of the time-to-digital converter based on the statistical distribution of data symbols outputted by the time-to-digital converter.

Example 20 is the apparatus of example 18 or example 19, wherein the calibration module is configured to count in the calibration mode until the time-to-digital converter has output at least five times a number of different payload data symbols of the communication protocol to obtain the statistical distribution of data symbols outputted by the time-to-digital converter.

Example 21 is the apparatus of any of examples 17 to 20, further comprising a clock signal generator circuit configured to generate at least one of the first clock signal and second clock signal.

Example 22 is the apparatus of any of examples 17 to 21, wherein the calibration module is configured to adjust a variable delay of at least one delay circuit of the delay line of the time-to-digital converter so that, at the time of capturing the signal values of the input data signal by the signal capture circuits, an edge of the input data signal has propagated half of the minimal symbol separation time after passing a latest tap node.

Example 23 is the apparatus of any of examples 1 to 22, wherein the resolution of the time-to-digital converter is less than 2 times the minimal symbol separation time.

Example 24 is the apparatus of any of examples 1 to 23, wherein the resolution of the time-to-digital converter is larger than 5 ps.

Example 25 is the apparatus of any of examples 1 to 24, wherein the resolution of the time-to-digital converter is less than 30 ps.

Example 26 is a receiver circuit comprising an apparatus for generating output data according to any of examples 1 to 25.

Example 27 is a transceiver circuit comprising an apparatus for generating output data according to any of examples 1 to 25.

Example 28 is a method for generating output data, the method comprising receiving an input data signal generated according to a communication protocol, wherein the input data signal comprises a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. Further, the method comprises generating output data indicating the first data symbol and the second symbol based on the input data signal by a time-to-digital converter. A resolution of the time-to-digital converter is larger than 30% of a minimal symbol separation time of all data symbols of the communication protocol.

Example 29 is a machine-readable storage medium comprising code, when executed, to cause a machine to perform a method for generating output data, the method comprising receiving an input data signal generated according to a communication protocol, wherein the input data signal comprises a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol. Further, the method comprises generating output data indicating the first data symbol and the second symbol based on the input data signal by a time-to-digital converter. A resolution of the time-to-digital converter is larger than 30% of a minimal symbol separation time of all data symbols of the communication protocol.

The examples described above in connection with FIGS. 33*a* to 33*g* may be summarized as follows:

Example 1 is an apparatus for generating an output data signal, the apparatus comprising:

A first digital-to-time converter circuit configured to generate a first converted data signal based on a first DTC input data signal;

A second digital-to-time converter circuit configured to generate a second converted data signal based on a second DTC input data signal; and An XOR or XNOR circuit configured to generate a combined output data signal based on the first converted data signal and the second converted data signal.

Example 2 is the apparatus according to example 1, wherein the combined output data signal is a digital signal.

Example 3 is the apparatus according to one of the previous examples, wherein a minimal pulse width of the first converted data signal is equal to two times a minimal pulse width of the combined output data signal, wherein a minimal pulse width of the second converted data signal is equal to two times the minimal pulse width of the combined output data signal.

Example 4 is the apparatus according to one of the previous examples, wherein the first converted data signal comprises a sequence of a first signal edge of a first type, a second signal edge of a second type, and a third signal edge of the first type, the first signal edge and the second signal edge being separated by a first time period corresponding to a first combined data symbol contained by the first DTC input data signal, and the second signal edge and the third signal edge being separated by a second time period corresponding to a second combined data symbol contained by the first DTC input data signal.

Example 5 is the apparatus according to example 4, wherein the second converted data signal comprises a sequence of a first signal edge of a first type, a second signal edge of a second type, and a third signal edge of the first type, the first signal edge and the second signal edge being separated by a first time period corresponding to a first combined data symbol contained by the second DTC input data signal, and the second signal edge and the third signal edge being separated by a second time period corresponding to a second combined data symbol contained by the second DTC input data signal.

Example 6 is the apparatus according to example 5, wherein the first combined data symbol of the first DTC input data signal is based on a first data symbol of a first input data stream to be transmitted and a first data symbol of a second input data stream to be transmitted, wherein the first combined data symbol of the second DTC input data signal is based on a second data symbol of the first input data stream to be transmitted and the first data symbol of the second input data stream to be transmitted.

Example 7 is the apparatus according to example 6, wherein the second combined data symbol of the first DTC input data signal is based on the second data symbol of the first input data stream to be transmitted and a second symbol of the second input data stream to be transmitted, wherein the second combined data symbol of the second DTC input data signal is based on a third data symbol of the first input data stream to be transmitted and the second symbol of the second input data stream to be transmitted.

Example 8 is a transmitter circuit comprising an apparatus according to one of the previous examples.

Example 9 is a transceiver circuit comprising an apparatus according to one of the previous examples.

Example 10 is an apparatus for generating data signals, the apparatus comprising:

A divider circuit configured to generate a first divided data signal based on an input data signal, wherein the divider circuit is configured to generate a second divided data signal based on the input data signal;

A first time-to-digital converter circuit configured to generate a first converted data signal based on the first divided data signal; and A second time-to-digital converter circuit configured to generate a second converted data signal based on a second divided data signal.

Example 11 is the apparatus according to example 10, wherein the divider circuit is configured to generate the first divided data signal and the second divided data signal so that an average frequency of the first divided data signal is half of an average frequency of the input data signal and an average frequency of the second divided data signal is half of the average frequency of the input data signal.

Example 12 is the apparatus according to example 10 or 11, wherein the divider circuit is configured to generate the first divided data signal and the second divided data signal so that the first divided data signal comprises signal edges for every signal edge of a first type of the input data signal and the second divided data signal comprises signal edges for every signal edge of a second type of the input data signal.

Example 13 is the apparatus according to one of the examples 10-12, wherein the input data signal is a digital signal.

Example 14 is the apparatus according to one of the examples 10-13, wherein a minimal pulse width of the first divided data signal is equal to two times a minimal pulse width of the input data signal, wherein a minimal pulse width of the second divided data signal is equal to two times the minimal pulse width of the input data signal.

Example 15 is the apparatus according to one of the examples 10-14, wherein the first divided data signal comprises a sequence of a first signal edge of a first type, a second signal edge of a second type, and a third signal edge of the first type, the first signal edge and the second signal edge being separated by a first time period corresponding to a first combined data symbol contained by the first divided data signal, and the second signal edge and the third signal edge being separated by a second time period corresponding to a second combined data symbol contained by the first divided data signal.

Example 16 is the apparatus according to example 15, wherein the second divided data signal comprises a sequence of a first signal edge of a first type, a second signal edge of a second type, and a third signal edge of the first type, the first signal edge and the second signal edge being separated by a first time period corresponding to a first combined data symbol contained by the second divided data signal, and the second signal edge and the third signal edge being separated by a second time period corresponding to a second combined data symbol contained by the second divided data signal.

Example 17 is the apparatus according to example 16, further comprising a processing circuit configured to determine data of a first output data stream based on the first converted data signal and the second converted data signal, wherein the processing circuit is configured to determine data of a second output data stream based on the first converted data signal and the second converted data signal.

Example 18 is the apparatus according to example 17, wherein a first data symbol of the first output data stream is based on the first combined data symbol of the first divided data signal and the first combined data symbol of the second divided data signal, wherein a first data symbol of the second output data stream is based on the second combined data symbol of the first divided data signal and the first combined data symbol of the second divided data signal.

Example 19 is the apparatus according to example 18, wherein a second data symbol of the first output data stream is based on the second combined data symbol of the first divided data signal and the second combined data symbol of the second divided data signal, wherein a second data symbol of the second output data stream is based on a third combined data symbol of the first divided data signal and the second combined symbol of the second divided data signal.

Example 20 is a receiver circuit comprising an apparatus according to one of the examples 10-19.

Example 21 is a transceiver circuit comprising an apparatus according to one of the examples 10-20.

Example 22 is a method for generating output data, the apparatus comprising:

- generating a first converted data signal based on a first DTC input data signal by a first digital-to-time converter circuit;
- generating a second converted data signal based on a second DTC input data signal by a second digital-to-time converter circuit; and
- generating a combined output data signal based on the first converted data signal and the second converted data signal by an XOR or XNOR circuit.

Example 23 is a method for generating output data, the apparatus comprising:

- generating a first divided data signal based on an input data signal;
- generating a second divided data signal based on the input data signal;
- generating a first converted data signal based on the first divided data signal by a first time-to-digital converter circuit; and
- generating a second converted data signal based on a second divided data signal by a second time-to-digital converter circuit.

Example 24 is a machine-readable storage medium comprising code, when executed, to cause a machine to perform a method for generating output data, the method comprising:

- generating a first converted data signal based on a first DTC input data signal by a first digital-to-time converter circuit;
- generating a second converted data signal based on a second DTC input data signal by a second digital-to-time converter circuit; and
- generating a combined output data signal based on the first converted data signal and the second converted data signal by an XOR or XNOR circuit.

Example 25 is a machine-readable storage medium comprising code, when executed, to cause a machine to perform a method for generating output data, the method comprising:

- generating a first divided data signal based on an input data signal;
- generating a second divided data signal based on the input data signal;
- generating a first converted data signal based on the first divided data signal by a first time-to-digital converter circuit; and
- generating a second converted data signal based on a second divided data signal by a second time-to-digital converter circuit.

The examples described above in connection with FIGS. 34*a* to 34*g* may be summarized as follows:

Example 1 is an apparatus for generating data signals, the apparatus comprising:

a processing circuit configured to generate a transmit data signal, the transmit data signal comprising a sequence of a first signal edge of a first type, a second signal edge of a second type, and a third signal edge of the first type, the first signal edge and the second signal edge being separated by a first time period corresponding to a first data symbol contained by the transmit data signal, and the second signal edge and the third signal edge being separated by a second time period corresponding to a second data symbol contained by the transmit data signal; an input/output interface configured to transmit data based on the transmit data signal through a bi-directional lane, wherein the input/output interface is configured to receive a receive data signal through the bi-directional lane, wherein the processing circuit is configured to generate an output data signal based on the receive data signal.

Example 2 is the apparatus according to example 1, wherein the processing circuit comprises a digital-to-time converter circuit configured to generate the transmit data signal based on an input data signal.

Example 3 is the apparatus according to one of the previous examples, wherein the processing circuit is configured to generate the transmit data signal with a first data rate in a transmit mode of the apparatus, wherein the apparatus is configured to receive the receive data signal with a second data rate in the transmit mode, wherein the first data rate is higher than the second data rate.

Example 4 is the apparatus according to example 3, wherein the first data rate is higher than 10 times the second data rate.

Example 5 is the apparatus according to one of the previous examples, wherein the processing circuit is configured to generate the transmit data signal with a first data rate in a receive mode of the apparatus, wherein the apparatus is configured to receive the receive data signal with a second data rate in the receive mode, wherein the first data rate is lower than the second data rate.

Example 6 is the apparatus according to example 5, wherein the first data rate is lower than 10% of the second data rate.

Example 7 is the apparatus according to one of the previous examples, wherein the apparatus is configured to transmit data during a transmit time interval and receive the receive data signal during a receive time interval, wherein the transmit time interval and the receive time interval are non-overlapping.

Example 8 is the apparatus according to example 7, wherein the transmit time interval is longer than the receive time interval in the transmit mode of the apparatus, wherein the transmit time interval is shorter than the receive time interval in the receive mode of the apparatus.

Example 9 is the apparatus according to example 7 or 8, wherein a length of the transmit time interval differs from a length of the receive time interval by more than 90% of the longer time interval of the transmit time interval and the receive time interval.

Example 10 is the apparatus according to one of the previous examples, wherein the processing circuit comprises a time-to-digital converter circuit configured to generate the output data signal based on the receive data signal.

Example 11 is the apparatus according to example 10, wherein a TDC input data signal based on the receive data signal is provided to the time-to-digital converter circuit for generating the output data signal, wherein the TDC input data signal comprises a sequence of a first signal edge of a first type, a second signal edge of a second type, and a third signal edge of the first type, the first signal edge and the second signal edge being separated by a first time period corresponding to a first data symbol contained by the TDC input data signal, and the second signal edge and the third signal edge being separated by a second time period corresponding to a second data symbol contained by the TDC input data signal.

Example 12 is the apparatus according to one of the previous examples, wherein the processing circuit comprises an up-conversion circuit configured to generate an up-converted transmit data signal based on a modulation of a carrier signal based on the transmit data signal, wherein the input/output interface is configured to transmit data based on the up-converted transmit data signal through the bi-directional lane.

Example 13 is the apparatus according to example 12, wherein the processing circuit is configured to provide the transmit data signal to the input/output interface for transmission in the transmit mode of the apparatus, wherein the processing circuit is configured to generate the up-converted transmit data signal and provide the up-converted transmit data signal to the input/output interface for transmission in the receive mode of the apparatus.

Example 14 is the apparatus according to one of the previous examples, wherein the processing circuit comprises a down-conversion circuit configured to generate a down-converted receive data signal based on the receive data signal and an oscillator signal.

Example 15 is the apparatus according to example 14, wherein the processing circuit is configured to provide the receive data signal or a filtered version of the receive data signal to the time-to-digital converter circuit as the TDC input data signal in the receive mode of the apparatus, wherein the processing circuit is configured to provide the down-converted receive data signal to the time-to-digital converter circuit as the TDC input data signal in the transmit mode of the apparatus.

Example 16 is the apparatus according to one of the previous examples, wherein the input/output interface comprises a low-pass filter unit configured to filter the receive data signal to obtain a low-pass filtered receive data signal in the receive mode of the apparatus.

Example 17 is the apparatus according to one of the previous examples, wherein the input/output interface comprises a high-pass or band-pass filter unit configured to filter the receive data signal to obtain a high-pass or band-pass filtered receive data signal in the transmit mode of the apparatus.

Example 18 is the apparatus according to example 17, wherein the bidirectional lane is a single ended connection or one lane of a pair of lanes of a differential connection.

Example 19 is a transceiver circuit comprising an apparatus according to one of the previous examples.

Example 20 is a method for generating output data, the method comprising:

generating a transmit data signal, the transmit data signal comprising a sequence of a first signal edge of a first type, a second signal edge of a second type, and a third signal edge of the first type, the first signal edge and the second signal edge being separated by a first time period corresponding to a first data symbol contained by the transmit data signal, and the second signal edge and the third signal edge being separated by a second time period corresponding to a second data symbol contained by the transmit data signal;

transmitting data based on the transmit data signal through a bi-directional lane;

receiving a receive data signal through the bi-directional lane; and generating an output data signal based on the receive data signal.

Example 21 is a machine-readable storage medium comprising code, when executed, to cause a machine to perform a method for generating output data, the method comprising:

generating a transmit data signal, the transmit data signal comprising a sequence of a first signal edge of a first type, a second signal edge of a second type, and a third signal edge of the first type, the first signal edge and the second signal edge being separated by a first time period corresponding to a first data symbol contained by the transmit data signal, and the second signal edge and the third signal edge being separated by a second time period corresponding to a second data symbol contained by the transmit data signal;

transmitting data based on the transmit data signal through a bi-directional lane;

receiving a receive data signal through the bi-directional lane; and generating an output data signal based on the receive data signal.

The examples described above in connection with FIGS. 35*a* to 35*h* may be summarized as follows:

Example 1 is an apparatus for generating a data signal, the apparatus comprising:

a digital-to-time converter circuit configured to generate a DTC data signal based on an input data signal, wherein the DTC data signal comprises a sequence of a first signal edge of a first type, a second signal edge of a second type, and a third signal edge of the first type, wherein the first signal edge and the second signal edge are separated by a first time period corresponding to a first data symbol contained by the input data signal, wherein the second signal edge and the third signal edge are separated by a second time period corresponding to a second data symbol contained by the input data signal; and an up-conversion circuit configured to generate an up-converted data signal based on a modulation of a carrier signal based on the DTC data signal.

Example 2 is the apparatus according to example 1, wherein the DTC data signal is a digital signal.

Example 3 is the apparatus according to one of the previous examples, wherein the carrier signal has a frequency larger than 10 GHz.

Example 4 is the apparatus according to one of the previous examples, wherein the up-conversion circuit comprises a mixer circuit configured to mix the carrier signal and the DTC data signal.

Example 5 is the apparatus according to one of the previous examples, further comprising a second digital-to-time converter circuit configured to generate a second DTC data signal based on a second input data signal, wherein the apparatus is configured to provide an output data signal based on a combination of the up-converted data signal and the second DTC data signal.

Example 6 is the apparatus according to example 5, wherein the second DTC data signal comprises a sequence of a first signal edge of a first type, a second signal edge of a second type, and a third signal edge of the first type, wherein the first signal edge and the second signal edge are separated by a first time period corresponding to a first data symbol contained by the second input data signal, wherein the second signal edge and the third signal edge are separated by a second time period corresponding to a second data symbol contained by the second input data signal.

Example 7 is the apparatus according to one of the examples 5-6, wherein a maximal frequency of the second DTC data signal is lower than 30 GHz.

Example 8 is the apparatus according to one of the examples 5-7, wherein a frequency range used by the up-converted data signal is located at higher frequencies than a frequency range used by the second DTC data signal.

Example 9 is the apparatus according to one of the examples 5-8, wherein the apparatus is configured to transmit data contained by the input data signal and data contained by the second input data signal over the same lane.

Example 10 is the apparatus according to one of the previous examples, further comprising:

a further digital-to-time converter circuit configured to generate a further DTC data signal based on a further input data signal, wherein the further DTC data signal comprises a sequence of a first signal edge of a first type, a second signal edge of a second type, and a third signal edge of the first type, wherein the first signal edge and the second signal edge are separated by a first time period corresponding to a first data symbol contained by the further input data signal, wherein the second signal edge and the third signal edge are separated by a second time period corresponding to a second data symbol contained by the further input data signal; and a further up-conversion circuit configured to generate a further up-converted data signal based on a modulation of a further carrier signal based on the further DTC data signal, wherein the carrier signal and the further carrier signal are orthogonal carrier signals.

Example 11 is the apparatus according to example 10, wherein the apparatus is configured to provide an output data signal based on a combination of the up-converted data signal and the further up-converted data signal.

Example 12 is the apparatus according to example 10 or 11, wherein at least a part of a frequency range used by the up-converted data signal is located at same frequencies as at least a part of a frequency range used by the further up-converted data signal.

Example 13 is the apparatus according to example 10, 11 or 12, wherein the apparatus is configured to transmit data contained by the input data signal and data contained by the further input data signal over the same lane.

Example 14 is a transmitter circuit comprising an apparatus according to one of the previous examples.

Example 15 is a transceiver circuit comprising an apparatus according to one of the previous examples.

Example 16 is an apparatus for generating data signals, the apparatus comprising:

a down-conversion circuit configured to generate a down-converted data signal based on an input data signal and an oscillator signal;

a time-to-digital converter circuit configured to generate a TDC data signal based on the down-converted data signal, wherein the down-converted data signal comprises a sequence of a first signal edge of a first type, a second signal edge of a second type, and a third signal edge of the first type, wherein the first signal edge and the second signal edge are separated by a first time period corresponding to a first data symbol contained by the down-converted data signal, wherein the second signal edge and the third signal edge are separated by a second time period corresponding to a second data symbol contained by the down-converted data signal.

Example 17 is the apparatus according to example 16, wherein the oscillator signal comprises a frequency larger than 10 GHz.

Example 18 is the apparatus according to example 16 or 17, wherein the down-conversion circuit comprises a mixer circuit configured to mix the oscillator signal and the input data signal.

Example 19 is the apparatus according to one of the examples 16-18, further comprising a high-pass or band-pass filter unit configured to filter the input data signal to obtain a filtered input data signal, wherein the down-conversion circuit is configured to generate the down-converted data signal based on the filtered input data signal and the oscillator signal.

Example 20 is the apparatus according to example 19, wherein a lower cut-off frequency of the high-pass or band-pass filter unit is higher than 10 GHz.

Example 21 is the apparatus according to one of the examples 16-20, comprising a second time-to-digital converter circuit configured to generate a second TDC data signal based on the input data signal.

Example 22 is the apparatus according to example 21, further comprising a low-pass filter unit configured to filter the input data signal to obtain a low-pass filtered input data signal, wherein the second time-to-digital converter circuit is configured to generate the second TDC data signal based on a time-to-digital conversion of the low-pass filtered input data signal.

Example 23 is the apparatus according to example 22, wherein an upper cut-off frequency of the low-pass filter unit is lower than 30 GHz.

Example 24 is the apparatus according to example 22 or 23, wherein the low-pass filtered data signal comprises a sequence of a first signal edge of a first type, a second signal edge of a second type, and a third signal edge of the first type, wherein the first signal edge and the second signal edge are separated by a first time period corresponding to a first data symbol contained by the low-pass filtered data signal, wherein the second signal edge and the third signal edge are separated by a second time period corresponding to a second data symbol contained by the low-pass filtered data signal.

Example 25 is the apparatus according to one of the examples 22-24, further comprising:

a further down-conversion circuit configured to generate a further down-converted data signal based on the input data signal and a further oscillator signal;

a further time-to-digital converter circuit configured to generate a further TDC data signal based on the further down-converted data signal, wherein the further down-converted data signal comprises a sequence of a first signal edge of a first type, a second signal edge of a second type, and a third signal edge of the first type, wherein the first signal edge and the second signal edge are separated by a first time period corresponding to a first data symbol contained by the further down-converted data signal, wherein the second signal edge and the third signal edge are separated by a second time period corresponding to a second data symbol contained by the further down-converted data signal, wherein the oscillator signal and the further oscillator signal are orthogonal oscillator signals.

Example 26 is a receiver circuit comprising an apparatus according to one of the examples 16-25.

Example 27 is a transceiver circuit comprising an apparatus according to one of the examples 16-26.

Example 28 is a method for generating output data, the apparatus comprising:

generating a DTC data signal based on an input data signal by a digital-to-time converter circuit, wherein the DTC data signal comprises a sequence of a first signal edge of a first type, a second signal edge of a second type, and a third signal edge of the first type, wherein the first signal edge and the second signal edge are separated by a first time period corresponding to a first data symbol contained by the input data signal, wherein the second signal edge and the third signal edge are separated by a second time period corresponding to a second data symbol contained by the input data signal; and generating an up-converted data signal based on a modulation of a carrier signal based on the DTC data signal.

Example 29 is a method for generating output data, the apparatus comprising:

generating a down-converted data signal based on an input data signal and an oscillator signal; and generating a TDC data signal based on the down-converted data signal by a time-to-digital converter circuit, wherein the down-converted data signal comprises a sequence of a first signal edge of a first type, a second signal edge of a second type, and a third signal edge of the first type, wherein the first signal edge and the second signal edge are separated by a first time period corresponding to a first data symbol contained by the down-converted data signal, wherein the second signal edge and the third signal edge are separated by a second time period corresponding to a second data symbol contained by the down-converted data signal.

Example 30 is a machine-readable storage medium comprising code, when executed, to cause a machine to perform a method for generating output data, the method comprising:

generating a DTC data signal based on an input data signal by a digital-to-time converter circuit, wherein the DTC data signal comprises a sequence of a first signal edge of a first type, a second signal edge of a second type, and a third signal edge of the first type, wherein the first signal edge and the second signal edge are separated by a first time period corresponding to a first data symbol contained by the input data signal, wherein the second signal edge and the third signal edge are separated by a second time period corresponding to a second data symbol contained by the input data signal; and generating an up-converted data signal based on a modulation of a carrier signal based on the DTC data signal.

Example 31 is a machine-readable storage medium comprising code, when executed, to cause a machine to perform a method for generating output data, the method comprising:

generating a down-converted data signal based on an input data signal and an oscillator signal;

generating a TDC data signal based on the down-converted data signal by a time-to-digital converter circuit, wherein the down-converted data signal comprises a sequence of a first signal edge of a first type, a second signal edge of a second type, and a third signal edge of the first type, wherein the first signal edge and the second signal edge are separated by a first time period corresponding to a first data symbol contained by the down-converted data signal, wherein the second signal edge and the third signal edge are separated by a second time period corresponding to a second data symbol contained by the down-converted data signal.

The examples described previously in connection with FIGS. 36*a* to 36*f* may be summarized as follows:

Example 1 is adaption circuitry for data signals differentially received via two transmission lines, comprising:

- an input for the first transmission line and for the second transmission line;
- an output for the first transmission line and for the second transmission line;
- a first resistive element between the input for the first transmission line and the output for the first transmission line; and
- a second resistive element between the input for the second transmission line and the output for the second transmission line,
- the first resistive element and the second resistive elements adding attenuation to the transmission lines.

In example 2, in the adaption circuitry according to example 1, a resistivity of the first resistive element and the second resistive element is adjustable.

In example 3, in the adaption circuitry according to example 2, a resistivity of the first resistive element and the second resistive element are adjusted to an identical value.

In example 4, the adaption circuitry according to any of examples 1 to 3 further comprises a third resistive element coupled between the first transmission line and the second transmission line between the inputs and the first and second resistive elements, respectively; and a fourth resistive element coupled between the first transmission line and the second transmission line between the outputs and the first and second resistive elements, respectively.

In example 5, in the adaption circuitry according to example 4, a resistivity of the third resistive element and the fourth resistive element is adjustable.

In example 6, in the adaption circuitry according to example 5, a resistivity of the third resistive element and the fourth resistive element are adjusted to an identical value.

Example 7 is adaption circuitry for data signals differentially received via two transmission lines, comprising:

- an input for the first transmission line and for the second transmission line;
- an output for the first transmission line and for the second transmission line;
- a first resistive element between the input for the first transmission line and the output for the first transmission line;
- a second resistive element between the input for the second transmission line and the output for the second transmission line, wherein the first and second resistive elements are adjustable to an identical first value;
- a third resistive element coupled between the first transmission line and the second transmission line between the inputs and the first and second resistive elements, respectively;
- a fourth resistive element coupled between the first transmission line and the second transmission line between the outputs and the first and second resistive elements, respectively, wherein the first and second resistive elements are adjustable to an identical second value.

Example 8 is a receiver for data signals differentially transmitted via two transmission lines, comprising:

- a data input for a first transmission line and for a second transmission line;
- an amplifier circuit configured to generate an output signal depending on a difference of the signal on the first transmission line and on the second transmission line; and
- adaption circuitry according to any of examples 1 to 7 coupled between the data input and the amplifier circuit.

Example 9 is a method for determining an attenuation level, comprising:

- receiving a first predetermined sequence of calibration symbols at a first attenuation level;
- determining a first error rate for the received calibration symbols of the first sequence;
- increasing attenuation to a second attenuation level;
- receiving a second predetermined sequence of calibration symbols at the second attenuation level;
- determining a second error rate for the received calibration symbols of the second sequence; and
- increasing the attenuation to a third attenuation level if the second error rate is lower than the first error rate.

In example 10, the method of example 9 further comprises maintaining the second attenuation level if the second error rate is zero.

In example 11, the method of example 10 further comprises sending a feedback signal causing no more calibration symbols to be received.

In example 12, the method of any of examples 9 to 11 further comprises

- setting the first attenuation level to zero; and
- sending a feedback signal causing an increase of a signal level of the calibration symbols if the second error rate is higher than the first error rate.

In example 13, in the method of any of examples 9 to 12, the attenuation is adjusted using adaption circuitry according to any of examples 1 to 7.

In example 14, in the method of one of examples 9 to 13,

- receiving the first predetermined sequence of calibration symbols at the first attenuation level comprises:
- receiving a data signal comprising the first predetermined sequence of calibration symbols; and attenuating the data signal with the first attenuation level; and
- receiving the second predetermined sequence of calibration symbols at the second attenuation level comprises:
- receiving the data signal comprising the second predetermined sequence of calibration symbols; and
- attenuating the data signal with the second attenuation level.

Example 15 is an apparatus for processing a data signal, comprising

- a processing circuit configured to determine a sequence of a first signal edge of a first type, a second signal edge of a second type, and a third signal edge of the first type in the data signal;
- a demodulation circuit configured to determine first data based on a first time period between the first signal edge and the second signal edge; and second data based on a second time period between the second signal edge and the third signal edge; and
- adaption circuitry according to any of examples 1 to 7.

Example 16 is an apparatus for processing a data signal, comprising:

- processing circuit configured to determine a sequence of a first signal edge of a first type, a second signal edge of a second type, and a third signal edge of the first type in the data signal;
- a demodulation circuit configured to determine first data based on a first time period between the first signal edge and the second signal edge; and second data based on a second time period between the second signal edge and the third signal edge; and adaption circuitry for the data signal which is differentially received via two transmission lines, comprising:
- an input for a first transmission line and for a second transmission line;
- an output for the first transmission line and for the second transmission line;
- a first resistive element between the input for the first transmission line and the output for the first transmission line;
- a second resistive element between the input for the second transmission line and the output for the second transmission line, wherein the first and second resistive elements are adjustable to an identical first value;
- a third resistive element coupled between the first transmission line and the second transmission line between the input and the first and second resistive elements, respectively;
- a fourth resistive element coupled between the first transmission line and the second transmission line between the output and the first and second resistive elements, respectively, wherein the first and second resistive elements are adjustable to an identical second value.

Example 17 is an apparatus for processing a data signal, comprising:
- a processing circuit configured to determine a sequence of a first signal edge of a first type, a second signal edge of a second type, and a third signal edge of the first type in the data signal;
- a demodulation circuit configured to determine first data based on a first time period between the first signal edge and the second signal edge; and second data based on a second time period between the second signal edge and the third signal edge; and
- adaption circuitry for the data signal which is differentially received via two transmission lines, comprising: an input for the first transmission line and for the second transmission line;
- an output for the first transmission line and for the second transmission line;
- a first resistive element between the input for the first transmission line and the output for the first transmission line; and
- a second resistive element between the input for the second transmission line and the output for the second transmission line,
- the first resistive element and the second resistive elements adding attenuation to the transmission lines.

Example 18 is an apparatus for generating a data signal, comprising:
- a modulator circuit configured to generate a series of calibration symbols;
- an output interface configured to transmit a data signal comprising the series of calibration symbols at a first signal level;
- an input interface configured to receive a feedback signal; wherein
- the output interface is further configured to transmit, upon receipt of the feedback signal, the data signal comprising the series of calibration symbols at a second signal level, the second signal level being higher than the first signal level.

In example 19, in the apparatus of example 18, the output interface is further configured to generate the data signal comprising a sequence of a first signal edge of a first type, a second signal edge of a second type, and a third signal edge of the first type, wherein a first time period between the first signal edge and the second signal edge corresponds to a first calibration symbol and wherein a second time period between the first signal edge and the second signal edge corresponds to a second calibration symbol.

Example 20 is a physical layer controller for a communication interface, the physical layer controller comprising an apparatus for processing a data signal according to one of examples 15 to 17.

In example 21, the physical layer controller of example 20 further comprises a MAC-output interface configured to connect to a Medium Access Controller.

Example 22 is a physical layer controller for a communication interface, the physical layer controller comprising an apparatus for generating a data signal according to one of examples 18 or 19.

In example 23, the physical layer controller of example 22, further comprises
- a MAC-input interface configured to connect to a Medium Access Controller.

The examples described previously in connection with FIGS. 37*a* to 37*h* may be summarized as follows:

Example 1 is an apparatus for generating a data signal, comprising:
- a pre-distortion circuit configured to generate a modification for at least one characteristic of a data signal to be transmitted via a transmission link based on a pre-distortion model for jitter introduced to the data signal at the transmission link; and
- a processing circuit configured to generate the data signal based on the modified characteristic.

In example 2, in the apparatus of example 1, the pre-distortion circuit is configured to generate a modification of the characteristic using a look-up-table that assigns the modification to data to be transmitted using the data signal.

In example 3, in the apparatus of example 1, the pre-distortion circuit is configured to input data to be transmitted into a pre-distortion model to generate the modification of the characteristic.

In example 4, in the apparatus of example 3, the pre-distortion model comprises a finite impulse response model of the transmission link.

In example 5, in the apparatus of one of examples 1 to 4, the pre-distortion circuit is configured to update the pre-distortion model based on calibration information received from a recipient of the data signal.

In example 6, in the apparatus of example 5, the calibration information is based on a measured jitter in the data signal.

In example 7, in the apparatus of any of examples 1 to 6, the pre-distortion circuit uses a pre-distortion model depending on at least one transmit data symbol of a series of transmit data symbols to be transmitted by means of the data signal.

In example 8, in the apparatus of example 7, the pre-distortion model uses at least the present transmit data symbol and a preceding transmit data symbol of the series.

In example 9, in the apparatus of one of the preceding examples, the modification is an adjustment of a time period associated to a transmit data symbol.

Example 10 is an apparatus for generating a data signal, comprising:
- a pre-distortion circuit configured to generate a modification of at least one characteristic of a data signal to be transmitted via a transmission link based on a pre-distortion model for jitter introduced to the data signal along the transmission link; and
- a processing circuit configured to generate the data signal, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol; and an output interface circuit configured to output the data signal to the transmission link.

In example 11, in the apparatus of example 10, the pre-distortion circuit is configured to generate a modification of the first time period and a modification of the second time period.

In example 12, in the apparatus of one of examples 10 or 11, the processing circuit comprises a digital-to-time converter.

In example 13, in the apparatus of one of examples 10 to 12, the first type is a rising edge and the second type is a falling edge, or wherein the second type is a rising edge and the first type is a falling edge.

In example 14, in the apparatus of one of examples 10 to 13, a sum of the first time period and the second time period is lower than 10-7 s.

Example 15 is a method for generating a data signal, comprising:

generating a modification for at least one characteristic of a data signal to be transmitted via a transmission link based on a pre-distortion model for jitter introduced to the data signal along the transmission link; and generating the data signal based on the modified characteristic.

In example 16, in the method of example 15, generating a modification comprises using a look-up-table assigning the modification to data to be transmitted using the data signal.

In example 17, in the method of example 15, generating a modification comprises inputting data to be transmitted using the data signal into a pre-distortion model to generate the modification of the characteristic.

In example 18, in the method of example 15, the pre-distortion model comprises a finite impulse response model of the transmission link.

In example 19, the method of one of examples 15 to 18 further comprises updating the pre-distortion model based on calibration information received from a recipient of the data signal.

In example 20, in the method of example 19, the calibration information is based on measured jitter in the data signal.

In example 21, in the method of one of examples 15 to 20, the pre-distortion model depends on at least one transmit data symbol of a series of transmit data symbols transmitted using the data signal.

In example 22, in the method of example 21, the pre-distortion model uses at least the present transmit data symbol and a preceding transmit data symbol of the series.

Example 23 is a method for generating a data signal, comprising:

generating a modification for at least one characteristic of a data signal to be transmitted via a transmission link based on a pre-distortion model for jitter introduced to the data signal along the transmission link; and generating the data signal, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol; and output the data signal to the transmission link.

In example 24, in the method of example 23, generating the modification for at least one characteristic comprises generating a modification of the first time period and a modification of the second time period.

Example 25 is means for generating a data signal, comprising:

means for generating a modification for at least one characteristic of a data signal to be transmitted via a transmission link based on a pre-distortion model for jitter introduced to the data signal along the transmission link; and means for generating the data signal based on the modified characteristic.

In example 26, in the means for generating a data signal according to example 25, the pre-distortion model comprises a finite impulse response model of the transmission link.

Example 27 is means for generating a data signal, comprising:

means for generating a modification for at least one characteristic of a data signal to be transmitted via a transmission link based on a pre-distortion model for jitter introduced to the data signal along the transmission link;

means for generating the data signal, the data signal comprising a sequence of a first signal edge of a first type, a second signal edge of a second type, and a third signal edge of the first type, the first signal edge and the second signal edge being separated by a first time period corresponding to a first data symbol, and the second signal edge and the third signal edge being separated by a second time period corresponding to a second data symbol; and means for outputting the data signal to the transmission link.

In example 28, in the means for generating a data signal according to example 27, the pre-distortion model comprises a finite impulse response model of the transmission link.

Example 29 is a physical layer controller for a communication interface, the physical layer controller comprising an apparatus for generating a data signal according to one of examples 1 to 9.

In example 30, the physical layer controller of example 29 further comprises a MAC-output interface configured to connect to a Medium Access Controller.

Example 31 is a physical layer controller for a communication interface, the physical layer controller comprising an apparatus for generating a data signal according to one of examples 10 to 15.

In example 32, the physical layer controller of example 31 further comprises a MAC-input interface configured to connect to a Medium Access Controller.

The examples described previously in connection with FIGS. 38*a* to 38*i* may be summarized as follows:

Example 1 is a method to determine a time period between two signal edges using a time to digital converter with a coarse resolution, comprising:

scaling a time period between a series of subsequent signal edges within a data signal by a calibration factor;

transmitting the series of subsequent signal edges via a transmission link;

receiving the series of subsequent signal edges;

quantizing the time periods between signal edges with the coarse resolution to provide quantization values; and calculating the time period between the signal edges based on a distribution of the quantization values and on the scaling factor.

In Example 2, the method of example 1 further comprises providing multiple repetitions of a series of payload data symbols; and assigning a time period to each payload data symbol of the series.

In Example 3, in the method of example 2, determining the time period between signal edges corresponding to a select payload data symbol within the series comprises:

determining the distribution of quantization values for the select payload data symbol; and calculating the time period using the scaling factor, the time periods corresponding to at least two neighboring quantization values of the distribution and the distribution of the quantization values.

In Example 4, in the method of one of examples 2 or 3, the number of payload data symbols within the series corresponds to the complexity of a predistortion model for Jitter due to Inter Symbol interference.

In Example 5, the method of one of examples 2 to 4 further comprises generating first calibration data for the last payload data symbol within a series, the first calibration data relating the time period determined for the last payload data symbol to the series of payload data symbols.

In Example 6, in the method of one of examples 2 or 3, the length of the series of payload data symbols corresponds to twice the signal propagation time of the transmission link.

In Example 7, the method of example 6 further comprises generating second calibration data for the last payload data symbol within the series relating the time period determined for the last payload data symbol of the series to the first payload data symbol of the series.

In Example 8, in the method of one of the preceding examples, scaling a time period comprises changing a frequency of a local oscillator used to generate the series of subsequent signal edges from an operating frequency to a calibration frequency.

In Example 9, in the method of example 8, the scaling factor is given by the calibration frequency divided by the operating frequency.

Example 10 is an apparatus for processing a data signal generated by an apparatus for generating a data signal, comprising:

an input interface configured to receive a series of subsequent signal edges within the data signal;

a time to digital converter configured to quantize time periods between signal edges with a coarse resolution to provide a quantization value for each time period; and evaluation circuitry configured to calculate the time period between the signal edges based on a distribution of the quantization values and a scaling factor used for generating the data signal.

In Example 11, in the apparatus of example 10, the evaluation circuitry is configured to determine the time period between signal edges corresponding to a select payload data symbol of a series of payload data symbols repeatedly received within the data signal by determining the distribution of quantization values for the select payload data symbol; and calculating the time period using the scaling factor, the time periods corresponding to at least two neighboring quantization values of the distribution and the distribution of the quantization values.

In Example 12, the apparatus of example 10 further comprises an output interface configured to communicate the calculated time period to the apparatus for generating the data signal.

Example 13 is an apparatus for generating a data signal, comprising:

a calibration circuit configured to generate multiple repetitions of a series of payload data symbols;

a modulation circuit configured to assign a time period to each payload data symbol of the series;

a data signal generation circuit configured to generate a data signal comprising a sequence of subsequent signal edges separated by calibration time periods, the calibration time periods being the time periods scaled by a calibration factor.

In Example 14, the apparatus of example 13 further comprises an input interface configured to receive a feedback signal; wherein the data signal generation circuit is configured to modify the calibration factor upon receipt of a negative acknowledgement signal within the feedback signal.

In Example 15, in the apparatus of example 14, the data signal generation circuit is configured to decrease the calibration factor.

In Example 16, in the apparatus of example 14 or 15, the data signal generation circuit comprises a Phase Locked Loop used to generate the sequence of subsequent signal edges.

In Example 17, in the apparatus of example 15, a frequency of the Phase Locked Loop is increased upon receipt of the negative acknowledgement signal.

Example 18 is a physical layer controller for a communication interface, the physical layer controller comprising an apparatus for generating a data signal according to one of examples 13 to 17.

In Example 19, the physical layer controller of example 18 further comprises a MAC-input interface configured to connect to a Medium Access Controller.

Example 20 is a physical layer controller for a communication interface, the physical layer controller comprising an apparatus for processing a data signal according to one of examples 10 to 12.

In Example 21, the physical layer controller of example 20 further comprises a MAC-output interface configured to connect to a Medium Access Controller.

The examples described previously in connection with FIGS. 39*a* to 39*e* may be summarized as follows:

Example 1 is an apparatus for generating a data signal, comprising:

a modulator circuit configured to generate a data stream comprising a sequence of a control symbol indicator, a control symbol indicating a series of calibration symbols, and a series of calibration symbols comprising at least one calibration symbol; and an output interface configured to output a data signal comprising the symbols of the data stream.

In Example 2, the apparatus of example 1 further comprises a processing circuit configured to generate the data signal comprising a sequence of complementary signal edges separated by time periods corresponding to the control symbol indicator, the control symbol, and the calibration symbols of the sequence.

In Example 3, in the apparatus of example 1 or 2, the series of calibration symbols comprises multiple repetitions of a series of payload data symbols.

Example 4 is an apparatus for processing a data signal, comprising:

an input interface configured to receive the data signal comprising a sequence of a control symbol indicator, a control symbol indicating a series of calibration symbols, and a series of calibration symbols; and evaluation circuit configured to use the series of calibration symbols to determine a property of the data signal.

In Example 5, the apparatus of example 4 further comprises an output interface configured to output the property of the data signal.

Example 6 is a method for generating a data signal, comprising:

generating a data stream comprising a sequence of a control symbol indicator, a control symbol indicating a series of calibration symbols, and a series of calibration symbols comprising at least one calibration symbol; and outputting the data signal comprising the symbols of the data stream.

In Example 7, the method of example 6 further comprises generating the data signal comprising a sequence of complementary signal edges separated by time periods corresponding to the control symbol indicator, the control symbol, and the calibration symbols of the sequence.

In Example 8, in the method of example 6 or 7, the series of calibration symbols comprises multiple repetitions of a series of payload data symbols.

Example 9 is a method for processing a data signal, comprising:

receiving the data signal comprising a sequence of a control symbol indicator, a control symbol indicating a series of calibration symbols, and a series of calibration symbols; and using the series of calibration symbols to determine a property of the data signal.

In Example 10, the method of example 9 further comprises outputting the property of the data signal.

Example 11 is a physical layer controller for a communication interface, the physical layer controller comprising an apparatus for generating a data signal according to one of examples 1 to 3.

In Example 12, the physical layer controller of example 11 further comprises a MAC-input interface configured to connect to a Medium Access Controller.

Example 13 is a physical layer controller for a communication interface, the physical layer controller comprising an apparatus for processing a data signal according to one of examples 4 or 5.

In Example 14, the physical layer controller of example 13 further comprises a MAC-output interface configured to connect to a Medium Access Controller.

The examples described previously in connection with FIGS. 40*a* to 40*e* may be summarized as follows:

Example 1 is a method to calibrate variable delay elements, comprising:

Setting a first time period of the DTC to a first value derivable from a reference clock;

Transmitting a data signal comprising a series of complementary signal edges separated by the first time period to a TDC; and Calibrating a delay element within the TDC to the first value.

In example 2, the method of example 1 further comprises setting the first time period of the DTC to a second value derivable from the reference clock;

Transmitting a data signal comprising a series of complementary signal edges separated by the first time period to the TDC; and Calibrating the delay element within the TDC to the second value.

In example 3, the method of example 2 further comprises

Setting the first time period of the DTC to the first value;

Transmitting a data signal comprising a series of complementary signal edges separated by a time period depending form the first time period and from a second time period to the TDC; and calibrating the second time period within the DTC to a difference between the second value and the first value.

In example 4, in the method of example 2 or 3, the difference between the second value and the first value corresponds to one half of a symbol separation time of a communication protocol.

In example 5, the method of example 3 or 4 further comprises calibrating the second time period within the DTC the symbol separation time being twice the difference between the second value and the first value.

In example 6, the method of example 5 further comprises

Setting the second time period within the DTC to the symbol separation time;

transmitting a data signal comprising a series of complementary signal edges separated by a time period depending form the first time period and from the second time period to the TDC; and calibrating a second time period within TDC to the symbol separation time.

Example 7 is a Time to Digital Converter, comprising:

a series of serially connected delay elements configured to implement a delay corresponding to a symbol separation time of a communication protocol; and at least one further delay element coupled to the serially connected delay elements, the further delay element being configured to implement a delay of one half of the symbol separation time.

In example 8, in the Time to Digital Converter of example 7, the further delay element is coupled in parallel to the series of serially connected delay elements.

Example 9 is means for calibrating variable delay elements, comprising means for setting a first time period of a DTC to a first value derivable from a reference clock;

means for transmitting a data signal comprising a series of complementary signal edges separated by the first time period to a TDC;

means for calibrating a delay element within the TDC to the first value.

In Example 10, the means of example 9 further comprise means for setting the first time period of the DTC to a second value derivable from the reference clock;

means for transmitting a data signal comprising a series of complementary signal edges separated by the first time period to the TDC; and means for calibrating the delay element within the TDC to the second value.

The examples described above in connection with FIGS. 41*a* to 41*e* may be summarized as follows:

Example 1 is an electronic device, comprising a connector configured to receive a data cable, wherein the connector is further configured to output a data signal to the data cable. The electronic device further comprises an apparatus for generating the data signal. The apparatus for generating the data signal comprises a processing circuit configured to generate the data signal, the data signal comprising a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The apparatus for generating the data signal further comprises an output interface circuit configured to output the data signal to the connector.

Example 2 is the electronic device of example 1, wherein the electronic device is one of a mobile phone, a tablet computer, a laptop computer, a computer, a television set, a set-top box, a portable data storage device, a video game console, and a consumer electronics device.

Example 3 is the electronic device of example 1 or example 2, wherein the first type is a rising edge and the second type is a falling edge, or wherein the second type is a rising edge and the first type is a falling edge.

Example 4 is the electronic device of any of examples 1 to 3, wherein a sum of the first time period and the second time period is lower than $10^{-7}$ s.

Example 5 is the electronic device of any of examples 1 to 4, wherein the processing circuit is further configured to generate a second data signal, the second data signal being inverted with respect to the data signal, and wherein the output interface circuit is further configured to output the second data signal to the connector.

Example 6 is the electronic device of any of examples 1 to 5, wherein the processing circuit is configured to generate the data signal compliant to the Serial Time Encoded Phy, STEP, protocol.

Example 7 is an electronic device, comprising a connector configured to receive a data cable, wherein the connector is further configured to receive a data signal from the data cable. The electronic device further comprises an apparatus for decoding the data signal. The apparatus for decoding the data signal comprises a processing circuit configured to determine a sequence of a first signal edge of a first type, a second signal edge of a second type, and a third signal edge of the first type in the data signal. Further, the apparatus for decoding the data signal comprises a demodulation circuit configured to determine first data based on a first time period between the first signal edge and the second signal edge, and to determine second data based on a second time period between the second signal edge and the third signal edge.

Example 8 is the electronic device of example 7, wherein the electronic device is one of a mobile phone, a tablet computer, a laptop computer, a computer, a television set, a set-top box, a portable data storage device, a video game console, and a consumer electronics device.

Example 9 is the electronic device of example 7 or example 8, wherein the first type is a rising edge and the second type is a falling edge, or wherein the second type is a rising edge and the first type is a falling edge.

Example 10 is the electronic device of any of examples 7 to 9, wherein a sum of the first time period and the second time period is lower than $10^{-7}$ s.

Example 11 is the electronic device of any of examples 7 to 10, wherein the connector is further configured to receive a second data signal from the data cable, the second data signal being inverted with respect to the data signal, and wherein the processing circuit is configured to determine the first signal edge, the second signal edge, and the third signal edge further based on the second data signal.

Example 12 is the electronic device of any of examples 7 to 11, wherein the apparatus for decoding the data signal is configured to decode the data signal compliant to the Serial Time Encoded Phy, STEP, protocol.

Example 13 is a data cable, comprising a first connector configured to couple to a first electronic device, and a second connector configured to couple to a second electronic device. The data cable further comprises at least one repeater circuit coupled between the first connector and the second connector. The first connector is configured to receive a data signal from the first electronic device, wherein data signal comprises a sequence of a first signal edge of a first type, a second signal edge of a second type, and a third signal edge of the first type, the first signal edge and the second signal edge being separated by a first time period corresponding to first data to be transmitted, and the second signal edge and the third signal edge being separated by a second time period corresponding to second data to be transmitted. The at least one repeater circuit is configured to amplify the data signal, and the second connector is configured to output the amplified data signal to the second electronic device.

Example 14 is the data cable of example 13, wherein the data cable comprises at least two repeater circuits coupled in series between the first connector and the second connector, and wherein the at least two repeater circuits are configured to sequentially amplify the data signal.

Example 15 is the data cable of example 13 or example 14, wherein the first type is a rising edge and the second type is a falling edge, or wherein the second type is a rising edge and the first type is a falling edge.

Example 16 is the data cable of any of examples 13 to 15, wherein a sum of the first time period and the second time period is lower than $10^{-7}$ s.

Example 17 is the data cable of any of examples 13 to 16, wherein the at least one repeater circuit is coupled to the second connector via a coaxial cable, and wherein the at least one repeater circuit is configured to output the amplified data signal single ended to the second connector via the coaxial cable.

Example 18 is the data cable of any of examples 13 to 16, wherein the first connector is further configured to receive a second data signal from the first electronic device, the second data signal being inverted with respect to the data signal. The at least one repeater circuit is further configured to amplify the second data signal, wherein the second connector is further configured to output the amplified second data signal to the second electronic device.

Example 19 is the data cable of example 18, wherein the at least one repeater circuit is coupled to the second connector via a pair of coaxial cables, and wherein the at least one repeater circuit is configured to output the amplified data signal and the amplified second data signal to different ones of the pair of coaxial cables.

Example 20 is the data cable of example 18, wherein the at least one repeater circuit is coupled to the second connector via a twisted pair cable, and wherein the at least one repeater circuit is configured to output the amplified data signal and the amplified second data signal to different lines of the twisted pair cable.

Example 21 is the data cable of any of examples 13 to 20, wherein at least the data signal is compliant to the Serial Time Encoded Phy, STEP, protocol.

Example 22 is the data cable of any of examples 13 to 21, wherein the second connector is configured to receive a third data signal from the second electronic device. The third data signal comprises a sequence of a fourth signal edge of the first type, a fifth signal edge of the second type, and a sixth signal edge of the first type, the fourth signal edge and the fifth signal edge being separated by a third time period corresponding to third data to be transmitted, and the fifth signal edge and the sixth signal edge being separated by a fourth time period corresponding to fourth data to be transmitted. The at least one repeater circuit is configured to amplify the third data signal, and wherein the first connector is configured to output the amplified third data signal to the first electronic device.

Example 23 is the data cable of example 22, wherein the at least one repeater circuit is configured to simultaneously amplify the first data signal and the third data signal.

Example 24 is a data cable, comprising a first connector configured to couple to a first electronic device and to receive an input signal compliant to a communication protocol from the first electronic device. Further, the data cable comprises a second connector configured to couple to a second electronic device, and two conversion circuits coupled between the first connector and the second connector. A first conversion circuit of the two conversion circuits is configured to receive the input signal from the first connector and to generate a data signal based on the input signal. The data signal comprises a sequence of a first signal edge of a first type, a second signal edge of a second type, and a third signal edge of the first type, the first signal edge and the second signal edge being separated by a first time period corresponding to first data encoded to the input signal, and the second signal edge and the third signal edge being separated by a second time period corresponding to second data encoded to the input signal. A second conversion circuit of the two conversion circuits is configured to receive the data signal from the first conversion circuit and to generate an output signal compliant to the communication protocol based on the data signal. The second connector is configured output the output signal to the second electronic device.

Example 25 is the data cable of example 24, wherein the first type is a rising edge and the second type is a falling edge, or wherein the second type is a rising edge and the first type is a falling edge.

Example 26 is the data cable of example 24 or example 25, wherein a sum of the first time period and the second time period is lower than $10^{-7}$ s.

Example 27 is the data cable of any of examples 24 to 26, wherein the first conversion circuit is configured to generate the data signal compliant to the Serial Time Encoded Phy, STEP, protocol.

Example 28 is the data cable of any of examples 24 to 28, wherein the first conversion circuit is coupled to the second conversion circuit via a coaxial cable, and wherein the first conversion circuit is configured to output the data signal single ended to the second conversion circuit via the coaxial cable.

Example 29 is the data cable of any of examples 24 to 27, wherein the first conversion circuit is further configured to generate a second data signal based on the input signal, the second data signal being inverted with respect to the data signal, and wherein the second conversion circuit is configured to generate the output signal further based on the second data signal.

Example 29 is the data cable of example 28, wherein the first conversion circuit is coupled to the second conversion circuit via a pair of coaxial cables, and wherein the first conversion circuit is configured to output the data signal and the second data signal to different ones of the pair of coaxial cables.

Example 30 is the data cable of example 28, wherein the first conversion circuit is coupled to the second conversion circuit via a twisted pair cable, and wherein the first conversion circuit is configured to output the data signal and the second data signal to different lines of the twisted pair cable.

Example 31 is the data cable of any of examples 23 to 30, wherein the second connector is configured to receive a second input signal compliant to the communication protocol from the second electronic device. The second conversion circuit is configured to receive the second input signal from the second connector and to generate a third data signal based on the second input signal. The third data signal comprises a sequence of a fourth signal edge of the first type, a fifth signal edge of the second type, and a sixth signal edge of the first type, the fourth signal edge and the fifth signal edge being separated by a third time period corresponding to third data encoded to the second input signal, and the fifth signal edge and the sixth signal edge being separated by a fourth time period corresponding to fourth data encoded to the second input signal. The first conversion circuit is configured to receive the third data signal from the second conversion circuit and to generate a second output signal compliant to the communication protocol based on the third data signal. The first connector is configured output the second output signal to the first electronic device.

Example 32 is the data cable of example 21, wherein the first conversion circuit is configured to simultaneously generate the data signal and the second output signal.

The examples described above in connection with FIGS. 42*a* to 42*c* may be summarized as follows:

Example 1 is a semiconductor package, comprising a first semiconductor die comprising a first integrated circuit, and a second semiconductor die comprising a second integrated circuit. The semiconductor package further comprises a transmission link coupling the first semiconductor die and the second semiconductor die. The first semiconductor die further comprises an apparatus for generating a data transmit signal. The apparatus for generating the data transmit signal comprises a processing circuit configured to generate the data transmit signal, the data transmit signal comprising a sequence of a first signal edge of a first type, a second signal edge of a second type, and a third signal edge of the first type, the first signal edge and the second signal edge being separated by a first time period corresponding to first data to be transmitted from the first integrated circuit to the second integrated circuit, and the second signal edge and the third signal edge being separated by a second time period corresponding to second data to be transmitted from the first integrated circuit to the second integrated circuit. Further, the apparatus for generating the data transmit signal comprises an interface circuit configured to output the data signal to the transmission link.

Example 2 is the semiconductor package of example 1, wherein the interface circuit is further configured to receive a data receive signal via the transmission link, and wherein the first semiconductor die further comprises an apparatus for decoding the data receive signal. The apparatus for decoding the data receive signal comprises a processing circuit configured to determine a sequence of a fourth signal edge of the first type, a fifth signal edge of the second type, and a sixth signal edge of the first type in the data receive signal. Further, the apparatus for decoding the data receive signal comprises a demodulation circuit configured to determine first data for the first integrated circuit based on a third time period between the fourth signal edge and the fifth signal edge, and to determine second data for the first integrated circuit based on a fourth time period between the fifth signal edge and the sixth signal edge.

Example 3 is the semiconductor package of example 1 or example 2, wherein the transmission link is one or more wires, or wherein the transmission link is one or more conductive tracks on a printed circuit board holding the first semiconductor die and the second semiconductor die.

Example 4 is the semiconductor package of example 1 or example 2, wherein the first semiconductor die and the second semiconductor die are mounted on a third semiconductor die, and wherein the transmission link is one or more conductive traces in a wiring layer stack of the third semiconductor die.

Example 5 is the semiconductor package of any of examples 1 to 4, wherein the first type is a rising edge and the second type is a falling edge, or wherein the second type is a rising edge and the first type is a falling edge.

Example 6 is the semiconductor package of any of examples 1 to 5, wherein a sum of the first time period and the second time period is lower than $10^{-7}$ s.

Example 7. is the semiconductor package of any of example 1 to 6, wherein the processing circuit is configured to generate the data transmit signal compliant to the Serial Time Encoded Phy, STEP, protocol, and/or the apparatus for decoding the data receive signal is configured to decode the data receive signal compliant to the STEP protocol.

Example 8 is the semiconductor package of any of example 1 to 7, wherein the first data to be transmitted from the first integrated circuit to the second integrated circuit is two bits or less.

Example 9 is a semiconductor die, comprising a first integrated circuit, a second integrated circuit, and a transmission link coupling the first integrated circuit and the second integrated circuit. The first integrated circuit comprises an apparatus for generating a data transmit signal. The apparatus for generating the data transmit comprises a processing circuit configured to generate the data transmit signal, the data transmit signal comprising a sequence of a first signal edge of a first type, a second signal edge of a second type, and a third signal edge of the first type, the first signal edge and the second signal edge being separated by a first time period corresponding to first data to be transmitted from the first integrated circuit to the second integrated circuit, and the second signal edge and the third signal edge being separated by a second time period corresponding to second data to be transmitted from the first integrated circuit to the second integrated circuit. Further, the apparatus for generating a data transmit comprises an interface circuit configured to output the data signal to the transmission link.

Example 10 is the semiconductor die of example 9, wherein the interface circuit is further configured to receive a data receive signal via the transmission link, and wherein the first integrated circuit further comprises an apparatus for decoding the data receive signal. The apparatus for decoding the data receive signal comprises a processing circuit configured to determine a sequence of a fourth signal edge of the first type, a fifth signal edge of the second type, and a sixth signal edge of the first type in the data receive signal. Further, the apparatus for decoding the data receive signal comprises a demodulation circuit configured to determine first data for the first integrated circuit based on a third time period between the fourth signal edge and the fifth signal edge, and to determine second data for the first integrated circuit based on a fourth time period between the fifth signal edge and the sixth signal edge.

Example 11 is the semiconductor die of example 9 or example 10, wherein the transmission link is one or more conductive traces in a wiring layer stack of the semiconductor die.

Example 12 is the semiconductor die of any of examples 9 to 11, wherein the first type is a rising edge and the second type is a falling edge, or wherein the second type is a rising edge and the first type is a falling edge.

Example 13 is the semiconductor die of any of examples 9 to 12, wherein a sum of the first time period and the second time period is lower than $10^{-7}$ s.

Example 14 is the semiconductor die of any of example 9 to 13, wherein the processing circuit is configured to generate the data transmit signal compliant to the Serial Time Encoded Phy, STEP, protocol, and/or the apparatus for decoding the data receive signal is configured to decode the data receive signal compliant to the STEP protocol.

Example 15 is the semiconductor die of any of example 9 to 14, wherein the first data to be transmitted from the first integrated circuit to the second integrated circuit is two bits or less.

Example 16 is a semiconductor package, comprising a semiconductor die comprising an integrated circuit, an output terminal configured to output an output signal of the semiconductor package, and an apparatus for generating the output signal. The apparatus for generating the output signal comprises a processing circuit configured to generate the output signal, the output signal comprising a sequence of a first signal edge of a first type, a second signal edge of a second type, and a third signal edge of the first type, the first signal edge and the second signal edge being separated by a first time period corresponding to first output data of the integrated circuit, and the second signal edge and the third signal edge being separated by a second time period corresponding to second output data of the integrated circuit. Further, the apparatus for generating the output signal comprises an interface circuit configured to output the output signal to the output terminal.

Example 17 is the semiconductor package of example 16, further comprising an input terminal configured to receive an input signal for the semiconductor package, and an apparatus for decoding the input signal. The apparatus for decoding the input signal comprises a processing circuit configured to determine a sequence of a fourth signal edge of the first type, a fifth signal edge of the second type, and a sixth signal edge of the first type in the input signal. Further, the apparatus for decoding the input signal comprises a demodulation circuit configured to determine first input data based on a third time period between the fourth signal edge and the fifth signal edge, and to determine second input data based on a fourth time period between the fifth signal edge and the sixth signal edge.

Example 18 is the semiconductor package of example 16 or example 17, wherein the first type is a rising edge and the second type is a falling edge, or wherein the second type is a rising edge and the first type is a falling edge.

Example 19 is the semiconductor package of any of examples 16 to 18, wherein a sum of the first time period and the second time period is lower than $10^{-7}$ s.

Example 20 is the semiconductor package of any of example 16 to 19, wherein the processing circuit is configured to generate the output signal compliant to the Serial Time Encoded Phy, STEP, protocol, and/or the apparatus for decoding the data receive signal is configured to decode the input signal compliant to the STEP protocol.

Example 21 is the semiconductor package of any of example 16 to 20, wherein the semiconductor die comprises the apparatus for generating the output signal.

Example 22 is the semiconductor package of any of example 16 to 20, further comprising a second semiconductor die comprising the apparatus for generating the output signal.

The examples described above in connection with FIGS. 43*a* to 43*c* may be summarized as follows:

Example 1 is a data aggregation device for a vehicle. The data aggregation device comprises an input interface circuit configured to couple to a plurality of sensors installed in the vehicle via a plurality of first transmission links, wherein the input interface is further configured to aggregate sensor data from the plurality of sensors. Further, the data aggregation device comprises a processing circuit configured to generate a data signal, the data signal comprising a sequence of a first signal edge of a first type, a second signal edge of a second type, and a third signal edge of the first type, the first signal edge and the second signal edge being separated by a first time period corresponding to first data of the aggregated sensor data, and the second signal edge and the third signal edge being separated by a second time period corresponding to second data of the aggregated sensor data. The data aggregation device additionally comprises an output interface circuit configured to output the data signal to a second transmission link.

Example 2 is the data aggregation device of example 1, wherein the first type is a rising edge and the second type is a falling edge, or wherein the second type is a rising edge and the first type is a falling edge.

Example 3 is the data aggregation device of example 1 or example 2, wherein a sum of the first time period and the second time period is lower than $10^{-7}$ s.

Example 4 is the data aggregation device of any of examples 1 to 3, wherein the processing circuit is further configured to generate a second data signal, the second data signal being inverted with respect to the data signal, and wherein the output interface circuit is further configured to output the second data signal to the second transmission link.

Example 5 is the data aggregation device of any of examples 1 to 5, wherein the processing circuit is configured to generate the data signal compliant to the Serial Time Encoded Phy, STEP, protocol.

Example 6 is the data aggregation device of any of examples 1 to 5, further comprising a processing circuit configured to determine a sequence of a fourth signal edge of the first type, a fifth signal edge of the second type, and a sixth signal edge of the first type in a sensor signal received from one of the plurality sensors by the input interface circuit. The data aggregation device additionally comprises a demodulation circuit configured to determine first sensor data of the one of the plurality sensors based on a third time period between the fourth signal edge and the fifth signal edge, and to determine second sensor data of the one of the plurality sensors based on a fourth time period between the fifth signal edge and the sixth signal edge.

Example 7 is the data aggregation device of example 6, wherein the demodulation circuit is configured to demodulate the sensor signal compliant to the Serial Time Encoded Phy, STEP, protocol.

Example 8 is the data aggregation device of any of examples 1 to 7, wherein the processing circuit is configured to generate the data signal to exhibit a higher data rate than the sensor data received via a single one of the plurality of first transmission links by the input interface circuit.

Example 9 is a data processing device for a vehicle, comprising an input interface circuit configured to receive a data signal from a transmission link, wherein the data signal carries sensor data from a plurality of sensors. Further, the data processing device comprises an apparatus for decoding, comprising a processing circuit configured to determine a sequence of a first signal edge of a first type, a second signal edge of a second type, and a third signal edge of the first type in the data signal. The apparatus for decoding additionally comprises a demodulation circuit configured to determine first data of the sensor data based on a first time period between the first signal edge and the second signal edge, and to determine second data of the sensor data based on a second time period between the second signal edge and the third signal edge. The data processing device further comprises a processor configured to generate control data for a controllable device of the vehicle based on the first data and the second data of the sensor data.

Example 10 is the data processing device of example 9, further comprising an apparatus for generating a control signal. The apparatus for generating the control signal comprises another processing circuit configured to generate the control signal, the control signal comprising a sequence of a fourth signal edge of the first type, a fifth signal edge of the second type, and a sixth signal edge of the first type, the fourth signal edge and the fifth signal edge being separated by a third time period corresponding to first data of the control data, and the fifth signal edge and the sixth signal edge being separated by a fourth time period corresponding to second data of the control data. Further, the apparatus for generating the control signal comprises an output interface circuit configured to output the data signal to another transmission link.

Example 11 is the data processing device of example 9 or example 10, wherein a sum of the third time period and the fourth time period is lower than $10^{-7}$ s.

Example 12 is the data processing device of any of example 9 to 11, further comprising a memory device. The other processing circuit is further configured to generate a write signal for the memory device, the write signal comprising a sequence of a seventh signal edge of the first type, an eighth signal edge of the second type, and a ninth signal edge of the first type, the seventh signal edge and the eighth signal edge being separated by a fifth time period corresponding to first data of the processor to be written to the memory device, and the eighth signal edge and the ninth signal edge being separated by a sixth time period corresponding to second data of the processor to be written to the memory device. Alternatively or additionally, the processing circuit is configured to determine a sequence of a tenth signal edge of the first type, an eleventh signal edge of the second type, and a twelfth signal edge of the first type in a read signal output by the memory device, and the demodulation circuit is configured to determine first data for the processor based on a seventh time period between the tenth signal edge and the eleventh signal edge, and to determine second data for the processor based on an eighth time period between the eleventh signal edge and the twelfth signal edge.

Example 13 is the data processing device of any of example 9 to 12, wherein the first type is a rising edge and the second type is a falling edge, or wherein the second type is a rising edge and the first type is a falling edge.

Example 14 is the data processing device of any of example 9 to 13, wherein the demodulation circuit is configured to demodulate at least one of the data signal and the read signal compliant to the Serial Time Encoded Phy, STEP, protocol, and/or the other processing circuit is configured to generate at least one of the control signal and the write signal compliant to the STEP protocol.

Example 15 is a vehicle, comprising a plurality of sensors and a data aggregation device. The data aggregation device comprises a first interface circuit configured to couple to the plurality of sensors via a plurality of first transmission links, wherein the input interface is further configured to aggregate sensor data from the plurality of sensors. Additionally, the data aggregation device comprises a processing circuit configured to generate a data signal, the data signal comprising a sequence of a first signal edge of a first type, a second signal edge of a second type, and a third signal edge of the first type, the first signal edge and the second signal edge being separated by a first time period corresponding to first data of the aggregated sensor data, and the second signal edge and the third signal edge being separated by a second time period corresponding to second data of the aggregated sensor data. The data aggregation device further comprises a second interface circuit configured to output the data signal to a second transmission link.

Example 16 is the vehicle of example 15, wherein a data rate of the data signal is at least five times higher than a data rate of each of the sensor data received via a single one of the plurality of first transmission links.

Example 17 is the vehicle of example 15 or example 16, further comprising a data processing device. The data processing device comprises a third interface circuit configured to receive the data signal from the second transmission link. Further, the data processing device comprises a processing circuit configured to determine a sequence of a fourth signal edge of the first type, a fifth signal edge of the second type, and a sixth signal edge of the second type in the data signal. The data processing device additionally comprises a demodulation circuit configured to determine third data of the sensor data based on a third time period between the fourth signal edge and the fifth signal edge, and to determine fourth data of the sensor data based on a fourth time period between the fifth signal edge and the sixth signal edge. The data processing device further comprises a processor configured to generate control data for a controllable device of the vehicle based on the third data and the fourth data of the sensor data.

Example 18 is the vehicle of example 17, wherein the data processing device further comprises an apparatus for generating a control signal. The apparatus for generating the control signal comprises another processing circuit configured to generate the control signal, the control signal comprising a sequence of a seventh signal edge of the first type, an eighth signal edge of the second type, and a ninth signal edge of the first type, the seventh signal edge and the eighth signal edge being separated by a fifth time period corresponding to first data of the control data, and the eighth signal edge and the ninth signal edge being separated by a sixth time period corresponding to second data of the control data. Further, the apparatus for generating the control signal comprises a fourth interface circuit configured to output the data signal to a third transmission link coupled to the controllable device.

Example 19 is the vehicle of example 18, further comprising a repeater circuit coupled between the fourth output circuit and the controllable device, wherein the repeater circuit is configured to receive the control signal from the third transmission link and to amplify the control signal.

Example 20 is the vehicle of any of examples 15 to 19, wherein a sum of the first time period and the second time period is lower than $10^{-7}$ s, and/or wherein a sum of the third time period and the fourth time period is lower than $10^{-7}$ s.

Example 21 is the vehicle of any of example 15 to 20, wherein the demodulation circuit is configured to demodulate the data signal compliant to the Serial Time Encoded Phy, STEP, protocol, and/or the other processing circuit is configured to generate the control signal compliant to the STEP protocol.

The examples described above in connection with FIGS. 44a to 44c may be summarized as follows:

Example 1 is a sensor device, comprising a camera element configured to generate image data, and a processing circuit configured to generate a data signal. The data signal comprises a sequence of a first signal edge of a first type, a second signal edge of a second type, and a third signal edge of the first type, the first signal edge and the second signal edge being separated by a first time period corresponding to first data of the image data, and the second signal edge and the third signal edge being separated by a second time period corresponding to second data of the image data. The sensor device further comprises an interface circuit configured to output the data signal.

Example 2 is the sensor device of example 1, wherein the image data comprises at least one video data stream.

Example 3 is the sensor device of example 2, wherein the video data stream exhibits a data rate of more than 5.5 Gbit/s.

Example 4 is the sensor device of any of examples 1 to 3, wherein the first type is a rising edge and the second type is a falling edge, or wherein the second type is a rising edge and the first type is a falling edge.

Example 5 is the sensor device of any of examples 1 to 4, wherein a sum of the first time period and the second time period is lower than $10^{-7}$ s.

Example 6 is the sensor device of any of examples 1 to 5, wherein the processing circuit is further configured to generate a second data signal, the second data signal being inverted with respect to the data signal, and wherein the interface circuit is further configured to output the second data signal.

Example 7 is the sensor device of any of examples 1 to 6, wherein the processing circuit is configured to generate the data signal compliant to the Serial Time Encoded Phy, STEP, protocol.

Example 8 is the sensor device of any of examples 1 to 7, wherein the camera element comprises a first camera configured to generate a first video data stream, and a second camera configured to generate a second video data stream. The camera element is configured to generate the image data to comprise the first video data stream and the second video data stream.

Example 9 is the sensor device of any of examples 1 to 8, further comprising at least one further sensor element configured to generate sensor data, wherein the processing circuit is further configured to include the sensor data into the data signal.

Example 10 is the sensor device of example 9, wherein the further sensor element is one of a microphone and a light sensor.

Example 11 is the sensor device of any of examples 1 to 11, wherein the interface circuit is further configured to receive a control signal. The electronic device further comprises another processing circuit configured to determine a sequence of a fourth signal edge of the first type, a fifth signal edge of the second type, and a sixth signal edge of the second type in the control signal. Additionally, the electronic device comprises a demodulation circuit configured to determine first control data based on a first time period between the fourth signal edge and the fifth signal edge, and to determine second control data based on a second time period between the fifth signal edge and the sixth signal edge.

Example 12 is a bridge circuit, comprising a first interface circuit configured to receive sensor data, and a processing circuit configured to generate a data signal. The data signal comprises a sequence of a first signal edge of a first type, a second signal edge of a second type, and a third signal edge of the first type, the first signal edge and the second signal edge being separated by a first time period corresponding to first data of the sensor data, and the second signal edge and the third signal edge being separated by a second time period corresponding to second data of the sensor data. The bridge circuit additionally comprises a second interface circuit configured to output the data signal.

Example 13 is the bridge circuit of example 12, wherein the first type is a rising edge and the second type is a falling edge, or wherein the second type is a rising edge and the first type is a falling edge.

Example 14 is the bridge circuit of example 12 or example 13, wherein a sum of the first time period and the second time period is lower than $10^{-7}$ s.

Example 15 is the bridge circuit of any of examples 12 to 14, wherein the processing circuit is further configured to generate a second data signal, the second data signal being inverted with respect to the data signal, and wherein the second interface circuit is further configured to output the second data signal.

Example 16 is the bridge circuit of any of examples 12 to 15, wherein the processing circuit is configured to generate the data signal compliant to the Serial Time Encoded Phy, STEP, protocol.

Example 17 is the bridge circuit of any of examples 12 to 16, wherein the first interface is configured to receive the sensor data from at least two sensor elements.

Example 18 is the bridge circuit of any of examples 12 to 17, wherein the sensor data comprises image data, and wherein the first interface circuit is configured to receive the image data compliant with the Camera Serial Interface, CSI, protocol.

Example 19 is the bridge circuit of any of examples 12 to 18, wherein the second interface circuit is further configured to receive a control signal. The bridge circuit further comprises another processing circuit configured to determine a sequence of a fourth signal edge of the first type, a fifth signal edge of the second type, and a sixth signal edge of the second type in the control signal. Additionally, the bridge circuit comprises a demodulation circuit configured to determine first control data based on a third time period between the fourth signal edge and the fifth signal edge, and to determine second control data based on a fourth time period between the fifth signal edge and the sixth signal edge. The first interface is configured to output the first control data and the second control data compliant to a communication protocol.

Example 20 is an electronic device, comprising an interface circuit configured to receive a data signal, and a processing circuit configured to determine a sequence of a first signal edge of a first type, a second signal edge of a second type, and a third signal edge of the first type in the data signal. Additionally, the electronic device comprises a demodulation circuit configured to determine first data based on a first time period between the first signal edge and the second signal edge, and to determine second data based on a second time period between the second signal edge and the third signal edge. The electronic device further comprises an application processor configured to determine sensor data based on the first data and the second data.

Example 21 is the electronic device of example 20, wherein the first type is a rising edge and the second type is a falling edge, or wherein the second type is a rising edge and the first type is a falling edge.

Example 22 is the electronic device of example 20 or example 21, wherein a sum of the first time period and the second time period is lower than $10^{-7}$ s.

Example 23 is the electronic device of any of examples 20 to 22, wherein the interface circuit is further configured to receive a second data signal, the second data signal being inverted with respect to the data signal, and wherein the processing circuit is configured to determine the first signal edge, the second signal edge, and the third signal edge further based on the second data signal.

Example 24 is the electronic device of any of examples 20 to 23, wherein the demodulation circuit is configured to demodulate the data signal compliant to the Serial Time Encoded Phy, STEP, protocol.

Example 25 is the electronic device of any of examples 20 to 24, wherein the application processor is further configured to generate control data. The electronic device further comprises another processing circuit configured to generate a control signal, the control signal comprising a sequence of a fourth signal edge of the first type, a fifth signal edge of the second type, and a sixth signal edge of the first type, the fourth signal edge and the fifth signal edge being separated by a third time period corresponding to first data of the control data, and the fifth signal edge and the sixth signal edge being separated by a fourth time period corresponding to second data of the control data. Additionally, the interface circuit is configured to output the control signal.

Example 26 is a bridge circuit, comprising a first interface circuit configured to receive a data signal, and a processing circuit configured to determine a sequence of a first signal edge of a first type, a second signal edge of a second type, and a third signal edge of the first type in the data signal. The bridge circuit additionally comprises a demodulation circuit configured to determine first data based on a first time period between the first signal edge and the second signal edge, and to determine second data based on a second time period between the second signal edge and the third signal edge. Further, the bridge circuit comprises a modulation circuit configured to generate an output signal compliant to a communication protocol based on the first data and the second data, and a second interface circuit configured to output the output signal.

Example 27 is the bridge circuit of example 26, wherein the first type is a rising edge and the second type is a falling edge, or wherein the second type is a rising edge and the first type is a falling edge.

Example 28 is the bridge circuit of example 26 or example 27, wherein a sum of the first time period and the second time period is lower than $10^{-7}$ s.

Example 29 is the bridge circuit of any of examples 26 to 28, wherein the first interface circuit is further configured to receive a second data signal, the second data signal being inverted with respect to the data signal, and wherein the processing circuit is configured to determine the first signal edge, the second signal edge, and the third signal edge further based on the second data signal.

Example 30 is the bridge circuit of any of examples 26 to 29, wherein the demodulation circuit is configured to demodulate the data signal compliant to the Serial Time Encoded Phy, STEP, protocol.

Example 31 is the bridge circuit of any of examples 26 to 30, wherein the modulation circuit is further configured to generate a second output signal, the second output signal being inverted with respect to the output signal, and wherein the second interface circuit is further configured to output the second output signal.

Example 32 is the bridge circuit of any of examples 26 to 31, wherein the second interface circuit is further configured to receive control data compliant to the communication protocol. The bridge circuit further comprises another processing circuit configured to generate a control signal, the control signal comprising a sequence of a fourth signal edge of the first type, a fifth signal edge of the second type, and a sixth signal edge of the first type, the fourth signal edge and the fifth signal edge being separated by a third time period corresponding to first data of the control data, and the fifth signal edge and the sixth signal edge being separated by a fourth time period corresponding to second data of the control data. Additionally, the first interface circuit is configured to output the control signal.

Example 33 is the bridge circuit of any of examples 26 to 32, wherein the communication protocol is one of Peripheral Component Interconnect express, PCIe; D-PHY; M-PHY; or Universal Serial Bus, USB.

Example 34 is an imaging system comprising at least one imaging device. The at least one imaging device comprises a camera element configured to generate image data, and a processing circuit configured to generate a data signal. The data signal comprises a sequence of a first signal edge of a first type, a second signal edge of a second type, and a third signal edge of the first type, the first signal edge and the second signal edge being separated by a first time period corresponding to first data of the image data, and the second signal edge and the third signal edge being separated by a second time period corresponding to second data of the image data. The at least one imaging device further comprises an output interface circuit configured to output the data signal to a transmission link. Additionally, the imaging system comprises an image processing device. The image processing device comprises an input interface circuit configured to receive the data signal from the transmission link, and another processing circuit configured to determine a sequence of a fourth signal edge of the first type, a fifth signal edge of the second type, and a sixth signal edge of the second type in the data signal. Further, the image processing device comprises a demodulation circuit configured to determine third data based on a third time period between the fourth signal edge and the fifth signal edge, and to determine fourth data based on a fourth time period between the fifth signal edge and the sixth signal edge. The image processing device comprises additionally comprises an application processor configured to determine the image data based on the third data and the fourth data.

Example 35 is a communication device comprising at least one sensor device. The at least one sensor device comprises a camera element configured to generate image data, and a processing circuit configured to generate a data signal. The data signal comprises a sequence of a first signal edge of a first type, a second signal edge of a second type, and a third signal edge of the first type, the first signal edge and the second signal edge being separated by a first time period corresponding to first data of the image data, and the second signal edge and the third signal edge being separated by a second time period corresponding to second data of the image data. The at least one sensor device further comprises an interface circuit configured to output the data signal.

Example 36 is the communication device of example 35, wherein the sensor device comprises at least one further sensor element configured to generate sensor data, and wherein the processing circuit is further configured to include the sensor data into the data signal.

Example 37 is the communication device of example 35 or example 36, wherein the communication device is one of a mobile phone, a tablet computer, a laptop computer, and a computer.

The examples described above in connection with FIGS. 46*a* to 46*c* may be summarized as follows:

Example 1 is a radio system, comprising a printed circuit board, a first die arranged on the printed circuit board and comprising a baseband processor configured to generate transmit data, and a second die arranged on the printed circuit board and comprising at least part of a radio frequency modem. The first die further comprises a processing circuit configured to generate a data transmit signal, the data transmit signal comprising a sequence of a first signal edge of a first type, a second signal edge of a second type, and a third signal edge of the first type, the first signal edge and the second signal edge being separated by a first time period corresponding to first data related to the transmit data, and the second signal edge and the third signal edge being separated by a second time period corresponding to second data related to the transmit data. The first die additionally comprises an interface circuit configured to output the data transmit signal to a transmission link coupling the first die and the second die.

Example 2 is the radio system of example 1, wherein the first type is a rising edge and the second type is a falling edge, or wherein the second type is a rising edge and the first type is a falling edge.

Example 3 is the radio system of example 1 or example 2, wherein a sum of the first time period and the second time period is lower than $10^{-7}$ s.

Example 4 is the radio system of any of examples 1 to 3, wherein the processing circuit is further configured to generate a second data transmit signal, the second data signal being inverted with respect to the data transmit signal, and wherein the output interface circuit is further configured to output the second data transmit signal to the transmission link.

Example 5 is the radio system of any of examples 1 to 4, wherein the interface circuit is further configured to receive a data receive signal from the transmission link. The first die further comprises another processing circuit configured to determine a sequence of a fourth signal edge of the first type, a fifth signal edge of the second type, and a sixth signal edge of the second type in the data receive signal. Additionally, the first die comprises a demodulation circuit configured to determine first receive data based on a first time period between the fourth signal edge and the fifth signal edge, and to determine second receive data based on a second time period between the fifth signal edge and the sixth signal edge.

Example 6 is the radio system of any of example 1 to 5, wherein the processing circuit is configured to generate the data transmit signal compliant to the Serial Time Encoded Phy, STEP, protocol, and/or the demodulation circuit is configured to demodulate the data receive signal compliant to the STEP protocol.

Example 7 is a mobile device comprising a radio system according to any of examples 1 to 6.

Example 8 is the mobile device of example 7, further comprising an application processor arranged on the printed circuit board, wherein the application processor is coupled to the baseband processor.

Example 9 is a base station for a mobile communication network comprising a radio system according to any of examples 1 to 6.

Example 10 is the base station of example 9, further comprising an application processor coupled to the baseband processor.

The examples described above in connection with FIGS. 47*a* to 47*d* may be summarized as follows:

Example 1 is a radio system comprising a die arranged on a printed circuit board, wherein the die comprises a baseband processor and a first part of a radio frequency modem. The radio system further comprises a radio head arranged separate from the printed circuit board, wherein the radio head comprises a second part of the radio frequency modem and at least one antenna coupled to the second part of the radio frequency modem. The first die further comprises a processing circuit configured to generate a data transmit signal, the data transmit signal comprising a sequence of a first signal edge of a first type, a second signal edge of a second type, and a third signal edge of the first type, the first signal edge and the second signal edge being separated by a first time period corresponding to first data generated by the first part of a radio frequency modem, and the second signal edge and the third signal edge being separated by a second time period corresponding to second data generated by the first part of a radio frequency modem. Additionally, the first die comprises an interface circuit configured to output the data transmit signal to a transmission link coupling the first die and the radio head.

Example 2 is the radio system of example 1, wherein the first part of the radio frequency modem comprises only digital circuitry, and wherein the second part of the radio frequency modem comprises digital and analog circuitry.

Example 3 is the radio system of example 1 or example 2, wherein the data transmit signal comprises data for multiple transmit channels and/or data for multiple transmit polarizations.

Example 4 is the radio system of any of examples 1 to 3, wherein the first type is a rising edge and the second type is a falling edge, or wherein the second type is a rising edge and the first type is a falling edge.

Example 5 is the radio system of any of examples 8 to 4, wherein a sum of the first time period and the second time period is lower than $10^{-7}$ s.

Example 6 is the radio system of any of examples 1 to 5, wherein the processing circuit is further configured to generate a second data transmit signal, the second data signal being inverted with respect to the data transmit signal, and wherein the output interface circuit is further configured to output the second data transmit signal to the transmission link.

Example 7 is the radio system of any of examples 8 to 6, wherein the interface circuit is further configured to receive a data receive signal from the second part of the radio frequency modem via the transmission link. The first die further comprises another processing circuit configured to determine a sequence of a fourth signal edge of the first type, a fifth signal edge of the second type, and a sixth signal edge of the second type in the data receive signal. Additionally, the first die comprises a demodulation circuit configured to determine first receive data based on a first time period between the fourth signal edge and the fifth signal edge, and to determine second receive data based on a second time period between the fifth signal edge and the sixth signal edge.

Example 8 is the radio system of any of examples 1 to 7, wherein the processing circuit is configured to generate the data transmit signal compliant to the Serial Time Encoded Phy, STEP, protocol, and/or the demodulation circuit is configured to demodulate the data receive signal compliant to the STEP protocol.

Example 9 is a mobile device comprising a radio system according to any of examples 1 to 8.

Example 10 is the mobile device of example 16, further comprising an application processor arranged on the printed circuit board, wherein the application processor is coupled to the baseband processor.

Example 11 is a base station for a mobile communication network comprising a radio system according to any of examples 1 to 8.

Example 12 is the base station of example 11, further comprising an application processor coupled to the baseband processor.

The examples described above in connection with FIGS. 48*a* to 48*c* may be summarized as follows:

Example 1 is a semiconductor die comprising at least one processor core configured to generate data to be stored. Further, the semiconductor die comprises a first apparatus capable of generating a first output signal compliant to the Peripheral Component Interconnect express, PCIe, protocol based on the data to be stored, wherein the first apparatus is configured to output the first output signal to a first output terminal of the semiconductor die. The semiconductor die additionally comprises a second apparatus capable of generating a second output signal. The second apparatus comprises a processing circuit configured to generate the second output signal, the second output signal comprising a sequence of a first signal edge of a first type, a second signal edge of a second type, and a third signal edge of the first type, the first signal edge and the second signal edge being separated by a first time period corresponding to first data of the data to be stored, and the second signal edge and the third signal edge being separated by a second time period corresponding to second data of the data to be stored. Additionally, the second apparatus comprises an interface circuit configured to output the second output signal to a second output terminal of the semiconductor die. The semiconductor die further comprises a control circuit configured to enable the first apparatus in a first operation mode and to enable the second apparatus in a second operation mode.

Example 2 is the semiconductor die of example 1, further comprising a PCIe controller configured to control operation of the first apparatus and the second apparatus.

Example 3 is the semiconductor die of example 2, wherein the PCIe controller is configured to communicate with the first apparatus and the second apparatus using a first interface protocol. The second apparatus is configured to communicate with control circuitry using a second interface protocol. The semiconductor die further comprises a gasket circuit coupled between the PCIe controller and the second apparatus, the gasket circuit being configured to convert between the first and the second interface protocol.

Example 4 is the semiconductor die of example 3, wherein the first interface protocol is the PHY Interface for the PCI Express Architecture, PIPE, protocol.

Example 5 is the semiconductor die of any of examples 2 to 4, wherein the PCIe controller comprises a first port for communicating with the first apparatus and a second port for communicating with the second apparatus.

Example 6 is the semiconductor die of any of examples 2 to 5, wherein the PCIe controller comprises the control circuit.

Example 7 is the semiconductor die of any of examples 1 to 6, wherein the first output terminal and the second output terminal are configured to couple to a connector for receiving a data storage device via different signal lines.

Example 8 is the semiconductor die of any of examples 1 to 7, wherein an input terminal of the semiconductor die is configured to couple to a predetermined electrical contact of a connector for receiving a data storage device, and wherein the control circuit is configured to set the second operation mode if a predetermined signal is sensed at the predetermined electrical contact.

Example 9 is the semiconductor die of example 8, wherein the control circuit is configured to set the first operation mode if a signal different from the predetermined signal is sensed at the predetermined electrical contact.

Example 10 is the semiconductor die of example 8 or example 9, wherein another output terminal of the semiconductor die is configured to couple to another predetermined electrical contact of the connector, and wherein the semiconductor die is configured to output another predefined signal to the other predetermined electrical contact via the other output terminal.

Example 11 is the semiconductor die of any of examples 1 to 10, wherein the semiconductor die is configured to receive an input signal at an input terminal of the semiconductor die, and wherein semiconductor die further comprises an apparatus capable of decoding the input signal. The apparatus capable of decoding the input signal comprises another processing circuit configured to determine a sequence of a fourth signal edge of the first type, a fifth signal edge of the second type, and a sixth signal edge of the first type in the input signal. Additionally, the apparatus capable of decoding the input signal comprises a demodulation circuit configured to determine first receive data based on a third time period between the fourth signal edge and the fifth signal edge, and to determine second receive data based on a fourth time period between the fifth signal edge and the sixth signal edge. The control circuit is configured to enable the apparatus capable of decoding the input signal in the second operation mode.

Example 12 is the semiconductor die of example 11, further comprising another apparatus capable of decoding the input signal compliant to the PCIe protocol, wherein the control circuit is configured to enable the other apparatus capable of decoding the input signal compliant to the PCIe protocol in the first operation mode.

Example 13 is the semiconductor die of any of example 1 to 12, wherein the processing circuit is configured to generate the second output signal compliant to the Serial Time Encoded Phy, STEP, protocol, and/or the apparatus capable of decoding the input signal is configured to decode the input signal compliant to the STEP protocol.

Example 14 is the semiconductor die of any of example 1 to 13, wherein the first type is a rising edge and the second type is a falling edge, or wherein the second type is a rising edge and the first type is a falling edge.

Example 15 is the semiconductor die of any of example 1 to 14, wherein a sum of the first time period and the second time period is lower than $10^{-7}$ s.

Example 16 is a data storage device comprising a data storage element configured to store data. Further, the data storage device comprises a first apparatus capable of generating a first output signal compliant to the Peripheral Component Interconnect express, PCIe, protocol based on data stored in the data storage element, wherein the first apparatus is configured to output the first output signal to a connector of the data storage device. The data storage device additionally comprises a second apparatus capable of generating a second output signal. The second apparatus comprises a processing circuit configured to generate the second output signal, the second output signal comprising a sequence of a first signal edge of a first type, a second signal edge of a second type, and a third signal edge of the first type, the first signal edge and the second signal edge being separated by a first time period corresponding to first data of the data stored in the data storage element, and the second signal edge and the third signal edge being separated by a second time period corresponding to second data of the data stored in the data storage element. Further, the second apparatus comprises an interface circuit configured to output the second output signal to the connector. The data storage device additionally comprises a control circuit configured to enable the first apparatus in a first operation mode and to enable the second apparatus in a second operation mode.

Example 17 is the data storage device of example 16, wherein the first apparatus and the interface circuit are coupled to the connector via different signal lines.

Example 18 is the data storage device of example 16 or example 17, wherein the control circuit is configured to set the second operation mode if a predetermined signal is sensed at a predetermined electrical contact of the connector.

Example 19 is the data storage device of example 18, wherein the control circuit is configured to set the first operation mode if a signal different from the predetermined signal is sensed at the predetermined electrical contact.

Example 20 is the data storage device of example 18 or example 19, wherein the data storage device is configured to output another predefined signal to another predetermined electrical contact.

Example 21 is the data storage device of any of examples 16 to 20, further comprising a PCIe controller configured to control operation of the first apparatus and the second apparatus.

Example 22 is the data storage device of example 21, wherein the PCIe controller is configured to communicate with the first apparatus and the second apparatus using a first interface protocol. The second apparatus is configured to communicate with control circuitry using a second interface protocol. The data storage device further comprises a gasket circuit coupled between the PCIe controller and the second apparatus, the gasket circuit being configured to convert between the first and the interface protocol.

Example 23 is the data storage device of example 22, wherein the first interface protocol is the PHY Interface for the PCI Express Architecture, PIPE, protocol.

Example 24 is the data storage device of any of examples 21 to 23, wherein the PCIe controller comprises a first port for communicating with the first apparatus and a second port for communicating with the second apparatus.

Example 25 is the data storage device of any of examples 21 to 24, wherein the PCIe controller comprises the control circuit.

Example 26 is the data storage device of any of examples 16 to 25, wherein the interface circuit is in the second operation mode further configured to receive an input signal from the connector, and wherein data storage device further comprises an apparatus capable of decoding the input signal. The apparatus capable of decoding the input signal comprises another processing circuit configured to determine a sequence of a fourth signal edge of the first type, a fifth signal edge of the second type, and a sixth signal edge of the first type in the input signal. Additionally, the apparatus capable of decoding the input signal comprises a demodulation circuit configured to determine first receive data based on a third time period between the fourth signal edge and the fifth signal edge, and to determine second receive data based on a fourth time period between the fifth signal edge and the sixth signal edge. The control circuit is configured to enable the apparatus capable of decoding the input signal in the second operation mode.

Example 27 is the data storage device of example 11, further comprising another apparatus capable of decoding the input signal compliant to the PCIe protocol, wherein the control circuit is configured to enable the apparatus capable of decoding the input signal compliant to the PCIe protocol in the first operation mode.

Example 28 is the data storage device of any of example 16 to 27, wherein the processing circuit is configured to generate the second output signal compliant to the Serial Time Encoded Phy, STEP, protocol, and/or the apparatus for decoding the input signal is configured to decode the input signal compliant to the STEP protocol.

Example 29 is the data storage device of any of example 16 to 28, wherein the first type is a rising edge and the second type is a falling edge, or wherein the second type is a rising edge and the first type is a falling edge.

Example 30 is the data storage device of any of example 16 to 29, wherein a sum of the first time period and the second time period is lower than $10^{-7}$ s.

Example 31 is the data storage device of any of examples 16 to 30, wherein the data storage element is a three-dimensional crosspoint memory.

Example 32 is a computer comprising a semiconductor die according to any of examples 1 to 15.

Example 33 is a computer comprising a data storage device according to any of examples 16 to 31.

The aspects and features mentioned and described together with one or more of the previously detailed examples and Figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the Figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the examples may be implemented by a device having means for performing each of the respective acts of these methods.

It is to be understood that the disclosure of multiple acts, processes, operations, steps or functions disclosed in the specification or examples may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following examples are hereby incorporated into the detailed description, where each example may stand on its own as a separate example. While each example may stand on its own as a separate example, it is to be noted that—although a dependent example may refer in the examples to a specific combination with one or more other examples—other examples may also include a combination of the dependent example with the subject matter of each other dependent or independent example. Such combinations are explicitly proposed herein unless it is stated that a specific combination is not intended. Furthermore, it is intended to include also features of a example to any other independent example even if this example is not directly made dependent to the independent example.

What is claimed is:

1. A method for processing a data signal, the method comprising:

receiving a first group of at least one payload data symbol;

sending a negative acknowledge signal if the received first group contains an error;

receiving a second group of at least one payload data symbol:

at a number of groups of payload data symbols after sending the negative acknowledge signal, or receiving the second group at a number of groups of payload data symbols after receiving the first group.

2. The method of claim 1 further comprising:

demodulating the payload data symbols of the first group using a first demodulation scheme; and demodulating the payload data symbols of the second group using a second demodulation scheme.

3. The method of claim 2, wherein the second demodulation scheme is more robust than the first demodulation scheme.

4. The method of claim 3, wherein a symbol separation time of the second demodulation scheme is longer than the symbol separation time of the first demodulation scheme.

5. The method of claim 1, further comprising:

receiving the first group and the second group via a first transmission link; and transmitting the negative acknowledge signal via a second transmission link.

6. A method for generating a data signal, the method comprising:

transmitting a first group of at least one payload data symbol; and upon receiving a negative acknowledge signal, transmitting a second group of at least one payload data symbol related to the first group:

at a number of groups of payload data symbols after transmitting the first group, or at a number of groups of payload data symbols after receiving the negative acknowledge signal.

7. The method of claim 6, further comprising:

modulating payload data into the first group using a first modulation scheme; and modulating the payload data into the second group using a second modulation scheme.

8. The method of claim 7, wherein the second modulation scheme is more robust than the first modulation scheme.

9. The method of claim 8, wherein a symbol separation time of the second modulation scheme is longer than the symbol separation time of the first modulation scheme.

10. The method of claim 6, further comprising:

transmitting the first group and the second group via a first transmission link; and receiving the negative acknowledge signal via a second transmission link.

11. An apparatus for processing a data signal, the apparatus comprising:

a receiver circuit configured to receive groups of payload data symbols;

an error detection circuit configured to generate a negative acknowledge signal if a first group of at least one payload data symbol contains an error; and error correction circuitry configured to use a second group of at least one payload data symbol to replace the first group, the second group being received:

at a number of groups of payload data symbols after sending the negative acknowledge signal or at a number of groups of payload data symbols after receiving the first group.

12. The apparatus of claim 11, further comprising:

demodulation circuitry configured to demodulate the payload data symbols of the first group using a first demodulation scheme and to demodulate the payload data symbols of the second group using a second demodulation scheme.

13. The apparatus of claim 11, further comprising an input interface for a first transmission link coupled to the receiver circuit to receive a data signal comprising the groups of payload data symbols.

14. The apparatus of claim 13, wherein the input interface is configured to receive the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period; the first time period being based on a first payload data symbol, and the second time period being based on a second payload data symbol.

15. The apparatus of claim 13, further comprising an output interface for transmitting the negative acknowledge signal via a second transmission link, the output interface coupled to the error detection circuit.

16. An apparatus for generating a data signal, the apparatus comprising:

a transmitter circuit configured to transmit a first group of at least one payload data symbol; and an input interface configured to receive a negative acknowledge signal, wherein the transmitter circuit is further configured to transmit a second group of at least one payload data symbol related to the first group:

at a number of groups of payload data symbols after transmitting the first group, or at a number of groups of payload data symbols after receiving the negative acknowledge signal.

17. The apparatus of claim 16, wherein the transmitter circuit further comprises a modulator circuit configured to modulate payload data into the first group using a first modulation scheme; and to modulate the payload data into the second group using a second modulation scheme.

18. The apparatus of claim 17, wherein a symbol separation time of the second modulation scheme is longer than the symbol separation time of the first modulation scheme.

19. The apparatus of claim 16, further comprising:

an output interface configured to output a data signal comprising the first group and the second group; and an input interface configured to receive the negative acknowledge signal via a second transmission link.

20. The apparatus of claim 19, wherein the output interface is configure to output the data signal comprising a sequence of a first signal edge of a first type, a second signal edge of a second type, and a third signal edge of the first type, the first signal edge and the second signal edge being separated by a first time period, and the second signal edge and the third signal edge being separated by a second time period; the first time period being based on a first payload data symbol, and the second time period being based on a second payload data symbol.

21. A physical layer controller for a communication interface, the physical layer controller comprising an apparatus for processing a data signal, the apparatus for processing a data signal comprising:

a receiver circuit configured to receive a first group of at least one payload data symbol;

an error detection circuit configured to send a negative acknowledge signal if the first group contains an error; and error correction circuitry configured to use a second group of at least one payload data symbol to replace the first group, the second group being received:

at a number of groups of payload data symbols after sending the negative acknowledge signal, or at a number of groups of payload data symbols after receiving the first group.

* * * * *